US005367388A

United States Patent [19]

Ossia

[11] Patent Number: 5,367,388

[45] Date of Patent: Nov. 22, 1994

[54] ELECTRONIC SEPARATION SCANNER

[75] Inventor: Yoav Ossia, Tel Aviv, Israel

[73] Assignee: Scitex Corporation Ltd., Herzliya, Israel

[21] Appl. No.: 920,035

[22] Filed: Jul. 27, 1992

[51] Int. Cl.[5] .......................... G03F 3/08; H04N 1/46

[52] U.S. Cl. .................................... 358/518; 358/505; 358/515

[58] Field of Search ............... 358/501, 504, 505, 515, 358/516, 518, 520, 521, 527, 530, 532

[56] References Cited

U.S. PATENT DOCUMENTS 4,491,864 1/1985 Yamada .............................. 358/530
5,172,224 12/1992 Collette et al. ..................... 358/515

FOREIGN PATENT DOCUMENTS 0322879 7/1989 European Pat. Off. .
0398645 11/1990 European Pat. Off. .

OTHER PUBLICATIONS

IBM Technical Disclosure Bulletin, vol. 18, No. 6, Nov. 1975, New York, US. p. 1790. Bennett et al, "Object Access Authorization Mechanism".

*Primary Examiner*—Edward L. Coles, Sr.
*Assistant Examiner*—Thomas D. Lee
*Attorney, Agent, or Firm*—Ladas & Parry

[57] ABSTRACT

An electronic separation scanner including a tool library including a plurality of tools, each individual one of the plurality of tools including a user interface operative to prompt a user to select values for at least one tone enhancement parameter, an optical-mechanical scanning unit operative to electronically scan a color image in accordance with at least one user-selected tone enhancement parameter value and a selective tool disabler operative to selectively disable access of the user to at least one of the plurality of tools.

30 Claims, 6 Drawing Sheets

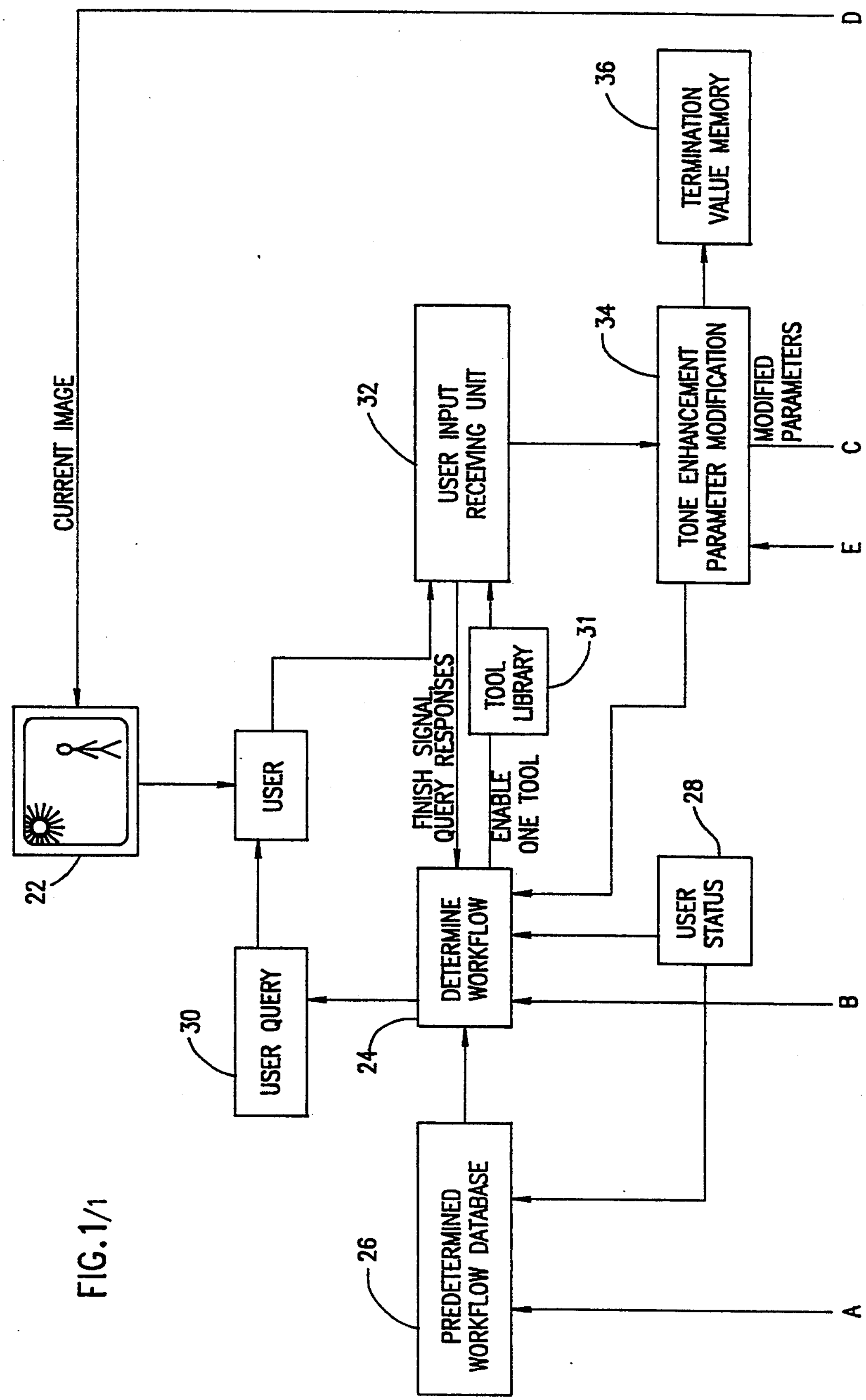
FIG. 1/1

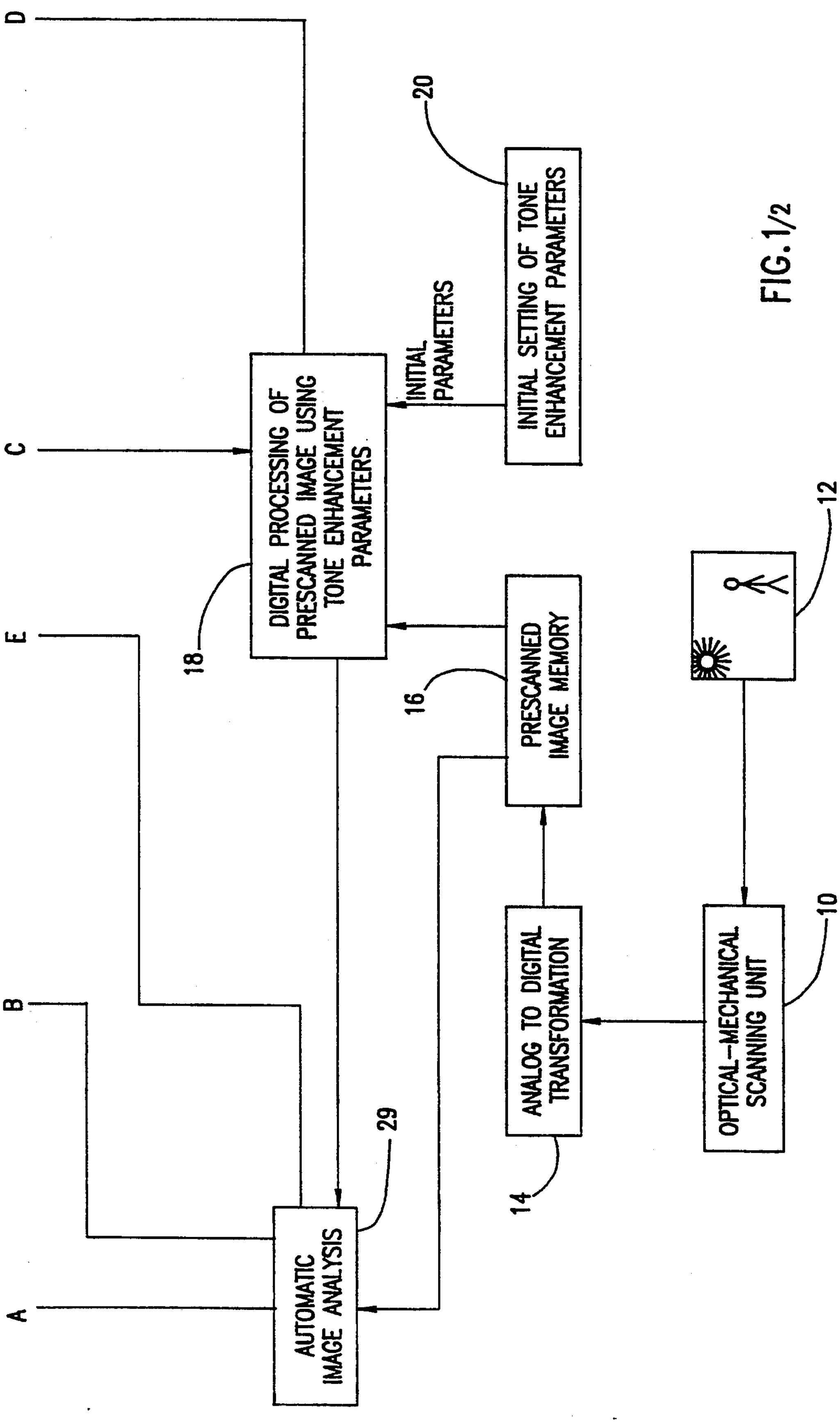
FIG. 1/2

FIG.2/1
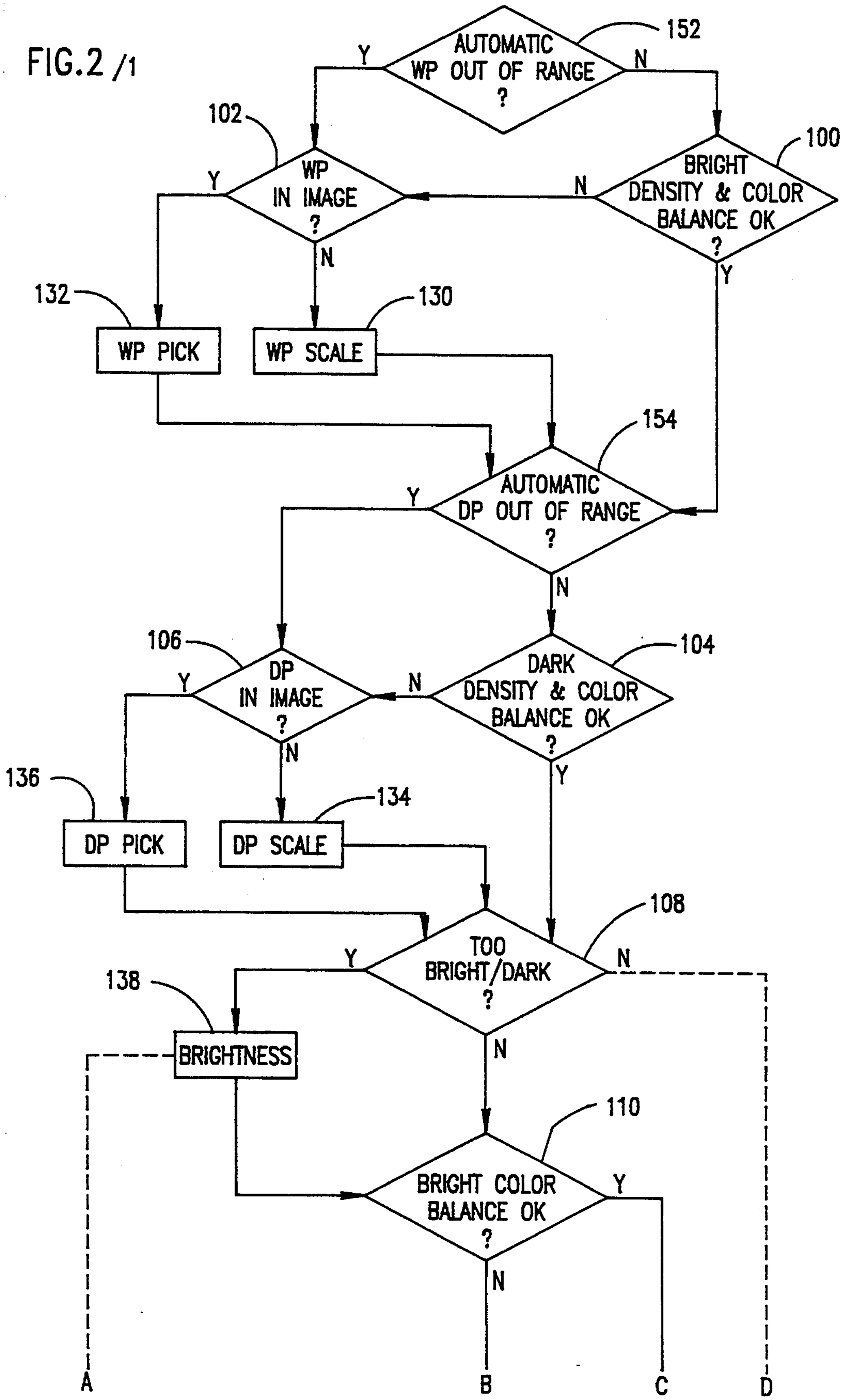

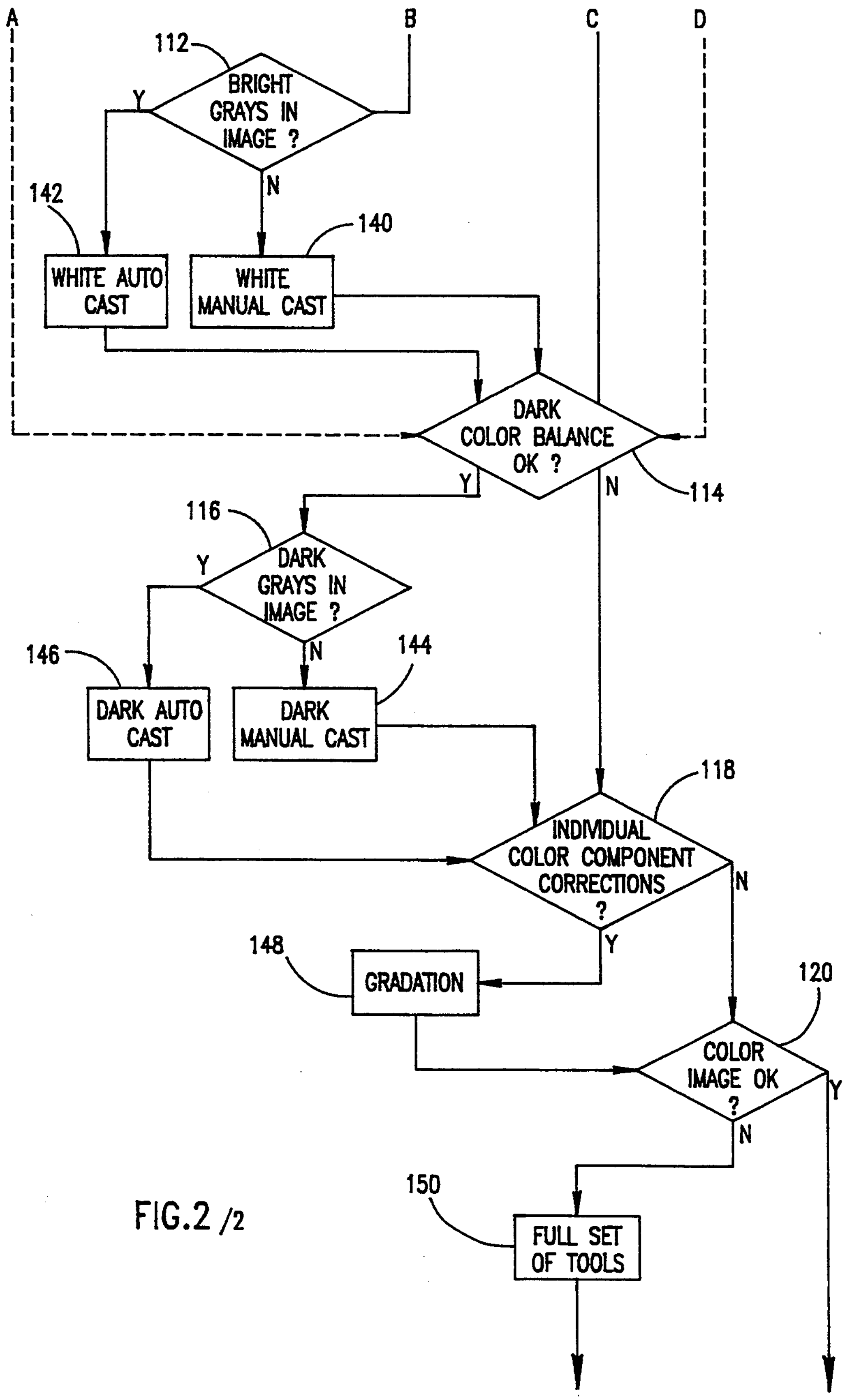
FIG.2 /2

ELECTRONIC SEPARATION SCANNER

FIELD OF THE INVENTION

The present invention relates to methods and apparatus for scanning images.

BACKGROUND OF THE INVENTION

Many electronic color separation scanners are currently on the market. Conventional scanners suffer from the disadvantage that they are relatively difficult to operate, particularly because the operator is repeatedly confronted with a wide variety of possible courses of actions, some of which may be incompatible relative to previously selected courses of action.

For example, a user prescans an image, using an electronic color separation scanner such as the Smart Scanner, commercially available from Scitex Corporation, Herzlia, Isreal. The prescanned image is displayed to the user who selects a point in the prescanned image to serve as a white point. The selected point is then transformed to "absolute white". The user then corrects the color cast of the highlights. For example, the user may think that the light grays have a yellow cast, i e., are too yellow and make an appropriate correction. However, this correction affects his previous selection of the white point by reducing the yellow component of the white point, thereby giving a bluish tone to the absolute white locations of the picture.

Another example is that a user may first increase the brightness level of a color image. The user subsequently selects a relatively non-bright point as the white point because the selected relatively non-bright point, according to the context of the picture, should be white. This operation results in brightening of all points somewhat less bright than the selected point which causes the entire picture to appear too bright.

SUMMARY OF THE INVENTION

The present invention seeks to provide an improved apparatus and method for scanning images in which a professionally designed workflow is built into the electronic color separation scanner.

There is thus provided in accordance with a preferred embodiment of the present invention an electronic separation scanner including a tool library including a plurality of tools, each individual one of the plurality of tools including a user interface operative to prompt a user to select values for at least one tone enhancement parameter, an optical-mechanical scanning unit operative to electronically scan a color image in accordance with at least one user-selected tone enhancement parameter value and a selective tool disabler operative to selectively disable access of the user to at least one of the plurality of tools.

Further in accordance with a preferred embodiment of the present invention, the selective tool disabler includes a set of rules determining a relationship between use of at least one first tool and disabling of a corresponding set of at least one second tools, and a user selection monitor operative to receive an indication of use of a first tool and to disable access of the user to the corresponding set of at least one second tools.

Still further in accordance with a preferred embodiment of the present invention, the selective tool disabler includes a set of rules determining a relationship between type of usage of individual first tools and disabling of a corresponding set of at least one second tools, and a tool usage monitor operative to receive a characterization of usage of a user-selected first tool and to disable access of the user to the corresponding set of at least one second tool in accordance with the set of rules.

Still further in accordance with a preferred embodiment of the present invention, the selective tool disabler includes a tool sequence generator operative to determine a tool sequence in which at least first and second tools are sequentially presented to the user, the first tool including an indication prompting the user to select values for a first set of first tone enhancement parameters and the second tool including an indication prompting the user to select values for a second set of second tone enhancement parameters.

Additionally in accordance with a preferred embodiment of the present invention, the optical-mechanical scanning unit includes a sequence of transformation units operative to provide a corresponding sequence of representations of the color image, the tool library includes a first tool for selecting values of a tone enhancement parameter of an individual transformation unit in the transformation unit sequence and a second tool for selecting values of a tone enhancement parameter of a later transformation unit in the transformation unit sequence, and the first tool precedes the second tool in the tool sequence.

Further in accordance with a preferred embodiment of the present invention, a user querying unit is provided which is operative to prompt a user to enter a user evaluation of at least one characteristic of the color image and to transmit user evaluation information to the tool sequence generator, and the tool sequence generator determines the tool sequence at least partly in accordance with the user evaluation information.

Still further in accordance with a preferred embodiment of the present invention, a query sequence generator is provided which is operative to receive a user response to an individual query from the user querying unit and to determine, at least partly in accordance therewith, a sequence of further queries to be presented to the user by the user querying unit.

Additionally in accordance with a preferred embodiment of the present invention, a query sequence generator is provided which is operative to automatically analyze at least one characteristic of the color image and to determine, at least partly in accordance therewith, a sequence of queries to be presented to the user by the user querying unit.

Further in accordance with a preferred embodiment of the present invention, the query sequence generator is operative to automatically analyze at least one characteristic of the color image and to determine, at least partly in accordance therewith, the sequence of further queries.

Still further in accordance with a preferred embodiment of the present invention, a user expertise level coding system is provided which includes, for each of a plurality of users, a stored indication of an expertise level code value, and the query sequence generator determines the sequence of queries presented to an individual user at least partly in accordance with the user's ordinal expertise level code value.

Additionally in accordance with a preferred embodiment of the present invention, the expertise level code value for each individual user includes an indication of a subset of the plurality of tools to be disabled for the individual user.

Further in accordance with a preferred embodiment of the present invention, the user querying unit prompts a user to evaluate at least one color image characteristic as satisfactory and the tool sequence generator is operative to determine a tool sequence which excludes at least one tool which affects the satisfactory color image characteristic.

Further in accordance with a preferred embodiment of the present invention, an automatic image analyzer is provided which is operative to automatically analyze at least one characteristic of the color image, and the tool sequence generator determines the tool sequence at least partly in accordance with the automatically analyzed characteristic.

For example, each of the first and second sets of first tone enhancement parameters may include an individual one of the following set of tone enhancement parameters: brightness/darkness of white point, brightness/-darkness of dark point, global image brightness/darkness, color balance of white point, color balance of dark point and global image color balance.

Additionally in accordance with a preferred embodiment of the present invention, a current image display is provided which is operative to provide a real-time indication of the appearance of the image as scanned in accordance with current user-selected tone enhancement parameter values.

Still further in accordance with a preferred embodiment of the present invention, a user expertise level coding system is provided which includes, for each of a plurality of users, a stored indication of an ordinal expertise level code value, and, for each expertise level code value, a stored indication of a subset of the plurality of tools to be disabled by the selective tool disabler.

Additionally in accordance with a preferred embodiment of the present invention, the user expertise level coding system also includes an automatic expertise level updating system.

Further in accordance with a preferred embodiment of the present invention, the automatic expertise level updating system includes, for each expertise level code value, a stored indication of at least one prerequisite for advancing a user at the individual expertise level code value to the next expertise level code value.

Still further in accordance with a preferred embodiment of the present invention, the at least one prerequisite includes at least one of the following types of prerequisite: time accumulated at the individual expertise level, quantity of work experience at the individual expertise level, full utilization of the subset of tools which is not disabled by the selective tool disabler, quality level of scanned images generated by a user, and correctness of user's habitual work processes.

There is also provided in accordance with another preferred embodiment of the present invention a tone enhancement tool access control system for controlling user access to tools which allow user selection of tone enhancement parameter values according to which a color image is electronically scanned, the system including a tool library including a plurality of tools, each individual one of the plurality of tools including a user interface operative to prompt a user to select values for at least one tone enhancement parameter, and a selective tool disabler operative to selectively disable access of a user to at least one of the plurality of tools.

There is also provided, in accordance with another preferred embodiment of the present invention, an electronic separation scanning method including the steps of providing a tool library including a plurality of tools, each individual one of the plurality of tools including a user interface operative to prompt a user to select values for at least one tone enhancement parameter, selectively disabling access of the user to at least one of the plurality of tools, and electronically scanning a color image in accordance with at least one user-selected tone enhancement parameter value.

Further in accordance with a preferred embodiment of the present invention, the selectively disabling step includes the steps of providing a set of rules determining a relationship between use of at least one first tool and disabling of a corresponding set of at least one second tools, and receiving an indication of use of a first tool and disabling access of the user to the corresponding set of at least one second tools in accordance with the set of rules.

Further in accordance with a preferred embodiment of the present invention, the selectively disabling step includes the steps of providing a set of rules determining a relationship between type of usage of individual first tools and disabling of a corresponding set of at least one second tools, and receiving a characterization of usage of a user-selected first tool and disabling access of the user to the corresponding set of at least one second tool in accordance with the set of rules.

Still further in accordance with a preferred embodiment of the present invention, the disabling step includes the step of determining a tool sequence in which at least first and second tools are sequentially presented to the user, the first tool including an indication prompting the user to select values for a first set of first tone enhancement parameters and the second tool including an indication prompting the user to select values for a second set of second tone enhancement parameters.

Additionally in accordance with a preferred embodiment of the present invention, the step of electronically scanning includes the step of performing a sequence of color transformations, thereby to provide a sequence of representations of the color image, the tool library includes a first tool for selecting values of a tone enhancement parameter of an individual transformation in the transformation sequence and a second tool for selecting values of a tone enhancement parameter of a later transformation in the transformation sequence, and the first tool precedes the second tool in the tool sequence.

Still further in accordance with a preferred embodiment of the present invention, the method also includes the steps of prompting a user to enter a user evaluation of at least one characteristic of the color image, and determining the tool sequence at least partly in accordance with the user evaluation information.

Additionally in accordance with a preferred embodiment of the present invention, the method also includes the steps of receiving a user response to an individual query and determining, at least partly in accordance therewith, a sequence of further queries to be presented to the user.

Further in accordance with a preferred embodiment of the present invention, the method also includes the steps of automatically analyzing at least one characteristic of the color image, and determining, at least partly in accordance therewith, a sequence of queries to be presented to the user.

Still further in accordance with a preferred embodiment of the present invention, the step of determining includes the step of automatically analyzing at least one characteristic of the color image and determining, at least partly in accordance therewith, the sequence of further queries.

Additionally in accordance with a preferred embodiment of the present invention, the method also includes the step of storing, for each of a plurality of users, an indication of an expertise level code value, and the sequence of queries presented to an individual user is determined at least partly in accordance with the user's ordinal expertise level code value.

Further in accordance with a preferred embodiment of the present invention, the expertise level code value for each individual user includes an indication of a subset of the plurality of tools to be disabled for the individual user.

Still further in accordance with a preferred embodiment of the present invention, the step of prompting includes the step of prompting a user to evaluate at least one color image characteristic as satisfactory, and generating a tool sequence which excludes at least one tool which affects the satisfactory color image characteristic.

Additionally in accordance with a preferred embodiment of the present invention, the method also includes the steps of automatically analyzing at least one characteristic of the color image, and determining the tool sequence at least partly in accordance with the automatically analyzed characteristic.

Further in accordance with a preferred embodiment of the present invention, each of the first and second sets of first tone enhancement parameters includes an individual one of the following set of tone enhancement parameters: brightness/darkness of white point, brightness/darkness of dark point, global image brightness/-darkness, color balance of white point, color balance of dark point, and global image color balance.

Still further in accordance with a preferred embodiment of the present invention, the method also includes the step of providing a real-time indication of the appearance of the image as scanned in accordance with current user-selected tone enhancement parameter values.

Still further in accordance with a preferred embodiment of the present invention, the method also includes the steps of storing, for each of a plurality of users, an indication of an ordinal expertise level code value, and, for each expertise level code value, storing an indication of a subset of the plurality of tools to be disabled by the selective tool disabler.

Additionally in accordance with a preferred embodiment of the present invention, the step of storing also includes the step of automatically updating expertise levels of individual users.

Further in accordance with a preferred embodiment of the present invention, the step of storing includes the step of storing, for each expertise level code value, an indication of at least one prerequisite for advancing a user at the individual expertise level code value to the next expertise level code value.

Still further in accordance with a preferred embodiment of the present invention, the at least one prerequisite includes at least one of the following types of prerequisite: time accumulated at the individual expertise level, quantity of work experience at the individual expertise level, full utilization of the subset of tools which is not disabled by the selective tool disabler, quality level of scanned images generated by a user, and correctness of user's habitual work processes.

There is also provided in accordance with another preferred embodiment of the present invention, a tone enhancement tool access control method for controlling user access to tools which allow user selection of tone enhancement parameter values according to which a color image is electronically scanned, the method including the steps of providing a tool library including a plurality of tools, each individual one of the plurality of tools including a user interface operative to prompt a user to select values for at least one tone enhancement parameter, and selectively disabling access of a user to at least one of the plurality of tools.

Further in accordance with a preferred embodiment of the present invention, the user evaluation of at least one color image characteristic defines a query sequence of at least one queries and the query sequence and the tool sequence are interspersed.

Still further in accordance with a preferred embodiment of the present invention, the step of prompting defines a query sequence of at least one queries and the query sequence and the tool sequence are interspersed.

BRIEF DESCRIPTION OF THE DRAWINGS

The present invention will be understood and appreciated from the following detailed description, taken in conjunction with the drawings in which:

FIG. 1 is a simplified block diagram of an electronic separation scanner constructed and operative in accordance with a preferred embodiment of the present invention;

FIG. 2 is a simplified flowchart type diagram of a workflow provided in accordance with a preferred embodiment of the present invention;

DETAILED DESCRIPTION OF PREFERRED EMBODIMENTS

Figure 3:
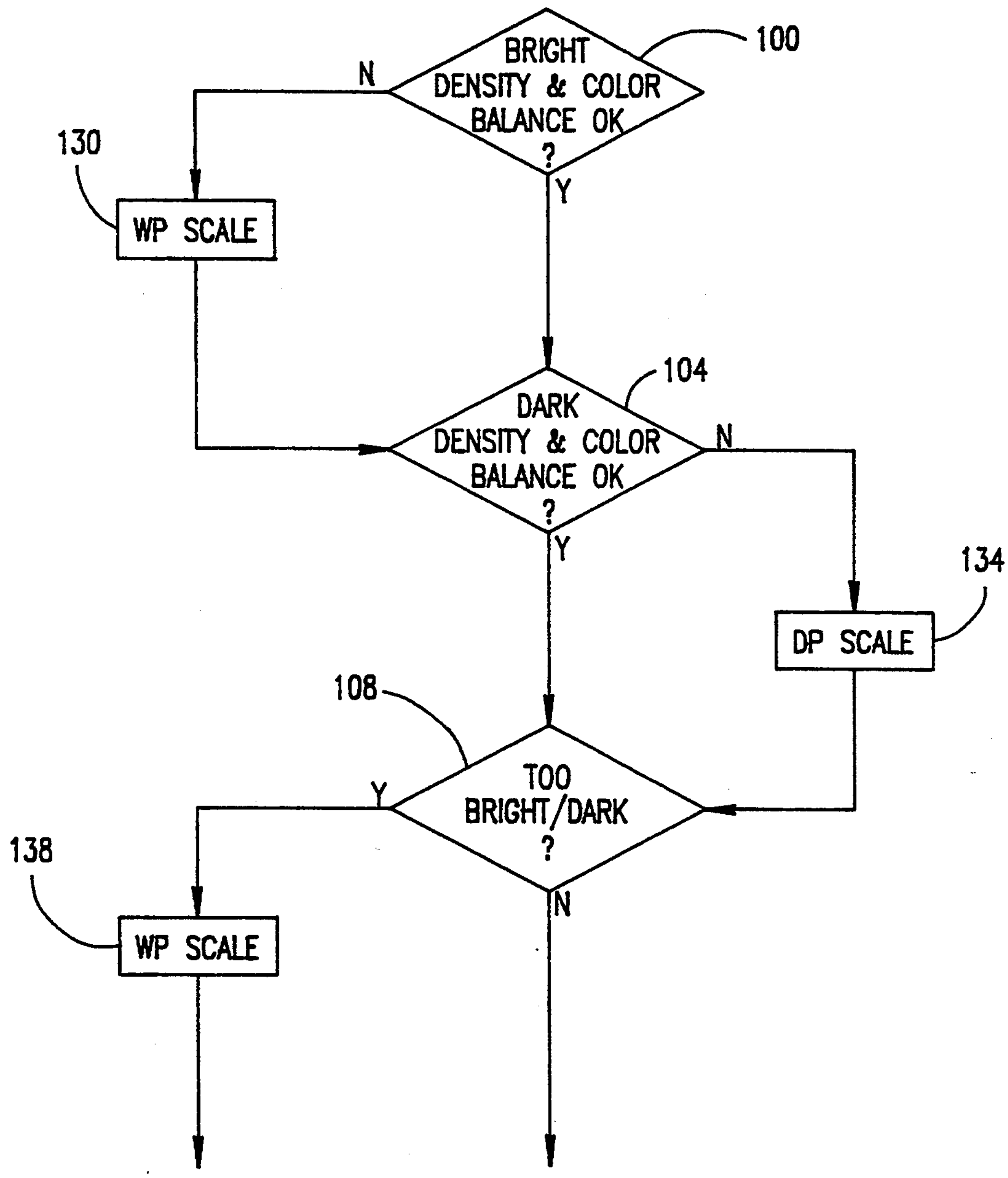
FIG. 3 is a simplified flowchart type diagram of a collapsed variation of the workflow illustrated in FIG. 2 which may be provided instead of or in addition to the workflow illustrated in FIG. 2.

Reference is now made to FIG. 1 which is a simplified block diagram illustration of an electronic color separation scanner constructed in accordance with a preferred embodiment of the present invention.

The electronic color separation scanner of FIG. 1 comprises an optical-mechanical scanning unit 10 including all mechanical and optical components required to electronically prescan an analog representation 12 of a color image such as a transparency. Analog output signals generated by optical-mechanical scanning unit 10 are provided to an analog-to-digital hardware unit 14 which transforms these signals into digital signals defined in an input color space such as RGB. The input digital signals are stored in a digital prescanned image memory 16 such as a disk.

The prescanned image from prescanned image memory 16 is digitally enhanced by an image processing unit 18, in accordance with tone enhancement parameters which characterize at least one digital-to-digital transformation of the input digital signals of prescanned image 16. For example, the digital-to-digital transformations performed on prescanned image 16 may comprise the following sequence of transformations:

a. transformations, within the input color space, of the prescanned image, such as transformations of 12-bit input color space values, e.g. 12-bit RGB values, into 8-bit input color space values, e.g. 8-bit RGB values;

b. transformations from the input color space to an output color space, such as transformations from 8-bit RGB values to 8-bit CMYK values;

c. transformations within the output color space, such as transformations from 8-bit CMYK to 8-bit CMYK.

Initially, tone enhancement parameter values are set by an initial parameter setting unit 20. Unit 20 may comprise a database of tone enhancement parameter values which are predetermined or may be automatically determined as a function of characteristics of the prescanned image such as the characteristics which are automatically analyzed by unit 29, as explained below. The prescanned image as currently preprocessed by unit 18 is displayed to a user of the system by a display unit 22 which may comprise a CRT.

The user may now interact with the system in accordance with a well-defined work-flow in order to further modify the prescanned image. The user interaction workflow is determined by a workflow determining unit 24. Typically, the user interaction workflow comprises a sequence of queries which are directed at the user, some of which are followed by enablement of a specific image modification tool.

Each image modification tool typically includes a user interface which prompts a user to select values for one or more tone enhancement parameters. It is appreciated that the method shown and described herein for defining a workflow including a plurality of tools, may also be employed to define a within-tool workflow, for tools which enable a user to select values for more than one tone enhancement parameter. In this way, a tool which gives a user unguided freedom to modify two, three or more related tone enhancement parameters may be replaced by a tool in which the user is guided by a well-defined workflow in which tone enhancement parameters are modified sequentially.

At least one initial stage of the workflow employed by workflow determining unit 24 is determined by a database 26 which stores a predetermined initial workflow. According to a preferred embodiment of the present invention, the initial stage of the workflow, as well as subsequent stages thereof, are affected by the status of the user, as received by a user status input unit 28. Typically, user status input unit 28 allows a user's level of expertise to be classified by means of human input which may be provided by the user's supervisor. Supervisor input may be provided in any suitable form. For example, supervisor input may include, for each user and each tool in a tool library 31, an indication of whether or not the user is entitled to use the tool.

Preferably, the initial stage of the workflow, as well as subsequent stages thereof, are affected by at least one characteristic of the image which is analyzed by an automatic image analyzer 29. The characteristics which are automatically analyzed for an individual image preferably include tone enhancement parameters such as:

a. a color value which can serve as the white point of the image. This color value, and all brighter color values, are candidates for transformation to a user-defined "white point" color value.

b. a color value which can serve as the dark point of the image. This color value, and all darker color values, are candidates for transformation to a user-defined "dark point" color value.

Automatic analysis may initially be carried out on the prescanned image in memory 16 and may subsequently be carried out on the prescanned image as currently processed by unit 18. Preferably, the results of the automatic analysis at least partly determine the workflow.

A first query is presented to the user by means of a query presentation unit 30. The user's response to the query is received by workflow determination unit 24 via a user input receiving unit 32. In accordance with the contents of the response, workflow determination unit 24 then either presents a further query to the user via query presentation unit 30 or enables a single image modification tool from a library 31 of tools via user input receiving unit 32.

Tool library 31 may include a variety of tools such as the tools described hereinbelow with reference to FIG. 2. Each tool is a user interface prompting a user to select values for one or more tone enhancement parameters such as the tone enhancement parameters which were initially analyzed automatically by automatic image analysis unit 29, as explained above.

User input receiving unit 32 presents the single enabled image modification tool to the user, thereby prompting the user to set values for one or more input parameters of the tool. User input receiving unit 32 typically provides a finish signal to workflow determining unit 24, indicating that the user has completed use of the tool and, therefore, that a further query can be presented to the user.

A tone enhancement parameter modification unit 34 is operative to modify the values of one or more tone enhancement parameters in accordance with the user-selected input parameters for the enabled tool. Preferably, tone enhancement parameter modification unit 34 is also operative to modify the values of one or more tone enhancement parameters in accordance with automatic analysis of the current image received from automatic analysis unit 29.

The modified tone enhancement parameters are received by image processor 18 which reprocesses the prescanned image in accordance with the modified tone enhancement parameters. The reprocessed image is then presented to the user via display unit 22 and the next query or tool is presented. Preferably, reprocessing is carried out in real time, that is, as each tone enhancement parameter is modified, the image is reprocessed accordingly and the reprocessed image is displayed to the user so that the user will be up-to-date when handling the next query or tool.

Preferably, portions of the workflow are at least partly by analyzing the user's interactions with tools presented in preceding portions of the workflow. The analysis of past user-tool interactions are preferably provided by tone enhancement parameter modification unit 34 to workflow determining unit 24.

Eventually, the workflow reaches termination. The termination values of the tone enhancement parameters may be stored in a suitable form such as look-up-table (LUT) form, on a suitable memory 36 such as a hard disk. The termination values may be subsequently employed when performing the final scan of the transparency 12. In the course of the final scan, the termination values may be employed to control digital-to-digital transformations or, alternatively, may be adapted to be suitable for controlling analog-to-analog, analog-todigital or digital-to-analog transformations performed in the course of the final scan.

According to a preferred embodiment of the present invention, the apparatus of FIG. 1 may be implemented by employing a computer listing appended hereto and referenced Appendix A, in conjunction with the Smart Scanner, commercially available from Scitex Corporation, Herzlia, Israel. The computer listing of Appendix A may be employed in conjunction with the Smart Scanner by following a procedure which is described in Appendix B, appended hereto.

FIGS. 2–3 are flowchart-type illustrations of sample workflows for the apparatus of FIG. 1. Tools appear as rectangles, queries and branch points appear as diamonds, and arrows indicate the workflow.

Reference is now made specifically to FIG. 2. The workflow of FIG. 2 includes the following queries:

Query 100: "Are the contrast and color balance of the bright areas of the image satisfactory?"

The term "contrast" refers to the extent to which relatively bright areas of the image differ from relatively non-bright areas of the image.

The term "color balance" refers to the relative magnitudes of a plurality of color components and determines the hue of the color image.

Query 102: "Is there a location in the image which can serve as a white point?"

Query 104: "Are the contrast and color balance of the dark areas of the image satisfactory?"

Query 106: "Is there a location in the image which can serve as a dark point?"

Query 108: "Is the image too bright or too dark?"

Query 110: "Is the color balance of the bright areas of the image satisfactory?"

Query 112: "Are there bright areas of the image which should be gray, but, in fact, appear to be colored?"

Query 114: "Is the color balance of the dark areas of the image satisfactory?"

Query 116: "Are there dark areas of the image which should be gray, but, in fact, appear to be colored?"

Query 118: "Consider each of the color components separately. Are there color corrections to be made on individual color-components?"

Query 120: "Is the color image now satisfactory?"

The workflow of FIG. 2 includes the following tools:

Tool 130—"WP scale": The New Density and Lumin Mask options of the White Point function, and also the Level suboption of the New Point option of the White Point function, all described on page 5-4 onward of the user guide of the Smart Scanner, commercially available from Scitex Corporation, Herzlia, Israel, the disclosure of which is incorporated herein by reference.

Tool 132—"WP pick": The Both suboption of the New Point option of the White Point function described on pages 5-4 and 5—5 of the Smart Scanner user guide. This suboption is also termed the White suboption.

Tool 134—"DP scale": The New Density and Lumin Mask options of the Dark Point function, and also the Level suboption of the New Point option of the Dark Point function, all described on page 5-19 onward of the Smart Scanner user guide.

Tool 136—"DP pick": The Both suboption of the New Point option of the Dark Point function described on pages 5-19 onward of the Smart Scanner user guide. This suboption is also termed the Dark suboption.

Tool 138—"Brightness": The Brightness function described on page 5-34 of the Smart Scanner user guide.

Tool 140—"White manual cast": A tool which enables a user to select a bright color image location and to change the color balance thereof. Typically, the user-selected change in the color balance also affects other color image locations and particularly color image locations whose color is similar to the selected bright color image location.

Tool 142—"White auto cast": A tool which enables a user to select a bright color image location to be transformed to gray. The system selects the gray which is closest to the color value of the selected location and transforms the color value of the selected location to the system-selected gray color value. Typically, this transformation also affects other color image locations and particularly color image locations whose color is similar to the selected bright color image location.

Tool 144—"Dark manual cast": A tool which enables a user to select a dark color image location and to change the color balance thereof. Typically, the user-selected change in the color balance also affects other color image locations and particularly color image locations whose color is similar to the selected dark color image location.

Tool 146—"Dark auto cast": A tool which enables a user to select a dark color image location to be transformed to gray. The system selects the gray which is closest to the color value of the selected location and transforms the color value of the selected location to the system-selected gray color value. Typically, this transformation also affects other color image locations and particularly color image locations whose color is similar to the selected dark color image location.

Tool 148—"Gradation": The Gradation function described on page 5-20 of the Smart Scanner user guide.

Tools 150: According to one embodiment of the present invention, only some of the tools in the tool library are included in the guided workflow of FIG. 2. If an operator completes the workflow of FIG. 1 and remains unsatisfied with the scanned product (query 120), a tool menu is displayed to the user which may include all tools in the tool library, preferably including the tools described above, or alternatively all tools which the user is entitled to employ, taking into account his status.

According to a preferred embodiment of the present invention, user responses to individual queries at least partly determine the workflow. For example, in FIG. 2, if the user answers "Yes" to query 102, then queries 110 and 112 and tools 140 and 142 are eliminated from the workflow, as indicated by the dotted lines.

According to a preferred embodiment of the present invention, the workflow may branch depending upon an image characteristic which has been automatically analyzed by automatic image analyzer 29 of FIG. 1. For example, diamond 152 is a branch point which is operative as follows: if an automatically analyzed white point falls outside of a predetermined range of "reasonable" white points, the system may prevent the user from disregarding the white point by eliminating query 100 in FIG. 2. The first query to be presented is then query 102.

Similarly, diamond 154 is a branch point which is operative as follows: if an automatically analyzed dark point falls outside of a predetermined range of "reasonable" dark points, the system may prevent the user from disregarding the dark point by eliminating query 104 in FIG. 2. In this case, query 106 is presented directly after query 100 is negatively responded to, or directly after tool 130 or tool 132 is used.

According to one embodiment of the present invention, messages are provided to the user which indicate considerations of the system in determining the workflow.

According to a preferred embodiment of the present invention, queries may be presented differently to users of different levels of expertise.

Reference is made to FIG. 3 which is a variation on the workflow of FIG. 2, suitable for a user who is only entitled to use tools 130, 134 and 138 of FIG. 2. The workflow of FIG. 2 is similar to FIG. 3 except that tools other than tools 130, 134 and 138 are not presented and except for the following omitted queries:

a. Query 102 is omitted since its purpose is to channel users to one of tools 130 and 132. Since only tool 130 is enabled, and not tool 132, query 102 is superfluous for the workflow of FIG. 3.

b. Query 106 is omitted since its purpose is to channel users to one of tools 134 and 136. Since only tool 134 is enabled, and not tool 136, query 106 is superfluous for the workflow of FIG. 3.

c. Queries 110, 112, 114, 116, 118 and 120 are omitted since their purpose is to channel users to tools which the user is not entitled to use, i.e. tools 140, 142, 144, 146 and 148, and tool menu 150.

It is appreciated that the workflows shown and described hereinabove with reference to FIGS. 2 and 3 are only exemplary and are not intended to be limiting. More generally, a workflow may include any suitable set of tone enhancement tools and, optionally, any suitable set of queries which may be interspersed in any suitable order between the tone enhancement tools. Branches in the workflow may be provided at any point in the workflow and may depend upon any one of the following or upon any predefined interaction therebetween:

user's use of tools up until the branch point;
user's responses to queries up until the branch point;
automatically analyzed image characteristics; and
stored indications of user expertise.

Figure 4:
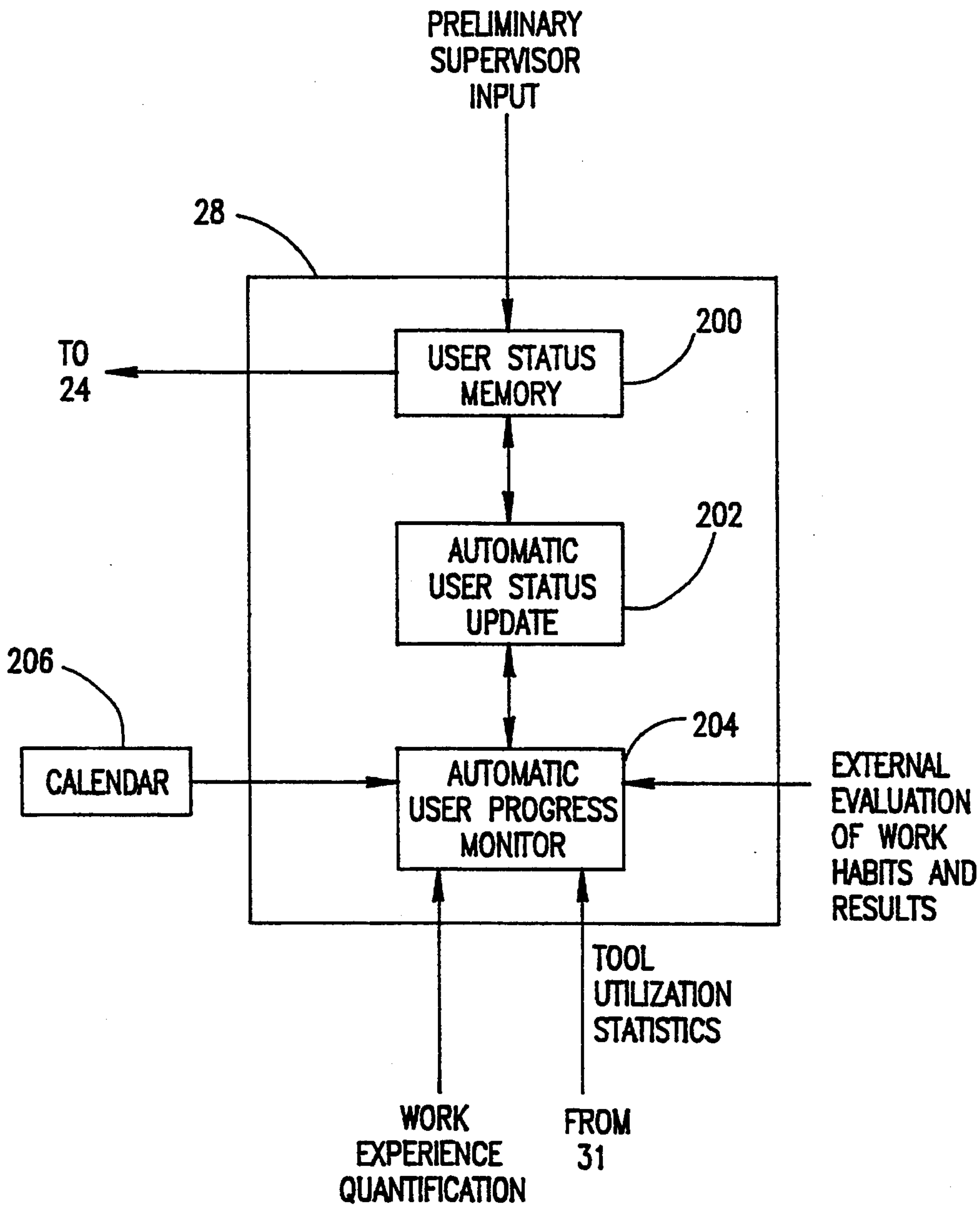
FIG. 4 is a simplified block diagram of user status unit 28 of FIG. 1.

Reference is now made to FIG. 4 which is a generalized block diagram illustration of user status input unit 28, constructed and operative in accordance with a preferred embodiment of the present invention. As shown, user status input unit 28 includes a user status memory 200 which is accessible by workflow determining unit 24 of FIG. 1 and which stores an indication of the current status, such as the current expertise level, of each user.

The status of a user may be determined by supervisor input from outside the system. However, preferably, users' status is automatically updated by an automatic update unit 202. Automatic update unit 202 preferably stores an indication of at least one prerequisite for advancing a user at an individual expertise level to a more advanced expertise level. Prerequisites may include some or all of the following:

a. time accumulated at the individual expertise level;
b. quantity of work experience at the individual expertise level;
c. full utilization of the subset of tools which is not disabled by the selective tool disabler;
d. quality level of scanned images generated by a user; and
e. correctness of user's habitual work processes.

Information indicating whether or not an individual user has fulfilled prerequisites is provided by an automatic user progress monitor 204 which may monitor user progress by receiving, for each user, some or all of the following types of input:

a. an indication of days or weeks accumulated at an individual expertise level, which may be provided by a calendar unit 206;
b. a quantification of the work experience accumulated at an individual expertise level, such as an indication of number of log-ons, and/or an indication of total log-on time.
c. An indication of the extent of utilization of the subset of tools which the user is entitled to due to his expertise level. These tool utilization statistics may be generated by monitoring access of each user to tool library 31 of FIG. 1.
d. An external evaluation of the quality of work products generated by a user and/or of the quality of the user's work habits. Such an evaluation may be provided by a supervisor or may be generated automatically.

It is appreciated that although the preferred embodiments of the present invention shown and described herein are based on the Scitex Smart Scanner, this not need be the case. More generally, the present invention may be based upon existing tools of any conventional electronic separation scanner.

It will be appreciated by persons skilled in the art that the present invention is not limited to what has been particularly shown and described hereinabove. Rather, the scope of the present invention is defined only by the claims that follow.

```
_$1$DUB18:[USERS.SMART.YOAV_O.FRAME.SUBSYSTEM.LEAD.SRC]TR_HELP.H;2

tr_help.H - Copy from line starting with "start point...". Lines beginning
8th colomn should be attached to previous line.

start point - no help
Is there a problem in the brighter parts of the image (wrong contrast and/or
        wrong color cast) ?
Is there an area in the image that can be the WP, Improving image in both
        contrast & color cast ?
Is there a problem in the darker parts of the image (wrong contrast and/or
        wrong color cast) ?
Is there an area in the image that can be the DP, Improving image in both
        contrast & color cast ?
Is the Image either too dark or too bright (in all separations and throughout
        the tonal range) ?
Is there a cast problem (Global error in hue) in the bright tones of the imag
Are there areas in the image that should be bright grey, but instead display
        a color cast ?
Is there a cast problem (Global error in hue) in the dark tones of the image
Are there areas in the image that should be dark grey, but instead display a
        color cast ?
```

Is the distribution of color throughout the tonal range still wrong ?
Is current image tone processing satisfactory, or further access to enhancement tools needed ?
End point - no help

APPENDIX A

DARK.HEX

```
---------
23002001 00240114 27000001 00070113 00C80024 01142700 00010003 000045F5
24011427 00000101 09000023 01142700 00010109 00070024 01142700 00010005
00240114 27000001 01090200 24011427 00544E49 4F505F44 4C4F0001 01090100
69502024 01142700 00010109 04002401 14270067 72764174 696E4900 01010903
6D206573 6F6F6843 24011427 00000101 09050074 6E696F70 206B7261 44206B63
506B7261 4474696E 49000100 09060074 6E696F50 206B7261 4420666F 2065646F
00240114 27000001 00030100 24011427 00000000 06070024 01142700 746E696F
28464C53 01010923 00200100 24011427 00002936 3128464C 43010007 011300C8
01142700 00010003 02002401 14270000 01000901 00240114 27000029 312C3632
24011427 00002933 32286761 6C466C61 636F4C65 73614301 00070113 00C80024
00000100 03020024 01142700 00010009 01002401 14270000 01010923 00200100
00200100 24011427 0067654E 5F724F5F 736F5000 01000701 1300C800 24011427
24011427 00000101 03020024 01142700 00010009 01002401 14270000 01010923
61440D00 24001527 00000001 07001300 79002401 14270000 01000301 1300C900
6E696F50 6C65636E 61430029 322C3328 464C5301 01070300 746E696F 50206B72
01072400 200B0024 01142700 00000107 23006C65 636E6143 0C002401 14270074
07230020 7265540A 00240114 2700746E 696F5072 65540029 322C3328 464C5301
00000001 07240020 08002401 14270000 00010724 00200900 24011427 00000001
24011427 00000101 07240020 06002401 14270000 00010724 00200700 24011427
01072400 20040024 01142700 00000107 23002079 7469736E 65447E77 654E0500
4E020024 01142700 00010107 23006B63 616C427E 77654E03 00240114 27000001
01142700 00000006 24002001 00240114 27000000 00072300 746E696F 507E7765
05230020 01002401 14270000 01000701 1300CD00 24011427 00000100 03010024
00240114 27000001 01090000 23011427 00000101 09000200 24011427 00000100
27000001 00070113 00C80024 01142700 00010003 02002401 14270000 01000901
09000024 01142700 00010109 00020024 01142700 00010005 23002001 00240114
6C622077 656E2072 65746E45 20240114 27000001 00090100 24011427 00000101
00000006 02002074 6E696F70 20657469 68772072 6F662065 756C6176 206B6361
C8002401 14270000 01000300 13007A00 24011427 00000101 03010024 01142700
00000007 01002401 14270000 00000623 00200100 24011427 00000100 07011300
01000301 00240114 27000000 00062300 6B63616C 42207765 4E010024 00152700
14270000 01000523 00200100 24011427 00000100 07011300 C8002401 14270000
00090000 24011427 006B6361 6C425F6B 7261445F 77654E00 01010900 01002401
14270000 01010900 4B43414C 42002401 14270000 00002E01 00240114 27000001
726F6620 7365756C 6176206C 6167656C 6C492024 01142700 00010009 01002301
00000602 00726574 6E656572 20657361 656C7020 2C746E69 6F70206B 72614420
002E0500 24011427 00000000 06010024 01142700 00000006 00002401 14270000
00000000 06060024 01142700 00000006 00534E45 44535444 00240114 27000000
00200100 24011427 00776F6C 6C417369 56707261 68530001 00070600 24011427
24011427 00000100 03020024 01142700 00010009 01002401 14270000 01010923
12007900 24011427 00000100 03240020 0B002401 14270000 00000700 12007900
206B7361 4D7E6E69 6D754C0B 00240114 27006B73 614D5F74 696E4900 01000700
00C90024 01142700 00010103 004B5341 4D535444 00240114 27000000 002E2300
206B7261 440D0024 00152700 00000107 00130079 00240114 27000001 00030113
2700746E 696F506C 65636E61 43002932 2C332846 4C530101 07030074 6E696F50
4C530101 07240020 0B002401 14270000 00010723 006C6563 6E61430C 00240114
00000107 23002072 65540A00 24011427 00746E69 6F507265 54002932 2C332846
01142700 00000107 24002008 00240114 27000000 01072400 20090024 01142700
4E050024 01142700 00010107 24002006 00240114 27000000 01072400 20070024
00000101 07240020 04002401 14270000 00010723 00207974 69736E65 447E7765
7E77654E 02002401 14270000 01010723 006B6361 6C427E77 654E0300 24011427
01002401 14270000 00000624 00200100 24011427 00000000 07230074 6E696F50
00010005 23002001 00240114 27000001 00070113 00CD0024 01142700 00010003
00090100 24011427 00000101 09000023 01142700 00010109 00020024 01142700
24011427 00000100 07011300 C8002401 14270000 01000302 00240114 27000001
00010109 00002401 14270000 01010900 02002401 14270000 01000523 00200100
6B63616C 62207765 6E207265 746E4520 24011427 00000100 09010024 01142700
14270000 00000602 0020746E 696F7020 65746968 7720726F 66206575 6C617620
011300C8 00240114 27000001 00030013 007A0024 01142700 00010103 01002401
15270000 00000701 00240114 27000000 00062300 20010024 01142700 00010007
27000001 00030100 24011427 00000000 0623006B 63616C42 2077654E 01002400
00240114 27000001 00052300 20010024 01142700 00010007 011300C8 00240114
```

00000100 09000024 01142700 6B63616C 425F6B72 61445F77 654E0001 01090001
00230114 27000001 0109004B 43414C42 00240114 27000000 002E0100 24011427
61442072 6F662073 65756C61 76206C61 67656C6C 49202401 14270000 01000901
27000000 00060200 7265746E 65657220 65736165 6C70202C 746E696F 70206B72
00000000 2E050024 01142700 00000006 01002401 14270000 00000600 00240114
01142700 00000006 06002401 14270000 00000600 534E4544 53544400 24011427
01092300 20010024 01142700 776F6C6C 41736956 70726168 53000100 07060024
00790024 01142700 00010003 02002401 14270000 01000901 00240114 27000001
00070012 00790024 01142700 00010003 2400200B 00240114 27000000 00070012
2E230020 6B73614D 7E6E696D 754C0B00 24011427 006B7361 4D5F7469 6E490001
07011300 C8002401 14270000 01000300 4B53414D 53544400 24011427 00000000
24011427 00000101 09230020 01002401 14270067 654E5F72 4F5F736F 50000100
00000100 03011300 C9002401 14270000 01010302 00240114 27000001 00090100
0300746E 696F5020 6B726144 0D002400 15270000 00010700 13007900 24011427
61430C00 24011427 00746E69 6F506C65 636E6143 0029322C 3328464C 53010107
0029322C 3328464C 53010107 2400200B 00240114 27000000 01072300 6C65636E
09002401 14270000 00010723 00207265 540A0024 01142700 746E696F 50726554
07240020 07002401 14270000 00010724 00200800 24011427 00000001 07240020
736E6544 7E77654E 05002401 14270000 01010724 00200600 24011427 00000001
4E030024 01142700 00010107 24002004 00240114 27000000 01072300 20797469
07230074 6E696F50 7E77654E 02002401 14270000 01010723 004B594D 437E7765
01142700 00010003 01002401 14270000 00000624 00200100 24011427 00000000
00090024 01142700 00010005 23002001 00240114 27000001 00070113 00C80024
00240114 27000001 01090100 24011427 00000101 09000023 01142700 00010109
24011427 00000101 09040024 01142700 00010109 03002401 14270000 01010902
01142700 00010109 07002401 14270000 01010906 00240114 27000001 01090500
00010003 0013007A 00240114 27000001 01030900 24011427 00000100 09080024
01142700 00010005 23002001 00240114 27000001 00070113 00C80024 01142700
6E207265 746E4520 24011427 00000100 09000024 01142700 00010109 00010024
2E010020 746E696F 70206B72 61442072 6F662065 756C6176 206E6179 63207765
15270000 00000701 00240114 27000000 0006004E 41594300 24011427 00000000
14270000 01010302 00240114 27000000 00062300 4B594D43 2077654E 01002406
01002406 15270000 00000700 13007A00 24011427 00000100 03011300 C8002401
01142700 00010005 23002001 00240114 27000001 00072300 4B594D43 2077654E
27000000 002E0100 24011427 00000100 09000024 01142700 00010109 00010024
007A0024 01142700 00010103 01002401 14270000 00000600 4E415943 00240114
00052300 20010024 01142700 00010007 011300C8 00240114 27000001 00030013
45202401 14270000 01000900 00240114 27000001 01090001 00240114 27000001
206B7261 4420726F 66206575 6C617620 61746E65 67616D20 77656E20 7265746E
27000000 00060041 544E4547 414D0024 01142700 0000002E 01002074 6E696F70
00240615 27000000 00072300 6E617943 02002401 14270000 01010701 00240114
00240114 27000000 0006FD00 24011427 00000000 0623004B 594D4320 77654E01
01000701 1300C800 24011427 00000100 03001300 7A002401 14270000 01010301
24011427 00000101 09000100 24011427 00000100 05230020 01002401 14270000
6C617620 776F6C6C 65792077 656E2072 65746E45 20240114 27000001 00090000
45590024 01142700 0000002E 01002074 6E696F70 206B7261 4420726F 66206575
6E656761 4D030024 01142700 00010107 01002401 14270000 00000600 574F4C4C
01002406 15270000 00000723 006E6179 43020024 01142700 00010107 23006174
FE002401 14270000 000006FB 00240114 27000000 00062300 4B594D43 2077654E
14270000 01000300 13007A00 24011427 00000101 03010024 01142700 00000006
01002401 14270000 01000523 00200100 24011427 00000100 07011300 C8002401
7265746E 45202401 14270000 01000900 00240114 27004B59 4D434400 01010900
20746E69 6F70206B 72614420 726F6620 65756C61 76206B63 616C6220 77656E20
01000901 00230114 27000001 0109004B 43414C42 00240114 27000000 002E0100
70206B72 61442072 6F662073 65756C61 76206C61 67656C6C 49202401 14270000
00240114 27000000 00060200 7265746E 65657220 65736165 6C70202C 746E696F
07230077 6F6C6C65 59040024 01142700 00010107 01002401 14270000 000006FB
79430200 24011427 00000101 07230061 746E6567 614D0300 24011427 00000101
14270000 00000623 004B594D 43207765 4E010024 06152700 00000007 23006E61
27000000 0006FE00 24011427 00000000 06FC0024 01142700 00000006 F9002401
4E454453 54440024 01142700 0000002E 05002401 14270000 00000601 00240114
72616853 00010007 06002401 14270000 00000606 00240114 27000000 00060053
00090100 24011427 00000101 09230020 01002401 14270077 6F6C6C41 73695670
24011427 00000000 07001200 79002401 14270000 01000302 00240114 27000001
6B73614D 5F74696E 49000100 07001200 79002401 14270000 01000324 00200B00
54440024 01142700 0000002E 2300206B 73614D7E 6E696D75 4C0B0024 01142700
00790024 01142700 00010003 011300C9 00240114 27000001 0103004B 53414D53
28464C53 01010703 00746E69 6F50206B 7261440D 00240015 27000000 01070013
0723006C 65636E61 430C0024 01142700 746E696F 506C6563 6E614300 29322C33

6E696F50 72655400 29322C33 28464C53 01010724 00200B00 24011427 00000001
00000107 24002009 00240114 27000000 01072300 20726554 0A002401 14270074
01142700 00000107 24002007 00240114 27000000 01072400 20080024 01142700
07230020 79746973 6E65447E 77654E05 00240114 27000001 01072400 20060024
4B594D43 7E77654E 03002401 14270000 01010724 00200400 24011427 00000001
01142700 00000007 2300746E 696F507E 77654E02 00240114 27000001 01072300
07011300 C8002401 14270000 01000301 00240114 27000000 00062400 20010024
14270000 01010900 09002401 14270000 01000523 00200100 24011427 00000100
27000001 01090200 24011427 00000101 09010024 01142700 00010109 00002301
00000101 09050024 01142700 00010109 04002401 14270000 01010903 00240114
00010009 08002401 14270000 01010907 00240114 27000001 01090600 24011427
C8002401 14270000 01000300 13007A00 24011427 00000101 03090024 01142700
01010900 01002401 14270000 01000523 00200100 24011427 00000100 07011300
6E617963 2077656E 20726574 6E452024 01142700 00010009 00002401 14270000
01142700 0000002E 01002074 6E696F70 206B7261 4420726F 66206575 6C617620
77654E01 00240615 27000000 00070100 24011427 00000000 06004E41 59430024
011300C8 00240114 27000001 01030200 24011427 00000000 0623004B 594D4320
594D4320 77654E01 00240615 27000000 00070013 007A0024 01142700 00010003
01010900 01002401 14270000 01000523 00200100 24011427 00000100 0723004B
41594300 24011427 00000000 2E010024 01142700 00010009 00002401 14270000
00000100 03001300 7A002401 14270000 01010301 00240114 27000000 0006004E
24011427 00000100 05230020 01002401 14270000 01000701 1300C800 24011427
656E2072 65746E45 20240114 27000001 00090000 24011427 00000101 09000100
0020746E 696F7020 6B726144 20726F66 2065756C 61762061 746E6567 616D2077
01070100 24011427 00000000 06004154 4E454741 4D002401 14270000 00002E01
4D432077 654E0100 24061527 00000000 0723006E 61794302 00240114 27000001
27000001 01030100 24011427 00000000 06FD0024 01142700 00000006 23004B59
00240114 27000001 00070113 00C80024 01142700 00010003 0013007A 00240114
00000100 09000024 01142700 00010109 00010024 01142700 00010005 23002001
20726F66 2065756C 61762077 6F6C6C65 79207765 6E207265 746E4520 24011427
00060057 4F4C4C45 59002401 14270000 00002E01 0020746E 696F7020 6B726144
01010723 0061746E 6567614D 03002401 14270000 01010701 00240114 27000000
594D4320 77654E01 00240615 27000000 00072300 6E617943 02002401 14270000
14270000 000006FE 00240114 27000000 0006FB00 24011427 00000000 0623004B
011300C8 00240114 27000001 00030013 007A0024 01142700 00010103 01002401
43440001 01090001 00240114 27000001 00052300 20010024 01142700 00010007
6C622077 656E2072 65746E45 20240114 27000001 00090000 24011427 004B594D
00000000 2E010020 746E696F 70206B72 61442072 6F662065 756C6176 206B6361
20240114 27000001 00090100 23011427 00000101 09004B43 414C4200 24011427
70202C74 6E696F70 206B7261 4420726F 66207365 756C6176 206C6167 656C6C49
27000000 0006FB00 24011427 00000000 06020072 65746E65 65722065 7361656C
01142700 00010107 2300776F 6C6C6559 04002401 14270000 01010701 00240114
00000723 006E6179 43020024 01142700 00010107 23006174 6E656761 4D030024
000006F9 00240114 27000000 00062300 4B594D43 2077654E 01002406 15270000
00060100 24011427 00000000 06FE0024 01142700 00000006 FC002401 14270000
00000000 0600534E 45445354 44002401 14270000 00002E05 00240114 27000000
6C6C4173 69567072 61685300 01000706 00240114 27000000 00060600 24011427
24011427 00000100 09010024 01142700 00010109 23002001 00240114 2700776F
00032400 200B0024 01142700 00000007 00120079 00240114 27000001 00030200
0B002401 1427006B 73614D5F 74696E49 00010007 00120079 00240114 27000001
2E004B53 414D5354 44002401 14270000 00002E23 00206B73 614D7E6E 696D754C
01000301 00240114 27000000 00060054 534E494B 52414400 24011427 00000000
14270000 00000623 00200100 24011427 00000100 07001300 51002401 14270000
01142700 63695074 65470001 00070113 00CA0024 01142700 00010003 01002401
00000006 02002401 14270000 01000901 00240114 27000001 01092300 20010024
01002401 14270000 01000700 13005100 24011427 00000100 03010024 01142700
00010003 00130051 00240114 27000001 01030000 24011427 00000000 06230020
00002933 32286761 6C466C61 636F4C65 73614301 00070113 00C80024 01142700
03020024 01142700 00010009 01002401 14270000 01010923 00200100 24011427
00000001 07001300 79002401 14270000 01000301 1300CD00 24011427 00000101
55000101 07030061 65724120 20202020 20746E69 6F502077 654E0D00 24001527
24011427 00000001 0723006C 65636E61 430C0024 01142700 594D4344 5F4F444E
00200800 24011427 00000001 07240020 0A002401 14270000 00010724 00200B00
00000001 0723006B 72614407 00240114 27004854 4F425F4B 52414400 01010724
00000001 0724006C 6576654C 04002401 14270000 00010724 00200500 24011427
00000624 006C6172 7475654E 01002401 14270000 00000724 00200200 24011427
00200100 24011427 00000100 07FC0024 01142700 00000006 01002401 14270000
24011427 00337461 4D677276 41000101 07001200 79002401 14270000 01000323
01142700 00000007 24002006 00240114 27000000 01070200 39207820 39200900

```
03011300 CD002401 14270000 01010300 00240114 27000000 00062400 20030024
4C430100 07011300 C8002401 14270000 01000300 13007900 24011427 00000101
00000100 09010024 01142700 00010109 23002001 00240114 27000029 36312846
200B0024 01142700 00000007 00120079 00240114 27000001 00030200 24011427
24011427 00002936 3228464C 43010007 011300C9 00240114 27000001 00032400
00000100 03020024 01142700 00010009 01002401 14270000 01010923 00200100
00000000 07240020 6B726144 07002401 14270000 00010700 12007900 24011427
01070012 00790024 01142700 00010003 2400206C 61727475 654E0100 24011427
7475654E 01002401 14270000 00000724 00206C65 76654C04 00240114 27000000
20202020 2020746E 696F5020 77654E0D 00240015 27000000 01072400 206C6172
6C65636E 61430C00 24011427 00594D43 445F4F44 4E550001 01070300 61657241
01072400 200A0024 01142700 00000107 2400200B 00240114 27000000 01072300
07002401 14270048 544F425F 4B524144 00010107 24002008 00240114 27000000
56454C5F 4B524144 00010107 24002005 00240114 27000000 01072300 6B726144
00072400 20020024 01142700 00000107 23006C65 76654C04 00240114 27004C45
27000000 00062300 6C617274 75654E01 00240114 27004555 485F4B52 41440001
00000000 06010024 01142700 00000006 01002401 14270000 00000601 00240114
00240114 2700657A 69537461 4D677276 416B6365 68430001 0007FC00 24011427
27000001 00090500 24011427 00000101 09030024 01142700 00010109 23002001
00337461 4D677276 41000101 07001200 79002401 14270000 01000309 00240114
00240114 27003274 614D6772 76410001 01070200 39207820 39200900 24011427
78203320 03002401 14270031 74614D67 72764100 01000723 00352078 20352006
27000000 00060000 24011427 00000000 06000024 01142700 00000006 23003320
00337461 4D677276 41000101 07001200 79002401 14270000 01000300 00240114
00240114 27003274 614D6772 76410001 01072300 39207820 39200900 24011427
78203320 03002401 14270031 74614D67 72764100 01000702 00352078 20352006
27000000 00060000 24011427 00000000 06000024 01142700 00000006 23003320
00337461 4D677276 41000101 07001200 79002401 14270000 01000300 00240114
00240114 27003274 614D6772 76410001 01072300 39207820 39200900 24011427
78203320 03002401 14270031 74614D67 72764100 01000723 00352078 20352006
27000000 00060000 24011427 00000000 06000024 01142700 00000006 02003320
0003FF00 24011427 00000000 06230020 01002401 14270000 01000700 00240114
01142700 544E494F 505F4554 41445055 00010007 011300C8 00240114 27000001
76204B59 4D432401 14270000 01010901 00230114 27000001 01092300 20010024
27000001 00090200 64656966 69646F6D 206E6565 62206576 61682073 65756C61
6B616D20 2D20656C 62616C69 6176616E 75206563 696F6863 20736968 74240114
14270000 000006FB 00240114 27000000 00060300 6563696F 68632077 656E2065
01000701 1300CA00 24011427 00000100 03FB0024 01142700 00000006 FB002401
00000024 01142700 00000006 23002001 00240114 27000029 312C3034 28464C53
00000000 00000000 00000000 00000000 00000000 00000000 00000000 00000000
```

LIGHT.HEX
----------

```
23002001 00230114 27000001 00070113 00C80024 01142700 00010003 000040E7
24011427 00000101 09000023 01142700 00010109 00070024 01142700 00010005
00240114 27000001 01090200 24011427 00544E49 4F505F44 4C4F0001 01090100
69502024 01142700 00010109 04002401 14270067 72764174 696E4900 01010903
2065736F 6F684324 01142700 00010109 0500746E 696F7020 65746968 77206B63
69685774 696E4900 01000906 00746E69 6F502065 74696857 20666F20 65646F6D
14270000 01000301 00240114 27000000 00060700 24011427 00746E69 6F506574
01142700 00293631 2867616C 466C6163 6F4C6573 61430100 07011300 C8002401
27000001 00090100 24011427 00002931 2C363228 464C5301 01092300 20010024
466C6163 6F4C6573 61430100 07011300 C8002401 14270000 01000302 00240114
01000901 00240114 27000001 01092300 20010024 01142700 00293332 2867616C
724F5F73 6F500001 00070113 00C80024 01142700 00010003 02002401 14270000
14270000 01000901 00240114 27000001 01092300 20010024 01142700 67654E5F
00130079 00240114 27000001 00030113 00C90024 01142700 00010103 02002401
3328464C 53010107 0300746E 696F5020 65746968 570D0024 00152700 00000107
01072300 6C65636E 61430C00 24011427 00746E69 6F506C65 636E6143 0029322C
746E696F 50726554 0029322C 3328464C 53010107 2400200B 00240114 27000000
00000001 07240020 09002401 14270000 00010723 00207265 540A0024 01142700
24011427 00000001 07240020 07002401 14270000 00010724 00200800 24011427
01072300 20797469 736E6544 7E77654E 05002401 14270000 01010724 00200600
6B63616C 427E7765 4E030024 01142700 00010107 24002004 00240114 27000000
01142700 00000007 2300746E 696F507E 77654E02 00240114 27000001 01072300
07011300 CD002401 14270000 01000301 00240114 27000000 00062400 20010024
14270000 01010900 02002401 14270000 01000523 00200100 24011427 00000100
27000001 00030200 24011427 00000100 09010024 01142700 00010109 00002301
00240114 27000001 00052300 20010024 01142700 00010007 011300C8 00240114
```

01142700 00010009 01002401 14270000 01010900 00240114 27000001 01090002
74696877 20726F66 2065756C 6176206B 63616C62 2077656E 20726574 6E452024
7A002401 14270000 01010301 00240114 27000000 00060200 20746E69 6F702065
06230020 01002401 14270000 01000701 1300C800 24011427 00000100 03001300
23006B63 616C4220 77654E01 00240015 27000000 00070100 24011427 00000000
14270000 01000701 1300C800 24011427 00000100 03010024 01142700 00000006
74686769 4C5F7765 4E000101 09000100 24011427 00000100 05230020 01002401
01142700 0000002E 01002401 14270000 01000900 00240114 27006B63 616C425F
6C6C4920 24011427 00000100 09010023 01142700 00010109 004B4341 4C420024
61656C70 202C746E 696F7020 6B726144 20726F66 20736575 6C617620 6C616765
24011427 00000000 06000024 01142700 00000006 02007265 746E6565 72206573
0600534E 45445354 44002401 14270000 00002E05 00240114 27000000 00060100
69567072 61685300 01000706 00240114 27000000 00060600 24011427 00000000
00000100 09010024 01142700 00010109 23002001 00240114 2700776F 6C6C4173
200B0024 01142700 00000007 00120079 00240114 27000001 00030200 24011427
1427006B 73614D5F 74696E49 00010007 00120079 00240114 27000001 00032400
414D5354 44002401 14270000 00002E23 00206B73 614D7E6E 696D754C 0B002401
07001300 79002401 14270000 01000301 1300C900 24011427 00000101 03004B53
2C332846 4C530101 07030074 6E696F50 20657469 68570D00 24001527 00000001
00010723 006C6563 6E61430C 00240114 2700746E 696F506C 65636E61 43002932
00746E69 6F507265 54002932 2C332846 4C530101 07240020 0B002401 14270000
27000000 01072400 20090024 01142700 00000107 23002072 65540A00 24011427
00240114 27000000 01072400 20070024 01142700 00000107 24002008 00240114
00010723 00207974 69736E65 447E7765 4E050024 01142700 00010107 24002006
006B6361 6C427E77 654E0300 24011427 00000101 07240020 04002401 14270000
24011427 00000000 07230074 6E696F50 7E77654E 02002401 14270000 01010723
00070113 00CD0024 01142700 00010003 01002401 14270000 00000624 00200100
01142700 00010109 00020024 01142700 00010005 23002001 00240114 27000001
14270000 01000302 00240114 27000001 00090100 24011427 00000101 09000023
02002401 14270000 01000523 00200100 24011427 00000100 07011300 C8002401
24011427 00000100 09010024 01142700 00010109 00002401 14270000 01010900
65746968 7720726F 66206575 6C617620 6B63616C 62207765 6E207265 746E4520
007A0024 01142700 00010103 01002401 14270000 00000602 0020746E 696F7020
00062300 20010024 01142700 00010007 011300C8 00240114 27000001 00030013
0623006B 63616C42 2077654E 01002400 15270000 00000701 00240114 27000000
01142700 00010007 011300C8 00240114 27000001 00030100 24011427 00000000
5F746867 694C5F77 654E0001 01090001 00240114 27000001 00052300 20010024
24011427 00000000 2E010024 01142700 00010009 00002401 1427006B 63616C42
656C6C49 20240114 27000001 00090100 23011427 00000101 09004B43 414C4200
7361656C 70202C74 6E696F70 206B7261 4420726F 66207365 756C6176 206C6167
00240114 27000000 00060000 24011427 00000000 06020072 65746E65 65722065
00060053 4E454453 54440024 01142700 0000002E 05002401 14270000 00000601
73695670 72616853 00010007 06002401 14270000 00000606 00240114 27000000
27000001 00090100 24011427 00000101 09230020 01002401 14270077 6F6C6C41
00200B00 24011427 00000000 07001200 79002401 14270000 01000302 00240114
01142700 6B73614D 5F74696E 49000100 07001200 79002401 14270000 01000324
53414D53 54440024 01142700 0000002E 2300206B 73614D7E 6E696D75 4C0B0024
27006765 4E5F724F 5F736F50 00010007 011300C8 00240114 27000001 0003004B
01030200 24011427 00000100 09010024 01142700 00010109 23002001 00240114
27000000 01070013 00790024 01142700 00010003 011300C9 00240114 27000001
61430029 322C3328 464C5301 01070300 746E696F 50206574 6968570D 00240015
01142700 00000107 23006C65 636E6143 0C002401 14270074 6E696F50 6C65636E
00240114 2700746E 696F5072 65540029 322C3328 464C5301 01072400 200B0024
08002401 14270000 01010724 00200900 24011427 00000001 07230020 7265540A
00000107 24002007 00240114 27000000 01072300 20746867 694C7E68 63746143
79746973 6E65447E 77654E05 00240114 27000001 01072400 20060024 01142700
7E77654E 03002401 14270000 01010724 00200400 24011427 00000001 07230020
00000000 07230074 6E696F50 7E77654E 02002401 14270000 01010723 00594D43
00C80024 01142700 00010003 01002401 14270000 00000624 00200100 24011427
00010109 00070024 01142700 00010005 23002001 00240114 27000001 00070113
01010902 00240114 27000001 01090100 24011427 00000101 09000023 01142700
01090500 24011427 00000101 09040024 01142700 00010109 03002401 14270000
007A0024 01142700 00010103 07002401 14270000 01000906 00240114 27000001
00052300 20010024 01142700 00010007 011300C8 00240114 27000001 00030013
45202401 14270000 01000900 00240114 27000001 01090001 00240114 27000001
6F702065 74696877 20726F66 2065756C 6176206E 61796320 77656E20 7265746E
01002401 14270000 00000600 4E415943 00240114 27000000 002E0100 20746E69
03020024 01142700 00000006 2300594D 43207765 4E010024 06152700 00000007
00000000 07001300 7A002401 14270000 01000301 1300C800 24011427 00000101

01000523 00200100 24011427 00000100 07230059 4D432077 654E0100 24061527
2E010024 01142700 00010009 00002401 14270000 01010900 01002401 14270000
14270000 01010301 00240114 27000000 0006004E 41594300 24011427 00000000
01002401 14270000 01000701 1300C800 24011427 00000100 03001300 7A002401
27000001 00090000 24011427 00000101 09000100 24011427 00000100 05230020
20726F66 2065756C 61762061 746E6567 616D2077 656E2072 65746E45 20240114
0041544E 4547414D 00240114 27000000 002E0100 20746E69 6F702065 74696877
00000007 23006E61 79430200 24011427 00000101 07010024 01142700 00000006
00000000 06FD0024 01142700 00000006 2300594D 43207765 4E010024 06152700
00C80024 01142700 00010003 0013007A 00240114 27000001 01030100 24011427
00010109 00010024 01142700 00010005 23002001 00240114 27000001 00070113
2077656E 20726574 6E452024 01142700 00010009 00002401 1427004B 594D434C
2E010020 746E696F 70206574 69687720 726F6620 65756C61 7620776F 6C6C6579
00000100 09010023 01142700 00010109 00574F4C 4C455900 24011427 00000000
6F702065 74696877 20726F66 20736575 6C617620 6C616765 6C6C4920 24011427
FD002401 14270000 00000602 00726574 6E656572 20657361 656C7020 2C746E69
07230061 746E6567 614D0300 24011427 00000101 07010024 01142700 00000006
43207765 4E010024 06152700 00000007 23006E61 79430200 24011427 00000101
27000000 0006FE00 24011427 00000000 06FB0024 01142700 00000006 2300594D
4E454453 54440024 01142700 0000002E 05002401 14270000 00000601 00240114
00000606 00240114 27000000 00060048 43544143 00240114 27000000 002E0053
01002401 14270077 6F6C6C41 73695670 72616853 00010007 06002401 14270000
14270000 01000302 00240114 27000001 00090100 24011427 00000101 09230020
79002401 14270000 01000324 00200B00 24011427 00000000 07001200 79002401
73614D7E 6E696D75 4C0B0024 01142700 6B73614D 5F74696E 49000100 07001200
00240114 27000001 0103004B 53414D53 54440024 01142700 0000002E 2300206B
6968570D 00240015 27000000 01070013 00790024 01142700 00010003 011300C9
6E696F50 6C65636E 61430029 322C3328 464C5301 01070300 746E696F 50206574
01072400 200B0024 01142700 00000107 23006C65 636E6143 0C002401 14270074
07230020 7265540A 00240114 2700746E 696F5072 65540029 322C3328 464C5301
00000001 07240020 08002401 14270000 00010724 00200900 24011427 00000001
24011427 00000101 07240020 06002401 14270000 00010724 00200700 24011427
01072400 20040024 01142700 00000107 23002079 7469736E 65447E77 654E0500
77654E02 00240114 27000001 01072300 594D437E 77654E03 00240114 27000001
00240114 27000000 00062400 20010024 01142700 00000007 2300746E 696F507E
01000523 00200100 24011427 00000100 07011300 C8002401 14270000 01000301
09010024 01142700 00010109 00002301 14270000 01010900 07002401 14270000
04002401 14270000 01010903 00240114 27000001 01090200 24011427 00000101
00240114 27000001 00090600 24011427 00000101 09050024 01142700 00010109
01000701 1300C800 24011427 00000100 03001300 7A002401 14270000 01010307
24011427 00000101 09000100 24011427 00000100 05230020 01002401 14270000
65756C61 76206E61 79632077 656E2072 65746E45 20240114 27000001 00090000
41594300 24011427 00000000 2E010020 746E696F 70206574 69687720 726F6620
00594D43 2077654E 01002406 15270000 00000701 00240114 27000000 0006004E
27000001 00030113 00C80024 01142700 00010103 02002401 14270000 00000623
00010007 2300594D 43207765 4E010024 06152700 00000007 0013007A 00240114
00240114 27000001 01090001 00240114 27000001 00052300 20010024 01142700
00000000 06004E41 59430024 01142700 0000002E 01002401 14270000 01000900
00C80024 01142700 00010003 0013007A 00240114 27000001 01030100 24011427
00010109 00010024 01142700 00010005 23002001 00240114 27000001 00070113
6E656761 6D207765 6E207265 746E4520 24011427 00000100 09000024 01142700
00000000 2E010020 746E696F 70206574 69687720 726F6620 65756C61 76206174
01142700 00010107 01002401 14270000 00000600 41544E45 47414D00 24011427
00000623 00594D43 2077654E 01002406 15270000 00000723 006E6179 43020024
13007A00 24011427 00000101 03010024 01142700 00000006 FD002401 14270000
01000523 00200100 24011427 00000100 07011300 C8002401 14270000 01000300
14270000 01000900 00240114 27004B59 4D434C00 01010900 01002401 14270000
68772072 6F662065 756C6176 20776F6C 6C657920 77656E20 7265746E 45202401
01010900 574F4C4C 45590024 01142700 0000002E 01002074 6E696F70 20657469
7365756C 6176206C 6167656C 6C492024 01142700 00010009 01002301 14270000
7265746E 65657220 65736165 6C70202C 746E696F 70206574 69687720 726F6620
01142700 00010107 01002401 14270000 000006FD 00240114 27000000 00060200
00000723 006E6179 43020024 01142700 00010107 23006174 6E656761 4D030024
00000006 FB002401 14270000 00000623 00594D43 2077654E 01002406 15270000
00002E05 00240114 27000000 00060100 24011427 00000000 06FE0024 01142700
27000000 00060600 24011427 00000000 0600534E 45445354 44002401 14270000
23002001 00240114 2700776F 6C6C4173 69567072 61685300 01000706 00240114
00240114 27000001 00030200 24011427 00000100 09010024 01142700 00010109

```
00120079 00240114 27000001 00032400 200B0024 01142700 00000007 00120079
00206B73 614D7E6E 696D754C 0B002401 1427006B 73614D5F 74696E49 00010007
47494C00 24011427 00000000 2E004B53 414D5354 44002401 14270000 00002E23
07001300 51002401 14270000 01000301 00240114 27000000 00060053 4E495448
01142700 00010003 01002401 14270000 00000623 00200100 24011427 00000100
27000001 01092300 20010024 01142700 63695074 65470001 00070113 00CA0024
00000100 03010024 01142700 00000006 02002401 14270000 01000901 00240114
24011427 00000000 06230020 01002401 14270000 01000700 13005100 24011427
00070113 00CA0024 01142700 00010003 00130051 00240114 27000001 01030000
01010923 00200100 24011427 00002933 32286761 6C466C61 636F4C65 73614301
1300CD00 24011427 00000101 03020024 01142700 00010009 01002401 14270000
6F502077 654E0D00 24001527 00000001 07001300 79002401 14270000 01000301
01142700 594D434C 5F4F444E 55000101 07030061 65724120 20202020 20746E69
14270000 00010724 00200B00 24011427 00000001 0723006C 65636E61 430C0024
14270048 544F4200 01010724 00200800 24011427 00000001 07240020 0A002401
14270000 00010724 00200500 24011427 00000001 07230065 74696857 07002401
14270000 00000724 00200200 24011427 00000001 0724006C 6576654C 04002401
01142700 00000006 01002401 14270000 00000624 006C6172 7475654E 01002401
07001200 79002401 14270000 01000323 00200100 24011427 00000100 07FC0024
27000000 01070200 39207820 39200900 24011427 00337461 4D677276 41000101
00240114 27000000 00062400 20030024 01142700 00000007 24002006 00240114
01000300 13007900 24011427 00000101 03011300 CD002401 14270000 01010300
00293631 2867616C 466C6163 6F4C6573 61430100 07011300 C8002401 14270000
02002401 14270000 01000901 00240114 27000001 01092300 20010024 01142700
00010003 2400200B 00240114 27000000 00070012 00790024 01142700 00010003
09230020 01002401 14270000 29363228 464C4301 00070113 00C90024 01142700
79002401 14270000 01000302 00240114 27000001 00090100 24011427 00000101
00240114 27000000 00072400 20657469 68570700 24011427 00000001 07001200
14270000 00010700 12007900 24011427 00000100 03240020 6C617274 75654E01
00206C61 72747565 4E010024 01142700 00000007 2400206C 6576654C 04002401
00616572 41202020 20202074 6E696F50 2077654E 0D002400 15270000 00010724
00010723 006C6563 6E61430C 00240114 2700594D 434C5F4F 444E5500 01010703
14270000 00010724 00200A00 24011427 00000001 07240020 0B002401 14270000
00010723 00657469 68570700 24011427 0048544F 42000101 07240020 08002401
6C657665 4C040024 01142700 4C455645 4C000101 07240020 05002401 14270000
654E0100 24011427 00455548 00010007 24002002 00240114 27000000 01072300
00000601 00240114 27000000 00060100 24011427 00000000 0623006C 61727475
67727641 6B636568 43000100 07FC0024 01142700 00000006 01002401 14270000
00010109 03002401 14270000 01010923 00200100 24011427 00657A69 5374614D
00120079 00240114 27000001 00030900 24011427 00000100 09050024 01142700
41000101 07020039 20782039 20090024 01142700 3374614D 67727641 00010107
614D6772 76410001 00072300 35207820 35200600 24011427 00327461 4D677276
00000006 00002401 14270000 00000623 00332078 20332003 00240114 27003174
00120079 00240114 27000001 00030000 24011427 00000000 06000024 01142700
41000101 07230039 20782039 20090024 01142700 3374614D 67727641 00010107
614D6772 76410001 00070200 35207820 35200600 24011427 00327461 4D677276
00000006 00002401 14270000 00000623 00332078 20332003 00240114 27003174
00120079 00240114 27000001 00030000 24011427 00000000 06000024 01142700
41000101 07230039 20782039 20090024 01142700 3374614D 67727641 00010107
614D6772 76410001 00072300 35207820 35200600 24011427 00327461 4D677276
00000006 00002401 14270000 00000602 00332078 20332003 00240114 27003174
23002001 00240114 27000001 00070000 24011427 00000000 06000024 01142700
44505500 01000701 1300C800 24011427 00000100 03FF0024 01142700 00000006
01090100 23011427 00000101 09230020 01002401 14270054 4E494F50 5F455441
69646F6D 206E6565 62206576 61682073 65756C61 7620594D 43240114 27000001
6176616E 75206563 696F6863 20736968 74240114 27000001 00090200 64656966
27000000 00060300 6563696F 68632077 656E2065 6B616D20 2D20656C 62616C69
00000100 03FB0024 01142700 00000006 FB002401 14270000 000006FB 00240114
23002001 00240114 27000029 312C3034 28464C53 01000701 1300CA00 24011427
00000000 00000000 00000000 00000000 00000000 00000024 01142700 00000006
00000000 00000000 00000000 00000000 00000000 00000000 00000000 00000000
```

LIGHTINS.HEX
------------

```
6C466C61 636F4C65 73614301 00070113 00C80024 01142700 00010003 00001C53
00010009 01002401 14270000 01010923 00200100 24011427 00002933 32286761
5F724F5F 736F5000 01000701 1300C800 24011427 00000100 03020024 01142700
01142700 00010009 01002401 14270000 01010923 00200100 24011427 0067654E
616C466C 61636F4C 65736143 01000701 1300C800 24011427 00000100 03020024
```

00000100 09010024 01142700 00010109 23002001 00240114 27000029 33312867
570D0024 00152700 00000107 00130079 00240114 27000001 00030200 24011427
6F506C65 636E6143 0029322C 3328464C 53010107 0300746E 696F5020 65746968
006B7361 4D5F7469 6E490001 01072300 6C65636E 61430C00 24011427 00746E69
54002932 2C332846 4C530101 07230020 6B73614D 7E6E696D 754C0B00 24011427
20090024 01142700 00000107 23002072 65540A00 24011427 00746E69 6F507265
01072400 20070024 01142700 00000107 24002008 00240114 27000000 01072400
69736E65 447E7765 4E050024 01142700 00010107 24002006 00240114 27000000
654E0300 24011427 00000001 07240020 04002401 14270000 00010723 00207974
77654E02 00240114 27000029 322C3632 28464C53 01010724 006B6361 6C427E77
00240114 27000000 00062400 20010024 01142700 00000007 2300746E 696F507E
002E0600 24011427 00000000 0600534E 45445354 44002401 14270000 00002E01
00000100 03060024 01142700 00000006 004B5341 4D535444 00240114 27000000
00746E69 6F502065 74696857 0D002400 15270000 00010700 13007900 24011427
430C0024 01142700 746E696F 506C6563 6E614300 29322C33 28464C53 01010703
07240020 6B73614D 7E6E696D 754C0B00 24011427 00000001 0723006C 65636E61
23002072 65540A00 24011427 00746E69 6F507265 54002932 2C332846 4C530101
00000107 24002008 00240114 27000000 01072400 20090024 01142700 00000107
01142700 00000107 24002006 00240114 27000000 01072400 20070024 01142700
07240020 04002401 14270000 00010724 00207974 69736E65 447E7765 4E050024
02002401 14270000 01010724 006B6361 6C427E77 654E0300 24011427 00000001
14270000 00000624 00200100 24011427 00000000 07230074 6E696F50 7E77654E
27000001 00030600 24011427 00000000 06060024 01142700 00000006 01002401
14270000 29333128 67616C46 6C61636F 4C657361 43010007 011300C8 00240114
01000302 00240114 27000001 00090100 24011427 00000101 09230020 01002401
6E696F50 20657469 68570D00 24001527 00000001 07001300 79002401 14270000
00240114 2700746E 696F506C 65636E61 43002932 2C332846 4C530101 07030074
6D754C0B 00240114 27006B73 614D5F74 696E4900 01010723 006C6563 6E61430C
2700746E 696F5072 65540029 322C3328 464C5301 01072300 206B7361 4D7E6E69
14270000 00010724 00200900 24011427 00000001 07230020 7265540A 00240114
06002401 14270000 00010724 00200700 24011427 00000001 07240020 08002401
00000107 23002079 7469736E 65447E77 654E0500 24011427 00000101 07240020
00206B63 616C427E 77654E03 00240114 27000000 01072400 20040024 01142700
2300746E 696F507E 77654E02 00240114 27000029 322C3632 28464C53 01010724
14270000 00002E01 00240114 27000000 00062400 20010024 01142700 00000007
00240114 27000000 002E0600 24011427 00000000 0600534E 45445354 44002401
13007900 24011427 00000100 03060024 01142700 00000006 004B5341 4D535444
28464C53 01010703 00746E69 6F502065 74696857 0D002400 15270000 00010700
0723006C 65636E61 430C0024 01142700 746E696F 506C6563 6E614300 29322C33
2C332846 4C530101 07240020 6B73614D 7E6E696D 754C0B00 24011427 00000001
01142700 00000107 23002072 65540A00 24011427 00746E69 6F507265 54002932
20070024 01142700 00000107 24002008 00240114 27000000 01072400 20090024
447E7765 4E050024 01142700 00000107 24002006 00240114 27000000 01072400
00240114 27000000 01072400 20040024 01142700 00000107 24007974 69736E65
746E696F 507E7765 4E020024 01142700 00010107 24006B63 616C427E 77654E03
00000000 06010024 01142700 00000006 24002001 00240114 27000000 00072300
07011300 C8002401 14270000 01000306 00240114 27000000 00060600 24011427
24011427 00000101 09230020 01002401 14270067 654E5F72 4F5F736F 50000100
61430100 07011300 C8002401 14270000 01000302 00240114 27000001 00090100
27000001 01092300 20010024 01142700 00293331 2867616C 466C6163 6F4C6573
01070013 00790024 01142700 00010003 02002401 14270000 01000901 00240114
322C3328 464C5301 01070300 746E696F 50206574 6968570D 00240015 27000000
00010107 23006C65 636E6143 0C002401 14270074 6E696F50 6C65636E 61430029
01010723 00206B73 614D7E6E 696D754C 0B002401 1427006B 73614D5F 74696E49
01072300 20726554 0A002401 14270074 6E696F50 72655400 29322C33 28464C53
67694C7E 68637461 43080024 01142700 00000107 24002009 00240114 27000000
00200600 24011427 00000001 07240020 07002401 14270000 00010724 00207468
27000000 01072300 20797469 736E6544 7E77654E 05002401 14270000 01010724
53010107 2400594D 437E7765 4E030024 01142700 00000107 24002004 00240114
00000000 07230074 6E696F50 7E77654E 02002401 14270000 29322C36 3228464C
54440024 01142700 0000002E 01002401 14270000 00000624 00200100 24011427
414D5354 44002401 14270000 00002E06 00240114 27000000 00060053 4E454453
00000107 00130079 00240114 27000001 00030600 24011427 00000000 06004B53
0029322C 3328464C 53010107 0300746E 696F5020 65746968 570D0024 00152700
27000000 01072300 6C65636E 61430C00 24011427 00746E69 6F506C65 636E6143
65540029 322C3328 464C5301 01072400 206B7361 4D7E6E69 6D754C0B 00240114
00200900 24011427 00000001 07230020 7265540A 00240114 2700746E 696F5072
27000000 01072400 20746867 694C7E68 63746143 08002401 14270000 00010724
00240114 27000000 01072400 20060024 01142700 00000107 24002007 00240114

```
00010724 00200400 24011427 00000001 07240020 79746973 6E65447E 77654E05
77654E02 00240114 27000001 01072400 20594D43 7E77654E 03002401 14270000
00240114 27000000 00062400 20010024 01142700 00000007 2300746E 696F507E
24011427 00000100 03060024 01142700 00000006 06002401 14270000 00000601
00240114 27000029 33312867 616C466C 61636F4C 65736143 01000701 1300C800
27000001 00030200 24011427 00000100 09010024 01142700 00010109 23002001
0300746E 696F5020 65746968 570D0024 00152700 00000107 00130079 00240114
61430C00 24011427 00746E69 6F506C65 636E6143 0029322C 3328464C 53010107
7E6E696D 754C0B00 24011427 006B7361 4D5F7469 6E490001 01072300 6C65636E
24011427 00746E69 6F507265 54002932 2C332846 4C530101 07230020 6B73614D
00240114 27000000 01072400 20090024 01142700 00000107 23002072 65540A00
24002006 00240114 27000000 01072400 20070024 01142700 00000107 24002008
14270000 00010723 00207974 69736E65 447E7765 4E050024 01142700 00010107
53010107 24002059 4D437E77 654E0300 24011427 00000001 07240020 04002401
00000000 07230074 6E696F50 7E77654E 02002401 14270000 29322C36 3228464C
54440024 01142700 0000002E 01002401 14270000 00000624 00200100 24011427
414D5354 44002401 14270000 00002E06 00240114 27000000 00060053 4E454453
00000107 00130079 00240114 27000001 00030600 24011427 00000000 06004B53
0029322C 3328464C 53010107 0300746E 696F5020 65746968 570D0024 00152700
27000000 01072300 6C65636E 61430C00 24011427 00746E69 6F506C65 636E6143
65540029 322C3328 464C5301 01072400 206B7361 4D7E6E69 6D754C0B 00240114
00200900 24011427 00000001 07230020 7265540A 00240114 2700746E 696F5072
00010724 00200700 24011427 00000001 07240020 08002401 14270000 00010724
7469736E 65447E77 654E0500 24011427 00000001 07240020 06002401 14270000
77654E03 00240114 27000000 01072400 20040024 01142700 00000107 24002079
00000007 2300746E 696F507E 77654E02 00240114 27000001 01072400 594D437E
06002401 14270000 00000601 00240114 27000000 00062400 20010024 01142700
00000000 00000000 00000000 00000000 00000000 00060024 01142700 00000006
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
```

DARKINST.HEX

```
6C466C61 636F4C65 73614301 00070113 00C80024 01142700 00010003 00001C3C
00010009 01002401 14270000 01010923 00200100 24011427 00002933 32286761
5F724F5F 736F5000 01000701 1300C800 24011427 00000100 03020024 01142700
01142700 00010009 01002401 14270000 01010923 00200100 24011427 0067654E
616C466C 61636F4C 65736143 01000701 1300C800 24011427 00000100 03020024
00000100 09010024 01142700 00010109 23002001 00240114 27000029 33312867
440D0024 00152700 00000107 00130079 00240114 27000001 00030200 24011427
696F506C 65636E61 43002932 2C332846 4C530101 07030074 6E696F50 206B7261
27006B73 614D5F74 696E4900 01010723 006C6563 6E61430C 00240114 2700746E
65540029 322C3328 464C5301 01072300 206B7361 4D7E6E69 6D754C0B 00240114
00200900 24011427 00000001 07230020 7265540A 00240114 2700746E 696F5072
00010724 00200700 24011427 00000001 07240020 08002401 14270000 00010724
7469736E 65447E77 654E0500 24011427 00000101 07240020 06002401 14270000
77654E03 00240114 27000000 01072400 20040024 01142700 00000107 23002079
7E77654E 02002401 14270000 29322C36 3228464C 53010107 24006B63 616C427E
01002401 14270000 00000624 00200100 24011427 00000000 07230074 6E696F50
00002E06 00240114 27000000 00060053 4E454453 54440024 01142700 0000002E
27000001 00030600 24011427 00000000 06004B53 414D5354 44002401 14270000
07030074 6E696F50 206B7261 440D0024 00152700 00000107 00130079 00240114
6E61430C 00240114 2700746E 696F506C 65636E61 43002932 2C332846 4C530101
01010724 00206B73 614D7E6E 696D754C 0B002401 14270000 00010723 006C6563
01072300 20726554 0A002401 14270074 6E696F50 72655400 29322C33 28464C53
27000000 01072400 20080024 01142700 00000107 24002009 00240114 27000000
00240114 27000000 01072400 20060024 01142700 00000107 24002007 00240114
00010724 00200400 24011427 00000001 07240020 79746973 6E65447E 77654E05
654E0200 24011427 00000101 0724006B 63616C42 7E77654E 03002401 14270000
24011427 00000000 06240020 01002401 14270000 00000723 00746E69 6F507E77
01142700 00010003 06002401 14270000 00000606 00240114 27000000 00060100
```

24011427 00002933 31286761 6C466C61 636F4C65 73614301 00070113 00C80024
00000100 03020024 01142700 00010009 01002401 14270000 01010923 00200100
0300746E 696F5020 6B726144 0D002400 15270000 00010700 13007900 24011427
61430C00 24011427 00746E69 6F506C65 636E6143 0029322C 3328464C 53010107
7E6E696D 754C0B00 24011427 006B7361 4D5F7469 6E490001 01072300 6C65636E
24011427 00746E69 6F507265 54002932 2C332846 4C530101 07230020 6B73614D
00240114 27000000 01072400 20090024 01142700 00000107 23002072 65540A00
24002006 00240114 27000000 01072400 20070024 01142700 00000107 24002008
14270000 00010723 00207974 69736E65 447E7765 4E050024 01142700 00010107
01072400 206B6361 6C427E77 654E0300 24011427 00000001 07240020 04002401
00000723 00746E69 6F507E77 654E0200 24011427 00002932 2C363228 464C5301
00240114 27000000 002E0100 24011427 00000000 06240020 01002401 14270000
53544400 24011427 00000000 2E060024 01142700 00000006 00534E45 44535444
01070013 00790024 01142700 00010003 06002401 14270000 00000600 4B53414D
29322C33 28464C53 01010703 00746E69 6F50206B 7261440D 00240015 27000000
00000001 0723006C 65636E61 430C0024 01142700 746E696F 506C6563 6E614300
54002932 2C332846 4C530101 07240020 6B73614D 7E6E696D 754C0B00 24011427
20090024 01142700 00000107 23002072 65540A00 24011427 00746E69 6F507265
01072400 20070024 01142700 00000107 24002008 00240114 27000000 01072400
69736E65 447E7765 4E050024 01142700 00000107 24002006 00240114 27000000
654E0300 24011427 00000001 07240020 04002401 14270000 00010724 00207974
2300746E 696F507E 77654E02 00240114 27000001 01072400 206B6361 6C427E77
14270000 00000601 00240114 27000000 00062400 20010024 01142700 00000007
01000701 1300C800 24011427 00000100 03060024 01142700 00000006 06002401
01002401 14270000 01010923 00200100 24011427 0067654E 5F724F5F 736F5000
65736143 01000701 1300C800 24011427 00000100 03020024 01142700 00010009
01142700 00010109 23002001 00240114 27000029 33312867 616C466C 61636F4C
00000107 00130079 00240114 27000001 00030200 24011427 00000100 09010024
43002932 2C332846 4C530101 07030074 6E696F50 206B7261 440D0024 00152700
696E4900 01010723 006C6563 6E61430C 00240114 2700746E 696F506C 65636E61
464C5301 01072300 206B7361 4D7E6E69 6D754C0B 00240114 27006B73 614D5F74
00000001 07230020 7265540A 00240114 2700746E 696F5072 65540029 322C3328
24011427 00000001 07240020 08002401 14270000 00010724 00200900 24011427
654E0500 24011427 00000101 07240020 06002401 14270000 00010724 00200700
27000000 01072400 20040024 01142700 00000107 23002079 7469736E 65447E77
01142700 0029322C 36322846 4C530101 0724004B 594D437E 77654E03 00240114
00000006 24002001 00240114 27000000 00072300 746E696F 507E7765 4E020024
14270000 00000600 534E4544 53544400 24011427 00000000 2E010024 01142700
00240114 27000000 0006004B 53414D53 54440024 01142700 0000002E 06002401
50206B72 61440D00 24001527 00000001 07001300 79002401 14270000 01000306
14270074 6E696F50 6C65636E 61430029 322C3328 464C5301 01070300 746E696F
73614D7E 6E696D75 4C0B0024 01142700 00000107 23006C65 636E6143 0C002401
540A0024 01142700 746E696F 50726554 0029322C 3328464C 53010107 2400206B
00200800 24011427 00000001 07240020 09002401 14270000 00010723 00207265
00010724 00200600 24011427 00000001 07240020 07002401 14270000 00010724
00240114 27000000 01072400 20797469 736E6544 7E77654E 05002401 14270000
27000001 01072400 204B594D 437E7765 4E030024 01142700 00000107 24002004
00062400 20010024 01142700 00000007 2300746E 696F507E 77654E02 00240114
03060024 01142700 00000006 06002401 14270000 00000601 00240114 27000000
33312867 616C466C 61636F4C 65736143 01000701 1300C800 24011427 00000100
24011427 00000100 09010024 01142700 00010109 23002001 00240114 27000029
206B7261 440D0024 00152700 00000107 00130079 00240114 27000001 00030200
2700746E 696F506C 65636E61 43002932 2C332846 4C530101 07030074 6E696F50
00240114 27006B73 614D5F74 696E4900 01010723 006C6563 6E61430C 00240114
696F5072 65540029 322C3328 464C5301 01072300 206B7361 4D7E6E69 6D754C0B
00010724 00200900 24011427 00000001 07230020 7265540A 00240114 2700746E
14270000 00010724 00200700 24011427 00000001 07240020 08002401 14270000
23002079 7469736E 65447E77 654E0500 24011427 00000101 07240020 06002401
594D437E 77654E03 00240114 27000000 01072400 20040024 01142700 00000107
6E696F50 7E77654E 02002401 14270000 29322C36 3228464C 53010107 2400204B
0000002E 01002401 14270000 00000624 00200100 24011427 00000000 07230074
14270000 00002E06 00240114 27000000 00060053 4E454453 54440024 01142700
00240114 27000001 00030600 24011427 00000000 06004B53 414D5354 44002401
4C530101 07030074 6E696F50 206B7261 440D0024 00152700 00000107 00130079
006C6563 6E61430C 00240114 2700746E 696F506C 65636E61 43002932 2C332846
28464C53 01010724 00206B73 614D7E6E 696D754C 0B002401 14270000 00010723
27000000 01072300 20726554 0A002401 14270074 6E696F50 72655400 29322C33
00240114 27000000 01072400 20080024 01142700 00000107 24002009 00240114

77654E05 00240114 27000000 01072400 20060024 01142700 00000107 24002007
14270000 00010724 00200400 24011427 00000001 07240020 79746973 6E65447E
6F507E77 654E0200 24011427 00000101 07240020 4B594D43 7E77654E 03002401
00060100 24011427 00000000 06240020 01002401 14270000 00000723 00746E69
00000000 00000000 00000000 06002401 14270000 00000606 00240114 27000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000

CHOOSING.HEX 00002931 2C303428 464C5301 00070113 00CB0024 01142700 00010003 00002B43
6C467465 47000100 07011300 CB002401 14270000 01000323 00200100 24011427
00000101 09020024 01142700 00010109 23002001 00240114 27007265 704F776F
27006C65 6E61505F 6E495F79 7469736E 65445F74 75500001 01090300 24011427
06002401 14270000 01010905 00726574 656D6F74 69736E65 64206573 55240114
65735524 01142700 6C656E61 505F6E49 5F797469 736E6544 5F747550 00010109
27000001 01090800 24011427 00000101 09070072 6574656D 6F746973 6E656420
00000101 090B0024 01142700 00010109 0A002401 14270000 01010909 00240114
7463656C 65532401 14270000 0101090D 00240114 27000001 01090C00 24011427
3328464C 53010109 0E007065 74532067 6E697373 6563636F 72502074 78654E20
01091500 24011427 00002931 2C332846 4C530101 09140024 01142700 0029312C
14270000 29362C33 28464C53 01010916 00240114 27000029 362C3328 464C5301
3328464C 53010109 18002401 14270000 2932312C 3328464C 53010109 17002401
1A002401 14270000 2936312C 3328464C 53010109 19002401 14270000 2935312C
2937312C 3328464C 53010109 1B002401 14270000 2934312C 3328464C 53010109
00010003 1E002401 14270000 2938312C 3328464C 53010009 1D002401 14270000
00200100 24011427 00002932 2C343128 464C5301 00070113 00D30024 01142700
464C5301 00070113 00D30024 01142700 00010003 01002401 14270000 00000623
00010003 01002401 14270000 00000623 00200100 24011427 00002932 2C343128
00200100 24011427 00002932 2C343128 464C5301 00070113 00D30024 01142700
464C5301 00070113 00D30024 01142700 00010003 01002401 14270000 00000623
00010003 01002401 14270000 00000623 00200100 24011427 00002932 2C343128
00200100 24011427 00002932 2C343128 464C5301 00070113 00D30024 01142700
464C5301 00070113 00D30024 01142700 00010003 01002401 14270000 00000623
00010003 01002401 14270000 00000623 00200100 24011427 00002932 2C343128
00200100 24011427 00002932 2C333128 464C5301 00070113 00D20024 01142700
01142700 0029322C 34312846 4C530100 07011300 D3002401 14270000 01000323
07011300 D2002401 14270000 01000301 00240114 27000000 00062300 20010024
00240114 27000001 00032300 20010024 01142700 0029312C 33312846 4C530100
00000000 06230020 01002401 14270000 29322C34 3128464C 53010007 011300D3
29322C33 3128464C 53010007 011300D2 00240114 27000001 00030100 24011427
28464C53 01000701 1300D300 24011427 00000100 03230020 01002401 14270000
00000100 03010024 01142700 00000006 23002001 00240114 27000029 322C3431
23002001 00240114 27000029 312C3331 28464C53 01000701 1300D200 24011427
24011427 00002932 2C343128 464C5301 00070113 00D30024 01142700 00010003
01070012 009A0024 01142700 00010003 01002401 14270000 00000623 00200100
27000000 01072400 20060024 01142700 00000107 24002007 00240114 27000000
00240114 27000000 01072400 20040024 01142700 00000107 24002005 00240114
20202001 00240015 27000000 00072400 20020024 01142700 00000107 24002003
12009A00 24011427 00000100 03030020 20206465 74656C70 6D6F4320 776F6C46
74726174 53655207 00240114 27007265 704F776F 6C466574 6F4E5200 01010700
2300706C 65480600 24011427 00726570 4F776F6C 4665746F 4E480001 01072300
2079726F 74736948 05002401 14270072 65704F77 6F6C4665 746F4E53 00010107
00726570 4F776F6C 4665746F 4E420001 01072300 29736E6F 69746365 6C657328
14270072 65704F77 6F6C4665 746F4E4E 00010107 23006B63 61420400 24011427
02002401 14270072 65704F77 6F6C4665 746F4E59 00010107 23006F4E 03002401
49204E49 20535945 5247204B 52414420 01002400 15270000 00000723 00736559
00000006 00002401 14270000 00000600 00240114 27000000 00060300 3F20474D
00000600 00240114 27000000 00060000 24011427 00000000 06000024 01142700
4665746F 4E520001 01070012 009A0024 01142700 00010003 00002401 14270000

65746F4E 48000101 07230074 72617453 65520700 24011427 00726570 4F776F6C
6C466574 6F4E5300 01010723 00706C65 48060024 01142700 7265704F 776F6C46
736E6F69 7463656C 65732820 79726F74 73694805 00240114 27007265 704F776F
006B6361 42040024 01142700 7265704F 776F6C46 65746F4E 42000101 07230029
01010723 006F4E03 00240114 27007265 704F776F 6C466574 6F4E4E00 01010723
27000000 00072300 73655902 00240114 27007265 704F776F 6C466574 6F4E5900
00000000 0603003F 20535453 49584520 54534143 20574F44 41485301 00240015
00000006 00002401 14270000 00000600 00240114 27000000 00060000 24011427
01000300 00240114 27000000 00060000 24011427 00000000 06000024 01142700
01142700 7265704F 776F6C46 65746F4E 52000101 07001200 9A002401 14270000
14270072 65704F77 6F6C4665 746F4E48 00010107 23007472 61745365 52070024
24011427 00726570 4F776F6C 4665746F 4E530001 01072300 706C6548 06002401
746F4E42 00010107 23002973 6E6F6974 63656C65 73282079 726F7473 69480500
4665746F 4E4E0001 01072300 6B636142 04002401 14270072 65704F77 6F6C4665
4F776F6C 4665746F 4E590001 01072300 6F4E0300 24011427 00726570 4F776F6C
544C4847 49480100 24001527 00000000 07230073 65590200 24011427 00726570
00000000 06000024 01142700 00000006 03003F20 53545349 58452054 53414320
00000006 00002401 14270000 00000600 00240114 27000000 00060000 24011427
0012009A 00240114 27000001 00030000 24011427 00000000 06000024 01142700
00747261 74536552 07002401 14270072 65704F77 6F6C4665 746F4E52 00010107
07230070 6C654806 00240114 27007265 704F776F 6C466574 6F4E4800 01010723
28207972 6F747369 48050024 01142700 7265704F 776F6C46 65746F4E 53000101
27007265 704F776F 6C466574 6F4E4200 01010723 0029736E 6F697463 656C6573
01142700 7265704F 776F6C46 65746F4E 4E000101 0723006B 63614204 00240114
23007365 59020024 01142700 0029322C 36312846 4C530101 0723006F 4E030024
003F204E 4F495443 4552524F 43205245 48545255 46010024 00152700 00000007
24011427 00000000 06000024 01142700 00000006 01002401 14270000 00000603
01142700 00000006 00002401 14270000 00000600 00240114 27000000 00060000
704F776F 6C466574 6F4E5200 01010700 12009A00 24011427 00000100 03000024
4F776F6C 4665746F 4E480001 01072300 74726174 53655207 00240114 27007265
65704F77 6F6C4665 746F4E53 00010107 2300706C 65480600 24011427 00726570
01072300 29736E6F 69746365 6C657328 2079726F 74736948 05002401 14270072
00010107 23006B63 61420400 24011427 00726570 4F776F6C 4665746F 4E420001
746F4E59 00010107 23006F4E 03002401 14270072 65704F77 6F6C4665 746F4E4E
01002400 15270000 00000723 00736559 02002401 14270072 65704F77 6F6C4665
00240114 27000000 00060300 203F2053 53454E54 48474952 42205946 49444F4D
24011427 00000000 06000024 01142700 00000006 00002401 14270000 00000600
01142700 00010003 00002401 14270000 00000600 00240114 27000000 00060000
65520700 24011427 00726570 4F776F6C 4665746F 4E520001 01070012 009A0024
48060024 01142700 7265704F 776F6C46 65746F4E 48000101 07230074 72617453
73694805 00240114 27007265 704F776F 6C466574 6F4E5300 01010723 00706C65
776F6C46 65746F4E 42000101 07230029 736E6F69 7463656C 65732820 79726F74
704F776F 6C466574 6F4E4E00 01010723 006B6361 42040024 01142700 7265704F
27007265 704F776F 6C466574 6F4E5900 01010723 006F4E03 00240114 27007265
49204E49 20502D44 20202001 00240015 27000000 00072300 73655902 00240114
00240114 27000000 00060000 24011427 00000000 06030020 20203F20 4547414D
24011427 00000000 06000024 01142700 00000006 00002401 14270000 00000600
00000100 03001200 AF002401 14270000 01010300 00240114 27000000 00060000
00240114 27007265 704F776F 6C466574 6F4E5200 01010700 12009A00 24011427
24011427 00726570 4F776F6C 4665746F 4E480001 01072300 74726174 53655207
05002401 14270072 65704F77 6F6C4665 746F4E53 00010107 2300706C 65480600
4665746F 4E420001 01072300 29736E6F 69746365 6C657328 2079726F 74736948
6F6C4665 746F4E4E 00010107 23006B63 61420400 24011427 00726570 4F776F6C
65704F77 6F6C4665 746F4E59 00010107 23006F4E 03002401 14270072 65704F77
49444F4D 20202020 01002400 15270000 00000723 00736559 02002401 14270072
00010007 011300CC 00240114 27000001 00030300 20202020 3F20502D 44205946
01002401 1427006C 656E6150 5F6D6F72 465F7974 69736E65 445F6574 656C6544
07001200 AF002401 14270000 01000301 1300C800 24011427 00000101 03230020
00200100 24011427 00000100 07240079 7469736E 65440D00 24011427 00000000
65440001 00070113 00CC0024 01142700 00010003 00002401 14270000 00000623
00200100 24011427 006C656E 61505F6D 6F72465F 79746973 6E65445F 6574656C
00000700 1200AF00 24011427 00000100 03011300 C8002401 14270000 01010323
06230020 01002401 14270000 01000724 00797469 736E6544 0D002401 14270000
656C6544 00010007 011300CC 00240114 27000001 00030000 24011427 00000000
03230020 01002401 1427006C 656E6150 5F6D6F72 465F7974 69736E65 445F6574
00000000 07001200 AF002401 14270000 01000301 1300C800 24011427 00000101
00000623 00200100 24011427 00000100 07240079 7469736E 65440D00 24011427
00060000 24011427 00000000 06000024 01142700 00000006 00002401 14270000

01000324 00797469 736E6544 0D002401 14270000 00000700 00240114 27000000
01142700 7265704F 776F6C46 65746F4E 52000101 07001200 9A002401 14270000
14270072 65704F77 6F6C4665 746F4E48 00010107 23007472 61745365 52070024
24011427 00726570 4F776F6C 4665746F 4E530001 01072300 706C6548 06002401
746F4E42 00010107 23002973 6E6F6974 63656C65 73282079 726F7473 69480500
4665746F 4E4E0001 01072300 6B636142 04002401 14270072 65704F77 6F6C4665
4F776F6C 4665746F 4E590001 01072300 6F4E0300 24011427 00726570 4F776F6C
54414441 52470100 24001527 00000000 07230073 65590200 24011427 00726570
00000000 06000024 01142700 00000006 03003F20 44455249 55514552 204E4F49
00000006 00002401 14270000 00000600 00240114 27000000 00060000 24011427
001200AF 00240114 27000001 01030000 24011427 00000000 06000024 01142700
74726174 53655207 00240114 27000000 01070012 009A0024 01142700 00010003
2300706C 65480600 24011427 00726570 4F776F6C 4665746F 4E480001 01072400
0029736E 6F697463 656C6573 28207972 6F747369 48050024 01142700 00000107
4F776F6C 4665746F 4E4E0001 01072400 6B636142 04002401 14270000 00010724
00726570 4F776F6C 4665746F 4E590001 01072300 6F4E0300 24011427 00726570
59464944 4F4D2020 20200100 24001527 00000000 07230073 65590200 24011427
65440001 00070113 00CC0024 01142700 00010003 03002020 20203F20 502D5720
00200100 24011427 006C656E 61505F6D 6F72465F 79746973 6E65445F 6574656C
00000700 1200AF00 24011427 00000100 03011300 C8002401 14270000 01010323
06230020 01002401 14270000 01000724 00797469 736E6544 0D002401 14270000
656C6544 00010007 011300CC 00240114 27000001 00030000 24011427 00000000
03230020 01002401 1427006C 656E6150 5F6D6F72 465F7974 69736E65 445F6574
00000000 07001200 AF002401 14270000 01000301 1300C800 24011427 00000101
00000623 00200100 24011427 00000100 07240079 7469736E 65440D00 24011427
65440D00 24011427 00000000 07000024 01142700 00000006 00002401 14270000
6C466574 6F4E5200 01010700 12009A00 24011427 00000100 03240079 7469736E
4665746F 4E480001 01072300 74726174 53655207 00240114 27007265 704F776F
6F6C4665 746F4E53 00010107 2300706C 65480600 24011427 00726570 4F776F6C
29736E6F 69746365 6C657328 2079726F 74736948 05002401 14270072 65704F77
23006B63 61420400 24011427 00726570 4F776F6C 4665746F 4E420001 01072300
00010107 23006F4E 03002401 14270072 65704F77 6F6C4665 746F4E4E 00010107
15270000 00000723 00736559 02002401 14270072 65704F77 6F6C4665 746F4E59
27000000 00060300 3F474D49 204E4920 53594552 47205448 47495242 01002400
00000000 06000024 01142700 00000006 00002401 14270000 00000600 00240114
00010003 00002401 14270000 00000600 00240114 27000000 00060000 24011427
24011427 00726570 4F776F6C 4665746F 4E520001 01070012 009A0024 01142700
01142700 7265704F 776F6C46 65746F4E 48000101 07230074 72617453 65520700
00240114 27007265 704F776F 6C466574 6F4E5300 01010723 00706C65 48060024
65746F4E 42000101 07230029 736E6F69 7463656C 65732820 79726F74 73694805
6C466574 6F4E4E00 01010723 006B6361 42040024 01142700 7265704F 776F6C46
704F776F 6C466574 6F4E5900 01010723 006F4E03 00240114 27007265 704F776F
20502D57 20202001 00240015 27000000 00072300 73655902 00240114 27007265
27000000 00060000 24011427 00000000 06030020 20203F20 4547414D 49204E49
00000000 06000024 01142700 00000006 00002401 14270000 00000600 00240114
00000000 00000000 00000000 00006F00 00240114 27000000 00060000 24011427
00000000 00000000 00000000 00000000 00000000 00000000 00000000 000000C0
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000

FLACCESS.HEX
-------------

00000101 09000023 01142700 00010109 00030024 01142700 00010005 0000040A
27000001 01090100 64726F77 73736150 20726573 55207265 746E4520 24011427
01070012 009A0024 01142700 00010003 03002401 14270000 01000902 00240114
2C363128 464C5301 01072300 6F4E0300 24011427 00002932 2C363128 464C5301
5254534E 49200100 24001527 00000000 07230073 65590200 24011427 00002931
00000000 06010024 01142700 00000006 03002020 3F20574F 4C462044 45544355
4E030024 01142700 00010107 0012009A 00240114 27000001 00030300 24011427

27000000 00072300 73655902 00240114 27007364 7750646F 4D000101 0723006F
00000006 03002020 3F207364 726F7773 73615020 79666964 6F4D2001 00240015
00130005 00240114 27000001 00030100 24011427 00000000 06010024 01142700
49240114 27000001 01092300 20010024 01142700 656D616E 5F647770 00010007
726F7773 73615024 01142700 00010109 01006472 6F777373 6170206C 61676C6C
41207265 73557265 70755324 01142700 00010009 02006465 74706563 63612064
00000601 00240114 27000000 0006FF00 24011427 00000000 06030073 73656363
00000000 00000000 00000000 09010024 01142700 00000006 00002401 14270000
00000000 00000000 00000000 00000000 00000000 00000000 00000000 00000000

FLW_PWD.HEX 20445750 5F574C46 20202020 20202020 20202020 20200052 0150004C 00180016
00000000 00000000 00000000 00000000 00000000 00000000 00000000 00000000
20202020 20445750 00000000 9B000000 50500110 00040000 48700020 0110021F
20202020 20304C56 00000000 00080000 50500106 00040000 CA600020 0106041D
00000000 00000000 00000000 00000000 00000000 00000000 00002020 20202030
00000000 00000000 00000000 00002F6B 636F6C42 2F657355 2F20202F 000200FE
20202020 20384C56 00000000 00080000 50500106 00040000 CA600020 01060442
00000000 00000000 00000000 00000000 00000000 00000000 00002020 20202030
00000000 00000000 00000000 00002F6B 636F6C42 2F657355 2F20202F 000200FE
20202020 20314C56 00000000 00080000 50500106 00040000 CA600020 0106061D
00000000 00000000 00000000 00000000 00000000 00000000 00002020 20202030
00000000 00000000 00000000 00002F6B 636F6C42 2F657355 2F20202F 000200FE
20202020 20394C56 00000000 00080000 50500106 00040000 CA600020 01060642
00000000 00000000 00000000 00000000 00000000 00000000 00002020 20202030
00000000 00000000 00000000 00002F6B 636F6C42 2F657355 2F20202F 000200FE
20202020 20324C56 00000000 00080000 50500106 00040000 CA600020 0106081D
00000000 00000000 00000000 00000000 00000000 00000000 00002020 20202030
00000000 00000000 00000000 00002F6B 636F6C42 2F657355 2F20202F 000200FE
20202020 30314C56 00000000 00080000 50500106 00040000 CA600020 01060842
00000000 00000000 00000000 00000000 00000000 00000000 00002020 20202030
00000000 00000000 00000000 00002F6B 636F6C42 2F657355 2F20202F 000200FE
20202020 20334C56 00000000 00080000 50500106 00040000 CA600020 01060A1D
00000000 00000000 00000000 00000000 00000000 00000000 00002020 20202030
00000000 00000000 00000000 00002F6B 636F6C42 2F657355 2F20202F 000200FE
20202020 20344C56 00000000 00080000 50500106 00040000 CA600020 01060C1D
00000000 00000000 00000000 00000000 00000000 00000000 00002020 20202030
00000000 00000000 00000000 00002F6B 636F6C42 2F657355 2F20202F 000200FE
20202020 20354C56 00000000 00080000 50500106 00040000 CA600020 01060E1D
00000000 00000000 00000000 00000000 00000000 00000000 00002020 20202030
00000000 00000000 00000000 00002F6B 636F6C42 2F657355 2F20202F 000200FE
20202020 20364C56 00000000 00080000 50500106 00040000 CA600020 0106101D
00000000 00000000 00000000 00000000 00000000 00000000 00002020 20202030
00000000 00000000 00000000 00002F6B 636F6C42 2F657355 2F20202F 000200FE
20202020 20374C56 00000000 00080000 50500106 00040000 CA600020 0106121D
00000000 00000000 00000000 00000000 00000000 00000000 00002020 20202030
00000000 00000000 00000000 00002F6B 636F6C42 2F657355 2F20202F 000200FE
20202020 35375F46 00000000 00000000 5050010C 00000000 88400020 010C0211
00000000 00000000 00000000 00000000 00000000 203A2064 726F5773 73615020
20202020 20304D4E 00000000 00000000 50500116 00000000 08400020 01160406
20202020 20384D4E 00000000 00000000 50500116 00000000 08400020 0116042B
20202020 20314D4E 00000000 00000000 50500116 00000000 08400020 01160606
20202020 20394D4E 00000000 00000000 50500116 00000000 08400020 0116062B
20202020 20324D4E 00000000 00000000 50500116 00000000 08400020 01160806
20202020 30314D4E 00000000 00000000 50500116 00000000 08400020 0116082B
20202020 20334D4E 00000000 00000000 50500116 00000000 08400020 01160A06
20202020 20344D4E 00000000 00000000 50500116 00000000 08400020 01160C06
20202020 20354D4E 00000000 00000000 50500116 00000000 08400020 01160E06
20202020 20364D4E 00000000 00000000 50500116 00000000 08400020 01161006
20202020 20374D4E 00000000 00000000 50500116 00000000 08400020 01161206
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000

```
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
```

INSTRUCT.HEX

-------------

```
00002931 2C343128 464C5301 00070113 00CB0024 01142700 00010003 000075AE
00002301 14270000 01010900 02002401 14270000 01000523 00200100 24011427
01030200 20240114 27000001 00090100 24011427 00744374 65736552 00010109
27000001 01030113 00CC0024 01142700 00010103 011300C9 00240114 27000001
00240114 27000001 01030113 00C80024 01142700 00010103 011300D0 00240114
011300CF 00240114 27000001 01030113 00CB0024 01142700 00010103 011300CE
00010003 011300D2 00240114 27000001 01030013 00AF0024 01142700 00010103
01092300 20010024 01142700 00293328 464C4301 00070113 00CA0024 01142700
09060024 01142700 00010109 02002401 14270000 01010901 00240114 27000001
0E002401 14270000 0101090C 00240114 27000001 01090B00 24011427 00000101
00240114 27000001 01091000 24011427 00000101 090F0024 01142700 00010109
27000000 00070013 00C80024 01142700 00010003 12002401 14270000 01000911
00240114 27000000 00070013 00C80024 01142700 00010003 23002001 00240114
23002001 00240114 27000000 00070013 00C80024 01142700 00010003 23002001
00010003 23002001 00240114 27000000 00070013 00C80024 01142700 00010003
01142700 00010003 23002001 00240114 27000000 00070013 00C80024 01142700
00C80024 01142700 00010003 23002001 00240114 27000000 00070013 00C80024
00070013 00C80024 01142700 00010003 23002001 00240114 27000000 00070013
46474301 00070113 00CA0024 01142700 00010003 23002001 00240114 27000000
01142700 0029322C 37322846 47530101 09230020 01002401 14270000 29383228
00000007 001300C8 00240114 27000001 00030200 24011427 00000100 09010024
01142700 00000007 001300C8 00240114 27000001 00032300 20010024 01142700
20010024 01142700 00000007 001300C8 00240114 27000001 00032300 20010024
00000101 09230020 01002401 14270072 656C626D 65737341 66490001 00072300
07011300 D2002401 14270000 01000302 00240114 27000001 00090100 24011427
09010024 01142700 00010109 23002001 00240114 27000029 37322846 47430100
01142700 00000007 001300C8 00240114 27000001 00030200 24011427 00000100
20080024 00152700 00000107 001300A6 00240114 27000001 00032300 20010024
004D2006 00240015 27000000 01070300 59200700 24001527 00000001 07030042
01072300 20040024 00152700 00000107 03004320 05002400 15270000 00010703
27000000 00072300 20020024 00152700 00000107 23002003 00240015 27000000
00240114 27000000 00070013 00C80024 01142700 00010003 23002001 00240015
6972420E 00240114 27000000 01072400 200F0024 01142700 00000107 23002001
24011427 00000001 07240020 0D002401 14270000 00010724 00737365 6E746867
726F4320 74736143 0B002401 14270000 00010724 006E6F69 74616461 72470C00
24011427 00000001 07240020 6B63616C 42200A00 24011427 00000001 07240072
0061746E 6567614D 20080024 01142700 00000107 2400776F 6C6C6C65 59200900
61440600 24011427 00000001 0724006E 61794320 07002401 14270000 00010724
27000000 01072400 6B63616C 42200500 24011427 00000001 07240074 50206B72
746E6567 614D2003 00240114 27000000 01072400 776F6C6C 65592004 00240114
00240114 27000000 00072400 6E617943 20020024 01142700 00000107 24002061
23002001 00240114 27000029 34312846 4C430100 07240074 50206574 69685701
00240114 27000001 00030200 24011427 00000100 09010024 01142700 00010109
01090001 00240114 27000001 00052300 20010024 01142700 00000007 001300C8
48430024 01142700 0000002E 01002401 14270000 01000900 00230114 27000001
00293631 28464C43 01000701 1300CB00 24011427 00000100 0300474E 49534F4F
65726F74 73655200 01000901 00240114 27000001 01092300 20010024 01142700
27000000 00060200 24011427 00000000 06020024 01142700 6C656E61 50737444
27000001 01092300 20010024 01142700 00293431 28464C43 01000700 00240114
01142700 0029312C 34312846 4C533B29 322C3034 28464C53 01000901 00240114
24011427 00002933 28464C43 01000701 1300CB00 24011427 00000100 03020024
696F5020 65746968 57206D72 6F667265 50202401 14270000 01010923 00200100
4C530101 09060024 01142700 00010109 02002401 14270000 01010901 0020746E
72672079 6669646F 4D202401 14270064 6172475F 74696E49 0029312C 30372846
00010109 0E002401 14270000 0101090C 00207365 76727563 206E6F69 74616461
27000001 01090F00 20747361 43206F74 7541206D 726F6672 65502024 01142700
27000001 01091000 20747361 43206C61 756E614D 206D726F 66726550 20240114
01142700 00010009 11002074 73614320 6F747541 206D726F 66726550 20240114
01142700 0000002E 12002074 73614320 6C61756E 614D206D 726F6672 65502024
```

0000002E 00545341 4357454E 00240114 27000000 002E0054 53414357 454E0024
00545341 4357454E 00240114 27000000 002E0054 53414357 454E0024 01142700
00010005 23002001 00240114 27000001 00070113 00C80024 01142700 00010003
00000101 09000024 01142700 0029322C 3328464C 53010109 00040024 01142700
68676972 42202401 14270000 01010902 00240114 27000001 01090100 23011427
45202401 14270000 01000903 00646572 65746E65 2065756C 61562073 73656E74
2065676E 61722820 7373656E 74686769 72622066 6F206575 6C617620 7265746E
00000000 06005448 47495242 00240114 27000000 002E0400 29203031 202D2030
24011427 00000100 03005448 47495242 00240114 27000000 002E0200 24011427
00240114 27007373 656E7468 67697242 5F6C6162 6F6C4700 01000701 1300CA00
206C6167 656C6C49 24011427 00000100 09010024 01142700 00010109 23002001
2D203020 65676E61 7220282E 7373656E 74686769 72422072 6F662065 756C6176
01000301 00240114 27000000 0006FF00 24011427 00000000 06020029 20303120
20010024 01142700 0029312C 30342846 4C530100 07011300 CA002401 14270000
0000002E 00444152 47002401 14270000 00002E00 00240114 27000000 00062300
14270000 00000700 1200AF00 24011427 00000100 03004B52 41440024 01142700
00000100 03005448 47494C00 24011427 00000000 2E24006E 61794320 02002401
30312846 4C430100 07230020 01002401 14270000 00000700 1300C800 24011427
24011427 00000100 09000024 01142700 00010109 23002001 00240114 27000029
00070113 00C90024 01142700 00010003 011300CB 00240114 27000001 01030100
01010901 00240114 27000001 01092300 20010024 01142700 00293328 464C4301
6E4F5F73 65767275 43000101 09060024 01142700 00010109 02002401 14270000
0101090F 00240114 27000001 01090E00 24011427 00000101 090C0024 01142700
00031200 24011427 00000100 09110024 01142700 00010109 10002401 14270000
664F2073 65767275 43030024 01142700 00000107 0012007B 00240114 27000001
14270000 00000724 00747361 4C206F64 6E550200 24011427 00000001 07240066
01142700 00000107 0012007B 00240114 27000001 00032400 6F646E55 01002401
4C206F64 6E550200 24011427 00000001 07240066 664F2073 65767275 43030024
00240114 27000001 00032400 6F646E55 01002401 14270000 00000724 00747361
00000001 07240066 664F2073 65767275 43030024 01142700 00000107 0012007B
6F646E55 01002401 14270000 00000724 00747361 4C206F64 6E550200 24011427
65767275 43030024 01142700 00000107 0012007B 00240114 27000001 00032400
00000724 00747361 4C206F64 6E550200 24011427 00000001 07240066 664F2073
00000107 0012007B 00240114 27000001 00032400 6F646E55 01002401 14270000
6E550200 24011427 00000001 07240066 664F2073 65767275 43030024 01142700
27000001 00032400 6F646E55 01002401 14270000 00000724 00747361 4C206F64
0066664F 5F736576 72754300 29302C30 3128464C 53010107 0012007B 00240114
646E5502 00240114 27000000 01072300 66664F20 73657672 75430300 24011427
14270000 01010324 006F646E 55010024 01142700 00000007 24007473 614C206F
312C3031 28464C53 00000700 12007B00 24011427 00000100 03011300 CD002401
01000723 006E4F20 73657672 75430300 24031527 006E4F5F 73657672 75430029
01000901 00230114 27000001 01092300 20010024 01142700 00293332 28464C43
00240114 27000000 01030010 00EB0024 01142700 00000003 02002301 14270000
001000E9 00240114 27000000 01030010 00EA0024 01142700 00000103 001000EB
00000107 0012007B 00240114 27000001 00030010 00E80024 01142700 00000003
6E550200 24011427 00000001 07240066 664F2073 65767275 43030024 01142700
27000001 00032400 6F646E55 01002401 14270000 00000724 00747361 4C206F64
0066664F 5F736576 72754300 29302C30 3128464C 53010107 0012007B 00240114
24011427 00314B43 41420001 01072300 66664F20 73657672 75430300 24011427
006C6C41 5F646172 475F7465 73655200 01000723 00747361 4C206F64 6E550200
27000000 00070013 00C80024 01142700 00010003 23006F64 6E550100 24011427
00240114 27000000 00070013 00C80024 01142700 00010003 23002001 00240114
0012007B 00240114 27000001 00030113 00CD0024 01142700 00010103 23002001
72754303 00240315 27006E4F 5F736576 72754300 29312C30 3128464C 53000007
01010923 00200100 24011427 00002933 3228464C 43010007 23006E4F 20736576
1000EB00 24011427 00000000 03020023 01142700 00010009 01002301 14270000
00010300 1000EA00 24011427 00000001 03001000 EB002401 14270000 00010300
14270000 01000300 1000E800 24011427 00000000 03001000 E9002401 14270000
01072400 66664F20 73657672 75430300 24011427 00000001 07001200 7B002401
55010024 01142700 00000007 24007473 614C206F 646E5502 00240114 27000000
27000001 01092300 20010024 01142700 00293332 28464C43 01000724 006F646E
01070012 00EB0024 01142700 00010003 02002401 14270000 01000901 00240114
27000000 01072300 20080024 00152700 00000107 24002009 00240015 27000000
00240015 27000000 01072400 20060024 00152700 00000107 23002007 00240015
23002003 00240015 27000000 01072300 20040024 00152700 00000107 24002005
006B6361 6C422001 00240015 27000000 00072400 20020024 00152700 00000107
01010300 1300EA00 24011427 00000101 03001200 EB002401 14270000 01010303

15270000 00010700 1300E800 24011427 00000100 03001300 E9002401 14270000
07002400 15270000 00010723 00200800 24001527 00000001 07240020 09002400
07240020 05002400 15270000 00010724 00200600 24001527 00000001 07230020
00000001 07230020 03002400 15270000 00010723 00200400 24001527 00000001
00000001 0703006E 61794320 01002400 15270000 00000724 00200200 24001527
24001527 00000001 07230020 08002400 15270000 00010724 00200900 24001527
00200500 24001527 00000001 07240020 06002400 15270000 00010723 00200700
00010723 00200300 24001527 00000001 07230020 04002400 15270000 00010724
03006174 6E656761 4D200100 24001527 00000000 07240020 02002400 15270000
00000107 23002008 00240015 27000000 01072400 20090024 00152700 00000107
00152700 00000107 24002006 00240015 27000000 01072300 20070024 00152700
20030024 00152700 00000107 23002004 00240015 27000000 01072400 20050024
6C6C6559 20010024 00152700 00000007 24002002 00240015 27000000 01072300
23002008 00240015 27000000 01072400 20090024 00152700 00000107 0300776F
00000107 24002006 00240015 27000000 01072300 20070024 00152700 00000107
00152700 00000107 23002004 00240015 27000000 01072400 20050024 00152700
20010024 00152700 00000007 24002002 00240015 27000000 01072300 20030024
C8002401 14270000 01000301 1300C900 24011427 00000101 0303006B 63616C42
24011427 00000101 09230020 01002401 14270000 29332846 4C430100 07011300
01142700 00010109 06002401 14270000 01010902 00240114 27000001 01090100
14270000 0101090F 00240114 27000001 01090E00 24011427 00000101 090C0024
27000001 00031200 24011427 00000100 09110024 01142700 00010109 10002401
00240114 27000001 00032300 20010024 01142700 00000007 001300C8 00240114
001300C8 00240114 27000001 00032300 20010024 01142700 00000007 001300C8
00000007 001300C8 00240114 27000001 00032300 20010024 01142700 00000007
01142700 00000007 001300C8 00240114 27000001 00032300 20010024 01142700
00002933 3228464C 43010007 011300CB 00240114 27000001 00032300 20010024
03020024 01142700 00010009 01002401 14270000 01010923 00200100 24011427
00000001 07240020 09002400 15270000 00010700 1200EB00 24011427 00000100
24001527 00000001 07230020 07002400 15270000 00010723 00200800 24001527
00200400 24001527 00000001 07240020 05002400 15270000 00010724 00200600
00000724 00200200 24001527 00000001 07230020 03002400 15270000 00010723
01030012 00EB0024 01142700 00010103 03006B63 616C4220 01002400 15270000
27000001 00030013 00E90024 01142700 00010103 001300EA 00240114 27000001
00240015 27000000 01072400 20090024 00152700 00000107 001300E8 00240114
24002006 00240015 27000000 01072300 20070024 00152700 00000107 23002008
00000107 23002004 00240015 27000000 01072400 20050024 00152700 00000107
00152700 00000007 24002002 00240015 27000000 01072300 20030024 00152700
00152700 00000107 24002009 00240015 27000000 01070300 6E617943 20010024
20060024 00152700 00000107 23002007 00240015 27000000 01072300 20080024
01072300 20040024 00152700 00000107 24002005 00240015 27000000 01072400
27000000 00072400 20020024 00152700 00000107 23002003 00240015 27000000
00010724 00200900 24001527 00000001 07030061 746E6567 614D2001 00240015
15270000 00010723 00200700 24001527 00000001 07230020 08002400 15270000
04002400 15270000 00010724 00200500 24001527 00000001 07240020 06002400
07240020 02002400 15270000 00010723 00200300 24001527 00000001 07230020
00200900 24001527 00000001 07030077 6F6C6C65 59200100 24001527 00000000
00010723 00200700 24001527 00000001 07230020 08002400 15270000 00010724
15270000 00010724 00200500 24001527 00000001 07240020 06002400 15270000
02002400 15270000 00010723 00200300 24001527 00000001 07230020 04002400
00240114 27000001 00030300 6B63616C 42200100 24001527 00000000 07240020
001300C8 00240114 27000001 00032300 20010024 01142700 00000007 001300C8
00000007 001300C8 00240114 27000001 00032300 20010024 01142700 00000007
01092300 20010024 01142700 00293328 464C4301 00072300 20010024 01142700
09060024 01142700 00010109 02002401 14270000 01010901 00240114 27000001
01090E00 24011427 00000101 090C0024 01142700 6E4F5F73 65767275 43000101
09110024 01142700 00010109 10002401 14270000 0101090F 00240114 27000001
01142700 00000107 0012007B 00240114 27000001 00031200 24011427 00000100
614C206F 646E5502 00240114 27000000 01072400 6E4F2073 65767275 43030024
7B002401 14270000 01000324 006F646E 55010024 01142700 00000007 24007473
14270000 00010724 006E4F20 73657672 75430300 24011427 00000001 07001200
24006F64 6E550100 24011427 00000000 07240074 73614C20 6F646E55 02002401
20736576 72754303 00240114 27000000 01070012 007B0024 01142700 00010003
27000000 00072400 7473614C 206F646E 55020024 01142700 00000107 24006E4F
14270000 00010700 12007B00 24011427 00000100 0324006F 646E5501 00240114
4C206F64 6E550200 24011427 00000001 0724006E 4F207365 76727543 03002401
00240114 27000001 00032400 6F646E55 01002401 14270000 00000724 00747361
27000000 01072400 6E4F2073 65767275 43030024 01142700 00000107 0012007B
006F646E 55010024 01142700 00000007 24007473 614C206F 646E5502 00240114

76727543 0029302C 30312846 4C530101 07001200 7B002401 14270000 01000324
14270000 00010723 0066664F 20736576 72754303 00240114 27006666 4F5F7365
24006F64 6E550100 24011427 00000000 07240074 73614C20 6F646E55 02002401
53000007 0012007B 00240114 27000001 00030113 00CD0024 01142700 00010103
20736576 72754303 00240315 27006E4F 5F736576 72754300 29312C30 3128464C
14270000 01010923 00200100 24011427 00002933 3228464C 43010007 23006E4F
00010300 1000EB00 24011427 00000000 03020023 01142700 00010009 01002301
14270000 00010300 1000EA00 24011427 00000001 03001000 EB002401 14270000
7B002401 14270000 01000300 1000E800 24011427 00000000 03001000 E9002401
14270000 00010724 006E4F20 73657672 75430300 24011427 00000001 07001200
24006F64 6E550100 24011427 00000000 07240074 73614C20 6F646E55 02002401
65767275 43002931 2C303128 464C5301 01070012 007B0024 01142700 00010003
00314B43 41420001 01072300 6E4F2073 65767275 43030024 01142700 6E4F5F73
5F646172 475F7465 73655200 01000723 00747361 4C206F64 6E550200 24011427
00070013 00C80024 01142700 00010003 23006F64 6E550100 24011427 006C6C41
27000000 00070013 00C80024 01142700 00010003 23002001 00240114 27000000
00240114 27000001 00030113 00CB0024 01142700 00010103 23002001 00240114
24031527 0066664F 5F736576 72754300 29302C30 3128464C 53000007 0012007B
01002401 14270000 29333228 464C4301 00072300 66664F20 73657672 75430300
14270000 01000302 00240114 27000001 00090100 24011427 00000101 09230020
08002400 15270000 00010724 00200900 24001527 00000001 07001200 EB002401
07240020 06002400 15270000 00010723 00200700 24001527 00000001 07230020
00000001 07230020 04002400 15270000 00010724 00200500 24001527 00000001
24001527 00000000 07240020 02002400 15270000 00010723 00200300 24001527
01142700 00010103 001200EB 00240114 27000001 01030300 6B63616C 42200100
00E80024 01142700 00010003 001300E9 00240114 27000001 01030013 00EA0024
01072300 20080024 00152700 00000107 24002009 00240015 27000000 01070013
27000000 01072400 20060024 00152700 00000107 23002007 00240015 27000000
00240015 27000000 01072300 20040024 00152700 00000107 24002005 00240015
79432001 00240015 27000000 00072400 20020024 00152700 00000107 23002003
23002008 00240015 27000000 01072400 20090024 00152700 00000107 03006E61
00000107 24002006 00240015 27000000 01072300 20070024 00152700 00000107
00152700 00000107 23002004 00240015 27000000 01072400 20050024 00152700
20010024 00152700 00000007 24002002 00240015 27000000 01072300 20030024
24001527 00000001 07240020 09002400 15270000 00010703 0061746E 6567614D
00200600 24001527 00000001 07230020 07002400 15270000 00010723 00200800
00010723 00200400 24001527 00000001 07240020 05002400 15270000 00010724
15270000 00000724 00200200 24001527 00000001 07230020 03002400 15270000
00000001 07240020 09002400 15270000 00010703 00776F6C 6C655920 01002400
24001527 00000001 07230020 07002400 15270000 00010723 00200800 24001527
00200400 24001527 00000001 07240020 05002400 15270000 00010724 00200600
00000724 00200200 24001527 00000001 07230020 03002400 15270000 00010723
01070012 007B0024 01142700 00010003 03006B63 616C4220 01002400 15270000
55020024 01142700 00000107 24006E4F 20736576 72754303 00240114 27000000
4C430100 0724006F 646E5501 00240114 27000000 00072400 7473614C 206F646E
464C5301 01090100 24011427 00000101 09230020 01002401 14270000 29332846
01142700 00010109 06002401 14270000 01010902 00240114 27000029 312C3928
14270000 0101090F 00240114 27000001 01090E00 24011427 00000101 090C0024
27000001 01031200 24011427 00000100 09110024 01142700 00010109 10002401
00240114 27000000 01070012 007C0024 01142700 00010003 011300CB 00240114
6E452074 65440700 24011427 00000001 07240020 5243472F 5243556E 61635308
15270000 00010724 00726F6C 6F432020 06002401 14270000 00010724 00636E68
61635320 20040024 01142700 00000107 02006472 70655220 656E6F54 05002400
27000000 01070200 6C6F4320 2620656E 6F540300 24001527 00000001 0724006E
20746369 50010024 01142700 00000007 24006E6F 69746973 6F502002 00240114
01000323 00200100 24011427 00002932 2C392846 4C530100 07240070 75746553
14270000 01010323 00200100 24011427 00000000 07001300 C8002401 14270000
08002401 14270000 00010700 12007C00 24011427 00000100 03011300 CB002401
686E4520 74654407 00240114 27000000 01072400 20524347 2F524355 6E616353
00152700 00000107 2400726F 6C6F4320 20060024 01142700 00000107 2400636E
6E616353 20200400 24011427 00000001 07020064 72706552 20656E6F 54050024
14270000 00010702 006C6F43 20262065 6E6F5403 00240015 27000000 01072400
53207463 69500100 24011427 00000000 0724006E 6F697469 736F5020 02002401
00010003 23002001 00240114 27000029 322C3928 464C5301 00072400 70757465
01142700 00010103 23002001 00240114 27000000 00070013 00C80024 01142700
53080024 01142700 00000107 0012007C 00240114 27000001 00030113 00CB0024
6E686E45 20746544 07002401 14270000 00010724 00205243 472F5243 556E6163
24001527 00000001 07240072 6F6C6F43 20200600 24011427 00000001 07240063

006E6163 53202004 00240114 27000000 01070200 64727065 5220656E 6F540500
01142700 00000107 02006C6F 43202620 656E6F54 03002400 15270000 00010724
65532074 63695001 00240114 27000000 00072400 6E6F6974 69736F50 20020024
00000100 03230020 01002401 14270000 29322C39 28464C53 01000724 00707574
24011427 00000101 03230020 01002401 14270000 00000700 1300C800 24011427
63530800 24011427 00000001 07001200 7C002401 14270000 01000301 1300CB00
636E686E 45207465 44070024 01142700 00000107 24002052 43472F52 43556E61
00240015 27000000 01072400 726F6C6F 43202006 00240114 27000000 01072400
24006E61 63532020 04002401 14270000 00010702 00647270 65522065 6E6F5405
24011427 00000001 0702006C 6F432026 20656E6F 54030024 00152700 00000107
74655320 74636950 01002401 14270000 00000724 006E6F69 7469736F 50200200
27000001 00032300 20010024 01142700 0029322C 3928464C 53010007 24007075
00240114 27000001 01032300 20010024 01142700 00000007 001300C8 00240114
61635308 00240114 27000000 01070012 007C0024 01142700 00010003 011300CB
00636E68 6E452074 65440700 24011427 00000001 07240020 5243472F 5243556E
05002400 15270000 00010724 00726F6C 6F432020 06002401 14270000 00010724
0724006E 61635320 20040024 01142700 00000107 02006472 70655220 656E6F54
00240114 27000000 01070200 6C6F4320 2620656E 6F540300 24001527 00000001
75746553 20746369 50010024 01142700 00000007 24006E6F 69746973 6F502002
14270000 01000323 00200100 24011427 00002932 2C392846 4C530100 07240070
CB002401 14270000 01010323 00200100 24011427 00000000 07001300 C8002401
6E616353 08002401 14270000 00010700 12007C00 24011427 00000100 03011300
2400636E 686E4520 74654407 00240114 27000000 01072400 20524347 2F524355
54050024 00152700 00000107 2400726F 6C6F4320 20060024 01142700 00000107
01072400 6E616353 20200400 24011427 00000001 07020064 72706552 20656E6F
02002401 14270000 00010702 006C6F43 20262065 6E6F5403 00240015 27000000
70757465 53207463 69500100 24011427 00000000 0724006E 6F697469 736F5020
01142700 00010003 23002001 00240114 27000029 322C3928 464C5301 00072400
00CB0024 01142700 00010103 23002001 00240114 27000000 00070013 00C80024
556E6163 53080024 01142700 00000107 0012007C 00240114 27000001 00030113
07240063 6E686E45 20746544 07002401 14270000 00010724 00205243 472F5243
6F540500 24001527 00000001 07240072 6F6C6F43 20200600 24011427 00000001
00010724 006E6163 53202004 00240114 27000000 01070200 64727065 5220656E
20020024 01142700 00000107 02006C6F 43202620 656E6F54 03002400 15270000
00707574 65532074 63695001 00240114 27000000 00072400 6E6F6974 69736F50
24011427 00000100 03230020 01002401 14270000 29322C39 28464C53 01000724
1300CD00 24011427 00000101 03230020 01002401 14270000 00000700 1300C800
00240114 27000029 33322846 4C430100 07011300 CA002401 14270000 01000301
27000001 01030200 24011427 00000100 09010024 01142700 00010109 23002001
00240114 27000001 00030012 007C0024 01142700 00010103 011300D1 00240114
14270000 01010923 00200100 24011427 00002932 32284647 43010007 011300CA
27000001 00030300 24011427 00000100 09020024 01142700 00010109 01002401
00240114 27000001 00032300 20010024 01142700 00000007 001300C8 00240114
00000007 24005243 472F5243 556E6163 53080024 01142700 00000107 0012007C
001300C8 00240114 27000001 00032400 636E686E 45207465 44070024 01142700
24011427 00002933 2C353128 46475301 01072300 20010024 01142700 00000007
00726F6C 6F432020 06002401 14270000 00010723 00636E68 6E452074 65440700
31284647 53010107 02006472 70655220 656E6F54 05002400 15270000 00010724
54030024 00152700 00000107 23006E61 63532020 04002401 14270000 29342C35
70757465 53207463 69500100 24011427 00000000 0702006C 6F432026 20656E6F
3228464C 43010007 00002401 14270000 00000600 00240114 27000000 00062400
01142700 00010009 01002401 14270000 01010923 00200100 24011427 00002933
6E616353 08002401 14270000 00000700 12007C00 24011427 00000100 03020024
35312846 47530100 07001200 7C002401 14270000 01000324 00524347 2F524355
01142700 00000006 23005243 472F5243 556E6163 53080024 01142700 0029362C
03001200 7C002401 14270000 01010301 1300D100 24011427 00000101 03000024
20010024 01142700 00293232 28464743 01000701 1300CA00 24011427 00000100
01142700 00010009 02002401 14270000 01010901 00240114 27000001 01092300
03230020 01002401 14270000 00000700 1300C800 24011427 00000100 03030024
2F524355 6E616353 08002401 14270000 00010700 12007C00 24011427 00000100
00000100 03240063 6E686E45 20746544 07002401 14270000 00000724 00524347
35312846 47530101 07230020 01002401 14270000 00000700 1300C800 24011427
2C353128 46475301 01072300 636E686E 45207465 44070024 01142700 0029332C
6F540500 24001527 00000001 07230072 6F6C6F43 20200600 24011427 00002932
20200400 24011427 00002934 2C353128 46475301 01070200 64727065 5220656E
00000702 006C6F43 20262065 6E6F5403 00240015 27000000 01072300 6E616353
06000024 01142700 00000006 24007075 74655320 74636950 01002401 14270000
00293332 28464C43 01000700 00240114 27000000 00060000 24011427 00000000
02002401 14270000 01000901 00240114 27000001 01092300 20010024 01142700

5243556E 61635308 00240114 27000000 00070012 007C0024 01142700 00010003
29362C35 31284647 53010007 0012007C 00240114 27000001 00032400 5243472F
00002401 14270000 00000623 00524347 2F524355 6E616353 08002401 14270000
09230020 01002401 1427004E 4F495449 534F505F 4F544F47 5F4E4143 00010007
7C002401 14270000 01000302 00240114 27000001 00090100 24011427 00000101
14270000 01000324 006E6F69 7469736F 50200200 24011427 00000000 07001200
69736F50 20020024 01142700 0029312C 35312846 47530100 07001200 7C002401
03011300 CB002401 14270000 01010300 00240114 27000000 00062300 6E6F6974
2F524355 6E616353 08002401 14270000 00010700 12007C00 24011427 00000100
00000107 2400636E 686E4520 74654407 00240114 27000000 01072400 20524347
20656E6F 54050024 00152700 00000107 2400726F 6C6F4320 20060024 01142700
27000000 01072400 6E616353 20200400 24011427 00000001 07020064 72706552
736F5020 02002401 14270000 00010702 006C6F43 20262065 6E6F5403 00240015
00072400 70757465 53207463 69500100 24011427 00000000 0724006E 6F697469
00C80024 01142700 00010003 23002001 00240114 27000029 322C3928 464C5301
0044495F 4E414353 5F544547 00010007 23002001 00240114 27000000 00070013
09020024 01142700 00010109 01002401 14270000 01010923 00200100 24011427
00152700 00000007 0013007D 00240114 27000001 00030300 24011427 00000100
0013007D 00240114 27000001 00030300 7365646F 4D207265 6E6E6163 53010024
01000303 00207365 646F4D20 42207265 6E6E6163 53010024 00152700 00000007
20412072 656E6E61 63530100 24001527 00000000 07001300 7D002401 14270000
00010109 23002001 00230114 27000029 35312846 47430100 07030073 65646F4D
65727574 63695000 01010901 00240114 27006666 4F6F666E 49657275 74636950
66664F6F 666E4965 72757463 69500001 01090200 24011427 0066664F 6F666E49
04002401 14270066 664F6F66 6E496572 75746369 50000101 09030024 01142700
00240114 27000001 00030600 24011427 00000100 09050024 01142700 00010109
27000000 01032300 20010024 01142700 66664F5F 77617244 00010007 011300C8
00240114 27000001 00030113 00CD0024 01142700 00010103 00100079 00240114
00524355 00240114 27000000 002E2300 20010024 01142700 00010007 011300C8
01002301 14270000 01010923 00200100 24011427 00002933 3228464C 43010007
14270000 00010300 1000EB00 24011427 00000000 03020023 01142700 00010009
E9002401 14270000 00010300 1000EA00 24011427 00000001 03001000 EB002401
07001300 C8002401 14270000 01000300 1000E800 24011427 00000000 03001000
44000100 07011300 C8002401 14270000 01000323 00200100 24011427 00000000
03011300 CD002401 14270000 01010323 00200100 24011427 0066664F 5F776172
01002301 1427004E 4143535F 444E4500 00000701 1300CD00 24011427 00000100
01142700 00010109 23002001 00240114 27000029 33322846 4C430100 07230020
00000103 001000EB 00240114 27000000 00030200 23011427 00000100 09010023
01142700 00000103 001000EA 00240114 27000000 01030010 00EB0024 01142700
00C80024 01142700 00010003 001000E8 00240114 27000000 00030010 00E90024
01142700 00000103 23002001 00240114 27006666 4F5F7761 72440001 00070113
00CE0024 01142700 00010003 011300CD 00240114 27000001 01030010 00790024
01000723 00200100 24011427 00707261 68735F6F 745F656E 6F740000 00070113
01000901 00230114 27000001 01092300 20010024 01142700 00293332 28464C43
00240114 27000000 01030010 00EB0024 01142700 00000003 02002301 14270000
001000E9 00240114 27000000 01030010 00EA0024 01142700 00000103 001000EB
00010007 011300C8 00240114 27000001 00030010 00E80024 01142700 00000003
00100079 00240114 27000000 01032300 20010024 01142700 66664F5F 77617244
00000007 011300CE 00240114 27000001 00030113 00CD0024 01142700 00010103
33322846 4C430100 07230020 01002401 14270072 6F6C6F63 5F6F745F 656E6F74
23011427 00000100 09010023 01142700 00010109 23002001 00240114 27000029
01030010 00EB0024 01142700 00000103 001000EB 00240114 27000000 00030200
27000000 00030010 00E90024 01142700 00000103 001000EA 00240114 27000000
4F5F7761 72440001 00070113 00C80024 01142700 00010003 001000E8 00240114
27000001 01030010 00790024 01142700 00000103 23002001 00240114 27006666
745F656E 6F740000 00070113 00CE0024 01142700 00010003 011300CD 00240114
00002933 3228464C 43010007 23002001 00240114 27006E6F 69746973 6F705F6F
03020023 01142700 00010009 01002301 14270000 01010923 00200100 24011427
00000001 03001000 EB002401 14270000 00010300 1000EB00 24011427 00000000
24011427 00000000 03001000 E9002401 14270000 00010300 1000EA00 24011427
4E4F5400 24011427 00000000 2E230020 01002401 14270000 01000700 1000E800
00000000 00002401 14270000 00000601 00240114 27000000 0006004C 49545545
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000

NEWCAST.HEX

```
23002001 00230114 27000001 00070113 00C80024 01142700 00010003 00003214
09000023 01142700 0029322C 3328464C 53010109 00070024 01142700 00010005
494F505F 444C4F00 01010902 00240114 27000001 01090100 24011427 00000101
6B72616D 20724F20 6E6F6974 706F2074 73616320 6B636950 20240114 2700544E
04002401 14270000 01010903 00746E69 6F702065 636E7265 66657220 77656E20
72614D20 24011427 00000101 09050024 01142700 67727641 74696E49 00010109
63657272 6F632074 73616320 726F6620 746E696F 70206563 6E726566 6572206B
27000000 00060700 24011427 00747361 435F7469 6E490001 00090600 6E6F6974
00030013 00510024 01142700 00010103 01002401 14270000 00000601 00240114
72726F43 20747361 430D0024 00152700 00000107 00130079 00240114 27000001
0723006C 65636E61 430C0024 01142700 74736143 5F74726F 62410001 01070300
00000001 07240020 0A002401 14270000 00010724 00200B00 24011427 00000001
24011427 00000001 07240020 08002401 14270000 00010724 00200900 24011427
00200500 24011427 00000001 07240020 06002401 14270000 00010724 00200700
00010724 00200300 24011427 00000001 07240020 04002401 14270000 00010724
14270000 00000624 00200100 24011427 00000000 07240020 02002401 14270000
01000301 00240114 27000000 00062300 20010024 01142700 00010007 05002401
09230020 01002401 14270063 69507465 47000100 07011300 CA002401 14270000
01002401 14270000 00000602 00240114 27000001 00090100 24011427 00000101
00000006 23002001 00240114 27000001 00070013 00510024 01142700 00010003
CD002401 14270000 01010300 13005100 24011427 00000101 03000024 01142700
03001300 79002401 14270000 01010300 13006200 24011427 00000101 03011300
20010024 01142700 00293631 28464C43 01000701 1300CB00 24011427 00000100
01142700 00010003 02002401 14270000 01000901 00240114 27000001 01092300
6F6C6F63 20657355 24011427 00327261 425F6E65 704F0001 01070012 00790024
756E614D 05006E6F 69746365 72726F63 20656E69 66656420 6F742072 61622072
20657355 24011427 00317261 425F6E65 704F0001 01072300 6B726144 207E6C61
04006E6F 69746365 72726F63 20656E69 66656420 6F742072 61622072 6F6C6F63
27006C61 72747565 4E6B7261 44000101 07230074 68676972 427E6C61 756E614D
7475654E 74686769 72420001 00072300 6B726144 207E6F74 75412002 00240114
01142700 00010003 23007468 67697242 7E6F7475 41200100 24011427 006C6172
09230020 01002401 1427006C 61727475 654E6F74 75410001 00070113 00CC0024
6572726F 63206D72 69666E6F 43240114 27000001 00090100 24011427 00000101
01000300 00240114 27000000 00060100 24011427 00000000 0602006E 6F697463
00240114 27006C61 72747565 4E6F7475 41000100 07011300 CC002401 14270000
206D7269 666E6F43 24011427 00000100 09010024 01142700 00010109 23002001
24011427 00000000 06010024 01142700 00000006 02006E6F 69746365 72726F63
01142700 00010003 02002401 14270000 00000602 00240114 27000000 00060000
27000001 01092300 20010024 01142700 00293328 464C4301 00070113 00C90024
00000100 09110024 01142700 00010109 10002401 14270000 0101090F 00240114
7261425F 6E65704F 00010007 00120079 00240114 27000001 00031200 24011427
6F632065 6E696665 64206F74 20726162 20726F6C 6F632065 73552401 14270032
01142700 00000006 23006B72 6144207E 6C61756E 614D0500 6E6F6974 63657272
6C617274 75654E6B 72614400 01000700 12007900 24011427 00000100 03020024
00CC0024 01142700 00010003 23006B72 6144207E 6F747541 20020024 01142700
00000101 09230020 01002401 1427006C 61727475 654E6F74 75410001 00070113
6F697463 6572726F 63206D72 69666E6F 43240114 27000001 00090100 24011427
14270000 01000300 00240114 27000000 00060100 24011427 00000000 0602006E
6C6F6320 65735524 01142700 31726142 5F6E6570 4F000100 07001200 79002401
6E614D04 006E6F69 74636572 726F6320 656E6966 6564206F 74207261 6220726F
24011427 00000100 03020024 01142700 00000006 23007468 67697242 7E6C6175
75412001 00240114 27006C61 72747565 4E746867 69724200 01000700 12007900
74754100 01000701 1300CC00 24011427 00000100 03230074 68676972 427E6F74
01000901 00240114 27000001 01092300 20010024 01142700 6C617274 75654E6F
27000000 00060200 6E6F6974 63657272 6F63206D 7269666E 6F432401 14270000
20747361 430D0024 00152700 00000107 00002401 14270000 00000601 00240114
00747361 435F7472 6F624100 01010703 00616572 41202020 20202020 72726F43
00000107 2400200B 00240114 27000000 01072300 6C65636E 61430C00 24011427
01142700 00000107 24002008 00240114 27000000 01072400 200A0024 01142700
0724006B 72614420 7E6C6175 6E614D05 00240114 27000000 01072400 20070024
14270000 00010724 00746867 6972427E 6C61756E 614D0400 24011427 00000001
74754120 01002401 14270000 00000724 006B7261 44207E6F 74754120 02002401
6F6C6F43 6D754400 00000703 00240114 27000000 00062400 74686769 72427E6F
76416B63 65684300 01000723 00200100 24001527 00796669 646F4D31 72614272
01090300 24011427 00000101 09230020 01002401 14270065 7A695374 614D6772
00790024 01142700 00010003 09002401 14270000 01000905 00240114 27000001
01010702 00392078 20392009 00240114 27003374 614D6772 76410001 01070012
```

67727641 00010007 23003520 78203520 06002401 14270032 74614D67 72764100
00060000 24011427 00000000 06230033 20782033 20030024 01142700 3174614D
00790024 01142700 00010003 00002401 14270000 00000600 00240114 27000000
01010723 00392078 20392009 00240114 27003374 614D6772 76410001 01070012
67727641 00010007 02003520 78203520 06002401 14270032 74614D67 72764100
00060000 24011427 00000000 06230033 20782033 20030024 01142700 3174614D
00790024 01142700 00010003 00002401 14270000 00000600 00240114 27000000
01010723 00392078 20392009 00240114 27003374 614D6772 76410001 01070012
67727641 00010007 23003520 78203520 06002401 14270032 74614D67 72764100
00060000 24011427 00000000 06020033 20782033 20030024 01142700 3174614D
20010024 01142700 00010007 00002401 14270000 00000600 00240114 27000000
00000100 03001300 7A002401 14270000 010103FF 00240114 27000000 00062300
72726F63 206D7269 666E6F43 0D002400 15270000 00010700 13007900 24011427
0065676E 6168435F 74736143 5F6C6563 6E614300 01010703 00206E6F 69746365
00010107 2400200B 00240114 27000000 01072300 6C65636E 61430C00 24011427
65726F66 65420A00 24011427 0065726F 6665425F 79616C70 7369445F 74736143
6C706D61 53080024 01142700 00000107 24002009 00240114 27000000 01072300
01142700 6E4F746E 696F506C 61636F4C 0029322C 30372846 4C530101 07240065
01072400 20060024 01142700 00000107 2300746E 696F507E 6C61636F 4C070024
27000000 01072400 20040024 01142700 00000107 24002005 00240114 27000000
00240114 27000000 00072400 20020024 01142700 00000107 24002003 00240114
00120079 00240114 27000001 00030113 00C80024 01142700 00010103 24002001
20240215 27006666 4F746E69 6F506C61 636F4C00 29312C30 3728464C 53000007
01000523 00200100 24011427 00000100 07020074 6E696F50 7E6C6163 6F4C0700
09010024 01142700 00010109 00002401 14270000 01010900 03002401 14270000
00010009 02002074 6E696F70 20656C70 6D617320 6B72614D 24011427 00000101
00240114 27000001 00070012 00790024 01142700 00010003 03002024 01142700
03010024 01142700 00000006 01002401 14270000 00000623 00656C70 6D615308
00000100 07001200 79002401 14270000 01000300 13005100 24011427 00000101
6D615300 010007FE 00240114 27000000 00060200 656C706D 61530800 24011427
01000300 00240114 27000000 00062300 20010024 01142700 746E696F 50656C70
14270000 00010323 00200100 24011427 00000000 07001300 C8002401 14270000
0D002400 15270000 00010700 12007900 24011427 00000100 03001000 7A002401
74736143 5F6C6563 6E614300 01010703 00207473 61432063 6974616D 6F747541
00240114 27000000 01072300 6C65636E 61430C00 24011427 0065676E 6168435F
00240215 27007265 7466415F 79616C70 7369445F 74736143 00000107 2400200B
01072400 20090024 01142700 00000107 23006E65 65726353 7E657461 6470550A
27000000 01072400 20070024 01142700 00000107 24002008 00240114 27000000
01142700 00000107 24002020 05002401 14270000 00010724 00202006 00240114
00240114 27000000 01072400 20200300 24011427 00000001 07240020 20040024
1300C800 24011427 00000101 03240020 01002401 14270000 00000724 00202002
00240114 27000029 30372846 4C430100 07011300 CF002401 14270000 01000301
66664F74 6E696F50 6C61636F 4C000100 09010024 01142700 00010109 23002001
01002401 14270000 00000700 1300C800 24011427 00000100 03020024 01142700
07230020 01002401 14270000 00000700 1300C800 24011427 00000100 03230020
01142700 00010103 FF002401 14270000 00000623 00200100 24011427 00000100
00002930 3728464C 43010007 011300CF 00240114 27000001 00030113 00C80024
696F506C 61636F4C 00010009 01002401 14270000 01010923 00200100 24011427
27000000 00070013 00C80024 01142700 00010003 02002401 14270066 664F746E
00240114 27000000 00070013 00C80024 01142700 00010003 23002001 00240114
010007FF 00240114 27000000 00062300 20010024 01142700 00010007 23002001
14270000 01010323 00657461 64705520 01002301 14270074 7361435F 72655400
00293037 28464C43 01000701 1300CF00 24011427 00000100 03011300 C8002401
6F506C61 636F4C00 01000901 00240114 27000001 01092300 20010024 01142700
00000000 07001300 C8002401 14270000 01000302 00240114 27006666 4F746E69
24011427 00000000 07001300 C8002401 14270000 01000323 00200100 24011427
01030200 24011427 00000000 06230020 01002401 14270000 01000723 00200100
27000000 01070013 00790024 01142700 00010003 00130062 00240114 27000001
61435F6C 65636E61 43000101 07030020 74736143 206C6175 6E614D0D 00240015
01142700 00000107 23006C65 636E6143 0C002401 14270065 676E6168 435F7473
23006E65 65726353 7E657461 6470550A 00240114 27000001 01072400 200B0024
00000107 24002008 00240114 27000000 01072400 20090024 01142700 00000107
01142700 00000107 24002006 00240114 27000000 01072400 20070024 01142700
20030024 01142700 00000107 24002004 00240114 27000000 01072400 20050024
00032400 20010024 01142700 00000007 24002002 00240114 27000000 01072400
7466415F 79616C70 7369445F 74736143 00010007 011300CC 00240114 27000001
24011427 00000100 09010024 01142700 00010109 23002001 00240114 27007265
007A0024 01142700 00010103 02006E6F 69746365 72726F63 206D7269 666E6F43

```
01070013 00790024 01142700 00010003 00130062 00240114 27000001 01030013
01070300 206E6F69 74636572 726F6320 6D726966 6E6F430D 00240015 27000000
65636E61 430C0024 01142700 65676E61 68435F74 7361435F 6C65636E 61430001
616C7073 69445F74 73614300 00010724 00200B00 24011427 00000001 0723006C
6564206F 74207261 6220726F 6C6F6320 65735524 05152700 65726F66 65425F79
14270000 00010723 0065726F 6665420A 006E6F69 74636572 726F6320 656E6966
464C5301 01072400 656C706D 61530800 24011427 00000001 07240020 09002401
7E6C6163 6F4C0700 24011427 006E4F74 6E696F50 6C61636F 4C002932 2C303728
05002401 14270000 00010724 00200600 24011427 00000001 07230074 6E696F50
07240020 03002401 14270000 00010724 00200400 24011427 00000001 07240020
00000101 03240020 01002401 14270000 00000724 00200200 24011427 00000001
30372846 4C530000 07001200 79002401 14270000 01000301 1300C800 24011427
507E6C61 636F4C07 00202402 15270066 664F746E 696F506C 61636F4C 0029312C
00030024 01142700 00010005 23002001 00240114 27000001 00070200 746E696F
4D240114 27000001 01090100 24011427 00000101 09000024 01142700 00010109
03030020 24011427 00000100 09020020 746E696F 7020656C 706D6173 206B7261
2300656C 706D6153 08002401 14270000 01000700 12007900 24011427 00000100
00240114 27000001 01030100 24011427 00000000 06010024 01142700 00000006
6D615308 00240114 27000001 00070012 00790024 01142700 00010003 00130051
00746E69 6F50656C 706D6153 00010007 FE002401 14270000 00000602 00656C70
00C80024 01142700 00010003 00002401 14270000 00000623 00200100 24011427
00030113 00C80024 01142700 00010103 23002001 00240114 27000000 00070013
00200100 24011427 00002930 3728464C 43010007 011300CF 00240114 27000001
14270066 664F746E 696F506C 61636F4C 00010009 01002401 14270000 01010923
23002001 00240114 27000000 00070013 00C80024 01142700 00010003 02002401
00010007 23002001 00240114 27000000 00070013 00C80024 01142700 00010003
6F6C6F43 6D754400 000007FE 00240114 27000000 00062300 20010024 01142700
7361435F 72655400 01000723 00200100 24001527 00796669 646F4D31 72614272
03011300 C8002401 14270000 01010323 00657461 64705520 01002301 14270074
20010024 01142700 00293037 28464C43 01000701 1300CF00 24011427 00000100
27006666 4F746E69 6F506C61 636F4C00 01000901 00240114 27000001 01092300
00200100 24011427 00000000 07001300 C8002401 14270000 01000302 00240114
01000723 00200100 24011427 00000000 07001300 C8002401 14270000 01000323
00240114 27000000 00060100 24011427 00000000 06230020 01002401 14270000
01000701 1300CF00 24011427 00000100 03011300 C8002401 14270000 01010300
01000901 00240114 27000001 01092300 20010024 01142700 00293037 28464C43
C8002401 14270000 01000302 00240114 27006666 4F746E69 6F506C61 636F4C00
07001300 C8002401 14270000 01000323 00200100 24011427 00000000 07001300
00000000 06230020 01002401 14270000 01000723 00200100 24011427 00000000
01002400 15270079 6669646F 4D317261 42726F6C 6F430000 0007FE00 24011427
27000029 312C3034 28464C53 01000701 1300CA00 24011427 00000100 03230020
00000000 00000000 00000000 00000024 01142700 00000006 23002001 00240114
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
```

SHOW.HEX
---------

```
20202057 4F485359 20202020 20202020 20202020 20200000 007E000E 000E000E
00000000 00000000 00000000 00000000 00000000 00000000 00000000 00000000
20202020 20315F46 00000000 00000000 50500109 00040000 08400020 01090000
20202020 20325F46 00000000 00000000 50500109 00000000 08400020 01090100
20202020 20335F46 00000000 00000000 50500109 00000000 08400020 01090200
20202020 20345F46 00000000 00000000 50500109 00000000 08400020 01090300
20202020 20355F46 00000000 00000000 50500109 00000000 08400020 01090400
20202020 20365F46 00000000 00000000 50500109 00000000 08400020 01090500
20202020 20375F46 00000000 00000000 50500109 00000000 08400020 01090600
```

20202020 20385F46 00000000 00000000 50500109 00000000 08400020 01090700
20202020 20395F46 00000000 00000000 50500109 00000000 08400020 01090800
20202020 30315F46 00000000 00000000 50500109 00000000 08400020 01090900
20202020 31315F46 00000000 00000000 50500109 00000000 08400020 01090A00
20202020 32315F46 00000000 00000000 50500109 00000000 08400020 01090B00
20202020 33315F46 00000000 00000000 50500109 00000000 08400020 01090C00
20202020 34315F46 00000000 00000000 50500109 00000000 08400020 01090D00

OPTDEL.HEX 1427006B 636F6C42 50570001 00070113 00CF0024 01142700 00010003 00004B13
01010302 00240114 27000001 00090100 24011427 00000101 09230020 01002401
42504400 01000701 1300CF00 24011427 00000100 03001200 AF002401 14270000
14270000 01000901 00240114 27000001 01092300 20010024 01142700 6B636F6C
011300CF 00240114 27000001 00030012 00AF0024 01142700 00010103 02002401
24011427 00000101 09230020 01002401 1427006B 636F6C42 64617247 00010007
00000100 03001200 AF002401 14270000 01010302 00240114 27000001 00090100
09230020 01002401 1427006B 636F6C42 74724200 01000701 1300CF00 24011427
AF002401 14270000 01010302 00240114 27000001 00090100 24011427 00000101
27006B63 6F6C4274 73614300 01000701 1300CF00 24011427 00000100 03001200
01030200 24011427 00000100 09010024 01142700 00010109 23002001 00240114
464C4301 00070113 00CF0024 01142700 00010003 001200AF 00240114 27000001
27000001 00090100 24011427 00000101 09230020 01002401 14270000 29333228
1200AF00 24011427 00000100 03001300 CF002401 14270000 01010302 00240114
24011427 00000000 07240072 726F4320 74736143 0B002401 14270000 00000700
00200100 24011427 00000000 07001300 CF002401 14270000 01000323 00200100
24011427 00000100 03240072 726F4320 74736143 0B002401 14270000 00000723
27000001 01092300 20010024 01142700 00293332 28464C43 01000701 1300CF00
00030013 00CF0024 01142700 00010103 02002401 14270000 01000901 00240114
72726F43 20747361 430B0024 01142700 00000007 001200AF 00240114 27000001
00070013 00CF0024 01142700 00010003 23002001 00240114 27000000 00072400
73656E74 68676972 420E0024 01142700 00000007 23002001 00240114 27000000
27006B63 6F6C4274 73614300 01000701 1300CF00 24011427 00000100 03240073
01030200 24011427 00000100 09010024 01142700 00010109 23002001 00240114
464C4301 00070113 00CF0024 01142700 00010003 001200AF 00240114 27000001
27000001 00090100 24011427 00000101 09230020 01002401 14270000 29333228
1200AF00 24011427 00000100 03001300 CF002401 14270000 01010302 00240114
24011427 00000000 07240072 726F4320 74736143 0B002401 14270000 00000700
00200100 24011427 00000000 07001300 CF002401 14270000 01000323 00200100
24011427 00000100 03240072 726F4320 74736143 0B002401 14270000 00000723
27000001 01092300 20010024 01142700 00293332 28464C43 01000701 1300CF00
00030013 00CF0024 01142700 00010103 02002401 14270000 01000901 00240114
72726F43 20747361 430B0024 01142700 00000007 001200AF 00240114 27000001
00070013 00CF0024 01142700 00010003 23002001 00240114 27000000 00072400
6E6F6974 61646172 470C0024 01142700 00000007 23002001 00240114 27000000
01142700 6B636F6C 42747242 00010007 011300CF 00240114 27000001 00032400
00010103 02002401 14270000 01000901 00240114 27000001 01092300 20010024
74736143 00010007 011300CF 00240114 27000001 00030012 00AF0024 01142700
27000001 00090100 24011427 00000101 09230020 01002401 1427006B 636F6C42
1300CF00 24011427 00000100 03001200 AF002401 14270000 01010302 00240114
00240114 27000001 01092300 20010024 01142700 00293332 28464C43 01000701
27000001 00030013 00CF0024 01142700 00010103 02002401 14270000 01000901
00072400 72726F43 20747361 430B0024 01142700 00000007 001200AF 00240114
27000000 00070013 00CF0024 01142700 00010003 23002001 00240114 27000000
00032400 72726F43 20747361 430B0024 01142700 00000007 23002001 00240114
00200100 24011427 00002933 3228464C 43010007 011300CF 00240114 27000001
24011427 00000101 03020024 01142700 00010009 01002401 14270000 01010923
61430B00 24011427 00000000 07001200 AF002401 14270000 01000300 1300CF00
24011427 00000100 03230020 01002401 14270000 00000724 0072726F 43207473
72420E00 24011427 00000000 07230020 01002401 14270000 00000700 1300CF00
74736143 00010007 011300CF 00240114 27000001 00032400 7373656E 74686769
27000001 00090100 24011427 00000101 09230020 01002401 1427006B 636F6C42
1300CF00 24011427 00000100 03001200 AF002401 14270000 01010302 00240114
00240114 27000001 01092300 20010024 01142700 00293332 28464C43 01000701
27000001 00030013 00CF0024 01142700 00010103 02002401 14270000 01000901
00072400 72726F43 20747361 430B0024 01142700 00000007 001200AF 00240114
27000000 00070013 00CF0024 01142700 00010003 23002001 00240114 27000000
00032400 72726F43 20747361 430B0024 01142700 00000007 23002001 00240114
00200100 24011427 00002933 3228464C 43010007 011300CF 00240114 27000001
24011427 00000101 03020024 01142700 00010009 01002401 14270000 01010923
61430B00 24011427 00000000 07001200 AF002401 14270000 01000300 1300CF00
24011427 00000100 03230020 01002401 14270000 00000724 0072726F 43207473

61440600 24011427 00000000 07230020 01002401 14270000 00000700 1300CF00
6F6C4264 61724700 01000701 1300CF00 24011427 00000100 03240074 50206B72
24011427 00000100 09010024 01142700 00010109 23002001 00240114 27006B63
00070113 00CF0024 01142700 00010003 001200AF 00240114 27000001 01030200
09010024 01142700 00010109 23002001 00240114 27006B63 6F6C4274 72420001
01142700 00010003 001200AF 00240114 27000001 01030200 24011427 00000100
01010923 00200100 24011427 006B636F 6C427473 61430001 00070113 00CF0024
1200AF00 24011427 00000101 03020024 01142700 00010009 01002401 14270000
00240114 27000029 33322846 4C430100 07011300 CF002401 14270000 01000300
27000001 01030200 24011427 00000100 09010024 01142700 00010109 23002001
00240114 27000000 00070012 00AF0024 01142700 00010003 001300CF 00240114
27000001 00032300 20010024 01142700 00000007 24007272 6F432074 7361430B
00240114 27000000 00072300 20010024 01142700 00000007 001300CF 00240114
464C4301 00070113 00CF0024 01142700 00010003 24007272 6F432074 7361430B
27000001 00090100 24011427 00000101 09230020 01002401 14270000 29333228
1200AF00 24011427 00000100 03001300 CF002401 14270000 01010302 00240114
24011427 00000000 07240072 726F4320 74736143 0B002401 14270000 00000700
00200100 24011427 00000000 07001300 CF002401 14270000 01000323 00200100
01142700 00010003 24007373 656E7468 67697242 0E002401 14270000 00000723
01010923 00200100 24011427 006B636F 6C427473 61430001 00070113 00CF0024
1200AF00 24011427 00000101 03020024 01142700 00010009 01002401 14270000
00240114 27000029 33322846 4C430100 07011300 CF002401 14270000 01000300
27000001 01030200 24011427 00000100 09010024 01142700 00010109 23002001
00240114 27000000 00070012 00AF0024 01142700 00010003 001300CF 00240114
27000001 00032300 20010024 01142700 00000007 24007272 6F432074 7361430B
00240114 27000000 00072300 20010024 01142700 00000007 001300CF 00240114
464C4301 00070113 00CF0024 01142700 00010003 24007272 6F432074 7361430B
27000001 00090100 24011427 00000101 09230020 01002401 14270000 29333228
1200AF00 24011427 00000100 03001300 CF002401 14270000 01010302 00240114
24011427 00000000 07240072 726F4320 74736143 0B002401 14270000 00000700
00200100 24011427 00000000 07001300 CF002401 14270000 01000323 00200100
24011427 00000100 0324006E 6F697461 64617247 0C002401 14270000 00000723
00000101 09230020 01002401 1427006B 636F6C42 74724200 01000701 1300CF00
03001200 AF002401 14270000 01010302 00240114 27000001 00090100 24011427
00240114 27006B63 6F6C4274 73614300 01000701 1300CF00 24011427 00000100
27000001 01030200 24011427 00000100 09010024 01142700 00010109 23002001
29333228 464C4301 00070113 00CF0024 01142700 00010003 001200AF 00240114
00240114 27000001 00090100 24011427 00000101 09230020 01002401 14270000
00000700 1200AF00 24011427 00000100 03001300 CF002401 14270000 01010302
00200100 24011427 00000000 07240072 726F4320 74736143 0B002401 14270000
00000723 00200100 24011427 00000000 07001300 CF002401 14270000 01000323
1300CF00 24011427 00000100 03240072 726F4320 74736143 0B002401 14270000
00240114 27000001 01092300 20010024 01142700 00293332 28464C43 01000701
27000001 00030013 00CF0024 01142700 00010103 02002401 14270000 01000901
00072400 72726F43 20747361 430B0024 01142700 00000007 001200AF 00240114
27000000 00070013 00CF0024 01142700 00010003 23002001 00240114 27000000
03240073 73656E74 68676972 420E0024 01142700 00000007 23002001 00240114
00240114 27006B63 6F6C4274 73614300 01000701 1300CF00 24011427 00000100
27000001 01030200 24011427 00000100 09010024 01142700 00010109 23002001
29333228 464C4301 00070113 00CF0024 01142700 00010003 001200AF 00240114
00240114 27000001 00090100 24011427 00000101 09230020 01002401 14270000
00000700 1200AF00 24011427 00000100 03001300 CF002401 14270000 01010302
00200100 24011427 00000000 07240072 726F4320 74736143 0B002401 14270000
00000723 00200100 24011427 00000000 07001300 CF002401 14270000 01000323
1300CF00 24011427 00000100 03240072 726F4320 74736143 0B002401 14270000
00240114 27000001 01092300 20010024 01142700 00293332 28464C43 01000701
27000001 00030013 00CF0024 01142700 00010103 02002401 14270000 01000901
00072400 72726F43 20747361 430B0024 01142700 00000007 001200AF 00240114
27000000 00070013 00CF0024 01142700 00010003 23002001 00240114 27000000
01000324 00745020 65746968 57010024 01142700 00000007 23002001 00240114
23002001 00240114 27006B63 6F6C4250 44000100 07011300 CF002401 14270000
00240114 27000001 01030200 24011427 00000100 09010024 01142700 00010109
006B636F 6C426461 72470001 00070113 00CF0024 01142700 00010003 001200AF
03020024 01142700 00010009 01002401 14270000 01010923 00200100 24011427
42000100 07011300 CF002401 14270000 01000300 1200AF00 24011427 00000101
00010009 01002401 14270000 01010923 00200100 24011427 006B636F 6C427472
CF002401 14270000 01000300 1200AF00 24011427 00000101 03020024 01142700
27000001 01092300 20010024 01142700 6B636F6C 42747361 43000100 07011300
00030012 00AF0024 01142700 00010103 02002401 14270000 01000901 00240114

| | | | | | | | |
|---|---|---|---|---|---|---|---|
| 00200100 | 24011427 | 00002933 | 3228464C | 43010007 | 011300CF | 00240114 | 27000001 |
| 24011427 | 00000101 | 03020024 | 01142700 | 00010009 | 01002401 | 14270000 | 01010923 |
| 61430B00 | 24011427 | 00000000 | 07001200 | AF002401 | 14270000 | 01000300 | 1300CF00 |
| 24011427 | 00000100 | 03230020 | 01002401 | 14270000 | 00000724 | 0072726F | 43207473 |
| 61430B00 | 24011427 | 00000000 | 07230020 | 01002401 | 14270000 | 00000700 | 1300CF00 |
| 33322846 | 4C430100 | 07011300 | CF002401 | 14270000 | 01000324 | 0072726F | 43207473 |
| 24011427 | 00000100 | 09010024 | 01142700 | 00010109 | 23002001 | 00240114 | 27000029 |
| 00070012 | 00AF0024 | 01142700 | 00010003 | 001300CF | 00240114 | 27000001 | 01030200 |
| 20010024 | 01142700 | 00000007 | 24007272 | 6F432074 | 7361430B | 00240114 | 27000000 |
| 00072300 | 20010024 | 01142700 | 00000007 | 001300CF | 00240114 | 27000001 | 00032300 |
| CF002401 | 14270000 | 01000324 | 00737365 | 6E746867 | 6972420E | 00240114 | 27000000 |
| 27000001 | 01092300 | 20010024 | 01142700 | 6B636F6C | 42747361 | 43000100 | 07011300 |
| 00030012 | 00AF0024 | 01142700 | 00010103 | 02002401 | 14270000 | 01000901 | 00240114 |
| 00200100 | 24011427 | 00002933 | 3228464C | 43010007 | 011300CF | 00240114 | 27000001 |
| 24011427 | 00000101 | 03020024 | 01142700 | 00010009 | 01002401 | 14270000 | 01010923 |
| 61430B00 | 24011427 | 00000000 | 07001200 | AF002401 | 14270000 | 01000300 | 1300CF00 |
| 24011427 | 00000100 | 03230020 | 01002401 | 14270000 | 00000724 | 0072726F | 43207473 |
| 61430B00 | 24011427 | 00000000 | 07230020 | 01002401 | 14270000 | 00000700 | 1300CF00 |
| 33322846 | 4C430100 | 07011300 | CF002401 | 14270000 | 01000324 | 0072726F | 43207473 |
| 24011427 | 00000100 | 09010024 | 01142700 | 00010109 | 23002001 | 00240114 | 27000029 |
| 00070012 | 00AF0024 | 01142700 | 00010003 | 001300CF | 00240114 | 27000001 | 01030200 |
| 20010024 | 01142700 | 00000007 | 24007272 | 6F432074 | 7361430B | 00240114 | 27000000 |
| 00072300 | 20010024 | 01142700 | 00000007 | 001300CF | 00240114 | 27000001 | 00032300 |
| 00CF0024 | 01142700 | 00010003 | 24006E6F | 69746164 | 6172470C | 00240114 | 27000000 |
| 01142700 | 00010109 | 23002001 | 00240114 | 27006B63 | 6F6C4274 | 72420001 | 00070113 |
| 00010003 | 001200AF | 00240114 | 27000001 | 01030200 | 24011427 | 00000100 | 09010024 |
| 00200100 | 24011427 | 006B636F | 6C427473 | 61430001 | 00070113 | 00CF0024 | 01142700 |
| 24011427 | 00000101 | 03020024 | 01142700 | 00010009 | 01002401 | 14270000 | 01010923 |
| 27000029 | 33322846 | 4C430100 | 07011300 | CF002401 | 14270000 | 01000300 | 1200AF00 |
| 01030200 | 24011427 | 00000100 | 09010024 | 01142700 | 00010109 | 23002001 | 00240114 |
| 27000000 | 00070012 | 00AF0024 | 01142700 | 00010003 | 001300CF | 00240114 | 27000001 |
| 00032300 | 20010024 | 01142700 | 00000007 | 24007272 | 6F432074 | 7361430B | 00240114 |
| 27000000 | 00072300 | 20010024 | 01142700 | 00000007 | 001300CF | 00240114 | 27000001 |
| 00070113 | 00CF0024 | 01142700 | 00010003 | 24007272 | 6F432074 | 7361430B | 00240114 |
| 00090100 | 24011427 | 00000101 | 09230020 | 01002401 | 14270000 | 29333228 | 464C4301 |
| 24011427 | 00000100 | 03001300 | CF002401 | 14270000 | 01010302 | 00240114 | 27000001 |
| 00000000 | 07240072 | 726F4320 | 74736143 | 0B002401 | 14270000 | 00000700 | 1200AF00 |
| 24011427 | 00000000 | 07001300 | CF002401 | 14270000 | 01000323 | 00200100 | 24011427 |
| 00010003 | 24007373 | 656E7468 | 67697242 | 0E002401 | 14270000 | 00000723 | 00200100 |
| 00200100 | 24011427 | 006B636F | 6C427473 | 61430001 | 00070113 | 00CF0024 | 01142700 |
| 24011427 | 00000101 | 03020024 | 01142700 | 00010009 | 01002401 | 14270000 | 01010923 |
| 27000029 | 33322846 | 4C430100 | 07011300 | CF002401 | 14270000 | 01000300 | 1200AF00 |
| 01030200 | 24011427 | 00000100 | 09010024 | 01142700 | 00010109 | 23002001 | 00240114 |
| 27000000 | 00070012 | 00AF0024 | 01142700 | 00010003 | 001300CF | 00240114 | 27000001 |
| 00032300 | 20010024 | 01142700 | 00000007 | 24007272 | 6F432074 | 7361430B | 00240114 |
| 27000000 | 00072300 | 20010024 | 01142700 | 00000007 | 001300CF | 00240114 | 27000001 |
| 00070113 | 00CF0024 | 01142700 | 00010003 | 24007272 | 6F432074 | 7361430B | 00240114 |
| 00090100 | 24011427 | 00000101 | 09230020 | 01002401 | 14270000 | 29333228 | 464C4301 |
| 24011427 | 00000100 | 03001300 | CF002401 | 14270000 | 01010302 | 00240114 | 27000001 |
| 00000000 | 07240072 | 726F4320 | 74736143 | 0B002401 | 14270000 | 00000700 | 1200AF00 |
| 24011427 | 00000000 | 07001300 | CF002401 | 14270000 | 01000323 | 00200100 | 24011427 |
| 14270000 | 01000324 | 00745020 | 6B726144 | 06002401 | 14270000 | 00000723 | 00200100 |
| 01092300 | 20010024 | 01142700 | 6B636F6C | 42646172 | 47000100 | 07011300 | CF002401 |
| 00AF0024 | 01142700 | 00010103 | 02002401 | 14270000 | 01000901 | 00240114 | 27000001 |
| 01142700 | 6B636F6C | 42747242 | 00010007 | 011300CF | 00240114 | 27000001 | 00030012 |
| 00010103 | 02002401 | 14270000 | 01000901 | 00240114 | 27000001 | 01092300 | 20010024 |
| 74736143 | 00010007 | 011300CF | 00240114 | 27000001 | 00030012 | 00AF0024 | 01142700 |
| 27000001 | 00090100 | 24011427 | 00000101 | 09230020 | 01002401 | 1427006B | 636F6C42 |
| 1300CF00 | 24011427 | 00000100 | 03001200 | AF002401 | 14270000 | 01010302 | 00240114 |
| 00240114 | 27000001 | 01092300 | 20010024 | 01142700 | 00293332 | 28464C43 | 01000701 |
| 27000001 | 00030013 | 00CF0024 | 01142700 | 00010103 | 02002401 | 14270000 | 01000901 |
| 00072400 | 72726F43 | 20747361 | 430B0024 | 01142700 | 00000007 | 001200AF | 00240114 |
| 27000000 | 00070013 | 00CF0024 | 01142700 | 00010003 | 23002001 | 00240114 | 27000000 |
| 00032400 | 72726F43 | 20747361 | 430B0024 | 01142700 | 00000007 | 23002001 | 00240114 |
| 00200100 | 24011427 | 00002933 | 3228464C | 43010007 | 011300CF | 00240114 | 27000001 |
| 24011427 | 00000101 | 03020024 | 01142700 | 00010009 | 01002401 | 14270000 | 01010923 |
| 61430B00 | 24011427 | 00000000 | 07001200 | AF002401 | 14270000 | 01000300 | 1300CF00 |
| 24011427 | 00000100 | 03230020 | 01002401 | 14270000 | 00000724 | 0072726F | 43207473 |

```
72420E00 24011427 00000000 07230020 01002401 14270000 00000700 1300CF00
74736143 00010007 011300CF 00240114 27000001 00032400 7373656E 74686769
27000001 00090100 24011427 00000101 09230020 01002401 1427006B 636F6C42
1300CF00 24011427 00000100 03001200 AF002401 14270000 01010302 00240114
00240114 27000001 01092300 20010024 01142700 00293332 28464C43 01000701
27000001 00030013 00CF0024 01142700 00010103 02002401 14270000 01000901
00072400 72726F43 20747361 430B0024 01142700 00000007 001200AF 00240114
27000000 00070013 00CF0024 01142700 00010003 23002001 00240114 27000000
00032400 72726F43 20747361 430B0024 01142700 00000007 23002001 00240114
00200100 24011427 00002933 3228464C 43010007 011300CF 00240114 27000001
24011427 00000101 03020024 01142700 00010009 01002401 14270000 01010923
61430B00 24011427 00000000 07001200 AF002401 14270000 01000300 1300CF00
24011427 00000100 03230020 01002401 14270000 00000724 0072726F 43207473
72470C00 24011427 00000000 07230020 01002401 14270000 00000700 1300CF00
6C427472 42000100 07011300 CF002401 14270000 01000324 006E6F69 74616461
01142700 00010009 01002401 14270000 01010923 00200100 24011427 006B636F
07011300 CF002401 14270000 01000300 1200AF00 24011427 00000101 03020024
00240114 27000001 01092300 20010024 01142700 6B636F6C 42747361 43000100
27000001 00030012 00AF0024 01142700 00010103 02002401 14270000 01000901
01010923 00200100 24011427 00002933 3228464C 43010007 011300CF 00240114
1300CF00 24011427 00000101 03020024 01142700 00010009 01002401 14270000
43207473 61430B00 24011427 00000000 07001200 AF002401 14270000 01000300
1300CF00 24011427 00000100 03230020 01002401 14270000 00000724 0072726F
43207473 61430B00 24011427 00000000 07230020 01002401 14270000 00000700
27000029 33322846 4C430100 07011300 CF002401 14270000 01000324 0072726F
01030200 24011427 00000100 09010024 01142700 00010109 23002001 00240114
27000000 00070012 00AF0024 01142700 00010003 001300CF 00240114 27000001
00032300 20010024 01142700 00000007 24007272 6F432074 7361430B 00240114
27000000 00072300 20010024 01142700 00000007 001300CF 00240114 27000001
07011300 CF002401 14270000 01000324 00737365 6E746867 6972420E 00240114
00240114 27000001 01092300 20010024 01142700 6B636F6C 42747361 43000100
27000001 00030012 00AF0024 01142700 00010103 02002401 14270000 01000901
01010923 00200100 24011427 00002933 3228464C 43010007 011300CF 00240114
1300CF00 24011427 00000101 03020024 01142700 00010009 01002401 14270000
43207473 61430B00 24011427 00000000 07001200 AF002401 14270000 01000300
1300CF00 24011427 00000100 03230020 01002401 14270000 00000724 0072726F
43207473 61430B00 24011427 00000000 07230020 01002401 14270000 00000700
27000029 33322846 4C430100 07011300 CF002401 14270000 01000324 0072726F
01030200 24011427 00000100 09010024 01142700 00010109 23002001 00240114
27000000 00070012 00AF0024 01142700 00010003 001300CF 00240114 27000001
00032300 20010024 01142700 00000007 24007272 6F432074 7361430B 00240114
00000000 00002300 20010024 01142700 00000007 001300CF 00240114 27000001
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
```

EPROD2.HEX
-----------

```
27004D4F 4F5A5F52 45544E49 00010109 00050024 01142700 00010005 000077FC
4C530101 09020024 01142700 00010109 01002401 14270000 01010900 00230114
01142700 0029322C 31362846 4C530101 09030024 01142700 0029302C 30312846
74437465 73655200 29312C30 3428464C 533B2932 2C332846 4C530100 09040024
011300CA 00240114 27000001 00030100 24011427 00000000 06050024 01142700
01002401 14270000 01010923 00200100 24011427 00002932 32284647 43010007
0067616C 665F7475 6C657461 6572635F 74657300 29322C33 32284647 53010109
00000006 01002401 14270000 00000603 00240114 27000001 00090200 24011427
```

011300CA 00240114 27000001 00030100 24011427 00000000 06010024 01142700
01142700 65746968 775F646E 615F6B63 616C625F 726F5F72 6F6C6F63 00010007
464C5301 00090100 24011427 00002931 2C333228 464C5301 01092300 20010024
14270000 00000601 00240114 27000000 00060200 24011427 00002932 2C333228
24011427 00000100 03005353 45434341 4C460024 01142700 0000002E 01002401
27000001 01092300 20010024 01142700 00293631 28464C43 01000701 1300CB00
00070113 00CB0024 01142700 00010003 02002401 14270000 01000901 00240114
65736552 00010109 00020024 01142700 00010005 23002001 00240114 27000001
75435F77 61724400 01000901 00230114 27000001 01090000 24011427 00744374
00240114 27000001 01030100 24011427 00000000 06020024 01142700 73657672
011300D0 00240114 27000001 01030113 00CC0024 01142700 00010103 011300C9
00010103 011300CF 00240114 27000001 01030113 00C80024 01142700 00010103
01142700 00010103 011300CB 00240114 27000001 01030113 00CE0024 01142700
00CA0024 01142700 00010003 011300D2 00240114 27000001 01030013 00AF0024
00240114 27000001 01092300 20010024 01142700 00293328 464C4301 00070113
24011427 00000101 09060024 01142700 00010109 02002401 14270000 01010901
01142700 00010003 0E002401 14270000 0100090C 00240114 27000001 01090B00
00C80024 01142700 00010003 23002001 00240114 27000000 00070013 00C80024
00070013 00C80024 01142700 00010003 23002001 00240114 27000000 00070013
27000000 00070013 00C80024 01142700 00010003 23002001 00240114 27000000
29383228 46474301 00070113 00CA0024 01142700 00010003 23002001 00240114
09010024 01142700 0029322C 37322846 47530101 09230020 01002401 14270000
01142700 00000007 001300C8 00240114 27000001 00030200 24011427 00000100
20010024 01142700 00000007 001300C8 00240114 27000001 00032300 20010024
00072300 20010024 01142700 00000007 001300C8 00240114 27000001 00032300
24011427 00000101 09230020 01002401 14270072 656C626D 65737341 66490001
47430100 07011300 D2002401 14270000 01000302 00240114 27000001 00090100
00000100 09010024 01142700 00010109 23002001 00240114 27000029 37322846
20010024 01142700 00000007 001300C8 00240114 27000001 00030200 24011427
07030042 20080024 00152700 00000107 001300A6 00240114 27000001 00032300
00010703 004D2006 00240015 27000000 01070300 59200700 24001527 00000001
27000000 01072300 20040024 00152700 00000107 03004320 05002400 15270000
00240015 27000000 00072300 20020024 00152700 00000107 23002003 00240015
23002001 00240114 27000000 00070013 00C80024 01142700 00010003 23002001
24011427 00002934 312C3328 464C5301 01072400 200F0024 01142700 00000107
53010107 2400200D 00240114 27000000 01072300 7373656E 74686769 72420E00
4C530101 0723006E 6F697461 64617247 0C002401 14270000 2932312C 3328464C
27000000 01072300 72726F43 20747361 430B0024 01142700 00293131 2C332846
6F6C6C6C 65592009 00240114 27000000 01072400 206B6361 6C42200A 00240114
01142700 00000107 24006174 6E656761 4D200800 24011427 00000001 07240077
72614406 00240114 27000029 362C3328 464C5301 01072400 6E617943 20070024
14270000 00010724 006B6361 6C422005 00240114 27000000 01072300 7450206B
61746E65 67614D20 03002401 14270000 00010724 00776F6C 6C655920 04002401
29312C33 28464C53 01000724 006E6179 43200200 24011427 00000001 07240020
011300CA 00240114 27000001 00032300 74502065 74696857 01002401 14270000
24011427 00000100 03230020 01002401 14270000 29322C30 3428464C 53010007
46475301 01092300 20010024 01142700 00293732 28464743 01000701 1300CB00
24011427 00002931 2C373228 46475301 00090100 24011427 00002932 2C383228
14270000 29312C38 32284647 53010007 011300CB 00240114 27000001 00030200
01000300 00240114 27000000 00060000 24011427 00000000 06230020 01002401
20010024 01142700 0029322C 30342846 4C530100 07011300 CA002401 14270000
24011427 00002937 32284647 43010007 011300CB 00240114 27000001 00032300
28464753 01000901 00240114 27000029 322C3832 28464753 01010923 00200100
47530100 07011300 CB002401 14270000 01000302 00240114 27000029 312C3732
00000600 00240114 27000000 00062300 20010024 01142700 0029312C 38322846
2C303428 464C5301 00070113 00CA0024 01142700 00010003 00002401 14270000
47430100 07011300 CB002401 14270000 01000323 00200100 24011427 00002932
14270000 29322C38 32284647 53010109 23002001 00240114 27000029 37322846
01142700 00010003 02002401 14270000 29312C37 32284647 53010009 01002401
00000623 00200100 24011427 00002931 2C383228 46475301 00070113 00CB0024
1300CA00 24011427 00000100 03000024 01142700 00000006 00002401 14270000
01142700 00010003 23002001 00240114 27000029 322C3034 28464C53 01000701
47530101 09230020 01002401 14270000 29373228 46474301 00070113 00CB0024
01142700 0029312C 37322846 47530100 09010024 01142700 0029322C 38322846
27000029 312C3832 28464753 01000701 1300CB00 24011427 00000100 03020024
00030000 24011427 00000000 06000024 01142700 00000006 23002001 00240114
01002401 14270000 29322C30 3428464C 53010007 011300CA 00240114 27000001
20010024 01142700 00293328 464C4301 00070000 24011427 00000000 06230020

01142700 00010109 02002401 14270000 01010901 00240114 27000001 01092300
5F74696E 49002931 2C303728 464C5301 01090B00 24011427 00000101 09060024
65767275 63206E6F 69746164 61726720 79666964 6F4D2024 01142700 64617247
01000301 1300C800 24011427 00000101 030E0024 01142700 00010009 0C002073
72420E00 24011427 00002932 2C332846 4C530101 07001200 AF002401 14270000
24006E6F 69746164 6172470C 00240114 27000000 01070200 7373656E 74686769
00240114 27000000 01072400 72726F43 20747361 430B0024 01142700 00000107
03240074 50206574 69685701 00240114 27000000 00072400 7450206B 72614406
00240114 27000029 312C3034 28464C53 01000701 1300CA00 24011427 00000100
01000523 00200100 24011427 00000100 07000024 01142700 00000006 23002001
00010109 00002401 14270000 29322C33 28464C53 01010900 04002401 14270000
01000903 00240114 27000001 01090200 24011427 00000101 09010023 01142700
7373656E 74686769 72622066 6F206575 6C617620 7265746E 45202401 14270000
49524200 24011427 00000000 2E040029 20303120 2D203020 65676E61 72202820
00544847 49524200 24011427 00000000 2E020024 01142700 00000006 00544847
6E746867 6972425F 6C61626F 6C470001 00070113 00CA0024 01142700 00010003
01142700 00010009 01002401 14270000 01010923 00200100 24011427 00737365
20282E73 73656E74 68676972 4220726F 66206575 6C617620 6C616765 6C6C4924
00000000 06FF0024 01142700 00000006 02002920 3031202D 20302065 676E6172
29312C30 3428464C 53010007 011300CA 00240114 27000001 00030100 24011427
00240114 27000000 002E0000 24011427 00000000 06230020 01002401 14270000
24011427 00000100 03007473 61437765 4E002401 14270000 00012E00 44415247
00000107 24007373 656E7468 67697242 0E002401 14270000 00010700 1200AF00
62410029 322C3328 464C5301 01072400 6E6F6974 61646172 470C0024 01142700
27000000 01070200 72726F43 20747361 430B0024 01142700 74736143 5F74726F
50206574 69685701 00240114 27000000 00072400 7450206B 72614406 00240114
07011300 CF002401 14270000 01000301 1300CA00 24011427 00000101 03240074
09010024 01142700 00010109 23002001 00240114 27000029 30372846 4C430100
24011427 00000100 03020024 01142700 66664F74 6E696F50 6C61636F 4C000100
1300C800 24011427 00000100 03230020 01002401 14270000 00000700 1300C800
01142700 0029312C 30342846 4C530100 07230020 01002401 14270000 00000700
004B5241 44002401 14270000 00012E00 00240114 27000000 00062300 20010024
6E746867 6972420E 00240114 27000000 01070012 00AF0024 01142700 00010003
00000001 0724006E 6F697461 64617247 0C002401 14270000 00010724 00737365
6F624100 29322C33 28464C53 01010724 0072726F 43207473 61430B00 24011427
24011427 00000000 07020074 50206B72 61440600 24011427 00746E69 6F507472
27000001 00030113 00CA0024 01142700 00010103 24007450 20657469 68570100
01010923 00200100 24011427 00002930 3728464C 43010007 011300CF 00240114
02002401 14270066 664F746E 696F506C 61636F4C 00010009 01002401 14270000
00010003 23002001 00240114 27000000 00070013 00C80024 01142700 00010003
3428464C 53010007 23002001 00240114 27000000 00070013 00C80024 01142700
27000001 00030000 24011427 00000000 06230020 01002401 14270000 29312C30
27000000 012E2400 6E617943 20020024 01142700 00000007 001200AF 00240114
01142700 00000107 001200AF 00240114 27000001 00030054 4847494C 00240114
74616461 72470C00 24011427 00000001 07240073 73656E74 68676972 420E0024
00000001 07240072 726F4320 74736143 0B002401 14270000 00010724 006E6F69
74726F62 41002932 2C332846 4C530100 07240074 50206B72 61440600 24011427
00240114 27000001 01030200 74502065 74696857 01002401 14270074 6E696F50
14270000 29303728 464C4301 00070113 00CF0024 01142700 00010003 011300CA
746E696F 506C6163 6F4C0001 00090100 24011427 00000101 09230020 01002401
01142700 00000007 001300C8 00240114 27000001 00030200 24011427 0066664F
20010024 01142700 00000007 001300C8 00240114 27000001 00032300 20010024
14270000 00000623 00200100 24011427 00002931 2C303428 464C5301 00072300
14270000 01010923 00200100 24011427 00002930 3128464C 43010007 00002401
01000301 1300CB00 24011427 00000101 03010024 01142700 00010009 00002401
09230020 01002401 14270000 29332846 4C430100 07011300 C9002401 14270000
06002401 14270000 01010902 00240114 27000001 01090100 24011427 00000101
090C0024 01142700 6E4F5F73 65767275 43000101 090B0024 01142700 00010109
01142700 00000107 0012007B 00240114 27000001 00030E00 24011427 00000100
4C206F64 6E550200 24011427 00000001 07240066 664F2073 65767275 43030024
00240114 27000001 00032400 6F646E55 01002401 14270000 00000724 00747361
24011427 0066664F 5F736576 72754300 29302C30 3128464C 53010107 0012007B
614C206F 646E5502 00240114 27000000 01072300 66664F20 73657672 75430300
CD002401 14270000 01010324 006F646E 55010024 01142700 00000007 24007473
75430029 312C3031 28464C53 00000700 12007B00 24011427 00000100 03011300
28464C43 01000723 006E4F20 73657672 75430300 24031527 006E4F5F 73657672
14270000 01000901 00230114 27000001 01092300 20010024 01142700 00293332
001000EB 00240114 27000000 01030010 00EB0024 01142700 00000003 02002301
00000003 001000E9 00240114 27000000 01030010 00EA0024 01142700 00000103

01142700 00000107 0012007B 00240114 27000001 00030010 00E80024 01142700
4C206F64 6E550200 24011427 00000001 07240066 664F2073 65767275 43030024
00240114 27000001 00032400 6F646E55 01002401 14270000 00000724 00747361
00000001 07240066 664F2073 65767275 43030024 01142700 00000107 0012007B
6F646E55 01002401 14270000 00000724 00747361 4C206F64 6E550200 24011427
72754300 29302C30 3128464C 53010107 0012007B 00240114 27000001 00032400
41420001 01072300 66664F20 73657672 75430300 24011427 0066664F 5F736576
475F7465 73655200 01000723 00747361 4C206F64 6E550200 24011427 00314B43
00C80024 01142700 00010003 23006F64 6E550100 24011427 006C6C41 5F646172
00070013 00C80024 01142700 00010003 23002001 00240114 27000000 00070013
27000001 00030113 00CD0024 01142700 00010103 23002001 00240114 27000000
27006E4F 5F736576 72754300 29312C30 3128464C 53000007 0012007B 00240114
24011427 00002933 3228464C 43010007 23006E4F 20736576 72754303 00240315
00000000 03020023 01142700 00010009 01002301 14270000 01010923 00200100
24011427 00000001 03001000 EB002401 14270000 00010300 1000EB00 24011427
1000E800 24011427 00000000 03001000 E9002401 14270000 00010300 1000EA00
73657672 75430300 24011427 00000001 07001200 7B002401 14270000 01000300
00000007 24007473 614C206F 646E5502 00240114 27000000 01072400 66664F20
20010024 01142700 00293332 28464C43 01000724 006F646E 55010024 01142700
01142700 00010003 02002401 14270000 01000901 00240114 27000001 01092300
20080024 00152700 00000107 24002009 00240015 27000000 01070012 00EB0024
01072400 20060024 00152700 00000107 23002007 00240015 27000000 01072300
27000000 01072300 20040024 00152700 00000107 24002005 00240015 27000000
00240015 27000000 00072400 20020024 00152700 00000107 23002003 00240015
24011427 00000101 03001200 EB002401 14270000 01010303 006B6361 6C422001
1300E800 24011427 00000100 03001300 E9002401 14270000 01010300 1300EA00
00010723 00200800 24001527 00000001 07240020 09002400 15270000 00010700
15270000 00010724 00200600 24001527 00000001 07230020 07002400 15270000
03002400 15270000 00010723 00200400 24001527 00000001 07240020 05002400
61794320 01002400 15270000 00000724 00200200 24001527 00000001 07230020
07230020 08002400 15270000 00010724 00200900 24001527 00000001 0703006E
00000001 07240020 06002400 15270000 00010723 00200700 24001527 00000001
24001527 00000001 07230020 04002400 15270000 00010724 00200500 24001527
4D200100 24001527 00000000 07240020 02002400 15270000 00010723 00200300
00240015 27000000 01072400 20090024 00152700 00000107 03006174 6E656761
24002006 00240015 27000000 01072300 20070024 00152700 00000107 23002008
00000107 23002004 00240015 27000000 01072400 20050024 00152700 00000107
00152700 00000007 24002002 00240015 27000000 01072300 20030024 00152700
27000000 01072400 20090024 00152700 00000107 0300776F 6C6C6559 20010024
00240015 27000000 01072300 20070024 00152700 00000107 23002008 00240015
23002004 00240015 27000000 01072400 20050024 00152700 00000107 24002006
00000007 24002002 00240015 27000000 01072300 20030024 00152700 00000107
01000301 1300C900 24011427 00000101 0303006B 63616C42 20010024 00152700
09230020 01002401 14270000 29332846 4C430100 07011300 C8002401 14270000
06002401 14270000 01010902 00240114 27000001 01090100 24011427 00000101
00240114 27000001 00090C00 24011427 00000101 090B0024 01142700 00010109
01000323 00200100 24011427 00000000 07001300 C8002401 14270000 0100030E
23002001 00240114 27000029 33322846 4C430100 07011300 CB002401 14270000
00240114 27000001 00030200 24011427 00000100 09010024 01142700 00010109
23002008 00240015 27000000 01072400 20090024 00152700 00000107 001200EB
00000107 24002006 00240015 27000000 01072300 20070024 00152700 00000107
00152700 00000107 23002004 00240015 27000000 01072400 20050024 00152700
20010024 00152700 00000007 24002002 00240015 27000000 01072300 20030024
EA002401 14270000 01010300 1200EB00 24011427 00000101 0303006B 63616C42
07001300 E8002401 14270000 01000300 1300E900 24011427 00000101 03001300
00000001 07230020 08002400 15270000 00010724 00200900 24001527 00000001
24001527 00000001 07240020 06002400 15270000 00010723 00200700 24001527
00200300 24001527 00000001 07230020 04002400 15270000 00010724 00200500
006E6179 43200100 24001527 00000000 07240020 02002400 15270000 00010723
00010723 00200800 24001527 00000001 07240020 09002400 15270000 00010703
15270000 00010724 00200600 24001527 00000001 07230020 07002400 15270000
03002400 15270000 00010723 00200400 24001527 00000001 07240020 05002400
67614D20 01002400 15270000 00000724 00200200 24001527 00000001 07230020
20080024 00152700 00000107 24002009 00240015 27000000 01070300 61746E65
01072400 20060024 00152700 00000107 23002007 00240015 27000000 01072300
27000000 01072300 20040024 00152700 00000107 24002005 00240015 27000000
00240015 27000000 00072400 20020024 00152700 00000107 23002003 00240015
00152700 00000107 24002009 00240015 27000000 01070300 776F6C6C 65592001

20060024 00152700 00000107 23002007 00240015 27000000 01072300 20080024
01072300 20040024 00152700 00000107 24002005 00240015 27000000 01072400
27000000 00072400 20020024 00152700 00000107 23002003 00240015 27000000
00000000 07001300 C8002401 14270000 01000303 006B6361 6C422001 00240015
24011427 00000000 07001300 C8002401 14270000 01000323 00200100 24011427
00200100 24011427 00000000 07001300 C8002401 14270000 01000323 00200100
01000723 00200100 24011427 00000000 07001300 C8002401 14270000 01000323
00010109 01002401 14270000 01010923 00200100 24011427 00002933 28464C43
0101090B 00240114 27000001 01090600 24011427 00000101 09020024 01142700
00010003 0E002401 14270000 0100090C 00240114 27006E4F 5F736576 72754300
24006E4F 20736576 72754303 00240114 27000000 01070012 007B0024 01142700
00240114 27000000 00072400 7473614C 206F646E 55020024 01142700 00000107
302C3031 28464C53 01010700 12007B00 24011427 00000100 0324006F 646E5501
07230066 664F2073 65767275 43030024 01142700 66664F5F 73657672 75430029
01002401 14270000 00000724 00747361 4C206F64 6E550200 24011427 00000001
007B0024 01142700 00010003 011300CD 00240114 27000001 01032400 6F646E55
43030024 03152700 6E4F5F73 65767275 43002931 2C303128 464C5300 00070012
09230020 01002401 14270000 29333228 464C4301 00072300 6E4F2073 65767275
EB002401 14270000 00000302 00230114 27000001 00090100 23011427 00000101
03001000 EA002401 14270000 00010300 1000EB00 24011427 00000001 03001000
00000100 03001000 E8002401 14270000 00000300 1000E900 24011427 00000001
0724006E 4F207365 76727543 03002401 14270000 00010700 12007B00 24011427
01002401 14270000 00000724 00747361 4C206F64 6E550200 24011427 00000001
43030024 01142700 00000107 0012007B 00240114 27000001 00032400 6F646E55
24007473 614C206F 646E5502 00240114 27000000 01072400 6E4F2073 65767275
07001200 7B002401 14270000 01000324 006F646E 55010024 01142700 00000007
76727543 03002401 1427006E 4F5F7365 76727543 0029312C 30312846 4C530101
7473614C 206F646E 55020024 01142700 314B4341 42000101 0723006E 4F207365
006F646E 55010024 01142700 6C6C415F 64617247 5F746573 65520001 00072300
01000323 00200100 24011427 00000000 07001300 C8002401 14270000 01000323
14270000 01010323 00200100 24011427 00000000 07001300 C8002401 14270000
302C3031 28464C53 00000700 12007B00 24011427 00000100 03011300 CB002401
07230066 664F2073 65767275 43030024 03152700 66664F5F 73657672 75430029
09010024 01142700 00010109 23002001 00240114 27000029 33322846 4C430100
00152700 00000107 001200EB 00240114 27000001 00030200 24011427 00000100
20070024 00152700 00000107 23002008 00240015 27000000 01072400 20090024
01072400 20050024 00152700 00000107 24002006 00240015 27000000 01072300
27000000 01072300 20030024 00152700 00000107 23002004 00240015 27000000
00000101 0303006B 63616C42 20010024 00152700 00000007 24002002 00240015
24011427 00000101 03001300 EA002401 14270000 01010300 1200EB00 24011427
00200900 24001527 00000001 07001300 E8002401 14270000 01000300 1300E900
00010723 00200700 24001527 00000001 07230020 08002400 15270000 00010724
15270000 00010724 00200500 24001527 00000001 07240020 06002400 15270000
02002400 15270000 00010723 00200300 24001527 00000001 07230020 04002400
09002400 15270000 00010703 006E6179 43200100 24001527 00000000 07240020
07230020 07002400 15270000 00010723 00200800 24001527 00000001 07240020
00000001 07240020 05002400 15270000 00010724 00200600 24001527 00000001
24001527 00000001 07230020 03002400 15270000 00010723 00200400 24001527
27000000 01070300 61746E65 67614D20 01002400 15270000 00000724 00200200
00240015 27000000 01072300 20080024 00152700 00000107 24002009 00240015
24002005 00240015 27000000 01072400 20060024 00152700 00000107 23002007
00000107 23002003 00240015 27000000 01072300 20040024 00152700 00000107
01070300 776F6C6C 65592001 00240015 27000000 00072400 20020024 00152700
27000000 01072300 20080024 00152700 00000107 24002009 00240015 27000000
00240015 27000000 01072400 20060024 00152700 00000107 23002007 00240015
23002003 00240015 27000000 01072300 20040024 00152700 00000107 24002005
006B6361 6C422001 00240015 27000000 00072400 20020024 00152700 00000107
73657672 75430300 24011427 00000001 07001200 7B002401 14270000 01000303
00000000 07240074 73614C20 6F646E55 02002401 14270000 00010724 006E4F20
27000000 002E2300 20010024 01142700 00010007 24006F64 6E550100 24011427
09230020 01002401 14270000 29332846 4C430100 07004C45 4454504F 00240114
01010902 00240114 27000029 312C3928 464C5301 01090100 24011427 00000101
00090C00 24011427 00000101 090B0024 01142700 00010109 06002401 14270000
24011427 00000100 03011300 CB002401 14270000 0101030E 00240114 27000001
01072400 20524347 2F524355 6E616353 08002401 14270000 00010700 12007C00
20060024 01142700 00000107 2400636E 686E4520 74654407 00240114 27000000
07020064 72706552 20656E6F 54050024 00152700 00000107 2400726F 6C6F4320
6E6F5403 00240015 27000000 01072400 6E616353 20200400 24011427 00000001
0724006E 6F697469 736F5020 02002401 14270000 00010702 006C6F43 20262065

322C3928 464C5301 00072400 70757465 53207463 69500100 24011427 00000000
27000000 00070013 00C80024 01142700 00010003 23002001 00240114 27000029
00240114 27000001 00030113 00CB0024 01142700 00010103 23002001 00240114
00010724 00205243 472F5243 556E6163 53080024 01142700 00000107 0012007C
20200600 24011427 00000001 07240063 6E686E45 20746544 07002401 14270000
01070200 64727065 5220656E 6F540500 24001527 00000001 07240072 6F6C6F43
656E6F54 03002400 15270000 00010724 006E6163 53202004 00240114 27000000
00072400 6E6F6974 69736F50 20020024 01142700 00000107 02006C6F 43202620
29322C39 28464C53 01000724 00707574 65532074 63695001 00240114 27000000
14270000 00000700 1300C800 24011427 00000100 03230020 01002401 14270000
7C002401 14270000 01000301 1300CB00 24011427 00000101 03230020 01002401
00000107 24002052 43472F52 43556E61 63530800 24011427 00000001 07001200
43202006 00240114 27000000 01072400 636E686E 45207465 44070024 01142700
00010702 00647270 65522065 6E6F5405 00240015 27000000 01072400 726F6C6F
20656E6F 54030024 00152700 00000107 24006E61 63532020 04002401 14270000
00000724 006E6F69 7469736F 50200200 24011427 00000001 0702006C 6F432026
0029322C 3928464C 53010007 24007075 74655320 74636950 01002401 14270000
01142700 00000007 001300C8 00240114 27000001 00032300 20010024 01142700
007C0024 01142700 00010003 011300CB 00240114 27000001 01032300 20010024
00000001 07240020 5243472F 5243556E 61635308 00240114 27000000 01070012
6F432020 06002401 14270000 00010724 00636E68 6E452074 65440700 24011427
00000107 02006472 70655220 656E6F54 05002400 15270000 00010724 00726F6C
2620656E 6F540300 24001527 00000001 0724006E 61635320 20040024 01142700
00000007 24006E6F 69746973 6F502002 00240114 27000000 01070200 6C6F4320
00002932 2C392846 4C530100 07240070 75746553 20746369 50010024 01142700
24011427 00000000 07001300 C8002401 14270000 01000323 00200100 24011427
1300CA00 24011427 00000100 03011300 CD002401 14270000 01010323 00200100
00240114 27000001 01092300 20010024 01142700 00293332 28464C43 01000701
27000001 01030113 00D10024 01142700 00010103 02002401 14270000 01000901
29323228 46474301 00070113 00CA0024 01142700 00010003 0012007C 00240114
00240114 27000001 01090100 24011427 00000101 09230020 01002401 14270000
27000000 00070013 00C80024 01142700 00010003 03002401 14270000 01000902
00240114 27000000 01070012 007C0024 01142700 00010003 23002001 00240114
686E4520 74654407 00240114 27000000 00072400 5243472F 5243556E 61635308
23002001 00240114 27000000 00070013 00C80024 01142700 00010003 2400636E
07230063 6E686E45 20746544 07002401 14270000 29332C35 31284647 53010107
6F540500 24001527 00000001 07240072 6F6C6F43 20200600 24011427 00000001
20200400 24011427 00002934 2C353128 46475301 01070200 64727065 5220656E
00000702 006C6F43 20262065 6E6F5403 00240015 27000000 01072300 6E616353
06000024 01142700 00000006 24007075 74655320 74636950 01002401 14270000
09230020 01002401 14270000 29333228 464C4301 00070000 24011427 00000000
7C002401 14270000 01000302 00240114 27000001 00090100 24011427 00000101
00000100 03240052 43472F52 43556E61 63530800 24011427 00000000 07001200
61635308 00240114 27000029 362C3531 28464753 01000700 12007C00 24011427
D1002401 14270000 01010300 00240114 27000000 00062300 5243472F 5243556E
07011300 CA002401 14270000 01000300 12007C00 24011427 00000101 03011300
09010024 01142700 00010109 23002001 00240114 27000029 32322846 47430100
C8002401 14270000 01000303 00240114 27000001 00090200 24011427 00000101
07001200 7C002401 14270000 01000323 00200100 24011427 00000000 07001300
24011427 00000000 07240052 43472F52 43556E61 63530800 24011427 00000001
00000000 07001300 C8002401 14270000 01000324 00636E68 6E452074 65440700
74654407 00240114 27000029 332C3531 28464753 01010723 00200100 24011427
6F432020 06002401 14270000 29322C35 31284647 53010107 2300636E 686E4520
53010107 02006472 70655220 656E6F54 05002400 15270000 00010723 00726F6C
00152700 00000107 23006E61 63532020 04002401 14270000 29342C35 31284647
53207463 69500100 24011427 00000000 0702006C 6F432026 20656E6F 54030024
00000006 00002401 14270000 00000600 00240114 27000000 00062400 70757465
00010109 23002001 00240114 27000029 33322846 4C430100 07000024 01142700
0012007C 00240114 27000001 00030200 24011427 00000100 09010024 01142700
01142700 00010003 24005243 472F5243 556E6163 53080024 01142700 00000007
43556E61 63530800 24011427 00002936 2C353128 46475301 00070012 007C0024
505F4F54 4F475F4E 41430001 00070000 24011427 00000000 06230052 43472F52
00010009 01002401 14270000 01010923 00200100 24011427 004E4F49 5449534F
02002401 14270000 00000700 12007C00 24011427 00000100 03020024 01142700
28464753 01000700 12007C00 24011427 00000100 0324006E 6F697469 736F5020
01142700 00000006 23006E6F 69746973 6F502002 00240114 27000029 312C3531
07001200 7C002401 14270000 01000301 1300CB00 24011427 00000101 03000024
01142700 00000107 24002052 43472F52 43556E61 63530800 24011427 00000001

```
726F6C6F 43202006 00240114 27000000 01072400 636E686E 45207465 44070024
14270000 00010702 00647270 65522065 6E6F5405 00240015 27000000 01072400
6F432026 20656E6F 54030024 00152700 00000107 24006E61 63532020 04002401
14270000 00000724 006E6F69 7469736F 50200200 24011427 00000001 0702006C
01142700 0029322C 3928464C 53010007 24007075 74655320 74636950 01002401
20010024 01142700 00000007 001300C8 00240114 27000001 00032300 20010024
00000101 09230020 01002401 14270044 495F4E41 43535F54 45470001 00072300
00010003 03002401 14270000 01000902 00240114 27000001 01090100 24011427
646F4D20 72656E6E 61635301 00240015 27000000 00070013 007D0024 01142700
61635301 00240015 27000000 00070013 007D0024 01142700 00010003 03007365
00000700 13007D00 24011427 00000100 03030020 7365646F 4D204220 72656E6E
28464743 01000703 00736564 6F4D2041 2072656E 6E616353 01002400 15270000
66664F6F 666E4965 72757463 69500001 01092300 20010023 01142700 00293531
02002401 14270066 664F6F66 6E496572 75746369 50000101 09010024 01142700
63695000 01010903 00240114 27006666 4F6F666E 49657275 74636950 00010109
01000905 00240114 27000001 01090400 24011427 0066664F 6F666E49 65727574
4F5F7761 72440001 00070113 00C80024 01142700 00010003 06002401 14270000
27000001 01030010 00790024 01142700 00000103 23002001 00240114 27006666
00240114 27000001 00070113 00C80024 01142700 00010003 011300CD 00240114
14270000 29333228 464C4301 00070052 43550024 01142700 0000002E 23002001
00000302 00230114 27000001 00090100 23011427 00000101 09230020 01002401
14270000 00010300 1000EB00 24011427 00000001 03001000 EB002401 14270000
E8002401 14270000 00000300 1000E900 24011427 00000001 03001000 EA002401
03230020 01002401 14270000 00000700 1300C800 24011427 00000100 03001000
01002401 14270066 664F5F77 61724400 01000701 1300C800 24011427 00000100
07011300 CD002401 14270000 01000301 1300CD00 24011427 00000101 03230020
00293332 28464C43 01000723 00200100 23011427 004E4143 535F444E 45000000
02002301 14270000 01000901 00230114 27000001 01092300 20010024 01142700
00000103 001000EB 00240114 27000000 01030010 00EB0024 01142700 00000003
01142700 00000003 001000E9 00240114 27000000 01030010 00EA0024 01142700
66664F5F 77617244 00010007 011300C8 00240114 27000001 00030010 00E80024
01142700 00010103 00100079 00240114 27000000 01032300 20010024 01142700
5F6F745F 656E6F74 00000007 011300CE 00240114 27000001 00030113 00CD0024
00240114 27000029 33322846 4C430100 07230020 01002401 14270070 72616873
27000000 00030200 23011427 00000100 09010023 01142700 00010109 23002001
00240114 27000000 01030010 00EB0024 01142700 00000103 001000EB 00240114
001000E8 00240114 27000000 00030010 00E90024 01142700 00000103 001000EA
00240114 27006666 4F5F7761 72440001 00070113 00C80024 01142700 00010003
011300CD 00240114 27000001 01030010 00790024 01142700 00000103 23002001
00726F6C 6F635F6F 745F656E 6F740000 00070113 00CE0024 01142700 00010003
01092300 20010024 01142700 00293332 28464C43 01000723 00200100 24011427
00EB0024 01142700 00000003 02002301 14270000 01000901 00230114 27000001
01030010 00EA0024 01142700 00000103 001000EB 00240114 27000000 01030010
27000001 00030010 00E80024 01142700 00000003 001000E9 00240114 27000000
01032300 20010024 01142700 66664F5F 77617244 00010007 011300C8 00240114
27000001 00030113 00CD0024 01142700 00010103 00100079 00240114 27000000
01142700 6E6F6974 69736F70 5F6F745F 656E6F74 00000007 011300CE 00240114
00000101 09230020 01002401 14270000 29333228 464C4301 00072300 20010024
03001000 EB002401 14270000 00000302 00230114 27000001 00090100 23011427
00000001 03001000 EA002401 14270000 00010300 1000EB00 24011427 00000001
24011427 00000100 07001000 E8002401 14270000 00000300 1000E900 24011427
01142700 00000006 004C4954 55454E4F 54002401 14270000 00002E23 00200100
00240114 27000000 00060054 43555254 534E4900 24011427 00000000 2E000024
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
```

TONE.HEX
---------

```
086F6649 000095A2 00005CB6 0000001C 0000C111 00028DF2 0005F055 00B90206
00000400 000002A0 00000800 00000000 00000000 00000000 00000000 00000000
00000000 00000000 00000000 00000000 00000000 00000054 00000201 00000080
00000000 00000000 00000000 00000000 0000000F FFF00000 10000003 00000000
00000000 00000000 00000000 00000000 00000000 00000000 00000000 00000000
2C524550 50414D20 36383258 50416914 35313A32 303A3831 32392F36 322F3530
00000000 0000000D 72000000 0200008A 9C000000 0F0001CC 5A7FDE32 2E335620
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00009A00 0000FFFC 00009200 0000FFFE 00009200 0000007F 00000000 00000000
00009A00 0000FFFE 00009A00 0000FFF8 00009A00 0000FFF6 00009200 0000FFFE
00009200 0000C101 00009A00 0000EFE6 00009200 00008DF4 00009A00 0000FFFC
00009200 00000002 00009A00 0000001C 00009200 00000002 00009A00 0000006F
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000001 00000000
00000000 00000000 00000000 00000000 00000000 00000000 00000002 00000000
```

```
00000000 00000000 00000000 0000FFFF 0000FFFE 00000C00 00000014 80000002
00000000 00000000 00000000 0000FFFD 0000FFFC 00010C00 0000001C 80080001
00000000 00000000 00000000 0000FFFF 0000FFFE 00020C00 00000024 80000002
00000000 00000000 00000000 0000FFF7 0000FFF6 00030C00 0000002C 80080001
00000000 00000000 00000000 0000FFF9 0000FFF8 00040C00 00000034 80080001
00000000 00000000 00000000 0000FFFF 0000FFFE 00050C00 0000003C 80080001
00000000 00000000 00000000 0000FFFD 0000FFFC 00060C00 00000044 80080001
00000000 00000000 00000000 00008DF5 00008DF4 00070C00 0000004C 80000002
00000000 00000000 00000000 0000EFE7 0000EFE6 00079C00 00000054 80080001
00000000 00000000 00000000 0000C102 00000000 00000000 0000005C 80000002
00000000 00000000 00000000 00000070 0000006F 00088C00 00000064 80080001
00000000 00000000 00000000 00000003 00000000 00000000 0000006C 80000002
00000000 00000000 00000000 0000001D 0000001C 00089000 00000074 80080001
00000000 00000000 00000000 00000003 00000002 00089400 0000007C 80000002
00000000 00000000 00000000 0000002C 0000002C 00089402 00000011 00000041
00000000 00000000 00000000 00005CB6 00005CB6 0008942E 00000012 00000042
00000000 00000000 00000000 000000BE 000000BE 0008F0E4 00000013 00000043
00000000 00000000 00000000 0000001C 0000001C 0008F1A2 00000014 00000044
00000000 00000000 00000000 00005594 00005594 0008F1BE 00000015 00000045
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
2064252C 2064253D 6267725F 74726174 732C2020 64253D68 63746163 5F646E69
43205443 55525453 4E4F4345 52200064 253D6863 7461635F 646E6900 2064252C
4433204E 49204843 52414553 20455352 45564552 0A000A20 44455445 4C504D4F
253D6920 00662520 3D20796D 635F7861 5F792064 253D6920 000A2020 54554C2D
3D20796D 635F7861 5F792064 253D6920 00662520 3D20796D 635F7861 5F782064
5F792064 253D6920 00662520 3D20796D 635F7861 5F782064 253D6920 00662520
00662520 3D20796D 635F7861 5F782064 253D6920 00662520 3D20796D 635F7861
53545045 43524554 4E492052 4F462048 43524145 53204553 52455645 52200A20
554C4156 20535450 45435245 544E4920 0A20000A 20544847 494C4843 5441432D
432D2048 43524145 53204553 52455645 52204552 4F464542 20545355 4A205345
6625203D 20796D63 5F78615F 79206425 3D69200A 000A2054 4847494C 48435441
45564552 200A2000 0A206625 203D2079 6D635F78 615F7820 64253D69 20000A20
494C4843 54414320 2D454E4F 5A5F4449 4D20524F 46204843 52414553 20455352
2D353532 20524F46 20484352 41455320 45535245 56455220 0A20000A 20544847
2A2A2A2A 2A2A594D 4353475F 44414552 200A0020 0A544847 494C4843 54414320
53470062 7200682E 796D6373 67000A2A 2A2A2A2A 2A2A2A2A 2A2A2A2A 2A2A2A2A
31646172 675F6F6E 20006425 00642500 0A444E55 4F462054 4F4E2048 2E594D43
4D28202E 2073656C 70697274 20796D63 20796E61 6D206F6F 74200064 25203D20
2C662520 74686769 6C20200A 00206625 20662520 66250029 64252073 69205841
2A2A2A59 4D435347 5F45474E 41484320 0A006425 20795F79 6D635F74 72617473
64617267 5F6F6E20 200A000A 2A2A2A2A 2A2A2A2A 2A2A2A2A 2A2A2A2A 2A2A2A2A
2520795F 796D635F 74726174 732C6625 20746867 696C2020 0A006425 20315F31
6F200A00 64252079 5F796D63 5F747261 74732C66 25207468 67696C20 200A0064
64252032 5F316461 72675F6F 6E20200A 00662520 66252066 2520796D 635F7475
54414441 52475F44 4C495542 200A0064 2520335F 31646172 675F6F6E 20200A00
4E49200A 000A2A2A 2A2A2A2A 2A2A2A2A 2A2A2A2A 2A2A2A2A 2A2A2A2A 2A4E4F49
49200A00 0A2A2A2A 2A2A2A2A 2A2A2A2A 2A2A2A2A 2A2A2A2A 2A2A2A2A 54524553
2A2A2A2A 2A2A2A2A 2A2A2A2A 2A2A2A2A 2A2A2A2A 2A2A2A47 454E5F54 5245534E
2A2A2A2A 2A2A2A2A 2A2A2A2A 2A67656E 5F73756F 696E6F74 6F6E6F6D 200A000A
2A2A2A2A 2A2A2A73 756F696E 6F746F6E 6F6D200A 000A2A2A 2A2A2A2A 2A2A2A2A
203D205D 64255B64 6172675F 6F6E000A 2A2A2A2A 2A2A2A2A 2A2A2A2A 2A2A2A2A
5F444C49 5542200A 00200A64 25203D20 5D64255B 64617267 5F6F6E00 200A6425
200A000A 2A2A2A2A 2A2A2A2A 2A2A2A2A 2A2A2A2A 2A2A2A2A 2A2A2A54 554C6433
2A2A2A2A 2A2A2A2A 2A2A2A2A 2A2A2A2A 2A2A2A2A 54554C64 335F4547 4E414843
66200A00 0A205044 5F50575F 524F465F 524F435F 524F4C4F 43200A00 0A2A2A2A
20642520 64252064 25206425 20642520 74705F74 772C7470 5F6B6420 6C616E69
20642520 64252074 6C2C6B64 5F726F63 5F646E69 200A0020 64252064 25206425
4F435F52 4F4C4F43 200A000A 20504420 524F4620 524F435F 524F4C4F 43200A00
00000000 00000000 00000000 02000000 00000000 00000A20 50572052 4F462052
00000000 00000000 00000000 00000000 00000000 00000000 00000000 00000000
```

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

99 100

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
20545241 54530000 00000000 00000000 00000000 00000000 00000000 00000000
3D3D3D3D 3D000A53 4E4F4954 41524550 4F20454E 4F542047 4E494452 4F434552
3D3D3D3D 3D3D4544 4F4D2048 43544142 204E4920 454E4F54 3D3D3D3D 3D3D3D3D
72726500 0A736E61 72547472 61745320 6E692072 6F727265 000A3D3D 3D3D3D3D
0A707369 64737464 206E6920 726F7272 65000A70 73696473 7464206E 6920726F
20544F4E 20482E59 4D435347 00627200 682E796D 63736700 32444F52 50455200
72726500 00202E2E 2E474E49 53534543 4F525000 64250064 25000A44 4E554F46
000A444E 45202D20 626F4A20 656E6F54 20000A70 73696473 7464206E 6920726F
004C5F59 5F444C4F 00643325 004C5F4D 5F444C4F 00643325 004C5F43 5F444C4F
5F57454E 00643325 004C5F4D 5F57454E 00643325 004C5F43 5F57454E 00643325
004C5F59 5F444C4F 004C5F4D 5F444C4F 004C5F43 5F444C4F 00643325 004C5F59
00732500 42415447 004C5F59 5F57454E 004C5F4D 5F57454E 004C5F43 5F57454E
25005243 55500064 33250042 58414D00 64332500 424E494D 00632500 4257454E
312E3325 00464143 5F430063 25004652 43006631 2E332500 52544346 42006433
4D004241 54470066 312E3325 00464143 5F590066 312E3325 00464143 5F4D0066
00464143 5F4D0046 41435F43 00525443 46420052 43555000 4258414D 00424E49
4C4F0064 3325004C 5F4D5F44 4C4F0064 3325004C 5F435F44 4C4F0046 41435F59
3325004C 5F4D5F57 454E0064 3325004C 5F435F57 454E0064 3325004C 5F595F44
00643425 00424E49 4D007325 20004241 54470064 3325004C 5F595F57 454E0064
5F430066 312E3325 00525443 46420064 34250052 43555000 64342500 4258414D
312E3325 00464143 5F590066 312E3325 00464143 5F4D0066 312E3325 00464143
643A0000 00000000 0A202121 20766974 63616564 67206E69 20726F72 72450066
00000000 00000000 00000000 00000000 00000000 00000000 00000000 3A207374
00000000 00000000 00000000 00000000 00000000 00000000 00000000 00000000

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
74656700 66656473 74696E55 00666564 626F4A00 73656761 7373654D 00000000
6E654474 72617453 0065646F 6D5F7361 6461625F 74656700 64695F6E 6163735F
74614D73 6E654400 3174614D 736E6544 00307461 4D736E65 4400736E 65440073
69746172 61706553 74726174 5300736E 65446666 4F003374 614D736E 65440032
65536E61 7943006E 6F697461 72617065 53656C67 6E695374 72617453 00736E6F
6F6C6C65 59006E6F 69746172 61706553 61746E65 67614D00 6E6F6974 61726170
536C6C41 006E6F69 74617261 7065536B 63616C42 006E6F69 74617261 70655377
6D530066 664F7065 53326D53 006E4F70 6553326D 5300736E 6F697461 72617065
664F4374 6553006E 4F42326D 53006E4F 59326D53 006E4F4D 326D5300 6E4F4332
6E4F4374 65530066 664F4274 65530066 664F5974 65530066 664F4D74 65530066
00797472 616D535F 6649006E 4F427465 53006E4F 59746553 006E4F4D 74655300
65746164 70550072 65776569 566F7263 694D6649 0072656C 626D6573 73416649
696C006E 6F697461 6C6F7072 65746E69 5F746573 6572006E 65657263 53504942

656C6261 745F7468 67696C5F 74656700 66666F5F 6E6F5F65 6C626174 5F746867
454D5F4F 4E006761 6C665F74 756C6574 61657263 5F746573 00737574 6174735F
454E4F54 00574446 5F57454E 5F454E4F 54005453 4958455F 57444600 59524F4D
5F524F5F 57444600 53505F4F 545F5744 465F454E 4F540057 44465F56 4552505F
53004C42 49534956 5F485300 5744465F 54484757 5F57454E 004E4143 53455250
645F6576 61735F74 756C0059 54494C49 42495349 56004C42 49534956 4E555F48
70757465 73006576 61735F70 75746573 00657661 735F7475 6C00746C 75616665
635F6461 7267006C 6C61635F 70726168 735F6461 656C0066 65645F65 7661735F
7661735F 626D6F63 00657661 735F6461 7267006C 6C61635F 626D6F63 006C6C61
6665645F 73615F65 76617300 6665645F 65766173 5F646172 675F656E 6F740065
4F540066 666F5F67 616C665F 6665645F 73615F65 76617300 6E6F5F67 616C665F
726F6C6F 4372756F 746E6F43 65676E61 68430048 43544142 5F455641 535F454E
53726F73 72754365 676E6168 4300726F 6C6F4372 6F737275 4365676E 61684300
74636950 0066664F 65646F4D 65756C42 006E4F65 646F4D65 756C4200 65706168
4F6E4F6F 666E4900 66664F6F 666E4965 72757463 6950006E 4F6F666E 49657275
0066664F 746E696F 506C6163 6F4C006E 4F746E69 6F506C61 636F4C00 66664F72
31726142 726F6C6F 43006666 4F5F6574 656C6544 00746E69 6F50656C 706D6153
464F4C4E 41500079 6669646F 4D317261 42726F6C 6F436D75 44007966 69646F4D
6F6C6F63 004D4F4F 5A5F5245 544E4900 74437465 73655200 4E4F4C4E 41500046
0067654E 5F724F5F 736F5000 65746968 775F646E 615F6B63 616C625F 726F5F72
52474554 4E490077 6F6C6C41 73695670 72616853 00776F6C 6C417465 4478614D
416B6365 68430073 7365636F 7250726F 74696E6F 4D004441 5247004E 4F495441
72764100 3074614D 67727641 00677276 4174696E 4900657A 69537461 4D677276
74696857 74696E49 00337461 4D677276 41003274 614D6772 76410031 74614D67
6E696F50 79746973 6E654400 746E696F 506B7261 4474696E 4900746E 696F5065
6E696F50 74726F62 4100746E 696F506C 65636E61 4300746E 696F5072 65540074
00544E49 4F505F44 4C4F0063 69507465 4700544E 494F505F 45544144 50550074
00594D43 445F4F44 4E550059 4D434C5F 4F444E55 004B594D 4344004B 594D434C
42006B63 616C425F 6B726144 5F77654E 006B6361 6C425F74 6867694C 5F77654E
44004C45 56454C5F 4B524144 0048544F 42004555 48004C45 56454C00 314B4341
69577065 52656E6F 54657361 72450048 544F425F 4B524144 00455548 5F4B5241
6144006C 61727475 654E7468 67697242 00747361 435F7469 6E490073 776F646E
00317261 425F6E65 704F006C 61727475 654E6F74 7541006C 61727475 654E6B72
61430074 7361435F 74726F62 41007473 61435F72 65540032 7261425F 6E65704F
66415F79 616C7073 69445F74 73614300 65676E61 68435F74 7361435F 6C65636E
756E614D 74696E49 0065726F 6665425F 79616C70 7369445F 74736143 00726574
614D6470 5500326C 6C415F6E 614D6470 5500316C 6C415F6E 614D6470 55006C61
64705500 31435F6E 614D6470 5500346C 6C415F6E 614D6470 5500336C 6C415F6E
614D6470 55003443 5F6E614D 64705500 33435F6E 614D6470 55003243 5F6E614D
5F6E614D 64705500 334D5F6E 614D6470 5500324D 5F6E614D 64705500 314D5F6E
33595F6E 614D6470 55003259 5F6E614D 64705500 31595F6E 614D6470 5500344D
55003252 5F6E614D 64705500 31525F6E 614D6470 55003459 5F6E614D 64705500
64705500 31475F6E 614D6470 55003452 5F6E614D 64705500 33525F6E 614D6470
614D6470 55003447 5F6E614D 64705500 33475F6E 614D6470 55003247 5F6E614D
5F6E614D 64705500 33425F6E 614D6470 55003242 5F6E614D 64705500 31425F6E
6665425F 79616C70 7369445F 6C61756E 614D006C 61756E61 4D5F7265 54003442
5F6C6563 6E614300 72657466 415F7961 6C707369 445F6C61 756E614D 0065726F
6554006B 73614D5F 74696E49 006C6175 6E614D5F 74657365 52006C61 756E614D
48534E55 004D554C 5F574F48 53006B73 614D5F6C 65636E61 43006B73 614D5F72
73616572 636E4900 6B73614D 5F726F6C 6F435F65 676E6168 43004D55 4C5F574F
5F657361 65726365 4400326B 73614D5F 65736165 72636E49 00316B73 614D5F65
5F686374 61435F74 696E4900 326B7361 4D5F6573 61657263 65440031 6B73614D
7461435F 6C65636E 61430074 6867694C 5F686374 61435F72 65540074 6867694C
6669646F 4D007468 67694C5F 68637461 435F7465 73655200 74686769 4C5F6863
72617453 5F746547 00747261 74536369 50746547 00737365 6E706565 74535F79
5F657461 64705500 68637461 435F6F4E 5F79616C 70736944 00746E69 6F505F74
65445F74 75500073 73656E74 68676972 425F6C61 626F6C47 0079616C 70736944
72465F79 7469736E 65445F65 74656C65 44006C65 6E61505F 6E495F79 7469736E
47457475 5000425F 53474574 696E4900 53474574 696E4900 6C656E61 505F6D6F
00534745 6C65636E 61430053 47456574 61647055 00534745 63695074 65470053
72470064 6172475F 74696E49 006E4F53 47450066 664F5347 45005347 45726554
64617247 00595F64 61724700 4D5F6461 72470043 5F646172 47006C6C 415F6461
00726574 66415F79 616C7073 69440065 726F6665 425F7961 6C707369 4400425F
5F646172 475F7465 73655200 64617247 5F6C6563 6E614300 64617247 5F726554

004D5F64 6172475F 65726F66 65420043 5F646172 475F6572 6F666542 006C6C41
6F666542 00425F64 6172475F 65726F66 65420059 5F646172 475F6572 6F666542
6E4F5F73 65767275 43006666 4F5F7365 76727543 006C6C41 5F646172 475F6572
47003174 72426461 72470066 664F5F77 61724400 73657672 75435F77 61724400
6F436461 72470034 74724264 61724700 33747242 64617247 00327472 42646172
746E6F43 64617247 0033746E 6F436461 72470032 746E6F43 64617247 0031746E
00336867 69486461 72470032 68676948 64617247 00316867 69486461 72470034
64617247 00326469 4D646172 47003164 694D6461 72470034 68676948 64617247
64616853 64617247 00316461 68536461 72470034 64694D64 61724700 3364694D
00317472 74536461 72470034 64616853 64617247 00336461 68536461 72470032
72470034 74727453 64617247 00337472 74536461 72470032 74727453 64617247
646E4564 61724700 33646E45 64617247 0032646E 45646172 47003164 6E456461
61724700 3379654B 64617247 00327965 4B646172 47003179 654B6461 72470034
65007263 755F3765 6E6F745F 646E6500 376C6E70 5F726165 6C630034 79654B64
67007263 75006163 755F3765 6E6F745F 646E6500 7263675F 37656E6F 745F646E
61637500 65746164 70755F72 63670065 74616470 755F7263 75006163 75007263
00726375 705F6E69 00627861 6D5F6E69 00626E69 6D5F6E69 00657461 6470755F
00635F61 63755F6E 6900625F 6163755F 6E690062 6174675F 6E690043 495F6E69
69676972 6F007263 755F6F64 6E750079 5F616375 5F6E6900 6D5F6163 755F6E69
74696E69 00726375 5F6C6563 6E616300 7263755F 76657270 00726375 5F6C616E
006C6C61 635F7263 75007263 755F6E61 63735F64 6E650072 63755F6E 6163735F
67006C6C 61635F72 63670066 65645F65 7661735F 72637500 65766173 5F726375
656C6966 5F776F64 6E697700 6665645F 65766173 5F726367 00657661 735F7263
6E6F7400 70726168 735F6F74 5F656E6F 74004E41 43535F44 4E450054 49584500
5F6E6163 006E6F69 7469736F 705F6F74 5F656E6F 7400726F 6C6F635F 6F745F65
4665746F 4E590072 65704F77 6F6C4674 6547006E 6F697469 736F705F 6F746F67
4F776F6C 4665746F 4E420072 65704F77 6F6C4665 746F4E4E 00726570 4F776F6C
00726570 4F776F6C 4665746F 4E480072 65704F77 6F6C4665 746F4E53 00726570
46007364 7750646F 4D00656D 616E5F64 77700072 65704F77 6F6C4665 746F4E52
44006B63 6F6C4250 57006C65 6E615073 74446572 6F747365 52006773 4D776F6C
6C427472 42006B63 6F6C4264 61724700 6B636F6C 42747361 43006B63 6F6C4250
0014E23D 0054C8B7 0014E234 0054C842 0014E22D 0054C826 0014E224 006B636F
0014E267 005471C3 0014E262 005471A6 0014E258 003C9540 0014E249 00545B17
0014E28B 005473C4 0014E282 005473B2 0014E279 005473A0 0014E270 0054738E
0014E2C9 00549DFE 0014E2BA 00549DDA 0014E2A4 00549D08 0014E293 005473D6
0014E30B 00549D5E 0014E2FC 00549E37 0014E2EC 00549E24 0014E2DB 00549E11
0014E32C 0054C6FE 0014E325 0054C6CE 0014E31E 0054C66E 0014E314 0054C69E
0014E34A 00549FBD 0014E342 00549FAA 0014E33A 0054C75E 0014E333 0054C72E
0014E368 00549F71 0014E361 00549F5E 0014E35A 00549FE3 0014E352 00549FD0
0014E38C 005458A2 0014E380 00545813 0014E376 00549F97 0014E36F 00549F84
0014E3D1 003C8883 0014E3BE 003C8E83 0014E3AA 00343445 0014E39A 005458EE
0014E40F 00546518 0014E405 005464E0 0014E3FB 00442BF8 0014E3E8 003C8896
0014E448 00546449 0014E439 00546361 0014E42A 0054634E 0014E41C 005460E0
0014E476 00546545 0014E46B 00546599 0014E45F 00546572 0014E455 005460F3
0014E4AA 002CF542 0014E49B 002CF3B8 0014E490 00442F66 0014E487 00443140
0014E4D8 00443C43 0014E4CE 00443737 0014E4C4 004434AF 0014E4BA 004444D4
0014E51E 002CF747 0014E509 002CF735 0014E4F5 00444306 0014E4E2 00443E36
0014E565 00542547 0014E553 0054267C 0014E541 0054B0DE 0014E52E 00442C96
0014E599 0054B93D 0014E58A 0054B76C 0014E57C 0054243B 0014E570 0054221E
0014E5CC 001CF1E8 0014E5C0 001CF8FB 0014E5B2 001CF1B0 0014E5A5 0054B95E
0014E602 00442711 0014E5FA 0044A1A3 0014E5E7 0044A050 0014E5D7 0044913E
0014E635 0044D40E 0014E61C 0054C994 0014E611 0054C92C 0014E609 00442388
0014E666 0044D34A 0014E65A 0044D3EC 0014E64C 0044D3CA 0014E640 0044D3A7
0014E694 002CDCE3 0014E68B 002CDCCE 0014E67A 0044D39E 0014E66B 0044CCA5
0014E6B8 002CDF25 0014E6AF 002CDE93 0014E6A6 002CDE01 0014E69D 002CDD6F
0014E6EB 002CDFB7 0014E6E2 003C1AA8 0014E6D5 002CB4CB 0014E6C7 002CB496
0014E716 002CB6BB 0014E70F 002CC45D 0014E702 002CE054 0014E6F7 002CE09E
0014E736 002CBF8F 0014E72C 002CC01C 0014E726 002CBBEB 0014E720 002CB795
0014E765 002CD19C 0014E75F 002CC2BF 0014E750 002CBE7E 0014E740 002CC3D0
0014E77F 002CD8E5 0014E774 002CD7AD 0014E76F 002CD678 0014E76B 002CD53E
0014E7B0 004492EC 0014E7A6 002CEB77 0014E792 002CDB4D 0014E788 002CDA1F
0014E7E0 004493E4 0014E7D6 00449B4E 0014E7CA 00449B3C 0014E7BE 00449B2A
0014E811 00449F2B 0014E7FE 00449E91 0014E7F3 00449DFC 0014E7EA 00449430
0014E84F 00445284 0014E843 004445C4 0014E838 004494C5 0014E824 0044947C

| | | | | | | | |
|---|---|---|---|---|---|---|---|
| 0014E87D | 0044474D | 0014E873 | 004452CC | 0014E867 | 004452B4 | 0014E85B | 0044529C |
| 0014E8A5 | 004447AD | 0014E89B | 00444795 | 0014E891 | 0044477D | 0014E887 | 00444765 |
| 0014E8CD | 0044480D | 0014E8C3 | 004447F5 | 0014E8B9 | 004447DD | 0014E8AF | 004447C5 |
| 0014E8F5 | 0044486D | 0014E8EB | 00444855 | 0014E8E1 | 0044483D | 0014E8D7 | 00444825 |
| 0014E91D | 004448CD | 0014E913 | 004448B5 | 0014E909 | 0044489D | 0014E8FF | 00444885 |
| 0014E945 | 0044492D | 0014E93B | 00444915 | 0014E931 | 004448FD | 0014E927 | 004448E5 |
| 0014E96E | 0044554B | 0014E963 | 00444975 | 0014E959 | 0044495D | 0014E94F | 00444945 |
| 0014E9B4 | 00445718 | 0014E9A7 | 004458E6 | 0014E999 | 00445834 | 0014E984 | 00445782 |
| 0014E9DC | 0044C3ED | 0014E9D3 | 0044C1FB | 0014E9C7 | 0044C11C | 0014E9BE | 0044BE56 |
| 0014EA17 | 0044CA02 | 0014EA08 | 0044C9CD | 0014E9F9 | 0044C8D6 | 0014E9E7 | 0044C43F |
| 0014EA56 | 003CDD1B | 0014EA46 | 003CD758 | 0014EA35 | 0044CA6C | 0014EA26 | 0044CA37 |
| 0014EA98 | 003CD92F | 0014EA8C | 003CF15D | 0014EA7B | 003CDF9D | 0014EA69 | 003CDE1F |
| 0014EADA | 002CEA7B | 0014EAC8 | 003CE6F8 | 0014EAB9 | 003CE5AF | 0014EAA8 | 003CD9BE |
| 0014EB1B | 003C042E | 0014EB11 | 003C0000 | 0014EB09 | 003C277F | 0014EAEF | 003C2131 |
| 0014EB40 | 003C0D16 | 0014EB36 | 003C0C30 | 0014EB2C | 003C0850 | 0014EB22 | 003C066D |
| 0014EB5E | 003401EE | 0014EB54 | 003C1946 | 0014EB4E | 003C18C2 | 0014EB47 | 003C0EA8 |
| 0014EB7C | 00341F42 | 0014EB75 | 00341F25 | 0014EB6E | 00341F0A | 0014EB67 | 00341F7C |
| 0014EBA9 | 00340923 | 0014EBA0 | 00340702 | 0014EB92 | 003405ED | 0014EB83 | 00341F5F |
| 0014EBE0 | 003423A3 | 0014EBD2 | 00342364 | 0014EBC4 | 00341FB2 | 0014EBB5 | 00340817 |
| 0014EC17 | 00342A53 | 0014EC0C | 00342460 | 0014EBFC | 00342421 | 0014EBEE | 003423E2 |
| 0014EC3F | 0034099C | 0014EC36 | 00342D25 | 0014EC2D | 00340501 | 0014EC21 | 00342A6A |
| 0014EC64 | 00340A10 | 0014EC5A | 003409F3 | 0014EC51 | 003409D6 | 0014EC48 | 003409B9 |
| 0014EC8C | 00340A84 | 0014EC82 | 00340A67 | 0014EC78 | 00340A4A | 0014EC6E | 00340A2D |
| 0014ECB3 | 00340AF8 | 0014ECAA | 00340ADB | 0014ECA0 | 00340ABE | 0014EC96 | 00340AA1 |
| 0014ECD8 | 00340B6C | 0014ECCE | 00340B4F | 0014ECC5 | 00340B32 | 0014ECBC | 00340B15 |
| 0014ED00 | 00340BE0 | 0014ECF6 | 00340BC3 | 0014ECEC | 00340BA6 | 0014ECE2 | 00340B89 |
| 0014ED27 | 00340C54 | 0014ED1E | 00340C37 | 0014ED14 | 00340C1A | 0014ED0A | 00340BFD |
| 0014ED4B | 00340CC8 | 0014ED42 | 00340CAB | 0014ED39 | 00340C8E | 0014ED30 | 00340C71 |
| 0014ED71 | 0034827A | 0014ED66 | 00340D1F | 0014ED5D | 00340D02 | 0014ED54 | 00340CE5 |
| 0014ED9F | 003C2A5E | 0014ED9B | 00348288 | 0014ED8D | 00348B82 | 0014ED7F | 00348738 |
| 0014EDBD | 003C2912 | 0014EDB2 | 003C2941 | 0014EDA7 | 003C2B1D | 0014EDA3 | 003C299F |
| 0014EDE0 | 003474B9 | 0014EDD8 | 00347128 | 0014EDD0 | 00346ECC | 0014EDC8 | 003C2970 |
| 0014EE00 | 003475E2 | 0014EDF7 | 003477C9 | 0014EDEE | 0034786D | 0014EDE6 | 0034730D |
| 0014EE28 | 003C2C55 | 0014EE1B | 003C2CED | 0014EE12 | 00347725 | 0014EE09 | 00347681 |
| 0014EE57 | 00349834 | 0014EE4A | 0034914E | 0014EE3C | 003C2BDC | 0014EE31 | 003C2CAA |
| 0014EE7F | 00541353 | 0014EE76 | 00541910 | 0014EE69 | 00541458 | 0014EE60 | 0054124E |
| 0014EEA6 | 00442BCF | 0014EEA1 | 002CF979 | 0014EE95 | 00541828 | 0014EE88 | 00541640 |
| 0014EEDC | 00442B74 | 0014EECB | 00442B61 | 0014EEBD | 00442B4E | 0014EEAF | 00442952 |
| 0014EF16 | 0034E52F | 0014EF08 | 0034E514 | 0014EEFA | 0034DAEA | 0014EEEE | 005465C0 |
| 0014EF4E | 0034E54A | 0014EF40 | 0034E597 | 0014EF32 | 0034E57C | 0014EF24 | 0034E561 |
| 0014EF77 | 0034E5C2 | 0014EF67 | 0034D04A | 0014EF5F | 0034F40A | 0014EF57 | 0034D99A |
| 0014EF9B | 0034ED1A | 0014EF91 | 0034ED32 | 0014EF87 | 0034ED94 | 0014EF7F | 0034ED63 |
| 2E726570 | 736E6564 | 2F737464 | 2F73656C | 69663A61 | 6D736972 | 703A012C | 0034ED02 |
| 00000000 | 00000000 | 00000000 | 00000000 | 00000066 | 25206625 | 00642500 | 62720068 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

```
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
20202020 20202020 20202020 20200000 00000000 00000000 00000000 00000000
20202020 20202020 20202020 20200073 25203A20 454D414E 00202020 20202020
20202020 20202020 20202020 20200073 25203A50 55544553 00202020 20202020
20202020 20202020 20202020 20200073 25203A52 4F4C4F43 00202020 20202020
20202020 20202020 20202020 20200073 25203A20 44415247 00202020 20202020
00000000 00000000 00000000 00000073 25203A20 204D5355 00202020 20202020
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 43584503 00000000 00000000 00000000 00000000 00000000 00000000
EC868D16 3474003D 838FC83E C52E0000 F7E886C7 0000F7EA 86C70008 30C85756
CC3EC52E 8FD036FF 2E8FD236 FF2E50F7 F8868D16 FF6A50F7 F2868D16 FF6A50F7
F7FEBE83 F7FE86FF 04EB0000 F7FE86C7 77EB18C4 83001C92 1A9A35FF 0275FF8F
898FD61E 8E2E8FD4 3E032E02 E7C1F7FE BE8B02C4 830054DB E89A4000 68237D03
2E8FD236 FF2E35FF 0275FF8F CC3EC52E 026A066A 50F7F886 8D16D2EB 02558905
9AF7F8B6 FF006A00 6A006A00 6A147400 F7F8BE83 10C48300 34A1509A 8FD036FF
FEBE8B01 51E9037C 04F7FEBE 83F7FE86 FF04EB00 00F7FE86 C70AC483 0054C048
BE8B2175 0054968A 9A8FE01E DC2E9B05 D99B8FDA 1E8E2E8F D83E032E 02E7C1F7
56B07400 54968A9A 8FE81EDC 2E9B05D9 9B8FDE1E 8E2E8FDC 3E032E02 E7C1F7FE
2E8FF006 032E09E0 C1F7FE86 8B505208 002DC703 5A16C58B 09E7C1F7 FEBE8B57
FEBE8B00 0105C78F F83EC52E 5E5F0054 DE289A35 FF8FF43E C52E5052 8FF2168B
3E032E02 E7C1F7FE BE8BF7E0 9ED99B05 D99B8FDA 1E8E2E8F D83E032E 02E7C1F7
8FDA1E8E 2E8FD83E 032E02E7 C1F7FEBE 8BF7DC9E D99B05D9 9B8FDE1E 8E2E8FDC
1DD99BEE D99B8FDE 1E8E2E8F DC3E032E 02E7C1F7 FEBE8B1D D99B8FE0 06DD2E9B
868BF7E4 B6FFF7E6 B6FF8FFC 36FF2E8F FE36FF2E F7FEB6FF 006A50F7 F8868D16
02E7C1F7 FEBE8B14 C483003C 99589A50 528FF216 8B2E8FF0 06032E09 E0C1F7FE
8E2E8FDC 3E032E02 E7C1F7FE BE8B1DD9 9BF7E086 D99B8FDA 1E8E2E8F D83E032E
058B9006 1E8E2E90 043E032E E7D1F7FE BE8BFEA1 E91DD99B F7DC86D9 9B8FDE1E
1E8E2E90 0C3E032E E7D1F7FE BE8B0589 90021E8E 2E90003E 032EE7D1 F7FEBE8B
3E032E02 E7C1F7FE BE8B0589 900A1E8E 2E90083E 032EE7D1 F7FEBE8B 058B900E
BE8B1DD9 9B90121E 8E2E9010 3E032E02 E7C1F7FE BE8B05D9 9B90161E 8E2E9014
8E2E9018 3E032E02 E7C1F7FE BE8B05D9 9B901E1E 8E2E901C 3E032E02 E7C1F7FE
F7FE86C7 0630E903 75013D80 90243EC5 2E000205 C790203E C52E1DD9 9B901A1E
068E2E90 2C36032E E6D1F7FE B68B0153 E9037C03 F7FEBE83 F7FE86FF 04EB0000
8B0001F7 EA86C706 74043B26 058B902A 1E8E2E90 283E032E E7D1F7FE BE8B902E
8B90321E 8E2E9030 3E032EE7 D1F7FEBE 8B903606 8E2E9034 36032EE6 D1F7FEB6
05D99B90 3A1E8E2E 90383E03 2E02E7C1 F7FEBE8B 0001F7EA 86C70674 043B2605
2E90443E 032E02E7 C1F7FEBE 8B0001F7 EA86C706 74005496 8A9A903C 1EDC2E9B
E7C1F7FE BE8B0001 F7EA86C7 06740054 968A9A90 3C1EDC2E 9B05D99B 90461E8E
01F7EA86 C7067400 54968A9A 903C1EDC 2E9B05D9 9B904A1E 8E2E9048 3E032E02
```

0054968A 9A903C1E DC2E9B05 D99B8FFE 1E8E2E8F FC3E032E 02E7C1F7 FEBE8B00
1EDC2E9B 05D99B90 4E1E8E2E 904C3E03 2E02E7C1 F7FEBE8B 0001F7EA 86C70674
905A1E8E 2E90583E 032E02E7 C1F7FEBE 8B0001F7 EA86C706 74005496 8A9A9050
05C7905C 3EC52E00 01F7EA86 C7FEB1E9 03750054 968A9A90 3C1EDC2E 9B05D99B
905C3EC5 2E097400 54968A9A 903C1EDC 2E9B0C45 D99B9058 3EC52EFE 9FE90001
83F7FE86 FF04EB00 00F7FE86 C7023DE9 03740001 3D058B90 5C3EC52E 000105C7
E7C1F7FE BE8BE6D1 358B9066 1E8E2E90 643E032E E7D1F7FE BE8B3D7D 04F7FEBE
8990621E 8E2E9060 3E032EE7 D1F7FEBE 8B058BFE 038FF21E 8E2E8FF0 3E032E09
86FF04EB 0000F7FE 86C700D6 E9037400 3D838FC8 3EC52E00 00F7FA86 C7B8EB05
001505C7 906A1E8E 2E90683E 032EE7D1 F7FEBE8B 0164E903 7C03F7FE BE83F7FE
F08B01A0 F7FE8669 02E7C103 EF833F8B 906A1E8E 2E90681E 032EE3D1 F7FE9E8B
9B05DF9B 906E1E8E 2E906C3E 032EE7D1 F7FEBE8B F7039072 068E2E90 7036032E
8E2E9068 1E032EE3 D1F7FE9E 8B000205 C7905C3E C52E0973 0054968A 9A1CD826
8BF70390 72068E2E 90703603 2EF08B01 A0F7FE86 6902E7C1 03EF833F 8B906A1E
FF3EE903 74005496 8A9A1CD8 269B05DF 9B906E1E 8E2E906C 3E032EE7 D1F7FEBE
E9037C03 F7FEBE83 F7FE86FF 04EB0000 F7FE86C7 FF32E9F7 FA868940 F7FA868B
032EF08B 01A0F7FE 86690068 05C7906A 1E8E2E90 683E032E E7D1F7FE BE8B008E
085CD826 9B05DF9B 906E1E8E 2E906C3E 032EE7D1 F7FEBE8B 9072068E 2E907036
068E2E90 7036032E F08B01A0 F7FE8669 000205C7 905C3EC5 2E097300 54968A9A
74005496 8A9A085C D8269B05 DF9B906E 1E8E2E90 6C3E032E E7D1F7FE BE8B9072
000305C7 905C3EC5 2E097503 F7FABE83 FF64E9F7 FA868940 F7FA868B FF70E903
FF906C3E C52E0275 FF906C3E C52E0475 FF906C3E C52E3074 003D8090 743EC52E
2E907E36 FF2E0CC4 8300544A 8A9A9078 36FF2E90 7A36FF2E 35FF905C 3EC52E35
FF905C3E C52E1974 003D8090 743EC52E 04C48300 549BD59A 50001205 907C068B
00120590 7C068B2E 907E36FF 2E06C483 00544A8A 9A908036 FF2E9082 36FF2E35
99058B90 883EC52E 001C32C4 9A0219E9 037401F7 EABE8304 C4830054 9BD59A50
3D838FC8 3EC52E04 C4830054 AEFA9A50 52025589 05890255 13050390 843EC52E
F7FE86C7 F7FC8689 02E0C1F7 D8868B00 68F7D886 C706EB00 15F7D886 C7087500
8B906A1E 8E2E9068 3E032EE7 D1F7FEBE 8B7B7D03 F7FEBE83 F7FE86FF 04EB0000
2E01A0F7 FE866950 52908E16 8B2E908C 06032E01 A0F7FE86 69575605 89F7D886
032E01A0 F7FE8669 57565E5F 0054DE28 9AF7FCB6 FF505290 72168B2E 90700603
F7FCB6FF 50529096 168B2E90 9406032E 01A0F7FE 86695052 9092168B 2E909006
55130503 90843EC5 2E99058B 90883EC5 2E001C34 F99AFF7A E95E5F00 54DE289A
883EC52E F7FE86FF 04EB0001 F7FE86C7 04C48300 54AEFA9A 50520255 89058902
2E0CF7FE 866B5052 909E168B 2E909C06 032E0CF7 FE866B2C 7F053BF7 FE868B90
FF8FCC3E C52E001C 0B4C9AC3 EB08C483 001C306E 9A505290 9A168B2E 90980603
05890255 13050390 843EC52E 99058B90 883EC52E 04C48300 1C3A4A9A 35FF0275
003C7B9F 9A006A35 FF0275FF 8FCC3EC5 2E036A04 C4830054 AEFA9A50 52025589
D1F7FEBE 8B717D04 F7FEBE83 F7FE86FF 04EB0000 F7FE86C7 0044D431 9A08C483
3E032EE7 D1F7FEBE 8B12EB00 FFB8057D 00FF3D05 8B90321E 8E2E9030 3E032EE7
2E02E7C1 F7FEBE8B F7D09EDD 9B90A806 DF2E9BF7 DA868905 8B90321E 8E2E9030
3E032E02 E7C1F7FE BE8B15D9 9BF7D0B6 DC9BF7DA 86DF9B90 A61E8E2E 90A43E03
00F7FE86 C7009AE9 03740001 3D058B8F F83EC52E 84EB1DD9 9B90A21E 8E2E90A0
F7FEBE8B F7D09EDD 9B90A806 DF2E9B00 84E9037E 03F7FEBE 83F7FE86 FF04EB00
F7FEBE8B 21750054 968A9AF7 D09EDC9B 05D99B8F DA1E8E2E 8FD83E03 2E02E7C1
8B5756A6 74005496 8A9A8FE8 1EDC2E9B 05D99B8F DE1E8E2E 8FDC3E03 2E02E7C1
2DC7035A 16C58B09 E7C1F7FE BE8B5052 8FF2168B 2E8FF006 032E09E0 C1F7FE86
0002B999 058B9088 3EC52EFF 6EE95E5F 0054DE28 9A35FF8F F43EC52E 50520800
7400F7EA BE8304C4 830054AE FA9A5052 02558905 8990843E C52EFAE2 D2D1E0D1
7406443B 2606458B 90283EC5 2E902C36 C42E00DA E9037401 3D809024 3EC52E0D
0001F7E8 86C70674 06443B26 06458B90 303EC52E 903436C4 2E0001F7 E886C706
443EC52E 0001F7E8 86C70674 0054968A 9A903C1E DC2E9B0C 45D99B90 383EC52E
45D99B90 483EC52E 0001F7E8 86C70674 0054968A 9A903C1E DC2E9B0C 45D99B90
DC2E9B0C 45D99B8F FC3EC52E 0001F7E8 86C70674 0054968A 9A903C1E DC2E9B0C
9A90501E DC2E9B0C 45D99B90 4C3EC52E 0001F7E8 86C70674 0054968A 9A903C1E
0054968A 9A903C1E DC2E9B0C 45D99B90 583EC52E 0001F7E8 86C70674 0054968A
00013D05 8B8FF83E C52E0C74 01F7E8BE 83137401 F7EABE83 0001F7EA 86C70674
0390843E C52E9905 8B90883E C52E04C4 83001C5C 159AF7EA B6FFF7E8 B6FF1075
36FF2E12 74003D80 90743EC5 2E04C483 0054AEFA 9A505202 55890589 02551305
9BD59A50 00120590 7C068B2E 907E36FF 2E04C483 00544A8A 9A90AA36 FF2E90AC
018C46C7 00E68E46 C7003290 46C70000 B8C85756 CB5E5FC9 9BC02B04 C4830054
1274003D 8090743E C52EFF5C 9ED99B90 B606DF2E 9B805ED9 9B90AE06 DD2E9B00
50001205 907C068B 2E907E36 FF2E04C4 8300544A 8A9A90B8 36FF2E90 BA36FF2E
8390C03E C52E04C4 830054A4 509A35FF 0275FF90 BC3EC52E 04C48300 549BD59A

3EC52E0A EB884689 48058B90 883EC52E 0D740002 3D058B90 5C3EC52E 1975003D
C52E0001 9A46C700 028A46C7 0566E903 74003D83 90C43EC5 2E884689 058B9088
CA1E8E2E 90C83E03 2E02E7C1 8C7E8B08 45D99B90 703EC52E 5D75003D 838FC83E
D99B90CA 1E8E2E90 C83E032E 02E7C18C 7E8B01A8 85D99B90 703EC52E 1DD99B90
9DD99B90 CA1E8E2E 90C83E03 2E02E7C1 8C7E8B03 4885D99B 90703EC5 2E048C9D
8B05D99B 90721E8E 2E90703E 032E02E7 C103EF83 3D8B9068 3EC52E00 8FE90918
2E02E7C1 03EF833D 8B90683E C52E1DD9 9B90CA1E 8E2E90C8 3E032E02 E7C18C7E
D99B90CA 1E8E2E90 C83E032E 02E7C18C 7E8B01A0 85D99B90 721E8E2E 90703E03
8B034085 D99B9072 1E8E2E90 703E032E 02E7C103 EF833D8B 90683EC5 2E048C9D
2E909C36 032EF08B 0C9A466B 09189DD9 9B90CA1E 8E2E90C8 3E032E02 E7C18C7E
0054968A 9A1CD826 9B05D99B 909A1E8E 2E90983E 032EF88B 0C9A466B 909E068E
90983E03 2EF88B0C 9A466B90 9E068E2E 909C3603 2EF08B0C 9A466B01 6BE90374
032EF08B 0C9A466B 0138E903 74005496 8A9A045C D8269B04 45D99B90 9A1E8E2E
5CD8269B 0845D99B 909A1E8E 2E90983E 032EF88B 0C9A466B 909E068E 2E909C36
7E8B0845 D99B9070 3EC52E63 75003D83 8FC83EC5 2E0105E9 03740054 968A9A08
478C7E8B 01A885D9 9B90703E C52E1DD9 9B90CE1E 8E2E90CC 3E032E02 E7C1478C
478C7E8B 034885D9 9B90703E C52E062C 9DD99B90 CE1E8E2E 90CC3E03 2E02E7C1
833D8B90 683EC52E 0367E98C 46FF0C58 9DD99B90 CE1E8E2E 90CC3E03 2E02E7C1
8E2E90CC 3E032E02 E7C1478C 7E8B05D9 9B90721E 8E2E9070 3E032E02 E7C103EF
85D99B90 721E8E2E 90703E03 2E02E7C1 03EF833D 8B90683E C52E1DD9 9B90CE1E
833D8B90 683EC52E 062C9DD9 9B90CE1E 8E2E90CC 3E032E02 E7C1478C 7E8B01A0
90CC3E03 2E02E7C1 478C7E8B 034085D9 9B90721E 8E2E9070 3E032E02 E7C103EF
EB000092 46C79C5E D99B90D0 06DF2E9B 02CFE98C 46FF0C58 9DD99B90 CE1E8E2E
90BC3EC5 2EB44689 B64689B8 46899246 8B01BDE9 037C9046 3B92468B 9246FF03
46FF03EB 00009846 C70CC483 00545B78 9A50B446 8D1650AC 468D1635 FF0275FF
C71F16FD 03E7D198 7E8BE87D 00AC7D83 1F16FD03 E7D1987E 8B1F7D04 987E8398
9ED99B25 D89BAC46 DF9B909A 1E8E2E90 983E032E F88B0C9A 466BD8EB 0000AC45
6BFF789E D99B0465 D89BAE46 DF9B909A 1E8E2E90 983E032E F88B0C9A 466BFF7C
9BEED99B FF749ED9 9B0865D8 9BB046DF 9B909A1E 8E2E9098 3E032EF8 8B0C9A46
7C86D99B 08EBFF7C 86D99B07 76005496 8A9AFF50 9EDC9BFF 7C86D99B FF509EDD
0054968A 9AFF509E DC9BFF78 86D99BFF 509EDD9B EED99BFF 709ED99B E0D99BFF
D99BFF50 9EDD9BEE D99BFF6C 9ED99BE0 D99BFF78 86D99B08 EBFF7886 D99B0776
D99BE0D9 9BFF7486 D99B08EB FF7486D9 9B077600 54968A9A FF509EDC 9BFF7486
FF6C86D9 9B05EBFF 7086D99B 07760054 968A9AFF 6C9ED89B FF7086D9 9BFF689E
9BFF6886 D99B05EB A046D99B 06760054 968A9AFF 689ED89B A046D99B A05ED99B
9A90AE1E DC2E9BA0 46D99BFE 6CE90376 0054968A 9A9C5ED8 9BA046D9 9BA05ED9
5ED99BB6 46DF9BE4 5ED99BB4 46DF9B9C 5ED99BA0 46D99BFE 58E90376 0054968A
FF509EDC 9B9C46D9 9BFF509E DD9B90B6 06DF2E9B FE35E9EC 5ED99BB8 46DF9BE8
8B1DD99B E446D99B 90CE1E8E 2E90CC3E 032E02E7 C1478C7E 8B527700 54968A9A
02E7C147 8C7E8B06 2C9DD99B E846D99B 90CE1E8E 2E90CC3E 032E02E7 C1478C7E
C52E50E4 468D1600 86E98C46 FF0C589D D99BEC46 D99B90CE 1E8E2E90 CC3E032E
0CC48300 44DF9B9A 5052909A 168B2E90 9806032E 0C9A466B 35FF0275 FF90BC3E
D99BE446 D99B90CE 1E8E2E90 CC3E032E 02E7C147 8C7E8B56 7500FC7E 83FC4689
C1478C7E 8B062C9D D99BE846 D99B90CE 1E8E2E90 CC3E032E 02E7C147 8C7E8B1D
8B00018A 46C705EB 8C46FF0C 589DD99B EC46D99B 90CE1E8E 2E90CC3E 032E02E7
FF90BC3E C52E50E4 468D1602 2FE9037E 88463B9A 468B9A46 FF03EB9A 46898A46
2EFC4689 0CC48300 44DF9B9A 5052909A 168B2E90 9806032E 0C9A466B 35FF0275
A77500FC 7E8304C4 830054AE FA9A5052 00025583 01058302 558B058B 90843EC5
9A505290 9E168B2E 909C0603 2E0C9A46 6B35FF02 75FF90BC 3EC52E50 F0468D16
8E2E90C8 3E032E02 E7C18C7E 8BFF74E9 037400FE 7E83FE46 890CC483 0044DF9B
D99BF446 D99B90CA 1E8E2E90 C83E032E 02E7C18C 7E8B1DD9 9BF046D9 9B90CA1E
478C7E8B 09189DD9 9BF846D9 9B90CA1E 8E2E90C8 3E032E02 E7C18C7E 8B048C9D
90CC3E03 2E02E7C1 478C7E8B 1DD99BE4 46D99B90 CE1E8E2E 90CC3E03 2E02E7C1
9B90CE1E 8E2E90CC 3E032E02 E7C1478C 7E8B062C 9DD99BE8 46D99B90 CE1E8E2E
7C03967E 839646FF 03EB0000 9646C701 0DE9037F 018C7E83 0C589DD9 9BEC46D9
768BDF03 90CA068E 2E90C81E 032ED88B 048C9646 6902E7C1 4F8C7E8B 00FAE903
8A9A1FD8 269B05D9 9BFE0390 CA1E8E2E 90C83E03 2EF88B04 8C964669 02E6C18C
9BFE0390 CA1E8E2E 90C83E03 2EF88B04 8C964669 02E6C14E 8C768B39 73005496
7E8B1DD9 9BFE0390 CA1E8E2E 90C83E03 2EF88B04 8C964669 02E6C18C 768B05D9
466902E6 C1468C76 8BDF0390 CE068E2E 90CC1E03 2ED88B06 2C964669 02E7C18C
E9037200 54968A9A 1FD8269B 05D99BFE 0390CE1E 8E2E90CC 3E032EF8 8B062C96
768B05D9 9BFE0390 CE1E8E2E 90CC3E03 2EF88B06 2C964669 02E6C18C 768BFF36
46FFFEFA E91DD99B FE0390CE 1E8E2E90 CC3E032E F88B062C 96466902 E6C1468C
0758E903 7500023D 058B905C 3EC52E07 67E90374 003D8390 C03EC52E FDC3E98C

EF833D8B 90683EC5 2E0091E9 0374003D 838FC83E C52E9A46 89058B90 883EC52E
CA1E8E2E 90C83E03 2E02E7C1 8C7E8B05 D99B9072 1E8E2E90 703E032E 02E7C103
01A085D9 9B90721E 8E2E9070 3E032E02 E7C103EF 833D8B90 683EC52E 1DD99B90
C103EF83 3D8B9068 3EC52E04 8C9DD99B 90CA1E8E 2E90C83E 032E02E7 C18C7E8B
CA1E8E2E 90C83E03 2E02E7C1 8C7E8B03 4085D99B 90721E8E 2E90703E 032E02E7
CA1E8E2E 90C83E03 2E02E7C1 8C7E8B08 45D99B90 703EC52E 5AEB0918 9DD99B90
D99B90CA 1E8E2E90 C83E032E 02E7C18C 7E8B01A8 85D99B90 703EC52E 1DD99B90
9DD99B90 CA1E8E2E 90C83E03 2E02E7C1 8C7E8B03 4885D99B 90703EC5 2E048C9D
1E8E2E90 983E032E F88B0C9A 466B909E 068E2E90 9C36032E F08B0C9A 466B0918
8E2E909C 36032EF0 8B0C9A46 6B016EE9 03740054 968A9A1C D8269B05 D99B909A
54968A9A 045CD826 9B0445D9 9B909A1E 8E2E9098 3E032EF8 8B0C9A46 6B909E06
983E032E F88B0C9A 466B909E 068E2E90 9C36032E F08B0C9A 466B013B E9037400
3D838FC8 3EC52E01 08E90374 0054968A 9A085CD8 269B0845 D99B909A 1E8E2E90
05D99B90 721E8E2E 90703E03 2E02E7C1 03EF833D 8B90683E C52E0098 E9037400
E7C103EF 833D8B90 683EC52E 1DD99B90 CE1E8E2E 90CC3E03 2E02E7C1 478C7E8B
CE1E8E2E 90CC3E03 2E02E7C1 478C7E8B 01A085D9 9B90721E 8E2E9070 3E032E02
85D99B90 721E8E2E 90703E03 2E02E7C1 03EF833D 8B90683E C52E062C 9DD99B90
C52E0404 E98C46FF 0C589DD9 9B90CE1E 8E2E90CC 3E032E02 E7C1478C 7E8B0340
90703EC5 2E1DD99B 90CE1E8E 2E90CC3E 032E02E7 C1478C7E 8B0845D9 9B90703E
90703EC5 2E062C9D D99B90CE 1E8E2E90 CC3E032E 02E7C147 8C7E8B01 A885D99B
A1E98C46 FF0C589D D99B90CE 1E8E2E90 CC3E032E 02E7C147 8C7E8B03 4885D99B
2E90CC36 032E02E6 C18C768B 00CFE903 7D028C7E 839C5ED9 9B90D006 DF2E9B03
968A9A06 2C9CD826 9B05D99B 90CE1E8E 2E90CC3E 032E02E7 C18C7E8B 90CE068E
5496EF9A 0054968F 9A05D99B 90CE1E8E 2E90CC3E 032E02E7 C18C7E8B 22760054
0054968F 9A062C85 D99B90CE 1E8E2E90 CC3E032E 02E7C18C 7E8B22EB 08C48300
9B8E46DF 9B90CE1E 8E2E90CC 3E032E02 E7C18C7E 8B8E4689 08C48300 5496EF9A
7E8B22EB 08C48300 5496EF9A 0054968F 9A8E46DF 9B137600 54968A9A 0C589DD8
08C48300 5496EF9A 0054968F 9A0C5885 D99B90CE 1E8E2E90 CC3E032E 02E7C18C
4689B846 8992468B 01BFE903 7F8E463B 92468B92 4EFF03EB 00FF9246 C78E4689
0CC48300 545B789A 50B4468D 1650AC46 8D1635FF 0275FF90 BC3EC52E B44689B6
7E00FF3D AC458B1F 16FD03E7 D1987E8B 217D0498 7E839846 FF03EB00 009846C7
9A1E8E2E 90983E03 2EF88B0C 9A466BD6 EB00FFAC 45C71F16 FD03E7D1 987E8BE6
46DF9B90 9A1E8E2E 90983E03 2EF88B0C 9A466BFF 7C9ED99B 25D89BAC 46DF9B90
D89BB046 DF9B909A 1E8E2E90 983E032E F88B0C9A 466BFF78 9ED99B04 65D89BAE
07760054 968A9AFF 509EDC9B FF7C86D9 9BFF509E DD9BEED9 9BFF749E D99B0865
7886D99B FF509EDD 9BEED99B FF709ED9 9BE0D99B FF7C86D9 9B08EBFF 7C86D99B
6C9ED99B E0D99BFF 7886D99B 08EBFF78 86D99B07 76005496 8A9AFF50 9EDC9BFF
EBFF7486 D99B0776 0054968A 9AFF509E DC9BFF74 86D99BFF 509EDD9B EED99BFF
9B077600 54968A9A FF6C9ED8 9BFF7086 D99BFF68 9ED99BE0 D99BFF74 86D99B08
9B067600 54968A9A FF689ED8 9BA046D9 9BA05ED9 9BFF6C86 D99B05EB FF7086D9
FE6AE903 76005496 8A9A9C5E D89BA046 D99BA05E D99BFF68 86D99B05 EBA046D9
B446DF9B 9C5ED99B A046D99B FE56E903 76005496 8A9A90AE 1EDC2E9B A046D99B
9EDD9B90 B606DF2E 9BFE33E9 EC5ED99B B846DF9B E85ED99B B646DF9B E45ED99B
8E2E90CC 3E032E02 E7C1478C 7E8B5177 0054968A 9AFF509E DC9B9C46 D99BFF50
9BE846D9 9B90CE1E 8E2E90CC 3E032E02 E7C1478C 7E8B1DD9 9BE446D9 9B90CE1E
46FF0C58 9DD99BEC 46D99B90 CE1E8E2E 90CC3E03 2E02E7C1 478C7E8B 062C9DD9
909A168B 2E909806 032E0C9A 466B35FF 0275FF90 BC3EC52E 50E4468D 167FEB8C
2E90CC3E 032E02E7 C1478C7E 8B4F7500 FC7E83FC 46890CC4 830044DF 9B9A5052
E846D99B 90CE1E8E 2E90CC3E 032E02E7 C1478C7E 8B1DD99B E446D99B 90CE1E8E
FF0C589D D99BEC46 D99B90CE 1E8E2E90 CC3E032E 02E7C147 8C7E8B06 2C9DD99B
7E8B00FA E9037C03 987E8398 46FF03EB 00009846 C7010DE9 037F018C 7E838C46
466902E6 C1468C76 8BDF0390 CE068E2E 90CC1E03 2ED88B06 2C984669 02E7C18C
8B397300 54968A9A 1FD8269B 05D99BFE 0390CE1E 8E2E90CC 3E032EF8 8B062C98
C1468C76 8B05D99B FE0390CE 1E8E2E90 CC3E032E F88B062C 98466902 E6C18C76
6902E7C1 4F8C7E8B 1DD99BFE 0390CE1E 8E2E90CC 3E032EF8 8B062C98 466902E6
2EF88B04 8C984669 02E6C18C 768BDF03 90CA068E 2E90C81E 032ED88B 048C9846
4E8C768B FF36E903 72005496 8A9A1FD8 269B05D9 9BFE0390 CA1E8E2E 90C83E03
6902E6C1 8C768B05 D99BFE03 90CA1E8E 2E90C83E 032EF88B 048C9846 6902E6C1
FF03EB00 009A46C7 FEFAE91D D99BFE03 90CA1E8E 2E90C83E 032EF88B 048C9846
2EE0EB05 89488C46 8B90D41E 8E2E90D2 3E032EE7 D19A7E8B 177D039A 7E839A46
2E029CE9 037C049A 7E839A46 FF03EB00 009A46C7 0CFBE903 75003D83 905C3EC5
54968F9A 05D99B90 DC1E8E2E 90DA3E03 2E02E7C1 9A7E8B2D 74003D80 90743EC5
907C068B 2E907E36 FF2E0EC4 8300544A 8A9A90D6 36FF2E90 D836FF2E 9A76FF00
E23E032E 02E7C19A 7E8B2D74 003D8090 743EC52E 04C48300 549BD59A 50001205

00544A8A 9A90DE36 FF2E90E0 36FF2E9A 76FF0054 968F9A05 D99B90E4 1E8E2E90
2E09E7C1 9A7E8B04 C4830054 9BD59A50 00120590 7C068B2E 907E36FF 2E0EC483
8FF03E03 2E09E7C1 9A7E8B00 DEE90375 00FF3D01 FE858B8F F21E8E2E 8FF03E03
9A7E8B1D D99B90DC 1E8E2E90 DA3E032E 02E7C19A 7E8B01FE 85DF9B8F F21E8E2E
2D74003D 8090743E C52E1DD9 9B8FE006 DD2E9B90 E41E8E2E 90E23E03 2E02E7C1
90E836FF 2E9A76FF 0054968F 9A05D99B 90DC1E8E 2E90DA3E 032E02E7 C19A7E8B
00549BD5 9A500012 05907C06 8B2E907E 36FF2E0E C4830054 4A8A9A90 E636FF2E
05D99B90 E41E8E2E 90E23E03 2E02E7C1 9A7E8B2D 74003D80 90743EC5 2E04C483
2E907E36 FF2E0EC4 8300544A 8A9A90EA 36FF2E90 EC36FF2E 9A76FF00 54968F9A
8C7E838C 4EFF03EB 00FF8C46 C7FE60E9 04C48300 549BD59A 50001205 907C068B
7400FF3D 058BFE03 8FF21E8E 2E8FF03E 032E09E7 C19A7E8B E6D18C76 8B1E7E00
9EDD9BE8 D99B1DD9 9B8FE006 DD2E9B90 DC1E8E2E 90DA3E03 2E02E7C1 9A7E8BD9
C52E1DD9 9BFF5086 DC9B8C46 DF9B90E4 1E8E2E90 E23E032E 02E7C19A 7E8BFF50
0054968F 9A05D99B 90DC1E8E 2E90DA3E 032E02E7 C19A7E8B 2D74003D 8090743E
05907C06 8B2E907E 36FF2E0E C4830054 4A8A9A90 EE36FF2E 90F036FF 2E9A76FF
90E23E03 2E02E7C1 9A7E8B2D 74003D80 90743EC5 2E04C483 00549BD5 9A500012
8300544A 8A9A90F2 36FF2E90 F436FF2E 9A76FF00 54968F9A 05D99B90 E41E8E2E
90743EC5 2EFD58E9 04C48300 549BD59A 50001205 907C068B 2E907E36 FF2E0EC4
7C068B2E 907E36FF 2E04C483 00544A8A 9A90F636 FF2E90F8 36FF2E12 74003D80
049A7E83 9A46FF03 EB00009A 46C70001 FC46C704 C4830054 9BD59A50 00120590
C4830054 4A8A9A90 FA36FF2E 90FC36FF 2E127400 3D809074 3EC52E00 CFE9037C
74003D80 90743EC5 2E04C483 00549BD5 9A500012 05907C06 8B2E907E 36FF2E04
0036FF2E 9A76FF00 54968F9A 05D99B90 DC1E8E2E 90DA3E03 2E02E7C1 9A7E8B2D
549BD59A 50001205 907C068B 2E907E36 FF2E0EC4 8300544A 8A9A90FE 36FF2E91
D99B90E4 1E8E2E90 E23E032E 02E7C19A 7E8B2D74 003D8090 743EC52E 04C48300
907E36FF 2E0EC483 00544A8A 9A910236 FF2E9104 36FF2E9A 76FF0054 968F9A05
C52E9106 36FF2E91 0836FF2E FF25E904 C4830054 9BD59A50 00120590 7C068B2E
FE7E83FE 46890CC4 830044DF 9B9A90DA 36FF2E90 DC36FF2E 35FF0275 FF90BC3E
E236FF2E 90E436FF 2E35FF02 75FF90BC 3EC52E91 0A36FF2E 910C36FF 2E297500
36C42E01 4EE90374 00FF66BE 83FF6686 89FC468B FC46890C C4830044 DF9B9A90
9B910A3E C52E906C 36C42EFF 509EDD9B 0264DE26 9B0445D9 9B910A3E C52E906C
9B05D99B 910A3EC5 2E906C36 C42E1373 0054968A 9AFF509E DC9B24DE 269B05D9
36C42EFF 589ED99B 0264DE26 9B0445D9 9B910A3E C52E906C 36C42E13 EB24DE26
9AFF509E DC9BFF58 86D99BFF 509EDD9B 0464DE26 9B0845D9 9B910A3E C52E906C
0464DE26 9B0845D9 9B910A3E C52E906C 36C42E13 EBFF5886 D99B0773 0054968A
46C76976 0054968A 9AFF509E DC9BFF58 86D99BFF 509EDD9B EED99BFF 589ED99B
906E068E 2E906C36 032EE6D1 9A768B01 A2E9037C 039A7E83 9A46FF03 EB00009A
5C86D99B FF509EDD 9B24DE26 9B05D99B 910C1E8E 2E910A3E 032E02E7 C19A7E8B
16FD03E7 D19A7E8B 08C48300 5496EF9A 0054968F 9AFF58B6 D89BFF50 8EDC9BFF
03E7D19A 7E8B0139 E9037C03 9A7E839A 46FF03EB 00009A46 C79EEBFF 6085891F
052B00FF B8906C3E C52E0275 2B00FFBE 906C3EC5 2EE3EB00 01FF6085 C71F16FD
FFB8906C 3EC52E14 EB02C483 0054969D 9A50052B 00FFB890 6C3EC52E 157DC63B
9D9A5004 452B00FF B8906C3E C52EFF58 9ED99B02 C4830054 969D9A50 02452B00
5886D99B 07730054 968A9AFF 509EDC9B FF5886D9 9BFF509E DD9B02C4 83005496
9BEED99B FF589ED9 9B02C483 0054969D 9A500445 2B00FFB8 906C3EC5 2E14EBFF
839A46FF 03EB0000 9A46C75D 76005496 8A9AFF50 9EDC9BFF 5886D99B FF509EDD
83005496 9D9A5005 2B00FFB8 906E1E8E 2E906C3E 032EE7D1 9A7E8B6E 7D039A7E
005496EF 9A005496 8F9AFF58 B6D89BFF 508EDC9B FF5C86D9 9BFF509E DD9B02C4
039A7E83 9A46FF03 EB00009A 46C7AAEB FF608589 1F16FD03 E7D19A7E 8B08C483
C7327400 033D058B 905C3EC5 2EE6EB00 01FF6085 C71F16FD 03E7D19A 7E8B117D
DF9B906E 1E8E2E90 6C3E032E E7D19A7E 8B6A7D03 9A7E839A 46FF03EB 00009A46
7D039A7E 839A46FF 03EB0000 9A46C7D5 EBF05DD9 9B1F16FD 0302E7C1 9A7E8B05
FF608403 26058B90 6E1E8E2E 906C3E03 2EE7D19A 7E8B0716 F503E6D1 9A768B38
3D809074 3EC52EBF EBF05DD9 9B1F16FD 0302E7C1 9A7E8B02 C4830054 969D9A50
05907C06 8B2E907E 36FF2E04 C4830054 4A8A9A91 0E36FF2E 911036FF 2E127400
C702A5E9 037E00FF 9A7E819A 46FF03EB 00009A46 C704C483 00549BD5 9A500012
8B910C06 8E2E910A 36032E02 E6C18C76 8B637D03 8C7E838C 46FF03EB 00008C46
9B2C7400 FF66BE83 07720054 968A9A1C D8269BF0 45D99B1F 16FD0302 E7C18C7E
968A9AFF 509EDC9B F045D99B 1F16FD03 02E7C18C 7E8BFF50 9EDD9B90 A806DF2E
009446C7 0228E903 7500FF9A 7E8194EB 00FF9A46 C79B7400 FF66BE83 A2720054
911206DC 2E9BF045 D99B1F16 FD0302E7 C1947E8B 2F7D0394 7E839446 FF03EB00
90BC3EC5 2EC8EBBA 45891F16 FD03E7D1 947E8B08 C4830054 96EF9A00 54968F9A
46FF03EB 00008C46 C70CC483 00545B78 9A50BA46 8D1650AC 468D1635 FF0275FF
16FD03E7 D18C7E8B 0E7E00FF 3DAC458B 1F16FD03 E7D18C7E 8B4F7D04 8C7E838C

2E8FF03E 032E09E7 C18C7E8B E6D1AC75 8B1F16FD 03E7D18C 7E8B00FF AC45C71F
9446FF03 EB000094 46C7A8EB AC45891F 16FD03E7 D18C7E8B 058BFE03 8FF21E8E
5DD99B1F 16FD0302 E7C1947E 8BAC45DF 9B1F16FD 03E7D194 7E8B1D7D 04947E83
890CC483 0044DF9B 9A50D046 8D1635FF 0275FF90 BC3EC52E 50E4468D 16DAEBD0
D045D99B 1F16FD03 02E7C194 7E8B2F7D 04947E83 9446FF03 EB000094 46C7FE46
EBAC4589 1F16FD03 E7D1947E 8B08C483 005496EF 9A005496 8F9A9112 06DC2E9B
8C7E8B00 87E9037C 038C7E83 8C46FF03 EB00008C 46C7009A E9037400 FE7E83C8
02E6C146 358B90D4 1E8E2E90 D23E032E E7D18C7E 8BF045D9 9B1F16FD 0302E7C1
1F16FD03 02E7C18C 7E8B1DD9 9BFE0390 CA1E8E2E 90C83E03 2EF88B04 8C8C4669
8B062C8C 466902E6 C1464635 8B90D41E 8E2E90D2 3E032EE7 D18C7E8B E445D99B
FF90D41E 8E2E90D2 3E032EE7 D18C7E8B 1DD99BFE 0390CE1E 8E2E90CC 3E032EF8
0716F503 E6D18C76 8BFD7BE9 037C038C 7E838C46 FF03EB00 008C46C7 FF6DE905
D99B1F16 FD0302E7 C18C7E8B FF6084DE 269BF045 D99B1F16 FD0302E7 C18C7E8B
C6E9037C 038C7E83 8C46FF03 EB00008C 46C700A4 E9037400 FF66BE83 C7EBF05D
8E2E90D2 3E032EE7 D18C7E8B 05D99B91 0C1E8E2E 910A3E03 2E02E7C1 8C7E8B02
8B1DD99B FE0390CA 1E8E2E90 C83E032E F88B048C 8C466902 E6C14635 8B90D41E
D41E8E2E 90D23E03 2EE7D18C 7E8B05D9 9B91081E 8E2E9106 3E032E02 E7C18C7E
7E8B1DD9 9BFE0390 CE1E8E2E 90CC3E03 2EF88B06 2C8C4669 02E6C146 46358B90
1C36FF2E 1274003D 8090743E C52EFF63 E905FF90 D41E8E2E 90D23E03 2EE7D18C
549BD59A 50001205 907C068B 2E907E36 FF2E04C4 8300544A 8A9A911A 36FF2E91
2E9B1F16 FD0302E7 C18C7E8B 167D038C 7E838C46 FF03EB00 008C46C7 04C48300
02E7C194 7E8B2F7D 03947E83 9446FF03 EB000094 46C7E1EB F05DD99B 8FE006DD
E7D1947E 8B08C483 005496EF 9A005496 8F9A9112 06DC2E9B F045D99B 1F16FD03
5B789A50 BA468D16 50AC468D 1635FF02 75FF90BC 3EC52EC8 EBBA4589 1F16FD03
458B1F16 FD03E7D1 8C7E8B4F 7D048C7E 838C46FF 03EB0000 8C46C70C C4830054
AC758B1F 16FD03E7 D18C7E8B 00FFAC45 C71F16FD 03E7D18C 7E8B0E7E 00FF3DAC
891F16FD 03E7D18C 7E8B058B FE038FF2 1E8E2E8F F03E032E 09E7C18C 7E8BE6D1
45DF9B1F 16FD03E7 D1947E8B 1D7D0494 7E839446 FF03EB00 009446C7 A8EBA445
35FF0275 FF90BC3E C52E50E4 468D16DA EBC05DD9 9B1F16FD 0302E7C1 947E8BA4
2F7D0494 7E839446 FF03EB00 009446C7 FE46890C C4830044 DF9B9A50 C0468D16
C4830054 96EF9A00 54968F9A 911206DC 2E9BC045 D99B1F16 FD0302E7 C1947E8B
FF03EB00 008C46C7 008FE903 7400FE7E 83C8EBA4 45891F16 FD03E7D1 947E8B08
8C466902 E6C14635 8B90D41E 8E2E90D2 3E032EE7 D18C7E8B 7F7D038C 7E838C46
0302E7C1 8C7E8B1D D99B90A8 06DF2E9B FE0390CA 1E8E2E90 C83E032E F88B048C
8C466902 E6C14646 358B90D4 1E8E2E90 D23E032E E7D18C7E 8BE445D9 9B1F16FD
1E8E2E90 D23E032E E7D18C7E 8B1DD99B FE0390CE 1E8E2E90 CC3E032E F88B062C
7E838C46 FF03EB00 008C46C7 044EE903 74003D83 8FC83EC5 2EFF78E9 05FF90D4
7E8B1DD9 9BEED99B 90CA1E8E 2E90C83E 032EF88B 048C8C46 69043BE9 037C038C
2E90C83E 032EF88B 048C8C46 6902E6C1 46358B90 D41E8E2E 90D23E03 2EE7D18C
90CE1E8E 2E90CC3E 032EF88B 062C8C46 691DD99B 8FE006DD 2E9BFE03 90CA1E8E
8C466902 E6C14646 358B90D4 1E8E2E90 D23E032E E7D18C7E 8B045DD9 9BEED99B
032EE7D1 8C7E8B1D D99B8FE0 06DD2E9B FE0390CE 1E8E2E90 CC3E032E F88B062C
2EF88B04 8C8C4669 FF509EDD 9BEED99B 024EE903 7F003D83 90D41E8E 2E90D23E
8C8C4669 00C5E903 77005496 8A9AFF50 9EDC9B04 45D99B90 CA1E8E2E 90C83E03
D99B90CE 1E8E2E90 CC3E032E F88B062C 8C466990 CA068E2E 90C83603 2EF08B04
8B048C8C 46694D76 0054968A 9A805ED8 9B8446D9 9B845ED9 9B0474D8 269B0845
2EF88B06 2C8C4669 FF509EDD 9B044DD8 9B8046D9 9B90CA1E 8E2E90C8 3E032EF8
8E2E90CC 3E032EF8 8B062C8C 4669FF50 A6DC9B08 45D99B90 CE1E8E2E 90CC3E03
1EDC2E9B 0445D99B 90CE1E8E 2E90CC3E 032EF88B 062C8C46 69045DD9 9B90CE1E
5DD99BEE D99B90CE 1E8E2E90 CC3E032E F88B062C 8C466918 73005496 8A9A8FE8
C83E032E F88B048C 8C466902 E6C1358B 90D41E8E 2E90D23E 032EE7D1 8C7E8B04
E3D18C5E 8B0123E9 03720054 968A9A8F E01EDC2E 9B05D99B FE0390CA 1E8E2E90
CA1E8E2E 90C83E03 2EF88B04 8C8C4669 02E6C137 8B2690D4 068E2E90 D21E032E
90D4068E 2E90D21E 032EE3D1 8C5E8BFF 509EDD9B 25D89B8F E006DD2E 9BFE0390
8FE006DD 2E9BFE03 90CE1E8E 2E90CC3E 032EF88B 062C8C46 6902E6C1 46378B26
5E8B00A0 E9037700 54968A9A 805ED89B 8446D99B 845ED99B FF50B6DC 9B25D89B
2E90C83E 032EF88B 048C8C46 6902E6C1 378B2690 D4068E2E 90D21E03 2EE3D18C
9EDD9BFF 488EDC9B 8046D99B FF489EDD 9B25D89B 8FE006DD 2E9BFE03 90CA1E8E
032EF88B 062C8C46 6902E6C1 46358B90 D41E8E2E 90D23E03 2EE7D18C 7E8BFF50
D41E8E2E 90D23E03 2EE7D18C 7E8BFF50 86DC9B05 D99BFE03 90CE1E8E 2E90CC3E
C52E1DD9 9BFE0390 CE1E8E2E 90CC3E03 2EF88B06 2C8C4669 02E6C146 46358B90
DAE9037E 00FF9A7E 819A46FF 03EB0000 9A46C700 85E90374 00023D05 8B90203E
8C466950 4040058B 90D41E8E 2E90D23E 032EE7D1 8C7E8BE0 5ED99B9A 46DF9BFC
C806032E 048C8C46 69500004 05C38B51 CA8BD88B 90CE168B 2E90CC06 032E062C

E7C18C7E 8B02E6C1 9A768B0E C483001C 41D89A50 E0468D16 505290CA 168B2E90
D18C7E8B 9A46FF03 EB00019A 46C782EB 1DD99BFE 0391201E 8E2E911E 3E032E0A
8C466902 E6C19A76 8BFC44E9 037D9A46 3B484805 8B906A1E 8E2E9068 3E032EE7
D23E032E E7D18C7E 8BE05ED9 9B05D99B FE039072 1E8E2E90 703E032E F88B01A0
8B51CA8B D88B90CE 168B2E90 CC06032E 062C8C46 69504040 058B90D4 1E8E2E90
001C41D8 9A50E046 8D165052 90CA168B 2E90C806 032E048C 8C466950 000405C3
E91DD99B FE039124 1E8E2E91 223E032E F88B0230 8C466902 E6C19A76 8B0EC483
E9037C03 8C7E838C 46FF03EB 00008C46 C703BAE9 0375003D 838FC83E C52EFF57
032EE7D1 8C7E8B1D D99BEED9 9B90CA1E 8E2E90C8 3E032EF8 8B048C8C 466903A7
0390CA1E 8E2E90C8 3E032EF8 8B048C8C 466902E6 C146358B 90D41E8E 2E90D23E
D99BEED9 9B90CE1E 8E2E90CC 3E032EF8 8B062C8C 46691DD9 9B8FE006 DD2E9BFE
2EF88B06 2C8C4669 02E6C146 46358B90 D41E8E2E 90D23E03 2EE7D18C 7E8B045D
8E2E90D2 3E032EE7 D18C7E8B 1DD99B8F E006DD2E 9BFE0390 CE1E8E2E 90CC3E03
2E90C83E 032EF88B 048C8C46 69FF509E DD9BEED9 9B024EE9 037F003D 8390D41E
032EF08B 048C8C46 6900C5E9 03770054 968A9AFF 509EDC9B 0445D99B 90CA1E8E
D8269B08 45D99B90 CE1E8E2E 90CC3E03 2EF88B06 2C8C4669 90CA068E 2E90C836
C83E032E F88B048C 8C46694D 76005496 8A9A805E D89B8446 D99B845E D99B0474
2E90CC3E 032EF88B 062C8C46 69FF509E DD9B044D D89B8046 D99B90CA 1E8E2E90
D99B90CE 1E8E2E90 CC3E032E F88B062C 8C4669FF 50A6DC9B 0845D99B 90CE1E8E
968A9A8F E81EDC2E 9B0445D9 9B90CE1E 8E2E90CC 3E032EF8 8B062C8C 4669045D
D18C7E8B 045DD99B EED99B90 CE1E8E2E 90CC3E03 2EF88B06 2C8C4669 18730054
CA1E8E2E 90C83E03 2EF88B04 8C8C4669 02E6C135 8B90D41E 8E2E90D2 3E032EE7
90D21E03 2EE3D18C 5E8B0123 E9037200 54968A9A 8FE01EDC 2E9B05D9 9BFE0390
2E9BFE03 90CA1E8E 2E90C83E 032EF88B 048C8C46 6902E6C1 378B2690 D4068E2E
C146378B 2690D406 8E2E90D2 1E032EE3 D18C5E8B FF509EDD 9B25D89B 8FE006DD
DC9B25D8 9B8FE006 DD2E9BFE 0390CE1E 8E2E90CC 3E032EF8 8B062C8C 466902E6
032EE3D1 8C5E8B00 A0E90377 0054968A 9A805ED8 9B8446D9 9B845ED9 9BFF50B6
0390CA1E 8E2E90C8 3E032EF8 8B048C8C 466902E6 C1378B26 90D4068E 2E90D21E
8C7E8BFF 509EDD9B FF488EDC 9B8046D9 9BFF489E DD9B25D8 9B8FE006 DD2E9BFE
8E2E90CC 3E032EF8 8B062C8C 466902E6 C146358B 90D41E8E 2E90D23E 032EE7D1
4646358B 90D41E8E 2E90D23E 032EE7D1 8C7E8BFF 5086DC9B 05D99BFE 0390CE1E
03EB0001 9A46C71D D99BFE03 90CE1E8E 2E90CC3E 032EF88B 062C8C46 6902E6C1
768BFCD8 E9037D9A 463B4848 058B906A 1E8E2E90 683E032E E7D18C7E 8B9A46FF
7E8BE05E D99B05D9 9BFE0390 721E8E2E 90703E03 2EF88B01 A08C4669 02E6C19A
CE168B2E 90CC0603 2E062C8C 46695040 40058B90 D41E8E2E 90D23E03 2EE7D18C
468D1650 5290CA16 8B2E90C8 06032E04 8C8C4669 50000405 C38B51CA 8BD88B90
241E8E2E 91223E03 2EF88B02 308C4669 02E6C19A 768B0EC4 83001C41 D89A50E0
7E83FE46 FF03EB00 00FE46C7 00002CC8 5756CB5E 5FC99BFF 57E91DD9 9BFE0391
1F16FD03 02E7C1FE 7E8B05D9 9B0C5E8E 0A7E0302 E7C1FE7E 8B0238E9 037C03FE
D99B1F16 FD0302E7 C1FE7E8B 8FF2068E 2E8FF036 032E09E6 C1FE768B F05DD99B
BEE9E45D D99BEED9 9B1F16FD 0302E7C1 FE7E8B14 73005496 8A9A1CDE 269BF045
9BF045D9 9B1F16FD 0302E7C1 FE7E8B8F F2068E2E 8FF03603 2E09E6C1 FE768B01
E45DD99B 8FE006DD 2E9B1F16 FD0302E7 C1FE7E8B 17760054 968A9A01 FE9CDE26
46C76475 0054968A 9A8FE01E DC2E9BF0 45D99B1F 16FD0302 E7C1FE7E 8B017CE9
8BFE038F F21E8E2E 8FF03E03 2E09E7C1 FE7E8BE6 D1FC768B FC4EFF03 EB00FFFC
5DD99B8F E006DD2E 9B1F16FD 0302E7C1 FE7E8B17 7500FFFC 7E81DF74 00FF3D05
E9E45DD9 9B1F16FD 0302E7C1 FE7E8B02 C4830054 969D9A50 40FC468B 011BE9E4
0716DD03 02E3C1FE 5E8B00E9 E9037C00 FFFC7E81 FC46FF03 EB0000FC 46C700FD
9AF05FD8 269B05DF 9BFE038F F21E8E2E 8FF03E03 2E09E7C1 FE7E8BE6 D1FC768B
F03E032E 09E7C1FE 7E8BE6D1 46FC768B 0716DD03 02E3C1FE 5E8BC377 0054968A
C1FE5E8B E7D1FC7E 8B927600 54968A9A F05FD826 9B05DF9B FE038FF2 1E8E2E8F
2E8FF03E 032E09E7 C1FE7E8B E6D146FC 768BDF03 8FF2068E 2E8FF01E 032E09E3
FE768BE7 D1FC7E8B D45EDD9B 02C48300 54969D9A 50072B26 058BFE03 8FF21E8E
DE269BF0 45D99B1F 16FD0302 E7C1FE7E 8BF7038F F2068E2E 8FF03603 2E09E6C1
8BE45DD9 9BDC46DC 9BFC46DF 9B1F16FD 0302E7C1 FE7E8BDC 5EDD9BD4 76DC9B24
9BFDBCE9 1DD99B10 5E8E0E7E 0302E7C1 FE7E8BE4 45D99B1F 16FD0302 E7C1FE7E
FF2E9128 36FF2E12 74003D80 90743EC5 2E0000A8 46C70000 58C85756 CB5E5FC9
C4830054 9BD59A50 00120590 7C068B2E 907E36FF 2E04C483 00544A8A 9A912636
9A505204 C4830054 7FAA9A91 2A36FF2E 912C36FF 2E912E36 FF2E9130 36FF2E04
913436FF 2E127400 3D809074 3EC52E37 75C20BFE 5689FC46 8908C483 00549972
00549BD5 9A500012 05907C06 8B2E907E 36FF2E04 C4830054 4A8A9A91 3236FF2E
FFFE76FF 913636FF 2E913836 FF2E913A 36FF2E91 3C36FF2E 0001A846 C704C483
908A36FF 2E0CC483 00542A08 9A50520A C4830054 EAAA9A50 AC468D16 506AFC76
54EAAA9A 50AC468D 16506AFC 76FFFE76 FF913E36 FF2E9140 36FF2E90 8836FF2E

2E35FF90 883EC52E 1974003D 8090743E C52E0CC4 8300542A 089A5052 0AC48300
9A500012 05907C06 8B2E907E 36FF2E06 C4830054 4A8A9A91 4236FF2E 914436FF
00FF6815 74003D80 90743EC5 2E357E00 FF3D058B 90883EC5 2E04C483 00549BD5
50001205 907C068B 2E907E36 FF2E06C4 8300544A 8A9A9146 36FF2E91 4836FF2E
466B6D7F 053BAA46 8B90883E C52EAA46 FF03EB00 01AA46C7 04C48300 549BD59A
914E0603 2E0CAA46 6B500008 05C38B51 CA8BD88B 9150168B 2E914E06 032E0CAA
50529150 168B2E91 4E06032E 0CAA466B 50000405 C38B51CA 8BD88B91 50168B2E
520AC483 0054EAAA 9A50AC46 8D16506A FC76FFFE 76FF914A 36FF2E91 4C36FF2E
2E04C483 00549C3C 9AFC76FF FE76FF0E 7500A87E 8384EB14 C4830054 2A089A50
2E000020 C85756CB 5E5FC904 C4830054 9BD59A50 00120590 7C068B2E 907E36FF
45DF9B90 283EC52E F05ED99B 0245DF9B 90283EC5 2EEC5ED9 9B05DF9B 90283EC5
3EC52EE0 5ED99B05 DF9B9030 3EC52E29 7400023D 058B905C 3EC52EF4 5ED99B04
9B90603E C52E008E E9E85ED9 9B0445DF 9B90303E C52EE45E D99B0245 DF9B9030
E85ED99B 0445DF9B 90603EC5 2EE45ED9 9B0245DF 9B90603E C52EE05E D99B05DF
2EE7D1FE 7E8B3674 003D8090 743EC52E 587D03FE 7E83FE46 FF03EB00 00FE46C7
FF2E0054 968F9AE0 45D99B1F 16FD0302 E7C1FE7E 8B35FF90 621E8E2E 90603E03
D59A5000 1205907C 068B2E90 7E36FF2E 0EC48300 544A8A9A 915236FF 2E915436
544A8A9A 915636FF 2E915836 FF2E1274 003D8090 743EC52E 9FEB04C4 8300549B
8090743E C52E04C4 8300549B D59A5000 1205907C 068B2E90 7E36FF2E 04C48300
36FF2E06 C4830054 4A8A9A91 5A36FF2E 915C36FF 2E35FF90 883EC52E 1974003D
FE7E83FE 46FF03EB 0000FE46 C704C483 00549BD5 9A500012 05907C06 8B2E907E
000105C7 90C43EC5 2E097D00 3D83902A 1E8E2E90 283E032E E7D1FE7E 8B3E7D03
EB000105 C790C03E C52EC47E 00FF3D05 8B90321E 8E2E9030 3E032EE7 D1FE7E8B
E7C1FE7E 8B247D03 FE7E83FE 46FF03EB 0000FE46 C73B7500 3D8390C4 3EC52EB9
C7D3EB0C 5DD99B90 9A1E8E2E 90983E03 2E02E7C1 FE7E8BEC 45D99B1F 16FD0302
90743EC5 2E587D03 FE7E83FE 46FF03EB 0000FE46 C70000FC 46C705EB 0001FC46
1F16FD03 02E7C1FE 7E8B35FF 90621E8E 2E90603E 032EE7D1 FE7E8B36 74003D80
907E36FF 2E0EC483 00544A8A 9A915E36 FF2E9160 36FF2E00 54968F9A E045D99B
3EC52EFE 46FF03EB 0001FE46 C79FEB04 C4830054 9BD59A50 00120590 7C068B2E
9B05D99B 91501E8E 2E914E3E 032EF88B 0CFE466B 01F4E903 7E053BFE 468B9088
D89B0445 D99B9150 1E8E2E91 4E3E032E F88B0CFE 466BD076 0054968A 9AEC5ED8
5ED89B08 45D99B91 501E8E2E 914E3E03 2EF88B0C FE466BB1 76005496 8A9AF05E
9AE05ED8 9B05D99B 91501E8E 2E914E3E 032EF88B 0CFE466B 92760054 968A9AF4
5ED89B04 45D99B91 501E8E2E 914E3E03 2EF88B0C FE466B00 90E90372 0054968A
E85ED89B 0845D99B 91501E8E 2E914E3E 032EF88B 0CFE466B 71730054 968A9AE4
19E9037C 03FA7E83 FA46FF03 EB0000FA 46C7FC46 8940FC46 8B527300 54968A9A
C1FA768B 05D99BFE 0391501E 8E2E914E 3E032EF8 8B0CFE46 6B02E6C1 FA768BFF
03EB0000 F846C7BC EB1DD99B FE03909A 1E8E2E90 983E032E F88B0CFC 466B02E6
1E8E2E90 603E032E E7D1F87E 8B367400 3D809074 3EC52E58 7D03F87E 83F846FF
6236FF2E 916436FF 2E005496 8F9AE045 D99B1F16 FD0302E7 C1F87E8B 35FF9062
EB04C483 00549BD5 9A500012 05907C06 8B2E907E 36FF2E0E C4830054 4A8A9A91
9A0845D9 9B91501E 8E2E914E 3E032EF8 8B0CFE46 6B5C7400 3D809074 3EC52E9F
FE466B00 54968F9A 0445D99B 91501E8E 2E914E3E 032EF88B 0CFE466B 0054968F
9A916636 FF2E9168 36FF2E00 54968F9A 05D99B91 501E8E2E 914E3E03 2EF88B0C
FDFAE904 C4830054 9BD59A50 00120590 7C068B2E 907E36FF 2E1CC483 00544A8A
916C36FF 2E35FF90 883EC52E 1974003D 8090743E C52E0589 90883EC5 2EFC468B
00549BD5 9A500012 05907C06 8B2E907E 36FF2E06 C4830054 4A8A9A91 6A36FF2E
03EB0000 FE46C753 7400023D 058B905C 3EC52E5F 75003D83 90C03EC5 2E04C483
2EC88B02 E0C1FE46 8BE045D9 9B1F16FD 0302E7C1 FE7E8B34 7D03FE7E 83FE46FF
3EC52EC3 EB1DD99B F903909A 1E8E2E90 983E032E F88B0CC6 6B46358B 90883EC5
36FF2E35 FF90883E C52E1974 003D8090 743EC52E 05899088 3EC52E40 058B9088
9BD59A50 00120590 7C068B2E 907E36FF 2E06C483 00544A8A 9A916E36 FF2E9170
E45ED99B 917236DC 2E9B8FE0 06DD2E9B 000056C8 5756CB5E 5FC99B04 C4830054
7E36FF2E 04C48300 544A8A9A 917A36FF 2E917C36 FF2E1274 003D8090 743EC52E
03FE7E83 FE46FF03 EB0000FE 46C704C4 8300549B D59A5000 1205907C 068B2E90
058B90D4 1E8E2E90 D23E032E E7D1FE7E 8BFC46FF 03EB0002 FC46C705 AEE9037C
CA1E8E2E 90C83E03 2EF88B04 8CFE4669 02E6C14E FC768B00 E9E9037D FC463B40
8E2E9068 3E032EE7 D1FE7E8B 5F74003D 838FC83E C52EE05E D99B05D9 9BFE0390
908C0603 2E01A0FE 46695052 9092168B 2E909006 032E01A0 FE466935 FF906A1E
8B062CFE 466902E6 C1FC768B 0EC48300 1C40589A 50E0468D 16505290 8E168B2E
1E8E2E90 683E032E E7D1FE7E 8BFF59E9 1DD99BFE 0391801E 8E2E917E 3E032EF8
2E908C06 032E01A0 FE466950 52909216 8B2E9090 06032E01 A0FE4669 35FF906A
F88B062C FE466902 E6C1FC76 8B0EC483 001C41D8 9A50E046 8D165052 908E168B
9AFE76FF 1875003D 838FC83E C52EFEFA E91DD99B FE039180 1E8E2E91 7E3E032E

FF02C483 001C4729 9AFE76FF 16EB02C4 83001C53 619AFE76 FF02C483 001C4358
8BF4468B F65689F4 46890C56 8B0A4603 0DE0C1FE 468B02C4 83001C4A FA9AFE76
74003D83 8FC83EC5 2EEE5689 EC46891F FE05F656 8BF4468B EA5689E8 4689F656
D1FE7E8B FE5DE903 7C1000FC 7E81FC46 FF03EB00 00FC46C7 E05ED99B EED99B7F
46695052 90CE168B 2E90CC06 032E062C FE466935 FF90D41E 8E2E90D2 3E032EE7
54968F9A 0EC48300 1C40589A 50E0468D 16505291 80168B2E 917E0603 2E062CFE
8FEBE05E D99BE046 D89BE446 D99B0589 02F44683 F47EC508 C4830054 96EF9A00
F0468304 EBF25689 F04689EA 568BE846 8B01DAE9 03740002 3D058B90 203EC52E
5E8BCE46 8991823E F72E99E8 462BF046 8B017FE9 0376EC46 3BF2568B F0468B02
8F9A05D9 9B025F8E 263F0326 02E7C1CE 7E8B8FD6 068E2E8F D41E032E 02E3C1FE
91201E8E 2E911E3E 032E0AE7 C1FE7E8B 02E6C1F0 8B08C483 005496EF 9A005496
2602E7C1 CE7E8B8F D6068E2E 8FD43603 2E02E6C1 FE768BCA 5ED99B05 D99BFE03
E3C1FE5E 8B4E7D00 FF3D08C4 83005496 EF9A0054 968F9A05 D99B025C 8E263C03
0054968F 9A05D99B 025F8E26 3F032602 E7C1CE7E 8B8FD606 8E2E8FD4 1E032E02
FE039120 1E8E2E91 1E3E032E 0AE7C1FE 7E8B02E6 C146F08B 08C48300 5496EF9A
FE768BAA 5EDD9BCA 66D89BC6 46D99BC6 5ED99BCA 46D99B08 EBC65ED9 9B05D99B
968F9A05 D99B025C 8E263C03 2602E7C1 CE7E8B8F D6068E2E 8FD43603 2E02E6C1
36032E02 E6C1FE76 8BB25EDD 9B02C483 0054969D 9A5008C4 83005496 EF9A0054
9BAA4EDC 9BB266DC 9B05D99B 025C8E26 3C032602 E7C1CE7E 8B8FD606 8E2E8FD4
EF9A0054 968F9A91 1206DC2E 9BC246D9 9BC25ED9 9BBA46DC 9BCA46D9 9BBA5EDD
46FF03EB 0000FC46 C7FC42E9 037402FE 7E83FE6F E90589F0 7EC508C4 83005496
9A35FF02 75FF8FD6 1E8E2E8F D43E032E 02E7C1FC 7E8BFC2F E9037C03 FC7E83FC
969D9A50 FA468908 C4830054 96EF9A00 54968F9A EED99BD5 EB04C483 0054DC75
1E8E2E90 D23E032E E7D1FE7E 8BFC46FF 03EB0000 FC46C7DC 5ED99B02 C4830054
917E3E03 2EF88B06 2CFE4669 02E6C146 FC768B01 1BE9037F FC463B48 058B90D4
005496EF 9A005496 8F9AD846 D99BD85E D99BE476 D89B05D9 9BFE0391 801E8E2E
9BFE0390 CE1E8E2E 90CC3E03 2EF88B06 2CFE4669 02E6C1FC 768BF846 8908C483
D99B4EEB D05ED99B EED99B09 75005496 8A9AD85E D89BDC46 D99BD45E D99B05D9
CE068E2E 90CC1E03 2ED88B06 2CFE4669 02E7C1FC 7E8BBA5E DD9BDC66 D89BD846
05D99BFE 0390CE1E 8E2E90CC 3E032EF8 8B062CFE 466902E6 C146FC76 8BDF0390
8304EBF2 5689F046 89EA568B E84603E0 D1FA468B D05ED99B BA76DC9B 27D8269B
5496EF9A 0054968F 9AD446D9 9B2476F0 463BEA56 8BE84603 E0D1F846 8B02F046
46D99BFA 4689F846 8BC8EBD4 5ED99BD4 46D89BD0 46D99B05 89F07EC5 08C48300
F25689F0 4689EA56 8BE8468B EA5689E8 4689F256 8BF0468B FEC8E9DC 5ED99BD8
96EF9A00 54968F9A D446D99B FA85E903 76EC463B F2568BF0 468B02F0 468304EB
00FFB803 EB08C483 005496EF 9A005496 8F9AD446 D99B137D 00FF3D08 C4830054
7EC50000 1AC85756 CB5E5FC9 9BAFEBD4 5ED99BD4 46D89BD0 46D99B05 89F07EC5
9B0E7EC5 0E76C428 72005496 8A9A1DD8 9BF646D9 9B0E7EC5 F65ED99B 05D99B0A
32E905D9 9B127EC5 013BE904 45D99B12 7EC50A75 0054968A 9A045CD8 269B05D9
4E16768B 50770054 968A9A1D D89BF646 D99B105E 8E0E7E03 02E7C14F 167E8B01
8A9A1CD8 269B05D9 9B105E8E 0E7E0302 E7C14F16 7E8B1046 8E0E7603 02E6C14E
02E7C14F 167E8B00 DAE905D9 9B145E8E 127E0302 E7C14F4F 167E8B14 75005496
037DFA46 3B484816 468BFA46 FF03EB00 00FA46C7 00C7E905 D99B145E 8E127E03
FA7E8BD6 77005496 8A9A1DD8 9BF646D9 9B105E8E 0E7E0302 E7C1FA7E 8B00ACE9
760302E6 C1FA768B BB760054 968A9A1D D89BF646 D99B105E 8E0E7E03 02E7C147
C1FA768B E65EDD9B 24D8269B 05D99B10 5E8E0E7E 0302E7C1 47FA7E8B 10468E0E
EE5EDD9B 24D8269B 05D99B14 5E8E127E 0302E7C1 47FA7E8B 14468E12 760302E6
9B25D89B F646D99B 105E8E0E 7E0302E7 C1FA7E8B 14468E12 760302E6 C1FA768B
7EC50000 1AC85756 CB5E5FC9 9BFC46D9 9BFC5ED9 9B04D826 9BE676DC 9BEE4EDC
9B0E7EC5 0E76C428 77005496 8A9A1DD8 9BF646D9 9B0E7EC5 F65ED99B 05D99B0A
32E905D9 9B127EC5 013BE904 45D99B12 7EC50A75 0054968A 9A045CD8 269B05D9
4E16768B 50720054 968A9A1D D89BF646 D99B105E 8E0E7E03 02E7C14F 167E8B01
8A9A1CD8 269B05D9 9B105E8E 0E7E0302 E7C14F16 7E8B1046 8E0E7603 02E6C14E
02E7C14F 167E8B00 DAE905D9 9B145E8E 127E0302 E7C14F4F 167E8B14 75005496
037DFA46 3B484816 468BFA46 FF03EB00 00FA46C7 00C7E905 D99B145E 8E127E03
FA7E8BD6 72005496 8A9A1DD8 9BF646D9 9B105E8E 0E7E0302 E7C1FA7E 8B00ACE9
760302E6 C1FA768B BB730054 968A9A1D D89BF646 D99B105E 8E0E7E03 02E7C147
C1FA768B E65EDD9B 24D8269B 05D99B10 5E8E0E7E 0302E7C1 47FA7E8B 10468E0E
EE5EDD9B 24D8269B 05D99B14 5E8E127E 0302E7C1 47FA7E8B 14468E12 760302E6
9B25D89B F646D99B 105E8E0E 7E0302E7 C1FA7E8B 14468E12 760302E6 C1FA768B
C52E0000 06C85756 CB5E5FC9 9BFC46D9 9BFC5ED9 9B04D826 9BE676DC 9BEE4EDC
2E907E36 FF2E04C4 8300544A 8A9A9184 36FF2E91 8636FF2E 1274003D 8090743E
2EE7D10A 7E8BFE46 FF03EB00 01FE46C7 04C48300 549BD59A 50001205 907C068B
2E90D236 032EE6D1 0A768B03 6FE9037D FE463B48 48058B90 6A1E8E2E 90683E03

FE768BDF 03918006 8E2E917E 1E032ED8 8B062C0A 466902E7 C1473C8B 90D41E8E
968A9A1F D8269B05 D99BFE03 90961E8E 2E90943E 032EF88B 01A00A46 6902E6C1
032EE7D1 0A7E8B40 058B90D4 1E8E2E90 D23E032E E7D10A7E 8B00B4E9 03770054
961E8E2E 90943E03 2EF88B01 A00A4669 02E6C1FE 768B0589 90D41E8E 2E90D23E
062C0A46 6902E6C1 46358B90 D41E8E2E 90D23E03 2EE7D10A 7E8B05D9 9BFE0390
032EF88B 02300A46 6902E6C1 FE768B1D D99BFE03 91801E8E 2E917E3E 032EF88B
C146358B 90D41E8E 2E90D23E 032EE7D1 0A7E8B05 D99BFE03 91241E8E 2E91223E
0002FC46 C7FEDCE9 1DD99BFE 0390CE1E 8E2E90CC 3E032EF8 8B062C0A 466902E6
A00A4669 02E6C1FE 768B9180 068E2E91 7E1E032E D88B062C 0A4669FC 46FF03EB
9BE90373 0054968A 9A085FD8 269B05D9 9BFE0390 961E8E2E 90943E03 2EF88B01
02E6C1FE 768BDF03 9180068E 2E917E1E 032ED88B 062C0A46 6902E7C1 FC7E8B00
76005496 8A9A1FD8 269B05D9 9BFE0390 961E8E2E 90943E03 2EF88B01 A00A4669
E6C1FE76 8BDF0391 80068E2E 917E1E03 2ED88B06 2C0A4669 02E7C147 FC7E8B41
0054968A 9A1FD826 9B05D99B FE039096 1E8E2E90 943E032E F88B01A0 0A466902
D10A7E8B FF26E903 7CFC463B 40058B90 D41E8E2E 90D23E03 2EE7D10A 7E8B1A72
032ED88B 062C0A46 69FDE0E9 0375FC46 3B404005 8B90D41E 8E2E90D2 3E032EE7
0390961E 8E2E9094 3E032EF8 8B01A00A 466902E6 C1FE768B 9180068E 2E917E1E
2E90D23E 032EE7D1 0A7E8B00 01FC46C7 05730054 968A9A08 5FD8269B 05D99BFE
3E032EE7 D10A7E8B 058990D4 1E8E2E90 D23E032E E7D10A7E 8B40058B 90D41E8E
C14EFA76 8B747DFA 463B40FC 468BFA4E FF03EBFA 46894005 8B90D41E 8E2E90D2
466902E6 C1FA768B 05D99BFE 0391801E 8E2E917E 3E032EF8 8B062C0A 466902E6
062C0A46 6902E6C1 4EFA768B 1DD99BFE 0391801E 8E2E917E 3E032EF8 8B062C0A
032EF88B 062C0A46 6902E6C1 FA768B05 D99BFE03 90CE1E8E 2E90CC3E 032EF88B
943E032E F88B01A0 0A466902 E6C1FE76 8B80EB1D D99BFE03 90CE1E8E 2E90CC3E
8E2E917E 3E032EF8 8B062C0A 466902E6 C146FC76 8B05D99B FE039096 1E8E2E90
0391241E 8E2E9122 3E032EF8 8B02300A 466902E6 C1FE768B 1DD99BFE 0391801E
D99BFE03 90CE1E8E 2E90CC3E 032EF88B 062C0A46 6902E6C1 46FC768B 05D99BFE
FF2E918A 36FF2E12 74003D80 90743EC5 2E000006 C85756CB 5E5FC99B FC73E91D
C4830054 9BD59A50 00120590 7C068B2E 907E36FF 2E04C483 00544A8A 9A918836
463B4848 058B906A 1E8E2E90 683E032E E7D10A7E 8BFE46FF 03EB0001 FE46C704
062C0A46 6902E7C1 473C8B90 D41E8E2E 90D23603 2EE6D10A 768B036F E9037DFE
90943E03 2EF88B01 A00A4669 02E6C1FE 768BDF03 9180068E 2E917E1E 032ED88B
3E032EE7 D10A7E8B 00B4E903 72005496 8A9A1FD8 269B05D9 9BFE0390 961E8E2E
E6C1FE76 8B058990 D41E8E2E 90D23E03 2EE7D10A 7E8B4005 8B90D41E 8E2E90D2
D23E032E E7D10A7E 8B05D99B FE039096 1E8E2E90 943E032E F88B01A0 0A466902
9BFE0391 801E8E2E 917E3E03 2EF88B06 2C0A4669 02E6C146 358B90D4 1E8E2E90
7E8B05D9 9BFE0391 241E8E2E 91223E03 2EF88B02 300A4669 02E6C1FE 768B1DD9
2E90CC3E 032EF88B 062C0A46 6902E6C1 46358B90 D41E8E2E 90D23E03 2EE7D10A
1E032ED8 8B062C0A 4669FC46 FF03EB00 02FC46C7 FEDCE91D D99BFE03 90CE1E8E
FE039096 1E8E2E90 943E032E F88B01A0 0A466902 E6C1FE76 8B918006 8E2E917E
2ED88B06 2C0A4669 02E7C1FC 7E8B009B E9037600 54968A9A 085FD826 9B05D99B
1E8E2E90 943E032E F88B01A0 0A466902 E6C1FE76 8BDF0391 80068E2E 917E1E03
D88B062C 0A466902 E7C147FC 7E8B4173 0054968A 9A1FD826 9B05D99B FE039096
8E2E9094 3E032EF8 8B01A00A 466902E6 C1FE768B DF039180 068E2E91 7E1E032E
1E8E2E90 D23E032E E7D10A7E 8B1A7700 54968A9A 1FD8269B 05D99BFE 0390961E
4040058B 90D41E8E 2E90D23E 032EE7D1 0A7E8BFF 26E9037C FC463B40 058B90D4
6902E6C1 FE768B91 80068E2E 917E1E03 2ED88B06 2C0A4669 FDE0E903 75FC463B
76005496 8A9A085F D8269B05 D99BFE03 90961E8E 2E90943E 032EF88B 01A00A46
3E032EE7 D10A7E8B 40058B90 D41E8E2E 90D23E03 2EE7D10A 7E8B0001 FC46C705
03EBFA46 8940058B 90D41E8E 2E90D23E 032EE7D1 0A7E8B05 8990D41E 8E2E90D2
2E917E3E 032EF88B 062C0A46 6902E6C1 4EFA768B 747DFA46 3B40FC46 8BFA4EFF
91801E8E 2E917E3E 032EF88B 062C0A46 6902E6C1 FA768B05 D99BFE03 91801E8E
9BFE0390 CE1E8E2E 90CC3E03 2EF88B06 2C0A4669 02E6C14E FA768B1D D99BFE03
80EB1DD9 9BFE0390 CE1E8E2E 90CC3E03 2EF88B06 2C0A4669 02E6C1FA 768B05D9
46FC768B 05D99BFE 0390961E 8E2E9094 3E032EF8 8B01A00A 466902E6 C1FE768B
6902E6C1 FE768B1D D99BFE03 91801E8E 2E917E3E 032EF88B 062C0A46 6902E6C1
2C0A4669 02E6C146 FC768B05 D99BFE03 91241E8E 2E91223E 032EF88B 02300A46
000022C8 5756CB5E 5FC99BFC 73E91DD9 9BFE0390 CE1E8E2E 90CC3E03 2EF88B06
7E36FF2E 04C48300 544A8A9A 918C36FF 2E918E36 FF2E1274 003D8090 743EC52E
D10A7E8B FE46FF03 EB0003FE 46C704C4 8300549B D59A5000 1205907C 068B2E90
0A466902 E7C14FFE 7E8B00FA E9037DFE 463B4005 8B90D41E 8E2E90D2 3E032EE7
3E032EF8 8B062C0A 466902E6 C1FE768B DF039180 068E2E91 7E1E032E D88B062C
466902E6 C14EFE76 8B397600 54968A9A 1FD8269B 05D99BFE 0391801E 8E2E917E
8B062C0A 466902E6 C1FE768B 05D99BFE 0391801E 8E2E917E 3E032EF8 8B062C0A

032ED88B 062C0A46 6902E7C1 4FFE7E8B 1DD99BFE 0391801E 8E2E917E 3E032EF8
CE1E8E2E 90CC3E03 2EF88B06 2C0A4669 02E6C1FE 768BDF03 90CE068E 2E90CC1E
062C0A46 6902E6C1 4EFE768B FF25E903 72005496 8A9A1FD8 269B05D9 9BFE0390
032EF88B 062C0A46 6902E6C1 FE768B05 D99BFE03 90CE1E8E 2E90CC3E 032EF88B
8B90D41E 8E2E90D2 3E032EE7 D10A7E8B FEE9E91D D99BFE03 90CE1E8E 2E90CC3E
CC3E032E F88B062C 0A466905 8990D41E 8E2E90D2 3E032EE7 D10A7E8B 00040505
DD2E9B91 801E8E2E 917E3E03 2EF88B06 2C0A4669 1DD99BEE D99B90CE 1E8E2E90
062C0A46 6902E6C1 4E358B90 D41E8E2E 90D23E03 2EE7D10A 7E8B1DD9 9B8FE006
8E2E90D2 3E032EE7 D10A7E8B 1DD99BEE D99BFE03 91801E8E 2E917E3E 032EF88B
06DD2E9B FE0390CE 1E8E2E90 CC3E032E F88B062C 0A466902 E6C14E35 8B90D41E
2C0A4669 02E7C104 EF833C8B 90D41E8E 2E90D236 032EE6D1 0A768B1D D99B8FE0
358B90D4 1E8E2E90 D23E032E E7D10A7E 8BDF0391 80068E2E 917E1E03 2ED88B06
1FD8269B 05D99BFE 0391801E 8E2E917E 3E032EF8 8B062C0A 466902E6 C103EE83
E7C103EF 833C8B90 D41E8E2E 90D23603 2EE6D10A 768B0337 E9037500 54968A9A
8E2E90D2 3E032EE7 D10A7E8B DF039180 068E2E91 7E1E032E D88B062C 0A466902
D99BFE03 91801E8E 2E917E3E 032EF88B 062C0A46 6902E6C1 04EE8335 8B90D41E
02E7C104 EF833C8B 90D41E8E 2E90D236 032EE6D1 0A768BDE 5EDD9B27 D8269B05
1E8E2E90 D23E032E E7D10A7E 8BDF0390 CE068E2E 90CC1E03 2ED88B06 2C0A4669
05D99BFE 0390CE1E 8E2E90CC 3E032EF8 8B062C0A 466902E6 C103EE83 358B90D4
6902E6C1 03EE8335 8B90D41E 8E2E90D2 3E032EE7 D10A7E8B E65EDD9B 27D8269B
5EDD9BDE 76DC9BE6 4EDC9B05 D99BFE03 91801E8E 2E917E3E 032EF88B 062C0A46
2EF88B06 2C0A4669 02E6C103 EE83358B 90D41E8E 2E90D23E 032EE7D1 0A7E8BEE
8FE01EDC 2E9BF646 D99BF65E D99BEE46 DC9B05D9 9BFE0390 CE1E8E2E 90CC3E03
0A466902 E6C14E4E 358B90D4 1E8E2E90 D23E032E E7D10A7E 8B627700 54968A9A
90D23E03 2EE7D10A 7E8B1DD9 9BEED99B FE039180 1E8E2E91 7E3E032E F88B062C
9BFE0390 CE1E8E2E 90CC3E03 2EF88B06 2C0A4669 02E6C14E 4E358B90 D41E8E2E
02E7C104 EF833C8B 90D41E8E 2E90D236 032EE6D1 0A768B02 23E91DD9 9BF646D9
1E8E2E90 D23E032E E7D10A7E 8BDF0390 CE068E2E 90CC1E03 2ED88B06 2C0A4669
05D99BFE 0390CE1E 8E2E90CC 3E032EF8 8B062C0A 466902E6 C103EE83 358B90D4
6902E7C1 03EF833C 8B90D41E 8E2E90D2 36032EE6 D10A768B DE5EDD9B 27D8269B
D41E8E2E 90D23E03 2EE7D10A 7E8BDF03 9180068E 2E917E1E 032ED88B 062C0A46
9B05D99B FE039180 1E8E2E91 7E3E032E F88B062C 0A466902 E6C104EE 83358B90
6902E6C1 03EE8337 8B2690D4 068E2E90 D21E032E E3D10A5E 8BE65EDD 9B27D826
9BE64EDC 9B25D89B 90A806DF 2E9BFE03 90CE1E8E 2E90CC3E 032EF88B 062C0A46
466902E6 C103EE83 358B90D4 1E8E2E90 D23E032E E7D10A7E 8BEE5EDD 9BDE76DC
D10A7E8B FA5ED99B EE66DC9B 05D99BFE 0391801E 8E2E917E 3E032EF8 8B062C0A
8E2E917E 3E032EF8 8B062C0A 466902E6 C14E4E35 8B90D41E 8E2E90D2 3E032EE7
C14E4E35 8B90D41E 8E2E90D2 3E032EE7 D10A7E8B 1DD99BFA 46D99BFE 0391801E
8BE91DD9 9B8FE006 DD2E9BFE 0390CE1E 8E2E90CC 3E032EF8 8B062C0A 466902E6
2EF88B06 2C0A4669 02E6C103 EE83358B 90D41E8E 2E90D23E 032EE7D1 0A7E8B00
4E358B90 D41E8E2E 90D23E03 2EE7D10A 7E8B05D9 9BFE0391 801E8E2E 917E3E03
2EE7D10A 7E8B1DD9 9BFE0391 801E8E2E 917E3E03 2EF88B06 2C0A4669 02E6C14E
CE1E8E2E 90CC3E03 2EF88B06 2C0A4669 02E6C14E 4E358B90 D41E8E2E 90D23E03
0A466991 80068E2E 917E3603 2EF08B06 2C0A4669 1DD99B8F E006DD2E 9BFE0390
B9E90375 0054968A 9A0C5CD8 269B0845 D99B9180 1E8E2E91 7E3E032E F88B062C
8E2E917E 3E032EF8 8B062C0A 46699180 068E2E91 7E36032E F08B062C 0A466901
CE068E2E 90CC3603 2EF08B06 2C0A4669 DE5EDD9B 0C64D826 9B0845D9 9B91801E
69E65EDD 9B0864D8 269B0C45 D99B90CE 1E8E2E90 CC3E032E F88B062C 0A466990
DC9BE64E DC9B0865 D89B8FE0 06DD2E9B 91801E8E 2E917E3E 032EF88B 062C0A46
9BEE66DC 9B0845D9 9B90CE1E 8E2E90CC 3E032EF8 8B062C0A 4669EE5E DD9BDE76
917E3E03 2EF88B06 2C0A4669 37720054 968A9A8F E81EDC2E 9BF646D9 9BF65ED9
90CE1E8E 2E90CC3E 032EF88B 062C0A46 69045DD9 9B8FE006 DD2E9B91 801E8E2E
2C0A4669 90CE068E 2E90CC36 032EF08B 062C0A46 690111E9 045DD99B F646D99B
8B062C0A 4669DE5E DD9B0864 D8269B0C 45D99B90 CE1E8E2E 90CC3E03 2EF88B06
0845D99B 91801E8E 2E917E3E 032EF88B 062C0A46 69918006 8E2E917E 36032EF0
DC9B0845 D99B90CE 1E8E2E90 CC3E032E F88B062C 0A4669E6 5EDD9B0C 64D8269B
9B0845D9 9B91801E 8E2E917E 3E032EF8 8B062C0A 4669EE5E DD9BDE76 DC9BE64E
045DD99B FA46D99B 91801E8E 2E917E3E 032EF88B 062C0A46 69FA5ED9 9BEE46DC
8B062C0A 466942EB 045DD99B EED99B90 CE1E8E2E 90CC3E03 2EF88B06 2C0A4669
91801E8E 2E917E3E 032EF88B 062C0A46 690845D9 9B91801E 8E2E917E 3E032EF8
5E5FC99B 045DD99B EED99B90 CE1E8E2E 90CC3E03 2EF88B06 2C0A4669 045DD99B
00544A8A 9A919036 FF2E9192 36FF2E12 74003D80 90743EC5 2E00001E C85756CB
3D809074 3EC52E04 C4830054 9BD59A50 00120590 7C068B2E 907E36FF 2E04C483
9436FF2E 919636FF 2E0A76FF 35FF90D4 1E8E2E90 D23E032E E7D10A7E 8B267400

C704C483 00549BD5 9A500012 05907C06 8B2E907E 36FF2E08 C4830054 4A8A9A91
037DFE46 3B40058B 90D41E8E 2E90D23E 032EE7D1 0A7E8BFE 46FF03EB 0003FE46
FE768BDF 03918006 8E2E917E 1E032ED8 8B062C0A 466902E7 C14FFE7E 8B00FAE9
968A9A1F D8269B05 D99BFE03 91801E8E 2E917E3E 032EF88B 062C0A46 6902E6C1
D99BFE03 91801E8E 2E917E3E 032EF88B 062C0A46 6902E6C1 4EFE768B 39730054
FE7E8B1D D99BFE03 91801E8E 2E917E3E 032EF88B 062C0A46 6902E6C1 FE768B05
0A466902 E6C1FE76 8BDF0390 CE068E2E 90CC1E03 2ED88B06 2C0A4669 02E7C14F
25E90372 0054968A 9A1FD826 9B05D99B FE0390CE 1E8E2E90 CC3E032E F88B062C
768B05D9 9BFE0390 CE1E8E2E 90CC3E03 2EF88B06 2C0A4669 02E6C14E FE768BFF
0A4669FE E9E91DD9 9BFE0390 CE1E8E2E 90CC3E03 2EF88B06 2C0A4669 02E6C1FE
917E3E03 2EF88B06 2C0A4669 1DD99BEE D99B90CE 1E8E2E90 CC3E032E F88B062C
2C0A4669 9180068E 2E917E36 032EF08B 062C0A46 691DD99B EED99B91 801E8E2E
0163E903 75005496 8A9A085C D8269B0C 45D99B91 801E8E2E 917E3E03 2EF88B06
1E8E2E91 7E3E032E F88B062C 0A466991 80068E2E 917E3603 2EF08B06 2C0A4669
90CE068E 2E90CC36 032EF08B 062C0A46 69EA5EDD 9B0864D8 269B0C45 D99B9180
D99BEA76 DC9B0864 D8269B0C 45D99B90 CE1E8E2E 90CC3E03 2EF88B06 2C0A4669
69EA5EDD 9B084DD8 9BFA46D9 9B91801E 8E2E917E 3E032EF8 8B062C0A 4669FA5E
F646D99B F65ED99B EA66DC9B 0845D99B 90CE1E8E 2E90CC3E 032EF88B 062C0A46
D99B9180 1E8E2E91 7E3E032E F88B062C 0A466958 72005496 8A9A8FE8 1EDC2E9B
7E8B045D D99BF646 D99B90CE 1E8E2E90 CC3E032E F88B062C 0A466904 5DD99BEE
90D41E8E 2E90D23E 032EE7D1 0A7E8B40 40058B90 D41E8E2E 90D23E03 2EE7D10A
0A466904 5DD99BEE D99B90CE 1E8E2E90 CC3E032E F88B062C 0A466900 C4E90589
0A7E8B04 5DD99BFA 76D89BE0 D99BF646 D99B9180 1E8E2E91 7E3E032E F88B062C
8990D41E 8E2E90D2 3E032EE7 D10A7E8B 4040058B 90D41E8E 2E90D23E 032EE7D1
2EF88B06 2C0A4669 0845D99B 91801E8E 2E917E3E 032EF88B 062C0A46 6966EB05
D99B90CE 1E8E2E90 CC3E032E F88B062C 0A466904 5DD99B91 801E8E2E 917E3E03
3E032EE7 D10A7E8B 4040058B 90D41E8E 2E90D23E 032EE7D1 0A7E8B04 5DD99BEE
6902E7C1 4F4F3C8B 90D41E8E 2E90D236 032EE6D1 0A768B05 8990D41E 8E2E90D2
D41E8E2E 90D23E03 2EE7D10A 7E8BDF03 9180068E 2E917E1E 032ED88B 062C0A46
D8269B05 D99BFE03 91801E8E 2E917E3E 032EF88B 062C0A46 6902E6C1 4E358B90
E7C14F4F 3C8B90D4 1E8E2E90 D236032E E6D10A76 8B0234E9 03750054 968A9A1F
8E2E90D2 3E032EE7 D10A7E8B DF039180 068E2E91 7E1E032E D88B062C 0A466902
9B05D99B FE039180 1E8E2E91 7E3E032E F88B062C 0A466902 E6C14E35 8B90D41E
0A466902 E7C14F4F 3C8B90D4 1E8E2E90 D236032E E6D10A76 8BEA5EDD 9B27D826
8B90D41E 8E2E90D2 3E032EE7 D10A7E8B DF0390CE 068E2E90 CC1E032E D88B062C
9B27D826 9B05D99B FE0390CE 1E8E2E90 CC3E032E F88B062C 0A466902 E6C14E35
0A466902 E6C14E37 8B2690D4 068E2E90 D21E032E E3D10A5E 8BFA5ED9 9BEA76DC
E7D10A7E 8BEA5EDD 9B0DD89B FA46D99B FE039180 1E8E2E91 7E3E032E F88B062C
CE1E8E2E 90CC3E03 2EF88B06 2C0A4669 02E6C14E 358B90D4 1E8E2E90 D23E032E
F25ED99B F646D89B 8FE00EDC 2E9BFA46 D99BF65E D99BEA66 DC9B05D9 9BFE0390
90D41E8E 2E90D23E 032EE7D1 0A7E8B72 77005496 8A9A8FE0 1EDC2E9B F246D99B
D99B8FE0 06DD2E9B FE039180 1E8E2E91 7E3E032E F88B062C 0A466902 E6C1358B
CC3E032E F88B062C 0A466902 E6C1358B 90D41E8E 2E90D23E 032EE7D1 0A7E8B1D
05FF90D4 1E8E2E90 D23E032E E7D10A7E 8B1DD99B F246D99B FE0390CE 1E8E2E90
032EF88B 062C0A46 6902E6C1 358B90D4 1E8E2E90 D23E032E E7D10A7E 8B0112E9
1E8E2E90 D23E032E E7D10A7E 8B1DD99B 8FE006DD 2E9BFE03 90CE1E8E 2E90CC3E
8FE006DD 2E9BFE03 91801E8E 2E917E3E 032EF88B 062C0A46 6902E6C1 358B90D4
8B0096E9 05FF90D4 1E8E2E90 D23E032E E7D10A7E 8B1DD99B FA76D89B F666D89B
917E3E03 2EF88B06 2C0A4669 02E6C14E 358B90D4 1E8E2E90 D23E032E E7D10A7E
466902E6 C1358B90 D41E8E2E 90D23E03 2EE7D10A 7E8B05D9 9BFE0391 801E8E2E
8E2E90D2 3E032EE7 D10A7E8B 1DD99BFE 0391801E 8E2E917E 3E032EF8 8B062C0A
E006DD2E 9BFE0390 CE1E8E2E 90CC3E03 2EF88B06 2C0A4669 02E6C135 8B90D41E
2E90D23E 032EE7D1 0A7E8B05 FF90D41E 8E2E90D2 3E032EE7 D10A7E8B 1DD99B8F
06DD2E9B FE039180 1E8E2E91 7E3E032E F88B062C 0A466902 E6C1358B 90D41E8E
F88B062C 0A466902 E6C1358B 90D41E8E 2E90D23E 032EE7D1 0A7E8B1D D99B8FE0
2E90D23E 032EE7D1 0A7E8B1D D99B8FE0 06DD2E9B FE0390CE 1E8E2E90 CC3E032E
8B90D41E 8E2E90D2 3E032EE7 D10A7E8B FE46FF03 EB0001FE 46C705FF 90D41E8E
DF039180 068E2E91 7E1E032E D88B062C 0A466902 E7C14FFE 7E8B417D 053BFE46
1FD8269B 05D99BFE 0391801E 8E2E917E 3E032EF8 8B062C0A 466902E6 C1FE768B
466902E7 C14FFE7E 8BE25EDD 9B917236 DC2E9B8F E006DD2E 9BA67400 54968A9A
032EF88B 062C0A46 6902E6C1 FE768BDF 03918006 8E2E917E 1E032ED8 8B062C0A
2C0A4669 02E6C14E FE768BEA 5EDD9B27 D8269B05 D99BFE03 91801E8E 2E917E3E
CC3E032E F88B062C 0A466902 E6C1FE76 8BDE0390 CE068E2E 90CC1E03 2ED88B06
3E032E02 E7C10A7E 8BE24EDC 9BEA76DC 9B27D826 9B05D99B FE0390CE 1E8E2E90

```
8E2E90D2 3E032EE7 D10A7E8B 2674003D 8090743E C52E1DD9 9B919A1E 8E2E9198
2E907E36 FF2E08C4 8300544A 8A9A919C 36FF2E91 9E36FF2E 0A76FF35 FF90D41E
90743EC5 2E000008 C85756CB 5E5FC99B 04C48300 549BD59A 50001205 907C068B
7C068B2E 907E36FF 2E04C483 00544A8A 9A91A036 FF2E91A2 36FF2E12 74003D80
3EC52E5E 5F00543A 809A50FA 468D1600 6A575604 C4830054 9BD59A50 00120590
2E006A0A C4830054 C0489AFA 76FF006A 006A006A 006A1374 00FA7E83 058991A4
7E830674 013D8090 243EC52E FE5689FC 468904C4 830054B4 EA9A35FF 91A43EC5
00F846C7 08C48300 1C881E9A 35FF0275 FF90BC3E C52EFC76 FFFE76FF 1F75000A
0001F846 C708C483 001C5D53 9A35FF02 75FF90BC 3EC52EFC 76FFFE76 FF1DEB00
04C48300 54A51D9A 35FF0275 FF90BC3E C52E04C4 83003C7C 959AFC76 FFFE76FF
003D838F F83EC52E 227501F8 7E8304C4 830054A4 509A35FF 0275FF90 BC3EC52E
A43EC52E 575608C4 83001C74 849A35FF 0275FF90 BC3EC52E FC76FFFE 76FF1875
C70000FD F286C700 08DCC857 56CB5E5F C95E5F00 543A609A 50FA468D 1635FF91
EE86C700 00FDEC86 C70000FD EA86C700 00FDF886 C70000FD F686C700 00FDF486
32FDA286 C7FFCDFD A486C700 00FDA686 C70000FD A886C700 00FDF086 C70000FD
3D809074 3EC52E00 00F73C86 C70000F7 3A86C700 00F73886 C70000F7 3686C701
05907C06 8B2E907E 36FF2E04 C4830054 4A8A9A91 A836FF2E 91AA36FF 2E127400
5BE9037C 04FF0EBE 83FF0E86 FF04EB00 00FF0E86 C704C483 00549BD5 9A500012
9B1F16FD 0302E7C1 FF0EBE8B 05DF9B90 361E8E2E 90343E03 2EE7D1FF 0EBE8B08
FD0302E7 C1FF0EBE 8B05DF9B 90321E8E 2E90303E 032EE7D1 FF0EBE8B FDDA9DD9
E7C1FF0E BE8B05DF 9B902E1E 8E2E902C 3E032EE7 D1FF0EBE 8BFDCA9D D99B1F16
0EBE8B05 DF9B902A 1E8E2E90 283E032E E7D1FF0E BE8BFDBA 9DD99B1F 16FD0302
8BE6D1FF 0CB68BFF 0C8EFF04 EB00FFFF 0C86C7FD AA9DD99B 1F16FD03 02E7C1FF
2EE7D1FF 0EBE8BDC 7400FF3D 058BFE03 8FF21E8E 2E8FF03E 032E09E7 C1FF0EBE
C7058900 FFB803EB 40FF0C86 8B077D00 FF3D40FF 0C868B90 021E8E2E 90003E03
1E8E2E8F F03E032E 09E7C1FF 0EBE8BE6 D1FF0CB6 8BFF0C86 FF04EB00 00FF0C86
047D48FF 0C868B90 0A1E8E2E 90083E03 2EE7D1FF 0EBE8BDE 74003D83 FE038FF2
0EBE8BE6 D1FF0CB6 8BFF0C8E FF04EB00 FFFF0C86 C7058948 FF0C868B 05EBC02B
3E032EE7 D1FF0EBE 8BDC7400 FF3D058B FE0391AE 1E8E2E91 AC3E032E 09E7C1FF
0C86C705 8900FFB8 03EB40FF 0C868B07 7D00FF3D 40FF0C86 8B91B21E 8E2E91B0
91AE1E8E 2E91AC3E 032E09E7 C1FF0EBE 8BE6D1FF 0CB68BFF 0C86FF04 EB0000FF
C02B047D 48FF0C86 8B91B61E 8E2E91B4 3E032EE7 D1FF0EBE 8BDE7400 3D83FE03
E7C1FF0E BE8B8FDE 068E2E8F DC36032E 02E6C1FF 0EB68B05 8948FF0C 868B05EB
2E02E7C1 FF0EBE8B 8FE036DC 2E9B24D8 269B05D9 9B8FDA1E 8E2E8FD8 3E032E02
0EBE8B91 BA068E2E 91B83603 2E02E6C1 FF0EB68B 1DD99B91 BA1E8E2E 91B83E03
A43E032E 02E7C1FF 0EBE8B0C D8269B05 D99B90A6 1E8E2E90 A43E032E 02E7C1FF
E7C1FF0E BE8B91BA 068E2E91 B836032E 02E6C1FF 0EB68B1D D99B90A6 1E8E2E90
8E2E90A0 3E032E02 E7C1FF0E BE8B0CD8 269B05D9 9B90A21E 8E2E90A0 3E032E02
032E02E7 C1FF0EBE 8B91BA06 8E2E91B8 36032E02 E6C1FF0E B68B1DD9 9B90A21E
901A1E8E 2E90183E 032E02E7 C1FF0EBE 8B0CD826 9B05D99B 901A1E8E 2E90183E
90103E03 2E02E7C1 FF0EBE8B 91BA068E 2E91B836 032E02E6 C1FF0EB6 8B1DD99B
1DD99B90 121E8E2E 90103E03 2E02E7C1 FF0EBE8B 0CD8269B 05D99B90 121E8E2E
FD9E9ED9 9BEED99B 009AE903 7F003D83 900A1E8E 2E90083E 032EE7D1 FF0EBE8B
0CBE83FF 0C8EFF04 EBFF0C86 8948058B 900A1E8E 2E90083E 032EE7D1 FF0EBE8B
9ED99BFD 9EAED89B 05D99B90 1A1E8E2E 90183E03 2E02E7C1 FF0EBE8B 6E7C00FF
86D99BFD 9E9ED99B FDA486DF 9B0A7300 54968A9A FDA49EDE 9BFD9E86 D99BFD9E
C1FF0EBE 8BE6D1FF 0CB68B08 C4830054 96EF9A00 54968F9A 911206DC 2E9BFD9E
1E8E2E91 B43E032E E7D1FF0E BE8B87EB 0589FE03 8FF21E8E 2E8FF03E 032E09E7
1E8E2E91 B43E032E E7D1FF0E BE8BFD9E 9ED99BEE D99B009A E9037F00 3D8391B6
3E032E02 E7C1FF0E BE8B6E7C 00FF0CBE 83FF0C8E FF04EBFF 0C868948 058B91B6
8A9AFDA4 9EDE9BFD 9E86D99B FD9E9ED9 9BFD9EAE D89B05D9 9B90A61E 8E2E90A4
9A005496 8F9A9112 06DC2E9B FD9E86D9 9BFD9E9E D99BFDA4 86DF9B0A 73005496
FE0391AE 1E8E2E91 AC3E032E 09E7C1FF 0EBE8BE6 D1FF0CB6 8B08C483 005496EF
2E9B009D E9037C00 FF3D058B 90021E8E 2E90003E 032EE7D1 FF0EBE8B 87EB0589
EBFF0C86 89058B90 021E8E2E 90003E03 2EE7D1FF 0EBE8BFD 9E9ED99B 90A806DF
D99B9012 1E8E2E90 103E032E 02E7C1FF 0EBE8B6E 7F00FFFF 0CBE81FF 0C86FF04
A286DF9B 0A760054 968A9AFD A29EDE9B FD9E86D9 9BFD9E9E D99BFD9E 86D89B05
B68B08C4 83005496 EF9A0054 968F9A91 1206DC2E 9BFD9E86 D99BFD9E 9ED99BFD
D1FF0EBE 8B86EB05 89FE038F F21E8E2E 8FF03E03 2E09E7C1 FF0EBE8B E6D1FF0C
FD9E9ED9 9B90A806 DF2E9B00 9DE9037C 00FF3D05 8B91B21E 8E2E91B0 3E032EE7
FF0CBE81 FF0C86FF 04EBFF0C 8689058B 91B21E8E 2E91B03E 032EE7D1 FF0EBE8B
9ED99BFD 9E86D89B 05D99B90 A21E8E2E 90A03E03 2E02E7C1 FF0EBE8B 6E7F00FF
86D99BFD 9E9ED99B FDA286DF 9B0A7600 54968A9A FDA29EDE 9BFD9E86 D99BFD9E
C1FF0EBE 8BE6D1FF 0CB68B08 C4830054 96EF9A00 54968F9A 911206DC 2E9BFD9E
```

8E2E8FF0 3E032E09 E7C1FF0E BE8B86EB 0589FE03 91AE1E8E 2E91AC3E 032E09E7
7CFDA486 3BFF0C86 8BFF0C8E FF04EBFF FFFF0C86 C7FD9E9E D99B05DF 9B8FF21E
9BFD9E9E D99BFD9E AED89B05 D99B901A 1E8E2E90 183E032E 02E7C1FF 0EBE8B71
9BFD9E86 D99BFD9E 9ED99BFD A486DF9B 0A730054 968A9AFD A49EDE9B FD9E86D9
0E966BCA 8BE2D14A DAF7FF0C 968B08C4 83005496 EF9A0054 968F9A91 1206DC2E
8E2E8FF0 3E032E09 E7C1FF0E BE8B81EB FC068589 F903FE03 1F16FD8B F28B66FF
A2863BFF 0C868BFF 0C86FF04 EB0100FF 0C86C7FD 9E9ED99B 01FE85DF 9B8FF21E
9E9ED99B FD9E86D8 9B05D99B 90121E8E 2E90103E 032E02E7 C1FF0EBE 8B727FFD
9E86D99B FD9E9ED9 9BFDA286 DF9B0A76 0054968A 9AFDA29E DE9BFD9E 86D99BFD
CA8BE2D1 0100EA81 FF0C968B 08C48300 5496EF9A 0054968F 9A911206 DC2E9BFD
AC3E032E 09E7C1FF 0EBE8B80 EBFA6E85 89F903FE 031F16FD 8BF28B66 FF0E966B
863BFF0C 868BFF0C 8EFF04EB FFFFFF0C 86C7FD9E 9ED99B05 DF9B91AE 1E8E2E91
9ED99BFD 9EAED89B 05D99B90 A61E8E2E 90A43E03 2E02E7C1 FF0EBE8B 717CFDA4
86D99BFD 9E9ED99B FDA486DF 9B0A7300 54968A9A FDA49EDE 9BFD9E86 D99BFD9E
CA8BE2D1 4ADAF7FF 0C968B08 C4830054 96EF9A00 54968F9A 911206DC 2E9BFD9E
AC3E032E 09E7C1FF 0EBE8B81 EBF8D685 89F903FE 031F16FD 8BF28B66 FF0E966B
FF0C868B FF0C86FF 04EB0100 FF0C86C7 FD9E9ED9 9B01FE85 DF9B91AE 1E8E2E91
86D89B05 D99B90A2 1E8E2E90 A03E032E 02E7C1FF 0EBE8BF8 0AE9037E FDA2863B
9ED99BFD A286DF9B 0A760054 968A9AFD A29EDE9B FD9E86D9 9BFD9E9E D99BFD9E
EA81FF0C 968B08C4 83005496 EF9A0054 968F9A91 1206DC2E 9BFD9E86 D99BFD9E
FF0A86C7 FF7CE9F7 3E8589F9 03FE031F 16FD8BF2 8B66FF0E 966BCA8B E2D10100
9B91BE1E 8E2E91BC 3E032EE7 D1FF0ABE 8B597D03 FF0ABE83 FF0A86FF 04EB0000
0ABE8B07 16F50302 E6C1FF0A B68BFE6A 9DD99B1F 16FD0302 E7C1FF0A BE8B05DF
16FD0302 E7C1FF0A BE8BFE6A A4D8269B 05DF9B91 C21E8E2E 91C03E03 2EE7D1FF
FF0ABE83 FF0A86FF 04EB0000 FF0A86C7 FE2E9ED9 9BEED99B 9CEBFE5E 9DD99B1F
FE668ED8 9B0845D9 9B91C61E 8E2E91C4 3E032EF8 8B0CFF0A 866B00A9 E9037C03
9BFE628E D89B0445 D99B91C6 1E8E2E91 C43E032E F88B0CFF 0A866BF7 249EDD9B
86DC9BFE 5E8ED89B 05D99B91 C61E8E2E 91C43E03 2EF88B0C FF0A866B F72C9EDD
F50302E6 C1FF0AB6 8BFE529D D99B1F16 FD0302E7 C1FF0ABE 8BF72486 DC9BF72C
86D99BF7 2C9EDD9B FE528CD8 269BFE52 85D99B1F 16FD0302 E7C1FF0A BE8B0716
C4830054 E5409A00 54968F9A FE2E86D9 9BFF49E9 FE2E9ED9 9BF72C86 DC9BFE2E
E9037400 3D838FC8 3EC52E02 0AE90374 00023D05 8B90203E C52EFE32 9ED99B08
04EB0001 FF0C86C7 0339E903 7C03FF0E BE83FF0E 86FF04EB 0000FF0E 86C701FD
FF109ED9 9B02C483 0054969D 9A5004E0 C1FF0C86 8BDF7F0F FF0CBE83 FF0C86FF
06DF2E9B 0B750054 968A9AF7 2C9EDC9B FF1086D9 9BF72C9E DD9B91C8 06DF2E9B
0054968F 9A05D99B 91201E8E 2E911E3E 032E0AE7 C1FF0EBE 8BFF109E D99B90A8
0C868B1D 76005496 8A9AFF10 9ED89B02 C4830054 969D9A50 08C48300 5496EF9A
0000FF02 86C70000 FE7685C7 F903FE03 1F16FD8B F08B22FF 0E866BC8 8BE0D1FF
FE039120 1E8E2E91 1E3E032E 0AE7C1FF 0EBE8B02 E6C1FF02 B68BFF02 86FF04EB
02B68BFF 23E9037C 0100FF02 BE81FF2E E9037600 54968A9A FF109ED8 9B05D99B
9A005496 8F9A05D9 9BFE0391 201E8E2E 911E3E03 2E0AE7C1 FF0EBE8B 02E6C1FF
FF02BE81 08740054 968A9AFF 109ED89B F73486DF 9BF73486 8908C483 005496EF
89FF0286 8BF903FE 031F16FD 8BF08B22 FF0E866B C88BE0D1 FF0C868B 227500FF
0391201E 8E2E911E 3E032E0A E7C1FF0E BE8B02E6 C146FF02 B68BFF5C E9FE7685
9BFF10A6 D89B02C4 83005496 9D9A5008 C4830054 96EF9A00 54968F9A 05D99BFE
E0D1FF0C 868B2277 0054968A 9AF72C9E DC9BF734 A6DE9BFF 1086D99B F72C9EDD
FF0C868B FEE6E9FE 768589FF 02868BF9 03FE031F 16FD8BF0 8B22FF0E 866BC88B
C7FEC3E9 FE768589 40FF0286 8BF903FE 031F16FD 8BF08B22 FF0E866B C88BE0D1
0C86FF04 EB0001FF 0C86C701 3CE9037C 03FF0EBE 83FF0E86 FF04EB00 00FF0E86
DF2E9BFF 109ED99B 02C48300 54969D9A 5004E0C1 FF0C868B DF7F0FFF 0CBE83FF
9B90A806 DF2E9B0B 75005496 8A9AF72C 9EDC9BFF 1086D99B F72C9EDD 9B91C806
7E06032E 062CFF0E 866935FF 90D41E8E 2E90D23E 032EE7D1 FF0EBE8B FF109ED9
50FF1086 8D165052 90CE168B 2E90CC06 032E062C FF0E8669 50529180 168B2E91
F903FE03 1F16FD8B F08B44FF 0E866BC8 8B02E0C1 FF0C868B 0EC48300 1C41D89A
06032E01 A0FF0E86 6935FF90 6A1E8E2E 90683E03 2EE7D1FF 0EBE8BFF 149DD99B
C1FF0C86 8B505290 92168B2E 90900603 2E01A0FF 0E866950 52908E16 8B2E908C
0EC48300 1C41D89A 505200EC 2DC103C6 035A16C5 8BF08B44 FF0E866B C88B02E0
22FF0E96 6BCA8BE2 D1FF0C96 8B08C483 005496EF 9A005496 8F9A9112 06DC2E9B
BA86C700 00FE9886 C70000FE 7686C7FE CCE9FE76 8589F903 FE031F16 FD8BF28B
5689FC46 890C568B 0A468B00 FFFEDA86 C700FFFE B886C700 FFFE9686 C70000FE
8BF65689 F4468940 0005FA56 8BF8468B FA5689F8 46894000 05FE568B FC468BFE
EE568BEC 468BEE56 89EC4689 10568B0E 468BF256 89F04689 400005F6 568BF446
0005E656 8BE4468B E65689E4 46894000 05EA568B E8468BEA 5689E846 89400005
BE8108C1 E9037C14 00FF0EBE 81FF0E86 FF04EB00 00FF0E86 C7E25689 E0468940

8BFF0686 8900F025 FF0E868B FF048689 04F8C10F 0025FF0E 868B2A7D 1000FF0E
8900F025 FF0E868B 227D1100 FF0EBE81 00F5E9FF 08868904 E0C1000F 25FF0E86
1200FF0E BE8100CB E900FFFF 0886C7FF 06868904 E0C1000F 25FF0E86 8BFF0486
FFFF0686 C7FF0886 8904E0C1 000F25FF 0E868BFF 04868900 F025FF0E 868B227D
E0C1000F 25FF0E86 8BFF0686 8900F025 FF0E868B 217D1300 FF0EBE81 00A1E900
8904E0C1 000F25FF 0E868B1B 7D1340FF 0EBE8178 EB00FFFF 0486C7FF 08868904
C1000F25 FF0E868B 1B7D1380 FF0EBE81 55EBFF08 8689FF06 868900FF B8FF0486
25FF0E86 8B1B7D13 C0FF0EBE 8132EBFF 088689FF 04868900 FFB8FF06 868904E0
048689FF 08868900 FFB80FEB FF068689 FF048689 00FFB8FF 08868904 E0C1000F
00FF0686 C7067500 FFFF06BE 810100FF 0886C706 7500FFFF 08BE81FF 068689FF
16FD03E7 D1F88B91 CA3EF72E 99FF0886 8B0100FF 0486C706 7500FFFF 04BE8101
89FE9885 8B1F16FD 03E7D1F8 8B91CA3E F72E99FF 06868BFE FC8689FE 76858B1F
0C76FFFF 008689FE BA858B1F 16FD03E7 D1F88B91 CA3EF72E 99FF0486 8BFEFE86
FF04EB00 00FF0A86 C70CC483 00545B78 9A50FEFC 868D1650 FEF4868D 160A76FF
BE8B127E FDA2863B FEF4858B 1F16FD03 E7D1FF0A BE8B4E7D 04FF0ABE 83FF0A86
863BFEF4 858B1F16 FD03E7D1 FF0ABE8B FEF48589 FDA2868B 1F16FD03 E7D1FF0A
04EB0000 FF0A86C7 A7EBFEF4 8589FDA4 868B1F16 FD03E7D1 FF0ABE8B BB7DFDA4
1F16FD03 E7D1FF0A BE8B0716 F50302E6 C1FF0AB6 8B327D03 FF0ABE83 FF0A86FF
EED99BC3 EBFE469D D99B1F16 FD0302E7 C1FF0ABE 8BFE6AA4 D8269BFE FC85DF9B
0CFF0A86 6B00A9E9 037C03FF 0ABE83FF 0A86FF04 EB0000FF 0A86C7FE 2A9ED99B
8B0CFF0A 866BF724 9EDD9BFE 4E8ED89B 0845D99B 91C61E8E 2E91C43E 032EF88B
F88B0CFF 0A866BF7 2C9EDD9B FE4A8ED8 9B0445D9 9B91C61E 8E2E91C4 3E032EF8
FF0ABE8B F72486DC 9BF72C86 DC9BFE46 8ED89B05 D99B91C6 1E8E2E91 C43E032E
FD0302E7 C1FF0ABE 8B0716F5 0302E6C1 FF0AB68B FE3A9DD9 9B1F16FD 0302E7C1
2A9ED99B F72C86DC 9BFE2A86 D99BF72C 9EDD9BFE 3A8CD826 9BFE3A85 D99B1F16
0054968A 9AFE169E DC9BEED9 9BFE169E DD9BFE2A 8ED89BFE 2E86D99B FF49E9FE
5686D99B F7249EDD 9BFE428E D89BFE5A 86D99B00 9CE9FE26 9ED99BEE D99B0B72
9BF72486 DC9BF72C 86DC9BFE 3A8ED89B FE5286D9 9BF72C9E DD9BFE3E 8ED89BFE
968A9AFE 169EDC9B FE0E86DD 9BFE0E9E DD9BFE36 8ED89BFE 3686D99B FE369ED9
FE229ED9 9BFE16B6 DC9BFE0E 86DD9B0F EBFE229E D99B91CC 06DD2E9B 0D720054
54E5409A 0054968F 9AFE2A8E D89BFE1E 86D99BFE 1E9ED99B FE22A6D8 9BE8D99B
D99B036A E9037700 54968A9A 91D41EDC 2E9BFE26 86D99BFE 269ED99B 08C48300
91DC0EDC 2E9B91DC 0EDC2E9B 918206DF 2E9BFE26 9ED99B91 D426DC2E 9BFE2686
8ED89BE0 D99BFE26 86D99BFE 029ED99B F72CB6DC 9B91CC06 DD2E9BF7 2C9EDD9B
0BE90377 0054968A 9A91E41E DC2E9BFE 0686DD9B FE069EDD 9BFE028E D89BFE26
16FD03E7 D1FF0ABE 8B016BE9 037C04FF 0ABE83FF 0A86FF04 EB0000FF 0A86C702
0A866BC8 8BE0D148 D8F7FEF4 858B1F16 FD03E7D1 FF0ABE8B 6F7D00FE F4BD831F
BE8BFEEC 85891F16 FD03E7D1 FF0ABE8B FC06858B F903FE03 1F16FD8B F08B66FF
FE031F16 FD8BF08B 66FF0A86 6BC88BE0 D148D8F7 FEF4858B 1F16FD03 E7D1FF0A
16FD03E7 D1FF0ABE 8BFF72E9 FEE48589 1F16FD03 E7D1FF0A BE8BF8D6 858BF903
6BC88BE0 D101002D FEF4858B 1F16FD03 E7D1FF0A BE8B6F7E 00FF3DFE F4858B1F
FEEC8589 1F16FD03 E7D1FF0A BE8BFA6E 858BF903 FE031F16 FD8BF08B 66FF0A86
1F16FD8B F08B66FF 0A866BC8 8BE0D101 002DFEF4 858B1F16 FD03E7D1 FF0ABE8B
03E7D1FF 0ABE8BFE F0E9FEE4 85891F16 FD03E7D1 FF0ABE8B F73E858B F903FE03
BE8B058B FE038FF2 1E8E2E8F F03E032E 09E7C1FF 0ABE8BE6 D1FEF4B5 8B1F16FD
FF0ABE8B E6D1FEF4 B58B1F16 FD03E7D1 FF0ABE8B FEEC8589 1F16FD03 E7D1FF0A
E9FEE485 891F16FD 03E7D1FF 0ABE8B05 8BFE0391 AE1E8E2E 91AC3E03 2E09E7C1
FEA6D89B E8D99BFD FE9ED99B 08C48300 54EEC29A 0054968F 9AFE0686 DD9BFE87
FF0ABE8B 0248E903 7C04FF0A BE83FF0A 86FF04EB 0000FF0A 86C7FDFA 9ED99BFD
9B0716F5 03E6D1FF 0AB68BF7 2C9EDD9B FEE48DDE 9BFDFA86 D99B1F16 FD03E7D1
FF0ABE8B 08C48300 5496EF9A 0054968F 9AF72C86 DC9BFEEC 8CDE269B FDFE86D9
E9037C04 FF0ABE83 FF0A86FF 04EB0000 FF0A86C7 A2EBFEDC 85891F16 FD03E7D1
F4858B1F 16FD03E7 D1FF0ABE 8B387D00 FEF4BD83 1F16FD03 E7D1FF0A BE8B01E2
D1FF0ABE 8BF8D685 8BF903FE 031F16FD 8BF08B66 FF0A866B C88BE0D1 48D8F7FE
BE8B387E 00FF3DFE F4858B1F 16FD03E7 D1FF0ABE 8B7EEBFE E485891F 16FD03E7
FE031F16 FD8BF08B 66FF0A86 6BC88BE0 D101002D FEF4858B 1F16FD03 E7D1FF0A
1F16FD03 E7D1FF0A BE8B33EB FEE48589 1F16FD03 E7D1FF0A BE8BF73E 858BF903
D1FF0ABE 8B058BFE 0391AE1E 8E2E91AC 3E032E09 E7C1FF0A BE8BE6D1 FEF4B58B
16FD03E7 D1FF0ABE 8BFEE485 8B1F16FD 03E7D1FF 0ABE8BFE E485891F 16FD03E7
BE8B00E6 E9037C04 FF0ABE83 FF0A86FF 04EB0000 FF0A86C7 FF0CE9FE DC85891F
48D8F7FE F4858B1F 16FD03E7 D1FF0ABE 8B387D00 FEF4BD83 1F16FD03 E7D1FF0A
16FD03E7 D1FF0ABE 8BFC0685 8BF903FE 031F16FD 8BF08B66 FF0A866B C88BE0D1
E7D1FF0A BE8B387E 00FF3DFE F4858B1F 16FD03E7 D1FF0ABE 8B7EEBFE EC85891F
858BF903 FE031F16 FD8BF08B 66FF0A86 6BC88BE0 D101002D FEF4858B 1F16FD03

FEF4B58B 1F16FD03 E7D1FF0A BE8B33EB FEEC8589 1F16FD03 E7D1FF0A BE8BFA6E
16FD03E7 D1FF0ABE 8B058BFE 038FF21E 8E2E8FF0 3E032E09 E7C1FF0A BE8BE6D1
DC85891F 16FD03E7 D1FF0ABE 8BFEEC85 8B1F16FD 03E7D1FF 0ABE8BFE EC85891F
7EC50589 FEDE868B 02E84683 E87EC505 89FEDC86 8B02EC46 83EC7EC5 FF0CE9FE
8B02FC46 83FC7EC5 0589FEE2 868B02E0 4683E07E C50589FE E0868B02 E44683E4
9BF730E9 058B02F0 4683F07E C5058B02 F44683F4 7EC5058B 02F84683 F87EC505
0132FF70 86C7FFCD FF7286C7 0000D046 C70000D2 46C70000 E6C85756 CB5E5FC9
743EC52E FF569ED9 9B91EE06 DD2E9B01 00FF5A86 C7FF689E D99B91EC 06DF2E9B
068B2E90 7E36FF2E 04C48300 544A8A9A 91F636FF 2E91F836 FF2E1274 003D8090
7E8B7B7D 03CE7E83 CE46FF03 EB0000CE 46C704C4 8300549B D59A5000 1205907C
26040326 0DE0C1CE 468B91FA 36C42E00 6A35FF8F D21E8E2E 8FD03E03 2EE7D1CE
2EE7D1CE 7E8BFF4A 85891F16 FD03E7D1 CE7E8B08 C4830034 CB349A50 5202548B
5202548B 26040326 0DE0C1CE 468B91FA 36C42E01 6A35FF92 001E8E2E 91FE3E03
05F79202 3EC52EFF 7CE9FF50 85891F16 FD03E7D1 CE7E8B08 C4830034 CB349A50
03E7D1CE 7E8B01DB E9037C03 CE7E83CE 46FF03EB 0000CE46 C701A8E9 03750040
FF4A858B 1F16FD03 E7D1CE7E 8B207EFF 4A853B92 063EF72E 99FF5A86 8B1F16FD
D99BFF1A 9EDD9B92 0606DF2E 9B0090E9 FF628589 1F16FD03 E7D1CE7E 8B02E0C1
DC9B9208 06DF2E9B FF2A9EDD 9B920606 DF2E9BFF 229EDD9B FF1AB6DC 9BFF5686
B6DC9BFF 5686D99B FF3A9EDD 9BFF56A6 D89B9208 06DF2E9B FF329EDD 9BFF22A6
9BFF3A8E DC9BFF42 A6DC9BFF 4A85DF9B 1F16FD03 E7D1CE7E 8BFF429E DD9BFF2A
891F16FD 03E7D1CE 7E8B08C4 83005496 EF9A0054 968F9AFF 5686D89B FF32B6DC
D1CE7E8B 207EFF50 853B9206 3EF72E99 FF5A868B 1F16FD03 E7D1CE7E 8BFF6285
06DF2E9B FEF2E9FF 5C85891F 16FD03E7 D1CE7E8B 02E0C1FF 50858B1F 16FD03E7
2A9EDD9B 920606DF 2E9BFF22 9EDD9BFF 1AB6DC9B FF5686D9 9BFF1A9E DD9B9206
3A9EDD9B FF56A6D8 9B920806 DF2E9BFF 329EDD9B FF22A6DC 9B920806 DF2E9BFF
DC9BFF50 85DF9B1F 16FD03E7 D1CE7E8B FF429EDD 9BFF2AB6 DC9BFF56 86D99BFF
8B08C483 005496EF 9A005496 8F9AFF56 86D89BFF 32B6DC9B FF3A8EDC 9BFF42A6
8B367D03 CE7E83CE 46FF03EB 0000CE46 C7FE5FE9 FF5C8589 1F16FD03 E7D1CE7E
FD03E7D1 CE7E8BFF 6285891F 16FD03E7 D1CE7E8B FF4A858B 1F16FD03 E7D1CE7E
C7777500 3D838FC8 3EC52EC1 EBFF5C85 891F16FD 03E7D1CE 7E8BFF50 858B1F16
CE7E8B0D E6C1CE76 8B8FCC1E C42E00D8 E9037C03 CE7E83CE 46FF03EB 0000CE46
1F16FD03 E7D1CE7E 8B058B02 5F8E263F 0326FE03 E7D1FF62 BD8B1F16 FD03E7D1
26FE03E7 D1FF5CBD 8B1F16FD 03E7D1CE 7E8B0DE6 C1CE768B 8FCC1EC4 2EDA4589
CE46FF03 EB0000CE 46C790EB D445891F 16FD03E7 D1CE7E8B 058B025F 8E263F03
E7D1FF62 BD8B1F16 FD03E7D1 CE7E8B0D E6C1CE76 8B8FCC1E C42E647D 03CE7E83
C1CE768B 8FCC1EC4 2ED44589 1F16FD03 E7D1CE7E 8B058B02 5F8E263F 0326FE03
D1CE7E8B 058B025F 8E263F03 26FE03E7 D1FF5CBD 8B1F16FD 03E7D1CE 7E8B0DE6
8300545B 789A50DA 468D1650 9C468D16 0A76FF0C 76FF93EB DA45891F 16FD03E7
EB0000CE 46C70CC4 8300545B 789A50D4 468D1650 94468D16 0A76FF0C 76FF0CC4
8B05DF9B 90321E8E 2E90303E 032EE7D1 CE7E8B02 39E9037C 04CE7E83 CE46FF03
8B05DF9B 902A1E8E 2E90283E 032EE7D1 CE7E8B84 5DD99B1F 16FD0302 E7C1CE7E
03E7D1CE 7E8B9C45 8B1F16FD 03E7D1CE 7E8BFF74 9DD99B1F 16FD0302 E7C1CE7E
7E8BA445 891F16FD 03E7D1CE 7E8B9445 8B1F16FD 03E7D1CE 7E8BAC45 891F16FD
E7D1CE7E 8B00009C 45C71F16 FD03E7D1 CE7E8B0E 7D009C7D 831F16FD 03E7D1CE
2EE6D1CE 768B00FF 9445C71F 16FD03E7 D1CE7E8B 0E7E00FF 3D94458B 1F16FD03
2EE6D1CE 768B207E 042B269C 458B1F16 FD03E7D1 CE7E8B90 2A068E2E 90283603
2EE6D1CE 768B20EB 042B269C 458B1F16 FD03E7D1 CE7E8B90 2A068E2E 90283603
C7317E00 033DD8F7 042B269C 458B1F16 FD03E7D1 CE7E8B90 2A068E2E 90283603
2B26058B 902A1E8E 2E90283E 032EE7D1 CE7E8B07 16F503E6 D1CE768B 0001D046
7E8B0000 C245C71F 16FD03E7 D1CE7E8B 0EEBC245 891F16FD 03E7D1CE 7E8B9C44
CE768B00 00C245C7 1F16FD03 E7D1CE7E 8B0E7E00 FA3DAC45 8B1F16FD 03E7D1CE
CE768B20 7E042B26 94458B1F 16FD03E7 D1CE7E8B 9032068E 2E903036 032EE6D1
CE768B20 EB042B26 94458B1F 16FD03E7 D1CE7E8B 9032068E 2E903036 032EE6D1
00033DD8 F7042B26 94458B1F 16FD03E7 D1CE7E8B 9032068E 2E903036 032EE6D1
8B90321E 8E2E9030 3E032EE7 D1CE7E8B 0716F503 E6D1CE76 8B0001D2 46C7317E
00BA45C7 1F16FD03 E7D1CE7E 8B0EEBBA 45891F16 FD03E7D1 CE7E8B94 442B2605
45C71F16 FD03E7D1 CE7E8BFD CCE9037C 00053DA4 458B1F16 FD03E7D1 CE7E8B00
FFA276FF 9476FF96 76FF9876 FF9A76FF 2A74003D 8090743E C52EFDBB E90000BA
2E907E36 FF2E14C4 8300544A 8A9A920A 36FF2E92 0C36FF2E 9C76FF9E 76FFA076
D076FFD2 76FF1874 003D8090 743EC52E 04C48300 549BD59A 50001205 907C068B
50001205 907C068B 2E907E36 FF2E08C4 8300544A 8A9A920E 36FF2E92 1036FF2E
C52E063B E9037400 3D8390C4 3EC52E06 48E90374 01D07E83 04C48300 549BD59A
2E907E36 FF2E04C4 8300544A 8A9A9212 36FF2E92 1436FF2E 1274003D 8090743E
8BFC468B FE5689FC 46890C56 8B0A468B 04C48300 549BD59A 50001205 907C068B

F6568BF4 468BF656 89F44689 400005FA 568BF846 8BFA5689 F8468940 0005FE56
46894000 05EE568B EC468BEE 5689EC46 8910568B 0E468BF2 5689F046 89400005
89E04689 400005E6 568BE446 8BE65689 E4468940 0005EA56 8BE8468B EA5689E8
CC468B24 7D1000CC 7E810567 E9037C14 00CC7E81 CC46FF03 EB0000CC 46C7E256
D1E9B846 8904E0C1 000F25CC 468BB646 8900F025 CC468BB4 468904F8 C10F0025
B846C7B6 468904E0 C1000F25 CC468BB4 468900F0 25CC468B 1D7D1100 CC7E8100
468904E0 C1000F25 CC468BB4 468900F0 25CC468B 1D7D1200 CC7E8100 ADE900FF
C1000F25 CC468BB6 468900F0 25CC468B 1C7D1300 CC7E8100 89E900FF B646C7B8
B8B44689 04E0C100 0F25CC46 8B177D13 40CC7E81 66EB00FF B446C7B8 468904E0
00FFB8B6 468904E0 C1000F25 CC468B17 7D1380CC 7E8148EB B84689B6 468900FF
468900FF B8B84689 04E0C100 0F25CC46 8B177D13 C0CC7E81 2AEBB846 89B44689
C4830054 969D9A50 DE462BB4 468BB646 89B44689 B8468900 FFB80CEB B64689B4
DE462BB4 468BFF2A 9EDD9B02 C4830054 969D9A50 DC462BB6 468BFF22 9EDD9B02
83005496 9D9A50DC 462BB646 8BFF329E DD9BFF22 8EDC9B02 C4830054 969D9A50
FF429EDD 9B02C483 0054969D 9A50DA46 2BB8468B FF3A9EDD 9BFF2A8E DC9B02C4
D99BFF32 86DC9BFF 3A86DC9B FF428EDC 9B02C483 0054969D 9A50DA46 2BB8468B
10C48300 54D1809A 0054968F 9AFF6C86 D99B0054 968F9A91 1206DD2E 9BFF6C9E
7EDA462B B8468B03 59E90376 0054968A 9AFF689E D89BFF6C 86D99BFF 6C9ED99B
7EDC462B B6468B00 FFE9037C 00103DD8 F7DA462B B8468B08 EBDA462B B8468B08
3DDE462B B4468B00 DFE9037C 00103DD8 F7DC462B B6468B08 EBDC462B B6468B08
19EB00BA E9037C00 103DDE46 2BB4468B 107E0000 3DC02B02 EB0001B8 057D0010
4603058B FC7EC500 9FE90375 D8F7C02B 02EB0001 B8057D00 103DDE46 2BB4468B
0589EC7E C5CA468B CA4689C2 4603058B FC7EC508 EBFF7286 8B067DFF 72863BC2
8BCA4689 C4460305 8BF87EC5 08EBFF72 868B067D FF72863B C4460305 8BF87EC5
058BF47E C508EBFF 72868B06 7DFF7286 3BC64603 058BF47E C50589E8 7EC5CA46
FF72868B 067DFF72 863BC846 03058BF0 7EC50589 E47EC5CA 468BCA46 89C64603
6C8ED89B C246DF9B 0262E905 89E07EC5 CA468BCA 4689C846 03058BF0 7EC508EB
3AA6DC9B 02C48300 54969D9A 50C24603 058BFC7E C5FF3A9E DD9BFF68 B6D89BFF
54968F9A FF7286DF 9B147600 54968A9A FF429EDC 9BFF7286 DF9BFF42 9EDD9BFF
7EC5FF32 9EDD9BFF 68B6D89B FF6C8ED8 9BC246DF 9B36EB08 C4830054 96EF9A00
C4830054 96EF9A00 54968F9A FF32A6DC 9B02C483 0054969D 9A50C246 03058BFC
4603058B F87EC5FF 3A9EDD9B FF68B6D8 9BFF6C8E D89BC446 DF9B0589 EC7EC508
8A9AFF42 9EDC9BFF 7286DF9B FF429EDD 9BFF3AA6 DC9B02C4 83005496 9D9A50C4
8ED89BC4 46DF9B36 EB08C483 005496EF 9A005496 8F9AFF72 86DF9B14 76005496
A6DC9B02 C4830054 969D9A50 C4460305 8BF87EC5 FF329EDD 9BFF68B6 D89BFF6C
B6D89BFF 6C8ED89B C646DF9B 0589E87E C508C483 005496EF 9A005496 8F9AFF32
9EDD9BFF 3AA6DC9B 02C48300 54969D9A 50C64603 058BF47E C5FF3A9E DD9BFF68
96EF9A00 54968F9A FF7286DF 9B147600 54968A9A FF429EDC 9BFF7286 DF9BFF42
03058BF4 7EC5FF32 9EDD9BFF 68B6D89B FF6C8ED8 9BC646DF 9B36EB08 C4830054
E47EC508 C4830054 96EF9A00 54968F9A FF32A6DC 9B02C483 0054969D 9A50C646
9D9A50C8 4603058B F07EC5FF 3A9EDD9B FF68B6D8 9BFF6C8E D89BC846 DF9B0589
76005496 8A9AFF42 9EDC9BFF 7286DF9B FF429EDD 9BFF3AA6 DC9B02C4 83005496
D89BFF6C 8ED89BC8 46DF9B36 EB08C483 005496EF 9A005496 8F9AFF72 86DF9B14
8F9AFF32 A6DC9B02 C4830054 969D9A50 C8460305 8BF07EC5 FF329EDD 9BFF68B6
8BF87EC5 0589EC7E C5058BFC 7EC528EB 0589E07E C508C483 005496EF 9A005496
468302EC 46830589 E07EC505 8BF07EC5 0589E47E C5058BF4 7EC50589 E87EC505
1076FFFA 8CE902F0 468302E0 468302F4 468302E4 468302F8 468302E8 468302FC
E9037401 D27E8304 C4830054 A4509A0A 76FF0C76 FF04C483 003C7C95 9A0E76FF
C52E063B E9037500 023D058B 905C3EC5 2E064AE9 0374003D 8390C03E C52E0657
2E907E36 FF2E04C4 8300544A 8A9A9216 36FF2E92 1836FF2E 1274003D 8090743E
8BFC468B FE5689FC 46890C56 8B0A468B 04C48300 549BD59A 50001205 907C068B
F6568BF4 468BF656 89F44689 400005FA 568BF846 8BFA5689 F8468940 0005FE56
46894000 05EE568B EC468BEE 5689EC46 8910568B 0E468BF2 5689F046 89400005
89E04689 400005E6 568BE446 8BE65689 E4468940 0005EA56 8BE8468B EA5689E8
CC468B24 7D1000CC 7E810567 E9037C14 00CC7E81 CC46FF03 EB0000CC 46C7E256
D1E9B846 8904E0C1 000F25CC 468BB646 8900F025 CC468BB4 468904F8 C10F0025
B846C7B6 468904E0 C1000F25 CC468BB4 468900F0 25CC468B 1D7D1100 CC7E8100
468904E0 C1000F25 CC468BB4 468900F0 25CC468B 1D7D1200 CC7E8100 ADE900FF
C1000F25 CC468BB6 468900F0 25CC468B 1C7D1300 CC7E8100 89E900FF B646C7B8
B8B44689 04E0C100 0F25CC46 8B177D13 40CC7E81 66EB00FF B446C7B8 468904E0
00FFB8B6 468904E0 C1000F25 CC468B17 7D1380CC 7E8148EB B84689B6 468900FF
468900FF B8B84689 04E0C100 0F25CC46 8B177D13 C0CC7E81 2AEBB846 89B44689
C4830054 969D9A50 D8462BB4 468BB646 89B44689 B8468900 FFB80CEB B64689B4
D8462BB4 468BFF2A 9EDD9B02 C4830054 969D9A50 D6462BB6 468BFF22 9EDD9B02

83005496 9D9A50D6 462BB646 8BFF329E DD9BFF22 8EDC9B02 C4830054 969D9A50
FF429EDD 9B02C483 0054969D 9A50D446 2BB8468B FF3A9EDD 9BFF2A8E DC9B02C4
D99BFF32 86DC9BFF 3A86DC9B FF428EDC 9B02C483 0054969D 9A50D446 2BB8468B
10C48300 54D1809A 0054968F 9AFF6C86 D99B0054 968F9A91 1206DD2E 9BFF6C9E
7ED4462B B8468B03 59E90376 0054968A 9AFF689E D89BFF6C 86D99BFF 6C9ED99B
7ED6462B B6468B00 FFE9037C 00103DD8 F7D4462B B8468B08 EBD4462B B8468B08
3DD8462B B4468B00 DFE9037C 00103DD8 F7D6462B B6468B08 EBD6462B B6468B08
19EB00BA E9037C00 103DD846 2BB4468B 107E0000 3DC02B02 EB0001B8 057D0010
4603058B FC7EC500 9FE90375 D8F7C02B 02EB0001 B8057D00 103DD846 2BB4468B
0589EC7E C5CA468B CA4689BA 4603058B FC7EC508 EBFF7086 8B067EFF 70863BBA
8BCA4689 BC460305 8BF87EC5 08EBFF70 868B067E FF70863B BC460305 8BF87EC5
058BF47E C508EBFF 70868B06 7EFF7086 3BBE4603 058BF47E C50589E8 7EC5CA46
FF70868B 067EFF70 863BC046 03058BF0 7EC50589 E47EC5CA 468BCA46 89BE4603
6C8ED89B BA46DF9B 0262E905 89E07EC5 CA468BCA 4689C046 03058BF0 7EC508EB
3AA6DC9B 02C48300 54969D9A 50BA4603 058BFC7E C5FF3A9E DD9BFF68 B6D89BFF
54968F9A FF7086DF 9B147300 54968A9A FF429EDC 9BFF7086 DF9BFF42 9EDD9BFF
7EC5FF32 9EDD9BFF 68B6D89B FF6C8ED8 9BBA46DF 9B36EB08 C4830054 96EF9A00
C4830054 96EF9A00 54968F9A FF32A6DC 9B02C483 0054969D 9A50BA46 03058BFC
4603058B F87EC5FF 3A9EDD9B FF68B6D8 9BFF6C8E D89BBC46 DF9B0589 EC7EC508
8A9AFF42 9EDC9BFF 7086DF9B FF429EDD 9BFF3AA6 DC9B02C4 83005496 9D9A50BC
8ED89BBC 46DF9B36 EB08C483 005496EF 9A005496 8F9AFF70 86DF9B14 73005496
A6DC9B02 C4830054 969D9A50 BC460305 8BF87EC5 FF329EDD 9BFF68B6 D89BFF6C
B6D89BFF 6C8ED89B BE46DF9B 0589E87E C508C483 005496EF 9A005496 8F9AFF32
9EDD9BFF 3AA6DC9B 02C48300 54969D9A 50BE4603 058BF47E C5FF3A9E DD9BFF68
96EF9A00 54968F9A FF7086DF 9B147300 54968A9A FF429EDC 9BFF7086 DF9BFF42
03058BF4 7EC5FF32 9EDD9BFF 68B6D89B FF6C8ED8 9BBE46DF 9B36EB08 C4830054
E47EC508 C4830054 96EF9A00 54968F9A FF32A6DC 9B02C483 0054969D 9A50BE46
9D9A50C0 4603058B F07EC5FF 3A9EDD9B FF68B6D8 9BFF6C8E D89BC046 DF9B0589
73005496 8A9AFF42 9EDC9BFF 7086DF9B FF429EDD 9BFF3AA6 DC9B02C4 83005496
D89BFF6C 8ED89BC0 46DF9B36 EB08C483 005496EF 9A005496 8F9AFF70 86DF9B14
8F9AFF32 A6DC9B02 C4830054 969D9A50 C0460305 8BF07EC5 FF329EDD 9BFF68B6
8BF87EC5 0589EC7E C5058BFC 7EC528EB 0589E07E C508C483 005496EF 9A005496
468302EC 46830589 E07EC505 8BF07EC5 0589E47E C5058BF4 7EC50589 E87EC505
1076FFFA 8CE902F0 468302E0 468302F4 468302E4 468302F8 468302E8 468302FC
5756CB5E 5FC99B04 C4830054 A4509A0A 76FF0C76 FF04C483 003C7C95 9A0E76FF
8090243E C52E0132 FF7C86C7 FFCDFF7E 86C70000 8046C700 008246C7 0003BAC8
7E83DE46 FF03EBDE 4689FC46 868B0000 FC4686C7 06EB0003 FC4686C7 0875013D
0302E7C1 DE7E8B05 DF9B9036 1E8E2E90 343E032E E7D1DE7E 8B0455E9 037C04DE
0302E7C1 DE7E8B05 DF9B9032 1E8E2E90 303E032E E7D1DE7E 8BB45DD9 9B1F16FD
0302E7C1 DE7E8B05 DF9B902E 1E8E2E90 2C3E032E E7D1DE7E 8BA45DD9 9B1F16FD
0302E7C1 DE7E8B05 DF9B902A 1E8E2E90 283E032E E7D1DE7E 8B945DD9 9B1F16FD
F03E032E 09E7C1DE 7E8BE6D1 DC768BDC 4EFF03EB 00FFDC46 C7845DD9 9B1F16FD
468B9002 1E8E2E90 003E032E E7D1DE7E 8BDF7400 FF3D058B FE038FF2 1E8E2E8F
D1DC768B DC46FF03 EB0000DC 46C70589 00FFB803 EB40DC46 8B067D00 FF3D40DC
3E032EE7 D1DE7E8B E174003D 83FE038F F21E8E2E 8FF03E03 2E09E7C1 DE7E8BE6
36032E02 E6C1DE76 8B058948 DC468B04 EBC02B04 7D48DC46 8B900A1E 8E2E9008
2E9B24D8 269B05D9 9B8FDA1E 8E2E8FD8 3E032E02 E7C1DE7E 8B8FDE06 8E2E8FDC
36032E02 E6C1DE76 8B1DD99B 91BA1E8E 2E91B83E 032E02E7 C1DE7E8B 8FE036DC
7E8B0CD8 269B05D9 9B901A1E 8E2E9018 3E032E02 E7C1DE7E 8B91BA06 8E2E91B8
BA068E2E 91B83603 2E02E6C1 DE768B1D D99B901A 1E8E2E90 183E032E 02E7C1DE
032E02E7 C1DE7E8B 0CD8269B 05D99B90 1A1E8E2E 90183E03 2E02E7C1 DE7E8B91
E9037F00 3D83900A 1E8E2E90 083E032E E7D1DE7E 8B1DD99B 901A1E8E 2E90183E
EBDC4689 48058B90 0A1E8E2E 90083E03 2EE7D1DE 7E8BFF78 9ED99BEE D99B0093
AED89B05 D99B901A 1E8E2E90 183E032E 02E7C1DE 7E8B6B7C 00DC7E83 DC4EFF03
9ED99BFF 7E86DF9B 0A730054 968A9AFF 7E9EDE9B FF7886D9 9BFF789E D99BFF78
8BE6D1DC 768B08C4 83005496 EF9A0054 968F9A91 1206DC2E 9BFF7886 D99BFF78
2E90003E 032EE7D1 DE7E8B8C EB0589FE 038FF21E 8E2E8FF0 3E032E09 E7C1DE7E
032EE7D1 DE7E8BFF 789ED99B 90A806DF 2E9B0096 E9037C00 FF3D058B 90021E8E
2E02E7C1 DE7E8B6B 7F00FFDC 7E81DC46 FF03EBDC 4689058B 90021E8E 2E90003E
FF7C9EDE 9BFF7886 D99BFF78 9ED99BFF 7886D89B 05D99B90 121E8E2E 90103E03
54968F9A 911206DC 2E9BFF78 86D99BFF 789ED99B FF7C86DF 9B0A7600 54968A9A
FE038FF2 1E8E2E8F F03E032E 09E7C1DE 7E8BE6D1 DC768B08 C4830054 96EF9A00
FFDC46C7 FF789ED9 9B05DF9B 8FF21E8E 2E8FF03E 032E09E7 C1DE7E8B 8BEB0589
9B901A1E 8E2E9018 3E032E02 E7C1DE7E 8B6E7CFF 7E863BDC 468BDC4E FF03EBFF

86DF9B0A 73005496 8A9AFF7E 9EDE9BFF 7886D99B FF789ED9 9BFF78AE D89B05D9
8B08C483 005496EF 9A005496 8F9A9112 06DC2E9B FF7886D9 9BFF789E D99BFF7E
DE7E8B86 EBFDE085 89F903FE 031F16FD 8BF28B66 DE566BCA 8BE2D14A DAF7DC56
46FF03EB 0100DC46 C7FF789E D99B01FE 85DF9B8F F21E8E2E 8FF03E03 2E09E7C1
05D99B90 121E8E2E 90103E03 2E02E7C1 DE7E8BFC 0EE9037E FF7C863B DC468BDC
FF7C86DF 9B0A7600 54968A9A FF7C9EDE 9BFF7886 D99BFF78 9ED99BFF 7886D89B
DC568B08 C4830054 96EF9A00 54968F9A 911206DC 2E9BFF78 86D99BFF 789ED99B
8B0A468B 82EBFC48 8589F903 FE031F16 FD8BF28B 66DE566B CA8BE2D1 0100EA81
400005FA 568BF846 8BFA5689 F8468940 0005FE56 8BFC468B FE5689FC 46890C56
5689EC46 8910568B 0E468BF2 5689F046 89400005 F6568BF4 468BF656 89F44689
8BE65689 E4468940 0005EA56 8BE8468B EA5689E8 46894000 05EE568B EC468BEE
E9037C14 00DE7E81 DE46FF03 EB0000DE 46C7E256 89E04689 400005E6 568BE446
8902EC46 83EC7EC5 058B02FC 4683FC7E C500CAE9 0374003D 8090243E C52E0280
83E47EC5 058B02F4 4683F47E C5058902 E84683E8 7EC5058B 02F84683 F87EC505
DA468BDA 4689FF7C 868B077E FF7C863B DA468BDA 4689058B F07EC505 8902E446
8B1F16FD 03E7D14F DFF7DA7E 8B157D00 DA7E83DA 4689FF7E 868B077D FF7E863B
FD7A858B 1F16FD03 E7D10100 EF81DA7E 8B167E00 FFDA7E81 33EBCA46 89FF1285
4689CA46 8BCA4689 0600858B 8FF21E8E 2E8FF03E 032EE7D1 DA7E8B16 EBCA4689
4689058B FC7EC5FF 1CE9058B 02F04683 F07EC505 89D2468B 02E04683 E07EC5D2
89058BF0 7EC5D846 89D04689 058BF47E C5D64689 CE468905 8BF87EC5 D44689CC
16FD03E7 D1DC7E8B 0113E903 7E03DC7E 83DC46FF 03EB0000 DC46C7DA 4689D246
03E7D1DC 7E8BD445 89FF7C86 8B1F16FD 03E7D1DC 7E8B107E FF7C863B D4458B1F
D1DC7E8B D44589FF 7E868B1F 16FD03E7 D1DC7E8B 107DFF7E 863BD445 8B1F16FD
466BC88B E0D148D8 F7D4458B 1F16FD03 E7D1DC7E 8B337D00 D47D831F 16FD03E7
7E8B72EB C445891F 16FD03E7 D1DC7E8B FDE0858B F903FE03 1F16FD8B F08B66DC
E0D10100 2DD4458B 1F16FD03 E7D1DC7E 8B337E00 FF3DD445 8B1F16FD 03E7D1DC
C445891F 16FD03E7 D1DC7E8B FC48858B F903FE03 1F16FD8B F08B66DC 466BC88B
8FF21E8E 2E8FF03E 032E09E7 C1DC7E8B E6D1D475 8B1F16FD 03E7D1DC 7E8B2EEB
D1DC7E8B C4458B1F 16FD03E7 D1DC7E8B C445891F 16FD03E7 D1DC7E8B 058BFE03
058B02FC 4683FC7E C50589CC 468B02EC 4683EC7E C5FEE1E9 CC45891F 16FD03E7
89D0468B 02E44683 E47EC505 8B02F846 83F87EC5 0589CE46 8B02E846 83E87EC5
E9058B02 F04683F0 7EC50589 D2468B02 E04683E0 7EC5058B 02F44683 F47EC505
00147F5E 00147F4E 00240218 00147DE6 00147B9A 00147BF6 00CB5E5F C99BFD73
00147E8E 00147868 001404D2 0024D53E 00000000 00000000 406FE000 00000000
00147FA4 0014788A 00147FB4 0014787A 00147F94 00147872 00147F9C 0014786A
00000000 00147EBE 00147F2E 00147F36 00147F3E 00147F46 00147BA3 001477E8
001404D8 00147F7E 40000000 00000000 00147EDE 00147E9E 00147EAE 40140000
004C7C64 00140000 0014951F 00240224 00147F8E 001477E2 00147F6E 00147826
00141CEA 001410F6 00240704 00144906 00144DE6 001477DA 001404CE 00140025
00147B8C 0014004B 00034008 00000000 00000014 003200FF 001478BA 001478AA
007C0014 782E0014 00680014 77DC000A 00143682 001428DE 001404D4 001404D6
014C0014 010E0014 00E00014 00CC0014 00B80014 00A40014 00900014 783E0014
6BDA0014 01A63FE0 00000000 00000014 01790014 785A0014 784E0014 01630014
0214004C 83AE0014 02110014 01FE0014 01FB0014 01F30014 01CE0014 654A0014
02A70014 02960014 026F0014 02540014 05020014 024A0014 02260014 02170014
52C60014 031240AF FE000000 00000014 03010014 02F00014 02DD0014 02C20014
001403E5 00240BE8 001403D2 001403AC 00140382 0014035D 0014033C 00020014
00147DFE 001478CA 001478A2 0014789A 0024CBD0 0014041E 00147866 001403F8
00000000 40220000 00000000 3FF00000 00000000 00100100 0024C3AA 00147E04
7DEC0014 7B960014 04454070 00000000 00000053 C0100000 00000000 402A0000
004634C8 57560014 04B60014 04A10014 048A0014 045D0FFF 00040014 93740014
2E9BFBF0 9EDD9BEF CA06DD2E 9BFBF89E DD9BEFC2 06DD2E9B FCB49ED9 9BEED99B
DA06DD2E 9B0000FA BE86C700 00FAC086 C70000FA C286C7FB E89EDD9B EFD206DD
EA3EC52E FA589ED9 9BFA5C86 DF9B0100 FA5C86C7 FA829ED9 9BEFE236 DC2E9BEF
0275FF18 7EC50475 FF187EC5 1676FF26 74003D80 EFEE3EC5 2E307400 0105F7EF
000105F7 EFEA3EC5 2E0CC483 00544A8A 9AEFF236 FF2EEFF4 36FF2E35 FF187EC5
35FF1E7E C50275FF 1E7EC504 75FF1E7E C51C76FF 2674003D 80EFEE3E C52E3074
C52E097D 001C7E83 0F7C0016 7E830CC4 8300544A 8A9AEFF6 36FF2EEF F836FF2E
00167E83 000205C7 EFFA3EC5 2E097C00 1C7E830F 7D00167E 83000105 C7EFFA3E
3EC52E09 7D001C7E 830F7D00 167E8300 0005C7EF FA3EC52E 0975001C 7E830F75
EFFA3EC5 2E197400 3D80EFEE 3EC52E23 74000105 F7EFEA3E C52E0003 05C7EFFA
FC2A86FF 04EB0000 FC2A86C7 06C48300 544A8A9A EFFE36FF 2EF00036 FF2E35FF
7E03E7D1 FC2ABE8B 1075003D 831A5E8E 167E03E7 D1FC2ABE 8B447D03 FC2ABE83
03E7D1FC 2ABE8BC3 75003D83 205E8E1E 7E03E7D1 FC2ABE8B 000105C7 1A5E8E18

```
9AF00236 FF2EF004 36FF2EF0 0636FF2E F00836FF 2EB1EB00 0105C720 5E8E1E7E
2E50FC2E 868D16FC 829689FC 80868908 C4830054 99729A50 5204C483 00547FAA
C4830054 EAAA9A50 FC30868D 16506AFC 80B6FFFC 82B6FFF0 0A36FF2E F00C36FF
FFFC82B6 FFF00E36 FF2EF010 36FF2E50 FC1C868D 160CC483 00542A08 9A50520A
868D160C C4830054 2A089A50 520AC483 0054EAAA 9A50FC30 868D1650 6AFC80B6
EAAA9A50 FC30868D 16506AFC 80B6FFFC 82B6FFF0 1236FF2E F01436FF 2E50FC20
FFF01636 FF2EF018 36FF2E50 FC24868D 160CC483 00542A08 9A50520A C4830054
C4830054 2A089A50 520AC483 0054EAAA 9A50FC30 868D1650 6AFC80B6 FFFC82B6
FC30868D 16506AFC 80B6FFFC 82B6FFF0 1A36FF2E F01C36FF 2E50FC2C 868D160C
FF2EF020 36FF2E50 FC10868D 160CC483 00542A08 9A50520A C4830054 EAAA9A50
2A089A50 520AC483 0054EAAA 9A50FC30 868D1650 6AFC80B6 FFFC82B6 FFF01E36
FFFC82B6 FFF02236 FF2EF024 36FF2E50 FC14868D 1650FC00 868D160C C4830054
868D1610 C4830054 2A089A50 520AC483 0054EAAA 9A50FC30 868D1650 6AFC80B6
868D1650 6AFC80B6 FFFC82B6 FFF02636 FF2EF028 36FF2E50 FC18868D 1650FC08
16506AFC 80B6FFFC 82B6FF10 C4830054 2A089A50 520AC483 0054EAAA 9A50FC30
EAAA9A50 FC30868D 16506AFC 80B6FFFC 82B6FF0A C4830054 EAAA9A50 FC30868D
82B6FF0A C4830054 EAAA9A50 FC30868D 16506AFC 80B6FFFC 82B6FF0A C4830054
16506AFC 80B6FFFC 82B6FF0A C4830054 EAAA9A50 FC30868D 16506AFC 80B6FFFC
EAAA9A50 FC30868D 16506AFC 80B6FFFC 82B6FF0A C4830054 EAAA9A50 FC30868D
82B6FF0A C4830054 EAAA9A50 FC30868D 16506AFC 80B6FFFC 82B6FF0A C4830054
16506AFC 80B6FFFC 82B6FF0A C4830054 EAAA9A50 FC30868D 16506AFC 80B6FFFC
EAAA9A50 FC30868D 16506AFC 80B6FFFC 82B6FF0A C4830054 EAAA9A50 FC30868D
82B6FF0A C4830054 EAAA9A50 FC30868D 16506AFC 80B6FFFC 82B6FF0A C4830054
16506AFC 80B6FFFC 82B6FF0A C4830054 EAAA9A50 FC30868D 16506AFC 80B6FFFC
468D1650 F0468D16 50F8468D 1650BA06 868D160A C4830054 EAAA9A50 FC30868D
54EAAA9A 50FC3086 8D16506A FC80B6FF FC82B6FF F02A36FF 2EF02C36 FF2E50E8
8D1650D8 468D1650 E0468D16 50BA0886 8D1618C4 8300542A 089A5052 0AC48300
EAAA9A50 FC30868D 16506AFC 80B6FFFC 82B6FFF0 2E36FF2E F03036FF 2E50D046
1650C046 8D1650C8 468D1650 BA0A868D 1618C483 00542A08 9A50520A C4830054
AA9A50FC 30868D16 506AFC80 B6FFFC82 B6FFF032 36FF2EF0 3436FF2E 50B8468D
50A8468D 1650B046 8D1650BA 0C868D16 18C48300 542A089A 50520AC4 830054EA
9A50FC30 868D1650 6AFC80B6 FFFC82B6 FFF03636 FF2EF038 36FF2E50 A0468D16
C4830054 9C3C9AFC 80B6FFFC 82B6FF18 C4830054 2A089A50 520AC483 0054EAAA
F046DD9B 0054968F 9AF846DD 9B04C483 00544A8A 9AF03A36 FF2EF03C 36FF2E04
1CC48300 544A8A9A F03E36FF 2EF04036 FF2E0054 968F9AE8 46DD9B00 54968F9A
F04436FF 2E005496 8F9AD046 DD9B0054 968F9AD8 46DD9B00 54968F9A E046DD9B
9B005496 8F9AC046 DD9B0054 968F9AC8 46DD9B1C C4830054 4A8A9AF0 4236FF2E
8F9AB046 DD9B1CC4 8300544A 8A9AF046 36FF2EF0 4836FF2E 0054968F 9AB846DD
9AF04A36 FF2EF04C 36FF2E00 54968F9A A046DD9B 0054968F 9AA846DD 9B005496
2E00F5E9 037401FA 46BE8304 C483002C F0DA9A50 FA46868D 161CC483 00544A8A
C52EFA42 9ED99B05 D99BF052 3EC52E04 C4830054 4A8A9AF0 4E36FF2E F05036FF
FF04EB00 00FC2A86 C7FA4086 8908C483 005496EF 9A005496 8F9A05D9 9BF0563E
0303E6C1 FC2AB68B 1F16FD03 03E7C1FC 2ABE8B00 A7E9037C 03FC2ABE 83FC2A86
16FD0303 E7C1FC2A BE8BE85D DD9BFA40 86DE9BE8 4CDC269B FA4286D9 9B0716F5
8BD05DDD 9BFA4086 DE9BD04C DC269BFA 4286D99B 0716F503 03E6C1FC 2AB68B1F
9BB84CDC 269BFA42 86D99B07 16F50303 E6C1FC2A B68B1F16 FD0303E7 C1FC2ABE
D99B0716 F50303E6 C1FC2AB6 8B1F16FD 0303E7C1 FC2ABE8B B85DDD9B FA4086DE
FC2A86FF 04EB0000 FC2A86C7 FF4BE9A0 5DDD9BFA 4086DE9B A04CDC26 9BFA4286
54968A9A E85DDC9B EED99B1F 16FD0303 E7C1FC2A BE8B00B2 E9037C03 FC2ABE83
1F16FD03 03E7C1FC 2ABE8BE8 5DDD9BE8 D99B1F16 FD0303E7 C1FC2ABE 8B127200
D05DDD9B E8D99B1F 16FD0303 E7C1FC2A BE8B1272 0054968A 9AD05DDC 9BEED99B
03E7C1FC 2ABE8B12 72005496 8A9AB85D DC9BEED9 9B1F16FD 0303E7C1 FC2ABE8B
968A9AA0 5DDC9BEE D99B1F16 FD0303E7 C1FC2ABE 8BB85DDD 9BE8D99B 1F16FD03
EA3EC52E FF40E9A0 5DDD9BE8 D99B1F16 FD0303E7 C1FC2ABE 8BFF55E9 03730054
00544A8A 9AF05A36 FF2EF05C 36FF2E12 74003D80 EFEE3EC5 2E1C7400 0105F7EF
05F7EFEA 3EC52E05 7EE9037C 03FC2ABE 83FC2A86 FF04EB00 00FC2A86 C704C483
2E1676FF 35FF1A5E 8E187E03 E7D1FC2A BE8B2374 003D80EF EE3EC52E 2D740001
9A500012 05F06206 8B2EF064 36FF2E08 C4830054 4A8A9AF0 5E36FF2E F06036FF
FC2ABE8B 2374003D 80EFEE3E C52E2D74 000105F7 EFEA3EC5 2E04C483 00549BD5
2E08C483 00544A8A 9AF06636 FF2EF068 36FF2E1C 76FF35FF 205E8E1E 7E03E7D1
5E8E0E7E 03E7D1FC 2ABE8B04 C4830054 9BD59A50 001205F0 62068B2E F06436FF
058B105E 8E0E7E03 E7D1FC2A BE8BFCCA 85891F16 FD03E7D1 FC2ABE8B 06458B10
2ABE8B18 458B105E 8E0E7E03 E7D1FC2A BE8BFCD6 85891F16 FD03E7D1 FC2ABE8B
E7D1FC2A BE8B1E45 8B105E8E 0E7E03E7 D1FC2ABE 8BFCD085 891F16FD 03E7D1FC
```

03E7C1FC 2ABE8B24 45D99B10 5E8E0E7E 0302E7C1 FC2ABE8B FCC48589 1F16FD03
8BFCD685 DF9B1F16 FD03E7D1 FC2ABE8B 217500FC 2ABE83FC 9C9DDD9B 1F16FD03
9B02C483 0054969D 9A5040FC D6868B40 EBFA629D DD9B1F16 FD0303E7 C1FC2ABE
FCB6DC9B 02C48300 54969D9A 5040FCD6 858B1F16 FD03E7D1 FC2ABE8B B9FC9EDD
2ABE8B1C 75FF1C7E 83227501 167E83FA 629DDD9B 1F16FD03 03E7C1FC 2ABE8BB9
832275FF 167E8305 891A5E8E 187E03E7 D1FC2ABE 8BFCD685 8B1F16FD 03E7D1FC
89205E8E 1E7E03E7 D1FC2ABE 8BFCCA85 8B1F16FD 03E7D1FC 2ABE8B1C 75011C7E
0303E7C1 FC2ABE8B F06A0EDC 2E9B7845 DD9B105E 8E0E7E03 03E7C1FC 2ABE8B05
F0760EDC 2E9B0090 85DD9B10 5E8E0E7E 0303E7C1 FC2ABE8B FC849DDD 9B1F16FD
E7C1FC2A BE8B1DDD 9BF0741E 8E2EF072 3E032E03 E7C1FC2A BE8BF07E 26DC2E9B
032E03E7 C1FC2ABE 8BF07E26 DC2E9BF0 760EDC2E 9B6045DD 9B105E8E 0E7E0303
0EDC2E9B 4845DD9B 105E8E0E 7E0303E7 C1FC2ABE 8B1DDD9B F0881E8E 2EF0863E
FC2ABE8B 1DDD9BF0 8C1E8E2E F08A3E03 2E03E7C1 FC2ABE8B F07E26DC 2E9BF076
03E7C1FC 2ABE8BF0 7E26DC2E 9BF0760E DC2E9B30 45DD9B10 5E8E0E7E 0303E7C1
003D80EF EE3EC52E 69740001 05F7EFEA 3EC52E1D DD9BF090 1E8E2EF0 8E3E032E
16FD03E7 D1FC2ABE 8B005496 8F9AFC9C 85DD9B1F 16FD0303 E7C1FC2A BE8B5F74
CAB5FF1F 16FD03E7 D1FC2ABE 8BFCD0B5 FF1F16FD 03E7D1FC 2ABE8BFC C4B5FF1F
C4830054 4A8A9AF0 9236FF2E F09436FF 2EFCD6B5 FF1F16FD 03E7D1FC 2ABE8BFC
0886DD9B 0095E903 75003D80 EFEE3EC5 2E00A2E9 03750001 05F7EFEA 3EC52E14
8B005496 8F9A05DD 9BF0901E 8E2EF08E 3E032E03 E7C1FC2A BE8B0054 968F9AFC
2E03E7C1 FC2ABE8B 0054968F 9A05DD9B F08C1E8E 2EF08A3E 032E03E7 C1FC2ABE
1E8E2EF0 723E032E 03E7C1FC 2ABE8B00 54968F9A 05DD9BF0 881E8E2E F0863E03
2E005496 8F9AFC84 85DD9B1F 16FD0303 E7C1FC2A BE8B0054 968F9A05 DD9BF074
EE3EC52E 31740001 05F7EFEA 3EC52E34 C4830054 4A8A9AF0 9636FF2E F09836FF
F09C36FF 2E005496 8F9AFA62 85DD9B1F 16FD0303 E7C1FC2A BE8B2774 003D80EF
00549BD5 9A500012 05F06206 8B2EF064 36FF2E0C C4830054 4A8A9AF0 9A36FF2E
03E7C1FC 2ABE8BFC CA85DF9B 1F16FD03 E7D1FC2A BE8B2175 00FC2ABE 8304C483
8BFB80B6 DC9BFCCA 85DF9B1F 16FD03E7 D1FC2ABE 8B24EBFB 809DDD9B 1F16FD03
9BFC9C85 DD9B1F16 FD0303E7 C1FC2ABE 8BFB809D DD9B1F16 FD0303E7 C1FC2ABE
9DDD9BF0 7E06DD2E 9B1F16FD 0303E7C1 FC2ABE8B 16730054 968A9AF0 7E1EDC2E
8B167600 54968A9A F09E1EDC 2E9BFC9C 85DD9B1F 16FD0303 E7C1FC2A BE8BFC9C
1F16FD03 03E7C1FC 2ABE8BFC 9C9DDD9B F09E06DD 2E9B1F16 FD0303E7 C1FC2ABE
9DDD9BF0 A626DC2E 9BFC9C8C DC269BF0 A606DD2E 9B0716F5 0303E6C1 FC2AB68B
FD0303E7 C1FC2ABE 8B277400 3D80EFEE 3EC52E31 74000105 F7EFEA3E C52EFC9C
FF2E0CC4 8300544A 8A9AF0AE 36FF2EF0 B036FF2E 0054968F 9AFC9C85 DD9B1F16
023D058B EFFA3EC5 2EFA74E9 04C48300 549BD59A 50001205 F062068B 2EF06436
00FC2A86 C7033DE9 16468B03 55E90375 00033D05 8BEFFA3E C52E0364 E9037500
E3EB0000 BA0685C7 1F16FD03 E7D1FC2A BE8B127F 03FC2ABE 83FC2A86 FF04EB00
85DF9B1F 16FD03E7 D1FC2ABE 8B3E7D03 FC2ABE83 FC2A86FF 04EB0000 FC2A86C7
FCCA85DF 9B1F16FD 03E7D1FC 2ABE8BE8 5DDD9B1F 16FD0303 E7C1FC2A BE8BFCD6
9BF0B236 DC2E9BE8 66DC9BA0 46DD9BB7 EBA05DDD 9B1F16FD 0303E7C1 FC2ABE8B
9BB9FC8E DC9BF0BA 06DF2E9B B9FC9EDD 9BE866DC 9BA046DD 9BD05EDD 9BE846DC
037C03FC 2ABE83FC 2A86FF04 EB0001FC 2A86C7B8 5EDD9BE8 46DC9BF0 B236DC2E
DC269BA0 45DD9B1F 16FD0303 E7C1FC2A BE8B0716 F50303E6 C1FC2AB6 8B0287E9
8B1F16FD 0303E7C1 FC2ABE8B B9FC9EDD 9BE866DC 9BA046DD 9BB9F49E DD9BE864
44DC269B B9F48EDC 9BB9FCB6 DC9BE866 DC9BD046 DD9B0716 F50303E6 C1FC2AB6
9BA045DD 9B1F16FD 0303E7C1 FC2ABE8B 0716F503 03E6C1FC 2AB68BD0 5DDD9BE8
16FD0303 E7C1FC2A BE8BB9FC 9EDD9BE8 66DC9BA0 46DD9BB9 F49EDD9B E864DC26
269BB9F4 8EDC9BB9 FCB6DC9B E866DC9B B846DD9B 0716F503 03E6C1FC 2AB68B1F
01AAE903 7C03FC2A BE83FC2A 86FF04EB 0000FC2A 86C7FF2B E9B85DDD 9BE844DC
BE8BE85D DD9B1F16 FD0303E7 C1FC2ABE 8BE845DD 9B1F16FD 0303E7C1 FC2ABE8B
FC2ABE8B D05DDD9B 1F16FD03 03E7C1FC 2ABE8BD0 45DD9B1F 16FD0303 E7C1FC2A
E7C1FC2A BE8BB85D DD9B1F16 FD0303E7 C1FC2ABE 8BB845DD 9B1F16FD 0303E7C1
9BD046DD 9BFF77E9 A05DDD9B 1F16FD03 03E7C1FC 2ABE8BA0 45DD9B1F 16FD0303
968A9AB9 FC9EDC9B 05DF9B18 7EC5B9FC 9EDD9BE8 46DC9BF0 BC36DC2E 9BE866DC
C5F05EDD 9B0245DF 9B187EC5 E85EDD9B 05DF9B18 7EC50001 BA0686C7 29770054
9BD046DC 9BF0BC36 DC2E9BD0 66DC9BB8 46DD9B00 DDE9F85E DD9B0445 DF9B187E
9B187EC5 0001BA08 86C72977 0054968A 9AB9FC9E DC9B05DF 9B187EC5 B9FC9EDD
9B008BE9 E05EDD9B 0445DF9B 187EC5D8 5EDD9B02 45DF9B18 7EC5D05E DD9B05DF
FC9EDC9B 05DF9B18 7EC5B9FC 9EDD9BB8 46DC9BF0 BC36DC2E 9BB866DC 9BA046DD
9B0245DF 9B187EC5 B85EDD9B 05DF9B18 7EC50001 BA0A86C7 28770054 968A9AB9
A05EDD9B 05DF9B18 7EC50001 BA0C86C7 3AEBC85E DD9B0445 DF9B187E C5C05EDD
3DFCBCE9 0375C00B 12EBB05E DD9B0445 DF9B187E C5A85EDD 9B0245DF 9B187EC5
058BEFFA 3EC52E03 64E90375 00013D05 8BEFFA3E C52EFED1 E9FE43E9 03750002

7F03FC2A BE83FC2A 86FF04EB 0000FC2A 86C7033D E91C468B 0355E903 7500033D
83FC2A86 FF04EB00 00FC2A86 C7E3EB00 00BA0685 C71F16FD 03E7D1FC 2ABE8B12
1F16FD03 03E7C1FC 2ABE8BFC D685DF9B 1F16FD03 E7D1FC2A BE8B3E7D 03FC2ABE
DD9B1F16 FD0303E7 C1FC2ABE 8BFCCA85 DF9B1F16 FD03E7D1 FC2ABE8B E85DDD9B
DC9BA046 DD9BD05E DD9BE846 DC9BF0B2 36DC2E9B E866DC9B A046DD9B B7EBA05D
B85EDD9B E846DC9B F0B236DC 2E9BB9FC 8EDC9BF0 BA06DF2E 9BB9FC9E DD9BE866
16F50303 E6C1FC2A B68B0287 E9037C03 FC2ABE83 FC2A86FF 04EB0001 FC2A86C7
DC9BA046 DD9BB9F4 9EDD9BE8 64DC269B A045DD9B 1F16FD03 03E7C1FC 2ABE8B07
46DD9B07 16F50303 E6C1FC2A B68B1F16 FD0303E7 C1FC2ABE 8BB9FC9E DD9BE866
0303E6C1 FC2AB68B D05DDD9B E844DC26 9BB9F48E DC9BB9FC B6DC9BE8 66DC9BD0
A046DD9B B9F49EDD 9BE864DC 269BA045 DD9B1F16 FD0303E7 C1FC2ABE 8B0716F5
9B0716F5 0303E6C1 FC2AB68B 1F16FD03 03E7C1FC 2ABE8BB9 FC9EDD9B E866DC9B
2A86C7FF 2BE9B85D DD9BE844 DC269BB9 F48EDC9B B9FCB6DC 9BE866DC 9BB846DD
DD9B1F16 FD0303E7 C1FC2ABE 8B01AAE9 037C03FC 2ABE83FC 2A86FF04 EB0000FC
D045DD9B 1F16FD03 03E7C1FC 2ABE8BE8 5DDD9B1F 16FD0303 E7C1FC2A BE8BE845
BE8BB845 DD9B1F16 FD0303E7 C1FC2ABE 8BD05DDD 9B1F16FD 0303E7C1 FC2ABE8B
FC2ABE8B A045DD9B 1F16FD03 03E7C1FC 2ABE8BB8 5DDD9B1F 16FD0303 E7C1FC2A
E846DC9B F0BC36DC 2E9BE866 DC9BD046 DD9BFF77 E9A05DDD 9B1F16FD 0303E7C1
1E7EC500 01BA0686 C7297700 54968A9A B9FC9EDC 9B05DF9B 1E7EC5B9 FC9EDD9B
00DDE9F8 5EDD9B04 45DF9B1E 7EC5F05E DD9B0245 DF9B1E7E C5E85EDD 9B05DF9B
9EDC9B05 DF9B1E7E C5B9FC9E DD9BD046 DC9BF0BC 36DC2E9B D066DC9B B846DD9B
0245DF9B 1E7EC5D0 5EDD9B05 DF9B1E7E C50001BA 0886C729 77005496 8A9AB9FC
F0BC36DC 2E9BB866 DC9BA046 DD9B008B E9E05EDD 9B0445DF 9B1E7EC5 D85EDD9B
01BA0A86 C7287700 54968A9A B9FC9EDC 9B05DF9B 1E7EC5B9 FC9EDD9B B846DC9B
5EDD9B04 45DF9B1E 7EC5C05E DD9B0245 DF9B1E7E C5B85EDD 9B05DF9B 1E7EC500
7EC5A85E DD9B0245 DF9B1E7E C5A05EDD 9B05DF9B 1E7EC500 01BA0C86 C73AEBC8
2A86C7FE D1E9FE43 E9037500 023DFCBC E90375C0 0B12EBB0 5EDD9B04 45DF9B1E
D99B1F16 FD0303E7 C1FC2ABE 8B00B2E9 037C03FC 2ABE83FC 2A86FF04 EB0000FC
BE8BE85D DD9BE8D9 9B1F16FD 0303E7C1 FC2ABE8B 12720054 968A9AE8 5DDC9BEE
FD0303E7 C1FC2ABE 8B127200 54968A9A D05DDC9B EED99B1F 16FD0303 E7C1FC2A
0054968A 9AB85DDC 9BEED99B 1F16FD03 03E7C1FC 2ABE8BD0 5DDD9BE8 D99B1F16
9B1F16FD 0303E7C1 FC2ABE8B B85DDD9B E8D99B1F 16FD0303 E7C1FC2A BE8B1272
DD9BE8D9 9B1F16FD 0303E7C1 FC2ABE8B FF55E903 73005496 8A9AA05D DC9BEED9
8F9AD046 DD9BFB9E 868908C4 83005496 EF9A0054 968F9AE8 46DD9BFF 40E9A05D
08C48300 5496EF9A 0054968F 9AB846DD 9BFB9C86 8908C483 005496EF 9A005496
05F7EFEA 3EC52EFB 98868908 C4830054 96EF9A00 54968F9A A046DD9B FB9A8689
0054968F 9AD846DD 9B005496 8F9AE046 DD9B4874 003D80EF EE3EC52E 52740001
9AE846DD 9B005496 8F9AF046 DD9B0054 968F9AF8 46DD9B00 54968F9A D046DD9B
74000105 F7EFEA3E C52E34C4 8300544A 8A9AF0C4 36FF2EF0 C636FF2E 0054968F
46DD9B00 54968F9A A846DD9B 0054968F 9AB046DD 9B487400 3D80EFEE 3EC52E52
54968F9A B846DD9B 0054968F 9AC046DD 9B005496 8F9AC846 DD9B0054 968F9AA0
C52E2C74 000105F7 EFEA3EC5 2E34C483 00544A8A 9AF0C836 FF2EF0CA 36FF2E00
36FF2EF0 CE36FF2E FB9EB6FF FB9CB6FF FB9AB6FF FB98B6FF 2274003D 80EFEE3E
04C48300 549BD59A 50001205 F062068B 2EF06436 FF2E0CC4 8300544A 8A9AF0CC
FC2A86C7 04C48300 544A8A9A F0D036FF 2EF0D236 FF2E00CE E9037401 FA46BE83
45DD9B1F 16FD0303 E7C1FC2A BE8B0137 E9037C03 FC2ABE83 FC2A86FF 04EB0000
E7C1FC2A BE8B885D DD9B1F16 FD0303E7 C1FC2ABE 8BFA42B6 D89BFA40 A6DE9BE8
DD9B1F16 FD0303E7 C1FC2ABE 8BFA42B6 D89BFA40 A6DE9BD0 45DD9B1F 16FD0303
FC2ABE8B FA42B6D8 9BFA40A6 DE9BB845 DD9B1F16 FD0303E7 C1FC2ABE 8BFF709D
FA40A6DE 9BA045DD 9B1F16FD 0303E7C1 FC2ABE8B FF589DDD 9B1F16FD 0303E7C1
04EB0000 FC2A86C7 FF4CE9FF 409DDD9B 1F16FD03 03E7C1FC 2ABE8BFA 42B6D89B
E7C1FC2A BE8BE845 DD9B1F16 FD0303E7 C1FC2ABE 8B7E7D03 FC2ABE83 FC2A86FF
0303E7C1 FC2ABE8B D045DD9B 1F16FD03 03E7C1FC 2ABE8B88 5DDD9B1F 16FD0303
FD0303E7 C1FC2ABE 8BB845DD 9B1F16FD 0303E7C1 FC2ABE8B FF709DDD 9B1F16FD
16FD0303 E7C1FC2A BE8BA045 DD9B1F16 FD0303E7 C1FC2ABE 8BFF589D DD9B1F16
7FAA9AF0 D436FF2E F0D636FF 2EF0D836 FF2EF0DA 36FF2EFF 77E9FF40 9DDD9B1F
6AFC80B6 FFFC82B6 FFFC8296 89FC8086 8908C483 00549972 9A505204 C4830054
9A50FC30 868D1650 6AFC80B6 FFFC82B6 FF0AC483 0054EAAA 9A50FC30 868D1650
FF0AC483 0054EAAA 9A50FC30 868D1650 6AFC80B6 FFFC82B6 FF0AC483 0054EAAA
6AFC80B6 FFFC82B6 FF0AC483 0054EAAA 9A50FC30 868D1650 6AFC80B6 FFFC82B6
9A50FC30 868D1650 6AFC80B6 FFFC82B6 FF0AC483 0054EAAA 9A50FC30 868D1650
FF0AC483 0054EAAA 9A50FC30 868D1650 6AFC80B6 FFFC82B6 FF0AC483 0054EAAA
6AFC80B6 FFFC82B6 FF0AC483 0054EAAA 9A50FC30 868D1650 6AFC80B6 FFFC82B6
9A50FC30 868D1650 6AFC80B6 FFFC82B6 FF0AC483 0054EAAA 9A50FC30 868D1650

FF0AC483 0054EAAA 9A50FC30 868D1650 6AFC80B6 FFFC82B6 FF0AC483 0054EAAA
6AFC80B6 FFFC82B6 FF0AC483 0054EAAA 9A50FC30 868D1650 6AFC80B6 FFFC82B6
9A50FC30 868D1650 6AFC80B6 FFFC82B6 FF0AC483 0054EAAA 9A50FC30 868D1650
FF0AC483 0054EAAA 9A50FC30 868D1650 6AFC80B6 FFFC82B6 FF0AC483 0054EAAA
6AFC80B6 FFFC82B6 FF0AC483 0054EAAA 9A50FC30 868D1650 6AFC80B6 FFFC82B6
9A50FC30 868D1650 6AFC80B6 FFFC82B6 FF0AC483 0054EAAA 9A50FC30 868D1650
FF0AC483 0054EAAA 9A50FC30 868D1650 6AFC80B6 FFFC82B6 FF0AC483 0054EAAA
6AFC80B6 FFFC82B6 FF0AC483 0054EAAA 9A50FC30 868D1650 6AFC80B6 FFFC82B6
9046DD9B 0054968F 9A9846DD 9BBA06B6 FF0AC483 0054EAAA 9A50FC30 868D1650
FC80B6FF FC82B6FF F0DC36FF 2EF0DE36 FF2E0054 968F9A88 46DD9B00 54968F9A
9B005496 8F9AFF78 86DD9B00 54968F9A 8046DD9B BA08B6FF 22C48300 544AAE9A
00544AAE 9AFC80B6 FFFC82B6 FFF0E036 FF2EF0E2 36FF2E00 54968F9A FF7086DD
FF5886DD 9B005496 8F9AFF60 86DD9B00 54968F9A FF6886DD 9BBA0AB6 FF22C483
FF22C483 00544AAE 9AFC80B6 FFFC82B6 FFF0E436 FF2EF0E6 36FF2E00 54968F9A
54968F9A FF4086DD 9B005496 8F9AFF48 86DD9B00 54968F9A FF5086DD 9BBA0CB6
FFFC82B6 FF22C483 00544AAE 9AFC80B6 FFFC82B6 FFF0E836 FF2EF0EA 36FF2E00
74E9037C 03FC2ABE 83FC2A86 FF04EB00 00FC2A86 C704C483 00549C3C 9AFC80B6
0054968A 9AF0EC1E DC2E9B05 DD9BF074 1E8E2EF0 723E032E 03E7C1FC 2ABE8B01
54968A9A EFD21EDC 2E9B05DD 9BF0741E 8E2EF072 3E032E03 E7C1FC2A BE8B2172
2ABE8B1D DD9BF0F8 06DD2E9B F0F61E8E 2EF0F43E 032E05E7 C1FC2ABE 8BB07600
003E032E 05E7C1FC 2ABE8B18 55DD9BEE D99BF102 1E8E2EF1 003E032E 05E7C1FC
F10406DD 2E9BF0F6 1E8E2EF0 F43E032E 05E7C1FC 2ABE8B1D DD9BF102 1E8E2EF1
E7C1FC2A BE8BF10C 0EDC2E9B FC8485DD 9B1F16FD 0303E7C1 FC2ABE8B 185DDD9B
9BFC8485 DD9B1F16 FD0303E7 C1FC2ABE 8B085DDD 9BF0F61E 8E2EF0F4 3E032E05
E7C1FC2A BE8B085D DD9BF102 1E8E2EF1 003E032E 05E7C1FC 2ABE8BF1 140EDC2E
3E032E05 E7C1FC2A BE8BF11C 06DC2E9B F10C0EDC 2E9BFC84 85DD9B1F 16FD0303
760EDC2E 9BFC8485 DD9B1F16 FD0303E7 C1FC2ABE 8B105DDD 9BF0F61E 8E2EF0F4
A6DC9BF0 7606DD2E 9BF1021E 8E2EF100 3E032E05 E7C1FC2A BE8BB9FC 9EDD9BF0
9D9A50FC D0862BFC C4868BFE 7EE902C4 83001CE9 0B9AFC2A B6FF105D DD9BB9FC
789EDD9B 02C48300 54969D9A 50FCD686 2BFCCA86 8BFB709E DD9B02C4 83005496
FF3A9689 FF388689 0C568B0A 468BFF36 9689FF34 86891FFE 050C568B 0A468BFB
F09EDD9B F07E26DC 2E9BFCD6 86DF9B10 77005496 8A9AFBF0 9EDC9BFC D686DF9B
9EDD9BF0 7E26DC2E 9BFCD086 DF9B1077 0054968A 9AFBF89E DC9BFCD0 86DF9BFB
FBD09EDD 9BFBF8A6 DC9BFCD0 86DF9BFB D89EDD9B FBF8A6DC 9BFCC486 DF9BFBF8
D686DF9B FBC89EDD 9B08C483 0054D984 9A005496 8F9AFBD8 B6DC9BFB D086DD9B
9A005496 8F9AB9FC B6DC9BFB F0A6DC9B FCCA86DF 9BB9FC9E DD9BFBF0 A6DC9BFC
FBC086DD 9BFBC09E DD9BFBC0 8EDC9BFB E886DD9B FBC09EDD 9B08C483 0054D984
86DD9BB9 E49EDD9B 10C48300 54D1809A 0054968F 9AEFC206 DD2E9B00 54968F9A
9BB9EC9E DD9B10C4 830054D1 809A0054 968F9AEF C206DD2E 9B005496 8F9AFBC0
FCCA86DF 9BB9FC9E DD9BB9EC 8EDC9BFC D686DF9B B9F49EDD 9BB9E4A6 DC9BE8D9
B89EDD9B FB78B6DC 9BE0D99B FB7086DD 9BFBF09E DD9BB9F4 B6DC9BB9 FCA6DC9B
2EFBB09E DD9BB9FC A6DC9BFC C486DF9B B9FC9EDD 9BFBB88E DC9BFCD6 86DF9BFB
DD9B0054 968F9AFB F086DD9B 4474003D 80EFEE3E C52E4E74 000105F7 EFEA3EC5
F886DD9B 0054968F 9AFBE886 DD9B0054 968F9AFB C886DD9B 0054968F 9AFBC086
0105F7EF EA3EC52E 2CC48300 544A8A9A F12436FF 2EF12636 FF2E0054 968F9AFB
54968F9A FBB886DD 9B005496 8F9AFBB0 86DD9B26 74003D80 EFEE3EC5 2E307400
001205F0 62068B2E F06436FF 2E14C483 00544A8A 9AF12836 FF2EF12A 36FF2E00
04EB0000 FC2A86C7 FBA09EDD 9BFBC0B6 DC9BFBC8 86DD9B04 C4830054 9BD59A50
DC9BFC2A 86DF9BB9 FC9EDD9B F12C06DF 2E9B1394 E9037E63 FC2ABE83 FC2A86FF
03E7D1FC 2ABE8BFC D6860308 C4830054 96EF9A00 54968F9A B9FCB6DC 9BFB788E
B9FC9EDD 9BFBF0A6 DC9BFCD6 86DF9B00 54968F9A FBA086DD 9BFE6C85 891F16FD
809A0054 968F9AB9 FCB6DC9B FBF0A6DC 9BFE6C85 DF9B1F16 FD03E7D1 FC2ABE8B
9BFB6896 DD9BFB60 96DD9BFB 5896DD9B FBF886DC 9BFBD88E DC9B10C4 830054D1
A6DC9BFB B086DC9B FBB88EDC 9BFE6C85 DF9B1F16 FD03E7D1 FC2ABE8B FBE09EDD
FC9C86DD 9B013BE9 037563FC 2ABE8301 45E90375 00FC2ABE 83FBA89E DD9BFBE0
DD9BFBE0 86DC9BFB A88EDC9B FCA486DD 9BFB689E DD9BFBE0 86DC9BFB A88EDC9B
D0A6DE9B FB6886DD 9BFB589E DD9BFBE0 86DC9BFB A88EDC9B FCAC86DD 9BFB609E
9BFA969E DD9BFB70 B6DC9BFC D0A6DE9B FB6086DD 9BFA9E9E DD9BFB70 B6DC9BFC
9B005496 8F9AFC00 86DD9B00 6AFA8E9E DD9BFB70 B6DC9BFC D0A6DE9B FB5886DD
FA9E9EDD 9B1AC483 001CE59F 9A005496 8F9AFA9E 86DD9B00 54968F9A FC0886DD
0054968F 9AFA9686 DD9B0054 968F9AFC 0886DD9B 0054968F 9AFC0086 DD9B016A
8F9AFC08 86DD9B00 54968F9A FC0086DD 9B026AFA 969EDD9B 1AC48300 1CE59F9A
9BFA9E86 DD9BFA8E 9EDD9B1A C483001C E59F9A00 54968F9A FA8E86DD 9B005496
9EDD9BFC D086DE9B FB708EDC 9BFA9686 DD9BFB68 9EDD9BFC D086DE9B FB708EDC

9A50FCD2 862BFCC6 868BFB58 9EDD9BFC D086DE9B FB708EDC 9BFA8E86 DD9BFB60
9EDD9B02 C4830054 969D9A50 FCD0862B FCC4868B B9EC9EDD 9B02C483 0054969D
FCD286DF 9BB9FC9E DD9BB9EC 8EDC9BB9 F4B6DC9B FCD0A6DE 9BFB6086 DD9BB9F4
B9EC9EDD 9B02C483 0054969D 9A50FCD4 862BFCC8 868BFB60 9EDD9BB9 FC86DC9B
FCD0A6DE 9BFB5886 DD9BB9F4 9EDD9B02 C4830054 969D9A50 FCD0862B FCC4868B
BE8BFB58 9EDD9BB9 FC86DC9B FCD486DF 9BB9FC9E DD9BB9EC 8EDC9BB9 F4B6DC9B
9EDD9BE8 66DC9BD0 46DD9B01 4AE9037E FB9C863B FE6C858B 1F16FD03 E7D1FC2A
DC9BD846 DD9BB9FC 9EDD9BE8 66DC9BFE 6C85DF9B 1F16FD03 E7D1FC2A BE8BB9F4
2ABE8B08 C4830054 96EF9A00 54968F9A F046DC9B B9F4B6DC 9BB9FC8E DC9BF066
FD03E7D1 FC2ABE8B B9F49EDD 9BE866DC 9BD046DD 9BFDA485 891F16FD 03E7D1FC
B6DC9BB9 FC8EDC9B F866DC9B E046DD9B B9FC9EDD 9BE866DC 9BFE6C85 DF9B1F16
DC85891F 16FD03E7 D1FC2ABE 8B08C483 005496EF 9A005496 8F9AF846 DC9BB9F4
E876DC9B F046DD9B 0294E903 7CFB9E86 3BFE6C85 8B1F16FD 03E7D1FC 2ABE8BFC
9AF12E06 DC2E9BB9 FC8EDC9B FE6C85DF 9B1F16FD 03E7D1FC 2ABE8BB9 FC9EDD9B
DC9BF846 DD9BFDA4 85891F16 FD03E7D1 FC2ABE8B 08C48300 5496EF9A 0054968F
2E06DC2E 9BB9FC8E DC9BFE6C 85DF9B1F 16FD03E7 D1FC2ABE 8BB9FC9E DD9BE876
8B020DE9 FCDC8589 1F16FD03 E7D1FC2A BE8B08C4 83005496 EF9A0054 968F9AF1
DD9BD066 DC9BB846 DD9B00AF E9037EFB 9A863BFE 6C858B1F 16FD03E7 D1FC2ABE
9BC046DD 9BB9FC9E DD9BD066 DC9BFE6C 85DF9B1F 16FD03E7 D1FC2ABE 8BB9F49E
BE8B08C4 83005496 EF9A0054 968F9AD8 46DC9BB9 F4B6DC9B B9FC8EDC 9BD866DC
03E7D1FC 2ABE8BB9 F49EDD9B D066DC9B B846DD9B FDA48589 1F16FD03 E7D1FC2A
DC9BB9FC 8EDC9BE0 66DC9BC8 46DD9BB9 FC9EDD9B D066DC9B FE6C85DF 9B1F16FD
85891F16 FD03E7D1 FC2ABE8B 08C48300 5496EF9A 0054968F 9AE046DC 9BB9F4B6
6C85DF9B 1F16FD03 E7D1FC2A BE8BB9F4 9EDD9BB8 66DC9BA0 46DD9B01 47E9FCDC
C046DC9B B9F4B6DC 9BB9FC8E DC9BC066 DC9BA846 DD9BB9FC 9EDD9BB8 66DC9BFE
9BA046DD 9BFDA485 891F16FD 03E7D1FC 2ABE8B08 C4830054 96EF9A00 54968F9A
B9FC9EDD 9BB866DC 9BFE6C85 DF9B1F16 FD03E7D1 FC2ABE8B B9F49EDD 9BB866DC
005496EF 9A005496 8F9AC846 DC9BB9F4 B6DC9BB9 FC8EDC9B C866DC9B B046DD9B
3BFE6C85 8B1F16FD 03E7D1FC 2ABE8BFC DC85891F 16FD03E7 D1FC2ABE 8B08C483
9B1F16FD 03E7D1FC 2ABE8BB9 FC9EDD9B A076DC9B A846DD9B 0084E903 7FFB9886
FC2ABE8B 08C48300 5496EF9A 0054968F 9AF12E06 DC2E9BB9 FC8EDC9B FE6C85DF
16FD03E7 D1FC2ABE 8BB9FC9E DD9BA076 DC9BB046 DD9BFDA4 85891F16 FD03E7D1
BE8B08C4 83005496 EF9A0054 968F9AF1 2E06DC2E 9BB9FC8E DC9BFE6C 85DF9B1F
86DD9BFB 509EDD9B FB6886DD 9B457500 FC2ABE83 FCDC8589 1F16FD03 E7D1FC2A
89FDA485 8B1F16FD 03E7D1FC 2ABE8BFB 409EDD9B FB5886DD 9BFB489E DD9BFB60
9EDC9BFB 6886DD9B 0184E9FB 3C8689FC DC858B1F 16FD03E7 D1FC2ABE 8BFB3E86
968A9AFB 489EDC9B FB6086DD 9BFB689E DD9BFB50 86DD9B0A 76005496 8A9AFB50
9B0A7600 54968A9A FB409EDC 9BFB5886 DD9BFB60 9EDD9BFB 4886DD9B 0A760054
DD9BEED9 9B087300 54968A9A F1361EDC 2E9BFB68 86DD9BFB 589EDD9B FB4086DD
FB689EDD 9BEFDA06 DD2E9B0B 76005496 8A9AEFDA 1EDC2E9B FB6886DD 9BFB689E
9BFB6086 DD9BFB60 9EDD9BEE D99B0873 0054968A 9AF1361E DC2E9BFB 6086DD9B
1EDC2E9B FB5886DD 9BFB609E DD9BEFDA 06DD2E9B 0B760054 968A9AEF DA1EDC2E
54968A9A EFDA1EDC 2E9BFB58 86DD9BFB 589EDD9B EED99B08 73005496 8A9AF136
FB3E863B FDA4858B 1F16FD03 E7D1FC2A BE8BFB58 9EDD9BEF DA06DD2E 9B0B7600
858B1F16 FD03E7D1 FC2ABE8B FDA48589 FB3E868B 1F16FD03 E7D1FC2A BE8B127D
9BFB6886 DD9BFCDC 8589FB3C 868B1F16 FD03E7D1 FC2ABE8B 127DFB3C 863BFCDC
FD03E7D1 FC2ABE8B FB409EDD 9BFB5886 DD9BFB48 9EDD9BFB 6086DD9B FB509EDD
FC2ABE8B FB3C8689 FCDC858B 1F16FD03 E7D1FC2A BE8BFB3E 8689FDA4 858B1F16
8E2EF13E 3E032E02 E7C14747 FC2ABE8B FA828ED8 9BFE6C85 DF9B1F16 FD03E7D1
1EDC2E9B 05D99BF1 401E8E2E F13E3E03 2E02E7C1 4747FC2A BE8B1DD9 9BF1401E
9BEED99B F1401E8E 2EF13E3E 032E02E7 C14747FC 2ABE8B19 73005496 8A9AF136
8A9AEFDA 1EDC2E9B 05D99BF1 401E8E2E F13E3E03 2E02E7C1 4747FC2A BE8B1DD9
D99BEFDA 06DD2E9B F1401E8E 2EF13E3E 032E02E7 C14747FC 2ABE8B1C 76005496
032E02E7 C14747FC 2ABE8BFA 828ED89B FDA485DF 9B1F16FD 03E7D1FC 2ABE8B1D
F1401E8E 2EF13E3E 032E02E7 C14747FC 2ABE8B01 A09DD99B F1401E8E 2EF13E3E
F13E3E03 2E02E7C1 4747FC2A BE8B1B73 0054968A 9AF1361E DC2E9B01 A085D99B
F1401E8E 2EF13E3E 032E02E7 C14747FC 2ABE8B01 A09DD99B EED99BF1 401E8E2E
F13E3E03 2E02E7C1 4747FC2A BE8B1E76 0054968A 9AEFDA1E DC2E9B01 A085D99B
9BFCDC85 DF9B1F16 FD03E7D1 FC2ABE8B 01A09DD9 9BEFDA06 DD2E9BF1 401E8E2E
FC2ABE8B 03409DD9 9BF1401E 8E2EF13E 3E032E02 E7C14747 FC2ABE8B FA828ED8
73005496 8A9AF136 1EDC2E9B 034085D9 9BF1401E 8E2EF13E 3E032E02 E7C14747
FC2ABE8B 03409DD9 9BEED99B F1401E8E 2EF13E3E 032E02E7 C14747FC 2ABE8B1B
76005496 8A9AEFDA 1EDC2E9B 034085D9 9BF1401E 8E2EF13E 3E032E02 E7C14747
8B03409D D99BEFDA 06DD2E9B F1401E8E 2EF13E3E 032E02E7 C14747FC 2ABE8B1E

4747FC2A BE8B1DD9 9BFB6886 DD9BF144 1E8E2EF1 423E032E 02E7C147 47FC2ABE
2ABE8B19 73005496 8A9AF136 1EDC2E9B 05D99BF1 441E8E2E F1423E03 2E02E7C1
2E02E7C1 4747FC2A BE8B1DD9 9BEED99B F1441E8E 2EF1423E 032E02E7 C14747FC
C14747FC 2ABE8B1C 76005496 8A9AEFDA 1EDC2E9B 05D99BF1 441E8E2E F1423E03
032E02E7 C14747FC 2ABE8B1D D99BEFDA 06DD2E9B F1441E8E 2EF1423E 032E02E7
F1423E03 2E02E7C1 4747FC2A BE8B01A0 9DD99BFB 6086DD9B F1441E8E 2EF1423E
02E7C147 47FC2ABE 8B1B7300 54968A9A F1361EDC 2E9B01A0 85D99BF1 441E8E2E
F1423E03 2E02E7C1 4747FC2A BE8B01A0 9DD99BEE D99BF144 1E8E2EF1 423E032E
02E7C147 47FC2ABE 8B1E7600 54968A9A EFDA1EDC 2E9B01A0 85D99BF1 441E8E2E
032E02E7 C14747FC 2ABE8B01 A09DD99B EFDA06DD 2E9BF144 1E8E2EF1 423E032E
F1423E03 2E02E7C1 4747FC2A BE8B0340 9DD99BFB 5886DD9B F1441E8E 2EF1423E
02E7C147 47FC2ABE 8B1B7300 54968A9A F1361EDC 2E9B0340 85D99BF1 441E8E2E
F1423E03 2E02E7C1 4747FC2A BE8B0340 9DD99BEE D99BF144 1E8E2EF1 423E032E
02E7C147 47FC2ABE 8B1E7600 54968A9A EFDA1EDC 2E9B0340 85D99BF1 441E8E2E
831F16FD 03E7D1FC 2ABE8B03 409DD99B EFDA06DD 2E9BF144 1E8E2EF1 423E032E
2E9BFB68 86DD9B63 7F0FFF3D FE6C858B 1F16FD03 E7D1FC2A BE8B767C 00FE6CBD
D1FE6CBD 8B1F16FD 03E7D1FC 2ABE8B08 C4830054 96EF9A00 54968F9A F12E06DC
FE6C858B 1F16FD03 E7D1FC2A BE8B587D 03FAC2BE 830589FF 3A9E8EFF 38BE03E7
EE3EC52E 2EEBFAC2 868940FA C2868BFA D68589FE 031F16FD 8BF28B06 FAC2966B
36FF2EF1 4836FF2E FC2AB6FF FE6CB5FF 1F16FD03 E7D1FC2A BE8B2474 003D80EF
D1FC2ABE 8B7A7C00 FDA4BD83 1F16FD03 E7D1FC2A BE8B08C4 8300544A 8A9AF146
EF9A0054 968F9AF1 2E06DC2E 9BFB6086 DD9B677F 0FFF3DFD A4858B1F 16FD03E7
9E8EFF38 BE032000 C781E7D1 FDA4BD8B 1F16FD03 E7D1FC2A BE8B08C4 83005496
F28B06FA C0966BFD A4858B1F 16FD03E7 D1FC2ABE 8B587D03 FAC0BE83 0589FF3A
8B247400 3D80EFEE 3EC52E2E EBFAC086 8940FAC0 868BFAD8 8589FE03 1F16FD8B
00544A8A 9AF14A36 FF2EF14C 36FF2EFC 2AB6FFFD A4B5FF1F 16FD03E7 D1FC2ABE
858B1F16 FD03E7D1 FC2ABE8B 7A7C00FC DCBD831F 16FD03E7 D1FC2ABE 8B08C483
8B08C483 005496EF 9A005496 8F9AF12E 06DC2E9B FB5886DD 9B677F0F FF3DFCDC
BEBE8305 89FF3A9E 8EFF38BE 034000C7 81E7D1FC DCBD8B1F 16FD03E7 D1FC2ABE
89FE031F 16FD8BF2 8B06FABE 966BFCDC 858B1F16 FD03E7D1 FC2ABE8B 587D03FA
FD03E7D1 FC2ABE8B 2474003D 80EFEE3E C52E2EEB FABE8689 40FABE86 8BFADA85
FC2ABE83 08C48300 544A8A9A F14E36FF 2EF15036 FF2EFC2A B6FFFCDC B5FF1F16
26FE6C85 8B1F16FD 03E7D1FC 2ABE8B07 16F503E6 D14EFC2A B68BF1FA E9037F00
858B1F16 FD03E7D1 FC2ABE8B 0716F503 E6D14EFC 2AB68B75 7E00013D FE6C842B
1F16FD03 E7D14FFC 2ABE8BB9 FC9EDD9B 02C48300 54969D9A 50FE6C84 2B26FE6C
BE03E7D1 FE6CBD8B 1F16FD03 E7D1FC2A BE8BFF3A 868EFF38 B603E6D1 FE6CB58B
B68BFCB8 9ED99BB9 FCB6DC9B 02C48300 54969D9A 50042B26 058BFF3A 9E8EFF38
7E00013D FDA4842B 26FDA485 8B1F16FD 03E7D1FC 2ABE8B07 16F503E6 D14EFC2A
50FDA484 2B26FDA4 858B1F16 FD03E7D1 FC2ABE8B 0716F503 E6D14EFC 2AB68B7D
C681E6D1 FDA4B58B 1F16FD03 E7D14FFC 2ABE8BB9 FC9EDD9B 02C48300 54969D9A
BE032000 C781E7D1 FDA4BD8B 1F16FD03 E7D1FC2A BE8BFF3A 868EFF38 B6032000
B68BFCBC 9ED99BB9 FCB6DC9B 02C48300 54969D9A 50042B26 058BFF3A 9E8EFF38
7E00013D FCDC842B 26FCDC85 8B1F16FD 03E7D1FC 2ABE8B07 16F503E6 D14EFC2A
50FCDC84 2B26FCDC 858B1F16 FD03E7D1 FC2ABE8B 0716F503 E6D14EFC 2AB68B7D
C681E6D1 FCDCB58B 1F16FD03 E7D14FFC 2ABE8BB9 FC9EDD9B 02C48300 54969D9A
BE034000 C781E7D1 FCDCBD8B 1F16FD03 E7D1FC2A BE8BFF3A 868EFF38 B6034000
BE8BFCC0 9ED99BB9 FCB6DC9B 02C48300 54969D9A 50042B26 058BFF3A 9E8EFF38
8BFB389E D99B05DF 9BFF3A9E 8EFF38BE 03E7D1FE 6CBD8B1F 16FD03E7 D14FFC2A
9B05DF9B FF3A9E8E FF38BE03 2000C781 E7D1FDA4 BD8B1F16 FD03E7D1 4FFC2ABE
3A9E8EFF 38BE0340 00C781E7 D1FCDCBD 8B1F16FD 03E7D14F FC2ABE8B FB349ED9
858B1F16 FD03E7D1 FC2ABE8B 0716F503 E6D14EFC 2AB68BFB 309ED99B 05DF9BFF
E0D1FE6C 858B1F16 FD03E7D1 4FFC2ABE 8B00F3E9 037F0001 3DFE6C84 2B26FE6C
FE6C858B 1F16FD03 E7D1FC2A BE8BFA88 9689FA86 8689FF3A 968BFF38 86034040
FF3C8689 FA88968B FA86868B FA8C9689 FA8A8689 4848FF3A 968BFF38 8603E0D1
3886D99B 0086E903 76FA8A86 3BFF3E96 8BFF3C86 8B02FF3C 868305EB FF3E9689
EED99B08 73005496 8A9AF136 1EDC2E9B FB3886D9 9BFB389E D99BFCB8 86D89BFB
9ED99BEF DA06DD2E 9B0B7600 54968A9A EFDA1EDC 2E9BFB38 86D99BFB 389ED99B
72FF3C86 3B1FFE05 FF3A968B FF38868B 9672FF38 863BFF3E 968BFF3C 868BFB38
E90589FF 3CBEC508 C4830054 96EF9A00 54968F9A F12E06DC 2E9BFB38 86D99B85
FDA4842B 26FDA485 8B1F16FD 03E7D1FC 2ABE8B07 16F503E6 D14EFC2A B68BFF64
FF388603 200205E0 D1FDA485 8B1F16FD 03E7D14F FC2ABE8B 00FAE903 7F00013D
03200005 E0D1FDA4 858B1F16 FD03E7D1 FC2ABE8B FA889689 FA868689 FF3A968B
3E9689FF 3C8689FA 88968BFA 86868BFA 8C9689FA 8A868948 48FF3A96 8BFF3886
D89BFB34 86D99B00 89E90376 FA8A863B FF3E968B FF3C868B 02FF3C86 8305EBFF

9ED99BEE D99B0873 0054968A 9AF1361E DC2E9BFB 3486D99B FB349ED9 9BFCBC86
8BFB349E D99BEFDA 06DD2E9B 0B760054 968A9AEF DA1EDC2E 9BFB3486 D99BFB34
72FF3C86 3B3FFE05 FF3A968B FF38868B 9377FF3C 863B2000 05FF3A96 8BFF3886
E90589FF 3CBEC508 C4830054 96EF9A00 54968F9A F12E06DC 2E9BFB34 86D99B82
FCDC842B 26FCDC85 8B1F16FD 03E7D1FC 2ABE8B07 16F503E6 D14EFC2A B68BFF61
FF388603 400205E0 D1FCDC85 8B1F16FD 03E7D14F FC2ABE8B ED58E903 7F00013D
03400005 E0D1FCDC 858B1F16 FD03E7D1 FC2ABE8B FA889689 FA868689 FF3A968B
3E9689FF 3C8689FA 88968BFA 86868BFA 8C9689FA 8A868948 48FF3A96 8BFF3886
D89BFB30 86D99BEC E7E90376 FA8A863B FF3E968B FF3C868B 02FF3C86 8305EBFF
9ED99BEE D99B0873 0054968A 9AF1361E DC2E9BFB 3086D99B FB309ED9 9BFCC086
8BFB309E D99BEFDA 06DD2E9B 0B760054 968A9AEF DA1EDC2E 9BFB3086 D99BFB30
72FF3C86 3B5FFE05 FF3A968B FF38868B 9377FF3C 863B4000 05FF3A96 8BFF3886
E90589FF 3CBEC508 C4830054 96EF9A00 54968F9A F12E06DC 2E9BFB30 86D99B82
F88B01A0 FC288669 0540E903 7C03FC28 BE83FC28 86FF04EB 0000FC28 86C7FF61
F13E3E03 2EF88B01 A0FC2886 691DD99B EFDA06DD 2E9BF144 1E8E2EF1 423E032E
EED99BF1 441E8E2E F1423E03 2EF88B01 A0FC2886 691DD99B EED99BF1 401E8E2E
9DD99BEF DA06DD2E 9BF1401E 8E2EF13E 3E032EF8 8B01A0FC 28866901 9C9DD99B
3E3E032E F88B01A0 FC288669 F140068E 2EF13E36 032EF08B 01A0FC28 8669019C
8B01A0FC 28866901 DAE90375 0054968A 9A085CD8 269B0C45 D99BF140 1E8E2EF1
45D99BF1 401E8E2E F13E3E03 2EF88B01 A0FC2886 69F14006 8E2EF13E 36032EF0
288669F1 44068E2E F1423603 2EF08B01 A0FC2886 69B9EC9E DD9B0864 D8269B0C
288669B9 F49EDD9B 0C64D826 9B0845D9 9BF1441E 8E2EF142 3E032EF8 8B01A0FC
9EDD9BB9 ECB6DC9B B9F48EDC 9B0845D9 9BF1401E 8E2EF13E 3E032EF8 8B01A0FC
9ED99BB9 FC86DC9B 0845D99B F1441E8E 2EF1423E 032EF88B 01A0FC28 8669B9FC
3E3E032E F88B01A0 FC288669 37770054 968A9AEF DA1EDC2E 9BFA7A86 D99BFA7A
9BF1441E 8E2EF142 3E032EF8 8B01A0FC 28866904 5DD99BEE D99BF140 1E8E2EF1
288669F1 44068E2E F1423603 2EF08B01 A0FC2886 69013EE9 045DD99B FA7A86D9
288669B9 EC9EDD9B 0C64D826 9B0845D9 9BF1441E 8E2EF142 3E032EF8 8B01A0FC
401E8E2E F13E3E03 2EF88B01 A0FC2886 69F14006 8E2EF13E 36032EF0 8B01A0FC
441E8E2E F1423E03 2EF88B01 A0FC2886 69B9F49E DD9B0864 D8269B0C 45D99BF1
01A0FC28 8669B9FC 9EDD9BB9 ECB6DC9B B9F48EDC 9B0865D8 9BF15206 DF2E9BF1
01A0FC28 8669FA7E 9ED99BB9 FCA6DC9B 0845D99B F1401E8E 2EF13E3E 032EF88B
3E032EF8 8B01A0FC 28866904 5DD99BFA 7E86D99B F1401E8E 2EF13E3E 032EF88B
F13E3E03 2EF88B01 A0FC2886 6956EB04 5DD99BEF DA06DD2E 9BF1441E 8E2EF142
69045DD9 9BF1401E 8E2EF13E 3E032EF8 8B01A0FC 28866908 45D99BF1 401E8E2E
0054968A 9AEFDA1E DC2E9B04 45D99BF1 441E8E2E F1423E03 2EF88B01 A0FC2886
A0FC2886 69F14006 8E2EF13E 36032EF0 8B01A0FC 288669C0 2B02EB00 01B80575
E9037500 54968A9A 01949CD8 269B0190 85D99BF1 401E8E2E F13E3E03 2EF88B01
3E3E032E F88B01A0 FC288669 F140068E 2EF13E36 032EF08B 01A0FC28 866901EB
032EF08B 01A0FC28 8669B9EC 9EDD9B01 90A4D826 9B019485 D99BF140 1E8E2EF1
9B019085 D99BF144 1E8E2EF1 423E032E F88B01A0 FC288669 F144068E 2EF14236
06DF2E9B F1401E8E 2EF13E3E 032EF88B 01A0FC28 8669B9F4 9EDD9B01 94A4D826
032EF88B 01A0FC28 8669B9FC 9EDD9BB9 ECB6DC9B B9F48EDC 9B0194A5 D89BF152
1EDC2E9B FA7A86D9 9BFA7A9E D99BB9FC A6DC9B01 9485D99B F1441E8E 2EF1423E
DA06DD2E 9BF1401E 8E2EF13E 3E032EF8 8B01A0FC 2886693C 72005496 8A9AF136
9DD99BFA 7A86D99B F1441E8E 2EF1423E 032EF88B 01A0FC28 86690198 9DD99BEF
2EF88B01 A0FC2886 69F14406 8E2EF142 36032EF0 8B01A0FC 288669FB E5E90198
8B01A0FC 288669B9 EC9EDD9B 0194A4D8 269B0190 85D99BF1 441E8E2E F1423E03
85D99BF1 401E8E2E F13E3E03 2EF88B01 A0FC2886 69F14006 8E2EF13E 36032EF0
9BF1441E 8E2EF142 3E032EF8 8B01A0FC 288669B9 F49EDD9B 0190A4D8 269B0194
F13E3E03 2EF88B01 A0FC2886 69B9FC9E DD9BB9EC B6DC9BB9 F48EDC9B 019485D9
3E3E032E F88B01A0 FC288669 FA7E9ED9 9BB9FC86 DC9B0194 85D99BF1 401E8E2E
1E8E2EF1 423E032E F88B01A0 FC288669 01989DD9 9BFA7E86 D99BF140 1E8E2EF1
9BF1401E 8E2EF13E 3E032EF8 8B01A0FC 288669FA FDE90198 9DD99BEE D99BF144
A0FC2886 6901989D D99BF140 1E8E2EF1 3E3E032E F88B01A0 FC288669 019485D9
04EB0000 FC2A86C7 FAB2E901 989DD99B EED99BF1 441E8E2E F1423E03 2EF88B01
FC2A966B FE6C858B 1F16FD03 E7D1FC2A BE2B0063 BF687D03 FC2ABE83 FC2A86FF
966BFDA4 858B1F16 FD03E7D1 FC2ABE2B 0063BFFA C48589FE 031F16FD 8BF28B06
FCDC858B 1F16FD03 E7D1FC2A BE2B0063 BFFAC685 89FE031F 16FD8BF2 8B06FC2A
83FC2A86 FF04EB00 00FC2A86 C78DEBFA C88589FE 031F16FD 8BF28B06 FC2A966B
868BFF3A 9689FF38 86890C56 8B0A4603 0DE0C1FC 2A868B16 53E9037C 03FC2ABE
D1FC2ABE 8B0716F5 03E6D1FC 2AB68BFF 369689FF 3486891F FE05FF3A 968BFF38
0716F503 E6D1FC2A B68B0080 E9037D00 013DFAD6 842B26FA DC858B1F 16FD03E7
FC9EDD9B 02C48300 54969D9A 50FAD684 2B26FADC 858B1F16 FD03E7D1 FC2ABE8B

03E7D1FC 2ABE8BFF 3A868EFF 38B603E6 D1FAD6B5 8B1F16FD 03E7D1FC 2ABE8BB9
9B02C483 0054969D 9A50042B 26058BFF 3A9E8EFF 38BE03E7 D1FADCBD 8B1F16FD
1F16FD03 E7D1FC2A BE8B4EEB FAB29DD9 9B1F16FD 0302E7C1 FC2ABE8B B9FCB6DC
BE03E7D1 FAE2BD8B 1F16FD03 E7D1FC2A BE8BFF3A 868EFF38 B603E6D1 FAD6B58B
9B1F16FD 0302E7C1 FC2ABE8B 02C48300 54969D9A 50042B26 058BFF3A 9E8EFF38
CA842B26 FAC4858B 1F16FD03 E7D1FC2A BE8B0716 F503E6D1 FC2AB68B FAB29DD9
C4858B1F 16FD03E7 D1FC2ABE 8B0716F5 03E6D1FC 2AB68B00 80E9037D 00013DFA
B58B1F16 FD03E7D1 FC2ABE8B B9FC9EDD 9B02C483 0054969D 9A50FACA 842B26FA
FF38BE03 E7D1FAC4 BD8B1F16 FD03E7D1 FC2ABE8B FF3A868E FF38B603 E6D1FACA
FD0302E7 C1FC2ABE 8BB9FCB6 DC9B02C4 83005496 9D9A5004 2B26058B FF3A9E8E
3A868EFF 38B603E6 D1FAD0B5 8B1F16FD 03E7D1FC 2ABE8B4E EBFAA69D D99B1F16
9A50042B 26058BFF 3A9E8EFF 38BE03E7 D1FAC4BD 8B1F16FD 03E7D1FC 2ABE8BFF
BE8B2375 01FC2EBE 83FAA69D D99B1F16 FD0302E7 C1FC2ABE 8B02C483 0054969D
B29DD99B 1F16FD03 02E7C1FC 2ABE8BE0 D99BFC1C 85D99B1F 16FD0302 E7C1FC2A
C1FC2ABE 8BE0D99B FC1085D9 9B1F16FD 0302E7C1 FC2ABE8B 237501FC 2CBE83FA
C1FC2ABE 8BFAB285 D99B1F16 FD0302E7 C1FC2ABE 8BFAA69D D99B1F16 FD0302E7
E7C1FC2A BE8B2A74 004005F7 F1583EC5 2E1DD99B F1561E8E 2EF1543E 032E02E7
561E8E2E F1543E03 2E02E7C1 FC2ABE8B F15C36DC 2E9BFAB2 85D99B1F 16FD0302
1F16FD03 E7D1FC2A BE8B04C4 83002CEE 839AF154 36FF2EF1 5636FF2E 1DD99BF1
9E8EFF38 BE03E7D1 FAD6BD8B 1F16FD03 E7D1FC2A BE8B015C E9037F00 FAD6BD83
66740001 05F7EFEA 3EC52EFB 0C9DD99B 1F16FD03 02E7C1FC 2ABE8B05 DF9BFF3A
8F9A05D9 9BF1561E 8E2EF154 3E032E02 E7C1FC2A BE8B5C74 003D80EF EE3EC52E
FD03E7D1 FC2ABE8B 0054968F 9AFB0C85 D99B1F16 FD0302E7 C1FC2ABE 8B005496
8A9AF164 36FF2EF1 6636FF2E FAD6B5FF 1F16FD03 E7D1FC2A BE8BFADC B5FF1F16
FC2ABE8B 04C48300 549BD59A 50001205 F062068B 2EF06436 FF2E18C4 8300544A
05EBFF3E 9689FF3C 86894848 FF3A968B FF388603 E0D1FAD6 858B1F16 FD03E7D1
16F50302 E6C1FC2A B68B00BB E90373FF 38863BFF 3E968BFF 3C868B02 FF3CAE83
FD0302E7 C1FC2ABE 8BFAB2A4 D8269BFB 0C85D99B 1F16FD03 02E7C1FC 2ABE8B07
968F9AF1 2E06DC2E 9BFB0C85 D99B1F16 FD0302E7 C1FC2ABE 8BFB0C9D D99B1F16
C7FF3CBE C5857E00 FF3D058B FF3CBEC5 0589FF3C BEC508C4 83005496 EF9A0054
D1FC2ABE 8B207400 3D80EFEE 3EC52E2A 74000105 F7EFEA3E C52EFF7A E900FF05
F06436FF 2E06C483 00544A8A 9AF16836 FF2EF16A 36FF2EFA D6B5FF1F 16FD03E7
3DFAC485 8B1F16FD 03E7D1FC 2ABE8B04 C4830054 9BD59A50 001205F0 62068B2E
9BFF3A9E 8EFF38BE 03E7D1FA C4BD8B1F 16FD03E7 D1FC2ABE 8B0186E9 037C0FFF
3EC52E62 74000105 F7EFEA3E C52EFAE8 9DD99B1F 16FD0302 E7C1FC2A BE8B05DF
FC2ABE8B 0054968F 9AFAA685 D99B1F16 FD0302E7 C1FC2ABE 8B587400 3D80EFEE
8BFACAB5 FF1F16FD 03E7D1FC 2ABE8B00 54968F9A FAE885D9 9B1F16FD 0302E7C1
2E18C483 00544A8A 9AF16C36 FF2EF16E 36FF2EFA C4B5FF1F 16FD03E7 D1FC2ABE
8B1F16FD 03E7D1FC 2ABE8B04 C4830054 9BD59A50 001205F0 62068B2E F06436FF
FF3C868B 02FF3C86 8305EBFF 3E9689FF 3C8689FF 3A968BFF 388603E0 D1FAC485
0302E7C1 FC2ABE8B 0716F503 02E6C1FC 2AB68B00 EBE90376 FF34863B FF3E968B
BE8BFAE8 9DD99B1F 16FD0302 E7C1FC2A BE8BFAA6 84D8269B FAE885D9 9B1F16FD
2E9BFA5E 86D99BFA 5E9ED99B F12E06DC 2E9BFAE8 85D99B1F 16FD0302 E7C1FC2A
EFDA1EDC 2E9BFA5E 86D99B82 EB000005 C7FF3CBE C50A7300 54968A9A F1361EDC
5496EF9A 0054968F 9AFA5E86 D99BFF65 E900FF05 C7FF3CBE C50B7600 54968A9A
003D80EF EE3EC52E 2A740001 05F7EFEA 3EC52EFF 4AE90589 FF3CBEC5 08C48300
8300544A 8A9AF170 36FF2EF1 7236FF2E FAC4B5FF 1F16FD03 E7D1FC2A BE8B2074
2C9ED99B F046DD9B 04C48300 549BD59A 50001205 F062068B 2EF06436 FF2E06C4
F846DD9B FA389ED9 9BA846DD 9BFA349E D99BC046 DD9BFA30 9ED99BD8 46DD9BFA
FA289ED9 9BB046DD 9BFA249E D99BC846 DD9BFA20 9ED99BE0 46DD9BFA 1C9ED99B
D1FB9CBE 8BBA1086 89058BFF 3A9E8EFF 38BE03E7 D1FB9EBE 8B507500 FC2ABE83
89058BFF 3A9E8EFF 38BE03E7 D1FB9ABE 8BBA1286 89058BFF 3A9E8EFF 38BE03E7
87E90374 01FC2ABE 83BA1686 89058BFF 3A9E8EFF 38BE03E7 D1FB98BE 8BBA1486
8EFF38BE 03E7D1BA 04BE8B16 7F0FFFBA 04BE81BA 0486FF04 EB0000BA 0486C707
BA1886FF 04EBBA18 8689BA04 868B3675 01BA06BE 83DE7DBA 10863B05 8BFF3A9E
DF9BDE7F BA10863B 058BFF3A 9E8EFF38 BE03E7D1 BA18BE8B 167F0FFF BA18BE81
18BE81BA 1886FF04 EBBA1886 89BA0486 8B367501 BA08BE83 FA2C9ED9 9BBA1886
BA1886DF 9BDE7FBA 12863B05 8BFF3A9E 8EFF38BE 03E7D1BA 18BE8B16 7F0FFFBA
0FFFBA18 BE81BA18 86FF04EB BA188689 BA04868B 367501BA 0ABE83FA 309ED99B
9ED99BBA 1886DF9B DE7FBA14 863B058B FF3A9E8E FF38BE03 E7D1BA18 BE8B167F
8B167F0F FFBA18BE 81BA1886 FF04EBBA 188689BA 04868B36 7501BA0C BE83FA34
9BFA389E D99BBA18 86DF9BDE 7FBA1686 3B058BFF 3A9E8EFF 38BE03E7 D1BA18BE
86D99B00 54968F9A FA3086D9 9B005496 8F9AFA34 86D99B00 54968F9A FA3886D9
C70001BA 0E86C724 C4830054 4A8A9AF1 7436FF2E F17636FF 2E005496 8F9AFA2C

DF9B0103 E9037600 54968A9A F05EDC9B BA1886DF 9BBA1886 FF04EB00 00BA1886
005496EF 9A005496 8F9AFA3C 86D99BFA 3C9ED99B F076DC9B FA2C8ED8 9BBA1886
86D99BB9 FA868905 8BFF3A9E 8EFF38BE 034747E7 D1BA1ABE 8BBA1A86 8908C483
BA1ABE8B FF3A868E FF38B603 4646E6D1 BA1AB68B B9FC9EDD 9BBA1AA6 DE9BFA3C
86DE9BB9 FC8EDC9B 02C48300 54969D9A 50042B26 058BFF3A 9E8EFF38 BE03E7D1
8B01A0FC 2A866902 E6C1BA0E B68BBA1C 9DD99B1F 16FD0302 E7C1BA18 BE8BB9FA
73005496 8A9A1DD8 9BFA828E D89BBA18 86DF9BFE 03F1401E 8E2EF13E 3E032EF8
3E032EF8 8B01A0FC 2A866902 E6C1BA0E B68BFF19 E9037E66 BA0EBE83 FF23E903
1886FFFE EAE9BA0E 86FF1DD9 9BFA828E D89BFA3C 86D99BFE 03F1401E 8E2EF13E
EC9EDD9B F066DC9B D846DD9B 0133E903 76005496 8A9AD85E DC9BBA18 86DF9BBA
DC9BB9F4 8EDC9BFA 2CA6D89B FA3086D9 9BB9F49E DD9BF066 DC9BBA18 86DF9BB9
54968F9A FA3C86D9 9BFA3C9E D99BB9FC 86DC9BFA 2C86D99B B9FC9EDD 9BB9ECB6
89058BFF 3A9E8EFF 38BE0347 47E7D1BA 1ABE8BBA 1A868908 C4830054 96EF9A00
868EFF38 B6034646 E6D1BA1A B68BB9FC 9EDD9BBA 1AA6DE9B FA3C86D9 9BB9FA86
DC9B02C4 83005496 9D9A5004 2B26058B FF3A9E8E FF38BE03 E7D1BA1A BE8BFF3A
6902E6C1 BA0EB68B BA1C9DD9 9B1F16FD 0302E7C1 BA18BE8B B9FA86DE 9BB9FC8E
1DD89BFA 828ED89B BA1886DF 9BFE03F1 401E8E2E F13E3E03 2EF88B01 A0FC2A86
A0FC2A86 6902E6C1 BA0EB68B FEE9E903 7E66BA0E BE83FEF3 E9037300 54968A9A
BA0E86FF 1DD99BFA 828ED89B FA3C86D9 9BFE03F1 401E8E2E F13E3E03 2EF88B01
DC9BC046 DD9B0133 E9037600 54968A9A C05EDC9B BA1886DF 9BBA1886 FFFEBAE9
9BFA30A6 D89BFA34 86D99BB9 F49EDD9B D866DC9B BA1886DF 9BB9EC9E DD9BD866
86D99BFA 3C9ED99B B9FC86DC 9BFA3086 D99BB9FC 9EDD9BB9 ECB6DC9B B9F48EDC
8EFF38BE 034747E7 D1BA1ABE 8BBA1A86 8908C483 005496EF 9A005496 8F9AFA3C
4646E6D1 BA1AB68B B9FC9EDD 9BBA1AA6 DE9BFA3C 86D99BB9 FA868905 8BFF3A9E
54969D9A 50042B26 058BFF3A 9E8EFF38 BE03E7D1 BA1ABE8B FF3A868E FF38B603
B68BBA1C 9DD99B1F 16FD0302 E7C1BA18 BE8BB9FA 86DE9BB9 FC8EDC9B 02C48300
D89BBA18 86DF9BFE 03F1401E 8E2EF13E 3E032EF8 8B01A0FC 2A866902 E6C1BA0E
E6C1BA0E B68BFEE9 E9037E66 BA0EBE83 FEF3E903 73005496 8A9A1DD8 9BFA828E
9BFA3C8E D89BFA82 86D99BFE 03F1401E 8E2EF13E 3E032EF8 8B01A0FC 2A866902
0133E903 76005496 8A9AA85E DC9BBA18 86DF9BBA 1886FFFE BAE9BA0E 86FF1DD9
FA3886D9 9BB9F49E DD9BC066 DC9BBA18 86DF9BB9 EC9EDD9B C066DC9B A846DD9B
D99BB9FC 86DC9BFA 3486D99B B9FC9EDD 9BB9ECB6 DC9BB9F4 8EDC9BFA 34A6D89B
47E7D1BA 1ABE8BBA 1A868908 C4830054 96EF9A00 54968F9A FA3C86D9 9BFA3C9E
B68BB9FC 9EDD9BBA 1AA6DE9B FA3C86D9 9BB9FA86 89058BFF 3A9E8EFF 38BE0347
2B26058B FF3A9E8E FF38BE03 E7D1BA1A BE8BFF3A 868EFF38 B6034646 E6D1BA1A
9B1F16FD 0302E7C1 BA18BE8B B9FA86DE 9BB9FC8E DC9B02C4 83005496 9D9A5004
9BFE03F1 401E8E2E F13E3E03 2EF88B01 A0FC2A86 6902E6C1 BA0EB68B BA1C9DD9
FEE9E903 7E66BA0E BE83FEF3 E9037300 54968A9A 1DD89BFA 828ED89B BA1886DF
FA8286D9 9BFE03F1 401E8E2E F13E3E03 2EF88B01 A0FC2A86 6902E6C1 BA0EB68B
DF9B012A E9037E0F FFBA18BE 81BA1886 FFFEBAE9 BA0E86FF 1DD99BFA 3C8ED89B
005496EF 9A005496 8F9AFA3C 86D99BFA 3C9ED99B A876DC9B FA388ED8 9BBA1886
8BFF3A9E 8EFF38BE 034747E7 D1BA1ABE 8B6D7D0F FFBA18BE 81BA1A86 8908C483
FF38B603 4646E6D1 BA1AB68B B9FC9EDD 9BBA1AA6 DE9BFA3C 86D99BB9 FA868905
02C48300 54969D9A 50042B26 058BFF3A 9E8EFF38 BE03E7D1 BA1ABE8B FF3A868E
BA18BE8B 21EBBA1C 9DD99B1F 16FD0302 E7C1BA18 BE8BB9FA 86DE9BB9 FC8EDC9B
0EB68BBA 1C9DD99B 1F16FD03 02E7C1BA 18BE8BBA 1C85D99B 1F16FD03 02E7C14F
8ED89BBA 1886DF9B FE03F140 1E8E2EF1 3E3E032E F88B01A0 FC2A8669 02E6C1BA
02E6C1BA 0EB68BFE F6E9037E 66BA0EBE 83FF00E9 03730054 968A9A1D D89BFA82
D99BFA3C 8ED89BFA 8286D99B FE03F140 1E8E2EF1 3E3E032E F88B01A0 FC2A8669
BE81BA04 86FF04EB 0000BA04 86C7074D E9037402 FC2ABE83 FEC7E9BA 0E86FF1D
BA06BE83 DE7DBA10 863B058B FF3A9E8E FF38BE03 E7D1BA04 BE8B167F 0FFFBA04
03E7D1BA 18BE8B16 7F0FFFBA 18BE81BA 1886FF04 EBBA1886 89BA0486 8B367501
367501BA 08BE83FA 1C9ED99B BA1886DF 9BDE7FBA 10863B05 8BFF3A9E 8EFF38BE
FF38BE03 E7D1BA18 BE8B167F 0FFFBA18 BE81BA18 86FF04EB BA188689 BA04868B
04868B36 7501BA0A BE83FA20 9ED99BBA 1886DF9B DE7FBA12 863B058B FF3A9E8E
3A9E8EFF 38BE03E7 D1BA18BE 8B167F0F FFBA18BE 81BA1886 FF04EBBA 188689BA
8689BA04 868B3675 01BA0CBE 83FA249E D99BBA18 86DF9BDE 7FBA1486 3B058BFF
058BFF3A 9E8EFF38 BE03E7D1 BA18BE8B 167F0FFF BA18BE81 BA1886FF 04EBBA18
86FF04EB 0000BA18 86C70001 BA0E86C7 FA289ED9 9BBA1886 DF9BDE7F BA16863B
9BFA1C8E D89BBA18 86DF9B01 03E90376 0054968A 9AF85EDC 9BBA1886 DF9BBA18
BE8BBA1A 868908C4 83005496 EF9A0054 968F9AFA 3C86D99B FA3C9ED9 9BF876DC
DD9BBA1A A6DE9BFA 3C86D99B B9FA8689 058BFF3A 9E8EFF38 BE034747 E7D1BA1A
3A9E8EFF 38BE03E7 D1BA1ABE 8BFF3A86 8EFF38B6 034646E6 D1BA1AB6 8BB9FC9E
02E7C1BA 18BE8BB9 FA86DE9B B9FC8EDC 9B02C483 0054969D 9A50042B 26058BFF

```
1E8E2EF1 3E3E032E F88B01A0 FC2A8669 02E6C1BA 0EB68BBA 1C9DD99B 1F16FD03
66BA0EBE 83FF23E9 03730054 968A9A1D D89BFA82 8ED89BBA 1886DF9B FE03F140
FE03F140 1E8E2EF1 3E3E032E F88B01A0 FC2A8669 02E6C1BA 0EB68BFF 19E9037E
5EDC9BBA 1886DF9B BA1886FF FEEAE9BA 0E86FF1D D99BFA3C 8ED89BFA 8286D99B
66DC9BBA 1886DF9B B9EC9EDD 9BF866DC 9BE046DD 9B0133E9 03760054 968A9AE0
9BB9FC9E DD9BB9EC B6DC9BB9 F48EDC9B FA1CA6D8 9BFA2086 D99BB9F4 9EDD9BF8
08C48300 5496EF9A 0054968F 9AFA3C86 D99BFA3C 9ED99BB9 FC86DC9B FA1C86D9
9BFA3C86 D99BB9FA 8689058B FF3A9E8E FF38BE03 4747E7D1 BA1ABE8B BA1A8689
03E7D1BA 1ABE8BFF 3A868EFF 38B60346 46E6D1BA 1AB68BB9 FC9EDD9B BA1AA6DE
8BB9FA86 DE9BB9FC 8EDC9B02 C4830054 969D9A50 042B2605 8BFF3A9E 8EFF38BE
032EF88B 01A0FC2A 866902E6 C1BA0EB6 8BBA1C9D D99B1F16 FD0302E7 C1BA18BE
F3E90373 0054968A 9A1DD89B FA828ED8 9BBA1886 DF9BFE03 F1401E8E 2EF13E3E
2EF13E3E 032EF88B 01A0FC2A 866902E6 C1BA0EB6 8BFEE9E9 037E66BA 0EBE83FE
DF9BBA18 86FFFEBA E9BA0E86 FF1DD99B FA3C8ED8 9BFA8286 D99BFE03 F1401E8E
DF9BB9EC 9EDD9BE0 66DC9BC8 46DD9B01 33E90376 0054968A 9AC85EDC 9BBA1886
B9ECB6DC 9BB9F48E DC9BFA20 A6D89BFA 2486D99B B9F49EDD 9BE066DC 9BBA1886
EF9A0054 968F9AFA 3C86D99B FA3C9ED9 9BB9FC86 DC9BFA20 86D99BB9 FC9EDD9B
B9FA8689 058BFF3A 9E8EFF38 BE034747 E7D1BA1A BE8BBA1A 868908C4 83005496
8BFF3A86 8EFF38B6 034646E6 D1BA1AB6 8BB9FC9E DD9BBA1A A6DE9BFA 3C86D99B
B9FC8EDC 9B02C483 0054969D 9A50042B 26058BFF 3A9E8EFF 38BE03E7 D1BA1ABE
FC2A8669 02E6C1BA 0EB68BBA 1C9DD99B 1F16FD03 02E7C1BA 18BE8BB9 FA86DE9B
968A9A1D D89BFA82 8ED89BBA 1886DF9B FE03F140 1E8E2EF1 3E3E032E F88B01A0
F88B01A0 FC2A8669 02E6C1BA 0EB68BFE E9E9037E 66BA0EBE 83FEF3E9 03730054
FEBAE9BA 0E86FF1D D99BFA3C 8ED89BFA 8286D99B FE03F140 1E8E2EF1 3E3E032E
9BC866DC 9BB046DD 9B0133E9 03760054 968A9AB0 5EDC9BBA 1886DF9B BA1886FF
F48EDC9B FA24A6D8 9BFA2886 D99BB9F4 9EDD9BC8 66DC9BBA 1886DF9B B9EC9EDD
9AFA3C86 D99BFA3C 9ED99BB9 FC86DC9B FA2486D9 9BB9FC9E DD9BB9EC B6DC9BB9
FF3A9E8E FF38BE03 4747E7D1 BA1ABE8B BA1A8689 08C48300 5496EF9A 0054968F
38B60346 46E6D1BA 1AB68BB9 FC9EDD9B BA1AA6DE 9BFA3C86 D99BB9FA 8689058B
C4830054 969D9A50 042B2605 8BFF3A9E 8EFF38BE 03E7D1BA 1ABE8BFF 3A868EFF
C1BA0EB6 8BBA1C9D D99B1F16 FD0302E7 C1BA18BE 8BB9FA86 DE9BB9FC 8EDC9B02
FA828ED8 9BBA1886 DF9BFE03 F1401E8E 2EF13E3E 032EF88B 01A0FC2A 866902E6
866902E6 C1BA0EB6 8BFEE9E9 037E66BA 0EBE83FE F3E90373 0054968A 9A1DD89B
FF1DD99B FA3C8ED8 9BFA8286 D99BFE03 F1401E8E 2EF13E3E 032EF88B 01A0FC2A
9BFA288E D89BBA18 86DF9B01 2AE9037E 0FFFBA18 BE81BA18 86FFFEBA E9BA0E86
BE81BA1A 868908C4 83005496 EF9A0054 968F9AFA 3C86D99B FA3C9ED9 9BB076DC
3C86D99B B9FA8689 058BFF3A 9E8EFF38 BE034747 E7D1BA1A BE8B6D7D 0FFFBA18
D1BA1ABE 8BFF3A86 8EFF38B6 034646E6 D1BA1AB6 8BB9FC9E DD9BBA1A A6DE9BFA
FA86DE9B B9FC8EDC 9B02C483 0054969D 9A50042B 26058BFF 3A9E8EFF 38BE03E7
9B1F16FD 0302E7C1 4FBA18BE 8B21EBBA 1C9DD99B 1F16FD03 02E7C1BA 18BE8BB9
A0FC2A86 6902E6C1 BA0EB68B BA1C9DD9 9B1F16FD 0302E7C1 BA18BE8B BA1C85D9
54968A9A 1DD89BFA 828ED89B BA1886DF 9BFE03F1 401E8E2E F13E3E03 2EF88B01
2EF88B01 A0FC2A86 6902E6C1 BA0EB68B FEF6E903 7E66BA0E BE83FF00 E9037300
83FEC7E9 BA0E86FF 1DD99BFA 3C8ED89B FA8286D9 9BFE03F1 401E8E2E F13E3E03
BA18BE81 BA1886FF 04EB0000 BA1886C7 E9EBE903 7402FC2A BE830A74 01FC2ABE
968F9AF1 2E06DC2E 9BBA1C85 D99B1F16 FD0302E7 C1BA18BE 8BE9D4E9 037E0FFF
583EC52E BCEB0589 FF3A9E8E FF38BE03 E7D1BA18 BE8B08C4 83005496 EF9A0054
036CE903 7C03FA48 BE83FA48 86FF04EB 0000FA48 86C70382 E9037500 4005F7F1
FA48868B 04C48300 544A8A9A F17836FF 2EF17A36 FF2E1274 003D80EF EE3EC52E
4A868BFA 4A8EFF04 EB0FFEFA 4A86C7FF 3A9689FF 3886890C 568B0A46 030DE0C1
FA58A6D8 9BF17E06 DF2E9BB9 D49EDD9B F17C06DF 2E9B0106 E9037DFA 5C863BFA
DD9BB9D4 B6DC9BFA 5886D99B B9E49EDD 9BFA58A6 D89BFA4A 86DF9BB9 DC9EDD9B
DF2E9BB9 F49EDD9B B9DCB6DC 9BB9E48E DC9BB9EC A6DC9BF1 7E06DF2E 9BB9EC9E
5486D99B FA549ED9 9BB9F486 DC9BB9FC B6DC9BFA 5886D99B B9FC9EDD 9BF17C06
509ED99B FA4EA6DE 9BFA5486 D99BFA4E 868908C4 83005496 EF9A0054 968F9AFA
8BFF3A9E 8EFF38BE 034747E7 D1FA4EBE 8BFF3A86 8EFF38B6 03E6D1FA 4EB68BFA
5086D99B BA028689 058BFF3A 9E8EFF38 BE03E7D1 FA4EBE8B FA4C8689 042B2605
4ABE8BBA 02860308 C4830054 96EF9A00 54968F9A F12E06DC 2E9BFA4C 8EDE9BFA
83FA4A8E FF04EBFA 4A868948 FA5C868B FEE9E905 89FF3A9E 8EFF38BE 03E7D1FA
8F9AFA54 86D99BFA 549ED99B F15C36DC 2E9BFA4A 86DF9B00 A4E9037D 00FA4ABE
B68BFA50 9ED99BFA 4EA6DE9B FA5486D9 9BFA4E86 8908C483 005496EF 9A005496
2B26058B FF3A9E8E FF38BE03 4747E7D1 FA4EBE8B FF3A868E FF38B603 E6D1FA4E
DE9BFA50 86D99BBA 02868905 8BFF3A9E 8EFF38BE 03E7D1FA 4EBE8BFA 4C868904
E7D1FA4A BE8BBA02 860308C4 83005496 EF9A0054 968F9AF1 2E06DC2E 9BFA4C8E
```

037E66FA 4ABE83FA 4A86FF04 EB0001FA 4A86C7FF 4EE90589 FF3A9E8E FF38BE03
4AB68BB9 FC9EDD9B B9F4B6DC 9BFA5886 D99BB9F4 9EDD9BF1 7C06DF2E 9BFDCFE9
FA82B6D8 9B05D99B FE03F140 1E8E2EF1 3E3E032E F88B01A0 FA488669 02E6C1FA
F13E3E03 2EF88B01 A0FA4886 6902E6C1 FA4AB68B 45770054 968A9AB9 FC9EDC9B
2EF88B01 A0FA4886 6902E6C1 FA4AB68B F15C0EDC 2E9B05D9 9BFE03F1 401E8E2E
5886D99B B9CC9EDD 9BF17C06 DF2E9BFF 64E91DD9 9BFE03F1 401E8E2E F13E3E03
D4A6DC9B F17E06DF 2E9BB9DC 9EDD9BF1 7C06DF2E 9BB9D49E DD9BB9CC B6DC9BFA
B9DCB6DC 9BFA5886 D99BB9EC 9EDD9BFA 58A6D89B F17E06DF 2E9BB9E4 9EDD9BB9
FE03F140 1E8E2EF1 3E3E032E F88B01A0 FA488669 02E6C1FA 4AB68BB9 F49EDD9B
FC9EDD9B FA5886D8 9BB9E4B6 DC9BB9EC 8EDC9BB9 F4A6DC9B FA82B6D8 9B05D99B
8286D99B FE03F140 1E8E2EF1 3E3E032E F88B01A0 FA488669 02E6C1FA 4AB68BB9
74003D80 EFEE3EC5 2E1C7400 0105F7EF EA3EC52E FEA9E91D D99BB9FC 8EDC9BFA
5E5FC99B C02B0000 05C7127E C504C483 00544A8A 9AF18036 FF2EF182 36FF2E12
DC9B1E46 DD9BF85E DD9B02C4 83005496 9D9A5014 462B1246 8B000010 C85756CB
56CB5E5F C99B0A46 DC9BF076 DC9BF84E DC9B0A66 DC9B1646 DD9BF05E DD9B2666
032E03E7 C1227E8B F85EDD9B F056DD9B E856DD9B E056DD9B EED99B00 0028C857
032E03E7 C1227E8B 20720054 968A9AF0 EC1EDC2E 9B05DD9B F0741E8E 2EF0723E
032E03E7 C1227E8B 33760054 968A9AEF D21EDC2E 9B05DD9B F0741E8E 2EF0723E
001CEE83 9A005496 8F9A0A46 DD9B2276 FFD85EDD 9B05DD9B F0741E8E 2EF0723E
2E9B05DD 9BF0881E 8E2EF086 3E032E03 E7C1227E 8BF85EDD 9BD84EDC 9B0AC483
2E9B05DD 9BF0881E 8E2EF086 3E032E03 E7C1227E 8B207200 54968A9A F0EC1EDC
DD9B05DD 9BF0881E 8E2EF086 3E032E03 E7C1227E 8B397600 54968A9A EFD21EDC
D84EDC9B 10C48300 1CE7A69A 0054968F 9A0A46DD 9B005496 8F9A1246 DD9BD85E
968A9AF0 EC1EDC2E 9B05DD9B F08C1E8E 2EF08A3E 032E03E7 C1227E8B F05EDD9B
968A9AEF D21EDC2E 9B05DD9B F08C1E8E 2EF08A3E 032E03E7 C1227E8B 20720054
9A0A46DD 9BD85EDD 9B05DD9B F08C1E8E 2EF08A3E 032E03E7 C1227E8B 30760054
2EF08E3E 032E03E7 C1227E8B E85EDD9B D84EDC9B 08C48300 1CE8469A 0054968F
2EF08E3E 032E03E7 C1227E8B 20720054 968A9AF0 EC1EDC2E 9B05DD9B F0901E8E
2EF08E3E 032E03E7 C1227E8B 39760054 968A9AEF D21EDC2E 9B05DD9B F0901E8E
E8709A00 54968F9A 0A46DD9B 0054968F 9A1A46DD 9BD85EDD 9B05DD9B F0901E8E
46DC9BE8 46DC9BF0 46DC9BF8 46DC9B0A 46DD9BE0 5EDD9BD8 4EDC9B10 C483001C
73005496 8A9AF184 1EDC2E9B 1266DC9B 0A46DD9B 000020C8 5756CB5E 5FC99BE0
2E9B1266 DC9B0A46 DD9B6876 0054968A 9AF1361E DC2E9B12 66DC9B0A 46DD9B7D
2E9B1266 DC9B0A46 DD9BF85E DD9BE066 DC9BF07E 06DD2E9B E05EDD9B F18C0EDC
E05EDD9B F06A06DC 2E9BF04E DC9BF04E DC9BF194 06DD2E9B F05EDD9B F12E26DC
D99B03EB E846DD9B E85EDD9B E076DC9B F84EDC9B F84EDC9B 1266DC9B 0A46DD9B
DD2E9B0A 5EDD9B0A 4EDC9B0A 66DC9BF0 7E06DD2E 9BEC8B55 5756CB5E 5FC99BEE
0A66DC9B F07E06DD 2E9B0000 20C85756 CB5E5FC9 9B0A4EDC 9B0A4EDC 9BF0B206
F1841EDC 2E9B0A46 DD9B0A5E DD9BE04E DC9B1276 DC9BF076 06DD2E9B E05EDD9B
9BE066DC 9BF07E06 DD2E9BE0 5EDD9B0A 4EDC9BF1 8C06DD2E 9B5C7300 54968A9A
9BF04EDC 9BF04EDC 9BF19406 DD2E9BF0 5EDD9BF1 2E26DC2E 9B0A46DD 9BF85EDD
46DD9BE8 5EDD9BE0 76DC9BF8 4EDC9BF8 4EDC9B0A 46DD9BE0 5EDD9BF0 6A06DC2E
9E46FF03 EB00009E 46C70004 9A46C700 0076C857 56CB5E5F C99BEED9 9B03EBE8
068E2EF0 F41E032E 05E3C10A 5E8B03E6 C19E768B 0168E903 7F9E463B 489A468B
05DD9BFE 03F0F61E 8E2EF0F4 3E032E05 E7C10A7E 8B03E6C1 469E768B DE03F0F6
8B1DDD9B FE03F19E 1E8E2EF1 9C3E032E 05E7C10A 7E8B03E6 C19E768B 27DC269B
EFD21EDC 2E9B05DD 9BFE03F1 9E1E8E2E F19C3E03 2E05E7C1 0A7E8B03 E6C19E76
FF03EB9C 4689409E 468BFF67 E9037F9E 463B489A 468BFF73 E9037200 54968A9A
1E8E2EF0 F43E032E 05E7C10A 7E8B03E6 C1469C76 8B707E9C 463B489A 468B9C46
9BFE03F0 F61E8E2E F0F43E03 2E05E7C1 0A7E8B03 E6C19C76 8B05DD9B FE03F0F6
768B05DD 9BFE03F1 021E8E2E F1003E03 2E05E7C1 0A7E8B03 E6C1469C 768B1DDD
768B9A4E FF84EB1D DD9BFE03 F1021E8E 2EF1003E 032E05E7 C10A7E8B 03E6C19C
0A7E8B03 E6C1469E 768BDE03 F0F6068E 2EF0F41E 032E05E3 C10A5E8B 03E6C19E
C10A7E8B 03E6C19E 768B27DC 269B05DD 9BFE03F0 F61E8E2E F0F43E03 2E05E7C1
2EF19C36 032E05E6 C10A768B FEEBE91D DD9BFE03 F19E1E8E 2EF19C3E 032E05E7
0EDC2E9B 0844DC26 9B05DD9B F19E1E8E 2EF19C3E 032E05E7 C10A7E8B F19E068E
89489E46 8B00AAE9 037C9A46 3B9E468B 9E46FF03 EB00029E 46C7C85E DD9BF0BC
05E3C10A 5E8B03E7 C19C7E8B 8A5EDD9B C045DD9B 1F16FD03 03E7C19C 7E8B9C46
1E8E2EF1 9C3E032E 05E7C10A 7E8B03E6 C19C768B DF03F19E 068E2EF1 9C1E032E
2E05E3C1 0A5E8B03 E6C19E76 8B925EDD 9B8A76DC 9B0FDC26 9B05DD9B FE03F19E
9E1E8E2E F19C3E03 2E05E7C1 0A7E8B03 E6C19C76 8BDE03F1 9E068E2E F19C1E03
DD9B1F16 FD0303E7 C19E7E8B 9266DC9B F0BC0EDC 2E9B07DC 269B05DD 9BFE03F1
7E8B03E6 C14E9E76 8B6C7D9A 463B9E46 8B9E46FF 03EB0001 9E46C7FF 48E9C05D
5E8B03E6 C14E9E76 8B925EDD 9B05DD9B FE03F19E 1E8E2EF1 9C3E032E 05E7C10A

003E032E 05E7C10A 7E8B03E6 C19E768B DE03F102 068E2EF1 001E032E 05E3C10A
5DDD9B1F 16FD0303 E7C19E7E 8B9276DC 9B27DC26 9B05DD9B FE03F102 1E8E2EF1
8B0716F5 0303E6C1 9E768B34 7D9A463B 9E468B9E 46FF03EB 00019E46 C789EBE0
0303E7C1 9E7E8BF1 A00EDC2E 9BE064DC 269BE045 DD9B1F16 FD0303E7 C1479E7E
C19E7E8B 557E9E46 3B489A46 8B9E46FF 03EB0001 9E46C7C1 EBA05DDD 9B1F16FD
7E8B03E6 C19E768B 0716DD03 03E3C19E 5E8B925E DD9BC045 DD9B1F16 FD0303E7
479E7E8B 9276DC9B A04FDC26 9B05DD9B FE03F19E 1E8E2EF1 9C3E032E 05E7C10A
032E05E7 C10A7E8B 03E6C14E 9A768B9F EBA05DDD 9BA06DDC 9B1F16FD 0303E7C1
F1AA1E8E 2EF1A83E 032E05E7 C10A7E8B 15DD9BEE D99BFE03 F1AA1E8E 2EF1A83E
9BA045DD 9B1F16FD 0303E7C1 4F4F9A7E 8B0716F5 0303E6C1 4E4E9A76 8B1DDD9B
DD9BFE03 F1AA1E8E 2EF1A83E 032E05E7 C10A7E8B 03E6C14E 4E9A768B C074DC26
C10A5E8B 03E7C147 9E7E8B7B 7E009E7E 839E4EFF 03EB9E46 8900032D 9A468B1D
2EF19C3E 032E05E7 C10A7E8B 03E6C19E 768BDF03 F1AA068E 2EF1A81E 032E05E3
E7C19E7E 8B0716F5 0303E6C1 9E768B92 5EDD9B0F DC269B05 DD9BFE03 F19E1E8E
032E05E7 C10A7E8B 03E6C19E 768BC074 DC269B92 66DC9BA0 45DD9B1F 16FD0303
463B489A 468B9E46 FF03EB00 009E46C7 FF7CE91D DD9BFE03 F1AA1E8E 2EF1A83E
768BDF03 F19E068E 2EF19C1E 032E05E3 C10A5E8B 03E7C19E 7E8B00B8 E9037F9E
DC2E9B0F DC269B05 DD9BFE03 F1AA1E8E 2EF1A83E 032E05E7 C10A7E8B 03E6C19E
8BDF03F1 9E068E2E F19C1E03 2E05E3C1 0A5E8B03 E7C19E7E 8B8A5EDD 9BF0B236
9B0FDC26 9B05DD9B FE03F1AA 1E8E2EF1 A83E032E 05E7C10A 7E8B03E6 C1469E76
8A66DC9B 9266DC9B E045DD9B 1F16FD03 03E7C147 9E7E8B92 5EDD9BF1 A036DC2E
C99BFF39 E91DDD9B FE03F1AE 1E8E2EF1 AC3E032E 05E7C10A 7E8B03E6 C19E768B
2E05E7C1 127E8B03 E6C1EE76 8BEE46FF 03EB0000 EE46C700 002AC857 56CB5E5F
C1EE768B EE4EFFD7 77005496 8A9A1DDC 9B0A46DD 9BFE03F0 F61E8E2E F0F43E03
8BF85EDD 9B25DC9B 0A46DD9B FE03F0F6 1E8E2EF0 F43E032E 05E7C112 7E8B03E6
0DDC9BF1 A006DD2E 9BFE03F1 9E1E8E2E F19C3E03 2E05E7C1 127E8B03 E6C1EE76
9B05DD9B FE03F102 1E8E2EF1 003E032E 05E7C112 7E8B03E6 C1EE768B D65EDD9B
C146EE76 8BDF03F1 AA068E2E F1A81E03 2E05E3C1 125E8B03 E7C1EE7E 8BDE5EDD
9BF84EDC 9B27DC26 9B05DD9B FE03F1AA 1E8E2EF1 A83E032E 05E7C112 7E8B03E6
8BDF03F1 AE068E2E F1AC1E03 2E05E3C1 125E8B03 E7C1EE7E 8BE65EDD 9BD676DC
F0BC36DC 2E9B05DD 9BFE03F1 AA1E8E2E F1A83E03 2E05E7C1 127E8B03 E6C1EE76
5E5FC99B F046DD9B F05EDD9B DE46DC9B F84EDC9B 07DC269B F84EDC9B E646DC9B
E0000000 00003F84 7AE147AE 147B403E 00000000 00004024 00000000 000000CB
435C004C 4A14004C 433C004C 431C0014 951F0014 93B240AF FE000000 0000406F
4388004C 4385004C 4382004C 437F004C 437C004C 4379004C 4376004C 436B004C
43EF004C 43D5004C 43C6004C 43B7004C 43A8004C 4399004C 4392004C 438B004C
4473004C 44490014 93AE0014 7C3E004C 442B004C 441C004C 440D004C 43FE004C
00003FC9 99999999 999A004C 49A63FB9 99999999 999A004C 448D004C 7C64004C
CCCD004C 4508004C 44CA004C 44A7004C 49EE004C 49D6004C 49BE3FF0 00000000
00000000 00024008 00000000 0000004C 45133FBC AC083126 E9794023 CCCCCCCC
004C45F4 004C45F0 004C45E5 004C45C7 004C45A8 004C4564 004C4520 40000000
BF40624D D2F1A9FC 004C47C6 BF847AE1 47AE147B 004C4624 004C4614 004C4604
00000000 BFC99999 9999999A 3FE80000 00000000 3FF0020C 49BA5E35 004C4826
07040000 00000000 00003FE0 00000000 00000063 004C465A 004C4634 3FD00000
00000000 00149374 00240BE8 00FF004C 46CA004C 469B004C 466C0024 02240024
0FFF0004 004C47A0 004C4777 004C4768 004C4737 004C4729 004C46F9 40100000
004C4946 400CCCCC CCCCCCCD 40033333 33333333 3FDA8F5C 28F5C28F 004C47B7
2E0C7E00 3D83FF24 3EC52EEC 8B555756 004C4886 004C48E6 40180000 00000000
05C7FF28 3EC52E00 0005C7FF 2C3EC52E 004488A0 9A197400 013D058B FF283EC5
02F2E900 1CFC929A 08750008 3D005455 F09A0000 42C85756 CB5E5FC9 C02B0000
3C3EC52E 1DD99BFF 303EC52E 05D99BFF 343EC52E 20750001 3D058BFF 283EC52E
3EC52EE8 46D99B04 C4830054 85699A50 D8468D16 1DD99BFF 383EC52E 05D99BFF
C52E0054 968F9A05 D99BFF34 3EC52E1D D99BFF3C 3EC52EEC 46D99B1D D99BFF34
C7FF403E C52E0278 E90375C0 0B10C483 00546477 9A005496 8F9A05D9 9BFF3C3E
9BFF343E C52E0054 968F9A05 D99BFF44 3EC52E50 BE468D16 50C2468D 16000105
503EC52E 20C48300 54B9F79A 0054968F 9A05D99B FF3C3EC5 2E005496 8F9A05D9
2EFF4E36 FF2E0054 968F9AC2 46D99B00 54968F9A BE46D99B 50C6468D 1635EFFF
00013D05 8BFF243E C52E1EC4 83005409 889AFF48 36FF2EFF 4A36FF2E FF4C36FF
0589FF5C 3EC52ECA 468B0589 FF583EC5 2EC8468B 0589FF54 3EC52EC6 468B3775
C52E50C6 468D1617 EB08C483 005474E2 9A35FF02 75FFFF60 3EC52E50 C6468D16
3EC52EC8 468B0589 FF683EC5 2EC6468B 08C48300 5474E29A 35FF0275 FFFF643E
6C3EC52E 23750002 3D058BFF 243EC52E 044589FF 683EC52E CA468B02 4589FF68
2E21EB0C C4830054 5B789AFF 6836FF2E FF6A36FF 2E50D046 8D1635FF 0275FFFF
0CC48300 545B789A FF6836FF 2EFF6A36 FF2E50D0 468D1635 FF0275FF FF703EC5

CC7E8BD0 45DF9B1F 16FD03E7 D1CC7E8B 717D04CC 7E83CC46 FF03EB00 00CC46C7
7E00FF3D D0458B1F 16FD03E7 D1CC7E8B 1DD99BFF 761E8E2E FF743E03 2E02E7C1
03E7D1CC 7E8B1DD9 9BFF7806 DD2E9BFF 761E8E2E FF743E03 2E02E7C1 CC7E8B19
EB1DD99B EED99BFF 761E8E2E FF743E03 2E02E7C1 CC7E8B9E 7D00D07D 831F16FD
2EFF8436 FF2EFF86 36FF2EFF 8836FF2E FF8A36FF 2E3C7500 3D83FF24 3EC52E86
CBD09AFF 6836FF2E FF6A36FF 2EFF7436 FF2EFF76 36FF2EFF 8036FF2E FF8236FF
FF8236FF 2EFF8C36 FF2EFF8E 36FF2EFF 9036FF2E FF9236FF 2E3AEB14 C483003C
C483003C CBD09AFF 6836FF2E FF6A36FF 2EFF7436 FF2EFF76 36FF2EFF 8036FF2E
C52E001C F90B9A00 0105C7FF 2C3EC52E 02C48300 448A569A 50CE4689 001AB814
3EC52E00 004EC857 56CB5E5F C99BC02B 000105C7 FF283EC5 2E000005 C7FF2C3E
9BFF303E C52E05D9 9BFF343E C52E2075 00013D05 8BFF283E C52E0000 05C7FF94
9B04C483 00548569 9A50D846 8D161DD9 9BFF383E C52E05D9 9BFF3C3E C52E1DD9
9A05D99B FF343EC5 2E1DD99B FF3C3EC5 2EEC46D9 9B1DD99B FF343EC5 2EE846D9
0376E903 75C00B10 C4830054 64779A00 54968F9A 05D99BFF 3C3EC52E 0054968F
0054968F 9A05D99B FF443EC5 2E50BE46 8D1650C2 468D1600 0105C7FF 403EC52E
830054B9 F79A0054 968F9A05 D99BFF3C 3EC52E00 54968F9A 05D99BFF 343EC52E
0054968F 9AC246D9 9B005496 8F9ABE46 D99B50C6 468D1635 FFFF503E C52E20C4
C6468D16 1EC48300 5409889A FF4836FF 2EFF4A36 FF2EFF4C 36FF2EFF 4E36FF2E
C8468B05 89FF683E C52EC646 8B08C483 005474E2 9A35FF02 75FFFF64 3EC52E50
2E0C7400 023D058B FF243EC5 2E044589 FF683EC5 2ECA468B 024589FF 683EC52E
2EFF6A36 FF2E50D0 468D1635 FF0275FF FF6C3EC5 2E237500 033D058B FF243EC5
36FF2E50 D0468D16 35FF0275 FFFF703E C52E21EB 0CC48300 545B789A FF6836FF
8B717D04 CC7E83CC 46FF03EB 0000CC46 C70CC483 00545B78 9AFF6836 FF2EFF6A
8B1DD99B FF761E8E 2EFF743E 032E02E7 C1CC7E8B D045DF9B 1F16FD03 E7D1CC7E
FF761E8E 2EFF743E 032E02E7 C1CC7E8B 197E00FF 3DD0458B 1F16FD03 E7D1CC7E
032E02E7 C1CC7E8B 9E7D00D0 7D831F16 FD03E7D1 CC7E8B1D D99BFF78 06DD2E9B
2EFF8A36 FF2E3C75 003D83FF 243EC52E 86EB1DD9 9BEED99B FF761E8E 2EFF743E
36FF2EFF 7636FF2E FF8036FF 2EFF8236 FF2EFF84 36FF2EFF 8636FF2E FF8836FF
FF9036FF 2EFF9236 FF2E3AEB 14C48300 3CCBD09A FF6836FF 2EFF6A36 FF2EFF74
FF2EFF74 36FF2EFF 7636FF2E FF8036FF 2EFF8236 FF2EFF8C 36FF2EFF 8E36FF2E
2E02C483 00448A56 9A50CE46 89001AB8 14C48300 3CCBD09A FF6836FF 2EFF6A36
03740002 3D058BFF 243EC52E 0F740003 3D058BFF 243EC52E 000105C7 FF2C3EC5
2E50BC46 8D1650B6 468D1650 B2468D16 00D9E903 75003D83 FF983EC5 2E011AE9
FFB036FF 2EFFB236 FF2E50BA 468D1610 C483003C D5E39AFF 6836FF2E FF6A36FF
FF2EFFA4 36FF2EFF A636FF2E FFA836FF 2EFFAA36 FF2EFFAC 36FF2EFF AE36FF2E
9AB646D9 9B005496 8F9AB246 D99BFF9C 36FF2EFF 9E36FF2E FFA036FF 2EFFA236
C52E1875 00BA7E83 000005C7 FF943EC5 2E2EC483 00442CBB 9ABC76FF 0054968F
0589FFA8 3EC52EFF FFB833EB 04C48300 442CA99A 35FFFF9C 3EC52E35 FFFFA03E
FFA03EC5 2EFFFFB8 0589FFAC 3EC52E05 89FFB03E C52EFFFF B80589FF A43EC52E
FF0B7500 033D058B FF243EC5 2E177400 3D83FF98 3EC52E05 89FF9C3E C52E0589
F90B9A05 EB06C483 001CFA9E 9A0A76FF 0C76FF0E 76FF02C4 8300442C B29A0A76
EC8B5557 56CB5E5F C99BC02B 000105C7 FF283EC5 2E000005 C7FF2C3E C52E001C
F09A017B E9037500 3D83FF40 3EC52E00 0012C857 56CB5E5F C9C02B00 448C249A
543EC52E 55750001 3D058BFF 243EC52E 0169E900 1CFE909A 08750008 3D005455
2E50F046 8D16F446 89058BFF 5C3EC52E F2468905 8BFF583E C52EF046 89058BFF
C52EF246 8B0589FF 683EC52E F0468B08 C4830054 74E29A35 FF0275FF FF643EC5
3EC52E0F 7400013D 058BFF24 3EC52E04 4589FF68 3EC52EF4 468B0245 89FF683E
FF6A36FF 2E50F646 8D1635FF 0275FFFF 703EC52E 00A2E903 7400023D 058BFF24
EE7E8B71 7D04EE7E 83EE46FF 03EB0000 EE46C70C C4830054 5B789AFF 6836FF2E
EE7E8B1D D99BFF76 1E8E2EFF 743E032E 02E7C1EE 7E8BF645 DF9B1F16 FD03E7D1
2E9BFF76 1E8E2EFF 743E032E 02E7C1EE 7E8B197E 00FF3DF6 458B1F16 FD03E7D1
743E032E 02E7C1EE 7E8B9E7D 00F67D83 1F16FD03 E7D1EE7E 8B1DD99B FF7806DD
36FF2EFF 8E36FF2E FF9036FF 2EFF9236 FF2E86EB 1DD99BEE D99BFF76 1E8E2EFF
FF6836FF 2EFF6A36 FF2EFF74 36FF2EFF 7636FF2E FF8036FF 2EFF8236 FF2EFF8C
5756CB5E 5FC99BC0 2B02C483 00448A56 9A50FE46 89001BB8 14C48300 3CCBD09A
FF6C3EC5 2E447500 3D83FF98 3EC52E01 DCE90375 003D83FF 403EC52E 000028C8
EC468D16 0CC48300 545B789A FF6836FF 2EFF6A36 FF2E50F6 468D1635 FF0275FF
1621EB10 C483003C D5E39AFF 6836FF2E FF6A36FF 2E50F446 8D1650F0 468D1650
0CC48300 442CC49A FF6836FF 2EFF6A36 FF2E35FF 0275FFFF 6C3EC52E 50F6468D
F645DF9B 1F16FD03 E7D1EA7E 8B010FE9 037C04EA 7E83EA46 FF03EB00 00EA46C7
E846C770 75003D83 FF983EC5 2E1DD99B FF761E8E 2EFF743E 032E02E7 C1EA7E8B
9AF046D9 9B005496 8F9AEC46 D99B50D8 468D1660 7D07E87E 83E846FF 03EB0000
C1E87E8B 0716F503 02E6C1EA 768B18C4 83002CFF EC9AE876 FFF476FF 0054968F
FF743E03 2E02E7C1 EA7E8BD8 4CD8269B 05DF9B0E 5E8E0C7E 03E7D1EA 7E0302E7

05D99BFF 761E8E2E FF743E03 2E02E7C1 EA7E8B97 EB1DD99B 05D89BFF 761E8E2E
DD2E9BFF 761E8E2E FF743E03 2E02E7C1 EA7E8B19 76005496 8A9AFF78 1EDC2E9B
9AFFB41E DC2E9B05 D99BFF76 1E8E2EFF 743E032E 02E7C1EA 7E8B1DD9 9BFF7806
E91DD99B EED99BFF 761E8E2E FF743E03 2E02E7C1 EA7E8BFE FEE90372 0054968A
FF8036FF 2EFF8236 FF2EFF8C 36FF2EFF 8E36FF2E FF9036FF 2EFF9236 FF2EFEE5
89001BB8 14C48300 3CCBD09A FF6836FF 2EFF6A36 FF2EFF74 36FF2EFF 7636FF2E
3D058BFF 283EC52E 000036C8 5756CB5E 5FC99BC0 2B02C483 00448A56 9A50FE46
383EC52E 05D99BFF 3C3EC52E 1DD99BFF 303EC52E 05D99BFF 343EC52E 20750001
46D99B1D D99BFF34 3EC52EE8 46D99B04 C4830054 85699A50 D8468D16 1DD99BFF
8F9A05D9 9BFF3C3E C52E0054 968F9A05 D99BFF34 3EC52E1D D99BFF3C 3EC52EEC
50CE468D 16000105 C7FF403E C52E0179 E90375C0 0B10C483 00546477 9A005496
2E005496 8F9A05D9 9BFF343E C52E0054 968F9A05 D99BFF44 3EC52E50 CA468D16
35FFFF50 3EC52E50 D2468D16 20C48300 54B9F79A 0054968F 9A05D99B FF3C3EC5
005496EF 9A005496 8F9ACE46 D99B5008 C4830054 96EF9A00 54968F9A CA46D99B
12C48300 54DFCF9A FF4836FF 2EFF4A36 FF2EFF4C 36FF2EFF 4E36FF2E 5008C483
E7D1D27E 8BFF6036 C42E0589 FFBC3EC5 2ED2468B 47750001 3D058BFF 243EC52E
0326E7D1 3D8BFFC0 3EC52EFF C436C42E 0589FFC0 3EC52E05 8B025C8E 263C0326
3C0326E7 D1D27E8B FF6436C4 2E3BEB0C 5DD99BFF 803EC52E 05DF9B02 5C8E263C
FF861E8E 2EFF843E 032EE7D1 3D8BFFC0 3EC52E05 89FFC03E C52E058B 025C8E26
C52E1E7D 03D47E83 D446FF03 EB0000D4 46C70C5D D99BFF80 3EC52E06 0085DF9B
89001AB8 D9EB1DD9 9BFF821E 8E2EFF80 3E032E02 E7C1D47E 8B0C45D9 9BFF803E
05C7FF2C 3EC52E00 1CF90B9A 000105C7 FF2C3EC5 2E02C483 00448A56 9A50D646
00013D05 8BFF243E C52E0000 04C85756 CB5E5FC9 9B000105 C7FF283E C52E0000
0589FFC0 3EC52E05 8B025C8E 263C0326 E7D13D8B FFBC3EC5 2EFF6436 C42E1E75
5DD99BFF 803EC52E 05DF9B02 5C8E263C 0326E7D1 3D8BFFC0 3EC52EFF C436C42E
02E7C1FC 7E8B0C45 D99BFF80 3EC52E1E 7D03FC7E 83FC46FF 03EB0000 FC46C70C
C99B02C4 8300448A 569A50FE 4689001B B8D9EB1D D99BFF82 1E8E2EFF 803E032E
004C89EA 004C89F2 004C89E6 004C89EE 004C89E2 004C89E4 004C89E0 00CB5E5F
004C8A1A 004C8A18 004C8A16 004C8ADA 00147CC6 00147B9E 001494F8 004C7E68
406FE000 00000000 004C8A22 00147B8C 00147B90 004C8A1C 00147B9A 004C89C2
004C89F8 004C8A14 004C89F6 00147E8E 0024D53E 0024E1D4 0024C3D0 004C7E82
004C8A32 00000000 00000000 004C8A02 004C8A00 004C89FE 004C89FC 004C89FA
FF1076FF 1A74C00B F08B9805 8A0A46FF 0A7EC5EC 8B555756 004C8AA8 004C8A34
00000000 CB5E5FC9 C02B02EB FFFFB8DC 74F73BF8 8B06C483 0054CCF0 9A560E76
200A000A 20212121 2059524F 4D454D20 4F4E200A 00204220 00204720 00205220
61747320 3A202054 43435354 44200A20 000A2021 21212059 524F4D45 4D204F4E
7272450A 00203E3E 3E3E206E 6F697461 6C75636C 61632038 3E2D2D32 31207472
64202D20 27706573 5F657669 74636127 20726574 656D6172 6170206E 6920726F
6F6C2000 682E666E 6F635F74 73696873 7464004C 4C412073 6120746C 75616665
0A200066 25662566 25642564 25006272 000A7325 202D2072 6F662067 6E696B6F
0A3E3E3E 3E3E3E3E 3E3E2020 20202073 25202020 203C3C3C 3C3C3C3C 3C3C2020
746E6563 5F687320 0A00666C 253D7472 62206576 69746365 66666520 200A2000
3A323174 756F2064 252C6425 20203A32 316E6920 00662520 6120666C 25207265
000A666C 25203A64 61726720 64252C64 25203A38 74756F20 2064252C 64252020
25202020 0A3A746C 682C7464 6D2C6461 68732C74 73617274 6E6F632C 79656B20
6C252020 203D5058 45200020 0A20666C 2520666C 2520666C 2520666C 2520666C
5F6E6174 200A0032 312D3431 20726F66 206E6F69 74636572 726F6320 0A000A66
3D3D3D3D 3D000A20 64657465 6C706D6F 63205443 43535444 20002066 25206373
54554F52 20277463 63737464 27204E49 20524F52 52453D3D 3D3D3D3D 3D3D3D3D
00000000 00000000 00000000 00000000 0A3D3D3D 3D3D3D3D 3D3D3D21 20454E49
00000000 00000000 00000024 00080024 00040024 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000

00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

```
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
696C6962 69736976 00000000 00000000 00000000 00000000 00000000 00000000
6E697475 6F722070 73696473 7464206E 6920726F 72724500 00000000 00000000
73000A20 6D756C5F 776F6873 6E75000A 206D756C 5F776F68 0A642520 3D207974
6E697475 6F722070 73696473 7464206E 6920726F 72724500 73000A20 21212065
776F6873 5F646C69 7562000A 20776F68 735F706F 74735F68 0A20776F 68735F68
2020646E 6F635F77 70726168 735F646E 6966000A 20206469 73000A20 21212065
20202020 20202065 636E616E 696D756C 000A0020 20753425 72675F64 6E6F635F
6974756F 72207073 69647374 64206E69 20726F72 7245000A 000A3A62 6772000A
00000000 00000000 000000EB 3E800000 3F000000 3E800000 6425203A 20202020
00FF00FF 00FF0000 00FF00FF 00000000 00FF0000 00FF0000 000A2021 2120656E
FF3800C8 FFEC0014 00FF00FF 00FF00FF 00FF0000 00FF00FF 00FF0000 000000FF
00000000 00000000 00000000 00000000 00000000 00000000 00FF00FF 000000FF
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
```

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

```
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
3E4CCCCC 00000000 00000000 00000000 00000000 00000000 00000000 00000000
6666FFFF 00550001 00FE0000 000000D2 00010005 00E60011 00000001 000101F4
00000000 00000000 00013F33 333300FF 00003F80 00003F80 00003ECC CCCC3FE6
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
```

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

```
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
```

```
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
00000000 00000000 00000000 00000000
```

00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000

```
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
26202973 25282044 57502064 65726975 7165520A 00000000 00000000 00000000
2D2D2D2D 2D2D2D2D 0A000A65 6C696620 6E692074 6F6E2065 7261206B 73616D20
2D2D2D0A 7825203D 206E7361 4D202020 5D73255B 203D2044 5750200A 2D2D2D2D
7325000A 203A6465 74656C65 64207363 6E754600 0A2D2D2D 2D2D2D2D 2D2D2D2D
00626F72 50704400 676D496E 49705700 626F7250 70570054 52415453 000A000A
```

| | | | | | | | |
|---|---|---|---|---|---|---|---|
| 00796572 | 47747242 | 00747361 | 43746C48 | 00626F72 | 50747242 | 00676D49 | 6E497044 |
| 4500726F | 4365726F | 4D007165 | 52647247 | 00796572 | 476B7244 | 00747361 | 43646853 |
| 480A0072 | 00682E70 | 6C65685F | 72742F77 | 6F6C663A | 72657375 | 3A00656E | 6F54646E |
| 6573753A | 000A7473 | 69786520 | 746F6E20 | 73656F64 | 20732520 | 656C6966 | 20504C45 |
| 5E64726F | 57737361 | 5020676E | 6F725700 | 682E706C | 65685F72 | 742F776F | 6C663A72 |
| 65687420 | 676E6973 | 7520776F | 6C462064 | 65746375 | 7274736E | 49207265 | 746E4520 |
| 43495341 | 42004349 | 53414200 | 5E3F2064 | 726F7773 | 73617020 | 27434953 | 41422720 |
| 616C7567 | 65722067 | 6E696D72 | 6F667265 | 500A000A | 5D73255B | 20736920 | 44575000 |
| 5E732500 | 0A642520 | 6E6F6974 | 636E7566 | 20676E69 | 6E65704F | 000A656E | 6F742072 |
| 6F742065 | 75642064 | 65707069 | 6B73206E | 6F697463 | 656C6573 | 203F7325 | 005E7325 |
| 63656C65 | 73203F73 | 25005E00 | 73252026 | 20007325 | 0020676E | 6974696D | 4F5E3A20 |
| 5E732520 | 2D732500 | 6F4E0073 | 6559005E | 3A207325 | 206F7420 | 74657320 | 6E6F6974 |
| 505F5700 | 73250054 | 52420073 | 25005E73 | 25002928 | 434E554A | 5F4F4720 | 4E490A00 |
| 00732500 | 6C6E702E | 335F7374 | 64007325 | 004E4544 | 5F505F44 | 00732500 | 4E45445F |
| 315F4600 | 6C6E702E | 776F6873 | 79006325 | 2073372D | 25005452 | 42007325 | 00545242 |
| 253B6425 | 5B632500 | 73250064 | 255F4600 | 315F4600 | 57204F20 | 4C204620 | 00732500 |
| 6325004A | 5B632500 | 4A325B63 | 2500723B | 5B632500 | 7264253B | 64255B63 | 25004864 |
| 4E202973 | 392D2528 | 6432253E | 59207325 | 20733031 | 2D252064 | 32250038 | 63250037 |
| 54004556 | 494C000A | 6432253D | 74736C20 | 6432253E | 42202973 | 392D2528 | 6432253E |
| 465F4F4E | 004D4952 | 54445750 | 006D6972 | 546C7552 | 006D6972 | 54636E4A | 004D4952 |
| 77737361 | 500A0072 | 00682E64 | 77705F72 | 742F776F | 6C663A72 | 6573753A | 00434E55 |
| 753A000A | 74736978 | 6520746F | 6E207365 | 6F642073 | 2520656C | 69662027 | 7364726F |
| 65726975 | 7165520A | 00642520 | 73250068 | 2E647770 | 5F72742F | 776F6C66 | 3A726573 |
| 3A000A64 | 65686361 | 74746120 | 6B73616D | 206F6E20 | 73616820 | 73252044 | 57502064 |
| 27736472 | 6F777373 | 61500A00 | 7700682E | 6477705F | 72742F77 | 6F6C663A | 72657375 |
| 726F6620 | 6E65706F | 20656220 | 746F6E6E | 61632073 | 656F6420 | 73252065 | 6C696620 |
| 30322D25 | 00682E64 | 77705F72 | 742F776F | 6C663A72 | 6573753A | 000A6574 | 69727720 |
| 4E000074 | 69784520 | 20262065 | 76615300 | 52455055 | 53000A78 | 25206435 | 2D252073 |
| 73615020 | 776F6C46 | 20646574 | 63757274 | 736E4900 | 74697551 | 00000000 | 00747865 |
| 705F776C | 66007974 | 696C6974 | 55206E6F | 69746163 | 69666964 | 6F4D2064 | 726F5773 |
| 705F776C | 66205941 | 4C505349 | 44204F54 | 20454C42 | 414E5520 | 0A006C6E | 702E6477 |
| 254C5600 | 6C6E702E | 335F7374 | 64004349 | 53414200 | 4C4C4100 | 0A206C6E | 702E6477 |
| 4D4E0065 | 7355006B | 636F6C42 | 00445750 | 00732500 | 44575000 | 44575000 | 73250064 |
| 00000000 | 00010000 | 0000FFFF | 00010000 | 73250073 | 25006425 | 4C560073 | 25006425 |
| 00000000 | 00000000 | 4C5F4D5F | 444C4F00 | 00000000 | 0000004C | 5F435F44 | 4C4F0000 |
| 4C4F0000 | 00000000 | 00004C5F | 4B5F444C | 4F000000 | 00000000 | 004C5F59 | 5F444C4F |
| 5F444C4F | 00000000 | 00000000 | 445F4D5F | 444C4F00 | 00000000 | 00000044 | 5F435F44 |
| 5F435F57 | 454E0000 | 00000000 | 0000445F | 4B5F444C | 4F000000 | 00000000 | 00445F59 |
| 004C5F59 | 5F57454E | 00000000 | 00000000 | 4C5F4D5F | 57454E00 | 00000000 | 0000004C |
| 00000044 | 5F435F57 | 454E0000 | 00000000 | 00004C5F | 4B5F5745 | 4E000000 | 00000000 |
| 00000000 | 00445F59 | 5F57454E | 00000000 | 00000000 | 445F4D5F | 57454E00 | 00000000 |
| 00000000 | 00004B43 | 49502050 | 5F570000 | 00000000 | 0000445F | 4B5F5745 | 4E000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 502D5720 | 44454C41 | 43530000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 49502050 | 2D440000 | 00000000 | 00000000 | 00000000 | 00000000 | 00000000 | 00000000 |
| 00000000 | 00000000 | 00000000 | 00000000 | 00000000 | 00000000 | 00000000 | 00004B43 |
| 00000000 | 00000000 | 00000000 | 00000000 | 00000000 | 00000000 | 00000000 | 00000000 |
| 43530000 | 00000000 | 00000000 | 00000000 | 00000000 | 00000000 | 00000000 | 00000000 |
| 00000000 | 00000000 | 00000000 | 00000000 | 00000000 | 00000000 | 502D4420 | 44454C41 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 004E4F49 | 54414441 | 52470000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 73656C65 | 73550000 | 00000000 | 00005453 | 41434F54 | 55412050 | 2D570000 | 00000000 |
| 00000000 | 00000000 | 00000000 | 00000000 | 4B434950 | 20502D57 | 20726574 | 66612073 |
| 00000000 | 00000000 | 00000000 | 00000000 | 00000000 | 00000000 | 00000000 | 00000000 |
| 73550000 | 00000000 | 00005453 | 41432E4E | 414D2050 | 2D570000 | 00000000 | 00000000 |
| 00000000 | 00000000 | 00000000 | 4B434950 | 20502D57 | 20726574 | 66612073 | 73656C65 |
| 00000000 | 00000000 | 00000000 | 00000000 | 00000000 | 00000000 | 00000000 | 00000000 |
| 00000000 | 00000000 | 5353454E | 54484749 | 52420000 | 00000000 | 00000000 | 00000000 |

```
00000000 00000000 00000000 00000000 00000000 00000000 00000000 00000000
00000000 00000000 00000000 00000000 00000000 00000000 00000000 00000000
00000057 4F4C4620 4853494E 49460000 00000000 00000000 00000000 00000000
00000000 00000000 00000000 00000000 00000000 00000000 00000000 00000000
00000000 00000000 00000000 00000000 00000000 00000000 00000000 00000000
41434F54 55412050 2D440000 00000000 00000000 00000000 00000000 00000000
4B434950 20502D44 20726574 66612073 73656C65 73550000 00000000 00005453
00000000 00000000 00000000 00000000 00000000 00000000 00000000 00000000
414D2050 2D440000 00000000 00000000 00000000 00000000 00000000 00000000
20502D44 20726574 66612073 73656C65 73550000 00000000 00005453 41432E4E
00000000 00000000 00000000 00000000 00000000 00000000 00000000 4B434950
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
6041BEE2 4DD23EFE F9DB3E38 51EB3F05 60413E99 16870000 00000000 00000000
```

```
00000000 00000000 00000000 00000000 00003EFE F9DBBEAC 0831BE25 E353BD65
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
```

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

| | | | | | | | |
|---|---|---|---|---|---|---|---|
| 6C25203A | 20206572 | 6F666562 | 00000000 | 00000000 | 00000000 | 00000000 | 00000000 |
| 25203A20 | 2065726F | 66656200 | 200A2066 | 6C25203A | 20726574 | 66612020 | 20202066 |
| 203A2020 | 65726F66 | 65620020 | 0A20666C | 25203A20 | 72657466 | 61202020 | 2020666C |
| 3A202065 | 726F6665 | 6200200A | 20666C25 | 203A2072 | 65746661 | 20202020 | 20666C25 |
| 20206572 | 6F666562 | 00200A20 | 666C2520 | 3A207265 | 74666120 | 20202020 | 666C2520 |
| 2065726F | 66656200 | 200A2066 | 6C25203A | 20726574 | 66612020 | 20202066 | 6C25203A |
| 2065726F | 66656200 | 0A20666C | 25203A20 | 72657466 | 61202020 | 2020666C | 25203A20 |
| 65726F66 | 65620020 | 0A20666C | 25203A20 | 72657466 | 61202020 | 2020666C | 25203A20 |
| 524F5252 | 4500200A | 20666C25 | 203A2072 | 65746661 | 20202020 | 20666C25 | 203A2020 |
| 02000000 | 0000000A | 20212121 | 206E6565 | 72635365 | 74616470 | 555F7762 | 204E4920 |
| 44138000 | 43A50000 | 43A50000 | 43AA0000 | 42A00000 | 43AA0000 | 42A00000 | 01360082 |
| 00000000 | 00000000 | 00000000 | 00020000 | 00000002 | 43480000 | 43480000 | 44138000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
2020657A 69732072 6162200A 00000000 00000000 00000000 00000000 00000000
696E6564 20747865 74200A00 66252070 6574735F 79746973 6E656420 0A006425

```
20726162 200A0020 66322E33 25203C00 6425206E 6F697475 6C736572 20797473
20206625 203D2079 7469736E 65642079 65726720 20200A00 64252020 657A6973
200A0020 20662520 3D207974 69736E65 64207261 62206C61 75746361 20202020
66660020 66322E33 2520000A 20642520 203D2020 74696220 3231206C 61762020
00000000 00000000 00000000 00000000 00000000 00000000 00003FF3 3333BEE6
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
```

```
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
494D0000 00000000 00000000 00000000 00000000 00000000 00000000 00000000
41435F4D 00464143 5F430064 34250046 41435F43 00424E49 4D006434 2500424E
00464143 5F430042 58414D00 64342500 4258414D 00464143 5F4D0064 34250046
00464143 5F430046 41435F4D 00643425 00464143 5F4D0046 41435F43 00643425
00464143 5F430046 41435F4D 00643425 00464143 5F4D0046 41435F43 00643425
00464143 5F430046 41435F4D 00643425 00464143 5F4D0046 41435F43 00643425
5F590046 41435F4D 0066302E 33250046 41435F4D 00464143 5F430066 302E3325
54434642 0066302E 33250052 54434642 00464143 5F590066 302E3325 00464143
63616C42 20746E61 74736978 656E5520 0A00454C 4241542F 43494C42 55500052
200A2064 6564616F 6C20656C 62617420 746C7561 66654420 2C656C62 6174206B
```

202C7365 756C6176 20656C62 6174206B 63616C42 206E6920 726F7272 45200A00
00732500 42415447 00200A20 64656461 6F6C2065 6C626174 20746C75 61666544
4D006434 25004641 435F4D00 4641435F 43006434 25004641 435F4300 42415447
4220746E 61747369 78656E55 200A0045 4C424154 2F43494C 42555000 4641435F
64656461 6F6C2065 6C626174 20746C75 61666544 202C656C 62617420 6B63616C
65756C61 7620656C 62617420 6B63616C 42206E69 20726F72 7245200A 00200A20
375F7374 6400200A 20646564 616F6C20 656C6261 7420746C 75616665 44202C73
00007325 00425841 4D000073 25004241 54470064 34250042 4E494D00 6C6E702E
66312E33 25004641 435F4300 66312E33 25005254 43464200 00732500 52435550
702E375F 73746400 66312E33 25004641 435F5900 66312E33 25004641 435F4D00
43555000 64342500 4258414D 00643425 00424E49 4D007325 00424154 47006C6E
00464143 5F4D0064 34250046 41435F43 00643425 00525443 46420000 73250052
00732500 42415447 006C6E70 2E375F73 74640000 73250046 41435F59 00643425
52544346 42000073 25005243 55500064 34250042 58414D00 64342500 424E494D
25004641 435F5900 64342500 4641435F 4D006434 25004641 435F4300 64342500
72703A64 733A0021 21212020 59205220 4F204D20 45204D20 204F4E20 0A000073
20656C69 66200A20 00627200 682E7263 752F7374 642F7365 6C69662F 616D7369
2073656F 6420682E 7263752F 7374642F 73656C69 662F616D 73697270 3A64733A
00206425 00206625 20662520 66252066 25002064 25000A74 73697865 20746F6E
00206425 00206625 20662520 66250020 66252066 25002066 25206625 00206625
20642520 6425000A 21212059 2052204F 204D2045 204D2020 4F4E200A 00206425
65722065 6C696877 20726F72 72650A00 72006E69 622E7263 75002064 25206425
622E7263 752F7374 642F7365 6C69662F 616D7369 72703A64 733A2067 6E696461
69646165 7220656C 69687720 726F7272 650A0072 006E6962 2E726367 000A6E69
0A6E6962 2E726367 2F737464 2F73656C 69662F61 6D736972 703A6473 3A20676E
000000FA 005F003C 00190001 00010000 00666564 00007263 752EFF80 00110000
00000000 00000000 00000000 00000046 01904220 00004220 00004248 000042B4
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000

```
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000200 0160000C 000C0000 00000000 00000000
9A50A646 8D16002C 39AC9A00 00EA46C7 0010FC46 C70000FE 46C70000 5CC85756
000005C7 3B0A3EC5 2E0B7500 FFAA7E81 077400AA 7E83FE46 8904C483 0054E844
09EB0006 05C73B12 3EC52E0B 74003D83 3B0E3EC5 2E000105 C73B0A3E C52E09EB
3B223EC5 2E000F05 C73B1A3E C52E000B 05C73B16 3EC52E00 0505C73B 123EC52E
3B263EC5 2E040326 02E0C105 8B3B1A3E C52E3B2A 36C42E05 893B1E3E C52E058B
05893B2E 3EC52E48 A4460314 046B263B 1636C42E A4468905 8B3B223E C52E0589
C52E058B 3B2E3EC5 2E05893B 363EC52E 058B3B1E 3EC52E02 FF05C73B 323EC52E
893B423E C52E058B 3B323EC5 2E05893B 3E3EC52E 058B3B26 3EC52E05 893B3A3E
1A3EC52E EE468905 056B3B16 3EC52EFC 05C63B4A 3EC52EFD 05C63B46 3EC52E05
339A0C6A 096A03F6 46C601F5 46C603F4 46C6000C F246C7F0 468902E0 C1058B3B
499AF776 FFF976FF 0197E9D3 03FE46C7 0875C20B F95689F7 468904C4 830054DC
3EC52EFC 76FF3B52 36FF2E3B 5436FF2E 50EE468D 1650FE46 8D1604C4 83002C03
7E8304C4 830054DC 759AF776 FFF976FF 14C48300 54D8DC9A 086A066A 35FF3B4E
EB0000EC 46C70135 E90AC483 0054C048 9AFE76FF 006A006A 006A006A 167400FE
2E3B5606 032EE0D1 EC468B50 FE468D16 357500FE 7E833B7D 04EC7E83 EC46FF03
0054D8DC 9A026A05 6A35FF3B 4E3EC52E 35FF3B52 3EC52EEA 76FF5052 3B58168B
CEE90AC4 830054C0 489AFE76 FF006A00 6A006A00 6A167400 FE7E83BC EB12C483
9AFE76FF 006A006A 006A006A 167400FE 7E8304C4 83002C05 E29A50FE 468D1600
C63B623E C52E0005 C63B5E3E C52E0005 C63B5A3E C52E00A5 E90AC483 0054C048
C63B723E C52E0005 C63B6E3E C52E0005 C63B6A3E C52E0005 C63B663E C52E0005
C63B823E C52E0105 C63B7E3E C52E0005 C63B7A3E C52E0005 C63B763E C52E0005
C63B923E C52E0105 C63B8E3E C52E0005 C63B8A3E C52E0005 C63B863E C52E0005
C63BA23E C52E0005 C63B9E3E C52E0105 C63B9A3E C52E0005 C63B963E C52E0005
C52E0000 FE46C700 0002C857 56CB5E5F C9002C09 4A9A0005 C63BA63E C52E0005
35FF3B4E 3EC52E35 FF3B523E C52E50FE 468D1600 2C311C9A 0574003D 833BAA3E
C0489AFE 76FF006A 006A006A 006A1374 00FE7E83 0CC48300 54D8DC9A 166A026A
6B137D0C FE7E83FE 46FF03EB 0000FE46 C7000002 C85756CB 5E5FC90A C4830054
263B1636 C42E0000 5B45C70A 7EC5E4EB 0588FE46 8B0C5E8E 0A7E03F8 8B09FE46
6145890A 7EC54805 8B3B1A3E C52E0000 5F45C70A 7EC55D45 890A7EC5 4805046B
0A7EC505 8B3B1A3E C52E3945 890A7EC5 48058B3B 163EC52E 00003745 C70A7EC5
```

0145890A 7EC5058B 3B163EC5 2E3D4589 0A7EC548 E0D1058B 3B1A3EC5 2E3B4589
8B0A7EC5 0545890A 7EC53B45 8B0A7EC5 0345890A 7EC548E0 D1058B3B 163EC52E
03046B26 3B1636C4 2E0A4589 0A7EC5E0 D1058B3B 163EC52E 0745890A 7EC53D45
2E104589 0A7EC53D 458B0A7E C50E4589 0A7EC53B 458B0A7E C50C4589 0A7EC548
C5154589 0A7EC548 02E0C105 8B3B163E C52E1345 890A7EC5 03046B26 3B1636C4
E0C1058B 3B163EC5 2E194589 0A7EC53D 458B0A7E C5174589 0A7EC53B 458B0A7E
0A7EC53B 458B0A7E C5424589 0A7EC548 05046B26 3B1636C4 2E404589 0A7EC502
05046B26 3B1636C4 2E000064 45C70A7E C5464589 0A7EC53D 458B0A7E C5444589
4803046B 263B1A36 C42E6845 890A7EC5 E0D1058B 3B1A3EC5 2E664589 0A7EC548
C42E4B45 890A7EC5 39458B0A 7EC54945 890A7EC5 37458B0A 7EC56A45 890A7EC5
7EC54F45 890A7EC5 4802E0C1 058B3B1A 3EC52E4D 45890A7E C503046B 263B1A36
890A7EC5 4D458B0A 7EC51E45 890A7EC5 03458B0A 7EC51C45 890A7EC5 01458B0A
0C458B0A 7EC52545 890A7EC5 0A458B0A 7EC52245 890A7EC5 4F458B0A 7EC52045
7EC52B45 890A7EC5 4F458B0A 7EC52945 890A7EC5 4D458B0A 7EC52745 890A7EC5
890A7EC5 4D458B0A 7EC53045 890A7EC5 15458B0A 7EC52E45 890A7EC5 13458B0A
42458B0A 7EC55245 890A7EC5 40458B0A 7EC53445 890A7EC5 4F458B0A 7EC53245
5FC95845 890A7EC5 4F458B0A 7EC55645 890A7EC5 4D458B0A 7EC55445 890A7EC5
2DE746C6 2DE646C6 2DE546C6 2BE446C6 2BE346C6 2BE246C6 000022C8 5756CB5E
42E146C6 59E046C6 4DDF46C6 43DE46C6 20EB46C6 20EA46C6 20E946C6 20E846C6
FF683BB6 36FF2E3B B836FF2E 1774003D 833BB23E C52E4B75 003D833B AE3EC52E
968F9A05 D99B3BBA 3EC52E3B B636FF2E 3BB836FF 2E72EB06 C483002C 32BC9A00
2E167400 3D833BB2 3EC52E48 EB06C483 002C32BC 9A5008C4 83005496 EF9A0054
2E3BB636 FF2E3BB8 36FF2E28 EB06C483 002C32BC 9A006A3B B636FF2E 3BB836FF
3EC52E06 C483002C 32BC9A50 08C48300 5496EF9A 0054968F 9A05D99B 3BBE3EC5
00EE46C7 01F646C6 01F946C6 0003F346 C770F046 C674E846 C6047400 3D833B0E
C701FA46 C601F846 C600F746 C602F546 C6021DE9 037C04EE 7E83EE46 FF03EB00
4689001E 2DEC4603 5A16C58B 4D7D0AEC 7E83EC46 FF03EB00 00EC46C7 0003F146
581E8E2E 3B563E03 2EE7D1EE 7E8BEC76 FF50F046 8D160A76 FF0C76FF FD5689FB
E4E9AD74 003D830A 7EC512C4 830054D8 DC9A036A 056A35FF 3B4E3EC5 2E35FF3B
5689FB46 8900222D EE46035A 16C58B01 FA46C604 F846C601 F746C602 F546C601
2EE7D1EE 7E8B0A6A 50F0468D 160A76FF 0C76FFF1 4689E0D1 058B3B16 3EC52EFD
7EC512C4 830054D8 DC9A036A 056A35FF 3B4E3EC5 2E35FF3B 581E8E2E 3B563E03
893BB816 8B2E3BB6 068B2E05 FA46C602 F846C601 F546C601 7CE90374 003D830A
563E032E E7D1EE7E 8B0B6A50 F0468D16 0A76FF0C 76FF0005 F146C7FD 5689FB46
3D830A7E C512C483 0054D8DC 9A036A05 6A35FF3B 4E3EC52E 35FF3B58 1E8E2E3B
02E7C1EE 7E8B1B74 003D833B B23EC52E 4275003D 833BAE3E C52E011F E9037400
EE7E8B05 D99B3BBA 3EC52E5A EB1DD99B 3BC606DF 2E9B3BC4 1E8E2E3B C23E032E
C1EE7E8B 1874003D 833BB23E C52E3DEB 1DD99B3B C41E8E2E 3BC23E03 2E02E7C1
C1EE7E8B 05D99B3B BE3EC52E 1BEB1DD9 9BEED99B 3BC41E8E 2E3BC23E 032E02E7
523BCA16 8B2E3BC8 06032E02 E0C1EE46 8B1DD99B 3BC41E8E 2E3BC23E 032E02E7
003CFC5A 9A016A00 54968F9A 05D99B3B C41E8E2E 3BC23E03 2E02E7C1 EE7E8B50
CC3E032E 02E7C1EE 7E8B05D9 9B3BCA1E 8E2E3BC8 3E032E02 E7C1EE7E 8B0EC483
3BC836FF 2E3BCA36 FF2E3BCC 36FF2E3B CE36FF2E FDD7E91D D99B3BCE 1E8E2E3B
B99E9A50 003C05C3 8B51CA8B D88B3BD6 168B2E3B D406032E 4C056B3B D03EC52E
2E0A7400 3D833B0A 3EC52E00 00F246C7 000038C8 5756CB5E 5FC99B0C C483003C
3BD836FF 2E3BDA36 FF2E50F2 468D1612 05C63BD8 3EC52E08 EB1705C6 3BD83EC5
9AF276FF 006A006A 006A006A 137400F2 7E830EC4 830054DA BA9A6E6A 056A016A
2E05DF9B 3B363EC5 2E0105C6 3BE03EC5 2E0105C6 3BDC3EC5 2E0AC483 0054C048
05DF9B3B 3E3EC52E 045DD99B 3BE43EC5 2E05DF9B 3B3A3EC5 2E1DD99B 3BE43EC5
2E3BF006 DF2E9B04 5DD99B3B E83EC52E 05DF9B3B 423EC52E 1DD99B3B E83EC52E
F43EC52E 3BF806DF 2E9B045D D99B3BEC 3EC52E3B F206DF2E 9B1DD99B 3BEC3EC5
3EC52E0A 75003D83 3B0A3EC5 2E045DD9 9B3BF43E C52E3BFA 06DF2E9B 1DD99B3B
E42A058A 3B4A3EC5 2E05883C 003EC52E E42A058A 3B463EC5 2E227400 3D833BFC
05C73C08 3EC52E00 05C63C04 3EC52E01 05C63C00 3EC52E10 EB05883C 043EC52E
006A006A 167400F2 7E830AC4 830054DA BA9A01F5 68036A00 6A50F246 8D160000
50F2468D 16000005 C73C0C3E C52E06CE E90AC483 0054C048 9AF276FF 006A006A
6A137400 F27E830E C4830054 DABA9A01 FE68056A 006A3C0C 36FF2E3C 0E36FF2E
FC3EC52E 0D75003D 833B0A3E C52E0AC4 830054C0 489AF276 FF006A00 6A006A00
06DF2E9B 00D1E903 7C04F07E 83F046FF 03EB0000 F046C701 E3E90375 003D833B
968A9AD0 5EDC9B05 D99B3BCE 1E8E2E3B CC3E032E 02E7C1F0 7E8BD05E DD9B3BC6
9B3BC606 DF2E9B06 EB05D99B 3BCE1E8E 2E3BCC3E 032E02E7 C1F07E8B 15730054
C4830054 970A9A00 54968F9A EED99B12 76005496 8A9AD85E DC9BEED9 9BD85EDD
05D99B3B CE1E8E2E 3BCC3E03 2E02E7C1 F07E8BC8 5EDD9B3B C606DF2E 9B5DEB08
8F9A05D9 9B3BCE1E 8E2E3BCC 3E032E02 E7C1F07E 8B227300 54968A9A C85EDC9B

08C48300 54970A9A 0054968F 9A3BC606 DF2E9B13 EB08C483 0054970A 9A005496
1636FF2E 3C1036FF 2E3C1236 FF2E50F2 468D16FF 23E90588 F07E033C 103EC52E
6A006A00 6A006A13 7400F27E 8310C483 0054DABA 9A019768 066A3C14 36FF2E3C
1C3EC52E A005C63C 1C3EC52E FD05C63C 183EC52E 0AC48300 54C0489A F276FF00
6A006A3C 1836FF2E 3C1A36FF 2E50F246 8D16A002 45C63C1C 3EC52EA0 0145C63C
9AF276FF 006A006A 006A006A 137400F2 7E8310C4 830054DA BA9A0132 68066A00
3C2636FF 2E3C1C36 FF2E3C1E 36FF2E03 6AFC05C6 3C203EC5 2E0AC483 0054C048
006A006A 3C2036FF 2E3C2236 FF2E50F2 468D160A C4830054 96649A3C 2436FF2E
76FF006A 006A006A 006A022B E9037500 F27E8310 C4830054 DABA9A01 3268066A
03F07E83 347D04F0 7E83F046 FF03EB00 00F046C7 0215E90A C4830054 C0489AF2
3C2C3E03 2E02E7C1 F07E8B00 FF05C73C 2A1E8E2E 3C283E03 2EE7D1F0 7E8B137D
2E3C2C36 FF2E3C2E 36FF2E50 E0468D16 C3EB1DD9 9B3C3006 DD2E9B3C 2E1E8E2E
83005497 0A9A0054 968F9AE0 46D99B0C C483003C B99E9A3C 2836FF2E 3C2A36FF
2EE42A08 C4830054 970A9A00 54968F9A E446D99B 0145883C 383EC52E E42A08C4
45883C38 3EC52EE4 2A08C483 0054970A 9A005496 8F9AE846 D99B0588 3C383EC5
00F046C7 0245883C 383EC52E E42A08C4 83005497 0A9A0054 968F9AEC 46D99B03
2A1E8E2E 3C283E03 2EE7D1F0 7E8B137D 03F07E83 317D04F0 7E83F046 FF03EB00
468D16C6 EB1DD99B EED99B3C 2E1E8E2E 3C2C3E03 2E02E7C1 F07E8B00 0005C73C
D99B0CC4 83003CB9 9E9A3C28 36FF2E3C 2A36FF2E 3C2C36FF 2E3C2E36 FF2E50E0
968F9AE4 46D99B01 45883C3C 3EC52EE4 2A08C483 0054970A 9A005496 8F9AE046
54970A9A 0054968F 9AE846D9 9B05883C 3C3EC52E E42A08C4 83005497 0A9A0054
2A08C483 0054970A 9A005496 8F9AEC46 D99B0345 883C3C3E C52EE42A 08C48300
6A35FF3C 3C3EC52E 0275FF3C 3C3EC52E 006A50F2 468D1602 45883C3C 3EC52EE4
C0489AF2 76FF006A 006A006A 006A1374 00F27E83 0EC48300 54DABA9A 014C6805
014C6805 6A35FF3C 3C3EC52E 0275FF3C 3C3EC52E 016A50F2 468D160A C4830054
C4830054 C0489AF2 76FF006A 006A006A 006A1374 00F27E83 0EC48300 54DABA9A
2E3BEA36 FF2E3BDC 36FF2E3B DE36FF2E 3C4036FF 2E3C4236 FF2E50F2 468D160A
F27E831A C4830054 DABA9A00 CC680B6A 016A3BE4 36FF2E3B E636FF2E 3BE836FF
3C4A36FF 2E50F246 8D160AC4 830054C0 489AF276 FF006A00 6A006A00 6A137400
7E8312C4 830054DA BA9A02CA 68076A01 6A3C4436 FF2E3C46 36FF2E3C 4836FF2E
4A36FF2E 50F2468D 160AC483 0054C048 9AF276FF 006A006A 006A006A 137400F2
6A006A00 6A006A13 7400F27E 830CC483 0054DABA 9A01F868 046A3C48 36FF2E3C
E83EC52E 1DD99B3C 4C3EC52E 05D99B3B E43EC52E 0AC48300 54C0489A F276FF00
2ED866DC 9B05D99B 3BF43EC5 2ED85EDD 9BE8D99B 1DD99B3C 503EC52E 05D99B3B
9B3BE43E C52E045D D99B3C50 3EC52E04 45D99B3B E83EC52E 045DD99B 3C4C3EC5
9B3BE43E C52E1DD9 9B3C583E C52E05D9 9B3BE83E C52E1DD9 9B3C543E C52E05D9
2ED866DC 9B05D99B 3BEC3EC5 2ED85EDD 9BE8D99B 045DD99B 3C543EC5 2E0445D9
5C3EC52E D846DC9B 0445D99B 3BF43EC5 2ED85EDD 9BE8D99B 045DD99B 3C583EC5
3EC52E04 45D99B3B E43EC52E 1DD99B3C 603EC52E 05D99B3B E83EC52E 1DD99B3C
05D99B3B E43EC52E 045DD99B 3C603EC5 2E0445D9 9B3BE83E C52E045D D99B3C5C
683EC52E D846DC9B 0445D99B 3BEC3EC5 2ED85EDD 9BE8D99B 1DD99B3C 643EC52E
2E0445D9 9B3BE83E C52E045D D99B3C64 3EC52E04 45D99B3B E43EC52E 1DD99B3C
0A3EC52E F6468905 8B3B2A3E C52EF446 89058B3B 223EC52E 045DD99B 3C683EC5
36FF2E50 F2468D16 1305C63B D83EC52E 08EB1605 C63BD83E C52E0A74 003D833B
6A006A00 6A137400 F27E830E C4830054 DABA9A6E 6A056A01 6A3BD836 FF2E3BDA
000005C7 3C6C3EC5 2E000005 C73BAA3E C52E0AC4 830054C0 489AF276 FF006A00
833BFC3E C52E0D75 003D833B 0A3EC52E 0000FE46 C700000C C85756CB 5E5FC99B
02E7C1FC 7E8B00C2 E9037C04 FC7E83FC 46FF03EB 0000FC46 C702ADE9 0375003D
3BC606DF 2E9B0873 0054968A 9A1DD89B 3BC606DF 2E9B3BCE 1E8E2E3B CC3E032E
F45EDC9B EED99BF4 5EDD9B05 D99B3BCE 1E8E2E3B CC3E032E 02E7C1FC 7E8B13EB
2E02E6C1 FC768B56 EB08C483 0054970A 9A005496 8F9AEED9 9B127600 54968A9A
3BC606DF 2E9B1573 0054968A 9A1CD826 9B3BC606 DF2E9B3B CE068E2E 3BCC3603
9B3BCE1E 8E2E3BCC 3E032E02 E7C1FC7E 8B20EB08 C4830054 970A9A00 54968F9A
FE468D16 FF32E905 88FC7E03 3C103EC5 2E08C483 0054970A 9A005496 8F9A05D9
830054DA BA9A0197 68066A3C 1436FF2E 3C1636FF 2E3C1036 FF2E3C12 36FF2E50
0000FC46 C70AC483 0054C048 9AFE76FF 006A006A 006A006A 137400FE 7E8310C4
2E9B3C72 1E8E2E3C 703E032E 02E7C1FC 7E8B00C2 E9037C04 FC7E83FC 46FF03EB
703E032E 02E7C1FC 7E8B13EB 3BC606DF 2E9B0873 0054968A 9A1DD89B 3BC606DF
8F9AEED9 9B127600 54968A9A F45EDC9B EED99BF4 5EDD9B05 D99B3C72 1E8E2E3C
DF2E9B3C 72068E2E 3C703603 2E02E6C1 FC768B56 EB08C483 0054970A 9A005496
C4830054 970A9A00 54968F9A 3BC606DF 2E9B1573 0054968A 9A1CD826 9B3BC606
0054970A 9A005496 8F9A05D9 9B3C721E 8E2E3C70 3E032E02 E7C1FC7E 8B20EB08
2E3C1036 FF2E3C12 36FF2E50 FE468D16 FF32E905 88FC7E03 3C103EC5 2E08C483
006A006A 137400FE 7E8310C4 830054DA BA9A0197 68066A3C 7436FF2E 3C7636FF

FE468D16 0598E903 75003D83 3BAA3EC5 2E0AC483 0054C048 9AFE76FF 006A006A
00FE7E83 10C48300 54DABA9A 01326806 6A006A00 6A3B4636 FF2E3B48 36FF2E50
2E3B4C36 FF2E50FE 468D160A C4830054 C0489AFE 76FF006A 006A006A 006A1374
006A0536 E9037500 FE7E8310 C4830054 DABA9A01 3268066A 006A006A 3B4A36FF
9B3BC606 DF2E9B3B CC3EC52E 0520E90A C4830054 C0489AFE 76FF006A 006A006A
EED99BF4 5EDD9B05 D99B3BCC 3EC52E08 EB3BC606 DF2E9B08 73005496 8A9A1DD8
36C42E40 EB08C483 0054970A 9A005496 8F9AEED9 9B127600 54968A9A F45EDC9B
0A9A0054 968F9A3B C606DF2E 9B157300 54968A9A 1CD8269B 3BC606DF 2E9B3BCC
3EC52E08 C4830054 970A9A00 54968F9A 05D99B3B CC3EC52E 15EB08C4 83005497
C606DF2E 9B087300 54968A9A 045DD89B 3BC606DF 2E9B3BCC 3EC52E01 45883C38
D99B1276 0054968A 9AF45EDC 9BEED99B F45EDD9B 0445D99B 3BCC3EC5 2E09EB3B
045CD826 9B3BC606 DF2E9B3B CC36C42E 42EB08C4 83005497 0A9A0054 968F9AEE
CC3EC52E 16EB08C4 83005497 0A9A0054 968F9A3B C606DF2E 9B157300 54968A9A
2E9B3BCC 3EC52E05 883C383E C52E08C4 83005497 0A9A0054 968F9A04 45D99B3B
0845D99B 3BCC3EC5 2E09EB3B C606DF2E 9B087300 54968A9A 085DD89B 3BC606DF
83005497 0A9A0054 968F9AEE D99B1276 0054968A 9AF45EDC 9BEED99B F45EDD9B
C606DF2E 9B157300 54968A9A 085CD826 9B3BC606 DF2E9B3B CC36C42E 42EB08C4
0A9A0054 968F9A08 45D99B3B CC3EC52E 16EB08C4 83005497 0A9A0054 968F9A3B
968A9A0C 5DD89B3B C606DF2E 9B3BCC3E C52E0345 883C383E C52E08C4 83005497
F45EDC9B EED99BF4 5EDD9B0C 45D99B3B CC3EC52E 09EB3BC6 06DF2E9B 08730054
2E9B3BCC 36C42E42 EB08C483 0054970A 9A005496 8F9AEED9 9B127600 54968A9A
0054970A 9A005496 8F9A3BC6 06DF2E9B 15730054 968A9A0C 5CD8269B 3BC606DF
3C383EC5 2E08C483 0054970A 9A005496 8F9A0C45 D99B3BCC 3EC52E16 EB08C483
08EB3BC6 06DF2E9B 08730054 968A9A1D D89B3BC6 06DF2E9B 3C703EC5 2E024588
968F9AEE D99B1276 0054968A 9AF45EDC 9BEED99B F45EDD9B 05D99B3C 703EC52E
0054968A 9A1CD826 9B3BC606 DF2E9B3C 7036C42E 40EB08C4 83005497 0A9A0054
9A05D99B 3C703EC5 2E15EB08 C4830054 970A9A00 54968F9A 3BC606DF 2E9B1573
9B3BC606 DF2E9B3C 703EC52E 0145883C 783EC52E 08C48300 54970A9A 0054968F
9BF45EDD 9B0445D9 9B3C703E C52E09EB 3BC606DF 2E9B0873 0054968A 9A045DD8
2E42EB08 C4830054 970A9A00 54968F9A EED99B12 76005496 8A9AF45E DC9BEED9
54968F9A 3BC606DF 2E9B1573 0054968A 9A045CD8 269B3BC6 06DF2E9B 3C7036C4
C4830054 970A9A00 54968F9A 0445D99B 3C703EC5 2E16EB08 C4830054 970A9A00
2E9B0873 0054968A 9A085DD8 9B3BC606 DF2E9B3C 703EC52E 05883C78 3EC52E08
76005496 8A9AF45E DC9BEED9 9BF45EDD 9B0845D9 9B3C703E C52E09EB 3BC606DF
269B3BC6 06DF2E9B 3C7036C4 2E42EB08 C4830054 970A9A00 54968F9A EED99B12
2E16EB08 C4830054 970A9A00 54968F9A 3BC606DF 2E9B1573 0054968A 9A085CD8
3EC52E03 45883C78 3EC52E08 C4830054 970A9A00 54968F9A 0845D99B 3C703EC5
3C703EC5 2E09EB3B C606DF2E 9B087300 54968A9A 0C5DD89B 3BC606DF 2E9B3C70
0A9A0054 968F9AEE D99B1276 0054968A 9AF45EDC 9BEED99B F45EDD9B 0C45D99B
9B157300 54968A9A 0C5CD826 9B3BC606 DF2E9B3C 7036C42E 42EB08C4 83005497
968F9A0C 45D99B3C 703EC52E 16EB08C4 83005497 0A9A0054 968F9A3B C606DF2E
FE468D16 7874003D 833BAA3E C52E0245 883C783E C52E08C4 83005497 0A9A0054
830EC483 0054DABA 9A014C68 056A35FF 3C783EC5 2E0275FF 3C783EC5 2E006A50
2E016A50 FE468D16 0AC48300 54C0489A FE76FF00 6A006A00 6A006A13 7400FE7E
7400FE7E 830EC483 0054DABA 9A014C68 056A35FF 3C383EC5 2E0275FF 3C383EC5
5756CB5E 5FC99B00 2C22159A 0AC48300 54C0489A FE76FF00 6A006A00 6A006A13
BA9A01F6 68036A00 6A50FE46 8D160001 05C73C6C 3EC52E00 00FE46C7 000002C8
160AC483 0054C048 9AFE76FF 006A006A 006A006A 137400FE 7E830AC4 830054DA
6A006A00 6A006A13 7400FE7E 830AC483 0054DABA 9A01F568 036A006A 50FE468D
6A74003D 833BFC3E C52E0A75 003D833B 0A3EC52E 0AC48300 54C0489A FE76FF00
C52E0AC4 83005496 649A3C74 36FF2E3C 7636FF2E 3C1436FF 2E3C1636 FF2E036A
066A006A 006A3B4A 36FF2E3B 4C36FF2E 50FE468D 1600CBE9 0375003D 833BAA3E
9AFE76FF 006A006A 006A006A 00A2E903 7500FE7E 8310C483 0054DABA 9A013268
383EC52E 0145883C 783EC52E E42A0145 8A3C383E C52E008C E90AC483 0054C048
C52E0345 883C783E C52EE42A 03458A3C 383EC52E 05883C78 3EC52EE4 2A058A3C
6A50FE46 8D163C74 003D833B AA3EC52E 0245883C 783EC52E E42A0245 8A3C383E
FE7E830E C4830054 DABA9A01 4C68056A 35FF3C78 3EC52E02 75FF3C78 3EC52E00
0A74003D 833B0A3E C52E0AC4 830054C0 489AFE76 FF006A00 6A006A00 6A137400
D836FF2E 3BDA36FF 2E50FE46 8D161205 C63BD83E C52E08EB 1705C63B D83EC52E
FE76FF00 6A006A00 6A006A13 7400FE7E 830EC483 0054DABA 9A6E6A05 6A016A3B
DC36FF2E 3BDE36FF 2E3C4036 FF2E3C42 36FF2E50 FE468D16 0AC48300 54C0489A
54DABA9A 00CC680B 6A016A3B F436FF2E 3BF636FF 2E3BEC36 FF2E3BEE 36FF2E3B
468D160A C4830054 C0489AFE 76FF006A 006A006A 006A1374 00FE7E83 1AC48300
3C5036FF 2E3C5236 FF2E3BE0 36FF2E3B E236FF2E 3C4036FF 2E3C4236 FF2E50FE

6A137400 FE7E831A C4830054 DABA9A00 CC680B6A 016A3C4C 36FF2E3C 4E36FF2E
4036FF2E 3C4236FF 2E50FE46 8D160AC4 830054C0 489AFE76 FF006A00 6A006A00
6A3C5436 FF2E3C56 36FF2E3C 5836FF2E 3C5A36FF 2E3BE036 FF2E3BE2 36FF2E3C
9AFE76FF 006A006A 006A006A 137400FE 7E831AC4 830054DA BA9A00CC 680B6A01
3BE036FF 2E3BE236 FF2E3C40 36FF2E3C 4236FF2E 50FE468D 160AC483 0054C048
0054DABA 9A00CC68 0B6A016A 3C5C36FF 2E3C5E36 FF2E3C60 36FF2E3C 6236FF2E
FE468D16 0AC48300 54C0489A FE76FF00 6A006A00 6A006A13 7400FE7E 831AC483
2E3C6836 FF2E3C6A 36FF2E3B E036FF2E 3BE236FF 2E3C4036 FF2E3C42 36FF2E50
006A1374 00FE7E83 1AC48300 54DABA9A 00CC680B 6A016A3C 6436FF2E 3C6636FF
3C4836FF 2E3C4A36 FF2E50FE 468D160A C4830054 C0489AFE 76FF006A 006A006A
489AFE76 FF006A00 6A006A00 6A137400 FE7E830C C4830054 DABA9A01 F868046A
C63BD83E C52E08EB 1605C63B D83EC52E 0A74003D 833B0A3E C52E0AC4 830054C0
830EC483 0054DABA 9A6E6A05 6A016A3B D836FF2E 3BDA36FF 2E50FE46 8D161305
02C85756 CB5E5FC9 0AC48300 54C0489A FE76FF00 6A006A00 6A006A13 7400FE7E
54DABA9A 01F66803 6A006A50 FE468D16 000005C7 3C6C3EC5 2E0000FE 46C70000
468D160A C4830054 C0489AFE 76FF006A 006A006A 006A1374 00FE7E83 0AC48300
FF006A00 6A006A00 6A137400 FE7E830A C4830054 DABA9A01 F568036A 006A50FE
C52E08EB 1705C63B D83EC52E 0A74003D 833B0A3E C52E0AC4 830054C0 489AFE76
0054DABA 9A6E6A05 6A016A3B D836FF2E 3BDA36FF 2E50FE46 8D161205 C63BD83E
FE468D16 0AC48300 54C0489A FE76FF00 6A006A00 6A006A13 7400FE7E 830EC483
2E3BE836 FF2E3BEA 36FF2E3B DC36FF2E 3BDE36FF 2E3C4036 FF2E3C42 36FF2E50
006A1374 00FE7E83 1AC48300 54DABA9A 00CC680B 6A016A3B E436FF2E 3BE636FF
3C4836FF 2E3C4A36 FF2E50FE 468D160A C4830054 C0489AFE 76FF006A 006A006A
489AFE76 FF006A00 6A006A00 6A137400 FE7E830C C4830054 DABA9A01 F868046A
C63BD83E C52E08EB 1605C63B D83EC52E 0A74003D 833B0A3E C52E0AC4 830054C0
830EC483 0054DABA 9A6E6A05 6A016A3B D836FF2E 3BDA36FF 2E50FE46 8D161305
003D833B 0A3EC52E 0AC48300 54C0489A FE76FF00 6A006A00 6A006A13 7400FE7E
6A006A00 6A3C2036 FF2E3C22 36FF2E50 FE468D16 3B74003D 833BFC3E C52E0A75
C0489AFE 76FF006A 006A006A 006A5174 00FE7E83 10C48300 54DABA9A 01326806
68056A35 FF3C3C3E C52E0275 FF3C3C3E C52E006A 50FE468D 163CEB0A C4830054
0054C048 9AFE76FF 006A006A 006A006A 137400FE 7E830EC4 830054DA BA9A014C
00F846C7 0000FA46 C70000FC 46C70000 FE46C700 0016C857 56CB5E5F C90AC483
C7EC4689 058B3B2A 3EC52EEA 4689058B 3B223EC5 2E797500 3D833BAA 3EC52E00
FF50EA46 8D1650FE 468D1641 7500FE7E 83477D04 F67E83F6 46FF03EB 0000F646
6A066A35 FF3B4E3E C52E35FF 3B581E8E 2E3B563E 032EE7D1 F67E8BFA 76FFF876
3BAA3EC5 2E002C20 489AB0EB EA460105 056B3B16 3EC52E14 C4830054 D8DC9A06
0105C73C 0C3EC52E 0000FC46 C70000FE 46C70000 04C85756 CB5E5FC9 000105C7
0EC48300 54DABA9A 01FE6805 6AFC76FF 3C0C36FF 2E3C0E36 FF2E50FE 468D1600
3D833B0A 3EC52E0A C4830054 C0489AFE 76FF006A 006A006A 006A1374 00FE7E83
54DABA9A 01F76803 6A006A50 FE468D16 00B2E903 75003D83 3BFC3EC5 2E0D7500
468D160A C4830054 C0489AFE 76FF006A 006A006A 006A1374 00FE7E83 0AC48300
FE7E8310 C4830054 DABA9A01 3268066A 006A006A 3B4636FF 2E3B4836 FF2E50FE
0375003D 833C6C3E C52E0AC4 830054C0 489AFE76 FF006A00 6A006A00 6A137400
0054DABA 9A013268 066A006A 006A3B4A 36FF2E3B 4C36FF2E 50FE468D 1600EEE9
E90AC483 0054C048 9AFE76FF 006A006A 006A006A 00C5E903 7500FE7E 8310C483
3C783EC5 2E0275FF 3C783EC5 2E006A50 FE468D16 3C74003D 833C6C3E C52E00AF
FE76FF00 6A006A00 6A006A13 7400FE7E 830EC483 0054DABA 9A014C68 056A35FF
056A35FF 3C383EC5 2E0275FF 3C383EC5 2E016A50 FE468D16 0AC48300 54C0489A
54C0489A FE76FF00 6A006A00 6A006A13 7400FE7E 830EC483 0054DABA 9A014C68
006A1374 00FE7E83 0AC48300 54DABA9A 01F76803 6A006A50 FE468D16 0AC48300
0000FC46 C700000C C85756CB 5E5FC90A C4830054 C0489AFE 76FF006A 006A006A
8B287500 033D058B 3BAE3EC5 2E01E9E9 037C04FE 7E83FE46 FF03EB00 00FE46C7
1E8E2E3B C23E032E 02E7C1FE 7E8B05D9 9B3BCA1E 8E2E3BC8 3E032E02 E7C1FE7E
2E02E7C1 FE7E8B50 523BC416 8B2E3BC2 06032E02 E0C1FE46 8B34EB1D D99B3BC4
3C7C3EC5 2E0EC483 003CFC5A 9A006A00 54968F9A 05D99B3B CA1E8E2E 3BC83E03
833B0E3E C52E1AEB 0205C63C 843EC52E 0105C63C 803EC52E 1275003D 80FE7E03
2C750002 3D058B3B AE3EC52E 0105C63C 843EC52E 0205C63C 803EC52E 1074003D
968F9A05 D99B3BC4 1E8E2E3B C23E032E 02E7C1FE 7E8B3BB6 36FF2E3B B836FF2E
C23E032E 02E7C1FE 7E8B3BB6 36FF2E3B B836FF2E 39EB0CC4 83003CFE 929A0054
32BC9A50 08C48300 5496EF9A 0054968F 9A3C8806 DC2E9B05 D99B3BC4 1E8E2E3B
FF2E50FC 468D1602 55890589 3C903EC5 2E3BB816 8B2E3BB6 068B2E06 C483002C
8E2E3B56 3E032EE7 D1FE7E8B 0B6A3B5A 36FF2E3B 5C36FF2E 3C9436FF 2E3C9636
006A1374 00FC7E83 16C48300 54D8DC9A 046A076A 35FF3B4E 3EC52E35 FF3B581E
8D16FE69 E9037500 3D833B0E 3EC52E0A C4830054 C0489AFC 76FF006A 006A006A

032EE7D1 FE7E8B06 6A3B8236 FF2E3B84 36FF2E3C 9836FF2E 3C9A36FF 2E50FC46
FC7E8316 C4830054 D8DC9A04 6A076A35 FF3B4E3E C52E35FF 3B581E8E 2E3B563E
AA3EC52E FE0BE90A C4830054 C0489AFC 76FF006A 006A006A 006AFE21 E9037500
468D163F 74003D83 3BFC3EC5 2E0A7500 3D833B0A 3EC52E03 0BE90375 003D833B
FC7E8310 C4830054 DABA9A01 3268066A 006A006A 3B4636FF 2E3B4836 FF2E50FC
CC3EC52E 02B8E90A C4830054 C0489AFC 76FF006A 006A006A 006A02CE E9037500
D99B3BCC 3EC52E08 EB3BC606 DF2E9B08 73005496 8A9A1DD8 9B3BC606 DF2E9B3B
0054970A 9A005496 8F9AEED9 9B127600 54968A9A F45EDC9B EED99BF4 5EDD9B05
C606DF2E 9B157300 54968A9A 1CD8269B 3BC606DF 2E9B3BCC 36C42E40 EB08C483
970A9A00 54968F9A 05D99B3B CC3EC52E 15EB08C4 83005497 0A9A0054 968F9A3B
54968A9A 045DD89B 3BC606DF 2E9B3BCC 3EC52E01 45883C38 3EC52E08 C4830054
9AF45EDC 9BEED99B F45EDD9B 0445D99B 3BCC3EC5 2E09EB3B C606DF2E 9B087300
DF2E9B3B CC36C42E 42EB08C4 83005497 0A9A0054 968F9AEE D99B1276 0054968A
83005497 0A9A0054 968F9A3B C606DF2E 9B157300 54968A9A 045CD826 9B3BC606
883C383E C52E08C4 83005497 0A9A0054 968F9A04 45D99B3B CC3EC52E 16EB08C4
2E09EB3B C606DF2E 9B087300 54968A9A 085DD89B 3BC606DF 2E9B3BCC 3EC52E05
968F9AEE D99B1276 0054968A 9AF45EDC 9BEED99B F45EDD9B 0845D99B 3BCC3EC5
54968A9A 085CD826 9B3BC606 DF2E9B3B CC36C42E 42EB08C4 83005497 0A9A0054
45D99B3B CC3EC52E 16EB08C4 83005497 0A9A0054 968F9A3B C606DF2E 9B157300
C606DF2E 9B3BCC3E C52E0345 883C383E C52E08C4 83005497 0A9A0054 968F9A08
5EDD9B0C 45D99B3B CC3EC52E 09EB3BC6 06DF2E9B 08730054 968A9A0C 5DD89B3B
EB08C483 0054970A 9A005496 8F9AEED9 9B127600 54968A9A F45EDC9B EED99BF4
8F9A3BC6 06DF2E9B 15730054 968A9A0C 5CD8269B 3BC606DF 2E9B3BCC 36C42E42
0054970A 9A005496 8F9A0C45 D99B3BCC 3EC52E16 EB08C483 0054970A 9A005496
FF3C383E C52E0275 FF3C383E C52E016A 50FC468D 16024588 3C383EC5 2E08C483
9AFC76FF 006A006A 006A006A 137400FC 7E830EC4 830054DA BA9A014C 68056A35
7400FC7E 830AC483 0054DABA 9A01F768 036A006A 50FC468D 160AC483 0054C048
C700001C C85756CB 5E5FC99B 0AC48300 54C0489A FC76FF00 6A006A00 6A006A13
D99B3CAC 06DD2E9B F05ED99B 3CA406DD 2E9BF45E D99B3C9C 06DD2E9B 0000FE46
85D99B3C B43EC52E E45EDD9B 3CB806DF 2E9B5D75 00023D05 8B3BAE3E C52EEC5E
5ED99B3C A406DD2E 9BF45ED9 9B3C9C06 DD2E9B20 76005496 8A9AE45E DC9B00CC
5ED99B3C BA06DD2E 9BF45ED9 9B3CAC06 DD2E9B1E EBEC5ED9 9B3CAC06 DD2E9BF0
46C708B3 E9037E04 3B260445 8B0A7EC5 3B1236C4 2EEC5ED9 9B3CC206 DD2E9BF0
3B581E8E 2E3B563E 032EE7D1 FC7E8B0A 76C41A7D 04FC7E83 FC46FF03 EB0000FC
000105C7 3CCA3EC5 2E097503 FC7E8308 80E90375 04FC7E83 DD750644 3B26058B
7EC50001 05C73CD2 3EC52E08 5CE90375 00023D05 8B3CCE3E C52E0F75 03FC7E83
D99B05D8 9BF446D9 9B3BC41E 8E2E3BC2 3E032E02 E7C1FC7E 8B0155E9 04458B0A
37E91DD9 9B05D89B F046D99B 3BC41E8E 2E3BC23E 032E02E7 C1FC7E8B 0154E91D
7E8B011A E91DD99B 05D89BEC 46D99B3B C41E8E2E 3BC23E03 2E02E7C1 FC7E8B01
E7C1FC7E 8B00FDE9 1DD99B2D D89BF446 D99B3BC4 1E8E2E3B C23E032E 02E7C1FC
032E02E7 C1FC7E8B 00E0E91D D99B2DD8 9BF046D9 9B3BC41E 8E2E3BC2 3E032E02
2A058AFC 7E033C7C 3EC52E00 C3E91DD9 9B2DD89B EC46D99B 3BC41E8E 2E3BC23E
05C6FC7E 033C7C3E C52E0205 C63C843E C52E0105 C63C803E C52E1D75 00FF3DE4
8D16FF05 C6FC7E03 3C7C3EC5 2E0105C6 3C843EC5 2E0205C6 3C803EC5 2E1BEB00
032EE7D1 FC7E8B06 6A3B8236 FF2E3B84 36FF2E3C 9836FF2E 3C9A36FF 2E50FE46
FE7E8316 C4830054 D8DC9A04 6A076A35 FF3B4E3E C52E35FF 3B581E8E 2E3B563E
7700063D 06F5E90A C4830054 C0489AFE 76FF006A 006A006A 006A070B E9037500
3D058B3B AE3EC52E 28F528D8 28BB289E 28812864 284729AA A7FF2ED8 8BE0D117
2E3BC23E 032E02E7 C1FC7E8B 3C7D04FA 7E83FA46 FF03EB00 00FA46C7 4C740002
3E032E02 E7C1FC7E 8BF84689 08C48300 5496EF9A 0054968F 9A05D99B 3BC41E8E
B836FF2E 2C750002 3D058B3B AE3EC52E BBEB1DD9 9BF846DF 9B3BC41E 8E2E3BC2
929A0054 968F9A05 D99B3BC4 1E8E2E3B C23E032E 02E7C1FC 7E8B3BB6 36FF2E3B
1E8E2E3B C23E032E 02E7C1FC 7E8B3BB6 36FF2E3B B836FF2E 33EB0CC4 83003CFE
3BBA36C4 2E06C483 002C32BC 9A5008C4 83005496 EF9A0054 968F9A05 D99B3BC4
C52E1D76 0054968A 9A1CD826 9B05D99B 3BC41E8E 2E3BC23E 032E02E7 C1FC7E8B
3BBE36C4 2E3EEB1D D99B3BC4 1E8E2E3B C23E032E 02E7C1FC 7E8B05D9 9B3BBA3E
C52E1B73 0054968A 9A1CD826 9B05D99B 3BC41E8E 2E3BC23E 032E02E7 C1FC7E8B
058B3BAE 3EC52E1D D99B3BC4 1E8E2E3B C23E032E 02E7C1FC 7E8B05D9 9B3BBE3E
9B3BC41E 8E2E3BC2 3E032E02 E7C1FC7E 8B3BB636 FF2E3BB8 36FF2E2C 7500023D
E7C1FC7E 8B3BB636 FF2E3BB8 36FF2E33 EB0CC483 003CFE92 9A005496 8F9A05D9
2C32BC9A 5008C483 005496EF 9A005496 8F9A05D9 9B3BC41E 8E2E3BC2 3E032E02
36FF2E50 FE468D16 02558905 893C903E C52E3BB8 168B2E3B B6068B2E 06C48300
35FF3B4E 3EC52E06 75FF0A7E C50B6A3B 5A36FF2E 3B5C36FF 2E3C9436 FF2E3C96
032E02E7 C1FC7E8B 3B750003 3D058B3B AE3EC52E 16C48300 54D8DC9A 046A076A

7E8B15D9 9B3BCE1E 8E2E3BCC 3E032E02 E7C1FC7E 8B05D99B 3BC41E8E 2E3BC23E
8B2E3BC8 06032E02 E0C1FC46 8B34EB1D D99B3BCA 1E8E2E3B C83E032E 02E7C1FC
9A016A00 54968F9A 05D99B3B C41E8E2E 3BC23E03 2E02E7C1 FC7E8B50 523BCA16
3BD03EC5 2E3BC836 FF2E3BCA 36FF2E3B CC36FF2E 3BCE36FF 2E0EC483 003CFC5A
0CC48300 3CB99E9A 50003C05 C38B51CA 8BD88B3B D6168B2E 3BD40603 2E4C056B
3D833BFC 3EC52E0D 75003D83 3B0A3EC5 2E0422E9 03750003 3D058B3B AE3EC52E
2E02E7C1 FC7E8B00 C2E9037C 04FC7E83 FC46FF03 EB0000FC 46C70153 E9037500
EB3BC606 DF2E9B08 73005496 8A9A1DD8 9B3BC606 DF2E9B3B CE1E8E2E 3BCC3E03
9AE45EDC 9BEED99B E45EDD9B 05D99B3B CE1E8E2E 3BCC3E03 2E02E7C1 FC7E8B13
032E02E6 C1FC768B 56EB08C4 83005497 0A9A0054 968F9AEE D99B1276 0054968A
9A3BC606 DF2E9B15 73005496 8A9A1CD8 269B3BC6 06DF2E9B 3BCE068E 2E3BCC36
D99B3BCE 1E8E2E3B CC3E032E 02E7C1FC 7E8B20EB 08C48300 54970A9A 0054968F
50FE468D 16FF32E9 0588FC7E 033C103E C52E08C4 83005497 0A9A0054 968F9A05
C4830054 DABA9A01 9768066A 3C1436FF 2E3C1636 FF2E3C10 36FF2E3C 1236FF2E
2E50FE46 8D160AC4 830054C0 489AFE76 FF006A00 6A006A00 6A137400 FE7E8310
037500FE 7E8310C4 830054DA BA9A0132 68066A00 6A006A3B 4636FF2E 3B4836FF
2E9B3BCC 3EC52E02 B8E90AC4 830054C0 489AFE76 FF006A00 6A006A00 6A02CEE9
DD9B05D9 9B3BCC3E C52E08EB 3BC606DF 2E9B0873 0054968A 9A1DD89B 3BC606DF
08C48300 54970A9A 0054968F 9AEED99B 12760054 968A9AE4 5EDC9BEE D99BE45E
8F9A3BC6 06DF2E9B 15730054 968A9A1C D8269B3B C606DF2E 9B3BCC36 C42E40EB
83005497 0A9A0054 968F9A05 D99B3BCC 3EC52E15 EB08C483 0054970A 9A005496
08730054 968A9A04 5DD89B3B C606DF2E 9B3BCC3E C52E0145 883C383E C52E08C4
54968A9A E45EDC9B EED99BE4 5EDD9B04 45D99B3B CC3EC52E 09EB3BC6 06DF2E9B
3BC606DF 2E9B3BCC 36C42E42 EB08C483 0054970A 9A005496 8F9AEED9 9B127600
EB08C483 0054970A 9A005496 8F9A3BC6 06DF2E9B 15730054 968A9A04 5CD8269B
C52E0588 3C383EC5 2E08C483 0054970A 9A005496 8F9A0445 D99B3BCC 3EC52E16
CC3EC52E 09EB3BC6 06DF2E9B 08730054 968A9A08 5DD89B3B C606DF2E 9B3BCC3E
9A005496 8F9AEED9 9B127600 54968A9A E45EDC9B EED99BE4 5EDD9B08 45D99B3B
15730054 968A9A08 5CD8269B 3BC606DF 2E9B3BCC 36C42E42 EB08C483 0054970A
8F9A0845 D99B3BCC 3EC52E16 EB08C483 0054970A 9A005496 8F9A3BC6 06DF2E9B
D89B3BC6 06DF2E9B 3BCC3EC5 2E034588 3C383EC5 2E08C483 0054970A 9A005496
D99BE45E DD9B0C45 D99B3BCC 3EC52E09 EB3BC606 DF2E9B08 73005496 8A9A0C5D
C42E42EB 08C48300 54970A9A 0054968F 9AEED99B 12760054 968A9AE4 5EDC9BEE
0054968F 9A3BC606 DF2E9B15 73005496 8A9A0C5C D8269B3B C606DF2E 9B3BCC36
08C48300 54970A9A 0054968F 9A0C45D9 9B3BCC3E C52E16EB 08C48300 54970A9A
056A35FF 3C383EC5 2E0275FF 3C383EC5 2E016A50 FE468D16 0245883C 383EC52E
54C0489A FE76FF00 6A006A00 6A006A13 7400FE7E 830EC483 0054DABA 9A014C68
006A1374 00FE7E83 0AC48300 54DABA9A 01F76803 6A006A50 FE468D16 0AC48300
00FE46C7 000006C8 5756CB5E 5FC99B0A C4830054 C0489AFE 76FF006A 006A006A
317D04FC 7E83FC46 FF03EB00 00FC46C7 6874003D 833BAA3E C52E0000 FA46C700
4E3EC52E 35FF3B58 1E8E2E3B 563E032E E7D1FC7E 8B50FE46 8D162B75 00FE7E83
FF006A00 6A006A00 6A137400 FE7E83C6 EB0CC483 0054D8DC 9A076A02 6A35FF3B
04C85756 CB5E5FC9 000005C7 3BAA3EC5 2E002C31 1C9A0AC4 830054C0 489AFE76
0375003D 833BFC3E C52E0D75 003D833B 0A3EC52E 0000FC46 C70000FE 46C70000
0054DABA 9A013268 066A006A 006A3C18 36FF2E3C 1A36FF2E 50FE468D 160085E9
6C3EC52E 0AC48300 54C0489A FE76FF00 6A006A00 6A006A13 7400FE7E 8310C483
3268066A 006A006A 3C2036FF 2E3C2236 FF2E50FE 468D1600 EEE90375 003D833C
C0489AFE 76FF006A 006A006A 006A00C5 E9037500 FE7E8310 C4830054 DABA9A01
75FF3C3C 3EC52E00 6A50FE46 8D163C74 003D833C 6C3EC52E 00AFE90A C4830054
6A006A00 6A137400 FE7E830E C4830054 DABA9A01 4C68056A 35FF3C3C 3EC52E02
3EC52E02 75FF3C3C 3EC52E01 6A50FE46 8D160AC4 830054C0 489AFE76 FF006A00
FF006A00 6A006A00 6A137400 FE7E830E C4830054 DABA9A01 4C68056A 35FF3C3C
7E830AC4 830054DA BA9A01F7 68036A00 6A50FE46 8D160AC4 830054C0 489AFE76
000005C7 3C0C3EC5 2E0AC483 0054C048 9AFE76FF 006A006A 006A006A 137400FE
830EC483 0054DABA 9A01FE68 056AFC76 FF3C0C36 FF2E3C0E 36FF2E50 FE468D16
0AC85756 CB5E5FC9 0AC48300 54C0489A FE76FF00 6A006A00 6A006A13 7400FE7E
0E5E8E0C 7E03FE7E 8B0E7D04 FE7E83FE 46FF03EB 0000FE46 C70000F8 46C70000
7E831C75 00033D05 8B3BAE3E C52E0445 880C7EC5 058B3CD6 3EC52EE9 EB2005C6
833BB23E C52E2B05 C60C7EC5 06EB2D05 C60C7EC5 0A4689D8 F70A468B 107D000A
01FE46C7 20F746C6 04EB2DF7 46C60A46 89D8F70A 468B0E7D 000A7E83 1874003D
0A468B3D 7D04FE7E 83FC4689 3CDA3EF7 2E99FC46 8BFE46FF 0FEB0064 FC46C700
468B0001 F846C7CF 7503FE7E 83067401 F87E830C 7F00FA7E 83FA4689 FC7EF799
833BB23E C52EAEEB 05880030 05FA468B 0E5E8E0C 7E03FE7E 8B0A4629 FA6EF7FC
203D800E 5E8E0C7E 03FE7E8B 0E7D04FE 7E83FE46 FF03EB00 00FE46C7 2F74003D

F846C700 000AC857 56CB5E5F C90588E4 2AF7468A 0E5E8E0C 7E034FFE 7E8BE974
E9EB2005 C60E5E8E 0C7E03FE 7E8B0E7D 04FE7E83 FE46FF03 EB0000FE 46C70000
880C7EC5 058B3CD6 3EC52E0D EB200445 C60C7EC5 09750012 7E830F74 00107E83
C70001FE 46C720F7 46C604EB 2DF746C6 0A4689D8 F70A468B 0E7D000A 7E830445
F7990A46 8B3D7D04 FE7E83FC 46893CDA 3EF72E99 FC468BFE 46FF0FEB 0064FC46
F7FC468B 0001F846 C7CF7503 FE7E8306 7401F87E 830C7F00 FA7E83FA 4689FC7E
FF03EB00 00FE46C7 AEEB0588 003005FA 468B0E5E 8E0C7E03 FE7E8B0A 4629FA6E
0E5E8E0C 7E034FFE 7E8BE974 203D800E 5E8E0C7E 03FE7E8B 0E7D04FE 7E83FE46
3CB43EC5 2EF85EDD 9B3CB806 DF2E9B00 0008C857 56CB5E5F C90588E4 2AF7468A
9A005496 8F9A3C88 06DC2E9B 0A46DD9B 32760054 968A9AF8 5EDC9B00 CC85D99B
0AC48300 544ACA9A 1276FF14 76FF3CDC 36FF2E3C DE36FF2E 5008C483 005496EF
E036FF2E 3CE236FF 2E005496 8F9A0A46 DD9B2375 00187E83 29740016 7E8350EB
2E3CE636 FF2E0054 968F9A0A 46DD9B21 EB10C483 00544ACA 9A1276FF 1476FF3C
FE46C700 0004C857 56CB5E5F C99B10C4 8300544A CA9A1276 FF1476FF 3CE436FF
EF9A0054 968F9A05 D99B3BBE 3EC52E02 6AE90375 00033D05 8B3BAE3E C52E0000
83005496 EF9A0054 968F9A05 D99B3BBA 3EC52E05 893CE83E C52E08C4 83005496
C52E058B 3BAE3EC5 2E05893C F03EC52E 058B3CD6 3EC52E05 893CEC3E C52E08C4
00549664 9A3CF836 FF2E3CFA 36FF2E3B 4636FF2E 3B4836FF 2E046A05 893CF43E
8E2E3BC2 3E032E02 E7C1FC7E 8B4E7D04 FC7E83FC 46FF03EB 0000FC46 C70AC483
2E02E7C1 FC7E8B1D D99B3CFE 1E8E2E3C FC3E032E 02E7C1FC 7E8B05D9 9B3BC41E
EB1DD99B 3D021E8E 2E3D003E 032E02E7 C1FC7E8B 05D99B3B CA1E8E2E 3BC83E03
9B3BBA3E C52E0C46 DF9B1DD9 9B3BBE3E C52E0A46 DF9B0003 05C73BAE 3EC52EA9
C1FC7E8B 307D04FC 7E83FC46 FF03EB00 00FC46C7 05893CD6 3EC52E0E 468B1DD9
8E2E3BC8 3E032E02 E7C1FC7E 8B1DD99B 1046DF9B 3BC41E8E 2E3BC23E 032E02E7
3BC836FF 2E3BCA36 FF2E3BCC 36FF2E3B CE36FF2E C7EB1DD9 9B1046DF 9B3BCA1E
B99E9A50 003C05C3 8B51CA8B D88B3BD6 168B2E3B D406032E 4C056B3B D03EC52E
3D058B3B AE3EC52E 00E3E903 7C04FC7E 83FC46FF 03EB0000 FC46C70C C483003C
D99B3BC4 1E8E2E3B C23E032E 02E7C1FC 7E8B3BB6 36FF2E3B B836FF2E 2C750002
02E7C1FC 7E8B3BB6 36FF2E3B B836FF2E 39EB0CC4 83003CFE 929A0054 968F9A05
08C48300 5496EF9A 0054968F 9A3C8806 DC2E9B05 D99B3BC4 1E8E2E3B C23E032E
468D1602 55890589 3C903EC5 2E3BB816 8B2E3BB6 068B2E06 C483002C 32BC9A50
3E032EE7 D1FC7E8B 0B6A3B5A 36FF2E3B 5C36FF2E 3C9436FF 2E3C9636 FF2E50FE
00FE7E83 16C48300 54D8DC9A 046A076A 35FF3B4E 3EC52E35 FF3B581E 8E2E3B56
CB5E5FC9 9BFF11E9 0AC48300 54C0489A FE76FF00 6A006A00 6A006AFF 27E90375
3EC52E05 DF9B3CE8 3EC52E00 F6E90374 00033D05 8B3BAE3E C52E0000 02C85756
D63EC52E 058B3CF0 3EC52E1D D99B3BBA 3EC52E05 DF9B3CEC 3EC52E1D D99B3BBE
36FF2E3C F836FF2E 3CFA36FF 2E046A05 893BAE3E C52E058B 3CF43EC5 2E05893C
8B4E7D04 FE7E83FE 46FF03EB 0000FE46 C70AC483 00549664 9A3B4636 FF2E3B48
1E8E2E3B C23E032E 02E7C1FE 7E8B05D9 9B3CFE1E 8E2E3CFC 3E032E02 E7C1FE7E
032E02E7 C1FE7E8B 05D99B3D 021E8E2E 3D003E03 2E02E7C1 FE7E8B1D D99B3BC4
C836FF2E 3BCA36FF 2E3BCC36 FF2E3BCE 36FF2EA9 EB1DD99B 3BCA1E8E 2E3BC83E
9E9A5000 3C05C38B 51CA8BD8 8B3BD616 8B2E3BD4 06032E4C 056B3BD0 3EC52E3B
3BAA3EC5 2E0000FE 46C70000 02C85756 CB5E5FC9 9B002C22 159A0CC4 83003CB9
2E0A76FF 0C76FF50 FE468D16 74750003 3D058B3B AE3EC52E 0080E903 75003D83
006A006A 137400FE 7E8310C4 830054DA BA9A0197 68066A3C 1436FF2E 3C1636FF
006A3B46 36FF2E3B 4836FF2E 50FE468D 160AC483 0054C048 9AFE76FF 006A006A
FE76FF00 6A006A00 6A006A13 7400FE7E 8310C483 0054DABA 9A013268 066A006A
BE1C9A02 6A3D0436 FF2E3D06 36FF2EEC 8B555756 CB5E5FC9 0AC48300 54C0489A
3D833BB2 3EC52E00 0105C73B AE3EC52E 00DFE998 058A3D08 3EC52E06 C4830054
EB1DD99B 3BBA3EC5 2E3D0E06 DF2E9B1D D99B3BBE 3EC52E3D 0C06DF2E 9B1E7400
C73CD63E C52E1DD9 9B3BBA3E C52E3CB8 06DF2E9B 1DD99B3B BE3EC52E EED99B19
2E1DD99B 3BBE3EC5 2E05D99B 3D103EC5 2E000205 C73BAE3E C52E00A8 E9002505
C73BAE3E C52E74EB 006405C7 3CD63EC5 2E1DD99B 3BBA3EC5 2E05D99B 3D143EC5
1A06DF2E 9B1DD99B 3BBE3EC5 2E3D1806 DF2E9B1E 74003D83 3BB23EC5 2E000005
BA3EC52E 3BC606DF 2E9B1DD9 9B3BBE3E C52EEED9 9B19EB1D D99B3BBA 3EC52E3D
FF2E9C75 F9E0073B 2E434300 03B93AC0 BB1FEB00 7605C73C D63EC52E 1DD99B3B
C52E002C 39AC9A00 0002C857 56CB5E5F C99B3A5A 39D03A26 00530050 00440667
05893BAA 3EC52EFE 468B002C 22159A00 0005C73B AA3EC52E FE468905 8B3BAA3E
4DCA004C 4DC8004C 4DC6004C 4DC4004C 4A3C004C 4E6400CB 5E5FC900 54E7209A
4D8A004C 4D88004C 4D86004C 4DD0004C 4DCE004C 4A46004C 4DCC004C 4A44004C
4DD5004C 4DD4004C 4D6E004C 4DD20014 E220004C 4D82004C 4D62004C 4D8C004C
4DDD004C 4DDC004C 4DDB004C 4DDA004C 4DD9004C 4DD8004C 4DD7004C 4DD6004C
4DF5004C 4DF4004C 4DF3004C 4DF2004C 4DF1004C 4DF0004C 4DEF004C 4DEE004C
866A004C 866E004C 4A48004C 4A52004C 8666004C 4D50004C 4DF7004C 4DF6004C

004C4E66 004C4E08 004C4A56 004C4A54 004C5BC2 004C5BE2 00FF004C 4D52004C
004C4A3E 0308027E 004C4E7E 02F802E8 004C4E86 004C4E76 004C4E6E 004C4E6A
004C4D7B 004C4D7A 004C4D63 004C4E24 004C4E0A 004C4E0C 004C4E6B 004C4E67
004C4D76 004C4D6A 406FE000 00000000 004C4E0E 004C4E1E 004C4D7F 004C4D7E
004C4EAE 004C4EA6 004C4E9E 004C4E96 004C4E8E 004C4EDE 004C4ECE 004C4A4E
004C4A38 004C4D66 004C4D83 004C5BD2 004C4EEE 004C4EC6 004C4EBE 004C4EB6
00000000 004C4DF8 004C4DDE 004C4DE9 3FE00000 00000000 004C4E00 004C4DFD
99999999 999A0064 0014F92E 3FF00000 00000000 40240000 00000000 40590000
004C4A24 000A004C 8668004C 4A40004C 4A42004C 4D4E3F84 7AE147AE 147B3FB9
004C4E48 004C4E58 004C4E5C 004C4E5E 004C4E62 004C4E60 004C4A30 004C4A2A
10C85756 017FFF80 004C4DBC 004C4DC0 0096FFCE 004C4DBB 004C4DBA 004C4E38
05D99B0A 7EC51DD9 9B78483E C52E0445 D99B0A7E C5000105 C778443E C52E0000
C7057506 0E7E8300 445B3C9A 0574060E 7E830B74 030E7E83 1DD99B78 4C3EC52E
D99B7854 3EC52E15 D99B7858 3EC52EEE D99B0589 78503EC5 2E0E468B 00000E46
02BD6806 6A785C36 FF2E785E 36FF2E78 6036FF2E 786236FF 2E1076FF 1276FF1D
703EC52E 787406DD 2E9B1DD9 9B78643E C52E7868 06DD2E9B 10C48300 54DABA9A
1DD99B78 883EC52E 788C06DD 2E9B1DD9 9B787C3E C52E7880 06DD2E9B 1DD99B78
9B78943E C52E15D9 9B78983E C52E7868 06DD2E9B 7B750002 3D058B78 503EC52E
15D99B78 9C3EC52E 15D99B78 A03EC52E 786806DD 2E9B1DD9 9B78643E C52E15D9
C52E15D9 9B78A43E C52E15D9 9B78A83E C52E78AC 06DD2E9B 1DD99B78 703EC52E
883EC52E 15D99B78 B43EC52E 15D99B78 B83EC52E 788C06DD 2E9B1DD9 9B787C3E
D99B7898 3EC52EEE D99B008F E9037400 033D058B 78503EC5 2E01E3E9 1DD99B78
9C3EC52E 15D99B78 A03EC52E EED99B1D D99B7864 3EC52E15 D99B7894 3EC52E15
2EF066DC 9B05D99B 785C3EC5 2EF05EDD 9BE8D99B 1DD99B78 703EC52E 15D99B78
C52EF05E DD9BE8D9 9B1DD99B 787C3EC5 2E15D99B 78A43EC5 2E15D99B 78A83EC5
9B78883E C52E15D9 9B78B43E C52E15D9 9B78B83E C52EF066 DC9B05D9 9B78603E
2E15D99B 78983EC5 2E786806 DD2E9B7B 7500043D 058B7850 3EC52E01 45E91DD9
3EC52E15 D99B78A0 3EC52E78 6806DD2E 9B1DD99B 78643EC5 2E15D99B 78943EC5
78A43EC5 2E15D99B 78A83EC5 2E78AC06 DD2E9B1D D99B7870 3EC52E15 D99B789C
D99B78B4 3EC52E15 D99B78B8 3EC52E78 8C06DD2E 9B1DD99B 787C3EC5 2E15D99B
C52E7868 06DD2E9B 7A750005 3D058B78 503EC52E 00BEE91D D99B7888 3EC52E15
A03EC52E 786806DD 2E9B1DD9 9B78643E C52E15D9 9B78943E C52E15D9 9B78983E
9B78A83E C52E78AC 06DD2E9B 1DD99B78 703EC52E 15D99B78 9C3EC52E 15D99B78
15D99B78 B83EC52E 78BC06DD 2E9B1DD9 9B787C3E C52E15D9 9B78A43E C52E15D9
1DD99B78 943EC52E 786806DD 2E9B38EB 1DD99B78 883EC52E 15D99B78 B43EC52E
06DD2E9B 1DD99B78 A43EC52E 78AC06DD 2E9B1DD9 9B789C3E C52E7868 06DD2E9B
9B789C3E C52E7874 06DD2E9B 0E75003D 8378503E C52E1DD9 9B78B43E C52E788C
A43EC52E 789436C4 2EF05EDD 9B24D826 9B05D99B 78B43EC5 2E789C36 C42E1DD9
D99B7888 3EC52E78 7036C42E 1DD99B78 C43EC52E F076DC9B 24D8269B 05D99B78
D99BF076 DC9B24D8 269B05D9 9B787C3E C52E7864 36C42EF0 5EDD9B24 D8269B05
15D99B78 D43EC52E EED99B1D D99B78C8 3EC52E15 D99B78CC 3EC52EEE D99BFC5E
3EC52E05 D99B0A7E C51DD99B 78D03EC5 2E0445D9 9B0A7EC5 1DD99B78 D03EC52E
2E78C836 C42EF05E DD9B24D8 269B05D9 9B78D83E C52E78DC 36C42E1D D99B78D8
0054968A 9AFC5ED8 9BF846D9 9BF85ED9 9BF076DC 9B24D826 9B05D99B 78D03EC5
C52E05D9 9B78D83E C52E1DD9 9B78E03E C52EFC4E D89B05D9 9B78D83E C52E2673
D03EC52E 1DD99B78 E43EC52E FC76D89B 05D99B78 D03EC52E 24EB1DD9 9B78E43E
8F9A05D9 9B78643E C52E3875 003D8378 503EC52E 1DD99B78 E03EC52E 05D99B78
9A005496 8F9A05D9 9B78703E C52E0589 78E83EC5 2E08C483 005496EF 9A005496
F43EC52E EED99B1D D99B78F0 3EC52EEE D99B0589 78EC3EC5 2E08C483 005496EF
06DD2E9B 29760054 968A9A1C D8269B05 D99B78E0 3EC52E78 E436C42E 1DD99B78
79043EC5 2E34D826 9B05D99B 78E43EC5 2E78E036 C42E1DD9 9B78F83E C52E78FC
05D99B78 E03EC52E 78E436C4 2E1DD99B 79043EC5 2E78FC06 DD2E9B27 EB1DD99B
2E1DD99B 79083EC5 2E15D99B 790C3EC5 2EEED99B 1DD99B78 F83EC52E 34D8269B
F04ED89B 34D8269B 05D99B78 D03EC52E 78E036C4 2EF05ED9 9B05D99B 78F83EC5
D99B78D8 3EC52E78 E436C42E F05ED99B 05D99B79 043EC52E 1DD99B79 103EC52E
036A35FF 78443EC5 2E1076FF 1276FF1D D99B7914 3EC52EF0 4ED89B34 D8269B05
78D636FF 2E78E436 FF2E78E6 36FF2E10 76FF1276 FF0AC483 0054DABA 9A019168
35FF7844 3EC52E78 CC36FF2E 78CE36FF 2E78E036 FF2E78E2 36FF2E78 D436FF2E
36FF2E79 0436FF2E 790636FF 2E1076FF 1276FF1A C4830054 DABA9A01 92680B6A
78443EC5 2E78F036 FF2E78F2 36FF2E78 F836FF2E 78FA36FF 2E78F436 FF2E78F6
FF05C779 1C3EC52E FFFF05C7 79183EC5 2E1AC483 0054DABA 9A019368 0B6A35FF
5E5FC99B 000005C7 79283EC5 2E000005 C779243E C52E0000 05C77920 3EC52EFF
5FC90589 0E7EC505 8B78EC3E C52E0589 0A7EC505 8B78E83E C52EEC8B 555756CB
C4830054 DABA9A01 9168036A 35FF7844 3EC52E0A 76FF0C76 FFEC8B55 5756CB5E

C52E1276 FF1476FF EC8B5557 56CB5E5F C904C483 0054E933 9A0A76FF 0C76FF0A
106A106A 002C488F 9A002C48 659A0AC4 830054DA BA9A0191 68036A35 FF78443E
5496649A 50527932 168B2E79 3006032E 04E0C105 8B791C3E C52E0A76 FF0C76FF
5496649A 5052792E 168B2E79 2C06032E 04E0C105 8B79183E C52E5052 0AC48300
168B2E79 3806032E 04E0C105 8B791C3E C52E0E76 FF1076FF 106A106A 0AC48300
168B2E79 3406032E 04E0C105 8B79183E C52E5052 0AC48300 5496649A 5052793A
CB5E5FC9 06C48300 2C48F19A 006A1276 FF1476FF 0AC48300 5496649A 50527936
D8269B05 D99B78F8 3EC52E0E 76C4F85E D99B05D9 9B78E03E C52E0000 08C85756
9B79043E C52E0E76 C4F85ED9 9B05D99B 78E43EC5 2E1DD99B 0A7EC5F8 76D89B0C
3EC52E00 0018C857 56CB5E5F C99B045D D99B0A7E C5F876D8 9B044CD8 269B05D9
79343E03 2E04E7C1 3D8B7918 3EC52E79 36068E2E 79343603 2E04E6C1 358B7918
792C3603 2E04E6C1 358B7918 3EC52EE8 5EDD9B24 D8269B04 45D99B79 361E8E2E
D8269B04 45D99B79 2E1E8E2E 792C3E03 2E04E7C1 3D8B7918 3EC52E79 2E068E2E
3EC52E79 36068E2E 79343603 2E04E6C1 358B7918 3EC52EF8 5EDD9BE8 76DC9B24
C52EE85E DD9B0864 D8269B0C 45D99B79 361E8E2E 79343E03 2E04E7C1 3D8B7918
2C3E032E 04E7C13D 8B79183E C52E792E 068E2E79 2C36032E 04E6C135 8B79183E
E7C13D8B 79183EC5 2EF05EDD 9BE876DC 9B0864D8 269B0C45 D99B792E 1E8E2E79
3436032E 04E6C135 8B79183E C52EE85E D99B05D9 9B792E1E 8E2E792C 3E032E04
183EC52E F85EDD9B E846D89B F84EDC9B 24D8269B 05D99B0A 7EC57936 068E2E79
C1358B79 183EC52E E85ED99B 0845D99B 792E1E8E 2E792C3E 032E04E7 C13D8B79
E846D89B F04EDC9B 0864D826 9B0445D9 9B0A7EC5 7936068E 2E793436 032E04E6
2E1DD99B 0E7EC534 D8269BF8 4EDC9B05 D99B78E0 3EC52E78 F836C42E F05EDD9B
CB5E5FC9 9B045DD9 9B0E7EC5 34D8269B F04EDC9B 05D99B78 E43EC52E 790436C4
D8269B05 D99B0A7E C578F836 C42ED85E D99B05D9 9B78E03E C52E0000 28C85756
45D99B0A 7EC57904 36C42ED8 5ED99B05 D99B78E4 3EC52EF8 5EDD9BD8 76D89B0C
2E068E2E 792C3603 2E04E6C1 358B7918 3EC52EF0 5EDD9BD8 76D89B0C D8269B04
5EDD9B24 D8269B04 45D99B79 2E1E8E2E 792C3E03 2E04E7C1 3D8B7918 3EC52E79
2E04E7C1 3D8B7918 3EC52E79 36068E2E 79343603 2E04E6C1 358B7918 3EC52ED8
358B7918 3EC52EE8 5EDD9BD8 76DC9B24 D8269B04 45D99B79 361E8E2E 79343E03
2E1E8E2E 792C3E03 2E04E7C1 3D8B7918 3EC52E79 2E068E2E 792C3603 2E04E6C1
068E2E79 3436032E 04E6C135 8B79183E C52ED85E DD9B0864 D8269B0C 45D99B79
9B0864D8 269B0C45 D99B7936 1E8E2E79 343E032E 04E7C13D 8B79183E C52E7936
D99B05D9 9B79361E 8E2E7934 3E032E04 E7C13D8B 79183EC5 2EE05EDD 9BD876DC
DC9B24D8 269BF846 DD9B792E 068E2E79 2C36032E 04E6C135 8B79183E C52ED85E
343E032E 04E7C13D 8B79183E C52E1DD9 9B0E7EC5 793C06DC 2E9BD846 D89BE84E
068E2E79 2C36032E 04E6C135 8B79183E C52ED85E D99B0845 D99B7936 1E8E2E79
045DD99B 0E7EC579 3C06DC2E 9BD846D8 9BE04EDC 9B0864D8 269BF046 DD9B792E
043B2605 8B79183E C52E7944 36C42E05 FF79183E C52EEC8B 555756CB 5E5FC99B
791C3EC5 2E05FF79 203EC52E EC8B5557 56CB5E5F C9000005 C779183E C52E097E
243EC52E 000005C7 791C3EC5 2E097E04 3B26058B 791C3EC5 2E794436 C42E05FF
3EC52E40 058B7944 3EC52E0F 7D043B26 40058B79 443EC52E 792436C4 2E05FF79
FF0E76FF 1475010A 7E83EC8B 555756CB 5E5FC900 0005C779 283EC52E 05897924
04E0C105 8B79183E C52E0C76 FF0E76FF 0AC48300 54DABA9A 6F6A036A 036A0C76
2E04E0C1 058B7918 3EC52E50 000C05C3 8B51CA8B D88B792E 168B2E79 2C06032E
032E04E0 C1058B79 183EC52E 50000805 C38B51CA 8BD88B79 2E168B2E 792C0603
06032E04 E0C1058B 79183EC5 2E500004 05C38B51 CA8BD88B 792E168B 2E792C06
183EC52E 0C76FF0E 76FF18C4 830054DA BA9A0194 680A6A50 52792E16 8B2E792C
79183EC5 2E50000C 05C38B51 CA8BD88B 7936168B 2E793406 032E04E0 C1058B79
8B79183E C52E5000 0805C38B 51CA8BD8 8B793616 8B2E7934 06032E04 E0C1058B
058B7918 3EC52E50 000405C3 8B51CA8B D88B7936 168B2E79 3406032E 04E0C105
CB5E5FC9 18C48300 54DABA9A 0195680A 6A505279 36168B2E 79340603 2E04E0C1
790436C4 2EEC5ED9 9B34D826 9B05D99B 78E03EC5 2E78F836 C42E0000 18C85756
2E04E7C1 3D8B7918 3EC52E78 F036C42E E85ED99B 34D8269B 05D99B78 E43EC52E
2E78F436 C42E0093 E9037400 54968A9A 1CD8269B 05D99B79 2E1E8E2E 792C3E03
0054968A 9A1CD826 9B0845D9 9B792E1E 8E2E792C 3E032E04 E7C13D8B 79183EC5
9B0445D9 9B792E1E 8E2E792C 3E032E04 E7C13D8B 79183EC5 2E78F836 C42E6B75
8E2E792C 3E032E04 E7C13D8B 79183EC5 2E790436 C42E4375 0054968A 9A1CD826
8D1678CC 36FF2E78 CE36FF2E 106A1B75 0054968A 9A1CD826 9B0C45D9 9B792E1E
2E1E8E2E 792C3E03 2E04E7C1 3D8B7918 3EC52E7F EB0AC483 00549664 9A50F046
792E1E8E 2E792C3E 032E04E7 C13D8B79 183EC52E F05ED99B EC4ED89B 05D99B79
792E1E8E 2E792C3E 032E04E7 C13D8B79 183EC52E F85ED99B E84ED89B 0845D99B
792E1E8E 2E792C3E 032E04E7 C13D8B79 183EC52E F45ED99B EC4ED89B 0445D99B
2E0C7300 54968A9A 1DD89BF0 46D99B78 C83EC52E FC5ED99B E84ED89B 0C45D99B
C52E0C73 0054968A 9A1DD89B F846D99B 78DC3EC5 2EF05ED9 9B05D99B 78C83EC5

3EC52E0C 76005496 8A9A1DD8 9BF446D9 9B78D03E C52EF85E D99B05D9 9B78DC3E
D83EC52E 0C760054 968A9A1D D89BFC46 D99B78D8 3EC52EF4 5ED99B05 D99B78D0
5FC99B0A C4830054 96649A0A 76FF0C76 FF50F046 8D16106A FC5ED99B 05D99B78
36C42EDC 5ED99B34 D8269B05 D99B78E0 3EC52E78 F836C42E 000030C8 5756CB5E
E7C13D8B 79183EC5 2E78F036 C42ED85E D99B34D8 269B05D9 9B78E43E C52E7904
F436C42E 0093E903 74005496 8A9A1CD8 269B05D9 9B792E1E 8E2E792C 3E032E04
968A9A1C D8269B08 45D99B79 2E1E8E2E 792C3E03 2E04E7C1 3D8B7918 3EC52E78
45D99B79 2E1E8E2E 792C3E03 2E04E7C1 3D8B7918 3EC52E78 F836C42E 6B750054
792C3E03 2E04E7C1 3D8B7918 3EC52E79 0436C42E 43750054 968A9A1C D8269B04
78CC36FF 2E78CE36 FF2E106A 1B750054 968A9A1C D8269B0C 45D99B79 2E1E8E2E
8E2E792C 3E032E04 E7C13D8B 79183EC5 2E7FEB0A C4830054 96649A50 F0468D16
1E8E2E79 2C3E032E 04E7C13D 8B79183E C52EF05E D99BDC4E D89B05D9 9B792E1E
1E8E2E79 2C3E032E 04E7C13D 8B79183E C52EF85E D99BD84E D89B0845 D99B792E
1E8E2E79 2C3E032E 04E7C13D 8B79183E C52EF45E D99BDC4E D89B0445 D99B792E
73005496 8A9A1DD8 9BF046D9 9B78C83E C52EFC5E D99BD84E D89B0C45 D99B792E
0C730054 968A9A1D D89BF846 D99B78DC 3EC52EF0 5ED99B05 D99B78C8 3EC52E0C
2E0C7600 54968A9A 1DD89BF4 46D99B78 D03EC52E F85ED99B 05D99B78 DC3EC52E
C52E0C76 0054968A 9A1DD89B FC46D99B 78D83EC5 2EF45ED9 9B05D99B 78D03EC5
D99BD876 D89BF846 D99BE05E D99BDC76 D89BF046 D99BFC5E D99B05D9 9B78D83E
8B79183E C52EEC5E D99BD876 D89BFC46 D99BE45E D99BDC76 D89BF446 D99BE85E
1E8E2E79 2C3E032E 04E7C13D 8B79183E C52E792E 068E2E79 2C36032E 04E6C135
068E2E79 3436032E 04E6C135 8B79183E C52ED05E DD9B24D8 269B0445 D99B792E
DC9B24D8 269B0445 D99B7936 1E8E2E79 343E032E 04E7C13D 8B79183E C52E7936
0A7EC505 D99B7936 1E8E2E79 343E032E 04E7C13D 8B79183E C52EDC5E D99BD076
3EC52E04 5DD99B0A 7EC504D8 269BDC4E D89BE066 D89BE446 D99B0A76 C41DD99B
792C3E03 2E04E7C1 3D8B7918 3EC52E79 2E068E2E 792C3603 2E04E6C1 358B7918
3436032E 04E6C135 8B79183E C52ED05E DD9B0864 D8269B0C 45D99B79 2E1E8E2E
269B0C45 D99B7936 1E8E2E79 343E032E 04E7C13D 8B79183E C52E7936 068E2E79
9B79361E 8E2E7934 3E032E04 E7C13D8B 79183EC5 2ED85ED9 9BD076DC 9B0864D8
7EC50844 D8269BD8 4ED89BE8 66D89BEC 46D99B0A 76C4085D D99B0A7E C50845D9
9B78F03E C52E002C 488F9A00 2C48659A 000018C8 5756CB5E 5FC99B0C 5DD99B0A
3D8B791C 3EC52E15 D99B792E 1E8E2E79 2C3E032E 04E7C13D 8B79183E C52E05D9
C13D8B79 183EC52E 05D99B78 F43EC52E 1DD99B79 321E8E2E 79303E03 2E04E7C1
2E79303E 032E04E7 C13D8B79 1C3EC52E 0855D99B 792E1E8E 2E792C3E 032E04E7
2E792C3E 032E04E7 C13D8B79 183EC52E 05D99B79 103EC52E 085DD99B 79321E8E
045DD99B 79321E8E 2E79303E 032E04E7 C13D8B79 1C3EC52E 0455D99B 792E1E8E
0C55D99B 792E1E8E 2E792C3E 032E04E7 C13D8B79 183EC52E 05D99B79 143EC52E
05D99B78 643EC52E 0C5DD99B 79321E8E 2E79303E 032E04E7 C13D8B79 1C3EC52E
E7C13D8B 791C3EC5 2E15D99B 79361E8E 2E79343E 032E04E7 C13D8B79 183EC52E
04E7C13D 8B79183E C52E05D9 9B78703E C52E1DD9 9B793A1E 8E2E7938 3E032E04
1E8E2E79 383E032E 04E7C13D 8B791C3E C52E0855 D99B7936 1E8E2E79 343E032E
C52EF05E D99B05D9 9B78F83E C52EE85E D99B05D9 9B78643E C52E085D D99B793A
9BF84ED8 9B24D826 9B05D99B 787C3EC5 2E786436 C42EF85E D99B05D9 9B79103E
2E0455D9 9B79361E 8E2E7934 3E032E04 E7C13D8B 79183EC5 2EE846D8 9BF076D8
9B05D99B 78703EC5 2E045DD9 9B793A1E 8E2E7938 3E032E04 E7C13D8B 791C3EC5
787036C4 2EF85ED9 9B05D99B 79143EC5 2EF05ED9 9B05D99B 79043EC5 2EE85ED9
C13D8B79 183EC52E E846D89B F076D89B F84ED89B 24D8269B 05D99B78 883EC52E
2E79383E 032E04E7 C13D8B79 1C3EC52E 0C55D99B 79361E8E 2E79343E 032E04E7
5756CB5E 5FC99B06 C483002C 48F19A0A 76FF0C76 FF0E76FF 0C5DD99B 793A1E8E
C483002C 44A09A50 A6468D16 0A76FF0C 76FFEE46 89058B79 183EC52E 00006AC8
E7C1EE7E 8B002C48 659A0AC4 83005496 649A0A76 FF0C76FF 50A6468D 16086A08
8E2E792C 3E032E04 E7C1EE7E 8BF85EDD 9B0445D9 9B792E1E 8E2E792C 3E032E04
792C3603 2E04E6C1 EE768B96 5ED99B05 D99B0E7E C5F05EDD 9B0C45D9 9B792E1E
66DC9B05 D99B0A7E C59E5EDD 9B9676D8 9B24D826 9B05D99B 0A7EC579 2E068E2E
792E068E 2E792C36 032E04E6 C1EE768B 965ED99B 0445D99B 0E7EC5C6 5EDD9B9E
9B9E66DC 9B0445D9 9B0A7EC5 9E5EDD9B 9676D89B 0864D826 9B0445D9 9B0A7EC5
792E1E8E 2E792C3E 032E04E7 C1EE7E8B 0A76C496 5ED99B05 D99B0E7E C5BE5EDD
7EC5B65E DD9B9E46 DC9B05D9 9B0A7EC5 9E5EDD9B 9676D89B 24D8269B 0445D99B
0C45D99B 792E1E8E 2E792C3E 032E04E7 C1EE7E8B 0A76C496 5ED99B04 45D99B0E
C1EE7E8B AE5EDD9B 9E46DC9B 0445D99B 0A7EC59E 5EDD9B96 76D89B04 64D8269B
8E2E7934 3E032E04 E7C1EE7E 8BE65EDD 9B05D99B 79361E8E 2E79343E 032E04E7
9B0445D9 9B79361E 8E2E7934 3E032E04 E7C1EE7E 8BDE5EDD 9B0845D9 9B79361E
76FF1676 FFCE5EDD 9B0C45D9 9B79361E 8E2E7934 3E032E04 E7C1EE7E 8BD65EDD
AE46DD9B 789436FF 2E789636 FF2E7908 36FF2E79 0A36FF2E 1276FF01 6A006A14

0054968F 9AC646DD 9B005496 8F9ABE46 DD9B0054 968F9AB6 46DD9B00 54968F9A
9AE646DD 9B005496 8F9ADE46 DD9B0054 968F9AD6 46DD9B00 54968F9A CE46DD9B
4689058B 79183EC5 2E00006A C85756CB 5E5FC99B 52C48300 2C6EEC9A 0054968F
76FF0C76 FF50A646 8D16086A 08C48300 2C44A09A 50A6468D 160A76FF 0C76FFEE
D99B792E 1E8E2E79 2C3E032E 04E7C1EE 7E8B002C 48659A0A C4830054 96649A0A
7EC5F05E DD9B0C45 D99B792E 1E8E2E79 2C3E032E 04E7C1EE 7E8BF85E DD9B0445
269B05D9 9B0A7EC5 792E068E 2E792C36 032E04E6 C1EE768B 965ED99B 05D99B0E
9B0445D9 9B0E7EC5 C65EDD9B 9E66DC9B 05D99B0A 7EC59E5E DD9B9676 D89B24D8
9B0864D8 269B0445 D99B0A7E C5792E06 8E2E792C 36032E04 E6C1EE76 8B965ED9
965ED99B 05D99B0E 7EC5BE5E DD9B9E66 DC9B0445 D99B0A7E C59E5EDD 9B9676D8
9B9676D8 9B24D826 9B0445D9 9B792E1E 8E2E792C 3E032E04 E7C1EE7E 8B0A76C4
8B0A76C4 965ED99B 0445D99B 0E7EC5B6 5EDD9B9E 46DC9B05 D99B0A7E C59E5EDD
9E5EDD9B 9676D89B 0464D826 9B0C45D9 9B792E1E 8E2E792C 3E032E04 E7C1EE7E
9B79361E 8E2E7934 3E032E04 E7C1EE7E 8BAE5EDD 9B9E46DC 9B0445D9 9B0A7EC5
7E8BDE5E DD9B0845 D99B7936 1E8E2E79 343E032E 04E7C1EE 7E8BE65E DD9B05D9
343E032E 04E7C1EE 7E8BD65E DD9B0445 D99B7936 1E8E2E79 343E032E 04E7C1EE
790A36FF 2E1276FF 016A016A 1476FF16 76FFCE5E DD9B0C45 D99B7936 1E8E2E79
54968F9A B646DD9B 0054968F 9AAE46DD 9B789436 FF2E7896 36FF2E79 0836FF2E
D646DD9B 0054968F 9ACE46DD 9B005496 8F9AC646 DD9B0054 968F9ABE 46DD9B00
2E52C483 002C6EEC 9A005496 8F9AE646 DD9B0054 968F9ADE 46DD9B00 54968F9A
79483EC5 2E097500 023D058B 79483EC5 2E058979 483EC52E 058B05FF 79483EC5
483EC52E 5052792E 168B2E79 2C06032E 04E0C105 8B79183E C52E106A 000005C7
183EC52E 106A0AC4 83005496 649A5052 794E168B 2E794C06 032E04E0 C1058B79
5006032E 04E0C105 8B79483E C52E5052 7936168B 2E793406 032E04E0 C1058B79
79483EC5 2E000002 C85756CB 5E5FC99B 0AC48300 5496649A 50527952 168B2E79
51CA8BD8 8B794E16 8B2E794C 06032E04 E0C1FE46 8B0A76FF 0C76FFFE 4689058B
000805C3 8B51CA8B D88B794E 168B2E79 4C06032E 04E0C1FE 468B5000 0C05C38B
C1FE468B 50000405 C38B51CA 8BD88B79 4E168B2E 794C0603 2E04E0C1 FE468B50
76FF0C76 FF18C483 0054DABA 9A019468 0A6A5052 794E168B 2E794C06 032E04E0
C1FE468B 50000C05 C38B51CA 8BD88B79 52168B2E 79500603 2E04E0C1 FE468B0A
06032E04 E0C1FE46 8B500008 05C38B51 CA8BD88B 7952168B 2E795006 032E04E0
168B2E79 5006032E 04E0C1FE 468B5000 0405C38B 51CA8BD8 8B795216 8B2E7950
0A76FF0C 76FFEC8B 555756CB 5E5FC918 C4830054 DABA9A01 95680A6A 50527952
2E50000C 05C38B51 CA8BD88B 792E168B 2E792C06 032E04E0 C1058B79 183EC52E
C52E5000 0805C38B 51CA8BD8 8B792E16 8B2E792C 06032E04 E0C1058B 79183EC5
3EC52E50 000405C3 8B51CA8B D88B792E 168B2E79 2C06032E 04E0C105 8B79183E
18C48300 54DABA9A 0194680A 6A505279 2E168B2E 792C0603 2E04E0C1 058B7918
8B51CA8B D88B7936 168B2E79 3406032E 04E0C105 8B79183E C52E0A76 FF0C76FF
C38B51CA 8BD88B79 36168B2E 79340603 2E04E0C1 058B7918 3EC52E50 000C05C3
05C38B51 CA8BD88B 7936168B 2E793406 032E04E0 C1058B79 183EC52E 50000805
BA9A0195 680A6A50 52793616 8B2E7934 06032E04 E0C1058B 79183EC5 2E500004
0A76FF0C 76FFEE46 89058B79 183EC52E 00006AC8 5756CB5E 5FC918C4 830054DA
83005496 649A0A76 FF0C76FF 50A6468D 16086A08 C483002C 44A09A50 A6468D16
8BF85EDD 9B0445D9 9B792E1E 8E2E792C 3E032E04 E7C1EE7E 8B002C48 659A0AC4
5EDD9B05 D99B0A7E C5F05EDD 9B0C45D9 9B792E1E 8E2E792C 3E032E04 E7C1EE7E
2E04E7C1 EE7E8B0A 76C4965E D99B05D9 9B0E7EC5 BE5EDD9B 0445D99B 0A7EC5C6
9B05D99B 0A7EC59E 5EDD9B96 76D89B24 D8269B04 45D99B79 2E1E8E2E 792C3E03
792C3E03 2E04E7C1 EE7E8B0A 76C4965E D99B0445 D99B0E7E C5B65EDD 9B9E46DC
46DC9B04 45D99B0A 7EC59E5E DD9B9676 D89B0464 D8269B0C 45D99B79 2E1E8E2E
C1EE7E8B E65EDD9B 05D99B79 361E8E2E 79343E03 2E04E7C1 EE7E8BAE 5EDD9B9E
2E79343E 032E04E7 C1EE7E8B DE5EDD9B 0845D99B 79361E8E 2E79343E 032E04E7
0C45D99B 79361E8E 2E79343E 032E04E7 C1EE7E8B D65EDD9B 0445D99B 79361E8E
789636FF 2E790836 FF2E790A 36FF2E12 76FF016A 006A1476 FF1676FF CE5EDD9B
0054968F 9ABE46DD 9B005496 8F9AB646 DD9B0054 968F9AAE 46DD9B78 9436FF2E
9ADE46DD 9B005496 8F9AD646 DD9B0054 968F9ACE 46DD9B00 54968F9A C646DD9B
000062C8 5756CB5E 5FC99B52 C483002C 6EEC9A00 54968F9A E646DD9B 0054968F
7EC52076 0054968A 9A1CD826 9B05D99B 0A7EC50E 76C4EE46 89058B79 183EC52E
76C41DD9 9B0A7EC5 F846DD9B 1DD99B0E 7EC505D9 9B0A7EC5 F85EDD9B 05D99B0E
C5F85EDD 9B0445D9 9B0E7EC5 24760054 968A9A04 5CD8269B 0445D99B 0A7EC50E
8D160A76 FF0C76FF 045DD99B 0A7EC5F8 46DD9B04 5DD99B0E 7EC50445 D99B0A7E
76FF1076 FFBE5EDD 9BAA46D9 9BC65EDD 9BA646D9 9B08C483 002C44A0 9A50A646
768DAE5E DD9BAA46 D99BB65E DD9BA646 D99B08C4 83002C44 A09A50A6 468D160E
D99B792E 1E8E2E79 2C3E032E 04E7C1EE 7E8B792E 068E2E79 2C36032E 04E6C1EE
E7C1EE7E 8B792E06 8E2E792C 36032E04 E6C1EE76 8B9E5EDD 9B0864D8 269B0C45

9BBE46DD 9BF85EDD 9B9E76DC 9B24D826 9B0445D9 9B792E1E 8E2E792C 3E032E04
66DC9BB6 46DD9B9E 5EDD9BBE 66DC9BAE 46DD9B03 34E90372 0054968A 9AAE5EDC
78C43EC5 2E010AE9 03720054 968A9AF8 5EDC9BF0 46DD9BF0 5EDD9B9E 76DC9BC6
468D1650 B6468D16 50BE468D 1650AE46 8D163377 0054968A 9AF05EDC 9B05D99B
CAE922C4 83002C5F 969AFF6A 0054968F 9AF846DD 9B005496 8F9AF046 DD9B50C6
F85EDC9B 05D99B78 C43EC52E 7E760054 968A9AF0 5EDC9B05 D99B78C4 3EC52E01
9AF046DD 9B50C646 8D1650B6 468D1650 BE468D16 50AE468D 166B7300 54968A9A
50AE468D 1622C483 002C5F26 9A016A00 54968F9A 05D99B78 C43EC52E 0054968F
F846DD9B 0054968F 9A05D99B 78C43EC5 2E50C646 8D1650B6 468D1650 BE468D16
B6468D16 50BE468D 1650AE46 8D160139 E922C483 002C5F96 9AFF6A00 54968F9A
83002C5F 269A016A 0054968F 9AF846DD 9B005496 8F9AF046 DD9B50C6 468D1650
468D1650 AE468D16 33720054 968A9AF0 5EDC9B05 D99B78C4 3EC52E01 06E922C4
FF6A0054 968F9AF8 46DD9B00 54968F9A F046DD9B 50C6468D 1650B646 8D1650BE
C52E7D73 0054968A 9AF05EDC 9B05D99B 78C43EC5 2E00C0E9 22C48300 2C5F269A
50B6468D 1650BE46 8D1650AE 468D166A 76005496 8A9AF85E DC9B05D9 9B78C43E
5F969A01 6A005496 8F9A05D9 9B78C43E C52E0054 968F9AF0 46DD9B50 C6468D16
D99B78C4 3EC52E50 C6468D16 50B6468D 1650BE46 8D1650AE 468D1622 C483002C
50AE468D 1630EB22 C483002C 5F269AFF 6A005496 8F9AF846 DD9B0054 968F9A05
54968F9A F846DD9B 0054968F 9AF046DD 9B50C646 8D1650B6 468D1650 BE468D16
DD9B05D9 9B79361E 8E2E7934 3E032E04 E7C1EE7E 8B22C483 002C5F96 9A016A00
04E7C1EE 7E8BDE5E DD9B0845 D99B7936 1E8E2E79 343E032E 04E7C1EE 7E8BE65E
1E8E2E79 343E032E 04E7C1EE 7E8BD65E DD9B0445 D99B7936 1E8E2E79 343E032E
BE46DD9B 0085E903 72005496 8A9AB65E DC9BC646 DD9BCE5E DD9B0C45 D99B7936
36FF2E12 76FF016A 006A1476 FF1676FF 002C4865 9A767300 54968A9A AE5EDC9B
8F9AB646 DD9B0054 968F9AAE 46DD9B78 9436FF2E 789636FF 2E790836 FF2E790A
DD9B0054 968F9ACE 46DD9B00 54968F9A C646DD9B 0054968F 9ABE46DD 9B005496
C483002C 6EEC9A00 54968F9A E646DD9B 0054968F 9ADE46DD 9B005496 8F9AD646
46DD9BF8 5EDD9B24 DC269B05 DD9B287E C52476C4 000008C8 5756CB5E 5FG99B52
DD9B0B73 0054968A 9A79541E DC2E9B14 46DD9B14 5EDD9BF8 4EDC9B14 66DC9B0C
EB1DDD9B 207EC514 46DC9B05 DD9B207E C5127501 0A7E8314 5EDD9BE0 D99B1446
C51C76C4 000010C8 5756CB5E 5FC99B1D DD9B207E C51466DC 9B05DD9B 207EC510
FC06DD2E 9BF85EDD 9B1476DC 9B78FC06 DD2E9BF0 5EDD9B24 DC269B05 DD9B207E
0054968A 9A79541E DC2E9B14 46DD9B14 5EDD9BF0 4EDC9BF8 66DC9B0C 76DC9B78
287EC514 46DC9B05 DD9B287E C5127501 0A7E8314 5EDD9BE0 D99B1446 DD9B0B73
000020C8 5756CB5E 5FC99B1D DD9B287E C51466DC 9B05DD9B 287EC510 EB1DDD9B
79183EC5 2EE85ED9 9B05D99B 79361E8E 2E79343E 032E04E7 C13D8B79 183EC52E
E7C13D8B 79183EC5 2EEC5ED9 9B0845D9 9B79361E 8E2E7934 3E032E04 E7C13D8B
3E032E04 E7C13D8B 79183EC5 2EE05ED9 9B0445D9 9B79361E 8E2E7934 3E032E04
C4830054 E8C89A50 E8468D16 50F8468D 16E45ED9 9B0C45D9 9B79361E 8E2E7934
46D99B1D D99B0A7E C5F846D9 9B08C483 0054E8C8 9A50E046 8D1650F0 468D1608
C5FC66D8 9BF446D9 9B0C5DD9 9B0A7EC5 F866D89B F046D99B 045DD99B 0A7EC5FC
2E01E4E9 037F0001 3D058B79 243EC52E EC8B5557 56CB5E5F C99B085D D99B0A7E
2A75FFFF 3D058B79 1C3EC52E 0DFF7920 3EC52E0D FF791C3E C52E0DFF 79243EC5
EB058979 1C3EC52E 058B7944 3EC52E10 7E043B26 058B7920 3EC52E79 4436C42E
04E7C13D 8B791C3E C52E002C 48659A05 FF79283E C52E0000 05C7791C 3EC52E09
2E1E8E2E 792C3E03 2E04E7C1 3D8B7918 3EC52E05 D99B7932 1E8E2E79 303E032E
183EC52E 0845D99B 79321E8E 2E79303E 032E04E7 C13D8B79 1C3EC52E 1DD99B79
032E04E7 C13D8B79 1C3EC52E 085DD99B 792E1E8E 2E792C3E 032E04E7 C13D8B79
792E1E8E 2E792C3E 032E04E7 C13D8B79 183EC52E 0445D99B 79321E8E 2E79303E
183EC52E 0C45D99B 79321E8E 2E79303E 032E04E7 C13D8B79 1C3EC52E 045DD99B
032E04E7 C13D8B79 1C3EC52E 0C5DD99B 792E1E8E 2E792C3E 032E04E7 C13D8B79
9B79361E 8E2E7934 3E032E04 E7C13D8B 79183EC5 2E05D99B 793A1E8E 2E79383E
8B79183E C52E0845 D99B793A 1E8E2E79 383E032E 04E7C13D 8B791C3E C52E1DD9
383E032E 04E7C13D 8B791C3E C52E085D D99B7936 1E8E2E79 343E032E 04E7C13D
D99B7936 1E8E2E79 343E032E 04E7C13D 8B79183E C52E0445 D99B793A 1E8E2E79
8B79183E C52E0C45 D99B793A 1E8E2E79 383E032E 04E7C13D 8B791C3E C52E045D
002C48F1 9A0A76FF 0C76FF0E 76FF0C5D D99B7936 1E8E2E79 343E032E 04E7C13D
058B7944 3EC52E79 2436C42E 05FF7924 3EC52EEC 8B555756 CB5E5FC9 9B06C483
283EC52E 05FF7920 3EC52E05 8979243E C52E4005 8B79443E C52E0F7D 043B2640
791C3EC5 2E097E04 3B26058B 791C3EC5 2E794436 C42E05FF 791C3EC5 2E0DFF79
05D99B79 321E8E2E 79303E03 2E04E7C1 3D8B791C 3EC52E00 2C48659A 000005C7
E7C13D8B 791C3EC5 2E1DD99B 792E1E8E 2E792C3E 032E04E7 C13D8B79 183EC52E
8E2E792C 3E032E04 E7C13D8B 79183EC5 2E0845D9 9B79321E 8E2E7930 3E032E04
2E0445D9 9B79321E 8E2E7930 3E032E04 E7C13D8B 791C3EC5 2E085DD9 9B792E1E

E7C13D8B 791C3EC5 2E045DD9 9B792E1E 8E2E792C 3E032E04 E7C13D8B 79183EC5
8E2E792C 3E032E04 E7C13D8B 79183EC5 2E0C45D9 9B79321E 8E2E7930 3E032E04
C52E05D9 9B793A1E 8E2E7938 3E032E04 E7C13D8B 791C3EC5 2E0C5DD9 9B792E1E
2E04E7C1 3D8B791C 3EC52E1D D99B7936 1E8E2E79 343E032E 04E7C13D 8B79183E
361E8E2E 79343E03 2E04E7C1 3D8B7918 3EC52E08 45D99B79 3A1E8E2E 79383E03
3EC52E04 45D99B79 3A1E8E2E 79383E03 2E04E7C1 3D8B791C 3EC52E08 5DD99B79
2E04E7C1 3D8B791C 3EC52E04 5DD99B79 361E8E2E 79343E03 2E04E7C1 3D8B7918
361E8E2E 79343E03 2E04E7C1 3D8B7918 3EC52E0C 45D99B79 3A1E8E2E 79383E03
0010C857 56CB5E5F C99B06C4 83002C48 F19A0A76 FF0C76FF 0E76FF0C 5DD99B79
2E04E7C1 3D8B7918 3EC52E79 2E068E2E 792C3603 2E04E6C1 358B7918 3EC52E00
2E04E6C1 358B7918 3EC52EF0 5EDD9B24 D8269B04 45D99B79 2E1E8E2E 792C3E03
45D99B79 361E8E2E 79343E03 2E04E7C1 3D8B7918 3EC52E79 36068E2E 79343603
3EC52E1D D99B0E7E C5F876DC 9B05D99B 0E7EC5F8 5EDD9BF0 76DC9B24 D8269B04
792C3E03 2E04E7C1 3D8B7918 3EC52E79 2E068E2E 792C3603 2E04E6C1 358B7918
3436032E 04E6C135 8B79183E C52EF05E DD9B0864 D8269B0C 45D99B79 2E1E8E2E
269B0C45 D99B7936 1E8E2E79 343E032E 04E7C13D 8B79183E C52E7936 068E2E79
1676FF04 5DD99B0E 7EC5F876 DC9B0445 D99B0E7E C5F85EDD 9BF076DC 9B0864D8
56CB5E5F C99B0EC4 83002C51 DE9A0A76 FF0C76FF 0E76FF10 76FF1276 FF1476FF
9B792E1E 8E2E792C 3E032E04 E7C1FE7E 8BFE4689 058B7918 3EC52E00 0042C857
7E8BCE5E DD9B0845 D99B792E 1E8E2E79 2C3E032E 04E7C1FE 7E8BD65E DD9B05D9
2C3E032E 04E7C1FE 7E8BC65E DD9B0445 D99B792E 1E8E2E79 2C3E032E 04E7C1FE
361E8E2E 79343E03 2E04E7C1 FE7E8B0A 76C4BE5E DD9B0C45 D99B792E 1E8E2E79
9B79361E 8E2E7934 3E032E04 E7C1FE7E 8B0A76C4 F65EDD9B 04D8269B 05D99B79
9B79361E 8E2E7934 3E032E04 E7C1FE7E 8B0A76C4 EE5EDD9B 0444D826 9B0845D9
D99B7936 1E8E2E79 343E032E 04E7C1FE 7E8B0A76 C4E65EDD 9B04D826 9B0445D9
B5E90376 0054968A 9AE65EDC 9B05D99B 78943EC5 2EDE5EDD 9B0444D8 269B0C45
9B05D99B 78A43EC5 2E009FE9 03760054 968A9ADE 5EDC9B05 D99B789C 3EC52E00
76720054 968A9AEE 5EDC9B05 D99B78B4 3EC52E00 89E90373 0054968A 9AF65EDC
9636FF2E 790836FF 2E790A36 FF2E0E76 FF016A00 6A1076FF 1276FF00 2C48659A
54968F9A CE46DD9B 0054968F 9AC646DD 9B005496 8F9ABE46 DD9B7894 36FF2E78
EE46DD9B 0054968F 9AE646DD 9B005496 8F9ADE46 DD9B0054 968F9AD6 46DD9B00
0062C857 56CB5E5F C99B52C4 83002C6E EC9A0054 968F9AF6 46DD9B00 54968F9A
032E04E7 C1DE7E8B DE468905 8B79183E C52E04C4 830054EE AB9A50F0 468D1600
9B79361E 8E2E7934 3E032E04 E7C1DE7E 8BD65EDD 9B05D99B 79361E8E 2E79343E
8BC65EDD 9B0445D9 9B79361E 8E2E7934 3E032E04 E7C1DE7E 8BCE5EDD 9B0845D9
D89BF046 D99B0A7E C5BE5EDD 9B0C45D9 9B79361E 8E2E7934 3E032E04 E7C1DE7E
1DD89BE8 46D99B78 D03EC52E EC5ED99B 0445D89B F846D99B 0A7EC5E8 5ED99B05
0103E903 76005496 8A9A1DD8 9BEC46D9 9B78D83E C52E0119 E9037600 54968A9A
DD9BE446 D99BB65E DD9BE046 D99B08C4 83002C44 A09A50E0 468D1650 E8468D16
2EEC5ED9 9B0445D8 9BFC46D9 9B0A7EC5 E85ED99B 05D89BF4 46D99B0A 7EC5AE5E
D89BEC46 D99B78DC 3EC52E00 AEE90373 0054968A 9A1DD89B E846D99B 78C83EC5
46D99B08 C483002C 44A09A50 E0468D16 50E8468D 160098E9 03730054 968A9A1D
2E0E76FF 006A006A 1076FF12 76FF002C 48659A9E 5EDD9BE4 46D99BA6 5EDD9BE0
A646DD9B 0054968F 9A9E46DD 9B789436 FF2E7896 36FF2E79 0836FF2E 790A36FF
0054968F 9ABE46DD 9B005496 8F9AB646 DD9B0054 968F9AAE 46DD9B00 54968F9A
002C6EEC 9A005496 8F9AD646 DD9B0054 968F9ACE 46DD9B00 54968F9A C646DD9B
79183EC5 2E04C483 0054EEAB 9A50F046 8D160000 62C85756 CB5E5FC9 9B52C483
C1DE7E8B D65EDD9B 05D99B79 361E8E2E 79343E03 2E04E7C1 DE7E8BDE 4689058B
2E79343E 032E04E7 C1DE7E8B CE5EDD9B 0845D99B 79361E8E 2E79343E 032E04E7
0C45D99B 79361E8E 2E79343E 032E04E7 C1DE7E8B C65EDD9B 0445D99B 79361E8E
5ED99B04 45D89BF8 46D99B0A 7EC5E85E D99B05D8 9BF046D9 9B0A7EC5 BE5EDD9B
EC46D99B 78E43EC5 2E0119E9 03760054 968A9A1D D89BE846 D99B78E0 3EC52EEC
9B08C483 002C44A0 9A50E046 8D1650E8 468D1601 03E90376 0054968A 9A1DD89B
0A7EC5E8 5ED99B05 D89BF446 D99B0A7E C5AE5EDD 9BE446D9 9BB65EDD 9BE046D9
E9037300 54968A9A 1DD89BE8 46D99B78 CC3EC52E EC5ED99B 0445D89B FC46D99B
468D1650 E8468D16 0098E903 73005496 8A9A1DD8 9BEC46D9 9B78D43E C52E00AE
FF002C48 659A9E5E DD9BE446 D99BA65E DD9BE046 D99B08C4 83002C44 A09A50E0
789436FF 2E789636 FF2E7908 36FF2E79 0A36FF2E 0E76FF00 6A016A10 76FF1276
9AB646DD 9B005496 8F9AAE46 DD9B0054 968F9AA6 46DD9B00 54968F9A 9E46DD9B
9B005496 8F9ACE46 DD9B0054 968F9AC6 46DD9B00 54968F9A BE46DD9B 0054968F
468D1657 5600007E C85756CB 5E5FC99B 52C48300 2C6EEC9A 0054968F 9AD646DD
DD2E9B0C 7500023D 058B7850 3EC52E5E 5F0054DE 289A086A 0E76FF10 76FF508A
46D99BB6 4689058B 79183EC5 2E925ED9 9B78FC06 DD2E9B0A EB925ED9 9B795C06
8A9A8E5E D89B8A46 D99B17EB 8E5ED99B 8A46D99B 0A760054 968A9A8E 5ED89B8A

| | | | | | | | |
|---|---|---|---|---|---|---|---|
| C52E7894 | 36C42E82 | 5EDD9B8A | 4ED89B92 | 46D99B8A | 5ED99B8E | 46D99B08 | 73005496 |
| C42E825E | DD9B8E4E | D89B9246 | D99BAE5E | DD9B8276 | DC9B24D8 | 269B05D9 | 9B78A43E |
| 5C36DC2E | 9BAE46DD | 9BA65EDD | 9B8276DC | 9B24D826 | 9B05D99B | 78B43EC5 | 2E789C36 |
| 5EDD9B79 | 5C36DC2E | 9BA646DD | 9BB85ED9 | 9B8266DC | 9B05D99B | 0A7EC582 | 5EDD9B79 |
| 83002C44 | A09A509E | 468D1650 | B8468D16 | BC5ED99B | 8266DC9B | 0445D99B | 0A7EC582 |
| DD9BB85E | D99B8246 | DC9B05D9 | 9B0A7EC5 | 825EDD9B | 795C36DC | 2E9BAE46 | DD9B08C4 |
| 50B8468D | 16BC5ED9 | 9B8246DC | 9B0445D9 | 9B0A7EC5 | 825EDD9B | 795C36DC | 2E9BA646 |
| 46D99BC8 | 5EDD9BA2 | 46D99BD8 | 5EDD9B9E | 46D99B08 | C483002C | 44A09A50 | 96468D16 |
| D99B789C | 3EC52EF8 | 5EDD9B05 | D99B7894 | 3EC52EC0 | 5EDD9B9A | 46D99BD0 | 5EDD9B96 |
| 48659AE0 | 5EDD9B05 | D99B78B4 | 3EC52EE8 | 5EDD9B05 | D99B78A4 | 3EC52EF0 | 5EDD9B05 |
| FF2E7896 | 36FF2E79 | 0836FF2E | 790A36FF | 2E1276FF | 016A006A | 1476FF16 | 76FF002C |
| DD9B0054 | 968F9AC8 | 46DD9B00 | 54968F9A | D046DD9B | 0054968F | 9AC046DD | 9B789436 |
| 968F9AF0 | 46DD9B00 | 54968F9A | E846DD9B | 0054968F | 9AE046DD | 9B005496 | 8F9AD846 |
| 7E830000 | 10C85756 | CB5E5FC9 | 9B52C483 | 002C6EEC | 9A005496 | 8F9AF846 | DD9B0054 |
| 36168B2E | 79340603 | 2E04E0C1 | 058B7918 | 3EC52E0C | 76FF0E76 | FF0089E9 | 0374000A |
| 7936168B | 2E793406 | 032E04E0 | C1058B79 | 183EC52E | 50000C05 | C38B51CA | 8BD88B79 |
| 8B793616 | 8B2E7934 | 06032E04 | E0C1058B | 79183EC5 | 2E500008 | 05C38B51 | CA8BD88B |
| 50527936 | 168B2E79 | 3406032E | 04E0C105 | 8B79183E | C52E5000 | 0405C38B | 51CA8BD8 |
| C13D8B79 | 183EC52E | 796436C4 | 2E0A4EFF | 00D7E918 | C4830054 | DABA9A01 | 95680A6A |
| 36C42EF0 | 5ED99B04 | D8269B79 | 5C36DC2E | 9B05D99B | 79361E8E | 2E79343E | 032E04E7 |
| 795C36DC | 2E9B0445 | D99B7936 | 1E8E2E79 | 343E032E | 04E7C13D | 8B79183E | C52E7964 |
| 361E8E2E | 79343E03 | 2E04E7C1 | 3D8B7918 | 3EC52E79 | 6436C42E | F45ED99B | 04D8269B |
| 3D8B7918 | 3EC52E79 | 6436C42E | F85ED99B | 0444D826 | 9B795C36 | DC2E9B08 | 45D99B79 |
| FC5ED99B | 0444D826 | 9B795C36 | DC2E9B0C | 45D99B79 | 361E8E2E | 79343E03 | 2E04E7C1 |
| 9A019568 | 0A6A50F0 | 468D1650 | F4468D16 | 50F8468D | 1650FC46 | 8D160C76 | FF0E76FF |
| DD9BE85E | DD9B2A66 | DC9B3A46 | DD9B0000 | 18C85756 | CB5E5FC9 | 9B18C483 | 0054DABA |
| DC9B2246 | DD9BE85E | DD9B3266 | DC9B4246 | DD9BF85E | DD9BE876 | DC9B0A66 | DC9B1A46 |
| 8D160054 | 968F9A05 | D99B4E7E | C5005496 | 8F9AF846 | DD9BF05E | DD9BE876 | DC9B1266 |
| 9AF046DD | 9B20C483 | 002C72FD | 9A500A46 | 8D160054 | 968F9A05 | D99B4A7E | C5502A46 |
| 54968F9A | 0845D99B | 4A7EC550 | 32468D16 | 0054968F | 9A0845D9 | 9B4E7EC5 | 0054968F |
| 8F9A0445 | D99B4E7E | C5005496 | 8F9AF846 | DD9B20C4 | 83002C72 | FD9A5012 | 468D1600 |
| C483002C | 74849A50 | 1A468D16 | 0054968F | 9A0445D9 | 9B4A7EC5 | 503A468D | 16005496 |
| D99B4A7E | C5504246 | 8D160054 | 968F9A0C | 45D99B4E | 7EC50054 | 968F9AF0 | 46DD9B20 |
| 4A7EC500 | C3E90374 | 00567E83 | 20C48300 | 2C74849A | 5022468D | 16005496 | 8F9A0C45 |
| 1A5EDD9B | 05D89B0A | 66DC9B1A | 46DD9B4A | 7EC54F73 | 0054968A | 9A0A5EDC | 9B05D99B |
| 16005496 | 8F9A0445 | D99B4E7E | C5005496 | 8F9AF846 | DD9B0A5E | DD9B05D9 | 9B4A7EC5 |
| 4A7EC520 | C483002C | 74849A50 | 1A468D16 | 0054968F | 9A0445D9 | 9B4A7EC5 | 503A468D |
| DD9B0845 | D89B1266 | DC9B2246 | DD9B4A7E | C5517300 | 54968A9A | 125EDC9B | 0845D99B |
| 968F9A0C | 45D99B4E | 7EC50054 | 968F9AF0 | 46DD9B12 | 5EDD9B08 | 45D99B4A | 7EC5225E |
| 20C48300 | 2C74849A | 5022468D | 16005496 | 8F9A0C45 | D99B4A7E | C5504246 | 8D160054 |
| DD9B0054 | 968F9A12 | 46DD9B00 | 54968F9A | 1A46DD9B | 0054968F | 9A2246DD | 9B5476FF |
| 968F9A32 | 46DD9B00 | 54968F9A | 3A46DD9B | 0054968F | 9A4246DD | 9B005496 | 8F9A0A46 |
| 2C48F19A | 5276FF58 | 76FF5A76 | FF42C483 | 002C7129 | 9A005496 | 8F9A2A46 | DD9B0054 |
| 1E8E2E79 | 2C3E032E | 04E7C13D | 8B79183E | C52EEC8B | 555756CB | 5E5FC99B | 06C48300 |
| 46DD9B79 | 2E1E8E2E | 792C3E03 | 2E04E7C1 | 3D8B7918 | 3EC52E1D | D99B0A46 | DD9B792E |
| 5DD99B1A | 46DD9B79 | 2E1E8E2E | 792C3E03 | 2E04E7C1 | 3D8B7918 | 3EC52E08 | 5DD99B12 |
| 3EC52E0C | 5DD99B22 | 46DD9B79 | 2E1E8E2E | 792C3E03 | 2E04E7C1 | 3D8B7918 | 3EC52E04 |
| C13D8B79 | 183EC52E | 1DD99B2A | 46DD9B79 | 361E8E2E | 79343E03 | 2E04E7C1 | 3D8B7918 |
| 032E04E7 | C13D8B79 | 183EC52E | 085DD99B | 3246DD9B | 79361E8E | 2E79343E | 032E04E7 |
| 2E79343E | 032E04E7 | C13D8B79 | 183EC52E | 045DD99B | 3A46DD9B | 79361E8E | 2E79343E |
| 8B791C3E | C52E002C | 488F9A00 | E3E90374 | 014A7E83 | 0C5DD99B | 4246DD9B | 79361E8E |
| 2E04E7C1 | 3D8B791C | 3EC52E1D | D99B0A46 | DD9B7932 | 1E8E2E79 | 303E032E | 04E7C13D |
| 79303E03 | 2E04E7C1 | 3D8B791C | 3EC52E08 | 5DD99B12 | 46DD9B79 | 321E8E2E | 79303E03 |
| 321E8E2E | 79303E03 | 2E04E7C1 | 3D8B791C | 3EC52E04 | 5DD99B1A | 46DD9B79 | 321E8E2E |
| 46DD9B79 | 3A1E8E2E | 79383E03 | 2E04E7C1 | 3D8B791C | 3EC52E0C | 5DD99B22 | 46DD9B79 |
| 085DD99B | 3246DD9B | 793A1E8E | 2E79383E | 032E04E7 | C13D8B79 | 1C3EC52E | 1DD99B2A |
| 1C3EC52E | 045DD99B | 3A46DD9B | 793A1E8E | 2E79383E | 032E04E7 | C13D8B79 | 1C3EC52E |
| C85756CB | 5E5FC99B | 0C5DD99B | 4246DD9B | 793A1E8E | 2E79383E | 032E04E7 | C13D8B79 |
| 5EDC9B05 | DD9B167E | C500ADE9 | 03770054 | 968A9A0E | 5EDC9B05 | DD9B0A7E | C5000018 |
| 0A7EC5E8 | 5EDD9B22 | 4EDC9B1A | 66DC9B05 | DD9B167E | C50099E9 | 03770054 | 968A9A1A |
| 7EC50EEB | 0E66DC9B | 05DD9B0A | 7EC50C73 | 0054968A | 9AE85EDC | 9B0E66DC | 9B05DD9B |
| 8A9AF85E | DC9B0E66 | DC9B05DD | 9B0A7EC5 | F85EDD9B | 224EDC9B | 1A66DC9B | 05DD9B16 |
| 5EDD9B1A | 66DC9B05 | DD9B167E | C50EEBF0 | 5EDD9B22 | 76DC9BF8 | 46DD9B0E | 75005496 |
| DD9B167E | C5F066DC | 9B05DD9B | 167EC51D | DD9B0A7E | C5F866DC | 9B05DD9B | 0A7EC5F0 |

9A1A5EDC 9B05DD9B 167EC514 72005496 8A9A0E5E DC9B05DD 9B0A7EC5 00BBE91D
DD9B0A7E C5E85EDD 9B224EDC 9B25DC9B 1A46DD9B 167EC500 96E90372 0054968A
9B167EC5 0EEB25DC 9B0E46DD 9B0A7EC5 0C760054 968A9AE8 5EDC9B25 DC9B0E46
54968A9A F85EDC9B 25DC9B0E 46DD9B0A 7EC5F85E DD9B224E DC9B25DC 9B1A46DD
C5F05EDD 9B25DC9B 1A46DD9B 167EC50E EBF05EDD 9B2276DC 9BF846DD 9B0E7500
9B1DDD9B 167EC5F0 46DC9B05 DD9B167E C51DDD9B 0A7EC5F8 46DC9B05 DD9B0A7E
7EC500AD E9037200 54968A9A 0E5EDC9B 05DD9B0A 7EC50000 18C85756 CB5E5FC9
224EDC9B 25DC9B1A 46DD9B16 7EC50099 E9037200 54968A9A 1A5EDC9B 05DD9B16
0E46DD9B 0A7EC50C 73005496 8A9AE85E DC9B25DC 9B0E46DD 9B0A7EC5 E85EDD9B
DC9B0E46 DD9B0A7E C5F85EDD 9B224EDC 9B25DC9B 1A46DD9B 167EC50E EB25DC9B
46DD9B16 7EC50EEB F05EDD9B 2276DC9B F846DD9B 0E750054 968A9AF8 5EDC9B25
DC9B05DD 9B167EC5 1DDD9B0A 7EC5F846 DC9B05DD 9B0A7EC5 F05EDD9B 25DC9B1A
9B167EC5 14770054 968A9A0E 5EDC9B05 DD9B0A7E C500BBE9 1DDD9B16 7EC5F046
DD9B224E DC9B1A66 DC9B05DD 9B167EC5 0096E903 77005496 8A9A1A5E DC9B05DD
66DC9B05 DD9B0A7E C50C7600 54968A9A E85EDC9B 0E66DC9B 05DD9B0A 7EC5E85E
9B0E66DC 9B05DD9B 0A7EC5F8 5EDD9B22 4EDC9B1A 66DC9B05 DD9B167E C50EEB0E
DC9B05DD 9B167EC5 0EEBF05E DD9B2276 DC9BF846 DD9B0E75 0054968A 9AF85EDC
F066DC9B 05DD9B16 7EC51DDD 9B0A7EC5 F866DC9B 05DD9B0A 7EC5F05E DD9B1A66
D99B0A7E C50A76C4 E05EDD9B E8D99B00 0020C857 56CB5E5F C99B1DDD 9B167EC5
0445D99B 0A7EC50A 76C4E05E DD9BE8D9 9BFC5ED9 9BE046DC 9B0864D8 269B0C45
5ED99B24 D8269B05 D99B78F8 3EC52E78 F036C42E F85ED99B E046DC9B 24D8269B
8A9AE85E D89BEC46 D99BE85E D99B24D8 269B05D9 9B79043E C52E78F4 36C42EEC
46D99BF4 5ED99BEC 76D89BE8 4ED89BF8 46D99BF0 5ED99BF8 46D99B41 76005496
E876D89B EC4ED89B FC46D99B F45ED99B FC46D99B 59760054 968A9AFC 5ED89BF4
D99BF05E D99BE876 D89BEC4E D89BF846 D99BF45E D99BFC46 D99B3FEB F05ED99B
76D89BE8 4ED89BF8 46D99BF0 5ED99BF8 46D99B18 76005496 8A9AF85E D89BF046
2C3E032E 04E7C13D 8B79183E C52E05D9 9B78F03E C52E002C 48659AF4 5ED99BEC
792C3E03 2E04E7C1 3D8B7918 3EC52E05 D99B78F4 3EC52E1D D99B792E 1E8E2E79
792C3E03 2E04E7C1 3D8B7918 3EC52E05 D99B78F8 3EC52E08 5DD99B79 2E1E8E2E
792C3E03 2E04E7C1 3D8B7918 3EC52E05 D99B7904 3EC52E04 5DD99B79 2E1E8E2E
8E2E7934 3E032E04 E7C13D8B 79183EC5 2E05D99B 0A7EC50C 5DD99B79 2E1E8E2E
361E8E2E 79343E03 2E04E7C1 3D8B7918 3EC52E08 45D99B0A 7EC51DD9 9B79361E
55D99B0A 7EC5E066 DC9BF046 D89B05D9 9B0A7EC5 E05EDD9B E8D99B08 5DD99B79
E05EDD9B E8D99B04 5DD99B79 361E8E2E 79343E03 2E04E7C1 3D8B7918 3EC52E04
04E7C13D 8B79183E C52E0C55 D99B0A7E C5E066DC 9BF446D8 9B0845D9 9B0A7EC5
C99B06C4 83002C48 F19A006A 0E76FF10 76FF0C5D D99B7936 1E8E2E79 343E032E
004C7188 004C718C 004C7184 004C7128 004C7198 004C7194 004C7172 00CB5E5F
004C7178 40500000 00000000 004C717C 403C0000 00000000 004C7174 004C7190
004C7116 004C70FE 004C710E 4086F800 00000000 004C7180 40897800 00000000
00000000 004C710A 004C711A 408FF800 00000000 004C7102 004C7112 004C7106
004C6F96 004C6F9A 004C6F86 004C6F92 004C6F7E 004C6F8E 004C712A 4085E800
00000000 004C6FA2 004C6FA6 004C6F9E 004C7170 004C716E 004C6F8A 004C6F82
004C7120 004C711E 004C70FA 004C70F2 004C70F6 004C70EE 004C6FAA 3FF00000
48E8A71E 004C709E 004C6FFE 004C704E 004C6FAE 004C7126 004C7124 004C7122
00000000 00000000 00000000 004C714E 004C712E 004C6F7C 004C6F5A 3FEFFF2E
003D80B2 8C3EC52E 2174013D 80B2883E C52E0000 6AC85756 004C6F5C 40000000
058BB294 3EC52E02 A9E9C02B 04C48300 544A8A9A B29036FF 2EB29236 FF2E1274
0044FE0B 9A509846 8D160C76 FF0E76FF 006A0294 E9C02B05 7501967E 83964689
2C7D709A FC46890A C483002C 7C479A50 98468D16 1076FF12 76FF1476 FF0AC483
2E0C76FF 0E76FFFC 76FF1B74 003D80B2 8C3EC52E 0256E9C0 2B0575FF FC7E8300
E90A468B 02C48300 2C8D069A 0A76FF0A C4830054 4A8A9AB2 9836FF2E B29A36FF
9E1E8E2E B29C3E03 2EE7D1FE 7E8B3F7D 03FE7E83 FE46FF03 EB0000FE 46C7013A
8BB2A21E 8E2EB2A0 3E032EE7 D1FE7E8B 0589125E 8E107E03 E7D1FE7E 8B058BB2
5DD99B10 7EC50445 D99BB2A4 3EC52EB8 EB064589 125E8E10 7E03E7D1 FE7E8B05
7E83FE46 FF03EB00 00FE46C7 00E1E92C 5DD99B10 7EC50845 D99BB2A4 3EC52E28
125E8E10 7E03E7D1 FE7E8B05 8BB29E1E 8E2EB29C 3E032EE7 D1FE7E8B 207D03FE
107EC508 45D99BB2 A43EC52E 285DD99B 107EC504 45D99BB2 A43EC52E D7EB0589
A03E032E E7D1FE7E 8B217D03 FE7E83FE 46FF03EB 0000FE46 C7008EE9 2C5DD99B
45D99BB2 A43EC52E D6EB0645 89125E8E 107E03E7 D1FE7E8B 058BB2A2 1E8E2EB2
9BB2A43E C52E3BEB 2C5DD99B 107EC508 45D99BB2 A43EC52E 285DD99B 107EC504
00043D48 19EB2C5D D99B107E C50845D9 9BB2A43E C52E285D D99B107E C50445D9
2E127400 3D80B28C 3EC52E7A 227B3A7A E77A947B 757B6BA7 FF2ED88B E0D11377
75FF107E C5247400 3D80B28C 3EC52E04 C4830054 4A8A9AB2 A836FF2E B2AA36FF
2E0AC483 00544A8A 9AB2AC36 FF2EB2AE 36FF2E06 75FF107E C50875FF 107EC50A

```
2EB2B236 FF2E35FF 107EC502 75FF107E C50475FF 107EC523 74003D80 B28C3EC5
968F9A2C 45D99B10 7EC53674 003D80B2 8C3EC52E 0AC48300 544A8A9A B2B036FF
2EB2B636 FF2E0054 968F9A24 45D99B10 7EC50054 968F9A28 45D99B10 7EC50054
8300549B D59A5000 1205B2B8 068B2EB2 BA36FF2E 1CC48300 544A8A9A B2B436FF
04C48300 2C7D9D9A 0A76FF0C 76FF002C 7CC79A00 0004C857 56CB5E5F C99B04C4
C52E247D 01FC7E83 FC468905 8BB2943E C52E55EB FE468B05 75FFFE7E 83FE4689
FFFFB806 C4830054 4A8A9AB2 BC36FF2E B2BE36FF 2EFC76FF 1574003D 80B28C3E
03EBFFFF B80575FF FF3D08C4 83002C80 EA9AFC76 FF0E76FF 1076FF12 76FF21EB
FA46FF03 EB0000FA 46C700C0 05C7B2C0 3EC52E00 0006C857 56CB5E5F C9FE468B
0000FA46 C7E2EBFF FF05C7B2 C61E8E2E B2C43E03 2EE7D1FA 7E8B157D 03FA7E83
E2EBFFFF 05C7B2CA 1E8E2EB2 C83E032E E7D1FA7E 8B157D03 FA7E83FA 46FF03EB
89B2CC3E C52E06C4 830054DC 339A016A FC76FFFE 76FF0000 FE46C7E8 00FC46C7
830054DC 339A016A FC76FFFE 76FFFE56 89FC4689 99058BB2 C03EC52E 02558905
9A35FF02 75FFB2D0 3EC52EEC 8B555756 CB5E5FC9 02558905 89B2D03E C52E06C4
C85756CB 5E5FC904 C4830054 DC759A35 FF0275FF B2CC3EC5 2E04C483 0054DC75
5689FC46 8908C483 00549972 9A0A76FF 0C76FFB2 D436FF2E B2D636FF 2E000006
9AB2D836 FF2EB2DA 36FF2E0A 76FF0C76 FF187400 3D80B28C 3EC52E28 75C20BFE
0275FFB2 CC3EC52E 3A6A0400 68FC76FF FE76FF02 F9E9FFFF B808C483 00544A8A
B2DE36FF 2E127400 3D80B28C 3EC52E30 74C00BFA 46890CC4 830054CE 7E9A35FF
A5E9FFFF B804C483 00549C3C 9AFC76FF FE76FF04 C4830054 4A8A9AB2 DC36FF2E
FA46890C C4830054 CE7E9AB2 E036FF2E B2E236FF 2E066A01 6AFC76FF FE76FF02
04C48300 544A8A9A B2E436FF 2EB2E636 FF2E1274 003D80B2 8C3EC52E 3074C00B
FF2E066A 016AFC76 FFFE76FF 0252E9FF FFB804C4 8300549C 3C9AFC76 FFFE76FF
74003D80 B28C3EC5 2E3074C0 0BFA4689 0CC48300 54CE7E9A B2E836FF 2EB2EA36
C4830054 9C3C9AFC 76FFFE76 FF04C483 00544A8A 9AB2EC36 FF2EB2EE 36FF2E12
0054CE7E 9AB2F036 FF2EB2F2 36FF2E04 6A016AFC 76FFFE76 FF01FFE9 FFFFB804
8A9AB2F4 36FF2EB2 F636FF2E 1274003D 80B28C3E C52E3074 C00BFA46 890CC483
FC76FFFE 76FF01AC E9FFFFB8 04C48300 549C3C9A FC76FFFE 76FF04C4 8300544A
C00BFA46 890CC483 0054CE7E 9A35FF02 75FFB2D0 3EC52E35 FFB2C03E C52E016A
76FF04C4 8300544A 8A9AB2F8 36FF2EB2 FA36FF2E 1274003D 80B28C3E C52E3074
76FFFE76 FF001405 C7B2FC3E C52E0154 E9FFFFB8 04C48300 549C3C9A FC76FFFE
C52E3074 C00BFA46 890CC483 0054CE7E 9AB2FC36 FF2EB2FE 36FF2E02 6A016AFC
FC76FFFE 76FF04C4 8300544A 8A9AB300 36FF2EB3 0236FF2E 1274003D 80B28C3E
8BB2FC3E C52E3374 00173D05 8BB2FC3E C52E00F8 E9FFFFB8 04C48300 549C3C9A
C52E0F74 000A3D05 8BB2FC3E C52E1B74 00163D05 8BB2FC3E C52E2774 00153D05
C436FF2E B2C636FF 2E066A01 6AFC76FF FE76FF00 A4E90374 000B3D05 8BB2FC3E
2EB30636 FF2E1274 003D80B2 8C3EC52E 2F74C00B FA46890C C4830054 CE7E9AB2
FF67EBFF FFB804C4 8300549C 3C9AFC76 FFFE76FF 04C48300 544A8A9A B30436FF
C00BFA46 890CC483 0054CE7E 9AB2C836 FF2EB2CA 36FF2E06 6A016AFC 76FFFE76
76FF04C4 8300544A 8A9AB308 36FF2EB3 0A36FF2E 1274003D 80B28C3E C52E2F74
2E04C483 00549C3C 9AFC76FF FE76FF15 EBFFFFB8 04C48300 549C3C9A FC76FFFE
86B19A0A 76FF0A46 89058BB2 943EC52E 000002C8 5756CB5E 5FC9058B B2FC3EC5
627D03FE 7E83FE46 FF03EB00 00FE46C7 0351E9FF FFB80675 FFFF3D02 C483002C
7E8B0589 B30E1E8E 2EB30C3E 032EE7D1 FE7E8B05 8B0E5E8E 0C7E03E7 D1FE7E8B
FE7E8B05 89B3121E 8E2EB310 3E032EE7 D1FE7E8B 06458B0E 5E8E0C7E 03E7D1FE
1DD99BB3 161E8E2E B3143E03 2E02E7C1 FE7E8B24 45D99B0E 5E8E0C7E 0302E7C1
B31C36FF 2EB31E36 FF2E1274 003D80B2 8C3EC52E 0589B318 3EC52E10 468B95EB
FFB3243E C52E0475 FFB3243E C52E2974 003D80B2 8C3EC52E 04C48300 544A8A9A
B28C3EC5 2E0AC483 00544A8A 9AB32036 FF2EB322 36FF2E35 FFB3243E C52E0275
2A36FF2E 35FFB32C 3EC52E02 75FFB32C 3EC52E04 75FFB32C 3EC52E29 74003D80
0475FFB3 343EC52E 2974003D 80B28C3E C52E0AC4 8300544A 8A9AB328 36FF2EB3
C4830054 4A8A9AB3 3036FF2E B33236FF 2E35FFB3 343EC52E 0275FFB3 343EC52E
544A8A9A B33836FF 2EB33A36 FF2E35FF B33C3EC5 2E197400 3D80B28C 3EC52E0A
443EC52E 0054968F 9A0845D9 9BB3443E C52E3B74 003D80B2 8C3EC52E 06C48300
4036FF2E B34236FF 2E005496 8F9A05D9 9BB3443E C52E0054 968F9A04 45D99BB3
B34C3EC5 2E0475FF B34C3EC5 2E297400 3D80B28C 3EC52E1C C4830054 4A8A9AB3
8C3EC52E 0AC48300 544A8A9A B34836FF 2EB34A36 FF2E35FF B34C3EC5 2E0275FF
003D80B2 8C3EC52E 04C48300 544A8A9A B35036FF 2EB35236 FF2E1274 003D80B2
FF2EB356 36FF2E35 FFB2E03E C52E0275 FFB2E03E C52E0475 FFB2E03E C52E2974
3EC52E04 75FFB2E8 3EC52E29 74003D80 B28C3EC5 2E0AC483 00544A8A 9AB35436
C52E0AC4 8300544A 8A9AB358 36FF2EB3 5A36FF2E 35FFB2E8 3EC52E02 75FFB2E8
80B28C3E C52E04C4 8300544A 8A9AB35C 36FF2EB3 5E36FF2E 1274003D 80B28C3E
B36236FF 2E35FFB3 103EC52E 0275FFB3 103EC52E 0475FFB3 103EC52E 2974003D
2E0475FF B30C3EC5 2E297400 3D80B28C 3EC52E0A C4830054 4A8A9AB3 6036FF2E
```

0AC48300 544A8A9A B36436FF 2EB36636 FF2E35FF B30C3EC5 2E0275FF B30C3EC5
45D99BB3 143EC52E 0054968F 9A0845D9 9BB3143E C52E3B74 003D80B2 8C3EC52E
4A8A9AB3 6836FF2E B36A36FF 2E005496 8F9A05D9 9BB3143E C52E0054 968F9A04
B36C36FF 2EB36E36 FF2E35FF B3183EC5 2E197400 3D80B28C 3EC52E1C C4830054
01B804C4 8300549B D59A5000 1205B2B8 068B2EB2 BA36FF2E 06C48300 544A8A9A
547FAA9A 0E76FF10 76FFB370 36FF2EB3 7236FF2E 0000EAC8 5756CB5E 5FC99B00
76FFFE76 FF0098E9 0375C20B FE5689FC 468908C4 83005499 729A5052 04C48300
7636FF2E 50FF1686 8D166F74 C20B0AC4 830054EA AA9A50FF 34868D16 00C768FC
50FF1686 8D160A76 FF0C76FF 0CC48300 542A089A 50FF3486 8D16B374 36FF2EB3
FC76FFFE 76FF04C4 83002C85 E69AFC76 FFFE76FF 1F75C00B 08C48300 3CFFBE9A
830054EA AA9A50FF 34868D16 00C768FC 76FFFE76 FF00D7E9 04C48300 549C3C9A
0C76FF18 74003D80 B28C3EC5 2E04C483 00549C3C 9AFC76FF FE76FFFF 76E90AC4
FFB37C36 FF2EB37E 36FF2E08 C4830054 4A8A9AB3 7836FF2E B37A36FF 2E0A76FF
75C20BFE 5689FC46 8908C483 00549972 9A505204 C4830054 7FAA9A0E 76FF1076
00544A8A 9AB38036 FF2EB382 36FF2E0E 76FF1076 FF187400 3D80B28C 3EC52E27
AE9AFC76 FFFE76FF B38436FF 2EB38636 FF2E0A76 FF0C76FF 3AEBFFFF B808C483
8300549C 3C9AFC76 FFFE76FF 04C48300 2C85E69A FC76FFFE 76FF0CC4 8300544A
4C3EC52E 0275FFB3 4C3EC52E 0475FFB3 4C3EC52E 00007EC8 5756CB5E 5FC904C4
2E005496 8F9A0445 D99BB344 3EC52E00 54968F9A 0845D99B B3443EC5 2E35FFB3
B3343EC5 2E0475FF B3343EC5 2E35FFB3 3C3EC52E 0054968F 9A05D99B B3443EC5
FFB3243E C52E0275 FFB3243E C52E0475 FFB3243E C52E35FF B3343EC5 2E0275FF
36FF2EB3 8A36FF2E 35FFB32C 3EC52E02 75FFB32C 3EC52E04 75FFB32C 3EC52E35
76FFB38C 36FF2EB3 8E36FF2E 5082468D 163AC483 00544ACA 9A508246 8D16B388
9436FF2E B39636FF 2E0000D0 C85756CB 5E5FC99B 0CC48300 544AAE9A 0A76FF0C
F8468908 C4830054 99729A50 5204C483 00547FAA 9AB39036 FF2EB392 36FF2EB3
B39A36FF 2EB39C36 FF2EB39E 36FF2E1C 74003D80 B28C3EC5 2E2C75C2 0BFA5689
FE468BFE 46FF03EB 0001FE46 C7024FE9 FFFFB808 C4830054 4A8A9AB3 9836FF2E
8D1600C7 68F876FF FA76FFE5 7D02FC7E 83FC46FF 03EB0000 FC46C75E 7D0A463B
C52E04C4 8300549C 3C9AF876 FFFA76FF DC75C20B 0AC48300 54EAAA9A 50FF3086
FFFFB806 C4830054 4A8A9AB3 A036FF2E B3A236FF 2E0A76FF 1574003D 80B28C3E
76FF3375 C20B0AC4 830054EA AA9A50FF 30868D16 00C768F8 76FFFA76 FF01DFE9
FF2EB3A6 36FF2E0A 76FF1574 003D80B2 8C3EC52E 04C48300 549C3C9A F876FFFA
FF30868D 16187400 3D80B28C 3EC52E01 91E9FFFF B806C483 00544A8A 9AB3A436
30868D16 00C768F8 76FFFA76 FF08C483 00544A8A 9AB3A836 FF2EB3AA 36FF2E50
8C3EC52E 04C48300 549C3C9A F876FFFA 76FF3375 C20B0AC4 830054EA AA9A50FF
21E9FFFF B806C483 00544A8A 9AB3AC36 FF2EB3AE 36FF2E0A 76FF1574 003D80B2
36FF2E50 000205B3 4C068B2E B34E36FF 2E500004 05B34C06 8B2EB34E 36FF2E01
05B34406 8B2EB346 36FF2E50 000805B3 44068B2E B34636FF 2EB34C36 FF2EB34E
34068B2E B33636FF 2EB33C36 FF2EB33E 36FF2EB3 4436FF2E B34636FF 2E500004
36FF2EB3 3436FF2E B33636FF 2E500002 05B33406 8B2EB336 36FF2E50 000405B3
FF2EB326 36FF2E50 000205B3 24068B2E B32636FF 2E500004 05B32406 8B2EB326
2E500002 05B32C06 8B2EB32E 36FF2E50 000405B3 2C068B2E B32E36FF 2EB32436
C4830054 2A089A50 FF30868D 16B3B036 FF2EB3B2 36FF2EB3 2C36FF2E B32E36FF
3EC52E25 EB0001B8 057510FE 7E8304C4 8300549C 3C9AF876 FFFA76FF FE468948
B808C483 00544A8A 9AB3B436 FF2EB3B6 36FF2E0A 76FFFE76 FF187400 3D80B28C
C483002C 86B19AFE 76FFFE46 89058BB2 943EC52E 000002C8 5756CB5E 5FC9FFFF
36FF2E04 C4830054 4A8A9AB3 B836FF2E B3BA36FF 2E127400 3D80B28C 3EC52E02
FF2EB30E 36FF2E50 000205B3 0C068B2E B30E36FF 2E500004 05B30C06 8B2EB30E
2E127400 3D80B28C 3EC52E10 C4830054 29CC9AB3 BC36FF2E B3BE36FF 2EB30C36
2E500004 05B31006 8B2EB312 36FF2E04 C4830054 4A8A9AB3 C036FF2E B3C236FF
C436FF2E B3C636FF 2EB31036 FF2EB312 36FF2E50 000205B3 10068B2E B31236FF
4A8A9AB3 C836FF2E B3CA36FF 2E127400 3D80B28C 3EC52E10 C4830054 29CC9AB3
000405B3 14068B2E B31636FF 2E500008 05B31406 8B2EB316 36FF2E04 C4830054
3EC52E10 C4830054 29CC9AB3 CC36FF2E B3CE36FF 2EB31436 FF2EB316 36FF2E50
FF2EB31A 36FF2E04 C4830054 4A8A9AB3 D036FF2E B3D236FF 2E127400 3D80B28C
2E297400 3D80B28C 3EC52E08 C4830054 29CC9AB3 D436FF2E B3D636FF 2EB31836
B3D836FF 2EB3DA36 FF2E35FF B3243EC5 2E0275FF B3243EC5 2E0475FF B3243EC5
FFB32C3E C52E0475 FFB32C3E C52E2974 003D80B2 8C3EC52E 0AC48300 544A8A9A
B28C3EC5 2E0AC483 00544A8A 9AB3DC36 FF2EB3DE 36FF2E35 FFB32C3E C52E0275
E236FF2E 35FFB2E0 3EC52E02 75FFB2E0 3EC52E04 75FFB2E0 3EC52E29 74003D80
0475FFB2 E83EC52E 2974003D 80B28C3E C52E0AC4 8300544A 8A9AB3E0 36FF2EB3
C4830054 4A8A9AB3 E436FF2E B3E636FF 2E35FFB2 E83EC52E 0275FFB2 E83EC52E
B3343EC5 2E0275FF B3343EC5 2E0475FF B3343EC5 2E297400 3D80B28C 3EC52E0A
C52E2974 003D80B2 8C3EC52E 0AC48300 544A8A9A B3E836FF 2EB3EA36 FF2E35FF

9AB3EC36 FF2EB3EE 36FF2E35 FFB3103E C52E0275 FFB3103E C52E0475 FFB3103E
75FFB30C 3EC52E04 75FFB30C 3EC52E29 74003D80 B28C3EC5 2E0AC483 00544A8A
80B28C3E C52E0AC4 8300544A 8A9AB3F0 36FF2EB3 F236FF2E 35FFB30C 3EC52E02
0054968F 9A0445D9 9BB3443E C52E0054 968F9A08 45D99BB3 443EC52E 3B74003D
2E1CC483 00544A8A 9AB3F436 FF2EB3F6 36FF2E00 54968F9A 05D99BB3 443EC52E
0445D99B B3143EC5 2E005496 8F9A0845 D99BB314 3EC52E3B 74003D80 B28C3EC5
544A8A9A B3F836FF 2EB3FA36 FF2E0054 968F9A05 D99BB314 3EC52E00 54968F9A
C52E0275 FFB34C3E C52E0475 FFB34C3E C52E2974 003D80B2 8C3EC52E 1CC48300
74003D80 B28C3EC5 2E0AC483 00544A8A 9AB3FC36 FF2EB3FE 36FF2E35 FFB34C3E
C4830054 4A8A9AB4 0036FF2E B40236FF 2E35FFB3 3C3EC52E 35FFB318 3EC52E20
F05EDD9B B40C06DD 2E9BF85E DD9BB404 06DD2E9B 00013AC8 5756CB5E 5FC99B08
FF3E86C7 0000FF40 86C70000 FF4286C7 0000FF44 86C7E85E DD9BB414 06DD2E9B
B3243603 2EE6D1FF 66B68B46 7D03FF66 BE83FF66 86FF04EB 0000FF66 86C70000
FF66BE8B 177C043B 26058BB3 4E1E8E2E B34C3E03 2EE7D1FF 66BE8BB3 26068E2E
01FF3EBE 83AFEB00 01FF3E86 C7B77E0F FF3D058B B34E1E8E 2EB34C3E 032EE7D1
B3243E03 2EE7D1FF 66BE8B26 7D03FF66 BE83FF66 86FF04EB 0000FF66 86C73975
B33C36C4 2ECFEB05 89B34E1E 8E2EB34C 3E032EE7 D1FF66BE 8B058BB3 261E8E2E
8304C483 002CF0DA 9A50FEFC 868D16FF 6C9ED99B 34DE269B 05DF9BB3 183EC52E
B4203EC5 2E04C483 00544A8A 9AB41C36 FF2EB41E 36FF2E01 67E90374 01FEFCBE
FA868908 C4830054 96EF9A00 54968F9A 05D99BB4 243EC52E FEF69ED9 9B05D99B
8BFEDE9E DD9BEED9 9B0119E9 037C03FF 66BE83FF 6686FF04 EB0000FF 6686C7FE
06DC2E9B FEF6B6D8 9BFEFAA6 DE9B05DF 9BB30E1E 8E2EB30C 3E032EE7 D1FF66BE
DF9BB30E 1E8E2EB3 0C3E032E E7D1FF66 BE8B3276 0054968A 9AFEDE9E DC9BB428
10EB08C4 83005496 EF9A0054 968F9AB4 2806DC2E 9BFEF6B6 D89BFEFA A6DE9B05
B30E1E8E 2EB30C3E 032EE7D1 FF66BE8B 08C48300 5496EF9A 0054968F 9AEED99B
A6DE9B05 DF9BB312 1E8E2EB3 103E032E E7D1FF66 BE8BFEDE 9EDD9BEE D99B0589
2EE7D1FF 66BE8B32 76005496 8A9AFEDE 9EDC9BB4 2806DC2E 9BFEF6B6 D89BFEFA
54968F9A B42806DC 2E9BFEF6 B6D89BFE FAA6DE9B 05DF9BB3 121E8E2E B3103E03
D1FF66BE 8B08C483 005496EF 9A005496 8F9AEED9 9B10EB08 C4830054 96EF9A00
FF66BE83 FF6686FF 04EB0000 FF6686C7 FED9E905 89B3121E 8E2EB310 3E032EE7
8F9AFF6C 8ED89B05 DF9BB326 1E8E2EB3 243E032E E7D1FF66 BE8B01DA E9037C03
66BE8B05 89B3261E 8E2EB324 3E032EE7 D1FF66BE 8B08C483 005496EF 9A005496
83005496 EF9A0054 968F9AFF 6C8ED89B 05DF9BB3 2E1E8E2E B32C3E03 2EE7D1FF
2EB3343E 032EE7D1 FF66BE8B 0589B32E 1E8E2EB3 2C3E032E E7D1FF66 BE8B08C4
2EE7D1FF 66BE8B08 C4830054 96EF9A00 54968F9A FF6C8ED8 9B05DF9B B3361E8E
D89B05DF 9BB34E1E 8E2EB34C 3E032EE7 D1FF66BE 8B0589B3 361E8E2E B3343E03
B34E1E8E 2EB34C3E 032EE7D1 FF66BE8B 08C48300 5496EF9A 0054968F 9AFF6C8E
26DC2E9B B4300EDC 2E9B05D9 9BB3461E 8E2EB344 3E032E02 E7C1FF66 BE8B0589
3E032E02 E7C1FF66 BE8B1DD9 9BB3461E 8E2EB344 3E032E02 E7C1FF66 BE8BB430
3E032E02 E7C1FF66 BE8BB430 26DC2E9B B4300EDC 2E9B05D9 9BB3161E 8E2EB314
8E2EB32C 36032EE6 D1FF66B6 8BFEA5E9 0374050A 7E831DD9 9BB3161E 8E2EB314
0001FF44 86C7067D 043B2605 8BB30E1E 8E2EB30C 3E032EE7 D1FF66BE 8BB32E06
B3121E8E 2EB3103E 032EE7D1 FF66BE8B B326068E 2EB32436 032EE6D1 FF66B68B
66BE8BB3 4E068E2E B34C3603 2EE6D1FF 66B68B00 01FF4286 C7067E04 3B26058B
FE18E900 01FF4086 C7FE21E9 037F043B 26058BB3 121E8E2E B3103E03 2EE7D1FF
36C42E00 01FF4486 C7067D04 3B26058B B30C3EC5 2EB32C36 C42E4574 050A7E83
058BB310 3EC52EB3 4C36C42E 0001FF42 86C7067E 043B2605 8BB3103E C52EB324
9AB43836 FF2EB43A 36FF2E12 74003D80 B28C3EC5 2E0001FF 4086C706 7E043B26
75FFB30C 3EC52E04 75FFB30C 3EC52E29 74003D80 B28C3EC5 2E04C483 00544A8A
80B28C3E C52E0AC4 8300544A 8A9AB43C 36FF2EB4 3E36FF2E 35FFB30C 3EC52E02
B44236FF 2E35FFB3 103EC52E 0275FFB3 103EC52E 0475FFB3 103EC52E 2974003D
FFFF42B6 FFFF40B6 FF1E7400 3D80B28C 3EC52E0A C4830054 4A8A9AB4 4036FF2E
2E029AE9 037401FF 44BE830A C4830054 4A8A9AB4 4436FF2E B44636FF 2EFF44B6
2EFEDE9E DD9B0245 DF9BB32C 3EC52E09 EBE8D99B 057D0001 3D02458B B32C3EC5
005496EF 9A005496 8F9AFEDE B6DC9B0C DE269B02 45DF9BB3 0C3EC52E B32C36C4
DF9BB32C 3EC52E09 EBE8D99B 057D0001 3D04458B B32C3EC5 2EFF3C86 8908C483
8F9AFEDE B6DC9B0C DE269B04 45DF9BB3 0C3EC52E B32C36C4 2EFEDE9E DD9B0445
0C3EC52E 0D7FFF3C 863B058B B30C3EC5 2EFF3A86 8908C483 005496EF 9A005496
D99B057D 00013D05 8BB32C3E C52E0097 E9037505 0A7E8309 7EFF3A86 3B058BB3
DE269B05 DF9BB30C 3EC52EB3 2C36C42E FEDE9EDD 9B05DF9B B32C3EC5 2E08EBE8
2C3EC52E 024589B3 0C3EC52E 08C48300 5496EF9A 0054968F 9AFEDEB6 DC9B024C
2EB32C36 C42EFEDE 9EDD9B05 DF9BB32C 3EC52E08 EBE8D99B 057D0001 3D058BB3
C52E08C4 83005496 EF9A0054 968F9AFE DEB6DC9B 044CDE26 9B05DF9B B30C3EC5
3A863BFF 3C868B00 A8E9037C 053BFF3C 868BB30C 3EC52E01 50E90445 89B30C3E

45DF9BB3 2C3EC52E 09EBE8D9 9B057D00 013D0245 8BB32C3E C52E009B E9037EFF
968F9AFE DEB6DC9B 0CDE269B 0245DF9B B30C3EC5 2EB32C36 C42EFEDE 9EDD9B02
D99B057D 00013D02 458BB32C 3EC52E05 89B30C3E C52E08C4 83005496 EF9A0054
9B0245DF 9BB30C3E C52EB32C 36C42EFE DE9EDD9B 0245DF9B B32C3EC5 2E09EBE8
98E90445 89B30C3E C52E08C4 83005496 EF9A0054 968F9AFE DEB6DC9B 044CDE26
DE9EDD9B 0445DF9B B32C3EC5 2E09EBE8 D99B057D 00013D04 458BB32C 3EC52E00
96EF9A00 54968F9A FEDEB6DC 9B0CDE26 9B0445DF 9BB30C3E C52EB32C 36C42EFE
C52E09EB E8D99B05 7D00013D 04458BB3 2C3EC52E 0589B30C 3EC52E08 C4830054
9B024CDE 269B0445 DF9BB30C 3EC52EB3 2C36C42E FEDE9EDD 9B0445DF 9BB32C3E
037401FF 40BE8302 4589B30C 3EC52E08 C4830054 96EF9A00 54968F9A FEDEB6DC
DE269B02 45DF9BB3 103EC52E B34C36C4 2EFEE486 8902458B B34C3EC5 2E01F2E9
8904458B B34C3EC5 2EFF3C86 8908C483 005496EF 9A005496 8F9AFEE4 B6DE9B0C
9A005496 8F9AFEE4 B6DE9B0C DE269B04 45DF9BB3 103EC52E B34C36C4 2EFEE486
3B058BB3 103EC52E 0D7CFF3C 863B058B B3103EC5 2EFF3A86 8908C483 005496EF
B3103EC5 2EB34C36 C42EFEE4 8689058B B34C3EC5 2E717405 0A7E8306 7DFF3A86
89B3103E C52E08C4 83005496 EF9A0054 968F9AFE E4B6DE9B 024CDE26 9B05DF9B
9B044CDE 269B05DF 9BB3103E C52EB34C 36C42EFE E4868905 8BB34C3E C52E0245
103EC52E 00F9E904 4589B310 3EC52E08 C4830054 96EF9A00 54968F9A FEE4B6DE
2EFEE486 8902458B B34C3EC5 2E727CFF 3A863BFF 3C868B7C 7E053BFF 3C868BB3
005496EF 9A005496 8F9AFEE4 B6DE9B0C DE269B02 45DF9BB3 103EC52E B34C36C4
B3103EC5 2EB34C36 C42EFEE4 86890245 8BB34C3E C52E0589 B3103EC5 2E08C483
B3103EC5 2E08C483 005496EF 9A005496 8F9AFEE4 B6DE9B04 4CDE269B 0245DF9B
9B0445DF 9BB3103E C52EB34C 36C42EFE E4868904 458BB34C 3EC52E70 EB044589
4C3EC52E 0589B310 3EC52E08 C4830054 96EF9A00 54968F9A FEE4B6DE 9B0CDE26
FEE4B6DE 9B024CDE 269B0445 DF9BB310 3EC52EB3 4C36C42E FEE48689 04458BB3
830406E9 037400FF 40BE8302 4589B310 3EC52E08 C4830054 96EF9A00 54968F9A
C4830054 969D9A50 042B2605 8BB34C3E C52EB324 36C42E03 FCE90374 01FF42BE
02C48300 54969D9A 5002442B 2602458B B34C3EC5 2EB32436 C42EFF36 9ED99B02
9B02C483 0054969D 9A500444 2B260445 8BB34C3E C52EB324 36C42EFF 329ED99B
DD9B02C4 83005496 9D9A5002 442B2602 458BB310 3EC52EB3 2436C42E FF2E9ED9
FED68EDC 9B02C483 0054969D 9A50042B 26058BB3 4C3EC52E B32436C4 2EFED69E
5496EF9A 0054968F 9AFEDE86 DC9B05DF 9BB3243E C52EFEDE 9EDD9BFF 32B6D89B
83005496 9D9A5004 442B2604 458BB310 3EC52EB3 2436C42E FF3C8689 08C48300
9B02C483 0054969D 9A50042B 26058BB3 4C3EC52E B32436C4 2EFED69E DD9B02C4
0054968F 9AFEDE86 DC9B05DF 9BB3243E C52EFEDE 9EDD9BFF 2EB6D89B FED68EDC
058BB310 3EC52E0D 7CFF3C86 3B058BB3 103EC52E FF3A8689 08C48300 5496EF9A
9A50042B 26058BB3 103EC52E B32436C4 2E00D5E9 0375050A 7E83097D FF3A863B
9D9A5002 442B2602 458BB34C 3EC52EB3 2436C42E FED69EDD 9B02C483 0054969D
DC9B0245 DF9BB324 3EC52EFE DE9EDD9B FF36B6D8 9BFED68E DC9B02C4 83005496
3EC52EB3 2436C42E 024589B3 103EC52E 08C48300 5496EF9A 0054968F 9AFEDE86
8BB34C3E C52EB324 36C42EFE D69EDD9B 02C48300 54969D9A 50042B26 058BB310
C52EFEDE 9EDD9BFF 36B6D89B FED68EDC 9B02C483 0054969D 9A500444 2B260445
4589B310 3EC52E08 C4830054 96EF9A00 54968F9A FEDE86DC 9B0445DF 9BB3243E
D5E9037D FF3A863B FF3C868B 00E2E903 7F053BFF 3C868BB3 103EC52E 01E1E904
FED69EDD 9B02C483 0054969D 9A500244 2B260245 8BB3103E C52EB324 36C42E00
B6D89BFE D68EDC9B 02C48300 54969D9A 50042B26 058BB34C 3EC52EB3 2436C42E
C4830054 96EF9A00 54968F9A FEDE86DC 9B05DF9B B3243EC5 2EFEDE9E DD9BFF32
83005496 9D9A5002 442B2602 458BB310 3EC52EB3 2436C42E 0589B310 3EC52E08
C4830054 969D9A50 04442B26 04458BB3 4C3EC52E B32436C4 2EFED69E DD9B02C4
8F9AFEDE 86DC9B04 45DF9BB3 243EC52E FEDE9EDD 9BFF32B6 D89BFED6 8EDC9B02
3BFF3A86 8BB3103E C52E00EF E9044589 B3103EC5 2E08C483 005496EF 9A005496
04458BB3 103EC52E B32436C4 2E00D2E9 037FFF3C 863BFF3A 868B00DF E9037F05
2B26058B B34C3EC5 2EB32436 C42EFED6 9EDD9B02 C4830054 969D9A50 04442B26
DF9BB324 3EC52EFE DE9EDD9B FF2EB6D8 9BFED68E DC9B02C4 83005496 9D9A5004
2EB32436 C42E0589 B3103EC5 2E08C483 005496EF 9A005496 8F9AFEDE 86DC9B05
C52EB324 36C42EFE D69EDD9B 02C48300 54969D9A 5004442B 2604458B B3103EC5
9EDD9BFF 2EB6D89B FED68EDC 9B02C483 0054969D 9A500244 2B260245 8BB34C3E
3EC52E08 C4830054 96EF9A00 54968F9A FEDE86DC 9B0245DF 9BB3243E C52EFEDE
C4830054 4A8A9AB4 4836FF2E B44A36FF 2E127400 3D80B28C 3EC52E02 4589B310
B30C3EC5 2E0275FF B30C3EC5 2E0475FF B30C3EC5 2E297400 3D80B28C 3EC52E04
C52E2974 003D80B2 8C3EC52E 0AC48300 544A8A9A B44C36FF 2EB44E36 FF2E35FF
9AB45036 FF2EB452 36FF2E35 FFB3103E C52E0275 FFB3103E C52E0475 FFB3103E
E7D1FF66 BE8B427D 03FF66BE 83FF6686 FF04EB00 00FF6686 C70AC483 00544A8A
103E032E E7D1FF66 BE8B12EB 0FFFB805 7E0FFF3D 058BB312 1E8E2EB3 103E032E
0C3EC52E B3EB0589 B3121E8E 2EB3103E 032EE7D1 FF66BE8B 058BB312 1E8E2EB3
8BB30C3E C52E0245 89B29C3E C52E0245 8BB30C3E C52E0589 B29C3EC5 2E058BB3
02458BB3 103EC52E 0589B2A0 3EC52E05 8BB3103E C52E0445 89B29C3E C52E0445
3EC52EB2 E836C42E 044589B2 A03EC52E 04458BB3 103EC52E 024589B2 A03EC52E
C52EFF68 8689042B 26058BB3 243EC52E B32C36C4 2EFF6A86 89042B26 058BB2E0

9BB45426 DC2E9B05 DF9BB32C 3EC52E12 77005496 8A9AF05E DC9B05DF 9BB32C3E
2E9B05DF 9BB2E83E C52E1277 0054968A 9AF85EDC 9B05DF9B B2E83EC5 2EF05EDD
05DF9BB2 E83EC52E D85EDD9B F866DC9B 05DF9BB2 E03EC52E F85EDD9B B45426DC
5EDD9B08 C4830054 D9849A00 54968F9A D876DC9B D046DD9B D05EDD9B F866DC9B
DC9BF066 DC9B05DF 9BB3243E C52EFEDE 9EDD9BF0 66DC9B05 DF9BB32C 3EC52EC8
C05EDD9B C04EDC9B E846DD9B C05EDD9B 08C48300 54D9849A 0054968F 9AFEDEB6
C69EDD9B 10C48300 54D1809A 0054968F 9AB40406 DD2E9B00 54968F9A C046DD9B
9EDD9B10 C4830054 D1809A00 54968F9A B40406DD 2E9B0054 968F9AC0 46DD9BFE
DE9EDD9B FECE8EDC 9B05DF9B B32C3EC5 2EFED69E DD9BFEC6 A6DC9BE8 D99BFECE
9D9A50D8 F7FF6A86 8BF05EDD 9BFED6B6 DC9BFEDE A6DC9B05 DF9BB324 3EC52EFE
FEDE9EDD 9BB84EDC 9B05DF9B B32C3EC5 2EB85EDD 9BFF68B6 DE9B02C4 83005496
9AF046DD 9B3F7400 3D80B28C 3EC52EB0 5EDD9BFE DEA6DC9B 05DF9BB2 E03EC52E
9B005496 8F9AE846 DD9B0054 968F9AC8 46DD9B00 54968F9A C046DD9B 0054968F
80B28C3E C52E2CC4 8300544A 8A9AB45C 36FF2EB4 5E36FF2E 0054968F 9AF846DD
B46036FF 2EB46236 FF2E0054 968F9AB8 46DD9B00 54968F9A B046DD9B 2474003D
DD9B04C4 8300549B D59A5000 1205B2B8 068B2EB2 BA36FF2E 14C48300 544A8A9A
B3103EC5 2E097D04 3B26058B B3103EC5 2EB32436 C42EA05E DD9BC076 DC9BC846
05DF9BB3 2C3EC52E 0054968F 9AA046DD 9BFF6686 89058BB3 243EC52E 07EB058B
54D1809A 0054968F 9AFEDEB6 DC9BF066 DC9BFF66 86DF9BFE DE9EDD9B F066DC9B
66DC9BB0 46DC9BB8 4EDC9BFF 6686DF9B E05EDD9B F846DC9B D84EDC9B 10C48300
058BB32C 3EC52E98 5EDD9BE0 46DC9BA8 4EDC9B05 D99BB344 3EC52EA8 5EDD9BE0
2EB32C36 C42EFED6 9EDD9B24 DE269B05 DF9BB324 3EC52EB3 2C36C42E FED48689
0245DF9B B3103EC5 2EB32C36 C42EFEDE 9EDD9B02 64DE269B 0245DF9B B3243EC5
C4830054 96EF9A00 54968F9A FED486DE 9BFED68E DC9BFEDE B6DC9B02 64DE269B
89058BB3 243EC52E 07EBFF66 868B067D 053BFF66 868BB324 3EC52EFF 66868908
86DF9BFE DE9EDD9B F066DC9B 05DF9BB3 2C3EC52E 0054968F 9AA046DD 9BFF6686
F846DC9B D84EDC9B 10C48300 54D1809A 0054968F 9AFEDEB6 DC9BF066 DC9BFF66
D99BB344 3EC52EA8 5EDD9BE0 66DC9BB0 46DC9BB8 4EDC9BFF 6686DF9B E05EDD9B
2EB32C36 C42EFED4 8689058B B32C3EC5 2EFF169E DD9BE046 DC9BA84E DC9B0445
269B0445 DF9BB324 3EC52EB3 2C36C42E FED69EDD 9B24DE26 9B05DF9B B3243EC5
FEDEB6DC 9B0464DE 269B0445 DF9BB310 3EC52EB3 2C36C42E FEDE9EDD 9B0464DE
B3243EC5 2EFF6686 8908C483 005496EF 9A005496 8F9AFED4 86DE9BFE D68EDC9B
968F9AA0 46DD9BFF 66868905 8BB3243E C52E07EB FF66868B 067D053B FF66868B
DEB6DC9B F066DC9B FF6686DF 9BFEDE9E DD9BF066 DC9B05DF 9BB32C3E C52E0054
9BFF6686 DF9BE05E DD9BF846 DC9BD84E DC9B10C4 830054D1 809A0054 968F9AFE
E046DC9B A84EDC9B 0845D99B B3443EC5 2EA85EDD 9BE066DC 9BB046DC 9BB84EDC
2E07EB05 8BB30C3E C52E097E 043B2605 8BB30C3E C52EB32C 36C42EFF 0E9EDD9B
9BF066DC 9B05DF9B B32C3EC5 2E005496 8F9AA046 DD9BFF66 8689058B B32C3EC5
9B10C483 0054D180 9A005496 8F9AFEDE B6DC9BF0 66DC9BFF 6686DF9B FEDE9EDD
A85EDD9B E066DC9B B046DC9B B84EDC9B FF6686DF 9BE05EDD 9BF846DC 9BD84EDC
2EFED486 89058BB3 2C3EC52E 905EDD9B E046DC9B A84EDC9B 05D99BB3 443EC52E
9BB3243E C52EB32C 36C42EFE D69EDD9B 24DE269B 05DF9BB3 243EC52E B32C36C4
0264DE26 9B0245DF 9BB30C3E C52EB32C 36C42EFE DE9EDD9B 0264DE26 9B0245DF
FF668689 08C48300 5496EF9A 0054968F 9AFED486 DE9BFED6 8EDC9BFE DEB6DC9B
DD9BFF66 8689058B B32C3EC5 2E07EBFF 66868B06 7E053BFF 66868BB3 2C3EC52E
66DC9BFF 6686DF9B FEDE9EDD 9BF066DC 9B05DF9B B32C3EC5 2E005496 8F9AA046
9BE05EDD 9BF846DC 9BD84EDC 9B10C483 0054D180 9A005496 8F9AFEDE B6DC9BF0
4EDC9B04 45D99BB3 443EC52E A85EDD9B E066DC9B B046DC9B B84EDC9B FF6686DF
9BB3243E C52EB32C 36C42EFE D4868905 8BB32C3E C52EFF26 9EDD9BE0 46DC9BA8
DD9B0464 DE269B04 45DF9BB3 243EC52E B32C36C4 2EFED69E DD9B24DE 269B05DF
FED68EDC 9BFEDEB6 DC9B0464 DE269B04 45DF9BB3 0C3EC52E B32C36C4 2EFEDE9E
3BFF6686 8BB32C3E C52EFF66 868908C4 83005496 EF9A0054 968F9AFE D486DE9B
3EC52E00 54968F9A A046DD9B FF668689 058BB32C 3EC52E07 EBFF6686 8B067E05
54968F9A FEDEB6DC 9BF066DC 9BFF6686 DF9BFEDE 9EDD9BF0 66DC9B05 DF9BB32C
DC9BB84E DC9BFF66 86DF9BE0 5EDD9BF8 46DC9BD8 4EDC9B10 C4830054 D1809A00
FF1E9EDD 9BE046DC 9BA84EDC 9B0845D9 9BB3443E C52EA85E DD9BE066 DC9BB046
0A730054 968A9AFF 269EDC9B FEFE86DD 9B367505 0A7E83FE FE9EDD9B 9046DD9B
FF1E86DD 9B0A7300 54968A9A FF1E9EDC 9BFEFE86 DD9BFEFE 9EDD9BFF 2686DD9B
8A9AFF16 9EDC9BFF 0686DD9B 3675050A 7E83FF06 9EDD9B98 46DD9BFE FE9EDD9B
0A760054 968A9AFF 0E9EDC9B FF0686DD 9BFF069E DD9BFF16 86DD9B0A 76005496
83005496 9D9A5004 2B26058B B3103EC5 2EB30C36 C42EFF06 9EDD9BFF 0E86DD9B
9A005496 8F9AFEDE 86DC9B05 DF9BB30C 3EC52EFE DE9EDD9B B46436DC 2E9B02C4
969D9A50 02442B26 02458BB3 103EC52E B30C36C4 2EFEF086 8908C483 005496EF
8F9AFEDE 86DC9B02 45DF9BB3 0C3EC52E FEDE9EDD 9BB46436 DC2E9B02 C4830054
04442B26 04458BB3 103EC52E B30C36C4 2EFEF286 8908C483 005496EF 9A005496
86DC9B04 45DF9BB3 0C3EC52E FEDE9EDD 9BB46436 DC2E9B02 C4830054 969D9A50
9AA046DD 9BFF6686 89FEF086 8BFEF486 8908C483 005496EF 9A005496 8F9AFEDE
DC9BF066 DC9BFF66 86DF9BFE DE9EDD9B F066DC9B 05DF9BB3 2C3EC52E 0054968F
6686DF9B E05EDD9B F846DC9B D84EDC9B 10C48300 54D1809A 0054968F 9AFEDEB6

46DC9BA8 4EDC9B05 D99BB344 3EC52EA8 5EDD9BE0 66DC9BB0 46DC9BB8 4EDC9BFF
86C70000 FF6286C7 0000FF64 86C70000 FF5886C7 0000FF5A 86C7FF70 9EDD9BE0
54868905 8BB3243E C52E0000 FEEC86C7 0000FEEE 86C70000 FF5E86C7 0000FF60
058BB32C 3EC52EFF 4A868904 458BB324 3EC52EFF 50868902 458BB324 3EC52EFF
8F9AA046 DD9B02D1 E9037E05 3BFF6686 8BB3243E C52EFF66 86FF04EB FF668689
B6DC9BF0 66DC9BFF 6686DF9B FEDE9EDD 9BF066DC 9B05DF9B B32C3EC5 2E005496
FF6686DF 9BE05EDD 9BF846DC 9BD84EDC 9B10C483 0054D180 9A005496 8F9AFEDE
E046DC9B A84EDC9B 05D99BB3 443EC52E A85EDD9B E066DC9B B046DC9B B84EDC9B
01FF5A86 C70E7500 FF5ABE83 15730054 968A9AFE FE9EDC9B 8846DD9B 885EDD9B
0E7500FF 58BE8315 73005496 8A9AFF06 9EDC9B88 46DD9BFF 568689FF 66868B00
9D9A5004 2B26058B B3243EC5 2EB32C36 C42EFF54 8689FF66 868B0001 FF5886C7
9B02C483 0054969D 9A50052B FF66868B B32C3EC5 2EFECE9E DD9B02C4 83005496
DC9B02C4 83005496 9D9A5002 442B2602 458BB324 3EC52EB3 2C36C42E FED69EDD
DE86DC9B 0245DF9B B32C3EC5 2EFEDE9E DD9BB428 06DC2E9B FECEB6DC 9BFED68E
9BA84EDC 9B0445D9 9BB3443E C52EFF5C 868908C4 83005496 EF9A0054 968F9AFE
0E7500FF 64BE8315 73005496 8A9AFEFE 9EDC9BFF 7886DD9B FF789EDD 9BE046DC
83157300 54968A9A FF069EDC 9BFF7886 DD9BFF52 8689FF5C 868B0001 FF6486C7
8A9AFF70 9EDC9BFF 7886DD9B FF508689 FF5C868B 0001FF62 86C70E75 00FF62BE
2EB32C36 C42EFEF2 8689FF5C 868B0001 FEEE86C7 0E7500FE EEBE8315 73005496
FF66868B B32C3EC5 2EFECE9E DD9B02C4 83005496 9D9A5004 2B26058B B3243EC5
442B2604 458BB324 3EC52EB3 2C36C42E FED69EDD 9B02C483 0054969D 9A50052B
2EFEDE9E DD9BB428 06DC2E9B FECEB6DC 9BFED68E DC9B02C4 83005496 9D9A5004
C52EFF4E 868908C4 83005496 EF9A0054 968F9AFE DE86DC9B 0445DF9B B32C3EC5
54968A9A FEFE9EDC 9B8046DD 9B805EDD 9BE046DC 9BA84EDC 9B0845D9 9BB3443E
069EDC9B 8046DD9B FF4C8689 FF4E868B 0001FF60 86C70E75 00FF60BE 83157300
46DD9BFF 4A8689FF 4E868B00 01FF5E86 C70E7500 FF5EBE83 15730054 968A9AFF
0001FEEC 86C7FD2C E9037400 FEECBE83 FD36E903 72005496 8A9AFF70 9EDC9B80
40BE8305 89B29C3E C52EFF56 868B0B75 00FF44BE 83FD1BE9 FEF48689 FF4E868B
52868B0C 7500FF44 BE830589 B2A03EC5 2EFF5486 8B0B7500 FF42BE83 127500FF
B2A03EC5 2EFF5086 8B0C7500 FF42BE83 137500FF 40BE8302 4589B29C 3EC52EFF
42BE8313 7500FF40 BE830445 89B29C3E C52EFF4C 868B0C75 00FF44BE 83024589
FFB29C3E C52E2974 003D80B2 8C3EC52E 044589B2 A03EC52E FF4A868B 0C7500FF
00544A8A 9AB46C36 FF2EB46E 36FF2E35 FFB29C3E C52E0275 FFB29C3E C52E0475
3EC52E02 75FFB2A0 3EC52E04 75FFB2A0 3EC52E29 74003D80 B28C3EC5 2E0AC483
1E74003D 80B28C3E C52E0AC4 8300544A 8A9AB470 36FF2EB4 7236FF2E 35FFB2A0
FF2E0AC4 8300544A 8A9AB474 36FF2EB4 7636FF2E FEF0B6FF FEF2B6FF FEF4B6FF
0000FF66 86C700D2 E90A468B 04C48300 549BD59A 50001205 B2B8068B 2EB2BA36
B29E1E8E 2EB29C3E 032EE7D1 FF66BE8B 00D5E903 7C03FF66 BE83FF66 86FF04EB
2EB2A03E 032EE7D1 FF66BE8B 0589B30E 1E8E2EB3 0C3E032E E7D1FF66 BE8B058B
0000FF66 86C7A8EB 0589B312 1E8E2EB3 103E032E E7D1FF66 BE8B058B B2A21E8E
8B058BB2 9E1E8E2E B29C3E03 2EE7D1FF 66BE8B78 7D03FF66 BE83FF66 86FF04EB
83FF6686 FF04EB00 00FF6686 C7CFEB05 89B30E1E 8E2EB30C 3E032EE7 D1FF66BE
032EE7D1 FF66BE8B 058BB2A2 1E8E2EB2 A03E032E E7D1FF66 BE8B3F7D 03FF66BE
33A9FAA9 9AAA7BA7 FF2ED88B E0D11377 00043D48 CFEB0589 B3121E8E 2EB3103E
032EE7D1 FF66BE8B 427F02FF 66BE83FF 6686FF04 EB0000FF 6686C7A9 9AAA85AA
FD03E7D1 FF66BE8B FEE68589 1F16FD03 E7D1FF66 BE8B058B B3361E8E 2EB3343E
B40406DD 2E9BB3EB 0589B336 1E8E2EB3 343E032E E7D1FF66 BE8BFEF0 858B1F16
3EC52EB2 E836C42E E85EDD9B B41406DD 2E9BF05E DD9BB40C 06DD2E9B F85EDD9B
C52EFF68 8689042B 26058BB3 103EC52E B30C36C4 2EFF6A86 89042B26 058BB2E0
9BB45426 DC2E9B05 DF9BB30C 3EC52E12 77005496 8A9AF05E DC9B05DF 9BB30C3E
2E9B05DF 9BB2E83E C52E1277 0054968A 9AF85EDC 9B05DF9B B2E83EC5 2EF05EDD
05DF9BB2 E83EC52E D85EDD9B F866DC9B 05DF9BB2 E03EC52E F85EDD9B B45426DC
5EDD9B08 C4830054 D9849A00 54968F9A D876DC9B D046DD9B D05EDD9B F866DC9B
DC9BF066 DC9B05DF 9BB3103E C52EFEDE 9EDD9BF0 66DC9B05 DF9BB30C 3EC52EC8
C05EDD9B C04EDC9B E846DD9B C05EDD9B 08C48300 54D9849A 0054968F 9AFEDEB6
C69EDD9B 10C48300 54D1809A 0054968F 9AB40406 DD2E9B00 54968F9A C046DD9B
9EDD9B10 C4830054 D1809A00 54968F9A B40406DD 2E9B0054 968F9AC0 46DD9BFE
DE9EDD9B FECE8EDC 9B05DF9B B30C3EC5 2EFED69E DD9BFEC6 A6DC9BE8 D99BFECE
9D9A50D8 F7FF6A86 8BF05EDD 9BFED6B6 DC9BFEDE A6DC9B05 DF9BB310 3EC52EFE
FEDE9EDD 9BB84EDC 9B05DF9B B30C3EC5 2EB85EDD 9BFF68B6 DE9B02C4 83005496
9AF046DD 9B3F7400 3D80B28C 3EC52EB0 5EDD9BFE DEA6DC9B 05DF9BB2 E03EC52E
9B005496 8F9AE846 DD9B0054 968F9AC8 46DD9B00 54968F9A C046DD9B 0054968F
80B28C3E C52E2CC4 8300544A 8A9AB478 36FF2EB4 7A36FF2E 0054968F 9AF846DD
B47C36FF 2EB47E36 FF2E0054 968F9AB8 46DD9B00 54968F9A B046DD9B 2474003D
DD9B04C4 8300549B D59A5000 1205B2B8 068B2EB2 BA36FF2E 14C48300 544A8A9A
C52E0054 968F9AA0 46DD9BFF 66868905 8BB3343E C52EA05E DD9BC076 DC9BC846
968F9AFE DEB6DC9B F066DC9B FF6686DF 9BFEDE9E DD9BF066 DC9B05DF 9BB30C3E
9BB84EDC 9BFF6686 DF9BE05E DD9BF846 DC9BD84E DC9B10C4 830054D1 809A0054
FF709EDD 9BE046DC 9BA84EDC 9B05D99B B3143EC5 2EA85EDD 9BE066DC 9BB046DC

2EFECE9E DD9B02C4 83005496 9D9A5002 442B2602 458BB310 3EC52EB3 0C36C42E
C42EFED6 9EDD9B02 C4830054 969D9A50 02442B26 02458BB3 343EC52E B30C36C4
FECEB6DC 9BFED68E DC9B02C4 83005496 9D9A5004 2B26058B B3103EC5 2EB30C36
8908C483 005496EF 9A005496 8F9AFEDE 86DC9B05 DF9BB30C 3EC52EFE DE9EDD9B
9EDD9B02 C4830054 969D9A50 04442B26 04458BB3 103EC52E B30C36C4 2EFF4886
D69EDD9B 02C48300 54969D9A 5004442B 2604458B B3343EC5 2EB30C36 C42EFECE
DC9BFED6 8EDC9B02 C4830054 969D9A50 042B2605 8BB3103E C52EB30C 36C42EFE
83005496 EF9A0054 968F9AFE DE86DC9B 05DF9BB3 0C3EC52E FEDE9EDD 9BFECEB6
9B05DF9B B30C3EC5 2E005496 8F9AA046 DD9BFF66 8689FF48 868BFF46 868908C4
0054D180 9A005496 8F9AFEDE B6DC9BF0 66DC9BFF 6686DF9B FEDE9EDD 9BF066DC
E066DC9B B046DC9B B84EDC9B FF6686DF 9BE05EDD 9BF846DC 9BD84EDC 9B10C483
9BB2A43E C52E045D D99BB2A4 3EC52EA8 76DC9BE0 66DC9BFF 7086DD9B A85EDD9B
45D99BB2 A43EC52E 045DD99B B2A43EC5 2EB43036 DC2E9BB4 3006DC2E 9B0445D9
46868B04 5DD99BB2 A43EC52E B45406DD 2E9B0F73 0054968A 9AB4541E DC2E9B04
9BFEDE9E DD9BF066 DC9B05DF 9BB30C3E C52E0054 968F9AA0 46DD9BFF 668689FF
DC9BD84E DC9B10C4 830054D1 809A0054 968F9AFE DEB6DC9B F066DC9B FF6686DF
FF7086DD 9BA85EDD 9BE066DC 9BB046DC 9BB84EDC 9BFF6686 DF9BE05E DD9BF846
B43006DC 2E9B0845 D99BB2A4 3EC52E08 5DD99BB2 A43EC52E A876DC9B E066DC9B
8A9AB454 1EDC2E9B 0845D99B B2A43EC5 2E085DD9 9BB2A43E C52EB430 36DC2E9B
06DC2E9B 05D99BB3 143EC52E 085DD99B B2A43EC5 2EB45406 DD2E9B0F 73005496
FF66BE83 FF6686FF 04EB0000 FF6686C7 1DD99BB2 A43EC52E B43036DC 2E9BB430
361E8E2E B3343E03 2EE7D1FF 66BE8BFE E6858B1F 16FD03E7 D1FF66BE 8B227D03
C4830054 4A8A9AB4 8036FF2E B48236FF 2E014DE9 037401FE FCBE83D3 EB0589B3
9EDD9BB4 8406DF2E 9B0125E9 037C03FF 66BE83FF 6686FF04 EB0000FF 6686C704
9BFEFA86 DE9BFEF6 8ED89B05 DF9BB29E 1E8E2EB2 9C3E032E E7D1FF66 BE8BFEDE
9E1E8E2E B29C3E03 2EE7D1FF 66BE8B32 73005496 8A9AFEDE 9EDC9BB4 2806DC2E
C4830054 96EF9A00 54968F9A B42806DC 2E9BFEFA 86DE9BFE F68ED89B 05DF9BB2
9C3E032E E7D1FF66 BE8B08C4 83005496 EF9A0054 968F9AB4 8406DF2E 9B13EB08
8E2EB2A0 3E032EE7 D1FF66BE 8BFEDE9E DD9BB484 06DF2E9B 0589B29E 1E8E2EB2
0054968A 9AFEDE9E DC9BB428 06DC2E9B FEFA86DE 9BFEF68E D89B05DF 9BB2A21E
9BFEFA86 DE9BFEF6 8ED89B05 DF9BB2A2 1E8E2EB2 A03E032E E7D1FF66 BE8B3273
9A005496 8F9AB484 06DF2E9B 13EB08C4 83005496 EF9A0054 968F9AB4 2806DC2E
8C3EC52E FECDE905 89B2A21E 8E2EB2A0 3E032EE7 D1FF66BE 8B08C483 005496EF
003D80B2 8C3EC52E 04C48300 544A8A9A B48636FF 2EB48836 FF2E1274 003D80B2
FF2EB48C 36FF2E35 FFB2A03E C52E0275 FFB2A03E C52E0475 FFB2A03E C52E2974
3EC52E04 75FFB29C 3EC52E29 74003D80 B28C3EC5 2E0AC483 00544A8A 9AB48A36
C52E0AC4 8300544A 8A9AB48E 36FF2EB4 9036FF2E 35FFB29C 3EC52E02 75FFB29C
9A0445D9 9BB2A43E C52E0054 968F9A08 45D99BB2 A43EC52E 3B74003D 80B28C3E
00544A8A 9AB49236 FF2EB494 36FF2E00 54968F9A 05D99BB2 A43EC52E 0054968F
004C1F64 004C1596 00147C5C 004C1576 0014951F 00149454 CB5E5FC9 9B1CC483
004C1644 004C7C64 004C1628 004C1611 004C15FA 004C15C7 004C1F70 004C1F6A
004C1687 004C166B 004C1669 004C1EFC 004C1EF8 004C1F1A 004C1F14 004C1F06
004C1F04 004C1709 004C16EB 004C1F00 004C16C8 004C1F0E 004C16A5 004C1F08
004C1784 004C1F62 004C1F56 004C1F4A 004C1F50 004C1762 004C1740 004C1729
004C1F44 004C1802 004C1F32 004C17EA 004C1F2C 004C17D1 004C1F26 004C17B8
004C18AF 004C189A 004C1882 004C184F 004C1F20 004C1831 004C1F38 004C1812
004C195A 004C1938 004C1935 004C1931 004C1925 004C190A 004C18F5 004C18E0
004C1A0C 004C19F0 004C19EE 004C19E4 004C19DC 004C1996 004C198F 004C195C
004C1AF2 004C1ADA 004C1AAA 004C1A7A 004C1A60 004C1A42 004C1A2C 004C1A16
004C1B79 004C1B62 004C1B5F 004C1B3E 004C1B35 004C1B1C 004C1B13 004C1AFB
004C1C3F 004C1C1E 004C1C01 004C1BEA 004C1BD3 004C1BBC 004C1BA6 004C1B90
004C1C77 3F847AE1 47AE147B 403E0000 00000000 40240000 00000000 004C1C5D
004C1CB2 004C1C8C 3FBCAC08 3126E979 3FE00000 00000000 001493AE 00147C3E
004C1D83 3FF00000 00000000 004C1D65 004C1D47 004C1D22 004C1CEE 004C1CD0
004C1E3D 004C1E19 004C1DF9 004C1DDA 004C1DB9 40080000 00000000 004C1DA7
EC1A3EC5 2EEC8B55 5756004C 1ED9004C 1EC0004C 1EA7004C 1E6B0FFF 004C1E4F
83002CFC 9C9A066A EC2236FF 2EEC2436 FF2E147E 003D83EC 1E3EC52E 000205C7
2EEC2436 FF2E147E 003D83EC 1E3EC52E EC8B5557 56CB5E5F C9002CB5 009A06C4
CB5E5FC9 002CB500 9A000105 C7EC1A3E C52E06C4 83002CFC 9C9A036A EC2236FF
289A486A EC2A36FF 2EEC2C36 FF2EEC26 36FF2EEC 2836FF2E 57560000 04C85756
289A00A8 68EC2236 FF2EEC24 36FF2EEC 2E36FF2E EC3036FF 2E57565E 5F0054DE
3E032EE7 D1FC7E8B 0103E903 7C04FC7E 83FC46FF 03EB0000 FC46C75E 5F0054DE
2EE7D1FC 7E8B0589 EC341E8E 2EEC323E 032EE7D1 FC7E8B05 8BEC381E 8E2EEC36
D1FC7E8B 0589EC3C 1E8E2EEC 3A3E032E E7D1FC7E 8B058BEC 401E8E2E EC3E3E03
7E8B0589 EC441E8E 2EEC423E 032EE7D1 FC7E8B05 8BEC481E 8E2EEC46 3E032EE7
4C1E8E2E EC4A3E03 2E02E7C1 FC7E8B05 D99BEC50 1E8E2EEC 4E3E032E 02E7C1FC
E7D1FC7E 8B058BEC 581E8E2E EC563E03 2EE7D1FC 7E8B227D 03FC7E83 1DD99BEC
8B05D99B EC601E8E 2EEC5E3E 032E02E7 C1FC7E8B 0589EC54 1E8E2EEC 523E032E
1E8E2EEC 663E032E 02E7C1FC 7E8B1DD9 9BEC5C1E 8E2EEC5A 3E032E02 E7C1FC7E

EC6A3EC5 2EFEF1E9 1DD99BEC 641E8E2E EC623E03 2E02E7C1 FC7E8B05 D99BEC68
EC7A3EC5 2E000005 C7EC763E C52E0589 EC6E3EC5 2E058BEC 723EC52E 000105C7
16000005 C7EC863E C52E0000 05C7EC82 3EC52E00 0005C7EC 7E3EC52E 000005C7
EC8B5557 56CB5E5F C99B0589 EC8A3EC5 2EFE468B 04C48300 5464499A 50FE468D
2E006A35 FFEC9A3E C52EEC9E 36FF2EEC A036FF2E 3E750001 3D058BEC 8E3EC52E
C4830044 8D319A00 54968F9A 05D99BEC 923EC52E 0054968F 9A05D99B EC963EC5
923EC52E 04C48300 5485699A ECA236FF 2EECA436 FF2E0000 05C7EC8E 3EC52E18
C00B10C4 83005464 779A0054 968F9A05 D99BEC96 3EC52E00 54968F9A 05D99BEC
968F9A05 D99BEC96 3EC52E01 6A35FFEC 9A3EC52E EC9E36FF 2EECA036 FF2E4774
000105C7 EC8E3EC5 2E18C483 00448D31 9A005496 8F9A05D9 9BEC923E C52E0054
EC923EC5 2E00003C C85756CB 5E5FC99B 000105C7 0A7EC507 EB000205 C70A7EC5
3EC52E50 CA468D16 50CE468D 16CA5ED9 9B05D99B EC963EC5 2ECE5ED9 9B05D99B
54B9F79A 0054968F 9ACA46D9 9B005496 8F9ACE46 D99B0054 968F9A05 D99BECA6
D99B0054 968F9ACA 46D99BEC B236FF2E ECB436FF 2E35FFEC B63EC52E 20C48300
00540988 9AECAA36 FF2EECAC 36FF2EEC AE36FF2E ECB036FF 2E005496 8F9ACE46
4689058B ECBE3EC5 2EE44689 058BECBA 3EC52EE2 4689058B ECB23EC5 2E1EC483
0275FFEC C63EC52E 08C48300 5474E29A 35FF0275 FFECC23E C52E50E2 468D16E6
E9037500 4005F7EC CA3EC52E 0CC48300 545B789A 50E2468D 1650F846 8D1635FF
C4830034 CBCA9A35 FFECB23E C52EC656 89C44689 02558B05 8BECCE3E C52E00E2
46890255 8B058BEC CE3EC52E 0589ECB2 3EC52E05 8BC65E8E C47E03E7 D1F88B02
5E8EC47E 032000C7 81E7D1F8 8B02C483 0034CBCA 9A35FFEC BA3EC52E C65689C4
FFECBE3E C52EC656 89C44689 02558B05 8BECCE3E C52E0589 ECBA3EC5 2E058BC6
0589ECBE 3EC52E05 8BC65E8E C47E0340 00C781E7 D1F88B02 C4830034 CBCA9A35
CC699A35 FFECBA3E C52E0589 ECB23EC5 2E02C483 0034CC69 9A35FFEC B23EC52E
ECBE3EC5 2E02C483 0034CC69 9A35FFEC BE3EC52E 0589ECBA 3EC52E02 C4830034
ECB23EC5 2E058B02 5C8E263C 0326E7D1 3D8BECB2 3EC52EEC CE36C42E 62EB0589
3EC52E05 8B025C8E 263C0326 2000C781 E7D13D8B ECBA3EC5 2EECCE36 C42E0589
2E058B02 5C8E263C 03264000 C781E7D1 3D8BECBE 3EC52EEC CE36C42E 0589ECBA
8B1F16FD 03E7D1C8 7E8B5F7D 04C87E83 C846FF03 EB0000C8 46C70589 ECBE3EC5
16FD03E7 D1C87E8B 00FFB803 EBF8458B 1F16FD03 E7D1C87E 8B0E7D00 FF3DF845
F845DF9B 1F16FD03 E7D1C87E 8B0F7E00 F87D831F 16FD03E7 D1C87E8B F845891F
16ECD236 FF2EECD4 36FF2E98 EBE85DD9 9B1F16FD 0302E7C1 C87E8BEE D99B03EB
7D04C87E 83C846FF 03EB0000 C846C70C C483003C C42C9A50 E2468D16 50E8468D
ECD41E8E 2EECD23E 032E02E7 C1C87E8B 5052002E 2DD28CC5 0302E0C1 C8468B33
5A750001 3D058BEC 6A3EC52E C4EB0EC4 83003CFC 5A9A006A 0054968F 9A05D99B
1650DA46 8D1650DE 468D1600 0105C7EC D63EC52E 27750002 3D058BEC 1A3EC52E
DE468D16 000105C7 ECDA3EC5 2E5AEB10 C4830044 794A9A50 D2468D16 50D6468D
EB0000C8 46C733EB 10C48300 447B629A 50D2468D 1650D646 8D1650DA 468D1650
032E02E7 C1C87E8B E845D99B 1F16FD03 02E7C1C8 7E8B237D 04C87E83 C846FF03
00C846C7 00AAE903 7400013D 058BECE2 3EC52ED4 EB1DD99B ECE01E8E 2EECDE3E
8B05D99B ECE01E8E 2EECDE3E 032E02E7 C1C87E8B 747D04C8 7E83C846 FF03EB00
1E8E2EEC E63E032E 02E7C1C8 7E8B15D9 9BECEC1E 8E2EECEA 3E032E02 E7C1C87E
032E02E7 C1C87E8B 05D99BEC D41E8E2E ECD23E03 2E02E7C1 C87E8B1D D99BECE8
83EB1DD9 9BECF01E 8E2EECEE 3E032E02 E7C1C87E 8B15D99B ECF41E8E 2EECF23E
4589ECF6 3EC52EE6 468B3E45 89ECF63E C52EE446 8B3C4589 ECF63EC5 2EE2468B
9B005445 4D9AE85E D99B0054 454D9A00 0042C857 56CB5E5F C99B002C 11859A40
DC2E9B24 D8269B05 D99BECFA 3EC52EEC FE36C42E E05ED99B 0054454D 9AE45ED9
3EC52E00 83E90376 0054968A 9A1DD89B E046D99B ECFA3EC5 2ED65ED9 9BED0236
54968A9A 1DD89BE8 46D99BEC FA3EC52E 70770054 968A9A1D D89BE446 D99BECFA
0054968A 9ACE5EDC 9BE046D9 9BCE5EDD 9BD666D8 9B05D99B ECFE3EC5 2E5D7700
72005496 8A9AC65E DC9BE446 D99BC65E DD9BD666 D89B05D9 9BECFE3E C52E3E72
0A730054 968A9ABE 5EDC9BE8 46D99BBE 5EDD9BD6 66D89B05 D99BECFE 3EC52E1F
02E0C1DA 468B2E7D 03DA7E83 DA46FF03 EB0000DA 46C701AF E9000205 C70A7EC5
5A9A016A 0054968F 9AE045D9 9B1F16FD 0302E7C1 DA7E8B50 5200102D D28CC503
005496EF 9A005496 8F9AF046 D99B0AC7 833C8BEC 3E36C52E C9EB0EC4 83003CFC
005496EF 9A005496 8F9AF446 D99B0AC7 83027C8B EC3E36C5 2E407EC7 3B08C483
005496EF 9A005496 8F9AF846 D99B0AC7 83047C8B EC3E36C5 2E207EC7 3B08C483
003D83EC 1E3EC52E 000105C7 0A7EC501 08E90002 05C70A7E C50A7FC7 3B08C483
381E8E2E EC363E03 2EE7D1DA 7E8B247D 04DA7E83 DA46FF03 EB0000DA 46C7347E
DA46FF03 EB0000DA 46C7D3EB 0589ED0C 1E8E2EED 0A3E032E E7D1DA7E 8B058BEC
C4830054 96EF9A00 54968F9A F045D99B 1F16FD03 02E7C1DA 7E8B2E7D 03DA7E83
46C7487E 003D83EC 1E3EC52E C9EB0589 EC381E8E 2EEC363E 032EE7D1 DA7E8B08
8B058BEC 381E8E2E EC363E03 2EE7D1DA 7E8B247D 04DA7E83 DA46FF03 EB0000DA
9C9A1C6A ED0A36FF 2EED0C36 FF2ED3EB 0589ED10 1E8E2EED 0E3E032E E7D1DA7E
468D1605 89ECB23E C52E0589 ECBA3EC5 2E0589EC BE3EC52E C02B06C4 83002CFC
5756CB5E 5FC99B10 C4830044 7A569A50 E0468D16 50E4468D 1650E846 8D1650DC
C52EFC5E D99B0054 454D9AF0 5ED99BED 1206DD2E 9BF45ED9 9BEED99B 000010C8
968A9A1D D89BFC46 D99BECFE 3EC52E13 77005496 8A9A1DD8 9BFC46D9 9BECFA3E

5A9A016A 0054968F 9AFC46D9 9B50F846 8D1600BC E9000205 C70A7EC5 0A730054
83005496 EF9A0054 968F9AF8 46D99B0A C783067C 8BEC3E36 C52E0EC4 83003CFC
9A005496 8F9AF846 D99B0001 05C70A7E C57BEB00 0205C70A 7EC5097F C73B08C4
2E0589EC BA3EC52E 0589ECBE 3EC52EC0 2B064589 EC363EC5 2E08C483 005496EF
1650F446 8D1650F4 468D1650 FC468D16 1E74003D 83ED1A3E C52E0589 ECB23EC5
468D1650 F0468D16 50F0468D 1650FC46 8D161CEB 10C48300 447A569A 50F4468D
0C05EC5E 068B2EEC 6036FF2E EC8B5557 56CB5E5F C99B10C4 8300447A 569A50F0
FF2E5000 0405EC5E 068B2EEC 6036FF2E 50000805 EC5E068B 2EEC6036 FF2E5000
FFEC9A3E C52EEC9E 36FF2EEC A036FF2E 10C48300 44794A9A EC5E36FF 2EEC6036
8D319A00 54968F9A 05D99BEC 923EC52E 0054968F 9A05D99B EC963EC5 2E006A35
22C85756 CB5E5FC9 9B000005 C7EC8E3E C52E0000 05C7ECD6 3EC52E18 C4830044
454D9AE4 5ED99B00 54454D9A E85ED99B 0054454D 9AEC5ED9 9B005445 4D9A0000
FA3EC52E 0085E903 76005496 8A9A1DD8 9BE046D9 9BECFA3E C52EE05E D99B0054
0054968A 9A1DD89B E846D99B ECFA3EC5 2E727700 54968A9A 1DD89BE4 46D99BEC
D89BE046 D99BECFE 3EC52E4C 77005496 8A9A1DD8 9BEC46D9 9BECFA3E C52E5F77
ECFE3EC5 2E267200 54968A9A 1DD89BE4 46D99BEC FE3EC52E 39720054 968A9A1D
73005496 8A9A1DD8 9BEC46D9 9BECFE3E C52E1372 0054968A 9A1DD89B E846D99B
E0C1DE46 8B2E7D04 DE7E83DE 46FF03EB 0000DE46 C701CFE9 000205C7 0A7EC50A
9A016A00 54968F9A E045D99B 1F16FD03 02E7C1DE 7E8B5052 00102DD2 8CC50302
5496EF9A 0054968F 9AF046D9 9B0AEF83 3C8BEC36 36C52EC9 EB0EC483 003CFC5A
5496EF9A 0054968F 9AF446D9 9B0AEF83 027C8BEC 3636C52E 607DC73B 08C48300
5496EF9A 0054968F 9AF846D9 9B0AEF83 047C8BEC 3636C52E 407DC73B 08C48300
5496EF9A 0054968F 9AFC46D9 9B0AEF83 067C8BEC 3636C52E 207DC73B 08C48300
3D83EC1E 3EC52E00 0105C70A 7EC50108 E9000205 C70A7EC5 0A7CC73B 08C48300
1E8E2EEC 3E3E032E E7D1DE7E 8B247D04 DE7E83DE 46FF03EB 0000DE46 C7347E00
46FF03EB 0000DE46 C7D3EB05 89ED0C1E 8E2EED0A 3E032EE7 D1DE7E8B 058BEC40
83005496 EF9A0054 968F9AF0 45D99B1F 16FD0302 E7C1DE7E 8B2E7D04 DE7E83DE
C7487E00 3D83EC1E 3EC52EC9 EB0589EC 401E8E2E EC3E3E03 2EE7D1DE 7E8B08C4
058BEC40 1E8E2EEC 3E3E032E E7D1DE7E 8B247D04 DE7E83DE 46FF03EB 0000DE46
9A1B6AED 0A36FF2E ED0C36FF 2ED3EB05 89ED101E 8E2EED0E 3E032EE7 D1DE7E8B
8D160589 ECB23EC5 2E0589EC BA3EC52E 0589ECBE 3EC52EC0 2B06C483 002CFC9C
56CB5E5F C99B10C4 8300447C 649A50E0 468D1650 E4468D16 50E8468D 1650EC46
2EFC5ED9 9B005445 4D9AF05E D99BED12 06DD2E9B F45ED99B EED99B00 0010C857
8A9A1DD8 9BFC46D9 9BECFE3E C52E1377 0054968A 9A1DD89B FC46D99B ECFA3EC5
9A016A00 54968F9A FC46D99B 50F8468D 1600BCE9 000205C7 0A7EC50A 73005496
005496EF 9A005496 8F9AF846 D99B0AEF 83067C8B EC3636C5 2E0EC483 003CFC5A
0054968F 9AF846D9 9B000105 C70A7EC5 7BEB0002 05C70A7E C5097CC7 3B08C483
0589ECBA 3EC52E05 89ECBE3E C52EC02B 064589EC 3E3EC52E 08C48300 5496EF9A
50F4468D 1650F446 8D1650FC 468D161E 74003D83 ED1A3EC5 2E0589EC B23EC52E
8D1650F0 468D1650 F0468D16 50FC468D 161CEB10 C4830044 7C649A50 F4468D16
004C1B79 004C1B62 004C1B5F 004C1B3E 004C1B35 004C1B1C 004C1B13 004C1AFB
004C1C3F 004C1C1E 004C1C01 004C1BEA 004C1BD3 004C1BBC 004C1BA6 004C1B90
004C1C77 3F847AE1 47AE147B 403E0000 00000000 40240000 00000000 004C1C5D
004C1CB2 004C1C8C 3FBCAC08 3126E979 3FE00000 00000000 001493AE 00147C3E
004C1D83 3FF00000 00000000 004C1D65 004C1D47 004C1D22 004C1CEE 004C1CD0
004C1E3D 004C1E19 004C1DF9 004C1DDA 004C1DB9 40080000 00000000 004C1DA7
EC1A3EC5 2EEC8B55 5756004C 1ED9004C 1EC0004C 1EA7004C 1E6B0FFF 004C1E4F
83002CFC 9C9A066A EC2236FF 2EEC2436 FF2E147E 003D83EC 1E3EC52E 000205C7
2EEC2436 FF2E147E 003D83EC 1E3EC52E EC8B5557 56CB5E5F C9002CB5 009A06C4
CB5E5FC9 002CB500 9A000105 C7EC1A3E C52E06C4 83002CFC 9C9A036A EC2236FF
289A486A EC2A36FF 2EEC2C36 FF2EEC26 36FF2EEC 2836FF2E 57560000 04C85756
289A00A8 68EC2236 FF2EEC24 36FF2EEC 2E36FF2E EC3036FF 2E57565E 5F0054DE
3E032EE7 D1FC7E8B 0103E903 7C04FC7E 83FC46FF 03EB0000 FC46C75E 5F0054DE
2EE7D1FC 7E8B0589 EC341E8E 2EEC323E 032EE7D1 FC7E8B05 8BEC381E 8E2EEC36
D1FC7E8B 0589EC3C 1E8E2EEC 3A3E032E E7D1FC7E 8B058BEC 401E8E2E EC3E3E03
7E8B0589 EC441E8E 2EEC423E 032EE7D1 FC7E8B05 8BEC481E 8E2EEC46 3E032EE7
4C1E8E2E EC4A3E03 2E02E7C1 FC7E8B05 D99BEC50 1E8E2EEC 4E3E032E 02E7C1FC
E7D1FC7E 8B058BEC 581E8E2E EC563E03 2EE7D1FC 7E8B227D 03FC7E83 1DD99BEC
8B05D99B EC601E8E 2EEC5E3E 032E02E7 C1FC7E8B 0589EC54 1E8E2EEC 523E032E
1E8E2EEC 663E032E 02E7C1FC 7E8B1DD9 9BEC5C1E 8E2EEC5A 3E032E02 E7C1FC7E
EC6A3EC5 2EFEF1E9 1DD99BEC 641E8E2E EC623E03 2E02E7C1 FC7E8B05 D99BEC68
EC7A3EC5 2E000005 C7EC763E C52E0589 EC6E3EC5 2E058BEC 723EC52E 000105C7
16000005 C7EC863E C52E0000 05C7EC82 3EC52E00 0005C7EC 7E3EC52E 000005C7
EC8B5557 56CB5E5F C99B0589 EC8A3EC5 2EFE468B 04C48300 5464499A 50FE468D
2E006A35 FFEC9A3E C52EEC9E 36FF2EEC A036FF2E 3E750001 3D058BEC 8E3EC52E
C4830044 8D319A00 54968F9A 05D99BEC 923EC52E 0054968F 9A05D99B EC963EC5
923EC52E 04C48300 5485699A ECA236FF 2EECA436 FF2E0000 05C7EC8E 3EC52E18
C00B10C4 83005464 779A0054 968F9A05 D99BEC96 3EC52E00 54968F9A 05D99BEC

968F9A05 D99BEC96 3EC52E01 6A35FFEC 9A3EC52E EC9E36FF 2EECA036 FF2E4774
000105C7 EC8E3EC5 2E18C483 00448D31 9A005496 8F9A05D9 9BEC923E C52E0054
EC923EC5 2E00003C C85756CB 5E5FC99B 000105C7 0A7EC507 EB000205 C70A7EC5
3EC52E50 CA468D16 50CE468D 16CA5ED9 9B05D99B EC963EC5 2ECE5ED9 9B05D99B
54B9F79A 0054968F 9ACA46D9 9B005496 8F9ACE46 D99B0054 968F9A05 D99BECA6
D99B0054 968F9ACA 46D99BEC B236FF2E ECB436FF 2E35FFEC B63EC52E 20C48300
00540988 9AECAA36 FF2EECAC 36FF2EEC AE36FF2E ECB036FF 2E005496 8F9ACE46
4689058B ECBE3EC5 2EE44689 058BECBA 3EC52EE2 4689058B ECB23EC5 2E1EC483
0275FFEC C63EC52E 08C48300 5474E29A 35FF0275 FFECC23E C52E50E2 468D16E6
E9037500 4005F7EC CA3EC52E 0CC48300 545B789A 50E2468D 1650F846 8D1635FF
C4830034 CBCA9A35 FFECB23E C52EC656 89C44689 02558B05 8BECCE3E C52E00E2
46890255 8B058BEC CE3EC52E 0589ECB2 3EC52E05 8BC65E8E C47E03E7 D1F88B02
5E8EC47E 032000C7 81E7D1F8 8B02C483 0034CBCA 9A35FFEC BA3EC52E C65689C4
FFECBE3E C52EC656 89C44689 02558B05 8BECCE3E C52E0589 ECBA3EC5 2E058BC6
0589ECBE 3EC52E05 8BC65E8E C47E0340 00C781E7 D1F88B02 C4830034 CBCA9A35
CC699A35 FFECBA3E C52E0589 ECB23EC5 2E02C483 0034CC69 9A35FFEC B23EC52E
ECBE3EC5 2E02C483 0034CC69 9A35FFEC BE3EC52E 0589ECBA 3EC52E02 C4830034
ECB23EC5 2E058B02 5C8E263C 0326E7D1 3D8BECB2 3EC52EEC CE36C42E 62EB0589
3EC52E05 8B025C8E 263C0326 2000C781 E7D13D8B ECBA3EC5 2EECCE36 C42E0589
2E058B02 5C8E263C 03264000 C781E7D1 3D8BECBE 3EC52EEC CE36C42E 0589ECBA
8B1F16FD 03E7D1C8 7E8B5F7D 04C87E83 C846FF03 EB0000C8 46C70589 ECBE3EC5
16FD03E7 D1C87E8B 00FFB803 EBF8458B 1F16FD03 E7D1C87E 8B0E7D00 FF3DF845
F845DF9B 1F16FD03 E7D1C87E 8B0F7E00 F87D831F 16FD03E7 D1C87E8B F845891F
16ECD236 FF2EECD4 36FF2E98 EBE85DD9 9B1F16FD 0302E7C1 C87E8BEE D99B03EB
7D04C87E 83C846FF 03EB0000 C846C70C C483003C C42C9A50 E2468D16 50E8468D
ECD41E8E 2EECD23E 032E02E7 C1C87E8B 5052002E 2DD28CC5 0302E0C1 C8468B33
5A750001 3D058BEC 6A3EC52E C4EB0EC4 83003CFC 5A9A006A 0054968F 9A05D99B
1650DA46 8D1650DE 468D1600 0105C7EC D63EC52E 27750002 3D058BEC 1A3EC52E
DE468D16 000105C7 ECDA3EC5 2E5AEB10 C4830044 794A9A50 D2468D16 50D6468D
EB0000C8 46C733EB 10C48300 447B629A 50D2468D 1650D646 8D1650DA 468D1650
032E02E7 C1C87E8B E845D99B 1F16FD03 02E7C1C8 7E8B237D 04C87E83 C846FF03
00C846C7 00AAE903 7400013D 058BECE2 3EC52ED4 EB1DD99B ECE01E8E 2EECDE3E
8B05D99B ECE01E8E 2EECDE3E 032E02E7 C1C87E8B 747D04C8 7E83C846 FF03EB00
1E8E2EEC E63E032E 02E7C1C8 7E8B15D9 9BECEC1E 8E2EECEA 3E032E02 E7C1C87E
032E02E7 C1C87E8B 05D99BEC D41E8E2E ECD23E03 2E02E7C1 C87E8B1D D99BECE8
83EB1DD9 9BECF01E 8E2EECEE 3E032E02 E7C1C87E 8B15D99B ECF41E8E 2EECF23E
05EC6606 8B2EEC68 36FF2EEC 8B555756 CB5E5FC9 9B10C483 00447C64 9A50F046
2E500004 05EC6606 8B2EEC68 36FF2E50 000805EC 66068B2E EC6836FF 2E50000C
EC9A3EC5 2EEC9E36 FF2EECA0 36FF2E10 C4830044 7B629AEC 6636FF2E EC6836FF
319A0054 968F9A05 D99BEC92 3EC52E00 54968F9A 05D99BEC 963EC52E 006A35FF
C85756CB 5E5FC99B 000005C7 EC8E3EC5 2E000005 C7ECDA3E C52E18C4 8300448D
013D058B ECD63EC5 2E000105 C70A7EC5 0000F246 C700F946 C600FB46 C60000DC
83002CCE 849A50F2 468D1600 2CE4E19A 1575003D 83ED1E3E C52E04CA E9037400
2E697400 4005F7EC CA3EC52E 00AEE903 7400013D 058BED22 3EC52E00 BDE904C4
2E427DFF 28863B02 C4830034 CBCA9A35 FFECB23E C52EFF28 8689058B ED263EC5
217DFF26 863B02C4 830034CB CA9A35FF ECBA3EC5 2EFF2686 8902458B ED263EC5
7CFF2486 3B02C483 0034CBCA 9A35FFEC BE3EC52E FF248689 04458BED 263EC52E
C52EED26 36C42E24 73043B26 058BECB2 3EC52EED 2636C42E 3AEB0001 F246C741
F246C705 7204443B 26058BEC BE3EC52E ED2636C4 2E127302 443B2605 8BECBA3E
6AEC2236 FF2EEC24 36FF2E14 7E003D83 EC1E3EC5 2E00D5E9 037401F2 7E830001
E9037400 3D83ED1E 3EC52E00 2CBF8F9A 000305C7 0A7EC506 C483002C FC9C9A1A
2EED2E3E 032EE7D1 FE7E8B08 CAE9037C 03FE7E83 FE46FF03 EB0000FE 46C708DD
2A3E032E E7D1FE7E 8B0589EC 241E8E2E EC223E03 2EE7D1FE 7E8B058B ED301E8E
032EE7D1 FE7E8B05 8BED381E 8E2EED36 3E032EE7 D1FE7E8B 0589ED2C 1E8E2EED
E7D1FE7E 8B0589ED 341E8E2E ED323E03 2EE7D1FE 7E8B0589 ED281E8E 2EED263E
FF69E905 89EC2C1E 8E2EEC2A 3E032EE7 D1FE7E8B 058BED3C 1E8E2EED 3A3E032E
2CE9999A 0875003D 83ED1E3E C52E0002 05C7EC72 3EC52E00 0005C7EC D63EC52E
46740040 05F7ECCA 3EC52E7D 7500013D 058BED22 3EC52E00 2CE9F99A 008EE900
CBCA9A35 FFECBA3E C52E0589 EC223EC5 2E02C483 0034CBCA 9A35FFEC B23EC52E
223EC52E 02C48300 34CBCA9A 35FFECBE 3EC52E02 4589EC22 3EC52E02 C4830034
EC223EC5 2E058BEC BA3EC52E 0589EC22 3EC52E05 8BECB23E C52E2CEB 044589EC
2436FF2E 147E003D 83EC1E3E C52E0445 89EC223E C52E058B ECBE3EC5 2E024589
E90044CB 7A9A0875 003D83ED 1E3EC52E 06C48300 2CFC9C9A 196AEC22 36FF2EEC
3E3EC52E 04C48300 2CFBB89A 50FF2A86 8D166175 00013D05 8BED223E C52E0122
468D160C C483002C 79689A04 6A50FF39 868D16EC 2236FF2E EC2436FF 2E35FFED
FFECC23E C52EEC22 36FF2EEC 2436FF2E 50FC468D 16016A50 EC468D16 FF6A50E6
C52E0090 E9037400 033D058B ED223EC5 2E009FE9 18C48300 1C921A9A 35FF0275
ECBA3EC5 2EE04689 02C48300 34CBCA9A 35FFECB2 3EC52E38 74004005 F7ECCA3E
EBE44689 02C48300 34CBCA9A 35FFECBE 3EC52EE2 468902C4 830034CB CA9A35FF
16E44689 058BECBE 3EC52EE2 4689058B ECBA3EC5 2EE04689 058BECB2 3EC52E1E
C23EC52E EC2236FF 2EEC2436 FF2E50FC 468D1603 6A50E046 8D16FF6A 50E6468D

3C7B9F9A 006A35FF 0275FFEC C23EC52E 036A18C4 83001C92 1A9A35FF 0275FFEC
FF2EECAC 36FF2EEC AE36FF2E ECB036FF 2E006A00 6A006A50 FC468D16 08C48300
54C0489A FC76FF00 6A006A00 6A006A13 7400FC7E 8312C483 003C7D91 9AECAA36
2E04C483 0054DC75 9A35FF02 75FFEC9E 3EC52E00 0105C7EC 823EC52E 0AC48300
2E005496 8F9A05D9 9BEC963E C52E016A 35FFEC9A 3EC52EEC 9E36FF2E ECA036FF
7E83FE46 FF03EB00 00FE46C7 18C48300 448D319A 0054968F 9A05D99B EC923EC5
D23E032E 02E7C1FE 7E8B5052 EC60168B 2EEC5E06 032E02E0 C1FE468B 367D03FE
80ED423E C52EC1EB 0EC48300 3CFC5A9A 006A0054 968F9A05 D99BECD4 1E8E2EEC
8F9A0C45 D99BECD2 3EC52E50 000C05EC 5E068B2E EC6036FF 2E0558E9 0374013D
2E04CCE9 03740001 3D058BEC DA3EC52E 052FE90E C483003C FC5A9A00 6A005496
C52E00BD E904C483 002CCE84 9A50F246 8D16002C E6AE9A15 75003D83 ED1E3EC5
89058BEC 223EC52E 69740040 05F7ECCA 3EC52E00 AEE90374 00013D05 8BED223E
02458BEC 223EC52E 427EFF28 863B02C4 830034CB CA9A35FF ECB23EC5 2EFF2886
458BEC22 3EC52E21 7EFF2686 3B02C483 0034CBCA 9A35FFEC BA3EC52E FF268689
EB0001F2 46C7417F FF24863B 02C48300 34CBCA9A 35FFECBE 3EC52EFF 24868904
3B26058B ECBA3EC5 2EEC2236 C42E2476 043B2605 8BECB23E C52EEC22 36C42E3A
7401F27E 830001F2 46C70577 04443B26 058BECBE 3EC52EEC 2236C42E 12760244
FE46C700 9EE90374 003D83ED 1E3EC52E 002CC3D0 9A000305 C70A7EC5 00DBE903
8BED301E 8E2EED2E 3E032EE7 D1FE7E8B 008BE903 7C03FE7E 83FE46FF 03EB0000
2C1E8E2E ED2A3E03 2EE7D1FE 7E8B0589 EC241E8E 2EEC223E 032EE7D1 FE7E8B05
8E2EED26 3E032EE7 D1FE7E8B 058BED38 1E8E2EED 363E032E E7D1FE7E 8B0589ED
ED3A3E03 2EE7D1FE 7E8B0589 ED341E8E 2EED323E 032EE7D1 FE7E8B05 89ED281E
EC1E3EC5 2EFF69E9 0589EC2C 1E8E2EEC 2A3E032E E7D1FE7E 8B058BED 3C1E8E2E
2E0360E9 06C48300 2CFC9C9A 1A6AEC22 36FF2EEC 2436FF2E 0377E903 7F003D83
002CE999 9A087500 3D83ED1E 3EC52E00 0105C7EC 723EC52E 000005C7 ECDA3EC5
2E467400 4005F7EC CA3EC52E 7D750001 3D058BED 223EC52E 002CE9F9 9A008EE9
34CBCA9A 35FFECBA 3EC52E05 89ED263E C52E02C4 830034CB CA9A35FF ECB23EC5
ED263EC5 2E02C483 0034CBCA 9A35FFEC BE3EC52E 024589ED 263EC52E 02C48300
89ED263E C52E058B ECBA3EC5 2E0589ED 263EC52E 058BECB2 3EC52E2C EB044589
EC2436FF 2E147E00 3D83EC1E 3EC52E04 4589ED26 3EC52E05 8BECBE3E C52E0245
22E90044 CB7A9A08 75003D83 ED1E3EC5 2E06C483 002CFC9C 9A196AEC 2236FF2E
ED3E3EC5 2E04C483 002CFBB8 9A50FF2A 868D1661 7500013D 058BED22 3EC52E01
E6468D16 0CC48300 2C79689A 046A50FF 39868D16 EC2236FF 2EEC2436 FF2E35FF
75FFECC2 3EC52EEC 2236FF2E EC2436FF 2E50FC46 8D16FF6A 50EC468D 16016A50
3EC52E00 90E90374 00033D05 8BED223E C52E009F E918C483 001C921A 9A35FF02
FFECBA3E C52EDA46 8902C483 0034CBCA 9A35FFEC B23EC52E 38740040 05F7ECCA
1EEBDE46 8902C483 0034CBCA 9A35FFEC BE3EC52E DC468902 C4830034 CBCA9A35
8D16DE46 89058BEC BE3EC52E DC468905 8BECBA3E C52EDA46 89058BEC B23EC52E
ECC23EC5 2EEC2236 FF2EEC24 36FF2E50 FC468D16 FF6A50EC 468D1603 6A50DA46
003C7B9F 9A006A35 FF0275FF ECC23EC5 2E036A18 C483001C 921A9A35 FF0275FF
36FF2EEC AC36FF2E ECAE36FF 2EECB036 FF2E006A 006A006A 50FC468D 1608C483
0054C048 9AFC76FF 006A006A 006A006A 137400FC 7E8312C4 83003C7D 919AECAA
FF2E04C4 830054DC 759A35FF 0275FFEC 9E3EC52E 000105C7 EC823EC5 2E0AC483
C52E0054 968F9A05 D99BEC96 3EC52E01 6A35FFEC 9A3EC52E EC9E36FF 2EECA036
FE46C746 74013D80 ED423EC5 2E18C483 00448D31 9A005496 8F9A05D9 9BEC923E
8B5052EC 68168B2E EC660603 2E02E0C1 FE468B36 7D03FE7E 83FE46FF 03EB0000
C483003C FC5A9A00 6A005496 8F9A05D9 9BECD41E 8E2EECD2 3E032E02 E7C1FE7E
6A005496 8F9A0C45 D99BECD2 3EC52E50 000C05EC 66068B2E EC6836FF 2EC1EB0E
367D04FE 7E83FE46 FF03EB00 00FE46C7 00342BC7 9A54EB0E C483003C FC5A9A00
FE76FF50 52ED4816 8B2EED46 06032E09 E0C1FE46 8BF476FF F676FF50 FC468D16
9B000105 C7EC863E C52EC1EB 12C48300 54C78E9A 50E42AFB 468A50E4 2AF9468A
8A9AED4E 36FF2EED 5036FF2E 1274003D 80ED4A3E C52E0000 1CC85756 CB5E5FC9
00FC46C7 04C48300 549BD59A 50001205 ED52068B 2EED5436 FF2E04C4 8300544A
EC241E8E 2EEC223E 032EE7D1 FE7E8B1B 7D03FE7E 83FE46FF 03EB0000 FE46C700
83FE46FF 03EB0000 FE46C701 11E90375 00FC7E83 DCEB0001 FC46C7E3 7D003D83
8E2EED26 3E032EE7 D1FE7E8B EC24068E 2EEC2236 032EE6D1 FE768B4F 7D03FE7E
05DF9BED 281E8E2E ED263E03 2EE7D1FE 7E8BE45E DD9B24DE 269B05DF 9BED281E
54968A9A F05ED89B EC46D99B A8EBEC5D D99B1F16 FD0302E7 C1FE7E8B E476DC9B
968A9AF8 5ED89BF4 46D99BF8 5ED99BF0 46D99B08 EBF85ED9 9BEC46D9 9B0A7300
D1FE768B 6A7D03FE 7E83FE46 FF03EB00 00FE46C7 F85ED99B F446D99B 08730054
50042B26 058BED28 1E8E2EED 263E032E E7D1FE7E 8BEC2406 8E2EEC22 36032EE6
9BED281E 8E2EED26 3E032EE7 D1FE7E8B E45EDD9B F84ED89B 02C48300 54969D9A
1E8E2EEC 223E032E E7D1FE7E 8B08C483 005496EF 9A005496 8F9AE466 DC9B05DF
EC223E03 2EE7D1FE 7E8B527D 03FE7E83 FE46FF03 EB0000FE 46C78DEB 0589EC24
FE7E8B00 0005C7EC 241E8E2E EC223E03 2EE7D1FE 7E8B137D 003D83EC 241E8E2E
1E8E2EED 263E032E E7D1FE7E 8BBA7E0F FF3D058B ED281E8E 2EED263E 032EE7D1
C52EEC22 36C42E26 7E043B26 058BED26 3EC52EEC 2236C42E A5EB0FFF 05C7ED28
C5097F04 443B2604 458BED26 3EC52EEC 2236C42E 137E0244 3B260245 8BED263E
ED4A3EC5 2E4B7500 013D058B ECD63EC5 2E000005 C70A7EC5 07EB0001 05C70A7E

5836FF2E 35FFED26 3EC52E02 75FFED26 3EC52E04 75FFED26 3EC52E29 74003D80
549BD59A 50001205 ED52068B 2EED5436 FF2E0AC4 8300544A 8A9AED56 36FF2EED
223EC52E 2974003D 80ED4A3E C52E4975 00013D05 8BECDA3E C52E55EB 04C48300
4A8A9AED 5A36FF2E ED5C36FF 2E35FFEC 223EC52E 0275FFEC 223EC52E 0475FFEC
058B0A7E C504C483 00549BD5 9A500012 05ED5206 8B2EED54 36FF2E0A C4830054
C4830054 4A8A9AED 5E36FF2E ED6036FF 2E127400 3D80ED4A 3EC52E32 7500013D
08C85756 CB5E5FC9 9B04C483 00549BD5 9A500012 05ED5206 8B2EED54 36FF2E04
7400013D 058BEC72 3EC52E0F 7400023D 058BEC72 3EC52EF8 5ED99BEE D99B0000
2E3E032E E7D1FE7E 8B008BE9 037C03FE 7E83FE46 FF03EB00 00FE46C7 009EE903
032EE7D1 FE7E8B05 89EC241E 8E2EEC22 3E032EE7 D1FE7E8B 058BED30 1E8E2EED
E7D1FE7E 8B058BED 381E8E2E ED363E03 2EE7D1FE 7E8B0589 ED2C1E8E 2EED2A3E
FE7E8B05 89ED341E 8E2EED32 3E032EE7 D1FE7E8B 0589ED28 1E8E2EED 263E032E
E90589EC 2C1E8E2E EC2A3E03 2EE7D1FE 7E8B058B ED3C1E8E 2EED3A3E 032EE7D1
AC36FF2E ECAE36FF 2EECB036 FF2E006A 006A006A 50FC468D 160044CB 7A9AFF69
9AFC76FF 006A006A 006A006A 137400FC 7E8312C4 83003C7D 919AECAA 36FF2EEC
723EC52E 0C740002 3D058BEC 723EC52E 1D74C00B 0034E5B2 9A0AC483 0054C048
8D1650F8 468D1644 7500023D 058BEC72 3EC52E00 34E7189A 05750001 3D058BEC
55D99BEC 5E3EC52E EED99B10 C4830044 794A9A50 F8468D16 50F8468D 1650F846
3EC52E4E EB1DD99B EC5E3EC5 2E0455D9 9BEC5E3E C52E0855 D99BEC5E 3EC52E0C
7B629A50 F8468D16 50F8468D 1650F846 8D1650F8 468D1642 7500013D 058BEC72
9BEC663E C52E0855 D99BEC66 3EC52E0C 55D99BEC 663EC52E EED99B10 C4830044
9B000014 C85756CB 5E5FC99B 000005C7 EC723EC5 2E1DD99B EC663EC5 2E0455D9
032EE7D1 F07E8B00 A2E9037C 03F07E83 F046FF03 EB0000F0 46C7EC5E D99BEED9
E7D1F07E 8B0589EC 241E8E2E EC223E03 2EE7D1F0 7E8B058B ED641E8E 2EED623E
F07E8B05 8BED681E 8E2EED66 3E032EE7 D1F07E8B 0589ED2C 1E8E2EED 2A3E032E
8B0589ED 341E8E2E ED323E03 2EE7D1F0 7E8B0589 ED281E8E 2EED263E 032EE7D1
1E8E2EED 6E3E032E 02E7C1F0 7E8B0FFF 05C7EC2C 1E8E2EEC 2A3E032E E7D1F07E
ED1E3EC5 2EFF52E9 1DD99BED 6C1E8E2E ED6A3E03 2E02E7C1 F07E8B05 D99BED70
2E50FE46 8D16006A 50F8468D 16006A50 F2468D16 45EB0044 CB7A9A07 75003D83
3EC52E03 6A18C483 001C921A 9A35FF02 75FFECC2 3EC52EEC 2236FF2E EC2436FF
50EC468D 1650EC46 8D1650EC 468D1608 C483003C 7B9F9A00 6A35FF02 75FFECC2
D99BEC5E 3EC52E0C 55D99BEC 5E3EC52E EED99B10 C4830044 794A9A50 EC468D16
468D1650 EC468D16 50EC468D 161DD99B EC5E3EC5 2E0455D9 9BEC5E3E C52E0855
EC663EC5 2E0C55D9 9BEC663E C52EEED9 9B10C483 00447B62 9A50EC46 8D1650EC
9AED6A36 FF2EED6C 36FF2E1D D99BEC66 3EC52E04 55D99BEC 663EC52E 0855D99B
5756CB5E 5FC99B00 3205C7ED 723EC52E 000005C7 EC723EC5 2E04C483 00447D66
C483002C FC9C9A15 6AECB236 FF2EECB4 36FF2E14 7E003D83 EC1E3EC5 2EEC8B55
36FF2E04 C4830054 4A8A9AED 7636FF2E ED7836FF 2E127400 3D80ED4A 3EC52E06
2CE9F99A 000205C7 ED223EC5 2E04C483 00549BD5 9A500012 05ED5206 8B2EED54
35FFECB2 3EC52E46 74004005 F7ECCA3E C52E00C6 E9037400 3D83ED1E 3EC52E00
C52E02C4 830034CB CA9A35FF ECBA3EC5 2E0589ED 323EC52E 02C48300 34CBCA9A
2E2CEB04 4589ED32 3EC52E02 C4830034 CBCA9A35 FFECBE3E C52E0245 89ED323E
BE3EC52E 024589ED 323EC52E 058BECBA 3EC52E05 89ED323E C52E058B ECB23EC5
3EC52E04 75FFED32 3EC52E29 74003D80 ED4A3EC5 2E044589 ED323EC5 2E058BEC
FF2E0AC4 8300544A 8A9AED7A 36FF2EED 7C36FF2E 35FFED32 3EC52E02 75FFED32
C52E0000 02C85756 CB5E5FC9 04C48300 549BD59A 50001205 ED52068B 2EED5436
4A3EC52E 06C48300 2CFC9C9A 136AECB2 36FF2EEC B436FF2E 147E003D 83EC1E3E
068B2EED 5436FF2E 04C48300 544A8A9A ED7E36FF 2EED8036 FF2E1274 003D80ED
1E3EC52E 002CE9F9 9A000305 C7ED223E C52E04C4 8300549B D59A5000 1205ED52
C52EFE46 89058BED 2A3EC52E 6F740040 05F7ECCA 3EC52E00 C0E90374 003D83ED
8902458B ED2A3EC5 2E0589EC 2A3EC52E FE462B02 C4830034 CBCA9A35 FFECB23E
2A3EC52E 024589EC 2A3EC52E FE462B02 C4830034 CBCA9A35 FFECBA3E C52EFE46
4589EC2A 3EC52EFE 462B02C4 830034CB CA9A35FF ECBE3EC5 2EFE4689 04458BED
C52EED2A 36C42E05 89EC2A3E C52E042B 26058BEC B23EC52E ED2A36C4 2E46EB04
442B2605 8BECBE3E C52EED2A 36C42E02 4589EC2A 3EC52E02 442B2605 8BECBA3E
36FF2E14 7E003D83 EC1E3EC5 2E000002 C85756CB 5E5FC904 4589EC2A 3EC52E04
ED8436FF 2E127400 3D80ED4A 3EC52E06 C483002C FC9C9A14 6AECB236 FF2EECB4
00549BD5 9A500012 05ED5206 8B2EED54 36FF2E04 C4830054 4A8A9AED 8236FF2E
C52E00C3 E9037400 3D83ED1E 3EC52E00 2CE9F99A 000105C7 ED223EC5 2E04C483
2E0589ED 323EC52E 02C48300 34CBCA9A 35FFECB2 3EC52E46 74004005 F7ECCA3E
CBCA9A35 FFECBE3E C52E0245 89ED323E C52E02C4 830034CB CA9A35FF ECBA3EC5
3EC52E05 89ED323E C52E058B ECB23EC5 2E2CEB04 4589ED32 3EC52E02 C4830034
0000FE46 C7044589 ED323EC5 2E058BEC BE3EC52E 024589ED 323EC52E 058BECBA
2EE7D1FE 7E8BED2C 068E2EED 2A36032E E6D1FE76 8B367D03 FE7E83FE 46FF03EB
EB0589EC 2C1E8E2E EC2A3E03 2EE7D1FE 7E8B042B 26058BED 341E8E2E ED323E03
186AECB2 36FF2EEC B436FF2E 147E003D 83EC1E3E C52EEC8B 555756CB 5E5FC9C1
544A8A9A ED8636FF 2EED8836 FF2E1274 003D80ED 4A3EC52E 06C48300 2CFC9C9A
C7ED223E C52E04C4 8300549B D59A5000 1205ED52 068B2EED 5436FF2E 04C48300
46740040 05F7ECCA 3EC52E00 C6E90374 003D83ED 1E3EC52E 002CE9F9 9A000205

```
CBCA9A35 FFECBA3E C52E0589 ED2A3EC5 2E02C483 0034CBCA 9A35FFEC B23EC52E
2A3EC52E 02C48300 34CBCA9A 35FFECBE 3EC52E02 4589ED2A 3EC52E02 C4830034
ED2A3EC5 2E058BEC BA3EC52E 0589ED2A 3EC52E05 8BECB23E C52E2CEB 044589ED
2A3EC52E 2974003D 80ED4A3E C52E0445 89ED2A3E C52E058B ECBE3EC5 2E024589
4A8A9AED 8A36FF2E ED8C36FF 2E35FFED 2A3EC52E 0275FFED 2A3EC52E 0475FFED
56CB5E5F C904C483 00549BD5 9A500012 05ED5206 8B2EED54 36FF2E0A C4830054
83002CFC 9C9A166A ECB236FF 2EECB436 FF2E147E 003D83EC 1E3EC52E EC8B5557
FF2E04C4 8300544A 8A9AED8E 36FF2EED 9036FF2E 1274003D 80ED4A3E C52E06C4
E9F99A00 0305C7ED 223EC52E 04C48300 549BD59A 50001205 ED52068B 2EED5436
FFECB23E C52E6974 004005F7 ECCA3EC5 2E00BAE9 0374003D 83ED1E3E C52E002C
ECBA3EC5 2E0589EC 2A3EC52E C62B058B ED323EC5 2EF08B02 C4830034 CBCA9A35
C52E0245 89EC2A3E C52EC62B 02458BED 323EC52E F08B02C4 830034CB CA9A35FF
4589EC2A 3EC52EC6 2B04458B ED323EC5 2EF08B02 C4830034 CBCA9A35 FFECBE3E
C52EECBA 36C42E05 89EC2A3E C52E042B 26058BED 323EC52E ECB236C4 2E46EB04
2B260445 8BED323E C52EECBE 36C42E02 4589EC2A 3EC52E04 2B260245 8BED323E
36FF2E14 7E003D83 EC1E3EC5 2E000002 C85756CB 5E5FC904 4589EC2A 3EC52E04
ED9436FF 2E127400 3D80ED4A 3EC52E06 C483002C FC9C9A17 6AECB236 FF2EECB4
00549BD5 9A500012 05ED5206 8B2EED54 36FF2E04 C4830054 4A8A9AED 9236FF2E
C52E010C E9037400 3D83ED1E 3EC52E00 2CE9F99A 000105C7 ED223EC5 2E04C483
2E0589ED 2A3EC52E 02C48300 34CBCA9A 35FFECB2 3EC52E46 74004005 F7ECCA3E
CBCA9A35 FFECBE3E C52E0245 89ED2A3E C52E02C4 830034CB CA9A35FF ECBA3EC5
3EC52E05 89ED2A3E C52E058B ECB23EC5 2E2CEB04 4589ED2A 3EC52E02 C4830034
ED4A3EC5 2E044589 ED2A3EC5 2E058BEC BE3EC52E 024589ED 2A3EC52E 058BECBA
9836FF2E 35FFED2A 3EC52E02 75FFED2A 3EC52E04 75FFED2A 3EC52E29 74003D80
549BD59A 50001205 ED52068B 2EED5436 FF2E0AC4 8300544A 8A9AED96 36FF2EED
8E2EED2A 36032EE6 D1FE768B 367D03FE 7E83FE46 FF03EB00 00FE46C7 04C48300
2A3E032E E7D1FE7E 8B042B26 058BED34 1E8E2EED 323E032E E7D1FE7E 8BED2C06
C905890A 7EC5058B ECB63EC5 2EEC8B55 5756CB5E 5FC9C1EB 0589EC2C 1E8E2EEC
ED9A3EF7 2E994005 8BECB63E C52E0003 05C7ECB6 3EC52E00 0006C857 56CB5E5F
76FF026A 50FE468D 16FFFC46 C600FD46 C600FA46 C6FFFB46 C60589EC 9A3EC52E
FF006A00 6A006A00 6A187400 FE7E830E C4830054 DABA9A01 4C68056A FA76FFFC
FE76FF00 6A006A00 6A006A16 7400FE7E 831CEBFF FCB80AC4 830054C0 489AFE76
C52EEC9E 36FF2EEC A036FF2E EC8B5557 56CB5E5F C9FFFBB8 0AC48300 54C0489A
54968F9A 05D99BEC 923EC52E 0054968F 9A05D99B EC963EC5 2E006A35 FFEC9A3E
ED9A3EF7 2E994005 8BECB63E C52E0001 05C7ECB6 3EC52E18 C4830044 8D319A00
9BEC963E C52E016A 35FFEC9A 3EC52EEC 9E36FF2E ECA036FF 2E0589EC 9A3EC52E
5E5FC99B 18C48300 448D319A 0054968F 9A05D99B EC923EC5 2E005496 8F9A05D9
D99BEC96 3EC52E00 6A35FFEC 9A3EC52E EC9E36FF 2EECA036 FF2EEC8B 555756CB
ECB63EC5 2E18C483 00448D31 9A005496 8F9A05D9 9BEC923E C52E0054 968F9A05
FF2EECA0 36FF2E05 89EC9A3E C52EED9A 3EF72E99 40058BEC B63EC52E 000305C7
D99BEC92 3EC52E00 54968F9A 05D99BEC 963EC52E 016A35FF EC9A3EC5 2EEC9E36
36FF2EEC A036FF2E EC8B5557 56CB5E5F C99B18C4 8300448D 319A0054 968F9A05
05D99BEC 923EC52E 0054968F 9A05D99B EC963EC5 2E006A35 FFEC9A3E C52EEC9E
2E994005 8BECB63E C52E0005 05C7ECB6 3EC52E18 C4830044 8D319A00 54968F9A
C52E016A 35FFEC9A 3EC52EEC 9E36FF2E ECA036FF 2E0589EC 9A3EC52E ED9A3EF7
18C48300 448D319A 0054968F 9A05D99B EC923EC5 2E005496 8F9A05D9 9BEC963E
3EC52E00 6A35FFEC 9A3EC52E EC9E36FF 2EECA036 FF2EEC8B 555756CB 5E5FC99B
2E18C483 00448D31 9A005496 8F9A05D9 9BEC923E C52E0054 968F9A05 D99BEC96
36FF2E05 89EC9A3E C52EED9A 3EF72E99 40058BEC B63EC52E 000905C7 ECB63EC5
3EC52E00 54968F9A 05D99BEC 963EC52E 016A35FF EC9A3EC5 2EEC9E36 FF2EECA0
1E3EC52E EC8B5557 56CB5E5F C99B18C4 8300448D 319A0054 968F9A05 D99BEC92
9C9A086A EC2236FF 2EEC2436 FF2E1675 00023D05 8BEC1A3E C52E367E 003D83EC
8E3EC52E 06C48300 2CFC9C9A 056AEC22 36FF2EEC 2436FF2E 14EB06C4 83002CFC
EC963EC5 2E006A35 FFEC9A3E C52EEC9E 36FF2EEC A036FF2E 35750001 3D058BEC
3EC52E18 C4830044 8D319A00 54968F9A 05D99BEC 923EC52E 0054968F 9A05D99B
058BEC76 3EC52EEC 8B555756 CB5E5FC9 9B000005 C7EC6A3E C52E0000 05C7EC8E
EC7E3EC5 2E0044C1 AB9A0575 00013D05 8BEC7A3E C52E003C 11BD9A05 7500013D
5756CB5E 5FC9002C E09E9A00 0105C7EC 863EC52E 003CF0D5 9A0E7500 013D058B
36FF2E3E 7500013D 058BEC8E 3EC52E00 34E5029A 00F946C6 00FB46C6 00001AC8
3EC52E00 54968F9A 05D99BEC 963EC52E 006A35FF EC9A3EC5 2EEC9E36 FF2EECA0
50F2468D 16000005 C7EC8E3E C52E18C4 8300448D 319A0054 968F9A05 D99BEC92
2EEC3036 FF2E1E75 00013D05 8BEC8A3E C52E2A75 02F27E83 04C48300 5464499A
C52E2875 01F27E83 2EEB08C4 83005491 9E9AEC26 36FF2EEC 2836FF2E EC2E36FF
DF9AEC26 36FF2EEC 2836FF2E EC2E36FF 2EEC3036 FF2E1C75 00023D05 8BEC8A3E
9A00A868 EC2E36FF 2EEC3036 FF2EEC22 36FF2EEC 2436FF2E 575608C4 83005492
2436FF2E 16750002 3D058BEC 1A3EC52E 367E003D 83EC1E3E C52E5E5F 0054DE28
9C9A046A EC2236FF 2EEC2436 FF2E14EB 06C48300 2CFC9C9A 076AEC22 36FF2EEC
9A077500 3D83ED1E 3EC52E00 C5E90374 00013D05 8BEC823E C52E06C4 83002CFC
```

FF2EEC24 36FF2E50 FC468D16 006A50EC 468D1600 6A50E646 8D1645EB 0044CB7A
FF0275FF ECC23EC5 2E036A18 C483001C 921A9A35 FF0275FF ECC23EC5 2EEC2236
006A006A 006A50FC 468D1629 75003D83 EC7A3EC5 2E08C483 003C7B9F 9A006A35
FF2E23EB 12C48300 3C7D919A ECAA36FF 2EECAC36 FF2EECAE 36FF2EEC B036FF2E
C483003C 850B9A35 FFED9C3E C52EECAA 36FF2EEC AC36FF2E ECAE36FF 2EECB036
8BEC863E C52E0AC4 830054C0 489AFC76 FF006A00 6A006A00 6A137400 FC7E830A
D1FE7E8B 00BAE903 7C04FE7E 83FE46FF 03EB0000 FE46C701 18E90374 00013D05
7E8B0589 EC381E8E 2EEC363E 032EE7D1 FE7E8B05 8BEC341E 8E2EEC32 3E032EE7
0589EC40 1E8E2EEC 3E3E032E E7D1FE7E 8B058BEC 3C1E8E2E EC3A3E03 2EE7D1FE
EC481E8E 2EEC463E 032EE7D1 FE7E8B05 8BEC441E 8E2EEC42 3E032EE7 D1FE7E8B
EC4E3E03 2E02E7C1 FE7E8B05 D99BEC4C 1E8E2EEC 4A3E032E 02E7C1FE 7E8B0589
EC541E8E 2EEC523E 032EE7D1 FE7E8BFF 5FE9037C 03FE7E83 1DD99BEC 501E8E2E
0000FE46 C700342B C79AFF3A E90589EC 581E8E2E EC563E03 2EE7D1FE 7E8B058B
4606032E 09E0C1FE 468BF476 FFF676FF 50FC468D 16367D04 FE7E83FE 46FF03EB
EB12C483 0054C78E 9A50E42A FB468A50 E42AF946 8AFE76FF 5052ED48 168B2EED
5C1E8E2E EC5A3E03 2E02E7C1 FE7E8B4E 7D04FE7E 83FE46FF 03EB0000 FE46C7C1
3E032E02 E7C1FE7E 8B1DD99B EC601E8E 2EEC5E3E 032E02E7 C1FE7E8B 05D99BEC
6AA9EB1D D99BEC68 1E8E2EEC 663E032E 02E7C1FE 7E8B05D9 9BEC641E 8E2EEC62
5E068B2E EC6036FF 2E50000C 05EC5E06 8B2EEC60 36FF2E02 C4830044 707C9A01
794A9AEC 5E36FF2E EC6036FF 2E500004 05EC5E06 8B2EEC60 36FF2E50 000805EC
000805EC 66068B2E EC6836FF 2E50000C 05EC6606 8B2EEC68 36FF2E10 C4830044
C4830044 7B629AEC 6636FF2E EC6836FF 2E500004 05EC6606 8B2EEC68 36FF2E50
289A486A EC2636FF 2EEC2836 FF2EEC2A 36FF2EEC 2C36FF2E 5756003C 277F9A10
5E5FC99B 000005C7 EC6A3EC5 2E0589EC 723EC52E 058BEC6E 3EC52E5E 5F0054DE
00544A8A 9AEDA036 FF2EEDA2 36FF2E12 74003D80 ED4A3EC5 2E00001A C85756CB
058BED22 3EC52E04 C4830054 9BD59A50 001205ED 52068B2E ED5436FF 2E04C483
3E032EE7 D1FE7E8B 4D7D03FE 7E83FE46 FF03EB00 00FE46C7 0097E903 7500033D
E7D1FE7E 8BED2C06 8E2EED2A 36032EE6 D1FE768B E6468905 8BEC2C1E 8E2EEC2A
9B1F16FD 0302E7C1 FE7E8BE6 76DE9B24 DE269B05 DF9BED34 1E8E2EED 323E032E
D99B08EB E85ED99B EC46D99B 0A760054 968A9AF0 5ED89BEC 46D99BAA EBEC5DD9
2E23EBE8 5ED99BF4 46D99B2D 76005496 8A9AE85E D89BF446 D99BE85E D99BF046
D99BE676 DE9B24DE 269B05DF 9BED323E C52EED2A 36C42EE6 4689058B EC2A3EC5
2C1E8E2E EC2A3E03 2EE7D1FE 7E8B6E7D 03FE7E83 FE46FF03 EB0000FE 46C7E85E
FC46C707 76005496 8A9AEDA4 1EDC2E9B F846D99B F85ED99B 0DDE9BE8 46D99BEC
3E032EE7 D1FE7E8B FC468908 C4830054 96EF9A00 54968F9A F846D99B 14EB0FFF
89EB0589 040326FC 468BEC24 068E2EEC 2236032E E6D1FE76 8BED281E 8E2EED26
FFED263E C52E0275 FFED263E C52E0475 FFED263E C52E2974 003D80ED 4A3EC52E
001205ED 52068B2E ED5436FF 2E0AC483 00544A8A 9AEDAC36 FF2EEDAE 36FF2E35
FF2E1274 003D80ED 4A3EC52E 00001AC8 5756CB5E 5FC99B04 C4830054 9BD59A50
D59A5000 1205ED52 068B2EED 5436FF2E 04C48300 544A8A9A EDB036FF 2EEDB236
83FE46FF 03EB0000 FE46C700 97E90375 00033D05 8BED223E C52E04C4 8300549B
032EE6D1 FE768BE6 4689058B EC2C1E8E 2EEC2A3E 032EE7D1 FE7E8B4D 7D03FE7E
DE9B24DE 269B05DF 9BED341E 8E2EED32 3E032EE7 D1FE7E8B ED2C068E 2EED2A36
76005496 8A9AF45E D89BF046 D99BAAEB F05DD99B 1F16FD03 02E7C1FE 7E8BE676
0054968A 9AEC5ED8 9BF846D9 9BEC5ED9 9BF446D9 9B08EBEC 5ED99BF0 46D99B0A
ED323EC5 2EED2A36 C42EE646 89058BEC 2A3EC52E 23EBEC5E D99BF846 D99B2D76
8B6D7D03 FE7E83FE 46FF03EB 0000FE46 C7EC5ED9 9BE676DE 9B24DE26 9B05DF9B
DC2E9BE8 46D99BE8 5ED99B0D DE9BEC46 D99BEC2C 1E8E2EEC 2A3E032E E7D1FE7E
83005496 EF9A0054 968F9AE8 46D99B14 EB0FFFFC 46C70776 0054968A 9AEDA41E
032EE7D1 FE7E8BFC 462B058B ED281E8E 2EED263E 032EE7D1 FE7E8BFC 468908C4
C52E0475 FFEC223E C52E2974 003D80ED 4A3EC52E 8AEB0589 EC241E8E 2EEC223E
2E0AC483 00544A8A 9AEDB436 FF2EEDB6 36FF2E35 FFEC223E C52E0275 FFEC223E
000002C8 5756CB5E 5FC99B04 C4830054 9BD59A50 001205ED 52068B2E ED5436FF
458B0A7E C55E5F00 54DE289A 486A0A76 FF0C76FF EC2A36FF 2EEC2C36 FF2E5756
7D04FE7E 83FE46FF 03EB0000 FE46C700 0005C7ED B83EC52E 0589EC72 3EC52E68
601E8E2E EC5E3E03 2E02E7C1 FE7E8B48 45D99B0C 5E8E0A7E 0302E7C1 FE7E8B48
2EEC663E 032E02E7 C1FE7E8B 5845D99B 0C5E8E0A 7E0302E7 C1FE7E8B 1DD99BEC
2C36FF2E 0A76FF0C 76FF5756 000002C8 5756CB5E 5FC99BAF EB1DD99B EC681E8E
00FE46C7 6845890A 7EC5058B EC723EC5 2E5E5F00 54DE289A 486AEC2A 36FF2EEC
8B05D99B EC601E8E 2EEC5E3E 032E02E7 C1FE7E8B 487D04FE 7E83FE46 FF03EB00
9BEC681E 8E2EEC66 3E032E02 E7C1FE7E 8B485DD9 9B0C5E8E 0A7E0302 E7C1FE7E
C7000002 C85756CB 5E5FC99B AFEB585D D99B0C5E 8E0A7E03 02E7C1FE 7E8B05D9
058BEC24 1E8E2EEC 223E032E E7D1FE7E 8B467D03 FE7E83FE 46FF03EB 0000FE46
ED281E8E 2EED263E 032EE7D1 FE7E8B05 89ED2C1E 8E2EED2A 3E032EE7 D1FE7E8B
C7000002 C85756CB 5E5FC9B1 EB0589ED 341E8E2E ED323E03 2EE7D1FE 7E8B058B
058BEC2C 1E8E2EEC 2A3E032E E7D1FE7E 8B687D03 FE7E83FE 46FF03EB 0000FE46
ED281E8E 2EED263E 032EE7D1 FE7E8B05 89ED3C1E 8E2EED3A 3E032EE7 D1FE7E8B
1E8E2EEC 223E032E E7D1FE7E 8B0589ED 381E8E2E ED363E03 2EE7D1FE 7E8B058B

```
00B6C857 56CB5E5F C98FEB05 89ED301E 8E2EED2E 3E032EE7 D1FE7E8B 058BEC24
BC06DD2E 9B0A7300 54968A9A EDBC1EDC 2E9BFC46 D99BFC5E D99B0054 454D9A00
00B2E900 0205C70A 7EC50A76 0054968A 9AEDC41E DC2E9BFC 46D99BFC 5ED99BED
3EC52E04 55D99BED 6A3EC52E 0855D99B ED6A3EC5 2EFC46D9 9B000105 C70A7EC5
3EC52E04 C483002C FBB89A50 FF4A868D 162F7400 3D83ED1E 3EC52E1D D99BED6A
7A9A0CC4 83002C79 689A046A 50FF5986 8D16EC22 36FF2EEC 2436FF2E 35FFED3E
36FF2EEC AC36FF2E ECAE36FF 2EECB036 FF2E006A 006A006A 50FA468D 160044CB
0054C048 9AFA76FF 006A006A 006A006A 157400FA 7E8312C4 83003C7D 919AECAA
3EC52E00 0002C857 56CB5E5F C99B04C4 8300447D 669A50FC 468D160D EB0AC483
2E003CF0 D59A0575 00013D05 8BEC7E3E C52E003C 11BD9A05 7500013D 058BEC76
9A01F668 036A006A 50FE468D 16002C02 F39A002C 1D7C9A37 74003D83 ECE23EC5
0AC48300 54C0489A FE76FF00 6A006A00 6A006A13 7400FE7E 830AC483 0054DABA
FE7E830A C4830054 DABA9A6F 6A036A13 6A50FE46 8D162C75 003D83ED CC3EC52E
7B86004C 5B78CB5E 5FC90AC4 830054C0 489AFE76 FF006A00 6A006A00 6A137400
7F46004C 5B320014 7F36004C 5B2A004C 5A82004C 59F2004C 5A3A0014 7DE60014
59B6004C 5B580014 7F8E004C 5B520014 7F7E004C 5B420014 7F6E004C 5B3A0014
2A200024 92020024 F20E004C 59EC004C 59EE004C 59D8004C 59C6004C 5B68004C
5BAA004C 5BA8004C 5B94004C 5B90004C 59DA004C 59F0004C 5B7C004C 5B7A004C
8AB0004C 8AAE004C 5B7E004C 8AAC0014 7CC60014 7B9E0014 94F8004C 5B80004C
291A004C 59B4004C 59B2004C 59DC0014 7B960014 93740014 7B8C0014 7B9A004C
866A004C 866E004C 4A56004C 5BF2004C 5BE2004C 5BD2004C 5BC2004C 5BC0004C
7BF6004C 8666406F E0000000 0000004C 5BB6004C 5BAE4014 00000000 0000004C
7DDC004C 59F8004C 5A0A004C 59FE004C 5A10004C 5A040014 7DEC004C 59D60014
583D004C 581F004C 5801004C 7C64004C 57E00014 951F0024 D53E0014 7BA30014
5885004C 586E004C 584F0014 7BFA004C 5A2E0014 7E0A004C 5A16004C 5A1C004C
00249200 0002004C 592C004C 590F004C 58F5004C 58DE004C 58C0004C 58A2004C
9999999A 004C4A54 004C5993 004C597A 004C595C 40AFFE00 00000000 004C5943
FFAC3EC5 2E0000FC 46C70000 06C85756 00147B7C 40240000 00000000 3FB99999
8D1635FF FFB83EC5 2E35FFFF B43EC52E 35FFFFB0 3EC52E57 5605890A 468B3DC5
FF6A35FF FFB83EC5 2E57566A EBFC468B 0575690A 7E835E5F 00543C14 9A50FE46
2E006A05 89FFBC3E C52E5E5F 00543BF4 9A50FE46 8D1635FF 0275FFFF C03EC52E
8B3DC5FF C43EC52E 02558905 89FFC43E C52E04C4 830054B4 EA9A35FF FFBC3EC5
C9FC468B 00442B8C 9A0575FF FA7E83FA 46890245 8B3DC5FF C43EC52E FC468905
046A500A 468D1650 00020505 8B0275FF FFAC3EC5 2E575600 0002C857 56CB5E5F
0002C857 56CB5E5F C9FE468B FE468902 C483002C EDD09A79 6A5E5F00 54DE289A
565E5F00 54DE289A 046A500A 468D1650 00020505 8B0275FF FFAC3EC5 2E575600
2E57565E 5F0054DE 289A046A 500E468D 16500006 05058B02 75FFFFAC 3EC52E57
3EC52E57 565E5F00 54DE289A 046A5012 468D1650 000A0505 8B0275FF FFAC3EC5
FFAC3EC5 2E57565E 5F0054DE 289A046A 5016468D 1650000E 05058B02 75FFFFAC
75FFFFAC 3EC52E57 565E5F00 54DE289A 046A501A 468D1650 00120505 8B0275FF
8B0275FF FFAC3EC5 2E57565E 5F0054DE 289A046A 501E468D 16500016 05058B02
FE468902 C483002C EDD09A65 6A5E5F00 54DE289A 046A5022 468D1650 001A0505
000002C8 5756CB5E 5FC902C4 83002CED D09A666A EC8B5557 56CB5E5F C9FE468B
57565E5F 0054DE28 9A046A50 0A468D16 50000205 058B0275 FFFFAC3E C52E5756
C52E5756 5E5F0054 DE289A04 6A500E46 8D165000 0605058B 0275FFFF AC3EC52E
AC3EC52E 57565E5F 0054DE28 9A046A50 12468D16 50000A05 058B0275 FFFFAC3E
FFFFAC3E C52E5756 5E5F0054 DE289A04 6A501646 8D165000 0E05058B 0275FFFF
02C48300 2CEDD09A 676A5E5F 0054DE28 9A046A50 1A468D16 50001205 058B0275
50000205 058B0275 FFFFAC3E C52E5756 000002C8 5756CB5E 5FC9FE46 8BFE4689
5FC9FE46 8BFE4689 02C48300 2CEDD09A 7A6A5E5F 0054DE28 9A046A50 0A468D16
9A046A50 0A468D16 50000205 058B0275 FFFFAC3E C52E5756 000002C8 5756CB5E
000002C8 5756CB5E 5FC9FE46 8BFE4689 02C48300 2CEDD09A 7B6A5E5F 0054DE28
686A5E5F 0054DE28 9A046A50 0A468D16 50000205 058B0275 FFFFAC3E C52E5756
FFFFAC3E C52E5756 000002C8 5756CB5E 5FC9FE46 8BFE4689 02C48300 2CEDD09A
02C48300 2CEDD09A 6A6A5E5F 0054DE28 9A046A50 0A468D16 50000205 058B0275
FC468D16 50E42AFF 468A5756 03FF46C6 000004C8 5756CB5E 5FC9FE46 8BFE4689
2E35FFFF C83EC52E 57562B74 00100A46 F70589FF C83EC52E 5E5F0054 3BD49A50
89E90589 FFCC3EC5 2E5E5F00 543C349A 50FC468D 16FF6AFF D036FF2E FFD236FF
468D16FF 6AFFD436 FF2EFFD6 36FF2E35 FFFFC83E C52E5756 2A740020 0A46F700
FFFFC83E C52E5756 2A75010A 7E8358EB 0589FFCC 3EC52E5E 5F00543C 349A50FC
0589FFCC 3EC52E5E 5F00543C 349A50FC 468D16FF 6AFFD836 FF2EFFDA 36FF2E35
543C349A 50FC468D 16FF6AFF DC36FF2E FFDE36FF 2E35FFFF C83EC52E 575628EB
FFE03EC5 2E04C483 0054B4EA 9A35FFFF CC3EC52E 006A0589 FFCC3EC5 2E5E5F00
08458B3D C5FFE03E C52E0589 FFB03EC5 2E04458B 3DC5FFE0 3EC52E02 55890589
FFFFB43E C52E006A 0589FFB4 3EC52E0A 458B3DC5 FFE03EC5 2E0589FF B83EC52E
D09A696A EC8B5557 56CB5E5F C9025589 0589FFAC 3EC52E04 C4830054 B4EA9A35
50000205 058B0275 FFFFAC3E C52E5756 000002C8 5756CB5E 5FC902C4 83002CED
058B0A7E C5FE4689 02C48300 2CEDD09A 6B6A5E5F 0054DE28 9A046A50 0A468D16
75FFFFAC 3EC52E57 56000002 C85756CB 5E5FC9FE 468B0044 2B8C9A05 7500033D
```

8902C483 002CEDD0 9A6C6A5E 5F0054DE 289A046A 500A468D 16500002 05058B02
9A6D6AEC 8B555756 CB5E5FC9 FE468B00 442B8C9A 05750003 3D058B0A 7EC5FE46
5756CB5E 5FC902C4 83002CED D09A6E6A EC8B5557 56CB5E5F C902C483 002CEDD0
75FFFFAC 3EC52E57 56000002 C85756CB 5E5FC902 C483002C EDD09A6F 6AEC8B55
8902C483 002CEDD0 9A726A5E 5F0054DE 289A046A 500A468D 16500002 05058B02
7EC50000 18C85756 CB5E5FC9 FE468B00 442B8C9A 05750003 3D058B0A 7EC5FE46
C4830054 EEEA9A50 EF468D16 06C48300 5448E69A 0F6A50EF 468D1600 0105C70A
AC3EC52E 5756EA56 89E84689 5A16EC46 8D667500 3D83FFE4 3EC52E0A 75C00B04
FFFFAC3E C52E5756 5E5F0054 DE289A04 6A500A46 8D165000 0205058B 0275FFFF
02C48300 2CEDD09A 706A5E5F 0054DE28 9A046A50 E8468D16 50000605 058B0275
56000002 C85756CB 5E5FC9FE 468B0044 2B8C9A05 7500033D 058B0A7E C5FE4689
2E57565E 5F0054DE 289A046A 500A468D 16500002 05058B02 75FFFFAC 3EC52E57
3EC52E57 565E5F00 54DE289A 046A5012 468D1650 00060505 8B0275FF FFAC3EC5
002CEDD0 9A786A5E 5F0054DE 289A046A 500E468D 1650000A 05058B02 75FFFFAC
02C85756 CB5E5FC9 FE468B00 442B8C9A 05750003 3D058B0A 7EC5FE46 8902C483
5E5F0054 DE289A04 6A500A46 8D165000 0205058B 0275FFFF AC3EC52E 57560000
80685E5F 0054DE28 9A046A50 0E468D16 50000605 058B0275 FFFFAC3E C52E5756
5FC9FE46 8B00442B 8C9A0575 00033D05 8B0A7EC5 FE468902 C483002C EDD09A00
2CEDD09A 736AEC8B 555756CB 5E5FC902 C483002C EDD09A71 6AEC8B55 5756CB5E
5448E69A 0F6A50EF 468D1600 0105C70A 7EC50000 18C85756 CB5E5FC9 02C48300
8D667500 3D83FFE4 3EC52E0A 75C00B04 C4830054 EEEA9A50 EF468D16 06C48300
6A500A46 8D165000 0205058B 0275FFFF AC3EC52E 5756EA56 89E84689 5A16EC46
9A046A50 E8468D16 50000605 058B0275 FFFFAC3E C52E5756 5E5F0054 DE289A04
2B8C9A05 7500033D 058B0A7E C5FE4689 02C48300 2CEDD09A 756A5E5F 0054DE28
468D06C4 83005448 E69A0F6A 50EF468D 16000018 C85756CB 5E5FC9FE 468B0044
046A500A 468D1650 00020505 8B0275FF FFAC3EC5 2E5756EA 5689E846 895A16EC
289A046A 50E8468D 16500006 05058B02 75FFFFAC 3EC52E57 565E5F00 54DE289A
442B8C9A 05750003 3D058B0A 7EC5FE46 8902C483 002CEDD0 9A766A5E 5F0054DE
0018C857 56CB5E5F C902C483 002CEDD0 9A746AEC 8B555756 CB5E5FC9 FE468B00
75C00B04 C4830054 EEEA9A50 EF468D16 06C48300 5448E69A 0F6A50EF 468D1600
0275FFFF AC3EC52E 5756EA56 89E84689 5A16EC46 8D667500 3D83FFE4 3EC52E0A
058B0275 FFFFAC3E C52E5756 5E5F0054 DE289A04 6A500A46 8D165000 0205058B
C5FE4689 02C48300 2CEDD09A 776A5E5F 0054DE28 9A046A50 E8468D16 50000605
C7FFE43E C52EEC8B 555756CB 5E5FC9FE 468B0044 2B8C9A05 7500033D 058B0A7E
C5000018 C85756CB 5E5FC900 0005C7FF E43EC52E EC8B5557 56CB5E5F C9000105
830054EE EA9A50EF 468D1606 C4830054 48E69A0F 6A50EF46 8D160001 05C70A7E
3EC52E57 56EA5689 E846895A 16EC468D 6675003D 83FFE43E C52E0A75 C00B04C4
FFAC3EC5 2E57565E 5F0054DE 289A046A 500A468D 16500002 05058B02 75FFFFAC
C483002C EDD09A7D 6A5E5F00 54DE289A 046A50E8 468D1650 00060505 8B0275FF
6AEC8B55 5756CB5E 5FC9FE46 8B00442B 8C9A0575 00033D05 8B0A7EC5 FE468902
05058B02 75FFFFAC 3EC52E57 56000002 C85756CB 5E5FC902 C483002C EDD09A7C
7EC5FE46 8902C483 002CEDD0 9A7E6A5E 5F0054DE 289A046A 500A468D 16500002
002CEDD0 9A7F6AEC 8B555756 CB5E5FC9 FE468B00 442B8C9A 05750003 3D058B0A
468D1650 00020505 8B0275FF FFAC3EC5 2E575600 0002C857 56CB5E5F C902C483
033D058B 0A7EC5FE 468902C4 83002CED D09A0089 685E5F00 54DE289A 046A500A
EF468D16 000105C7 0A7EC500 0018C857 56CB5E5F C9FE468B 00442B8C 9A057500
E43EC52E 0A75C00B 04C48300 54EEEA9A 50EF468D 1606C483 005448E6 9A0F6A50
00020505 8B0275FF FFAC3EC5 2E5756EA 5689E846 895A16EC 468D6775 003D83FF
16500006 05058B02 75FFFFAC 3EC52E57 565E5F00 54DE289A 046A500A 468D1650
058B0A7E C5FE4689 02C48300 2CEDD09A 008A685E 5F0054DE 289A046A 50E8468D
C483002C EDD09A00 8B68EC8B 555756CB 5E5FC9FE 468B0044 2B8C9A05 7500033D
16000018 C85756CB 5E5FC902 C483002C EDD09A00 8C68EC8B 555756CB 5E5FC902
561A75C0 0B04C483 0054EEEA 9A50F146 8D1606C4 83005448 E69A0F6A 50F1468D
46895A16 EE468D5E 5F0054DE 289A066A FFE836FF 2EFFEA36 FF2E50F1 468D1657
0054DE28 9A046A50 EA468D16 50000205 058B0275 FFFFAC3E C52E5756 EC5689EA
C52E5756 EC8B5557 56CB5E5F C9E8468B E8468902 C483002C EDD09A00 81685E5F
EDD09A00 82685E5F 0054DE28 9A026A50 0A468D16 50000205 058B0275 FFFFAC3E
16500002 05058B02 75FFFFAC 3EC52E57 56000002 C85756CB 5E5FC902 C483002C
5FC9FE46 8BFE4689 02C48300 2CEDD09A 0084685E 5F0054DE 289A046A 500A468D
9A046A50 0A468D16 50000205 058B0275 FFFFAC3E C52E5756 000002C8 5756CB5E
0002C857 56CB5E5F C9FE468B FE468902 C483002C EDD09A00 85685E5F 0054DE28
685E5F00 54DE289A 046A500A 468D1650 00020505 8B0275FF FFAC3EC5 2E575600
AC3EC52E 57560000 02C85756 CB5E5FC9 FE468BFE 468902C4 83002CED D09A0086
002CEDD0 9A008768 5E5F0054 DE289A04 6A500A46 8D165000 0205058B 0275FFFF
05058B02 75FFFFAC 3EC52E57 56000002 C85756CB 5E5FC9FE 468BFE46 8902C483
8BFE4689 02C48300 2CEDD09A 0088685E 5F0054DE 289A046A 500A468D 16500002
0A468D16 50000205 058B0275 FFFFAC3E C52E5756 000002C8 5756CB5E 5FC9FE46
56CB5E5F C9FE468B FE468902 C483002C EDD09A00 8D685E5F 0054DE28 9A046A50
54DE289A 046A500A 468D1650 00020505 8B0275FF FFAC3EC5 2E575600 0002C857
57560000 02C85756 CB5E5FC9 FE468BFE 468902C4 83002CED D09A008E 685E5F00

9A009268 5E5F0054 DE289A04 6A500A46 8D165000 0205058B 0275FFFF AC3EC52E
75FFFFAC 3EC52E57 56000002 C85756CB 5E5FC9FE 468BFE46 8902C483 002CEDD0
02C48300 2CEDD09A 0093685E 5F0054DE 289A046A 500A468D 16500002 05058B02
50000205 058B0275 FFFFAC3E C52E5756 000002C8 5756CB5E 5FC9FE46 8BFE4689
C9FE468B FE468902 C483002C EDD09A00 8F685E5F 0054DE28 9A046A50 0A468D16
046A500A 468D1650 00020505 8B0275FF FFAC3EC5 2E575600 0002C857 56CB5E5F
02C85756 CB5E5FC9 FE468BFE 468902C4 83002CED D09A0098 685E5F00 54DE289A
5E5F0054 DE289A02 6A500A46 8D165000 0205058B 0275FFFF AC3EC52E 57560000
99685E5F 0054DE28 9A046A50 0C468D16 50000605 058B0275 FFFFAC3E C52E5756
2CEDD09A 009A6800 0002C857 56CB5E5F C9FE468B FE468902 C483002C EDD09A00
058B0275 FFFFAC3E C52E5756 000002C8 5756CB5E 5FC9FE46 8BFE4689 02C48300
FE468902 C483002C EDD09A00 95685E5F 0054DE28 9A046A50 0A468D16 50000205
0002C857 56CB5E5F C902C483 002CEDD0 9A009468 EC8B5557 56CB5E5F C9FE468B
685E5F00 54DE289A 046A500A 468D1650 00020505 8B0275FF FFAC3EC5 2E575600
AC3EC52E 57560000 02C85756 CB5E5FC9 FE468BFE 468902C4 83002CED D09A0096
002CEDD0 9A009C68 5E5F0054 DE289A04 6A500A46 8D165000 0205058B 0275FFFF
05058B02 75FFFFAC 3EC52E57 56000002 C85756CB 5E5FC9FE 468BFE46 8902C483
00060505 8B0275FF FFAC3EC5 2E57565E 5F0054DE 289A046A 500A468D 16500002
1650000A 05058B02 75FFFFAC 3EC52E57 565E5F00 54DE289A 046A500E 468D1650
5FC9FE46 8BFE4689 02C48300 2CEDD09A 009D685E 5F0054DE 289A046A 5012468D
9A046A50 0A468D16 50000205 058B0275 FFFFAC3E C52E5756 000002C8 5756CB5E
0002C857 56CB5E5F C9FE468B FE468902 C483002C EDD09A00 9F685E5F 0054DE28
685E5F00 54DE289A 046A500A 468D1650 00020505 8B0275FF FFAC3EC5 2E575600
AC3EC52E 57560000 02C85756 CB5E5FC9 FE468BFE 468902C4 83002CED D09A009E
002CEDD0 9A00A168 5E5F0054 DE289A04 6A500A46 8D165000 0205058B 0275FFFF
5E5FC902 C483002C EDD09A00 9768EC8B 555756CB 5E5FC9FE 468BFE46 8902C483
02C85756 CB5E5FC9 FE468BFE 468902C4 83002CED D09A009B 68000002 C85756CB
5E5F0054 DE289A04 6A500A46 8D165000 0205058B 0275FFFF AC3EC52E 57560000
A0685E5F 0054DE28 9A046A50 0E468D16 50000605 058B0275 FFFFAC3E C52E5756
FFAC3EC5 2E575600 0002C857 56CB5E5F C9FE468B FE468902 C483002C EDD09A00
83002CED D09A00A4 685E5F00 54DE289A 026A500A 468D1650 00020505 8B0275FF
004C878A 004C8786 004C8788 004C8784 004C878C CB5E5FC9 FE468BFE 468902C4
004C8758 004C874E 004C876E 004C8762 004C8780 004C8782 004C8790 004C8794
00000000 00000000 000000CB 5E5FC9EC 8B555756 004C8742 004C877A 004C877C
703EC52E 06000536 76168B2E 3674068B 2E000105 C7366C3E C52E0000 06C85756
FE46C702 55890589 36783EC5 2E060005 367E168B 2E367C06 8B2E0255 89058936
8436FF2E 368636FF 2EFE76FF 016A50FC 468D165B 7D04FE7E 83FE46FF 03EB0000
168B2E36 7406032E 09E0C1FE 468B5052 3682168B 2E368006 032E0082 FE466936
C0489AFC 76FF006A 006A006A 006AB274 00FC7E83 14C48300 3C99589A 50523676
36883EC5 2E767500 FA7E8304 C483002C FA629A50 FA468D16 0141E90A C4830054
FF36943E C52E50FC 468D165C 7D04FE7E 83FE46FF 03EB0000 FE46C76C 75003D83
058A3690 3EC52EFE 76FF5052 3676168B 2E367406 032E09E0 C1FE468B 35FF0275
6A006A00 6AB17400 FC7E8312 C4830054 C78E9A50 E42A058A 368C3EC5 2E50E42A
369C3EC5 2E0B7501 3D803698 3EC52E00 B8E90AC4 830054C0 489AFC76 FF006A00
8B197D40 FE7E83FE 46FF03EB 0000FE46 C7000005 C7369C3E C52E09EB 000305C7
3E032EE7 D1FE7E8B DEEB0589 02E0C1FE 468B36A2 1E8E2E36 A03E032E E7D1FE7E
C52E36AC 36DC2E9B 05D99B36 A83EC52E 05894802 E0C1FE46 8B36A21E 8E2E36A0
BC3EC52E 1DD99B36 B43EC52E 36AC36DC 2E9B05D9 9B36B83E C52E1DD9 9B36A43E
C52E0034 296C9A02 55890589 36C03EC5 2E36A216 8B2E36A0 068B2E00 4105C736
46C73275 013D8036 983EC52E 000004C8 5756CB5E 5FC99BC0 2B000005 C736C43E
FF05C736 CA1E8E2E 36C83E03 2EE7D1FE 7E8B157D 03FE7E83 FE46FF03 EB0000FE
EB0000FE 46C72875 0F3D8036 CC3EC52E 00A5E900 010645C7 36C83EC5 2EE2EBFF
000105C7 36CA1E8E 2E36C83E 032EE7D1 FE7E8B00 88E9037C 04FE7E83 FE46FF03
869A5098 058A36CC 3EC52EFE 76FF637D 04FE7E83 FE46FF03 EB0000FE 46C7DFEB
C83E032E E7D1FE7E 8B058936 CA1E8E2E 36C83E03 2EE7D1FE 7E8B04C4 830054E6
A9EB0001 05C736CA 1E8E2E36 C83E032E E7D1FE7E 8B157400 3D8336CA 1E8E2E36
7C36FF2E 367E36FF 2E575694 EBFFFF05 C736CA1E 8E2E36C8 3E032EE7 D1FE7E8B
2E57565E 5F0054DE 289A5002 E0C1058B 36D03EC5 2E367436 FF2E3676 36FF2E36
5F0054DE 289A35FF 36D83EC5 2E368436 FF2E3686 36FF2E36 D436FF2E 36D636FF
E0C1058B 36E03EC5 2E368036 FF2E3682 36FF2E36 DC36FF2E 36DE36FF 2E57565E
3EC52E05 8936EC3E C52E00FF B8367E00 3D8336E4 3EC52E5E 5F0054DE 289A5002
6A368436 FF2E3686 36FF2E05 8936F03E C52E0589 36F43EC5 2E00FFB8 058936E8
8D165B7D 04FE7E83 FE46FF03 EB0000FE 46C70034 04049A06 C483002C FC9C9A28
FF505236 76168B2E 36740603 2E09E0C1 FE468B35 FF0275FF 36943EC5 2E50FC46
7E8312C4 830054C7 8E9A50E4 2A058A36 8C3EC52E 50E42A05 8A36F83E C52EFE76
C02B0044 82829A07 EB0AC483 0054C048 9AFC76FF 006A006A 006A006A B17400FC
FC36FF2E 36FE36FF 2E50FC46 8D160605 C636FC3E C52E0000 04C85756 CB5E5FC9
FC76FF00 6A006A00 6A006A16 7400FC7E 830EC483 0054DABA 9A6E6A05 6A016A36
5C7D04FE 7E83FE46 FF03EBFE 4689058B 369C3EC5 2E00B2E9 0AC48300 54C0489A

37043EC5 2E006A02 55890589 37003EC5 2E368216 8B2E3680 06032E00 82FE4669
C52E3682 168B2E36 8006032E 0082FE46 6908C483 00342677 9AFE76FF 006A35FF
C43EC52E 9BEB08C4 83003426 779AFE76 FF060468 006A096A 02558905 8937003E
FF016A09 6A207D04 FE7E83FE 46FF03EB FE468905 8B369C3E C52E3575 003D8336
5E5FC9C0 2BD7EB06 C4830034 27389AFE 76FF026A 096A06C4 83003427 389AFE76
016A36FC 36FF2E36 FE36FF2E 50FC468D 160605C6 36FC3EC5 2E000004 C85756CB
C0489AFC 76FF006A 006A006A 006A1674 00FC7E83 0EC48300 54DABA9A 6E6A056A
4689058B 369C3EC5 2E0090E9 03740001 3D058B36 C43EC52E 00A1E90A C4830054
FF026A09 6A06C483 00342738 9AFE76FF 016A096A 7B7D04FE 7E83FE46 FF03EBFE
05893700 3EC52E36 82168B2E 36800603 2E0082FE 466906C4 83003427 389AFE76
032E0082 FE466908 C4830034 26779AFE 76FF006A 35FF3704 3EC52E09 6A025589
3426779A FE76FF06 0468006A 096A0255 89058937 003EC52E 36DE168B 2E36DC06
9A057500 013D058B 37083EC5 2E000006 C85756CB 5E5FC9C0 2BFF7CE9 08C48300
74C00B00 5458749A 009DE903 75C00B04 C4830054 58A29A50 FA468D16 003CF03F
05367C06 8B2E367E 36FF2E06 C483003C 8CF79A00 6A367C36 FF2E367E 36FF2E5E
8CF79A02 6A500400 05367C06 8B2E367E 36FF2E06 C483003C 8CF79A01 6A500200
9A1CEB06 C483003C 8CF79A03 6A500600 05367C06 8B2E367E 36FF2E06 C483003C
00545874 9A04C483 003435AD 9A35FF02 75FF3678 3EC52E12 7500083D 005455F0
1650FD46 8D1650FE 468D1649 EB003434 459A5075 00083D00 5455F09A 0A75C00B
DABA9A01 43680A6A 056A50E4 2AFD468A 50E42AFD 468A50E4 2AFD468A 50FD468D
5FC90AC4 830054C0 489AFE76 FF006A00 6A006A00 6A137400 FE7E8318 C4830054
A29A50FA 468D1600 3CE9C69A 05750001 3D058B37 083EC52E 000006C8 5756CB5E
367436FF 2E367636 FF2E5E74 C00B0054 58749A00 9DE90375 C00B04C4 83005458
83003C8C F79A016A 50020005 3674068B 2E367636 FF2E06C4 83003C8C F79A006A
2E367636 FF2E06C4 83003C8C F79A026A 50040005 3674068B 2E367636 FF2E06C4
C52E1275 00083D00 5455F09A 1CEB06C4 83003C8C F79A036A 50060005 3674068B
083D0054 55F09A0A 75C00B00 5458749A 04C48300 3435AD9A 35FF0275 FF36703E
8A50E42A FD468A50 FD468D16 50FD468D 1650FE46 8D1649EB 00343445 9A507500
137400FE 7E8318C4 830054DA BA9A0143 680A6A03 6A50E42A FD468A50 E42AFD46
E5029A00 0006C857 56CB5E5F C90AC483 0054C048 9AFE76FF 006A006A 006A006A
2CFC9C9A 2A6A006A 006A0034 35189A13 7E003D83 36E43EC5 2E00342F D79A0034
FF36D83E C52E36D4 36FF2E36 D636FF2E 368436FF 2E368636 FF2E5756 06C48300
468D165B 7D04FE7E 83FE46FF 03EBFE46 89058B36 9C3EC52E 5E5F0054 DE289A35
76FF5052 3676168B 2E367406 032E09E0 C1FE468B 35FF0275 FF36943E C52E50FC
FC7E8312 C4830054 C78E9A50 E42A058A 368C3EC5 2E50E42A 058A3690 3EC52EFE
58A29A50 FA468D16 47EB0AC4 830054C0 489AFC76 FF006A00 6A006A00 6AB17400
35AD9A35 FF0275FF 36703EC5 2E127500 083D0054 55F09A34 74C00B04 C4830054
C9C02B00 3434459A 05750008 3D005455 F09A0A75 C00B0054 58749A04 C4830034
9A3474C0 0B04C483 005458A2 9A50FE46 8D160034 2E619A00 0002C857 56CB5E5F
00545874 9A04C483 003435AD 9A35FF02 75FF3670 3EC52E12 7500083D 005455F0
35189A19 7E003D83 36E43EC5 2E003434 459A0575 00083D00 5455F09A 0A75C00B
8B555756 CB5E5FC9 C02B06C4 83002CFC 9C9A296A 368436FF 2E368636 FF2E0034
2E9BEC8B 555756CB 5E5FC99B 08C48300 340D3C9A 0054968F 9A370C06 DD2E9BEC
1C06DD2E 9BEC8B55 5756CB5E 5FC99B08 C4830034 0D3C9A00 54968F9A 371406DD
8F9A3724 06DD2E9B EC8B5557 56CB5E5F C99B08C4 8300340D 3C9A0054 968F9A37
0054968F 9A370C06 DD2E9BEC 8B555756 CB5E5FC9 9B08C483 00340D3C 9A005496
0FB49A00 54968F9A 371406DD 2E9BEC8B 555756CB 5E5FC99B 08C48300 340FB49A
8300340F B49A0054 968F9A37 1C06DD2E 9BEC8B55 5756CB5E 5FC99B08 C4830034
9B08C483 00340FB4 9A005496 8F9A3724 06DD2E9B EC8B5557 56CB5E5F C99B08C4
5E5FC99B 08C48300 3411E09A 0054968F 9A370C06 DD2E9BEC 8B555756 CB5E5FC9
5756CB5E 5FC99B08 C4830034 11E09A00 54968F9A 371406DD 2E9BEC8B 555756CB
EC8B5557 56CB5E5F C99B08C4 83003411 E09A0054 968F9A37 1C06DD2E 9BEC8B55
DD2E9BEC 8B555756 CB5E5FC9 9B08C483 003411E0 9A005496 8F9A3724 06DD2E9B
371406DD 2E9BEC8B 555756CB 5E5FC99B 08C48300 3416389A 0054968F 9A370C06
968F9A37 1C06DD2E 9BEC8B55 5756CB5E 5FC99B08 C4830034 16389A00 54968F9A
9A005496 8F9A3724 06DD2E9B EC8B5557 56CB5E5F C99B08C4 83003416 389A0054
3418649A 0054968F 9A370C06 DD2E9BEC 8B555756 CB5E5FC9 9B08C483 00341638
C4830034 18649A00 54968F9A 371406DD 2E9BEC8B 555756CB 5E5FC99B 08C48300
C99B08C4 83003418 649A0054 968F9A37 1C06DD2E 9BEC8B55 5756CB5E 5FC99B08
CB5E5FC9 9B08C483 00341864 9A005496 8F9A3724 06DD2E9B EC8B5557 56CB5E5F
555756CB 5E5FC99B 08C48300 341A909A 0054968F 9A370C06 DD2E9BEC 8B555756
9BEC8B55 5756CB5E 5FC99B08 C4830034 1A909A00 54968F9A 371406DD 2E9BEC8B
06DD2E9B EC8B5557 56CB5E5F C99B08C4 8300341A 909A0054 968F9A37 1C06DD2E
9A370C06 DD2E9BEC 8B555756 CB5E5FC9 9B08C483 00341A90 9A005496 8F9A3724
54968F9A 371406DD 2E9BEC8B 555756CB 5E5FC99B 08C48300 341CCD9A 0054968F
CD9A0054 968F9A37 1C06DD2E 9BEC8B55 5756CB5E 5FC99B08 C4830034 1CCD9A00
00341CCD 9A005496 8F9A3724 06DD2E9B EC8B5557 56CB5E5F C99B08C4 8300341C
08C48300 34140C9A 0054968F 9A370C06 DD2E9BEC 8B555756 CB5E5FC9 9B08C483
5FC99B08 C4830034 140C9A00 54968F9A 371406DD 2E9BEC8B 555756CB 5E5FC99B

56CB5E5F C99B08C4 83003414 0C9A0054 968F9A37 1C06DD2E 9BEC8B55 5756CB5E
12C85756 CB5E5FC9 9B08C483 0034140C 9A005496 8F9A3724 06DD2E9B EC8B5557
C52E0000 05C736E8 3EC52E0A 5EDD9B37 2C36DC2E 9B0A46DD 9B0000EE 46C70000
8B018EE9 037C04F0 7E83F046 FF03EBF0 4689058B 369C3EC5 2E000005 C736F03E
013D058B 36CA1E8E 2E36C83E 032EE7D1 F07E8B00 00F245C7 1F16FD03 E7D1F07E
37343E03 2E02E7C1 F07E8B05 0936E83E C52E02C4 83003435 799AF076 FFD07500
9B05D99B 37361E8E 2E37343E 032E02E7 C1F07E8B FA5ED99B 05D99B37 361E8E2E
DD2E9B0A 75005496 8A9A3740 1EDC2E9B 0A46DD9B 1B750054 968A9A37 381EDC2E
D99B2DD8 9B0A46DD 9B37361E 8E2E3734 3E032E02 E7C1F07E 8B0A5EDD 9B374806
76005496 8A9A3750 1EDC2E9B 05D99B37 361E8E2E 37343E03 2E02E7C1 F07E8B1D
02E7C1F0 7E8B1DD9 9B375006 DD2E9B37 361E8E2E 37343E03 2E02E7C1 F07E8B19
02E7C1F0 7E8B1973 0054968A 9A37381E DC2E9B05 D99B3736 1E8E2E37 343E032E
F07E8B33 74003D80 37583EC5 2E1DD99B 373806DD 2E9B3736 1E8E2E37 343E032E
FF2E0054 968F9AFA 46D99B00 54968F9A 05D99B37 361E8E2E 37343E03 2E02E7C1
37361E8E 2E37343E 032E02E7 C1F07E8B 14C48300 544A8A9A 375C36FF 2E375E36
FF0001F2 45C71F16 FD03E7D1 F07E8BFE 82E90375 0054968A 9AFA5ED8 9B05D99B
9C3EC52E 0034348F 9A057E00 3D8336E4 3EC52EFE 66E902C4 8300342A 819AF076
00013DF2 458B1F16 FD03E7D1 F07E8B71 7D04F07E 83F046FF 03EBF046 89058B36
7406032E 09E0C1F0 468B35FF 0275FF36 943EC52E 50FE468D 160001EE 46C7E675
9A50E42A 058A368C 3EC52E50 E42A058A 36903EC5 2EF076FF 50523676 168B2E36
0AC48300 54C0489A FE76FF00 6A006A00 6A006A9B 7400FE7E 8312C483 0054C78E
2E0000EA 46C70000 16C85756 CB5E5FC9 9BC02B00 1CF90B9A 057501EE 7E830DEB
EC46FF03 EBEC4689 058B369C 3EC52E00 1005C736 F03EC52E 000005C7 36E83EC5
C83E032E E7D1EC7E 8B0000EE 45C71F16 FD03E7D1 EC7E8B01 50E9037C 04EC7E83
8B050936 E83EC52E 02C48300 3435799A EC76FFD0 7500013D 058B36CA 1E8E2E36
603E032E 02E7C1EC 7E8BF65E DD9B05D9 9B37621E 8E2E3760 3E032E02 E7C1EC7E
37621E8E 2E37603E 032E02E7 C1EC7E8B 1DD99B05 D89B0A46 DD9B3762 1E8E2E37
37621E8E 2E37603E 032E02E7 C1EC7E8B 19760054 968A9A37 641EDC2E 9B05D99B
1EDC2E9B 05D99B37 621E8E2E 37603E03 2E02E7C1 EC7E8B1D D99B3764 06DD2E9B
2E1DD99B EED99B37 621E8E2E 37603E03 2E02E7C1 EC7E8B16 73005496 8A9A376C
54968F9A 05D99B37 621E8E2E 37603E03 2E02E7C1 EC7E8B33 74003D80 37583EC5
C1EC7E8B 14C48300 544A8A9A 377436FF 2E377636 FF2E0054 968F9AF6 46DD9B00
EC7E8BFE C0E90375 0054968A 9AF65EDC 9B05D99B 37621E8E 2E37603E 032E02E7
3D8336E4 3EC52EFE A4E902C4 8300342A 819AEC76 FF0001EE 45C71F16 FD03E7D1
EC7E8B71 7D04EC7E 83EC46FF 03EBEC46 89058B36 9C3EC52E 0034348F 9A057E00
0275FF36 943EC52E 50FE468D 160001EA 46C7E675 00013DEE 458B1F16 FD03E7D1
E42A058A 36903EC5 2EEC76FF 50523676 168B2E36 7406032E 09E0C1EC 468B35FF
6A006A00 6A006A9B 7400FE7E 8312C483 0054C78E 9A50E42A 058A368C 3EC52E50
CB5E5FC9 9BC02B00 1CF90B9A 057501EA 7E830DEB 0AC48300 54C0489A FE76FF00
3EC52E00 2005C736 F03EC52E 000005C7 36E83EC5 2E0000EA 46C70000 16C85756
45C71F16 FD03E7D1 EC7E8B01 50E9037C 04EC7E83 EC46FF03 EBEC4689 058B369C
3435799A EC76FFD0 7500013D 058B36CA 1E8E2E36 C83E032E E7D1EC7E 8B0000EE
DD9B05D9 9B36861E 8E2E3684 3E032E02 E7C1EC7E 8B050936 E83EC52E 02C48300
C1EC7E8B 1DD99B2D D89B0A46 DD9B3686 1E8E2E36 843E032E 02E7C1EC 7E8BF65E
C1EC7E8B 19760054 968A9A37 641EDC2E 9B05D99B 36861E8E 2E36843E 032E02E7
36843E03 2E02E7C1 EC7E8B1D D99B3764 06DD2E9B 36861E8E 2E36843E 032E02E7
36843E03 2E02E7C1 EC7E8B16 73005496 8A9A376C 1EDC2E9B 05D99B36 861E8E2E
36843E03 2E02E7C1 EC7E8B33 74003D80 37583EC5 2E1DD99B EED99B36 861E8E2E
377836FF 2E377A36 FF2E0054 968F9AF6 46DD9B00 54968F9A 05D99B36 861E8E2E
9AF65EDC 9B05D99B 36861E8E 2E36843E 032E02E7 C1EC7E8B 14C48300 544A8A9A
8300342A 819AEC76 FF0001EE 45C71F16 FD03E7D1 EC7E8BFE C0E90375 0054968A
03EBEC46 89058B36 9C3EC52E 0034348F 9A057E00 3D8336E4 3EC52EFE A4E902C4
160001EA 46C7E675 00013DEE 458B1F16 FD03E7D1 EC7E8B71 7D04EC7E 83EC46FF
50523676 168B2E36 7406032E 09E0C1EC 468B35FF 0275FF36 943EC52E 50FE468D
8312C483 0054C78E 9A50E42A 058A368C 3EC52E50 E42A058A 36903EC5 2EEC76FF
057501EA 7E830DEB 0AC48300 54C0489A FE76FF00 6A006A00 6A006A9B 7400FE7E
000005C7 36E83EC5 2E0000EA 46C70000 16C85756 CB5E5FC9 9BC02B00 1CF90B9A
50E9037C 04EC7E83 EC46FF03 EBEC4689 058B369C 3EC52E00 5005C736 F03EC52E
058B36CA 1E8E2E36 C83E032E E7D1EC7E 8B0000EE 45C71F16 FD03E7D1 EC7E8B01
3E032E02 E7C1EC7E 8B050936 E83EC52E 02C48300 3435799A EC76FFD0 7500013D
DD9B377E 1E8E2E37 7C3E032E 02E7C1EC 7E8BF65E DD9B05D9 9B377E1E 8E2E377C
641EDC2E 9B05D99B 377E1E8E 2E377C3E 032E02E7 C1EC7E8B 1DD99B2D D89B0A46
D99B3764 06DD2E9B 377E1E8E 2E377C3E 032E02E7 C1EC7E8B 19760054 968A9A37
73005496 8A9A376C 1EDC2E9B 05D99B37 7E1E8E2E 377C3E03 2E02E7C1 EC7E8B1D
74003D80 37583EC5 2E1DD99B EED99B37 7E1E8E2E 377C3E03 2E02E7C1 EC7E8B16
968F9AF6 46DD9B00 54968F9A 05D99B37 7E1E8E2E 377C3E03 2E02E7C1 EC7E8B33
2E377C3E 032E02E7 C1EC7E8B 14C48300 544A8A9A 378036FF 2E378236 FF2E0054
45C71F16 FD03E7D1 EC7E8BFE C0E90375 0054968A 9AF65EDC 9B05D99B 377E1E8E 0034348F 9A057E00 3D8336E4 3EC52EFE A4E902C4 8300342A 819AEC76 FF0001EE
458B1F16 FD03E7D1 EC7E8B71 7D04EC7E 83EC46FF 03EBEC46 89058B36 9C3EC52E
09E0C1EC 468B35FF 0275FF36 943EC52E 50FE468D 160001EA 46C7E675 00013DEE
058A368C 3EC52E50 E42A058A 36903EC5 2EEC76FF 50523676 168B2E36 7406032E
54C0489A FE76FF00 6A006A00 6A006A9B 7400FE7E 8312C483 0054C78E 9A50E42A
46C70000 16C85756 CB5E5FC9 9BC02B00 1CF90B9A 057501EA 7E830DEB 0AC48300
EBEC4689 058B369C 3EC52E00 3005C736 F03EC52E 000005C7 36E83EC5 2E0000EA
E7D1EC7E 8B0000EE 45C71F16 FD03E7D1 EC7E8B01 50E9037C 04EC7E83 EC46FF03
E83EC52E 02C48300 3435799A EC76FFD0 7500013D 058B36CA 1E8E2E36 C83E032E
02E7C1EC 7E8BF65E DD9B05D9 9B37861E 8E2E3784 3E032E02 E7C1EC7E 8B050936
2E37843E 032E02E7 C1EC7E8B 1DD99B2D D89B0A46 DD9B3786 1E8E2E37 843E032E
2E37843E 032E02E7 C1EC7E8B 19760054 968A9A37 641EDC2E 9B05D99B 37861E8E
05D99B37 861E8E2E 37843E03 2E02E7C1 EC7E8B1D D99B3764 06DD2E9B 37861E8E
EED99B37 861E8E2E 37843E03 2E02E7C1 EC7E8B16 73005496 8A9A376C 1EDC2E9B
05D99B37 861E8E2E 37843E03 2E02E7C1 EC7E8B33 74003D80 37583EC5 2E1DD99B
14C48300 544A8A9A 378836FF 2E378A36 FF2E0054 968F9AF6 46DD9B00 54968F9A
C0E90375 0054968A 9AF65EDC 9B05D99B 37861E8E 2E37843E 032E02E7 C1EC7E8B
3EC52EFE A4E902C4 8300342A 819AEC76 FF0001EE 45C71F16 FD03E7D1 EC7E8BFE
7D04EC7E 83EC46FF 03EBEC46 89058B36 9C3EC52E 0034348F 9A057E00 3D8336E4
943EC52E 50FE468D 160001EA 46C7E675 00013DEE 458B1F16 FD03E7D1 EC7E8B71
36903EC5 2EEC76FF 50523676 168B2E36 7406032E 09E0C1EC 468B35FF 0275FF36
6A006A9B 7400FE7E 8312C483 0054C78E 9A50E42A 058A368C 3EC52E50 E42A058A
9BC02B00 1CF90B9A 057501EA 7E830DEB 0AC48300 54C0489A FE76FF00 6A006A00
4005C736 F03EC52E 000005C7 36E83EC5 2E0000EA 46C70000 16C85756 CB5E5FC9
FD03E7D1 EC7E8B01 50E9037C 04EC7E83 EC46FF03 EBEC4689 058B369C 3EC52E00
EC76FFD0 7500013D 058B36CA 1E8E2E36 C83E032E E7D1EC7E 8B0000EE 45C71F16
9B378E1E 8E2E378C 3E032E02 E7C1EC7E 8B050936 E83EC52E 02C48300 3435799A
1DD99B2D D89B0A46 DD9B378E 1E8E2E37 8C3E032E 02E7C1EC 7E8BF65E DD9B05D9
19760054 968A9A37 641EDC2E 9B05D99B 378E1E8E 2E378C3E 032E02E7 C1EC7E8B
2E02E7C1 EC7E8B1D D99B3764 06DD2E9B 378E1E8E 2E378C3E 032E02E7 C1EC7E8B
2E02E7C1 EC7E8B16 73005496 8A9A376C 1EDC2E9B 05D99B37 8E1E8E2E 378C3E03
2E02E7C1 EC7E8B33 74003D80 37583EC5 2E1DD99B EED99B37 8E1E8E2E 378C3E03
2E379236 FF2E0054 968F9AF6 46DD9B00 54968F9A 05D99B37 8E1E8E2E 378C3E03
9B05D99B 378E1E8E 2E378C3E 032E02E7 C1EC7E8B 14C48300 544A8A9A 379036FF
819AEC76 FF0001EE 45C71F16 FD03E7D1 EC7E8BFE C0E90375 0054968A 9AF65EDC
89058B36 9C3EC52E 0034348F 9A057E00 3D8336E4 3EC52EFE A4E902C4 8300342A
46C7E675 00013DEE 458B1F16 FD03E7D1 EC7E8B71 7D04EC7E 83EC46FF 03EBEC46
168B2E36 7406032E 09E0C1EC 468B35FF 0275FF36 943EC52E 50FE468D 160001EA
0054C78E 9A50E42A 058A368C 3EC52E50 E42A058A 36903EC5 2EEC76FF 50523676
7E830DEB 0AC48300 54C0489A FE76FF00 6A006A00 6A006A9B 7400FE7E 8312C483
9B0A46DD 9B0000EA 46C70000 16C85756 CB5E5FC9 9BC02B00 1CF90B9A 057501EA
369C3EC5 2E006005 C736F03E C52E0000 05C736E8 3EC52E0A 5EDD9B37 940EDC2E
00EE45C7 1F16FD03 E7D1EC7E 8B0153E9 037C04EC 7E83EC46 FF03EBEC 4689058B
83003435 799AEC76 FFD07500 013D058B 36CA1E8E 2E36C83E 032EE7D1 EC7E8B00
F65EDD9B 05D99B37 9E1E8E2E 379C3E03 2E02E7C1 EC7E8B05 0936E83E C52E02C4
02E7C1EC 7E8B1DD9 9B2DD89B 0A46DD9B 379E1E8E 2E379C3E 032E02E7 C1EC7E8B
02E7C1EC 7E8B1976 0054968A 9A37A01E DC2E9B05 D99B379E 1E8E2E37 9C3E032E
8E2E379C 3E032E02 E7C1EC7E 8B1DD99B 37A006DD 2E9B379E 1E8E2E37 9C3E032E
8E2E379C 3E032E02 E7C1EC7E 8B197300 54968A9A 37A81EDC 2E9B05D9 9B379E1E
9C3E032E 02E7C1EC 7E8B3374 003D8037 583EC52E 1DD99B37 A806DD2E 9B379E1E
B036FF2E 37B236FF 2E005496 8F9AF646 DD9B0054 968F9A05 D99B379E 1E8E2E37
F65EDC9B 05D99B37 9E1E8E2E 379C3E03 2E02E7C1 EC7E8B14 C4830054 4A8A9A37
00342A81 9AEC76FF 0001EE45 C71F16FD 03E7D1EC 7E8BFEBD E9037500 54968A9A
EBEC4689 058B369C 3EC52E00 34348F9A 057E003D 8336E43E C52EFEA1 E902C483
0001EA46 C7E67500 013DEE45 8B1F16FD 03E7D1EC 7E8B717D 04EC7E83 EC46FF03
52367616 8B2E3674 06032E09 E0C1EC46 8B35FF02 75FF3694 3EC52E50 FE468D16
12C48300 54C78E9A 50E42A05 8A368C3E C52E50E4 2A058A36 903EC52E EC76FF50
7501EA7E 830DEB0A C4830054 C0489AFE 76FF006A 006A006A 006A9B74 00FE7E83
0EDC2E9B 0A46DD9B 0000EA46 C7000016 C85756CB 5E5FC99B C02B001C F90B9A05
89058B36 9C3EC52E 007005C7 36F03EC5 2E000005 C736E83E C52E0A5E DD9B3794
7E8B0000 EE45C71F 16FD03E7 D1EC7E8B 0153E903 7C04EC7E 83EC46FF 03EBEC46
2E02C483 00343579 9AEC76FF D0750001 3D058B36 CA1E8E2E 36C83E03 2EE7D1EC
EC7E8BF6 5EDD9B05 D99B37B6 1E8E2E37 B43E032E 02E7C1EC 7E8B0509 36E83EC5
3E032E02 E7C1EC7E 8B1DD99B 2DD89B0A 46DD9B37 B61E8E2E 37B43E03 2E02E7C1
3E032E02 E7C1EC7E 8B197600 54968A9A 37B81EDC 2E9B05D9 9B37B61E 8E2E37B4
37B61E8E 2E37B43E 032E02E7 C1EC7E8B 1DD99B37 B806DD2E 9B37B61E 8E2E37B4
37B61E8E 2E37B43E 032E02E7 C1EC7E8B 19730054 968A9A37 C01EDC2E 9B05D99B
8E2E37B4 3E032E02 E7C1EC7E 8B337400 3D803758 3EC52E1D D99B37C0 06DD2E9B

8A9A37C8 36FF2E37 CA36FF2E 0054968F 9AF646DD 9B005496 8F9A05D9 9B37B61E
968A9AF6 5EDC9B05 D99B37B6 1E8E2E37 B43E032E 02E7C1EC 7E8B14C4 8300544A
02C48300 342A819A EC76FF00 01EE45C7 1F16FD03 E7D1EC7E 8BFEBDE9 03750054
46FF03EB EC468905 8B369C3E C52E0034 348F9A05 7E003D83 36E43EC5 2EFEA1E9
468D1600 01EA46C7 E6750001 3DEE458B 1F16FD03 E7D1EC7E 8B717D04 EC7E83EC
76FF5052 3676168B 2E367406 032E09E0 C1EC468B 35FF0275 FF36943E C52E50FE
FE7E8312 C4830054 C78E9A50 E42A058A 368C3EC5 2E50E42A 058A3690 3EC52EEC
0B9A0575 01EA7E83 0DEB0AC4 830054C0 489AFE76 FF006A00 6A006A00 6A9B7400
2B058936 C83EC52E FF046B26 36C836C4 2EEC8B55 5756CB5E 5FC99BC0 2B001CF9
5FC9C02B 02458936 C83EC52E FF02446B 2636C836 C42EEC8B 555756CB 5E5FC9C0
56CB5E5F C9C02B04 458936C8 3EC52EFF 04446B26 36C836C4 2EEC8B55 5756CB5E
02C85756 CB5E5FC9 C02B0645 8936C83E C52EFF06 446B2636 C836C42E EC8B5557
C83E032E E7D1FE7E 8B157D04 FE7E83FE 46FF03EB FE468905 8B369C3E C52E0000
74C00B00 34E5B29A 000006C8 5756CB5E 5FC9C02B E2EB0001 05C736CA 1E8E2E36
C52E06C4 83002CFC 9C9A2C6A 006A006A 0E7E003D 8336E43E C52E0034 E7189A05
0054DABA 9A6E6A05 6A016A36 FC36FF2E 36FE36FF 2E50FA46 8D160605 C636FC3E
2E0341E9 0AC48300 54C0489A FA76FF00 6A006A00 6A006A16 7400FA7E 830EC483
317D04FE 7E83FE46 FF03EBFE 4689058B 369C3EC5 2E467500 013D058B 36C43EC5
37043EC5 2E006A02 55890589 37003EC5 2E368216 8B2E3680 06032E00 82FE4669
FE46FF03 EBFE4689 058B369C 3EC52EC6 EB08C483 00342677 9AFE76FF 006A35FF
7E8B06C4 830044D5 169A3684 36FF2E36 8636FF2E FE76FF00 E4E9037C 04FE7E83
FF2EFE76 FF016A50 FA468D16 5B7E00FF 3D058B37 CE1E8E2E 37CC3E03 2EE7D1FE
2E09E0C1 FE468B50 52368216 8B2E3680 06032E00 82FE4669 368436FF 2E368636
6A006A00 6A006A84 7400FA7E 8314C483 003C9958 9A505236 76168B2E 36740603
FF2E3686 36FF2EFE 76FF006A 50FA468D 160251E9 0AC48300 54C0489A FA76FF00
2E367406 032E09E0 C1FE468B 50523682 168B2E36 8006032E 0082FE46 69368436
FF006A00 6A006A00 6AFF26E9 037500FA 7E8314C4 83003C99 589A5052 3676168B
46FF03EB FE468905 8B369C3E C52E002C D3799A01 F3E90AC4 830054C0 489AFA76
7406032E 09E0C1FE 468B35FF 0275FF36 943EC52E 50FA468D 165C7D04 FE7E83FE
9A50E42A 058A368C 3EC52E50 E42A058A 36903EC5 2EFE76FF 50523676 168B2E36
0AC48300 54C0489A FA76FF00 6A006A00 6A006AB1 7400FA7E 8312C483 0054C78E
36FF2E37 D236FF2E 37D436FF 2E37D636 FF2E006A 006A006A 50FA468D 16017DE9
0054C048 9AFA76FF 006A006A 006A006A 137400FA 7E8312C4 83003C7D 919A37D0
3E032EE7 D1FE7E8B 6B7D04FE 7E83FE46 FF03EBFE 4689058B 369C3EC5 2E0AC483
768B227D 40FC7E83 FC46FF03 EB0000FC 46C7E17F 00FF3D05 8B37CE1E 8E2E37CC
D5EB0589 02E0C1FC 468BFE03 36821E8E 2E36803E 032EF88B 0082FE46 69E6D1FC
894802E0 C1FC468B FE033682 1E8E2E36 803E032E F88B0082 FE4669E6 D1FC768B
7E83FE46 FF03EBFE 4689058B 369C3EC5 2E467500 013D058B 36C43EC5 2E8CEB05
2E096A02 55890589 37003EC5 2E368216 8B2E3680 06032E00 82FE4669 317D04FE
EBFE4689 058B369C 3EC52EC6 EB08C483 00342677 9AFE76FF 006A35FF 37043EC5
FE466950 5236DE16 8B2E36DC 06032E00 82FE4669 5756567D 04FE7E83 FE46FF03
983EC52E 5E5F0054 DE289A35 FF36E03E C52E5052 3682168B 2E368006 032E0082
A1EB02C4 83004472 629AFE76 FFAEEB00 4476719A 077503FE 7E830D75 013D8036
0105C737 D83EC52E 00343518 9A227E00 3D8336E4 3EC52EEC 8B555756 CB5E5FC9
C902C483 003424BD 9A006A06 C483002C FC9C9A2D 6A37D836 FF2E37DA 36FF2E00
000205C7 37D83EC5 2E003435 189A227E 003D8336 E43EC52E EC8B5557 56CB5E5F
5FC902C4 83003424 BD9A016A 06C48300 2CFC9C9A 2D6A37D8 36FF2E37 DA36FF2E
2E000405 C737D83E C52E0034 35189A22 7E003D83 36E43EC5 2EEC8B55 5756CB5E
5E5FC902 C4830034 24BD9A02 6A06C483 002CFC9C 9A2D6A37 D836FF2E 37DA36FF
FF2E0008 05C737D8 3EC52E00 3435189A 227E003D 8336E43E C52EEC8B 555756CB
CB5E5FC9 02C48300 3424BD9A 036A06C4 83002CFC 9C9A2D6A 37D836FF 2E37DA36
36FF2E00 0F05C737 D83EC52E 00343518 9A227E00 3D8336E4 3EC52EEC 8B555756
24BD9A01 6A02C483 003424BD 9A006A06 C483002C FC9C9A2D 6A37D836 FF2E37DA
C85756CB 5E5FC902 C4830034 24BD9A03 6A02C483 003424BD 9A026A02 C4830034
0A468B35 FF0275FF 36943EC5 2E50FE46 8D1602C4 83003431 599A0A76 FF000002
8C3EC52E 50E42A05 8A36903E C52E0A76 FF505236 76168B2E 36740603 2E09E0C1
9AFE76FF 006A006A 006A006A 157400FE 7E8312C4 830054C7 8E9A50E4 2A058A36
555756CB 5E5FC900 1CF90B9A 02C48300 34253D9A 0A76FF10 EB0AC483 0054C048
37343E03 2E02E7C1 0A7E8B05 D99B37DE 1E8E2E37 DC3E032E 02E7C10A 7E8BEC8B
E7C10A7E 8B05D99B 36D61E8E 2E36D43E 032E02E7 C10A7E8B 1DD99B37 361E8E2E
D99B37E2 1E8E2E37 E03E032E 02E7C10A 7E8B1DD9 9B36861E 8E2E3684 3E032E02
2E37E43E 032E02E7 C10A7E8B 1DD99B37 861E8E2E 37843E03 2E02E7C1 0A7E8B05
02E7C10A 7E8B1DD9 9B378E1E 8E2E378C 3E032E02 E7C10A7E 8B05D99B 37E61E8E
1DD99B37 7E1E8E2E 377C3E03 2E02E7C1 0A7E8B05 D99B37EA 1E8E2E37 E83E032E
8E2E3760 3E032E02 E7C10A7E 8B05D99B 37EE1E8E 2E37EC3E 032E02E7 C10A7E8B
2E02E7C1 0A7E8B05 D99B37F2 1E8E2E37 F03E032E 02E7C10A 7E8B1DD9 9B37621E
8B05D99B 37F61E8E 2E37F43E 032E02E7 C10A7E8B 1DD99B37 9E1E8E2E 379C3E03
FC46C700 0004C857 56CB5E5F C99B1DD9 9B37B61E 8E2E37B4 3E032E02 E7C10A7E
10C48300 54DABA9A 012E6806 6AFC76FF 0C76FF0E 76FF1076 FF50FE46 8D160001

```
50FE468D 1678EB0A C4830054 C0489AFE 76FF006A 006A006A 006A1574 00FE7E83
76FF006A 006A006A 006A1574 00FE7E83 0AC48300 54DABA9A 012D6803 6AFC76FF
C52E05D9 9B37FE1E 8E2E37FC 3E032E02 E7C10A7E 8B48EB0A C4830054 C0489AFE
D99B3800 3EC52E05 D99B3806 1E8E2E38 043E032E 02E7C10A 7E8B1DD9 9B37F83E
46C70000 1EC85756 CB5E5FC9 9B04C483 00343274 9A380836 FF2E380A 36FF2E1D
6E6A056A 016A36FC 36FF2E36 FE36FF2E 50EC468D 160605C6 36FC3EC5 2E0001EA
C4830054 C0489AEC 76FF006A 006A006A 006A1674 00EC7E83 0EC48300 54DABA9A
DABA9A01 2E68066A EA76FF00 6A35FF37 043EC52E 0E76FF50 EC468D16 01E3E90A
A6E90AC4 830054C0 489AEC76 FF006A00 6A006A00 6A167400 EC7E8310 C4830054
006A006A 167400EC 7E830AC4 830054DA BA9A012D 68036AEA 76FF50EC 468D1601
DD9BE8D9 9B00B3E9 0374010C 7E830175 E90AC483 0054C048 9AEC76FF 006A006A
DF2E9BEE 5ED99BE2 46DC9B05 D99B3806 1E8E2E38 043E032E 02E7C10A 7E8BE25E
D99BE246 DC9B05D9 9B38061E 8E2E3804 3E032E02 E7C10A7E 8BE25EDD 9B380C06
3E032EF8 8B0A0A46 6BE6D1FE 768B5C7F 04FE7E83 FE46FF03 EB0000FE 46C7F25E
8D1650EE 468D1650 EC468D16 FA5ED99B F656D99B 05DF9BFE 0338101E 8E2E380E
006A006A 006A006A B17400EC 7E8312C4 830054DA BA9A00C9 68076A02 6A50F646
7E8BE25E DD9BE8D9 9B00B0E9 0374020C 7E8300B9 E90AC483 0054C048 9AEC76FF
9B380C06 DF2E9BF6 5ED99BE2 66DC9B05 D99B37FE 1E8E2E37 FC3E032E 02E7C10A
46C7FA5E D99BE266 DC9B05D9 9B37FE1E 8E2E37FC 3E032E02 E7C10A7E 8BE25EDD
8E2E3812 3E032EF8 8B0A0A46 6BE6D1FE 768B597F 04FE7E83 FE46FF03 EB0000FE
6A50F646 8D1650EE 468D1650 EC468D16 F25ED99B EE56D99B 05DF9BFE 0338141E
9AEC76FF 006A006A 006A006A B17400EC 7E8312C4 830054DA BA9A00C9 68076A02
04FE7E83 FE46FF03 EB0000FE 46C70000 14C85756 CB5E5FC9 9B0AC483 0054C048
2EEC5EDD 9B381606 DF2E9BE4 7F04FC7E 83FC46FF 03EB0000 FC46C700 C9E9037C
8E2E37FC 3E032E02 E7C1FE7E 8BF45EDD 9BEC76DC 9B0DD89B FC46DF9B 36A83EC5
0AFE566B E6D1FC76 8B08C483 005496EF 9A005496 8F9AF446 DC9B05D9 9B37FE1E
9B36B83E C52EEC5E DD9B3816 06DF2E9B 0589FE03 38101E8E 2E380E3E 032EFA8B
D99B3806 1E8E2E38 043E032E 02E7C1FE 7E8BF45E DD9BEC76 DC9B0DD8 9BFC46DF
3E032EFA 8B0AFE56 6BE6D1FC 768B08C4 83005496 EF9A0054 968F9AF4 66DC9B05
3EC52E00 342D4B9A EC8B5557 56CB5E5F C99BFF3E E90589FE 0338141E 8E2E3812
5E5FC900 3405019A 000105C7 36C43EC5 2EEC8B55 5756CB5E 5FC90000 05C736C4
016A36FC 36FF2E36 FE36FF2E 50FE468D 160605C6 36FC3EC5 2E000002 C85756CB
C0489AFE 76FF006A 006A006A 006A1674 00FE7E83 0EC48300 54DABA9A 6E6A056A
55890589 37003EC5 2E368216 8B2E3680 06032E00 820A4669 00FBE90A C4830054
DC06032E 00820A46 6908C483 00342677 9A0A76FF 006A35FF 37043EC5 2E006A02
006A096A 12750001 3D058B36 C43EC52E 02558905 8937003E C52E36DE 168B2E36
36FF2E36 8636FF2E 0A76FF01 6A50FE46 8D1608C4 83003426 779A0A76 FF060468
8B2E3674 06032E09 E0C10A46 8B505236 82168B2E 36800603 2E00820A 46693684
489AFE76 FF006A00 6A006A00 6A157400 FE7E8314 C483003C 99589A50 52367616
55890589 37003EC5 2E368216 8B2E3680 06032E00 820A4669 3BEB0AC4 830054C0
00342677 9A0A76FF 006A35FF 37043EC5 2E096A16 7500013D 058B36C4 3EC52E02
2E36FE36 FF2E50FC 468D1606 05C636FC 3EC52E00 0004C857 56CB5E5F C908C483
006A006A 006A006A 167400FC 7E830EC4 830054DA BA9A6E6A 056A016A 36FC36FF
8B369C3E C52E4675 00013D05 8B36C43E C52E0113 E90AC483 0054C048 9AFC76FF
C52E3682 168B2E36 8006032E 0082FE46 69317D04 FE7E83FE 46FF03EB FE468905
C6EB08C4 83003426 779AFE76 FF006A35 FF37043E C52E006A 02558905 8937003E
2EFE76FF 016A50FC 468D165A 7D04FE7E 83FE46FF 03EBFE46 89058B36 9C3EC52E
09E0C1FE 468B5052 3682168B 2E368006 032E0082 FE466936 8436FF2E 368636FF
006A006A 006AB274 00FC7E83 14C48300 3C99589A 50523676 168B2E36 7406032E
369C3EC5 2E467500 013D058B 36C43EC5 2E52EB0A C4830054 C0489AFC 76FF006A
2E368216 8B2E3680 06032E00 82FE4669 317D04FE 7E83FE46 FF03EBFE 4689058B
EB08C483 00342677 9AFE76FF 006A35FF 37043EC5 2E096A02 55890589 37003EC5
C52E0AC4 830054DA BA9A6F6A 036A066A 50FE468D 16000002 C85756CB 5E5FC9C6
FF2E50FC 468D1606 05C636FC 3EC52E00 0004C857 56CB5E5F C9000005 C7366C3E
006A006A 167400FC 7E830EC4 830054DA BA9A6E6A 056A016A 36FC36FF 2E36FE36
BCE90374 00013D05 8B36C43E C52E00CB E90AC483 0054C048 9AFC76FF 006A006A
27389AFE 76FF016A 006A7B7D 04FE7E83 FE46FF03 EBFE4689 058B369C 3EC52E00
8B2E3680 06032E00 82FE4669 06C48300 3427389A FE76FF02 6A006A06 C4830034
00342677 9AFE76FF 006A35FF 37043EC5 2E006A02 55890589 37003EC5 2E368216
006A006A 02558905 8937003E C52E36DE 168B2E36 DC06032E 0082FE46 6908C483
0054D323 9A381836 FF2E381A 36FF2EFF 7CE908C4 83003426 779AFE76 FF060468
5E5FC908 C4830054 D39A9A38 1836FF2E 381A36FF 2E006A01 6A1674C0 0B04C483
016A36FC 36FF2E36 FE36FF2E 50FC468D 160605C6 36FC3EC5 2E000004 C85756CB
C0489AFC 76FF006A 006A006A 006A1674 00FC7E83 0EC48300 54DABA9A 6E6A056A
FE46695F 7D04FE7E 83FE46FF 03EBFE46 89058B36 9C3EC52E 012BE90A C4830054
FE76FF06 0468006A 006A0255 89058937 003EC52E 36DE168B 2E36DC06 032E0082
0082FE46 69505236 DE168B2E 36DC0603 2E0082FE 46695756 08C48300 3426779A
C43EC52E 98EB5E5F 0054DE28 9A35FF36 E03EC52E 50523682 168B2E36 8006032E
006A0095 E9037C04 FE7E83FE 46FF03EB FE468905 8B369C3E C52E6775 003D8336
```

```
82FE4669 06C48300 3427389A FE76FF02 6A006A06 C4830034 27389AFE 76FF016A
006A35FF 37043EC5 2E006A02 55890589 37003EC5 2E368216 8B2E3680 06032E00
04FE7E83 FE46FF03 EBFE4689 058B369C 3EC52EA5 EB08C483 00342677 9AFE76FF
3EC52E09 6A025589 05893700 3EC52E36 82168B2E 36800603 2E0082FE 4669317D
3EC52E00 0004C857 56CB5E5F C9C6EB08 C4830034 26779AFE 76FF006A 35FF3704
830054DA BA9A6E6A 056A016A 36FC36FF 2E36FE36 FF2E50FC 468D1606 05C636FC
C52E0137 E90AC483 0054C048 9AFC76FF 006A006A 006A006A 167400FC 7E830EC4
36800603 2E0082FE 4669011F E9037C04 FE7E83FE 46FF03EB FE468905 8B369C3E
26779AFE 76FF006A 35FF3704 3EC52E00 6A025589 05893700 3EC52E36 82168B2E
006A0255 89058937 003EC52E 36DE168B 2E36DC06 032E0082 FE466908 C4830034
168B2E36 7406032E 09E0C1FE 468B5756 08C48300 3426779A FE76FF06 0468006A
DE289A35 FF36D03E C52E5052 367E168B 2E367C06 032E09E0 C1FE468B 50523676
DC06032E 0082FE46 69505236 82168B2E 36800603 2E0082FE 46695756 5E5F0054
00013D05 8B36C43E C52E5E5F 0054DE28 9A35FF36 E03EC52E 505236DE 168B2E36
3EC52E09 6A025589 05893700 3EC52E36 82168B2E 36800603 2E0082FE 46693275
00342738 9AFE76FF 016A006A FEF6E908 C4830034 26779AFE 76FF006A 35FF3704
2E000002 C85756CB 5E5FC9FE D5E906C4 83003427 389AFE76 FF026A00 6A06C483
54DABA9A 6E6A056A 016A36FC 36FF2E36 FE36FF2E 50FE468D 160605C6 36FC3EC5
00D0E90A C4830054 C0489AFE 76FF006A 006A006A 006A1674 00FE7E83 0EC48300
37043EC5 2E006A02 55890589 37003EC5 2E368216 8B2E3680 06032E00 820A4669
76168B2E 36740603 2E09E0C1 0A468B57 5608C483 00342677 9A0A76FF 006A35FF
54DE289A 35FF36D0 3EC52E50 52367E16 8B2E367C 06032E09 E0C10A46 8B505236
36DC0603 2E00820A 46695052 3682168B 2E368006 032E0082 0A466957 565E5F00
2E368006 032E0082 0A46695E 5F0054DE 289A35FF 36E03EC5 2E505236 DE168B2E
043EC52E 096A1675 00013D05 8B36C43E C52E0255 89058937 003EC52E 3682168B
04458B0A 7EC50002 2CC85756 CB5E5FC9 08C48300 3426779A 0A76FF00 6A35FF37
9B0E45D9 9B0A7EC5 F65689F4 46890A55 8B08458B 0A7EC5FA 5689F846 8906558B
FC46FF02 F4468302 F846830B EB0000FC 46C7EC5E D99B1245 D99B0A7E C5F05ED9
00FFB8F8 7EC5FDD4 9ED99B16 45D99B0A 7EC50081 E9037C0C 453BFC46 8B0A7EC5
9B1F16FD 0302E7C1 FC7E8BFD DC9EDD9B FDD48ED8 9B02C483 0054969D 9A50052B
2B00FFB8 F47EC5FD D49ED99B 1A45D99B 0A7EC5FE E89DD99B FDDC86DC 9BF046D9
D99B1F16 FD0302E7 C1FC7E8B FDDC9EDD 9BFDD48E D89B02C4 83005496 9D9A5005
50FEE886 8D1650FD E4868D16 50FE468D 16FF66E9 FDE49DD9 9BFDDCA6 DC9BEC46
006A006A 006A006A 137400FE 7E8312C4 830054DA BA9A00C9 68076A50 48FC468B
6A036A03 6A50FA46 8D160000 08C85756 CB5E5FC9 9B0AC483 0054C048 9AFE76FF
DABA9A6E 6A056A01 6A50F846 8D1650FA 468D1603 F846C60A C4830054 DABA9A6F
2E000245 C6381C3E C52E0301 45C6381C 3EC52E08 05C6381C 3EC52E0E C4830054
381C36FF 2E381E36 FF2E50FA 468D1601 0445C638 1C3EC52E 000345C6 381C3EC5
012D6803 6A50FC46 890008B8 50FA468D 160EC483 0054DABA 9A014168 056A016A
C4830054 DABA9A01 2F68036A 50FE4689 0008B850 FA468D16 0AC48300 54DABA9A
37D436FF 2E37D636 FF2E006A 006A006A 50FE468D 16000002 C85756CB 5E5FC90A
006A006A 006A006A 137400FE 7E8312C4 83003C7D 919A37D0 36FF2E37 D236FF2E
747400FF 3D058B36 F03EC52E EC8B5557 56CB5E5F C90AC483 0054C048 9AFE76FF
043B2605 8B36E83E C52E36EC 36C42E11 75043B26 058B36F0 3EC52E36 F436C42E
3EC52E04 0B26058B 36EC3EC5 2E36F436 C42E2A74 00FF3D05 8B36F43E C52E5274
2E058B36 F03EC52E 06C48300 2CFC9C9A 2B6A37D8 36FF2E37 DA36FF2E 058937D8
3EC52EEC 8B555756 CB5E5FC9 058936EC 3EC52E05 8B36E83E C52E0589 36F43EC5
2E058937 D83EC52E 040B2605 8B36E83E C52E36F0 36C42E4C 7400FF3D 058B36F0
3EC52E05 8936F03E C52E00FF B806C483 002CFC9C 9A2B6A37 D836FF2E 37DA36FF
83000004 C85756CB 5E5FC905 8936EC3E C52E0589 36E83EC5 2E00FFB8 058936F4
7D0A463B FC468BFC 46FF03EB 0000FC46 C70001FE 46C71FEB 0001B805 75000A7E
04C48300 54DC339A 30006802 6A000006 C85756CB 5E5FC9FE 468BF0EB FE66D105
C52E7B7D 05FE7E83 FE46FF03 EB0000FE 46C72E75 FA460BFC 468BFC56 89FA4689
00FE46C7 D9EB04C4 8300544A 8A9A3820 36FF2E38 2236FF2E ED74003D 8037583E
3D8B025C 8E263C03 26E7D1FE 7E8B3824 36C42E2C 7D3000FE 7E81FE46 FF03EB00
76FFFC76 FF036ACA EB0589FC 5E8EFA7E 03E7D1FE 7E8B058B 0C5E8E0A 7E03E7D1
555756CB 5E5FC904 C4830054 DC759AFA 76FFFC76 FF08C483 003C7B9F 9A006AFA
0024C3D0 0024D4FA 0024D53E 004C8AA8 0024E1D0 00CB5E5F C9003407 029AEC8B
0024D53C 00147BA3 0024E37C 0024D530 0024D52E 00147B7C 00147E8E 0024DD3E
0024E366 0024D528 0024E374 406FE000 00000000 0024D524 0024E370 0024E14E
0024DF46 0024D502 0024E1D4 0024D4FE 00147BA4 0024D534 0024E1D2 0024E35E
0024E35C 0024D532 0024E386 0024E384 0024E382 0024E380 00147B86 0024D500
9999999A 3FF00000 00000000 3FB99999 9999999A 004C2A20 0024D52C 0024E362
3FC99999 9999999A 00147EDE 40040000 00000000 BFF00000 00000000 BFB99999
0024D3D4 0014951F 40180000 00000000 BFC99999 9999999A BFD99999 9999999A
00147ECE 0024D416 0024D3F5 00000000 00000000 40240000 00000000 00147EBE
00147F4E 402E0000 00000000 0024D479 00147EAE 0024D458 00147E9E 0024D437
40590000 00000000 00147F5E 0024D499 40636000 00000000 40763000 00000000
0024E224 0024E388 00147CC6 00147B9E 00147F36 0024D4BA C0590000 00000000
```

0024D504 0024E368 0024E2A4 0024E294 0024E204 0024E214 0024E1F4 0024E1E4
0024E38A 001494C2 00040024 E3320024 E30A000F 0024E35A 0024D514 0024E36C
36FF2E6E 3E36FF2E 6E4036FF 2E6E4236 FF2E0000 54C85756 00147B9A 0024D4DB
FF2E2775 C20BFE56 89FC4689 08C48300 5499729A 505204C4 8300547F AA9A6E3C
8300544A 8A9A6E48 36FF2E6E 4A36FF2E 04C48300 544A8A9A 6E4436FF 2E6E4636
0004056E 50068B2E 6E5236FF 2E500008 056E5006 8B2E6E52 36FF2E01 03E904C4
468D1650 6AFC76FF FE76FF6E 4C36FF2E 6E4E36FF 2E6E5036 FF2E6E52 36FF2E50
14056E50 068B2E6E 5236FF2E 14C48300 542A089A 50520AC4 830054EA AA9A50AC
FF2E5000 0C056E50 068B2E6E 5236FF2E 50001005 6E50068B 2E6E5236 FF2E5000
9A50520A C4830054 EAAA9A50 AC468D16 506AFC76 FFFE76FF 6E5436FF 2E6E5636
056E5006 8B2E6E52 36FF2E50 0020056E 50068B2E 6E5236FF 2E14C483 00542A08
76FFFE76 FF6E5836 FF2E6E5A 36FF2E50 0018056E 50068B2E 6E5236FF 2E50001C
FC76FFFE 76FF14C4 8300542A 089A5052 0AC48300 54EAAA9A 50AC468D 16506AFC
6036FF2E 6E6236FF 2E003438 289A0000 2CC85756 CB5E5FC9 04C48300 549C3C9A
FC468908 C4830054 99729A50 5204C483 00547FAA 9A6E5C36 FF2E6E5E 36FF2E6E
AA9A6E64 36FF2E6E 6636FF2E 6E6836FF 2E6E6A36 FF2E1957 E90374C2 0BFE5689
806E6C3E C52E2275 C20BFE56 89FC4689 08C48300 5499729A 505204C4 8300547F
8B0A468B 1913E904 C4830054 4A8A9A6E 7036FF2E 6E7236FF 2E1928E9 0375003D
2E05FF6E 743EC52E 07EB0000 05C76E74 3EC52E00 00EE46C7 E65689E4 46890C56
05FF6E78 3EC52E07 EB000005 C76E783E C52E032B E9037C00 103D058B 6E743EC5
C52E05FF 6E7C3EC5 2E07EB00 0005C76E 7C3EC52E CC7D0010 3D058B6E 783EC52E
0EDC2E9B 0CDE269B 0845D99B 6E503EC5 2E6E7436 C42ECF7D 00103D05 8B6E7C3E
DD9B6E80 0EDC2E9B 0CDE269B 0445D99B 6E503EC5 2E6E7836 C42ED45E DD9B6E80
46DC9BDC 46DC9B6E 800EDC2E 9B0CDE26 9B05D99B 6E503EC5 2E6E7C36 C42EDC5E
5EDD9B6E 800EDC2E 9B0CDE26 9B1445D9 9B6E503E C52E6E74 36C42EF8 5ED99BD4
36C42EDC 5EDD9B6E 800EDC2E 9B0CDE26 9B1045D9 9B6E503E C52E6E78 36C42ED4
5ED99BD4 46DC9BDC 46DC9B6E 800EDC2E 9B0CDE26 9B0C45D9 9B6E503E C52E6E7C
36C42ED4 5EDD9B6E 800EDC2E 9B0CDE26 9B2045D9 9B6E503E C52E6E74 36C42EF4
C52E6E7C 36C42EDC 5EDD9B6E 800EDC2E 9B0CDE26 9B1C45D9 9B6E503E C52E6E78
EED99BF0 5ED99BD4 46DC9BDC 46DC9B6E 800EDC2E 9B0CDE26 9B1845D9 9B6E503E
07EBF846 D99B0676 0054968A 9ADC5EDC 9BF846D9 9BDC5EDD 9BEED99B D45EDD9B
5EDC9BF8 46D99BD4 5EDD9BEE D99B5576 0054968A 9AD45EDC 9BE0D99B F846D99B
9BF876D8 9B6E880E DC2E9BE0 D99BF846 D99B07EB F846D99B 06760054 968A9AD4
E47E03E7 D1EE7E8B 08C48300 5496EF9A 0054968F 9ADC46DC 9BF846D9 9BDC5EDD
EED99BD4 5EDD9BEE D99B0000 05C7E65E 8EE47E03 E7D1EE7E 8B0FEB05 89E65E8E
E0D99BF4 46D99B07 EBF446D9 9B067600 54968A9A DC5EDC9B F446D99B DC5EDD9B
76005496 8A9AD45E DC9BF446 D99BD45E DD9BEED9 9B577600 54968A9A D45EDC9B
F446D99B DC5EDD9B F476D89B 6E880EDC 2E9BE0D9 9BF446D9 9B07EBF4 46D99B06
0589E65E 8EE47E03 4747E7D1 EE7E8B08 C4830054 96EF9A00 54968F9A DC46DC9B
5EDD9BEE D99BD45E DD9BEED9 9B000005 C7E65E8E E47E0347 47E7D1EE 7E8B11EB
5EDC9BE0 D99BF046 D99B07EB F046D99B 06760054 968A9ADC 5EDC9BF0 46D99BDC
D99B0676 0054968A 9AD45EDC 9BF046D9 9BD45EDD 9BEED99B 58760054 968A9AD4
46DC9BF0 46D99BDC 5EDD9BF0 76D89B6E 880EDC2E 9BE0D99B F046D99B 07EBF046
12EB0589 E65E8EE4 7E0304C7 83E7D1EE 7E8B08C4 83005496 EF9A0054 968F9ADC
05C76E7C 3EC52EFC FEE903EE 46830000 05C7E65E 8EE47E03 04C783E7 D1EE7E8B
037C0010 3D058B6E 743EC52E 05FF6E74 3EC52E07 EB000005 C76E743E C52E00FF
7D00103D 058B6E78 3EC52E05 FF6E783E C52E07EB 000005C7 6E783EC5 2E02FBE9
36C42ED4 5EDD9B6E 800EDC2E 9B0CDE26 9B0845D9 9B6E503E C52E6E74 36C42ECC
C52E6E7C 36C42EDC 5EDD9B6E 800EDC2E 9B0CDE26 9B0445D9 9B6E503E C52E6E78
6E503EC5 2E6E7436 C42EF85E D99BD446 DC9BDC46 DC9B0CDE 269B05D9 9B6E503E
1045D99B 6E503EC5 2E6E7836 C42ED45E DD9B6E80 0EDC2E9B 0CDE269B 1445D99B
0CDE269B 0C45D99B 6E503EC5 2E6E7C36 C42EDC5E DD9B6E80 0EDC2E9B 0CDE269B
2E9B0CDE 269B2045 D99B6E50 3EC52E6E 7436C42E F45ED99B D446DC9B DC46DC9B
6E800EDC 2E9B0CDE 269B1C45 D99B6E50 3EC52E6E 7836C42E D45EDD9B 6E800EDC
D99BD446 DC9BDC46 DC9B0CDE 269B1845 D99B6E50 3EC52E6E 7C36C42E DC5EDD9B
9B067600 54968A9A DC5EDC9B F846D99B DC5EDD9B EED99BD4 5EDD9BEE D99BF05E
D99BD45E DD9BEED9 9B557600 54968A9A D45EDC9B E0D99BF8 46D99B07 EBF846D9
6E880EDC 2E9BE0D9 9BF846D9 9B07EBF8 46D99B06 76005496 8A9AD45E DC9BF846
EE7E8B08 C4830054 96EF9A00 54968F9A DC46DC9B F846D99B DC5EDD9B F876D89B
DD9BEED9 9B000005 C7E65E8E E47E03E7 D1EE7E8B 0FEB0589 E65E8EE4 7E03E7D1
D99B07EB F446D99B 06760054 968A9ADC 5EDC9BF4 46D99BDC 5EDD9BEE D99BD45E
9AD45EDC 9BF446D9 9BD45EDD 9BEED99B 57760054 968A9AD4 5EDC9BE0 D99BF446
5EDD9BF4 76D89B6E 880EDC2E 9BE0D99B F446D99B 07EBF446 D99B0676 0054968A
E47E0347 47E7D1EE 7E8B08C4 83005496 EF9A0054 968F9ADC 46DC9BF4 46D99BDC
9BD45EDD 9BEED99B 000005C7 E65E8EE4 7E034747 E7D1EE7E 8B11EB05 89E65E8E
9BF046D9 9B07EBF0 46D99B06 76005496 8A9ADC5E DC9BF046 D99BDC5E DD9BEED9
54968A9A D45EDC9B F046D99B D45EDD9B EED99B58 76005496 8A9AD45E DC9BE0D9
D99BDC5E DD9BF076 D89B6E88 0EDC2E9B E0D99BF0 46D99B07 EBF046D9 9B067600
5E8EE47E 0304C783 E7D1EE7E 8B08C483 005496EF 9A005496 8F9ADC46 DC9BF046

C52EFD10 E903EE46 83000005 C7E65E8E E47E0304 C783E7D1 EE7E8B12 EB0589E6
058B6E74 3EC52E05 FF6E743E C52E07EB 000005C7 6E743EC5 2E00FF05 C76E783E
8B6E7C3E C52E05FF 6E7C3EC5 2E07EB00 0005C76E 7C3EC52E 02FBE903 7C00103D
DD9B6E80 0EDC2E9B 0CDE269B 0845D99B 6E503EC5 2E6E7436 C42ECC7D 00103D05
3EC52E6E 7C36C42E DC5EDD9B 0CDE269B 0445D99B 6E503EC5 2E6E7836 C42ED45E
6E7436C4 2EF85ED9 9BD446DC 9BDC46DC 9B6E800E DC2E9B0C DE269B05 D99B6E50
503EC52E 6E7836C4 2ED45EDD 9B6E800E DC2E9B0C DE269B14 45D99B6E 503EC52E
9B0CDE26 9B0C45D9 9B6E503E C52E6E7C 36C42EDC 5EDD9B0C DE269B10 45D99B6E
9B2045D9 9B6E503E C52E6E74 36C42EF4 5ED99BD4 46DC9BDC 46DC9B6E 800EDC2E
9B0CDE26 9B1C45D9 9B6E503E C52E6E78 36C42ED4 5EDD9B6E 800EDC2E 9B0CDE26
9BDC46DC 9B6E800E DC2E9B0C DE269B18 45D99B6E 503EC52E 6E7C36C4 2EDC5EDD
968A9ADC 5EDC9BF8 46D99BDC 5EDD9BEE D99BD45E DD9BEED9 9BF05ED9 9BD446DC
9BEED99B 55760054 968A9AD4 5EDC9BE0 D99BF846 D99B07EB F846D99B 06760054
9BE0D99B F846D99B 07EBF846 D99B0676 0054968A 9AD45EDC 9BF846D9 9BD45EDD
83005496 EF9A0054 968F9ADC 46DC9BF8 46D99BDC 5EDD9BF8 76D89B6E 880EDC2E
000005C7 E65E8EE4 7E03E7D1 EE7E8B0F EB0589E6 5E8EE47E 03E7D1EE 7E8B08C4
46D99B06 76005496 8A9ADC5E DC9BF446 D99BDC5E DD9BEED9 9BD45EDD 9BEED99B
F446D99B D45EDD9B EED99B57 76005496 8A9AD45E DC9BE0D9 9BF446D9 9B07EBF4
D89B6E88 0EDC2E9B E0D99BF4 46D99B07 EBF446D9 9B067600 54968A9A D45EDC9B
E7D1EE7E 8B08C483 005496EF 9A005496 8F9ADC46 DC9BF446 D99BDC5E DD9BF476
EED99B00 0005C7E6 5E8EE47E 034747E7 D1EE7E8B 11EB0589 E65E8EE4 7E034747
07EBF046 D99B0676 0054968A 9ADC5EDC 9BF046D9 9BDC5EDD 9BEED99B D45EDD9B
5EDC9BF0 46D99BD4 5EDD9BEE D99B5876 0054968A 9AD45EDC 9BE0D99B F046D99B
9BF076D8 9B6E880E DC2E9BE0 D99BF046 D99B07EB F046D99B 06760054 968A9AD4
04C783E7 D1EE7E8B 08C48300 5496EF9A 0054968F 9ADC46DC 9BF046D9 9BDC5EDD
03EE4683 000005C7 E65E8EE4 7E0304C7 83E7D1EE 7E8B12EB 0589E65E 8EE47E03
C52E05FF 6E783EC5 2E07EB00 0005C76E 783EC52E 00FF05C7 6E743EC5 2EFD10E9
2E05FF6E 7C3EC52E 07EB0000 05C76E7C 3EC52E02 FBE9037C 00103D05 8B6E783E
5EDD9B0C DE269B08 45D99B6E 503EC52E 6E7436C4 2ECC7D00 103D058B 6E7C3EC5
36C42EDC 5EDD9B6E 800EDC2E 9B0CDE26 9B0445D9 9B6E503E C52E6E78 36C42ED4
F85ED99B D446DC9B DC46DC9B 6E800EDC 2E9B0CDE 269B05D9 9B6E503E C52E6E7C
6E503EC5 2E6E7836 C42ED45E DD9B0CDE 269B1445 D99B6E50 3EC52E6E 7436C42E
0C45D99B 6E503EC5 2E6E7C36 C42EDC5E DD9B6E80 0EDC2E9B 0CDE269B 1045D99B
6E503EC5 2E6E7436 C42EF45E D99BD446 DC9BDC46 DC9B6E80 0EDC2E9B 0CDE269B
2E9B0CDE 269B1C45 D99B6E50 3EC52E6E 7836C42E D45EDD9B 0CDE269B 2045D99B
6E800EDC 2E9B0CDE 269B1845 D99B6E50 3EC52E6E 7C36C42E DC5EDD9B 6E800EDC
DC9BF846 D99BDC5E DD9BEED9 9BD45EDD 9BEED99B F05ED99B D446DC9B DC46DC9B
76005496 8A9AD45E DC9BE0D9 9BF846D9 9B07EBF8 46D99B06 76005496 8A9ADC5E
46D99B07 EBF846D9 9B067600 54968A9A D45EDC9B F846D99B D45EDD9B EED99B55
9A005496 8F9ADC46 DC9BF846 D99BDC5E DD9BF876 D89B6E88 0EDC2E9B E0D99BF8
5E8EE47E 03E7D1EE 7E8B0FEB 0589E65E 8EE47E03 E7D1EE7E 8B08C483 005496EF
0054968A 9ADC5EDC 9BF446D9 9BDC5EDD 9BEED99B D45EDD9B EED99B00 0005C7E6
5EDD9BEE D99B5776 0054968A 9AD45EDC 9BE0D99B F446D99B 07EBF446 D99B0676
DC2E9BE0 D99BF446 D99B07EB F446D99B 06760054 968A9AD4 5EDC9BF4 46D99BD4
08C48300 5496EF9A 0054968F 9ADC46DC 9BF446D9 9BDC5EDD 9BF476D8 9B6E880E
05C7E65E 8EE47E03 4747E7D1 EE7E8B11 EB0589E6 5E8EE47E 034747E7 D1EE7E8B
9B067600 54968A9A DC5EDC9B F046D99B DC5EDD9B EED99BD4 5EDD9BEE D99B0000
D99BD45E DD9BEED9 9B587600 54968A9A D45EDC9B E0D99BF0 46D99B07 EBF046D9
6E880EDC 2E9BE0D9 9BF046D9 9B07EBF0 46D99B06 76005496 8A9AD45E DC9BF046
EE7E8B08 C4830054 96EF9A00 54968F9A DC46DC9B F046D99B DC5EDD9B F076D89B
0005C7E6 5E8EE47E 0304C783 E7D1EE7E 8B12EB05 89E65E8E E47E0304 C783E7D1
EB0000EC 46C700FF 05C76E78 3EC52E00 FF05C76E 7C3EC52E FD10E903 EE468300
2E05FF6E 743EC52E 07EB0000 05C76E74 3EC52E02 E9E9037C 04EC7E83 EC46FF03
DC2E9B0C DE269B08 45D99B6E 503EC52E 6E7436C4 2ED67D00 103D058B 6E743EC5
36C42EDC 5EDD9B0C DE269B04 45D99B6E 503EC52E 6E7836C4 2ED45EDD 9B6E800E
2E6E7436 C42EF85E D99BD446 DC9BDC46 DC9B0CDE 269B05D9 9B6E503E C52E6E7C
6E503EC5 2E6E7836 C42ED45E DD9B6E80 0EDC2E9B 0CDE269B 1445D99B 6E503EC5
DC9B0CDE 269B0C45 D99B6E50 3EC52E6E 7C36C42E DC5EDD9B 0CDE269B 1045D99B
0EDC2E9B 0CDE269B 2045D99B 6E503EC5 2E6E7436 C42EF45E D99BD446 DC9BDC46
7C36C42E DC5EDD9B 0CDE269B 1C45D99B 6E503EC5 2E6E7836 C42ED45E DD9B6E80
5EDD9BEE D99BF05E D99BD446 DC9BDC46 DC9B0CDE 269B1845 D99B6E50 3EC52E6E
46D99B07 EBF846D9 9B067600 54968A9A DC5EDC9B F846D99B DC5EDD9B EED99BD4
8A9AD45E DC9BF846 D99BD45E DD9BEED9 9B557600 54968A9A D45EDC9B E0D99BF8
DC5EDD9B F876D89B 6E880EDC 2E9BE0D9 9BF846D9 9B07EBF8 46D99B06 76005496
E65E8EE4 7E03E7D1 EE7E8B08 C4830054 96EF9A00 54968F9A DC46DC9B F846D99B
5EDD9BEE D99BD45E DD9BEED9 9B000005 C7E65E8E E47E03E7 D1EE7E8B 0FEB0589
5EDC9BE0 D99BF446 D99B07EB F446D99B 06760054 968A9ADC 5EDC9BF4 46D99BDC
D99B0676 0054968A 9AD45EDC 9BF446D9 9BD45EDD 9BEED99B 57760054 968A9AD4
46DC9BF4 46D99BDC 5EDD9BF4 76D89B6E 880EDC2E 9BE0D99B F446D99B 07EBF446

8B11EB05 89E65E8E E47E0347 47E7D1EE 7E8B08C4 83005496 EF9A0054 968F9ADC
D99BDC5E DD9BEED9 9BD45EDD 9BEED99B 000005C7 E65E8EE4 7E034747 E7D1EE7E
8A9AD45E DC9BE0D9 9BF046D9 9B07EBF0 46D99B06 76005496 8A9ADC5E DC9BF046
EBF046D9 9B067600 54968A9A D45EDC9B F046D99B D45EDD9B EED99B58 76005496
8F9ADC46 DC9BF046 D99BDC5E DD9BF076 D89B6E88 0EDC2E9B E0D99BF0 46D99B07
EE7E8B12 EB0589E6 5E8EE47E 0304C783 E7D1EE7E 8B08C483 005496EF 9A005496
2E00FF05 C76E7C3E C52EFD22 E903EE46 83000005 C7E65E8E E47E0304 C783E7D1
6E783EC5 2E02E9E9 037C04EC 7E83EC46 FF03EB00 00EC46C7 00FF05C7 6E743EC5
C52E6E74 36C42ED6 7D00103D 058B6E78 3EC52E05 FF6E783E C52E07EB 000005C7
DE269B04 45D99B6E 503EC52E 6E7836C4 2ED45EDD 9B0CDE26 9B0845D9 9B6E503E
DC46DC9B 0CDE269B 05D99B6E 503EC52E 6E7C36C4 2EDC5EDD 9B6E800E DC2E9B0C
C42ED45E DD9B0CDE 269B1445 D99B6E50 3EC52E6E 7436C42E F85ED99B D446DC9B
2E6E7C36 C42EDC5E DD9B6E80 0EDC2E9B 0CDE269B 1045D99B 6E503EC5 2E6E7836
3EC52E6E 7436C42E F45ED99B D446DC9B DC46DC9B 0CDE269B 0C45D99B 6E503EC5
0CDE269B 1C45D99B 6E503EC5 2E6E7836 C42ED45E DD9B0CDE 269B2045 D99B6E50
DC46DC9B 0CDE269B 1845D99B 6E503EC5 2E6E7C36 C42EDC5E DD9B6E80 0EDC2E9B
8A9ADC5E DC9BF846 D99BDC5E DD9BEED9 9BD45EDD 9BEED99B F05ED99B D446DC9B
EED99B55 76005496 8A9AD45E DC9BE0D9 9BF846D9 9B07EBF8 46D99B06 76005496
E0D99BF8 46D99B07 EBF846D9 9B067600 54968A9A D45EDC9B F846D99B D45EDD9B
005496EF 9A005496 8F9ADC46 DC9BF846 D99BDC5E DD9BF876 D89B6E88 0EDC2E9B
0005C7E6 5E8EE47E 03E7D1EE 7E8B0FEB 0589E65E 8EE47E03 E7D1EE7E 8B08C483
D99B0676 0054968A 9ADC5EDC 9BF446D9 9BDC5EDD 9BEED99B D45EDD9B EED99B00
46D99BD4 5EDD9BEE D99B5776 0054968A 9AD45EDC 9BE0D99B F446D99B 07EBF446
9B6E880E DC2E9BE0 D99BF446 D99B07EB F446D99B 06760054 968A9AD4 5EDC9BF4
D1EE7E8B 08C48300 5496EF9A 0054968F 9ADC46DC 9BF446D9 9BDC5EDD 9BF476D8
D99B0000 05C7E65E 8EE47E03 4747E7D1 EE7E8B11 EB0589E6 5E8EE47E 034747E7
EBF046D9 9B067600 54968A9A DC5EDC9B F046D99B DC5EDD9B EED99BD4 5EDD9BEE
DC9BF046 D99BD45E DD9BEED9 9B587600 54968A9A D45EDC9B E0D99BF0 46D99B07
F076D89B 6E880EDC 2E9BE0D9 9BF046D9 9B07EBF0 46D99B06 76005496 8A9AD45E
C783E7D1 EE7E8B08 C4830054 96EF9A00 54968F9A DC46DC9B F046D99B DC5EDD9B
EE468300 0005C7E6 5E8EE47E 0304C783 E7D1EE7E 8B12EB05 89E65E8E E47E0304
EC46FF03 EB0000EC 46C700FF 05C76E78 3EC52E00 FF05C76E 743EC52E FD22E903
6E7C3EC5 2E05FF6E 7C3EC52E 07EB0000 05C76E7C 3EC52E02 E9E9037C 04EC7E83
36C42ED4 5EDD9B0C DE269B08 45D99B6E 503EC52E 6E7436C4 2ED67D00 103D058B
05D99B6E 503EC52E 6E7C36C4 2EDC5EDD 9B0CDE26 9B0445D9 9B6E503E C52E6E78
6E503EC5 2E6E7436 C42EF85E D99BD446 DC9BDC46 DC9B6E80 0EDC2E9B 0CDE269B
DD9B0CDE 269B1045 D99B6E50 3EC52E6E 7836C42E D45EDD9B 0CDE269B 1445D99B
DC9BDC46 DC9B6E80 0EDC2E9B 0CDE269B 0C45D99B 6E503EC5 2E6E7C36 C42EDC5E
7836C42E D45EDD9B 0CDE269B 2045D99B 6E503EC5 2E6E7436 C42EF45E D99BD446
1845D99B 6E503EC5 2E6E7C36 C42EDC5E DD9B0CDE 269B1C45 D99B6E50 3EC52E6E
EED99BD4 5EDD9BEE D99BF05E D99BD446 DC9BDC46 DC9B6E80 0EDC2E9B 0CDE269B
E0D99BF8 46D99B07 EBF846D9 9B067600 54968A9A DC5EDC9B F846D99B DC5EDD9B
76005496 8A9AD45E DC9BF846 D99BD45E DD9BEED9 9B557600 54968A9A D45EDC9B
F846D99B DC5EDD9B F876D89B 6E880EDC 2E9BE0D9 9BF846D9 9B07EBF8 46D99B06
0FEB0589 E65E8EE4 7E03E7D1 EE7E8B08 C4830054 96EF9A00 54968F9A DC46DC9B
46D99BDC 5EDD9BEE D99BD45E DD9BEED9 9B000005 C7E65E8E E47E03E7 D1EE7E8B
968A9AD4 5EDC9BE0 D99BF446 D99B07EB F446D99B 06760054 968A9ADC 5EDC9BF4
07EBF446 D99B0676 0054968A 9AD45EDC 9BF446D9 9BD45EDD 9BEED99B 57760054
968F9ADC 46DC9BF4 46D99BDC 5EDD9BF4 76D89B6E 880EDC2E 9BE0D99B F446D99B
E7D1EE7E 8B11EB05 89E65E8E E47E0347 47E7D1EE 7E8B08C4 83005496 EF9A0054
DC9BF046 D99BDC5E DD9BEED9 9BD45EDD 9BEED99B 000005C7 E65E8EE4 7E034747
76005496 8A9AD45E DC9BE0D9 9BF046D9 9B07EBF0 46D99B06 76005496 8A9ADC5E
46D99B07 EBF046D9 9B067600 54968A9A D45EDC9B F046D99B D45EDD9B EED99B58
9A005496 8F9ADC46 DC9BF046 D99BDC5E DD9BF076 D89B6E88 0EDC2E9B E0D99BF0
C783E7D1 EE7E8B12 EB0589E6 5E8EE47E 0304C783 E7D1EE7E 8B08C483 005496EF
6E783EC5 2E00FF05 C76E7C3E C52EFD22 E903EE46 83000005 C7E65E8E E47E0304
02B9E903 7C40EC7E 83EC46FF 03EB0000 EC46C700 FF05C76E 743EC52E 00FF05C7
6E503EC5 2E6E7836 C42ED45E DD9B0CDE 269B0845 D99B6E50 3EC52E6E 7436C42E
46DC9B0C DE269B05 D99B6E50 3EC52E6E 7C36C42E DC5EDD9B 0CDE269B 0445D99B
2ED45EDD 9B0CDE26 9B1445D9 9B6E503E C52E6E74 36C42EF8 5ED99BD4 46DC9BDC
9B6E503E C52E6E7C 36C42EDC 5EDD9B0C DE269B10 45D99B6E 503EC52E 6E7836C4
45D99B6E 503EC52E 6E7436C4 2EF45ED9 9BD446DC 9BDC46DC 9B0CDE26 9B0C45D9
2EDC5EDD 9B0CDE26 9B1C45D9 9B6E503E C52E6E78 36C42ED4 5EDD9B0C DE269B20
EED99BF0 5ED99BD4 46DC9BDC 46DC9B0C DE269B18 45D99B6E 503EC52E 6E7C36C4
07EBF846 D99B0676 0054968A 9ADC5EDC 9BF846D9 9BDC5EDD 9BEED99B D45EDD9B
5EDC9BF8 46D99BD4 5EDD9BEE D99B5576 0054968A 9AD45EDC 9BE0D99B F846D99B
9BF876D8 9B6E880E DC2E9BE0 D99BF846 D99B07EB F846D99B 06760054 968A9AD4
E47E03E7 D1EE7E8B 08C48300 5496EF9A 0054968F 9ADC46DC 9BF846D9 9BDC5EDD
EED99BD4 5EDD9BEE D99B0000 05C7E65E 8EE47E03 E7D1EE7E 8B0FEB05 89E65E8E
E0D99BF4 46D99B07 EBF446D9 9B067600 54968A9A DC5EDC9B F446D99B DC5EDD9B 76005496 8A9AD45E DC9BF446 D99BD45E DD9BEED9 9B577600 54968A9A D45EDC9B
F446D99B DC5EDD9B F476D89B 6E880EDC 2E9BE0D9 9BF446D9 9B07EBF4 46D99B06
0589E65E 8EE47E03 4747E7D1 EE7E8B08 C4830054 96EF9A00 54968F9A DC46DC9B
5EDD9BEE D99BD45E DD9BEED9 9B000005 C7E65E8E E47E0347 47E7D1EE 7E8B11EB
5EDC9BE0 D99BF046 D99B07EB F046D99B 06760054 968A9ADC 5EDC9BF0 46D99BDC
D99B0676 0054968A 9AD45EDC 9BF046D9 9BD45EDD 9BEED99B 58760054 968A9AD4
46DC9BF0 46D99BDC 5EDD9BF0 76D89B6E 880EDC2E 9BE0D99B F046D99B 07EBF046
12EB0589 E65E8EE4 7E0304C7 83E7D1EE 7E8B08C4 83005496 EF9A0054 968F9ADC
2EFC76FF FE76FFFD 3BE903EE 46830000 05C7E65E 8EE47E03 04C783E7 D1EE7E8B
5689E846 8999C78B F88B0CC4 830054CF 019AE476 FFE676FF 026A34FF 6E9036C5
2E6E9A36 FF2E0000 08C85756 CB5E5FC9 9B04C483 00549C3C 9AFC76FF FE76FFEA
08C48300 5499729A 505204C4 8300547F AA9A6E94 36FF2E6E 9636FF2E 6E9836FF
8A9A6E9C 36FF2E6E 9E36FF2E 6E74003D 806E6C3E C52E1E75 C20BFE56 89FC4689
CE7E9A0A 76FF0C76 FF026A34 FF6E9036 C52EFC76 FFFE76FF 5AEB04C4 8300544A
003D806E 6C3EC52E 1C74FA46 0BF8468B FA5689F8 468999C7 8BF88B0C C4830054
8300549C 3C9AFC76 FFFE76FF 04C48300 544A8A9A 6EA036FF 2E6EA236 FF2E1274
6EA436FF 2E6EA636 FF2E6EA8 36FF2E6E AA36FF2E 00002CC8 5756CB5E 5FC904C4
2E1957E9 0374C20B FE5689FC 468908C4 83005499 729A5052 04C48300 547FAA9A
99729A50 5204C483 00547FAA 9A6EAC36 FF2E6EAE 36FF2E6E B036FF2E 6EB236FF
B636FF2E 1928E903 75003D80 6E6C3EC5 2E2275C2 0BFE5689 FC468908 C4830054
EE46C7E6 5689E446 890C568B 0A468B19 13E904C4 8300544A 8A9A6EB4 36FF2E6E
037C0010 3D058B6E 743EC52E 05FF6E74 3EC52E07 EB000005 C76E743E C52E0000
7D00103D 058B6E78 3EC52E05 FF6E783E C52E07EB 000005C7 6E783EC5 2E032BE9
2ECF7D00 103D058B 6E7C3EC5 2E05FF6E 7C3EC52E 07EB0000 05C76E7C 3EC52ECC
6E7836C4 2ED45EDD 9B6E800E DC2E9B0C DE269B08 45D99B6E B83EC52E 6E7436C4
B83EC52E 6E7C36C4 2EDC5EDD 9B6E800E DC2E9B0C DE269B04 45D99B6E B83EC52E
2E6E7436 C42EF85E D99BD446 DC9BDC46 DC9B6E80 0EDC2E9B 0CDE269B 05D99B6E
6EB83EC5 2E6E7836 C42ED45E DD9B6E80 0EDC2E9B 0CDE269B 1445D99B 6EB83EC5
0C45D99B 6EB83EC5 2E6E7C36 C42EDC5E DD9B6E80 0EDC2E9B 0CDE269B 1045D99B
6EB83EC5 2E6E7436 C42EF45E D99BD446 DC9BDC46 DC9B6E80 0EDC2E9B 0CDE269B
1C45D99B 6EB83EC5 2E6E7836 C42ED45E DD9B6E80 0EDC2E9B 0CDE269B 2045D99B
0CDE269B 1845D99B 6EB83EC5 2E6E7C36 C42EDC5E DD9B6E80 0EDC2E9B 0CDE269B
DC5EDD9B EED99BD4 5EDD9BEE D99BF05E D99BD446 DC9BDC46 DC9B6E80 0EDC2E9B
D45EDC9B E0D99BF8 46D99B07 EBF846D9 9B067600 54968A9A DC5EDC9B F846D99B
46D99B06 76005496 8A9AD45E DC9BF846 D99BD45E DD9BEED9 9B557600 54968A9A
DC46DC9B F846D99B DC5EDD9B F876D89B 6E880EDC 2E9BE0D9 9BF846D9 9B07EBF8
D1EE7E8B 0FEB0589 E65E8EE4 7E03E7D1 EE7E8B08 C4830054 96EF9A00 54968F9A
5EDC9BF4 46D99BDC 5EDD9BEE D99BD45E DD9BEED9 9B000005 C7E65E8E E47E03E7
57760054 968A9AD4 5EDC9BE0 D99BF446 D99B07EB F446D99B 06760054 968A9ADC
F446D99B 07EBF446 D99B0676 0054968A 9AD45EDC 9BF446D9 9BD45EDD 9BEED99B
EF9A0054 968F9ADC 46DC9BF4 46D99BDC 5EDD9BF4 76D89B6E 880EDC2E 9BE0D99B
7E034747 E7D1EE7E 8B11EB05 89E65E8E E47E0347 47E7D1EE 7E8B08C4 83005496
8A9ADC5E DC9BF046 D99BDC5E DD9BEED9 9BD45EDD 9BEED99B 000005C7 E65E8EE4
EED99B58 76005496 8A9AD45E DC9BE0D9 9BF046D9 9B07EBF0 46D99B06 76005496
E0D99BF0 46D99B07 EBF046D9 9B067600 54968A9A D45EDC9B F046D99B D45EDD9B
005496EF 9A005496 8F9ADC46 DC9BF046 D99BDC5E DD9BF076 D89B6E88 0EDC2E9B
E47E0304 C783E7D1 EE7E8B12 EB0589E6 5E8EE47E 0304C783 E7D1EE7E 8B08C483
000005C7 6E743EC5 2E00FF05 C76E7C3E C52EFCFE E903EE46 83000005 C7E65E8E
0005C76E 783EC52E 02FBE903 7C00103D 058B6E74 3EC52E05 FF6E743E C52E07EB
6EB83EC5 2E6E7436 C42ECC7D 00103D05 8B6E783E C52E05FF 6E783EC5 2E07EB00
0445D99B 6EB83EC5 2E6E7836 C42ED45E DD9B6E80 0EDC2E9B 0CDE269B 0845D99B
9B0CDE26 9B05D99B 6EB83EC5 2E6E7C36 C42EDC5E DD9B6E80 0EDC2E9B 0CDE269B
DC2E9B0C DE269B14 45D99B6E B83EC52E 6E7436C4 2EF85ED9 9BD446DC 9BDC46DC
9B6E800E DC2E9B0C DE269B10 45D99B6E B83EC52E 6E7836C4 2ED45EDD 9B6E800E
5ED99BD4 46DC9BDC 46DC9B0C DE269B0C 45D99B6E B83EC52E 6E7C36C4 2EDC5EDD
36C42ED4 5EDD9B6E 800EDC2E 9B0CDE26 9B2045D9 9B6EB83E C52E6E74 36C42EF4
C52E6E7C 36C42EDC 5EDD9B6E 800EDC2E 9B0CDE26 9B1C45D9 9B6EB83E C52E6E78
D99BD45E DD9BEED9 9BF05ED9 9BD446DC 9BDC46DC 9B0CDE26 9B1845D9 9B6EB83E
D99BF846 D99B07EB F846D99B 06760054 968A9ADC 5EDC9BF8 46D99BDC 5EDD9BEE
0054968A 9AD45EDC 9BF846D9 9BD45EDD 9BEED99B 55760054 968A9AD4 5EDC9BE0
46D99BDC 5EDD9BF8 76D89B6E 880EDC2E 9BE0D99B F846D99B 07EBF846 D99B0676
EB0589E6 5E8EE47E 03E7D1EE 7E8B08C4 83005496 EF9A0054 968F9ADC 46DC9BF8
D99BDC5E DD9BEED9 9BD45EDD 9BEED99B 000005C7 E65E8EE4 7E03E7D1 EE7E8B0F
8A9AD45E DC9BE0D9 9BF446D9 9B07EBF4 46D99B06 76005496 8A9ADC5E DC9BF446
EBF446D9 9B067600 54968A9A D45EDC9B F446D99B D45EDD9B EED99B57 76005496
8F9ADC46 DC9BF446 D99BDC5E DD9BF476 D89B6E88 0EDC2E9B E0D99BF4 46D99B07
D1EE7E8B 11EB0589 E65E8EE4 7E034747 E7D1EE7E 8B08C483 005496EF 9A005496
9BF046D9 9BDC5EDD 9BEED99B D45EDD9B EED99B00 0005C7E6 5E8EE47E 034747E7
0054968A 9AD45EDC 9BE0D99B F046D99B 07EBF046 D99B0676 0054968A 9ADC5EDC

D99B07EB F046D99B 06760054 968A9AD4 5EDC9BF0 46D99BD4 5EDD9BEE D99B5876
0054968F 9ADC46DC 9BF046D9 9BDC5EDD 9BF076D8 9B6E880E DC2E9BE0 D99BF046
83E7D1EE 7E8B12EB 0589E65E 8EE47E03 04C783E7 D1EE7E8B 08C48300 5496EF9A
743EC52E 00FF05C7 6E783EC5 2EFD10E9 03EE4683 000005C7 E65E8EE4 7E0304C7
3EC52E02 FBE9037C 00103D05 8B6E743E C52E05FF 6E743EC5 2E07EB00 0005C76E
6E7436C4 2ECC7D00 103D058B 6E7C3EC5 2E05FF6E 7C3EC52E 07EB0000 05C76E7C
B83EC52E 6E7836C4 2ED45EDD 9B6E800E DC2E9B0C DE269B08 45D99B6E B83EC52E
2E9B0CDE 269B05D9 9B6EB83E C52E6E7C 36C42EDC 5EDD9B0C DE269B04 45D99B6E
269B1445 D99B6EB8 3EC52E6E 7436C42E F85ED99B D446DC9B DC46DC9B 6E800EDC
DD9B0CDE 269B1045 D99B6EB8 3EC52E6E 7836C42E D45EDD9B 6E800EDC 2E9B0CDE
DC9BDC46 DC9B6E80 0EDC2E9B 0CDE269B 0C45D99B 6EB83EC5 2E6E7C36 C42EDC5E
DD9B6E80 0EDC2E9B 0CDE269B 2045D99B 6EB83EC5 2E6E7436 C42EF45E D99BD446
3EC52E6E 7C36C42E DC5EDD9B 0CDE269B 1C45D99B 6EB83EC5 2E6E7836 C42ED45E
9BEED99B F05ED99B D446DC9B DC46DC9B 6E800EDC 2E9B0CDE 269B1845 D99B6EB8
9B07EBF8 46D99B06 76005496 8A9ADC5E DC9BF846 D99BDC5E DD9BEED9 9BD45EDD
D45EDC9B F846D99B D45EDD9B EED99B55 76005496 8A9AD45E DC9BE0D9 9BF846D9
DD9BF876 D89B6E88 0EDC2E9B E0D99BF8 46D99B07 EBF846D9 9B067600 54968A9A
8EE47E03 E7D1EE7E 8B08C483 005496EF 9A005496 8F9ADC46 DC9BF846 D99BDC5E
9BEED99B D45EDD9B EED99B00 0005C7E6 5E8EE47E 03E7D1EE 7E8B0FEB 0589E65E
9BE0D99B F446D99B 07EBF446 D99B0676 0054968A 9ADC5EDC 9BF446D9 9BDC5EDD
06760054 968A9AD4 5EDC9BF4 46D99BD4 5EDD9BEE D99B5776 0054968A 9AD45EDC
9BF446D9 9BDC5EDD 9BF476D8 9B6E880E DC2E9BE0 D99BF446 D99B07EB F446D99B
EB0589E6 5E8EE47E 034747E7 D1EE7E8B 08C48300 5496EF9A 0054968F 9ADC46DC
DC5EDD9B EED99BD4 5EDD9BEE D99B0000 05C7E65E 8EE47E03 4747E7D1 EE7E8B11
D45EDC9B E0D99BF0 46D99B07 EBF046D9 9B067600 54968A9A DC5EDC9B F046D99B
46D99B06 76005496 8A9AD45E DC9BF046 D99BD45E DD9BEED9 9B587600 54968A9A
DC46DC9B F046D99B DC5EDD9B F076D89B 6E880EDC 2E9BE0D9 9BF046D9 9B07EBF0
8B12EB05 89E65E8E E47E0304 C783E7D1 EE7E8B08 C4830054 96EF9A00 54968F9A
FF05C76E 743EC52E FD10E903 EE468300 0005C7E6 5E8EE47E 0304C783 E7D1EE7E
E9037C00 103D058B 6E783EC5 2E05FF6E 783EC52E 07EB0000 05C76E78 3EC52E00
CC7D0010 3D058B6E 7C3EC52E 05FF6E7C 3EC52E07 EB000005 C76E7C3E C52E02FB
6EB83EC5 2E6E7836 C42ED45E DD9B0CDE 269B0845 D99B6EB8 3EC52E6E 7436C42E
9B05D99B 6EB83EC5 2E6E7C36 C42EDC5E DD9B6E80 0EDC2E9B 0CDE269B 0445D99B
9B6EB83E C52E6E74 36C42EF8 5ED99BD4 46DC9BDC 46DC9B6E 800EDC2E 9B0CDE26
DC2E9B0C DE269B10 45D99B6E B83EC52E 6E7836C4 2ED45EDD 9B0CDE26 9B1445D9
9B6E800E DC2E9B0C DE269B0C 45D99B6E B83EC52E 6E7C36C4 2EDC5EDD 9B6E800E
5EDD9B0C DE269B20 45D99B6E B83EC52E 6E7436C4 2EF45ED9 9BD446DC 9BDC46DC
36C42EDC 5EDD9B6E 800EDC2E 9B0CDE26 9B1C45D9 9B6EB83E C52E6E78 36C42ED4
5ED99BD4 46DC9BDC 46DC9B6E 800EDC2E 9B0CDE26 9B1845D9 9B6EB83E C52E6E7C
D99B0676 0054968A 9ADC5EDC 9BF846D9 9BDC5EDD 9BEED99B D45EDD9B EED99BF0
46D99BD4 5EDD9BEE D99B5576 0054968A 9AD45EDC 9BE0D99B F846D99B 07EBF846
9B6E880E DC2E9BE0 D99BF846 D99B07EB F846D99B 06760054 968A9AD4 5EDC9BF8
D1EE7E8B 08C48300 5496EF9A 0054968F 9ADC46DC 9BF846D9 9BDC5EDD 9BF876D8
5EDD9BEE D99B0000 05C7E65E 8EE47E03 E7D1EE7E 8B0FEB05 89E65E8E E47E03E7
46D99B07 EBF446D9 9B067600 54968A9A DC5EDC9B F446D99B DC5EDD9B EED99BD4
8A9AD45E DC9BF446 D99BD45E DD9BEED9 9B577600 54968A9A D45EDC9B E0D99BF4
DC5EDD9B F476D89B 6E880EDC 2E9BE0D9 9BF446D9 9B07EBF4 46D99B06 76005496
8EE47E03 4747E7D1 EE7E8B08 C4830054 96EF9A00 54968F9A DC46DC9B F446D99B
D99BD45E DD9BEED9 9B000005 C7E65E8E E47E0347 47E7D1EE 7E8B11EB 0589E65E
D99BF046 D99B07EB F046D99B 06760054 968A9ADC 5EDC9BF0 46D99BDC 5EDD9BEE
0054968A 9AD45EDC 9BF046D9 9BD45EDD 9BEED99B 58760054 968A9AD4 5EDC9BE0
46D99BDC 5EDD9BF0 76D89B6E 880EDC2E 9BE0D99B F046D99B 07EBF046 D99B0676
E65E8EE4 7E0304C7 83E7D1EE 7E8B08C4 83005496 EF9A0054 968F9ADC 46DC9BF0
3EC52EFD 10E903EE 46830000 05C7E65E 8EE47E03 04C783E7 D1EE7E8B 12EB0589
E9037C04 EC7E83EC 46FF03EB 0000EC46 C700FF05 C76E783E C52E00FF 05C76E7C
D67D0010 3D058B6E 743EC52E 05FF6E74 3EC52E07 EB000005 C76E743E C52E02E9
7836C42E D45EDD9B 6E800EDC 2E9B0CDE 269B0845 D99B6EB8 3EC52E6E 7436C42E
9B05D99B 6EB83EC5 2E6E7C36 C42EDC5E DD9B0CDE 269B0445 D99B6EB8 3EC52E6E
DE269B14 45D99B6E B83EC52E 6E7436C4 2EF85ED9 9BD446DC 9BDC46DC 9B0CDE26
5EDD9B0C DE269B10 45D99B6E B83EC52E 6E7836C4 2ED45EDD 9B6E800E DC2E9B0C
2EF45ED9 9BD446DC 9BDC46DC 9B0CDE26 9B0C45D9 9B6EB83E C52E6E7C 36C42EDC
6E7836C4 2ED45EDD 9B6E800E DC2E9B0C DE269B20 45D99B6E B83EC52E 6E7436C4
9B1845D9 9B6EB83E C52E6E7C 36C42EDC 5EDD9B0C DE269B1C 45D99B6E B83EC52E
46D99BDC 5EDD9BEE D99BD45E DD9BEED9 9BF05ED9 9BD446DC 9BDC46DC 9B0CDE26
968A9AD4 5EDC9BE0 D99BF846 D99B07EB F846D99B 06760054 968A9ADC 5EDC9BF8
07EBF846 D99B0676 0054968A 9AD45EDC 9BF846D9 9BD45EDD 9BEED99B 55760054
968F9ADC 46DC9BF8 46D99BDC 5EDD9BF8 76D89B6E 880EDC2E 9BE0D99B F846D99B
7E03E7D1 EE7E8B0F EB0589E6 5E8EE47E 03E7D1EE 7E8B08C4 83005496 EF9A0054
8A9ADC5E DC9BF446 D99BDC5E DD9BEED9 9BD45EDD 9BEED99B 000005C7 E65E8EE4

EED99B57 76005496 8A9AD45E DC9BE0D9 9BF446D9 9B07EBF4 46D99B06 76005496
E0D99BF4 46D99B07 EBF446D9 9B067600 54968A9A D45EDC9B F446D99B D45EDD9B
005496EF 9A005496 8F9ADC46 DC9BF446 D99BDC5E DD9BF476 D89B6E88 0EDC2E9B
5E8EE47E 034747E7 D1EE7E8B 11EB0589 E65E8EE4 7E034747 E7D1EE7E 8B08C483
0054968A 9ADC5EDC 9BF046D9 9BDC5EDD 9BEED99B D45EDD9B EED99B00 0005C7E6
5EDD9BEE D99B5876 0054968A 9AD45EDC 9BE0D99B F046D99B 07EBF046 D99B0676
DC2E9BE0 D99BF046 D99B07EB F046D99B 06760054 968A9AD4 5EDC9BF0 46D99BD4
08C48300 5496EF9A 0054968F 9ADC46DC 9BF046D9 9BDC5EDD 9BF076D8 9B6E880E
E65E8EE4 7E0304C7 83E7D1EE 7E8B12EB 0589E65E 8EE47E03 04C783E7 D1EE7E8B
EC46C700 FF05C76E 743EC52E 00FF05C7 6E7C3EC5 2EFD22E9 03EE4683 000005C7
6E783EC5 2E07EB00 0005C76E 783EC52E 02E9E903 7C04EC7E 83EC46FF 03EB0000
0CDE269B 0845D99B 6EB83EC5 2E6E7436 C42ED67D 00103D05 8B6E783E C52E05FF
DC5EDD9B 6E800EDC 2E9B0CDE 269B0445 D99B6EB8 3EC52E6E 7836C42E D45EDD9B
36C42EF8 5ED99BD4 46DC9BDC 46DC9B0C DE269B05 D99B6EB8 3EC52E6E 7C36C42E
45D99B6E B83EC52E 6E7836C4 2ED45EDD 9B0CDE26 9B1445D9 9B6EB83E C52E6E74
DE269B0C 45D99B6E B83EC52E 6E7C36C4 2EDC5EDD 9B6E800E DC2E9B0C DE269B10
9B0CDE26 9B2045D9 9B6EB83E C52E6E74 36C42EF4 5ED99BD4 46DC9BDC 46DC9B0C
2EDC5EDD 9B6E800E DC2E9B0C DE269B1C 45D99B6E B83EC52E 6E7836C4 2ED45EDD
EED99BF0 5ED99BD4 46DC9BDC 46DC9B0C DE269B18 45D99B6E B83EC52E 6E7C36C4
07EBF846 D99B0676 0054968A 9ADC5EDC 9BF846D9 9BDC5EDD 9BEED99B D45EDD9B
5EDC9BF8 46D99BD4 5EDD9BEE D99B5576 0054968A 9AD45EDC 9BE0D99B F846D99B
9BF876D8 9B6E880E DC2E9BE0 D99BF846 D99B07EB F846D99B 06760054 968A9AD4
E47E03E7 D1EE7E8B 08C48300 5496EF9A 0054968F 9ADC46DC 9BF846D9 9BDC5EDD
EED99BD4 5EDD9BEE D99B0000 05C7E65E 8EE47E03 E7D1EE7E 8B0FEB05 89E65E8E
E0D99BF4 46D99B07 EBF446D9 9B067600 54968A9A DC5EDC9B F446D99B DC5EDD9B
76005496 8A9AD45E DC9BF446 D99BD45E DD9BEED9 9B577600 54968A9A D45EDC9B
F446D99B DC5EDD9B F476D89B 6E880EDC 2E9BE0D9 9BF446D9 9B07EBF4 46D99B06
0589E65E 8EE47E03 4747E7D1 EE7E8B08 C4830054 96EF9A00 54968F9A DC46DC9B
5EDD9BEE D99BD45E DD9BEED9 9B000005 C7E65E8E E47E0347 47E7D1EE 7E8B11EB
5EDC9BE0 D99BF046 D99B07EB F046D99B 06760054 968A9ADC 5EDC9BF0 46D99BDC
D99B0676 0054968A 9AD45EDC 9BF046D9 9BD45EDD 9BEED99B 58760054 968A9AD4
46DC9BF0 46D99BDC 5EDD9BF0 76D89B6E 880EDC2E 9BE0D99B F046D99B 07EBF046
12EB0589 E65E8EE4 7E0304C7 83E7D1EE 7E8B08C4 83005496 EF9A0054 968F9ADC
05C76E74 3EC52EFD 22E903EE 46830000 05C7E65E 8EE47E03 04C783E7 D1EE7E8B
C52E02E9 E9037C04 EC7E83EC 46FF03EB 0000EC46 C700FF05 C76E783E C52E00FF
7436C42E D67D0010 3D058B6E 7C3EC52E 05FF6E7C 3EC52E07 EB000005 C76E7C3E
0445D99B 6EB83EC5 2E6E7836 C42ED45E DD9B0CDE 269B0845 D99B6EB8 3EC52E6E
9B6E800E DC2E9B0C DE269B05 D99B6EB8 3EC52E6E 7C36C42E DC5EDD9B 0CDE269B
5EDD9B0C DE269B14 45D99B6E B83EC52E 6E7436C4 2EF85ED9 9BD446DC 9BDC46DC
B83EC52E 6E7C36C4 2EDC5EDD 9B0CDE26 9B1045D9 9B6EB83E C52E6E78 36C42ED4
6E7436C4 2EF45ED9 9BD446DC 9BDC46DC 9B6E800E DC2E9B0C DE269B0C 45D99B6E
9B1C45D9 9B6EB83E C52E6E78 36C42ED4 5EDD9B0C DE269B20 45D99B6E B83EC52E
9B6E800E DC2E9B0C DE269B18 45D99B6E B83EC52E 6E7C36C4 2EDC5EDD 9B0CDE26
5EDC9BF8 46D99BDC 5EDD9BEE D99BD45E DD9BEED9 9BF05ED9 9BD446DC 9BDC46DC
55760054 968A9AD4 5EDC9BE0 D99BF846 D99B07EB F846D99B 06760054 968A9ADC
F846D99B 07EBF846 D99B0676 0054968A 9AD45EDC 9BF846D9 9BD45EDD 9BEED99B
EF9A0054 968F9ADC 46DC9BF8 46D99BDC 5EDD9BF8 76D89B6E 880EDC2E 9BE0D99B
E65E8EE4 7E03E7D1 EE7E8B0F EB0589E6 5E8EE47E 03E7D1EE 7E8B08C4 83005496
76005496 8A9ADC5E DC9BF446 D99BDC5E DD9BEED9 9BD45EDD 9BEED99B 000005C7
D45EDD9B EED99B57 76005496 8A9AD45E DC9BE0D9 9BF446D9 9B07EBF4 46D99B06
0EDC2E9B E0D99BF4 46D99B07 EBF446D9 9B067600 54968A9A D45EDC9B F446D99B
8B08C483 005496EF 9A005496 8F9ADC46 DC9BF446 D99BDC5E DD9BF476 D89B6E88
0005C7E6 5E8EE47E 034747E7 D1EE7E8B 11EB0589 E65E8EE4 7E034747 E7D1EE7E
D99B0676 0054968A 9ADC5EDC 9BF046D9 9BDC5EDD 9BEED99B D45EDD9B EED99B00
46D99BD4 5EDD9BEE D99B5876 0054968A 9AD45EDC 9BE0D99B F046D99B 07EBF046
9B6E880E DC2E9BE0 D99BF046 D99B07EB F046D99B 06760054 968A9AD4 5EDC9BF0
D1EE7E8B 08C48300 5496EF9A 0054968F 9ADC46DC 9BF046D9 9BDC5EDD 9BF076D8
000005C7 E65E8EE4 7E0304C7 83E7D1EE 7E8B12EB 0589E65E 8EE47E03 04C783E7
05C76E74 3EC52E00 FF05C76E 783EC52E 00FF05C7 6E7C3EC5 2EFD22E9 03EE4683
9B6EB83E C52E6E74 36C42E02 B9E9037C 40EC7E83 EC46FF03 EB0000EC 46C700FF
5EDD9B0C DE269B04 45D99B6E B83EC52E 6E7836C4 2ED45EDD 9B0CDE26 9B0845D9
C42EF85E D99BD446 DC9BDC46 DC9B0CDE 269B05D9 9B6EB83E C52E6E7C 36C42EDC
D99B6EB8 3EC52E6E 7836C42E D45EDD9B 0CDE269B 1445D99B 6EB83EC5 2E6E7436
DC46DC9B 0CDE269B 0C45D99B 6EB83EC5 2E6E7C36 C42EDC5E DD9B0CDE 269B1045
C42ED45E DD9B0CDE 269B2045 D99B6EB8 3EC52E6E 7436C42E F45ED99B D446DC9B
D99B6EB8 3EC52E6E 7C36C42E DC5EDD9B 0CDE269B 1C45D99B 6EB83EC5 2E6E7836
DC5EDD9B EED99BD4 5EDD9BEE D99BF05E D99BD446 DC9BDC46 DC9B0CDE 269B1845
D45EDC9B E0D99BF8 46D99B07 EBF846D9 9B067600 54968A9A DC5EDC9B F846D99B
46D99B06 76005496 8A9AD45E DC9BF846 D99BD45E DD9BEED9 9B557600 54968A9A

DC46DC9B F846D99B DC5EDD9B F876D89B 6E880EDC 2E9BE0D9 9BF846D9 9B07EBF8
D1EE7E8B 0FEB0589 E65E8EE4 7E03E7D1 EE7E8B08 C4830054 96EF9A00 54968F9A
5EDC9BF4 46D99BDC 5EDD9BEE D99BD45E DD9BEED9 9B000005 C7E65E8E E47E03E7
57760054 968A9AD4 5EDC9BE0 D99BF446 D99B07EB F446D99B 06760054 968A9ADC
F446D99B 07EBF446 D99B0676 0054968A 9AD45EDC 9BF446D9 9BD45EDD 9BEED99B
EF9A0054 968F9ADC 46DC9BF4 46D99BDC 5EDD9BF4 76D89B6E 880EDC2E 9BE0D99B
7E034747 E7D1EE7E 8B11EB05 89E65E8E E47E0347 47E7D1EE 7E8B08C4 83005496
8A9ADC5E DC9BF046 D99BDC5E DD9BEED9 9BD45EDD 9BEED99B 000005C7 E65E8EE4
EED99B58 76005496 8A9AD45E DC9BE0D9 9BF046D9 9B07EBF0 46D99B06 76005496
E0D99BF0 46D99B07 EBF046D9 9B067600 54968A9A D45EDC9B F046D99B D45EDD9B
005496EF 9A005496 8F9ADC46 DC9BF046 D99BDC5E DD9BF076 D89B6E88 0EDC2E9B
E47E0304 C783E7D1 EE7E8B12 EB0589E6 5E8EE47E 0304C783 E7D1EE7E 8B08C483
E676FF02 6A34FF6E 9036C52E FC76FFFE 76FFFD3B E903EE46 83000005 C7E65E8E
549C3C9A FC76FFFE 76FFEA56 89E84689 99C78BF8 8B0CC483 0054CF01 9AE476FF
FF2E6EBE 36FF2E6E C036FF2E 6EC236FF 2E000008 C85756CB 5E5FC99B 04C48300
2E1E75C2 0BFE5689 FC468908 C4830054 99729A50 5204C483 00547FAA 9A6EBC36
FE76FF5A EB04C483 00544A8A 9A6EC436 FF2E6EC6 36FF2E6E 74003D80 6E6C3EC5
8999C78B F88B0CC4 830054CE 7E9A0A76 FF0C76FF 026A34FF 6E9036C5 2EFC76FF
C836FF2E 6ECA36FF 2E127400 3D806E6C 3EC52E1C 74FA460B F8468BFA 5689F846
004C73A0 00CB5E5F C904C483 00549C3C 9AFC76FF FE76FF04 C4830054 4A8A9A6E
004C7413 004C740C 004C7405 0024C3AA 004C73FE 004C73E0 004C73B0 004C73AD
004C7590 004C7592 004C7594 004C742D 0014951F 004C742A 004C7420 004C741D
004C7464 004C7461 004C7457 004C756A 3FE00000 00000000 40300000 00000000
004C74F4 004C7546 004C74C6 004C74C3 004C74B6 004C74B3 004C74A6 004C7487
968F9A9D 9006DC2E 9B005445 4D9A0000 0AC85756 004C7527 004C7504 004C7501
EB0000FE 46C715EB 058B9D98 3EC52E05 899D8C3E C52E08C4 83005496 EF9A0054
6EFA6F1E A7FF2ED8 8BE0D10F 7700023D 4815EB00 00FE46C7 1CEB0000 FE46C723
983EC52E 3F7E0064 3D058B9D 8C3EC52E 0C7CFE46 3B058B9D 8C3EC52E 6F086F01
000205C7 0A7EC501 CAE90002 05C70A7E C501D4E9 000305C7 0A7EC51E EB058B9D
05C70A7E C56F596F 4F6F456F 75A7FF2E D88BE0D1 01B7E903 7600023D 4801C0E9
8F9A9DA4 0EDC2E9B 05DF9B9D 8C3EC52E 05899D9C 3EC52E05 8B9D8C3E C52E0001
B236FF2E 9D9C36FF 2E9D9E36 FF2E0589 9DA03EC5 2E08C483 005496EF 9A005496
36FF2E9D B636FF2E 0CC48300 54424D9A 9DAC36FF 2E9DAE36 FF2E9DB0 36FF2E9D
058B9D8C 3EC52E01 2AE90375 00033D05 8B9D983E C52E04C4 83005443 0B9A9DB4
0275FF9D BC3EC52E 35FF9DC0 3EC52E9D C436FF2E 9DC636FF 2E05899D B83EC52E
8F9A9D90 06DC2E9B 9DCC0EDC 2E9B05D9 9B9DC43E C52E0AC4 83003C2D 549A35FF
D99B9DC4 3EC52EF6 5EDD9BEE D99B0589 9DC83EC5 2E08C483 005496EF 9A005496
C236FF2E 29EB0589 9DC03EC5 2E058B9D D43EC52E 10770054 968A9AF6 5EDC9B05
310E9A35 FF0275FF 9DBC3EC5 2E005496 8F9A05D9 9B9DC43E C52E9DC0 36FF2E9D
36FF2E9D C036FF2E 9DC236FF 2E05899D D83EC52E 058B9DC0 3EC52E10 C483003C
FF2E9DE6 36FF2E0C C4830054 424D9A9D DC36FF2E 9DDE36FF 2E9DE036 FF2E9DE2
2E9DEC36 FF2E9DEE 36FF2E9D C836FF2E 9DCA36FF 2E04C483 0054430B 9A9DE436
0054430B 9A9DF036 FF2E9DF2 36FF2E0C C4830054 424D9A9D E836FF2E 9DEA36FF
EF9A0054 968F9A9D 9006DC2E 9B005445 4D9A0000 08C85756 CB5E5FC9 9B04C483
058B9D8C 3EC52E0C 7C003C3D 058B9D8C 3EC52E05 899D8C3E C52E08C4 83005496
3EC52E05 8B9D8C3E C52E0001 05C70A7E C50199E9 000205C7 0A7EC50A 7E00643D
2E08C483 005496EF 9A005496 8F9A9DA4 0EDC2E9B 05DF9B9D 8C3EC52E 05899DF4
C52E9DC4 36FF2E9D C636FF2E 05899DFC 3EC52E05 8B9D8C3E C52E0589 9DF83EC5
9B05D99B 9DC43EC5 2E0AC483 003C2D54 9A35FF02 75FF9DBC 3EC52E35 FF9DC03E
9B05899D C83EC52E 08C48300 5496EF9A 0054968F 9A9D9006 DC2E9B9D CC0EDC2E
058B9DD4 3EC52E10 77005496 8A9AF85E DC9B05D9 9B9DC43E C52EF85E DD9BEED9
0054968F 9A05D99B 9DC43EC5 2E9DC036 FF2E9DC2 36FF2E29 EB05899D C03EC52E
05899DD8 3EC52E05 8B9DC03E C52E10C4 83003C31 0E9A35FF 0275FF9D BC3EC52E
4D9A9E00 36FF2E9E 0236FF2E 9E0436FF 2E9E0636 FF2E9DF4 36FF2E9D F636FF2E
36FF2E9D C236FF2E 04C48300 54430B9A 9E0836FF 2E9E0A36 FF2E0CC4 83005442
FF2E0CC4 83005442 4D9A9E0C 36FF2E9E 0E36FF2E 9E1036FF 2E9E1236 FF2E9DC0
2E9E1E36 FF2E9DC8 36FF2E9D CA36FF2E 04C48300 54430B9A 9E1436FF 2E9E1636
9E2036FF 2E9E2236 FF2E0CC4 83005442 4D9A9E18 36FF2E9E 1A36FF2E 9E1C36FF
8F9A9D90 06DC2E9B 0054454D 9A000008 C85756CB 5E5FC99B 04C48300 54430B9A
C42E117C 00643D05 8B9D8C3E C52E0589 9D8C3EC5 2E08C483 005496EF 9A005496
000105C7 0A7EC501 5BE90002 05C70A7E C50A7E04 3B26058B 9D8C3EC5 2E9E2436
8C3EC52E 05899DC0 3EC52E05 8B9D8C3E C52E0589 9E283EC5 2E058B9D 8C3EC52E
9DBC3EC5 2E35FF9D C03EC52E 9DC436FF 2E9DC636 FF2E0589 9DD83EC5 2E058B9D
9006DC2E 9B9DCC0E DC2E9B05 D99B9DC4 3EC52E0A C483003C 2D549A35 FF0275FF
C43EC52E F85EDD9B EED99B05 899DC83E C52E08C4 83005496 EF9A0054 968F9A9D
2E29EB05 899DC03E C52E058B 9DD43EC5 2E107700 54968A9A F85EDC9B 05D99B9D
35FF0275 FF9DBC3E C52E0054 968F9A05 D99B9DC4 3EC52E9D C036FF2E 9DC236FF
3EC52E05 8B9DC83E C52E0589 9DD83EC5 2E058B9D C03EC52E 10C48300 3C310E9A
36FF2E9E 3236FF2E 9E3436FF 2E9E3636 FF2E9DC0 36FF2E9D C236FF2E 05899E2C
CA36FF2E 04C48300 54430B9A 9E3836FF 2E9E3A36 FF2E0CC4 83005442 4D9A9E30

83005442 4D9A9E3C 36FF2E9E 3E36FF2E 9E4036FF 2E9E4236 FF2E9DC8 36FF2E9D
4D9AEC8B 555756CB 5E5FC99B 04C48300 54430B9A 9E4436FF 2E9E4636 FF2E0CC4
3EC52E05 899D8C3E C52E08C4 83005496 EF9A0054 968F9A9D 9006DC2E 9B005445
0A7EC500 E0E90002 05C70A7E C50A7E00 643D058B 9D8C3EC5 2E0C7C00 3D839D8C
05899E2C 3EC52E05 8B9DC83E C52E0589 9DC83EC5 2E058B9D 8C3EC52E 000105C7
9DC036FF 2E9DC236 FF2E1DD9 9B9DC43E C52E9DCC 36DC2E9B 05DF9B9D 8C3EC52E
2E10C483 003C310E 9A35FF02 75FF9DBC 3EC52E00 54968F9A 05D99B9D C43EC52E
4C36FF2E 9E4E36FF 2E9DC036 FF2E9DC2 36FF2E05 899DD83E C52E058B 9DC03EC5
430B9A9E 5036FF2E 9E5236FF 2E0CC483 0054424D 9A9E4836 FF2E9E4A 36FF2E9E
FF2E9E56 36FF2E9E 5836FF2E 9E5A36FF 2E9DC836 FF2E9DCA 36FF2E04 C4830054
5FC99B04 C4830054 430B9A9E 5C36FF2E 9E5E36FF 2E0CC483 0054424D 9A9E5436
603EC52E F85EDD9B EED99B1D D99B9E60 3EC52E00 54454D9A 000008C8 5756CB5E
968A9A9D CC1EDC2E 9B05D99B 9E603EC5 2E157200 54968A9A F85EDC9B 05D99B9E
643EC52E 05D99B9E 603EC52E 000105C7 0A7EC54F EB000205 C70A7EC5 09760054
36FF2E9E 6A36FF2E 9E6C36FF 2E9E6E36 FF2E9E64 36FF2E9E 6636FF2E 1DD99B9E
5E5FC99B 04C48300 54430B9A 9E7036FF 2E9E7236 FF2E0CC4 83005442 4D9A9E68
9E603EC5 2EF85EDD 9BEED99B 1DD99B9E 603EC52E 0054454D 9A000008 C85756CB
54968A9A 9DCC1EDC 2E9B05D9 9B9E603E C52E1572 0054968A 9AF85EDC 9B05D99B
9E643EC5 2E05D99B 9E603EC5 2E000105 C70A7EC5 54EB0002 05C70A7E C5097600
7636FF2E 9E7836FF 2E9E7A36 FF2E5000 04059E64 068B2E9E 6636FF2E 045DD99B
04C48300 54430B9A 9E7C36FF 2E9E7E36 FF2E0CC4 83005442 4D9A9E74 36FF2E9E
2EF85EDD 9BEED99B 1DD99B9E 603EC52E 0054454D 9A000008 C85756CB 5E5FC99B
9DCC1EDC 2E9B05D9 9B9E603E C52E1572 0054968A 9AF85EDC 9B05D99B 9E603EC5
2E05D99B 9E603EC5 2E000105 C70A7EC5 54EB0002 05C70A7E C5097600 54968A9A
9E8436FF 2E9E8636 FF2E5000 08059E64 068B2E9E 6636FF2E 085DD99B 9E643EC5
54430B9A 9E8836FF 2E9E8A36 FF2E0CC4 83005442 4D9A9E80 36FF2E9E 8236FF2E
9BEED99B 1DD99B9E 603EC52E 0054454D 9A000008 C85756CB 5E5FC99B 04C48300
2E9B05D9 9B9E603E C52E1572 0054968A 9AF85EDC 9B05D99B 9E603EC5 2EF85EDD
9E603EC5 2E000105 C70A7EC5 54EB0002 05C70A7E C5097600 54968A9A 9DCC1EDC
2E9E9236 FF2E5000 0C059E64 068B2E9E 6636FF2E 0C5DD99B 9E643EC5 2E05D99B
9E9436FF 2E9E9636 FF2E0CC4 83005442 4D9A9E8C 36FF2E9E 8E36FF2E 9E9036FF
56000105 C70A7EC5 00541A48 9A00000A C85756CB 5E5FC99B 04C48300 54430B9A
9E9E36FF 2E00349A 959A5E5F 00740002 9A666A00 6A9E9836 FF2E9E9A 36FF2E57
0003059E 9C068B2E 9E9E36FF 2E06C483 005448E6 9A0F6A50 0003059E 9C068B2E
00FE46C7 63750002 7D809E9C 3EC52E02 45889E9C 3EC52E04 C4830054 EEEA9A50
88FE7E03 9EA43EC5 2E98058A FE7E039E A83EC52E 227D04FE 7E83FE46 FF03EB00
35FF9EB4 3EC52E00 05C6FE7E 039EA43E C52ED5EB 0588FE7E 039EA03E C52E9805
6A038BE9 0AC48300 3C49BC9A 35FF0275 FF9EAC3E C52E35FF 0275FF9E B03EC52E
C4830054 1E6F9A9E BC36FF2E 9EBE36FF 2E9E9C36 FF2E9E9E 36FF2E01 6A056A12
E9037500 3D839EC0 3EC52E0A C4830054 96649A9E B836FF2E 9EBA36FF 2E50520C
058A9EBC 3EC52E5E 5F007400 029A546A 006A9EC4 36FF2E9E C636FF2E 5756015F
2E9ED236 FF2E0588 9EC83EC5 2EE42A01 458A9EBC 3EC52E05 889EC43E C52EE42A
9ECC36FF 2E9ECE36 FF2E08C4 830054EE 309A9ECC 36FF2E9E CE36FF2E 9ED036FF
2E9E9C36 FF2E9E9E 36FF2E01 6A056A12 6A05889E D43EC52E 04C48300 54EEEA9A
96649A9E B836FF2E 9EBA36FF 2E50520C C4830054 1E6F9A9E C436FF2E 9EC636FF
04FE7E83 FE46FF03 EB0000FE 46C700AF E9037500 3D839EC0 3EC52E0A C4830054
FE7E039E A03EC52E 980588FE 7E039EA4 3EC52E98 058AFE7E 039EA83E C52E227D
7E83FE46 FF03EB00 00FE46C7 00349B02 9A0005C6 FE7E039E A43EC52E D5EB0588
2E02E7C1 FE7E8B35 FF0275FF 9EDE1E8E 2E9EDC3E 032E02E7 C1FE7E8B 347D03FE
2E000205 C70A7EC5 C3EB08C4 83003C4C 249A35FF 0275FF9E DA1E8E2E 9ED83E03
86E904C4 8300544A 8A9A9EE4 36FF2E9E E636FF2E 039BE903 75003D80 9EE03EC5
8FCC9A35 FF0275FF 9EB83EC5 2E006A02 6A086A9E E836FF2E 9EEA36FF 2E006A03
A83EC52E 227D04FE 7E83FE46 FF03EB00 00FE46C7 00ACE903 75C00B10 C4830034
C52ED5EB 0588FE7E 039EA03E C52E9805 88FE7E03 9EA43EC5 2E98058A FE7E039E
7E8B347D 03FE7E83 FE46FF03 EB0000FE 46C70034 9B029A00 05C6FE7E 039EA43E
8E2E9ED8 3E032E02 E7C1FE7E 8B35FF02 75FF9EDE 1E8E2E9E DC3E032E 02E7C1FE
EE36FF2E 1274003D 809EE03E C52EC3EB 08C48300 3C4C249A 35FF0275 FF9EDA1E
FF03EB00 00FE46C7 02AFE900 0205C70A 7EC504C4 8300544A 8A9A9EEC 36FF2E9E
3EC52E05 8B9EEA1E 8E2E9EE8 3E032EE7 D1FE7E8B 00A0E903 7C0100FE 7E81FE46
FE7E8B05 89F92B02 5C8E263C 0326E7D1 FE7E8B9E D836C42E CA8BE2D1 158B9EF0
36C42ECA 8BE2D115 8B9EF03E C52E058B 9EEA1E8E 2E9EE83E 032EE7D1 0100C781
E83E032E E7D10200 C781FE7E 8B0589F9 2B065C8E 26047C03 26E7D1FE 7E8B9ED8
7C0326E7 D1FE7E8B 9ED836C4 2ECA8BE2 D1158B9E F03EC52E 058B9EEA 1E8E2E9E
46C704C4 8300541F 539A9EB8 36FF2E9E BA36FF2E FF53E905 89F92B0A 5C8E2608
2E9E9C3E 032EFE7E 8B2876FE 463BE42A 02458A9E 9C3EC52E FE46FF03 EB0000FE
2EC6EB05 88FE7E03 9EA03EC5 2E980588 FE7E039E A43EC52E 9803458A 9E9E1E8E
8B347D03 FE7E83FE 46FF03EB 0000FE46 C700349B 029A0005 C6FE7E03 9EA43EC5
2E9ED83E 032E02E7 C1FE7E8B 35FF0275 FF9EDE1E 8E2E9EDC 3E032E02 E7C1FE7E
3EC52E9D C436FF2E 9DC636FF 2EC3EB08 C483003C 4C249A35 FF0275FF 9EDA1E8E

2E9B05D9 9B9DC43E C52E0AC4 83003C2D 549A35FF 0275FF9D BC3EC52E 35FF9DC0
D99B0589 9DC83EC5 2E08C483 005496EF 9A005496 8F9A9D90 06DC2E9B 9DCC0EDC
2E058B9D D43EC52E 10770054 968A9AF6 5EDC9B05 D99B9DC4 3EC52EF6 5EDD9BEE
2E005496 8F9A05D9 9B9DC43E C52E9DC0 36FF2E9D C236FF2E 29EB0589 9DC03EC5
2E05899D D83EC52E 058B9DC0 3EC52E10 C483003C 310E9A35 FF0275FF 9DBC3EC5
424D9A9E F436FF2E 9EF636FF 2E9EF836 FF2E9EFA 36FF2E9E A436FF2E 9EA636FF
C036FF2E 9DC236FF 2E04C483 0054430B 9A9EFC36 FF2E9EFE 36FF2E0C C4830054
36FF2E0C C4830054 424D9A9F 0036FF2E 9F0236FF 2E9F0436 FF2E9F06 36FF2E9D
FF2E9F12 36FF2E9D C836FF2E 9DCA36FF 2E04C483 0054430B 9A9F0836 FF2E9F0A
9A9F1436 FF2E9F16 36FF2E0C C4830054 424D9A9F 0C36FF2E 9F0E36FF 2E9F1036
B43EC52E 00349A95 9A00541A 489A0000 02C85756 CB5E5FC9 9B04C483 0054430B
560AC483 003C49BC 9A35FF02 75FF9EAC 3EC52E35 FF0275FF 9EB03EC5 2E35FF9E
9EA436FF 2E9EA636 FF2E5E5F 00740002 9A666A00 6A9E9836 FF2E9E9A 36FF2E57
9E9C068B 2E9E9E36 FF2E08C4 830054EE 309A5000 03059E9C 068B2E9E 9E36FF2E
2E9E9E36 FF2E016A 056A126A 0245889E 9C3EC52E 04C48300 54EEEA9A 50000305
36FF2E9E BA36FF2E 50520CC4 8300541E 6F9A9EBC 36FF2E9E BE36FF2E 9E9C36FF
FF2E9EC6 36FF2E57 560158E9 0375003D 839EC03E C52E0AC4 83005496 649A9EB8
C52E0588 9EC43EC5 2EE42A05 8A9EBC3E C52E5E5F 00740002 9A546A00 6A9EC436
FF2E9ECE 36FF2E9F 1836FF2E 9F1A36FF 2E05889E C83EC52E E42A0145 8A9EBC3E
3EC52E04 C4830054 EEEA9A9E CC36FF2E 9ECE36FF 2E08C483 0054EE30 9A9ECC36
6F9A9EC4 36FF2E9E C636FF2E 9E9C36FF 2E9E9E36 FF2E016A 056A126A 05889ED4
839EC03E C52E0AC4 83005496 649A9EB8 36FF2E9E BA36FF2E 50520CC4 8300541E
8AFE7E03 9EA83EC5 2E227D04 FE7E83FE 46FF03EB 0000FE46 C700A8E9 0375003D
7E039EA4 3EC52ED5 EB0588FE 7E039EA0 3EC52E98 0588FE7E 039EA43E C52E9805
2E02E7C1 FE7E8B34 7D03FE7E 83FE46FF 03EB0000 FE46C700 349B029A 0005C6FE
75FF9EDA 1E8E2E9E D83E032E 02E7C1FE 7E8B35FF 0275FF9E DE1E8E2E 9EDC3E03
2E9F1E36 FF2E01FC E9037500 3D809EE0 3EC52EC3 EB08C483 003C4C24 9A35FF02
6A026A08 6A9EE836 FF2E9EEA 36FF2E00 6A01E7E9 04C48300 544A8A9A 9F1C36FF
EB0000FE 46C700A8 E90375C0 0B10C483 00348FCC 9A35FF02 75FF9EB8 3EC52E00
980588FE 7E039EA4 3EC52E98 058AFE7E 039EA83E C52E227D 04FE7E83 FE46FF03
00FE46C7 00349B02 9A0005C6 FE7E039E A43EC52E D5EB0588 FE7E039E A03EC52E
FF0275FF 9EDE1E8E 2E9EDC3E 032E02E7 C1FE7E8B 347D03FE 7E83FE46 FF03EB00
C3EB08C4 83003C4C 249A35FF 0275FF9E DA1E8E2E 9ED83E03 2E02E7C1 FE7E8B35
E904C483 00544A8A 9A9F2036 FF2E9F22 36FF2E01 29E90375 003D809E E03EC52E
E7D1FE7E 8B00A0E9 037C0100 FE7E81FE 46FF03EB 0000FE46 C700349A 959A0114
D1FE7E8B 9ED836C4 2ECA8BE2 D1158B9E F03EC52E 058B9EEA 1E8E2E9E E83E032E
8B9EEA1E 8E2E9EE8 3E032EE7 D10100C7 81FE7E8B 0589F92B 025C8E26 3C0326E7
F92B065C 8E26047C 0326E7D1 FE7E8B9E D836C42E CA8BE2D1 158B9EF0 3EC52E05
E2D1158B 9EF03EC5 2E058B9E EA1E8E2E 9EE83E03 2EE7D102 00C781FE 7E8B0589
00349B02 9AFF53E9 0589F92B 0A5C8E26 087C0326 E7D1FE7E 8B9ED836 C42ECA8B
9EDE1E8E 2E9EDC3E 032E02E7 C1FE7E8B 347D03FE 7E83FE46 FF03EB00 00FE46C7
83003C4C 249A35FF 0275FF9E DA1E8E2E 9ED83E03 2E02E7C1 FE7E8B35 FF0275FF
9AEC8B55 5756CB5E 5FC904C4 8300541F 539A9EB8 36FF2E9E BA36FF2E C3EB08C4
04C48300 54A53E9A 35FF0275 FF9DBC3E C52E0000 10C85756 CB5E5FC9 00544201
9F243EC5 2E000305 C79D983E C52E04C4 83003C7C 959A35FF 0275FF9D BC3EC52E
75FF9DBC 3EC52EFC 4689058B 9F243EC5 2EFA4689 058B9F24 3EC52EF8 4689058B
EB0000F6 46C70CC4 8300545B 789A50F8 468D169F 2836FF2E 9F2A36FF 2E35FF02
C02B047D 003D839F 2A1E8E2E 9F283E03 2EE7D1F6 7E8B747D 04F67E83 F646FF03
F67E8B29 EB00FFBE 057E00FF 3D058B9F 2A1E8E2E 9F283E03 2EE7D1F6 7E8B11EB
2E9F283E 032EE7D1 F67E8B11 EBF62B04 7D003D83 9F2A1E8E 2E9F283E 032EE7D1
C52E83EB 05899F2A 1E8E2E9F 283E032E E7D1F67E 8BC62B00 FFB8358B 9F2A1E8E
5008C483 005496EF 9A005496 8F9A9D90 06DC2E9B 9DA436DC 2E9B05DF 9B9F283E
9B9DA436 DC2E9B02 45DF9B9F 283EC52E 1DD99B9F 2C3EC52E 02C48300 54969D9A
9F303EC5 2E02C483 0054969D 9A5008C4 83005496 EF9A0054 968F9A9D 9006DC2E
96EF9A00 54968F9A 9D9006DC 2E9B9DA4 36DC2E9B 0445DF9B 9F283EC5 2E1DD99B
9B0645DF 9B9F283E C52E1DD9 9B9F343E C52E02C4 83005496 9D9A5008 C4830054
C4830054 969D9A50 08C48300 5496EF9A 0054968F 9A9D9006 DC2E9B9D A436DC2E
2EF24689 04458B9F 283EC52E F0468906 458B9F28 3EC52E1D D99B9F38 3EC52E02
36DC2E9B F446DF9B F44689F0 4603F246 03024403 26058B9F 283EC52E 9F2836C4
3EC52E05 8B9F403E C52E0589 9E243EC5 2E08C483 005496EF 9A005496 8F9A9DA4
05899E28 3EC52E05 8B9F483E C52E0589 9D9C3EC5 2E058B9F 443EC52E 05899F3C
2E9EA236 FF2E9F50 36FF2E9F 5236FF2E 176A0589 9DF43EC5 2E058B9F 4C3EC52E
C52E0004 05C79F58 3EC52E00 0405C79F 543EC52E 0AC48300 5496649A 9EA036FF
9B9D9C3E C52E0588 9F643EC5 2E058B9F 683EC52E 05889F5C 3EC52E05 8B9F603E
9DA03EC5 2E08C483 005496EF 9A005496 8F9A9D90 06DC2E9B 9DA40EDC 2E9B05DF
005496EF 9A005496 8F9A9D90 06DC2E9B 9DA40EDC 2E9B05DF 9B9DF43E C52E0589
05D99B9F 2C3EC52E 05899DD4 3EC52E05 8B9E243E C52E0589 9DF83EC5 2E08C483
D99B9F34 3EC52E04 5DD99B9E 643EC52E 05D99B9F 303EC52E 1DD99B9E 643EC52E
9F6E36FF 2E0C5DD9 9B9E643E C52E05D9 9B9F383E C52E085D D99B9E64 3EC52E05

76FF006A 006A006A 006A0005 FE46C718 74C00B04 C4830054 42609A9F 6C36FF2E
36FF2E9F 7436FF2E 9F7636FF 2E9F4436 FF2E9F46 36FF2E0A C4830054 C0489AFE
FF2E9F7E 36FF2E9F 8036FF2E 9F8236FF 2E0CC483 0054424D 9A9F7036 FF2E9F72
2E9F8C36 FF2E9F8E 36FF2E0C C4830054 424D9A9F 7836FF2E 9F7A36FF 2E9F7C36
9F9A36FF 2E0CC483 0054424D 9A9F8436 FF2E9F86 36FF2E9F 8836FF2E 9F8A36FF
C4830054 424D9A9F 9036FF2E 9F9236FF 2E9F9436 FF2E9F96 36FF2E9F 9836FF2E
FF2E9F9E 36FF2E9F A036FF2E 9FA236FF 2E50000C 059E6406 8B2E9E66 36FF2E0C
2E9FA836 FF2E9FAA 36FF2E9E 6436FF2E 9E6636FF 2E0CC483 0054424D 9A9F9C36
2E500004 059E6406 8B2E9E66 36FF2E0C C4830054 424D9A9F A436FF2E 9FA636FF
9E6636FF 2E0CC483 0054424D 9A9FAC36 FF2E9FAE 36FF2E9F B036FF2E 9FB236FF
424D9A9F B436FF2E 9FB636FF 2E9FB836 FF2E9FBA 36FF2E50 0008059E 64068B2E
C52E0000 12C85756 CB5E5FC9 9B000705 C79FBC3E C52E0054 42739A0C C4830054
83003C7C 959A35FF 0275FF9D BC3EC52E 04C48300 54A53E9A 35FF0275 FF9DBC3E
8B9F243E C52EF646 89058B9F 243EC52E 000105C7 9D983EC5 2E003498 519A04C4
36FF2E9F 2A36FF2E 35FF0275 FF9DBC3E C52EFA46 89058B9F 243EC52E F8468905
8B747D04 F47E83F4 46FF03EB 0000F446 C70CC483 00545B78 9A50F646 8D169F28
283E032E E7D1F47E 8B11EBC0 2B047D00 3D839F2A 1E8E2E9F 283E032E E7D1F47E
2A1E8E2E 9F283E03 2EE7D1F4 7E8B29EB 00FFBE05 7E00FF3D 058B9F2A 1E8E2E9F
C62B00FF B8358B9F 2A1E8E2E 9F283E03 2EE7D1F4 7E8B11EB F62B047D 003D839F
C52EEE46 8906458B 9F283EC5 2E83EB05 899F2A1E 8E2E9F28 3E032EE7 D1F47E8B
89EE4603 F0460302 44032605 8B9F283E C52E9F28 36C42EF0 46890445 8B9F283E
05899E24 3EC52E08 C4830054 96EF9A00 54968F9A 9DA436DC 2E9BF246 DF9BF246
9EA43EC5 2E98058A FC7E039F 503EC52E 177D0FFC 7E83FC46 FF03EB00 00FC46C7
8B9FC03E C52E0589 9F3C3EC5 2E058B9F 403EC52E 00347E6C 9AE0EB05 88FC7E03
3EC52E05 8B9F4C3E C52E0589 9E283EC5 2E058B9F 483EC52E 05899D9C 3EC52E05
83005496 649A9EA0 36FF2E9E A236FF2E 9F5036FF 2E9F5236 FF2E176A 05899DF4
9F5C3EC5 2E058B9F 603EC52E 000405C7 9F583EC5 2E000405 C79F543E C52E0AC4
2E9B9DA4 0EDC2E9B 05DF9B9D 9C3EC52E 05889F64 3EC52E05 8B9F683E C52E0588
05DF9B9D F43EC52E 05899DA0 3EC52E08 C4830054 96EF9A00 54968F9A 9D9006DC
05899DF8 3EC52E08 C4830054 96EF9A00 54968F9A 9D9006DC 2E9B9DA4 0EDC2E9B
9E243EC5 2E08EB05 8B9E283E C52E097E 043B2648 058B9E24 3EC52E9E 2836C42E
36FF2E9D C636FF2E 05899DD4 3EC52E05 8B9E243E C52E0589 9DC03EC5 2E48058B
9DC43EC5 2E0AC483 003C2D54 9A35FF02 75FF9DBC 3EC52E35 FF9DC03E C52E9DC4
3C3EC52E 08C48300 5496EF9A 0054968F 9A9D9006 DC2E9B9D CC0EDC2E 9B05D99B
00544260 9A9FC436 FF2E9FC6 36FF2E05 899DC83E C52E058B 9F3C3EC5 2E05899F
2E0AC483 0054C048 9AFE76FF 006A006A 006A006A 0005FE46 C71874C0 0B04C483
424D9A9F C836FF2E 9FCA36FF 2E9FCC36 FF2E9FCE 36FF2E9E A436FF2E 9EA636FF
FF2E9FD2 36FF2E9F D436FF2E 9FD636FF 2E9D9C36 FF2E9D9E 36FF2E0C C4830054
2E9FDC36 FF2E9FDE 36FF2E9D F436FF2E 9DF636FF 2E0CC483 0054424D 9A9FD036
9FE636FF 2E9FE836 FF2E9FEA 36FF2E0C C4830054 424D9A9F D836FF2E 9FDA36FF
2436FF2E 9E2636FF 2E0CC483 0054424D 9A9FE036 FF2E9FE2 36FF2E9F E436FF2E
36FF2E0C C4830054 424D9A9F EC36FF2E 9FEE36FF 2E9FF036 FF2E9FF2 36FF2E9E
0054424D 9A9FF436 FF2E9FF6 36FF2E9F F836FF2E 9FFA36FF 2E9E2836 FF2E9E2A
FC36FF2E 9FFE36FF 2EA00036 FF2EA002 36FF2E9F 3C36FF2E 9F3E36FF 2E0CC483
36FF2EA0 0836FF2E A00A36FF 2EA00C36 FF2EA00E 36FF2E0C C4830054 424D9A9F
5FC99B00 0705C79F BC3EC52E 00544273 9A0CC483 0054424D 9AA00436 FF2EA006
FF9DBC3E C52E04C4 830054A5 3E9A35FF 0275FF9D BC3EC52E 000012C8 5756CB5E
8B9F243E C52E0002 05C79D98 3EC52E00 3499739A 04C48300 3C7C959A 35FF0275
0275FF9D BC3EC52E FA468905 8B9F243E C52EF846 89058B9F 243EC52E F6468905
03EB0000 F446C70C C4830054 5B789A50 F6468D16 9F2836FF 2E9F2A36 FF2E35FF
EBC02B04 7D003D83 9F2A1E8E 2E9F283E 032EE7D1 F47E8B74 7D04F47E 83F446FF
D1F47E8B 29EB00FF BE057E00 FF3D058B 9F2A1E8E 2E9F283E 032EE7D1 F47E8B11
8E2E9F28 3E032EE7 D1F47E8B 11EBF62B 047D003D 839F2A1E 8E2E9F28 3E032EE7
3EC52E83 EB05899F 2A1E8E2E 9F283E03 2EE7D1F4 7E8BC62B 00FFB835 8B9F2A1E
26058B9F 283EC52E 9F2836C4 2EF04689 04458B9F 283EC52E EE468906 458B9F28
005496EF 9A005496 8F9A9DA4 36DC2E9B F246DF9B F24689EE 4603F046 03024403
03A0103E C52E177D 0FFC7E83 FC46FF03 EB0000FC 46C70589 9E243EC5 2E08C483
3EC52E05 8BA0143E C52E0034 7E6C9AE0 EB0588FC 7E039EA4 3EC52E98 058AFC7E
05899E28 3EC52E05 8BA01C3E C52E0589 9D9C3EC5 2E058BA0 183EC52E 05899F3C
2E9EA236 FF2EA010 36FF2EA0 1236FF2E 176A0589 9DF43EC5 2E058BA0 203EC52E
C52E0004 05C79F58 3EC52E00 0405C79F 543EC52E 0AC48300 5496649A 9EA036FF
9B9D9C3E C52E0588 9F643EC5 2E058B9F 683EC52E 05889F5C 3EC52E05 8B9F603E
9DA03EC5 2E08C483 005496EF 9A005496 8F9A9D90 06DC2E9B 9DA40EDC 2E9B05DF
005496EF 9A005496 8F9A9D90 06DC2E9B 9DA40EDC 2E9B05DF 9B9DF43E C52E0589
283EC52E 097E043B 2648058B 9E243EC5 2E9E2836 C42E0589 9DF83EC5 2E08C483
9DD43EC5 2E058B9E 243EC52E 05899DC0 3EC52E48 058B9E24 3EC52E08 EB058B9E
2D549A35 FF0275FF 9DBC3EC5 2E35FF9D C03EC52E 9DC436FF 2E9DC636 FF2E0589
EF9A0054 968F9A9D 9006DC2E 9B9DCC0E DC2E9B05 D99B9DC4 3EC52E0A C483003C
A02636FF 2E05899D C83EC52E 058B9F3C 3EC52E05 899F3C3E C52E08C4 83005496

76FF006A 006A006A 006A0005 FE46C718 74C00B04 C4830054 42609AA0 2436FF2E
36FF2EA0 2C36FF2E A02E36FF 2E9EA436 FF2E9EA6 36FF2E0A C4830054 C0489AFE
FF2EA036 36FF2E9D 9C36FF2E 9D9E36FF 2E0CC483 0054424D 9AA02836 FF2EA02A
2E9DF436 FF2E9DF6 36FF2E0C C4830054 424D9AA0 3036FF2E A03236FF 2EA03436
A04A36FF 2E0CC483 0054424D 9AA03836 FF2EA03A 36FF2EA0 3C36FF2E A03E36FF
C4830054 424D9AA0 4036FF2E A04236FF 2EA04436 FF2EA046 36FF2EA0 4836FF2E
9AA04C36 FF2EA04E 36FF2EA0 5036FF2E A05236FF 2E9E2436 FF2E9E26 36FF2E0C
A05636FF 2EA05836 FF2EA05A 36FF2E9E 2836FF2E 9E2A36FF 2E0CC483 0054424D
6036FF2E A06236FF 2E9F3C36 FF2E9F3E 36FF2E0C C4830054 424D9AA0 5436FF2E
36FF2EA0 6C36FF2E A06E36FF 2E0CC483 0054424D 9AA05C36 FF2EA05E 36FF2EA0
C52E0054 42739A0C C4830054 424D9AA0 6436FF2E A06636FF 2EA06836 FF2EA06A
006A0780 E75E86C7 0080E760 86C70018 A6C85756 CB5E5FC9 9B000705 C79FBC3E
5E8603E7 60860309 E0C14010 468B0AC4 830054D6 A49A0A76 FF0C76FF 006A006A
890CC483 0054D5C2 9A50E770 868D16E7 66B6FF01 6A0A76FF 0C76FFE7 668689E7
5C863B12 468BE75C 8689E42A E813868A 011AE9FF FEB80674 00E762BE 83E76286
462BE75C 868B00F0 E9FFFCB8 06731046 3BE42AE8 0C868A01 01E9FFFD B8067EE7
8908E0C1 0E468BE7 688689E0 D3E7648E 8BE76886 8B0001E7 6886C7E7 64868912
FE031F16 FD8BE6D1 E76EB68B 3FC0E764 86C7E76C 868908E0 C1401046 8BE76E86
BE83E75A 86891846 8B07EB00 01E75A86 C7087600 F03DE768 B6F7D22B F000858B
6AB68B6B 7DE76C86 3BE76A86 8BE76A86 FF04EBE7 6A8689E7 6E868B3E 7500E75A
89165E8E 147E03E7 D1E76ABE 8BE768B6 F7D22BF0 00858BFE 031F16FD 8BE6D1E7
D1E76ABE 8B2D7DE7 6C863BE7 6A868BE7 6A86FF04 EBE76A86 89E76E86 8BCCEB05
D22BF000 842B26E7 64868BF1 030716F5 8BC88BE0 D1E76A86 8B165E8E 147E03E7
C52E0034 2D259A00 00FE46C7 000064C8 5756CB5E 5FC9C02B C5EB0589 E768B6F7
0054DABA 9A6F6A03 6A036A50 FE468D16 000005C7 A0743EC5 2E000005 C7A0703E
54B3EA9A 0AC48300 54C0489A FE76FF00 6A006A00 6A006A13 7400FE7E 830AC483
830054A4 759A35FF 0275FF9D BC3EC52E 00544201 9A02C483 00441E98 9A016A00
9BA0783E C52EA07C 06DD2E9B 04C48300 54A4DB9A 35FF0275 FF9DBC3E C52E04C4
085DD99B A0783EC5 2EA07C06 DD2E9B04 5DD99BA0 783EC52E A07C06DD 2E9B1DD9
3EC52E1D D99BA08C 3EC52EA0 9006DD2E 9B0C5DD9 9BA0783E C52EA084 06DD2E9B
DF2E9B1D D99BA0A0 3EC52EA0 A406DD2E 9B000005 C7A09C3E C52E0000 05C7A098
2EA0BC06 DD2E9B1D D99BA0B2 3EC52EA0 B606DF2E 9B1DD99B A0AC3EC5 2EA0B006
A0C83EC5 2EA0BC06 DD2E9B1D D99BA0C4 3EC52EA0 BC06DD2E 9B1DD99B A0B83EC5
DC339A50 039C466B 026A0200 9C46C71D D99BA0CC 3EC52EA0 D006DD2E 9B1DD99B
C52E04C4 830054DC 339A5003 9C466B02 6A025589 05899EAC 3EC52E04 C4830054
6A025589 0589A0DC 3EC52E04 C4830054 DC339A9C 76FF026A 02558905 89A0D83E
DC339A03 0068046A 02558905 89A0E03E C52E04C4 830054DC 339A5003 9C466B02
05899ED8 3EC52E02 558B058B 9EAC3EC5 2E025589 0589A0E4 3EC52E04 C4830054
9EAC3EC5 2E065589 0445899E D83EC52E 04000502 558B058B 9EAC3EC5 2E025589
3EC52E02 558B058B A0D83EC5 2E0A5589 0845899E D83EC52E 08000502 558B058B
2E065589 0445899E DC3EC52E 04000502 558B058B A0D83EC5 2E025589 05899EDC
558B058B A0E03EC5 2E0A5589 0845899E DC3EC52E 08000502 558B058B A0D83EC5
044589A0 E83EC52E 04000502 558B058B A0E03EC5 2E025589 0589A0E8 3EC52E02
A0E43EC5 2E0A5589 084589A0 E83EC52E 08000502 558B058B A0E03EC5 2E065589
EC3EC52E 04000502 558B058B A0E43EC5 2E025589 0589A0EC 3EC52E02 558B058B
2E0A5589 084589A0 EC3EC52E 08000502 558B058B A0E43EC5 2E065589 044589A0
0B02458B A0DC3EC5 2E247405 0B02458B A0D83EC5 2E307405 0B02458B 9EAC3EC5
00349B66 9A1A7505 0B02458B A0E43EC5 2E0C7405 0B02458B A0E03EC5 2E187405
81A846FF 03EB0000 A846C703 BAE904C4 8300544A 8A9AA0F0 36FF2EA0 F236FF2E
36FF2EDF EBFC1805 C7025C8E 263C0326 E7D1A87E 8BA0DC36 C42E177D 0200A87E
0BAC5689 AA468908 C4830054 99729AA0 F436FF2E A0F636FF 2EA0F836 FF2EA0FA
36FF2EA0 9A36FF2E 0357E904 C4830054 4A8A9AA0 FC36FF2E A0FE36FF 2E1575C2
C4830054 EAAA9A50 AE468D16 506AAA76 FFAC76FF A10036FF 2EA10236 FF2EA098
8B2EA07A 36FF2E50 000C05A0 78068B2E A07A36FF 2E0CC483 00542A08 9A50520A
2EA07836 FF2EA07A 36FF2E50 000405A0 78068B2E A07A36FF 2E500008 05A07806
50520AC4 830054EA AA9A50AE 468D1650 6AAA76FF AC76FFA1 0436FF2E A10636FF
FFAC76FF A10836FF 2EA10A36 FF2EA10C 36FF2EA1 0E36FF2E 18C48300 542A089A
A08E36FF 2E0CC483 00542A08 9A50520A C4830054 EAAA9A50 AE468D16 506AAA76
54EAAA9A 50AE468D 16506AAA 76FFAC76 FFA11036 FF2EA112 36FF2EA0 8C36FF2E
36FF2EA0 A236FF2E A0B836FF 2EA0BA36 FF2E0CC4 8300542A 089A5052 0AC48300
C4830054 EAAA9A50 AE468D16 506AAA76 FFAC76FF A11436FF 2EA11636 FF2EA0A0
2EA0AC36 FF2EA0AE 36FF2EA0 C436FF2E A0C636FF 2E10C483 00542A08 9A50520A
50520AC4 830054EA AA9A50AE 468D1650 6AAA76FF AC76FFA1 1836FF2E A11A36FF
CE36FF2E A0B236FF 2EA0B436 FF2EA0C8 36FF2EA0 CA36FF2E 10C48300 542A089A
EAAA9A50 AE468D16 506AAA76 FFAC76FF A11C36FF 2EA11E36 FF2EA0CC 36FF2EA0
FF2EA122 36FF2EA0 9C36FF2E A09E36FF 2E14C483 00542A08 9A50520A C4830054
8300542A 089A5052 0AC48300 54EAAA9A 50AE468D 16506AAA 76FFAC76 FFA12036
8D16506A AA76FFAC 76FFA124 36FF2EA1 2636FF2E 9EB436FF 2E9EB636 FF2E0CC4
8902E0C1 058B9EB4 3EC52E0C C4830054 2A089A50 520AC483 0054EAAA 9A50AE46
458B9EB0 3EC52E02 55890589 9EB03EC5 2E04C483 0054DC33 9A9C76FF 026A9C46

EB0000A8 46C700F5 E904C483 00544A8A 9AA12836 FF2EA12A 36FF2E15 75050B02
468D1650 A2468D16 50A4468D 1600CEE9 037C053B A8468B9E B43EC52E A846FF03
AA9A50AE 468D1650 6AAA76FF AC76FFA1 2C36FF2E A12E36FF 2E509E46 8D1650A0
5B7D04A6 7E83A646 FF03EB00 00A646C7 18C48300 542A089A 50520AC4 830054EA
EF9A0054 968F9A9D 9006DC2E 9B9DA40E DC2E9B9E 45DF9B1F 16FD03E7 D1A67E8B
C42E9E45 8B1F16FD 03E7D1A6 7E8B9E45 891F16FD 03E7D1A6 7E8B08C4 83005496
9EF03EC5 2E9CEB05 89025F8E 263F0326 FE03E7D1 A67E8B03 E6C1A876 8B9EB01E
20E90589 9E468BF9 2B025C8E 263C0326 E7D1A07E 8BA0DC36 C42EC88B E0D1058B
BD9A0034 9B669AEC 8B555756 CB5E5FC9 9B04C483 00549C3C 9AAA76FF AC76FFFF
74003D83 A0703EC5 2E000008 C85756CB 5E5FC902 C4830044 29749A63 6A004422
04C48300 547FAA9A A13036FF 2EA13236 FF2EA134 36FF2EA1 3636FF2E 010BE903
7E83FE46 FF03EB00 00FE46C7 7675C20B FC5689FA 468908C4 83005499 729A5052
9F503EC5 2EE0EB05 88FE7E03 9F503EC5 2E98058A FE7E039E A83EC52E 177D04FE
5F05C79F 4C3EC52E 001905C7 9FC03EC5 2E004605 C79F403E C52E0005 C6FE7E03
9EA036FF 2E9EA236 FF2E9F50 36FF2E9F 5236FF2E 176A0136 05C79F48 3EC52E00
7E9A9F50 36FF2E9F 5236FF2E 176A016A FA76FFFC 76FF65EB 0AC48300 5496649A
3836FF2E A13A36FF 2E127400 3D809EE0 3EC52E34 74C00BF8 46890CC4 830054CE
442B8C9A 0AC48300 54C0489A F876FF03 6A006A00 6A006A04 C4830054 4A8A9AA1
3D83A074 3EC52E00 0008C857 56CB5E5F C904C483 00549C3C 9AFA76FF FC76FF00
8300547F AA9AA13C 36FF2EA1 3E36FF2E A14036FF 2EA14236 FF2E010B E9037400
F846FF03 EB0000F8 46C77675 C20BFE56 89FC4689 08C48300 5499729A 505204C4
3EC52EE0 EB0588F8 7E03A010 3EC52E98 058AF87E 039EA83E C52E177D 04F87E83
C7A0203E C52E0019 05C7A018 3EC52E00 0005C7A0 143EC52E 0005C6F8 7E03A010
36FF2E9E A236FF2E A01036FF 2EA01236 FF2E176A 013605C7 A01C3EC5 2E005F05
A01036FF 2EA01236 FF2E176A 016AFC76 FFFE76FF 65EB0AC4 83005496 649A9EA0
FF2EA146 36FF2E12 74003D80 9EE03EC5 2E3474C0 0BFA4689 0CC48300 54CE7E9A
8C9A0AC4 830054C0 489AFA76 FF036A00 6A006A00 6A04C483 00544A8A 9AA14436
0000FE46 C7000004 C85756CB 5E5FC904 C4830054 9C3C9AFC 76FFFE76 FF00442B
C1FC768B E67D03FC 7E83FC46 FF03EB00 00FC46C7 527D0200 FE7E81FE 46FF03EB
C1FC768B FC1805C7 025C8E26 3C0326E7 D1FE7E8B 9EDA068E 2E9ED836 032E02E6
5FC9B5EB FC1805C7 025C8E26 3C0326E7 D1FE7E8B A0EA068E 2EA0E836 032E02E6
032E02E7 C1FE7E8B 3C7D03FE 7E83FE46 FF03EB00 00FE46C7 000002C8 5756CB5E
A0E83E03 2E02E7C1 FE7E8B04 C483003C 6D999A35 FF0275FF 9EDA1E8E 2E9ED83E
555756CB 5E5FC900 349BDB9A BBEB04C4 83003C6D 999A35FF 0275FFA0 EA1E8E2E
3EC52E04 C4830054 DC759A35 FF0275FF 9EAC3EC5 2EEC8B55 5756CB5E 5FC9EC8B
C4830054 DC759A35 FF0275FF A0DC3EC5 2E04C483 0054DC75 9A35FF02 75FFA0D8
DC759A35 FF0275FF A0E43EC5 2E04C483 0054DC75 9A35FF02 75FFA0E0 3EC52E04
0012C857 56CB5E5F C904C483 0054DC75 9A35FF02 75FF9EB0 3EC52E04 C4830054
C88BE0D1 058B9EF0 3EC52E01 91E9037C 0100FE7E 81FE46FF 03EB0000 FE46C700
058B9EF0 3EC52EF4 4689058B F92B065C 8E26047C 0326E7D1 FE7E8B9E D836C42E
C52E227D F4463B05 8BF92B02 5C8E263C 0326E7D1 FE7E8B9E D836C42E C88BE0D1
21EB058B F92B025C 8E263C03 26E7D1FE 7E8B9ED8 36C42EC8 8BE0D105 8B9EF03E
8BF92B06 5C8E2604 7C0326E7 D1FE7E8B 9ED836C4 2EC88BE0 D1058B9E F03EC52E
8E26087C 0326E7D1 FE7E8B9E D836C42E C88BE0D1 048B269E F036C42E FA468905
D836C42E C88BE0D1 058B9EF0 3EC52E22 EBFA46DF 9B067D05 3BFA468B F92B0A5C
46FF03EB 0000FC46 C7F65ED9 9B05DF9B F92B0A5C 8E26087C 0326E7D1 FE7E8B9E
5D760054 968A9AEE 5EDC9BF6 46D99BEE 5EDD9BEE D99BFEFE E9037C03 FC7E83FC
9EF03EC5 2EF45689 F2468902 558B058B 9EDA1E8E 2E9ED83E 032E02E7 C1FC7E8B
E6C1FC76 8B34DE26 9BF646D9 9BF12BF4 468EF276 03E6D1FE 768BC88B E0D1058B
FC768B81 EB1DD99B 025C8E26 3C032602 E7C1FE7E 8BA0EE06 8E2EA0EC 36032E02
A14806DD 2E9B025C 8E263C03 2602E7C1 FE7E8BA0 EE068E2E A0EC3603 2E02E6C1
0024F6F6 0024AAFE 3FE00000 00000000 0024FE0E 00CB5E5F C99BFF58 E91DD99B
00147B90 0024F78F 0024F2A7 0024F2A3 0024F29E 40046666 66666666 0024AA6E
0024F2AC 0024F793 0024AA6A 40590000 00000000 0024AA66 00249258 0024AA68
0024F791 0024AA6C 0024F6FA 0024F2C6 0024F2C2 0024F2BC 0024F2B6 0024F2B2
0024F2F0 0024F2EA 0024F2E4 0024F2E0 0024F2DA 0024F2D5 0024F2D1 0024F2CC
0024F30A 0024F304 0024F300 0024F2FA 0024F784 0024F6FC 0024F70E 0024F2F4
0024F334 0024F330 0024F32A 0024F324 0024F320 0024F31A 0024F314 0024F310
0024F358 0024F352 0024F34C 0024F346 0024F340 0024F33A 0024AA74 0024FE64
0024F7EA 0024F796 0024F37C 0024F376 0024F370 0024F36A 0024F364 0024F35E
00149DE2 0024F7FC 0024F6E2 0024AAB0 0024AAA0 0024F6EC 0024AA90 0024F77E
0024AAC0 0024AAB4 0024FE12 0024F382 0024FE13 0024FE11 0024FE10 0024F80A
0024F400 0024F3FD 0024F3F8 0024F6E4 0024F3C1 0024F80E 0024F38F 0014951F
0024F432 0024F425 0024F41F 0024F41B 0024F415 0024F40F 0024F40B 0024F405
0024F710 0024F6FE 0024F70A 0024F706 0024F702 0024F736 00147DFE 0024F464
0024AA64 0024AA62 0024AA60 0024F74E 0024F761 0024F763 0024F6F8 0024F75D
0024F4B3 0024F4AE 0024F4AA 0024F4A5 0024F49B 0024F6F4 0024AA65 0024F6F2
0024F4C9 0024F4C8 0024F4C5 0024F4C0 0024F4BF 0024F4BC 0024F4B7 0024F4B6
00149E4A 0024F4F3 0024F4ED 0024F4E7 0024F4E1 0024F4DB 0024F4D5 0024F4CF

0024F519 0024F514 0024F510 0024F50B 0024F508 0024F503 0024F4F9 0024F75F
0024F53A 0024F536 0024F530 0024F52C 0024F526 0024F525 0024F522 0024F51D
0024F77B 0024F777 0024F775 0024F766 0024F54D 0024F54A 0024F544 0024F540
0024F56E 0024F569 0024F565 0024F560 0024F55D 0024F558 0024F54E 0024F779
0024F58F 0024F58B 0024F585 0024F581 0024F57B 0024F57A 0024F577 0024F572
9999999A 0024F73E 004C80E2 004C80E0 0024F5A2 0024F59F 0024F599 0024F595
0024AB00 0024F734 3FE33333 33333333 0024F730 3FF19999 9999999A 3FE99999
9999999A 004C0918 001C004C 0924000C 004C091C 40140000 00000000 004C0914
0024AAAC 0024AAA4 3FFCCCCC CCCCCCCD 0024AADA 004C0928 004C0920 3FB99999
0024F5D8 0024F5D5 0024F5BA 0024F5A3 0024AAE2 0024AACC 0024AADE 0024AAA8
0024F632 0024F62B 0024F624 0024F620 0024AAEE 0024F61C 0024F60F 0024F60B
0024F6A4 0024F671 0024F66F 0024F667 0024F65A 0024F644 0024F640 0024F63C
DD2E9BB8 5ED99BEE D99B0006 7EC85756 3FF00000 00000000 0024F6AE 0024F6AC
2E9BFACA 9ED99BFA CE86DF9B 0100FACE 86C7FAD4 9ED99BCE B636DC2E 9BCEAE06
9BFAB69E DD9BFAAE A6DC9BCE B606DD2E 9BFAAE9E DD9BCEC6 36DC2E9B CEBE06DD
C636DC2E 9BCEBE06 DD2E9BFA BE9ED99B FAB6B6DC 9BCEBE26 DC2E9BCE B606DD2E
2E1575C2 0BFAB096 89FAAE86 8904C483 0054DC33 9A016A60 0068FABA 9ED99BCE
9A016A40 00682E75 02127E83 20F6E904 C4830054 4A8A9ACE CE36FF2E CED036FF
4A8A9ACE D236FF2E CED436FF 2E1575C2 0BFA9C96 89FA9A86 8904C483 0054DC33
1274003D 80CEE23E C52E1DD9 9BCED63E C52ECEDA 06DD2E9B 20C2E904 C4830054
DD2E9BF9 A29EDD9B CEEA06DF 2E9B04C4 830054EB 729ACEE6 36FF2ECE E836FF2E
01FE46C7 FC709EDD 9BCC46D9 9BCC5ED9 9BEED99B C85ED99B F9A2B6DC 9BCEDA06
8F9ACEEC 06DD2E9B CC5ED99B CC46D89B C846D99B 397D10FE 7E83FE46 FF03EB00
DD9B1F16 FD0303E7 C1FE7E8B 10C48300 54D1809A 0054968F 9ACC46D9 9B005496
0000F646 C70000F8 46C700A7 E914468B FCF09EDD 9BCEDA06 DD2E9BBE EBFC709D
C70002F8 46C7009F E90001F4 46C70001 F646C700 01F846C7 00B1E900 01F446C7
F846C77C EB0001F4 46C70001 F646C700 00F846C7 008DE900 01F446C7 0002F646
C75AEB00 01F446C7 0002F646 C70001F8 46C76BEB 0002F446 C70002F6 46C70000
2ECEF636 FF2E1274 003D80CE E23EC52E 49EB0001 F446C700 02F646C7 0000F846
00063D1C EB0001F4 46C70002 F646C700 00F846C7 04C48300 544A8A9A CEF436FF
2E9B0002 E446C7A3 3FA32EA3 1DA30CA2 FAA2E8A2 D6A38BA7 FF2ED88B E0D1CE77
54968F9A E046D99B 0054968F 9ADC46D9 9BDC5ED9 9BE8D99B E05ED99B CEF806DF
868D1650 5204C483 00547FAA 9ACEFA36 FF2ECEFC 36FF2E10 C4830044 F85E9A00
1874003D 80CEE23E C52E2274 000105F7 CEFE3EC5 2E08C483 0054EE30 9A50F9DE
36FF2ECF 0836FF2E 08C48300 544A8A9A CF0236FF 2ECF0436 FF2E50F9 DE868D16
A9E9C02B 0575C20B F9DC9689 F9DA8689 08C48300 5499729A 50F9DE86 8D16CF06
2E50F9BE 868D1650 F9C0868D 1650F9CE 868D1650 F9CA868D 1650FA32 868D161E
C4830054 EAAA9A50 FA36868D 16506AF9 DAB6FFF9 DCB6FFCF 0A36FF2E CF0C36FF
4689F846 8B04C483 00549C3C 9AF9DAB6 FFF9DCB6 FF1CC483 00542A08 9A50520A
7E8B2774 003D80CE E23EC52E 1DDAE903 7EF6463B FA468BFA 4601F446 8B06EBFA
4A8A9ACF 0E36FF2E CF1036FF 2E35FF02 75FFCF14 1E8E2ECF 123E032E 02E7C1FA
89FAA686 8910568B 0E4603E0 D1FA8C86 8BFA8C86 890CE0C1 FA468B08 C4830054
868BCF16 3EC52EFA AC9689FA AA8689FA B0968BFA AE8603E0 D1FA8C86 8BFAA896
3E032E02 E7C1FA7E 8B2D7502 127E83FA A49689FA A2868902 558B0503 E0D1FA8C
FA968689 FA9C968B FA9A868B FA949689 FA928689 02558B05 8BCF1C1E 8E2ECF1A
8B0C5E8E 0A7E03E7 D1FA7E8B D6468905 8B0C5E8E 0A7E03E7 D1FA7E8B FA989689
5E8E0A7E 03E7D1FA 7E8BD446 8918458B 0C5E8E0A 7E03E7D1 FA7E8BD2 46890645
CF1E3EC5 2EA85EDD 9B2445D9 9B0C5E8E 0A7E0302 E7C1FA7E 8BD04689 1E458B0C
C086C706 7D01F9C0 BE8304C4 83002CF0 DA9A50F9 B4868D16 019FE903 74003D83
E0D99B08 C4830054 D9849A00 54968F9A 35DE9BF9 C086DF9B CF223EC5 2E0001F9
9B05D99B CF263EC5 2E427501 F9B4BE83 F9B69ED9 9B05DF9B 0A7EC5F9 D69ED99B
0A7EC5F9 B2868908 C4830054 96EF9A00 54968F9A 05D99BCF 2A3EC52E F9BA9ED9
A29EDD9B EED99BF9 B69ED99B F9BAB6D8 9B02C483 0054969D 9A50F9B2 862B058B
9A35DE9B F9B686D9 9BCF223E C52E2476 0054968A 9AF9A29E DC9BF9B6 86D99BF9
DA06DD2E 9BCF223E C52E23EB F9D29ED9 9BE0D99B 08C48300 54D9849A 0054968F
D89BF9D6 86D99BF9 D29ED99B E0D99B08 C4830054 D9849A00 54968F9A 35DE9BCE
D89BF9C6 86D99B16 76005496 8A9AF9CE 9ED89BF9 C686D99B F9C69ED9 9BF9D2A6
66DC9BCF 3006DD2E 9BF9C29E D99BEED9 9B08EBF9 C29ED99B F9CA8ED8 9BF9CEA6
F9AA86DD 9BF9AA9E DD9BF9A2 A6DC9BF9 C2A6D89B CF2E06DF 2E9BF9A2 9EDD9BA8
5EDD9BF9 AA86DD9B F9AA9EDD 9BCF3806 DD2E9B0B 73005496 8A9ACF38 1EDC2E9B
9ACF4036 FF2ECF42 36FF2E00 54968F9A F9AA86DD 9B1C7400 3D80CEE2 3EC52EA8
5ED99BF9 A2B6DC9B CEDA06DD 2E9BF9A2 9EDD9BCE EA06DF2E 9B0CC483 00544A8A
5ED99B10 C4830054 D1809A00 54968F9A C846D99B 0054968F 9ACEEC06 DD2E9BC8
54968F9A CC46D99B 0054968F 9AA046DD 9BA05EDD 9BA876DC 9BCEEC06 DD2E9BCC
9BE046D9 9B985EDD 9BF9A28E DC9BDC46 D99BF9A2 9EDD9B10 C4830054 D1809A00
54D1809A 0054968F 9ACC46D9 9B005496 8F9AA046 DD9BF9A2 9EDD9BCF 440EDC2E
0303E7C1 FA7E8B20 7502127E 83067401 127E83CC 5ED99BF9 A2B6DC9B 10C48300
3D80CEE2 3EC52E60 5DDD9BCF 4C36DC2E 9BCC66D8 9BCEDA06 DD2E9B0C 5E8E0A7E
9ACF5436 FF2ECF56 36FF2E00 54968F9A 9846DD9B 0054968F 9ACC46D9 9B247400
FA7E8B04 C4830054 9BD59A50 001205CF 58068B2E CF5A36FF 2E14C483 00544A8A

0A7E0303 E7C1FA7E 8B905EDD 9BCF380E DC2E9B78 45DD9B0C 5E8E0A7E 0303E7C1
C1FA7E8B 1DDD9BCF 5C3EC52E CEDA26DC 2E9BCF4C 0EDC2E9B 009085DD 9B0C5E8E
1DDD9BCF 603EC52E CEDA26DC 2E9BCF4C 0EDC2E9B 6045DD9B 0C5E8E0A 7E0303E7
643EC52E CEDA26DC 2E9BCF4C 0EDC2E9B 4845DD9B 0C5E8E0A 7E0303E7 C1FA7E8B
CEDA26DC 2E9BCF4C 0EDC2E9B 3045DD9B 0C5E8E0A 7E0303E7 C1FA7E8B 1DDD9BCF
9AFAA2B6 FFFAA4B6 FF006A35 FF0C5E8E 0A7E03E7 D1FA7E8B 1DDD9BCF 683EC52E
FFFAA4B6 FF016A06 75FF0C5E 8E0A7E03 E7D1FA7E 8BFA8886 8908C483 0034CB34
968F9AA8 46DD9B2F 74003D80 CEE23EC5 2EFA8686 8908C483 0034CB34 9AFAA2B6
CF6C36FF 2ECF6E36 FF2EFA88 B6FFFA86 B6FFD676 FFD276FF D476FFD0 76FF0054
2E005496 8F9A05DD 9BCF683E C52E4F74 003D80CE E23EC52E 18C48300 544A8A9A
DD9BCF5C 3EC52E00 54968F9A 05DD9BCF 603EC52E 0054968F 9A05DD9B CF643EC5
C4830054 4A8A9ACF 7036FF2E CF7236FF 2E005496 8F9A9046 DD9B0054 968F9A05
2E9B05DD 9BCF5C3E C52E1872 0054968A 9ACF741E DC2E9B05 DD9BCF5C 3EC52E2C
2EEED99B 1DDD9BCF 843EC52E CF8806DD 2E9B0098 E9037700 54968A9A CF7C1EDC
9B185DDD 9BCF843E C52ECF94 06DD2E9B 1DDD9BCF 903EC52E 1855DD9B CF903EC5
903EC52E CFA40EDC 2E9B9046 DD9B085D DD9BCF84 3EC52ECF 9C0EDC2E 9B9046DD
DD9B105D DD9BCF84 3EC52ECF AC06DC2E 9BCF9C0E DC2E9B90 46DD9B08 5DDD9BCF
5DDD9BCF 903EC52E F9A2A6DC 9BCF4C06 DD2E9BF9 A29EDD9B CF4C0EDC 2E9B9046
DD9B1B74 003D80CE E23EC52E A85EDD9B A876DC9B CEEC06DD 2E9B0034 C6CC9A10
C70A7D01 D27E830C C4830054 4A8A9ACF B436FF2E CFB636FF 2E005496 8F9AA846
0A7E00FF D07E8100 01D046C7 0000D446 C70A7D01 D07E8300 01D246C7 0000D646
2E9BF9A2 9EDD9B02 C4830054 969D9A50 D6462BD2 468B00FF D046C700 00D446C7
B05ED99B 02C48300 54969D9A 50D4462B D0468BB4 5ED99BF9 A2B6DC9B CEDA06DD
C7B85ED9 9B02C483 0054969D 9A50D646 2BD2468B 0FFFD246 C7057E0F FFD27E81
B846D99B 1F16FD03 03E7C1FE 7E8B00AB E9037C11 FE7E83FE 46FF03EB 0000FE46
08C48300 5496EF9A 0054968F 9AF9A286 DC9BD646 DF9BF9A2 9EDD9BFC 708DDC9B
8B2F7E08 023DFBA8 858B1F16 FD03E7D1 FE7E8BFB A885891F 16FD03E7 D1FE7E8B
7E8B08C4 830034CB 349AFAA2 B6FFFAA4 B6FF016A FBA8B5FF 1F16FD03 E7D1FE7E
A4B6FF00 6AFBA8B5 FF1F16FD 03E7D1FE 7E8BFF78 E9FAE085 891F16FD 03E7D1FE
AA868BFF 49E9FAE0 85891F16 FD03E7D1 FE7E8B08 C4830034 CB349AFA A2B6FFFA
8BF9A29E DD9B02C4 83005496 9D9A50D6 462BD246 8BEC5689 EA4689FA AC968BFA
06DD2E9B FAD09ED9 9BF9A2B6 DC9BA84E DC9B02C4 83005496 9D9A50D4 462BD046
46DF9BF9 A29EDD9B F99A8EDC 9BFAD0B6 D89BE8D9 9BF99A9E DD9BD066 DE9BCEAE
5689D846 89FADE96 89FADC86 8908C483 00549725 9A005496 8F9AF9A2 86DC9BD2
563B99D2 468B0000 DA46C70F FFD846C7 0A760FFF D87E8111 7C097F00 DA7E83DA
B99A5052 D11BC32B DA568BD8 468BCA8B D88B99D2 468B3B73 D8463B40 7F077CDA
9BF9A2B6 DC9B02C4 83005496 9D9A50D0 462B00FF B8F9A29E DD9B04C4 83005496
C4830054 969D9A50 D0462B00 FFB8CC5E D99BCFB8 36DC2E9B E8D99B68 EBCC5ED9
259A0054 968F9ACF C006DC2E 9BF9A286 DC9BD246 DF9BF9A2 9EDD9BCC 76D89B02
FFD87E81 117C097F 00DA7E83 DA5689D8 4689FADE 9689FADC 868908C4 83005497
DF9BE856 89E64689 EC568BEA 4603E0D1 D8468B00 00DA46C7 0FFFD846 C70A760F
8304EBF0 5689EE46 89EC568B EA4603E0 D1D2468B C85ED99B CFC006DC 2E9BD046
9EDC9BC8 46D99BF9 A29EDD9B CFC806DF 2E9B7777 E6463BF0 568BEE46 8B02EE46
968F9AC4 46D99BC4 5ED99BCF C806DF2E 9B06EBC8 46D99B06 73005496 8A9AF9A2
3EF72E99 FAAA862B EE468B21 7502127E 830589EE 7EC508C4 83005496 EF9A0054
D99BC846 D89BCC46 D99B1DD9 9BC446D9 9BFA989E 8EFA96BE 0302E7C1 F88BCFCA
E85689E6 46892000 05EC568B EA468BF0 5689EE46 89E8568B E6468BFF 7AE9C85E
468B02EE 468304EB F05689EE 4689EC56 8BEA468B EC5689EA 4689F056 8BEE468B
F72E99FA AA862BEE 468BE475 02127E83 00FF05C7 EE7EC532 73E6463B F0568BEE
8BFAAA86 8BBFEB1D D99BCFC8 06DF2E9B FA989E8E FA96BE03 02E7C1F8 8BCFCA3E
D1FE7E8B 00E1E903 7C11FE7E 83FE46FF 03EB0000 FE46C7EC 5689EA46 89FAAC96
16FD0303 E7C1FE7E 8BF05689 EE4689EC 568BEA46 03E0D1FB A8858B1F 16FD03E7
D99B0054 968F9AA8 46DD9B00 54968F9A 9846DD9B 006ABC5E D99BFC70 85DD9B1F
F9A29EDD 9BB04ED8 9BC046D9 9BC05ED9 9B1AC483 0034C2EF 9A005496 8F9ABC46
9A9EDD9B B04ED89B C046D99B 18730054 968A9AD0 5EDE9BF9 A286DC9B D446DF9B
8F9ACFC0 06DC2E9B C446D99B C45ED99B D046DF9B 04EBF99A 86DC9BD4 46DF9BF9
FAAA862B EE468BFF 37E90374 02127E83 0589EE7E C508C483 005496EF 9A005496
AA868BFF 13E91DD9 9BC446D9 9BFA989E 8EFA96BE 0302E7C1 F88BCFCA 3EF72E99
968A9AA8 5EDC9B05 DD9BCFCC 3EC52E3A 7502E47E 83EC5689 EA4689FA AC968BFA
DD2E9B0E EB1DD99B CFD03EC5 2EEED99B 1DDD9BCF CC3EC52E A846DD9B 19740054
7C10FE7E 83FE46FF 03EB0000 FE46C705 40E9E446 8B1DD99B CFD03EC5 2ECEDA06
C5F05689 EE4689EC 568BEA46 03E0D1FB A8858B1F 16FD03E7 D1FE7E8B 053DE903
FBA8858B 1F16FD03 E7D147FE 7E8B0716 F503E6D1 FE768BCC 5ED99B05 DF9BEE7E
4689EC56 8BEA4603 E0D1FBA8 858B1F16 FD03E7D1 47FE7E8B F24689FB A8842B26
EBB85ED9 9BEED99B 097500F2 7E83C85E D99BCC66 D89B05DF 9BE67EC5 E85689E6
E7D1FE7E 8BCC5ED9 9BCC46D8 9BCFC006 DD2E9BB8 5ED99BF2 76DE9BC8 46D99B0C
7E8B02EE 468304EB F05689EE 4689EC56 8BEA4603 4040E0D1 FBA8858B 1F16FD03
B846D99B FF1CE903 73EE463B EC568BEA 4603E0D1 FBA8858B 1F16FD03 E7D147FE
7E830589 EE7EC508 C4830054 96EF9A00 54968F9A CC46D99B CC5ED99B CC46D89B

D99BFA98 9E8EFA96 BE0302E7 C1F88BCF CA3EF72E 99FAAA86 2BEE468B B6750212
9B05DF9B EE7EC5F0 5689EE46 89EC568B EA4603E0 D1FBA886 8B93EB1D D99BCC46
E85689E6 4689EC56 8BEA4603 E0D1FBAA 868BF246 89FBA886 2BFBAA86 8BCC5ED9
46D99B0C EBB85ED9 9BEED99B 097500F2 7E83C85E D99BCC66 D89B05DF 9BE67EC5
034040E0 D1FBA886 8BCC5ED9 9BCC46D8 9BCFC006 DD2E9BB8 5ED99BF2 76DE9BC8
EE463BEC 568BEA46 03E0D1FB AA868B02 EE468304 EBF05689 EE4689EC 568BEA46
C508C483 005496EF 9A005496 8F9ACC46 D99BCC5E D99BCC46 D89BB846 D99B4B72
FA96BE03 02E7C1F8 8BCFCA3E F72E99FA AA862BEE 468BC375 02127E83 0589EE7E
0054968A 9ACFD41E DC2E9B05 D99BCFD0 3EC52EA0 EB1DD99B CC46D99B FA989E8E
9B005496 8F9A9846 DD9B3F7F 0FFFFE7E 81FE46FF 03EB0000 FE46C701 AEE90374
8B18C483 0034C2EF 9A005496 8F9ACEB6 36DC2E9B FE46DF9B 0054968F 9AA846DD
EA460340 40E0D1FB AA868BB7 EB1DD99B CFD21E8E 2ECFD03E 032E02E7 C147FE7E
E0D1FBC8 868BFE46 FF02EE46 8307EBFE 468940FB AA868BF0 5689EE46 89EC568B
DC2E9B02 C4830054 969D9A50 D6462BFE 468B0293 E90373EE 463BEC56 8BEA4603
032E02E7 C147FC7E 8BFC4689 08C48300 5496EF9A 0054968F 9AB44ED8 9BCEB60E
D446DF9B F9A29EDD 9BB04ED8 9BC046D9 9BC05ED9 9B05D99B CFD21E8E 2ECFD03E
08C48300 5496EF9A 0054968F 9ACFC006 DC2E9BC4 46D99BC4 5ED99BF9 A286DC9B
02E7C1F8 8BCFCA3E F72E99FA AA862BEE 468BFF65 E9037402 127E8305 89EE7EC5
C14EF08B CFCA3EF7 2E99FAAA 862BEE46 8B1DD99B C446D99B FA989E8E FA96BE03
FA96BE03 02E7C1F8 8BCFCA3E F72E99FA AA862BEE 468BFA98 868EFA96 B60302E6
3EF72E99 FAAA862B EE468BFE FEE90372 0054968A 9A1CD826 9B05D99B FA989E8E
CFCA3EF7 2E99FAAA 862BEE46 8B05D99B FA989E8E FA96BE03 02E7C14F F88BCFCA
568BEA46 034040E0 D1FBAA86 8BFEC0E9 1DD99BFA 989E8EFA 96BE0302 E7C1F88B
4603E0D1 FBC8868B FE46FF02 EE468307 EBFE4689 40FBAA86 8BF05689 EE4689EC
B60EDC2E 9B02C483 0054969D 9A50D646 2BFE468B 0135E903 73EE463B EC568BEA
D03E032E 02E7C147 FC7E8BFC 468908C4 83005496 EF9A0054 968F9AB4 4ED89BCE
DC9BD446 DF9BF9A2 9EDD9BB0 4ED89BC0 46D99BC0 5ED99B05 D99BCFD2 1E8E2ECF
7EC508C4 83005496 EF9A0054 968F9ACF C006DC2E 9BC446D9 9BC45ED9 9BF9A286
BE0302E7 C1F88BCF CA3EF72E 99FAAA86 2BEE468B FF65E903 7402127E 830589EE
02E6C14E F08BCFCA 3EF72E99 FAAA862B EE468B1D D99BC446 D99BFA98 9E8EFA96
9E8EFA96 BE0302E7 C1F88BCF CA3EF72E 99FAAA86 2BEE468B FA98868E FA96B603
CFCA3EF7 2E99FAAA 862BEE46 8BFEFEE9 03720054 968A9A1C D8269B05 D99BFA98
F88BCFCA 3EF72E99 FAAA862B EE468B05 D99BFA98 9E8EFA96 BE0302E7 C14FF88B
E6E90375 00023DFA B8E90375 00013DFE C0E91DD9 9BFA989E 8EFA96BE 0302E7C1
CC5ED99B 05DF9BFA AC9E8EFA AABE03E7 D1FBA8BE 8B047AE9 037F00FB A8BE83FB
C5E85689 E64689FA AC968BFA AA8603E0 D1FBAA86 8BF24689 FBA8862B FBAA868B
5ED99BE8 D99BB85E D99BEED9 9B077500 F27E83C8 5ED99BCC 66D89B05 DF9BE67E
F9A2A6DC 9BCC46D9 9BF9A29E DD9BFBA8 8EDE9BB8 46D99BF9 9A9EDD9B EED99BB8
AA8603E0 D1FA1A86 8BFA1A86 8948D646 8B00A1E9 03770054 968A9AF9 9A9EDC9B
9BB846D9 9B03CAE9 037D00FA 1ABE83FA 1A8EFF04 EBF05689 EE4689FA AC968BFA
9B077300 54968A9A F9A29EDC 9BCC46D9 9BF9A29E DD9BEED9 9BCC5ED9 9BCC6ED8
BE0302E7 C1F88BCF CA3EF72E 99FAAA86 2BEE468B 21750212 7E83CC5E D99BEED9
5496EF9A 0054968F 9ACFC006 DC2E9BCC 46D99B1D D99BCC46 D99BFA98 9E8EFA96
9B457E01 D67E83FA 269ED99B B846D99B FF7DE902 EE6E8305 89EE7EC5 08C48300
FA268ED8 9BCFCA06 DF2E9BF9 9A9EDD9B F992A6DC 9BD646DF 9BF9929E DD9BE8D9
9ED99BF9 9AB6DC9B F9A2A6DC 9BD676DE 9BD44EDE 9BCFCA06 DF2E9BF9 A29EDD9B
F992A6DC 9BD646DF 9BF9929E DD9BE8D9 9BFA2E9E D99BCFDC 06DD2E9B 0BEBFA2E
D99BF9A2 86DC9BFA 2686D99B F9A29EDD 9BF99A8E DC9BFA2E 86D99BF9 9A9EDD9B
46D99B00 01FA1C86 C70133E9 03770054 968A9AFA 329ED89B FA2A86D9 9BFA2A9E
89EE4689 FAAC968B FAAA8603 E0D1FA1A 868BFA1A 868948D6 468BFA1E 9ED99BCC
02C48300 54969D9A 5048FA1C 868B0273 E9037D00 FA1ABE83 FA1A8EFF 04EBF056
2686D99B F9A29EDD 9BF9928E DC9BFA2E 86D99BF9 9A9EDD9B EED99BF9 929EDD9B
02C48300 54969D9A 5048FA1C 868B2E76 0054968A 9AF99A9E DC9BF9A2 86DC9BFA
03EBF98A 86DC9BFA 2686D99B F98A9EDD 9BF9828E DC9BFA2E 86D99BF9 829EDD9B
9AF9A29E DC9BFA22 A6D89BFA 1E86D99B F9A29EDD 9BEED99B FA229ED9 9BEED99B
22750212 7E83FA1E 9ED99BEE D99B03EB FA22A6D8 9BFA1E86 D99B0C76 0054968A
9BFA1E86 D99BFA98 9E8EFA96 BE0302E7 C1F88BCF CA3EF72E 99FAAA86 2BEE468B
FF0589EE 7EC508C4 83005496 EF9A0054 968F9ACF C006DC2E 9BFA1E86 D99B1DD9
9A9EDD9B FA3286D8 9BFA2686 D99BF992 9EDD9BE8 D99BFEFA E902EE6E 83FA1C86
D99BF9A2 9EDD9BF9 92A6DC9B F99AB6DC 9B02C483 0054969D 9A50E0D1 D4468BF9
1E9ED99B CC46D99B 0001FA1C 86C7FA2E 9ED99BF9 A2B6DC9B FA26A6D8 9BFA3286
FF04EBF0 5689EE46 89FAAC96 8BFAAA86 03E0D1FA 1A868BFA 1A868948 D6468BFA
F9929EDD 9B02C483 0054969D 9A5048FA 1C868B00 F8E9037D 00FA1ABE 83FA1A8E
A286DC9B FA2686D9 9BF9A29E DD9BF992 8EDC9BFA 2E86D99B F99A9EDD 9BEED99B
F9829EDD 9B02C483 0054969D 9A5048FA 1C868B2E 76005496 8A9AF99A 9EDC9BF9
D99BEED9 9B03EBF9 8A86DC9B FA2686D9 9BF98A9E DD9BF982 8EDC9BFA 2E86D99B
76005496 8A9AF9A2 9EDC9BFA 22A6D89B FA1E86D9 9BF9A29E DD9BEED9 9BFA229E
862BEE46 8B227502 127E83FA 1E9ED99B EED99B03 EBFA22A6 D89BFA1E 86D99B0C
86D99B1D D99BFA1E 86D99BFA 989E8EFA 96BE0302 E7C1F88B CFCA3EF7 2E99FAAA

6E83FA1C 86FF0589 EE7EC508 C4830054 96EF9A00 54968F9A CFC006DC 2E9BFA1E
8E8689FA 94968BFA A09689FA 92868BFA 9E8689FA A8968BFA A6868BFE FAE902EE
8EFAA2BE 03E7D1FE 7E8B6D7D 1000FE7E 81FE46FF 03EB0000 FE46C7FA 909689FA
86890FFF B803EB05 8BFAA49E 8EFAA2BE 03E7D1FE 7E8B117D 0FFF3D05 8BFAA49E
127E8305 8902FA9E 8683FA9E BEC5058B FAAC9E8E FAAABE03 E7D1FA8A BE8BFA8A
D99B04FA 8E8683FA 8EBEC505 D99BFA98 9E8EFA96 BE0302E7 C1FA8ABE 8BA97502
C52E0309 E9037400 3D83CFE8 3EC52E03 16E90375 004005F7 CFE43EC5 2E89EB1D
968BFAA6 868B04C4 8300544A 8A9ACFEC 36FF2ECF EE36FF2E 1274003D 80CEE23E
DF9B0163 E9037DFA CE863BFE 468BFE4E FF03EB0F FEFE46C7 EC5689EA 4689FAA8
FAC69ED9 9BF9A286 DC9BFABA 86D99BF9 A29EDD9B FABEB6D8 9BFACAA6 D89BFE46
FAB8A6DE 9BFAC686 D99BFAB8 868908C4 83005496 EF9A0054 968F9AFA C686D99B
8BEC5E8E EA7E0347 47E7D1FA B8BE8BEC 468EEA76 03E6D1FA B8B68BFA C29ED99B
BE8BCF1C 068E2ECF 1A36032E 02E6C1FA 768B5275 02127E83 FAB68689 042B2605
2ECF1A36 032E02E6 C1FA768B F9A29ED9 9B05D99B 025C8E26 3C032602 E7C1FAB8
FAB29ED9 9BF9A2A6 D89B05D9 9B025C8E 263C0326 02E7C147 FAB8BE8B CF1C068E
06DC2E9B FAB68EDE 9BFAC286 D99BF9A8 8689058B EC5E8EEA 7E03E7D1 FAB8BE8B
0589EC5E 8EEA7E03 E7D1FE7E 8BF9A886 0308C483 005496EF 9A005496 8F9ACFC0
032E02E6 C1FA768B F9A29EDD 9BFAB28E D89BFAC2 86D99BFE E6E90374 02127E83
768BF9A2 86DC9B05 D99B025C 8E263C03 2602E7C1 FAB8BE8B CF1C068E 2ECF1A36
8EE91DD9 9B025C8E 263C0326 02E7C1FE 7E8BCF1C 068E2ECF 1A36032E 02E6C1FA
C636DC2E 9BFE46DF 9B0150E9 037D00FE 7E83FE4E FF03EBFE 468948FA CE868BFE
C686D99B FAB88689 08C48300 5496EF9A 0054968F 9AFAC686 D99BFAC6 9ED99BCE
034747E7 D1FAB8BE 8BEC468E EA7603E6 D1FAB8B6 8BFAC29E D99BFAB8 A6DE9BFA
2ECF1A36 032E02E6 C1FA768B 52750212 7E83FAB6 8689042B 26058BEC 5E8EEA7E
02E6C1FA 768BF9A2 9ED99B05 D99B025C 8E263C03 2602E7C1 FAB8BE8B CF1C068E
A2A6D89B 05D99B02 5C8E263C 032602E7 C147FAB8 BE8BCF1C 068E2ECF 1A36032E
8EDE9BFA C286D99B F9A88689 058BEC5E 8EEA7E03 E7D1FAB8 BE8BFAB2 9ED99BF9
7E03E7D1 FE7E8BF9 A8860308 C4830054 96EF9A00 54968F9A CFC006DC 2E9BFAB6
768BF9A2 9EDD9BFA B28ED89B FAC286D9 9BFEFCE9 03740212 7E830589 EC5E8EEA
9B05D99B 025C8E26 3C032602 E7C1FAB8 BE8BCF1C 068E2ECF 1A36032E 02E6C1FA
5C8E263C 032602E7 C1FE7E8B CF1C068E 2ECF1A36 032E02E6 C1FA768B F9A286DC
3E032EF8 8B01A0FA 4669E6ED E9037402 127E8309 7401127E 83FEA4E9 1DD99B02
D99BCFF2 1E8E2ECF F03E032E F88B01A0 FA466915 D99BEED9 9BCFF61E 8E2ECFF4
A0FA4669 5055D99B CEAE06DD 2E9BCFF6 1E8E2ECF F43E032E F88B01A0 FA46691D
2EF88B01 A0FA4669 577800FA DABE8350 5DD99BCF F21E8E2E CFF03E03 2EF88B01
B6FFFAA4 B6FF006A FAD8B6FF FADAB6FF 045DD99B EED99BCF F21E8E2E CFF03E03
2EF88B01 A0FA4669 FAD48ED8 9B02C483 0054969D 9A500AC4 830034CB 349AFAA2
3E032EF8 8B01A0FA 466905DF 9BFAAABE C54EEB04 5DD99BCF F61E8E2E CFF43E03
5008C483 0034CB34 9AFAA2B6 FFFAA4B6 FF006A00 6A045DD9 9BCFF21E 8E2ECFF0
DEBE8304 5DD99BCF F61E8E2E CFF43E03 2EF88B01 A0FA4669 02C48300 54969D9A
9BCFF21E 8E2ECFF0 3E032EF8 8B01A0FA 46695A77 0FFFFADC BE81627F 0A7C00FA
0034CB34 9AFAA2B6 FFFAA4B6 FF016AFA DCB6FFFA DEB6FF4C 5DD99BCE AE06DD2E
1E8E2ECF F43E032E F88B01A0 FA4669FA D48ED89B 02C48300 54969D9A 500AC483
1E8E2ECF F03E032E F88B01A0 FA46691F FE85DF9B FAAABEC5 5FEB4C5D D99BCFF6
54969D9A 5008C483 0034CB34 9AFAA2B6 FFFAA4B6 FF016A0F FF684C5D D99BCFF2
DC9BB846 D99BCFF6 1E8E2ECF F43E032E F88B01A0 FA4669F9 A29EDD9B 02C48300
03E7D1FE 7E8B00A4 E9037C11 FE7E83FE 46FF03EB 0000FE46 C74C5DD9 9BF9A28E
F43E032E F88B01A0 FA466902 E6C14646 FE768BFA D48ED89B FAE085DF 9B1F16FD
006ABC5E D99BFC70 85DD9B1F 16FD0303 E7C1FE7E 8B1DD99B FE03CFF6 1E8E2ECF
0034C2EF 9A005496 8F9ABC46 D99B0054 968F9AA8 46DD9B00 54968F9A 9846DD9B
A0FA4669 02E6C146 46FE768B F9A29EDD 9BB04ED8 9BC046D9 9BC05ED9 9B1AC483
C52EFF50 E91DD99B F9A286DC 9BD446DF 9BFE03CF F21E8E2E CFF03E03 2EF88B01
03EB0001 FE46C700 DEE90374 003D83CF E83EC52E 00EBE903 75004005 F7CFE43E
8E2ECFF4 3E032EF8 8B01A0FA 466902E6 C1FE768B 00CBE903 7E13FE7E 83FE46FF
6902E6C1 FE768B40 77005496 8A9AFABA 9ED89BFA D4B6D89B 05D99BFE 03CFF61E
E6C1FE76 8BCEC60E DC2E9B05 D99BFE03 CFF61E8E 2ECFF43E 032EF88B 01A0FA46
6902E6C1 FE768B87 EB1DD99B FE03CFF6 1E8E2ECF F43E032E F88B01A0 FA466902
9BFABAA6 D89BFAD4 B6D89B05 D99BFE03 CFF61E8E 2ECFF43E 032EF88B 01A0FA46
CFF43E03 2EF88B01 A0FA4669 02E6C1FE 768BF9A2 9EDD9BFA CA86D89B FABEB6D8
46FF03EB 0001FE46 C7FF29E9 1DD99BF9 A28EDC9B FAD486D9 9BFE03CF F61E8E2E
03CFF606 8E2ECFF4 1E032ED8 8B01A0FA 466902E7 C14FFE7E 8B417D15 FE7E83FE
D8269B05 D99BFE03 CFF61E8E 2ECFF43E 032EF88B 01A0FA46 6902E6C1 FE768BDF
02E7C14F FE7E8BF9 9A9EDD9B CEB636DC 2E9BCEAE 06DD2E9B B6740054 968A9A1F
F88B01A0 FA466902 E6C1FE76 8BDF03CF F6068E2E CFF41E03 2ED88B01 A0FA4669
6902E6C1 4EFE768B F9A29EDD 9B27D826 9B05D99B FE03CFF6 1E8E2ECF F43E032E
2EF88B01 A0FA4669 02E6C1FE 768BDE03 CFF2068E 2ECFF01E 032ED88B 01A0FA46
C1FA7E8B F99A8EDC 9BF9A2B6 DC9B27D8 269B05D9 9BFE03CF F21E8E2E CFF03E03
2E02E7C1 FA7E8B2A 74003D80 CEE23EC5 2E1DD99B CFFA1E8E 2ECFF83E 032E02E7
00544A8A 9ACFFC36 FF2ECFFE 36FF2E00 54968F9A 05D99BCF FA1E8E2E CFF83E03

FF2ECFFA 36FF2E04 C4830054 9BD59A50 001205CF 58068B2E CF5A36FF 2E0CC483
7E8304C4 830054DC 759AFAAE B6FFFAB0 B6FFE215 E904C483 002CEE83 9ACFF836
3EC52EEE D99B0B75 00127E83 04C48300 54DC759A FA9AB6FF FA9CB6FF 10750212
C4830054 EB729AD0 0036FF2E D00236FF 2E127400 3D80CEE2 3EC52E1D DD9BCFCC
E856DD9B E056DD9B EED99B00 0028C857 56CB5E5F C99BC02B 000005C7 167EC504
830054D1 809A0054 968F9A0A 46DD9B00 54968F9A 1246DD9B F85EDD9B F056DD9B
CF5C3EC5 2E157200 54968A9A CF741EDC 2E9B05DD 9BCF5C3E C52E0A5E DD9B10C4
0A46DD9B D85EDD9B 05DD9BCF 5C3EC52E 25760054 968A9ACF 7C1EDC2E 9B05DD9B
DC2E9B05 DD9BCF60 3EC52EF8 5EDD9BD8 4EDC9B08 C4830034 C5CE9A00 54968F9A
2E2E7600 54968A9A CF7C1EDC 2E9B05DD 9BCF603E C52E1572 0054968A 9ACF741E
C5379A00 54968F9A 0A46DD9B 0054968F 9A1A46DD 9BD85EDD 9B05DD9B CF603EC5
0054968A 9ACF741E DC2E9B05 DD9BCF64 3EC52EF0 5EDD9BD8 4EDC9B10 C4830034
9B05DD9B CF643EC5 2E257600 54968A9A CF7C1EDC 2E9B05DD 9BCF643E C52E1572
683EC52E E85EDD9B D84EDC9B 08C48300 34C50D9A 0054968F 9A0A46DD 9BD85EDD
9ACF7C1E DC2E9B05 DD9BCF68 3EC52E15 72005496 8A9ACF74 1EDC2E9B 05DD9BCF
0034C484 9A005496 8F9A0A46 DD9BD85E DD9B05DD 9BCF683E C52E2576 0054968A
9BE046DC 9BE846DC 9BF046DC 9BF846DC 9B0A46DD 9BE05EDD 9BD84EDC 9B08C483
1EDC2E9B 0A46DD9B 0A5EDD9B 0A66DC9B CEDA06DD 2E9B0000 20C85756 CB5E5FC9
66DC9BCE DA06DD2E 9BE05EDD 9B0A4EDC 9BD00C06 DD2E9B5C 73005496 8A9AD004
4EDC9BF0 4EDC9BD0 1406DD2E 9BF05EDD 9BCFC026 DC2E9B0A 46DD9BF8 5EDD9BE0
9BE85EDD 9BE076DC 9BF84EDC 9BF84EDC 9B0A46DD 9BE05EDD 9BCF3806 DC2E9BF0
0A4EDC9B 0A66DC9B CEDA06DD 2E9BEC8B 555756CB 5E5FC99B EED99B03 EBE846DD
DD2E9B00 0028C857 56CB5E5F C99B0A4E DC9B0A4E DC9BD01C 06DD2E9B 0A5EDD9B
0EDC2E9B 0A46DD9B 6E760054 968A9A0A 5EDC9BCF 4C36DC2E 9B124EDC 9BD00406
DC9BCEDA 06DD2E9B D85EDD9B E04EDC9B D00C06DD 2E9BE05E DD9B1276 DC9BCF4C
DC9BF04E DC9BD014 06DD2E9B F05EDD9B CFC026DC 2E9BE046 DD9BF85E DD9BD866
E85EDD9B D876DC9B F84EDC9B F84EDC9B E046DD9B D85EDD9B CF3806DC 2E9BF04E
7E8BEE46 FF03EB00 00EE46C7 00002AC8 5756CB5E 5FC99BEE D99B03EB E846DD9B
8BEE4EFF DF770054 968A9A1D DC9B0A46 DD9BCF86 1E8E2ECF 843E032E 03E7C1EE
03E7C1EE 7E8BF85E DD9B25DC 9B0A46DD 9BCF861E 8E2ECF84 3E032E03 E7C1EE7E
3E032E03 E7C1EE7E 8BD65EDD 9B0DDC9B D03006DD 2E9BD02E 1E8E2ED0 2C3E032E
7E8BD02A 068E2ED0 2836032E 03E6C1EE 768BDE5E DD9B05DD 9BCF921E 8E2ECF90
DD9BD676 DC9BF84E DC9B24DC 269B05DD 9BD02A1E 8E2ED028 3E032E03 E7C147EE
1E8E2ED0 283E032E 03E7C1EE 7E8BD026 068E2ED0 2436032E 03E6C1EE 768BE65E
9BDE46DC 9BF84EDC 9B04DC26 9BF84EDC 9BE646DC 9BCEEC36 DC2E9B05 DD9BD02A
46FF03EB 00009E46 C700049A 46C70000 76C85756 CB5E5FC9 9BF046DD 9BF05EDD
9E7E8BCF 86068E2E CF843603 2E03E6C1 9E768B01 0AE9037F 9E463B48 9A468B9E
D02C3E03 2E03E7C1 9E7E8B24 DC269B05 DD9BCF86 1E8E2ECF 843E032E 03E7C147
7C1EDC2E 9B05DD9B D02E1E8E 2ED02C3E 032E03E7 C19E7E8B 1DDD9BD0 2E1E8E2E
9A468B9C 46FF03EB 9C468940 9E468B8D 7E9E463B 489A468B 96730054 968A9ACF
03E7C19C 7E8B05DD 9BCF861E 8E2ECF84 3E032E03 E7C1479C 7E8B507E 9C463B48
DD9BCF92 1E8E2ECF 903E032E 03E7C147 9C7E8B1D DD9BCF86 1E8E2ECF 843E032E
2E03E6C1 9E768B9A 4EFFA4EB 1DDD9BCF 921E8E2E CF903E03 2E03E7C1 9C7E8B05
DC269B05 DD9BCF86 1E8E2ECF 843E032E 03E7C147 9E7E8BCF 86068E2E CF843603
2C3EC52E D02C36C4 2EFF31E9 1DDD9BD0 2E1E8E2E D02C3E03 2E03E7C1 9E7E8B24
9E468B9E 46FF03EB 00029E46 C7C85EDD 9BCEEC0E DC2E9B08 44DC269B 05DD9BD0
5EDD9BC0 45DD9B1F 16FD0303 E7C19C7E 8B9C4689 489E468B 008AE903 7C9A463B
2E1E8E2E D02C3E03 2E03E7C1 9C7E8BD0 2E068E2E D02C3603 2E03E6C1 9C768B8A
D02E068E 2ED02C36 032E03E6 C19E768B 925EDD9B 8A76DC9B 0CDC269B 05DD9BD0
66DC9BCE EC0EDC2E 9B04DC26 9B05DD9B D02E1E8E 2ED02C3E 032E03E7 C19C7E8B
3B9E468B 9E46FF03 EB00019E 46C7FF68 E9C05DDD 9B1F16FD 0303E7C1 9E7E8B92
4E9E768B 925EDD9B 05DD9BD0 2E1E8E2E D02C3E03 2E03E7C1 4F9E7E8B 547D9A46
05DD9BCF 921E8E2E CF903E03 2E03E7C1 9E7E8BCF 92068E2E CF903603 2E03E6C1
FF03EB00 019E46C7 A1EBE05D DD9B1F16 FD0303E7 C19E7E8B 9276DC9B 24DC269B
9B1F16FD 0303E7C1 479E7E8B 0716F503 03E6C19E 768B347D 9A463B9E 468B9E46
46C7C1EB A05DDD9B 1F16FD03 03E7C19E 7E8BD030 0EDC2E9B E064DC26 9BE045DD
9BC045DD 9B1F16FD 0303E7C1 9E7E8B4D 7E9E463B 489A468B 9E46FF03 EB00019E
05DD9BD0 2E1E8E2E D02C3E03 2E03E7C1 9E7E8B07 16F50303 E6C19E76 8B925EDD
7E8BA7EB A05DDD9B A06DDC9B 1F16FD03 03E7C147 9E7E8B92 76DC9BA0 4CDC269B
9A768B1D DD9BD028 3EC52E15 DD9BEED9 9BD02A1E 8E2ED028 3E032E03 E7C14F9A
7E8BC074 DC269BA0 45DD9B1F 16FD0303 E7C14F4F 9A7E8B07 16F50303 E6C14E4E
4EFF03EB 9E468900 032D9A46 8B1DDD9B D02A1E8E 2ED0283E 032E03E7 C14F4F9A
032E03E7 C19E7E8B D02A068E 2ED02836 032E03E6 C1469E76 8B627E00 9E7E839E
9E7E8B07 16F50303 E6C19E76 8B925EDD 9B0CDC26 9B05DD9B D02E1E8E 2ED02C3E
2ED0283E 032E03E7 C19E7E8B C074DC26 9B9266DC 9BA045DD 9B1F16FD 0303E7C1
8B0090E9 037F9E46 3B489A46 8B9E46FF 03EB0000 9E46C795 EB1DDD9B D02A1E8E
9BD02A1E 8E2ED028 3E032E03 E7C19E7E 8BD02E06 8E2ED02C 36032E03 E6C19E76
D02E068E 2ED02C36 032E03E6 C19E768B 8A5EDD9B D01C36DC 2E9B0CDC 269B05DD
DD9BD030 36DC2E9B 0CDC269B 05DD9BD0 2A1E8E2E D0283E03 2E03E7C1 479E7E8B

2E03E7C1 9E7E8B8A 66DC9B92 66DC9BE0 45DD9B1F 16FD0303 E7C1479E 7E8B925E
7E0FFF10 7E810000 04C85756 CB5E5FC9 9BFF61E9 1DDD9BD0 261E8E2E D0243E03
FFFE7E81 FE46FF03 EB0000FE 46C73675 000E7E83 FC468910 468B03EB 0FFFB805
5E8E0A7E 03E7D147 FE7E8BE4 7C053BFC 468B0C5E 8E0A7E03 E7D1FE7E 8B257D0F
7E8B257E 00FE7E83 FE4EFF03 EB0FFFFE 46C73575 010E7E83 D17D053B FC468B0C
3BFC468B 0C5E8E0A 7E03E7D1 4FFE7E8B E57F053B FC468B0C 5E8E0A7E 03E7D1FE
DD9BD038 06DF2E9B FC5ED99B 0A46DF9B 000016C8 5756CB5E 5FC9FE46 8BD27E05
C006DC2E 9BCEC636 DC2E9BFC 46D99B22 73005496 8A9AF25E DC9BFC46 D99BF25E
9BCEBE26 DC2E9BCE B606DD2E 9B4EEBFA 468908C4 83005496 EF9A0054 968F9ACF
4EDC9BD0 3A26DC2E 9BCEB606 DD2E9BF2 5EDD9BCE BE26DC2E 9BFC46D9 9BEA5EDD
468908C4 83005496 EF9A0054 968F9ACF C006DC2E 9BD03A06 DC2E9BEA 76DC9BF2
5EDD9BD0 4206DF2E 9BFC5ED9 9B0A46DF 9B000016 C85756CB 5E5FC99B FA468BFA
DC9BFC46 D99BF25E DD9BD044 06DF2E9B 24730054 968A9AF2 5EDC9BFC 46D99BF2
D03A26DC 2E9BCEB6 06DD2E9B 4EEBFA46 8908C483 005496EF 9A005496 8F9AF24E
DC9BCEBE 26DC2E9B CEB606DD 2E9BF25E DD9BD03A 26DC2E9B FC46D99B EA5EDD9B
8908C483 005496EF 9A005496 8F9ACFC0 06DC2E9B CEBE06DC 2E9BEA76 DC9BF24E
83FC46FF 03EB0001 FC46C700 01FE46C7 000004C8 5756CB5E 5FC99BFA 468BFA46
06458B0A 7EC50589 0C5E8E0A 7E03E7D1 FC7E8B05 8B0A7EC5 0105E903 7E02FC7E
890C5E8E 0A7E03E7 D1FC7E8B 0C458B0A 7EC50645 890C5E8E 0A7E03E7 D1FC7E8B
D1FC7E8B 18458B0A 7EC51245 890C5E8E 0A7E03E7 D1FC7E8B 12458B0A 7EC50C45
7EC51E45 890C5E8E 0A7E03E7 D1FC7E8B 1E458B0A 7EC51845 890C5E8E 0A7E03E7
C1FC7E8B 3045DD9B 0A7EC524 5DD99B0C 5E8E0A7E 0302E7C1 FC7E8B24 45D99B0A
9B0C5E8E 0A7E0303 E7C1FC7E 8B4845DD 9B0A7EC5 305DDD9B 0C5E8E0A 7E0303E7
45DD9B0A 7EC5605D DD9B0C5E 8E0A7E03 03E7C1FC 7E8B6045 DD9B0A7E C5485DDD
0303E7C1 FC7E8B00 9085DD9B 0A7EC578 5DDD9B0C 5E8E0A7E 0303E7C1 FC7E8B78
76FF0E76 FF1076FF FE76FF00 6A1276FF 1476FFFE EFE90090 9DDD9B0C 5E8E0A7E
FF2E1274 003D80CE E23EC52E 1C74003D 83127EC5 10C48300 34A1509A 0A76FF0C
FF1076FF 50200005 0E468B10 76FF5756 04C48300 544A8A9A D04636FF 2ED04836
00680E76 FF1076FF 50400005 0E468B10 76FF5756 5E5F0054 DE289A20 00680E76
000040AF FE000000 0000406F E0000000 000000CB 5E5FC99B 5E5F0054 DE289A20
00000000 00000024 0BE40024 001E0024 000C4010 00000000 00004070 00000000
93B20024 008E0003 0024005C 40000000 00000000 00100024 00300014 951F3FF0
7BF80024 02180014 7B960024 020A0024 00BE0024 00B30024 00B00024 009D0014
3FB99999 9999999A 40140000 00000000 00050014 93AE0014 7C3E0014 7DDC0014
00240C94 004C7C64 002400F7 3FC99999 9999999A 3FC04189 374BC6A8 002400E1
47AE147B BF847AE1 47AE147B 00240140 0024010C 00240CAC 00240CA4 00240C9C
00000000 3FF0020C 49BA5E35 00240C14 BF40624D D2F1A9FC 00240BF4 3F847AE1
40300000 00000000 00240176 3FD00000 00000000 BFC99999 9999999A 3FE80000
00000000 00000000 00000000 00240CB4 002401F2 000200FF 3FE00000 00000000
0024019A 00240BE8 00240704 00240224 00240183 00240216 00149374 BFF00000
00000000 400CCCCC CCCCCCCD 40033333 33333333 3FDA8F5C 28F5C28F 002401A7
00000000 00000100 40180000 00000000 00240C74 00240C54 00240C34 40080000
02C85756 CB5E5FC9 000105C7 F8F03EC5 2EEC8B55 57560024 01BB0004 00404050
1E8E2EF8 F43E032E F88B1AFE 466B5E7D 0DFE7E83 FE46FF03 EB0000FE 46C70000
0A45890C 468BF8F6 1E8E2EF8 F43E032E F88B1AFE 466B1675 0A463B0A 458BF8F6
032EF88B 1AFE466B B1750A46 3B0C458B F8F61E8E 2EF8F43E 032EF88B 1AFE466B
9A0000FC 46C70000 04C85756 CB5E5FC9 99EB0C45 890C468B F8F61E8E 2EF8F43E
0375003D 80F8F83E C52E2875 C00B04C4 830034F1 C39A0A76 FF0C76FF 0034EDC5
C52E010D E908C483 00544A8A 9AF8FC36 FF2EF8FE 36FF2E0A 76FF0C76 FF0128E9
F83EC52E 3374000E 7E83FC46 89058BF9 061E8E2E F9043E03 2EE7D13D 8BF9003E
36FF2E50 52F90E16 8B2EF90C 06032E0A 056BF900 3EC52EFC 76FF2974 003D80F8
C52E1C74 000E7E83 00B3E903 7500FC7E 830AC483 00544A8A 9AF90836 FF2EF90A
EB0014FE 46C704C4 8300544A 8A9AF910 36FF2EF9 1236FF2E 1274003D 80F8F83E
013D0001 25FC468B 517400FC 7E83577D 1FFE7E83 FE46FFFC 4689F8D1 FC468B0B
C174003D 80F8F83E C52ECB74 000E7E83 04C48300 34D05C9A FE76FFFF 6ADE7500
9AF91436 FF2EF916 36FF2E50 52F91A16 8B2EF918 06032E64 C76B14EF 83FE7E8B
FF2EF91E 36FF2E12 74003D80 F8F83EC5 2E1C7400 0E7E8398 EB08C483 00544A8A
6A006A01 6A016A00 6A006A00 0008C857 56CB5E5F C904C483 00544A8A 9AF91C36
056A026A 036A006A 006A12C4 830034D7 069A0A76 FFF92036 FF2EF922 36FF2E00
6A036A03 6A146A15 6A12C483 0034D706 9A0A76FF F92436FF 2EF92636 FF2E016A
046A056A 006A006A 12C48300 34D7069A 0A76FFF9 2836FF2E F92A36FF 2E026A02
6A056A16 6A176A12 C4830034 D7069A0A 76FFF92C 36FF2EF9 2E36FF2E 036A076A
066A1B6A 006A12C4 830034D7 069A0A76 FFF93036 FF2EF932 36FF2E04 6A086A05
6A006A00 6A12C483 0034D706 9A0A76FF F93436FF 2EF93636 FF2E056A 096A066A
196A1A6A 12C48300 34D7069A 0A76FFF9 3836FF2E F93A36FF 2E066A0B 6A076A08
6A006A12 C4830034 D7069A0A 76FFF93C 36FF2EF9 3E36FF2E 076A036A 086A086A
1E6A12C4 830034D7 069A0A76 FFF94036 FF2EF942 36FF2E08 6A0C6A09 6A0A6A00
6A12C483 0034D706 9A0A76FF F94436FF 2EF94636 FF2E096A 0D6A0A6A 0A6A1D6A
12C48300 34D7069A 0A76FFF9 4836FF2E F94A36FF 2E0A6A06 6A0B6A0B 6A186A00
C4830034 D7069A0A 76FFF94C 36FF2EF9 4E36FF2E 0B6A0A6A 0C6A0C6A 1C6A006A

```
830034D7 069A0A76 FFF95036 FF2EF952 36FF2E0C 6A0E6A0C 6A006A00 6A006A12
0005C7F9 583EC52E 0129E903 75003D83 F9583EC5 2E000C05 C7F9543E C52E12C4
7E8B04C4 830054DC 339A016A 008D6839 7D0DFE7E 83FE46FF 03EB0000 FE46C700
8E2EF95C 3E032E02 E7C1FE7E 8B025589 0589F95E 1E8E2EF9 5C3E032E 02E7C1FE
729AF960 36FF2EF9 6236FF2E F96436FF 2EF96636 FF2EBEEB 0005C63D C5F95E1E
36FF2E00 A4E90375 003D80F8 F83EC52E 2C75C20B FA5689F8 468908C4 83005499
00FE46C7 0085E908 C4830054 4A8A9AF9 6836FF2E F96A36FF 2EF96C36 FF2EF96E
F95C3E03 2E02E7C1 FE7E8B00 8C68F876 FFFA76FF 757D0DFE 7E83FE46 FF03EB00
8CFC7E81 FC46FF03 EB0000FC 46C70AC4 830054EA AA9A35FF 0275FFF9 5E1E8E2E
0A3D8002 5C8E263C 0326FC7E 8BF95E06 8E2EF95C 36032E02 E6C1FE76 8B1F7D00
EB0005C6 025C8E26 3C0326FC 7E8BF95E 068E2EF9 5C36032E 02E6C1FE 768BD775
F88B1A0A 466B01C8 E9037505 3B0A468B F9543EC5 2E000004 C85756CB 5E5FC982
F8F43603 2EF08B1A 0A466B02 C4830034 D5259A04 75FFF8F6 1E8E2EF8 F43E032E
466B1B74 06443B26 04458BF8 F61E8E2E F8F43E03 2EF88B1A 0A466BF8 F6068E2E
E9037500 0A7E8302 C4830034 D5259A06 75FFF8F6 1E8E2EF8 F43E032E F88B1A0A
1E8E2EF8 F43E032E F88B1A0A 466BF8F6 068E2EF8 F436032E F08B1A0A 466B0160
458BF8F6 1E8E2EF8 F43E032E F88B1A0A 466B0134 E9037406 443B2604 458BF8F6
1A0A466B 2E75000A 7D83F8F6 1E8E2EF8 F43E032E F88B1A0A 466B1674 FFFF3D0A
2EF8F43E 032EF88B 1A0A466B 5574FFFF 3D0C458B F8F61E8E 2EF8F43E 032EF88B
3E032EF8 8B1A0A46 6B00CBE9 0374003D 83F8F03E C52E3F74 000C7D83 F8F61E8E
F8F61E8E 2EF8F43E 032EF88B 1A0A466B 00B2E903 7E000A7D 83F8F61E 8E2EF8F4
6BFC4689 04458BF8 F61E8E2E F8F43E03 2EF88B1A 0A466B00 99E9037E 000C7D83
7E83FE46 FF03EB00 00FE46C7 00000245 C7F8F61E 8E2EF8F4 3E032EF8 8B1A0A46
1AFE466B 16750A46 3B04458B F8F61E8E 2EF8F43E 032EF88B 1AFE466B 5E7D0DFE
1E8E2EF8 F43E032E F88B1AFE 466B0445 89FC468B F8F61E8E 2EF8F43E 032EF88B
064589FC 468BF8F6 1E8E2EF8 F43E032E F88B1AFE 466BB175 0A463B06 458BF8F6
8BF8F616 8B2EF8F4 06032E1A 10466B0C 76FF0E76 FFEC8B55 5756CB5E 5FC999EB
1E8E2EF8 F43E032E F88B1A10 466B08C4 830054EE 309A5000 1005C38B 51CA8BD8
1A10466B 00010245 C7F8F61E 8E2EF8F4 3E032EF8 8B1A1046 6B058912 468BF8F6
1E8E2EF8 F43E032E F88B1A10 466B0445 8914468B F8F61E8E 2EF8F43E 032EF88B
107E8B05 8914468B F9721E8E 2EF9703E 032E02E7 C1107E8B 06458916 468BF8F6
8E2EF8F4 3E032EF8 8B1A1046 6B024589 16468BF9 721E8E2E F9703E03 2E02E7C1
466B0A45 8918468B F8F61E8E 2EF8F43E 032EF88B 1A10466B 00000845 C7F8F61E
2EF9743E 032E02E7 C1107E8B 0C45891A 468BF8F6 1E8E2EF8 F43E032E F88B1A10
83024589 1A468BF9 761E8E2E F9743E03 2E02E7C1 107E8B05 8918468B F9761E8E
5756CB5E 5FC9FFFF 0E45C7F8 F61E8E2E F8F43E03 2EF88B1A 10466B15 75010A7E
8E2EF978 3E032EE7 D1FE7E8B 157D0BFE 7E83FE46 FF03EB00 00FE46C7 000002C8
F9783E03 2EE7D114 EF830A7E 8B000002 C85756CB 5E5FC9E2 EB000005 C7F97A1E
7A1E8E2E F9783E03 2EE7D114 EF830A7E 8B0087E9 03750C46 3B058BF9 7A1E8E2E
34D0D49A F97C36FF 2EF97E36 FF2E016A 02C48300 34D22F9A 006A0589 0C468BF9
8E2EF978 3E032EE7 D1FE7E8B 297D0BFE 7E83FE46 FF03EB00 00FE46C7 06C48300
9A006ACE EB04C483 0034D05C 9A500014 05FE468B FE6AE175 00013D05 8BF97A1E
000002C8 5756CB5E 5FC90034 EAD19A05 74003D80 F8F83EC5 2E02C483 0034D525
2B02EB00 01B80575 000C7E83 58EB058B F8F61E8E 2EF8F43E 032EF88B 1A0A466B
36EB04C4 830034D8 6D9A1A6A FE76FF04 C4830034 D86D9A19 6AFE76FF FE4689C0
FE76FF04 C4830034 D86D9A1D 6AFE76FF FE4689C0 2B02EB00 01B80575 000C7E83
000066C8 5756CB5E 5FC9CA74 00083DA3 7400023D 0AEB04C4 830034D8 6D9A1E6A
34EDC59A 06C48300 5448E69A 0F6AF97C 36FF2EF9 7E36FF2E FE468900 541A489A
00013D05 8B0A7EC5 05890A7E C504C483 0034F13E 9AF97C36 FF2EF97E 36FF2E00
026A509A 468D1608 C4830054 EE309A50 9A468D16 F98036FF 2EF98236 FF2E7375
34F13E9A F98436FF 2EF98636 FF2E4375 00013D0A C4830054 C0489A27 4968016A
7E36FF2E F98836FF 2EF98A36 FF2E0034 F5559A05 7402FE7E 83FE4689 04C48300
5756CB5E 5FC9002C FD479A00 0205C70A 7EC508C4 830054EE 309AF97C 36FF2EF9
D83E9A06 C4830034 D0D49A0A 76FF0C76 FF016A02 C4830034 D22F9A01 6AEC8B55
F8F43EC5 2E0034EA D19A0574 003D80F8 F83EC52E 02C48300 34D5259A 006A0034
FF05C7F9 943EC52E 0589F990 3EC52E05 8BF98C3E C52E0589 F98C3EC5 2E04458B
8BF8F61E 8E2EF8F4 3E032EF8 8B1A046B 26F98C36 C42E0001 05C7F998 3EC52EFF
36FF2E00 B8E90374 003D83F9 983EC52E 000002C8 5756CB5E 5FC90589 0E7EC505
C42E567C 00FE7E83 FE4EFF03 EBFE4689 4804C483 0054EEEA 9AF97C36 FF2EF97E
7C36C42E D9740305 F6F99E1E 8E2EF99C 3E032E47 F88B9804 8A26FE76 03F97C36
03F97C3E C52EBB74 0205F6F9 9E1E8E2E F99C3E03 2E47F88B 98048A26 FE7603F9
FF2E1C74 003D80F8 F83EC52E A1EB0588 FE7E03F9 7C3EC52E FFDF2598 058AFE7E
0A76FF0C 76FF08C4 8300544A 8A9AF9A0 36FF2EF9 A236FF2E F97C36FF 2EF97E36
7500013D 058BF9A4 3EC52E02 7CE908C4 830034DA 5E9AF97C 36FF2EF9 7E36FF2E
2E0F7400 3D83F994 3EC52E01 3BE90374 00023D05 8BF9983E C52E0034 E7189A05
D13D8BF9 943EC52E F08B1A05 6BF9903E C52E0122 E9037400 013D058B F9943EC5
F08B1A05 6BF9903E C52E00BD E9037F00 0A7D83FE 03F8F61E 8E2EF8F4 3E032EE7
3EC52E35 75001C3D 0A458BFE 03F8F61E 8E2EF8F4 3E032EE7 D13D8BF9 943EC52E
8B2EF9AE 36FF2E04 C4830054 4A8A9AF9 A836FF2E F9AA36FF 2E127400 3D80F8F8
F9901EC4 2E000005 C7F9B03E C52E01BF E904C483 00549BD5 9A500012 05F9AC06
```

7EC50A45 8BFE03F8 F61E8E2E F8F43E03 2EE7D13D 8BF9943E C52EF08B 1A076B26
FF2E35FF 0A7EC501 78E90375 003D80F8 F83EC52E 000305C7 F9983EC5 2E05890A
3EC52EF0 8B1A056B F98C3EC5 2E015EE9 06C48300 544A8A9A F9B436FF 2EF9B636
FFF9943E C52E1675 FFFE3D0A 458BFE03 F8F61E8E 2EF8F43E 032EE7D1 3D8BF994
2E0089E9 03740003 3D058BF9 983EC52E 04C48300 34DE359A 35FFF98C 3EC52E35
3B26058B F9903EC5 2EF98C36 C42E0000 05C7F9B0 3EC52E7F 74003D83 F9B03EC5
F61E8E2E F8F43E03 2EE7D13D 8BF9943E C52EF08B 1A076B26 F9901EC4 2E347404
FFFF05C7 F9943EC5 2E00BAE9 000305C7 F9983EC5 2E05890A 7EC50A45 8BFE03F8
058BF8F6 1E8E2EF8 F43E032E F88B1A04 6B26F990 36C42E00 0105C7F9 983EC52E
D69A04C4 830034D9 1A9A35FF F9903EC5 2E35FFF9 943EC52E 0089E905 890A7EC5
F9943EC5 2EF08B1A 076B26F9 901EC42E 000005C7 F9B03EC5 2E3C75C0 0B0034E2
0305C7F9 983EC52E 05890A7E C50A458B FE03F8F6 1E8E2EF8 F43E032E E7D13D8B
F88B1A04 6B26F990 36C42E00 0105C7F9 983EC52E FFFF05C7 F9943EC5 2E2EEB00
F8F03EC5 2E0000CE C85756CB 5E5FC905 890A7EC5 058BF8F6 1E8E2EF8 F43E032E
8BFE03F8 F61E8E2E F8F43E03 2EE7D10C 7E8BF08B 1A0A466B 00C1E903 75003D83
0A458BFE 03F8F61E 8E2EF8F4 3E032EE7 D10C7E8B F08B1A0A 466BFF32 86890445
00142D05 8BFE03F9 761E8E2E F9743E03 2E02E7C1 0A7E8BE6 D10C768B FF348689
C38B51CA 8BD88BF9 1A168B2E F9180603 2E64FF36 866B5AEB FF34868B FF368689
16F9B836 FF2EF9BA 36FF2E50 52F91A16 8B2EF918 06032E64 FF36866B 50001405
830054C0 489A2749 68006A02 6A50FF38 868D1610 C4830054 4ACA9A50 FF38868D
8E2EF8F4 36032EF0 8B1A0A46 6B000134 C85756CB 5E5FC9A1 74FFFE3D 05EB0AC4
E90002B8 06740644 3B260445 8BF8F61E 8E2EF8F4 3E032EF8 8B1A0A46 6BF8F606
032EF88B 1A0A466B 1C7E000A 7D83F8F6 1E8E2EF8 F43E032E F88B1A0A 466B0390
2EF8F43E 032EF88B 1A0A466B 035EE900 02B8067E 000C7D83 F8F61E8E 2EF8F43E
2C74000C 7D83F8F6 1E8E2EF8 F43E032E F88B1A0A 466B167E 000A7D83 F8F61E8E
F43E032E F88B1A0A 466B1C7E 000C7D83 F8F61E8E 2EF8F43E 032EF88B 1A0A466B
1E8E2EF8 F43E032E F88B1A0A 466B0300 E90002B8 0675000A 7D83F8F6 1E8E2EF8
7E000C7D 83F8F61E 8E2EF8F4 3E032EF8 8B1A0A46 6B018EE9 037E000A 7D83F8F6
032E1A0A 466B02B8 E90003B8 0675003D 83F8F03E C52E0A74 000C7E83 0175E903
868D16F9 BC36FF2E F9BE36FF 2E500010 05C38B51 CA8BD88B F8F6168B 2EF8F406
468904C4 830054EE EA9A50FE CC868D16 0001FE46 C70CC483 00544ACA 9A50FECC
2E02E7C1 0A7E8B58 75FFFE3D 0C458BF8 F61E8E2E F8F43E03 2EF88B1A 0A466BFC
F91A168B 2EF91806 032E64FA 466BFA46 8900142D 02458BF9 761E8E2E F9743E03
0CC48300 544ACA9A 50520134 2DFC4603 5A16C58B F9C036FF 2EF9C236 FF2E5052
F61E8E2E F8F43E03 2EF88B1A 0A466BFC 468904C4 830054EE EA9A50FE CC868D16
46890014 2D058BF9 761E8E2E F9743E03 2E02E7C1 0A7E8B46 75FFFE3D 0A458BF8
035A16C5 8BF9C436 FF2EF9C6 36FF2E50 52F91A16 8B2EF918 06032E64 FA466BFA
FC468904 C4830054 EEEA9A50 FECC868D 160CC483 00544ACA 9A505201 342DFC46
8D1608C4 8300544A CA9A5052 01342DFC 46035A16 C58BF9C8 36FF2EF9 CA36FF2E
2EF88B1A 0A466B01 59E90003 B80AC483 0054C048 9A274968 006A026A 50FECC86
F43E032E F88B1A0A 466B013C E9C02B05 75FFFF3D 0C458BF8 F61E8E2E F8F43E03
2EF8F43E 032EF88B 1A0A466B 011EE900 01B80675 FFFF3D0A 458BF8F6 1E8E2EF8
2E00E6E9 0375000C 7E83F846 89C02B02 EB0001B8 0575FFFE 3D0C458B F8F61E8E
FF2E0AEB F9D036FF 2EF9D236 FF2E0C75 01F87E83 00D9E903 75003D83 F8F03EC5
001005C3 8B51CA8B D88BF8F6 168B2EF8 F406032E 1A0A466B F9D436FF 2EF9D636
9A50FECC 868D1610 C4830054 4ACA9A50 FECC868D 16F9CC36 FF2EF9CE 36FF2E50
03F9761E 8E2EF974 3E032E02 E7C10A7E 8BE6D1F8 768BFC46 8904C483 0054EEEA
1405C38B 51CA8BD8 8BF91A16 8B2EF918 06032E64 FA466BFA 46890014 2D058BFE
5A16C58B F9D836FF 2EF9DA36 FF2E5052 F91A168B 2EF91806 032E64FA 466B5000
C0489A27 4968006A 026A50FE CC868D16 10C48300 544ACA9A 50520134 2DFC4603
F83EC52E 0000CCC8 5756CB5E 5FC90001 B803EBC0 2B047501 F87E830A C4830054
068B2EF9 AE36FF2E 04C48300 544A8A9A F9DC36FF 2EF9DE36 FF2E1274 003D80F8
0105C7F9 A43EC52E 00C2E905 8BF9943E C52E04C4 8300549B D59A5000 1205F9AC
F95E1E8E 2EF95C3E 032E02E7 C13D8BF9 903EC52E 01D2E900 01B80034 E8EE9A00
868D160C C4830054 4ACA9A50 FF34868D 16F9E036 FF2EF9E2 36FF2E35 FF0275FF
1A056BF9 8C3EC52E 0186E900 01B80AC4 830054C0 489A277C 68036A01 6A50FF34
3E032EF8 8B1A046B 26F98C36 C42EFE46 8908458B F8F61E8E 2EF8F43E 032EF88B
2E04458B F8F43EC5 2E08EBFE 468B0574 00FE7E83 00000845 C7F8F61E 8E2EF8F4
00023D00 022D0124 E90001B8 0589F990 3EC52E05 8BF98C3E C52E0589 F98C3EC5
F9943EC5 2EF08B1A 056BF990 3EC52EE3 2CE318E3 78E3EBA7 FF2ED88B E0D10F77
0034DF0D 9AFE76FF 016AFE46 8904458B FE03F8F6 1E8E2EF8 F43E032E E7D13D8B
F8F61E8E 2EF8F43E 032EFA8B 1AFE566B 058BF98C 3EC52E00 BCE9FC46 8904C483
89F8F61E 8E2EF8F4 3E032EFA 8B1A146B 26F99036 C42E058B F9943EC5 2E084589
058BF994 3EC52E00 85E90001 B80589F9 903EC52E 0589F98C 3EC52EFE 468B0E45
F9903EC5 2EFE468B 0E4589F8 F61E8E2E F8F43E03 2EFA8B1A 146B26F9 9036C42E
FA8B1A14 6B26F990 36C42E05 8BF9943E C52EFF43 E9000005 C7F9943E C52E0589
89F9943E C52EFC46 8B0589F9 903EC52E FE468B0E 4589F8F6 1E8E2EF8 F43E032E
5FC9E479 E429E4AE E4AEE4F6 A7FF2ED8 8BE0D1FF 04E90376 00033D19 EBC02B05
05C7F994 3EC52EEC 8B555756 CB5E5FC9 000105C7 F9B03EC5 2EEC8B55 5756CB5E

3EC52E00 0105C7F9 943EC52E EC8B5557 56CB5E5F C9000205 C7F9983E C52E0000
5E5FC900 341FB29A 000005C7 F9983EC5 2EEC8B55 5756CB5E 5FC90002 05C7F998
8B555756 CB5E5FC9 000205C7 F9983EC5 2E000205 C7F9943E C52EEC8B 555756CB
943EC52E EC8B5557 56CB5E5F C9000205 C7F9983E C52E0003 05C7F994 3EC52EEC
5FC9058B F9A43EC5 2EEC8B55 5756CB5E 5FC90002 05C7F998 3EC52E00 0405C7F9
000004C8 5756CB5E 5FC90034 E7189A05 74003D83 F9A43EC5 2EEC8B55 5756CB5E
E77D08FC 7E83FC46 FF03EB00 00FC46C7 747D02FE 7E83FE46 FF03EB00 00FE46C7
36FF2EF9 EA36FF2E 5052C703 F9EE168B 2EF9EC06 032E78FE 466BF88B 0FFC466B
83005442 3A9A5052 C703F9E6 168B2EF9 E406032E 78FE466B F88B0FFC 466BF9E8
830034E7 FE9A5052 C703F9EE 168B2EF9 EC06032E 78FE466B F88B0FFC 466B0CC4
36FF2EF9 F236FF2E F9F436FF 2EF9F636 FF2EF9F8 36FF2EF9 FA36FF2E 93EB04C4
FF2EFA00 36FF2EFA 0236FF2E FA0436FF 2EFA0636 FF2E0CC4 83005442 3A9AF9F0
FF2E5000 0F05FA04 068B2EFA 0636FF2E 0CC48300 54423A9A F9FC36FF 2EF9FE36
2EF9FA36 FF2E0CC4 83005442 3A9AFA08 36FF2EFA 0A36FF2E FA0C36FF 2EFA0E36
FF2E04C4 830034E7 FE9AFA04 36FF2EFA 0636FF2E 04C48300 34E7FE9A F9F836FF
C52E0000 04C85756 CB5E5FC9 04C48300 34E7FE9A 50000F05 FA04068B 2EFA0636
46C704C4 83005442 609AFA10 36FF2EFA 1236FF2E 00544201 9A000005 C7F9A43E
466BE77D 08FC7E83 FC46FF03 EB0000FC 46C7747D 02FE7E83 FE46FF03 EB0000FE
FA1436FF 2EFA1636 FF2E5052 C703F9EE 168B2EF9 EC06032E 78FE466B F88B0FFC
0CC48300 54424D9A 5052C703 F9E6168B 2EF9E406 032E78FE 466BF88B 0FFC466B
04C48300 54430B9A 5052C703 F9E6168B 2EF9E406 032E78FE 466BF88B 0FFC466B
FA1836FF 2EFA1A36 FF2EFA1C 36FF2EFA 1E36FF2E F9F836FF 2EF9FA36 FF2E93EB
5756CB5E 5FC904C4 83005443 0B9AFA20 36FF2EFA 2236FF2E 0CC48300 54424D9A
800A7EC5 09740001 7D800A7E C5187530 3D800A7E C5207400 3D800A7E C5EC8B55
2EFE46FF 03EB0000 FE46C700 0002C857 56CB5E5F C90005C6 0A7EC506 7520017D
F61E8E2E F8F43E03 2EF88B1A 0A466B00 99E9FE46 8B067505 3B0A468B F98C3EC5
51CA8BD8 8BF8F616 8B2EF8F4 06032E1A 0A466B4E 6A02EB59 6A047500 0E7D83F8
5052FA26 168B2EFA 2406032E 0CFE466B FA2836FF 2EFA2A36 FF2E5000 1005C38B
7D8BF8F6 1E8E2EF8 F43E032E F88B1A0A 466BF08B 1A0A466B 0EC48300 544ACA9A
830034DF 0D9A0A76 FF006A0A 46890445 8BFE03F8 F61E8E2E F8F43E03 2EE7D10E
DA9A0000 FA46C700 00FC46C7 000012C8 5756CB5E 5FC9FF52 E9C17500 023D04C4
2EFA3A36 FF2E04C4 83005442 609AFA2C 36FF2EFA 2E36FF2E 00544201 9A0034E5
0CC48300 54424D9A FA3036FF 2EFA3236 FF2EFA34 36FF2EFA 3636FF2E FA3836FF
34E82F9A 0475FFF8 F43EC52E 006A04C4 83005443 0B9AFA3C 36FF2EFA 3E36FF2E
000C2DFE 468B097E 0CFE7E83 0FEB0001 FC46C707 7F06FE7E 83FE4689 04C48300
36FF2EFA 4236FF2E F876FF61 7DFE463B FA468BFA 46FF03EB 0002F846 C7FA4601
2E5052FA 26168B2E FA240603 2E0CFA46 6B0AC483 00544ACA 9A50EE46 8D16FA40
0054430B 9A50EE46 8D160CC4 83005442 4D9A50EE 468D16FA 4436FF2E FA4636FF
FFEC8B55 5756CB5E 5FC994EB F8460100 01B803EB 0002B805 7400FC7E 8304C483
555756CB 5E5FC90A C4830054 4A8A9AFA 4836FF2E FA4A36FF 2E1B6A0A 76FF0C76
CB5E5FC9 0AC48300 544A8A9A FA4C36FF 2EFA4E36 FF2E1B6A 0A76FF0C 76FFEC8B
555756CB 5E5FC906 C4830054 4A8A9AFA 5036FF2E FA5236FF 2E1B6AEC 8B555756
6AEC8B55 5756CB5E 5FC906C4 8300544A 8A9AFA54 36FF2EFA 5636FF2E 1B6AEC8B
FF2E1B6A EC8B5557 56CB5E5F C906C483 00544A8A 9AFA5836 FF2EFA5A 36FF2E1B
FA6236FF 2E1B6AEC 8B555756 CB5E5FC9 06C48300 544A8A9A FA5C36FF 2EFA5E36
0034E9FA 9A016A01 6A000034 C85756CB 5E5FC906 C4830054 4A8A9AFA 6036FF2E
50EA468D 1600F3E9 037C0DFE 7E83FE46 FF03EB00 00FE46C7 0034EA7A 9A04C483
50CC468D 1606C483 0034EBF2 9A0A75FF F8F61E8E 2EF8F43E 032EF88B 1AFE466B
8B1AFE46 6B06C483 0034EBF2 9A0C75FF F8F61E8E 2EF8F43E 032EF88B 1AFE466B
75FFF8F6 1E8E2EF8 F43E032E F88B1AFE 466B0E75 FFF8F61E 8E2EF8F4 3E032EF8
466B50EA 468D1606 75FFF8F6 1E8E2EF8 F43E032E F88B1AFE 466B50CC 468D1608
F61E8E2E F8F43E03 2EF88B1A FE466B04 75FFF8F6 1E8E2EF8 F43E032E F88B1AFE
FE466BFA 6C36FF2E FA6E36FF 2E0AEBFA 6836FF2E FA6A36FF 2E0C7400 027D83F8
FF2EFA66 36FF2EFE 76FF5000 1005C38B 51CA8BD8 8BF8F616 8B2EF8F4 06032E1A
36FF2E00 95E90A46 8BEC8B55 5756CB5E 5FC9FF01 E91EC483 00544A8A 9AFA6436
36FF2EFA 7636FF2E 0093E908 C4830054 EE309A0C 76FF0E76 FFFA7036 FF2EFA72
FF0E76FF FA7836FF 2EFA7A36 FF2E79EB 08C48300 54EE309A 0C76FF0E 76FFFA74
54EE309A 0C76FF0E 76FFFA7C 36FF2EFA 7E36FF2E 5FEB08C4 830054EE 309A0C76
76FF0E76 FF5052F9 1A168B2E F9180603 2E64C76B 14EF830A 7E8B45EB 08C48300
FF2ED88B E0D1CC77 00033D00 030519EB 000945C6 0C7EC508 C4830054 EE309A0C
83F9003E C52E0000 FE46C700 0002C857 56CB5E5F C9EC4CEC 32EC18EB FDECA3A7
4689058B F9061E8E 2EF9043E 032EE7D1 3D8BF900 3EC52E35 EB0001B8 0575003D
5FC90001 B803EB00 02B80575 00013D00 0125F8D3 CF8BFE46 8B14EF83 0A7E8BFE
6AEC8B55 5756CB5E 5FC90589 0A7EC502 C4830034 ECAF9A1B 6AEC8B55 5756CB5E
C4830034 ECAF9A19 6AEC8B55 5756CB5E 5FC90589 0A7EC502 C4830034 ECAF9A18
C905890A 7EC502C4 830034EC AF9A1A6A 0F750002 3D058B0A 7EC50589 0A7EC502
7500023D 058B0A7E C505890A 7EC502C4 830034EC AF9A146A EC8B5557 56CB5E5F
0034ECAF 9A166AEC 8B555756 CB5E5FC9 05890A7E C502C483 0034ECAF 9A156A0F
890A7EC5 02C48300 34ECAF9A 176A0F75 00023D05 8B0A7EC5 05890A7E C502C483
B8067400 3D83FA80 3EC52E00 009646C7 00019A46 C700006E C85756CB 5E5FC905

C4830054 99729AFA 8436FF2E FA8636FF 2EFA8836 FF2EFA8A 36FF2E01 55E90001
2EFA9036 FF2EFA92 36FF2E1C 74003D80 F8F83EC5 2E2E75C2 0B945689 92468908
05C7FA94 3EC52E00 D4E90000 9A46C708 C4830054 4A8A9AFA 8C36FF2E FA8E36FF
8D160098 E90375C2 0B0AC483 0054EAAA 9A50B046 8D16646A 9276FF94 76FF0000
8910C483 00542A08 9A50B046 8D16FA98 36FF2EFA 9A36FF2E 509C468D 16509646
FA9C36FF 2EFA9E36 FF2E509C 468D16B1 74003D80 F8F83EC5 2E23EB98 468B9846
0A056BFA 943EC52E 509C468D 16D47400 013D9474 C00B98EB 08C48300 544A8A9A
3E032EE7 D13D8BFA 943EC52E 08C48300 54EE309A 5052F90E 168B2EF9 0C06032E
FF000105 C7FA803E C52EFF4C E905FFFA 943EC52E 05899646 8BF9061E 8E2EF904
1E987E83 9846FF03 EB984689 058BFA94 3EC52E04 C4830054 9C3C9A92 76FF9476
5756CB5E 5FC99A46 8BE2EB00 0005C7F9 061E8E2E F9043E03 2EE7D198 7E8B157D
08C48300 5499729A FAA036FF 2EFAA236 FF2EFAA4 36FF2EFA A636FF2E 000006C8
FF2EFAAC 36FF2EFA AE36FF2E 1C74003D 80F8F83E C52E2A75 C20BFC56 89FA4689
C52EFE46 FF03EB00 00FE46C7 70EBC02B 08C48300 544A8A9A FAA836FF 2EFAAA36
E7D1FE7E 8B35FFF9 061E8E2E F9043E03 2EE7D1FE 7E8B4C7D 053BFE46 8BFA943E
B236FF2E 5052F90E 168B2EF9 0C06032E 0AFE466B 35FFF906 1E8E2EF9 043E032E
549C3C9A FA76FFFC 76FFA5EB 10C48300 544AAE9A FA76FFFC 76FFFAB0 36FF2EFA
5E8E0A7E 03FC7E8B FC46FF03 EB0000FC 46C70000 04C85756 CB5E5FC9 04C48300
8E0A7E03 FC7E8BFE 46FFFC46 FF06EB00 00FE46C7 517400FC 7E83EF74 203D800C
8E0A7E03 FE7E8B98 058A0C5E 8E0A7E03 FC7E8B19 7D0FFE7E 831F7400 3D800C5E
FC46C705 880C5E8E 0A7E03FE 7E8B9805 8A0C5E8E 0A7E03FC 7E8BCDEB 05880C5E
7E03FC7E 8B1C7420 3D800C5E 8E0A7E03 FC7E8B2A 7D0FFC7E 83FC46FF 03EB0000
0C5E8E0A 7E03FC7E 8BCD750A 3D800C5E 8E0A7E03 FC7E8B0E 74003D80 0C5E8E0A
5A7C00FC 7E83FC4E FF03EBFC 46894804 C4830054 EEEA9A0A 76FF0C76 FF0005C6
8BD87403 05F6F99E 1E8E2EF9 9C3E032E 47F88B98 048A260C 468E0A76 03FC768B
7E8BB974 0205F6F9 9E1E8E2E F99C3E03 2E47F88B 98048A26 0C468E0A 7603FC76
5756CB5E 5FC99DEB 05880C5E 8E0A7E03 FC7E8BFF DF259805 8A0C5E8E 0A7E03FC
943EC52E FE46FF03 EB0000FE 46C704C4 830034F0 089A0A76 FF0C76FF 000002C8
BE9A5052 F90E168B 2EF90C06 032E0AFE 466B0A76 FF0C76FF 227D053B FE468BFA
FAB436FF 2EFAB636 FF2E2675 053BFE46 8BFA943E C52ECF75 C00B08C4 83003CFF
C90002B8 03EB0001 B808EB00 03B80575 C00B08C4 83003CFF BE9A0A76 FF0C76FF
46FF03EB 0000FE46 C704C483 0034F008 9A0A76FF 0C76FF00 0002C857 56CB5E5F
0E168B2E F90C0603 2E0AFE46 6B0A76FF 0C76FF22 7D053BFE 468BFA94 3EC52EFE
468BFA94 3EC52E05 89F9003E C52EFE46 8BCF75C0 0B08C483 003CFFBE 9A5052F9
F90E168B 2EF90C06 032E0AFE 466B0A76 FF0C76FF 05FFFA94 3EC52E29 75053BFE
0445C70E 7EC5EC8B 555756CB 5E5FC900 01B803EB C02B08C4 830054EE 309A5052
000E45C7 00000C45 C70E7EC5 00000A45 C7000008 45C70E7E C5000006 45C70000
001645C7 0E7EC500 001445C7 0E7EC500 001245C7 0E7EC500 011045C7 0E7EC500
001E45C7 0E7EC500 001A45C7 0E7EC500 001C45C7 0E7EC500 001845C7 0E7EC500
0A468B0C 76FFFAB8 36FF2EFA BA36FF2E 05880A7E C50001B8 002045C6 0E7EC500
FFFABC36 FF2EFABE 36FF2E12 45880A7E C50000B8 08C48300 54EE309A 50000105
2EFAC236 FF2E2445 880A7EC5 0003B808 C4830054 EE309A50 0013050A 468B0C76
2E364588 0A7EC500 00B808C4 830054EE 309A5000 25050A46 8B0C76FF FAC036FF
7EC50000 B808C483 0054EE30 9A500037 050A468B 0C76FFFA C436FF2E FAC636FF
08C48300 54EE309A 50004905 0A468B0C 76FFFAC8 36FF2EFA CA36FF2E 4845880A
EE309A50 005B050A 468B0C76 FFFACC36 FF2EFACE 36FF2E5A 45880A7E C50000B8
6D050A46 8B0C76FF FAD036FF 2EFAD236 FF2E6C45 880A7EC5 0000B808 C4830054
0C76FFFA D436FF2E FAD636FF 2E7E4588 0A7EC500 08B808C4 830054EE 309A5000
0E7EC50C 568B0A46 8B000822 45C70E7E C508C483 0054EE30 9A50007F 050A468B
9A004427 119A0034 E5DA9A00 00FC46C7 000068C8 5756CB5E 5FC92655 89244589
FAE236FF 2E08C483 0054EE30 9A509846 8D16FAD8 36FF2EFA DA36FF2E 0054406F
E03EC52E 5A169846 8D08C483 0034F255 9AFADC36 FF2EFADE 36FF2EFA E036FF2E
9A005441 DB9A04C4 8300543E F39A50E4 2A058AFA E43EC52E 016A0255 890589FA
2EFAEE36 FF2E1774 C00B04C4 83005442 609AFAE8 36FF2EFA EA36FF2E 00544201
2E0034ED C59A0000 05C7F900 3EC52E00 A0E9C02B 04C48300 544A8A9A FAEC36FF
36FF2EFA E236FF2E 02C48300 34F6EE9A 016A0034 F5559A05 75003D83 FA943EC5
C52E0034 F65E9A58 EB0034F5 E69A40EB FE468BFE 468904C4 83005442 BF9AFAE0
EB000005 C7F9003E C52EB875 043B2605 8BF9003E C52EFA94 36C42E05 FFF9003E
41A7FF2E D88BE0D1 96770007 3D481FEB 0034F5E6 9A0034EF 3E9A0034 F65E9AAD
2EFAF236 FF2EEC8B 555756CB 5E5FC9F4 F2F4CEF4 CEF4CEF4 CEF4F9F4 CEF521F5
08C48300 54EE309A 5052F90E 168B2EF9 0C06032E 0A056BFA 943EC52E FAF036FF
FF2E05FF FA943EC5 2E000005 C7F9061E 8E2EF904 3E032EE7 D13D8BFA 943EC52E
54EE309A 5052F90E 168B2EF9 0C06032E 0A056BFA 943EC52E FAF436FF 2EFAF636
FA943EC5 2E0F7505 C7F9061E 8E2EF904 3E032EE7 D13D8BFA 943EC52E 08C48300
3EC52E00 0005C7F9 003EC52E 000005C7 FA943EC5 2EEC8B55 5756CB5E 5FC905FF
9A004423 889A0034 F6289A00 54406F9A 005441EE 9A005442 019A0000 05C7FA80
019A0054 41DB9A04 C4830054 3EF39A01 6A646AEC 8B555756 CB5E5FC9 0034E718
5756CB5E 5FC90054 42739A04 C4830054 42609AFA F836FF2E FAFA36FF 2E005442
89E0D1D4 468B0EEB 0000D846 C70014DA 46C70001 D446C700 00D646C7 00002CC8
50DC468D 16FAFC36 FF2EFAFE 36FF2ED8 76FF447D 1FDA7E83 D846FFDA 46FFD446

54423A9A 50DC468D 16FB0036 FF2EFB02 36FF2E50 EC468D16 0AC48300 544ACA9A
F9043E03 2EE7D13D 8BF9003E C52EA8EB D64609D4 468BB075 42EC7E80 0CC48300
7C9AFB04 36FF2EFB 0636FF2E 000020C8 5756CB5E 5FC90589 D6468BF9 061E8E2E
2EFB0E36 FF2E5052 F90E168B 2EF90C06 032E0A05 6BF9003E C52E04C4 83005441
FB1036FF 2EFB1236 FF2E0CC4 83005442 4D9AFB08 36FF2EFB 0A36FF2E FB0C36FF
FA468905 8BF9061E 8E2EF904 3E032EE7 D13D8BF9 003EC52E 04C48300 54430B9A
037C1FFE 7E83FC46 FFFE46FF FA4689F8 D1FA468B 0EEB0000 FC46C700 14FE46C7
2EFB1A36 FF2E0AEB FB1436FF 2EFB1636 FF2E0C75 00013D00 0125FA46 8B00E2E9
2EFB1E36 FF2EFC76 FF5B7400 0A7E8308 C4830054 EE309A50 F0468D16 FB1836FF
466B04C4 83005441 7C9A50E0 468D160A C4830054 4ACA9A50 E0468D16 FB1C36FF
424D9A50 E0468D16 FB2036FF 2EFB2236 FF2E5052 F91A168B 2EF91806 032E64FC
16FB2436 FF2EFB26 36FF2EFC 76FF04C4 83005443 0B9A50E0 468D160C C4830054
FF2E50F0 468D1604 C4830054 417C9A50 E0468D16 0AC48300 544ACA9A 50E0468D
83005443 0B9A50E0 468D160C C4830054 424D9A50 E0468D16 FB2836FF 2EFB2A36
8D165052 005443C9 9AFC4689 00544357 9A000036 C85756CB 5E5FC9FF 07E904C4
16FB2C36 FF2EFB2E 36FF2E50 CA468D16 50EBFC46 8B08C483 0054EE30 9A50F246
50CA468D 16FE4689 058BF900 3EC52E00 34F65E9A 0CC48300 54423A9A 50F2468D
05EB02C4 830034F6 EE9A006A 1174053B FE468BF9 003EC52E 04C48300 34F1C39A
0024B32C 0014951F 0024BD96 0024BD40 00CB5E5F C9400054 436A9AAB 74009B3D
0024B3A2 0024B8F2 0024B39E 0024B38D 0024C18A 0024B357 0024C2B6 0024BD44
0024B3D8 0024B3D0 0024B3C8 0024B3C0 0024B3B9 0024B3B1 0024B3AA 0024B3A4
0024BD46 0024B7F2 0024C188 0024B3FF 0024B3F7 0024B3F0 0024B3E8 0024B3E0
0024C174 0024BF50 0024BF1C 0024BEE8 0024B43C 0024B41E 0024B41C 0024B407
0054E94A 0024B7FC 0024B7F4 0024B7F8 0024B7F6 0024B49B 0024B495 0024B451
0024B4E4 0024B4DD 0024B4C8 0024B7FE 004C7C64 0024B4AE 0024BD3E 0024B4A1
0024B541 0024B539 0024B536 0024B532 0024B517 0024B515 0024B50F 0024B50C
0024B55D 0024C056 0024B55A 0024B556 0024BF66 0024B553 0024B802 0024B54F
0024B584 0024B580 0024B57D 0024B573 0024B570 0024B568 0024C066 0024B565
0024B5AD 0024B5A4 0024B5A1 0024B59D 0024B593 0024B58B 0024C084 0024B587
0024B5DE 0024B5D9 0024B5D3 0024B5CD 0024B5C3 0024B5B9 0024B5B6 0024B5B1
0024B63C 0024B634 0024B62C 0024B624 0024B61F 0024B61A 0024B5E6 0024B5E2
0024B698 0024B692 0024BD42 0024B67E 0024B65A 0024B658 0024B644 0024B800
0024B73E 0024B731 0024B72B 0024B71C 0024B708 0024B6D5 0024B6D3 0024B6BF
0024C31A 0024B74D 0024B748 0024B747 0024B746 0024B745 0024B744 0024B73F
0024B7BD 0024B7B3 0024B7AD 0024B7A9 0024B787 0024B77B 0014951E 0024C2F2
0024B7DE 0024B7DA 0024B7D4 0024B7D0 0024B7CD 0024B7C9 0024B7C5 0024B7C2
1E9A0054 968F9A0C 46DD0000 4EC85756 0024B7EE 0024B7EB 0024B7E6 0024B7E3
8B2474C2 0BFE5689 FC4689FF 58958B2E FF56858B 2E02E7C1 F88B08C4 83005498
EB75C00A 0588F846 FFF87EC5 98058AFC 46FFFC7E C5FA5689 F8468918 568B1646
1476FF50 F6468D16 50F4468D 1650B446 8D160006 1446C705 7D00147E 8301DCE9
895C7567 0A7E83FE 5689FC46 8918C483 0034FD6A 9A0A76FF 0054968F 9A0C46DD
FC463B05 75FE563B FA568BF8 468BF3EB F846FF05 74003D80 F87EC5FA 5689F846
05087CFD F67E83B2 4689FC46 2BF8468B E2EBF84E FF057530 FF7D80F8 7EC50E74
568B1646 8B000014 46C7057C B2463BF6 468B0DEB 00650A46 C7077DF6 463B0005
C500A5E9 0374650A 7E832D05 C6F846FF F87EC509 7400F47E 83FA5689 F8468918
FF037400 54968A9A FF361EDC 2E0C46DD 0588F846 FFF87EC5 98058AFC 46FFFC7E
EB98058A FC46FF08 74003D80 FC7EC520 7E00147E 832E05C6 F846FFF8 7EC5F64E
0B7C00F6 7E836505 C6F846FF F87EC5DA EB144EFF 0588F846 FFF87EC5 0030B803
0EF676FF F64689D8 F7F6468B 2D05C6F8 46FFF87E C511EB2B 05C6F846 FFF87E8B
0104C483 0054EEEA 9AF876FF FA76FF0A C4830054 4ACA9AF8 76FFFA76 FFFFF468
FC46FF08 74003D80 FC7EC520 EB3005C6 F846FFF8 7EC50B7F 00F67E83 7BEBF846
46FFF87E C5447400 147E83E0 75F64EFF 0588F846 FFF87EC5 0030B803 EB98058A
C51BEB30 05C6F846 FFF87EC5 0B7DC00B F646FFF6 468B357E 00147E83 2E05C6F8
8BC5EB14 4EFF0588 F846FFF8 7EC50030 B803EB98 058AFC46 FF087400 3D80FC7E
C5477200 54968A9A FF361EDC 2E0C46DD 000012C8 5756CB5E 5FC99BFA 568BF846
8B1E468B 000007C7 165EC540 75005496 8A9AFF36 1EDC2E0C 46DD0000 07C71A5E
FC5EC5EB EB3007C6 FC46FFFC 5EC50B74 C00B144E FF14468B FE5689FC 46892056
968F9A0C 46DD50F6 468D160C 5EDDE0D9 0C46DD00 0107C71A 5EC50164 E90007C6
C4830054 96EF9A00 54968F9A FF3E36DC 2EF646DF D8DD0CC4 83005497 7F9A0054
0054968A 9AFF461E DC2E0C46 DD0C5EDD 0C7EDC02 C4830054 983A9A50 FA468908
968F9A0C 46DD0789 165EC5FA 468B0C5E DD0C4EDC FF4E06DD 2E0BEBFA 46FF0572
7E83F846 8914468B FE5689FC 46892056 8B1E468B F08B08C4 83005496 EF9A0054
4603FA46 8B087CFA 463B0005 0514468B 137C00FA 7E831975 670A7E83 1774660A
0011F846 C7057E11 F87E8300 00F846C7 057D00F8 7E83F846 89401446 8B04EB14
EE5EDD02 C4830054 969D9A56 07880030 05C68BFC 46FFFC5E C53C7DF8 7E3BFF2B
F08B08C4 83005496 EF9A0054 968F9A0C 46DD0C5E DDFF4E0E DC2EEE66 DC0C46DD
4EFF1874 1E463B05 7520563B FE568BFC 468B3C7C 05FE8300 07C6FC5E C5BFEB47
03F85E8B 3107C6FC 5EC5D8EB 3007C6FC 5EC51C7E 00393D98 078A07FE FC5EC5FC
A3710000 00000000 000000CB 5E5FC99B 20568B1E 468B07FF 165EC500 07C6FC5E
FFAB0034 FFA30034 FF964024 00000000 00003FF0 00000000 0000400A 934F0979

00000000 00000000 00000034 FFCD0000 00000034 FFC00000 00000034 FFB80034
616D726F 6E6E5520 2B7B0000 00000034 FFE70000 00000034 FFDA0000 00000000
007D4E41 4E202D7B 007D6C61 6D726F6E 6E55202D 7B007D4E 414E202B 7B007D6C
6E654420 2B7B007D 7974696E 69666E49 202D7B00 7D797469 6E69666E 49202B7B
00000000 00000000 00007525 007D6C61 6D726F6E 6544202D 7B007D6C 616D726F
2CFC9C9A 0F6A27B4 36FF2E27 B636FF2E 147E003D 8327B03E C52E0000 24C85756
2E012C05 C727C03E C52E0097 05C727BC 3EC52E00 0105C727 B83EC52E 06C48300
3E032EE7 D1FE7E8B 467D03FE 7E83FE46 FF03EB00 00FE46C7 001E05C7 27C43EC5
2EE7D1FE 7E8B0589 27CA1E8E 2E27C83E 032EE7D1 FE7E8B05 8B27CE1E 8E2E27CC
C52EB1EB 058927D2 1E8E2E27 D03E032E E7D1FE7E 8B058B27 B61E8E2E 27B43E03
3EC52E00 6A35FF27 E03EC52E 27E436FF 2E27E636 FF2E3E75 00013D05 8B27D43E
2E18C483 00448D31 9A005496 8F9A05D9 9B27D83E C52E0054 968F9A05 D99B27DC
058B27C0 3EC52E4E 358B27BC 3EC52E00 0005C727 E83EC52E FFFF05C7 27D43EC5
00544A8A 9A27F036 FF2E27F2 36FF2E35 FF27EC3E C52E0589 27EC3EC5 2EFEF799
058B27BC 3EC52E04 C4830054 9BD59A50 00120527 F4068B2E 27F636FF 2E06C483
D99BDC76 DC9B2800 26DC2E9B 27F806DD 2E9BDC5E DD9B02C4 83005496 9D9A5048
36FF2E0C C4830054 4A8A9A28 0836FF2E 280A36FF 2E005496 8F9AF046 D99BF05E
48058B27 BC3EC52E 27C436C4 2E04C483 00549BD5 9A500012 0527F406 8B2E27F6
F636FF2E 06C48300 544A8A9A 280C36FF 2E280E36 FF2EEE76 FFEE4689 3CF72699
9B28103E C52E05D9 9B28143E C52E04C4 8300549B D59A5000 120527F4 068B2E27
2E02E7C1 4FFC7E8B 2D7D053B FC468B27 BC3EC52E FC46FF03 EB0001FC 46C71DD9
28121E8E 2E28103E 032E02E7 C1FC7E8B F046D89B 05D99B28 121E8E2E 28103E03
EB0000FC 46C7EC46 8928183E F72E9905 8B27EC3E C52E0005 EA46C7C4 EB1DD99B
8BEE6EF7 40FC468B 281436C4 2E0082E9 037C053B FC468B27 C43EC52E FC46FF03
968F9AE4 46D99BE4 5ED99B24 D8269B05 D99B2812 1E8E2E28 103E032E 02E7C1F8
544ACA9A 5052281C 168B2E28 1A06032E 07FC466B 281E36FF 2E282036 FF2E0054
2E28223E 032EE7D1 FC7E8BE8 46892DF7 EE6EF740 FC468B27 EC3EC52E 10C48300
C7FA4689 058B2826 3EC52EFF 6CE90589 EA462B00 2805EC46 03E8468B 28241E8E
28103E03 2E02E7C1 FC7E8B5D 7D053BFC 468B27BC 3EC52EFC 46FF03EB 0000FC46
10C48300 54D1809A 0054968F 9A283606 DD2E9B00 54968F9A 05D99B28 121E8E2E
8B08C483 005496EF 9A005496 8F9A282E 06DC2E9B DC76DC9B FA46DF9B DC5EDD9B
8304C483 00546449 9A50F446 8D1694EB 0589282C 1E8E2E28 2A3E032E E7D1FC7E
27BC3EC5 2EFC46FF 03EB0000 FC46C7F6 5ED99B05 D99B283E 3EC52E7E 7502F47E
968F9AF6 4ED89B05 DF9B282C 1E8E2E28 2A3E032E E7D1FC7E 8B5C7D05 3BFC468B
28423EC5 2E058928 2C1E8E2E 282A3E03 2EE7D1FC 7E8B08C4 83005496 EF9A0054
01282C1E 8E2E282A 3E032EE7 D1FC7E8B 08C48300 5496EF9A 0054968F 9A05D99B
032EE7D1 FC7E8B2B 7D053BFC 468B27BC 3EC52EFC 46FF03EB 0000FC46 C795EB05
05C7282C 1E8E2E28 2A3E032E E7D1FC7E 8BDB7E0F FF3D058B 282C1E8E 2E282A3E
BC3EC52E 000205C7 27B83EC5 2EEC8B55 5756CB5E 5FC99B00 3C04BA9A C6EB0FFF
FFFF05C7 28463EC5 2E000005 C727E83E C52E00FF 05C727C0 3EC52E01 0005C727
27EC3EC5 2EFEF799 058B27C0 3EC52E4E 358B27BC 3EC52EFF FF05C728 4A3EC52E
27F636FF 2E06C483 00544A8A 9A284E36 FF2E2850 36FF2E35 FF27EC3E C52E0589
000012C8 5756CB5E 5FC9003C 04BA9A04 C4830054 9BD59A50 00120527 F4068B2E
468B27BC 3EC52EFE 46FF03EB 0000FE46 C700DEE9 03740001 3D058B27 B83EC52E
89F84689 FA468905 8B282C1E 8E2E282A 3E032EE7 D1FE7E8B 0181E903 7C053BFE
75FF2856 3EC52E08 C4830054 74E29A35 FF0275FF 28523EC5 2E50F646 8D16F646
83FC46FF 03EB0000 FC46C70C C4830054 5B789A50 F6468D16 50EE468D 1635FF02
8B1F16FD 03E7D1FC 7E8B0E7D 00FF3DEE 458B1F16 FD03E7D1 FC7E8B91 7D04FC7E
7D00FF3D EE458B1F 16FD03E7 D1FC7E8B 22EBC02B 047D0000 3D00FFB8 03EBEE45
3E032E03 E7C1FE7E 8BE6D1FC 768B00FF B803EBEE 458B1F16 FD03E7D1 FC7E8B0E
3BFE468B 27BC3EC5 2EFE46FF 03EB0000 FE46C78F EB0589FE 03285C1E 8E2E285A
1635FF02 75FF2856 3EC52EF6 4689F846 89FA4689 FE462B00 FFB800A3 E9037C05
7D04FC7E 83FC46FF 03EB0000 FC46C70C C4830054 5B789A50 F6468D16 50EE468D
03EBEE45 8B1F16FD 03E7D1FC 7E8B0E7D 00FF3DEE 458B1F16 FD03E7D1 FC7E8BB3
FC7E8B0E 7D00FF3D EE458B1F 16FD03E7 D1FC7E8B 22EBC02B 047D0000 3D00FFB8
8E2E285A 3E032E03 E7C1FE7E 8BE6D1FC 768B00FF B803EBEE 458B1F16 FD03E7D1
169F9A00 3C12DC9A 003C06D7 9A000004 C85756CB 5E5FC98F EB0589FE 03285C1E
8B28463E C52E2674 FFFF3D05 8B28463E C52E3275 00023D05 8B27B83E C52E003C
0AC48300 3C0FE09A 35FF285E 3EC52E00 54968F9A FC46D99B 0589285E 3EC52E05
F046C700 0016C857 56CB5E5F C99B0000 05C72866 3EC52E00 0105C728 623EC52E
5F00543A 809A50FC 468D1600 6A575600 03EA46C7 0002EC46 C70001EE 46C70000
FF006A0A C4830054 C0489AFC 76FF006A 006A006A 006A1374 00FC7E83 F646895E
8B27BC3E C52EFA46 FF03EB00 00FA46C7 F45689F2 468904C4 830054B4 EA9AF676
D77EFE46 3B19056B 27EC3EC5 2EFE46FF 03EB0000 FE46C700 CCE9037C 053BFA46
FA7E8BE6 D1EE768B F8468902 E0C1FE46 0319C76B F88B2CF7 FA468B27 EC36C52E
F0768B05 88F45E8E F27E03F8 7E8B9805 8AFE0328 5C1E8E2E 285A3E03 2E03E7C1
5E8EF27E 0347F87E 8B98058A FE03285C 1E8E2E28 5A3E032E 03E7C1FA 7E8BE6D1
F87E8B98 058AFE03 285C1E8E 2E285A3E 032E03E7 C1FA7E8B E6D1EA76 8B0588F4
03285C1E 8E2E285A 3E032E03 E7C1FA7E 8BE6D1EC 768B0588 F45E8EF2 7E034747

```
8B27BC3E C52E27EC 36C42EFF 3BE90588 F45E8EF2 7E0303C7 83F87E8B 98058AFE
F676FF57 560EC483 003C8733 9A50F246 8D16016A 00C86828 6A196A50 2CF72605
286A3EC5 2E0096FC 46C70000 08C85756 CB5E5FC9 5E5F0054 3A609A50 FC468D16
0A7EC505 89286A3E C52EFE46 8B005473 ED9A0001 05C7286A 3EC52EFE 4689058B
9B286E3E C52E0391 E9000405 C70A7EC5 0A750001 3D058B28 663EC52E 000305C7
54968F9A 05D99B28 6E3EC52E 1A7C00C8 3D08C483 005496EF 9A005496 8F9A05D9
99058B28 723EC52E 0353E900 0205C70A 7EC50A7E 00E13D08 C4830054 96EF9A00
183EF72E 99058B28 723EC52E 28C68335 8B27C03E C52E1B7C 00283D28 183EF72E
183EF72E 99058B28 723EC52E 27EC36C4 2E031CE9 000205C7 0A7EC50A 7EC63B28
C52E024D E9037400 013D058B 27B83EC5 2E058928 4A3EC52E 3CF72699 00282D28
9A05D99B 28121E8E 2E28103E 032E02E7 C13D8B28 4A3EC52E 5374003D 8028763E
05D99B28 121E8E2E 28103E03 2E02E7C1 3D8B284A 3EC52E28 1436C42E 0054968F
27F636FF 2E14C483 00544A8A 9A287A36 FF2E287C 36FF2E00 54968F9A 24D8269B
284A3EC5 2E277400 3D802876 3EC52E04 C4830054 9BD59A50 00120527 F4068B2E
8300544A 8A9A287E 36FF2E28 8036FF2E 35FF282C 1E8E2E28 2A3E032E E7D13D8B
3EC52E28 1436C42E 04C48300 549BD59A 50001205 27F4068B 2E27F636 FF2E06C4
1DD99B28 823EC52E 24D8269B 05D99B28 121E8E2E 28103E03 2E02E7C1 3D8B284A
C4830054 96EF9A00 54968F9A 282E06DC 2E9B2886 36DC2E9B 05DF9B28 723EC52E
FF285E3E C52E0054 968F9A05 D99B2882 3EC52E00 3433909A 0589285E 3EC52E08
6A1674C0 0B04C483 0054D323 9A288E36 FF2E2890 36FF2E0A C483003C 0FE09A35
7500023D 058B2892 3EC52E08 C4830054 D39A9A28 8E36FF2E 289036FF 2E006A00
3B260014 05058B27 B43EC52E 282C068E 2E282A36 032EE6D1 358B284A 3EC52E75
14050245 8B27B43E C52E282C 068E2E28 2A36032E E6D1358B 284A3EC5 2E497F04
458B27B4 3EC52E28 2C068E2E 282A3603 2EE6D135 8B284A3E C52E267F 043B2600
2EE6D135 8B284A3E C52E0115 E9000105 C70A7EC5 011FE903 7F043B26 00140504
D1358B28 4A3EC52E 497C043B 2600142D 058B27CC 3EC52E28 2C068E2E 282A3603
284A3EC5 2E267C04 3B260014 2D02458B 27CC3EC5 2E282C06 8E2E282A 36032EE6
AAE9037C 043B2600 142D0445 8B27CC3E C52E282C 068E2E28 2A36032E E6D1358B
9A282E06 DC2E9B28 8636DC2E 9B05DF9B 28723EC5 2E00A0E9 000105C7 0A7EC500
54968F9A F846D99B 00343390 9A058928 5E3EC52E 08C48300 5496EF9A 0054968F
830054D3 239A288E 36FF2E28 9036FF2E 0AC48300 3C0FE09A 35FF285E 3EC52E00
4A3EC52E 08C48300 54D39A9A 288E36FF 2E289036 FF2E006A 006A1674 C00B04C4
3EC52E0E EBFFFF05 C7284A3E C52E0001 05C70A7E C5127DFC 463B052B 00FFB828
00013D05 8B27B83E C52E0000 04C85756 CB5E5FC9 9B058928 463EC52E 058B285E
7D03FE7E 83FE46FF 03EB0000 FE46C738 7500023D 058B2892 3EC52E00 CDE90374
27CC3E03 2EE7D1FE 7E8B058B 282C1E8E 2E282A3E 032EE7D1 3D8B284A 3EC52E60
3D8B284A 3EC52E28 7D03FE7E 83FE46FF 03EB0000 FE46C7CF EB058927 CE1E8E2E
EB058927 B61E8E2E 27B43E03 2EE7D1FE 7E8B058B 282C1E8E 2E282A3E 032EE7D1
289836FF 2E289A36 FF2E289C 36FF2E00 6A006A00 6A50FC46 8D160044 CB7A9ACF
489AFC76 FF006A00 6A006A00 6A157400 FC7E8312 C483003C 7D919A28 9636FF2E
34E5029A 000004C8 5756CB5E 5FC9003C 06D79A00 3C04BA9A 0AEB0AC4 830054C0
FE7E8B46 7D03FE7E 83FE46FF 03EB0000 FE46C779 7500013D 058B27B8 3EC52E00
8B058927 CE1E8E2E 27CC3E03 2EE7D1FE 7E8B058B 27CA1E8E 2E27C83E 032EE7D1
8927B61E 8E2E27B4 3E032EE7 D1FE7E8B 058B27D2 1E8E2E27 D03E032E E7D1FE7E
C483002C FC9C9A10 6A27B436 FF2E27B6 36FF2E14 7E003D83 27B03EC5 2EB1EB05
289836FF 2E289A36 FF2E289C 36FF2E00 6A006A00 6A50FC46 8D160044 CB7A9A06
489AFC76 FF006A00 6A006A00 6A137400 FC7E8312 C483003C 7D919A28 9636FF2E
FF2E3E75 FFFF3D05 8B27D43E C52E4A75 00013D05 8B27B83E C52E0AC4 830054C0
C52E0054 968F9A05 D99B27DC 3EC52E01 6A35FF27 E03EC52E 27E436FF 2E27E636
3C11BD9A 000105C7 27D43EC5 2E18C483 00448D31 9A005496 8F9A05D9 9B27D83E
A23EC52E 4774003D 83289E3E C52E003C E6F89A56 7500023D 058B27B8 3EC52E00
6A35FF28 AE3EC52E 28A236FF 2E28A436 FF2E04C4 830054DC 759A35FF 0275FF28
00448D31 9A005496 8F9A05D9 9B28A63E C52E0054 968F9A05 D99B28AA 3EC52E01
FF2E289C 36FF2E00 6A006A00 6A50FE46 8D160000 08C85756 CB5E5FC9 9B18C483
6A006A00 6A137400 FE7E8312 C483003C 7D919A28 9636FF2E 289836FF 2E289A36
8327B03E C52E3575 00013D05 8B27B83E C52E0AC4 830054C0 489AFE76 FF006A00
0105C728 B23EC52E 06C48300 2CFC9C9A 116A27B4 36FF2E27 B636FF2E 147E003D
03740002 3D058B27 B83EC52E 003C11BD 9A002CE9 999A0000 05C727D4 3EC52E00
89FA4689 FC468905 2B00FFB8 284A3EC5 2E3674FF FF3D058B 284A3EC5 2E0098E9
DB289A50 52285C16 8B2E285A 06032E03 E0C1058B 284A3EC5 2E50F846 8D16F846
759A35FF 0275FF28 A23EC52E 4774003D 83289E3E C52E003C E6F89A08 C483003C
D99B28AA 3EC52E01 6A35FF28 AE3EC52E 28A236FF 2E28A436 FF2E04C4 830054DC
CB5E5FC9 9B18C483 00448D31 9A005496 8F9A05D9 9B28A63E C52E0054 968F9A05
C846C654 C746C653 C646C600 00E846C7 0000EA46 C7000AEC 46C70000 3AC85756
50EC462B 00C8B8EE 5ED99BF2 56D99B0A 46DF9B00 CB46C654 CA46C652 C946C641
50EE468D 1650FE46 8D16FA5E D99B28B6 06DF2E9B F65ED99B 02C48300 54969D9A
45750001 3D058B27 E83EC52E 12C48300 54DABA9A 00C96807 6A026A50 F6468D16
6A026A35 FF28B83E C52E35FF 28BC3EC5 2E50FE46 8D163B75 003D8328 663EC52E
830054C0 489AFE76 FF006A00 6A006A00 6A167400 FE7E830C C4830054 D8DC9A07
```

2E28C636 FF2E0054 968F9A0C 46DD9B27 7500013D 058B27B8 3EC52E01 13E90AC4
36FF2E50 C6468D16 17EB10C4 8300544A CA9A28C0 36FF2E28 C236FF2E 28C436FF
D546C600 01CD46C7 0005CF46 C770CC46 C608C483 0054EE30 9A28C036 FF2E28C2
8928C216 8B2E28C0 068B2E04 D446C602 D146C606 D646C601 D346C601 D246C601
6A35FF28 B83EC52E 35FF28BC 3EC52E00 6A50CC46 8D1650FE 468D16D9 5689D746
8BDC4689 E0D10019 2DEC462B 00C8B867 7500FE7E 8312C483 0054D8DC 9A036A05
FF28BC3E C52EEA76 FFE876FF 50DC468D 1650FE46 8D16DE46 89000A2D E0D10A46
006A006A 006A1574 00FE7E83 14C48300 54D8DC9A 066A066A 35FF28B8 3EC52E35
C85756CB 5E5FC99B 000105C7 27E83EC5 2E09EB0A C4830054 C0489AFE 76FF006A
28B83EC5 2E35FF28 C83EC52E 50FE468D 16707500 013D058B 27B83EC5 2E000002
9AFE76FF 006A006A 006A006A 137400FE 7E830CC4 830054D8 DC9A166A 026A35FF
DC9A166A 026A35FF 28B83EC5 2E35FF28 CC3EC52E 50FE468D 160AC483 0054C048
160AC483 0054C048 9AFE76FF 006A006A 006A006A 137400FE 7E830CC4 830054D8
7E830CC4 830054D8 DC9A166A 026A35FF 28B83EC5 2E35FF28 D03EC52E 50FE468D
036A036A 50FE468D 160AC483 0054C048 9AFE76FF 006A006A 006A006A 137400FE
1674C00B 04C48300 54D3239A 288E36FF 2E289036 FF2E0AC4 830054DA BA9A6F6A
006A006A 137400FE 7E8308C4 830054D3 9A9A288E 36FF2E28 9036FF2E 006A006A
24C85756 CB5E5FC9 000005C7 28623EC5 2E0AC483 0054C048 9AFE76FF 006A006A
0271E903 7400013D 058B27B8 3EC52E00 00F646C7 0010F846 C70000FA 46C70000
C609E246 C60001E0 46C7DE46 89FC468B DC4689FE 468B0014 FC46C700 36FE46C7
C20BE756 89E54689 04C48300 54DC339A 35FF27C4 3EC52E09 6A08E446 C601E346
8B09F446 6B597D05 3BF4468B 27C43EC5 2EF446FF 03EB0000 F446C703 56E90375
F4466B00 000145C7 E75E8EE5 7E03F88B 09F4466B 0566F446 8BE75E8E E57E03F8
00000545 C7E75E8E E57E03F8 8B09F446 6B034589 FE468BE7 5E8EE57E 03F88B09
FF2E50DC 468D1650 FA468D16 98EB0745 89FC468B E75E8EE5 7E03F88B 09F4466B
76FF14C4 830054D8 DC9A086A 066A35FF 28B83EC5 2EF876FF 28C836FF 2E28CA36
C0489AFA 76FF006A 006A006A 006A1674 00FA7E83 04C48300 54DC759A E576FFE7
8D164F7D 053BF446 8B27C43E C52EF446 FF03EB00 00F446C7 0293E90A C4830054
C52E35FF 28C83EC5 2EF676FF 505228D6 168B2E28 D406032E E0D1F446 8B50FA46
FF006A00 6A006A00 6AB87400 FA7E8312 C4830054 D8DC9A02 6A056A35 FF28B83E
FC468BDC 4689FE46 8B001EFC 46C70068 FE46C702 2EE90AC4 830054C0 489AFA76
04C48300 54DC339A 016A096A 08E446C6 01E346C6 09E246C6 0001E046 C7DE4689
7EC5FE46 8B000001 45C7E57E C50005C6 E57EC501 EEE90375 C20BE756 89E54689
2E50DC46 8D1650FA 468D1607 4589E57E C5FC468B 00000545 C7E57EC5 034589E5
FF14C483 0054D8DC 9A086A06 6A35FF28 B83EC52E F876FF28 CC36FF2E 28CE36FF
489AFA76 FF006A00 6A006A00 6A167400 FA7E8304 C4830054 DC759AE5 76FFE776
28CC3EC5 2EF676FF 28D836FF 2E28DA36 FF2E50FA 468D1601 72E90AC4 830054C0
6A006A00 6A167400 FA7E8312 C4830054 D8DC9A02 6A056A35 FF28B83E C52E35FF
4689FE46 8B0014FC 46C70032 FE46C701 2AE90AC4 830054C0 489AFA76 FF006A00
54DC339A 016A096A 08E446C6 01E346C6 09E246C6 0001E046 C7DE4689 FC468BDC
8B000001 45C7E57E C50005C6 E57EC500 EAE90375 C20BE756 89E54689 04C48300
8D1650FA 468D1607 4589E57E C5FC468B 00000545 C7E57EC5 034589E5 7EC5FE46
0054D8DC 9A086A06 6A35FF28 B83EC52E F876FF28 D036FF2E 28D236FF 2E50DC46
FF006A00 6A006A00 6A157400 FA7E8304 C4830054 DC759AE5 76FFE776 FF14C483
C52EF676 FF28BC36 FF2E28BE 36FF2E50 FA468D16 6FEB0AC4 830054C0 489AFA76
006A1574 00FA7E83 12C48300 54D8DC9A 026A056A 35FF28B8 3EC52E35 FF28D03E
C600EC46 C600EB46 C600EA46 C628EB0A C4830054 C0489AFA 76FF006A 006A006A
56CB5E5F C901F346 C600F246 C600F146 C600F046 C600EF46 C600EE46 C600ED46
CF46C620 CE46C600 00F846C7 0000FA46 C70050FC 46C701C2 FE46C700 0038C857
D746C679 D646C674 D546C669 D446C673 D346C66E D246C665 D146C644 D046C620
BDE90374 00013D05 8B27B83E C52E0000 CC46C700 DA46C620 D946C620 D846C620
0005DF46 C770DC46 C6737D05 3BC8468B 27C43EC5 2EC846FF 03EB0000 C846C701
C8466B04 E446C602 E146C607 E646C601 E346C601 E246C601 E546C600 01DD46C7
C87E8B00 6A50DC46 8D1650CA 468D16E9 5689E746 89281C16 8B2E281A 06032E07
C4830054 D8DC9A03 6A056A35 FF28B83E C52E35FF 28D61E8E 2E28D43E 032EE7D1
8B27C43E C52EC846 FF03EB00 00C846C7 EC4689FE 468B0134 E9817400 CA7E8312
CC468D16 EE4689E0 D1058B28 241E8E2E 28223E03 2EE7D1C8 7E8B667D 053BC846
3EC52E35 FF28D61E 8E2E28D4 3E032EE7 D1C87E8B FA76FFF8 76FF50EC 468D1650
76FF006A 006A006A 006AA174 00CC7E83 14C48300 54D8DC9A 066A066A 35FF28B8
46C601E5 46C60001 DD46C700 08DF46C7 70DC46C6 00B2E90A C4830054 C0489ACC
468D16E9 5689E746 895A16CE 468D04E4 46C602E1 46C60CE6 46C601E3 46C601E2
0054D8DC 9A036A05 6A35FF28 B83EC52E 35FF28D8 3EC52E00 6A50DC46 8D1650CA
50CC468D 16EE4689 001E2DFC 468BEC46 8900322D FE468B55 7500CA7E 8312C483
D8DC9A06 6A066A35 FF28B83E C52E35FF 28D83EC5 2EFA76FF F876FF50 EC468D16
5FC90AC4 830054C0 489ACC76 FF006A00 6A006A00 6A137400 CC7E8314 C4830054
36FF2E28 9A36FF2E 289C36FF 2E006A00 6A006A50 FE468D16 000002C8 5756CB5E
FE76FF00 6A006A00 6A006A13 7400FE7E 8312C483 003C7D91 9A289636 FF2E2898
288E36FF 2E289036 FF2E0001 05C72866 3EC52E00 3C198B9A 0AC48300 54C0489A
830054D3 9A9A288E 36FF2E28 9036FF2E 006A006A 1674C00B 04C48300 54D3239A

```
7500013D 058B27E8 3EC52E00 3C169F9A 003C06D7 9AEC8B55 5756CB5E 5FC908C4
3EC52E0A C483003C 0FE09A35 FF285E3E C52E0054 968F9A05 D99B2882 3EC52E1C
0092E903 7400013D 058B27B8 3EC52E00 0006C857 56CB5E5F C99B0000 05C72866
E7D1FE7E 8B50FC46 8D16447D 053BFE46 8B27C43E C52EFE46 FF03EB00 00FE46C7
830CC483 0054D8DC 9A076A02 6A35FF28 B83EC52E 35FF28D6 1E8E2E28 D43E032E
2E50FC46 8D16ADEB 0AC48300 54C0489A FC76FF00 6A006A00 6A006AC2 7400FC7E
6A137400 FC7E830C C4830054 D8DC9A07 6A026A35 FF28B83E C52E35FF 28D83EC5
8D163A75 00013D05 8B27E83E C52E0AC4 830054C0 489AFC76 FF006A00 6A006A00
FA7E830C C4830054 D8DC9A07 6A026A35 FF28B83E C52E35FF 28BC3EC5 2E50FA46
6A036A50 FC468D16 2CEB0AC4 830054C0 489AFA76 FF006A00 6A006A00 6A157400
54C0489A FC76FF00 6A006A00 6A006A13 7400FC7E 830AC483 0054DABA 9A6F6A03
FC46D99B 28143EC5 2EFC5ED9 9B005445 4D9A0000 E8C85756 CB5E5FC9 0AC48300
3EC52E27 E436FF2E 27E636FF 2E3E7500 013D058B 27D43EC5 2EF85ED9 9B05D89B
0054968F 9A05D99B 27D83EC5 2E005496 8F9A05D9 9B27DC3E C52E006A 35FF27E0
9B28DC06 DC2E9B05 D99B2814 3EC52E00 0005C727 D43EC52E 18C48300 448D319A
8A9A2800 1EDC2E9B F846D99B 11770054 968A9AFF 209EDC9B F846D99B FF209EDD
C52E28EC 36C42E19 74003D83 28E43EC5 2E05DDE9 000205C7 0A7EC50A 73005496
F846D99B F4468905 8B28263E C52EF85E D99B04D8 269BF84E D89B05D9 9B28E83E
46DF9BFF 209EDD9B 10C48300 54D1809A 0054968F 9A283606 DD2E9B00 54968F9A
DE468D16 F6468908 C4830054 96EF9A00 54968F9A 282E06DC 2E9BFF20 B6DC9BF4
9BF646DF 9BEA5ED9 9B05D99B 283E3EC5 2E3C7502 DE7E8304 C4830054 64499A50
0054968F 9A05D99B 28423EC5 2EF64689 08C48300 5496EF9A 0054968F 9AEA4ED8
023D058B 28923EC5 2E0FFFF6 46C7057E 0FFFF67E 81F64601 08C48300 5496EF9A
B43EC52E 1A7E053B F6468B27 B43EC52E 5975003D 8328E43E C52E024D E9037400
04CCE900 0205C70A 7EC50A7F 04453BF6 468B27B4 3EC52E0D 7E02453B F6468B27
1E8E2E27 CC3E032E E7D1DC7E 8B0435E9 037C03DC 7E83DC46 FF03EB00 00DC46C7
032EE7D1 DC7E8B3C 7D03DC7E 83DC46FF 03EB0000 DC46C7DE EB0589F6 468B27CE
831F16FD 03E7D1DC 7E8BEE45 891F16FD 03E7D1DC 7E8B058B 27B61E8E 2E27B43E
5ED99BEE 76DE9BF0 46DF9BBB EB0001EE 45C71F16 FD03E7D1 DC7E8BCB 7500EE7D
969D9A50 042B2605 8B27CC3E C52E27B4 36C42EE2 5ED99BEE 76DE9BF2 46DF9BE6
B6DC9B02 C4830054 969D9A50 F6462B05 8B27CC3E C52EFF20 9EDD9B02 C4830054
9D9A5002 442B2602 458B27CC 3EC52E27 B436C42E EE4689F6 468BD85E D99BFF20
DF9B27CC 3EC52EFF 209EDD9B FF188EDC 9BD846D9 9BFF189E DD9B02C4 83005496
F0468B05 7E00F07E 83F04689 08C48300 5496EF9A 0054968F 9AFF20A6 DC9B0245
C4830054 969D9A50 04442B26 04458B27 CC3EC52E 27B436C4 2EF04689 C02B02EB
A6DC9B04 45DF9B27 CC3EC52E FF209EDD 9BFF188E DC9BD846 D99BFF18 9EDD9B02
89C02B02 EBF2468B 057E00F2 7E83F246 8908C483 005496EF 9A005496 8F9AFF20
27CC3EC5 2E0D7D02 453BF046 8B27CC3E C52E1A7D 053BEE46 8B27CC3E C52EF246
03DC7E83 DC46FF03 EB0000DC 46C7031A E9000205 C70A7EC5 0A7C0445 3BF2468B
EB058927 B61E8E2E 27B43E03 2EE7D1DC 7E8BEE45 8B1F16FD 03E7D1DC 7E8B1F7D
27B436FF 2E27B636 FF2E35FF 28263EC5 2E04C483 002CFBB8 9A50FF28 868D16D8
3EC52E59 75003D83 28E43EC5 2E0235E9 0CC48300 2C79689A 026A50FF 37868D16
453BF646 8B27CC3E C52E0D7D 02453BF6 468B27CC 3EC52E1A 7D053BF6 468B27CC
01E8E903 7C03DC7E 83DC46FF 03EB0000 DC46C702 7FE90002 05C70A7E C50A7C04
DC46FF03 EB0000DC 46C7DEEB 0589F646 8B27B61E 8E2E27B4 3E032EE7 D1DC7E8B
1F16FD03 E7D1DC7E 8B058B27 CE1E8E2E 27CC3E03 2EE7D1DC 7E8B1F7D 03DC7E83
36C42EE2 5ED99BEE 76DE9BF2 46DF9BE6 5ED99BEE 76DE9BF0 46DF9BD8 EBEE4589
8B27B43E C52EFF20 9EDD9B02 C4830054 969D9A50 042B2605 8B27CC3E C52E27B4
B436C42E EE4689F6 468BD85E D99BFF20 B6DC9B02 C4830054 969D9A50 052BF646
27B43EC5 2EFF209E DD9B02C4 83005496 9D9A5002 442B2602 458B27CC 3EC52E27
F07E81F0 468908C4 83005496 EF9A0054 968F9A02 45DE9BFF 208EDC9B D846D99B
04442B26 04458B27 CC3EC52E 27B436C4 2EF04689 0FFFB803 EBF0468B 057D0FFF
0445DE9B FF208EDC 9BD846D9 9B27B43E C52EFF20 9EDD9B02 C4830054 969D9A50
890FFFB8 03EBF246 8B057D0F FFF27E81 F2468908 C4830054 96EF9A00 54968F9A
8B27B43E C52E0FFF F246C705 7E0FFFF2 7E810FFF F046C705 7E0FFFF0 7E81F246
0A7F0445 3BF2468B 27B43EC5 2E0D7E02 453BF046 8B27B43E C52E1A7E 053BEE46
03E7D1DC 7E8B1F7D 03DC7E83 DC46FF03 EB0000DC 46C700E2 E9000205 C70A7EC5
9A50FF28 868D16D8 EB058927 CE1E8E2E 27CC3E03 2EE7D1DC 7E8BEE45 8B1F16FD
036A50FF 37868D16 27B436FF 2E27B636 FF2E35FF 28263EC5 2E04C483 002CFBB8
FF2E27B6 36FF2E14 7E003D83 27B03EC5 2E000105 C70A7EC5 0CC48300 2C79689A
36FF2E00 6A006A00 6A50E046 8D160044 CB7A9A06 C483002C FC9C9A12 6A27B436
6A157400 E07E8312 C483003C 7D919A28 9636FF2E 289836FF 2E289A36 FF2E289C
3EC52E00 0105C728 B23EC52E 18EB0AC4 830054C0 489AE076 FF006A00 6A006A00
5ED99B28 F006DD2E 9B000040 C85756CB 5E5FC99B 002CE999 9A057500 3D8328E4
3EC52E28 FC06DD2E 9B107500 3D8328F8 3EC52E06 2DE90374 C00B0034 E5B29AD0
FC468D16 FE468905 8B28263E C52E1DD9 9B28143E C52EEED9 9B0BEB1D D99B2814
5ED99BC8 76DC9B29 0406DF2E 9BC85EDD 9B290606 DF2E9B04 C4830054 64499A50
C52E27B4 36C42ECE 46890445 8B27B43E C52E02F6 E9037400 3D8328E4 3EC52EF4
9BF05ED9 9B27F836 DC2E9B02 C4830054 969D9A50 CE460302 44032605 8B27B43E
```

3EC52EE6 468908C4 83005496 EF9A0054 968F9A28 2E06DC2E 9BF04ED8 9BF446D9
54EFB89A 50CE462B 08C48300 5496EF9A 0054968F 9AF046D9 9BCE4689 058B27B4
0054968F 9AF046D9 9BCC4689 02458B27 B43EC52E 00F2E903 7EE6463B 02C48300
B43EC52E 00C2E903 7EE6463B 02C48300 54EFB89A 50CC462B 08C48300 5496EF9A
54EFB89A 50CA462B 08C48300 5496EF9A 0054968F 9AF046D9 9BCA4689 04458B27
C52EF85E D99B05D9 9B283E3E C52E4475 02FC7E83 0092E903 7EE6463B 02C48300
54968F9A 282E06DC 2E9BF876 D89BF046 D99BF05E D99BF06E D89B05D9 9B28423E
28001EDC 2E9BF046 D99BF05E D99B02C4 83005496 9D9A5008 C4830054 96EF9A00
0054968F 9AF076D8 9BFE46DF 9BC85ED9 9B05D99B 28143EC5 2E2B7400 54968A9A
2E9B0AEB E85ED99B 28DC06DD 2E9B16EB E85ED99B C866D89B 08C48300 54D9849A
26058B27 CC3EC52E 27CC36C4 2ECE4689 04458B27 CC3EC52E E85ED99B 290806DF
4ED89BF4 46D99BF0 5ED99B27 F836DC2E 9B02C483 0054969D 9A50CE46 03024403
4689058B 27CC3EC5 2EE44689 08C48300 5496EF9A 0054968F 9A282E06 DC2E9BF0
463B02C4 830054EF B89A50CE 462B08C4 83005496 EF9A0054 968F9AF0 46D99BCE
83005496 EF9A0054 968F9AF0 46D99BCC 46890245 8B27CC3E C52E00F1 E9037EE4
46890445 8B27CC3E C52E00C1 E9037EE4 463B02C4 830054EF B89A50CC 462B08C4
463B02C4 830054EF B89A50CA 462B08C4 83005496 EF9A0054 968F9AF0 46D99BCA
05D99B28 423EC52E F85ED99B 05D99B28 3E3EC52E 447502FC 7E830091 E9037EE4
005496EF 9A005496 8F9A282E 06DC2E9B F876D89B F046D99B F05ED99B F06ED89B
FE46DF9B C85ED99B 05D99B28 143EC52E F05ED99B 02C48300 54969D9A 5008C483
DC2E9BEC 46D99BEC 5ED99BC8 66D89B08 C4830054 D9849A00 54968F9A F076D89B
5ED99B29 0806DF2E 9B0293E9 EC5ED99B EED99B02 9DE90372 0054968A 9A28001E
28E83EC5 2E28EC36 C42EC85E DD9B28DC 06DC2E9B 05D99B28 143EC52E 0286E9EC
5EDD9B28 0006DC2E 9B05D99B 28143EC5 2ED85ED9 9B04D826 9BC84EDC 9B05D99B
9B27CC3E C52ED45E D99B04D8 269BC84E DC9B05D9 9B28E83E C52E28EC 36C42EC8
05D99B28 423EC52E F85ED99B 05D99B28 3E3EC52E 447502FC 7E83F05E D99B05DF
005496EF 9A005496 8F9A282E 06DC2E9B F876D89B F046D99B F05ED99B F06ED89B
D9849A00 54968F9A F076D89B FE46DF9B F05ED99B 02C48300 54969D9A 5008C483
968A9AC8 5EDC9BE0 46D99BC8 5EDD9BD0 66D89BD8 46D99BE0 5ED99B08 C4830054
9B0C7600 54968A9A C05EDC9B E046D99B C05EDD9B D046D89B D446D99B 1B720054
C85EDD9B 34D8269B 05D99B28 EC3EC52E 28E836C4 2E5AEBE8 5ED99B29 0806DF2E
9B28143E C52EDC5E D99BC866 DC9BE04E D89B35D8 9B290A06 DD2E9B28 E83EC52E
DC06DD2E 9B0A7600 54968A9A 28DC1EDC 2E9BE846 D99BE85E D99B25D8 9BDC46D9
9B05D99B 283E3EC5 2E447502 FC7E83F0 5ED99B05 DF9B27B4 3EC52EE8 5ED99B28
2E06DC2E 9BF876D8 9BF046D9 9BF05ED9 9BF06ED8 9B05D99B 28423EC5 2EF85ED9
9BF046D9 9BF05ED9 9B02C483 0054969D 9A5008C4 83005496 EF9A0054 968F9A28
C4830054 D9849A00 54968F9A F076D89B FE46DF9B 1B740054 968A9A28 001EDC2E
46D99BC8 5EDD9BD0 66D89BD8 46D99BE0 5ED99B28 DC06DD2E 9B0AEBE0 5ED99B08
C05EDC9B E046D99B C05EDD9B D046D89B D446D99B 1B720054 968A9AC8 5EDC9BE0
05D99B28 EC3EC52E 28E836C4 2E57EBEC 5ED99B29 0806DF2E 9B0C7600 54968A9A
D99BC866 DC9BE04E D89B35D8 9B290A06 DD2E9B28 E83EC52E C85EDD9B 34D8269B
54968A9A 28001EDC 2E9BEC46 D99BEC5E D99B25D8 9BDC46D9 9B28143E C52EDC5E
54968A9A C85EDC9B EC46D99B C85EDD9B 290806DF 2E9BEC5E D99BEED9 9B077300
E846D99B C85EDD9B 290806DF 2E9B06C4 8300447D B69A50EC 468D1601 6A0F7400
56CB5E5F C99B06C4 8300447E 469A50E8 468D1601 6A0F7400 54968A9A C85EDC9B
16006A06 C4830044 7DB69A50 FC468D16 006A1E75 C00B0034 E5B29A00 0004C857
0024E448 0024E446 00147DE6 00147B86 CB5E5FC9 06C48300 447E469A 50FC468D
004C5B94 004C5B90 004C59DA 0024F216 00147DEC 0024F210 0024F204 0024E44A
40080000 00000000 004C7C64 0024E394 0024F206 0024F20A 004C5BAA 004C5BA8
E3D10024 EFD60002 0024F1F2 0024E44C 0024E3B5 0024E3A3 00000000 00000000
7C3E4024 00000000 00003FE0 00000000 00000024 E6A80014 7DDC0024 F17A0024
F2000024 E7D60014 7B8C0014 7B9A0024 E3DA0024 F2080024 F2020014 93AE0014
E41E0024 E3E90014 951F004C 8AB4004C 8AC2004C 8ADA0024 F20C0024 F20E0024
89E40014 7CC60014 7B9E004C 5B780014 94C24000 00000000 00000024 F1FC0024
0024F29C 0014E220 00E1004C 5B7A004C 7E80004C 89EA004C 89E6004C 7F1E004C
33333333 0024F29A 0024F222 0024F220 0024F21E 0024F21C 0024E436 0024F1F6
1EB851EC 00147BF8 3F40624D D2F1A9FC 0024E442 0024E43E 00147BF6 400F3333
2E3EC52E 003C299F 9AEC8B55 57563FF0 00000000 0000FFFF 0FA00050 3FB1EB85
5E5FC902 C483003C 4D999A35 FF50323E C52E04C4 830054A4 DB9A35FF 0275FF50
3EC52E04 C4830054 A4DB9A35 FF0275FF 502E3EC5 2E003C2A 5E9AEC8B 555756CB
FF502E3E C52E003C 2B1D9AEC 8B555756 CB5E5FC9 02C48300 3C4D999A 35FF5032
56CB5E5F C902C483 003C4D99 9A35FF50 323EC52E 04C48300 54A4DB9A 35FF0275
04C48300 54A53E9A 35FF0275 FF503A3E C52E0002 05C75036 3EC52E00 0002C857
54A4509A 35FF0275 FF502E3E C52E04C4 83003C7C 959A35FF 0275FF50 3A3EC52E
35FF0275 FF502E3E C52E04C4 830054A4 DB9A35FF 0275FF50 2E3EC52E 04C48300
6A50FE46 8D1604C4 83003C7C 959A35FF 0275FF50 2E3EC52E 04C48300 3C331D9A
C483003C 7D919A50 3E36FF2E 504036FF 2E504236 FF2E5044 36FF2E00 6A006A01
5756CB5E 5FC90AC4 830054C0 489AFE76 FF006A00 6A006A00 6A137400 FE7E8312
2E04C483 0054A53E 9A35FF02 75FF503A 3EC52E00 0105C750 363EC52E 000002C8

0054A450 9A35FF02 75FF502E 3EC52E04 C483003C 7C959A35 FF0275FF 503A3EC5
9A35FF02 75FF502E 3EC52E04 C4830054 A4DB9A35 FF0275FF 502E3EC5 2E04C483
016A50FE 468D1604 C483003C 7C959A35 FF0275FF 502E3EC5 2E04C483 003C331D
12C48300 3C7D919A 503E36FF 2E504036 FF2E5042 36FF2E50 4436FF2E 006A006A
C85756CB 5E5FC90A C4830054 C0489AFE 76FF006A 006A006A 006A1374 00FE7E83
C52E04C4 830054A5 3E9A35FF 0275FF50 3A3EC52E 000305C7 50363EC5 2E000002
830054A4 509A35FF 0275FF50 2E3EC52E 04C48300 3C7C959A 35FF0275 FF503A3E
1D9A35FF 0275FF50 2E3EC52E 04C48300 54A4DB9A 35FF0275 FF502E3E C52E04C4
6A016A50 FE468D16 04C48300 3C7C959A 35FF0275 FF502E3E C52E04C4 83003C33
8312C483 003C7D91 9A503E36 FF2E5040 36FF2E50 4236FF2E 504436FF 2E006A00
02C85756 CB5E5FC9 0AC48300 54C0489A FE76FF00 6A006A00 6A006A13 7400FE7E
959A35FF 0275FF50 3A3EC52E 04C48300 54A53E9A 35FF0275 FF503A3E C52E0000
6A006A50 FE468D16 04C48300 54A4509A 35FF0275 FF502E3E C52E04C4 83003C7C
2E12C483 0054B36A 9A503E36 FF2E5040 36FF2E50 4236FF2E 504436FF 2E006A00
503A3EC5 2E000002 C85756CB 5E5FC904 C4830054 A4DB9A35 FF0275FF 502E3EC5
1604C483 003C7C95 9A35FF02 75FF503A 3EC52E04 C4830054 A53E9A35 FF0275FF
6A9A503E 36FF2E50 4036FF2E 504236FF 2E504436 FF2E006A 006A006A 50FE468D
83003C7C 959A35FF 0275FF50 2E3EC52E 000002C8 5756CB5E 5FC912C4 830054B3
3E36FF2E 504036FF 2E504236 FF2E5044 36FF2E00 6A006A01 6A50FE46 8D1604C4
A5809A35 FF0275FF 502E3EC5 2E000002 C85756CB 5E5FC912 C4830054 B36A9A50
006A016A 50FE468D 1604C483 003C7C95 9A35FF02 75FF502E 3EC52E04 C4830054
C52E12C4 830054B3 6A9A503E 36FF2E50 4036FF2E 504236FF 2E504436 FF2E006A
EB0000FE 46C70000 42C85756 CB5E5FC9 04C48300 54A4A89A 35FF0275 FF502E3E
8B35FF02 75FF504C 1E8E2E50 4A3E032E 02E7C1FE 7E8B347D 03FE7E83 FE46FF03
C52EC3EB 08C48300 3C4C249A 35FF0275 FF50481E 8E2E5046 3E032E02 E7C1FE7E
9A005496 8F9A505E 0EDC2E9B 05DF9B50 5A3EC52E 0589504E 3EC52E05 8B50523E
36FF2E50 6636FF2E 506836FF 2E50FC46 8D160589 50563EC5 2E08C483 005496EF
6E3EC52E EC468905 2BFC468B 504E3EC5 2E0CC483 003C4CA0 9A504A36 FF2E504C
D99B506A 3EC52EF1 2B0A458E 087503E6 D1EC768B 50463EC5 2EC88BE0 D1058B50
03E6D1EC 768B5046 3EC52EC8 8BE0D105 8B506E3E C52ED85E DD9B0CDE 269B0845
D1058B50 6E3EC52E E05EDD9B 0CDE269B 0445D99B 506A3EC5 2EF12B06 458E0475
0CDE269B 05D99B50 6A3EC52E F12B0245 8E3503E6 D1EC768B 50463EC5 2EC88BE0
8B50723E C52EDC5E DD9B505E 0EDC2E9B 0E46DF9B F05ED99B D846DC9B E046DC9B
03024403 26058B50 663EC52E 506636C4 2EE64689 04458B50 663EC52E E4468905
D99BF45E D99BF046 D99BF85E D99BDC66 DC9B02C4 83005496 9D9A50E4 4603E646
830054C0 489A2717 68006A00 6A006A00 6A1F7700 54968A9A 50761EDC 2E9BF446
9B057300 54968A9A 50761EDC 2E9BF846 D99B01FB E91DD99B 107EC5EE D99B0AC4
EB507E06 DD2E9B08 76005496 8A9A507E 1EDC2E9B F476D89B F846D99B 04EBEED9
9BF476D8 9BF846D9 9B04EBEE D99B0573 0054968A 9A50761E DC2E9BF8 46D99B1E
45DF9B50 663EC52E C65EDD9B 0C4DD89B EC4EDE9B E846D99B 506A3EC5 2EE85ED9
723EC52E 0A730054 968A9ACE 5EDC9B05 DF9B5072 3EC52ECE 5EDD9BC6 46DC9B06
50663EC5 2EBE5EDD 9B0C4DD8 9BEC4EDE 9BE846D9 9B506A3E C52E22EB 05DF9B50
04458B50 663EC52E DE5EDD9B F04ED89B E846D99B D65EDD9B BE46DC9B 0645DF9B
9B02C483 0054969D 9A50E646 03024403 26058B50 663EC52E 506636C4 2EE64689
5E36DC2E 9BEE46DF 9BEE4689 08C48300 5496EF9A 0054968F 9AD646DC 9BDE66DC
E9037C0E 463BEE46 8BEE4689 08C48300 5496EF9A 0054968F 9A508606 DC2E9B50
50663EC5 2EE44689 06458B50 663EC52E DC5EDD9B 505E0EDC 2E9B0E46 DF9B00BD
969D9A50 E44603E6 46030244 0326058B 50663EC5 2E506636 C42EE646 8904458B
D99BE05E DD9BEC4E DE9B0C45 D99B506A 3EC52EF8 5ED99BDC 66DC9B02 C4830054
04EBEED9 9B057300 54968A9A 50761EDC 2E9BF846 D99BF45E D99BE066 DC9BF046
46D99B1E EB507E06 DD2E9B08 76005496 8A9A507E 1EDC2E9B F476D89B F846D99B
9BE85ED9 9BF476D8 9BF846D9 9B04EBEE D99B0573 0054968A 9A50761E DC2E9BF8
504E3EC5 2E058B50 523EC52E 000034C8 5756CB5E 5FC99B1D D99B107E C5E846D9
1E8E2E50 4A3E032E 02E7C1FE 7E8B347D 03FE7E83 FE46FF03 EB0000FE 46C70589
3C4C249A 35FF0275 FF50481E 8E2E5046 3E032E02 E7C1FE7E 8B35FF02 75FF504C
C4830054 96EF9A00 54968F9A 505E0EDC 2E9B05DF 9B505A3E C52EC3EB 08C48300
4A36FF2E 504C36FF 2E506636 FF2E5068 36FF2E50 FC468D16 05895056 3EC52E08
8BE0D105 8B506E3E C52EEE46 89052BFC 468B504E 3EC52E0C C483003C 4CA09A50
0CDE269B 0845D99B 506A3EC5 2EF12B0A 458E0875 03E6D1EE 768B5046 3EC52EC8
2B06458E 047503E6 D1EE768B 50463EC5 2EC88BE0 D1058B50 6E3EC52E DE5EDD9B
3EC52EC8 8BE0D105 8B506E3E C52EE65E DD9B0CDE 269B0445 D99B506A 3EC52EF1
DC9BE646 DC9B0CDE 269B05D9 9B506A3E C52EF12B 02458E35 03E6D1EE 768B5046
50663EC5 2ED45EDD 9B0E4EDC 9B0C4DD8 9BEE46DF 9B506A3E C52EF05E D99BDE46
2E0A7300 54968A9A DC5EDC9B 05DF9B50 723EC52E DC5EDD9B D446DC9B 0645DF9B
C52ECC5E DD9B0E4E DC9B0C4D D89BEE46 DF9B506A 3EC52E22 EB05DF9B 50723EC5
2E506636 C42EEC46 8904458B 50663EC5 2EE45EDD 9BCC46DC 9B0645DF 9B50663E
D99BF85E D99BE446 DC9B02C4 83005496 9D9A50EC 46030244 0326058B 50663EC5
505E36DC 2E9BE666 DC9BF846 D99BE65E DD9B0E4E DC9BF446 D99BF45E D99BF046
C85756CB 5E5FC99B 0589167E C508C483 005496EF 9A005496 8F9A5086 06DC2E9B

000005C7 50983EC5 2E158950 8E3EC52E 50963EF7 2E99058B 50923EC5 2E000012
D99B509C 3EC52E24 D8269B50 7E06DD2E 9B50A036 C42E02BC E9058B50 363EC52E
4C1E8E2E 504A3E03 2E02E7C1 FE7E8B34 7D03FE7E 83FE46FF 03EB0000 FE46C71D
003C4C24 9A35FF02 75FF5048 1E8E2E50 463E032E 02E7C1FE 7E8B35FF 0275FF50
FF0C76FF 000005C7 50A83EC5 2E000005 C750A43E C52E003C 490F9AC3 EB08C483
83003C40 389A0A76 FF0C76FF 0E74003D 8350983E C52E04C4 83003C38 929A0A76
35FF0275 FF50AC3E C52E0225 E9037F04 3B26058B 50A83EC5 2E509236 C42E04C4
9B509C3E C52E24D8 269B507E 06DD2E9B 50A036C4 2E0210E9 04C48300 54DC759A
1E8E2E50 4A3E032E 02E7C1FE 7E8B347D 03FE7E83 FE46FF03 EB0000FE 46C71DD9
3C4C249A 35FF0275 FF50481E 8E2E5046 3E032E02 E7C1FE7E 8B35FF02 75FF504C
0C76FF00 0005C750 A83EC52E 000005C7 50A43EC5 2E003C49 0F9AC3EB 08C48300
003C3620 9A0A76FF 0C76FF0E 74003D83 50983EC5 2E04C483 003C3892 9A0A76FF
FF0275FF 50AC3EC5 2E0164E9 037F043B 26058B50 A83EC52E 509236C4 2E04C483
C42E0589 50B03EC5 2E042B26 00FFB850 5236C42E 014FE904 C4830054 DC759A35
9B50B03E C52EEE5E DD9B02C4 83005496 9D9A5004 2B26058B 50B43EC5 2E509236
54968F9A F646DC9B 05DF9B50 923EC52E F65EDD9B 50B836DC 2E9BEE4E DC9B05DF
2E9B50C0 36DC2E9B 05DF9B50 B03EC52E 058950B0 3EC52E08 C4830054 96EF9A00
0000FE46 C7058950 B03EC52E 04E0C108 C4830054 96EF9A00 54968F9A 508606DC
02E7C1FE 7E8B5068 068E2E50 6636032E E6D1FE76 8B417D04 FE7E83FE 46FF03EB
3E032E02 E7C1FE7E 8B24DE26 9B505E0E DC2E9B05 D99B50CE 1E8E2E50 CC3E032E
54969D9A 50042B26 058B50B0 3EC52E50 9236C42E B6EB1DD9 9B50CA1E 8E2E50C8
76FF0000 05C750A8 3EC52E00 0005C750 A43EC52E 1DD99B50 D03EC52E 02C48300
3C407C9A 0A76FF0C 76FF2574 003D8350 983EC52E 04C48300 3C38929A 0A76FF0C
CB5E5FC9 9B34CC34 0B334A36 15A7FF2E D88BE0D1 0F770002 3D4815EB 04C48300
6A3C00D6 46C76000 E846C740 00E646C7 2000E446 C70000E2 46C70000 38C85756
E076FF02 30E90375 DE460BE0 468BE056 89DE4689 04C48300 54DC339A D676FF02
89E0568B DE468B04 C4830034 53349ADE 76FFE076 FF04C483 0034398C 9ADE76FF
037C1400 FE7E81FE 46FF03EB 0000FE46 C7003C51 EB9A003C 54E69ADC 5689DA46
8B1F16FD 03E7D1FC 7E8B0088 E9037C04 FC7E83FC 46FF03EB 0000FC46 C701DCE9
003D8350 D43EC52E F245891F 16FD03E7 D1FC7E8B 058B0C5E 8E0A7E03 E7D1E27D
EBF2458B 1F16FD03 E7D1FC7E 8B0E7D00 FF3DF245 8B1F16FD 03E7D1FC 7E8BC874
03E7D1FC 7E8B0E7D 00FF3DF2 458B1F16 FD03E7D1 FC7E8B24 7E00003D 00FFB803
7EC5FF6C E9F24589 1F16FD03 E7D1FC7E 8BC02B02 EB00FFB8 07EBF245 8B1F16FD
1650D246 8D1650D0 468D16D8 4689058B DA7EC505 EB00FFB8 057E00FF 3D058BDA
D0463BD2 468B0092 E90374D2 463BD446 8B0EC483 003C6A04 9AFE76FF 50D4468D
03EB04E0 C1D4468B 087D00FF 3D04E0C1 D4468B7F 75D0463B D4468B00 87E90374
89058B50 DE1E8E2E 50DC3E03 2EE7D13D 8B50D83E C52E0589 50D83EC5 2E00FFB8
8B50D83E C52EEC46 89058B50 E21E8E2E 50E03E03 2EE7D13D 8B50D83E C52EEA46
50E83E03 2EE7D13D 8B50D83E C52EEE46 89058B50 E61E8E2E 50E43E03 2EE7D13D
C483003C 68A09AFE 76FF50C8 468D1650 FA468D16 33EBF046 89058B50 EA1E8E2E
8312C483 003C4155 9A50F246 8D1650EA 468D1600 54968F9A C846DD9B D876FF0A
8B1F16FD 03E7D1FC 7E8BFE40 E9037C04 FC7E83FC 46FF03EB 0000FC46 C706DA46
FFCBEB05 890C5E8E 0A7E03E7 D1E244FF 26E27C8B 260716F5 03E6D1FC 768BEA45
0005C750 983EC52E 000076C8 5756CB5E 5FC99B04 C4830054 DC759ADE 76FFE076
4689E646 89E84689 FE468B01 65E9037C 0100FE7E 81FE46FF 03EB0000 FE46C700
3D8350D4 3EC52E0C C4830054 5B789A50 E4468D16 50F4468D 160A76FF 0C76FFE4
3DF4458B 1F16FD03 E7D1FC7E 8B5B7D04 FC7E83FC 46FF03EB 0000FC46 C76B7400
03E7D1FC 7E8B247E 00003D00 FFB803EB F4458B1F 16FD03E7 D1FC7E8B 0E7D00FF
C02B02EB 00FFB807 EBF4458B 1F16FD03 E7D1FC7E 8B0E7D00 FF3DF445 8B1F16FD
17750003 3D058B50 363EC52E EA4689FE 468B9CEB F445891F 16FD03E7 D1FC7E8B
1650EC46 8D16EA76 FF15EB0A C483003C 47A39A50 F4468D16 50EC468D 16EA76FF
0589EC46 8B50DE1E 8E2E50DC 3E032EE7 D1FE7E8B 0AC48300 3C44889A 50F4468D
8E2E50E4 3E032EE7 D1FE7E8B 0589EE46 8B50E21E 8E2E50E0 3E032EE7 D1FE7E8B
00FC46C7 0589F246 8B50EA1E 8E2E50E8 3E032EE7 D1FE7E8B 0589F046 8B50E61E
3E032EE7 D1FC7E8B 0716F503 E6D1FC76 8BFEB9E9 037C04FC 7E83FC46 FF03EB00
8B50363E C52EC9EB 000105C7 50983EC5 2ED474F4 443B2605 8B50DE1E 8E2E50DC
36C42E02 71E9037F 043B2605 8B50A83E C52E5092 36C42E03 A8E90375 00033D05
10C68335 8B50A83E C52E0589 50A83EC5 2E040326 04E0C105 8B50EC3E C52E50A8
8B50EA1E 8E2E50E8 3E032EE7 D13D8B50 A83EC52E 50EA068E 2E50E836 032EE6D1
06DD2E9B 50A83EC5 2EB45EDD 9B50C036 DC2E9B02 C4830054 969D9A50 042B2605
50A836C4 2E9C5EDD 9B25DE9B 50B806DD 2E9B5092 3EC52EBC 5EDD9B25 DE9B50B8
DD9BB476 DC9B25DE 9BB44EDC 9BBC46DD 9B50EA1E 8E2E50E8 3E032EE7 D13C8B26
DE269B05 DF9B50EA 1E8E2E50 E83E032E E7D13D8B 50A83EC5 2E507236 C42EC45E
46DD9BAC 5EDD9BE0 D99B08C4 830054D9 849A0054 968F9AAC 46DD9BAC 5EDD9B34
968F9AA4 46DD9BA4 5EDD9B8A 76DC9BC4 66DC9BBC 46DD9B8A 5EDD9BC4 66DC9B9C
3EC52E94 5EDD9BA4 76DC9BE0 D99BAC46 DD9BA45E DD9B08C4 830054D9 849A0054
026A9246 8940042B 26058B50 E83EC52E 50EA068E 2E50E836 032EE6D1 358B50A8
8BFE46FF 03EB0000 FE46C702 55890589 50AC3EC5 2E04C483 0054DC33 9A9276FF
C52EDEEB FC1805C7 025C8E26 3C0326E7 D1FE7E8B 50AC36C4 2E177392 463BFE46

8B50A83E C52E0589 50F03EC5 2E058B50 EA1E8E2E 50E83E03 2EE7D13D 8B50A83E
C4830054 969D9A50 FE462B00 FFB800A5 E9037D00 FE7E83FE 4EFF03EB FE468905
5EDD9B8A 76DC9BC4 66DC9BCC 46DD9B8A 5EDD9BC4 66DC9B9C 46DD9BCC 5EDD9B02
2E8A5EDD 9B10C483 0054D180 9A005496 8F9ACC46 DD9B0054 968F9A94 46DD9BCC
EF9A0054 968F9A50 8606DC2E 9BAC46DD 9BAC5EDD 9B8A4EDC 9B05DF9B 50723EC5
50E83E03 2EE7D1FE 7E8B50AC 36C42ECA 8BE2D115 8B50F03E C52E08C4 83005496
FF50AC3E C52E9276 FFFF4FE9 0589F92B 025C8E26 3C0326E7 D13D8B50 EA1E8E2E
46FF03EB 0000FE46 C703E805 C750F03E C52E09EB 06C48300 3C6FC19A 35FF0275
2EE6D1FE 768B50DE 1E8E2E50 DC3E032E E7D1FE7E 8B0106E9 037C0100 FE7E81FE
50E21E8E 2E50E03E 032EE7D1 FE7E8B05 89042B26 00FFB850 DE068E2E 50DC3603
E43E032E E7D1FE7E 8B058904 2B2600FF B850E206 8E2E50E0 36032EE6 D1FE768B
36C42E05 89042B26 00FFB850 E6068E2E 50E43603 2EE6D1FE 768B50E6 1E8E2E50
8B058B50 AC3EC52E 507C043B 26058B50 EA1E8E2E 50E83E03 2EE7D1FE 7E8B50F0
1E8E2E50 E83E032E E7D1FE7E 8BC88BE0 D1058B50 F03EC52E 9056898E 46890255
8E2E50E8 3E032EE7 D1FE7E8B 042B2600 FFB8F12B 90468E8E 7603E6D1 358B50EA
E836032E E6D1FE76 8B50EA1E 8E2E50E8 3E032EE7 D1FE7E8B FF16E905 8950EA1E
C52E0255 E9037500 3D835098 3EC52EFE EDE90589 042B2600 FFB850EA 068E2E50
16058950 F43EC52E 50963EF7 2E99058B 50923EC5 2E0248E9 0375003D 83508E3E
DC36FF2E 50DE36FF 2E35FF50 923EC52E 5004E0C1 40058B50 F43EC52E 50D4468D
FF50923E C52E5004 E0C14005 8B50F43E C52E50D8 468D160C C483003C 40C09A50
40058B50 F43EC52E 50DC468D 160CC483 003C40C0 9A50E036 FF2E50E2 36FF2E35
468D160C C483003C 40C09A50 E436FF2E 50E636FF 2E35FF50 923EC52E 5004E0C1
9A50E836 FF2E50EA 36FF2E35 FF50923E C52E5004 E0C14005 8B50F43E C52E50E0
0173E903 7D00FE7E 83FE4EFF 03EBFE46 8948058B 50923EC5 2E0CC483 003C40C0
9B8A4EDC 9BD446D9 9B8A5EDD 9B02C483 0054969D 9A50FE46 2B058B50 923EC52E
3E032EE7 D13D8B50 923EC52E F08B08C4 83005496 EF9A0054 968F9A50 8606DC2E
923EC52E 058950DE 1E8E2E50 DC3E032E E7D1FE7E 8BC62B05 8B50DE1E 8E2E50DC
8606DC2E 9B8A4EDC 9BD846D9 9B8A5EDD 9B02C483 0054969D 9A50FE46 2B058B50
8E2E50E0 3E032EE7 D13D8B50 923EC52E F08B08C4 83005496 EF9A0054 968F9A50
2B058B50 923EC52E 058950E2 1E8E2E50 E03E032E E7D1FE7E 8BC62B05 8B50E21E
968F9A50 8606DC2E 9B8A4EDC 9BDC46D9 9B8A5EDD 9B02C483 0054969D 9A50FE46
8B50E61E 8E2E50E4 3E032EE7 D13D8B50 923EC52E F08B08C4 83005496 EF9A0054
9A50FE46 2B058B50 923EC52E 058950E6 1E8E2E50 E43E032E E7D1FE7E 8BC62B05
EF9A0054 968F9A50 8606DC2E 9B8A4EDC 9BE046D9 9B8A5EDD 9B02C483 0054969D
8BC62B05 8B50EA1E 8E2E50E8 3E032EE7 D13D8B50 923EC52E F08B08C4 83005496
54D49AEC 8B555756 CB5E5FC9 9BFE81E9 058950EA 1E8E2E50 E83E032E E7D1FE7E
50E036FF 2E50E236 FF2E50E4 36FF2E50 E636FF2E 50E836FF 2E50EA36 FF2E003C
8B555756 CB5E5FC9 14C48300 3C55409A 0A76FF0C 76FF50DC 36FF2E50 DE36FF2E
2E50E236 FF2E50E4 36FF2E50 E636FF2E 50E836FF 2E50EA36 FF2E003C 54F89AEC
CB5E5FC9 14C48300 3C55409A 0A76FF0C 76FF50DC 36FF2E50 DE36FF2E 50E036FF
EC5EDD9B EED99BFC 5ED99B02 C4830054 969D9A50 0E462B10 468B0000 14C85756
FC46D99B 07EBFC46 D99B0676 0054968A 9AF45EDC 9BFC46D9 9BF45EDD 9BEED99B
7E03E7D1 107E8B0C 468E0A76 03E6D10E 768B3076 0054968A 9AEC5EDC 9BE0D99B
2E9B12EB 1DD99B12 7EC5FC76 D89B02C4 83005496 9D9A5004 2B26058B 0C5E8E0A
0000FE46 C700002C C85756CB 5E5FC99B 1DD99B12 7EC550F8 36DC2E9B 507E06DD
468E0A76 03E6D1FE 768B105E 8E0E7E03 E7D1FE7E 8B207D04 FE7E83FE 46FF03EB
504A36FF 2E504C36 FF2E0E76 FF1076FF 50FC468D 16D7EB05 89042B26 00FFB80C
2BFC468B 504E3EC5 2E029CE9 037D053B FC468B50 4E3EC52E 0CC48300 3C4CA09A
8902458B 0E7EC506 EB058B0E 7EC5077D 02443B26 058B0E7E C50E76C4 FC468905
46C7F65E D99B0445 DF9B0E7E C507EBFA 46DF9B06 7D04453B FA468B0E 7EC5FA46
C1FE768B C88BE0D1 058B506E 3EC52E01 E3E9037C 03FE7E83 FE46FF03 EB0000FE
D1FE7E8B 058BF92B 025C8E26 3C0326E7 D1FC7E8B 5048068E 2E504636 032E02E6
7E8B1874 0054968A 9ADC5EDC 9BF646D9 9BDC5EDD 9BEED99B E445891F 16FD03E7
3EC52EF2 5ED99BEE D99B07EB F25ED99B 35DE9BF6 46D99B10 5E8E0E7E 03E7D1FE
7C00FC7E 830081E9 037C0100 FC7E8100 93E9EE5E D99BE8D9 9B0A7400 3D835100
E7C1FC7E 8B510A06 8E2E5108 36032E02 E6C1FE76 8B677400 3D835104 3EC52E7B
9B507E06 DD2E9BDC 5EDD9B12 4EDC9B25 D89B507E 06DD2E9B 025C8E26 3C032602
F246D99B 0A730054 968A9A50 7E1EDC2E 9BEA76D8 9BF246D9 9BEA5ED9 9BDC66DC
F246D99B 08EBEE5E D99BF246 D99B12EB EE5ED99B 507E06DD 2E9B06EB EA76D89B
D99BEED9 9B077E04 3B26058B 105E8E0E 7E03E7D1 FE7E8B51 0C36C42E EE5ED99B
9BEE46D9 9B1F16FD 03E7D1FE 7E8B506C 068E2E50 6A36032E 02E6C1FE 768BEE5E
DC2E9BDC 66DC9B05 DF9B105E 8E0E7E03 E7D1FE7E 8BDC5EDD 9B0CD826 9BE44DDE
C1FE768B 48EB08C4 83005496 EF9A0054 968F9AEE D99B1273 0054968A 9A50761E
D8269BE4 4DDE9BEE 46D99B1F 16FD03E7 D1FE7E8B 506C068E 2E506A36 032E02E6

5496EF9A 0054968F 9AD466DC 9B05DF9B 105E8E0E 7E03E7D1 FE7E8BD4 5EDD9B0C
4EDE9B0C 45D99B50 6A3EC52E FE11E905 89105E8E 0E7E03E7 D1FE7E8B 08C48300
C550F036 C42E0645 010E7EC5 FC468BFC 468908C4 83005496 EF9A0054 968F9AFC
067D8B0E 7EC550AC 36C42EC8 8BE0D105 8B50F03E C52E297C 043B2606 458B0E7E
FE7E83FE 46FF03EB 0000FE46 C7064589 0E7EC505 8BF92B02 5C8E263C 0326E7D1
89042B26 00FFB810 468E0E76 03E6D1FE 768B105E 8E0E7E03 E7D1FE7E 8B207D04
7E8B207D 04FE7E83 FE46FF03 EB0000FE 46C70000 24C85756 CB5E5FC9 9BD7EB05
8D16D7EB 0589042B 2600FFB8 0C468E0A 7603E6D1 FE768B10 5E8E0E7E 03E7D1FE
504E3EC5 2E0CC483 003C4CA0 9A504A36 FF2E504C 36FF2E0E 76FF1076 FF50FC46
26058B0E 7EC50E76 C4FC4689 052BFC46 8B504E3E C52E02B4 E9037D05 3BFC468B
067D0445 3BFA468B 0E7EC5FA 46890245 8B0E7EC5 06EB058B 0E7EC507 7D02443B
7C03FE7E 83FE46FF 03EB0000 FE46C7F6 5ED99B04 45DF9B0E 7EC507EB FA46DF9B
03E7D1FE 7E8B1874 0054968A 9AE45EDC 9BF646D9 9BE45EDD 9BEED99B 01D5E903
058B506E 3EC52EF2 5ED99BEE D99B07EB F25ED99B 35DE9BF6 46D99B10 5E8E0E7E
025C8E26 3C0326E7 D1FC7E8B 5048068E 2E504636 032E02E6 C1FE768B C88BE0D1
FE768B00 AAE90375 003D8351 043EC52E EC45891F 16FD03E7 D1FE7E8B 058BF92B
DD9BEC4C DE269B05 D99B506C 1E8E2E50 6A3E032E 02E7C1FE 7E8B0716 F503E6D1
73005496 8A9A5076 1EDC2E9B E466DC9B 05DF9B10 5E8E0E7E 03E7D1FE 7E8BE45E
C1FE7E8B 0716F503 E6D1FE76 8B44EB08 C4830054 96EF9A00 54968F9A EED99B12
0E7E03E7 D1FE7E8B DC5EDD9B EC4CDE26 9B05D99B 506C1E8E 2E506A3E 032E02E7
8E0E7E03 E7D1FE7E 8B08C483 005496EF 9A005496 8F9ADC66 DC9B05DF 9B105E8E
1F16FD03 E7D1FE7E 8B506C06 8E2E506A 36032E02 E6C1FE76 8BFED1E9 0589105E
DC9B05DF 9B105E8E 0E7E03E7 D1FE7E8B E45EDD9B 0CD8269B EC4DDE9B F246D99B
EB08C483 005496EF 9A005496 8F9AEED9 9B127300 54968A9A 50761EDC 2E9BE466
DE9BF246 D99B1F16 FD03E7D1 FE7E8B50 6C068E2E 506A3603 2E02E6C1 FE768B48
54968F9A DC66DC9B 05DF9B10 5E8E0E7E 03E7D1FE 7E8BDC5E DD9B0CD8 269BEC4D
D99B506A 3EC52EFE 1FE90589 105E8E0E 7E03E7D1 FE7E8B08 C4830054 96EF9A00
2E064501 0E7EC5FC 468BFC46 8908C483 005496EF 9A005496 8F9AFC4E DE9B0C45
50A43EC5 2E097E04 3B260645 8B0E7EC5 507236C4 2E197E05 3B12468B 50923EC5
468B207D 043B2606 458B0E7E C5507236 C42E3074 003D8350 A43EC52E 000105C7
C99B0000 05C750A4 3EC52E05 8950A83E C52E1246 8B1375D2 0B50963E F72E9912
7E03E7D1 FE7E8B20 7D04FE7E 83FE46FF 03EB0000 FE46C700 0012C857 56CB5E5F
468B50B0 3EC52ED7 EB058904 2B2600FF B80C468E 0A7603E6 D1FE768B 105E8E0E
8A9AEE5E DC9B05D9 9B50D03E C52EEE5E DD9B5110 06DF2E9B 00ACE903 7E053B12
9A501246 2B058B50 B03EC52E EE5ED99B 05D99B50 D03EC52E 008CE903 77005496
F646D99B 0054968F 9A05D99B 51123EC5 2EF65ED9 9BEE76D8 9B02C483 0054969D
7D04FE7E 83FE46FF 03EB0000 FE46C7FA 5ED99B10 C4830054 D1809A00 54968F9A
96EF9A00 54968F9A FA4ED89B 05D99B50 CA1E8E2E 50C83E03 2E02E7C1 FE7E8B33
7E83FE46 FF03EB00 00FE46C7 C4EB0501 105E8E0E 7E03E7D1 FE7E8B08 C4830054
5E8E0E7E 03E7D1FE 7E8B0F7D 017F3D05 8B105E8E 0E7E03E7 D1FE7E8B 667D04FE
8B0F7D01 7F3D058B 105E8E0E 7E03E7D1 FE7E8B26 7EFF803D 017FB803 EB058B10
E7D1FE7E 8BC62B00 FFB8FF80 BE03EB01 7FBE08EB 358B105E 8E0E7E03 E7D1FE7E
83FC46FF 03EB0000 FC46C700 000CC857 56CB5E5F C99B91EB 0589105E 8E0E7E03
D99B05D9 9B50A03E C52EE67D 0200FE7E 81FE46FF 03EB0000 FE46C76D 7D03FC7E
DF9B025C 8E263C03 26E7D1FE 7E8B504C 068E2E50 4A36032E 02E6C1FC 768BF45E
068E2E50 4A36032E 02E6C1FC 768B08C4 83005496 EF9A0054 968F9AF4 4ED89B05
9B05DF9B 50523EC5 2E50A036 C42E9AEB 0589025C 8E263C03 26E7D1FE 7E8B504C
16C85756 CB5E5FC9 9B058950 4E3EC52E 08C48300 5496EF9A 0054968F 9A0CD826
46C704C4 83003C6D 999A35FF 0275FF51 163EC52E 1274003D 8351043E C52E0000
FA468BF6 4689FA46 8BF44689 FA468B01 65E9037D 00FA7E83 FA4EFF03 EB00FFFA
C70CC483 00545B78 9A50F446 8D1650EC 468D1635 FF0275FF 503A3EC5 2EF84689
16F503E6 D1FC768B 1F16FD03 E7D1FC7E 8B1E7D04 FC7E83FC 46FF03EB 0000FC46
EC7E8B51 1A36C42E C88BE0D1 058B506E 3EC52ED9 EBEC4589 EC442B26 00FFB807
511A36C4 2EC88BE0 D1058B50 6E3EC52E 0589F246 8BF92B02 5C8E263C 0326E7D1
2EC88BE0 D1058B50 6E3EC52E 0589F246 8BF92B06 5C8E2604 7C0326E7 D1EE7E8B
003D8351 043EC52E 0589F246 8BF92B0A 5C8E2608 7C0326E7 D1F07E8B 511A36C4
5C8E263C 0326E7D1 EC7E8B51 1636C42E C88BE0D1 058B506E 3EC52EFF 20E90375
3C0326E7 D1EA7E8B 504636C4 2EC88BE0 D1058B50 6E3EC52E EA468905 8BF92B02
E7D1EA7E 8B504636 C42EC88B E0D1058B 506E3EC5 2E0589EC 468BF92B 025C8E26
8B504636 C42EC88B E0D1058B 506E3EC5 2E0589EE 468BF92B 065C8E26 047C0326
0374003D 8351043E C52EFE8F E90589F0 468BF92B 0A5C8E26 087C0326 E7D1EA7E
7E0303E7 C1FE7E8B 00A8E903 7C12463B FE468BFE 46FF03EB 0000FE46 C700BDE9
158B506E 3EC52E05 8B105E8E 0E7E0347 4703E7C1 FE7E8BEA 4689058B 105E8E0E
8303E7C1 FE7E8B05 89F92B02 5C8E263C 0326E7D1 EA7E8B50 4636C42E CA8BE2D1

26E7D1EA 7E8B5046 36C42ECA 8BE2D115 8B506E3E C52E058B 105E8E0E 7E0304C7
6E3EC52E 058B105E 8E0E7E03 06C78303 E7C1FE7E 8B0589F9 2B065C8E 26047C03
FF4AE905 89F92B0A 5C8E2608 7C0326E7 D1EA7E8B 504636C4 2ECA8BE2 D1158B50
E7D1FE7E 8B117D02 00FE7E81 FE46FF03 EB0000FE 46C70000 04C85756 CB5E5FC9
3EC52E31 7D017FFE 7E81FE46 FF03EBFF 80FE46C7 E5EBFC18 05C7105E 8E0E7E03
D1FC7E2B 3D8B0C5E 8E0A7E03 E7D13C2B 26FE7E8B 506E36C4 2EFC4689 058B506E
CB5E5FC9 04C48300 3C6D999A 0E76FF10 76FFC5EB 0589FE46 8B105E8E 0E7E03E7
047C0326 E7D1027D 8B0E7EC5 0A76C4C8 8BE0D105 8B506E3E C52E0000 06C85756
E7D13D8B 0E7EC50A 76C4C88B E0D1058B 506E3EC5 2EFC4689 058BF92B 065C8E26
7EC50A76 C4C88BE0 D1058B50 6E3EC52E 227DFC46 3B058BF9 2B025C8E 263C0326
0A76C4C8 8BE0D105 8B506E3E C52E22EB 058BF92B 025C8E26 3C0326E7 D13D8B0E
0A558B08 458B0A7E C5FE4689 058BF92B 065C8E26 047C0326 E7D1027D 8B0E7EC5
2BFC468E FA7603E6 D104758B 0E7EC5C8 8BE0D105 8B506E3E C52EFC56 89FA4689
8B0E7EC5 0A76C4C8 8BE0D105 8B506E3E C52E22EB FE468B05 7D043B26 FE468BF1
2E000012 C85756CB 5E5FC905 89127EC5 058BF92B 0A5C8E26 087C0326 E7D1047D
0CC48300 545B789A 50B436FF 2E50B636 FF2E50F6 468D1635 FF0275FF 502E3EC5
C4830054 5B789A50 9236FF2E 509436FF 2E50EE46 8D1635FF 0275FF50 2E3EC52E
0E7D00F6 7D831F16 FD03E7D1 FE7E8B7B 7D04FE7E 83FE46FF 03EB0000 FE46C70C
8B0E7E00 FF3DF645 8B1F16FD 03E7D1FE 7E8B0000 F645C71F 16FD03E7 D1FE7E8B
D1FE7E8B 0E7D00EE 7D831F16 FD03E7D1 FE7E8B00 FFF645C7 1F16FD03 E7D1FE7E
E7D1FE7E 8B8D7E00 FF3DEE45 8B1F16FD 03E7D1FE 7E8B0000 EE45C71F 16FD03E7
F87E8143 7500FFF6 7E812A74 013D8051 1E3EC52E FF7CE900 FFEE45C7 1F16FD03
207500FF F27E8127 7500FFF0 7E812E75 00FFEE7E 81357500 FFFA7E81 3C7500FF
E7EB0000 EE45C71F 16FD03E7 D1FE7E8B 527D03FE 7E83FE46 FF03EB00 00FE46C7
7C00FA3D F6458B1F 16FD03E7 D1FE7E8B 327D04FE 7E83FE46 FF03EB00 00FE46C7
0000EE45 C71F16FD 03E7D1FE 7E8BD57C 00FA3DEE 458B1F16 FD03E7D1 FE7E8BE6
E7D1FE7E 8B0716F5 03E6D1FE 768B547D 04FE7E83 FE46FF03 EB0000FE 46C7C5EB
3D000A05 EE458B1F 16FD03E7 D1FE7E8B D97EF644 3B26000A 05EE458B 1F16FD03
16FD03E7 D1FE7E8B 000A05EE 458B1F16 FD03E7D1 FE7E8B0F EB00FFB8 057E00FF
8B00AAE9 037C04FE 7E83FE46 FF03EB00 00FE46C7 7175010A 7E83A3EB F645891F
D1FE7E8B 05895128 1E8E2E51 263E032E E7D1FE7E 8BF6458B 1F16FD03 E7D1FE7E
032EE7D1 FE7E8BEE 458B1F16 FD03E7D1 FE7E8B05 8951241E 8E2E5122 3E032EE7
FE46C796 EB058951 2C1E8E2E 512A3E03 2EE7D1FE 7E8B0589 51301E8E 2E512E3E
032EE7D1 FE7E8BF6 458B1F16 FD03E7D1 FE7E8B3C 7D04FE7E 83FE46FF 03EB0000
512A3E03 2EE7D1FE 7E8BEE45 8B1F16FD 03E7D1FE 7E8B0589 51241E8E 2E51223E
7B9E0014 7B900024 AAFE0024 922E0014 7B8C00CB 5E5FC9BB EB058951 2C1E8E2E
66660024 AA6A0024 AAF80024 AA6E0024 AAF60024 AAC00024 AAB40014 7CC60014
00000000 00000000 00000024 AA6C0024 F6E40024 F73E0024 F7364004 66666666
0024925C 0024B302 00100014 7DFE0024 B3043FE0 00000000 00003FF0 00000000
406FE000 00000000 00147E04 0024B30C 0024AAF0 0024B32A 0024AAD8 00249258
0024AB02 0024B308 00249222 0024B30E 0024AA74 0024B312 40300000 00000000
3FF99999 9999999A 0024B30A 0024AAF4 0024AAEE 0024B102 0024AF02 0024AD02
7BA30024 AACC0024 AAAC0024 AADA000A 00249220 0024AAE2 0024AB00 0024F734
013D058B 75023EC5 2EEC8B55 57560014 7F460014 7F3E0014 7F360014 7F2E0014
35FF0275 FF750A3E C52E3674 003D8375 063EC52E 000005C7 75023EC5 2E547500
FF75123E C52E04C4 830054DC 759A35FF 0275FF75 0E3EC52E 04C48300 54DC759A
000105C7 75023EC5 2E2DEB00 0005C775 063EC52E 04C48300 54DC759A 35FF0275
3C71A69A 35FF7516 3EC52E35 FF751A3E C52E35FF 751E3EC5 2E35FF75 223EC52E
07EB0002 05C70A7E C5097400 3D837502 3EC52EEC 8B555756 CB5E5FC9 08C48300
2A06DD2E 9B0187E9 058B7526 3EC52E00 004CC857 56CB5E5F C9000105 C70A7EC5
8F9A35DE 9B753606 DD2E9B75 323EC52E CC5EDD9B E0D99BEC 46DD9BEC 5EDD9B75
EC5EDD9B 753E06DD 2E9B0166 E9DC5EDD 9BCC76DC 9B08C483 0054EF12 9A005496
129A0054 968F9A35 DE9B7536 06DD2E9B 75323EC5 2ECC5EDD 9BE0D99B EC46DD9B
9BEC46DD 9BEC5EDD 9B754606 DD2E9B01 2BE9DC5E DD9BCC76 DC9B08C4 830054EF
C4830054 EF129A00 54968F9A 35DE9B75 3606DD2E 9B75323E C52ECC5E DD9BE0D9
5EDD9B05 D99B7552 3EC52E00 0005C775 4E3EC52E 00F0E9DC 5EDD9BCC 76DC9B08
54968F9A D446DD9B CC5EDD9B E0D99BEC 46DD9BD4 5EDD9B05 D99B7556 3EC52EEC
3EC52E00 0005C775 4E3EC52E 00A8E9DC 5EDD9BCC 76DC9B08 C4830054 EF129A00
CC5EDD9B E0D99BEC 46DD9BD4 5EDD9B05 D99B755E 3EC52EEC 5EDD9B05 D99B755A
754E3EC5 2E61EBDC 5EDD9BCC 76DC9B08 C4830054 EF129A00 54968F9A D446DD9B
EC46DD9B D45EDD9B 05D99B75 663EC52E EC5EDD9B 05D99B75 623EC52E 000005C7
DC5EDD9B CC76DC9B 08C48300 54EF129A 0054968F 9AD446DD 9BCC5EDD 9BE0D99B
00FE46C7 533B52F4 52AC5271 523651FB 5390A7FF 2ED88BE0 D1157700 053D1AEB
E37D11FC 7E83FC46 FF03EBFC 4689FE46 8B0120E9 037C11FE 7E83FE46 FF03EB00

66DC9BFC 46DF9BF4 5EDD9B75 6A36DC2E 9B02C483 0054969D 9A50FE46 03FC468B
5EDD9BB4 4EDC9BF4 66DC9BFC 46DF9BBC 5EDD9BF4 66DC9BFE 46DF9BB4 5EDD9BF4
46DC9BCC 46DC9BF4 4EDC9BF4 46DD9BCC 5EDD9BBC 4EDC9BF4 66DC9BFE 46DF9BC4
0054968A 9A75721E DC2E9BE4 46DD9BE4 5EDD9BDC 4EDC9BEC 46DD9BEC 5EDD9BC4
DD9BEED9 9BFE0375 7C1E8E2E 757A3E03 2EF88B00 88FC4669 03E6C1FE 768B3E76
FF37E91D DD9BFE03 757C1E8E 2E757A3E 032EF88B 0088FE46 6903E6C1 FC768B15
8B0088FC 466903E6 C1FE768B 08C48300 54EEC29A 0054968F 9AE0D99B E446DD9B
3E032EF8 8B0088FE 466903E6 C1FC768B 15DD9BFE 03757C1E 8E2E757A 3E032EF8
05C77526 3EC52EEC 8B555756 CB5E5FC9 9BFEE8E9 1DDD9BFE 03757C1E 8E2E757A
3EC52EEC 8B555756 CB5E5FC9 000405C7 75263EC5 2EEC8B55 5756CB5E 5FC90003
8B555756 CB5E5FC9 000005C7 75263EC5 2EEC8B55 5756CB5E 5FC90005 05C77526
CB5E5FC9 000205C7 75263EC5 2EEC8B55 5756CB5E 5FC90001 05C77526 3EC52EEC
89400005 F7EA968B F7E8868B F7EA9689 F7E88689 0C568B0A 468B0008 46C85756
968BF7E8 868BF7E2 9689F7E0 86898000 2DF7EA96 8BF7E886 8BF7E696 89F7E486
00FE46C7 0129E903 7500023D 058B7526 3EC52EF7 DE9689F7 DC868940 002DF7EA
FFF7F686 89F7F886 89F7FA86 89FE468B 0110E903 7C0100FE 7E81FE46 FF03EB00
FD03E7D1 FE7E8B0C C4830054 5B789A50 F7F6868D 1650F7EE 868D160A 76FF0C76
EEBE8111 EBFF80B8 057DFF80 3DF7EE86 8B04EB01 7FB8057E 017FF7EE BE811F16
7FF7F0BE 811F16FD 03E7D1FE 7E8BFDFC 8589F7EE 868B04EB 017FB805 7E017FF7
7FB8057E 017FF7F0 BE8111EB FF80B805 7DFF803D F7F0868B 04EB017F B8057E01
EB017FB8 057E017F F7F2BE81 1F16FD03 E7D1FE7E 8BFBFC85 89F7F086 8B04EB01
F7F2868B 04EB017F B8057E01 7FF7F2BE 8111EBFF 80B8057D FF803DF7 F2868B04
803DF7F4 868B04EB 017FB805 7E017FF7 F4BE811F 16FD03E7 D1FE7E8B F9FC8589
FEE3E9F7 FC8589F7 F4868B04 EB017FB8 057E017F F7F4BE81 11EBFF80 B8057DFF
81FE46FF 03EB0000 FE46C7FC 46897582 3EF72E99 058B757E 3EC52E00 3C51EB9A
3D058BF7 E8BEC506 EB017FB8 057E017F 3D058BF7 E8BEC511 B2E9037C 1400FE7E
C5058BF7 E8BEC506 EB017FB8 057E017F 3D058BF7 E8BEC516 EBFF80B8 057DFF80
057DFF80 3D058BF7 E4BEC506 EB017FB8 057E017F 3D058BF7 E4BEC505 89F7E8BE
89F7E4BE C5058BF7 E4BEC506 EB017FB8 057E017F 3D058BF7 E4BEC516 EBFF80B8
EBFF80B8 057DFF80 3D058BF7 E0BEC506 EB017FB8 057E017F 3D058BF7 E0BEC505
DCBEC505 89F7E0BE C5058BF7 E0BEC506 EB017FB8 057E017F 3D058BF7 E0BEC516
DCBEC516 EBFF80B8 057DFF80 3D058BF7 DCBEC506 EB017FB8 057E017F 3D058BF7
058B7526 3EC52E05 89F7DCBE C5058BF7 DCBEC506 EB017FB8 057E017F 3D058BF7
8D1650F7 CC868D16 50F7CA86 8D167074 003D8375 843EC52E 072CE903 7400023D
8E0E7E03 E7D10080 C78104E7 C1F7CEBE 8B0EC483 003C6A04 9AFE76FF 50F7CE86
C5058B14 5E8E127E 03E7D100 80C78104 E7C1F7CC BE8B0589 F7E8BEC5 058B105E
0589F7E0 BEC5058B 185E8E16 7E03E7D1 0080C781 04E7C1F7 CABE8B05 89F7E4BE
F7E4BEC5 0589F7E8 BEC5058B 105E8E0E 7E03E7D1 0080C781 3D8BF7E8 BEC54EEB
0080C781 3D8BF7E0 BEC50589 F7E4BEC5 058B145E 8E127E03 E7D10080 C7813D8B
06EB017F B8057E01 7F3D058B F7E8BEC5 0589F7E0 BEC5058B 185E8E16 7E03E7D1
06EB017F B8057E01 7F3D058B F7E8BEC5 16EBFF80 B8057DFF 803D058B F7E8BEC5
F7E4BEC5 06EB017F B8057E01 7F3D058B F7E4BEC5 0589F7E8 BEC5058B F7E8BEC5
F7E4BEC5 06EB017F B8057E01 7F3D058B F7E4BEC5 16EBFF80 B8057DFF 803D058B
803D058B F7E0BEC5 06EB017F B8057E01 7F3D058B F7E0BEC5 0589F7E4 BEC5058B
BEC5058B F7E0BEC5 06EB017F B8057E01 7F3D058B F7E0BEC5 16EBFF80 B8057DFF
0275E903 75003D83 75023EC5 2E03B0E9 03740004 3D058B75 883EC52E 0589F7E0
C42EF7C6 8689058B 025C8E26 3C0326E7 D10080C7 813D8BF7 E0BEC575 1236C42E
0A36C42E F7C88689 058B025C 8E263C03 26E7D100 80C7813D 8BF7E4BE C5750E36
0A36C42E 1C7EF7C8 863B058B 025C8E26 3C0326E7 D10080C7 813D8BF7 E8BEC575
E4BEC575 0E36C42E 1AEB058B 025C8E26 3C0326E7 D10080C7 813D8BF7 E8BEC575
E0BEC575 1236C42E 1C7DF7C6 863B058B 025C8E26 3C0326E7 D10080C7 813D8BF7
813D8BF7 E4BEC575 0E36C42E 74EB058B 025C8E26 3C0326E7 D10080C7 813D8BF7
80C7813D 8BF7E8BE C5750A36 C42EF7C4 8689058B 025C8E26 3C0326E7 D10080C7
80C7813D 8BF7E8BE C5750A36 C42E1C7E F7C4863B 058B025C 8E263C03 26E7D100
26E7D100 80C7813D 8BF7E4BE C5750E36 C42E1AEB 058B025C 8E263C03 26E7D100
C5758C36 C42EF7D8 8689F7DA 862B058B F7DCBEC5 F7DA8689 058B025C 8E263C03
E4BEC575 9436C42E F7C68689 058B025C 8E263C03 26E7D100 80C7813D 8BF7E0BE
8BF7E8BE C5759036 C42EF7C8 8689058B 025C8E26 3C0326E7 D10080C7 813D8BF7
8BF7E8BE C5759036 C42E1C7E F7C8863B 058B025C 8E263C03 26E7D100 80C7813D
80C7813D 8BF7E4BE C5759436 C42E1AEB 058B025C 8E263C03 26E7D100 80C7813D
80C7813D 8BF7E0BE C5758C36 C42E1C7D F7C6863B 058B025C 8E263C03 26E7D100
26E7D100 80C7813D 8BF7E4BE C5759436 C42E74EB 058B025C 8E263C03 26E7D100
3C0326E7 D10080C7 813D8BF7 E8BEC575 9036C42E F7C48689 058B025C 8E263C03
3C0326E7 D10080C7 813D8BF7 E8BEC575 9036C42E 1C7EF7C4 863B058B 025C8E26

025C8E26 3C0326E7 D10080C7 813D8BF7 E4BEC575 9436C42E 1AEB058B 025C8E26
3D8BF7E0 BEC5758C 36C42E01 2EE90501 F7DCBEC5 F7D8868B 0589F7DC BEC5058B
C7813D8B F7E4BEC5 759436C4 2EF7C686 89058B02 5C8E263C 0326E7D1 0080C781
0080C781 3D8BF7E8 BEC57590 36C42EF7 C8868905 8B025C8E 263C0326 E7D10080
0080C781 3D8BF7E8 BEC57590 36C42E1C 7EF7C886 3B058B02 5C8E263C 0326E7D1
0326E7D1 0080C781 3D8BF7E4 BEC57594 36C42E1A EB058B02 5C8E263C 0326E7D1
0326E7D1 0080C781 3D8BF7E0 BEC5758C 36C42E1C 7DF7C686 3B058B02 5C8E263C
5C8E263C 0326E7D1 0080C781 3D8BF7E4 BEC57594 36C42E74 EB058B02 5C8E263C
8B025C8E 263C0326 E7D10080 C7813D8B F7E8BEC5 759036C4 2EF7C486 89058B02
8B025C8E 263C0326 E7D10080 C7813D8B F7E8BEC5 759036C4 2E1C7EF7 C4863B05
DCBEC505 8B025C8E 263C0326 E7D10080 C7813D8B F7E4BEC5 759436C4 2E1AEB05
CE868D16 50F7CC86 8D1650F7 CA868D16 0B54E903 75003D83 754E3EC5 2E0589F7
FC462BF7 CE868B0B 2BE90374 FC463BF7 CC868B0E C483003C 6A049AFE 76FF50F7
F7CC868B 0B08E903 7E00013D D8F7FC46 2BF7CE86 8B09EBFC 462BF7CE 868B097E
8B0AE5E9 037E0001 3DD8F7FC 462BF7CC 868B09EB FC462BF7 CC868B09 7EFC462B
E9037E00 013DD8F7 FC462BF7 CA868B09 EBFC462B F7CA868B 097EFC46 2BF7CA86
9A500244 2B26058B F7E8BEC5 759836C4 2EF7BA9E D99B05D9 9B759C3E C52E0AC2
9AF7C286 DC9B0245 DF9B7598 3EC52EF7 C29EDD9B F7BA8ED8 9B02C483 0054969D
2EF7BA9E D99B05D9 9B759C3E C52E0589 F7E8BEC5 08C48300 5496EF9A 0054968F
C29EDD9B F7BA8ED8 9B02C483 0054969D 9A500244 2B26058B F7E4BEC5 75A036C4
F7E4BEC5 08C48300 5496EF9A 0054968F 9AF7C286 DC9B0245 DF9B75A0 3EC52EF7
9A500244 2B26058B F7E0BEC5 75A436C4 2EF7BA9E D99B05D9 9B759C3E C52E0589
9AF7C286 DC9B0245 DF9B75A4 3EC52EF7 C29EDD9B F7BA8ED8 9B02C483 0054969D
C3E90374 00043D05 8B75883E C52E0589 F7E0BEC5 08C48300 5496EF9A 0054968F
9D9A5002 442B2605 8BF7DCBE C575A836 C42EF7BA 9ED99B05 D99B759C 3EC52E09
8F9AF7C2 86DC9B02 45DF9B75 A83EC52E F7C29EDD 9BF7BA8E D89B02C4 83005496
50F7D086 8D1650F7 EC868D16 0970E905 89F7DCBE C508C483 005496EF 9A005496
E8BEC505 7BE90372 0054968A 9AF7D09E DC9BEED9 9B0AC483 003C68A0 9AFE76FF
26058B10 5E8E0E7E 03E7D1F7 ECBE8B07 16F503E6 D1F7ECB6 8BF7C886 89058BF7
0308C483 005496EF 9A005496 8F9AF7D0 8EDC9B02 C4830054 969D9A50 FDFC842B
ECBE8B07 16F503E6 D1F7ECB6 8BF7C886 89058BF7 E4BEC505 89F7E8BE C5F7C886
8F9AF7D0 8EDC9B02 C4830054 969D9A50 FBFC842B 26058B14 5E8E127E 03E7D1F7
8BF7C886 89058BF7 E0BEC505 89F7E4BE C5F7C886 0308C483 005496EF 9A005496
969D9A50 F9FC842B 26058B18 5E8E167E 03E7D1F7 ECBE8B07 16F503E6 D1F7ECB6
89F7E0BE C5F7C886 0308C483 005496EF 9A005496 8F9AF7D0 8EDC9B02 C4830054
36C42E01 30E90375 003D8375 4E3EC52E 013DE903 7400043D 058B7588 3EC52E05
759436C4 2EF7C686 89058B02 5C8E263C 0326E7D1 0080C781 3D8BF7E0 BEC5758C
BEC57590 36C42EF7 C8868905 8B025C8E 263C0326 E7D10080 C7813D8B F7E4BEC5
BEC57590 36C42E1C 7EF7C886 3B058B02 5C8E263C 0326E7D1 0080C781 3D8BF7E8
3D8BF7E4 BEC57594 36C42E1A EB058B02 5C8E263C 0326E7D1 0080C781 3D8BF7E8
3D8BF7E0 BEC5758C 36C42E1C 7DF7C686 3B058B02 5C8E263C 0326E7D1 0080C781
0080C781 3D8BF7E4 BEC57594 36C42E74 EB058B02 5C8E263C 0326E7D1 0080C781
E7D10080 C7813D8B F7E8BEC5 759036C4 2EF7C486 89058B02 5C8E263C 0326E7D1
E7D10080 C7813D8B F7E8BEC5 759036C4 2E1C7EF7 C4863B05 8B025C8E 263C0326
263C0326 E7D10080 C7813D8B F7E4BEC5 759436C4 2E1AEB05 8B025C8E 263C0326
058B7526 3EC52E18 7400043D 058B7588 3EC52E70 EB0589F7 DCBEC505 8B025C8E
D1F7ECB6 8BF7C886 89058BF7 DCBEC54C 7500053D 058B7526 3EC52E0C 7400033D
C4830054 969D9A50 F7FC842B 26058B1C 5E8E1A7E 03E7D1F7 ECBE8B07 16F503E6
3EC52E05 89F7DCBE C5F7C886 0308C483 005496EF 9A005496 8F9AF7D0 8EDC9B02
9AFE76FF 50F7CE86 8D1650F7 CC868D16 50F7CA86 8D1601DE E9037500 3D83754E
F7CE868B 097EFC46 2BF7CE86 8B01B5E9 0374FC46 3BF7CC86 8B0EC483 003C6A04
8B097EFC 462BF7CC 868B0192 E9037E00 013DD8F7 FC462BF7 CE868B09 EBFC462B
FC462BF7 CA868B01 6FE9037E 00013DD8 F7FC462B F7CC868B 09EBFC46 2BF7CC86
9C3EC52E 014CE903 7E00013D D8F7FC46 2BF7CA86 8B09EBFC 462BF7CA 868B097E
C4830054 969D9A50 02442B26 058BF7E8 BEC57598 36C42EF7 BA9ED99B 05D99B75
EF9A0054 968F9AF7 C286DC9B 0245DF9B 75983EC5 2EF7C29E DD9BF7BA 8ED89B02
BEC575A0 36C42EF7 BA9ED99B 05D99B75 9C3EC52E 0589F7E8 BEC508C4 83005496
75A03EC5 2EF7C29E DD9BF7BA 8ED89B02 C4830054 969D9A50 02442B26 058BF7E4
9C3EC52E 0589F7E4 BEC508C4 83005496 EF9A0054 968F9AF7 C286DC9B 0245DF9B
C4830054 969D9A50 02442B26 058BF7E0 BEC575A4 36C42EF7 BA9ED99B 05D99B75
EF9A0054 968F9AF7 C286DC9B 0245DF9B 75A43EC5 2EF7C29E DD9BF7BA 8ED89B02
05D99B75 9C3EC52E 50750004 3D058B75 883EC52E 0589F7E0 BEC508C4 83005496
8ED89B02 C4830054 969D9A50 02442B26 058BF7DC BEC575A8 36C42EF7 BA9ED99B
83005496 EF9A0054 968F9AF7 C286DC9B 0245DF9B 75A83EC5 2EF7C29E DD9BF7BA

803D058B F7E8BEC5 06EB017F B8057E01 7F3D058B F7E8BEC5 0589F7DC BEC508C4
BEC5058B F7E8BEC5 06EB017F B8057E01 7F3D058B F7E8BEC5 16EBFF80 B8057DFF
B8057DFF 803D058B F7E4BEC5 06EB017F B8057E01 7F3D058B F7E4BEC5 0589F7E8
0589F7E4 BEC5058B F7E4BEC5 06EB017F B8057E01 7F3D058B F7E4BEC5 16EBFF80
16EBFF80 B8057DFF 803D058B F7E0BEC5 06EB017F B8057E01 7F3D058B F7E0BEC5
F7DCBEC5 0589F7E0 BEC5058B F7E0BEC5 06EB017F B8057E01 7F3D058B F7E0BEC5
F7DCBEC5 16EBFF80 B8057DFF 803D058B F7DCBEC5 06EB017F B8057E01 7F3D058B
003D8375 4E3EC52E 0589F7DC BEC5058B F7DCBEC5 06EB017F B8057E01 7F3D058B
75E90375 003D8375 023EC52E 03B0E903 7400043D 058B7588 3EC52E03 BFE90375
2EF7C686 89058B02 5C8E263C 0326E7D1 0080C781 3D8BF7E0 BEC57512 36C42E02
36C42EF7 C8868905 8B025C8E 263C0326 E7D10080 C7813D8B F7E4BEC5 750E36C4
36C42E1C 7EF7C886 3B058B02 5C8E263C 0326E7D1 0080C781 3D8BF7E8 BEC5750A
BEC5750E 36C42E1A EB058B02 5C8E263C 0326E7D1 0080C781 3D8BF7E8 BEC5750A
BEC57512 36C42E1C 7DF7C686 3B058B02 5C8E263C 0326E7D1 0080C781 3D8BF7E4
3D8BF7E4 BEC5750E 36C42E74 EB058B02 5C8E263C 0326E7D1 0080C781 3D8BF7E0
C7813D8B F7E8BEC5 750A36C4 2EF7C486 89058B02 5C8E263C 0326E7D1 0080C781
C7813D8B F7E8BEC5 750A36C4 2E1C7EF7 C4863B05 8B025C8E 263C0326 E7D10080
E7D10080 C7813D8B F7E4BEC5 750E36C4 2E1AEB05 8B025C8E 263C0326 E7D10080
758C36C4 2EF7D886 89F7DA86 2B058BF7 DCBEC5F7 DA868905 8B025C8E 263C0326
BEC57594 36C42EF7 C6868905 8B025C8E 263C0326 E7D10080 C7813D8B F7E0BEC5
F7E8BEC5 759036C4 2EF7C886 89058B02 5C8E263C 0326E7D1 0080C781 3D8BF7E4
F7E8BEC5 759036C4 2E1C7EF7 C8863B05 8B025C8E 263C0326 E7D10080 C7813D8B
C7813D8B F7E4BEC5 759436C4 2E1AEB05 8B025C8E 263C0326 E7D10080 C7813D8B
C7813D8B F7E0BEC5 758C36C4 2E1C7DF7 C6863B05 8B025C8E 263C0326 E7D10080
E7D10080 C7813D8B F7E4BEC5 759436C4 2E74EB05 8B025C8E 263C0326 E7D10080
0326E7D1 0080C781 3D8BF7E8 BEC57590 36C42EF7 C4868905 8B025C8E 263C0326
0326E7D1 0080C781 3D8BF7E8 BEC57590 36C42E1C 7EF7C486 3B058B02 5C8E263C
5C8E263C 0326E7D1 0080C781 3D8BF7E4 BEC57594 36C42E1A EB058B02 5C8E263C
8BF7E0BE C5758C36 C42E012E E90501F7 DCBEC5F7 D8868B05 89F7DCBE C5058B02
813D8BF7 E4BEC575 9436C42E F7C68689 058B025C 8E263C03 26E7D100 80C7813D
80C7813D 8BF7E8BE C5759036 C42EF7C8 8689058B 025C8E26 3C0326E7 D10080C7
80C7813D 8BF7E8BE C5759036 C42E1C7E F7C8863B 058B025C 8E263C03 26E7D100
26E7D100 80C7813D 8BF7E4BE C5759436 C42E1AEB 058B025C 8E263C03 26E7D100
26E7D100 80C7813D 8BF7E0BE C5758C36 C42E1C7D F7C6863B 058B025C 8E263C03
8E263C03 26E7D100 80C7813D 8BF7E4BE C5759436 C42E74EB 058B025C 8E263C03
025C8E26 3C0326E7 D10080C7 813D8BF7 E8BEC575 9036C42E F7C48689 058B025C
025C8E26 3C0326E7 D10080C7 813D8BF7 E8BEC575 9036C42E 1C7EF7C4 863B058B
BEC5058B 025C8E26 3C0326E7 D10080C7 813D8BF7 E4BEC575 9436C42E 1AEB058B
CB5E5FC9 9BEE41E9 02F7DC86 8302F7E0 868302F7 E4868302 F7E88683 0589F7DC
0EC48300 3C6A049A 0A76FF50 FE468D16 50FC468D 1650FA46 8D160000 0AC85756
2E9B756A 36DC2E9B 75AC0EDC 2E9B02C4 83005496 9D9A50FE 4603FA46 03FC468B
087F00FF 3D058B10 7EC50589 107EC508 C4830054 96EF9A00 54968F9A 753606DC
7D00003D 00FFB803 EB058B10 7EC5077D 00FF3D05 8B107EC5 367D003D 83107EC5
8D160589 107EC500 FFB803EB 058B107E C5077D00 FF3D058B 107EC514 EBC02B04
6903E6C1 F6768B0E C483003C 69809AFE 76FFFC76 FFFA76FF 50F8468D 1650F646
CB5E5FC9 9B1DDD9B 0C7EC505 DD9BFE03 757C1E8E 2E757A3E 032EF88B 0088F846
3B0E468B FE46890C 468B06EB FE46890A 468B087D 0C463B0A 468B0000 02C85756
0C468B05 89107EC5 FE462B0A 468B1875 FE462B0E 468BFE46 890E468B 067DFE46
0E468B05 89107EC5 FE462B0A 468B1875 FE462B0C 468B36EB 0589147E C5FE462B
0589147E C5FE462B 0E468B05 89107EC5 FE462B0C 468B16EB 0589147E C5FE462B
C10A468B 05890C7E C5000F25 0A468B2A 7D10000A 7E810000 02C85756 CB5E5FC9
11000A7E 810132E9 0589147E C5000F25 08F8C10A 468B0589 107EC500 0F2504F8
2B0A468B 0589107E C5000F25 FE462B0A 468B0010 05C70C7E C51000FE 46C72E7D
2B0A468B 1100FE46 C72E7D12 000A7E81 00FDE905 89147EC5 000F2504 F8C1FE46
147EC500 0F2504F8 C1FE462B 0A468B00 1005C710 7EC50589 0C7EC500 0F25FE46
8B05890C 7EC5000F 25FE462B 0A468B12 00FE46C7 2E7D1300 0A7E8100 C8E90589
7D13400A 7E810093 E9001005 C7147EC5 0589107E C5000F25 04F8C1FE 462B0A46
147EC500 0F25FE46 2B0A468B 001005C7 107EC500 1005C70C 7EC51300 FE46C723
000F25FE 462B0A46 8B001005 C70C7EC5 1340FE46 C7237D13 800A7E81 69EB0589
FE462B0A 468B1380 FE46C723 7D13C00A 7E813FEB 001005C7 147EC505 89107EC5
C5001005 C70C7EC5 15EB0010 05C7147E C5001005 C7107EC5 05890C7E C5000F25
00E646C7 0000E846 C7000022 C85756CB 5E5FC900 1005C714 7EC50010 05C7107E
8BE64689 40E8468B E9EBE846 FF0575FC 183D058B 0C5E8E0A 7E03E7D1 E87E8B00
969D9A50 E8462BE6 468BE9EB E646FF05 75FC183D 058B0C5E 8E0A7E03 E7D1E67E

8B0C5E8E 0A7E03E7 D1E67E8B 0C468E0A 7603E6D1 E8768BDE 5EDD9B02 C4830054
0C5E8E0A 7E03E7D1 E87E8BF8 5EDD9BDE 76DC9B02 C4830054 969D9A50 042B2605
96EF9A00 54968F9A F046DD9B 2F7C00EA 7E83EA46 8948E846 8BF05EDD 9B05DF9B
5EDD9BF0 6EDC9BF8 46DD9BEA 4EFF0589 0C5E8E0A 7E03E7D1 EA7E8B08 C4830054
03E7D1EC 7E8BEC46 8940EE46 8B00DCE9 037C00FE EE7E81EE 4689E846 8BCBEBF0
EC7E8B00 01EA46C7 E2EBEC46 FF057D00 FFEC7E81 0C75FC18 3D058B0C 5E8E0A7E
DD9B02C4 83005496 9D9A50EE 462BEC46 8B3F74FC 183D058B 0C5E8E0A 7E03E7D1
9D9A5004 2B26058B 0C5E8E0A 7E03E7D1 EC7E8B0C 468E0A76 03E6D1EE 768BDE5E
7EEA463B EE462BEC 468BF05E DD9BF846 DD9BF85E DD9BDE76 DC9B02C4 83005496
83005496 EF9A0054 968F9AF0 46DD9BE4 4689058B 0C5E8E0A 7E03E7D1 EE7E8B45
5EDD9BF0 46DC9BF8 46DD9B05 890C5E8E 0A7E03E7 D1EE7E03 EA7E8BE4 460308C4
EE46C701 FE85890A 7EC501FC 858B0A7E C5FF1AE9 EE4601EA 468BB0EB EA46FFF0
117E017F 3D058B0C 5E8E0A7E 03E7D1EE 7E8B467D 0100EE7E 81EE46FF 03EB0000
803D058B 0C5E8E0A 7E03E7D1 EE7E8BD3 EB017F05 C70C5E8E 0A7E03E7 D1EE7E8B
C7000022 C85756CB 5E5FC99B B0EBFF80 05C70C5E 8E0A7E03 E7D1EE7E 8BC17DFF
E9EBE846 FF0575FC 183D058B 0C5E8E0A 7E03E7D1 E87E8B00 00E646C7 0000E846
468BE9EB E646FF05 75FC183D 058B0C5E 8E0A7E03 E7D1E67E 8BE64689 40E8468B
D1E67E8B 0C468E0A 7603E6D1 E8768BDE 5EDD9B02 C4830054 969D9A50 E8462BE6
E87E8BF8 5EDD9BDE 76DC9B02 C4830054 969D9A50 042B2605 8B0C5E8E 0A7E03E7
F046DD9B 2F7C00EA 7E83EA46 8948E846 8BF05EDD 9B05DF9B 0C5E8E0A 7E03E7D1
46DD9BEA 4EFF0589 0C5E8E0A 7E03E7D1 EA7E8B08 C4830054 96EF9A00 54968F9A
8940EE46 8B00DCE9 037C01FE EE7E81EE 4689E846 8BCBEBF0 5EDD9BF0 6EDC9BF8
E2EBEC46 FF057D01 FFEC7E81 0C75FC18 3D058B0C 5E8E0A7E 03E7D1EC 7E8BEC46
9D9A50EE 462BEC46 8B3F74FC 183D058B 0C5E8E0A 7E03E7D1 EC7E8B00 01EA46C7
0C5E8E0A 7E03E7D1 EC7E8B0C 468E0A76 03E6D1EE 768BDE5E DD9B02C4 83005496
468BF05E DD9BF846 DD9BF85E DD9BDE76 DC9B02C4 83005496 9D9A5004 2B26058B
968F9AF0 46DD9BE4 4689058B 0C5E8E0A 7E03E7D1 EE7E8B45 7EEA463B EE462BEC
46DD9B05 890C5E8E 0A7E03E7 D1EE7E03 EA7E8BE4 460308C4 83005496 EF9A0054
7EC503FC 858B0A7E C5FF1AE9 EE4601EA 468BB0EB EA46FFF0 5EDD9BF0 46DC9BF8
5E8E0A7E 03E7D1EE 7E8B467D 0200EE7E 81EE46FF 03EB0000 EE46C703 FE85890A
7E03E7D1 EE7E8BD3 EB017F05 C70C5E8E 0A7E03E7 D1EE7E8B 117E017F 3D058B0C
5E5FC99B B0EBFF80 05C70C5E 8E0A7E03 E7D1EE7E 8BC17DFF 803D058B 0C5E8E0A
183D058B 0C5E8E0A 7E03E7D1 E87E8B00 00E646C7 0000E846 C7000022 C85756CB
75FC183D 058B0C5E 8E0A7E03 E7D1E67E 8BE64689 40E8468B E9EBE846 FF0575FC
7603E6D1 E8768BDE 5EDD9B02 C4830054 969D9A50 E8462BE6 468BE9EB E646FF05
76DC9B02 C4830054 969D9A50 042B2605 8B0C5E8E 0A7E03E7 D1E67E8B 0C468E0A
7E83EA46 8948E846 8BF05EDD 9B05DF9B 0C5E8E0A 7E03E7D1 E87E8BF8 5EDD9BDE
0C5E8E0A 7E03E7D1 EA7E8B08 C4830054 96EF9A00 54968F9A F046DD9B 2F7C00EA
463B4848 0E468BEE 4689E846 8BCBEBF0 5EDD9BF0 6EDC9BF8 46DD9BEA 4EFF0589
8B0E75FC 183D058B 0C5E8E0A 7E03E7D1 EC7E8BEC 468940EE 468B00DE E9037FEE
3D058B0C 5E8E0A7E 03E7D1EC 7E8B0001 EA46C7E0 EBEC46FF 057EEC46 3B480E46
8E0A7603 E6D1EE76 8BDE5EDD 9B02C483 0054969D 9A50EE46 2BEC468B 3F74FC18
9BDE76DC 9B02C483 0054969D 9A50042B 26058B0C 5E8E0A7E 03E7D1EC 7E8B0C46
5E8E0A7E 03E7D1EE 7E8B457E EA463BEE 462BEC46 8BF05EDD 9BF846DD 9BF85EDD
EE7E03EA 7E8BE446 0308C483 005496EF 9A005496 8F9AF046 DD9BE446 89058B0C
4601EA46 8BB0EBEA 46FFF05E DD9BF046 DC9BF846 DD9B0589 0C5E8E0A 7E03E7D1
890C5E8E 0A7E03E7 D14F0E7E 8B058B0C 5E8E0A7E 03E7D14F 4F0E7E8B FF15E9EE
83F64689 5E5F0054 3A809A50 FC468D16 006A5756 000016C8 5756CB5E 5FC99B05
B4EA9AF6 76FF006A 0AC48300 54C0489A FC76FF00 6A006A00 6A006A13 7400FC7E
F446895E 5F00543A 809A50FC 468D1600 6A575600 00F246C7 F0468904 C4830054
EA9AF476 FF006A0A C4830054 C0489AFC 76FF006A 006A006A 006A1374 00FC7E83
00FE46C7 EA46893D F7990118 B875B43E C52E0000 EE46C7EC 468904C4 830054B4
E7D10A7E 8BFA4689 02E0C1FE 468B0108 E9037FFE 463B19EA 466BFE46 FF03EB00
0588F25E 8EF07E03 FA7E8B98 02C48300 3C73EF9A 35FF75A2 1E8E2E75 A03E032E
7E0347FA 7E8B9802 C483003C 73EF9A35 FF759A1E 8E2E7598 3E032EE7 D10A7E8B
9802C483 003C73EF 9A35FF75 AA1E8E2E 75A83E03 2EE7D10A 7E8B0588 F25E8EF0
EF9A35FF 75A61E8E 2E75A43E 032EE7D1 0A7E8B05 88F25E8E F07E0347 47FA7E8B
02C48300 3C73EF9A 00806805 88F25E8E F07E0303 C783FA7E 8B9802C4 83003C73
8EEC7E03 47FA7E8B 9802C483 003C73EF 9A008068 0588EE5E 8EEC7E03 FA7E8B98
00806805 88EE5E8E EC7E0347 47FA7E8B 9802C483 003C73EF 9A008068 0588EE5E
EA6EF70A 468BFEE9 E90588EE 5E8EEC7E 0303C783 FA7E8B98 02C48300 3C73EF9A
1F75D20B 0E7EF799 FE468B54 7D0C463B FE468BFE 46FF03EB 0000FE46 C7F84689
8BCBEB0E C483003C 87339A50 F0468D16 016A3E6A 50002505 F8468B19 6AEA76FF
9A50EC46 8D16016A 3E6A5000 2505F846 8B196AEA 76FFC075 D20B107E F799FE46

16F476FF 57565E5F 00543A60 9A50FC46 8D16F676 FF5756A1 EB0EC483 003C8733
00FF0A46 C7077E00 FF0A7E81 EC8B5557 56CB5E5F C95E5F00 543A609A 50FC468D
EB0000FE 46C70000 34C85756 CB5E5FC9 0A468B00 000A46C7 057D000A 7E830BEB
468BE37D 11FC7E83 FC46FF03 EBFC4689 FE468B00 D0E9037C 11FE7E83 FE46FF03
9BEC66DC 9BFC46DF 9BEC5EDD 9B756A36 DC2E9B02 C4830054 969D9A50 FE4603FC
9BDC5EDD 9BCC4EDC 9BEC66DC 9BFC46DF 9BD45EDD 9BEC66DC 9BFE46DF 9BCC5EDD
9BDC46DC 9BE446DC 9BEC4EDC 9BEC46DD 9BE45EDD 9BD44EDC 9BEC66DC 9BFE46DF
466903E6 C1FE768B F45EDD9B 08C48300 54E5409A 0054968F 9AF446DD 9BF45EDD
768B15DD 9B75AC0E DC2E9BF4 46DD9BFE 03757C1E 8E2E757A 3E032EF8 8B0088FC
5FC99BFF 38E91DDD 9BFE0375 7C1E8E2E 757A3E03 2EF88B00 88FE4669 03E6C1FC
0006004C 0004004C 0002004C 0942004C 093E004C 093A004C 0948004C 0946CB5E
00003FE0 00000000 0000004C 092C4026 00000000 0000004C 0912004C 0008004C
0920004C 091C004C 0918004C 0914004C 09564060 00000000 00004046 00000000
095C004C 000A4014 00000000 00004008 00000000 0000004C 0928004C 0924004C
004C0960 004C0964 004C0932 004C092E 004C0936 004C0ABC 004C0ABE 0010004C
46C60000 04C85756 004C0000 40300000 00000000 004C0A66 004C0A10 004C09BA
0A46F705 8998BC3E C52E5E5F 00543BD4 9A50FC46 8D1650E4 2AFF468A 575603FF
98C836FF 2E98CA36 FF2E35FF 98BC3EC5 2E575600 0105C798 C03EC52E 34740010
562A7400 200A46F7 0089E905 8998C43E C52E5E5F 00543C34 9A50FC46 8D16FF6A
5E5F0054 3C349A50 FC468D16 FF6A98CC 36FF2E98 CE36FF2E 35FF98BC 3EC52E57
36FF2E98 D236FF2E 35FF98BC 3EC52E57 562A7501 0A7E8358 EB058998 C43EC52E
98BC3EC5 2E575628 EB058998 C43EC52E 5E5F0054 3C349A50 FC468D16 FF6A98D0
8998C43E C52E5E5F 00543C34 9A50FC46 8D16FF6A 98D436FF 2E98D636 FF2E35FF
C52E006A 02558905 8998D83E C52E04C4 830054B4 EA9A35FF 98C43EC5 2E006A05
98D83EC5 2E006A02 55890589 98DC3EC5 2E04C483 0054B4EA 9A35FF3D C598D83E
558B058B 98E03EC5 2E025589 058998E0 3EC52E04 C4830054 B4EA9A0A 75FF3DC5
E8068B2E 3DC598DC 3EC52E00 0006C857 56CB5E5F C9025589 058998E4 3EC52E02
3DC598D8 3EC52E57 5605890A 468B3DC5 98E03EC5 2E025589 058998EA 168B2E98
543C149A 50FC468D 160675FF 3DC598D8 3EC52E0A 75FF3DC5 98D83EC5 2E0275FF
50FC468D 1635FF02 75FF98EC 3EC52EFF 6A0675FF 3DC598D8 3EC52E57 565E5F00
C52E04C4 830054B4 EA9A0C75 FF3DC598 D83EC52E 006AFA46 895E5F00 543BF49A
4689058B 3DC598F0 3EC52EFE 46890245 8B3DC598 F03EC52E 02558905 8998F03E
91199AFE 76FFFC76 FF0E7401 FE7E8302 C483002C F9F79A00 6A307400 FE7E83FC
5756CB5E 5FC9FC46 8B03EB00 442B8C9A 02C48300 2CFF739A FE76FF04 C483003C
5F0054DE 289A026A 500A468D 16500002 05058B02 75FF98E0 3EC52E57 56EC8B55
000A7E83 1075003D 8398F43E C52E0589 98F43EC5 2E02C483 003C770F 9A0F6A5E
C52E5756 EC8B5557 56CB5E5F C9058B98 F43EC52E 02C48300 2CF9F79A 016A0A75
3C770F9A 486A5E5F 0054DE28 9A046A50 0A468D16 50000205 058B0275 FF98E03E
3EC52E57 56EC8B55 5756CB5E 5FC9058B 98F43EC5 2E058998 F43EC52E 02C48300
003C770F 9A496A5E 5F0054DE 289A026A 500A468D 16500002 05058B02 75FF98E0
E03EC52E 5756EC8B 555756CB 5E5FC905 8B98F43E C52E0589 98F43EC5 2E02C483
003C770F 9A00A368 5E5F0054 DE289A02 6A500A46 8D165000 0205058B 0275FF98
E03EC52E 5756EC8B 555756CB 5E5FC905 8B98F43E C52E0589 98F43EC5 2E02C483
83003C77 0F9A016A 5E5F0054 DE289A04 6A500A46 8D165000 0205058B 0275FF98
98E03EC5 2E5756EC 8B555756 CB5E5FC9 058B98F4 3EC52E05 8998F43E C52E02C4
C483003C 770F9A54 6A5E5F00 54DE289A 046A500A 468D1650 00020505 8B0275FF
FF98E03E C52E5756 EC8B5557 56CB5E5F C9058B98 F43EC52E 058998F4 3EC52E02
0275FF98 E03EC52E 57565E5F 0054DE28 9A046A50 0A468D16 50000205 058B0275
C52E02C4 83003C77 0F9A636A 5E5F0054 DE289A04 6A500E46 8D165000 0605058B
8B0275FF 98E03EC5 2E5756EC 8B555756 CB5E5FC9 058B98F4 3EC52E05 8998F43E
3EC52E02 C483003C 770F9A02 6A5E5F00 54DE289A 046A500A 468D1650 00020505
058B0275 FF98E03E C52E5756 EC8B5557 56CB5E5F C9058B98 F43EC52E 058998F4
CB5E5FC9 02C48300 3C770F9A 036A5E5F 0054DE28 9A026A50 0A468D16 50000205
54DE289A 046A500A 468D1650 00020505 8B0275FF 98E03EC5 2E5756EC 8B555756
56CB5E5F C9058B98 F43EC52E 058998F4 3EC52E02 C483003C 770F9A04 6A5E5F00
0054DE28 9A046A50 0E468D16 50000205 058B0275 FF98E03E C52E5756 EC8B5557
5E5F0054 DE289A04 6A501246 8D165000 0605058B 0275FF98 E03EC52E 57565E5F
05058B02 75FF98E0 3EC52E57 56EC8B55 5756CB5E 5FC902C4 83003C77 0F9A056A
56CB5E5F C902C483 003C770F 9A066A5E 5F0054DE 289A046A 500E468D 16500002
75FF98E0 3EC52E57 56EC8B55 5756CB5E 5FC902C4 83003C77 0F9A076A EC8B5557
8B0275FF 98E03EC5 2E57565E 5F0054DE 289A046A 500E468D 16500002 05058B02
05058B02 75FF98E0 3EC52E57 565E5F00 54DE289A 046A5012 468D1650 00060505
56CB5E5F C902C483 003C770F 9A086A5E 5F0054DE 289A026A 5016468D 1650000A
0054DE28 9A046A50 0C468D16 50000205 058B0275 FF98E03E C52E5756 EC8B5557

5E5F0054 DE289A02 6A500A46 8D165000 0605058B 0275FF98 E03EC52E 57565E5F
096A5E5F 0054DE28 9A026A50 10468D16 50000805 058B0275 FF98E03E C52E5756
56EC8B55 5756CB5E 5FC9058B 98F43EC5 2E058998 F43EC52E 02C48300 3C770F9A
2E57565E 5F0054DE 289A046A 500C468D 16500002 05058B02 75FF98E0 3EC52E57
3EC52E57 565E5F00 54DE289A 026A500A 468D1650 00060505 8B0275FF 98E03EC5
003C770F 9A0A6A5E 5F0054DE 289A026A 5010468D 16500008 05058B02 75FF98E0
E03EC52E 5756EC8B 555756CB 5E5FC905 8B98F43E C52E0589 98F43EC5 2E02C483
83003C77 0F9A0B6A 5E5F0054 DE289A04 6A500A46 8D165000 0205058B 0275FF98
98E03EC5 2E5756EC 8B555756 CB5E5FC9 058B98F4 3EC52E05 8998F43E C52E02C4
C483003C 770F9A5A 6A5E5F00 54DE289A 046A500A 468D1650 00020505 8B0275FF
FF98E03E C52E5756 EC8B5557 56CB5E5F C9058B98 F43EC52E 058998F4 3EC52E02
02C48300 3C770F9A 0C6A5E5F 0054DE28 9A046A50 0A468D16 50000205 058B0275
75FF98E0 3EC52E57 56EC8B55 5756CB5E 5FC9058B 98F43EC5 2E058998 F43EC52E
2E02C483 003C770F 9A0D6A5E 5F0054DE 289A046A 500A468D 16500002 05058B02
0F750008 3D005455 F09AEC8B 555756CB 5E5FC905 8B98F43E C52E0589 98F43EC5
16500002 05058B02 75FF98E0 3EC52E57 560095E9 000005C7 187EC500 0000009A
468D1650 00060505 8B0275FF 98E03EC5 2E57565E 5F0054DE 289A046A 500E468D
5016468D 1650000A 05058B02 75FF98E0 3EC52E57 565E5F00 54DE289A 046A5012
026A5018 468D1650 000C0505 8B0275FF 98E03EC5 2E57565E 5F0054DE 289A026A
C5058B98 F43EC52E 058998F4 3EC52E02 C483003C 770F9A0E 6A5E5F00 54DE289A
468D1650 00020505 8B0275FF 98E03EC5 2E5756EC 8B555756 CB5E5FC9 0589187E
500C468D 16500004 05058B02 75FF98E0 3EC52E57 565E5F00 54DE289A 026A500A
5756CB5E 5FC90589 98F43EC5 2E02C483 003C770F 9A146A5E 5F0054DE 289A046A
5F0054DE 289A026A 500A468D 16500002 05058B02 75FF98E0 3EC52E57 56EC8B55
6A5E5F00 54DE289A 046A500C 468D1650 00040505 8B0275FF 98E03EC5 2E57565E
98E03EC5 2E5756EC 8B555756 CB5E5FC9 058998F4 3EC52E02 C483003C 770F9A15
C483003C 770F9A16 6A5E5F00 54DE289A 046A500A 468D1650 00020505 8B0275FF
00020505 8B0275FF 98E03EC5 2E5756EC 8B555756 CB5E5FC9 058998F4 3EC52E02
16500006 05058B02 75FF98E0 3EC52E57 565E5F00 54DE289A 046A500A 468D1650
5FC90589 98F43EC5 2E02C483 003C770F 9A176A5E 5F0054DE 289A046A 500E468D
289A046A 500A468D 16500002 05058B02 75FF98E0 3EC52E57 56EC8B55 5756CB5E
56EC8B55 5756CB5E 5FC90589 98F43EC5 2E02C483 003C770F 9A186A5E 5F0054DE
9A196A5E 5F0054DE 289A046A 500A468D 16500002 05058B02 75FF98E0 3EC52E57
75FF98E0 3EC52E57 56EC8B55 5756CB5E 5FC90589 98F43EC5 2E02C483 003C770F
2E02C483 003C770F 9A476A5E 5F0054DE 289A046A 500A468D 16500002 05058B02
16500002 05058B02 75FF98E0 3EC52E57 56EC8B55 5756CB5E 5FC90589 98F43EC5
5FC90589 98F43EC5 2E02C483 003C770F 9A1A6A5E 5F0054DE 289A046A 500A468D
289A046A 500A468D 16500002 05058B02 75FF98E0 3EC52E57 56EC8B55 5756CB5E
54DE289A 046A500E 468D1650 00060505 8B0275FF 98E03EC5 2E57565E 5F0054DE
2E5756EC 8B555756 CB5E5FC9 058998F4 3EC52E02 C483003C 770F9A1B 6A5E5F00
3EC52E57 565E5F00 54DE289A 046A500A 468D1650 00020505 8B0275FF 98E03EC5
98E03EC5 2E57565E 5F0054DE 289A026A 500E468D 16500006 05058B02 75FF98E0
C483003C 770F9A1D 6A5E5F00 54DE289A 026A5010 468D1650 00080505 8B0275FF
00020505 8B0275FF 98E03EC5 2E5756EC 8B555756 CB5E5FC9 058998F4 3EC52E02
058998F4 3EC52E02 C483003C 770F9A1E 6A5E5F00 54DE289A 046A500A 468D1650
046A500A 468D1650 00020505 8B0275FF 98E03EC5 2E5756EC 8B555756 CB5E5FC9
8B555756 CB5E5FC9 058998F4 3EC52E02 C483003C 770F9A46 6A5E5F00 54DE289A
6A5E5F00 54DE289A 046A500A 468D1650 00020505 8B0275FF 98E03EC5 2E5756EC
98E03EC5 2E5756EC 8B555756 CB5E5FC9 058998F4 3EC52E02 C483003C 770F9A1F
C483003C 770F9A20 6A5E5F00 54DE289A 026A500A 468D1650 00020505 8B0275FF
98F43EC5 2E02C483 003C770F 9A216AEC 8B555756 CB5E5FC9 058998F4 3EC52E02
500A468D 16500002 05058B02 75FF98E0 3EC52E57 56EC8B55 5756CB5E 5FC90589
5756CB5E 5FC90589 98F43EC5 2E02C483 003C770F 9A376A5E 5F0054DE 289A046A
2E5756EC 8B555756 CB5E5FC9 058998F4 3EC52E02 C483003C 770F9A22 6AEC8B55
770F9A23 6A5E5F00 54DE289A 026A500A 468D1650 00020505 8B0275FF 98E03EC5
8B0275FF 98E03EC5 2E5756EC 8B555756 CB5E5FC9 058998F4 3EC52E02 C483003C
3EC52E02 C483003C 770F9A38 6A5E5F00 54DE289A 026A500A 468D1650 00020505
468D1650 00020505 8B0275FF 98E03EC5 2E5756EC 8B555756 CB5E5FC9 058998F4
500C468D 16500004 05058B02 75FF98E0 3EC52E57 565E5F00 54DE289A 026A500A
5756CB5E 5FC90589 98F43EC5 2E02C483 003C770F 9A246A5E 5F0054DE 289A026A
5F0054DE 289A026A 500A468D 16500002 05058B02 75FF98E0 3EC52E57 56EC8B55
565E5F00 54DE289A 026A500C 468D1650 00040505 8B0275FF 98E03EC5 2E57565E
2E57565E 5F0054DE 289A026A 500E468D 16500006 05058B02 75FF98E0 3EC52E57
770F9A25 6A5E5F00 54DE289A 026A5010 468D1650 00080505 8B0275FF 98E03EC5

C502C483 003C770F 9A266AEC 8B555756 CB5E5FC9 058998F4 3EC52E02 C483003C
127EC502 C483003C 770F9A28 6A05890E 7EC502C4 83003C77 0F9A276A 05890A7E
E03EC52E 5756EC8B 555756CB 5E5FC905 89167EC5 02C48300 3C770F9A 296A0589
83003C77 0F9A2A6A 5E5F0054 DE289A04 6A500A46 8D165000 0205058B 0275FF98
0205058B 0275FF98 E03EC52E 5756EC8B 555756CB 5E5FC905 8998F43E C52E02C4
8998F43E C52E02C4 83003C77 0F9A396A 5E5F0054 DE289A04 6A500A46 8D165000
56CB5E5F C9058998 F43EC52E 02C48300 3C770F9A 2D6AEC8B 555756CB 5E5FC905
2B6AEC8B 555756CB 5E5FC905 8998F43E C52E02C4 83003C77 0F9A2C6A EC8B5557
FF98E03E C52E5756 EC8B5557 56CB5E5F C9058998 F43EC52E 02C48300 3C770F9A
02C48300 3C770F9A 6B6A5E5F 0054DE28 9A026A50 0A468D16 50000205 058B0275
84D39A0A 76FF1275 00083D00 5455F09A EC8B5557 56CB5E5F C9058998 F43EC52E
0A468D16 50000205 058B0275 FF98E03E C52E5756 6BEB0000 00009A02 C483003C
6A500C46 8D165000 0405058B 0275FF98 E03EC52E 57565E5F 0054DE28 9A026A50
9A046A50 10468D16 50000805 058B0275 FF98E03E C52E5756 5E5F0054 DE289A04
EC8B5557 56CB5E5F C9058998 F43EC52E 02C48300 3C770F9A 336A5E5F 0054DE28
346A5E5F 0054DE28 9A046A50 0A468D16 50000205 058B0275 FF98E03E C52E5756
6AEC8B55 5756CB5E 5FC9058B 98F43EC5 2E058998 F43EC52E 02C48300 3C770F9A
EC8B5557 56CB5E5F C9058B98 F43EC52E 058998F4 3EC52E02 C483003C 770F9A2E
2F6A5E5F 0054DE28 9A046A50 0A468D16 50000205 058B0275 FF98E03E C52E5756
56EC8B55 5756CB5E 5FC9058B 98F43EC5 2E058998 F43EC52E 02C48300 3C770F9A
2E57565E 5F0054DE 289A026A 500A468D 16500002 05058B02 75FF98E0 3EC52E57
770F9A30 6A5E5F00 54DE289A 026A500C 468D1650 00040505 8B0275FF 98E03EC5
0F9A316A EC8B5557 56CB5E5F C9058B98 F43EC52E 058998F4 3EC52E02 C483003C
2E5756EC 8B555756 CB5E5FC9 058B98F4 3EC52E05 8998F43E C52E02C4 83003C77
3EC52E57 565E5F00 54DE289A 046A500A 468D1650 00020505 8B0275FF 98E03EC5
98E03EC5 2E57565E 5F0054DE 289A026A 5012468D 16500006 05058B02 75FF98E0
C483003C 770F9A32 6A5E5F00 54DE289A 046A5014 468D1650 00080505 8B0275FF
FF98E03E C52E5756 EC8B5557 56CB5E5F C9058B98 F43EC52E 058998F4 3EC52E02
0275FF98 E03EC52E 57565E5F 0054DE28 9A046A50 0A468D16 50000205 058B0275
058B0275 FF98E03E C52E5756 5E5F0054 DE289A02 6A500E46 8D165000 0605058B
0A05058B 0275FF98 E03EC52E 57565E5F 0054DE28 9A026A50 10468D16 50000805
50000C05 058B0275 FF98E03E C52E5756 5E5F0054 DE289A02 6A501246 8D165000
8D165000 0E05058B 0275FF98 E03EC52E 57565E5F 0054DE28 9A026A50 14468D16
3EC52E05 8998F43E C52E02C4 83003C77 0F9A356A 5E5F0054 DE289A02 6A501646
468D1650 00020505 8B0275FF 98E03EC5 2E5756EC 8B555756 CB5E5FC9 058B98F4
500E468D 16500006 05058B02 75FF98E0 3EC52E57 565E5F00 54DE289A 046A500A
046A5012 468D1650 000A0505 8B0275FF 98E03EC5 2E57565E 5F0054DE 289A046A
C9058B98 F43EC52E 058998F4 3EC52E02 C483003C 770F9A3A 6A5E5F00 54DE289A
3EC52E57 56EC8B55 5756CB5E 5FC902C4 83003C77 0F9A106A EC8B5557 56CB5E5F
003C770F 9A116A5E 5F0054DE 289A046A 500A468D 16500002 05058B02 75FF98E0
0A468D16 50000205 058B0275 FF98E03E C52E5756 EC8B5557 56CB5E5F C902C483
56CB5E5F C9058998 F43EC52E 02C48300 3C770F9A 3B6A5E5F 0054DE28 9A026A50
0054DE28 9A026A50 0A468D16 50000205 058B0275 FF98E03E C52E5756 EC8B5557
C52E5756 EC8B5557 56CB5E5F C9058998 F43EC52E 02C48300 3C770F9A 4A6A5E5F
E03EC52E 57565E5F 0054DE28 9A026A50 0A468D16 50000205 058B0275 FF98E03E
83003C77 0F9A446A 5E5F0054 DE289A04 6A500C46 8D165000 0405058B 0275FF98
0205058B 0275FF98 E03EC52E 5756EC8B 555756CB 5E5FC905 8998F43E C52E02C4
8998F43E C52E02C4 83003C77 0F9A4D6A 5E5F0054 DE289A02 6A500A46 8D165000
6A500A46 8D165000 0205058B 0275FF98 E03EC52E 5756EC8B 555756CB 5E5FC905
555756CB 5E5FC905 8998F43E C52E02C4 83003C77 0F9A606A 5E5F0054 DE289A02
5E5F0054 DE289A02 6A500A46 8D165000 0205058B 0275FF98 E03EC52E 5756EC8B
616A5E5F 0054DE28 9A026A50 0C468D16 50000405 058B0275 FF98E03E C52E5756
FF98E03E C52E5756 EC8B5557 56CB5E5F C9058998 F43EC52E 02C48300 3C770F9A
02C48300 3C770F9A 676A5E5F 0054DE28 9A046A50 0A468D16 50000205 058B0275
50000205 058B0275 FF98E03E C52E5756 EC8B5557 56CB5E5F C9058998 F43EC52E
C9058998 F43EC52E 02C48300 3C770F9A 686A5E5F 0054DE28 9A026A50 0A468D16
9A026A50 0A468D16 50000205 058B0275 FF98E03E C52E5756 EC8B5557 56CB5E5F
EC8B5557 56CB5E5F C9058998 F43EC52E 02C48300 3C770F9A 4B6A5E5F 0054DE28
4C6A5E5F 0054DE28 9A026A50 0A468D16 50000205 058B0275 FF98E03E C52E5756
FF98E03E C52E5756 EC8B5557 56CB5E5F C9058998 F43EC52E 02C48300 3C770F9A
02C48300 3C770F9A 3C6A5E5F 0054DE28 9A046A50 0A468D16 50000205 058B0275
50000205 058B0275 FF98E03E C52E5756 EC8B5557 56CB5E5F C9058998 F43EC52E
8D165000 0605058B 0275FF98 E03EC52E 57565E5F 0054DE28 9A046A50 0E468D16
16468D16 50000A05 058B0275 FF98E03E C52E5756 5E5F0054 DE289A04 6A501246

2E5756EC 8B555756 CB5E5FC9 02C48300 3C770F9A 3D6A5E5F 0054DE28 9A046A50
3EC52E57 565E5F00 54DE289A 046A500A 468D1650 00020505 8B0275FF 98E03EC5
003C770F 9A3E6A5E 5F0054DE 289A046A 5012468D 16500006 05058B02 75FF98E0
3C770F9A 3F6AEC8B 555756CB 5E5FC905 8B98F43E C52E0589 98F43EC5 2E02C483
770F9A40 6AEC8B55 5756CB5E 5FC9058B 98F43EC5 2E058998 F43EC52E 02C48300
C52E5756 EC8B5557 56CB5E5F C9058B98 F43EC52E 058998F4 3EC52E02 C483003C
E03EC52E 57565E5F 0054DE28 9A046A50 0E468D16 50000205 058B0275 FF98E03E
FF98E03E C52E5756 5E5F0054 DE289A02 6A501246 8D165000 0605058B 0275FF98
02C48300 3C770F9A 416A5E5F 0054DE28 9A026A50 14468D16 50000805 058B0275
C52E5756 EC8B5557 56CB5E5F C9058914 7EC5058B 98F43EC5 2E058998 F43EC52E
E03EC52E 57565E5F 0054DE28 9A026A50 0A468D16 50000205 058B0275 FF98E03E
83003C77 0F9A426A 5E5F0054 DE289A04 6A500C46 8D165000 0405058B 0275FF98
0205058B 0275FF98 E03EC52E 5756EC8B 555756CB 5E5FC905 8998F43E C52E02C4
50000405 058B0275 FF98E03E C52E5756 5E5F0054 DE289A02 6A500A46 8D165000
C9058998 F43EC52E 02C48300 3C770F9A 666A5E5F 0054DE28 9A046A50 0C468D16
555756CB 5E5FC905 8998F43E C52E02C4 83003C77 0F9A436A EC8B5557 56CB5E5F
5E5F0054 DE289A02 6A500A46 8D165000 0205058B 0275FF98 E03EC52E 5756EC8B
456A5E5F 0054DE28 9A026A50 0C468D16 50000405 058B0275 FF98E03E C52E5756
FF98E03E C52E5756 EC8B5557 56CB5E5F C9058998 F43EC52E 02C48300 3C770F9A
02C48300 3C770F9A 4F6A5E5F 0054DE28 9A046A50 0A468D16 50000205 058B0275
50000205 058B0275 FF98E03E C52E5756 EC8B5557 56CB5E5F C9058998 F43EC52E
C9058998 F43EC52E 02C48300 3C770F9A 506A5E5F 0054DE28 9A026A50 0A468D16
C85756CB 5E5FC905 8998F43E C52E02C4 83003C77 0F9A516A EC8B5557 56CB5E5F
5F0054DE 289A046A 500A468D 16500006 05058B02 75FF98E0 3EC52E57 56000002
565E5F00 54DE289A 046A500E 468D1650 000A0505 8B0275FF 98E03EC5 2E57565E
2E57565E 5F0054DE 289A046A 5012468D 1650000E 05058B02 75FF98E0 3EC52E57
3EC52E57 565E5F00 54DE289A 046A5016 468D1650 00120505 8B0275FF 98E03EC5
003C770F 9A536A5E 5F0054DE 289A046A 501A468D 16500016 05058B02 75FF98E0
50000205 058B0275 FF98E03E C52E5756 000002C8 5756CB5E 5FC9FE46 8902C483
56CB5E5F C9FE4689 02C48300 3C770F9A 556A5E5F 0054DE28 9A046A50 0A468D16
3EC52E57 56EC8B55 5756CB5E 5FC9FE46 8902C483 003C770F 9A566A00 0002C857
98E03EC5 2E57565E 5F0054DE 289A046A 500A468D 16500002 05058B02 75FF98E0
75FF98E0 3EC52E57 565E5F00 54DE289A 046A500E 468D1650 00060505 8B0275FF
2E02C483 003C770F 9A696A5E 5F0054DE 289A046A 5012468D 1650000A 05058B02
058998F4 3EC52E02 C483003C 770F9A6A 6AEC8B55 5756CB5E 5FC90589 98F43EC5
026A0000 FA46C700 00F846C7 0000FE46 C70000FC 46C70000 0CC85756 CB5E5FC9
FA5689F8 468906C4 830054B5 4E9A5052 00D28300 04050255 8B058B98 F83EC52E
C7E360F4 46C7FE56 89FC4689 06C48300 54B54E9A 35FF0275 FF98F83E C52E026A
8BE775F6 460BF446 8B087540 0005F7F8 7EC500F6 5E8301F4 6E8308EB 0016F646
FFFA76FF 04C48300 54B57B9A FC76FFFE 76FF1827 05C7FC7E C50774F6 460BF446
026A0000 FE46C700 00FC46C7 000004C8 5756CB5E 5FC904C4 830054B5 7B9AF876
FE5689FC 468906C4 830054B5 4E9A5052 00D28390 40050255 8B058B98 F83EC52E
C6000084 C85756CB 5E5FC904 C4830054 B57B9AFC 76FFFE76 FF140505 C7FC7EC5
FC3E032E 02E7C100 0FE781F8 8B04F8C1 0C468B02 FD46C603 9DE90A46 8B03FF46
C1000FE7 810C7E8B 08C48300 54EE309A 50AC468D 1635FF02 75FF98FE 1E8E2E98
80E908C4 830054ED F09A50AC 468D1635 FF0275FF 99021E8E 2E99003E 032E02E7
FF99061E 8E2E9904 3E032E02 E7C10C7E 8B257500 013D0054 55F09A01 FD46C603
F09A0A74 00023D00 5455F09A 034DE908 C4830054 EE309A50 AC468D16 35FF0275
468D1635 FF0275FF 990A1E8E 2E99083E 032E02E7 C10C7E8B 25750003 3D005455
0275FF99 0E1E8E2E 990C3E03 2E02E7C1 0C7E8B03 14E908C4 830054EE 309A50AC
2D750001 3D005455 F09A02FD 46C602EF E908C483 0054EE30 9A50AC46 8D1635FF
8D1635FF 0275FF99 121E8E2E 99103E03 2E02E7C1 0003E781 F88B08F8 C10C468B
7500033D 005455F0 9A0A7400 023D0054 55F09A6C EB08C483 0054EE30 9A50AC46
1635FF02 75FF9916 1E8E2E99 143E032E 02E7C100 03E781F8 8B08F8C1 0C468B2D
3E032E02 E7C10007 E781F88B 08F8C10C 468B2BEB 08C48300 54EE309A 50AC468D
00FFE781 0C7E8B08 C4830054 EE309A50 AC468D16 35FF0275 FF991A1E 8E2E9918
E908C483 0054EDF0 9A50AC46 8D1635FF 0275FF99 1E1E8E2E 991C3E03 2E02E7C1
1635FF02 75FF9922 1E8E2E99 203E032E 02E7C100 0FE7810C 7E8B01FD 46C6021F
992436FF 2E992636 FF2E3374 003D8398 C03EC52E 08C48300 54EE309A 50AC468D
CA9A50AC 468D1635 FF0275FF 99221E8E 2E99203E 032E02E7 C1000FE7 810C7E8B
3E032E02 E7C1000F E7810C7E 8B992836 FF2E992A 36FF2E01 B8E90CC4 8300544A
01FD46C6 0185E90C C4830054 4ACA9A50 AC468D16 35FF0275 FF99221E 8E2E9920
544ACA9A 50AC468D 16992C36 FF2E992E 36FF2E0C 76FF1A74 003D8398 C03EC52E
40E90AC4 8300544A CA9A50AC 468D1699 3036FF2E 993236FF 2E0C76FF 0AC48300

0C468B80 46890007 2509F8C1 0C468B82 4689000F 250CF8C1 0C468B03 FD46C601
197E0F82 7E83067F 05807E83 FF7C8689 003F250C 468BFF7E 86890007 2506F8C1
4082468B 8076FF1F EB08C483 00544ACA 9A508446 8D169934 36FF2E99 3636FF2E
2E02E7C1 FF7CBE8B 0CC48300 544ACA9A 5084468D 16993836 FF2E993A 36FF2E50
2E99403E 032E02E7 C1FF7EBE 8B508446 8D1635FF 0275FF99 461E8E2E 99443E03
14C48300 544ACA9A 50AC468D 16993C36 FF2E993E 36FF2E35 FF0275FF 99421E8E
1635FF02 75FF994A 1E8E2E99 483E032E 02E7C100 07E7810C 7E8B01FD 46C67FEB
00FD46C6 45EB00FF 46C600AC 46C600FD 46C653EB 08C48300 54EE309A 50AC468D
32272627 0D270014 67FF2EE7 75F9E007 3B2E4343 000AB994 D7BB3BEB 00AC46C6
8293C194 AE94AE94 AE937C92 E2912992 12918127 7E276F27 3A273727 35273327
55F09A0A C4830054 C0489A0A 76FF50E4 2AFF468A 50E42AFD 468A50AC 468D1694
CB5E5FC9 003C9024 9A0575C0 0B005455 F09A0EEB 003C90CE 9A077500 013D0054
7EC50589 0A7EC500 02B803EB 0001B805 7500023D 058B994C 3EC52EEC 8B555756
C52E5756 EC8B5557 56CB5E5F C9058B99 4C3EC52E EC8B5557 56CB5E5F C9058B0A
3C770F9A 596A5E5F 0054DE28 9A046A50 0A468D16 50000205 058B0275 FF98E03E
3EC52E57 56EC8B55 5756CB5E 5FC9058B 98F43EC5 2E058998 F43EC52E 02C48300
003C770F 9A656A5E 5F0054DE 289A026A 500A468D 16500002 05058B02 75FF98E0
05058B02 75FF98E0 3EC52E57 56EC8B55 5756CB5E 5FC90589 98F43EC5 2E02C483
00060505 8B0275FF 98E03EC5 2E57565E 5F0054DE 289A046A 500A468D 16500002
5756CB5E 5FC902C4 83003C77 0F9A00C8 685E5F00 54DE289A 046A500E 468D1650
5F0054DE 289A046A 500A468D 16500002 05058B02 75FF98E0 3EC52E57 56EC8B55
685E5F00 54DE289A 046A500E 468D1650 00060505 8B0275FF 98E03EC5 2E57565E
05058B02 75FF98E0 3EC52E57 56EC8B55 5756CB5E 5FC902C4 83003C77 0F9A00C9
00060505 8B0275FF 98E03EC5 2E57565E 5F0054DE 289A046A 500A468D 16500002
1650000A 05058B02 75FF98E0 3EC52E57 565E5F00 54DE289A 046A500E 468D1650
8B555756 CB5E5FC9 02C48300 3C770F9A 00CA685E 5F0054DE 289A026A 5012468D
565E5F00 54DE289A 026A500A 468D1650 00020505 8B0275FF 98E03EC5 2E5756EC
2E57565E 5F0054DE 289A046A 500C468D 16500004 05058B02 75FF98E0 3EC52E57
3EC52E57 565E5F00 54DE289A 046A5010 468D1650 00080505 8B0275FF 98E03EC5
3C770F9A 00CB685E 5F0054DE 289A046A 5014468D 1650000C 05058B02 75FF98E0
468D1650 00020505 8B0275FF 98E03EC5 2E5756EC 8B555756 CB5E5FC9 02C48300
500C468D 16500006 05058B02 75FF98E0 3EC52E57 565E5F00 54DE289A 026A500A
068B2EEC 8B555756 CB5E5FC9 02C48300 3C770F9A 00A2685E 5F0054DE 289A026A
C5058B99 543EC52E EC8B5557 56CB5E5F C9025589 05890A7E C5995216 8B2E9950
468D1650 00020505 8B0275FF 98E03EC5 2E5756EC 8B555756 CB5E5FC9 05890A7E
56EC8B55 5756CB5E 5FC902C4 83003C77 0F9A00CC 685E5F00 54DE289A 046A500E
2E57565E 5F0054DE 289A046A 500E468D 16500002 05058B02 75FF98E0 3EC52E57
3EC52E57 565E5F00 54DE289A 046A5012 468D1650 00060505 8B0275FF 98E03EC5
3C770F9A 00CD685E 5F0054DE 289A026A 5016468D 1650000A 05058B02 75FF98E0
004C1540 00CB5E5F C9058916 7EC5058B 98F43EC5 2E058998 F43EC52E 02C48300
004C1566 004C153A 004C13F8 004C13EE 004C140E 004C1402 004C153E 004C13EC
004C14E2 00149436 004C1564 004C1550 004C1554 00147B9E 004C156A 004C154C
004C145E 004C14AA 004C14D2 004C14C6 004C144E 004C142A 004C141A 004C14F2
004C131A 004C12FE 004C12FD 004C12EA 004C12DB 004C12D7 004C12CF 004C1522
C52E0000 6AC85756 0014945F 00149461 0014944E 004C143E 004C1338 004C1324
03E7D116 7E8B04C4 830054EB 729AB842 36FF2EB8 4436FF2E 1274003D 80B83E3E
7E8BF446 8900A885 8B145E8E 127E03E7 D1167E8B F6468900 A0858B14 5E8E127E
8900B885 8B145E8E 127E03E7 D1167E8B F2468900 B0858B14 5E8E127E 03E7D116
C1167E8B C85EDD9B B8460EDC 2E9B4045 D99B145E 8E127E03 02E7C116 7E8BF046
1DDD9BB8 4E3EC52E B85A26DC 2E9BB852 0EDC2E9B 3045D99B 145E8E12 7E0302E7
5A26DC2E 9BB8520E DC2E9B20 45D99B14 5E8E127E 0302E7C1 167E8BB8 6636C42E
D99B145E 8E127E03 02E7C116 7E8BB86E 36C42E1D DD9BB862 3EC52E0C D8269BB8
8BB87636 C42E1DDD 9BB86A3E C52E0CD8 269BB85A 26DC2E9B B8520EDC 2E9B1045
C52E0CD8 269BB85A 26DC2E9B B8520EDC 2E9B05D9 9B145E8E 127E0302 E7C1167E
D85ED99B 5075D89B B87A06DD 2E9B145E 8E127E03 02E7C116 7E8B1DDD 9BB8723E
5E8E127E 0302E7C1 167E8BE6 5ED99B00 C085D99B 145E8E12 7E0302E7 C1167E8B
F276FFF0 76FFF676 FFF476FF 1E74003D 80B83E3E C52EE25E D99B00D0 85D99B14
D846D99B 5874003D 80B83E3E C52E0CC4 8300544A 8A9AB882 36FF2EB8 8436FF2E
2E005496 8F9A05DD 9BB86A3E C52E0054 968F9A05 DD9BB872 3EC52E00 54968F9A
968F9AC8 46DD9B00 54968F9A 05DD9BB8 4E3EC52E 0054968F 9A05DD9B B8623EC5
D99B2474 003D80B8 3E3EC52E 34C48300 544A8A9A B88636FF 2EB88836 FF2E0054
8300544A 8A9AB88A 36FF2EB8 8C36FF2E 0054968F 9AE646D9 9B005496 8F9AE246
7E8B767D 03167E83 04C48300 549BD59A 50001205 B88E068B 2EB89036 FF2E14C4
74003D80 B83E3EC5 2E0000B6 46C72375 FFFF3D00 E0858B14 5E8E127E 03E7D116

02E7C116 7E8B0001 B646C73F EB04C483 00544A8A 9AB89236 FF2EB894 36FF2E53
003D80B8 3E3EC52E 1C750054 968A9AB8 961EDC2E 9B00F085 D99B145E 8E127E03
1EDC2E9B 05DD9BB8 4E3EC52E 04C48300 544A8A9A B89E36FF 2EB8A036 FF2E1274
96E90377 0054968A 9AB8AA1E DC2E9B05 DD9BB84E 3EC52E18 72005496 8A9AB8A2
B8BE3EC5 2E1855DD 9BB8BE3E C52EEED9 9B1DDD9B B8B23EC5 2EB8B606 DD2E9B00
B23EC52E B8CA0EDC 2E9BC846 DD9B185D DD9BB8B2 3EC52EB8 C206DD2E 9B1DDD9B
0EDC2E9B C846DD9B 085DDD9B B8BE3EC5 2EB8D20E DC2E9BC8 46DD9B08 5DDD9BB8
9BA65EDD 9BB8520E DC2E9BC8 46DD9B10 5DDD9BB8 B23EC52E B8DA06DC 2E9BB8CA
9D9A50F2 462BF646 8B003CAE FE9A105D DD9BB8BE 3EC52EA6 66DC9BB8 5206DD2E
9A50F046 2BF4468B D45ED99B A676DC9B B85A06DD 2E9BA65E DD9B02C4 83005496
9BC44ED8 9BF646DF 9BC45ED9 9BD44ED8 9BD046D9 9BD05ED9 9B02C483 0054969D
9BC446D9 9B145E8E 127E0302 E7C1167E 8BC05ED9 9BA666DC 9BF446DF 9BA65EDD
9AB8E21E DC2E9BF6 46DF9B11 73005496 8A9AB8E2 1EDC2E9B F446DF9B 01169DD9
EBAE5ED9 9B012695 D99BC446 D99B145E 8E127E03 02E7C116 7E8B1B72 0054968A
E206DD2E 9BA65EDD 9BF666DE 9BB8E206 DD2E9B14 5E8E127E 0302E7C1 167E8B62
2E9B1CEB B8EA06DD 2E9B0876 0054968A 9AB8EA1E DC2E9BA6 76DC9BF4 66DE9BB8
9B012695 D99B9E76 DC9BF466 DE9BB8E2 06DD2E9B 9E5EDD9B F666DE9B B8E206DD
5EDD9BAE 76D89B02 C4830054 969D9A50 F4462B00 FFB8437F 00FFF47E 81AE5ED9
81FE4689 08C48300 5496EF9A 0054968F 9AB8F206 DC2E9BA6 46DC9BF6 46DF9BA6
9BA65EDD 9BC476D8 9BF046DF 9BFE4689 F6468B06 EB00FFFE 46C70D7E 00FFFE7E
FC7E83FC 468908C4 83005496 EF9A0054 968F9AB8 F206DC2E 9BA666DC 9BF246DF
03E7D1E0 7E8B117D FC463BE0 468BE046 FF03EB00 00E046C7 0000FC46 C7057D00
00FFF67E 81FA4689 C02B02EB F2468B05 7E00F27E 83E4EB00 0005C70C 5E8E0A7E
647DFA46 3BE0468B E046FF03 EBE04689 FC468BF8 468900FF B803EBF6 468B057D
968A9AA6 5EDC9BEE D99BA65E DD9BB8F2 06DC2E9B C046D89B E04EDE9B C446D99B
D89BE04E DE9BC446 D99B1FEB 08C48300 5496EF9A 0054968F 9AEED99B 12760054
0C5E8E0A 7E03E7D1 E07E8B08 C4830054 96EF9A00 54968F9A B8F206DC 2E9BC046
46FF03EB E04689FA 468BEE46 89F4468B 03EB00FF B8057E00 FFF47E81 91EB0589
8BA65EDD 9B02C483 0054969D 9A50F246 2BF6468B 0096E903 7EF8463B E0468BE0
8D1650D8 468D1616 76FFB85E D99BA676 DC9B02C4 83005496 9D9A50F2 462BE046
968F9AB8 F206DC2E 9BD04ED8 9BBC46D9 9BBC5ED9 9B0AC483 003CA82B 9A50B846
03E7D1E0 7E8B0589 0C5E8E0A 7E03E7D1 E07E8BF0 460308C4 83005496 EF9A0054
E90589EE 468B0C5E 8E0A7E03 E7D1E07E 8BFF6FE9 037FEE46 3B058B0C 5E8E0A7E
50F8462B E0468B00 91E9037E FE463BE0 468BE046 FF03EBE0 468940F8 468BFF5C
DD9BB8F2 06DC2E9B F446DE9B 9E4EDC9B AE46D99B 9E5EDD9B 02C48300 54969D9A
EF9A0054 968F9AB8 FA06DF2E 9B157300 54968A9A A65EDC9B B8FA06DF 2E9BA65E
9BAE46D9 9B965EDD 9B02C483 0054969D 9A50F846 2BE0468B 32EB08C4 83005496
03E7D1E0 7E8B08C4 83005496 EF9A0054 968F9AB8 F206DC2E 9BF446DE 9B964EDC
E07E8B11 7F00FFE0 7E81E046 FF03EBE0 468940FE 468BFF61 E905890C 5E8E0A7E
008AE903 7401B67E 830093E9 037C0316 7E83E5EB 00FF05C7 0C5E8E0A 7E03E7D1
C1167E8B 04C48300 544A8A9A B8FC36FF 2EB8FE36 FF2E1274 003D80B8 3E3EC52E
D99BB25E D99B08C4 83003CB3 669A0054 968F9A00 F085D99B 145E8E12 7E0302E7
3CB4789A 0A76FF0C 76FF00E0 B5FF145E 8E127E03 E7D1167E 8B005496 8F9AB246
0302E7C1 167E8BB2 4ED89B01 2685D99B 145E8E12 7E0302E7 C1167E8B 0EC48300
E6D1DC76 8B3B7F00 FFDC7E81 DC46FF03 EB0001DC 46C70126 9DD99B14 5E8E127E
7E03E7D1 DC7E8BD8 7E043B26 FE458B0C 5E8E0A7E 03E7D1DC 7E8B0C46 8E0A7603
E04EFF03 EB00FFE0 46C7BBEB 05890C5E 8E0A7E03 E7D1DC7E 8BFE458B 0C5E8E0A
E0468B14 5E8E127E 03E7D116 7E8BEB74 00FF3D05 8B0C5E8E 0A7E03E7 D1E07E8B
E07E8BE0 46FF03EB 0000E046 C7010E85 8940E046 8B04EB00 FFB8057E 00FF3D40
C02B047D 48E0468B 145E8E12 7E03E7D1 167E8BED 74003D83 0C5E8E0A 7E03E7D1
19750054 968A9AA6 5EDC9BE2 46D99BA6 5EDD9BEE D99B0106 858948E0 468B04EB
FF1476FF 1676FF29 74005496 8A9A9E5E DC9BE646 D99B9E5E DD9BB8FA 06DF2E9B
83003CB5 599A0A76 FF0C76FF 0054968F 9AE246D9 9B005496 8F9AE646 D99B1276
D99BA65E DD9BEED9 9BEA4689 EE468BEC 4689F046 8B027FE9 03740118 7E831AC4
9A9E5EDC 9BE646D9 9B9E5EDD 9BB8FA06 DF2E9B2B 75005496 8A9AA65E DC9BE246
9BA65EDD 9BEED99B 4BEBEC46 89058B0C 5E8E0A7E 03E7D1F2 7E8B1274 0054968A
9E5EDC9B E646D99B 9E5EDD9B B8FA06DF 2E9B3574 0054968A 9AA65EDC 9BE246D9
058B0C5E 8E0A7E03 E7D1F67E 8B107500 B67E8316 7D03167E 831C7500 54968A9A
969D9A50 F2462BF6 468B00ED E9037C40 E07E83E0 46FF03EB 0000E046 C7EA4689
DC9BB8E2 36DC2E9B 02C48300 54969D9A 5002E0C1 E0468B9E 5EDD9B02 C4830054
C4830054 96EF9A00 54968F9A B8F206DC 2E9BA646 DC9BF246 DF9BA65E DD9B9E4E
8E0A7E03 E7D1DE7E 8BA65EDD 9B02C483 0054969D 9A50EC46 2BEA468B DE468908
B8F206DC 2E9BA676 DC9BB8E2 0EDC2E9B 02C48300 54969D9A 50EC462B 058B0C5E
03E7D1E0 7E8B0589 105E8E0E 7E03E7D1 E07E8B08 C4830054 96EF9A00 54968F9A

7E8BFF2C E900FF05 C7105E8E 0E7E03E7 D1E07E8B 127E00FF 3D058B10 5E8E0E7E
000005C7 105E8E0E 7E03E7D1 E07E8BFF 19E9037C 003D8310 5E8E0E7E 03E7D1E0
9D9A5048 02E0C1E0 468B9E5E DD9B02C4 83005496 9D9A50F2 462BF646 8BFF07E9
06DC2E9B A646DC9B F246DF9B A65EDD9B 9E4EDC9B B8E236DC 2E9B02C4 83005496
C4830054 969D9A50 EC462BEA 468BDE46 8908C483 005496EF 9A005496 8F9AB8F2
2E9B02C4 83005496 9D9A50EC 462B058B 0C5E8E0A 7E03E7D1 DE7E8BA6 5EDD9B02
E7D1E07E 8B08C483 005496EF 9A005496 8F9AB8F2 06DC2E9B A676DC9B B8E20EDC
03E7D1E0 7E8B117E 00FF3D05 8B105E8E 0E7E03E7 D1E07E8B 0589105E 8E0E7E03
E7D1E07E 8B0F7D00 3D83105E 8E0E7E03 E7D1E07E 8B1FEB00 FF05C710 5E8E0E7E
729AB900 36FF2EB9 0236FF2E 1274003D 80B83E3E C52E0000 05C7105E 8E0E7E03
03E7D114 7E8B0000 3CC85756 CB5E5FC9 9BC02B00 0005C71A 7EC504C4 830054EB
7E8BFC46 8900A885 8B125E8E 107E03E7 D1147E8B FE468900 A0858B12 5E8E107E
8900B885 8B125E8E 107E03E7 D1147E8B FA468900 B0858B12 5E8E107E 03E7D114
C1147E8B DC5EDD9B B8460EDC 2E9B4045 D99B125E 8E107E03 02E7C114 7E8BF846
1DDD9BB8 4E3EC52E B85A26DC 2E9BB852 0EDC2E9B 3045D99B 125E8E10 7E0302E7
5A26DC2E 9BB8520E DC2E9B20 45D99B12 5E8E107E 0302E7C1 147E8BB8 7636C42E
D99B125E 8E107E03 02E7C114 7E8BB86E 36C42E1D DD9BB862 3EC52E0C D8269BB8
8BB86636 C42E1DDD 9BB86A3E C52E0CD8 269BB85A 26DC2E9B B8520EDC 2E9B1045
C52E0CD8 269BB85A 26DC2E9B B8520EDC 2E9B05D9 9B125E8E 107E0302 E7C1147E
E85ED99B 5075D89B B87A06DD 2E9B125E 8E107E03 02E7C114 7E8B1DDD 9BB8723E
5E8E107E 0302E7C1 147E8BF2 5ED99B00 C085D99B 125E8E10 7E0302E7 C1147E8B
2E187200 54968A9A B8A21EDC 2E9B05DD 9BB84E3E C52EEE5E D99B00D0 85D99B12
3EC52EB8 B606DD2E 9B0096E9 03770054 968A9AB8 AA1EDC2E 9B05DD9B B84E3EC5
2EB8C206 DD2E9B1D DD9BB8BE 3EC52E18 55DD9BB8 BE3EC52E EED99B1D DD9BB8B2
9BDC46DD 9B085DDD 9BB8B23E C52EB8CA 0EDC2E9B DC46DD9B 185DDD9B B8B23EC5
C52EB8DA 06DC2E9B B8CA0EDC 2E9BDC46 DD9B085D DD9BB8BE 3EC52EB8 D20EDC2E
2ECC66DC 9BB85206 DD2E9BCC 5EDD9BB8 520EDC2E 9BDC46DD 9B105DDD 9BB8B23E
E45ED99B 02C48300 54969D9A 50F8462B FC468B00 3CAEFE9A 105DDD9B B8BE3EC5
C4830054 969D9A50 FA462BFE 468BF646 89FC468B 03EB00FF B8057E00 FFFC7E81
161476FF D45ED99B CC76DC9B 02C48300 54969D9A 50FA462B 0A468BCC 5EDD9B02
DC2E9BE4 4ED89BD8 46D99BD8 5ED99B0A C483003C A82B9A50 D4468D16 50E8468D
EC468905 8B0C7EC5 05890C7E C5F84603 08C48300 5496EF9A 0054968F 9AB8F206
F246D99B CC5EDD9B B8FA06DF 2E9B0589 0C7EC5F6 468B087E F6463B05 8B0C7EC5
74005496 8A9AC45E DC9BEE46 D99BC45E DD9BEED9 9B167500 54968A9A CC5EDC9B
3CB7B29A EC76FF0C 76FF0E76 FF005496 8F9AF246 D99B0054 968F9AEE 46D99B23
D99B0E7E C5FC5ED9 9B05D99B 0A7EC500 0030C857 56CB5E5F C99BC02B 16C48300
05DD9BB8 4E3EC52E F05EDD9B E856DD9B E056DD9B D856DD9B EED99BF8 5ED99B05
0054968A 9AB8AA1E DC2E9B05 DD9BB84E 3EC52E15 72005496 8A9AB8A2 1EDC2E9B
9B08C483 003CAE00 9A005496 8F9AFC46 D99BD05E DD9B05DD 9BB84E3E C52E2576
623EC52E 15720054 968A9AB8 A21EDC2E 9B05DD9B B8623EC5 2EF05EDD 9BD04EDC
12468BD0 5EDD9B05 DD9BB862 3EC52E45 76005496 8A9AB8AA 1EDC2E9B 05DD9BB8
52B90616 8B2EB904 06032E02 E0C11246 8B5052B9 0A168B2E B9080603 2E02E0C1
2E9B05DD 9BB86A3E C52EE85E DD9BD04E DC9B0CC4 83003CAC EB9A50FC 468D1650
38760054 968A9AB8 AA1EDC2E 9B05DD9B B86A3EC5 2E157200 54968A9A B8A21EDC
FF2EB90E 36FF2EB9 1036FF2E B91236FF 2E1276FF D05EDD9B 05DD9BB8 6A3EC52E
05DD9BB8 723EC52E E05EDD9B D04EDC9B 0EC48300 3CAB479A 50FC468D 16B90C36
0054968A 9AB8AA1E DC2E9B05 DD9BB872 3EC52E15 72005496 8A9AB8A2 1EDC2E9B
5052B91A 168B2EB9 1806032E 02E0C112 468BD05E DD9B05DD 9BB8723E C52E4576
9B0CC483 003CAA16 9A50FC46 8D165052 B916168B 2EB91406 032E02E0 C112468B
C4830054 D1809A00 54968F9A FC46D99B 0054968F 9AF846D9 9BD85EDD 9BD04EDC
C50E76C4 000028C8 5756CB5E 5FC99BD8 46DC9BE0 46DC9BE8 46DC9BF0 46DC9B10
5ED99B24 D8269B05 D99B127E C50E76C4 13740054 968A9A1C D8269B05 D99B127E
8F9A05D9 9B127EC5 0054968F 9A05D99B 0E7EC528 74003D80 B83E3EC5 2E38EBE8
D99B0E7E C500C7E9 EED99B14 C4830054 4A8A9AB9 1C36FF2E B91E36FF 2E005496
0A7EC5E0 5EDD9BD8 66DC9BB9 2806DD2E 9BD85EDD 9BE876D8 9BB9200E DC2E9B05
269B05D9 9B0A7EC5 0E76C4EC 5ED99BE0 46DC9B0D D89BE876 D89BB920 06DD2E9B
DD2E9B62 73005496 8A9A1CD8 269B05D9 9B0A7EC5 1276C476 76005496 8A9A1CD8
9BB85A06 DD2E9BE0 5EDD9BB9 300EDC2E 9BEC46D9 9BEC5ED9 9BEC66D8 9BB85A06
9BF04EDC 9BB93806 DD2E9BF0 5EDD9BB8 F226DC2E 9BEC46D9 9BF85EDD 9BE066DC
9B03EBE0 76DC9BF8 4EDC9BF8 4EDC9BEC 46D99BE0 5EDD9BB8 4606DC2E 9BF04EDC
36032E02 E6C11676 8BF85ED9 9BB8F206 DD2E9B00 0020C857 56CB5E5F C99BEED9
E6C11676 8B0168E9 03770054 968A9A1C D8269B05 D99B0A7E C5B94206 8E2EB940
8B0144E9 03720054 968A9A1C D8269B05 D99B0A7E C5B94606 8E2EB944 36032E02
65730054 968A9A1C D8269B05 D99B0A7E C5B94A06 8E2EB948 36032E02 E6C11676

B94A1E8E 2EB9483E 032E02E7 C1167E8B B942068E 2EB94036 032E02E6 C116768B
D99B0A7E C5B94206 8E2EB940 36032E02 E6C11676 8BE85EDD 9B24D826 9B05D99B
4C06DC2E 9BE876DC 9BF04EDC 9BB94C26 DC2E9BF8 46D99BF0 5EDD9B24 D8269B05
9A1CD826 9B05D99B 0A7EC5B9 4A068E2E B9483603 2E02E6C1 16768BFC 5ED99BB9
443E032E 02E7C116 7E8BB94A 068E2EB9 4836032E 02E6C116 768B6B72 0054968A
4A068E2E B9483603 2E02E6C1 16768BE0 5EDD9B24 D8269B05 D99BB946 1E8E2EB9
76DC9BE8 4EDC9BF8 66D89BB8 5A06DD2E 9BE85EDD 9B24D826 9B05D99B 0A7EC5B9
9BF05EDD 9BFC66D8 9BB85A06 DD2E9BFC 5ED99BF0 46DC9BF8 46D99BF0 5EDD9BE0
46D99BFC 5ED99BFC 4ED89BB8 EA0EDC2E 9BFC46D9 9BFC5ED9 9BF04EDC 9BFC46D9
8A9A1CD8 269B05D9 9B127EC5 0E76C400 0020C857 56CB5E5F C99BEED9 9B03EBFC
003D80B8 3E3EC52E 38EBE85E D99B24D8 269B05D9 9B127EC5 0E76C413 74005496
36FF2EB9 5636FF2E 0054968F 9A05D99B 127EC500 54968F9A 05D99B0E 7EC52874
E876D89B B9200EDC 2E9B05D9 9B0E7EC5 00ABE9EE D99B14C4 8300544A 8A9AB954
C50E76C4 EC5ED99B E066DC9B 0DD89BE8 76D89BB9 2006DD2E 9B0A7EC5 E05EDD9B
968A9A1C D8269B05 D99B0A7E C51276C4 68760054 968A9A1C D8269B05 D99B0A7E
F85EDD9B E066DC9B B85A06DD 2E9BE05E DD9BB930 0EDC2E9B EC46D99B 54730054
06DC2E9B F04EDC9B F04EDC9B B93806DD 2E9BF05E DD9BB8F2 26DC2E9B EC46D99B
CB5E5FC9 9BEED99B 03EBE076 DC9BF84E DC9BF84E DC9BEC46 D99BE05E DD9BB846
B8B41E8E 2EB8B23E 032E03E7 C1EE7E8B EE46FF03 EB0000EE 46C70000 2AC85756
B41E8E2E B8B23E03 2E03E7C1 EE7E8BEE 4EFFDF77 0054968A 9A1DDC9B 0A46DD9B
06DD2E9B B9621E8E 2EB9603E 032E03E7 C1EE7E8B F85EDD9B 25DC9B0A 46DD9BB8
DE5EDD9B 05DD9BB8 C01E8E2E B8BE3E03 2E03E7C1 EE7E8BD6 5EDD9B0D DC9BB964
5E1E8E2E B95C3E03 2E03E7C1 47EE7E8B B95E068E 2EB95C36 032E03E6 C1EE768B
2EB95836 032E03E6 C1EE768B E65EDD9B D676DC9B F84EDC9B 24DC269B 05DD9BB9
46DC9BB8 7A36DC2E 9B05DD9B B95E1E8E 2EB95C3E 032E03E7 C1EE7E8B B95A068E
5756CB5E 5FC99BF0 46DD9BF0 5EDD9BDE 46DC9BF8 4EDC9B04 DC269BF8 4EDC9BE6
8B010AE9 037F9E46 3B489A46 8B9E46FF 03EB0000 9E46C700 049A46C7 000076C8
B8B41E8E 2EB8B23E 032E03E7 C1479E7E 8BB8B406 8E2EB8B2 36032E03 E6C19E76
03E7C19E 7E8B1DDD 9BB9621E 8E2EB960 3E032E03 E7C19E7E 8B24DC26 9B05DD9B
463B489A 468B9673 0054968A 9AB8AA1E DC2E9B05 DD9BB962 1E8E2EB9 603E032E
2E03E7C1 479C7E8B 507E9C46 3B489A46 8B9C46FF 03EB9C46 89409E46 8B8D7E9E
8B1DDD9B B8B41E8E 2EB8B23E 032E03E7 C19C7E8B 05DD9BB8 B41E8E2E B8B23E03
8E2EB8BE 3E032E03 E7C19C7E 8B05DD9B B8C01E8E 2EB8BE3E 032E03E7 C1479C7E
C1479E7E 8BB8B406 8E2EB8B2 36032E03 E6C19E76 8B9A4EFF A4EB1DDD 9BB8C01E
8E2EB960 3E032E03 E7C19E7E 8B24DC26 9B05DD9B B8B41E8E 2EB8B23E 032E03E7
7A0EDC2E 9B0844DC 269B05DD 9BB9603E C52EB960 36C42EFF 31E91DDD 9BB9621E
4689489E 468B008A E9037C9A 463B9E46 8B9E46FF 03EB0002 9E46C7C8 5EDD9BB8
8E2EB960 36032E03 E6C19C76 8B8A5EDD 9BC045DD 9B1F16FD 0303E7C1 9C7E8B9C
DD9B8A76 DC9B0CDC 269B05DD 9BB9621E 8E2EB960 3E032E03 E7C19C7E 8BB96206
1E8E2EB9 603E032E 03E7C19C 7E8BB962 068E2EB9 6036032E 03E6C19E 768B925E
5DDD9B1F 16FD0303 E7C19E7E 8B9266DC 9BB87A0E DC2E9B04 DC269B05 DD9BB962
3E032E03 E7C14F9E 7E8B547D 9A463B9E 468B9E46 FF03EB00 019E46C7 FF68E9C0
8BB8C006 8E2EB8BE 36032E03 E6C14E9E 768B925E DD9B05DD 9BB9621E 8E2EB960
03E7C19E 7E8B9276 DC9B24DC 269B05DD 9BB8C01E 8E2EB8BE 3E032E03 E7C19E7E
C19E768B 347D9A46 3B9E468B 9E46FF03 EB00019E 46C7A1EB E05DDD9B 1F16FD03
B9640EDC 2E9BE064 DC269BE0 45DD9B1F 16FD0303 E7C1479E 7E8B0716 F50303E6
463B489A 468B9E46 FF03EB00 019E46C7 C1EBA05D DD9B1F16 FD0303E7 C19E7E8B
8B0716F5 0303E6C1 9E768B92 5EDD9BC0 45DD9B1F 16FD0303 E7C19E7E 8B4D7E9E
C1479E7E 8B9276DC 9BA04CDC 269B05DD 9BB9621E 8E2EB960 3E032E03 E7C19E7E
5E1E8E2E B95C3E03 2E03E7C1 4F9A7E8B A7EBA05D DD9BA06D DC9B1F16 FD0303E7
4F4F9A7E 8B0716F5 0303E6C1 4E4E9A76 8B1DDD9B B95C3EC5 2E15DD9B EED99BB9
1E8E2EB9 5C3E032E 03E7C14F 4F9A7E8B C074DC26 9BA045DD 9B1F16FD 0303E7C1
03E6C146 9E768B62 7E009E7E 839E4EFF 03EB9E46 8900032D 9A468B1D DD9BB95E
DC269B05 DD9BB962 1E8E2EB9 603E032E 03E7C19E 7E8BB95E 068E2EB9 5C36032E
66DC9BA0 45DD9B1F 16FD0303 E7C19E7E 8B0716F5 0303E6C1 9E768B92 5EDD9B0C
00009E46 C795EB1D DD9BB95E 1E8E2EB9 5C3E032E 03E7C19E 7E8BC074 DC269B92
62068E2E B9603603 2E03E6C1 9E768B00 90E9037F 9E463B48 9A468B9E 46FF03EB
DD9BB8EA 36DC2E9B 0CDC269B 05DD9BB9 5E1E8E2E B95C3E03 2E03E7C1 9E7E8BB9
8E2EB95C 3E032E03 E7C1479E 7E8BB962 068E2EB9 6036032E 03E6C19E 768B8A5E
9B1F16FD 0303E7C1 479E7E8B 925EDD9B B96436DC 2E9B0CDC 269B05DD 9BB95E1E
61E91DDD 9BB95A1E 8E2EB958 3E032E03 E7C19E7E 8B8A66DC 9B9266DC 9BE045DD
2E9BF846 DD9BF85E DD9B0A4E DC9BB96C 06DF2E9B 000010C8 5756CB5E 5FC99BFF
9B1B7400 3D80B83E 3EC52EF8 5EDD9BB9 7606DD2E 9B0A7500 54968A9A B96E1EDC
2EB89036 FF2E0CC4 8300544A 8A9AB97E 36FF2EB9 8036FF2E 0054968F 9A0A46DD

8F9AF846 DD9B1B74 003D80B8 3E3EC52E 04C48300 549BD59A 50001205 B88E068B
05B88E06 8B2EB890 36FF2E0C C4830054 4A8A9AB9 8236FF2E B98436FF 2E005496
9BF85EDD 9BB98E0E DC2E9BB9 8636DC2E 9BF846DD 9B04C483 00549BD5 9A500012
DD9B1B74 003D80B8 3E3EC52E F05EDD9B 08C48300 54C9C09A 0054968F 9AF846DD
8B2EB890 36FF2E0C C4830054 4A8A9AB9 9636FF2E B99836FF 2E005496 8F9AF046
7E8B0000 1AC85756 CB5E5FC9 9BF046DD 9B04C483 00549BD5 9A500012 05B88E06
FF2E0E76 FFF276FF 1874003D 80B83E3E C52EF246 89058B0C 5E8E0A7E 03E7D10E
D59A5000 1205B88E 068B2EB8 9036FF2E 08C48300 544A8A9A B99A36FF 2EB99C36
468BEE5E D99BE666 DC9BF246 DF9BE65E DD9B104E DC9BF246 DF9B04C4 8300549B
468BF656 89F44689 01FE050C 568B0A46 8BFA5689 F846890C 568B0A46 03E0D10E
DF9BFC7E C53977F4 463BFE56 8BFC468B 02FC4683 04EBFE56 89FC4689 FA568BF8
89FC7EC5 08C48300 5496EF9A 0054968F 9AB8F206 DC2E9BEE 46D89B10 4EDC9B05
8B00001E C85756CB 5E5FC99B B8EB00FF 05C7FC7E C5C17E00 FF3D058B FC7EC505
0106858B 205E8E1E 7E03E7D1 227E8BF4 4689010E 858B205E 8E1E7E03 E7D1227E
7E0302E7 C1227E8B EE5ED99B 012685D9 9B205E8E 1E7E0302 E7C1227E 8BF24689
95E9037E 00FFFE7E 81FE46FF 03EB0000 FE46C7EA 5ED99B01 1685D99B 205E8E1E
9BE24EDC 9B05DF9B 0C5E8E0A 7E03E7D1 FE7E8BE2 5EDD9B0E 66DC9B16 46DD9B00
54968A9A E25EDC9B F646D99B E25EDD9B EED99BF6 5ED99B0E 46DC9BB8 E236DC2E
8A9AE25E DC9BF646 D99BE25E DD9BB8FA 06DF2E9B 23EBF65E D99BEED9 9B097300
EF9A0054 968F9AB8 F206DC2E 9BF646D9 9BF65ED9 9BB8FA06 DF2E9B0A 76005496
C7009DE9 037F00F2 7E83FF5E E905890C 5E8E0A7E 03E7D1FE 7E8B08C4 83005496
0054969D 9A50FE46 2BF2468B 0088E903 7CF2463B FE468BFE 46FF03EB 0000FE46
DD9B0E66 DC9B1646 DD9BFA5E D99BE24E DC9BE0D9 9BEA46D9 9BE25EDD 9B02C483
9BE25EDD 9BEED99B F65ED99B 0E46DC9B B8E236DC 2E9BE24E DC9BFA46 D99BE25E
9AB8F206 DC2E9BF6 46D99BF6 5ED99BEE D99B0773 0054968A 9AE25EDC 9BF646D9
FFF47E81 FF6AE905 890C5E8E 0A7E03E7 D1FE7E8B 08C48300 5496EF9A 0054968F
2BFE468B 0091E903 7E00FFFE 7E81FE46 FF03EBFE 468940F4 468B00A7 E9037C00
5ED99BE2 46DC9BB8 FA06DF2E 9BE25EDD 9BEE4ED8 9B02C483 0054969D 9A50F446
9B0E46DC 9BB8E236 DC2E9BE2 4EDC9BFA 46D99BE2 5EDD9B0E 66DC9B16 46DD9BFA
06DF2E9B 0A760054 968A9AE2 5EDC9BF6 46D99BE2 5EDD9BB8 FA06DF2E 9BF65ED9
FE7E8B08 C4830054 96EF9A00 54968F9A B8F206DC 2E9BF646 D99BF65E D99BB8FA
1866DC9B 1046DD9B 00000CC8 5756CB5E 5FC99BFF 62E90589 0C5E8E0A 7E03E7D1
5EDD9BEE D99BFC5E D99B1846 DC9BB8E2 36DC2E9B F44EDC9B 0A46DF9B F45EDD9B
9BB8FA06 DF2E9B23 EBFC5ED9 9BEED99B 09730054 968A9AF4 5EDC9BFC 46D99BF4
FC46D99B FC5ED99B B8FA06DF 2E9B0A76 0054968A 9AF45EDC 9BFC46D9 9BF45EDD
951F00CB 5E5FC99B 05890C7E C508C483 005496EF 9A005496 8F9AB8F2 06DC2E9B
00000000 00003FC9 99999999 999A004C 6C983FB9 99999999 999A004C 69DC0014
00000000 0000004C 6BD0004C 6CB0004C 6BAC004C 6CA8004C 6BF4004C 6CA03FF0
6A934014 00000000 0000004C 6A81004C 7C64004C 6A68004C 6A2A004C 6A0B4000
6C18BF40 624DD2F1 A9FC004C 6BF83F84 7AE147AE 147BBF84 7AE147AE 147B004C
00000000 0000BFC9 99999999 999A3FE8 00000000 00003FF0 020C49BA 5E35004C
004C6AB1 00FF3FE0 00000000 00004008 00000000 0000406F E0000000 00003FD0
004C6AD3 004C6BC0 004C6BB0 004C6B70 004C6B6C 004C6BE4 004C6BD4 004C6AC6
400CCCCC CCCCCCCD 40033333 33333333 3FE2B851 EB851EB8 3FDA8F5C 28F5C28F
004C6C58 004C6C38 004C6AF0 00000000 00000000 004C6B9C 004C6B8C 004C6B7C
6B0D4056 40000000 00004056 80000000 00000009 40180000 00000000 004C6C78
5756004C 6B42004C 6B314009 21FB5444 2D184066 80000000 0000004C 6B21004C
0E7E0302 E7C1FE7E 8B008AE9 037C04FE 7E83FE46 FF03EB00 00FE46C7 0000A4C8
E7C1FE7E 8B0FEBD6 F406DD2E 9B087600 54968A9A D6F41EDC 2E9B05D9 9B105E8E
C1FE7E8B 33EBEED9 9B057300 54968A9A D6FC1EDC 2E9B05D9 9B105E8E 0E7E0302
0FEBD6F4 06DD2E9B 08760054 968A9AD6 F41EDC2E 9B05D99B 105E8E0E 7E0302E7
6AE9FF6C 9DD99B1F 16FD0302 E7C1FE7E 8B05D99B 105E8E0E 7E0302E7 C1FE7E8B
D7061E8E 2ED7043E 032EE7D1 FE7E8B51 7D03FE7E 83FE46FF 03EB0000 FE46C7FF
E7D1FE7E 8B0716F5 0302E6C1 FE768BCC 5DD99B1F 16FD0302 E7C1FE7E 8B05DF9B
C05DD99B 1F16FD03 02E7C1FE 7E8BCC64 D8269B05 DF9BD70A 1E8E2ED7 083E032E
0CFC466B 009BE903 7C03FC7E 83FC46FF 03EB0000 FC46C794 5ED99BEE D99BA6EB
2EF88B0C FC466BFF 5C9EDD9B C84ED89B 0845D99B D70E1E8E 2ED70C3E 032EF88B
0C3E032E F88B0CFC 466BFF64 9EDD9BC4 4ED89B04 45D99BD7 0E1E8E2E D70C3E03
16FD0302 E7C1FC7E 8BFF5C86 DC9BFF64 86DC9BC0 4ED89B05 D99BD70E 1E8E2ED7
D8269BB4 45D99B1F 16FD0302 E7C1FC7E 8B0716F5 0302E6C1 FC768BB4 5DD99B1F
0054968F 9A9446D9 9BFF59E9 945ED99B FF6486DC 9B9446D9 9BFF649E DD9BB44C
C1FC768B 2D7D03FC 7E83FC46 FF03EB00 00FC46C7 985ED99B 08C48300 54E5409A
0302E7C1 FC7E8BCC 64D8269B 05DF9B0C 5E8E0A7E 03E7D1FC 7E8B0716 F50302E6
037C03FC 7E83FC46 FF03EB00 00FC46C7 905ED99B EED99BCA EBA85DD9 9B1F16FD

FF5C9EDD 9BB04ED8 9B0845D9 9BD70E1E 8E2ED70C 3E032EF8 8B0CFC46 6B009BE9
FC466BFF 649EDD9B AC4ED89B 0445D99B D70E1E8E 2ED70C3E 032EF88B 0CFC466B
7E8BFF5C 86DC9BFF 6486DC9B A84ED89B 05D99BD7 0E1E8E2E D70C3E03 2EF88B0C
1F16FD03 02E7C1FC 7E8B0716 F50302E6 C1FC768B 9C5DD99B 1F16FD03 02E7C1FC
D99BFF59 E9905ED9 9BFF6486 DC9B9046 D99BFF64 9EDD9B9C 4CD8269B 9C45D99B
E9845ED9 9BEED99B 0A720054 968A9AF4 5EDC9BEE D99BF45E DD9B904E D89B9446
B446D99B FF649EDD 9BA04ED8 9BB846D9 9BFF5C9E DD9BA44E D89BBC46 D99B0087
DD9BEC5E DD9BE04E D89BE046 D99BE05E D99BFF5C 86DC9BFF 6486DC9B 9C4ED89B
76DC9BEC 46DD9B0C EB8C5ED9 9BD71006 DD2E9B0C 72005496 8A9AF45E DC9BEC46
E5409A00 54968F9A 904ED89B 8846D99B 885ED99B 8C66D89B E8D99B8C 5ED99BF4
46D99B03 A0E90377 0054968A 9AD7181E DC2E9B84 46D99B84 5ED99B08 C4830054
9EDD9BD7 260EDC2E 9BD7260E DC2E9BD7 2406DF2E 9B845ED9 9BD71826 DC2E9B84
D99B8446 D99BD720 3EC52E1D D99BD720 3EC52EFF 64B6DC9B D71006DD 2E9BFF64
02ECE903 77005496 8A9AD72E 1EDC2E9B D846DD9B D85EDD9B 0DD89B84 4ED89BE0
7C9ED99B 8066D89B E8D99B80 5ED99B08 C4830054 EEC29A00 54968F9A D846DD9B
7E8B4375 003D83D7 363EC52E 03B2E903 7C04FC7E 83FC46FF 03EB0000 FC46C7FF
FC7E8BFF 649EDD9B 01FE8DDE 9BFF7C86 D99BD740 1E8E2ED7 3E3E032E 09E7C1FC
EBE85ED9 9BFF6486 DC9B01FE 8DDE9B80 46D99BD7 3C1E8E2E D73A3E03 2E09E7C1
FF649EDD 9B01FE8D DE9BFF7C 86D99BD7 401E8E2E D73E3E03 2E09E7C1 FC7E8B41
D99BFF64 86DC9B01 FE8DDE9B 8046D99B D7441E8E 2ED7423E 032E09E7 C1FC7E8B
C1FC7E8B 18760054 968A9AE8 5ED89BFF 6C85D99B 1F16FD03 02E7C1FC 7E8BE85E
7E8B3F75 003D83D7 363EC52E FF34E91D D99BD746 06DF2E9B 145E8E12 7E0302E7
E7C1FC7E 8BFF649E DD9B0DDE 9BFF7C86 D99BD740 1E8E2ED7 3E3E032E 09E7C1FC
FC7E8B3D EBE85ED9 9BFF6486 DC9B0DDE 9B8046D9 9BD73C1E 8E2ED73A 3E032E09
09E7C1FC 7E8BFF64 9EDD9B0D DE9BFF7C 86D99BD7 401E8E2E D73E3E03 2E09E7C1
02E7C1FC 7E8BE85E D99BFF64 86DC9B0D DE9B8046 D99BD744 1E8E2ED7 423E032E
145E8E12 7E0302E7 C1FC7E8B 15730054 968A9AE8 5ED89BFF 6C85D99B 1F16FD03
3EC52EFE 6BE9037E 00FFFE7E 81FE46FF 03EB0001 FE46C7FE 7FE91DD9 9BEED99B
D99BFE03 D7401E8E 2ED73E3E 032E09E7 C1FC7E8B E6D1FE76 8B4D7500 3D83D736
D73C1E8E 2ED73A3E 032E09E7 C1FC7E8B E6D1FE76 8BFF649E DD9B0DDE 9BFF7C86
2E09E7C1 FC7E8BE6 D1FE768B 4BEBE45E D99BFF64 86DC9B0D DE9B8046 D99BFE03
FC7E8BE6 D1FE768B FF649EDD 9B0DDE9B FF7C86D9 9BFE03D7 401E8E2E D73E3E03
8BE45ED9 9BFF6486 DC9B0DDE 9B8046D9 9BFE03D7 441E8E2E D7423E03 2E09E7C1
0302E7C1 FC7E8B68 77005496 8A9AE45E D89BFF6C 85D99B1F 16FD0302 E7C1FC7E
FF5C9EDD 9BE866D8 9BE446D9 9B4E7200 54968A9A E85ED89B FF6C85D9 9B1F16FD
FE468BFF 649EDD9B FF5CB6DC 9BE866D8 9BFF6C85 D99B1F16 FD0302E7 C1FC7E8B
47E91DD9 9B145E8E 127E0302 E7C1FC7E 8BFF6486 DC9B02C4 83005496 9D9A5048
8B00E7E9 037C04FC 7E83FC46 FF03EB00 00FC46C7 FEC4E9E8 5ED99BE4 46D99BFD
54968F9A FF6C85D9 9B1F16FD 0302E7C1 FC7E8B50 5214568B 12460302 E0C1FC46
3EC52EB6 EB10C483 003CC34A 9A5052D7 40168B2E D73E0603 2E09E0C1 FC468B00
02E0C1FC 468B008C E9037C04 FC7E83FC 46FF03EB 0000FC46 C7517500 3D83D736
C1FC468B 0054968F 9AFF6C85 D99B1F16 FD0302E7 C1FC7E8B 50521456 8B124603
FF03EB00 00FC46C7 B6EB10C4 83003CC3 4A9A5052 D73C168B 2ED73A06 032E09E0
1F16FD03 02E7C1FC 7E8B5052 14568B12 460302E0 C1FC468B 3E7D04FC 7E83FC46
3CC34A9A 5052D744 168B2ED7 4206032E 09E0C1FC 468B0054 968F9AFF 6C85D99B
0302E7C1 FC7E8B01 CCE9037C 04FC7E83 FC46FF03 EB0000FC 46C7B9EB 10C48300
5E8E127E 0302E7C1 FC7E8B11 73005496 8A9AD6F4 1EDC2E9B 05D99B14 5E8E127E
0302E7C1 FC7E8B35 76005496 8A9AD6FC 1EDC2E9B D6F406DD 2E9B06EB 05D99B14
5E8E127E 0302E7C1 FC7E8B11 73005496 8A9AD6F4 1EDC2E9B 05D99B14 5E8E127E
1DD99B14 5E8E127E 0302E7C1 FC7E8BEE D99B03EB D6F406DD 2E9B0BEB 05D99B14
06DF2E9B 47760054 968A9AD6 F41EDC2E 9B05D99B 105E8E0E 7E0302E7 C1FC7E8B
FF649EDD 9BFF5CA6 DC9B05D9 9B145E8E 127E0302 E7C1FC7E 8BFF5C9E DD9BD746
145E8E12 7E0302E7 C1FC7E8B FF6486DC 9B05D99B 105E8E0E 7E0302E7 C1FC7E8B
8B2E7300 54968A9A D6FC1EDC 2E9B05D9 9B105E8E 0E7E0302 E7C1FC7E 8B1DD99B
7E8B04D8 269B05D9 9B105E8E 0E7E0302 E7C1FC7E 8B14468E 12760302 E6C1FC76
9BD74A06 DF2E9B14 5E8E127E 0302E7C1 FC7E8B1D D99B145E 8E127E03 02E7C1FC
05D99B14 5E8E127E 0302E7C1 FC7E8B0F EBD74A06 DF2E9B08 73005496 8A9A1DD8
8B34EBD7 4806DF2E 9B087600 54968A9A FF649EDC 9BD74806 DF2E9BFF 649EDD9B
06DF2E9B 08730054 968A9A1C D8269BD7 4A06DF2E 9B14468E 12760302 E6C1FC76
9B145E8E 127E0302 E7C1FC7E 8B05D99B 145E8E12 7E0302E7 C1FC7E8B 0FEBD74A
76005496 8A9A0E5E DC9B05DF 9B0A7EC5 000012C8 5756CB5E 5FC99BFE 28E91DD9
0F770054 968A9A0E 5EDC9B01 FE85DF9B 0A7EC500 BAE91DD9 9B167EC5 EED99B0C
037C00FE FE7E81FE 46FF03EB 0000FE46 C70098E9 1DD99B16 7EC5D746 06DF2E9B
47FE7E8B DA770054 968A9A0E 5EDC9B05 DF9B0C5E 8E0A7E03 E7D1FE7E 8B0084E9

468E0A76 03E6D1FE 768BC076 0054968A 9A0E5EDC 9B05DF9B 0C5E8E0A 7E03E7D1
8BEE5EDD 9B02C483 0054969D 9A50042B 26058B0C 5E8E0A7E 03E7D147 FE7E8B0C
46DC9BFE 46DF9BF6 5EDD9BEE 76DC9B25 DE9B0E46 DD9B0C5E 8E0A7E03 E7D1FE7E
2ED74E36 FF2E50FE 2C868D16 57560001 F8C85756 CB5E5FC9 9B1DD99B 167EC5F6
71E9037C 04FE7E83 FE46FF03 EB0000FE 46C75E5F 0054DE28 9A013668 D74C36FF
FE7E8B11 73005496 8A9AD6F4 1EDC2E9B 05D99B10 5E8E0E7E 0302E7C1 FE7E8B01
73005496 8A9AD6FC 1EDC2E9B D6F406DD 2E9B06EB 05D99B10 5E8E0E7E 0302E7C1
0054968A 9AD6F41E DC2E9B05 D99B105E 8E0E7E03 02E7C1FE 7E8B33EB EED99B05
0302E7C1 FE7E8BD6 F406DD2E 9B06EB05 D99B105E 8E0E7E03 02E7C1FE 7E8B1173
968F9AD7 5006DC2E 9BFE1885 D99B1F16 FD0302E7 C1FE7E8B FE189DD9 9B1F16FD
2ED73A3E 032E09E7 C1FE7E8B E6D1FE2A B68BFE2A 868908C4 83005496 EF9A0054
1F16FD8B E6D1FE76 8BD25DD9 9B1F16FD 0302E7C1 FE7E8B05 DF9BFE03 D73C1E8E
D1FE768B 117F00FF 3DFED485 8BFE031F 16FD8BE6 D1FE768B 00FFFECC 85C7FE03
768B0000 FEDC85C7 FE031F16 FD8BE6D1 FE768B00 FFFED485 C7FE031F 16FD8BE6
00FEE485 C7FE031F 16FD8BE6 D1FE768B 117C00FE E4BD83FE 031F16FD 8BE6D1FE
C1FE7E8B 0CC48300 3CA5149A FE2AB6FF 50FE2886 8D1650FE 2C868D16 FE76FF00
03FE7E83 FE46FF03 EB0000FE 46C7FE83 E9C25DD9 9BFE2886 DF9B1F16 FD0302E7
D99B1F16 FD0302E7 C1FE7E8B 05DF9BD7 061E8E2E D7043E03 2EE7D1FE 7E8B547D
9B05DF9B D70A1E8E 2ED7083E 032EE7D1 FE7E8B07 16F50302 E6C1FE76 8BFF7A9D
FE46C796 5ED99BEE D99BA3EB FF6E9DD9 9B1F16FD 0302E7C1 FE7E8BFF 7AA4D826
D70E1E8E 2ED70C3E 032EF88B 0CFE466B 00A1E903 7C03FE7E 83FE46FF 03EB0000
D99BD70E 1E8E2ED7 0C3E032E F88B0CFE 466BFE08 9EDD9BFF 768ED89B 0845D99B
9B05D99B D70E1E8E 2ED70C3E 032EF88B 0CFE466B FE109EDD 9BFF728E D89B0445
FE768BFF 629DD99B 1F16FD03 02E7C1FE 7E8BFE08 86DC9BFE 1086DC9B FF6E8ED8
109EDD9B FF628CD8 269BFF62 85D99B1F 16FD0302 E7C1FE7E 8B0716F5 0302E6C1
830054E5 409A0054 968F9A96 46D99BFF 53E9965E D99BFE10 86DC9B96 46D99BFE
0716F503 02E6C1FE 768B2E7D 03FE7E83 FE46FF03 EB0000FE 46C79A5E D99B08C4
D99B1F16 FD0302E7 C1FE7E8B FF7AA4D8 269B05DF 9B0C5E8E 0A7E03E7 D1FE7E8B
466B009B E9037C03 FE7E83FE 46FF03EB 0000FE46 C7925ED9 9BEED99B C9EBB25D
8B0CFE46 6BFE089E DD9BBA4E D89B0845 D99BD70E 1E8E2ED7 0C3E032E F88B0CFE
032EF88B 0CFE466B FE109EDD 9BB64ED8 9B0445D9 9BD70E1E 8E2ED70C 3E032EF8
0302E7C1 FE7E8BFE 0886DC9B FE1086DC 9BB24ED8 9B05D99B D70E1E8E 2ED70C3E
9BA645D9 9B1F16FD 0302E7C1 FE7E8B07 16F50302 E6C1FE76 8BA65DD9 9B1F16FD
4ED89B96 46D99BFF 59E9925E D99BFE10 86DC9B92 46D99BFE 109EDD9B A64CD826
86D99B00 8AE98E5E D99BEED9 9B0A7200 54968A9A F25EDC9B EED99BF2 5EDD9B92
D89BFF62 86D99BFE 109EDD9B AA4ED89B FF6686D9 9BFE089E DD9BAE4E D89BFF6A
EA46DD9B EA5EDD9B BE4ED89B BE46D99B BE5ED99B FE0886DC 9BFE1086 DC9BA64E
9BF276DC 9BEA46DD 9B0CEBA2 5ED99BD7 1006DD2E 9B0C7200 54968A9A F25EDC9B
0054E540 9A005496 8F9A924E D89B9E46 D99B9E5E D99BA266 D89BE8D9 9BA25ED9
9B8E46D9 9B0102E9 03770054 968A9AD7 181EDC2E 9B8E46D9 9B8E5ED9 9B08C483
FE109EDD 9BD7260E DC2E9BD7 260EDC2E 9BD72406 DF2E9B8E 5ED99BD7 1826DC2E
9BE0D99B 8E46D99B D7203EC5 2E1DD99B D7203EC5 2EFE10B6 DC9BD710 06DD2E9B
9AE246DD 9B737600 54968A9A D72E1EDC 2E9BE246 DD9BE25E DD9B0DD8 9B8E4ED8
0000FA46 C7865ED9 9B8A66D8 9BE8D99B 8A5ED99B 08C48300 54EEC29A 0054968F
C24DD89B 8646D99B 1F16FD03 02E7C1FA 7E8B009E E9037C04 FA7E83FA 46FF03EB
9B8A46D9 9B0716F5 0302E6C1 FA768B14 5E8E127E 0302E7C1 FA7E8BFE 109EDD9B
7E8B4E7D 04FA7E83 FA46FF03 EB0000FA 46C7B4EB 1DD99BFE 1086DC9B D24CD826
FA46C7D8 EB1DD99B 145E8E12 7E0302E7 C1FA7E8B C245D99B 1F16FD03 02E7C1FA
E7C1FA7E 8BD245D9 9B1F16FD 0302E7C1 FA7E8B1F 7D04FA7E 83FA46FF 03EB0000
8B01CCE9 037C04FC 7E83FC46 FF03EB00 00FC46C7 D8EB1DD9 9B145E8E 127E0302
E7C1FC7E 8B117300 54968A9A D6F41EDC 2E9B05D9 9B145E8E 127E0302 E7C1FC7E
8B357600 54968A9A D6FC1EDC 2E9BD6F4 06DD2E9B 06EB05D9 9B145E8E 127E0302
E7C1FC7E 8B117300 54968A9A D6F41EDC 2E9B05D9 9B145E8E 127E0302 E7C1FC7E
127E0302 E7C1FC7E 8BEED99B 03EBD6F4 06DD2E9B 0BEB05D9 9B145E8E 127E0302
0054968A 9AD6F41E DC2E9B05 D99B105E 8E0E7E03 02E7C1FC 7E8B1DD9 9B145E8E
08A6DC9B 05D99B14 5E8E127E 0302E7C1 FC7E8BFE 089EDD9B D74606DF 2E9B4776
02E7C1FC 7E8BFE10 86DC9B05 D99B105E 8E0E7E03 02E7C1FC 7E8BFE10 9EDD9BFE
8A9AD6FC 1EDC2E9B 05D99B10 5E8E0E7E 0302E7C1 FC7E8B1D D99B145E 8E127E03
05D99B10 5E8E0E7E 0302E7C1 FC7E8B14 468E1276 0302E6C1 FC768B2E 73005496
9B145E8E 127E0302 E7C1FC7E 8B1DD99B 145E8E12 7E0302E7 C1FC7E8B 04D8269B
127E0302 E7C1FC7E 8B0FEBD7 4A06DF2E 9B087300 54968A9A 1DD89BD7 4A06DF2E
DF2E9B08 76005496 8A9AFE10 9EDC9BD7 4806DF2E 9BFE109E DD9B05D9 9B145E8E
0054968A 9A1CD826 9BD74A06 DF2E9B14 468E1276 0302E6C1 FC768B34 EBD74806
0302E7C1 FC7E8B05 D99B145E 8E127E03 02E7C1FC 7E8B0FEB D74A06DF 2E9B0873

76FF50FE 2C868D16 57560001 F8C85756 CB5E5FC9 9BFE28E9 1DD99B14 5E8E127E
6DE9037C 04FE7E83 FE46FF03 EB0000FE 46C75E5F 0054DE28 9A013668 1A76FF1C
FE7E8B11 73005496 8A9AD6F4 1EDC2E9B 05D99B10 5E8E0E7E 0302E7C1 FE7E8B01
73005496 8A9AD6FC 1EDC2E9B D6F406DD 2E9B06EB 05D99B10 5E8E0E7E 0302E7C1
0054968A 9AD6F41E DC2E9B05 D99B105E 8E0E7E03 02E7C1FE 7E8B33EB EED99B05
0302E7C1 FE7E8BD6 F406DD2E 9B06EB05 D99B105E 8E0E7E03 02E7C1FE 7E8B1173
968F9AD7 5006DC2E 9B05D99B 105E8E0E 7E0302E7 C1FE7E8B FE189DD9 9B1F16FD
8E167E03 FE03E7D1 FE2ABE8B 09E6C1FE 768BFE2A 868908C4 83005496 EF9A0054
85C7FE03 1F16FD8B E6D1FE76 8BD25DD9 9B1F16FD 0302E7C1 FE7E8B05 DF9B185E
16FD8BE6 D1FE768B 117F00FF 3DFED485 8BFE031F 16FD8BE6 D1FE768B 00FFFECC
8BE6D1FE 768B0000 FEDC85C7 FE031F16 FD8BE6D1 FE768B00 FFFED485 C7FE031F
FE76FF00 00FEE485 C7FE031F 16FD8BE6 D1FE768B 117C00FE E4BD83FE 031F16FD
FD0302E7 C1FE7E8B 0CC48300 3CA5149A FE2AB6FF 50FE2886 8D1650FE 2C868D16
7E8B547D 03FE7E83 FE46FF03 EB0000FE 46C7FE87 E9C25DD9 9BFE2886 DF9B1F16
8BFF7A9D D99B1F16 FD0302E7 C1FE7E8B 05DF9BD7 061E8E2E D7043E03 2EE7D1FE
7AA4D826 9B05DF9B D70A1E8E 2ED7083E 032EE7D1 FE7E8B07 16F50302 E6C1FE76
03EB0000 FE46C796 5ED99BEE D99BA3EB FF6E9DD9 9B1F16FD 0302E7C1 FE7E8BFF
0845D99B D70E1E8E 2ED70C3E 032EF88B 0CFE466B 00A1E903 7C03FE7E 83FE46FF
D89B0445 D99BD70E 1E8E2ED7 0C3E032E F88B0CFE 466BFE08 9EDD9BFF 768ED89B
FF6E8ED8 9B05D99B D70E1E8E 2ED70C3E 032EF88B 0CFE466B FE109EDD 9BFF728E
0302E6C1 FE768BFF 629DD99B 1F16FD03 02E7C1FE 7E8BFE08 86DC9BFE 1086DC9B
46D99BFE 109EDD9B FF628CD8 269BFF62 85D99B1F 16FD0302 E7C1FE7E 8B0716F5
D99B08C4 830054E5 409A0054 968F9A96 46D99BFF 53E9965E D99BFE10 86DC9B96
D1FE7E8B 0716F503 02E6C1FE 768B2E7D 03FE7E83 FE46FF03 EB0000FE 46C79A5E
C9EBB25D D99B1F16 FD0302E7 C1FE7E8B FF7AA4D8 269B05DF 9B0C5E8E 0A7E03E7
F88B0CFE 466B009B E9037C03 FE7E83FE 46FF03EB 0000FE46 C7925ED9 9BEED99B
3E032EF8 8B0CFE46 6BFE089E DD9BBA4E D89B0845 D99BD70E 1E8E2ED7 0C3E032E
2ED70C3E 032EF88B 0CFE466B FE109EDD 9BB64ED8 9B0445D9 9BD70E1E 8E2ED70C
9B1F16FD 0302E7C1 FE7E8BFE 0886DC9B FE1086DC 9BB24ED8 9B05D99B D70E1E8E
A64CD826 9BA645D9 9B1F16FD 0302E7C1 FE7E8B07 16F50302 E6C1FE76 8BA65DD9
5EDD9B92 4ED89B96 46D99BFF 59E9925E D99BFE10 86DC9B92 46D99BFE 109EDD9B
D89BFF6A 86D99B00 8AE98E5E D99BEED9 9B0A7200 54968A9A F25EDC9B EED99BF2
DC9BA64E D89BFF62 86D99BFE 109EDD9B AA4ED89B FF6686D9 9BFE089E DD9BAE4E
F25EDC9B EA46DD9B EA5EDD9B BE4ED89B BE46D99B BE5ED99B FE0886DC 9BFE1086
9BA25ED9 9BF276DC 9BEA46DD 9B0CEBA2 5ED99BD7 1006DD2E 9B0C7200 54968A9A
9B08C483 0054E540 9A005496 8F9A924E D89B9E46 D99B9E5E D99BA266 D89BE8D9
1826DC2E 9B8E46D9 9B0102E9 03770054 968A9AD7 181EDC2E 9B8E46D9 9B8E5ED9
06DD2E9B FE109EDD 9BD7260E DC2E9BD7 260EDC2E 9BD72406 DF2E9B8E 5ED99BD7
9B8E4ED8 9BE0D99B 8E46D99B D7203EC5 2E1DD99B D7203EC5 2EFE10B6 DC9BD710
0054968F 9AE246DD 9B737600 54968A9A D72E1EDC 2E9BE246 DD9BE25E DD9B0DD8
46FF03EB 0000FC46 C7865ED9 9B8A66D8 9BE8D99B 8A5ED99B 08C48300 54EEC29A
109EDD9B C24DD89B 8646D99B 1F16FD03 02E7C1FC 7E8B009E E9037C04 FC7E83FC
D24CD826 9B8A46D9 9B0716F5 0302E6C1 FC768B14 5E8E127E 0302E7C1 FC7E8BFE
02E7C1FC 7E8B4E7D 04FC7E83 FC46FF03 EB0000FC 46C7B4EB 1DD99BFE 1086DC9B
03EB0000 FC46C7D8 EB1DD99B 145E8E12 7E0302E7 C1FC7E8B C245D99B 1F16FD03
127E0302 E7C1FC7E 8BD245D9 9B1F16FD 0302E7C1 FC7E8B1F 7D04FC7E 83FC46FF
E7C1FA7E 8B01CCE9 037C04FA 7E83FA46 FF03EB00 00FA46C7 D8EB1DD9 9B145E8E
127E0302 E7C1FA7E 8B117300 54968A9A D6F41EDC 2E9B05D9 9B145E8E 127E0302
E7C1FA7E 8B357600 54968A9A D6FC1EDC 2E9BD6F4 06DD2E9B 06EB05D9 9B145E8E
127E0302 E7C1FA7E 8B117300 54968A9A D6F41EDC 2E9B05D9 9B145E8E 127E0302
9B145E8E 127E0302 E7C1FA7E 8BEED99B 03EBD6F4 06DD2E9B 0BEB05D9 9B145E8E
2E9B4776 0054968A 9AD6F41E DC2E9B05 D99B105E 8E0E7E03 02E7C1FA 7E8B1DD9
9EDD9BFE 08A6DC9B 05D99B14 5E8E127E 0302E7C1 FA7E8BFE 089EDD9B D74606DF
8E127E03 02E7C1FA 7E8BFE10 86DC9B05 D99B105E 8E0E7E03 02E7C1FA 7E8BFE10
73005496 8A9AD6FC 1EDC2E9B 05D99B10 5E8E0E7E 0302E7C1 FA7E8B1D D99B145E
04D8269B 05D99B10 5E8E0E7E 0302E7C1 FA7E8B14 468E1276 0302E6C1 FA768B2E
4A06DF2E 9B145E8E 127E0302 E7C1FA7E 8B1DD99B 145E8E12 7E0302E7 C1FA7E8B
9B145E8E 127E0302 E7C1FA7E 8B0FEBD7 4A06DF2E 9B087300 54968A9A 1DD89BD7
EBD74806 DF2E9B08 76005496 8A9AFE10 9EDC9BD7 4806DF2E 9BFE109E DD9B05D9
2E9B0873 0054968A 9A1CD826 9BD74A06 DF2E9B14 468E1276 0302E6C1 FA768B34
5E8E127E 0302E7C1 FA7E8B05 D99B145E 8E127E03 02E7C1FA 7E8B0FEB D74A06DF
269B0845 D99BD70C 3EC52E0A 76C40000 1CC85756 CB5E5FC9 9BFE28E9 1DD99B14
2E0A76C4 EC5EDD9B 024CDE26 9B0445D9 9BD70C3E C52E0A76 C4E45EDD 9B044CDE
9BD70C3E C52E0A76 C4FC5ED9 9BE446DC 9BEC46DC 9B0CDE26 9B05D99B D70C3EC5

5EDD9B02 4CDE269B 1045D99B D70C3EC5 2E0A76C4 E45EDD9B 044CDE26 9B1445D9
0A76C4F8 5ED99BE4 46DC9BEC 46DC9B0C DE269B0C 45D99BD7 0C3EC52E 0A76C4EC
269B1C45 D99BD70C 3EC52E0A 76C4E45E DD9B044C DE269B20 45D99BD7 0C3EC52E
9BE446DC 9BEC46DC 9B0CDE26 9B1845D9 9BD70C3E C52E0A76 C4EC5EDD 9B024CDE
06760054 968A9AEC 5EDC9BFC 46D99BEC 5EDD9BEE D99BE45E DD9BEED9 9BF45ED9
9BE45EDD 9BEED99B 4D760054 968A9AE4 5EDC9BE0 D99BFC46 D99B07EB FC46D99B
500EDC2E 9BE0D99B FC46D99B 07EBFC46 D99B0676 0054968A 9AE45EDC 9BFC46D9
7EC508C4 83005496 EF9A0054 968F9AEC 46DC9BFC 46D99BEC 5EDD9BFC 76D89BD7
DC9BF846 D99BEC5E DD9BEED9 9BE45EDD 9BEED99B 000005C7 0E7EC507 EB05890E
76005496 8A9AE45E DC9BE0D9 9BF846D9 9B07EBF8 46D99B06 76005496 8A9AEC5E
46D99B07 EBF846D9 9B067600 54968A9A E45EDC9B F846D99B E45EDD9B EED99B4D
9A005496 8F9AEC46 DC9BF846 D99BEC5E DD9BF876 D89BD750 0EDC2E9B E0D99BF8
9BEED99B E45EDD9B EED99B00 0005C712 7EC507EB 0589127E C508C483 005496EF
9BE0D99B F446D99B 07EBF446 D99B0676 0054968A 9AEC5EDC 9BF446D9 9BEC5EDD
06760054 968A9AE4 5EDC9BF4 46D99BE4 5EDD9BEE D99B4D76 0054968A 9AE45EDC
9BF446D9 9BEC5EDD 9BF476D8 9BD7500E DC2E9BE0 D99BF446 D99B07EB F446D99B
C99B0000 05C7167E C507EB05 89167EC5 08C48300 5496EF9A 0054968F 9AEC46DC
76C4EC5E DD9B044C DE269B08 45D99BD7 0C3EC52E 0A76C400 0014C857 56CB5E5F
269B05D9 9BD70C3E C52E0A76 C4F45EDD 9B024CDE 269B0445 D99BD70C 3EC52E0A
9B044CDE 269B1445 D99BD70C 3EC52E0A 76C4FC5E D99BEC46 DC9BF446 DC9B0CDE
D70C3EC5 2E0A76C4 F45EDD9B 024CDE26 9B1045D9 9BD70C3E C52E0A76 C4EC5EDD
D99BD70C 3EC52E0A 76C41DD9 9B127EC5 EC46DC9B F446DC9B 0CDE269B 0C45D99B
F45EDD9B 024CDE26 9B1C45D9 9BD70C3E C52E0A76 C4EC5EDD 9B044CDE 269B2045
D99B1DD9 9B167EC5 EC46DC9B F446DC9B 0CDE269B 1845D99B D70C3EC5 2E0A76C4
54968F9A FC46D99B 16EB0000 05C70E7E C5097300 54968A9A D6FC1EDC 2E9BFC46
00000000 406FE000 00000000 00CB5E5F C99B0589 0E7EC508 C4830054 96EF9A00
40220000 00000000 3FF00000 00000000 0024C3AA 00147E04 00147DFE 00000000
CBD00024 D53E0024 C3CEC010 00000000 0000402A 00000000 00000002 0024D3D0
46C70000 06C85756 3FE00000 00000000 00147E8E 017FFF80 00FF0024 C3D00024
F36C1E8E 2EF36A3E 032EE7D1 FE7E8B00 9FE9037C 04FE7E83 FE46FF03 EB0000FE
8E2EF372 3E032E02 E7C1FE7E 8B0589F3 681E8E2E F3663E03 2EE7D1FE 7E8B058B
8B227D03 FE7E831D D99BF370 1E8E2EF3 6E3E032E 02E7C1FE 7E8B05D9 9BF3741E
89F3781E 8E2EF376 3E032EE7 D1FE7E8B 058BF37C 1E8E2EF3 7A3E032E E7D1FE7E
3E032E02 E7C1FE7E 8B1DD99B EED99BF3 801E8E2E F37E3E03 2E02E7C1 FE7E8B05
8C36FF2E F38636FF 2EF38836 FF2E5756 FF55E91D D99BEED9 9BF3841E 8E2EF382
2EF39436 FF2E5756 5E5F0054 DE289A50 02E0C105 8BF38E3E C52EF38A 36FF2EF3
FC46C700 3CE4E89A 5E5F0054 DE289A01 3668F396 36FF2EF3 9836FF2E F39236FF
C1FC468B 35FF0275 FFF3A23E C52E50FA 468D165B 7D04FC7E 83FC46FF 03EB0000
F39A3EC5 2E50E42A 058AF39E 3EC52EFC 76FF5052 F38C168B 2EF38A06 032E09E0
489AFA76 FF006A00 6A006A00 6AB17400 FA7E8312 C4830054 C78E9A50 E42A058A
C52EF3B6 36FF2EF3 B836FF2E 3E750001 3D058BF3 A63EC52E 62EB0AC4 830054C0
54968F9A 05D99BF3 AA3EC52E 0054968F 9A05D99B F3AE3EC5 2E006A35 FFF3B23E
3CE9C69A 003CE770 9A004482 829AFFFF 05C7F3A6 3EC52E18 C4830044 8D319A00
2EFE4689 058BF3BE 3EC52E00 0002C857 56CB5E5F C99B0001 05C7F3BA 3EC52E00
9A05D99B F3C63EC5 2E0589F3 BE3EC52E FE468B00 5473ED9A 000105C7 F3BE3EC5
3EC52E35 74C00B10 C4830054 64779A00 54968F9A 05D99BF3 C23EC52E 0054968F
8BF3D63E C52E0245 89F3CA3E C52E058B F3D23EC5 2E0589F3 CA3EC52E 058BF3CE
5756CB5E 5FC99B00 0105C70A 7EC507EB 000205C7 0A7EC504 4589F3CA 3EC52E05
74E29A35 FF0275FF F3DA3EC5 2EF3CA36 FF2EF3CC 36FF2E00 01EA46C7 000016C8
6C9AF3CA 36FF2EF3 CC36FF2E 50F2468D 1650F046 8D1650EE 468D1608 C4830054
9A02C483 0054969D 9A50C703 F06EF7F0 468BF88B EE6EF7EE 468B10C4 83003CD3
8F9AF446 D99B1B74 003D80F3 DE3EC52E F45ED99B 08C48300 54E5409A 0054968F
05F3E606 8B2EF3E8 36FF2E0C C4830054 4A8A9AF3 E236FF2E F3E436FF 2E005496
006A006A 18760054 968A9AF3 EA1EDC2E 9BF446D9 9B04C483 00549BD5 9A500012
3EC52E00 86E90374 01EA7E83 0000EA46 C70AC483 0054C048 9A273068 006A006A
46C70CC4 8300545B 789AF3CA 36FF2EF3 CC36FF2E 50F8468D 1635FF02 75FFF3F2
8B0E7E00 FF3DF845 8B1F16FD 03E7D1EC 7E8B3E7D 04EC7E83 EC46FF03 EB0000EC
D1EC7E8B C97D00F8 7D831F16 FD03E7D1 EC7E8B00 FFF845C7 1F16FD03 E7D1EC7E
003CDB28 9A50F846 8D16F3CA 36FF2EF3 CC36FF2E B9EB0000 F845C71F 16FD03E7
36FF2E12 74003D80 F3DE3EC5 2E0096FC 46C70000 0CC85756 CB5E5FC9 9B08C483
3B02458B 0A7EC516 7CFC463B 058B0A7E C504C483 00544A8A 9AF3F636 FF2EF3F8
830054C0 489A2731 68006A00 6A006A00 6A167DFC 463B0445 8B0A7EC5 0B7CFC46
0C5E8E0A 7E03E7D1 FE7E8B44 7D04FE7E 83FE46FF 03EB0000 FE46C701 91E90AC4
7E03E7D1 FE7E8BD3 7D03FE7E 830589F3 6C1E8E2E F36A3E03 2EE7D1FE 7E8B058B

03EB0000 FE46C7B3 EB0589F3 7C1E8E2E F37A3E03 2EE7D1FE 7E8B058B 105E8E0E
032E09E7 C1FE7E8B E6D1358B 0C5E8E0A 7E03E7D1 FE7E8B31 7D04FE7E 83FE46FF
80F3DE3E C52EC6EB F445891F 16FD03E7 D1FE7E8B 058BFE03 F3FC1E8E 2EF3FA3E
6A3EC52E 0275FFF3 6A3EC52E 0475FFF3 6A3EC52E 0675FFF3 6A3EC52E 3174003D
05F3E606 8B2EF3E8 36FF2E0C C4830054 4A8A9AF3 FE36FF2E F40036FF 2E35FFF3
76FFF676 FFF876FF FA76FF1E 74003D80 F3DE3EC5 2E04C483 00549BD5 9A500012
001205F3 E6068B2E F3E836FF 2E0CC483 00544A8A 9AF40236 FF2EF404 36FF2EF4
F37A3EC5 2E0475FF F37A3EC5 2E297400 3D80F3DE 3EC52E04 C4830054 9BD59A50
E836FF2E 0AC48300 544A8A9A F40636FF 2EF40836 FF2E35FF F37A3EC5 2E0275FF
EED99B06 6A000105 C7F40A3E C52E04C4 8300549B D59A5000 1205F3E6 068B2EF3
0006C857 56CB5E5F C99B0000 05C7F40A 3EC52E0A C483003C E1389A00 54968F9A
F39836FF 2EFE76FF 016A50FC 468D1641 7D04FE7E 83FE46FF 03EB0000 FE46C700
8A06032E 09E0C1FE 468B5052 F410168B 2EF40E06 032E0082 FE4669F3 9636FF2E
04FE7E83 FE46FF03 EB0000FE 46C7B6EB 14C48300 3C99589A 5052F38C 168B2EF3
8C168B2E F38A0603 2E09E0C1 FE468B35 FF0275FF F3A23EC5 2E50FC46 8D165B7D
830054C7 8E9A50E4 2A058AF3 9A3EC52E 50E42A05 8AF4123E C52EFE76 FF5052F3
468D163E EB0AC483 0054C048 9AFC76FF 006A006A 006A006A B17400FC 7E8312C4
9A0574C0 0B04C483 00545813 9A50FA46 8D161674 C00B04C4 83005458 A29A50FA
56CB5E5F C9000105 C7F4163E C52E003C F0D59A00 0005C7F3 A63EC52E 00343445
2EF3663E 032EE7D1 FE7E8B72 7D04FE7E 83FE46FF 03EB0000 FE46C700 0008C857
3E032E02 E7C1FE7E 8B0589F3 6C1E8E2E F36A3E03 2EE7D1FE 7E8B058B F3681E8E
FE7E831D D99BF374 1E8E2EF3 723E032E 02E7C1FE 7E8B05D9 9BF3701E 8E2EF36E
8E2EF37A 3E032EE7 D1FE7E8B 058BF378 1E8E2EF3 763E032E E7D1FE7E 8BA97D03
76FF016A 50FA468D 16417D04 FC7E83FC 46FF03EB 0000FC46 C785EB05 89F37C1E
C1FC468B 5052F410 168B2EF4 0E06032E 0082FC46 69F39636 FF2EF398 36FF2EFC
FF03EB00 00FC46C7 B6EB14C4 83003C99 589A5052 F38C168B 2EF38A06 032E09E0
06032E09 E0C1FC46 8B35FF02 75FFF3A2 3EC52E50 FA468D16 5B7D04FC 7E83FC46
50E42A05 8AF39A3E C52E50E4 2A058AF4 123EC52E FC76FF50 52F38C16 8B2EF38A
C4830054 C0489AFA 76FF006A 006A006A 006AB174 00FA7E83 12C48300 54C78E9A
C4830054 58139A50 F8468D16 1674C00B 04C48300 5458A29A 50F8468D 1635EB0A
C85756CB 5E5FC99B 003CF0D5 9A000005 C7F3A63E C52E0034 34459A05 74C00B04
F3663E03 2EE7D1FE 7E8B00C7 E9037C04 FE7E83FE 46FF03EB 0000FE46 C7000006
032E02E7 C1FE7E8B 0589F36C 1E8E2EF3 6A3E032E E7D1FE7E 8B058BF3 681E8E2E
7E831DD9 9BF3741E 8E2EF372 3E032E02 E7C1FE7E 8B05D99B F3701E8E 2EF36E3E
2EF37A3E 032EE7D1 FE7E8B05 8BF3781E 8E2EF376 3E032EE7 D1FE7E8B 227D03FE
74168B2E F3720603 2E02E0C1 FE468B50 FC468D16 227D03FE 7E830589 F37C1E8E
D99BF380 1E8E2EF3 7E3E032E 02E7C1FE 7E8B0AC4 83003CEF BC9AFE76 FF5052F3
FA46C7FF 2DE91DD9 9BEED99B F3841E8E 2EF3823E 032E02E7 C1FE7E8B 1DD99BEE
52F38C16 8B2EF38A 06032E09 E0C1FA46 8B575636 7D04FA7E 83FA46FF 03EB0000
5F0054DE 289A35FF F38E3EC5 2E5052F3 88168B2E F3860603 2E09E0C1 FA468B50
0275FFF3 A23EC52E 50FC468D 165B7D04 FA7E83FA 46FF03EB 0000FA46 C7C1EB5E
E42A058A F4123EC5 2EFA76FF 5052F38C 168B2EF3 8A06032E 09E0C1FA 468B35FF
6A006A00 6A006AB1 7400FC7E 8312C483 0054C78E 9A50E42A 058AF39A 3EC52E50
46C70000 24C85756 CB5E5FC9 9B001CF9 0B9A05EB 0AC48300 54C0489A FC76FF00
46891246 8BFC4689 12468B0C EB0002FA 46C70000 FC46C70C 7506127E 830000E6
8BF65ED9 9B0A46DD 9B01D1E9 037EFA46 3BFE468B FE46FF03 EBFE4689 FC468BFA
69E90375 0054968A 9AF41A1E DC2E9BF6 46D99B00 00E845C7 1F16FD03 E7D1FE7E
9BF646D9 9BDC5EDD 9BE0D99B 05D99BF3 801E8E2E F37E3E03 2E02E7C1 FE7E8B01
02E7C1FE 7E8BF384 068E2EF3 8236032E 02E6C1FE 768B4875 0054968A 9ADC5EDC
032E02E7 C1FE7E8B 1A740054 968A9A1C D8269B05 D99BF380 1E8E2EF3 7E3E032E
1E8E2EF3 723E032E 02E7C1FE 7E8BF65E D99BE0D9 9B05D99B F3841E8E 2EF3823E
46D99BF3 801E8E2E F37E3E03 2E02E7C1 FE7E8BEE 5ED99BF6 46D89B05 D99BF374
2E9BEE46 D99B3076 0054968A 9ADC5EDC 9BF646D9 9BDC5EDD 9BEED99B 1DD99BF6
2206DD2E 9BF3741E 8E2EF372 3E032E02 E7C1FE7E 8B4A7600 54968A9A F4221EDC
E7C1FE7E 8B1A7300 54968A9A F41A1EDC 2E9BEE46 D99B2BEB F65ED99B 25D89BF4
9AF41A1E DC2E9BF6 46D99BF6 5ED99B25 D89BEED9 9BF3741E 8E2EF372 3E032E02
1DD99B05 D89BF646 D99BF374 1E8E2EF3 723E032E 02E7C1FE 7E8B4474 0054968A
1F16FD03 E7D1FE7E 8B1DD99B F646D99B F3841E8E 2EF3823E 032E02E7 C1FE7E8B
36FF2E00 54968F9A F646D99B 1B74003D 80F3DE3E C52E0001 E646C700 01E845C7
9BD59A50 001205F3 E6068B2E F3E836FF 2E0CC483 00544A8A 9AF42A36 FF2EF42C
E7D1FE7E 8B357FFA 463BFE46 8BFE46FF 03EBFE46 89FC468B FE21E904 C4830054
74168B2E F3720603 2E02E0C1 FE468B50 F4468D16 E4750001 3DE8458B 1F16FD03
463BFE46 8BFE46FF 03EBFE46 89FC468B C0EB0AC4 83003CEF BC9AFE76 FF5052F3
74003D83 F40A3EC5 2E0A7400 013DE845 8B1F16FD 03E7D1FE 7E8B00BD E9037EFA

F3FA0603 2E09E0C1 FE468B50 52F38C16 8B2EF38A 06032E09 E0C1FE46 8B57566A
2EFE76FF 006A50F4 468D165E 5F0054DE 289A35FF F38E3EC5 2E5052F3 FC168B2E
5052F38C 168B2EF3 8A06032E 09E0C1FE 468B50E4 468D16F3 9636FF2E F39836FF
36FF2EF4 3036FF2E FE76FF15 74003D80 F3DE3EC5 2EFF6DE9 14C48300 3C99589A
04C48300 549BD59A 50001205 F3E6068B 2EF3E836 FF2E06C4 8300544A 8A9AF42E
F27E83F2 46FF03EB 0000F246 C7707400 3D83F40A 3EC52E0A 7500E67E 83FF35E9
168B2EF3 8A06032E 09E0C1F2 468B35FF 0275FFF3 A23EC52E 50F4468D 165B7D04
0054C78E 9A50E42A 058AF39A 3EC52E50 E42A058A F4123EC5 2EF276FF 5052F38C
0B9A05EB 0AC48300 54C0489A F476FF00 6A006A00 6A006AB1 7400F47E 8312C483
F39636FF 2EF39836 FF2E50FE C2868D16 57560001 3EC85756 CB5E5FC9 9B001CF9
FA7E8B00 8EE9037C 04FA7E83 FA46FF03 EB0000FA 46C75E5F 0054DE28 9A013668
F3FA0603 2E09E0C1 FA468B57 563675FF FF3D058B F36C1E8E 2EF36A3E 032EE7D1
35FFF38E 3EC52E50 52F38C16 8B2EF38A 06032E09 E0C1FA46 8B5052F3 FC168B2E
006A50F8 468D16FF FFA245C7 FE031F16 FD8BE6D1 FA768BA8 EB5E5F00 54DE289A
5052F3FC 168B2EF3 FA06032E 09E0C1FA 468B50FC 468D1650 FEC2868D 16FA76FF
EB0000FA 46C7003C F03F9A00 0008C857 56CB5E5F C9FF66E9 14C48300 3C99589A
2E09E0C1 FA468B35 FF0275FF F3A23EC5 2E50FE46 8D165C7D 04FA7E83 FA46FF03
2A058AF3 9A3EC52E 50E42A05 8AF39E3E C52EFA76 FF5052F3 FC168B2E F3FA0603
0054C048 9AFE76FF 006A006A 006A006A B17400FE 7E8312C4 830054C7 8E9A50E4
5458139A 50F8468D 167474C0 0B04C483 005458A2 9A50F846 8D1600CE E90AC483
FC36FF2E 06C48300 3C8CF79A 006AF3FA 36FF2EF3 FC36FF2E 6374C00B 04C48300
0005F3FA 068B2EF3 FC36FF2E 06C48300 3C8CF79A 016A5002 0005F3FA 068B2EF3
3C8CF79A 036A5006 0005F3FA 068B2EF3 FC36FF2E 06C48300 3C8CF79A 026A5004
50E42AFD 468A50FD 468D1650 FD468D16 50FE468D 1649EB00 3434459A 06C48300
7400FE7E 8318C483 0054DABA 9A014368 0A6A056A 50E42AFD 468A50E4 2AFD468A
029A0000 04C85756 CB5E5FC9 0AC48300 54C0489A FE76FF00 6A006A00 6A006A13
0275FFF3 A23EC52E 50FE468D 16597D04 FC7E83FC 46FF03EB 0000FC46 C7003407
E42A058A F39E3EC5 2EFC76FF 5052F388 168B2EF3 8606032E 09E0C1FC 468B35FF
6A006A00 6A006AB1 7400FE7E 8312C483 0054C78E 9A50E42A 058AF39A 3EC52E50
0010FC46 C70000FE 46C70000 24C85756 CB5E5FC9 0AC48300 54C0489A FE76FF00
0305058B F4323EC5 2E000F05 C7F4363E C52E000B 05C7F432 3EC52E00 00DC46C7
2E08E846 C601E746 C609E646 C60001E4 46C7E246 89058BF4 363EC52E E0468900
09F446C6 000CF246 C7F04689 02E0C105 8BF4363E C52EEE46 8905056B F4323EC5
46C70875 C20BF956 89F74689 04C48300 54DC339A 0C6A096A 08F646C6 01F546C6
03FE46C7 0875C20B EB5689E9 468904C4 830054DC 339A016A 096A01BC E9D303FE
468D1650 FE468D16 08C48300 3CEB099A F776FFF9 76FFE976 FFEB76FF 019EE9D3
830054D8 DC9A086A 066A35FF F43A3EC5 2EFC76FF F43E36FF 2EF44036 FF2E50EE
35FFF43A 3EC52EFC 76FFF442 36FF2EF4 4436FF2E 50E0468D 1650FE46 8D1614C4
167400FE 7E8304C4 830054DC 759AF776 FFF976FF 14C48300 54D8DC9A 086A066A
54DC759A E976FFEB 76FF010C E90AC483 0054C048 9AFE76FF 006A006A 006A006A
00E2E90A C4830054 C0489AFE 76FF006A 006A006A 006A1674 00FE7E83 04C48300
E0D1DE46 8B50FE46 8D163575 00FE7E83 3B7D04DE 7E83DE46 FF03EB00 00DE46C7
6A056A35 FFF43A3E C52E35FF F43E3EC5 2EDC76FF 5052F448 168B2EF4 4606032E
3EC52EDC 76FFF44A 36FF2EF4 4C36FF2E 50FE468D 16BCEB12 C4830054 D8DC9A02
6A006A15 7400FE7E 8312C483 0054D8DC 9A026A05 6A35FFF4 3A3EC52E 35FFF442
C6F4523E C52E0005 C6F44E3E C52E50EB 0AC48300 54C0489A FE76FF00 6A006A00
C6F4623E C52E0005 C6F45E3E C52E0005 C6F45A3E C52E0005 C6F4563E C52E0005
C6F4723E C52E0005 C6F46E3E C52E0005 C6F46A3E C52E0005 C6F4663E C52E0005
50FE468D 160000F6 46C70000 F846C700 00FE46C7 000016C8 5756CB5E 5FC90105
C4830054 C0489AFE 76FF006A 006A006A 006A1674 00FE7E83 04C48300 3CED729A
C52EF47A 36C42EEA 46890003 2D042B26 058BF476 3EC52EF4 3236C42E 0101E90A
3EC52EF8 76FFF676 FF50EA46 8D1650FE 468D16EC 46890403 26E0D105 8BF4363E
4689058B F4763EC5 2E14C483 0054D8DC 9A066A06 6A35FFF4 3A3EC52E 35FFF44A
7500FE7E 83497D04 FC7E83FC 46FF03EB 0000FC46 C7EC4689 058BF47A 3EC52EEA
F4481E8E 2EF4463E 032EE7D1 FC7E8BF8 76FFF676 FF50EA46 8D1650FE 468D1643
0102E0C1 058BF432 3EC52E14 C4830054 D8DC9A06 6A066A35 FFF43A3E C52E35FF
7D03FA7E 83FA46FF 03EB0000 FA46C704 C483003C ED729A50 FE468D16 AEEBEA46
003CEFBC 9AFA76FF 5052F374 168B2EF3 7206032E 02E0C1FA 468B50FE 468D1624
C601DD46 C601DC46 C601DB46 C600DA46 C600002C C85756CB 5E5FC9D3 EB0AC483
C601E546 C601E446 C603E346 C601E246 C601E146 C602E046 C601DF46 C601DE46
C601ED46 C601EC46 C603EB46 C601EA46 C600E946 C601E846 C601E746 C604E646
C604F546 C603F446 C601F346 C603F246 C603F146 C601F046 C602EF46 C603EE46
C602FD46 C605FC46 C600FB46 C600FA46 C605F946 C600F846 C603F746 C601F646
466B00CD E9037C0C FE7E83FE 46FF03EB 0000FE46 C700D846 C601D746 C600D646

FE031F16 FD8BF08B 03FE466B F4321EC4 2E0588FE 468B0C5E 8E0A7E03 F88B09FE
0A7E03F8 8B09FE46 6B014589 0C5E8E0A 7E03FA8B 09FE566B 27F726E4 2ADA458A
26E42ADB 458AFE03 1F16FD8B F08B03FE 466BF432 1EC42ED4 46890145 8B0C5E8E
03FE466B F4361EC4 2E034589 0C5E8E0A 7E03FA8B 09FE566B FFFF05D4 460327F7
6B054589 0C5E8E0A 7E03FA8B 09FE566B 27F726E4 2ADC458A FE031F16 FD8BF08B
03FA8B09 FE566BFF FF050544 0326058B F4363EC5 2E0C468E 0A7603F0 8B09FE46
466B00D0 E9037C01 FE7E83FE 46FF03EB 0000FE46 C7FF27E9 0745890C 5E8E0A7E
8BF08B03 FE466B03 C1830D8B F4323EC5 2E0588FE 468B105E 8E0E7E03 F88B09FE
8B09FE46 6B014589 105E8E0E 7E03FA8B 09FE566B E1F7E42A D6458AFE 031F16FD
D7458AFE 031F16FD 8BF08B03 FE466B03 C1830D8B F4323EC5 2E10468E 0E5E03D8
6BF4361E C42E0345 89105E8E 0E7E03FA 8B09FE56 6BFFFF05 01470326 E1F7E42A
89105E8E 0E7E03FA 8B09FE56 6B27F726 E42AD845 8AFE031F 16FD8BF0 8B03FE46
09FE566B FFFF0505 44032605 8BF4363E C52E1046 8E0E7603 F08B09FE 466B0545
2BE146C6 20E046C6 000038C8 5756CB5E 5FC9FF24 E9074589 105E8E0E 7E03FA8B
20E946C6 20E846C6 2DE746C6 2DE646C6 20E546C6 20E446C6 20E346C6 2BE246C6
4DD346C6 20D246C6 20D146C6 20D046C6 20CF46C6 43CE46C6 20CD46C6 20CC46C6
20DB46C6 20DA46C6 20D946C6 59D846C6 20D746C6 20D646C6 20D546C6 20D446C6
20CB46C6 50CA46C6 54C946C6 53C846C6 20DF46C6 6CDE46C6 6CDD46C6 41DC46C6
46C601FA 46C601F7 46C601F6 46C601F9 46C60003 F146C700 03F346C7 70F046C6
00382DEE 46035A16 C58B497D 01EE7E83 EE46FF03 EB0000EE 46C704F8 46C602F5
FFF44A3E C52EEC76 FF50F046 8D160A76 FF0C76FF EC4689EE 468BFD56 89FB4689
C70139E9 B174003D 830A7EC5 12C48300 54D8DC9A 036A056A 35FFF43A 3EC52E35
C602F546 C601FA46 C60121E9 037C04EE 7E83EE46 FF03EB00 00EE46C7 0000F146
FB468900 202DEA46 035A16C5 8B537D0A EA7E83EA 46FF03EB 0000EA46 C701F846
463E032E E7D1EE7E 8BEC76FF 50F0468D 160A76FF 0C76FFEC 4689EA46 8BFD5689
3D830A7E C512C483 0054D8DC 9A036A05 6A35FFF4 3A3EC52E 35FFF448 1E8E2EF4
C7FD5689 FB468900 342DD28C C50305EE 466B05FA 46C604F8 46C600B2 E9A77400
481E8E2E F4463E03 2EE7D1EE 7E8BEC76 FF50F046 8D160A76 FF0C76FF 000AEC46
46C65A75 003D830A 7EC512C4 830054D8 DC9A036A 056A35FF F43A3EC5 2E35FFF4
76FF0C76 FF000BEC 46C7FD56 89FB4689 F480168B 2EF47E06 8B2E01F5 46C602F8
FFF43A3E C52E35FF F4481E8E 2EF4463E 032EE7D1 EE7E8BEC 76FF50F0 468D160A
06C85756 CB5E5FC9 FED3E903 75003D83 0A7EC512 C4830054 D8DC9A03 6A056A35
76FF50FB 468D1608 C4830054 EE309A50 FA468D16 F48236FF 2EF48436 FF2E0000
76FF1276 FF025589 0589F486 3EC52E5A 16FA468D 08C48300 3CF2689A 0C76FF0E
463E032E E7D10A7E 8B0B6AF4 4E36FF2E F45036FF 2EF48A36 FF2EF48C 36FF2E10
56CB5E5F C916C483 0054D8DC 9A046A07 6A35FFF4 3A3EC52E 35FFF448 1E8E2EF4
54D8DC9A 076A026A 35FFF43A 3EC52E35 FFF44A3E C52E50FE 468D1600 0004C857
FC46C70A C4830054 C0489AFE 76FF006A 006A006A 006A1374 00FE7E83 0CC48300
481E8E2E F4463E03 2EE7D1FC 7E8B50FE 468D1644 7D04FC7E 83FC46FF 03EB0000
006A006A C87400FE 7E830CC4 830054D8 DC9A076A 026A35FF F43A3EC5 2E35FFF4
0000FE46 C7000002 C85756CB 5E5FC9B3 EB0AC483 0054C048 9AFE76FF 006A006A
830CC483 0054D8DC 9A166A02 6A35FFF4 3A3EC52E 35FFF442 3EC52E50 FE468D16
3EC52E50 FE468D16 0AC48300 54C0489A FE76FF00 6A006A00 6A006A13 7400FE7E
6A006A13 7400FE7E 830CC483 0054D8DC 9A166A02 6A35FFF4 3A3EC52E 35FFF43E
C85756CB 5E5FC900 0005C7F3 BA3EC52E 0AC48300 54C0489A FE76FF00 6A006A00
C07E83C0 4689C846 8B04C483 00548466 9A50C446 8D16F85E DD9BEED9 9B000044
C07E83F8 5EDD9BF4 9606DD2E 9B0A7502 C07E83F8 5EDD9BF4 8E06DD2E 9B0A7501
46DD9BF8 5EDD9BF4 A606DD2E 9B0A7507 C07E83F8 5EDD9BF4 9E06DD2E 9B0A7506
03EB0000 BC46C7BE 4689CA46 8B0090E9 C02B0575 0054968A 9AF41A1E DC2E9BF8
8BE17505 3BBE468B F4481E8E 2EF4463E 032EE7D1 BC7E8B1E 7D04BC7E 83BC46FF
6A006A15 75FFFF3D 058BF36A 3EC52E52 EBC02B04 7E03C27E 83D9EBC2 4689BC46
9AF846DD 9BC276FF 167D03C2 7E832FEB 0AC48300 54C0489A 272F6800 6A006A00
C483003C E1389A00 54968F9A F846DD9B 066A13EB 0AC48300 3CE1389A 0054968F
FC46D99B FC5ED99B 05D99B0A 7EC52EF1 46C60000 18C85756 CB5E5FC9 9BC02B0A
7E83F85E D99BF422 0EDC2E9B FC46D99B F6468908 C4830054 96EF9A00 54968F9A
9A500AF6 466B0145 880E7EC5 E42AF146 8A05880E 7EC50030 05F6468B 4D7F09F6
08C48300 5496EF9A 0054968F 9AE866DC 9BF846D9 9BE85EDD 9B02C483 0054969D
F6468BF2 5689F4AE 3EF72E99 F6468B6F EB024588 0E7EC500 3005F646 8BF64689
0145880E 7EC50030 05F2468B 05880E7E C5003005 F4468BF4 4689F4AE 3EF72E99
F846D99B E85EDD9B 02C48300 54969D9A 500AF646 6B024588 0E7EC5E4 2AF1468A
0345880E 7EC50030 05F6468B F6468908 C4830054 96EF9A00 54968F9A E866DC9B
32220014 7F8E004C 2A180014 7F7E004C 2A080014 7F6E004C 2A0000CB 5E5FC99B
29F4004C 29F00014 7E8E0024 E1D4004C 29EC0024 D53E0024 C3D0004C 3232004C
8ADA004C 2A20004C 5BAA004C 5BA8004C 5B94004C 5B90004C 59DA004C 3242004C

951F0014 7B9A004C 8AB0004C 8AAE004C 8AAC004C 3246004C 8AC2004C 8AC6004C
2961004C 2A22004C 294B0014 7B8C4022 00000000 0000004C 7C64004C 29300014
00000000 0000004C 5B7C004C 29F20024 DD3E004C 2A1E004C 29A1004C 2981004C
32500014 E220004C 324E004C 324C004C 29C8004C 29BD4024 00000000 00000000
3262004C 3261004C 3260004C 325F004C 325E004C 325C004C 3252004C 325A004C
29FA004C 29F8004C 29F6004C 3267004C 3266004C 3265004C 3264004C 3263004C
0000BFB9 99999999 999ABFF0 00000000 0000004C 3268004C 3273004C 29E5004C
0010FC46 C70000FE 46C70000 16C85756 000A3FB9 99999999 999A3FF0 00000000
4689058B FF103EC5 2E001505 C7FF143E C52E0031 05C7FF10 3EC52E00 00EA46C7
096A03F6 46C601F5 46C603F4 46C60002 F246C7F0 4689E0D1 058BFF14 3EC52EEE
FFF976FF 014AE903 FCFE46C7 0875C20B F95689F7 468904C4 830054DC 339A026A
76FFFF1C 36FF2EFF 1E36FF2E 50EE468D 1650FE46 8D1604C4 83003CF6 B19AF776
830054DC 759AF776 FFF976FF 14C48300 54D8DC9A 086A066A 35FFFF18 3EC52EFC
46C700E8 E90AC483 0054C048 9AFE76FF 006A006A 006A006A 167400FE 7E8304C4
032EE0D1 EC468B50 FE468D16 357500FE 7E833B7D 04EC7E83 EC46FF03 EB0000EC
9A026A05 6A35FFFF 183EC52E 35FFFF1C 3EC52EEA 76FF5052 FF22168B 2EFF2006
830054C0 489AFE76 FF006A00 6A006A00 6A167400 FE7E83BC EB12C483 0054D8DC
006A006A 006A006A 157400FE 7E8304C4 83003CF7 269A50FE 468D1600 81E90AC4
3EC52E00 05C6FF28 3EC52E00 05C6FF24 3EC52E59 EB0AC483 0054C048 9AFE76FF
3EC52E00 05C6FF38 3EC52E00 05C6FF34 3EC52E00 05C6FF30 3EC52E00 05C6FF2C
3EC52E01 05C6FF48 3EC52E00 05C6FF44 3EC52E00 05C6FF40 3EC52E00 05C6FF3C
FFFF1C3E C52E50FE 468D1600 00FE46C7 000002C8 5756CB5E 5FC90000 05C7FF4C
006A006A 006A1374 00FE7E83 0CC48300 54D8DC9A 166A026A 35FFFF18 3EC52E35
C70A7EC5 1505C60A 7EC5EC8B 555756CB 5E5FC90A C4830054 C0489AFE 76FF006A
8BFF143E C52E0000 0545C70A 7EC50345 890A7EC5 48058BFF 103EC52E 00000145
C548058B FF103EC5 2E00000A 45C70A7E C5160945 C60A7EC5 0745890A 7EC54805
890A7EC5 48E0D105 8BFF143E C52E0E45 890A7EC5 058BFF14 3EC52E0C 45890A7E
543EC52E 42ED46C6 59EC46C6 4DEB46C6 43EA46C6 000016C8 5756CB5E 5FC91045
00FE46C7 01F446C6 01F746C6 0003F146 C770EE46 C6044588 FF503EC5 2E058BFF
8B01F846 C604F646 C601F546 C602F346 C6012EE9 037C04FE 7E83FE46 FF03EB00
6A50EE46 8D160A76 FF0C76FF 000CEF46 C7FB5689 F9468900 162DFE46 035A16C5
D8DC9A03 6A056A35 FFFF183E C52E35FF FF221E8E 2EFF203E 032EE7D1 FE7E8B15
068B2E04 F846C601 F646C600 03EF46C7 00CDE903 74003D83 0A7EC512 C4830054
8B166A50 EE468D16 0A76FF0C 76FF0005 EF46C7FB 5689F946 89FF5216 8B2EFF50
0054D8DC 9A036A05 6A35FFFF 183EC52E 35FFFF22 1E8E2EFF 203E032E E7D1FE7E
FF5C3E03 2E02E7C1 FE7E8B1B 75003D83 FF583EC5 2E727500 3D830A7E C512C483
FF5E1E8E 2EFF5C3E 032E02E7 C1FE7E8B 16EB1DD9 9BFF6006 DF2E9BFF 5E1E8E2E
032E02E7 C1FE7E8B 5052FF64 168B2EFF 6206032E 02E0C1FE 468B1DD9 9BEED99B
5FC99BFE C6E90EC4 83003CFC 5A9A016A 0054968F 9A05D99B FF5E1E8E 2EFF5C3E
2E797500 3D83FF4C 3EC52E00 FB46C600 FD46C600 00FE46C7 000014C8 5756CB5E
F87E83F8 46FF03EB 0000F846 C7EE4689 058BFF6A 3EC52EEC 4689058B FF663EC5
8B50E42A FD468A50 E42AFB46 8A50EC46 8D1650FE 468D1646 7500FE7E 834C7D04
0054D8DC 9A066A06 6A35FFFF 183EC52E 35FFFF22 1E8E2EFF 203E032E E7D1F87E
06C85756 CB5E5FC9 000105C7 FF4C3EC5 2EABEBEC 4601058B FF103EC5 2E14C483
8B019BE9 037C04FC 7E83FC46 FF03EB00 00FC46C7 0000FA46 C70000FE 46C70000
02E0C1FC 468BD974 04232605 8BFF6E3E C52EFF74 068E2EFF 7236032E E6D1FC76
9A05D99B FF641E8E 2EFF623E 032E02E7 C1FA7E8B 5052FF5E 168B2EFF 5C06032E
3EC52E00 92E90374 00023D05 8BFF583E C52E0EC4 83003CFC 5A9A006A 0054968F
2EFF5C3E 032E02E7 C1FC7E8B 45760054 968A9AFF 7A1EDC2E 9B00CC85 D99BFF76
FF8436FF 2E5008C4 83005496 EF9A0054 968F9AFF 8606DC2E 9B05D99B FF5E1E8E
2E02E7C1 FC7E8B6F EB0AC483 00544ACA 9AFF5036 FF2EFF52 36FF2EFF 8236FF2E
FF5236FF 2EFF8E36 FF2EFF90 36FF2E00 54968F9A 05D99BFF 5E1E8E2E FF5C3E03
2E02E7C1 FC7E8BFF 5036FF2E FF5236FF 2E39EB10 C4830054 4ACA9AFF 5036FF2E
5008C483 005496EF 9A005496 8F9AFF86 06DC2E9B 05D99BFF 5E1E8E2E FF5C3E03
FE468D16 02558905 89FF923E C52EFF52 168B2EFF 50068B2E 06C48300 3CFB7B9A
203E032E E7D1FC7E 8B166AFF 2436FF2E FF2636FF 2EFF9636 FF2EFF98 36FF2E50
7400FE7E 8316C483 0054D8DC 9A046A07 6A35FFFF 183EC52E 35FFFF22 1E8E2EFF
56CB5E5F C99BFE59 E9FA46FF 0AC48300 54C0489A FE76FF01 6A006A00 6A006A13
7E83FC46 FF03EB00 00FC46C7 6374003D 83FF4C3E C52E0000 FE46C700 0004C857
35FFFF22 1E8E2EFF 203E032E E7D1FC7E 8B50FE46 8D162B75 00FE7E83 317D04FC
6A006A00 6A137400 FE7E83C6 EB0CC483 0054D8DC 9A076A02 6A35FFFF 183EC52E
000AC857 56CB5E5F C9000005 C7FF4C3E C52E0AC4 830054C0 489AFE76 FF006A00
C60E5E8E 0C7E03FE 7E8B0E7D 04FE7E83 FE46FF03 EB0000FE 46C70000 F846C700
C60A4689 D8F70A46 8B0E7D00 0A7E8304 45880C7E C5058BFF 543EC52E E9EB2005

9A3EF72E 99FC468B FE46FF0F EB0064FC 46C70001 FE46C720 F746C604 EB2DF746
067401F8 7E830C7F 00FA7E83 FA4689FC 7EF7990A 468B3D7D 04FE7E83 FC4689FF
FA468B0E 5E8E0C7E 03FE7E8B 0A4629FA 6EF7FC46 8B0001F8 46C7CF75 03FE7E83
0E5E8E0C 7E03FE7E 8B0E7D04 FE7E83FE 46FF03EB 0000FE46 C7AEEB05 88003005
000018C8 5756CB5E 5FC90588 E42AF746 8A0E5E8E 0C7E034F FE7E8BE9 74203D80
147EC50C 46DD9B5D EB058BFF 583EC52E 7D75000A 7E83F85E DD9BFF9C 06DD2E9B
7EC5E866 DC9BFF7A 06DD2E9B E85EDD9B FFA436DC 2E9B0C46 DD9B00F3 E91DD99B
02E7C133 C783F88B 08C48300 5496EF9A 0054968F 9A0C46DD 9B00D2E9 1DD99B14
E0D1009B E9037600 023D00A3 E91DD99B 147EC505 D99BFF78 1E8E2EFF 763E032E
1DD99B14 7EC50C46 DD9B6FEB 058BFF58 3EC52EFC A7FC86FC 79FCE7A7 FF2ED88B
1DD99B14 7EC5E866 DC9BFFAC 06DD2E9B E85EDD9B 0C4EDC9B FFA406DD 2E9B77EB
1DD99B14 7EC5F246 DF9BF246 8908C483 005496EF 9A005496 8F9A05D9 9B147EC5
003CFD7E 9AFF7636 FF2EFF78 36FF2E00 54968F9A 0C46DD9B 1476FF16 76FF37EB
5756CB5E 5FC99BFD 42FD02FC F6FD73A7 FF2ED88B E0D10F77 00023D14 EB10C483
54968A9A 0E5EDC9B 05D99B0C 5E8E0A7E 0302E7C1 FE7E8B00 01FE46C7 00001AC8
8E0A7E03 02E7C1FE 7E8BE65E DD9BEED9 9BDAEBFE 46FF057D 0166FE7E 810C7600
0C5E8E0A 7E0302E7 C1FE7E8B 15760054 968A9AE6 5EDC9B25 D89B0E46 DD9B0C5E
9BE0D99B 25D89B0E 46DD9B0C 5E8E0A7E 0302E7C1 FE7E8B16 EB25D89B 0E46DD9B
DC9B0E66 DC9B05D9 9B0C5E8E 0A7E0302 E7C14FFE 7E8BF65E DD9BEED9 9BEE5EDD
8B17EB0E 66DC9B05 D99B0C5E 8E0A7E03 02E7C14F FE7E8B16 76005496 8A9AF65E
73005496 8A9AEE5E DC9BE0D9 9B0E66DC 9B05D99B 0C5E8E0A 7E0302E7 C14FFE7E
9A500033 2DFE468B 15EB1DD9 9B167EC5 02C48300 54969D9A 5000342D FE468B17
DD9BFFB4 06DF2E9B 000008C8 5756CB5E 5FC99B1D D99B167E C502C483 0054969D
8606DC2E 9B0A46DD 9B327600 54968A9A F85EDC9B 00CC85D9 9BFF763E C52EF85E
9A1276FF 1476FFFF B636FF2E FFB836FF 2E5008C4 83005496 EF9A0054 968F9AFF
FF1476FF FFBA36FF 2EFFBC36 FF2E0054 968F9A0A 46DD9B21 EB0AC483 00544ACA
004C8696 0014E220 004C8694 004C8692 00CB5E5F C99B10C4 8300544A CA9A1276
004C86A6 004C86A5 004C86A4 004C86A3 004C86A2 004C86A1 004C86A0 004C8698
004C8682 004C8666 004C8668 004C865E 004C8664 004C86A9 004C86A8 004C86A7
00000000 00000014 F92E004C 86560024 FF06004C 8654004C 8652004C 867200FF
B7F87A0F 000A004C 86AA004C 86B5004C 863E3FE0 00000000 0000004C 86384059
5756004C 864B004C 86450064 406FE000 00000000 40046666 66666666 38AA95A5
19EBC02B E775003D 800A46FF 0C75043A 2698058A 0A7EC50E 46FF0E76 C4EC8B55
000000CB 5E5FC900 01B803EB FFFFB805 7D043A26 98058A0A 7EC50E76 C40E4EFF
C4830054 4AAE9A35 FF0275FF 16D63EC5 2E16DA36 FF2E16DC 36FF2EEC 8B555756
EA46C700 0016C857 56CB5E5F C904C483 00549BD5 9A35FF02 75FF16D6 3EC52E08
EC468D16 16E236FF 2E16E436 FF2E0A76 FF0C76FF 6474003D 8316DE3E C52E0000
EC468D16 5004C483 0054EEEA 9A50EC46 8D1650EA 468D160C C4830054 4ACA9A50
3EC52E02 75FF3DC5 16E63EC5 2E0B6A05 6A35FF16 EA3EC52E 35FF16EE 3EC52E50
16F236FF 2E16F436 FF2E0A76 FF0C76FF 34EB16C4 830054DD B19A35FF 3DC516E6
549BD59A 35FF0275 FF16D63E C52E0CC4 8300544A AE9A35FF 0275FF16 D63EC52E
E5E69A50 F6468D16 16F636FF 2E16F836 FF2E0000 0CC85756 CB5E5FC9 04C48300
3D058916 FA3EC52E 5E5F0054 38DA9A50 F4468D16 50F6468D 16575608 C4830054
544AAE9A 50002405 16FE068B 2E170036 FF2E1702 36FF2E17 0436FF2E 2075FFFF
2E57565E 5F005438 BA9A50F4 468D1600 6A036A35 FF16FA3E C52E5756 08C48300
FF2E5E5F 0054389A 9A50F446 8D16126A 170636FF 2E170836 FF2E35FF 16FA3EC5
8916D63E C52E08C4 83005499 729A170A 36FF2E17 0C36FF2E 170E36FF 2E171036
50002405 16FE068B 2E170036 FF2E1712 36FF2E17 1436FF2E 2075C20B 02558905
83058917 163EC52E 5E5F0054 3AC09A50 F4468D16 006A5756 08C48300 544AAE9A
4AAE9A50 00240516 FE068B2E 170036FF 2E171A36 FF2E171C 36FF2E20 7400F47E
38FA9A50 FE468D16 35FF16FA 3EC52E57 56000002 C85756CB 5E5FC908 C4830054
17163EC5 2E57565E 5F005439 1A9A50FE 468D1635 FF16FA3E C52E5756 5E5F0054
003D8317 1E3EC52E 000004C8 5756CB5E 5FC95E5F 00543AA0 9A50FE46 8D1635FF
949A50FC 468D1635 FF17163E C52E016A 50FF468D 1635FF16 FA3EC52E 57562D75
FF35FF17 163EC52E 35FF16FA 3EC52E57 563FEBC0 2B047400 FC7E835E 5F00543D
EBC02B00 0105C717 1E3EC52E 0D7400FC 7E835E5F 00543DD4 9A50FC46 8D160A76
00440252 9A0A76FF 000002C8 5756CB5E 5FC998FF 468A0000 05C7171E 3EC52E0D
529A0A76 FF4AEBC0 2B047500 FF7E80E7 751BFF7E 800674C0 0B98FF46 8802C483
76FF27EB C02B0475 00FF7E80 E7754FFF 7E800674 C00B98FF 468802C4 83004402
533DED74 00503D0C EBC02B10 EB0004B8 15EB0001 B80EEB02 C4830044 02529A0A
2FE90375 003D8316 DE3EC52E 0000FE46 C7000002 C85756CB 5E5FC9F0 EBED7400
468D1604 C4830044 00379A35 FF17223E C52E50E4 2A058A0A 7E031726 3EC52E02
0B6A056A 35FF16EA 3EC52E35 FF16EE3E C52E172A 36FF2E17 2C36FF2E 046A50FE
50FE468D 1616C483 0054DDB1 9A35FF3D C516E63E C52E0275 FF3DC516 E63EC52E

EA3EC52E 35FF16EE 3EC52E0C 76FF0E76 FF5004C4 830054EE EA9A0C76 FF0E76FF
830054DD B19A35FF 3DC516E6 3EC52E02 75FF3DC5 16E63EC5 2E0B6A05 6A35FF16
FF16EA3E C52E35FF 16EE3EC5 2E172E36 FF2E1730 36FF2E04 6A50FE46 8D1616C4
16C48300 54DDB19A 35FF3DC5 16E63EC5 2E0275FF 3DC516E6 3EC52E0B 6A056A35
0A7E0317 263EC52E 05880A7E 0317323E C52E04C4 830054EE EA9A0C76 FF0E76FF
36FF2E04 6A50FE46 8D1604C4 83004400 379A5040 058B1722 3EC52E50 E42A058A
3DC516E6 3EC52E0B 6A056A35 FF16EA3E C52E35FF 16EE3EC5 2E173636 FF2E1738
FE468D16 4D751046 0B12468B 16C48300 54DDB19A 35FF3DC5 16E63EC5 2E0275FF
FF16EE3E C52E173A 36FF2E17 3C36FF2E 5004C483 0054EEEA 9A0C76FF 0E76FF50
9A35FF3D C516E63E C52E0275 FF3DC516 E63EC52E 0B6A056A 35FF16EA 3EC52E35
1276FF50 04C48300 54EEEA9A 1076FF12 76FF50FE 468D1647 EB16C483 0054DDB1
2E0275FF 3DC516E6 3EC52E0B 6A056A35 FF16EA3E C52E35FF 16EE3EC5 2E1076FF
3E36FF2E 174036FF 2E046A50 FE468D16 16C48300 54DDB19A 35FF3DC5 16E63EC5
3EC52E02 75FF3DC5 16E63EC5 2E0B6A05 6A35FF16 EA3EC52E 35FF16EE 3EC52E17
0C76FF0E 76FF1742 36FF2E17 4436FF2E 25EB16C4 830054DD B19A35FF 3DC516E6
C700007A C85756CB 5E5FC90E C4830054 BCCE9A35 FF0275FF 16D63EC5 2E0A76FF
003D8316 DE3EC52E 0054E7B4 9A000086 46C70000 8846C700 008A46C7 00009446
E63EC52E 686A046A 35FF16EA 3EC52E19 6A50FF46 8D165094 468D1600 CBE90375
0083E903 7400FF7E 8014C483 0054DDB1 9A35FF3D C516E63E C52E0275 FF3DC516
6A35FF16 EA3EC52E 056A5086 468D1650 94468D16 88468986 468B8A46 8988468B
7E8314C4 830054DD B19A35FF 3DC516E6 3EC52E02 75FF3DC5 16E63EC5 2E696A04
17463EC5 2E0333E9 0001B821 EB86468B FF68E903 741B8A7E 83FF71E9 03744F88
DB740051 3DDA7400 503D0318 E90004B8 000005C7 174A3EC5 2E000308 45C73DC5
C00B98FE 468802C4 83004402 D29A196A 010AE918 7400FF3D E42AFF46 8AFF35E9
5F00543B F49A5094 468D1650 90468D16 006A35FF 174E3EC5 2E575600 F5E90374
9276FF02 B1E9C02B 0054E806 9A0A7400 947E83FE EBE90375 01947E83 9246895E
00013D05 8B8C7EC5 0D740003 3D058B8C 7EC58E56 898C4689 02C48300 54EF9C9A
05C7174A 3EC52E08 45893DC5 17463EC5 2E058B8C 7EC50054 E8069AFE B3E90374
3C749A50 94468D16 016A9076 FF575645 7500013D 058B8C7E C5004410 709A0000
3AA09A50 94468D16 35FF174E 3EC52E57 56023FE9 C02B0574 00947E83 5E5F0054
468D1601 6A9076FF 57561EEB 5E5F0054 3AE09A50 94468D16 006A5756 5E5F0054
2E0054E8 069A01F4 E90005B8 01FAE9C0 2B057400 947E835E 5F00543C 749A5094
6A509646 8D165094 468D1601 B2E90374 07FF7E80 01BFE903 75003D83 16DE3EC5
9A35FF3D C516E63E C52E0275 FF3DC516 E63EC52E 696A046A 35FF16EA 3EC52E70
6A036A35 FF16EA3E C52E1752 36FF2E17 5436FF2E 5094468D 1614C483 0054DDB1
94468D16 12C48300 54DDB19A 35FF3DC5 16E63EC5 2E0275FF 3DC516E6 3EC52E51
0275FF3D C516E63E C52E506A 036A35FF 16EA3EC5 2E175236 FF2E1754 36FF2E50
175A3EC5 2E0A7500 3D831756 3EC52E12 C4830054 DDB19A35 FF3DC516 E63EC52E
D22BC72B 9A468B16 C783F88B 2FF72604 8B175E36 C52E1762 1EC42E37 74003D83
059A468B 30EBFC46 89401768 36F72ED2 2BFD6D05 9C468BFA 46894017 6636F72E
2B9C468B FE2B0293 BFF08B78 076B175E 1EC52EFA 46894017 6636F72E D22BFFEA
40058B17 223EC52E 1274053B FC468B17 223EC52E FC468940 176836F7 2ED22BC7
458A1726 3EC52E25 77FA463B E42A0145 8A17263E C52E00A4 E9C02B05 74FC463B
C52E70EB 0001B805 72FA463B FFFF05C6 03E42A01 458A1732 3EC52EF0 8BE42A01
458A1732 3EC52EF0 8BE42A04 458A1726 3EC52E3A 77FA463B E42A0445 8A17263E
05C7174A 3EC52E00 030845C7 3DC51746 3EC52E1A 72FA463B FFFF05C6 03E42A04
0845C73D C517463E C52E18EB 0001B805 7501FE7E 8023EBC0 2B27EB00 04B80000
096A146A 00440000 9AEC8B55 5756CB5E 5FC90004 B8000005 C7174A3E C52E0003
544AAE9A 35FF0275 FF16D63E C52E176A 36FF2E17 6C36FF2E 04C48300 4400379A
36FF2E17 7036FF2E 0A6A04C4 8300549B D59A35FF 0275FF16 D63EC52E 08C48300
D59A35FF 0275FF16 D63EC52E 0AC48300 544AAE9A 35FF0275 FF16D63E C52E176E
8300544A AE9A35FF 0275FF16 D63EC52E 177236FF 2E177436 FF2E04C4 8300549B
177636FF 2E177836 FF2E0C6A 04C48300 549BD59A 35FF0275 FF16D63E C52E08C4
549BD59A 35FF0275 FF16D63E C52E0AC4 8300544A AE9A35FF 0275FF16 D63EC52E
8300544A AE9A35FF 0275FF16 D63EC52E 177A36FF 2E177C36 FF2E0D6A 04C48300
C52E177E 36FF2E17 8036FF2E 04C48300 549BD59A 35FF0275 FF16D63E C52E0AC4
8300549B D59A35FF 0275FF16 D63EC52E 08C48300 544AAE9A 35FF0275 FF16D63E
C52E08C4 8300544A AE9A35FF 0275FF16 D63EC52E 178236FF 2E178436 FF2E04C4
FF16D63E C52E1786 36FF2E17 8836FF2E 04C48300 549BD59A 35FF0275 FF16D63E
026A04C4 8300549B D59A35FF 0275FF16 D63EC52E 08C48300 544AAE9A 35FF0275
46C70000 D246C700 00D446C7 000042C8 5756CB5E 5FC904C4 83004400 379A166A
8D16006A 575604CD E9037500 3D8316DE 3EC52E00 00BE46C7 0001CE46 C70000D0
8A36FF2E 178C36FF 2E178E36 FF2E1790 36FF2EC0 46895E5F 00543BD4 9A50BE46
DD3E9A17 9236FF2E 179436FF 2E179636 FF2E1798 36FF2E08 C4830054 DD3E9A17

FF2E50BE 468D1602 55890589 16E63EC5 2E179416 8B2E1792 068B2E08 C4830054
3DC516E6 3EC52E02 75FF3DC5 16E63EC5 2E006A03 6AC076FF 16EA36FF 2E16EC36
00CDF546 C700FAF1 46C70456 E90001B8 067400BE 7E8312C4 830054DD B19A35FF
FE46C600 FD46C600 FC46C601 FB46C602 FA46C606 F946C600 0505C717 223EC52E
2ED076FF CE76FF50 EE468D16 50BE468D 160014F7 46C70002 F346C704 F046C604
DDB19A35 FF3DC516 E63EC52E 0275FF3D C516E63E C52E026A 056A35FF 16EA3EC5
C604FE46 C6058917 9A3EC52E EE468B03 DBE90001 B8067400 BE7E8316 C4830054
FFCE76FF 50EE468D 1650BE46 8D160014 F746C700 BAF546C7 0002F346 C704F046
35FF3DC5 16E63EC5 2E0275FF 3DC516E6 3EC52E02 6A056A35 FF16EA3E C52ED076
46C60589 179E3EC5 2EEE468B 0378E900 01B80674 00BE7E83 16C48300 54DDB19A
2E526A03 6A35FF16 EA3EC52E 50D6468D 1650BE46 8D1602D8 46C600D7 46C601D6
067400BE 7E8312C4 830054DD B19A35FF 3DC516E6 3EC52E02 75FF3DC5 16E63EC5
468D1600 0AF346C7 03F046C6 01FE46C6 0062F746 C700CDF5 46C70326 E90001B8
FF3DC516 E63EC52E 026A056A 35FF16EA 3EC52ED0 76FFCE76 FF50EE46 8D1650BE
8B02CDE9 0001B806 7400BE7E 8316C483 0054DDB1 9A35FF3D C516E63E C52E0275
5436FF2E 50BE468D 16058917 523EC52E 058B16EE 3EC52E05 8916EE3E C52EEE46
16E63EC5 2E0275FF 3DC516E6 3EC52E50 6A036A35 FF16EA3E C52E1752 36FF2E17
1C74003D 83175A3E C52E0A75 003D8317 563EC52E 12C48300 54DDB19A 35FF3DC5
16C246C7 17EB0280 C446C7C2 46890016 052CF726 058B175E 3EC52E17 6236C42E
D276FF50 C2468D16 50BE468D 16C44689 C72B0280 B8F88B78 046B175E 36C52E00
2E0275FF 3DC516E6 3EC52E06 6A066A35 FF16EA3E C52E35FF 179A3EC5 2ED476FF
563EC52E 01F0E900 01B80674 00BE7E83 18C48300 54DDB19A 35FF3DC5 16E63EC5
8B78046B 175E36C5 2E12EB02 93C446C7 0774003D 83175A3E C52E0A75 003D8317
35FF16EE 3EC52ED4 76FFD276 FF50C246 8D1650BE 468D16C4 4689C72B 0293B8F8
B19A35FF 3DC516E6 3EC52E02 75FF3DC5 16E63EC5 2E066A06 6A35FF16 EA3EC52E
5A3EC52E 0A75003D 8317563E C52E017A E90001B8 067400BE 7E8318C4 830054DD
02AFC446 C7C24689 001F052C F726058B 175E3EC5 2E176236 C42E1C74 003D8317
8D1650BE 468D16C4 4689C72B 02AFB8F8 8B78046B 175E36C5 2E001FC2 46C717EB
16E63EC5 2E066A06 6A35FF16 EA3EC52E 35FF179E 3EC52ED4 76FFD276 FF50C246
E90001B8 067400BE 7E8318C4 830054DD B19A35FF 3DC516E6 3EC52E02 75FF3DC5
FF16EA3E C52E35FF 179E3EC5 2E17A236 FF2E17A4 36FF2E06 6A50BE46 8D1600EA
16C48300 54DDB19A 35FF3DC5 16E63EC5 2E0275FF 3DC516E6 3EC52E0B 6A056A35
6A35FF16 EA3EC52E 35FF179E 3EC52E17 A636FF2E 17A836FF 2E046A50 BE468D16
8D1616C4 830054DD B19A35FF 3DC516E6 3EC52E02 75FF3DC5 16E63EC5 2E0B6A05
6A056A35 FF16EA3E C52E35FF 16EE3EC5 2E17AA36 FF2E17AC 36FF2E05 6A50BE46
00BE7E83 16C48300 54DDB19A 35FF3DC5 16E63EC5 2E0275FF 3DC516E6 3EC52E0B
9A35FF02 75FF16D6 3EC52E00 0005C717 1E3EC52E 004400E8 9A25EB00 01B82A74
16DE3EC5 2E0000FE 46C70000 02C85756 CB5E5FC9 004409B2 9A04C483 0054BD47
2E076A02 6A35FF16 EA3EC52E 35FF179A 3EC52E50 FE468D16 00BDE903 75003D83
2E50FE46 8D1610C4 830054DD B19A35FF 3DC516E6 3EC52E02 75FF3DC5 16E63EC5
16E63EC5 2E0275FF 3DC516E6 3EC52E07 6A026A35 FF16EA3E C52E35FF 179E3EC5
E63EC52E 016A016A 35FF16EA 3EC52E50 FE468D16 10C48300 54DDB19A 35FF3DC5
C52E35FF 17963EC5 2E0EC483 0054DDB1 9A35FF3D C516E63E C52E0275 FF3DC516
0054DD0C 9A35FF17 8A3EC52E 35FF178E 3EC52E04 C4830054 DD0C9A35 FF17923E
16016A35 FF17AE3E C52E5756 1774003D 8317AE3E C52E0044 02099A05 EB04C483
C52E0A46 8B0000FF 6086C700 00A0C857 56CB5E5F C95E5F00 543C749A 50FE468D
0B4E9A04 C4830054 A7E39A50 FF60868D 160E7500 3D8316DE 3EC52E05 8917B23E
0AC48300 4403499A 016A17B6 36FF2E17 B836FF2E 17BA36FF 2E17BC36 FF2E0044
429A0AC4 83004403 499A046A 17BE36FF 2E17C036 FF2E17C2 36FF2E17 C436FF2E
006A17C6 36FF2E17 C836FF2E 006A5756 0054E7B4 9A00008C 46C78E46 89005467
CC36FF2E 8C76FF57 56767501 FF60BE83 9046895E 5F00543C 349A50FF 60868D16
FF4E7500 FF60BE83 9246895E 5F00543C 349A50FF 60868D16 006A17CA 36FF2E17
0001FF60 86C70875 8E463B05 8B987EC5 9A568998 468902C4 830054EF 9C9A9276
FF60868D 16006A17 C636FF2E 17C836FF 2E8C76FF 57568C46 89058B98 7EC52BEB
9A9076FF 0182E903 7400FF60 BE830054 E8069A83 EB904689 5E5F0054 3C349A50
0594468B 9676FF00 9EE90375 00107D80 947EC596 56899446 8902C483 0054EF9C
50FF6086 8D164874 003D8316 DE3EC52E 08C48300 54EE309A 509C468D 16500010
FF16EA3E C52E35FF 179A3EC5 2E509C46 8D165004 C4830054 EEEA9A50 9C468D16
16C48300 54DDB19A 35FF3DC5 16E63EC5 2E0275FF 3DC516E6 3EC52E0B 6A056A35
4AAE9A35 FF0275FF 16D63EC5 2E509C46 8D1604C4 83004400 379A0A6A 156A35EB
E9037500 3D80947E C504C483 00549BD5 9A35FF02 75FF16D6 3EC52E08 C4830054
2E0CC483 00544ACA 9A509C46 8D1617CE 36FF2E17 D036FF2E 9476FF96 76FF00BC
509C468D 1650FF60 868D1604 C4830044 00379A01 6A016A54 74003D83 16DE3EC5
0B6A056A 35FF16EA 3EC52E35 FF16EE3E C52E509C 468D1650 04C48300 54EEEA9A

6A156A41 EB16C483 0054DDB1 9A35FF3D C516E63E C52E0275 FF3DC516 E63EC52E
08C48300 544AAE9A 35FF0275 FF16D63E C52E509C 468D1604 C4830044 00379A0C
C52E04C4 83004400 379A166A 026A04C4 8300549B D59A35FF 0275FF16 D63EC52E
9B0474DA 269B05DB 9B3DC517 463EC52E 35C41746 3EC52EFF 62868905 8B174A3E
3D8316DE 3EC52E05 89174A3E C52E08C4 83005496 EF9A0054 968F9A17 D20EDC2E
174A3EC5 2E001305 C7174A3E C52E097C 00143D05 8B174A3E C52E0086 E9037500
8D165E5F 00740002 9A196A20 6A50FF64 868D1657 5600DEE9 0375053B FF62868B
3EC52E50 52009C2D FF628603 5A16C58B 50FF6286 2B058B17 4A3EC52E 50FF6086
3DC516E6 3EC52E02 75FF3DC5 16E63EC5 2E0B6A05 6A35FF16 EA3EC52E 35FF179E
00029A35 FF174A3E C52E206A 50FF6486 8D165756 7DEB16C4 830054DD B19A35FF
17E036FF 2E50FF64 868D1600 FF6485C6 3C03261F 16FD8B17 4A36C42E 5E5F0074
FF0275FF 17DA3EC5 2E0CC483 00544AAE 9A35FF02 75FF17DA 3EC52E17 DE36FF2E
FF60868D 1604C483 00549C3C 9A35FF02 75FF16D6 3EC52E04 C4830054 9BD59A35
7400013D FE468900 4405B99A 000004C8 5756CB5E 5FC99B04 C4830054 A8239A50
9A000008 45C73DC5 17E23EC5 2E6B7501 FE7E83E7 7505FE7E 83067404 FE7E830C
5F00543C 949A50FC 468D1605 00685756 00010A45 C73DC517 463EC52E 00441070
6A006A00 6A006A00 6A006A00 54406F9A 005441EE 9A0A7400 3D8317E6 3EC52E5E
7E8302C4 8300442B B89A1717 6810C483 005453D1 9A17EA36 FF2E17EC 36FF2E00
EE36FF2E 17F036FF 2E006A57 5600000E C85756CB 5E5FC900 4410709A 057504FE
006A006A 006A006A 197400FE 7E83FC46 895E5F00 543C349A 50FE468D 16006A17
89F24689 02C48300 54EF9C9A FC76FF00 81E90001 B80AC483 0054C048 9AFE76FF
006A17F2 36FF2E17 F436FF2E 006A5756 62EB0001 B8057500 087D83F2 7EC5F456
32EB0001 B8057401 FE7E8317 7400FE7E 83FA4689 5E5F0054 3C349A50 FE468D16
76FFF676 FF50FE46 8D160001 F646C700 04F846C7 0AEB0002 F646C700 02F846C7
8508004C 638C004C 66AECB5E 5FC9FE46 8B0AC483 0054E0D6 9A0875FF F27EC5F8
7C64004C 664C004C 63A3004C 639A004C 66B4004C 66E4004C 66BE004C 6391004C
66E2004C 63FF004C 66E0004C 63E2004C 63E0004C 63D9004C 63C6004C 63AA004C
6436004C 642D004C 6428004C 666A004C 6423004C 641E004C 6664004C 66B6004C
85100014 7B7A0014 E222004C 66C2004C 8504004C 850A004C 8500004C 643B004C
652E004C 64FC004C 64CA004C 6498004C 6466004C 643C000E 0009004C 6672004C
66EA004C 66B2004C 66BC004C 66BA004C 66E8004C 66E6004C 659D004C 656A004C
65F6004C 65ED004C 65E4004C 66B8004C 8506004C 65DE004C 65D9004C 65D2004C
6611004C 850C4034 00000000 0000004C 6608004C 6658004C 664E004C 65FF004C
FF2E046A 00000EC8 5756004C 6637004C 662B004C 6624004C 6670004C 84FC004C
CE3EC52E 2CD236FF 2E2CD436 FF2E5756 06C48300 54E19E9A 2CCE36FF 2E2CD036
D436FF2E 2CD636FF 2E2CD836 FF2E5756 5E5F0054 DE289A21 C36835FF 0275FF2C
E436FF2E 00A86800 0005C72C DA3EC52E 5E5F0054 DE289A21 C1682CD2 36FF2E2C
2CEC36FF 2E12F868 0AC48300 5496649A 2CDE36FF 2E2CE036 FF2E2CE2 36FF2E2C
FF2E2CF4 36FF2E6A 6A0AC483 00549664 9A2CE636 FF2E2CE8 36FF2E2C EA36FF2E
36FF2E2C FC36FF2E 0128680A C4830054 96649A2C EE36FF2E 2CF036FF 2E2CF236
0236FF2E 2D0436FF 2E012068 0AC48300 5496649A 2CF636FF 2E2CF836 FF2E2CFA
2D0A36FF 2E2D0C36 FF2E08C2 680AC483 00549664 9A2CFE36 FF2E2D00 36FF2E2D
FF2E2D06 36FF2E2D 0836FF2E 666A0AC4 83005496 649A2D06 36FF2E2D 0836FF2E
36FF2E2D 1636FF2E 2D1836FF 2E019C68 0AC48300 5496649A 2D0E36FF 2E2D1036
058B2D1E 3EC52EFE 4689058B 2CD63EC5 2E0AC483 00549664 9A2D1236 FF2E2D14
2D2E3EC5 2E025589 05892D22 3EC52E02 558B058B 2D263EC5 2E05892D 1A3EC52E
05892D32 3EC52E02 558B058B 2D363EC5 2E025589 05892D2A 3EC52E02 558B058B
36FF2E2D 4636FF2E 2D4836FF 2E366A05 892D3A3E C52E058B 2D3E3EC5 2E025589
05892D4A 3EC52E02 558B058B 2D4E3EC5 2E0AC483 00549664 9A2D4236 FF2E2D44
36FF2E2D 5C36FF2E 00343828 9A1DD99B 2D523EC5 2E05D99B 2D563EC5 2E025589
2E02C483 00548134 9A50000F 25058B2D 5E3EC52E 06C48300 54BE1C9A 016A2D5A
36C42E02 C483002C F14A9A35 FF2D5E3E C52E02C4 83003C75 B89A35FF 2D5E3EC5
2004F726 2D5E36C4 2E05892D 623EC52E C02B02EB 0001B805 74001004 F7262D5E
2E2D6C36 FF2E000F 25812D5E 3EC52E05 892D663E C52EC02B 02EB0001 B8057400
1274003D 802D6E3E C52E327E 003D832D 6A3EC52E 04C48300 2CFC639A 2D6A36FF
50001205 2D76068B 2E2D7836 FF2E04C4 8300544A 8A9A2D72 36FF2E2D 7436FF2E
2E005488 EA9A04C4 83002CFD 0E9A2D7A 36FF2E2D 7C36FF2E 04C48300 549BD59A
36FF2E2D 8036FF2E 50FA468D 160054C3 9E9A0054 C25E9A3A 75003D83 2D663EC5
9B2D8406 DF2E9BF2 5ED99B2D 8206DF2E 9B00547A B29A08C4 830054ED 689A2D7E
1274003D 802D6E3E C52E1C74 00FC7E83 04C48300 2CFA629A 50FC468D 16F65ED9
50FA468D 160082E9 037401FE 7E8304C4 8300544A 8A9A2D86 36FF2E2D 8836FF2E
2C4F8A9A 016A50FA 468D1639 7500FA7E 830AC483 002C3D1C 9A50F246 8D16036A
136A50FA 468D1644 75003D83 2D1A3EC5 2E0054CB 5A9A5375 00FA7E83 06C48300
36FF2E2D 8C36FF2E 1274003D 802D6E3E C52E2FEB 0AC48300 54DABA9A 6F6A036A

```
FE7E830A C4830054 C0489AFA 76FF006A 006A006A 006A04C4 8300544A 8A9A2D8A
7A9A2CEE 36FF2E2C F036FF2E 003CF4B0 9A04C483 00543EF3 9A016A64 6A117501
FE7E8300 3400009A 04C48300 44D60D9A 2CE636FF 2E2CE836 FF2E04C4 83002CE8
C52E0C74 00023D05 8B2D1A3E C52E0044 F8369A05 7E003D83 2D6A3EC5 2E0F7500
44CB7A9A 057400FC 7E830B75 00023D05 8B2D1A3E C52E4D75 00033D05 8B2D1A3E
35FF0275 FF2CCE3E C52E5756 00442952 9A05892D 3E3EC52E 058B2D3A 3EC52E00
0092E903 7401FE7E 8301FCE9 5E5F0054 DE289A21 C3682CD2 36FF2E2C D436FF2E
36FF2E2D 0036FF2E 006A006A 006A50FA 468D1600 85E90374 003D832D 1A3EC52E
2CF036FF 2E35FF2D 6A3EC52E 12C48300 3C7D919A 2CF636FF 2E2CF836 FF2E2CFE
00C2E903 7500FA7E 830AC483 0044F6C9 9A2D8E36 FF2E2D90 36FF2E2C EE36FF2E
006A006A 04C48300 544A8A9A 2D9236FF 2E2D9436 FF2E1274 003D802D 6E3EC52E
9A0083E9 0374013D 802D963E C52E0090 E90AC483 0054C048 9AFA76FF 006A006A
BA9A6F6A 036A136A 50FA468D 160044CB 7A9A7475 01FE7E83 7A74C00B 0054573B
2CF836FF 2E2CFE36 FF2E2D00 36FF2E00 6A006A00 6A50FA46 8D160AC4 830054DA
36FF2E12 74003D80 2D6E3EC5 2E2F7400 FA7E8312 C483003C 7D919A2C F636FF2E
830054C0 489AFA76 FF006A00 6A006A00 6A04C483 00544A8A 9A2D9A36 FF2E2D9C
02C48300 44707C9A 006A0001 05C72D9E 3EC52E00 5441DB9A 617501FE 7E830AC4
6A1674C0 0B04C483 0054D323 9A2D4236 FF2E2D44 36FF2E00 0305C72D A23EC52E
9A2DA636 FF2E2DA8 36FF2E08 C4830054 D39A9A2D 4236FF2E 2D4436FF 2E006A00
3EC52E0A 7500FE7E 8305892D 3E3EC52E 058B2D3A 3EC52E6A EB04C483 0044EDC3
21C1682C D636FF2E 2CD836FF 2E2CD236 FF2E2CD4 36FF2E57 56427400 3D832D1A
21C3682C D236FF2E 2CD436FF 2E35FF02 75FF2CCE 3EC52E57 565E5F00 54DE289A
8D160002 68C85756 CB5E5FC9 9B02C483 00442974 9A076A0A EB5E5F00 54DE289A
058B2DAE 3EC52E02 19E90374 003D832D AA3EC52E 04C48300 3C95779A 50FD9A86
B636FF2E 2DB836FF 2E01FBE9 03750062 3D058B2D AE3EC52E 020AE903 7C00633D
F0868908 C4830054 99729A50 5204C483 00547FAA 9A2DB236 FF2E2DB4 36FF2E2D
4A8A9A2D BA36FF2E 2DBC36FF 2E127400 3D802D6E 3EC52E37 75C20BFD F29689FD
00442B8C 9A04C483 00549BD5 9A500012 052D7606 8B2E2D78 36FF2E04 C4830054
50FDA086 8D16506A FDF0B6FF FDF2B6FF 2DBE36FF 2E2DC036 FF2E50FD F4868D16
36FF2E2D C436FF2E 50FDF486 8D160CC4 8300542A 089A5052 0AC48300 54EAAA9A
542A089A 50520AC4 830054EA AA9A50FD A0868D16 506AFDF0 B6FFFDF2 B6FF2DC2
868999C7 8BF88B05 FDF4866B 04C48300 549C3C9A FDF0B6FF FDF2B6FF 0CC48300
0836FF2E 2DC636FF 2E2DC836 FF2EFDF6 B6FFFDF8 B6FF006A 006AFDF8 9689FDF6
04C48300 2CFA299A 50FD9C86 8D1610C4 830054AD 039A5000 57052D06 068B2E2D
2CE036FF 2E2CFE36 FF2E2D00 36FF2E2C F636FF2E 2CF836FF 2E35FF2D 6A3EC52E
BE831675 00FD9CBE 8312C483 0044F72A 9A2D8E36 FF2E2D90 36FF2E2C DE36FF2E
FD9E868D 162B7500 FD9ABE83 02C48300 1C00009A 35FF2D1A 3EC52E0F 7500FD9A
9A4474C0 0B04C483 00545813 9A50FD9E 868D1656 74C00B04 C4830054 58A29A50
04EB0000 FD9886C7 2B74C00B 04C48300 5458139A 50FD9E86 8D163DEB 003C8DA3
C483003C 8CF79AFD 98B6FF2D CA36FF2E 2DCC36FF 2E187D04 FD98BE83 FD9886FF
0000FE46 C701DEE9 0375000A 7E830044 E28A9A05 75003D83 2DCE3EC5 2EDDEB06
00FC46C7 FDFA8589 FE468B1F 16FD03E7 D1FE7E8B 5A7D0100 FE7E81FE 46FF03EB
CC1E8E2E 2DCA3E03 2E09E7C1 FC7E8BE6 D1FE768B D67D04FC 7E83FC46 FF03EB00
8BFE032D D41E8E2E 2DD23E03 2E09E7C1 FC7E8BE6 D1FE768B 0589FE46 8BFE032D
FF2E2D90 36FF2EFE 76FF607D 04FE7E83 FE46FF03 EB0000FE 46C7BDEB 0589FE46
8B058900 FFB82DDC 1E8E2E2D DA3E032E E7D1FE7E 8B06C483 0044D516 9A2D8E36
2B2DE41E 8E2E2DE2 3E032EE7 D1FE7E8B 05892DD8 1E8E2E2D D63E032E E7D1FE7E
468D1674 7500FD9A BE8397EB 05892DE0 1E8E2E2D DE3E032E E7D1FE7E 8B0589C0
6A50FA46 8D1612C4 830054C7 8E9A006A 006A006A 50FDFA86 8D16006A 006A50FA
006A006A 50FA468D 1612C483 0054C78E 9A006A00 6A016A50 FDFA868D 16006A00
868D1600 6A006A50 FA468D16 12C48300 54C78E9A 006A006A 026A50FD FA868D16
0036FF2E 006A006A 006A50FA 468D1612 C4830054 C78E9A00 6A006A03 6A50FDFA
C52E3474 00FA7E83 12C48300 3C7D919A 2CF636FF 2E2CF836 FF2E2CFE 36FF2E2D
006A006A 006A04C4 8300544A 8A9A2DE6 36FF2E2D E836FF2E 1274003D 802D6E3E
AE3EC52E 1D75003D 832DAA3E C52E0044 2B8C9A0A C4830054 C0489AFA 76FF006A
C85756CB 5E5FC900 54AF349A 05740062 3D058B2D AE3EC52E 117D0063 3D058B2D
FFFE7E81 04C48300 2CF0DA9A 50FE468D 165A7D00 633D058B 2DAE3EC5 2E000002
F636FF2E 2CF836FF 2E2D1236 FF2E2D14 36FF2E2D EA36FF2E 2DEC36FF 2E467500
6A35FF02 75FF2D2A 3EC52E03 6A10C483 005475AC 9A35FF02 75FF2D2A 3EC52E2C
4422BD9A 02C48300 441E989A 006AEC8B 555756CB 5E5FC908 C483003C 7B9F9A00
623D058B 2DAE3EC5 2E117D00 633D058B 2DAE3EC5 2E1D7500 3D832DAA 3EC52E00
544A8A9A 2DEE36FF 2E2DF036 FF2E1274 003D802D 6E3EC52E 0054AF34 9A057400
FC36FF2E 0361E905 8B2DA23E C52E0054 41DB9AEC 8B555756 CB5E5FC9 04C48300
83005442 4D9A2DF2 36FF2E2D F436FF2E 2DF636FF 2E2DF836 FF2E2DFA 36FF2E2D
```

2DFE36FF 2E2E0036 FF2E2E02 36FF2E2E 0436FF2E 2E0636FF 2E2E0836 FF2E0CC4
0C36FF2E 2E0E36FF 2E2E1036 FF2E2E12 36FF2E2E 1436FF2E 0CC48300 54424D9A
36FF2E2E 1C36FF2E 2E1E36FF 2E2E2036 FF2E0CC4 83005442 4D9A2E0A 36FF2E2E
FF2E2E2A 36FF2E2E 2C36FF2E 0CC48300 54424D9A 2E1636FF 2E2E1836 FF2E2E1A
2E2E3836 FF2E0CC4 83005442 4D9A2E22 36FF2E2E 2436FF2E 2E2636FF 2E2E2836
0CC48300 54424D9A 2E2E36FF 2E2E3036 FF2E2E32 36FF2E2E 3436FF2E 2E3636FF
54430B9A 2E3E36FF 2E2E4036 FF2E04C4 83005443 0B9A2E3A 36FF2E2E 3C36FF2E
2E4636FF 2E2E4836 FF2E04C4 83005443 0B9A2E42 36FF2E2E 4436FF2E 04C48300
2E2E5036 FF2E04C4 83005443 0B9A2E4A 36FF2E2E 4C36FF2E 04C48300 54430B9A
FF2E2E58 36FF2E2E 5A36FF2E 2E5C36FF 2E021EE9 04C48300 54430B9A 2E4E36FF
2E2E6636 FF2E2E68 36FF2E0C C4830054 424D9A2E 5236FF2E 2E5436FF 2E2E5636
2DFC36FF 2E0CC483 0054424D 9A2E5E36 FF2E2E60 36FF2E2E 6236FF2E 2E6436FF
C4830054 424D9A2E 6A36FF2E 2E6C36FF 2E2E6E36 FF2E2E70 36FF2E2D FA36FF2E
9A2E7236 FF2E2E74 36FF2E2E 7636FF2E 2E7836FF 2E2E0636 FF2E2E08 36FF2E0C
2E7C36FF 2E2E7E36 FF2E2E80 36FF2E2E 1236FF2E 2E1436FF 2E0CC483 0054424D
8636FF2E 2E8836FF 2E2E8A36 FF2E2E8C 36FF2E0C C4830054 424D9A2E 7A36FF2E
36FF2E2E 9636FF2E 2E9836FF 2E0CC483 0054424D 9A2E8236 FF2E2E84 36FF2E2E
FF2E2EA4 36FF2E0C C4830054 424D9A2E 8E36FF2E 2E9036FF 2E2E9236 FF2E2E94
2E0CC483 0054424D 9A2E9A36 FF2E2E9C 36FF2E2E 9E36FF2E 2EA036FF 2E2EA236
424D9A2E A636FF2E 2EA836FF 2E2EAA36 FF2E2EAC 36FF2E2E AE36FF2E 2EB036FF
FF2E2EB4 36FF2E2E B636FF2E 2EB836FF 2E2EBA36 FF2E2EBC 36FF2E0C C4830054
36FF2E04 C4830054 430B9A2E BE36FF2E 2EC036FF 2E0CC483 0054424D 9A2EB236
C4830054 430B9A2E C636FF2E 2EC836FF 2E04C483 0054430B 9A2EC236 FF2E2EC4
430B9A2E CE36FF2E 2ED036FF 2E04C483 0054430B 9A2ECA36 FF2E2ECC 36FF2E04
D636FF2E 2ED836FF 2E04C483 0054430B 9A2ED236 FF2E2ED4 36FF2E04 C4830054
00033D10 EB04C483 0054430B 9A2EDA36 FF2E2EDC 36FF2E04 C4830054 430B9A2E
0219E905 8B2DA23E C52EEC8B 555756CB 5E5FC9FD E2E90375 00073DFC 97E90375
3A9A2EDE 36FF2E2E E036FF2E 2EE236FF 2E2EE436 FF2E2DFA 36FF2E2D FC36FF2E
2E2EE836 FF2E2EEA 36FF2E2E EC36FF2E 2E0636FF 2E2E0836 FF2E0CC4 83005442
2EF236FF 2E2EF436 FF2E2E12 36FF2E2E 1436FF2E 0CC48300 54423A9A 2EE636FF
FC36FF2E 2E1E36FF 2E2E2036 FF2E0CC4 83005442 3A9A2EEE 36FF2E2E F036FF2E
36FF2E2E 2C36FF2E 0CC48300 54423A9A 2EF636FF 2E2EF836 FF2E2EFA 36FF2E2E
FF2E0CC4 83005442 3A9A2EFE 36FF2E2F 0036FF2E 2F0236FF 2E2F0436 FF2E2E2A
54423A9A 2F0636FF 2E2F0836 FF2E2F0A 36FF2E2F 0C36FF2E 2E3636FF 2E2E3836
2F1036FF 2E2F1236 FF2E2F14 36FF2E2E 5A36FF2E 2E5C36FF 2E0142E9 0CC48300
1A36FF2E 2F1C36FF 2E2DFA36 FF2E2DFC 36FF2E0C C4830054 423A9A2F 0E36FF2E
36FF2E2E 0636FF2E 2E0836FF 2E0CC483 0054423A 9A2F1636 FF2E2F18 36FF2E2F
FF2E2E14 36FF2E0C C4830054 423A9A2F 1E36FF2E 2F2036FF 2E2F2236 FF2E2F24
2E0CC483 0054423A 9A2F2636 FF2E2F28 36FF2E2F 2A36FF2E 2F2C36FF 2E2E1236
423A9A2F 2E36FF2E 2F3036FF 2E2F3236 FF2E2F34 36FF2E2E 8A36FF2E 2E8C36FF
FF2E2F38 36FF2E2F 3A36FF2E 2F3C36FF 2E2EA236 FF2E2EA4 36FF2E0C C4830054
2E2F4236 FF2E2F44 36FF2E2E AE36FF2E 2EB036FF 2E0CC483 0054423A 9A2F3636
2F4C36FF 2E2EBA36 FF2E2EBC 36FF2E0C C4830054 423A9A2F 3E36FF2E 2F4036FF
DFE90375 00033D10 EB0CC483 0054423A 9A2F4636 FF2E2F48 36FF2E2F 4A36FF2E
75003D83 2D623EC5 2EEC8B55 5756CB5E 5FC90054 41EE9AFE BEE90375 00073DFD
832D623E C52E0000 02C85756 CB5E5FC9 02C48300 4429749A 636A0044 232D9A05
2CF036FF 2E04C483 0044D69B 9A2CE636 FF2E2CE8 36FF2E00 54C92C9A 0574003D
2E2CE436 FF2E2CDE 36FF2E2C E036FF2E 00A86804 C483002C E90E9A2C EE36FF2E
FF2E2CEC 36FF2E2C E636FF2E 2CE836FF 2E12F868 0AC48300 5496649A 2CE236FF
F236FF2E 2CF436FF 2E2CEE36 FF2E2CF0 36FF2E6A 6A0AC483 00549664 9A2CEA36
2CFA36FF 2E2CFC36 FF2E2CF6 36FF2E2C F836FF2E 0128680A C4830054 96649A2C
9A2D0236 FF2E2D04 36FF2E2C FE36FF2E 2D0036FF 2E012068 0AC48300 5496649A
649A2D0A 36FF2E2D 0C36FF2E 2D0636FF 2E2D0836 FF2E08C2 680AC483 00549664
1DD99B2D 563EC52E 05D99B2D 523EC52E 05892F4E 3EC52E0A 468B0AC4 83005496
5E5F0054 DE289A21 C1682CD6 36FF2E2C D836FF2E 2CD236FF 2E2CD436 FF2E5756
5E5F0054 DE289A21 C3682CD2 36FF2E2C D436FF2E 35FF0275 FF2CCE3E C52E5756
0054406F 9A005441 EE9A0A75 003D832F 523EC52E 1E750001 3D058B2C D63EC52E
DABA9A68 6A026A50 FE468D16 5075003D 832D663E C52E0044 F15C9A00 3CF66A9A
9A2F5636 FF2E2F58 36FF2E12 74003D80 2D6E3EC5 2E1C7400 FE7E8308 C4830054
9A0AC483 0054D8DC 9A016A01 6A35FF2D 7E3EC52E 50FE468D 1604C483 00544A8A
5E5FC902 C4830044 29749A06 6AEC8B55 5756CB5E 5FC99B00 2CF2979A 00547E70
046A0054 C92C9AEC 8B555756 CB5E5FC9 02C48300 4429749A 096AEC8B 555756CB
001CF8FB 9A002CEB 779A0054 B93D9AEC 8B555756 CB5E5FC9 02C48300 4429749A
3EC52EEC 8B555756 CB5E5FC9 02C48300 54EC2C9A 016A02C4 83004429 749AFF6A

146A0C74 003D832D 623EC52E EC8B5557 56CB5E5F C900442B 8C9A0001 05C72F52
2E9B0000 06C85756 CB5E5FC9 02C48300 4429749A 016A0AEB 02C48300 4429749A
9B05892C DA3EC52E 058B2DAA 3EC52E00 0105C72D AA3EC52E FC5ED99B 2F5A06DD
CB7A9A1D D99B2F62 3EC52E04 55D99B2F 623EC52E 0855D99B 2F623EC5 2EFC46D9
F636FF2E 2CF836FF 2E2CFE36 FF2E2D00 36FF2E00 6A006A00 6A50FA46 8D160044
830054C0 489AFA76 FF006A00 6A006A00 6A157400 FA7E8312 C483003C 7D919A2C
29749A0B 6AEC8B55 5756CB5E 5FC99B04 C4830044 7D669A50 FC468D16 0DEB0AC4
EC8B5557 56CB5E5F C9EC8B55 5756CB5E 5FC9EC8B 555756CB 5E5FC902 C4830044
7DE60014 E2170014 9E940014 C0560014 E21C00CB 5E5FC9EC 8B555756 CB5E5FC9
7CC60014 9F400014 7B9E0014 BEFE0014 7FC40014 AC060014 802E0014 9E980014
9E960014 E21A0014 AA4A0014 93260014 9DE20014 A1880014 95200014 A0680014
C01D0014 7B940014 C0190014 7B960014 ABF20014 7B9A0014 ABEA0014 7B8C0014
C0170014 94FC0014 ABE60014 94F80014 AC000014 7B900014 C01F0014 94C20014
E2200014 E222004C 7C640014 78DA0014 951F0014 7B860014 7B7C0014 7B7A0014
66700014 794F0014 81640014 793D0014 7E8E0014 79280014 78FB0200 01800014
79870014 79740014 79710014 79690014 7BFA0014 9E480014 79610014 9E4A004C
7F3E0014 7F360014 7F2E0024 CBD00014 7BF60024 D53E0014 798D0014 798A0014
79CC0014 9E6A0014 79C80014 79C00014 79AF0024 0BE80014 799D0014 7F460014
9E700014 79EC0014 79E40014 9E6E0014 79E00014 79D80014 9E6C0014 79D40014
7A100014 7A080014 9E740014 7A040014 79FC0014 9E720014 79F80014 79F00014
7A400014 9E7E0014 7A3D0014 7A380014 7A300014 7A280014 7A200014 7A180014
7A5F0014 7A5A0014 7A560014 7A510014 7A4D0014 7A480014 9E800014 7A450014
7A7C0014 7A760014 9E820014 7A730014 7A6F0014 9E840014 7A690014 7A630014
7A9A0014 9E900014 7A940014 7A8E0014 9E8C0014 7A880014 7A820014 9E880014
7AC60014 7AC00014 7ABA0014 7AB40014 7AAE0014 7AA90014 7AA40014 7A9F0014
7AF60014 7AF20014 7AEA0014 7AE60014 7ADE0014 7ADA0014 7AD20014 7ACE0014
7B200014 7B1C0014 7B170014 7B130014 7B0E0014 7B0A0014 7B020014 7AFE0014
7B4A0014 7B440014 7B3E0014 7B380014 7B320014 7B2E0014 7B290014 7B250014
00000000 00000014 7B620014 7B880014 AC040014 7B5C0014 7B560014 7B500014
029A126A 006A50E2 468D1657 56000105 C70A7EC5 000084C8 57560014 7E0A4014
36FF2E44 FC36FF2E 5E5F0074 00029A66 6A006A50 FF7C868D 1657565E 5F007400
5448E69A 0F6A50D3 468D160C FF7E86C6 08C48300 54EE309A 50FF7F86 8D1644FA
006A006A 006A1D75 00D27E80 D2468804 C4830054 EEEA9A50 D3468D16 06C48300
C7FE4689 00541A48 9A0145E9 000205C7 0A7EC50A C4830054 C0489A11 2A68006A
6A0000FC 46C7E800 FA46C7F9 46880000 B8F84688 0003B800 1FF646C7 0001F446
50E2468D 1650520C C4830054 1E239A50 FF7C868D 1650D046 8D1650F4 468D1612
FF2E4502 36FF2E45 0436FF2E 50D3468D 16767510 47F07E81 0AC48300 5496649A
0768016A 016A44FE 36FF2E45 0036FF2E 0CC48300 544ACA9A 44FE36FF 2E450036
868D1650 D0468D16 50F4468D 16126A2B 7500013D FE46890A C4830054 C0489A20
C70A7EC5 09EB0AC4 83005496 649A50E2 468D1650 520CC483 00541F07 9A50FF7C
C0489AF0 76FF006A 006A006A 006A1374 1047F07E 81237400 F07E8377 EB000205
75FF4506 3EC52E3A 6A040068 E276FFE4 76FF4EEB 000205C7 0A7EC50A C4830054
C0489AFE 76FF036A 006A006A 006A1874 C00BFE46 890CC483 0054CF01 9A35FF02
CB5E5FC9 00541D15 9A04C483 00541F53 9A50E246 8D160044 2B8C9A0A C4830054
2E451036 FF2E4512 36FF2E45 1436FF2E 5375003D 83450A3E C52E0000 BAC85756
7475C20B FE5689FC 468908C4 83005499 729A5052 04C48300 547FAA9A 450E36FF
442B8C9A 04C48300 544A8A9A 451A36FF 2E451C36 FF2E1274 003D8045 163EC52E
5204C483 00547FAA 9A451E36 FF2E4520 36FF2E45 2236FF2E 452436FF 2E51EB00
36FF2E12 74003D80 45163EC5 2E2175C2 0BFE5689 FC468908 C4830054 99729A50
2E3A6A04 0068FC76 FFFE76FF 00442B8C 9A04C483 00544A8A 9A452636 FF2E4528
006A006A 006A006A 1874C00B FA46890C C4830054 CF019A35 FF0275FF 45063EC5
2E452C36 FF2E066A 016AFC76 FFFE76FF 00442B8C 9A0AC483 0054C048 9AFA76FF
489AFA76 FF006A00 6A006A00 6A1874C0 0BFA4689 0CC48300 54CF019A 452A36FF
9A452E36 FF2E4530 36FF2E06 6A016AFC 76FFFE76 FF00442B 8C9A0AC4 830054C0
C4830054 C0489AFA 76FF006A 006A006A 006A1874 C00BFA46 890CC483 0054CF01
FA46890C C4830054 CF019A50 F6468D16 046A016A FC76FFFE 76FF0044 2B8C9A0A
FFFE76FF 00442B8C 9A0AC483 0054C048 9AFA76FF 006A006A 006A006A 1874C00B
6A1874C0 0BFA4689 0CC48300 54CF019A 453236FF 2E453436 FF2E026A 016AFC76
163D058B 45323EC5 2E00442B 8C9A0AC4 830054C0 489AFA76 FF036A00 6A006A00
45323EC5 2E0C7400 183D058B 45323EC5 2E187400 153D058B 45323EC5 2E247400
0054CF01 9A453636 FF2E4538 36FF2E06 6A016AFC 76FFFE76 FF767500 173D058B
2B8C9A0A C4830054 C0489AFA 76FF036A 006A006A 006A1874 C00BFA46 890CC483
46890CC4 830054CF 019A453A 36FF2E45 3C36FF2E 066A016A FC76FFFE 76FF0044
3EC52E00 442B8C9A 0AC48300 54C0489A FA76FF03 6A006A00 6A006A18 74C00BFA 60026801 6AFC76FF FE76FF3C 7500183D 058B4532 3EC52E0C 7400163D 058B4532
6A006A00 6A006A18 74C00BFA 46890CC4 830054CF 019A35FF 0275FF45 3E3EC52E
FF46868D 16477500 3D834542 3EC52E00 442B8C9A 0AC48300 54C0489A FA76FF03
C4830054 CF019A50 FF55868D 160F6A01 6AFC76FF FE76FF04 C483002C FBB89A50
00442B8C 9A0AC483 0054C048 9AFA76FF 006A006A 006A006A 5574C00B FA46890C
46890CC4 830054CF 019A4546 36FF2E45 4836FF2E 0F6A016A FC76FFFE 76FF3BEB
FE76FF00 442B8C9A 0AC48300 54C0489A FA76FF00 6A006A00 6A006A18 74C00BFA
8D165756 000105C7 0A7EC500 1434C857 56CB5E5F C904C483 00549C3C 9AFC76FF
5E5F0074 00029A66 6A006A50 86468D16 57565E5F 00740002 9A126A00 6A50EC46
0A75C00B 0AC48300 54A9DA9A 5086468D 1650DA46 8D160E6A FE468900 541A489A
541E6F9A 5086468D 1650DA46 8D165000 01B8246A 126A0228 E9000105 C70A7EC5
6A006A00 6A006A1D 7400FA7E 830AC483 00549664 9A50EC46 8D165052 0CC48300
C068016A EC76FFEE 76FF01DC E9000205 C70A7EC5 0AC48300 54C0489A FA76FF00
76FF036A 006A006A 006A1874 C00BFE46 890CC483 0054CE7E 9A50EC8E 868D1600
7D04EBCC BE83EBCC 86FF04EB 0000EBCC 86C70044 2B8C9A0A C4830054 C0489AFE
D685891F 16FD03E7 D1EBCCBE 8B058B45 4C1E8E2E 454A3E03 2EE7D1EB CCBE8B42
CE85891F 16FD03E7 D1EBCCBE 8B058B45 501E8E2E 454E3E03 2EE7D1EB CCBE8BEB
C75E5F00 54DE289A 00C06850 EC8E868D 16455236 FF2E4554 36FF2E57 56B3EBEB
EBD6858B 1F16FD03 E7D1EBCC BE8B427D 04EBCCBE 83EBCC86 FF04EB00 00EBCC86
EBCE858B 1F16FD03 E7D1EBCC BE8B0589 454C1E8E 2E454A3E 032EE7D1 EBCCBE8B
EBCC86FF 04EB0000 EBCC86C7 B3EB0589 45501E8E 2E454E3E 032EE7D1 EBCCBE8B
C1EBCCBE 8BFFFF05 C745581E 8E2E4556 3E032EE7 D1EBCCBE 8B7D7D04 EBCCBE83
EBCCBE8B 147D03EB CCBE831D D99B455E 06DD2E9B 455C1E8E 2E455A3E 032E02E7
6C1E8E2E 456A3E03 2E02E7C1 EBCCBE8B FFFF05C7 45681E8E 2E45663E 032EE7D1
D99BEED9 9B45721E 8E2E4570 3E032E02 E7C1EBCC BE8B1DD9 9B456E06 DF2E9B45
6A50DD46 8D1650EB FC868D16 575604C4 83002CFB B89A50EB DE868D16 FF78E91D
00548D68 9A0054B7 AA9A04C4 83002CFB F19A50EB DE868D16 5E5F0054 DE289A0F
0A7EC500 1428C857 56CB5E5F C99B0054 1D159A04 C4830054 1F539A50 EC468D16
6A006A50 86468D16 57565E5F 00740002 9A126A00 6A50EC46 8D165756 000105C7
54A9DA9A 5086468D 1650DA46 8D16076A FE468900 541A489A 5E5F0074 00029A66
1650DA46 8D165000 01B81F6A 126A04AC E9000105 C70A7EC5 0A75C00B 0AC48300
7400FA7E 830AC483 00549664 9A50EC46 8D165052 0CC48300 541E6F9A 5086468D
909A0460 E9000205 C70A7EC5 0AC48300 54C0489A FA76FF00 6A006A00 6A006A1D
0CC48300 54CE7E9A 35FF0275 FF45743E C52E3A6A 040068EC 76FFEE76 FF0054E4
FF00442B 8C9A0AC4 830054C0 489AFE76 FF036A00 6A006A00 6A1874C0 0BFE4689
C00BFE46 890CC483 0054CE7E 9A452A36 FF2E452C 36FF2E06 6A016AEC 76FFEE76
EC76FFEE 76FF0044 2B8C9A0A C4830054 C0489AFE 76FF036A 006A006A 006A1874
6A006A18 74C00BFE 46890CC4 830054CE 7E9A452E 36FF2E45 3036FF2E 066A016A
16046A01 6AEC76FF EE76FF00 442B8C9A 0AC48300 54C0489A FE76FF03 6A006A00
9AFE76FF 036A006A 006A006A 1874C00B FE46890C C4830054 CE7E9A50 EBDA868D
CE7E9A50 EBDE868D 1600C068 016AEC76 FFEE76FF 00442B8C 9A0AC483 0054C048
9A0AC483 0054C048 9AFE76FF 036A006A 006A006A 1874C00B FE46890C C4830054
3236FF2E 453436FF 2E026A01 6AEC76FF EE76FF00 1405C745 323EC52E 00442B8C
0054C048 9AFE76FF 036A006A 006A006A 1874C00B FE46890C C4830054 CE7E9A45
097E0018 3D058B45 323EC52E 0C7C0014 3D058B45 323EC52E 00442B8C 9A0AC483
8300544A 8A9A4578 36FF2E45 7A36FF2E 35FF4532 3EC52E00 1405C745 323EC52E
8B45323E C52E1874 00153D05 8B45323E C52E2474 00163D05 8B45323E C52E06C4
3836FF2E 066A016A EC76FFEE 76FF7675 00173D05 8B45323E C52E0C74 00183D05
FE76FF03 6A006A00 6A006A18 74C00BFE 46890CC4 830054CE 7E9A4536 36FF2E45
3A36FF2E 453C36FF 2E066A01 6AEC76FF EE76FF00 442B8C9A 0AC48300 54C0489A
0054C048 9AFE76FF 036A006A 006A006A 1874C00B FE46890C C4830054 CE7E9A45
3C750018 3D058B45 323EC52E 0C740016 3D058B45 323EC52E 00442B8C 9A0AC483
FE46890C C4830054 CE7E9A35 FF0275FF 453E3EC5 2E600268 016AEC76 FFEE76FF
FF2E5756 00442B8C 9A0AC483 0054C048 9AFE76FF 036A006A 006A006A 1874C00B
04EB0000 EBD886C7 5E5F0054 DE289A00 C06850EB DE868D16 455236FF 2E455436
8BFFFF05 C745581E 8E2E4556 3E032EE7 D1EBD8BE 8B7D7D04 EBD8BE83 EBD886FF
147D03EB D8BE831D D99B455E 06DD2E9B 455C1E8E 2E455A3E 032E02E7 C1EBD8BE
456A3E03 2E02E7C1 EBD8BE8B FFFF05C7 45681E8E 2E45663E 032EE7D1 EBD8BE8B
9B45721E 8E2E4570 3E032E02 E7C1EBD8 BE8B1DD9 9B456E06 DF2E9B45 6C1E8E2E
FF45743E C52E04C4 83003C7C D49A35FF 0275FF45 743EC52E FF78E91D D99BEED9
C52E04C4 830054A5 1D9A35FF 0275FF45 743EC52E 04C48300 54A4FC9A 35FF0275
830054A4 509A35FF 0275FF45 063EC52E 04C48300 3C7C959A 35FF0275 FF45743E
9A0F6A50 DD468D16 50FEE586 8D165756 04C48300 2CFBB89A 50FED686 8D1604C4
5F0054DE 289A0F6A 457C36FF 2E457E36 FF2E50FE F4868D16 57565E5F 0054DE28

8D162F74 003D8345 0A3EC52E 0054B7AA 9A04C483 002CFBF1 9A50FED6 868D165E
868D1645 8036FF2E 458236FF 2E35FF45 843EC52E 04C48300 2CFBB89A 50FED686
9A2F6A50 FEE5868D 16107E00 3D834588 3EC52E0C C483002C 79689A01 6A50FEE5
C99B0054 1D159A04 C4830054 1F539A50 EC468D16 00548F36 9A06C483 002CFC9C
00740002 9A126A00 6A50E246 8D165756 000105C7 0A7EC500 137CC857 56CB5E5F
16458C36 FF2E458E 36FF2E5E 5F007400 029A666A 006A50FF 7C868D16 57565E5F
C4830054 48E69A0F 6A50D346 8D160CFF 7E86C608 C4830054 EE309A50 FF7F868D
68006A00 6A006A00 6A1D7500 D27E80D2 468804C4 830054EE EA9A50D3 468D1606
01F446C7 FE468900 541A489A 015EE900 0205C70A 7EC50AC4 830054C0 489A112A
8D16126A 0000FC46 C700C0FA 46C7F946 880000B8 F8468800 03B80024 F646C700
96649A50 E2468D16 50520CC4 8300541E 239A50FF 7C868D16 50D0468D 1650F446
450036FF 2E459036 FF2E4592 36FF2E50 D3468D16 77751047 F07E810A C4830054
489A2007 68016A01 6A44FE36 FF2E4500 36FF2E0C C4830054 4ACA9A44 FE36FF2E
50FF7C86 8D1650D0 468D1650 F4468D16 126A2B75 00013DFE 46890AC4 830054C0
000205C7 0A7EC50A EB0AC483 00549664 9A50E246 8D165052 0CC48300 541F079A
0054C048 9AF076FF 006A006A 006A006A 13741047 F07E8123 7400F07E 83008FE9
C0684552 36FF2E45 5436FF2E 50EC8486 8D165756 66EB0002 05C70A7E C50AC483
C4830054 CF019A50 EC84868D 1600C068 016AE276 FFE476FF 5E5F0054 DE289A00
00442B8C 9A0AC483 0054C048 9AFE76FF 036A006A 006A006A 1874C00B FE46890C
C70A7EC5 001380C8 5756CB5E 5FC90054 1D159A04 C4830054 1F539A50 E2468D16
6A006A50 FF7C868D 1657565E 5F007400 029A126A 006A50E2 468D1657 56000105
08C48300 54EE309A 50FF7F86 8D164594 36FF2E45 9636FF2E 5E5F0074 00029A66
C4830054 EEEA9A50 D3468D16 06C48300 5448E69A 0F6A50D3 468D160C FF7E86C6
E9037500 D27E8000 0005C745 423EC52E 37750001 3D058B45 983EC52E D2468804
423EC52E 5E5F0054 DE289A0F 6A50D346 8D164546 36FF2E45 4836FF2E 57560440
0AC48300 54C0489A 112A6800 6A006A00 6A006A1D 7500D27E 8023EB00 0105C745
880003B8 001FF646 C70001F4 46C7FE46 8900541A 489A03F8 E9000205 C70A7EC5
FA46C757 EB0000FC 46C7E8FE FA46C748 EB058B45 323EC52E F9468800 00B8F846
EB0000FC 46C7E8D0 FA46C73F EB0000FC 46C7E8DC FA46C74B EB0001FC 46C748DE
7700043D 00142D1B EB0000FC 46C7E8D0 FA46C727 EB0001FC 46C748DE FA46C733
50D0468D 1650F446 8D16126A 3F613F31 3F3D3F49 3F553F8A A7FF2ED8 8BE0D1EC
F07E810A C4830054 96649A50 E2468D16 50520CC4 8300541E 239A50FF 7C868D16
4ACA9A44 FE36FF2E 450036FF 2E459C36 FF2E459E 36FF2E50 D3468D16 77751047
46890AC4 830054C0 489A2007 68016A01 6A44FE36 FF2E4500 36FF2E0C C4830054
0CC48300 541F079A 50FF7C86 8D1650D0 468D1650 F4468D16 126A2B75 00013DFE
7400F07E 8302C7E9 000205C7 0A7EC50A EB0AC483 00549664 9A50E246 8D165052
05C70A7E C50AC483 0054C048 9AF076FF 006A006A 006A006A 13741047 F07E8124
5F0054DE 289A00C0 68455236 FF2E4554 36FF2E50 EC84868D 16575602 9DE90002
46890CC4 830054CF 019A35FF 0275FF45 063EC52E 3A6A0400 68E276FF E476FF5E
E476FF00 442B8C9A 0AC48300 54C0489A FE76FF03 6A006A00 6A006A18 74C00BFE
1874C00B FE46890C C4830054 CF019A45 2A36FF2E 452C36FF 2E066A01 6AE276FF
016AE276 FFE476FF 00442B8C 9A0AC483 0054C048 9AFE76FF 036A006A 006A006A
6A006A00 6A1874C0 0BFE4689 0CC48300 54CF019A 452E36FF 2E453036 FF2E066A
868D1604 6A016AE2 76FFE476 FF00442B 8C9A0AC4 830054C0 489AFE76 FF036A00
C0489AFE 76FF036A 006A006A 006A1874 C00BFE46 890CC483 0054CF01 9A50EC80
0054CF01 9A50EC84 868D1600 C068016A E276FFE4 76FF0044 2B8C9A0A C4830054
2B8C9A0A C4830054 C0489AFE 76FF036A 006A006A 006A1874 C00BFE46 890CC483
46890CC4 830054CF 019A4532 36FF2E45 3436FF2E 026A016A E276FFE4 76FF0044
3EC52E00 442B8C9A 0AC48300 54C0489A FE76FF03 6A006A00 6A006A18 74C00BFE
00163D05 8B45323E C52E06C4 8300544A 8A9A45A0 36FF2E45 A236FF2E 35FF4532
8B45323E C52E0C74 00183D05 8B45323E C52E1874 00153D05 8B45323E C52E2474
830054CF 019A4536 36FF2E45 3836FF2E 066A016A E276FFE4 76FF7675 00173D05
442B8C9A 0AC48300 54C0489A FE76FF03 6A006A00 6A006A18 74C00BFE 46890CC4
FE46890C C4830054 CF019A45 3A36FF2E 453C36FF 2E066A01 6AE276FF E476FF00
323EC52E 00442B8C 9A0AC483 0054C048 9AFE76FF 036A006A 006A006A 1874C00B
2E600268 016AE276 FFE476FF 3C750018 3D058B45 323EC52E 0C740016 3D058B45
036A006A 006A006A 1874C00B FE46890C C4830054 CF019A35 FF0275FF 453E3EC5
1D159A04 C4830054 1F539A50 E2468D16 00442B8C 9A0AC483 0054C048 9AFE76FF
45A836FF 2E45AA36 FF2E6974 003D8345 0A3EC52E 0013AEC8 5756CB5E 5FC90054
89FC4689 08C48300 5499729A 505204C4 8300547F AA9A45A4 36FF2E45 A636FF2E
4A8A9A45 AC36FF2E 45AE36FF 2E127400 3D804516 3EC52E00 9AE90374 C20BFE56
2E64EB00 442B8C9A 0AC48300 54C0489A 103C6803 6A006A00 6A006A04 C4830054
99729A50 5204C483 00547FAA 9A45B036 FF2E45B2 36FF2E45 B436FF2E 45B636FF
FF2E45BA 36FF2E12 74003D80 45163EC5 2E3475C2 0BFE5689 FC468908 C4830054

8C9A0AC4 830054C0 489A103C 68036A00 6A006A00 6A04C483 00544A8A 9A45B836
FF5E5F00 54DE289A 00C06845 5236FF2E 455436FF 2E50ED04 868D1657 5600442B
3574C00B EC528689 0CC48300 54CF019A 50ED0486 8D1600C0 68016AFC 76FFFE76
006A006A 04C48300 544A8A9A 45BC36FF 2E45BE36 FF2E1274 003D8045 163EC52E
16637500 3D834542 3EC52E00 442B8C9A 0AC48300 54C0489A EC52B6FF 036A006A
CF019A50 EC72868D 160F6A01 6AFC76FF FE76FF04 C483002C FBB89A50 EC54868D
C036FF2E 45C236FF 2E127400 3D804516 3EC52E35 74C00BEC 5286890C C4830054
2B8C9A0A C4830054 C0489AEC 52B6FF03 6A006A00 6A006A04 C4830054 4A8A9A45
9A0A76FF 0C76FFEC 8B555756 CB5E5FC9 04C48300 549C3C9A FC76FFFE 76FF0044
790E004C 776ECB5E 5FC90054 B7AA9A05 7500013D 058B0A7E C504C483 002CF80D
77AE004C 778B0014 951F004C 7789004C 777F0014 7BF60014 7B8C004C 777B004C
7B96004C 7928004C 79220014 7B940014 7DFE0014 7E04004C 77BB004C 77B9004C
00000014 7F7E0014 7F6E0014 7E8E0014 7F3E0014 7F2E004C 8798004C 87A80014
004C78FE 004C77DE 00147B90 00147F5E 00FF0014 7F4E0014 7F8E4014 00000000
004C7818 004C877A 004C780B 004C7807 004C77FA 00147B86 00147DDC 00147DE6
004C7898 004C7876 004C7874 004C786B 004C7846 004C7844 004C7838 004C781C
0C6A5AB6 36FF2E5A B836FF2E 147E003D 835AB23E C52E0000 06C85756 004C78C9
C705895A BA3EC52E FA468B04 C4830054 64499A50 FA468D16 06C48300 2CFC9C9A
058B5AC4 1E8E2E5A C23E032E E7D1FE7E 8B6C7D03 FE7E83FE 46FF03EB 0000FE46
5AB81E8E 2E5AB63E 032EE7D1 FE7E8B05 895AC01E 8E2E5ABE 3E032EE7 D1FE7E8B
1E8E2E5A CA3E032E E7D1FE7E 8B05895A C81E8E2E 5AC63E03 2EE7D1FE 7E8B058B
6000FC46 C78BEB00 0005C75A D01E8E2E 5ACE3E03 2EE7D1FE 7E8B0000 05C75ACC
5AD63EC5 2E3575C2 0B025589 05895AD2 3EC52E04 C4830054 DC339A01 6AFC76FF
2E5AE036 FF2E06C4 8300544A 8A9A5ADA 36FF2E5A DC36FF2E FC76FF15 74003D80
E23EC52E 35FF0275 FF5AD23E C52E5756 04C48300 549BD59A 50001205 5ADE068B
F836FF2E 3E750001 3D058B5A E63EC52E 5E5F0054 DE289AFC 76FF35FF 0275FF5A
EA3EC52E 0054968F 9A05D99B 5AEE3EC5 2E006A35 FF5AF23E C52E5AF6 36FF2E5A
2E004482 829AFFFF 05C75AE6 3EC52E18 C4830044 8D319A00 54968F9A 05D99B5A
C4830044 498D9A35 FF5AFE3E C52EEC8B 555756CB 5E5FC99B 000105C7 5AFA3EC5
555756CB 5E5FC902 C4830044 498D9A35 FF5B023E C52EEC8B 555756CB 5E5FC902
FF5B0A3E C52EEC8B 555756CB 5E5FC902 C4830044 498D9A35 FF5B063E C52EEC8B
C4830044 4B3B9A35 FF5AFE3E C52EEC8B 555756CB 5E5FC902 C4830044 498D9A35
555756CB 5E5FC902 C4830044 4B3B9A35 FF5B023E C52EEC8B 555756CB 5E5FC902
FF5B0A3E C52EEC8B 555756CB 5E5FC902 C4830044 4B3B9A35 FF5B063E C52EEC8B
C4830044 4D019A35 FF5AFE3E C52EEC8B 555756CB 5E5FC902 C4830044 4B3B9A35
555756CB 5E5FC902 C4830044 4D019A35 FF5B023E C52EEC8B 555756CB 5E5FC902
FF5B0A3E C52EEC8B 555756CB 5E5FC902 C4830044 4D019A35 FF5B063E C52EEC8B
C4830044 4EC79A35 FF5AFE3E C52EEC8B 555756CB 5E5FC902 C4830044 4D019A35
555756CB 5E5FC902 C4830044 4EC79A35 FF5B023E C52EEC8B 555756CB 5E5FC902
FF5B0A3E C52EEC8B 555756CB 5E5FC902 C4830044 4EC79A35 FF5B063E C52EEC8B
C4830044 500A9A35 FF5AFE3E C52EEC8B 555756CB 5E5FC902 C4830044 4EC79A35
555756CB 5E5FC902 C4830044 500A9A35 FF5B023E C52EEC8B 555756CB 5E5FC902
FF5B0A3E C52EEC8B 555756CB 5E5FC902 C4830044 500A9A35 FF5B063E C52EEC8B
C4830044 51479A35 FF5AFE3E C52EEC8B 555756CB 5E5FC902 C4830044 500A9A35
555756CB 5E5FC902 C4830044 51479A35 FF5B023E C52EEC8B 555756CB 5E5FC902
FF5B0A3E C52EEC8B 555756CB 5E5FC902 C4830044 51479A35 FF5B063E C52EEC8B
3EC52E1A 75003D83 5B0E3EC5 2E000004 C85756CB 5E5FC902 C4830044 51479A35
C52E0A46 89FF0A46 6B1FEB00 02FE46C7 26EB0001 FE46C707 7500023D 058B5B12
2E00A2E9 037401FE 7E830001 FE46C705 EB0002FE 46C70775 00023D05 8B5B123E
C52E0C74 043B2605 8B5ACA3E C52E5ACE 36C42E1D 750A463B D8F7058B 5ACA3EC5
895ACA3E C52E0A46 8BFC4689 05030A46 8B5AC23E C52E0A46 89D8F705 8B5ACE3E
3EC52E24 EB0A4689 052B0FFF B85AC23E C52E337E 0FFFFC7E 81167E00 0A7E8305
4689042B 26001405 058B5AB6 3EC52E5A C236C42E 157EFC46 3B001405 058B5AB6
A6E90589 5ACE3EC5 2E0A468B 05015AC2 3EC52E0A 468B00BD E9037500 0A7E830A
5ACE36C4 2E1D750A 463BD8F7 058B5ACA 3EC52E0A 46895B16 3EF72E99 0A468B00
0A468B5A B63EC52E 0A4689D8 F7058B5A CE3EC52E 0C74043B 26058B5A CA3EC52E
5AB63EC5 2E327D00 FC7E8314 7D000A7E 8305895A CA3EC52E 0A468BFC 46890503
3EC52E5A B636C42E 157DFC46 3B00142D 058B5AC2 3EC52E24 EB0A4689 052BC02B
0A468B05 015AB63E C52E0A46 8B147400 0A7E830A 4689042B 2600142D 058B5AC2
0004C857 56CB5E5F C902C483 004455C5 9A006A0A 74000A7E 8305895A CE3EC52E
46C726EB 0001FE46 C7077500 023D058B 5B123EC5 2E1A7500 3D835B0E 3EC52E00
C705EB00 02FE46C7 07750002 3D058B5B 123EC52E 0A4689FF 0A466B1F EB0002FE
CE36C42E 20750A46 3BD8F702 458B5ACA 3EC52E00 AEE90374 01FE7E83 0001FE46
C23EC52E 0A4689D8 F702458B 5ACE3EC5 2E0D7402 443B2602 458B5ACA 3EC52E5A

0FFFFC7E 81177E00 0A7E8302 45895ACA 3EC52E0A 468BFC46 89024503 0A468B5A
FC463B00 14050245 8B5AB63E C52E27EB 0A468902 452B0FFF B85AC23E C52E377E
E9037500 0A7E830A 46890244 2B260014 0502458B 5AB63EC5 2E5AC236 C42E177E
2E990A46 8B00B2E9 0245895A CE3EC52E 0A468B02 45015AC2 3EC52E0A 468B00CB
5ACA3EC5 2E5ACE36 C42E2075 0A463BD8 F702458B 5ACA3EC5 2E0A4689 5B163EF7
45030A46 8B5AB63E C52E0A46 89D8F702 458B5ACE 3EC52E0D 7402443B 2602458B
5AB63EC5 2E367D00 FC7E8315 7D000A7E 83024589 5ACA3EC5 2E0A468B FC468902
2E5AB636 C42E177D FC463B00 142D0245 8B5AC23E C52E27EB 0A468902 452BC02B
015AB63E C52E0A46 8B167400 0A7E830A 46890244 2B260014 2D02458B 5AC23EC5
5E5FC902 C4830044 55C59A01 6A0A7400 0A7E8302 45895ACE 3EC52E0A 468B0245
FE46C707 7500023D 058B5B12 3EC52E1A 75003D83 5B0E3EC5 2E000004 C85756CB
46C70775 00023D05 8B5B123E C52E0A46 89FF0A46 6B1FEB00 02FE46C7 26EB0001
0A463BD8 F704458B 5ACA3EC5 2E00AEE9 037401FE 7E830001 FE46C705 EB0002FE
89D8F704 458B5ACE 3EC52E0D 7404443B 2604458B 5ACA3EC5 2E5ACE36 C42E2075
7E000A7E 83044589 5ACA3EC5 2E0A468B FC468904 45030A46 8B5AC23E C52E0A46
04458B5A B63EC52E 27EB0A46 8904452B 0FFFB85A C23EC52E 377E0FFF FC7E8117
830A4689 04442B26 00140504 458B5AB6 3EC52E5A C236C42E 177EFC46 3B001405
B2E90445 895ACE3E C52E0A46 8B044501 5AC23EC5 2E0A468B 00CBE903 75000A7E
CE36C42E 20750A46 3BD8F704 458B5ACA 3EC52E0A 46895B16 3EF72E99 0A468B00
B63EC52E 0A4689D8 F704458B 5ACE3EC5 2E0D7404 443B2604 458B5ACA 3EC52E5A
7D00FC7E 83157D00 0A7E8304 45895ACA 3EC52E0A 468BFC46 89044503 0A468B5A
177DFC46 3B00142D 04458B5A C23EC52E 27EB0A46 8904452B C02B5AB6 3EC52E36
0A468B16 74000A7E 830A4689 04442B26 00142D04 458B5AC2 3EC52E5A B636C42E
004455C5 9A026A0A 74000A7E 83044589 5ACE3EC5 2E0A468B 0445015A B63EC52E
023D058B 5B123EC5 2E1A7500 3D835B0E 3EC52E00 0006C857 56CB5E5F C902C483
3D058B5B 123EC52E 0A4689FF 0A466B1F EB0002FE 46C726EB 0001FE46 C7077500
45030A46 8B5AC23E C52E7475 01FE7E83 0001FE46 C705EB00 02FE46C7 07750002
E9037E0F FFFC7E81 147E000A 7E83FA46 89044503 0A468B5A C23EC52E FC468902
2E00A7E9 037EFC46 3B001405 02458B5A B63EC52E 00BAE929 7E0FFFFA 7E8100C4
FA468B02 45895AC2 3EC52EFC 468B0094 E9037EFA 463B0014 0504458B 5AB63EC5
45030A46 8B5AB63E C52E0A46 895B163E F72E990A 468B72EB 0445895A C23EC52E
7E83487C 00FC7E83 0E7D000A 7E83FA46 89044503 0A468B5A B63EC52E FC468902
142D0445 8B5AC23E C52E307C FC463B00 142D0245 8B5AC23E C52E40EB 227D00FA
C59A056A 0445895A B63EC52E FA468B02 45895AB6 3EC52EFC 468B207C FA463B00
8B5B123E C52E1A75 003D835B 0E3EC52E 000006C8 5756CB5E 5FC902C4 83004455
5B123EC5 2E0A4689 FF0A466B 1FEB0002 FE46C726 EB0001FE 46C70775 00023D05
468B5AC2 3EC52E71 7501FE7E 830001FE 46C705EB 0002FE46 C7077500 023D058B
7E0FFFFC 7E81147E 000A7E83 FA468904 45030A46 8B5AC23E C52EFC46 8905030A
00A3E903 7EFC463B 00140505 8B5AB63E C52E00B5 E9287E0F FFFA7E81 00BFE903
FA468B05 895AC23E C52EFC46 8B0090E9 037EFA46 3B001405 04458B5A B63EC52E
05030A46 8B5AB63E C52E0A46 895B163E F72E990A 468B6FEB 0445895A C23EC52E
FA7E8346 7C00FC7E 830E7D00 0A7E83FA 46890445 030A468B 5AB63EC5 2EFC4689
3B00142D 04458B5A C23EC52E 2F7CFC46 3B00142D 058B5AC2 3EC52E3E EB217D00
004455C5 9A046A04 45895AB6 3EC52EFA 468B0589 5AB63EC5 2EFC468B 1F7CFA46
023D058B 5B123EC5 2E1A7500 3D835B0E 3EC52E00 0006C857 56CB5E5F C902C483
3D058B5B 123EC52E 0A4689FF 0A466B1F EB0002FE 46C726EB 0001FE46 C7077500
05030A46 8B5AC23E C52E7175 01FE7E83 0001FE46 C705EB00 02FE46C7 07750002
BFE9037E 0FFFFC7E 81147E00 0A7E83FA 46890245 030A468B 5AC23EC5 2EFC4689
3EC52E00 A3E9037E FC463B00 1405058B 5AB63EC5 2E00B5E9 287E0FFF FA7E8100
3EC52EFA 468B0589 5AC23EC5 2EFC468B 0090E903 7EFA463B 00140502 458B5AB6
FC468905 030A468B 5AB63EC5 2E0A4689 5B163EF7 2E990A46 8B6FEB02 45895AC2
217D00FA 7E83467C 00FC7E83 0E7D000A 7E83FA46 89024503 0A468B5A B63EC52E
7CFA463B 00142D02 458B5AC2 3EC52E2F 7CFC463B 00142D05 8B5AC23E C52E3EEB
02C48300 4455C59A 036A0245 895AB63E C52EFA46 8B05895A B63EC52E FC468B1F
8B555756 CB5E5FC9 02C48300 4452E49A 35FF5AFE 3EC52EEC 8B555756 CB5E5FC9
35FF5B06 3EC52EEC 8B555756 CB5E5FC9 02C48300 4452E49A 35FF5B02 3EC52EEC
02C48300 4452E49A 35FF5B0A 3EC52EEC 8B555756 CB5E5FC9 02C48300 4452E49A
07750002 3D058B5B 123EC52E 1A75003D 835B0E3E C52E0000 BAC85756 CB5E5FC9
7500023D 058B5B12 3EC52E0A 4689FF0A 466B1FEB 0002FC46 C726EB00 01FC46C7
FE46FF03 EB0000FE 46C700C5 E9037401 FC7E8300 01FC46C7 05EB0002 FC46C707
468B5AC4 068E2E5A C236032E E6D1FE76 8B1F16FD 03E7D1FE 7E8B237D 03FE7E83
8B4A7D03 FE7E83FE 46FF03EB 0000FE46 C7247E00 0A7E83D4 EBF64589 0403260A
FE7E83FE 46FF03EB 0000FE46 C701B4E9 E67E0FFF 3DF6458B 1F16FD03 E7D1FE7E
00140505 8B5AB81E 8E2E5AB6 3E032EE7 D1FE7E8B 0716F503 E6D1FE76 8B267D03

D1FE7E8B 00EBE903 7C03FE7E 83FE46FF 03EB0000 FE46C701 7EE9D47E F6443B26
2E990A46 8BD5EB05 895AC41E 8E2E5AC2 3E032EE7 D1FE7E8B F6458B1F 16FD03E7
1F16FD03 E7D1FE7E 8B237D03 FE7E83FE 46FF03EB 0000FE46 C70A4689 5B163EF7
227D000A 7E83D4EB F6458904 03260A46 8B5AB806 8E2E5AB6 36032EE6 D1FE768B
E9E87D00 F67D831F 16FD03E7 D1FE7E8B 487D03FE 7E83FE46 FF03EB00 00FE46C7
E7D1FE7E 8B0716F5 03E6D1FE 768B267D 03FE7E83 FE46FF03 EB0000FE 46C700E5
FF03EB00 00FE46C7 00AFE9D4 7DF6443B 2600142D 058B5AC4 1E8E2E5A C23E032E
8E2E5AB6 3E032EE7 D1FE7E8B F6458B1F 16FD03E7 D1FE7E8B 1F7D03FE 7E83FE46
868D1631 7500023D 058B5B12 3EC52E6C 74003D83 5B0E3EC5 2ED8EB05 895AB81E
55868D16 5AB636FF 2E5AB836 FF2E35FF 5B183EC5 2E04C483 002CFBB8 9A50FF46
183EC52E 04C48300 2CFBB89A 50FF4686 8D162FEB 0CC48300 2C79689A 026A50FF
9A066A0C C483002C 79689A03 6A50FF55 868D165A B636FF2E 5AB836FF 2E35FF5B
5AB836FF 2E147E00 3D835AB2 3EC52E00 0002C857 56CB5E5F C902C483 004455C5
C4830054 DC759A35 FF0275FF 5AD23EC5 2E06C483 002CFC9C 9A0E6A5A B636FF2E
0E3EC52E 000005C7 5AE63EC5 2E000105 C75B1C3E C52E0000 05C75AFA 3EC52E04
3434459A 0574C00B 04C48300 5458139A 50FE468D 16002CE9 999A0575 003D835B
2E016A0A 76FF50FE 468D1641 75003D83 5B0E3EC5 2E00000E C85756CB 5E5FC900
7400FE7E 8310C483 0034A150 9A5AB636 FF2E5AB8 36FF2E35 FF0275FF 5AE23EC5
468D16FF 6A50F246 8D1648EB 0AC48300 54C0489A FE76FF00 6A006A00 6A006A5D
921A9A35 FF0275FF 5AE23EC5 2E5AB636 FF2E5AB8 36FF2E50 FE468D16 FF6A50F8
036A0AC4 830054C0 489AFE76 FF006A00 6A006A00 6A137400 FE7E8318 C483001C
468D1640 75C00B00 54573B9A 08C48300 3C7B9F9A 006A35FF 0275FF5A E23EC52E
3C7D919A 5B2036FF 2E5B2236 FF2E5B24 36FF2E5B 2636FF2E 006A006A 006A50FE
3EC52E0A C4830054 C0489AFE 76FF006A 006A006A 006A1374 00FE7E83 12C48300
FF2E5B2E 36FF2E04 C4830054 DC759A35 FF0275FF 5B2C3EC5 2E477400 3D835B28
D99B5B30 3EC52E00 54968F9A 05D99B5B 343EC52E 016A35FF 5B383EC5 2E5B2C36
46C70000 02C85756 CB5E5FC9 9B001CF9 0B9A18C4 8300448D 319A0054 968F9A05
8B058B5A C01E8E2E 5ABE3E03 2EE7D1FE 7E8B467D 03FE7E83 FE46FF03 EB0000FE
8B5AC81E 8E2E5AC6 3E032EE7 D1FE7E8B 05895AC4 1E8E2E5A C23E032E E7D1FE7E
5FC902C4 83004455 C59A066A B1EB0589 5AB81E8E 2E5AB63E 032EE7D1 FE7E8B05
8D1608C4 83003C7B 9F9A006A 35FF0275 FF5AD23E C52E036A 000002C8 5756CB5E
7D919A5B 2036FF2E 5B2236FF 2E5B2436 FF2E5B26 36FF2E00 6A006A00 6A50FE46
C52E0AC4 830054C0 489AFE76 FF006A00 6A006A00 6A137400 FE7E8312 C483003C
2E5B2E36 FF2E04C4 830054DC 759A35FF 0275FF5B 2C3EC52E 4774003D 835B283E
9B5B303E C52E0054 968F9A05 D99B5B34 3EC52E01 6A35FF5B 383EC52E 5B2C36FF
E23EC52E 036A0000 02C85756 CB5E5FC9 9B18C483 00448D31 9A005496 8F9A05D9
5B2636FF 2E006A00 6A006A50 FE468D16 08C48300 3C7B9F9A 006A35FF 0275FF5A
6A006A13 7400FE7E 8312C483 003C7D91 9A5B2036 FF2E5B22 36FF2E5B 2436FF2E
FF5B2C3E C52E4774 003D835B 283EC52E 0AC48300 54C0489A FE76FF00 6A006A00
2E016A35 FF5B383E C52E5B2C 36FF2E5B 2E36FF2E 04C48300 54DC759A 35FF0275
C4830044 8D319A00 54968F9A 05D99B5B 303EC52E 0054968F 9A05D99B 5B343EC5
2E327502 FA7E8304 C4830054 64499A50 FA468D16 000008C8 5756CB5E 5FC99B18
36FF2E04 C4830054 94889A5A BE36FF2E 5AC036FF 2E267500 013D058B 5ABA3EC5
023D058B 5ABA3EC5 2E307501 FA7E8336 EB04C483 00549488 9A5AC636 FF2E5AC8
9A5AC636 FF2E5AC8 36FF2E04 C4830054 94F89A5A BE36FF2E 5AC036FF 2E247500
BE3E032E E7D1FE7E 8B467D03 FE7E83FE 46FF03EB 0000FE46 C704C483 005494F8
032EE7D1 FE7E8B05 895AC41E 8E2E5AC2 3E032EE7 D1FE7E8B 058B5AC0 1E8E2E5A
3EC52EB1 EB05895A B81E8E2E 5AB63E03 2EE7D1FE 7E8B058B 5AC81E8E 2E5AC63E
0044CB7A 9A06C483 002CFC9C 9A0D6A5A B636FF2E 5AB836FF 2E147E00 3D835AB2
FF2E5B24 36FF2E5B 2636FF2E 006A006A 006A50FC 468D1640 75C00B00 54573B9A
76FF006A 006A006A 006A1374 00FC7E83 12C48300 3C7D919A 5B2036FF 2E5B2236
54DC759A 35FF0275 FF5AD23E C52E0000 05C75B28 3EC52E0A C4830054 C0489AFC
FF2E5AF8 36FF2E3E 75FFFF3D 058B5AE6 3EC52E00 0005C75A FA3EC52E 04C48300
D99B5AEA 3EC52E00 54968F9A 05D99B5A EE3EC52E 016A35FF 5AF23EC5 2E5AF636
5458139A 50F8468D 16000105 C75AE63E C52E18C4 8300448D 319A0054 968F9A05
89C6004C 89DE0014 7DE60014 7B86CB5E 5FC99B00 3434459A 0574C00B 04C48300
7C64004C 898A0014 951F004C 89C2004C 89D8004C 89D2004C 89CC0014 7DEC004C
89BA004C 89E0004C 5BAA004C 5BA8004C 5B94004C 5B90004C 59DA0014 7B9A004C
004C5B7A 00147DDC 000A004C 5B780014 7BF6004C 89C0004C 89BC004C 89BE004C
26C85756 004C7E80 004C89EA 004C89E6 004C7F1E 004C89E4 00147CC6 00147B9E
7700043D 4805896F C63EC52E DA468B06 C4830054 BE1C9A01 6A50DA46 8D160000
9B6FCA3E C52E6FCE 06DD2E9B 5B8A5BB6 5BA05B8A 5B745B6A A7FF2ED8 8BE0D171
2AEB6FEA 06DD2E9B 1DD99B6F CA3EC52E 6FE206DD 2E9B40EB 6FDA06DD 2E9B1DD9
CA3EC52E 6FFA06DD 2E9B14EB 6FF206DD 2E9B1DD9 9B6FCA3E C52E6FE2 06DD2E9B

1C9A046A 700236FF 2E700436 FF2E1DD9 9B6FD63E C52E6FCE 06DD2E9B 1DD99B6F
3EC52EEE D99B0255 89058970 063EC52E 7004168B 2E700206 8B2E06C4 830054BE
1436FF2E 701636FF 2E701836 FF2E50FE 468D161D D99B700A 3EC52E15 D99B700E
36FF2E70 1C36FF2E 50FE468D 1610C483 0054DABA 9A02BD68 066A7012 36FF2E70
8B058B70 063EC52E 0589701E 3EC52E05 8B701A3E C52E08C4 830054ED 689A701A
05897026 3EC52E01 6A050255 8B058B70 063EC52E 02558905 8970223E C52E0255
8B70223E C52E0255 89058970 2A3EC52E 02D40502 558B058B 70063EC5 2E025589
C52E1DD9 9B70323E C52E05D9 9B70123E C52E0255 89058970 2E3EC52E 02558B05
EED99B1D D99B7036 3EC52E70 3A06DF2E 9B045DD9 9B70323E C52E05D9 9B70163E
446BB49A 045DD99B 704206DF 2E9B1DD9 9B703C3E C52E7040 06DF2E9B 045DD99B
D99B7048 3EC52EFE CC9ED99B 05D99B70 443EC52E 000144C8 5756CB5E 5FC99B00
704C36FF 2E704E36 FF2E06C4 830054BF 179A076A 50FECC86 8D16FED0 9ED99B05
005496EF 9A005496 8F9A7054 06DC2E9B 05D99B70 503EC52E 04C48300 54EE949A
06DC2E9B 05D99B70 5C3EC52E 1DD99B70 503EC52E FF2E86DF 9BFF2E86 8908C483
1DD99B70 5C3EC52E FF2E86DF 9BFF2E86 8908C483 005496EF 9A005496 8F9A7054
EC5ED99B FEDA86DF 9BFC5ED9 9BFED886 DF9B04C4 83005485 699A50FE D4868D16
E85ED99B FEDA86DF 9BF85ED9 9BFED886 DF9B04C4 83005485 699A50FE D4868D16
E45ED99B FEDA86DF 9BF45ED9 9BFED886 DF9B04C4 83005485 699A50FE D4868D16
E05ED99B FEDA86DF 9BF05ED9 9BFED886 DF9B04C4 83005485 699A50FE D4868D16
C456D99B E046D99B B85ED99B BC56D99B F046D99B 805EDD9B FF7896DD 9BEED99B
9B1F16FD 0302E7C1 FF2EBE8B 00EBE903 7C04FF2E BE830000 FF2E86C7 C05ED99B
9BFF7886 DC9BF045 D99B1F16 FD0302E7 C1FF2EBE 8B805EDD 9B8046DC 9BE045D9
BE8B1376 0054968A 9AF05DD8 9BB846D9 9B1F16FD 0302E7C1 FF2EBE8B FF789EDD
BC46D99B 1F16FD03 02E7C1FF 2EBE8BB8 5ED99BF0 45D99B1F 16FD0302 E7C1FF2E
BE8BBC5E D99BF045 D99B1F16 FD0302E7 C1FF2EBE 8B137300 54968A9A F05DD89B
0302E7C1 FF2EBE8B 13760054 968A9AE0 5DD89BC0 46D99B1F 16FD0302 E7C1FF2E
8A9AE05D D89BC446 D99B1F16 FD0302E7 C1FF2EBE 8BC05ED9 9BE045D9 9B1F16FD
9BFF0BE9 FF2E86FF C45ED99B E045D99B 1F16FD03 02E7C1FF 2EBE8B13 73005496
46D99BFF 789EDD9B 706036DC 2E9BFF78 86DD9B80 5EDD9B70 6036DC2E 9B8046DD
DD9BE066 D89BE446 D99BFF58 9EDD9BA0 4EDC9BA0 46DD9BA0 5EDD9BF0 66D89BF4
9B706036 DC2E9BFF 5886DD9B FF589EDD 9BFF5886 DC9BA04E DC9BA046 DD9BA05E
46D99BFF 609EDD9B 984EDC9B 9846DD9B 985EDD9B E466D89B E846D99B FF589EDD
FF6086DD 9BFF609E DD9BFF60 86DC9B98 4EDC9B98 46DD9B98 5EDD9BF4 66D89BF8
5EDD9B08 C4830054 E5409A00 54968F9A FF5886DD 9BFF609E DD9B7060 36DC2E9B
FF78A6DC 9BF846D9 9B985EDD 9B08C483 0054E540 9A005496 8F9AFF60 86DD9BA0
DD9B905E DD9BFEC4 86DC9B98 4EDC9B80 66DC9BE8 46D99BFE C49EDD9B A04EDC9B
DC9BE846 D99B905E DD9BFEC4 B6DC9B90 46DD9BFE C49EDD9B FF6086DC 9BFF5886
5EDD9BFE C4A6DC9B 984EDC9B FF78A6DC 9BF846D9 9BFEC49E DD9BA04E DC9B8066
46D99B88 5EDD9BFE C4B6DC9B 8846DD9B FEC49EDD 9BFF6086 DC9BFF58 86DD9B88
9B884EDC 9BF046D9 9BFF409E DD9B904E DC9BE046 D99BFF50 9EDD9B90 4EDC9BF0
9BFEC49E DD9BFF78 8EDC9B90 46DD9BFF 389EDD9B 884EDC9B E046D99B FF489EDD
DD9BFF78 8EDC9B88 46DD9BC8 5ED99BFF 7886DC9B FEC4A6DC 9B804EDC 9B8846DD
D99BFEC4 A6DC9B80 46DD9BFE C49EDD9B FEBC86DC 9B804EDC 9B9046DD 9BFEBC9E
005496EF 9A005496 8F9A7054 06DC2E9B FF38A6DC 9BFF5086 DC9BC846 D99BD45E
0054968F 9A705406 DC2E9BFF 4086DC9B FF4886DC 9BD446D9 9BFF3686 8908C483
4EDC9BF8 46D99BFE BC9EDD9B 884EDC9B E846D99B FF348689 08C48300 5496EF9A
9A005496 8F9A7054 06DC2E9B FEBCA6DC 9BFEC486 DC9BC846 D99BFEC4 9EDD9B90
884EDC9B F846D99B FEBC9EDD 9B904EDC 9BE846D9 9BFF3286 8908C483 005496EF
EF9A0054 968F9A70 5406DC2E 9BFEBC86 DC9BFEC4 86DC9BD4 46D99BFE C49EDD9B
FEC49EDD 9B02C483 0054969D 9A50FF36 862BFF32 868BFF30 868908C4 83005496
2BFF3086 8BFF709E DD9BFEC4 B6DC9B24 D8269B05 D99B7050 3EC52E70 4C36C42E
269B05D9 9B705C3E C52E7068 36C42EFE C49EDD9B 02C48300 54969D9A 50FF3486
DC9BFF38 86DC9BE0 D99BFF50 86DD9B70 4C3EC52E FF689EDD 9BFEC4B6 DC9B24D8
688EDC9B FF40A6DC 9BE0D99B FF4886DD 9B70683E C52EC85E D99B05D8 9BFF708E
708EDC9B E0D99B88 46DD9BCC 5ED99BFF 708EDC9B 9046DD9B D45ED99B 05D89BFF
6ADC5ED9 9BFF688E DC9B9046 DD9BD85E D99BFF68 8EDC9B88 46DD9BD0 5ED99BFF
D04ED89B D446D99B 0AC48300 5496649A 50A8468D 16700A36 FF2E700C 36FF2E10
9BD04ED8 9BD846D9 9BFF709E DD9BFEC4 A6DC9BDC 4ED89BC8 46D99BFE C49EDD9B
DD9BB44E D89BD046 D99BFF68 9EDD9BFE C4A6DC9B DC4ED89B CC46D99B FEC49EDD
9A005496 8F9AFF68 B6DC9BFF 70A6DC9B FEC4A6DC 9BAC4ED8 9BDC46D9 9BFEC49E
A84ED89B DC46D99B FEC49EDD 9BB04ED8 9BD046D9 9BFF3286 8908C483 005496EF
FF368689 08C48300 5496EF9A 0054968F 9AFF68B6 DC9BFF70 A6DC9BFE C4A6DC9B
9BFF709E DD9BFEC4 A6DC9BD8 4ED89BC8 46D99BFE C49EDD9B CC4ED89B D446D99B
4ED89BD8 46D99BFE C49EDD9B B44ED89B CC46D99B FF689EDD 9BE0D99B FF6886DD

30868908 C4830054 96EF9A00 54968F9A FF68B6DC 9BFF70A6 DC9BFEC4 A6DC9BAC
FF70A6DC 9BFEC4A6 DC9BA84E D89BD846 D99BFEC4 9EDD9BB0 4ED89BCC 46D99BFF
FF3286DF 9B6FCA3E C52EFF34 868908C4 83005496 EF9A0054 968F9AFF 68B6DC9B
83FF3286 8908C483 005496EF 9A005496 8F9ABC46 D99B1576 0054968A 9A1DD89B
6FD63EC5 2EFF3686 8908C483 005496EF 9A005496 8F9AB846 D99B157D 00FF36BE
08C48300 5496EF9A 0054968F 9AC446D9 9B157600 54968A9A 1DD89BFF 3086DF9B
FF348689 08C48300 5496EF9A 0054968F 9AC046D9 9B157D00 FF34BE83 FF308689
FF3486DF 9BB85ED9 9BFF3686 DF9BC45E D99BFF30 86DF9BBC 5ED99BFF 3286DF9B
D99BFEC4 9EDD9BB8 4ED89BCC 46D99BFE BC9EDD9B C04ED89B D046D99B C05ED99B
8908C483 005496EF 9A005496 8F9A7054 06DC2E9B FEBC86DC 9BFEC486 DC9BC846
46D99BFE C49EDD9B B84ED89B D846D99B FEBC9EDD 9BC04ED8 9BDC46D9 9BFF3686
868908C4 83005496 EF9A0054 968F9A70 5406DC2E 9BFEBC86 DC9BFEC4 86DC9BD4
C846D99B FEC49EDD 9BBC4ED8 9BCC46D9 9BFEBC9E DD9BC44E D89BD046 D99BFF34
32868908 C4830054 96EF9A00 54968F9A 705406DC 2E9BFEBC 86DC9BFE C486DC9B
9BD446D9 9BFEC49E DD9BBC4E D89BD846 D99BFEBC 9EDD9BC4 4ED89BDC 46D99BFF
FF308689 08C48300 5496EF9A 0054968F 9A705406 DC2E9BFE BC86DC9B FEC486DC
FF3086DF 9BAC5ED9 9BFF3286 DF9BB05E D99BFF34 86DF9BA8 5ED99BFF 3686DF9B
0054DE28 9A186A50 C8468D16 5000A205 058B0275 FF702A3E C52E5756 B45ED99B
5E5F0054 DE289A10 6A50B846 8D165000 BA05058B 0275FF70 2A3EC52E 57565E5F
D99BB846 D99BFF18 9ED99B05 D99B6FD6 3EC52EFF 149ED99B 05D99B6F CA3EC52E
66D89BC4 46D99BFF 249ED99B B866D89B BC46D99B FF209ED9 9BC046D9 9BFF1C9E
FF009ED9 9B05D99B 70163EC5 2EFEFC9E D99B05D9 9B70123E C52EFF28 9ED99BC0
9BFF0C9E D99BA866 D89BAC46 D99BFF08 9ED99BB0 46D99BFF 049ED99B A846D99B
FC868D16 50000205 058B0275 FF702A3E C52E016A FF109ED9 9BB066D8 9BB446D9
3EC52E35 FF701A3E C52E50FF 2C868D16 0EC48300 44672B9A 50FF1486 8D1650FE
FF2E0009 05C73DC5 702A3EC5 2E0AC483 00446AC5 9A500002 05058B02 75FF702A
2E3EC52E 02558B05 8B702A3E C52E06C4 830054BF 179A046A 700236FF 2E700436
83022EE9 037C09EE 7E830000 EE46C700 0012C857 56CB5E5F C99B0255 89058970
145E8E12 7E03F88B 28EE466B 397500EE 7E8301FC E9037504 EE7E8309 7501167E
EE466B0C 45D99B0A 7EC5FC5E D99B0C45 D99B0E7E C5F85ED9 9B2055D9 9BEED99B
E9037406 EE7E8309 7403EE7E 830F7400 EE7E8324 5DD99B14 5E8E127E 03F88B28
0845D99B 0E7EC5F0 5ED99B18 55D99BEE D99B145E 8E127E03 F88B28EE 466B00C4
7F00EE7E 831C5DD9 9B145E8E 127E03F8 8B28EE46 6B0845D9 9B0A7EC5 F45ED99B
28EE466B 2445D99B 127E03F8 8B28C66B 4EEE768B F85ED99B FC46D99B 0148E903
76C4FC5E D99B1445 D89BF846 D99B0E7E C5377503 EE7E8320 5DD99B12 7E03F88B
9B127E03 F88B28EE 466B1444 D8269B20 45D99B14 5E8E127E 03F88B28 EE466B0A
7E03F88B 28EE466B 0445D99B 0A7EC5FC 5ED99B04 45D99B0E 7EC500E6 E9245DD9
45D99B14 5E8E127E 03F88B28 C66B4EEE 768BF05E D99BF446 D99BD9EB 145E8E12
466B2045 D99B127E 03F88B28 C66B4EEE 768B185D D99B127E 03F88B28 EE466B1C
8B28EE46 6B2445D9 9B127E03 F88B28C6 6B4EEE76 8B205DD9 9B127E03 F88B28EE
EE466B0A 76C43275 07EE7E83 067404EE 7E830C74 01EE7E83 245DD99B 127E03F8
C51C5DD9 9B127E03 F88B28EE 466B1044 D8269B18 45D99B14 5E8E127E 03F88B28
D99B145E 8E127E03 F88B28EE 466B05D9 9B0A7EC5 1CEB1045 D89BF046 D99B0E7E
50F0468D 16505214 568B1246 0328EE46 6BEE76FF F45ED99B 05D99B0E 7EC51C5D
9BF046D9 9B0E7EC5 F05ED99B F446D99B 177504EE 7E831DEB 0AC48300 4469729A
46891056 8B0E468B 000020C8 5756CB5E 5FC99BFD C9E9EE46 FFF45ED9 9B1045D8
46D99B0A C4830054 96649A50 EC468D16 50001805 0E468B10 76FF106A FE5689FC
0C740112 7E83045D D99B0855 D99BFC7E C5EED99B 37750054 968A9AF0 5ED89BEC
D99B0A7E C551EB1D D99BFC7E C50445D9 9B0A7EC5 0F750612 7E830674 04127E83
9B0A7EC5 0A76C4E0 5EDD9BF0 66D89BEC 46D99B08 5DD99BFC 7EC5EED9 9BF0EB05
7EC504D8 269BE0D9 9BEC4ED8 9BE846D9 9BE85ED9 9BE076DC 9B0464D8 269B05D9
7EC5EED9 9B397500 54968A9A F85ED89B F446D99B 045DD99B E846D99B 1DD99BFC
D99B0A7E C5107503 127E8306 7402127E 830C7401 127E8310 5DD99B14 55D99BFC
D99B105D D99BFC7E C5EED99B EEEB0845 D99B0A7E C555EB0C 5DD99BFC 7EC50C45
5ED99BE0 76DC9B0C 64D8269B 0845D99B 0A7EC50A 76C4E05E DD9BF866 D89BF446
145DD99B E846D99B 0C5DD99B FC7EC508 44D8269B E0D99BF4 4ED89BE8 46D99BE8
466B0090 E9037C09 FE7E8300 00FE46C7 FFFFFC46 C7000004 C85756CB 5E5FC99B
9A1C5CD8 269B1845 D99B0C5E 8E0A7E03 F88B28FE 466B0C46 8E0A7603 F08B28FE
D99B0C5E 8E0A7E03 F88B28FE 466B0C46 8E0A7603 F08B28FE 466B6274 0054968A
568B0A46 0328FE46 6B1076FF 1276FFFC 46FF3A74 0054968A 9A245CD8 269B2045
00CD6806 6A0E76FF FC76FF50 520A4603 28FE466B 50001805 C38B51CA 8BD88B0C
3EC52E00 446BB49A EC8B5557 56CB5E5F C99BFF67 E9FE46FF 14C48300 54D8DC9A
223EC52E 06C48300 54BF179A 046A7002 36FF2E70 0436FF2E FFFF05C7 3DC5702A
2E50FE46 8D160000 02C85756 CB5E5FC9 02558905 89702E3E C52E0255 8B058B70

223EC52E 0AC48300 446AC59A 50000205 058B0275 FF70223E C52E35FF 701A3EC5
2E50FE46 8D160000 02C85756 CB5E5FC9 02558905 89702E3E C52E0255 8B058B70
263EC52E 0AC48300 446AC59A 50000205 058B0275 FF70263E C52E35FF 701A3EC5
C5702A3E C52E0000 02C85756 CB5E5FC9 02558905 89702E3E C52E0255 8B058B70
702A3EC5 2E35FF70 1A3EC52E 50FE468D 1636EB00 446BB49A 0775FFFF 3D058B3D
702E3EC5 2E02558B 058B702A 3EC52E0A C4830044 6AC59A50 00020505 8B0275FF
702E3EC5 2E35FF70 1A3EC52E 50FE468D 16000002 C85756CB 5E5FC902 55890589
0000FA46 C7000016 C85756CB 5E5FC90A C4830044 6AC59A50 00020505 8B0275FF
00446D62 9A50001A 05C38B51 CA8BD88B 14568B12 460328FA 466B0A76 FF0C76FF
76C4FE56 89FC4689 40401456 8B124603 28FA466B D4EBFA46 FF0575C0 0B08C483
05D99BF2 5EDD9B0C D8269B04 45D99BEA 5EDD9B04 4CD8269B 0845D99B FC7EC50A
D99BEA5E DD9B044C D8269B14 45D99BFC 7EC51DD9 9B0E7EC5 EA46DC9B F246DC9B
5FC99B04 5DD99B0E 7EC5EA46 DC9BF246 DC9B0C45 D99BF25E DD9B0CD8 269B1045
7EC50A76 C4467200 54968A9A 1CD8269B 05D99B0E 7EC50A76 C4EC8B55 5756CB5E
9A085CD8 269B0445 D99B0E7E C50A76C4 31770054 968A9A04 5CD8269B 05D99B0E
EB0001B8 05770054 968A9A0C 5CD8269B 0445D99B 0E7EC50A 76C41B72 0054968A
5ED99B06 45DF9BF8 5ED99B04 45DF9B0A 7EC50000 14C85756 CB5E5FC9 9BC02B02
02558B05 8B702A3E C52E05EB 70223EC5 2E0775FF FF3D058B 3DC5702A 3EC52EFC
8F9AF046 D99B0CC4 8300446C B59A50F8 468D1650 F0468D16 5052EE56 89EC4689
C4830054 96EF9A00 54968F9A F446D99B 05890A7E C508C483 005496EF 9A005496
706C36DC 2E9B05D9 9B6FCA3E C52E0001 CCC85756 CB5E5FC9 9B024589 0A7EC508
D89B05D9 9B0A7EC5 FE3C9ED9 9B706C36 DC2E9B05 D99B6FD6 3EC52EFE 409ED99B
D89B0445 D99BFE48 9ED99BFE 4086D89B 05D99BFE 849ED99B FE4496D9 9BFE40A6
DD9BEED9 9BFE509E D99BFE3C 86D89B04 45D99BFE 889ED99B FE4C96D9 9BFE3CA6
D99B6FCA 3EC52E26 EBEED99B 05730054 968A9AFE 349EDC9B FE4486D9 9BFE349E
9B05D89B FE48A6D8 9BFE4486 D99B6FCA 3EC52E17 76005496 8A9A1DD8 9BFE4886
EED99B05 73005496 8A9AFE34 9EDC9BFE 4C86D99B FE349EDD 9BEED99B FE849ED9
FE4C86D9 9B6FD63E C52E1776 0054968A 9A1DD89B FE5086D9 9B6FD63E C52E26EB
9B6FD63E C52EFE7C 9ED99B05 D99B6FCA 3EC52EFE 889ED99B 05D89BFE 50A6D89B
0EDC2E9B FE3C86D9 9BFE8C9E D99B7074 0EDC2E9B FE4086D9 9BFE809E D99B05D9
9A50FE7C 868D1670 3236FF2E 703436FF 2E50FE96 868D1600 6AFE909E D99B7074
C4830044 6AC59A50 FE96868D 1635FF70 1A3EC52E 50FE468D 160EC483 0044672B
90000000 0000004C 536840B2 C0000000 0000004C 5364004C 536CCB5E 5FC99B0A
20000000 000040A7 D0000000 000040A9 00000000 000040AF 40000000 000040AA
4EF00014 E220004C 4F0E004C 4F06004C 4F0A004C 4F02004C 5350004C 4F1240BC
004C537E 019B004C 5376004C 536E004C 5360004C 535C004C 5358004C 5354004C
004C4EFE 3FE00000 00000000 004C4EF6 004C4EF2 004C7198 004C7194 02FF0264
22C85756 40000000 00000000 40200000 00000000 004C4EFA 40100000 00000000
0B04C483 00544260 9A80C236 FF2E80C4 36FF2E00 5442019A 4575000A 7E830000
80C836FF 2E0AC483 0054C048 9AFE76FF 006A006A 006A006A 0005FE46 C71874C0
74003D83 80CE3EC5 2E2F7501 3D8080CA 3EC52E04 C4830044 7D669A80 C636FF2E
F256D99B F656D99B 80D206DD 2E9B6AEB EE5ED99B F256D99B F656D99B EED99B11
83003CFC 5A9A006A 0054968F 9A05DF9B 80DA3EC5 2E50EE46 8D1656EB EE5ED99B
160EC483 003CFC5A 9A006A00 54968F9A 0245DF9B 80DA3EC5 2E50F246 8D160EC4
FA468D16 0EC48300 3CFC5A9A 006A0054 968F9A04 45DF9B80 DA3EC52E 50F6468D
8D1650FA 468D160E C483003C FC5A9A00 6A005496 8F9A0645 DF9B80DA 3EC52E50
2E2F7501 3D8080CA 3EC52E10 C4830044 7A569A50 EE468D16 50F2468D 1650F646
80D206DD 2E9B6AEB DE5ED99B E256D99B E656D99B EED99B11 74003D83 80CE3EC5
0054968F 9A05DF9B 80DE3EC5 2E50DE46 8D1656EB DE5ED99B E256D99B E656D99B
9A006A00 54968F9A 0245DF9B 80DE3EC5 2E50E246 8D160EC4 83003CFC 5A9A006A
3CFC5A9A 006A0054 968F9A04 45DF9B80 DE3EC52E 50E6468D 160EC483 003CFC5A
C483003C FC5A9A00 6A005496 8F9A0645 DF9B80DE 3EC52E50 EA468D16 0EC48300
5FC99B10 C4830044 7C649A50 DE468D16 50E2468D 1650E646 8D1650EA 468D160E
80E436FF 2E197500 023D058B 80CE3EC5 2EFC5ED9 9BEED99B 000012C8 5756CB5E
8D1680E6 36FF2E80 E836FF2E 17EB08C4 830054EE 309A50EE 468D1680 E236FF2E
8F9A05DF 9B80DA3E C52E50F8 468D1603 A5E90A46 8B08C483 0054EE30 9A50EE46
6A005496 8F9A05DF 9B80DE3E C52E50F4 468D160E C483003C FC5A9A00 6A005496
424D9A80 EA36FF2E 80EC36FF 2E50EE46 8D1650F8 468D160E C483003C FC5A9A00
EE468D16 50F4468D 1604C483 0054430B 9A80EE36 FF2E80F0 36FF2E0C C4830054
430B9A80 F636FF2E 80F836FF 2E0CC483 0054424D 9A80F236 FF2E80F4 36FF2E50
C4830054 424D9A80 FA36FF2E 80FC36FF 2E50EE46 8D1650FC 468D1604 C4830054
36FF2E50 EE468D16 50FC468D 1604C483 0054430B 9A80FE36 FF2E8100 36FF2E0C
C4830054 430B9A81 0636FF2E 810836FF 2E0CC483 0054424D 9A810236 FF2E8104
3EC52E50 F8468D16 02B4E91D D99B810A 3EC52E15 D99B810E 3EC52EFC 46D99B04

9B80DE3E C52E50F4 468D160E C483003C FC5A9A00 6A005496 8F9A0245 DF9B80DA
1436FF2E 50EE468D 1650F846 8D160EC4 83003CFC 5A9A006A 0054968F 9A0245DF
04C48300 54430B9A 811636FF 2E811836 FF2E0CC4 83005442 4D9A8112 36FF2E81
2036FF2E 0CC48300 54424D9A 811A36FF 2E811C36 FF2E50EE 468D1650 F4468D16
36FF2E81 2436FF2E 50EE468D 1650FC46 8D1604C4 83005443 0B9A811E 36FF2E81
FC468D16 04C48300 54430B9A 812636FF 2E812836 FF2E0CC4 83005442 4D9A8122
36FF2E81 3036FF2E 0CC48300 54424D9A 812A36FF 2E812C36 FF2E50EE 468D1650
045DD99B 810A3EC5 2E0455D9 9B810E3E C52EFC46 D99B04C4 83005443 0B9A812E
0EC48300 3CFC5A9A 006A0054 968F9A04 45DF9B80 DA3EC52E 50F8468D 1601A9E9
468D160E C483003C FC5A9A00 6A005496 8F9A0445 DF9B80DE 3EC52E50 F4468D16
FF2E8138 36FF2E0C C4830054 424D9A81 3236FF2E 813436FF 2E50EE46 8D1650F8
9A813A36 FF2E813C 36FF2E50 EE468D16 50F4468D 1604C483 0054430B 9A813636
8D1650FC 468D1604 C4830054 430B9A81 3E36FF2E 814036FF 2E0CC483 0054424D
9A814636 FF2E8148 36FF2E0C C4830054 424D9A81 4236FF2E 814436FF 2E50EE46
0054424D 9A814A36 FF2E814C 36FF2E50 EE468D16 50FC468D 1604C483 0054430B
D99B810E 3EC52EFC 46D99B04 C4830054 430B9A81 4E36FF2E 815036FF 2E0CC483
54968F9A 0645DF9B 80DE3EC5 2E50F446 8D16009E E9085DD9 9B810A3E C52E0855
9A815236 FF2E8154 36FF2E50 EE468D16 50F4468D 160EC483 003CFC5A 9A006A00
8D1650FC 468D1604 C4830054 430B9A81 5636FF2E 815836FF 2E0CC483 0054424D
9A815E36 FF2E8160 36FF2E0C C4830054 424D9A81 5A36FF2E 815C36FF 2E50EE46
2ED88BE0 D1117700 033D16EB 0C5DD99B 810E3EC5 2EFC46D9 9B04C483 0054430B
C52EF85E D99BEED9 9B000010 C85756CB 5E5FC99B 75CE74C3 73B872B1 7664A7FF
468D16FC 5ED99BEE D99B07EB FC5ED99B 80D206DD 2E9B0C74 00013D05 8B80CE3E
2E50F046 8D160EC4 83003CFC 5A9A006A 0054968F 9A0645DF 9B80DA3E C52E50F4
F8468D16 50F8468D 160EC483 003CFC5A 9A006A00 54968F9A 0645DF9B 80DE3EC5
468D1650 FC468D16 50F4468D 1610C483 0044794A 9A50F846 8D1650F8 468D1650
8D1650F8 468D1650 F8468D16 50F8468D 1610C483 00447A56 9A50FC46 8D1650FC
9A50FC46 8D1650FC 468D1650 FC468D16 50F0468D 1610C483 00447B62 9A50F846
2EF846D9 9B1DD99B 810A3EC5 2E15D99B 810E3EC5 2EF846D9 9B10C483 00447C64
C52E0855 D99B810E 3EC52EF8 46D99B04 5DD99B81 0A3EC52E 0455D99B 810E3EC5
5FC99B0C 5DD99B81 0A3EC52E 0C55D99B 810E3EC5 2EF846D9 9B085DD9 9B810A3E
3CFC5A9A 006A0054 968F9A05 DF9B80DA 3EC52E50 FC468D16 000014C8 5756CB5E
C483003C FC5A9A00 6A005496 8F9A0245 DF9B80DA 3EC52E50 F8468D16 0EC48300
8D160EC4 83003CFC 5A9A006A 0054968F 9A0445DF 9B80DA3E C52E50F4 468D160E
2E50FC46 8D1610C4 8300447A 569A50FC 468D1650 F8468D16 50F4468D 1650EC46
80DE3EC5 2E50F846 8D160EC4 83003CFC 5A9A006A 0054968F 9A05DF9B 80DE3EC5
45DF9B80 DE3EC52E 50F4468D 160EC483 003CFC5A 9A006A00 54968F9A 0245DF9B
8F9A0645 DF9B80DE 3EC52E50 F0468D16 0EC48300 3CFC5A9A 006A0054 968F9A04
FC468D16 50F8468D 1650F446 8D1650F0 468D160E C483003C FC5A9A00 6A005496
DF9B80DA 3EC52E50 F4468D16 00000CC8 5756CB5E 5FC99B10 C4830044 7C649A50
9A0645DF 9B80DE3E C52E50F8 468D160E C483003C FC5A9A00 6A005496 8F9A0645
80D206DD 2E9B0C74 00013D05 8B80CE3E C52E0EC4 83003CFC 5A9A006A 0054968F
FC468D16 50FC468D 1650FC46 8D1650F4 468D16FC 5ED99BEE D99B07EB FC5ED99B
7C649A50 FC468D16 50FC468D 1650FC46 8D1650F8 468D1610 C4830044 7A569A50
6436FF2E 19750002 3D058B80 CE3EC52E 000006C8 5756CB5E 5FC99B10 C4830044
16816636 FF2E8168 36FF2E17 EB08C483 0054EE30 9A50FA46 8D168162 36FF2E81
6A36FF2E 816C36FF 2E50FA46 8D160A76 FF0C76FF 08C48300 54EE309A 50FA468D
4D9A816E 36FF2E81 7036FF2E 50FA468D 160E76FF 1076FF0C C4830054 424D9A81
0054424D 9A817236 FF2E8174 36FF2E50 FA468D16 1276FF14 76FF0CC4 83005442
9A817A36 FF2E817C 36FF2E04 C4830054 430B9A81 7636FF2E 817836FF 2E0CC483
3D8080CA 3EC52E04 C4830054 430B9A81 7E36FF2E 818036FF 2E04C483 0054430B
0CC48300 54424D9A 818236FF 2E818436 FF2E50FA 468D1616 76FF1876 FF2F7501
CE3EC52E 000006C8 5756CB5E 5FC904C4 83005443 0B9A8186 36FF2E81 8836FF2E
EB08C483 0054EE30 9A50FA46 8D16818A 36FF2E81 8C36FF2E 19750002 3D058B80
8D160A76 FF0C76FF 08C48300 54EE309A 50FA468D 16818E36 FF2E8190 36FF2E17
50FA468D 160E76FF 1076FF0C C4830054 424D9A81 9236FF2E 819436FF 2E50FA46
36FF2E50 FA468D16 1276FF14 76FF0CC4 83005442 4D9A8196 36FF2E81 9836FF2E
C4830054 430B9A81 9E36FF2E 81A036FF 2E0CC483 0054424D 9A819A36 FF2E819C
430B9A81 A636FF2E 81A836FF 2E04C483 0054430B 9A81A236 FF2E81A4 36FF2E04
2E81AC36 FF2E50FA 468D1616 76FF1876 FF2F7501 3D8080CA 3EC52E04 C4830054
5FC904C4 83005443 0B9A81AE 36FF2E81 B036FF2E 0CC48300 54424D9A 81AA36FF
8D1681B2 36FF2E81 B436FF2E 19750002 3D058B80 CE3EC52E 000006C8 5756CB5E
54EE309A 50FA468D 1681B636 FF2E81B8 36FF2E17 EB08C483 0054EE30 9A50FA46
C4830054 424D9A81 BA36FF2E 81BC36FF 2E50FA46 8D160A76 FF0C76FF 08C48300

76FF0CC4 83005442 4D9A81BE 36FF2E81 C036FF2E 50FA468D 160E76FF 1076FF0C
76FF1876 FF0CC483 0054424D 9A81C236 FF2E81C4 36FF2E50 FA468D16 1276FF14
36FF2E81 CC36FF2E 0CC48300 54424D9A 81C636FF 2E81C836 FF2E50FA 468D1616
D436FF2E 04C48300 54430B9A 81CE36FF 2E81D036 FF2E04C4 83005443 0B9A81CA
04C48300 54430B9A 81D636FF 2E81D836 FF2E04C4 83005443 0B9A81D2 36FF2E81
81DA36FF 2E81DC36 FF2E1975 00023D05 8B80CE3E C52E0000 06C85756 CB5E5FC9
309A50FA 468D1681 DE36FF2E 81E036FF 2E17EB08 C4830054 EE309A50 FA468D16
0054424D 9A81E236 FF2E81E4 36FF2E50 FA468D16 0A76FF0C 76FF08C4 830054EE
0CC48300 54424D9A 81E636FF 2E81E836 FF2E50FA 468D160E 76FF1076 FF0CC483
1876FF0C C4830054 424D9A81 EA36FF2E 81EC36FF 2E50FA46 8D161276 FF1476FF
2E81F436 FF2E0CC4 83005442 4D9A81EE 36FF2E81 F036FF2E 50FA468D 161676FF
FF2E04C4 83005443 0B9A81F6 36FF2E81 F836FF2E 04C48300 54430B9A 81F236FF
83005443 0B9A81FE 36FF2E82 0036FF2E 04C48300 54430B9A 81FA36FF 2E81FC36
0054EE30 9A50FA46 8D168202 36FF2E82 0436FF2E 000006C8 5756CB5E 5FC904C4
0CC48300 54424D9A 820636FF 2E820836 FF2E50FA 468D160A 76FF0C76 FF08C483
010E7E83 000006C8 5756CB5E 5FC904C4 83005443 0B9A820A 36FF2E82 0C36FF2E
160A76FF 0C76FF08 C4830054 EE309A50 FA468D16 820E36FF 2E821036 FF2E3675
36FF2E82 1836FF2E 38EB0CC4 83005442 4D9A8212 36FF2E82 1436FF2E 50FA468D
FF2E50FA 468D1682 1E36FF2E 822036FF 2E08C483 0054EE30 9A50FA46 8D168216
83005443 0B9A8222 36FF2E82 2436FF2E 0CC48300 54424D9A 821A36FF 2E821C36
0054EE30 9A50FA46 8D168226 36FF2E82 2836FF2E 000006C8 5756CB5E 5FC904C4
08C48300 54EE309A 50FA468D 16822A36 FF2E822C 36FF2E36 75010E7E 8308C483
2E38EB0C C4830054 424D9A82 2E36FF2E 823036FF 2E50FA46 8D160A76 FF0C76FF
823A36FF 2E823C36 FF2E08C4 830054EE 309A50FA 468D1682 3236FF2E 823436FF
3E36FF2E 824036FF 2E0CC483 0054424D 9A823636 FF2E8238 36FF2E50 FA468D16
2E197500 023D058B 80CE3EC5 2E000006 C85756CB 5E5FC904 C4830054 430B9A82
36FF2E82 4836FF2E 17EB08C4 830054EE 309A50FA 468D1682 4236FF2E 824436FF
2E824C36 FF2E50FA 468D160A 76FF0C76 FF08C483 0054EE30 9A50FA46 8D168246
5FC904C4 83005443 0B9A824E 36FF2E82 5036FF2E 0CC48300 54424D9A 824A36FF
8D168252 36FF2E82 5436FF2E 19750002 3D058B80 CE3EC52E 000006C8 5756CB5E
54EE309A 50FA468D 16825636 FF2E8258 36FF2E17 EB08C483 0054EE30 9A50FA46
C4830054 424D9A82 5A36FF2E 825C36FF 2E50FA46 8D160A76 FF0C76FF 08C48300
3EC52E00 0006C857 56CB5E5F C904C483 0054430B 9A825E36 FF2E8260 36FF2E0C
08C48300 54EE309A 50FA468D 16826236 FF2E8264 36FF2E19 7500023D 058B80CE
160A76FF 0C76FF08 C4830054 EE309A50 FA468D16 826636FF 2E826836 FF2E17EB
826E36FF 2E827036 FF2E0CC4 83005442 4D9A826A 36FF2E82 6C36FF2E 50FA468D
FF2E1975 00023D05 8B80CE3E C52E0000 06C85756 CB5E5FC9 04C48300 54430B9A
7636FF2E 827836FF 2E17EB08 C4830054 EE309A50 FA468D16 827236FF 2E827436
FF2E827C 36FF2E50 FA468D16 0A76FF0C 76FF08C4 830054EE 309A50FA 468D1682
5E5FC904 C4830054 430B9A82 7E36FF2E 828036FF 2E0CC483 0054424D 9A827A36
7F460014 7F36406F E0000000 0000004C 86660014 7BA30014 7E0A004C 66EC00CB
672A004C 6722004C 671A004C 6712004C 670A004C 6702004C 66FC004C 66F60014
675A004C 6752004C 674A004C 6742004C 59C6004C 59B6004C 673A004C 6732004C
679A004C 6792004C 678A004C 6782004C 677A004C 6772004C 676A004C 6762004C
67DA004C 67D2004C 67CA004C 67C2004C 67BA004C 67B2004C 67AA004C 67A2004C
6816004C 680E004C 6806004C 67FE004C 67F6004C 67EE004C 67E8004C 67E2004C
6852004C 684A004C 6842004C 683A004C 6834004C 682E004C 6826004C 681E004C
688E004C 6886004C 6880004C 687A004C 6872004C 686A004C 6862004C 685A004C
68CC004C 68C6004C 68BE004C 68B6004C 68AE004C 68A6004C 689E004C 6896004C
690A004C 6902004C 68FA004C 68F2004C 68EA004C 68E2004C 68DA004C 68D2004C
6939004C 6931004C 692E004C 6926004C 6920004C 691C004C 6918004C 6912004C
6964004C 6962004C 695A004C 6957004C 694F004C 6949004C 6943004C 693B004C
699C004C 6994004C 698E004C 6988004C 6980004C 6978004C 6972004C 696C004C
69D4004C 69CC004C 69C6004C 69C0004C 69B8004C 69B0004C 69AA004C 69A4004C
C52E2005 C691CE3E C52E00F9 46C60010 FC46C700 00FE46C7 00000CC8 5756004C
45C691CE 3EC52E1D EB058B91 D23EC52E 200245C6 91CE3EC5 2E200145 C691CE3E
2ED88BE0 D10F7700 023D14EB 640345C6 91CE3EC5 2E250345 C691CE3E C52E7603
DE3EC52E 003705C7 91DA3EC5 2E000005 C791D63E C52E82CB 82C282B9 82E4A7FF
C602F646 C600F746 C6001505 C791E63E C52E0031 05C791E2 3EC52E00 1505C791
35FF91DA 3EC52E35 FF91DE3E C52E91EA 36FF2E91 EC36FF2E 50FE468D 1602F546
006A006A 006A1974 00FE7E83 10C48300 44850A9A 50E42AF5 468A50E4 2AF7468A
F036FF2E 50FE468D 1603F546 C60193E9 0001B80A C4830054 C0489AFE 76FF006A
50E42AF5 468A50E4 2AF6468A 35FF91E2 3EC52E35 FF91E63E C52E91EE 36FF2E91
C4830054 C0489AFE 76FF006A 006A006A 006A1974 00FE7E83 10C48300 44850A9A

EA3EC52E 50E42AF9 468A91F6 36FF2E91 F836FF2E 50FE468D 16013FE9 0002B80A
006A006A 197400FE 7E8312C4 830054D8 DC9A026A 056A35FF 91F23EC5 2E35FF91
83FA46FF 03EB0000 FA46C700 F1E90003 B80AC483 0054C048 9AFE76FF 006A006A
5291FC16 8B2E91FA 06032EE0 D1FA468B 50FE468D 16557500 FE7E835B 7D04FA7E
C4830054 D8DC9A02 6A056A35 FF91F23E C52E35FF 91EE3EC5 2E50E42A F9468A50
0086E900 04B80AC4 830054C0 489AFE76 FF006A00 6A006A00 6AB57400 FE7E8312
489AFE76 FF006A00 6A006A00 6A187400 FE7E8304 C4830044 86409A50 FE468D16
92063EC5 2E0005C6 92023EC5 2E0005C6 91FE3EC5 2E5BEB00 05B80AC4 830054C0
92163EC5 2E0005C6 92123EC5 2E0005C6 920E3EC5 2E0005C6 920A3EC5 2E0005C6
92263EC5 2E0105C6 92223EC5 2E0005C6 921E3EC5 2E0005C6 921A3EC5 2E0005C6
6EF70A46 8BF24689 0E468B00 10F046C7 000010C8 5756CB5E 5FC9C02B 000005C7
0054DC33 9A0A76FF 096A03FA 46C601F9 46C603F8 46C6F646 890A468B F4468910
FFFB76FF FD76FF51 EB0001B8 03FC05C7 167EC50C 75C20BFD 5689FB46 8904C483
76FF50F2 468D1616 76FF1876 FF0CC483 004485AE 9A0A76FF 0C76FF0E 76FF1076
FB76FFFD 76FF14C4 830054D8 DC9A086A 066A35FF 91F23EC5 2EF076FF 1276FF14
468BFE46 FF03EB00 00FE46C7 000002C8 5756CB5E 5FC9C02B 04C48300 54DC759A
FA8B09FE 566BE42A 058A922C 1E8E2E92 2A3E032E FE7E030C 7E8B747D 0A463BFE
03F88B09 FE466B00 000145C7 145E8E12 7E03F88B 09FE466B 0588145E 8E127E03
4589106E F7FE468B 145E8E12 7E03F88B 09FE466B 03458948 0E468B14 5E8E127E
CB5E5FC9 C02B81EB 07458948 106EF740 FE468B14 5E8E127E 03F88B09 FE466B05
46C645E5 46C642E4 46C642ED 46C659EC 46C64DEB 46C643EA 46C60000 22C85756
C52E52E2 46C645E1 46C654E0 46C646DF 46C641DE 46C652E8 46C64FE7 46C646E6
46C601F4 46C601F7 46C60003 F146C770 EE46C603 458891CE 3EC52E05 8B922E3E
76FFFB56 89F94689 5A16E446 8D0005EF 46C705F8 46C604F6 46C601F5 46C602F3
D8DC9A03 6A056A35 FF91F23E C52E35FF 91F63EC5 2E176A50 EE468D16 0A76FF0C
3EC52E18 6A50EE46 8D160A76 FF0C76FF FB5689F9 46895A16 DE468D12 C4830054
E9037400 3D830A7E C512C483 0054D8DC 9A036A05 6A35FF91 F23EC52E 35FF91F6
16C58B01 F846C604 F646C601 64E9037C 04FE7E83 FE46FF03 EB0000FE 46C70179
8B196A50 EE468D16 0A76FF0C 76FF000C EF46C7FB 5689F946 8900162D FE46035A
0054D8DC 9A036A05 6A35FF91 F23EC52E 35FF91FC 1E8E2E91 FA3E032E E7D1FE7E
91D0168B 2E91CE06 8B2E04F8 46C601F6 46C6010D E9037400 3D830A7E C512C483
3E032EE7 D1FE7E8B 1A6A50EE 468D160A 76FF0C76 FF0005EF 46C7FB56 89F94689
830A7EC5 12C48300 54D8DC9A 036A056A 35FF91F2 3EC52E35 FF91FC1E 8E2E91FA
8E2E91FA 3E032EE7 D1FE7E8B 1B6A50EE 468D160A 76FF0C76 FF00B4E9 0374003D
7B75003D 830A7EC5 12C48300 54D8DC9A 036A056A 35FF91F2 3EC52E35 FF91FC1E
1E8E2E92 323E032E 02E7C1FE 7E8B05D9 9B92363E C52E1D75 003D8391 D23EC52E
9B92341E 8E2E9232 3E032E02 E7C1FE7E 8B05DF9B 923A3EC5 2E1BEB1D D99B9234
2E92323E 032E02E7 C1FE7E8B 50529240 168B2E92 3E06032E 02E0C1FE 468B1DD9
CB5E5FC9 9BC02BFE 90E90EC4 83003CFC 5A9A016A 0054968F 9A05D99B 92341E8E
FFFFB806 74003D83 92263EC5 2E00FB46 C600FD46 C60000FE 46C70000 14C85756
16EE4689 04032605 8B91DE3E C52E9246 36C42EEC 4689058B 92423EC5 2E018FE9
F23EC52E 35FF91F6 3EC52E50 E42AFD46 8A50E42A FB468A50 EC468D16 50FE468D
FE76FF00 6A006A00 6A006A19 7400FE7E 8314C483 0054D8DC 9A066A06 6A35FF91
EC468904 0326058B 91DA3EC5 2E924236 C42E0124 E9FFFEB8 0AC48300 54C0489A
657500FE 7E836B7D 04F87E83 F846FF03 EB0000F8 46C7EE46 89058B92 463EC52E
91FA3E03 2EE7D1F8 7E8B50E4 2AFD468A 50E42AFB 468A50EC 468D1650 FE468D16
197400FE 7E8314C4 830054D8 DC9A066A 066A35FF 91F23EC5 2E35FF91 FC1E8E2E
058B91E2 3EC52E00 99E9FFFD B80AC483 0054C048 9AFE76FF 006A006A 006A006A
2E000345 C6924A3E C52E0005 C6924A3E C52EFF01 45C6924A 3EC52E8C EBEC4601
056A35FF 924A3EC5 2E0275FF 924A3EC5 2E026A50 FE468D16 FF0245C6 924A3EC5
54C0489A FE76FF00 6A006A00 6A006A18 7400FE7E 830EC483 0054DABA 9A014C68
830054C0 489AFE76 FF006A00 6A006A00 6A187400 FE7E8329 EBFFFCB8 0AC48300
00FE46C7 00000AC8 5756CB5E 5FC9C02B 000105C7 92263EC5 2E0BEBFF FBB80AC4
1EE9037C 04F87E83 F846FF03 EB0000F8 46C70000 F646C700 FB46C600 FD46C600
8E2E923E 3E032E02 E7C1F67E 8B505292 34168B2E 92320603 2E02E0C1 F8468B01
7500023D 058B91D2 3EC52E0E C483003C FC5A9A00 6A005496 8F9A05D9 9B92401E
8F9A05D9 9B92341E 8E2E9232 3E032E02 E7C1F87E 8B91CE36 FF2E91D0 36FF2E2C
3E032E02 E7C1F87E 8B91CE36 FF2E91D0 36FF2E39 EB0CC483 00449150 9A005496
7B9A5008 C4830054 96EF9A00 54968F9A 924E06DC 2E9B05D9 9B92341E 8E2E9232
2E50FE46 8D160255 89058992 563EC52E 91D0168B 2E91CE06 8B2E06C4 83003CFB
91FA3E03 2EE7D1F8 7E8B0A76 FF91FE36 FF2E9200 36FF2E92 5A36FF2E 925C36FF
197400FE 7E8316C4 830054D8 DC9A046A 076A35FF 91F23EC5 2E35FF91 FC1E8E2E
2EFED6E9 F646FF00 86E9FFFF B80AC483 0054C048 9AFE76FF 006A006A 006A006A
3EC52E92 7236FF2E 927436FF 2E357400 3D839262 3EC52E74 74003D83 925E3EC5

0054968F 9A05D99B 92663EC5 2E005496 8F9A05D9 9B926A3E C52E006A 35FF926E
927A3EC5 2E016A35 FF926E3E C52E9272 36FF2E92 7436FF2E 18C48300 448D319A
9BC02B18 C4830044 8D319A00 54968F9A 05D99B92 763EC52E 0054968F 9A05D99B
2E00EDE9 0001B806 75003D83 92263EC5 2E0000FE 46C70000 04C85756 CB5E5FC9
7A3EC52E 006A35FF 926E3EC5 2E927236 FF2E9274 36FF2E3E 74003D83 92623EC5
C52E18C4 8300448D 319A0054 968F9A05 D99B9276 3EC52E00 54968F9A 05D99B92
DC9A076A 026A35FF 91F23EC5 2E35FF91 F63EC52E 50FE468D 16000005 C792623E
B80AC483 0054C048 9AFE76FF 006A006A 006A006A 187400FE 7E830CC4 830054D8
8B50FE46 8D164775 00FE7E83 4D7D04FC 7E83FC46 FF03EB00 00FC46C7 68EB0002
0054D8DC 9A076A02 6A35FF91 F23EC52E 35FF91FC 1E8E2E91 FA3E032E E7D1FC7E
EB0003B8 0AC48300 54C0489A FE76FF00 6A006A00 6A006AC2 7400FE7E 830CC483
46C7FC5E D99BEED9 9B00001A C85756CB 5E5FC99B C02B0000 05C79226 3EC52E0B
5689EE46 8920568B 1E468BF0 5689EE46 8904C483 0054DC33 9A016A04 6A0000FA
D99B9282 3EC52E1C 66DE9B12 46DD9B1D D99B927E 3EC52E1C 66DE9B0A 46DD9BF0
D99B928A 3EC52E12 46DC9B1C 46DF9B1D D99B9286 3EC52E0A 46DC9B1C 46DF9B1D
C4830054 96EF9A00 54968F9A E666DC9B 05D99B92 7E3EC52E E65EDD9B E8D99B1D
0054968F 9AE646DC 9B05D99B 92863EC5 2EE65EDD 9BE8D99B 0589928E 3EC52E08
DC9B05D9 9B92823E C52EE65E DD9BE8D9 9B058992 923EC52E 08C48300 5496EF9A
3EC52EE6 5EDD9BE8 D99B0589 92963EC5 2E08C483 005496EF 9A005496 8F9AE666
1EC42E05 89929A3E C52E08C4 83005496 EF9A0054 968F9AE6 46DC9B05 D99B928A
C792A23E C52E0255 89058992 9E3EC52E 99C68B46 372B2635 8B92923E C52E928E
C52E0001 05C792AE 3EC52E00 0105C792 AA3EC52E 000105C7 92A63EC5 2E000105
8B929A3E C52E9296 1EC42E00 000245C7 000005C7 92B63EC5 2E000005 C792B23E
6A006A50 FA468D16 5675001A 7E830255 89058992 BA3EC52E 99C68B46 372B2635
8314C483 0044B06A 9A046A13 6A35FF02 75FFEE7E C5928E36 FF2E9290 36FF2E00
75FFEE7E C5023EE9 0AC48300 54C0489A FA76FF00 6A006A00 6A006A16 7400FA7E
92C036FF 2E50FA46 8D161305 C692BE3E C52E0229 E904C483 0054DC75 9A35FF02
6A006A00 6A006A19 7400FA7E 830EC483 0054DABA 9A6E6A05 6A016A92 BE36FF2E
9E3EC52E 92BA36FF 2E92BC36 FF2E01E7 E90001B8 0AC48300 54C0489A FA76FF00
9AF676FF 046AF646 89000405 F8468BF8 468908C4 83005497 D89A35FF 0275FF92
3D8092C2 3EC52E22 75050B02 458BEE7E C5025589 0589EE7E C504C483 0054DC33
92C23EC5 2E017EE9 04C48300 544A8A9A 92C636FF 2E92C836 FF2E0193 E9037500
4A8A9A92 CA36FF2E 92CC36FF 2E35FF92 8E3EC52E 35FF9296 3EC52E20 74003D80
92C23EC5 2E04C483 00549BD5 9A500012 0592CE06 8B2E92D0 36FF2E08 C4830054
4A8A9A92 D236FF2E 92D436FF 2E35FF92 923EC52E 35FF929A 3EC52E20 74003D80
92C23EC5 2E04C483 00549BD5 9A500012 0592CE06 8B2E92D0 36FF2E08 C4830054
9A92D636 FF2E92D8 36FF2E50 058B929E 3EC52E50 058B92BA 3EC52E22 74003D80
468D1604 C4830054 9BD59A50 00120592 CE068B2E 92D036FF 2E08C483 00544A8A
44B06A9A 036A136A 35FF0275 FFEE7EC5 928E36FF 2E929036 FF2E006A 006A50FA
8A9A92DA 36FF2E92 DC36FF2E 1274003D 8092C23E C52E3174 00FA7E83 14C48300
B800F246 C65EEB0A C4830054 C0489AFA 76FF006A 006A006A 006A04C4 8300544A
FF2E9284 36FF2E50 F2468D16 50FC468D 1650FA46 8D16F346 88E42AF4 46880002
00FA7E83 1AC48300 54DABA9A 00CC680B 6A016A92 7E36FF2E 928036FF 2E928236
5756CB5E 5FC99BC0 2B02EB0A C4830054 C0489AFA 76FF006A 006A006A 006A1574
F85EDD9B 92E206DF 2E9B0000 08C85756 CB5E5FC9 000005C7 92623EC5 2EEC8B55
9A924E06 DC2E9B0A 46DD9B32 76005496 8A9AF85E DC9B00CC 85D99B92 DE3EC52E
4ACA9A12 76FF1476 FF92E436 FF2E92E6 36FF2E50 08C48300 5496EF9A 0054968F
1276FF14 76FF92E8 36FF2E92 EA36FF2E 0054968F 9A0A46DD 9B21EB0A C4830054
7EBC004C 7EB8004C 7E68004C 8666004C 7E7600CB 5E5FC99B 10C48300 544ACA9A
7ED0004C 7EC6004C 7EC40014 E220004C 7EC2004C 7EC0004C 7EBE004C 7EBA004C
7ED8004C 7ED7004C 7ED6004C 7ED5004C 7ED4004C 7ED3004C 7ED2004C 7ED1004C
7E82004C 866A004C 866E004C 7E92004C 8668004C 7E7A004C 7E66004C 7ED9004C
89E2004C 7EDA004C 7EE53FE0 00000000 0000004C 7EB4004C 7E6C004C 7E6A004C
7EA2004C 89EA004C 89E6004C 7F1E004C 7E80004C 89F2004C 89EE004C 89E4004C
7EF6004C 7EF0004C 7EEE004C 7EEC004C 7EEA004C 7EAE004C 7EA6004C 7EAA004C
7EB2004C 7EF2004C 7F04004C 7F02004C 7F00004C 7EFE004C 7EFC004C 7EFA004C
F92E004C 7E44004C 7E2C004C 7E03004C 7C64004C 7DE1004C 7DD00014 951F004C
FF2EA1BA 36FF2EA1 BC36FF2E 57560000 04C85756 004C7E5F 004C7E5A 00640014
C836FF2E 57565E5F 0054DE28 9A5002E0 C1058BA1 C23EC52E A1BE36FF 2EA1C036
C70044D4 319A5E5F 0054DE28 9A013668 A1CA36FF 2EA1CC36 FF2EA1C6 36FF2EA1
468B35FF 0275FFA1 D63EC52E 50FC468D 165B7D04 FE7E83FE 46FF03EB 0000FE46
3EC52E50 E42A058A A1D23EC5 2EFE76FF 5052A1C0 168B2EA1 BE06032E 09E0C1FE
FC76FF00 6A006A00 6A006AB1 7400FC7E 8312C483 0054C78E 9A50E42A 058AA1CE
0005C7A1 DE3EC52E 000005C7 A1DA3EC5 2E00449A 8B9A36EB 0AC48300 54C0489A

C02B0001 05C7A1E2 3EC52E00 2C197E9A 002C1FA7 9A002C00 009A0044 82829A00
FE7E83FE 46FF03EB 0000FE46 C7000205 C7A1E63E C52E0000 02C85756 CB5E5FC9
EA3E032E 02E7C1FE 7E8B05D9 9BA1F01E 8E2EA1EE 3E032E02 E7C1FE7E 8B287D04
C7000105 C7A1E63E C52E0000 02C85756 CB5E5FC9 9BCFEB1D D99BA1EC 1E8E2EA1
9BA1F01E 8E2EA1EE 3E032E02 E7C1FE7E 8B287D04 FE7E83FE 46FF03EB 0000FE46
8B555756 CB5E5FC9 9BCFEB1D D99BA1EC 1E8E2EA1 EA3E032E 02E7C1FE 7E8B05D9
9A0A76FF 0C76FF1F EB003407 029A0774 003D83A1 DA3EC52E 000205C7 0A7EC5EC
0005C7A1 DE3EC52E 00340702 9A057500 013D058B A1DE3EC5 2E04C483 004494DC
08C85756 CB5E5FC9 003405ED 9A000105 C7A1DE3E C52EEC8B 555756CB 5E5FC900
36FF2EA1 F836FF2E A1EA36FF 2EA1EC36 FF2E35FF A1E63EC5 2E50FA46 8D160000
7E8316C4 83004496 319AA1CA 36FF2EA1 CC36FF2E A1F236FF 2EA1F436 FF2EA1F6
ECE90001 05C70A7E C50AC483 0054C048 9A160B68 006A006A 006A006A 1D7500FA
A1CC36FF 2EFE76FF 016A50FC 468D1641 7D04FE7E 83FE46FF 03EB0000 FE46C700
BE06032E 09E0C1FE 468B5052 A1FC168B 2EA1FA06 032E0082 FE4669A1 CA36FF2E
04FE7E83 FE46FF03 EB0000FE 46C7B6EB 14C48300 3C99589A 5052A1C0 168B2EA1
C0168B2E A1BE0603 2E09E0C1 FE468B35 FF0275FF A1D63EC5 2E50FC46 8D165B7D
830054C7 8E9A50E4 2A058AA1 CE3EC52E 50E42A05 8AA1FE3E C52EFE76 FF5052A1
468D1630 EB0AC483 0054C048 9AFC76FF 006A006A 006A006A B17400FC 7E8312C4
9A0574C0 0B04C483 00545813 9A50F846 8D161674 C00B04C4 83005458 A29A50F8
46C70001 05C71C7E C500004E C85756CB 5E5FC900 0105C7A1 DA3EC52E 00343445
010E858B 105E8E0E 7E03E7D1 C27E8B01 31E9037C 04C27E83 C246FF03 EB0000C2
5E8E0E7E 0302E7C1 C27E8BCC 46890106 858B105E 8E0E7E03 E7D1C27E 8BCE4689
8BC45ED9 9B011685 D99B105E 8E0E7E03 02E7C1C2 7E8BC85E D99B0126 85D99B10
0302E7C1 C27E8B33 73005496 8A9ACC5E DE9B05D9 9B145E8E 127E0302 E7C1C27E
D99BC446 D99B1F16 FD0302E7 C1C27E8B BA5EDD9B 25D89BCC 46DF9B14 5E8E127E
9ACE5EDE 9B05D99B 145E8E12 7E0302E7 C1C27E8B FF59E9F0 5DD99BBA 4EDC9BE0
5EDD9BC8 4ED89BCE 66DE9B05 D99B145E 8E127E03 02E7C1C2 7E8B3676 0054968A
C1C27E8B FF09E9F0 5DD99BBA 46DC9BA2 0206DF2E 9B1F16FD 0302E7C1 C27E8BBA
C1C27E8B E6D1F08B 08C48300 5496EF9A 0054968F 9A05D99B 145E8E12 7E0302E7
E9F05DD9 9B1F16FD 0302E7C1 C27E8B05 DF9BFE03 A2061E8E 2EA2043E 032E09E7
D99B0091 E9037C03 C27E83C2 46FF03EB 0000C246 C7017CE9 0374021A 7E83FEC3
7E8B6774 0054968A 9ABA5EDC 9BF045D9 9B1F16FD 0302E7C1 C27E8BBA 5EDD9BEE
45D99B1F 16FD0302 E7C1C27E 8BB25ED9 9B00D085 D99B0C5E 8E0A7E03 02E7C1C2
05D99B18 5E8E167E 0302E7C1 C27E8B0C 468E0A76 0302E6C1 C2768BBA 5ED99BF0
D99B1F16 FD0302E7 C1C27E8B B246D89B BA76D89B A2080EDC 2E9B00D0 A4D8269B
8B787D03 C27E83C2 46FF03EB 0000C246 C70257E9 000005C7 1C7EC5FF 6DE9E05D
08C48300 5496EF9A 0054968F 9AA21006 DC2E9BE0 45D99B1F 16FD0302 E7C1C27E
1F16FD03 02E7C1C2 7E8B3777 0054968A 9AA2181E DC2E9B02 C4830054 969D9A50
02C48300 54969D9A 5008C483 005496EF 9A005496 8F9AA210 06DC2E9B E045D99B
46FF03EB 0000C246 C701CFE9 000005C7 1C7EC589 73005496 8A9AA220 1EDC2E9B
8F9AA210 06DC2E9B E045D99B 1F16FD03 02E7C1C2 7E8B01BC E9037C03 C27E83C2
0C5E8E0A 7E0302E7 C1C27E8B 02C48300 54969D9A 5008C483 005496EF 9A005496
A20206DF 2E9B0098 E9037C04 C27E83C2 46FF03EB 0000C246 C7B7EB00 C09DD99B
C27E8B6B 74005496 8A9ABA5E DC9BF045 D99B1F16 FD0302E7 C1C27E8B BA5EDD9B
468E0A76 0302E6C1 C2768BB2 5EDD9BF0 65D89BA2 0206DF2E 9B1F16FD 0302E7C1
0302E7C1 C27E8BBA 5EDD9B00 C08CD826 9BF045D9 9B1F16FD 0302E7C1 C27E8B0C
76DC9BBA 66DC9B0C D8269BA2 0206DF2E 9B18468E 16760302 E6C1C276 8B1F16FD
04C27E83 C246FF03 EB0000C2 46C700D4 E9000005 C71C7EC5 FF66E9D0 5DD99BB2
005496EF 9A005496 8F9AA210 06DC2E9B D045D99B 1F16FD03 02E7C1C2 7E8B777D
0302E7C1 C27E8B37 77005496 8A9AA228 1EDC2E9B 02C48300 54969D9A 5008C483
0054969D 9A5008C4 83005496 EF9A0054 968F9AA2 1006DC2E 9BD045D9 9B1F16FD
03EB0000 C246C74D EB000005 C71C7EC5 89730054 968A9AA2 301EDC2E 9B02C483
968F9AA2 1006DC2E 9BD045D9 9B1F16FD 0302E7C1 C27E8B3D 7D04C27E 83C246FF
9B0C5E8E 0A7E0302 E7C1C27E 8B02C483 0054969D 9A5008C4 83005496 EF9A0054
36FF2EA1 F236FF2E A1F436FF 2E575600 0008C857 56CB5E5F C99BBAEB 00D09DD9
7D04FA7E 83FA46FF 03EB0000 FA46C75E 5F0054DE 289A0136 68A1CA36 FF2EA1CC
3E032E02 E7C1FA7E 8B1DD99B EED99BA2 3A1E8E2E A2383E03 2E02E7C1 FA7E8B64
2EA1F436 FF2EFA76 FF006A50 F8468D16 1DD99BA2 0206DF2E 9BA23E1E 8E2EA23C
003C9958 9A5052A2 06168B2E A2040603 2E09E0C1 FA468B50 FC468D16 A1F236FF
8B555756 CB5E5FC9 000205C7 A1E63EC5 2EEC8B55 5756CB5E 5FC99B93 EB14C483
54968F9A 05D99BA2 403EC52E 000016C8 5756CB5E 5FC90001 05C7A1E6 3EC52EEC
FE76FF00 6A50FA46 8D1635FF 0275FFA2 443EC52E FE468908 C4830054 96EF9A00
A24E36FF 2EFC76FF FA76FF18 74003D80 A2483EC5 2EFC4689 0CC48300 449D439A
00549BD5 9A500012 05A25006 8B2EA252 36FF2E08 C4830054 4A8A9AA2 4C36FF2E

4A8A9AA2 5436FF2E A25636FF 2E127400 3D80A248 3EC52E35 7E32FA7E 8304C483
468B0140 E904C483 00549BD5 9A500012 05A25006 8B2EA252 36FF2E04 C4830054
789A50F4 468D1650 EC468D16 35FF0275 FFA2443E C52EF446 89F64689 F84689FC
8B1F16FD 03E7D1EA 7E8B647D 04EA7E83 EA46FF03 EB0000EA 46C70CC4 8300545B
16FD03E7 D1EA7E8B 00FFB803 EBEC458B 1F16FD03 E7D1EA7E 8B0E7D00 FF3DEC45
EC45DF9B 1F16FD03 E7D1EA7E 8B0F7E00 EC7D831F 16FD03E7 D1EA7E8B EC45891F
80A2483E C52E93EB 1DD99BA1 EC1E8E2E A1EA3E03 2E02E7C1 EA7E8BEE D99B03EB
A1EA3EC5 2E5008C4 83005496 EF9A0054 968F9A0C 45D99BA1 EA3EC52E 6D74003D
0054968F 9A0445D9 9BA1EA3E C52E5008 C4830054 96EF9A00 54968F9A 0845D99B
2E5008C4 83005496 EF9A0054 968F9A05 D99BA1EA 3EC52E50 08C48300 5496EF9A
9A500012 05A25006 8B2EA252 36FF2E0C C4830054 4A8A9AA2 5836FF2E A25A36FF
C99B04C4 83004494 7C9A0A76 FF0C76FF 000005C7 A1DA3EC5 2E04C483 00549BD5
94E9037D 00FE7E83 FE4EFF03 EB00FFFE 46C703E8 EC46C700 0014C857 56CB5E5F
5B789A50 F6468D16 50EE468D 161276FF 1476FFF6 4689F846 89FA4689 FE468B00
FE468B00 0005C70E 7EC50C75 0A463BEE 458B1F16 FD03E7D1 0C7E8B0C C4830054
2BEE458B 1F16FD03 E7D10C7E 8B117E0A 462BEE45 8B1F16FD 03E7D10C 7E8B56EB
3B058B0E 7EC50589 0E7EC5D8 F70A462B EE458B1F 16FD03E7 D10C7E8B 11EB0A46
02C85756 CB5E5FC9 FC468B03 EB40FE46 8BFF66E9 EC468905 8B0E7EC5 0B7FEC46
6A35FFA2 683EC52E A26C36FF 2EA26E36 FF2E3E75 00013D05 8BA25C3E C52E0000
00448D31 9A005496 8F9A05D9 9BA2603E C52E0054 968F9A05 D99BA264 3EC52E00
68036A00 6A50FE46 8D16002C 02F39A00 2C1D7C9A 000005C7 A25C3EC5 2E18C483
0054C048 9AFE76FF 006A006A 006A006A 137400FE 7E830AC4 830054DA BA9A01F6
5C3EC52E 0034E502 9A000002 C85756CB 5E5FC99B 000005C7 A1E23EC5 2E0AC483
A2643EC5 2E006A35 FFA2683E C52EA26C 36FF2EA2 6E36FF2E 3E750001 3D058BA2
3EC52E18 C4830044 8D319A00 54968F9A 05D99BA2 603EC52E 0054968F 9A05D99B
54DABA9A 01F66803 6A006A50 FE468D16 002C02F3 9A002C1D 7C9A0000 05C7A25C
3EC52E0A C4830054 C0489AFE 76FF006A 006A006A 006A1374 00FE7E83 0AC48300
36FF2EA1 CC36FF2E 57560034 E5029A00 0006C857 56CB5E5F C99B0000 05C7A1E2
FE46FF03 EB0000FE 46C75E5F 0054DE28 9A013668 A1C636FF 2EA1C836 FF2EA1CA
2E0082FE 4669A1CA 36FF2EA1 CC36FF2E FE76FF01 6A50FC46 8D16417D 04FE7E83
99589A50 52A1C016 8B2EA1BE 06032E09 E0C1FE46 8B5052A1 FC168B2E A1FA0603
D63EC52E 50FC468D 165B7D04 FE7E83FE 46FF03EB 0000FE46 C7B6EB14 C483003C
A1FE3EC5 2EFE76FF 5052A1C0 168B2EA1 BE06032E 09E0C1FE 468B35FF 0275FFA1
6A006AB1 7400FC7E 8312C483 0054C78E 9A50E42A 058AA1CE 3EC52E50 E42A058A
0B04C483 005458A2 9A50FA46 8D163AEB 0AC48300 54C0489A FC76FF00 6A006A00
A1DE3EC5 2E11EB00 3434459A 0774C00B 04C48300 5458139A 50FA468D 161874C0
01FECB86 C601FECA 86C60001 36C85756 CB5E5FC9 00340702 9A057500 013D058B
86C600FE D186C600 FED086C6 01FECF86 C601FECE 86C601FE CD86C601 FECC86C6
FED886C6 00FED786 C600FED6 86C600FE D586C600 FED486C6 00FED386 C600FED2
C600FEDE 86C600FE DD86C600 FEDC86C6 00FEDB86 C600FEDA 86C600FE D986C600
E586C600 FEE486C6 00FEE386 C600FEE2 86C600FE E186C600 FEE086C6 00FEDF86
00FEEB86 C600FEEA 86C602FE E986C602 FEE886C6 02FEE786 C602FEE6 86C600FE
86C600FE F186C600 FEF086C6 03FEEF86 C600FEEE 86C600FE ED86C600 FEEC86C6
00FFCE7E 81637C00 CE7E8304 C4830054 84669A50 CA468D16 00FEF386 C600FEF2
FE46C704 C483002C 27399A50 CA468D16 4E7501FE CABD80CE 7E031F16 FD8B5C7F
05D99BA1 F01E8E2E A1EE3E03 2E02E7C1 FE7E8B28 7D04FE7E 83FE46FF 03EB0000
C99B0000 05C7A1DA 3EC52ECF EB1DD99B A1EC1E8E 2EA1EA3E 032E02E7 C1FE7E8B
D53E0024 C3D0CB5E 5FC904C4 83005484 669A50CC 468D1600 0034C857 56CB5E5F
C3CE004C 292A004C 292C004C 1FD2004C 1FCE0014 7E8E0024 E1D4004C 1FCC0024
1FD00024 DD3E004C 291A004C 27D4004C 5BE2004C 290A004C 4A42004C 5BC00024
40763000 00000000 3FE00000 00000000 406FE000 00000000 004C1FD4 00FF004C
004C2894 004C28A4 C0590000 00000000 40590000 00000000 40636000 00000000
004C59DA 004C1FA1 004C1F94 004C7C64 004C1F7C 0014951F 00147B8C 004C59DC
B01E3EC5 2E005481 479A0000 16C85756 004C5BAA 004C5BA8 004C5B94 004C5B90
F846895E 5F006400 559A0380 6857565E 5F006400 409A3000 68038068 57560589
80685756 157310FA 7E83FA46 FF03EB00 00FA46C7 0003F846 C7487510 00F846F7
B02836FF 2E1D7400 3D80B022 3EC52EE2 EB5E5F00 6400409A 5008E0C1 FA468B03
2A3EC52E 006A106A F846890C E8C1F846 8B09EB04 C4830054 4A8A9AB0 2636FF2E
3EC52E0B 7500013D 058BB01E 3EC52EFE 468908C4 83005497 C69A35FF 0275FFB0
E0C1FE46 8BB02E3E C52E0380 68575600 C005C7B0 2E3EC52E 09EB0030 05C7B02E
EE468D16 106A35FF 0275FFB0 2A3EC52E 57565E5F 00640040 9A50000B 0D050B08
006A04C4 83003C8D BD9AEE76 FF006A0D 7400EE7E 83F04689 5E5F0054 3BB49A50
C52E0380 685756FA 4689058B EA7EC5EC 5689EA46 8904C483 0054B4EA 9AF076FF
50EE468D 16F076FF 57565E5F 00640040 9A50000A 0D050B08 E0C1FE46 8BB02E3E

83B0323E C52E04C4 83003C8D BD9AEE76 FF006A0D 7400EE7E 835E5F00 543B949A
5497C69A 35FF0275 FFB03A3E C52E006A 106A3674 003D83B0 363EC52E 0A75003D
00409A50 000B0D05 0B08E0C1 FC468BB0 2E3EC52E 03806857 56FC4689 08C48300
EB0004F8 4E810775 00013D05 8BB01E3E C52E02C4 830044AD E89A006A 5E5F0064
02680380 6857565E 5F006400 409A5010 000DF846 8B038068 57560008 F84E8105
8BB03E3E C52EF246 89007725 5E5F0064 00559A03 80685756 5E5F0064 00409A30
C74FEB00 06F446C7 56EB0005 F446C75D EB0004F4 46C764EB 0003F446 C738EB05
08B9A4CC BB33EB00 06F446C7 3AEB0005 F446C741 EB0004F4 46C748EB 0003F446
A4830070 00580048 00380006 00050004 00031067 FF2E2475 F9E0073B 2E434300
007025F2 468B1175 00013D05 8BB01E3E C52EA4B4 A4ADA4A6 A49FA498 A491A48A
F6468920 000DC70B 04E0C1F4 468B0007 E781F27E 8B15EBF6 46892000 0DF4460B
00680380 68575600 0002C857 56CB5E5F C95E5F00 6400409A F676FF03 80685756
FE46890C E8C1FE46 8BFE4689 5E5F0064 00559A03 80685756 5E5F0064 00409A30
FE468B03 80685756 FFF7FE66 8105EBFF FBFE6681 07750001 3D058BB0 1E3EC52E
4D750020 05F7B042 3EC52E00 0014C857 56CB5E5F C95E5F00 6400409A 5010000D
00F67E83 0589107E C55E5F00 543BB49A 50F6468D 160E76FF 0A76FF0C 76FF5756
468904C4 830054B4 EA9A35FF 107EC500 6A04C483 003C8DBD 9AF676FF 006A0D74
058BB01E 3EC52E05 89B01E3E C52E0054 81479A07 F7E9F256 8BF0468B F25689F0
468BB046 3EC52E00 C005C7B0 2E3EC52E 09EB0030 05C7B02E 3EC52E0B 7500013D
D2830000 05FE568B FC468B14 75000E7E 83FE5689 FC468902 551B052B 0C568B0A
81B04A3E C52EFA56 89F84689 FE5613FC 4603D22B 0E468B11 EBFA5689 F8468901
46C70000 F846C70A 7600F87E 83107C08 7F20FA7E 83187500 3D831D75 00C0027D
7C087F10 FA7E83F4 46FF0376 00FC7E83 097C087F 10FE7E83 0000F446 C70020FA
7F20FA7E 83F446FF 037600FC 7E83097C 087F20FE 7E83F446 FF037600 F87E8309
FA7E83F4 46FF0376 00FC7E83 097C087F 30FE7E83 F446FF03 7600F87E 83097C08
575602C4 830044AD E89A006A 06D4E9F4 468BF446 FF037600 F87E8309 7C087F30
0D7400F6 7E830589 107EC55E 5F00543B B49A50F6 468D160E 76FF0A76 FF0C76FF
89F04689 04C48300 54B4EA9A 35FF107E C5006A04 C483003C 8DBD9AF6 76FF006A
160E76FF 57560044 AE5D9A05 75003D83 B04E3EC5 2E0699E9 F2568BF0 468BF256
8DBD9AF6 76FF006A 0D7400F6 7E830589 B0523EC5 2E5E5F00 543A809A 50F6468D
02558905 89B0563E C52E04C4 830054B4 EA9A35FF B0523EC5 2E006A04 C483003C
00002DFA 568BF846 8BEE4689 FE561BFC 462B0010 BAC02B00 0005C7B0 5A3EC52E
8B025589 0589B05E 3EC52E0C 568B0A46 8B000005 C7B04E3E C52EEC46 8910DA83
FF575602 C4830044 ADE89A00 6A0589B0 663EC52E EC468B05 89B0623E C52EEE46
6A0D7400 F67E8305 89107EC5 5E5F0054 3BB49A50 F6468D16 EE76FF0A 76FF0C76
5689F046 8904C483 0054B4EA 9A35FF10 7EC5006A 04C48300 3C8DBD9A F676FF00
5E5F0054 DEA69A50 E8D1EE46 8BF076FF F276FF35 FF0275FF B0563EC5 2E5756F2
BD9AF676 FF006A0D 7400F67E 835E5F00 543B949A 50F6468D 1635FF10 7EC55756
16EC76FF 35FF0275 FFB0463E C52E5756 02C48300 44ADE89A 016A04C4 83003C8D
003C8DBD 9AF676FF 006A0D74 00F67E83 0589107E C55E5F00 543BB49A 50F6468D
8BB0563E C52E5756 F25689F0 468904C4 830054B4 EA9A35FF 107EC500 6A04C483
5E5F0054 DEA69A50 E8D1EC46 8BF076FF F276FF50 5202558B 0503E0D1 E8D1EE46
2D0C568B 0A468B57 5602C483 0044ADE8 9A016A04 D7E90255 8B058BB0 563EC52E
7400F67E 83058910 7EC55E5F 00543BB4 9A50F646 8D160E76 FF505210 DA830000
F0468904 C4830054 B4EA9A35 FF107EC5 006A04C4 83003C8D BD9AF676 FF006A0D
0E76FF57 560044AE 5D9A0575 003D83B0 4E3EC52E 0478E9F2 568BF046 8BF25689
BD9AF676 FF006A0D 7400F67E 830589B0 523EC52E 5E5F0054 3A809A50 F6468D16
55890589 B0563EC5 2E04C483 0054B4EA 9A35FFB0 523EC52E 006A04C4 83003C8D
4689FE56 1BFC462B 0020BAC0 2B000105 C7B05A3E C52E0000 05C7B04E 3EC52E02
5E3EC52E 10DA8300 002D0C56 8B0A468B EC468920 DA830000 2DFA568B F8468BEE
44ADE89A 016A0589 B0663EC5 2EEC468B 0589B062 3EC52EEE 468B0255 890589B0
543BB49A 50F6468D 16EE76FF 505210DA 8300002D 0C568B0A 468B5756 02C48300
107EC500 6A04C483 003C8DBD 9AF676FF 006A0D74 00F67E83 0589107E C55E5F00
FFF276FF 35FF0275 FFB0563E C52E5756 F25689F0 468904C4 830054B4 EA9A35FF
35FF107E C5575602 C4830044 ADE89A02 6A5E5F00 54DEA69A 50E8D1EE 468BF076
5604C483 003C8DBD 9AF676FF 006A0D74 00F67E83 5E5F0054 3B949A50 F6468D16
83058910 7EC55E5F 00543BB4 9A50F646 8D16EC76 FF35FF02 75FFB046 3EC52E57
C4830054 B4EA9A35 FF107EC5 006A04C4 83003C8D BD9AF676 FF006A0D 7400F67E
FFF276FF 50520255 8B0503E0 D1E8D1EE 468BB056 3EC52E57 56F25689 F0468904
E89A026A 02A8E902 558B058B B0563EC5 2E5E5F00 54DEA69A 50E8D1EC 468BF076
B49A50F6 468D160E 76FF5052 20DA8300 002D0C56 8B0A468B 575602C4 830044AD
C5006A04 C483003C 8DBD9AF6 76FF006A 0D7400F6 7E830589 107EC55E 5F00543B
B04E3EC5 2E0249E9 F2568BF0 468BF256 89F04689 04C48300 54B4EA9A 35FF107E
B0523EC5 2E5E5F00 543A809A 50F6468D 160E76FF 57560044 AE5D9A05 75003D83

EA9A35FF B0523EC5 2E006A04 C483003C 8DBD9AF6 76FF006A 0D7400F6 7E830589
05C7B05A 3EC52E00 0005C7B0 4E3EC52E 02558905 89B0563E C52E04C4 830054B4
8BEC4689 30DA8300 002DFA56 8BF8468B EE4689FE 561BFC46 2B0030BA C02B0002
8B0589B0 623EC52E EE468B02 55890589 B05E3EC5 2E20DA83 00002D0C 568B0A46
DA830000 2D0C568B 0A468B57 5602C483 0044ADE8 9A026A05 89B0663E C52EEC46
FF006A0D 7400F67E 83058910 7EC55E5F 00543BB4 9A50F646 8D16EE76 FF505220
56F25689 F0468904 C4830054 B4EA9A35 FF107EC5 006A04C4 83003C8D BD9AF676
036A5E5F 0054DEA6 9A50E8D1 EE468BF0 76FFF276 FF35FF02 75FFB056 3EC52E57
7400F67E 835E5F00 543B949A 50F6468D 1635FF10 7EC55756 02C48300 44ADE89A
468D16EC 76FF35FF 0275FFB0 463EC52E 575604C4 83003C8D BD9AF676 FF006A0D
C483003C 8DBD9AF6 76FF006A 0D7400F6 7E830589 107EC55E 5F00543B B49A50F6
EE468BB0 563EC52E 5756F256 89F04689 04C48300 54B4EA9A 35FF107E C5006A04
C52E5E5F 0054DEA6 9A50E8D1 EC468BF0 76FFF276 FF505202 558B0503 E0D1E8D1
8300002D 0C568B0A 468B5756 02C48300 44ADE89A 036A7AEB 02558B05 8BB0563E
006A0D74 00F67E83 0589107E C55E5F00 543BB49A 50F6468D 160E76FF 505230DA
F25689F0 468904C4 830054B4 EA9A35FF 107EC500 6A04C483 003C8DBD 9AF676FF
AB3CA96C A90DA74B A6F4ADD6 A7FF2ED8 8BE0D117 7700063D 1CEBF256 8BF0468B
C52E006A 106A5F74 02450B05 8BB0463E C52E0000 08C85756 CB5E5FC9 AD6AAB9B
6A106AFA 5689F846 89990A46 8BFE4689 08C48300 5497C69A 35FF0275 FFB0463E
80685756 FC4689FA 5613F846 0308C483 005497C6 9A35FF02 75FFB04A 3EC52E00
C85756CB 5E5FC95E 5F006400 409A50FC 460B050B 08E0C1FE 468BB02E 3EC52E03
5602C483 0044ADE8 9A35FFB0 5A3EC52E 016BE903 74003D83 B04E3EC5 2E000008
46895E5F 00543BB4 9A50FC46 8D1635FF B0623EC5 2E35FF02 75FFB05E 3EC52E57
C4830054 B4EA9AFE 76FF006A 04C48300 3C8DBD9A FC76FF00 6A0D7400 FC7E83FE
058BB062 3EC52E35 FF0275FF B0563EC5 2EF876FF FA76FF57 56FA5689 F8468904
7400FC7E 835E5F00 543B949A 50FC468D 16FE76FF 57565E5F 0054DEA6 9A50E8D1
5602C483 0044ADE8 9A504005 8BB05A3E C52E04C4 83003C8D BD9AFC76 FF006A0D
46895E5F 00543BB4 9A50FC46 8D1635FF B0663EC5 2E35FF02 75FFB046 3EC52E57
C4830054 B4EA9AFE 76FF006A 04C48300 3C8DBD9A FC76FF00 6A0D7400 FC7E83FE
26E0D1E8 D1058BB0 623EC52E B05636C4 2EF876FF FA76FF57 56FA5689 F8468904
8D16FE76 FF57565E 5F0054DE A69A50E8 D1058BB0 663EC52E 50520254 8B260403
835E5F00 543A609A 50FC468D 1635FFB0 523EC52E 57565E5F 00543B94 9A50FC46
56CB5E5F C9000105 C7B04E3E C52E04C4 83003C8D BD9AFC76 FF006A0D 7400FC7E
00543B94 9A50FE46 8D160A76 FF575629 7402450B 058BB046 3EC52E00 0002C857
8C26CB5E 5FC90044 AE5D9A04 C483003C 8DBD9AFE 76FF006A 0D7400FE 7E835E5F
943A0014 94420014 7B7C0014 7B7A004C 8C280014 9436004C 8C000014 951F004C
8C30004C 8C38004C 8C2A004C 8C2E004C 8C240014 94320014 93E40014 93740014
0005C71A 7EC50008 F046C700 01F246C7 00002CC8 5756004C 8C36004C 8C34004C
EB0588D4 468BD47E 03BE463E C52E0F7D 0100D47E 81D446FF 03EB0000 D446C700
03E7D1D4 7E8B297D 0100D47E 81D446FF 03EB0000 D446C73A 7416460B 18468BE7
88D47E03 BE463EC5 2E058B18 5E8E167E 03E7D1D4 7E8BE674 003D8318 5E8E167E
1A7EC50A C4830054 7D079A01 6ABE4A36 FF2EBE4C 36FF2E1A 76FF1C76 FFCDEB05
4A3EC52E 00F646C6 00F746C6 00F946C6 01FA46C6 00FB46C6 0C2EE903 74003D83
2E164589 3DC5BE4A 3EC52E40 042B2602 458B127E C51276C4 00002C45 C73DC5BE
012E45C7 3DC5BE4A 3EC52E00 012845C7 3DC5BE4A 3EC52E2A 45893DC5 BE4A3EC5
3DC5BE4A 3EC52E3C 4589C02B 3DC5BE4A 3EC52E00 003245C7 3DC5BE4A 3EC52E00
C52E058B BE4E3EC5 2E364589 3DC5BE4A 3EC52E38 45893DC5 BE4A3EC5 2E3A4589
404C45C7 3DC5BE4A 3EC52E0E 75003D83 BE4E3EC5 2E02F446 C605893D C5BE4A3E
75140C7E 83067415 0C7E830C 74130C7E 83000F4C 45C73DC5 BE4A3EC5 2E0CEB00
F5468800 0C05EE46 8B0778E9 0A468B00 03EE46C7 05EB0001 EE46C701 F946C60B
4E45C73D C5BE4A3E C52EF746 88E42AF6 4688E42A F5468AF8 4688000C 05EE468B
3DC5BE4A 3EC52E0A 45893DC5 BE4A3EC5 2E084589 0003B83D C5BE4A3E C52E000C
C52E2675 003D83BE 4E3EC52E 03F446C6 48558946 4589BE54 168B2EBE 52068B2E
00740002 9A010068 506ABE52 36FF2EBE 5436FF2E 57560101 4C45C73D C5BE4A3E
00D446C7 5E5F0074 00029A01 0068006A BE5236FF 2EBE5436 FF2E5756 18EB5E5F
8B2EBE52 06032ED4 4603F046 8B575606 F6E9037C 0100D47E 8110D446 8304EB00
0C05EE46 8BF54688 000C05EE 468BD1EB 5E5F0074 00029A08 6A406A50 52BE5416
F5468800 0805EE46 8B00F946 C606B4E9 00084E45 C73DC5BE 4A3EC52E F8468800
46C60475 00107D83 127EC500 094E45C7 3DC5BE4A 3EC52EF8 4688000C 05EE468B
10458B12 7EC51645 893DC5BE 4A3EC52E 4026442B 262A458B 127EC512 76C401FB
14458B12 7EC52E45 893DC5BE 4A3EC52E 14458B12 7EC52845 893DC5BE 4A3EC52E
45893DC5 BE4A3EC5 2E344589 C02B3DC5 BE4A3EC5 2E304589 3DC5BE4A 3EC52E40
45893DC5 BE4A3EC5 2E1E458B 127EC538 45893DC5 BE4A3EC5 2E12458B 127EC532
45893DC5 BE4A3EC5 2E18458B 127EC53C 45893DC5 BE4A3EC5 2E16458B 127EC536

01014C45 C73DC5BE 4A3EC52E 0C75003D 83BE4E3E C52E05DD E9037511 0A7E833A
2E32458B 127EC500 0C4E45C7 3DC5BE4A 3EC52EF7 4688E42A F64688E4 2AF8468A
4A3EC52E 30558B2E 458B127E C50A4589 3DC5BE4A 3EC52E08 45893DC5 BE4A3EC5
24458B12 7EC52C75 01EE7E83 00F946C6 0577E903 F446C648 55894645 893DC5BE
0C05EE46 8B0B7500 143D2445 8B127EC5 0B740015 3D24458B 127EC516 7400133D
E900064E 45C73DC5 BE4A3EC5 2EF54688 000805EE 468B0FF8 46C604EB F8468800
46C60509 E900044E 45C73DC5 BE4A3EC5 2E07F846 C6F54688 000805EE 468B0525
468B03F5 46C604ED E900024E 45C73DC5 BE4A3EC5 2EF84688 000C05EE 468B03F5
000C05EE 468B03F5 46C604D1 E9000D4E 45C73DC5 BE4A3EC5 2EF84688 000C05EE
45C73DC5 BE4A3EC5 2E0CEB00 004E45C7 3DC5BE4A 3EC52E0E 75080A7E 83F84688
EC5689EA 46899910 458B127E C5284589 3DC5BE4A 3EC52E10 458B127E C5000E4E
C5EC5689 EA4689FA E2D2D1E0 D1EC568B EA468B00 10B915EB 01FB46C6 0675C20B
127EC538 45893DC5 BE4A3EC5 2E12458B 127EC5EC 5611EA46 01D22B12 458B127E
127EC53A 45893DC5 BE4A3EC5 2E18458B 127EC53C 45893DC5 BE4A3EC5 2E16458B
DA76FFDC 76FF50EA 468D16DC 5689DA46 89FAE2D2 D1E0D100 10B90E55 8B0C458B
00DA8300 012DE856 13E64603 99058B12 7EC5E856 89E64689 08C48300 5497CC9A
8B0010B9 EC5689EA 46899914 458B127E C5009AE9 037401FB 7E800245 89127EC5
C5EC5611 EA4601D2 2B16458B 127EC5EC 5689EA46 89FAE2D2 D1E0D1EC 568BEA46
29D22B18 458B127E C5E05689 DE4689FA E2D2D1E0 D10010B9 0A558B08 458B127E
8D16E456 89E24689 08C48300 5497CC9A DE76FFE0 76FF50EA 468D16E0 5619DE46
468300BD E90375DE 463B0875 E0563B08 C4830054 97D89AE2 76FFE476 FF50EA46
46891A45 8B127EC5 E05689DE 46890A55 8B08458B 127EC500 B2E900E4 568301E2
D1E0D100 01B90E55 8B0C458B 127EC5D8 46891644 03261845 8B127EC5 1276C4D6
0000E246 C70E4601 E0D108C4 83005497 D29A5052 99C78B4F D67E8B50 52FAE2D2
0C731645 3BD8468B 127EC533 77DE463B 387F077C E0563B99 D6468B00 00E446C7
4683D846 0116458B 127EC5D6 46011445 8B127EC5 09EBD646 01401445 8B127EC5
458B127E C51C5589 1A458912 7EC5E056 1BDE462B 99D6468B BDEB00E4 568301E2
2B16458B 127EC550 E2468D16 06458912 7EC500DA 8300012D E45613E2 46039904
458B127E C550000C 0512468B 1476FF18 4501127E C508C483 005497DE 9A5052D2
50000C05 12468B14 76FF2A45 893DC5BE 4A3EC52E 08C48300 5497D89A 50529914
76C42C45 893DC5BE 4A3EC52E 08C48300 5497D89A 505299C6 8B461475 8B127EC5
46880008 05EE468B 01EFE916 45893DC5 BE4A3EC5 2E40042B 2602458B 127EC512
0C05EE46 8B02F546 C6197509 0A7E8300 044E45C7 3DC5BE4A 3EC52E06 F846C6F5
2845893D C5BE4A3E C52E1045 8B127EC5 00004E45 C73DC5BE 4A3EC52E F8468800
458B127E C500FB46 C604EB01 FB46C606 75C20BEC 5689EA46 89991045 8B127EC5
458B127E C53C4589 3DC5BE4A 3EC52E16 458B127E C5384589 3DC5BE4A 3EC52E12
468B1476 FF364589 3DC5BE4A 3EC52E1E 458B127E C53A4589 3DC5BE4A 3EC52E18
2A45893D C5BE4A3E C52E08C4 83005497 D89A5052 9914458B 127EC550 000C0512
C52E08C4 83005497 D89A5052 99C68B46 14758B12 7EC55000 0C051246 8B1476FF
E9164589 3DC5BE4A 3EC52E40 042B2602 458B127E C51276C4 2C45893D C5BE4A3E
E900F946 C600044E 45C73DC5 BE4A3EC5 2E06F846 C6F54688 000805EE 468B00E5
E900F946 C600024E 45C73DC5 BE4A3EC5 2EF84688 000C05EE 468B02F5 46C600C5
46C60089 E900004E 45C73DC5 BE4A3EC5 2EF84688 000C05EE 468B03F5 46C600A5
8B127EC5 1276C402 6A00004E 45C73DC5 BE4A3EC5 2EF84688 000C05EE 468B03F5
05C71A7E C54C75C2 0B105689 0E468904 C4830054 DC339A50 E0D14004 2B260245
30B2D2B9 7DA7FF2E D88BE0D1 F1770014 3D03C7E9 108705C7 1A7EC503 D1E9D303
F3B8C2B8 E2B8C2B8 E2B965B9 65B7B8B7 D1B4D6B9 02B1F7B9 1EB49EB4 82B430B4
0001B9FE 560BFC46 0B99E42A FB468A00 00FE46C7 0000FC46 C7B4D6B4 BAB2F3B2
E2D2D1E0 D10001B9 FE560BFC 460B99E4 2AFA468A FE5689FC 4689FAE2 D2D1E0D1
89FC4689 FAE2D2D1 E0D10005 B9FE560B FC460B99 E42AF946 8AFE5689 FC4689FA
F7468AFE 5689FC46 89FAE2D2 D1E0D100 05B9FE56 0BFC460B 99E42AF8 468AFE56
460B99E4 2AF6468A FE5689FC 4689FAE2 D2D1E0D1 0005B9FE 560BFC46 0B99E42A
B9FE560B FC460B99 E42AF546 8AFE5689 FC4689FA E2D2D1E0 D10005B9 FE560BFC
C5BE4A3E C52EFE56 09FC4609 99E42AF4 468AFE56 89FC4689 FAE2D2D1 E0D10002
C5BE4A3E C52E0645 890C468B 3DC5BE4A 3EC52E04 55890245 89FE568B FC468B3D
2E058B12 7EC51055 890E4589 10568B0E 468B3DC5 BE4A3EC5 2E0C4589 0C468B3D
3EC52E18 45893DC5 BE4A3EC5 2E16458B 3DC5BE4A 3EC52E12 45893DC5 BE4A3EC5
2B260645 8B127EC5 1276C400 011C45C7 3DC5BE4A 3EC52E00 001A45C7 3DC5BE4A
22558920 45891056 8B0E468B 3DC5BE4A 3EC52E1E 45893DC5 BE4A3EC5 2E400444
BE48168B 2EBE4606 8B2E3DC5 BE4A3EC5 2E244589 3DC5BE4A 3EC52E05 8B127EC5
7E830674 0F0A7E83 0C74100A 7E830000 4A45C73D C5BE4A3E C52E4055 893E4589
4A3EC52E 1845893D C5BE4A3E C52E4020 442B2622 458B127E C51276C4 2275020A
8B127EC5 1445893D C5BE4A3E C52E0445 8B127EC5 009EE90A 468B2A45 893DC5BE
E9264589 3DC5BE4A 3EC52E04 458B127E C500AFE9 2645893D C5BE4A3E C52E0445

7EC51445 893DC5BE 4A3EC52E 04458B12 7EC50000 2A45C73D C5BE4A3E C52E009C
5E75140C 7E830674 150C7E83 0C74130C 7E832645 893DC5BE 4A3EC52E 04458B12
C52E4074 003D83BE 4E3EC52E 2C65D13D C5BE4A3E C52E2A65 D13DC5BE 4A3EC52E
BBCEBBAF BBAFBBAF BC38A7FF 2ED88BE0 D12F7700 123D34EB 1865D13D C5BE4A3E
468BBBAF BBAFBB8C BB8CBB8C BB8CBC5E BC5EBBCE BBCEBBCE BBC2BBAF BBC2BBCE
2B262C45 8B127EC5 1276C47E EB144589 3DC5BE4A 3EC52E04 458B127E C55CEB0A
127EC50C 45893DC5 BE4A3EC5 2E24458B 127EC51E 45893DC5 BE4A3EC5 2E402844
3D34EB12 45893DC5 BE4A3EC5 2E26458B 127EC514 45893DC5 BE4A3EC5 2E28458B
F3BCF3BC F3BC63BC F3BCF3BC F3BC8DBC 8DBC63BC CDA7FF2E D88BE0D1 2F770012
FF2EBE4C 36FF2E1A 76FF1C76 FFBC75BC 75BCF3BC F3BCF3BC F3BCF3BC F3BCF3BC
89127EC5 4006458B 127EC50D 75080A7E 830CC483 00547D59 9A016A07 6ABE4A36
C4EC8B55 5756CB5E 5FC904C4 830054DC 759A0E76 FF1076FF 0E75050A 7E830445
468B3DC5 BE4A3EC5 2E1E4589 3DC5BE4A 3EC52E40 04442B26 06458B10 7EC51076
8B107EC5 34EB0A46 8B105589 0E45893D C5BE4A3E C52E2255 89204589 0E568B0C
7EC51445 893DC5BE 4A3EC52E 04458B10 7EC552EB 2645893D C5BE4A3E C52E0445
BD7CBDBE A7FF2ED8 8BE0D12B 7700103D 30EB2645 893DC5BE 4A3EC52E 04458B10
BD8EBD8E BD8EBD8E BDE0BDE0 BD8EBD8E BD8EBD8E BD7CBD8E BD8EBD8E BD7CBD7C
D88BE0D1 17770006 3D1CEB14 45893DC5 BE4A3EC5 2E04458B 107EC512 EB0A468B
FF2EBE4C 36FF2E14 76FF1676 FFBDE5BE 13BE13BE 13BDE5BD E5BDE5BE 05A7FF2E
89107EC5 4006458B 107EC50D 75080A7E 830CC483 00547D59 9A016A07 6ABE4A36
00F646C7 00000CC8 5756004C 72A0004C 8464004C 719C004C 71A0CB5E 5FC90445
2CFC9C9A 096ACAA6 36FF2ECA A836FF2E 147E003D 83CAA23E C52E00FF F446C700
CAAE36FF 2ECAB036 FF2E04C4 83003C81 649ACAAA 36FF2ECA AC36FF2E 06C48300
80CAB63E C52E04C4 83003C85 9B9ACAB2 36FF2ECA B436FF2E 04C48300 3C7FF29A
36FF2E06 C4830054 4A8A9ACA BA36FF2E CABC36FF 2E35FFCA B23EC52E 1974003D
04C48300 5464499A 50FA468D 1604C483 00549BD5 9A500012 05CABE06 8B2ECAC0
E7D1FE7E 8B167D01 00FE7E81 FE46FF03 EB0000FE 46C70589 CAC23EC5 2EFA468B
36FF2E3D 7500023D 058BCACA 3EC52EE0 EB0589F6 468BCAC8 1E8E2ECA C63E032E
FE7E81FE 46FF03EB FE4689F8 468BF846 8904C483 0044C73A 9ACACE36 FF2ECAD0
2ECAD436 FF2EE0EB 0589F446 8BCAC81E 8E2ECAC6 3E032EE7 D1FE7E8B 537D0100
7FF8463B FE468BFE 46FF03EB 0000FE46 C7F84689 04C48300 44C73A9A CAD236FF
50FC468D 16006A57 56DFEB05 89F4468B CAC81E8E 2ECAC63E 032EE7D1 FE7E8B16
9AFC76FF 006A006A 006A006A 137400FC 7E830589 CAD63EC5 2E5E5F00 543A809A
890589CA DA3EC52E 04C48300 54B4EA9A 35FFCAD6 3EC52E00 6A0AC483 0054C048
0B750002 3D058BCA CA3EC52E 04C48300 54A4509A 35FF0275 FFCADA3E C52E0255
032E03E0 C1058BCA DE3EC52E 000705C7 CADE3EC5 2E09EB00 0005C7CA DE3EC52E
00FE46C7 08C48300 44C8439A 35FF0275 FFCADA3E C52E5052 CAE4168B 2ECAE206
FE7E8B05 8BCAEC1E 8E2ECAEA 3E032EE7 D1FE7E8B 467D03FE 7E83FE46 FF03EB00
8B058BCA A81E8E2E CAA63E03 2EE7D1FE 7E8B0589 CAE81E8E 2ECAE63E 032EE7D1
FF2E3E75 00013D05 8BCAF23E C52EB1EB 0589CAF0 1E8E2ECA EE3E032E E7D1FE7E
C52E0054 968F9A05 D99BCAFA 3EC52E00 6A35FFCA FE3EC52E CB0236FF 2ECB0436
063EC52E FFFF05C7 CAF23EC5 2E18C483 00448D31 9A005496 8F9A05D9 9BCAF63E
02C85756 CB5E5FC9 9B000105 C7CB0E3E C52E0001 05C7CB0A 3EC52E00 0005C7CB
06C48300 2CFC9C9A 0B6ACAA6 36FF2ECA A836FF2E 147E003D 83CAA23E C52E0000
3A609A50 FE468D16 35FFCAD6 3EC52E57 560044C4 3F9A0574 003D83CB 063EC52E
3EC52E0A C4830054 C0489AFE 76FF006A 006A006A 006A1374 00FE7E83 5E5F0054
C52E002C E9999A05 75003D83 CB163EC5 2E000005 C7CAF23E C52E0001 05C7CB12
CB0A3EC5 2E0E7400 3D83CB06 3EC52E00 0002C857 56CB5E5F C9000005 C7CB0E3E
7E835E5F 00543A60 9A50FE46 8D1635FF CAD63EC5 2E575600 44C43F9A 000005C7
0006C857 56CB5E5F C90AC483 0054C048 9AFE76FF 006A006A 006A006A 137400FE
26750001 3D058BCA C23EC52E 327502FA 7E8304C4 83005464 499A50FA 468D1600
5494889A CAEE36FF 2ECAF036 FF2E04C4 83005494 889ACAE6 36FF2ECA E836FF2E
36FF2ECA E836FF2E 24750002 3D058BCA C23EC52E 307501FA 7E8336EB 04C48300
00FC46C7 04C48300 5494F89A CAEE36FF 2ECAF036 FF2E04C4 83005494 F89ACAE6
FC7E8B05 8BCAE81E 8E2ECAE6 3E032EE7 D1FC7E8B 467D03FC 7E83FC46 FF03EB00
8B058BCA F01E8E2E CAEE3E03 2EE7D1FC 7E8B0589 CAEC1E8E 2ECAEA3E 032EE7D1
A836FF2E 147E003D 83CAA23E C52EB1EB 0589CAA8 1E8E2ECA A63E032E E7D1FC7E
9A077400 3D83CB06 3EC52E00 44CB7A9A 06C48300 2CFC9C9A 0A6ACAA6 36FF2ECA
CB1C36FF 2ECB1E36 FF2ECB20 36FF2E00 6A006A00 6A50FE46 8D1661EB 0044C43F
489AFE76 FF006A00 6A006A00 6A347400 FE7E8312 C483003C 7D919ACB 1A36FF2E
8300544A 8A9ACB22 36FF2ECB 2436FF2E 1274003D 80CAB63E C52E0AC4 830054C0
3EC52ECB 0236FF2E CB0436FF 2E3E75FF FF3D058B CAF23EC5 2E00442B 8C9A04C4
0054968F 9A05D99B CAF63EC5 2E005496 8F9A05D9 9BCAFA3E C52E016A 35FFCAFE
9A50FE46 8D1635FF CAD63EC5 2E575600 0105C7CA F23EC52E 18C48300 448D319A

```
2E0AC483 0054C048 9AFE76FF 006A006A 006A006A 137400FE 7E835E5F 00543A60
2836FF2E 1274003D 80CAB63E C52EEC8B 555756CB 5E5FC99B 000005C7 CB0E3EC5
549BD59A 50001205 CABE068B 2ECAC036 FF2E04C4 8300544A 8A9ACB26 36FF2ECB
56CB5E5F C90044C4 BE9A04C4 83003C81 2C9ACAC6 36FF2ECA C836FF2E 04C48300
04C48300 544A8A9A CB2A36FF 2ECB2C36 FF2E1274 003D80CA B63EC52E EC8B5557
CAAA36FF 2ECAAC36 FF2E04C4 8300549B D59A5000 1205CABE 068B2ECA C036FF2E
1E36FF2E CB2036FF 2E237400 3D83CB0A 3EC52E00 44C5AE9A 04C48300 3C812C9A
5756CB5E 5FC90AC4 83003C85 0B9A35FF CAB23EC5 2ECB1A36 FF2ECB1C 36FF2ECB
04C48300 544A8A9A CB2E36FF 2ECB3036 FF2E1274 003D80CA B63EC52E 004002C8
3D75003D 83CB063E C52E04C4 8300549B D59A5000 1205CABE 068B2ECA C036FF2E
868D1604 C4830044 C61B9A50 C000868D 1602C483 003C81D4 9A35FFCB 323EC52E
868D1604 C483003C 7C959A35 FF0275FF CADA3EC5 2E04C483 003C7FBA 9A50C000
7D919ACB 1A36FF2E CB1C36FF 2ECB1E36 FF2ECB20 36FF2E00 6A006A00 6A50BFFE
0AC48300 54C0489A BFFEB6FF 006A006A 006A006A 357400BF FEBE8312 C483003C
442B8C9A 04C48300 544A8A9A CB3636FF 2ECB3836 FF2E1274 003D80CA B63EC52E
36FF2E12 74003D80 CAB63EC5 2EEC8B55 5756CB5E 5FC90001 05C7CB06 3EC52E00
9BD59A50 001205CA BE068B2E CAC036FF 2E04C483 00544A8A 9ACB3A36 FF2ECB3C
3E3EC52E 04C48300 3C7FBA9A CAAE36FF 2ECAB036 FF2E003C 825E9A04 C4830054
0006C857 56CB5E5F C9000005 C7CB063E C52E04C4 83003C7C 959A35FF 0275FFCB
36FF2E04 C4830054 4A8A9ACB 4236FF2E CB4436FF 2E127400 3D80CAB6 3EC52E00
0000FC46 C7FF4688 0044C698 9A04C483 00549BD5 9A500012 05CABE06 8B2ECAC0
FC7E8BE5 7D0080FA 7E81FA46 FF03EB00 00FA46C7 287D0080 FC7E81FC 46FF03EB
46C70000 10C85756 CB5E5FC9 DFEB0588 98FF468A 0C5E8E0A 7E03FA7E 0307E7C1
4836FF2E 1274003D 80CAB63E C52E0000 FC46C700 00FA46C7 0001FE46 C70001F8
549BD59A 50001205 CABE068B 2ECAC036 FF2E04C4 8300544A 8A9ACB46 36FF2ECB
46DF9BF2 4689F846 8BF64689 C70BFE46 0BE0D1FC 468B02E7 C1FA7E8B 04C48300
C1F47E8B F44689C0 2B02EB00 01B80572 0054968A 9ACB4A1E DC2E9BF2 66DE9BF8
000008C8 5756CB5E 5FC99B98 F1468AF1 468898F6 460BC70B 04E0C1F2 468B03E7
8E0A7603 E6D1FE76 8B2C7D03 FE7E83FE 46FF03EB 0000FE46 C7F85ED9 9BEED99B
5ED99BF8 46D89B0C DE269B05 D99BCB54 1E8E2ECB 523E032E 02E7C1FE 7E8B0C46
FC7E81FC 468908C4 83005496 EF9A0054 968F9ACB 4A06DC2E 9BF846D9 9BCBEBF8
4A8A9ACB 5636FF2E CB5836FF 2E127400 3D80CAB6 3EC52E00 FFFC46C7 057E00FF
8BED7400 3D80CAB6 3EC52E2B 7D03FE7E 83FE46FF 03EB0000 FE46C704 C4830054
CCEB06C4 8300544A 8A9ACB5A 36FF2ECB 5C36FF2E 35FF0C5E 8E0A7E03 E7D1FE7E
B63EC52E 04C48300 544A8A9A CB5E36FF 2ECB6036 FF2E1274 003D80CA B63EC52E
C99BFC46 8B06C483 00544A8A 9ACB6236 FF2ECB64 36FF2EFC 76FF1574 003D80CA
0005FC56 8BFA468B FC5689FA 46892780 050C568B 0A468B00 0012C857 56CB5E5F
89400005 F4568BF2 468BF456 89F24689 400005F8 568BF646 8BF85689 F6468940
FA4683FA 7EC5058B 0E7EC53D 7D40FE7E 83FE46FF 03EB0000 FE46C7F0 5689EE46
8902F246 83F27EC5 04458B0E 7EC50589 02F64683 F67EC502 458B0E7E C5058902
DE3EC52E 000002C8 5756CB5E 5FC9BAEB 058902EE 4683EE7E C506458B 0E7EC505
CADE3EC5 2E1E7500 073D058B CADE3EC5 2E177500 023D058B CACA3EC5 2E05FFCA
058BCADE 3EC52E00 0105C7CA DE3EC52E 0975003D 83CADE3E C52E13EB 000005C7
168B2ECA E206032E 03E0C105 8BCADE3E C52E0001 05C7CADE 3EC52E09 7500083D
35FF0275 FFCADA3E C52E08C4 830044C8 439A35FF 0275FFCA DA3EC52E 5052CAE4
36FF2ECB 1E36FF2E CB2036FF 2E006A00 6A006A50 FE468D16 04C48300 3C7C959A
FE76FF00 6A006A00 6A006A34 7400FE7E 8312C483 003C7D91 9ACB1A36 FF2ECB1C
544A8A9A CB6636FF 2ECB6836 FF2E1274 003D80CA B63EC52E 0AC48300 54C0489A
C52E1175 00023D05 8BCACA3E C52EEC8B 555756CB 5E5FC900 442B8C9A 04C48300
5FC902C4 83004452 E49A35FF CB6E3EC5 2E0FEB02 C4830044 52E49A35 FFCB6A3E
83004452 E49A35FF CB723EC5 2E117500 023D058B CACA3EC5 2EEC8B55 5756CB5E
CA3EC52E EC8B5557 56CB5E5F C902C483 004452E4 9A35FFCB 763EC52E 0FEB02C4
35FFCB6A 3EC52E0F EB02C483 004452E4 9A35FFCB 6E3EC52E 11750002 3D058BCA
3EC52E11 7500023D 058BCACA 3EC52EEC 8B555756 CB5E5FC9 02C48300 4452E49A
5E5FC902 C4830044 52E49A35 FFCB723E C52E0FEB 02C48300 4452E49A 35FFCB76
7C640024 4CB80014 951F0024 92000024 50000024 4E000014 7DE60014 7B8600CB
920E0024 920A0024 92080014 7DFE0014 7E04004C 5B780024 90000024 9206004C
5BA8004C 5B94004C 5B90004C 59DA0024 92160014 7DEC0024 92100024 4DB80024
7CC60014 7B9E0014 7BF6004C 5B7A0024 92020024 92040024 4DB6004C 5BAA004C
7B8C0024 4D270024 4D090024 4DB40024 4CFF0024 4CF20024 4CE70024 4CC90014
4D6E0024 4D680024 4D620024 4DA83FE0 00000000 00000024 4D4E0024 4D360014
00000EC8 57560024 4DF80024 4DFA0024 4DFC0024 4DFE0024 4D8A0024 4D700024
3436FF2E 04C48300 544A8A9A D72E36FF 2ED73036 FF2E1274 003D80D7 2A3EC52E
FE468D16 23750008 3D005455 F09A04C4 8300549B D59A5000 1205D732 068B2ED7
```

EBDC4589 907EC508 C4830054 96EF9A00 54968F9A E25606DC 2E9BA045 D99B1F16
FE03EB00 FF46C60C C4830054 5B789A50 DC468D16 50E2468D 160E76FF 1076FFBB
E7C1F88B 98FF468A E245DF9B 1F16FD03 E7D1F88B 98FF468A 237D03FF 7E80FF46
F08B98FF 468A377D 03FF7E80 FF46FE03 EB00FF46 C6D4EBC4 5DD99B1F 16FD0302
468A24D8 269BC445 D99B1F16 FD0302E7 C1F88B98 FF468A0C 468E0A76 0302E6C1
46FE03EB 00FF46C6 D85ED99B EED99BC0 EBAC5DD9 9B1F16FD 0302E7C1 F88B98FF
9BAC45D9 9B1F16FD 0302E7C1 F88B98FF 468A8C5E DD9BEED9 9B547D03 FF7E80FF
FF468A14 EBAC45D9 9B1F16FD 0302E7C1 F88B98FF 468A1376 0054968A 9A8C5EDC
9BD846D9 9BA3EBD8 5ED99BD8 46D89BE0 D99BAC45 D99B1F16 FD0302E7 C1F88B98
8B98FF46 8A257D03 FF7E80FF 46FE03EB 00FF46C6 3A730054 968A9AE2 5E1EDC2E
D2EB1DD9 9B145E8E 127E0302 E7C1F88B 98FF468A A045D99B 1F16FD03 02E7C1F8
E998FE46 8AFE46FE 00A8E903 76005496 8A9AD85E D89BD446 D99B0270 E9EC468B
127E0302 E7C1F88B 98FF468A 00D6E903 7C03FF7E 80FF46FE 03EB00FF 46C60083
FE03EB00 FF46C6CF EBB85DD9 9B1F16FD 0302E7C1 F88B98FF 468A05D9 9B145E8E
98FF468A B845D99B 1F16FD03 02E7C1F8 8B98FF46 8AFE08E9 037C03FF 7E80FF46
8B6BEBD0 5ED99BD0 4ED89BE2 5606DD2E 9BD0EBA0 5DD99B1F 16FD0302 E7C1F88B
DDBFDDAF DDAFDD79 DE2ADD42 DDD4A7FF 2ED88BE0 D15F7700 053D4801 D1E9EC46
A045D99B 1F16FD03 02E7C1F8 8B98FF46 8A257D03 FF7E80FF 46FE03EB 00FF46C6
D99BE24C 06DD2E9B 00FE46C6 D2EB1DD9 9B145E8E 127E0302 E7C1F88B 98FF468A
98FF468A 00B7E903 7C08FF7E 80FF46FE 03EB00FF 46C6D45E D99BD846 D99BD05E
96EF9A00 54968F9A 0845D99B 127EC51A 7404FF46 F6505200 122DD28C C503E0D1
5008C483 005496EF 9A005496 8F9A0845 D99B127E C515EB50 00100508 C4830054
15EB5000 100508C4 83005496 EF9A0054 968F9A04 45D99B12 7EC51A74 02FF46F6
D99B127E C5197401 FF46F650 08C48300 5496EF9A 0054968F 9A0445D9 9B127EC5
9A005496 8F9A05D9 9B127EC5 14EB5000 100508C4 83005496 EF9A0054 968F9A05
03FF7E80 FF46FE03 EB00FF46 C6FF3DE9 0AC48300 545FEC9A 5008C483 005496EF
032E02E7 C1F88B98 FF468A50 EE468D16 5098FF46 8A0E76FF 1076FFFC 8EE9037C
FD0302E7 C1F88B98 FF468A0E C4830044 D7BC9A35 FF0275FF E2681E8E 2EE2663E
9445D99B 1F16FD03 02E7C1F8 8B98FF46 8A005496 8F9AD046 D99B945D D99B1F16
C198FF46 8A005496 8F9AAC45 D99B1F16 FD0302E7 C1F88B98 FF468A00 54968F9A
001EC857 56CB5E5F C99BFF63 E91CC483 0044D9F3 9A505200 602DD28C C50302E0
FF1476FF FE76FF02 58E9037C 1BFE7E83 FE46FF03 EB0000FE 46C70000 FC46C700
5689F846 8999C78B F88B0EC4 830044DA 6B9A0A76 FF0C76FF 0E76FF10 76FF1276
F876FFFA 76FF1874 003D80E2 6E3EC52E 00A0E903 7400013D 058BE26A 3EC52EFA
9B0A7EC5 3574003D 80E26E3E C52E08C4 8300544A 8A9AE272 36FF2EE2 7436FF2E
2E005496 8F9A05D9 9B0A7EC5 0054968F 9A0445D9 9B0A7EC5 0054968F 9A0845D9
D99B127E C5357400 3D80E26E 3EC52E1C C4830054 4A8A9AE2 7636FF2E E27836FF
FF2E0054 968F9A05 D99B127E C5005496 8F9A0445 D99B127E C5005496 8F9A0845
307D03EE 7E83EE46 FF03EB00 00EE46C7 1CC48300 544A8A9A E27A36FF 2EE27C36
83005496 EF9A0054 968F9AE2 5606DC2E 9B05D99B 145E8E12 7E0302E7 C1EE7E8B
50E8468D 1650F046 8D160E76 FF1076FF C7EBE845 891F16FD 03E7D1EE 7E8B08C4
76FF1B74 003D80E2 6E3EC52E 25750001 3D058BE2 6A3EC52E 0CC48300 545B789A
03EB0000 EE46C70A C4830054 4A8A9AE2 7E36FF2E E28036FF 2EF076FF F276FFF4
0054968F 9A05D99B 0C5E8E0A 7E0302E7 C1EE7E8B 0099E903 7C03EE7E 83EE46FF
02E7C1EE 7E8B2E7E C62BF045 8B1F16FD 03E7D1EE 7E8BF08B 08C48300 5496EF9A
16FD03E7 D1EE7E8B F08B08C4 83005496 EF9A0054 968F9A05 D99B0C5E 8E0A7E03
5496EF9A 0054968F 9A05D99B 0C5E8E0A 7E0302E7 C1EE7E8B 2EEBC62B F0458B1F
891F16FD 03E7D1EE 7E8BD8F7 C62BF045 8B1F16FD 03E7D1EE 7E8BF08B 08C48300
76FFE676 FF1B7400 3D80E26E 3EC52E25 7500013D 058BE26A 3EC52EFF 5BE9E245
83FDAEE9 037C05E2 7E830AC4 8300544A 8A9AE282 36FF2EE2 8436FF2E E276FFE4
6E3EC52E FFFFFC46 C721751B FE7E83FD 9CE9037C 05E67E83 FDA5E903 7C05E47E
CB5E5FC9 9BFC468B 04C48300 544A8A9A E28636FF 2EE28836 FF2E1274 003D80E2
432D3FE0 00000000 00000003 3FF00000 00000000 271000FF 3F900000 00000000
8346004C 8319004C 82EC004C 82DC0014 951F004C 83AE004C 83A23F1A 36E2EB1C
8300547F AA9AEC70 36FF2EEC 7236FF2E 000116C8 5756004C 8388004C 8378004C
70868D16 EC7436FF 2EEC7636 FF2E08C4 830054EE 309A50FF 70868D16 505204C4
8D161874 003D80EC 783EC52E 6D75C20B FE5689FC 468908C4 83005499 729A50FF
EC80068B 2EEC8236 FF2E08C4 8300544A 8A9AEC7C 36FF2EEC 7E36FF2E 50FF7086
EC8436FF 2EEC8636 FF2E1274 003D80EC 783EC52E 04C48300 549BD59A 50001205
29E904C4 8300549B D59A5000 1205EC80 068B2EEC 8236FF2E 04C48300 544A8A9A
AA9A50AC 468D1650 6AFC76FF FE76FFEC 8836FF2E EC8A36FF 2E50FF12 868D1609
EC8C36FF 2EEC8E36 FF2E50FF 14868D16 0CC48300 542A089A 50520AC4 830054EA
160CC483 00542A08 9A50520A C4830054 EAAA9A50 AC468D16 506AFC76 FFFE76FF
54EAAA9A 50AC468D 16506AFC 76FFFE76 FFEC9036 FF2EEC92 36FF2E50 FF46868D

| | | | | | | | |
|---|---|---|---|---|---|---|---|
| 2E127400 | 3D80EC78 | 3EC52E75 | 7500FF14 | BE830CC4 | 8300542A | 089A5052 | 0AC48300 |
| 9A500012 | 05EC8006 | 8B2EEC82 | 36FF2E04 | C4830054 | 4A8A9AEC | 9436FF2E | EC9636FF |
| 00544A8A | 9AEC9836 | FF2EEC9A | 36FF2E12 | 74003D80 | EC783EC5 | 2E04C483 | 00549BD5 |
| 9AFC76FF | FE76FF04 | C4830054 | 9BD59A50 | 001205EC | 80068B2E | EC8236FF | 2E04C483 |
| 00C3E903 | 7C03FF6C | BE83FF6C | 86FF04EB | 0000FF6C | 86C70820 | E904C483 | 00549C3C |
| FF668589 | 1F16FD03 | E7D1FF6C | BE8B058B | EC9E1E8E | 2EEC9C3E | 032EE7D1 | FF6CBE8B |
| FF608589 | 1F16FD03 | E7D1FF6C | BE8B058B | ECA21E8E | 2EECA03E | 032EE7D1 | FF6CBE8B |
| FF5A8589 | 1F16FD03 | E7D1FF6C | BE8B058B | ECA61E8E | 2EECA43E | 032EE7D1 | FF6CBE8B |
| FF548589 | 1F16FD03 | E7D1FF6C | BE8B058B | ECAA1E8E | 2EECA83E | 032EE7D1 | FF6CBE8B |
| FF4E8589 | 1F16FD03 | E7D1FF6C | BE8B058B | ECAE1E8E | 2EECAC3E | 032EE7D1 | FF6CBE8B |
| FF488589 | 1F16FD03 | E7D1FF6C | BE8B058B | ECB21E8E | 2EECB03E | 032EE7D1 | FF6CBE8B |
| F89A50FF | 66868D16 | 547502FF | 6EBE8304 | C4830054 | 64499A50 | FF6E868D | 16FF2FE9 |
| 83005494 | F89A50FF | 5A868D16 | 04C48300 | 5494F89A | 50FF6086 | 8D1604C4 | 83005494 |
| 8D1604C4 | 83005494 | F89A50FF | 4E868D16 | 04C48300 | 5494F89A | 50FF5486 | 8D1604C4 |
| FF2E50FF | 2E868D16 | 50FF3286 | 8D1650FF | 36868D16 | 04C48300 | 5494F89A | 50FF4886 |
| 9A50520A | C4830054 | EAAA9A50 | AC468D16 | 506AFC76 | FFFE76FF | ECB436FF | 2EECB636 |
| FF2EECBA | 36FF2E50 | FF3A868D | 1650FF3E | 868D1650 | FF42868D | 1614C483 | 00542A08 |
| 8300542A | 089A5052 | 0AC48300 | 54EAAA9A | 50AC468D | 16506AFC | 76FFFE76 | FFECB836 |
| 76FFECBC | 36FF2EEC | BE36FF2E | 50FF1686 | 8D1650FF | 1A868D16 | 50FF1E86 | 8D1614C4 |
| 868D1614 | C4830054 | 2A089A50 | 520AC483 | 0054EAAA | 9A50AC46 | 8D16506A | FC76FFFE |
| 6AFC76FF | FE76FFEC | C036FF2E | ECC236FF | 2E50FF22 | 868D1650 | FF26868D | 1650FF2A |
| 04EB0000 | FF6C86C7 | 14C48300 | 542A089A | 50520AC4 | 830054EA | AA9A50AC | 468D1650 |
| 8B02E6C1 | FF6CB68B | 2D74003D | 80EC783E | C52E01E2 | E9037C03 | FF6CBE83 | FF6C86FF |
| 4A8A9AEC | C436FF2E | ECC636FF | 2EFF6CB6 | FF005496 | 8F9AFF2E | 85D99BFE | 031F16FD |
| D1FF6CB6 | 8B04C483 | 00549BD5 | 9A500012 | 05EC8006 | 8B2EEC82 | 36FF2E0E | C4830054 |
| 6CB68B01 | 3AE90375 | FF5A843B | 26FF6685 | 8B1F16FD | 03E7D1FF | 6CBE8B07 | 16F503E6 |
| FF6CBE8B | FF4EB4DE | 269BFF66 | 85DF9B1F | 16FD03E7 | D1FF6CBE | 8B0716F5 | 03E6D1FF |
| 16FD0302 | E7C1FF6C | BE8B2B74 | 003D80EC | 783EC52E | FF069DD9 | 9B1F16FD | 0302E7C1 |
| C4830054 | 4A8A9AEC | C836FF2E | ECCA36FF | 2EFF6CB6 | FF005496 | 8F9AFF06 | 85D99B1F |
| F58B02E7 | C1FF6CBE | 8B04C483 | 00549BD5 | 9A500012 | 05EC8006 | 8B2EEC82 | 36FF2E0E |
| 8BFEEA9E | DD9BFF16 | 8CD8269B | FF0685D9 | 9B1F16FD | 0302E7C1 | FF6CBE8B | F7030716 |
| 02E6C1FF | 6CB68BFE | F29EDD9B | FF16A5D8 | 9BE8D99B | FE031F16 | FD8B02E6 | C1FF6CB6 |
| 1F16FD8B | 02E6C1FF | 6CB68BFE | EA86DC9B | FEF28EDC | 9BFF2E85 | D99BFE03 | 1F16FD8B |
| D99BFE03 | 1F16FD8B | 02E6C1FF | 6CB68B2D | 74003D80 | EC783EC5 | 2EFF2E9D | D99BFE03 |
| FF2E0EC4 | 8300544A | 8A9AECCC | 36FF2EEC | CE36FF2E | FF6CB6FF | 0054968F | 9AFF2E85 |
| 74003D80 | EC783EC5 | 2EFE49E9 | 04C48300 | 549BD59A | 50001205 | EC80068B | 2EEC8236 |
| 80068B2E | EC8236FF | 2E06C483 | 00544A8A | 9AECD036 | FF2EECD2 | 36FF2EFF | 6CB6FF16 |
| FF6CBE83 | FF6C86FF | 04EB0000 | FF6C86C7 | FE10E904 | C4830054 | 9BD59A50 | 001205EC |
| 85D99BFE | 031F16FD | 8B02E6C1 | FF6CB68B | 2D74003D | 80EC783E | C52E0220 | E9037C03 |
| 36FF2E0E | C4830054 | 4A8A9AEC | D436FF2E | ECD636FF | 2EFF6CB6 | FF005496 | 8F9AFF3A |
| 6CBE8B07 | 16F503E6 | D1FF6CB6 | 8B04C483 | 00549BD5 | 9A500012 | 05EC8006 | 8B2EEC82 |
| 831F16FD | 03E7D1FF | 6CBE8B01 | 78E90375 | FF54843B | 26FF6085 | 8B1F16FD | 03E7D1FF |
| BD831F16 | FD03E7D1 | FF6CBE8B | FF4885FF | 1F16FD03 | E7D1FF6C | BE8B0E75 | 00FF48BD |
| 6CBE8B07 | 16F503E6 | D1FF6CB6 | 8BFF6085 | FF1F16FD | 03E7D1FF | 6CBE8B0E | 7500FF60 |
| 9DD99B1F | 16FD0302 | E7C1FF6C | BE8BFF48 | B4DE269B | FF6085DF | 9B1F16FD | 03E7D1FF |
| 54968F9A | FEFA85D9 | 9B1F16FD | 0302E7C1 | FF6CBE8B | 2B74003D | 80EC783E | C52EFEFA |
| 80068B2E | EC8236FF | 2E0EC483 | 00544A8A | 9AECD836 | FF2EECDA | 36FF2EFF | 6CB6FF00 |
| E7C1FF6C | BE8BF703 | 0716F58B | 02E7C1FF | 6CBE8B04 | C4830054 | 9BD59A50 | 001205EC |
| 1F16FD8B | 02E6C1FF | 6CB68BFE | EA9EDD9B | FF228CD8 | 269BFEFA | 85D99B1F | 16FD0302 |
| 3A85D99B | FE031F16 | FD8B02E6 | C1FF6CB6 | 8BFEF29E | DD9BFF22 | A5D89BE8 | D99BFE03 |
| 3EC52EFF | 3A9DD99B | FE031F16 | FD8B02E6 | C1FF6CB6 | 8BFEEA86 | DC9BFEF2 | 8EDC9BFF |
| B6FF0054 | 968F9AFF | 3A85D99B | FE031F16 | FD8B02E6 | C1FF6CB6 | 8B2D7400 | 3D80EC78 |
| 1205EC80 | 068B2EEC | 8236FF2E | 0EC48300 | 544A8A9A | ECDC36FF | 2EECDE36 | FF2EFF6C |
| ECE236FF | 2EFF6CB6 | FF167400 | 3D80EC78 | 3EC52EFE | 0BE904C4 | 8300549B | D59A5000 |
| 00549BD5 | 9A500012 | 05EC8006 | 8B2EEC82 | 36FF2E06 | C4830054 | 4A8A9AEC | E036FF2E |
| 3D80EC78 | 3EC52E75 | 75FFFF3D | 04C48300 | 54EF7E9A | FC76FFFE | 76FFFDD2 | E904C483 |
| 05EC8006 | 8B2EEC82 | 36FF2E04 | C4830054 | 4A8A9AEC | E436FF2E | ECE636FF | 2E127400 |
| 9AECE836 | FF2EECEA | 36FF2E12 | 74003D80 | EC783EC5 | 2E04C483 | 00549BD5 | 9A500012 |
| FE76FF04 | C4830054 | 9BD59A50 | 001205EC | 80068B2E | EC8236FF | 2E04C483 | 00544A8A |
| FFFE76FF | ECEC36FF | 2EECEE36 | FF2EFF12 | B6FF013C | E904C483 | 00549C3C | 9AFC76FF |
| AE9AFC76 | FFFE76FF | ECF036FF | 2EECF236 | FF2EFF14 | B6FF0AC4 | 8300544A | AE9AFC76 |
| 544AAE9A | FC76FFFE | 76FFECF4 | 36FF2EEC | F636FF2E | 5040FF46 | 868B0AC4 | 8300544A |
| 968F9AFF | 2E86D99B | 0054968F | 9AFF3286 | D99B0054 | 968F9AFF | 3686D99B | 0AC48300 |
| 9AFF4286 | D99B20C4 | 8300544A | AE9AFC76 | FFFE76FF | ECF836FF | 2EECFA36 | FF2E0054 |

```
2E60EB0C C4830034 CD0A9AD7 3636FF2E D73836FF 2E35FF02 75FFD73A 3EC52E50
3836FF2E 50FE468D 16FF6A50 F8468D16 FF6A50F2 468D1631 74003D83 D73E3EC5
6A50FE46 8D1625EB 18C48300 1C921A9A 35FF0275 FFD73A3E C52ED736 36FF2ED7
8310C483 0034A150 9AD73636 FF2ED738 36FF2E35 FF0275FF D73A3EC5 2E016A06
FFD73A3E C52E036A 0AC48300 54C0489A FE76FF00 6A006A00 6A006A13 7400FE7E
74003D80 D72A3EC5 2EEC8B55 5756CB5E 5FC908C4 83003C7B 9F9A006A 35FF0275
8B555756 CB5E5FC9 0044CB7A 9A04C483 0054EB72 9AD74236 FF2ED744 36FF2E12
FE468908 C4830054 96EF9A00 54968F9A 0054454D 9A00000A C85756CB 5E5FC9EC
81077C00 C8FE7E81 347E73FE 7E83067C 63FE7E83 407462FE 7E834674 30FE7E83
0384FE7E 81077C03 20FE7E81 187E01CF FE7E8107 7C0190FE 7E81267E 00E7FE7E
F72E99FE 468B347C 00C8FE7E 81000105 C70A7EC5 0166E900 0205C70A 7EC50A7E
FE468BF8 8B64FA46 6BFA76FF 0589D748 3EC52EFA 7EF799FE 468BFA46 89D7463E
006405C7 D7483EC5 2E008FE9 037430FE 7E8300B1 E904C483 0044D2AD 9A50C72B
F846C700 82E9037C 03F67E83 F646FF03 EB0000F6 46C702C4 830044D0 639A0A6A
0326E7D1 F87E030C E7C1F67E 8BD73A36 C42EE37D 0100F87E 81F846FF 03EB0000
8B025C8E 263C0326 E7D1F87E 030CE7C1 F67E8BD7 3A36C42E 30058302 5C8E263C
025C8E26 3C0326E7 D1F87E03 0CE7C1F6 7E8BD73A 36C42EBB 7600FF3D 0FFF2505
2E02C483 0044D063 9A50005A 2DFE468B 0589D748 3EC52EFE 468B9EEB 00FF0D81
C52E036A 04C48300 44CE769A 35FF0275 FFD73A3E C52E1274 004005F7 D74C3EC5
36FF2E00 6A006A00 6A50FC46 8D1608C4 83003C7B 9F9A006A 35FF0275 FFD73A3E
6A137400 FC7E8312 C483003C 7D919AD7 5036FF2E D75236FF 2ED75436 FF2ED756
00FE46C7 00004AC8 5756CB5E 5FC90AC4 830054C0 489AFC76 FF006A00 6A006A00
4A8A9AD7 5836FF2E D75A36FF 2E127400 3D80D72A 3EC52EFA 5ED99BFE 46DF9B01
46030DE0 C1E8468B 01A6E903 7C03E87E 83E846FF 03EB0000 E846C704 C4830054
9B00DEE9 037DFE46 3BE6468B E64EFF03 EB0FFEE6 46C7EC56 89EA4689 0C568B0A
9BFA66D8 9BE646DF 9BBE5EDD 9BFA66D8 9BD75E06 DF2E9BB6 5EDD9BD7 5C06DF2E
76DC9BC6 4EDC9BCE 66DC9BD7 5E06DF2E 9BCE5EDD 9BB676DC 9BFA46D9 9BC65EDD
9BF65ED9 9BD646DC 9BDE76DC 9BFA46D9 9BDE5EDD 9BD75C06 DF2E9BD6 5EDD9BBE
8BF25ED9 9BF066DE 9BF646D9 9BF04689 08C48300 5496EF9A 0054968F 9AF646D9
8BEE4689 042B2605 8BEC5E8E EA7E0347 47E7D1F0 7E8BEC46 8EEA7603 E6D1F076
968F9AD7 6006DC2E 9BEE4EDE 9BF246D9 9BE44689 058BEC5E 8EEA7E03 E7D1F07E
FE468BFF 14E90589 EC5E8EEA 7E03E7D1 E67E8BE4 460308C4 83005496 EF9A0054
F65ED99B D76836DC 2E9BE646 DF9BFEDA E9037D00 E67E83E6 4EFF03EB E6468948
F25ED99B F066DE9B F646D99B F0468908 C4830054 96EF9A00 54968F9A F646D99B
EE468904 2B26058B EC5E8EEA 7E034747 E7D1F07E 8BEC468E EA7603E6 D1F0768B
8F9AD760 06DC2E9B EE4EDE9B F246D99B E4468905 8BEC5E8E EA7E03E7 D1F07E8B
C99BFF68 E90589EC 5E8EEA7E 03E7D1E6 7E8BE446 0308C483 005496EF 9A005496
2E04C483 003C8A53 9A50F646 8D1600EE E9037408 0A7E8300 0012C857 56CB5E5F
2E9B06C4 8300544A 8A9AD770 36FF2ED7 7236FF2E F676FF15 74003D80 D72A3EC5
FC468BFC 46FF03EB EE5ED99B EED99B00 00FC46C7 F25ED99B F676DE9B D77406DD
81F84689 08C48300 5496EF9A 0054968F 9AD76006 DC2E9BEE 46D99B63 7FF6463B
7E8BD73A 36C42E1E 7D03FE7E 83FE46FF 03EB0000 FE46C7F0 00F84E81 00FFF866
9BEE46D8 9BF246D9 9BD9EB05 89F8468B 025C8E26 3C0326E7 D1FC7E03 0CE7C1FE
03FE7E83 FE46FF03 EB0000FE 46C70176 E9037C10 00FC7E81 FC46FF95 EBEE5ED9
D9EB0589 F8468B02 5C8E263C 0326E7D1 FC7E030C E7C1FE7E 8BD73A36 C42EE37D
03EB0000 FC46C701 2FE9037C 03FE7E83 FE46FF03 EB0000FE 46C77B75 090A7E83
5C8E263C 0326E7D1 FC7E030C E7C1FE7E 8BD73A36 C42EE37D 1000FC7E 81FC46FF
025C8E26 3C0326E7 D1FC7E03 0CE7C1FE 7E8BD73A 36C42E05 8904F8C1 FC468B02
EBF0000D 81025C8E 263C0326 E7D1FC7E 030CE7C1 FE7E8BD7 3A36C42E 00FF2581
FE46FF03 EB0000FE 46C7FA46 8908E0C1 000A2D0A 468B00BE E9037F09 0A7E839F
3A36C42E 1D7EFC46 3B40FA46 8BFC46FF 03EB0000 FC46C700 9FE9037C 03FE7E83
EBFC4689 FA468BD7 EBF00005 C7025C8E 263C0326 E7D1FC7E 030CE7C1 FE7E8BD7
26E7D1FC 7E030CE7 C1FE7E8B D73A36C4 2E247EFC 463B0100 05FA468B FC46FF03
46FF03EB FC468900 FF05FA46 8BCEEB05 89F0000D FA462BFC 468B025C 8E263C03
8E263C03 26E7D1FC 7E030CE7 C1FE7E8B D73A36C4 2EFF72E9 037C1000 FC7E81FC
FE7E83FE 46FF03EB 0000FE46 C7000004 C85756CB 5E5FC99B D6EBF0FF 05C7025C
030CE7C1 FE7E8BD7 3A36C42E E67D1000 FC7E81FC 46FF03EB 0000FC46 C72E7D03
7D03FE7E 83FE46FF 03EB0000 FE46C7D9 EB00FF05 C7025C8E 263C0326 E7D1FC7E
C1FE768B D73A1EC4 2EE17EFC 463B0C7E F7990100 B8FC46FF 03EB0000 FC46C745
F70C468B 025F8E26 3F0326E7 D1FC7E03 FE03F88B 0C7EF799 08E0C10A 468B0CE6
D99BD77C 3EC52EFC 5ED99B00 54454D9A 000004C8 5756CB5E 5FC9C2EB 0589FC6E
0A7EC509 76005496 8A9AD780 1EDC2E9B FC46D99B 11720054 968A9A1D D89BFC46
5756CB5E 5FC99B1D D99BD788 3EC52EFC 46D99B00 0105C70A 7EC513EB 000205C7
C507EB00 0105C70A 7EC50974 003D83D7 3E3EC52E EC8B5557 56CB5E5F C9EC8B55
```

03EB0002 B8057500 013D058B D78C3EC5 2EEC8B55 5756CB5E 5FC90002 05C70A7E
0002B805 7500013D 058BD78C 3EC52EEC 8B555756 CB5E5FC9 05890A7E C50001B8
0A7EC509 75013D80 D7903EC5 2EEC8B55 5756CB5E 5FC90589 0A7EC500 01B803EB
2E50FEC4 868D1657 5600013C C85756CB 5E5FC900 0105C70A 7EC507EB 000205C7
FC7E83FC 46FF03EB 0000FC46 C75E5F00 54DE289A 013668D7 9436FF2E D79636FF
1F16FD8B E6D1FC76 8B00FFFF 6485C7FE 031F16FD 8BE6D1FC 768B00AC E9037C04
D1FC768B 00FFFF6C 85C7FE03 1F16FD8B E6D1FC76 8B117F00 FF3DFF6C 858BFE03
8B117C00 FF7CBD83 FE031F16 FD8BE6D1 FC768B00 00FF7485 C7FE031F 16FD8BE6
FFFFA445 C7FE031F 16FD8BE6 D1FC768B 0000FF7C 85C7FE03 1F16FD8B E6D1FC76
D7980603 2E09E0C1 FC468B50 FE468D16 50FEC486 8D16FC76 FF006A50 FA468D16
E7C10E7E 8BEC8B55 5756CB5E 5FC9FF48 E914C483 003C9958 9A5052D7 9A168B2E
06DD2E9B 0C5E8E0A 7E0302E7 C10E7E8B 1DD99BD7 9C06DD2E 9B0C5E8E 0A7E0302
C10E7E8B 105DD99B D79C06DD 2E9B0C5E 8E0A7E03 02E7C10E 7E8B205D D99BD79C
2E9B0C5E 8E0A7E03 02E7C10E 7E8B305D D99BD79C 06DD2E9B 0C5E8E0A 7E0302E7
7E8B505D D99BD7A4 06DD2E9B 0C5E8E0A 7E0302E7 C10E7E8B 405DD99B D79C06DD
5E8E0A7E 0302E7C1 0E7E8B00 C09DD99B D7AC06DF 2E9B0C5E 8E0A7E03 02E7C10E
02E7C10E 7E8BFFFF 00E085C7 0C5E8E0A 7E03E7D1 0E7E8B00 D09DD99B EED99B0C
8E0A7E03 E7D10E7E 8B117D03 0E7E8300 F09DD99B D7AE06DF 2E9B0C5E 8E0A7E03
76FF0C76 FF013668 0200FE46 C7000002 C85756CB 5E5FC99B FFFF0100 85C70C5E
FFD7B036 FF2ED7B2 36FF2E57 560AC483 00549664 9AD79436 FF2ED796 36FF2E0A
FFD7B436 FF2ED7B6 36FF2E57 565E5F00 54DE289A 04E06850 0138050A 468B0C76
FFD7B836 FF2ED7BA 36FF2E57 565E5F00 54DE289A 04E06850 0618050A 468B0C76
0002C857 56CB5E5F C95E5F00 54DE289A 5002E0C1 FE468B50 0AF8050A 468B0C76
C4830054 96649A0A 76FF0C76 FFD79436 FF2ED796 36FF2E01 36680200 FE46C700
5F0054DE 289A04E0 68D7B036 FF2ED7B2 36FF2E50 0138050A 468B0C76 FF57560A
5F0054DE 289A04E0 68D7B436 FF2ED7B6 36FF2E50 0618050A 468B0C76 FF57565E
289A5002 E0C1FE46 8BD7B836 FF2ED7BA 36FF2E50 0AF8050A 468B0C76 FF57565E
7BF60014 7B9A0014 7DE6004C 7C64004C 880E0014 951F00CB 5E5FC95E 5F0054DE
0FFF0004 004C8840 00147CC6 00147B9E 00149374 00147BFA 0064004C 882B0014
001493BA 406F4000 00000000 004C8857 40100000 00000000 3FE00000 00000000
00000000 0024CBD0 00147E8E 00147BA3 00147B7A 00147BC8 40390000 00000000
2EC85756 0024D53E 00240704 00240224 000500FF 40000000 00000000 40140000
99058B10 5E8E0E7E 03E7D1FE 7E8B267D 08FE7E83 FE46FF03 EB0000FE 46C70000
7E8B01DC E912468B D1EBE055 89DE4589 1F16FD03 02E7C1FE 7E8B0C56 130A4603
7E8BD446 89058B16 5E8E147E 03E7D1FA 7E8BD246 89058B16 5E8E147E 03E7D1F6
7E8BD846 89058B16 5E8E147E 03E7D1F2 7E8BD646 89058B16 5E8E147E 03E7D1EE
768BDC46 89058B16 5E8E147E 03E7D1EA 7E8BDA46 89058B16 5E8E147E 03E7D1E6
03DA462B DC460304 2B26058B 165E8E14 7E03E7D1 E27E8B16 468E1476 03E6D1DE
F27E8B01 51E9E240 0EDC2E9B 02C48300 54969D9A 50D2462B D44603D6 462BD846
EE7E8BD4 4689058B 165E8E14 7E03E7D1 FA7E8BD2 4689058B 165E8E14 7E03E7D1
E27E8BD8 4689058B 165E8E14 7E03E7D1 F67E8BD6 4689058B 165E8E14 7E03E7D1
DE768BDC 4689058B 165E8E14 7E03E7D1 EA7E8BDA 4689058B 165E8E14 7E03E7D1
4603DA46 2BDC4603 042B2605 8B165E8E 147E03E7 D1E67E8B 16468E14 7603E6D1
D1EA7E8B 00B2E9E2 400EDC2E 9B02C483 0054969D 9A50D246 2BD44603 D6462BD8
D1E67E8B D4468905 8B165E8E 147E03E7 D1FA7E8B D2468905 8B165E8E 147E03E7
D1E27E8B D8468905 8B165E8E 147E03E7 D1F67E8B D6468905 8B165E8E 147E03E7
D1DE768B DC468905 8B165E8E 147E03E7 D1F27E8B DA468905 8B165E8E 147E03E7
D84603DA 462BDC46 03042B26 058B165E 8E147E03 E7D1EE7E 8B16468E 147603E6
D10F7700 023D14EB E2400EDC 2E9B02C4 83005496 9D9A50D2 462BD446 03D6462B
165EDC9B EED99B00 0008C857 56CB5E5F C99BD93C D89DD7FE D9E8A7FF 2ED88BE0
06DF2E9B 1DD99B2D D89B0A7E C51E4EDC 9B1676DC 9B0E46DD 9B5F7400 54968A9A
0A7EC5E2 4806DF2E 9B0E7600 54968A9A F85EDC9B 05D99B0A 7EC5F85E DD9BE248
EED99B09 73005496 8A9AF85E DC9B05D9 9B0A7EC5 F85EDD9B EED99B21 EB1DD99B
D45ED99B E24A06DF 2E9B0000 EC46C700 007CC857 56CB5E5F C99B1DD9 9B0A7EC5
80EA4689 03EA466B FF46FE0A EB0001EA 46C700FF 46C6D05E D99BE24C 06DD2E9B
04E0C1E8 468BE856 894AE254 3EF72E99 40EA7EF7 9916468B 00E4E903 7C03FF7E
9B05D99B 0C5E8E0A 7E0302E7 C1F88B98 FF468A8C 5EDD9B02 C4830054 969D9A50
98FF468A 8C5EDD9B EED99B1D D99B145E 8E127E03 02E7C1F8 8B98FF46 8A8C46DC
9BE24806 DF2E9B27 72005496 8A9A8C5E DC9B05D9 9B145E8E 127E0302 E7C1F88B
14760054 968A9A84 5EDC9B05 D99B145E 8E127E03 02E7C1F8 8B98FF46 8A845EDD
127E0302 E7C1F88B 98FF468A 12EB05D9 9B0C5E8E 0A7E0302 E7C1F88B 98FF468A
E7C1F88B 98FF468A 15D99B14 5E8E127E 0302E7C1 F88B98FF 468A05D9 9B145E8E
80FF46FE 03EB00FF 46C6EC46 FF03EB00 01EC46C7 FF09E9A0 5DD99B1F 16FD0302
FD0302E7 C1F88B98 FF468A92 56899046 89D28CC5 03E0D198 FF468A3C 7D03FF7E

36FF2EEC FE36FF2E 0054968F 9AFF3A86 D99B0054 968F9AFF 3E86D99B 0054968F
9AFF1A86 D99B0054 968F9AFF 1E86D99B 20C48300 544AAE9A FC76FFFE 76FFECFC
AE9AFC76 FFFE76FF ED0036FF 2EED0236 FF2E0054 968F9AFF 1686D99B 0054968F
9AFF2286 D99B0054 968F9AFF 2686D99B 0054968F 9AFF2A86 D99B20C4 8300544A
FFFE76FF 20C48300 544AAE9A FC76FFFE 76FFED04 36FF2EED 0636FF2E 0054968F
004C6CC8 0014951F 004C6CC4 004C6CB8 00CB5E5F C99B04C4 8300549C 3C9AFC76
00147DEC 004C6D1A 004C6D02 004C6CFF 004C6CFC 004C6CF9 004C6CE2 004C7C64
004C6D58 004C6D51 004C6D4A 004C5A28 004C5A22 004C5A1C 004C5A16 00147DE6
004C6E09 004C6DEE 004C6DD4 004C6DB5 004C6D9B 004C6D80 004C6D66 004C6D5F
004C6F14 004C6EFD 004C6ED6 004C6EA3 004C6E7B 004C6E63 004C6E41 004C6E23
613D8043 74003D80 0E7EC54B 74003D80 0A7EC5EC 8B555756 004C6F42 004C6F2A
7C613D80 0A7EC5F0 8B98058A 0E7EC508 EB20EE83 F08B9805 8A0A7F7A 3D800F7C
ADEB0E46 FF0A46FF 0875C63B 98058A0A 7EC506EB 00202D98 058A087F 7A3D800D
2E0000FE 46C70000 02C85756 CB5E5FC9 C62B9805 8A0A7EC5 F08B9805 8A0E7EC5
681E8E2E F6663E03 2E03E7C1 FE7E8B0A 76FF0C76 FF317D05 3BFE468B F6623EC5
C9FFFFB8 C3EBFE46 FF08EBFE 468B0575 C00B08C4 830044ED 089A35FF 0275FFF6
2E036A57 560005C6 F66A3EC5 2E0054A0 DC9A0001 EE46C700 0016C857 56CB5E5F
35FFF67A 3EC52E57 560589F6 6E3EC52E 5E5F0054 3BD49AF6 7236FF2E F67436FF
36FF2E00 C8685756 0589F676 3EC52E5E 5F00543A C09AF672 36FF2EF6 7436FF2E
2EF67436 FF2E00C8 68575605 89F67E3E C52E5E5F 00543A80 9AF67236 FF2EF674
F68C36FF 2E35FFF6 6E3EC52E 57560589 F6823EC5 2E5E5F00 543A809A F67236FF
3EC52E5E 5F00543C 349AF672 36FF2EF6 7436FF2E 35FFF68E 3EC52EF6 8A36FF2E
823EC52E EA46895E 5F00543B D49AF672 36FF2EF6 7436FF2E 016A5756 0589F686
02C48300 54EF9C9A 35FFF682 3EC52EFE 5689FC46 8902C483 0054EF9C 9A35FFF6
F67E3EC5 2EF65689 F4468902 C4830054 EF9C9A35 FFF67E3E C52EFA56 89F84689
54EE309A FC76FFFE 76FF0A76 FF0C76FF F25689F0 468902C4 830054EF 9C9A35FF
2E575654 4589EA46 8B524589 EA468B50 4589FC7E C5058BF6 7E3EC52E 08C48300
149AF672 36FF2EF6 7436FF2E 35FFF676 3EC52E35 FFF6823E C52E35FF F6863EC5
2EF69636 FF2EF698 36FF2E35 FFF68E3E C52E35FF F6763EC5 2E57565E 5F00543C
74043B26 F67E36C4 2E0589F6 923EC52E 5E5F0054 3BF49AF6 7236FF2E F67436FF
0589F69E 3EC52E02 558B058B F07EC505 89F69A3E C52E0445 8BF07EC5 016FE903
9AF6A636 FF2EF6A8 36FF2E12 74EA463B 0589F6A2 3EC52E06 458BF07E C5025589
C52E35FF F6763EC5 2E575600 0105C7F6 AA3EC52E 0000EE46 C704C483 00544A8A
5E5F0054 3BF49AF6 7236FF2E F67436FF 2EF69636 FF2EF698 36FF2E35 FFF68E3E
36C42E00 D6E90374 003D80F6 6A3EC52E 000005C7 F6AA3EC5 2E0589F6 923EC52E
8904C483 0054A2F8 9AF476FF F676FF00 C2E90374 043B2605 8BF6923E C52EF67E
EC5E8B50 005005F4 468BF676 FF0589F6 9A3EC52E 52458BF4 7EC53E7C C00BEC46
3EC52E00 0005C7F6 AE3EC52E 04C48304 5FFF26F6 68068E2E F6661E03 2E03E3C1
0374003D 80F66A3E C52E0000 05C7F69A 3EC52EFF FF05C7F6 723EC52E 0EEBF672
F69A3EC5 2E0589F8 7EC5058B F6723EC5 2E024589 F87EC550 458BF47E C500B5E9
2E35FFF6 763EC52E 35FFF682 3EC52E35 FFF6963E C52E5756 044589F8 7EC5058B
7436FF2E 35FFF676 3EC52E57 56FED4E9 5E5F0054 3C149AF6 7236FF2E F67436FF
F67236FF 2EF67436 FF2E35FF F67E3EC5 2E57565E 5F00543A A09AF672 36FF2EF6
5F00543A 609AF672 36FF2EF6 7436FF2E 35FFF682 3EC52E57 565E5F00 543A609A
8B555756 CB5E5FC9 C02B02EB 0001B805 74003D83 F6723EC5 2E0A7500 EE7E835E
C52E35FF F67E3EC5 2E35FFF6 963EC52E 575600BD E9037400 3D80F66A 3EC52EEC
0374003D 83F6AA3E C52E5E5F 00543C14 9AF67236 FF2EF674 36FF2E35 FFF6763E
36FF2EF6 9636FF2E F69836FF 2E35FFF6 8E3EC52E 35FFF676 3EC52E57 560080E9
FF2E35FF F6763EC5 2E575605 89F6923E C52E5E5F 00543BF4 9AF67236 FF2EF674
36FF2EF6 7436FF2E 35FFF67E 3EC52E57 565E5F00 543AA09A F67236FF 2EF67436
543A609A F67236FF 2EF67436 FF2E35FF F6823EC5 2E57565E 5F00543A 609AF672
2E0054A0 DC9A0001 EE46C700 0018C857 56CB5E5F C90105C6 F66A3EC5 2E5E5F00
6E3EC52E 5E5F0054 3BD49AF6 7236FF2E F67436FF 2E036A57 560005C6 F66A3EC5
3EC52E5E 5F00543A C09AF672 36FF2EF6 7436FF2E 35FFF67A 3EC52E57 560589F6
89F67E3E C52E5E5F 00543A80 9AF67236 FF2EF674 36FF2E00 C8685756 0589F676
57560589 F6823EC5 2E5E5F00 543A809A F67236FF 2EF67436 FF2E00C8 68575605
36FF2EF6 7436FF2E 35FFF68E 3EC52EF6 8A36FF2E F68C36FF 2E35FFF6 6E3EC52E
D49AF672 36FF2EF6 7436FF2E 016A5756 0589F686 3EC52E5E 5F00543C 349AF672
3EC52EFE 5689FC46 8902C483 0054EF9C 9A35FFF6 823EC52E EA46895E 5F00543B
309AFC76 FFFE76FF 0A76FF0C 76FFF256 89F04689 02C48300 54EF9C9A 35FFF67E
524589FC 7EC5058B F6A23EC5 2E504589 FC7EC505 8BF67E3E C52E08C4 830054EE
36FF2E35 FFF6763E C52E35FF F6823EC5 2E35FFF6 863EC52E 57565445 89EA468B
FF2E35FF F68E3EC5 2E35FFF6 763EC52E 57565E5F 00543C14 9AF67236 FF2EF674
0589F692 3EC52E5E 5F00543B F49AF672 36FF2EF6 7436FF2E F69636FF 2EF69836

8B058BF0 7EC50589 F69A3EC5 2E04458B F07EC501 D0E90374 043B26F6 7E36C42E
B436FF2E 12740644 3B26058B F6A23EC5 2EF076C4 02558905 89F69E3E C52E0255
35FFF682 3EC52E57 56E84689 0A458BF0 7EC504C4 8300544A 8A9AF6B2 36FF2EF6
458BF07E C50589F6 823EC52E E8468B5E 5F00543A 609AF672 36FF2EF6 7436FF2E
468B5E5F 00543A60 9AF67236 FF2EF674 36FF2E35 FFF67E3E C52E5756 E8468908
3EC52EFA 5689F846 8902C483 0054EF9C 9A35FFF6 823EC52E 0589F67E 3EC52EE8
C52E5756 0000EE46 C70054E9 CC9AF656 89F44689 02C48300 54EF9C9A 35FFF67E
F67236FF 2EF67436 FF2EF696 36FF2EF6 9836FF2E 35FFF68E 3EC52E35 FFF6763E
76FFF676 FF00C2E9 0374043B 26F67E36 C42E0589 F6923EC5 2E5E5F00 543BF49A
F676FF05 89F69A3E C52E5245 8BF47EC5 3E7CC00B EC468904 C4830054 A2F89AF4
C52E04C4 83045FFF 26F66806 8E2EF666 1E032E03 E3C1EC5E 8B500050 05F4468B
000005C7 F69A3EC5 2EFFFF05 C7F6723E C52E0EEB F6723EC5 2E000005 C7F6AE3E
058BF672 3EC52E02 4589F87E C550458B F47EC500 81E90374 003D80F6 6A3EC52E
F6823EC5 2E35FFF6 963EC52E 57560445 89F87EC5 058BF69A 3EC52E05 89F87EC5
2E5756FE FAE95E5F 00543C14 9AF67236 FF2EF674 36FF2E35 FFF6763E C52E35FF
3EC52E0A 7500EE7E 835E5F00 543AA09A F67236FF 2EF67436 FF2E35FF F6763EC5
75003D80 F66A3EC5 2EEC8B55 5756CB5E 5FC9C02B 02EB0001 B8057400 3D83F672
36FF2EF6 7436FF2E 35FFF676 3EC52E35 FFF67E3E C52E35FF F6963EC5 2E57567C
FF2EF698 36FF2E35 FFF68E3E C52E35FF F6763EC5 2E57565E 5F00543C 149AF672
3EC52E57 560589F6 923EC52E 5E5F0054 3BF49AF6 7236FF2E F67436FF 2EF69636
5E5FC901 05C6F66A 3EC52E5E 5F00543A A09AF672 36FF2EF6 7436FF2E 35FFF676
85A4004C 8594004C 859E004C 85AE004C 85A8004C 85860014 EFA40014 F90400CB
8596004C 8580004C 85A0004C 85AC004C 8592004C 858A004C 85A2004C 85A6004C
C52E0A46 8BEC8B55 5756004C 8546004C 857E004C 859C004C 8512004C 859A004C
7E834874 00127E83 02C48300 44F6B69A 016AEC8B 555756CB 5E5FC905 89FF183E
050E468B 1076FF06 C483002C FC9C9A1F 6A0A76FF 0C76FF00 2CFF019A 05740112
C483002C FC9C9A22 6A500036 050E468B 1076FF06 C483002C FC9C9A23 6A500030
6A0A76FF 0C76FF00 F9E90375 001A7E83 0000BAC8 5756CB5E 5FC90044 F8369A06
1076FF06 C483002C FC9C9A21 6A500024 050E468B 1076FF06 C483002C FC9C9A20
C483002C FC9C9A33 6AFF1C36 FF2EFF1E 36FF2E06 C483002C FC9C9A26 6A0E76FF
6A5000A0 0516468B 1876FF06 C483002C FC9C9A32 6A500116 0512468B 1476FF06
3EC52E06 C483002C FC9C9A35 6AFF2036 FF2EFF22 36FF2E06 C483002C FC9C9A34
C483002C FC9C9A36 6A50FE46 8D16FE46 89C02B02 EB0001B8 05740040 05F7FF24
868D1606 C483002C FC9C9A38 6A50F646 8D1604C4 830044F8 819A50F6 468D1606
50FF5586 8D16006A 02EB016A 04750058 7D83167E C504C483 002CFBB8 9A50FF46
50868D16 0000B0C8 5756CB5E 5FC902C4 830044F6 B69A006A 06C48300 44F9A69A
5756CB5E 5FC906C4 83002CFC 9C9A2E6A 50FF5F86 8D1604C4 83002CFB B89A50FF
5E5FC99B 045DD99B FF283EC5 2E1246DD 9B1DD99B FF283EC5 2E0A46DD 9BEC8B55
0A7EC504 45D99BFF 283EC52E 1DD99B0A 7EC505D9 9BFF283E C52EEC8B 555756CB
FF2C3EC5 2E0C468B 0589FF2C 3EC52E0A 468BEC8B 555756CB 5E5FC99B 045DD99B
FF03EB00 00FE46C7 00000AC8 5756CB5E 5FC90445 89FF2C3E C52E0E46 8B024589
5EDD9BFF 4836DC2E 9B05D99B 0C5E8E0A 7E0302E7 C1FE7E8B 527D04FE 7E83FE46
5496EF9A 0054968F 9AFF4006 DC2E9BFF 380EDC2E 9BF666DC 9BFF3006 DD2E9BF6
80FF503E C52EA5EB 0589FF2E 1E8E2EFF 2C3E032E E7D103C7 83FE7E8B 08C48300
2C3EC52E 0875FFFF 2C3EC52E 0A75FFFF 2C3EC52E 0C75FFFF 2C3EC52E 4974003D
FF5636FF 2E35FFFF 2C3EC52E 0275FFFF 2C3EC52E 0475FFFF 2C3EC52E 0675FFFF
C483002C FC9C9A37 6AFF2C36 FF2EFF2E 36FF2E12 C4830054 4A8A9AFF 5436FF2E
830044FE 0B9A509C 468D160A 76FF0C76 FF0E76FF 000096C8 5756CB5E 5FC99B06
7C00FF7C BE83FF7C 8EFF04EB FF7C8689 4804C483 0054EEEA 9A509C46 8D160AC4
7C86FFD9 752F9C7D 80FF7CBE 031F16FD 8B0E743A 9C7D80FF 7CBE031F 16FD8B1C
7E868D16 08C48300 54EE309A 50FF7E86 8D165052 00642DFF 7C86035A 16C58BFF
3EC52E27 75C00B04 C4830044 FC4F9A50 9C468D16 06C48300 2CFC9C9A 396A50FF
C4830054 4A8A9AFF 5836FF2E FF5A36FF 2E509C46 8D160201 E9037500 3D80FF50
4A8A9AFF 5C36FF2E FF5E36FF 2E509C46 8D161774 003D80FF 503EC52E 01E7E908
2E01ACE9 0375C00B 08C48300 44FD8D9A 509C468D 1650FF72 868D1608 C4830054
00544A8A 9AFF6036 FF2EFF62 36FF2EFF 72B6FFFF 74B6FF1A 74003D80 FF503EC5
04C48300 54DC339A 016A0400 6806C483 002CFC9C 9A3A6A50 FF72868D 1608C483
8908C483 00549972 9A509C46 8D16FF64 36FF2EFF 6636FF2E FF709689 FF6E8689
2EFF6A36 FF2E509C 468D1617 74003D80 FF503EC5 2E3475C2 0BEF6C96 89FF6A86
C7010CE9 04C48300 54DC759A FF6EB6FF FF70B6FF 08C48300 544A8A9A FF6836FF
FF78968B FF76868B 00FF7896 830400FF 7686810B EB0000FF 7886C700 00FF7686
6A040068 FF6AB6FF FF6CB6FF 00AAE903 72FF7286 3B00B3E9 037E0E7C FF74963B
3D80FF50 3EC52E3E 74C00BFF 7A86890C C4830054 CE7E9AFF 6EB6FFFF 70B6FF01
9C3C9AFF 6AB6FFFF 6CB6FF04 C4830054 4A8A9AFF 6C36FF2E FF6E36FF 2E127400

```
FF78B6FF 04006800 6A74EB04 C4830054 DC759AFF 6EB6FFFF 70B6FF04 C4830054
703EF72E 99FF7C86 8B127D3A FF7CBE83 FF7C8689 08C48300 5497C69A FF76B6FF
B6FFFF2F E906C483 002CFC9C 9A3B6AFF 6EB6FFFF 70B6FFFF 44E9037E 09FA83FF
8D1604C4 830054DC 759AFF6E B6FFFF70 B6FF04C4 8300549C 3C9AFF6A B6FFFF6C
2EFF7636 FF2EFF78 36FF2E00 0068C857 56CB5E5F C904C483 0044FD06 9A509C46
FF503EC5 2E2B75C2 0BFE5689 FC468908 C4830054 99729AFF 7236FF2E FF7436FF
C4830054 4A8A9AFF 7A36FF2E FF7C36FF 2EFF7E36 FF2EFF80 36FF2E1C 74003D80
005429EC 9AFC76FF FE76FFFF 8236FF2E FF8436FF 2E509846 8D165CEB 0001B808
FFC775C0 0B08C483 003CFFBE 9A509846 8D160A76 FF0C76FF 2974FFFF 3D0CC483
B804C483 00549C3C 9AFC76FF FE76FF11 EBC02B04 C4830054 9C3C9AFC 76FFFE76
FF8636FF 2EFF8836 FF2EFF8A 36FF2EFF 8C36FF2E 000004C8 5756CB5E 5FC90001
9436FF2E 1C74003D 80FF503E C52E2B75 C20BFE56 89FC4689 08C48300 5499729A
0C76FF2C EB0001B8 08C48300 544A8A9A FF8E36FF 2EFF9036 FF2EFF92 36FF2EFF
76FFFE76 FF0CC483 00544AAE 9AFC76FF FE76FFFF 9636FF2E FF9836FF 2E0A76FF
C4830054 EEEA9A0A 76FF0C76 FF0000AC C85756CB 5E5FC904 C4830054 9C3C9AFC
8E0A7E03 B07E8B1A 7CB0463B 98FF5486 8AB046FF 03EB0000 B046C7FF 54868804
50B2468D 1650FF54 868D1657 56D9EBFF 5485881F 16FD0347 B07E8B98 058A0C5E
890E7EC5 EA568BE8 468B11EB C02B0474 00AE7E83 5E5F0054 3E149A50 AE468D16
7D0FFE7E 83FE46FF 03EB0000 FE46C700 0002C857 56CB5E5F C90001B8 02558905
76FF1076 FF0005C6 0E7EC506 750FFE7E 83E97500 3D80105E 8E0E7E03 FE7E8B0E
5E8E0E7E 034FFE7E 8B0F7E00 FE7E83FE 4EFF03EB FE468904 C4830054 EEEA9A0E
FF1076FF FE46FF03 EB0000FE 46C70005 C6105E8E 0E7E03FE 7E8BE874 203D8010
FE468BDC 74203D80 105E8E0E 7E03FE7E 8B0E7EFE 463B04C4 830054EE EA9A0E76
FF9C36FF 2E0C7400 127E8336 75C00B04 C4830054 EEEA9A0E 76FF1076 FF0E4601
76FF0C76 FF505204 C4830054 7FAA9AFF 9E36FF2E FFA036FF 2E0AEBFF 9A36FF2E
FFA436FF 2EFFA636 FF2EFFA8 36FF2E0E 76FF1076 FF28EB08 C4830054 EE309A0A
001493AE 004C8AA6 00CB5E5F C910C483 00544ACA 9A0A76FF 0C76FFFF A236FF2E
40590000 00000000 3FF00000 00000000 004C7758 004C7750 00149374 001493E8
004C75F4 004C75D8 004C7596 0014951F 406FE000 00000000 3FE00000 00000000
7698004C 7669004C 7667004C 764E0010 004C7638 004C7620 004C761E 004C7611
7727004C 771D004C 7719004C 7700004C 76CF004C 76CD004C 76B4004C 76B1004C
8B555756 CB5E5FC9 EC8B5557 56CB5E5F C9EC8B55 5756004C 7737004C 7732004C
CB5E5FC9 EC8B5557 56CB5E5F C9EC8B55 5756CB5E 5FC9EC8B 555756CB 5E5FC9EC
00000000 00CB5E5F C9EC8B55 5756CB5E 5FC9EC8B 555756CB 5E5FC9EC 8B555756
00000000 00000000 00000000 00000000 00000000 00000003 00020032 00010010
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
```

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000220 | 00000000 | 00000000 | 00000000 | 00000000 | 00000000 | 00000000 | 00000000 |
| 00000441 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 20454C42 | 414E5500 | 45545445 | 53534143 | 2044414F | 4C204F54 | 20454C42 | 414E5500 |
| 53455220 | 4F542045 | 4C42414E | 55004554 | 54455353 | 41432044 | 414F4C4E | 55204F54 |
| 43204441 | 4F4C4E55 | 204F5420 | 454C4241 | 4E550052 | 4544414F | 4C204548 | 54205445 |
| 454F4420 | 45474449 | 52545241 | 43005953 | 55420059 | 44414552 | 00455454 | 45535341 |
| 58452054 | 4F4E2053 | 454F4420 | 45545445 | 53534143 | 00545349 | 58452054 | 4F4E2053 |
| 4C500045 | 54544553 | 53414320 | 4E525554 | 4552204F | 5420454C | 42414E55 | 00545349 |
| 45444F4D | 204E4F49 | 544F4D20 | 504F5453 | 00444549 | 50554343 | 4F205349 | 20454341 |
| 4420544E | 4F524620 | 52454441 | 4F4C0044 | 4550504F | 52442045 | 54544553 | 53414300 |

504F2052 4F4F4420 45545445 53534143 20524544 414F4C00 4E45504F 20524F4F
414D4D4F 43204C41 47454C4C 4900444E 414D4D4F 43204E57 4F4E4B4E 55004E45
4E524554 4E49004C 49414620 52455649 5244004C 49414620 5245574F 5000444E
00524F52 5245204D 4152204C 414E5245 54584500 524F5252 45204D41 52204C41
524F5200 524F5252 45204D4F 5200524F 52524520 4D415220 54584526 20544E49
45204D41 52205458 45202620 4D4F5200 524F5252 45204D41 5220544E 49202620
52524520 4D415220 54584520 26204D41 5220544E 49202620 4D4F5200 524F5252
58412059 00524F52 52452053 49584120 5800524F 52524520 4C415245 4E454700
44204552 41575446 4F530052 4F525245 20534958 41205A00 524F5252 45205349
414F4C20 544E5345 4F442052 454E4E41 43530054 53495845 20544F4E 2053454F
4157204E 4F545455 4220504F 54532052 4544414F 4C004554 54455353 41432044
52415754 464F5300 524F5252 45204D55 534B4345 48430044 45535345 52502053
5245204E 4F495441 43494E55 4D4D4F43 00524F52 52452047 4E494441 4F4C2045
544F4E20 544E4556 45005352 4554454D 41524150 204C4147 454C4C49 00524F52
20545055 52524554 4E492052 454D4954 20524F54 4F4D0044 45544345 54454420
00474E49 54494157 20455454 45535341 4320544E 45475255 00455255 4C494146
49525452 41430052 4F525245 204D5553 204B4345 48432052 4554454D 41524150
41430052 4F525245 20595449 52415020 45444F43 20524142 20293028 20454744
4F525245 20595449 52415020 45444F43 20524142 20293128 20454744 49525452
20595449 52415020 45444F43 20524142 20293228 20454744 49525452 41430052
52415020 45444F43 20524142 20293328 20454744 49525452 41430052 4F525245
44495254 52414300 524F5252 45204544 4F432052 41420052 4F525245 20595449
4E4F2045 54544553 53414300 4E45504F 20544F4E 20444944 20524F4F 44204547
52455345 52004445 54434554 45442054 4F4E2045 4D4F4800 52455050 49524720
20455454 45535341 43200053 524F5252 45204552 55545546 20524F46 20444556
20464F20 454E4F20 005E5245 564F4320 52455050 5520005E 005E005E 524F4F44
5E524F4F 4420544E 4F524620 52454441 4F4C2000 5E535245 564F4320 45444953
20524544 414F4C20 444E4120 53524556 4F432045 44495320 464F2045 4E4F2000
20535245 564F4320 45444953 20464F20 454E4F20 005E524F 4F442054 4E4F5246
005E2000 5E20005E 524F4F44 20544E4F 52462052 4544414F 4C20524F 2F444E41
554F2045 4D495420 45564945 43455220 005E5455 4F20454D 49542044 4E455320
504F2000 5E005E53 5245564F 43204544 49532046 4F20454E 4F20005E 20005E54
005E005E 005E5245 564F4320 52455050 5520005E 524F4F44 20474E49 54415245
434E4520 48435449 57532054 494D494C 20544847 4952005E 005E5953 5542005E
4F434E45 20484354 49575320 54494D49 4C205446 454C005E 44455245 544E554F
4F502054 45475241 54204843 41455220 544F4E20 4E414300 5E444552 45544E55
4E4F5053 45522054 4F4E005E 005E005E 005E005E 005E005E 005E4E4F 49544953
50534552 20544F4E 005E2954 554F2045 4D495420 52454646 55422820 474E4944
43005E00 5E295455 4F20454D 49542054 50555252 45544E49 2820474E 49444E4F
414D005E 44455353 41502054 494D494C 20454D49 54204E4F 49544152 42494C41
534E454C 5F474E48 43005E53 49584159 005E534E 454C005E 44414548 005E4E49
005E534E 454C005E 41544554 005E4E49 414D005E 53495249 005E4154 4554005E
54454700 5E4B2E4F 005E4445 4546005E 534E454C 005E4154 4554005E 4E49414D
005E4443 43204D4F 5246204E 4F495441 4D524F46 4E492048 43554D20 4F4F5420
204D4F52 46204E4F 4954414D 524F464E 4920454C 5454494C 204F4F54 20544547
4F4E2053 4148005E 4B2E4F00 5E474E49 444E4F50 53455220 544F4E00 5E444343
4148005E 4B53414D 20485447 4E454C4E 5552204E 49205449 4220524F 4C4F4320
4F525245 20455241 57445241 48005E52 4F4C4F43 2044454E 49464544 4E552053
4C005E29 4D415228 20524F52 52452045 52415744 52414800 5E294D4F 52282052
45204154 4144005E 54554F20 454D4954 20424D00 5E54554F 20454D49 54205842
33204E45 48542045 524F4D20 53414800 5E574F4C 46205245 564F005E 524F5252
50455320 44454E49 46454420 4F4E2053 4148005E 534E4F49 54415245 50455320
4B2E4F20 7325005E 474E4944 4E4F5053 45522054 4F4E005E 534E4F49 54415245
46207325 005E5455 4F20454D 49542045 474E4148 43584520 53554220 7325005E
005E5455 4F20454D 49542044 4D432073 25005E45 434E4555 51455320 544C5541
5245544E 49207325 005E7325 20534120 54534958 4520544F 4E204949 20504942
45205049 42005049 42005049 4220444E 32005E54 554F2045 4D495420 54505552
41430000 5E782520 3A524F52 52452050 49422044 4E32005E 7825203A 524F5252
5E73255E 73250064 31252045 54544553 53414320 2C643225 20454744 49525452
004C0B2E 004C0B28 004C0B0E 004C0AF3 004C0AD9 004C0AC1 004C0AC0 005E7325
004C0BC9 004C0BB2 004C0BA1 004C0B90 004C0B7E 004C0B64 004C0B4C 004C0B33
004C0C53 004C0C40 004C0C2D 004C0C1A 004C0C0E 004C0C03 004C0BF3 004C0BE3
004C0CD6 004C0CC9 004C0CBC 004C0CAF 004C0CA1 004C0C85 004C0C71 004C0C5D
004C0D8A 004C0D77 004C0D64 004C0D50 004C0D39 004C0D2A 004C0D0B 004C0CEE

004C0E79 004C0E6A 004C0E46 004C0E22 004C0DFE 004C0DDA 004C0DC0 004C0DA8
4F54324E 4143530A 004B4F54 314E4143 530A0000 004C0EBB 004C0EA9 004C0E95
0EE6004C 0ED60000 4B4F545F 534E4143 530A0000 4B4F544C 50504143 530A004B
0F7D004C 0F7A004C 0F4C004C 0F21004C 0F0D004C 0EF8004C 0EEA004C 0EE8004C
0FDC004C 0FCE004C 0FBD004C 0FBB004C 0FA6004C 0FA3004C 0F90004C 0F80004C
1048004C 1029004C 100A004C 0FEA004C 0FE8004C 0FE2004C 0FE0004C 0FDE004C
1078004C 1056004C 1054004C 1052004C 1050004C 104E004C 104C004C 104A004C
10E2004C 10D7004C 10D0004C 10CA004C 10C4004C 10BE004C 109F004C 109D004C
1112004C 110C004C 1106004C 1100004C 10FA004C 10F4004C 10EE004C 10E8004C
11B3004C 119E004C 117A004C 1175004C 1165004C 1140004C 111D004C 1118004C
124A004C 122E004C 1211004C 1206004C 11FA004C 11ED004C 11DF004C 11C9004C
00000000 0000004C 12B8004C 12A0004C 128F004C 127C004C 1262004C 125A004C
00000000 00000000 00000000 00000000 00000000 00000000 00000000 00000000
4C204556 49544147 454E0072 63732E6B 726D0000 00000000 00000000 00000000
45564F52 504D4920 4E490044 454C4241 53494420 474E4943 4E414C41 42205455
20455059 54205D73 255B2053 49205455 4C202E54 554C2045 56495441 47454D20
20505F43 2020474E 49544C55 53455220 2A2A2A2A 2A2A2A2A 2A000A64 25207369
6E695F78 616D000A 2A2A2A2A 2A2A2A2A 2A2A2A2A 2A2A2A2A 2A2A2A2A 2A20203A
64342520 64342520 3D6E695F 6E696D00 20202064 34252064 34252064 3425203D
2E362520 66332E36 25206633 2E362520 3D707865 5F727563 00202020 64342520
756E206C 61697265 74614D28 20414944 454D2054 43455252 4F434E49 000A6633
4520544F 4E205345 4F442073 2520454C 4946200A 0A007200 0A642520 7265626D
72727563 20667562 2054554C 20646165 7220746F 6E6E6163 0A000A0A 54534958
754F2078 614D2066 75622054 554C2064 61657220 746F6E6E 61630A00 0A746E65
6E694D20 66756220 54554C20 64616572 20746F6E 6E61630A 000A736C 61562074
20667562 2054554C 20646165 7220746F 6E6E6163 0A000A73 6C615620 74754F20
67206576 61732054 554C2064 61657220 746F6E6E 61630A00 0A6D754E 20707845
000A6570 79542054 554C2064 61657220 746F6E6E 61630A00 0A726170 20646172
736C6156 206E4920 78614D20 66756220 54554C20 64616572 20746F6E 6E61630A
6156206E 49206E69 4D206675 62205455 4C206461 65722074 6F6E6E61 630A000A
2A2A2A2A 2A2A2A2A 2A204F46 4E492045 4C494620 2A2A2A2A 2A2A2A0A 000A736C
5F78616D 5F726570 000A2A2A 2A2A2A2A 2A2A2A2A 2A2A2A2A 2A2A2A2A 2A2A2A2A
20643425 3D6E695F 6E696D5F 72657000 20206434 25206434 25206434 253D6E69
64342520 64342520 6434253D 6E695F64 696D5F72 65700020 20643425 20643425
66332E36 25203D70 78655F72 6570000A 64342520 3D206E69 61675F72 6570000A
25203D65 7361625F 78616D5F 72657000 20202020 66332E36 25206633 2E362520
4F464E49 2054554C 202A2A2A 2A2A2A2A 0A002020 20206434 25206434 25206434
2A2A2A2A 2A2A2A2A 2A2A2A2A 2A2A2A2A 2A2A2A2A 2A2A2A2A 2A2A2A2A 2A2A2A20
74756F6E 696D0020 20202064 34252064 34252064 3425203D 74756F78 616D000A
4F524620 4F464E49 2A2A2A2A 2A2A2A2A 2A000A64 34252064 34252064 3425203D
000A2A2A 2A2A2A2A 2A2A2A2A 2A2A2A2A 2A2A2A2A 2A2A2A20 203A2050 5F43204D
20643425 3D6E695F 6E696D00 20206434 25206434 25206434 253D6E69 5F78616D
36252066 332E3625 2066332E 36253D70 78655F72 75630020 20643425 20643425
6C616972 6574614D 00732500 772B7200 0A643425 203D206E 69616700 0A66332E
4C49460A 0061000A 656C6966 20666F20 646E6520 74612064 65646441 20732520
414D2057 454E2052 4F462044 454E4550 4F204542 20544F4E 4E414320 73252045
34252064 34252064 3425000A 7330332D 25000A54 5245534E 49204C41 49524554
36252064 34252064 34252064 34252064 34252064 34252064 34252064 34252064
32312D25 00643425 20643425 20643425 2066332E 36252066 332E3625 2066332E
2053454F 44207325 20454C49 46200A0A 00720068 2E65636E 616C6162 000A7330
45505954 20414944 454D0068 2E65636E 616C6162 000A0A54 53495845 20544F4E
4942204F 4F542064 25204550 59542041 4944454D 00474942 204F4F54 20642520
00732520 666F2061 74616420 676E6963 6E616C61 6220676E 69646165 520A0047
20642520 64250064 25204550 59542041 4944454D 20524F46 204F464E 49204F4E
66252066 25206625 20642520 64252064 25206425 20642520 64252064 25206425
41494445 4D20524F 4620474E 49535349 4D204F46 4E490064 25206425 20642520
7265746E 450A0029 7365756C 61762064 2520796C 6E6F2820 64252045 50595420
65746E45 0A006425 20642520 6425000A 734C4156 5F4E495F 4E494D2E 505F4320
746E450A 00642520 64252064 25000A73 4C41565F 4E495F58 414D2E50 5F432072
450A0066 25206625 20662500 0A297461 6F6C6628 20735058 452E505F 43207265
25000A6C 6576656C 5F6E6961 672E6D61 7261705F 6E616373 65727020 7265746E
6E696D5F 72657000 0A642520 64252064 25203D20 6E695F78 616D5F72 65700064
25206425 203D2020 20207475 6F78616D 000A6425 20642520 6425203D 206E695F
5F726570 000A6425 20642520 6425203D 20202020 74756F6E 696D000A 64252064

203D2020 2020206E 695F7861 6D000A64 25206425 20642520 3D206E69 5F64696D
0A642520 64252064 25203D20 20202020 6E695F6E 696D000A 64252064 25206425
7563000A 66332E36 25206633 2E362520 66332E36 25203D20 7078655F 72657000
70000A66 332E3625 2066332E 36252066 332E3625 203D2020 20202070 78655F72
72657000 20202020 64342520 64342520 64342520 3D657361 625F7861 6D5F7265
6F697463 6572726F 63000A64 25203D20 6E696167 202E6425 203D206E 6961675F
65726F66 6562206E 695F7861 6D206E69 5F6E696D 000A2057 44462072 6F66206E
325B5D31 5B5D305B 6E695F6E 696D000A 7374696D 696C2067 6E696B63 65686320
205D325B 5D315B5D 305B6E69 5F78616D 00202020 0A206425 20642520 6425205D
7374696D 696C2072 6F662073 65636964 6E690020 20200A20 64252064 25206425
0A64253D 65736162 646E6920 64253D78 616D646E 69206425 3D6E696D 646E693A
6C20676E 696B6365 68632072 65746661 206E695F 78616D20 6E695F6E 696D0020
20642520 64252064 25205D32 5B5D315B 5D305B6E 695F6E69 6D000A73 74696D69
200A2064 25206425 20642520 5D325B5D 315B5D30 5B6E695F 78616D00 2020200A
6320666C 25203863 20666C25 20376320 666C2520 33632066 6C252031 61002020
6E696D5F 77656E00 200A2066 6C252030 31632066 6C252039 63002066 6C252032
616D5F77 656E0020 20202064 25206425 20642520 5D325B5D 315B5D30 5B6E695F
6C617574 72697600 0A206425 20642520 6425205D 325B5D31 5B5D305B 6E695F78
20666C25 20316100 0A206425 20642520 6425205D 325B5D31 5B5D305B 64696D5F
20396300 20666C25 20326320 666C2520 38632066 6C252037 6320666C 25203363
44462072 6F66206E 6F697463 6572726F 6300200A 20666C25 20303163 20666C25
434E5546 20474E49 54414C55 434C4143 2D2D2D2D 2D000A20 296B6361 62282057
2D2D2D2D 2D2D2D2D 2D2D2D2D 2D2D2D2D 2D205354 4C555345 52207327 4E4F4954
00202064 34252064 34252064 34253D6E 695F7861 6D5F7765 6E000A2D 2D2D2D2D
7078655F 77656E00 20206434 25206434 25206434 253D6E69 5F6E696D 5F77656E
00000000 00000000 004C156E 000A6633 2E362520 66332E36 25206633 2E36253D
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
6F4C200A 00000000 00000000 00000000 00000000 00000000 00000000 00000000
0A6C6961 66206863 72616553 000A6425 203D2066 66696420 2C206425 203D2063
6425203D 204B2C59 2C4D2C43 203A7069 6C632072 65746661 20736575 6C615600
00000000 00000000 00000000 00020000 00000200 00000A64 252C6425 2C64252C
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 206D6F72 | 66206563 | 6E617473 | 6964200A | 00000000 | 00000000 | 00000000 | 00000000 |
| 0A746E69 | 6F505F74 | 72617453 | 5F657461 | 64705520 | 0A006625 | 203D2073 | 79617267 |
| 64252020 | 64252020 | 64252020 | 20642520 | 202D2D20 | 20206E69 | 20747261 | 74730A00 |
| 64252020 | 64252020 | 64252020 | 20642520 | 202D2D20 | 2074756F | 20747261 | 74730A00 |
| 61200A00 | 20642520 | 20642520 | 20206425 | 20202D2D | 20626772 | 20747261 | 74730A00 |
| 6F697461 | 72657065 | 73206E69 | 2065676E | 61686320 | 4F4E200A | 00662520 | 3D206464 |
| 00202020 | 2020029A | 02760002 | 00000000 | 00820200 | 00002020 | 20202000 | 6425206E |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

```
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
73753A00 73257325 00000000 00000000 00000000 00000000 00000000 00000000
72657375 3A006425 5F64255F 6431254D 502F7472 616D733A 73656C69 665F7265
69665F72 6573753A 00643125 454C4946 5F4D502F 7472616D 733A7365 6C69665F
656C6966 5F726573 753A0064 255F6425 5F643125 4D502F74 72616D73 3A73656C
0000006E 69622E64 3374756C 00006431 25454C49 465F4D50 2F747261 6D733A73
00000000 6E69622E 67656E74 756C0000 00000000 00000000 00000000 00000000
00000000 006E6962 2E707574 6573776C 00000000 00000000 00000000 00000000
00000000 00000000 006E6962 2E707574 65730000 00000000 00000000 00000000
00000000 00000000 00000000 6E69622E 64617267 00000000 00000000 00000000
00000000 00000000 0000006E 69622E67 656E6461 72670000 00000000 00000000
00000000 00000000 00000000 0000006E 69622E70 72616873 00000000 00000000
```

00000000 00000000 00000000 006E6962 2E646C6F 68736572 68740000 00000000
00000000 00000000 00000000 6E69622E 68736572 68745F70 756F7267 00000000
00000000 00000000 00000000 00000000 00000000 0000006E 69622E72 63670000
646D0000 00000000 00000000 00000000 00000000 00000000 006E6962 2E726375
75636F66 00000000 00000000 00000000 00000000 00000000 6E69622E 65736162
65635F74 6F720000 00000000 00000000 00000000 00000068 2E6D6172 61705F73
65645F63 6974706F 00000000 00000000 00000000 00000000 0000682E 7265746E
74686777 5F737563 6F660000 00000000 00000000 00000000 00000000 00682E66
2E737469 6D696C5F 73697269 00000000 00000000 00000000 00000000 0000682E
00000000 682E7473 6E6F635F 6D730000 00000000 00000000 00000000 00000068
00000000 00682E72 61765F74 72616D73 00000000 00000000 00000000 00000000
00000000 00000000 00682E68 63746170 62640000 00000000 00000000 00000000
00000000 00000000 682E666E 6F635F74 72616D73 00000000 00000000 00000000
00000000 00000000 00000000 00682E66 65645F6D 636D0000 00000000 00000000
00000000 00000000 00000000 682E6D61 7261705F 736E656C 00000000 00000000
00000000 00000000 00000000 682E666E 6F635F74 73696873 74640000 00000000
00000000 00000000 00000000 00000000 0000682E 666E6F63 5F67656E 00000000
00000000 00000000 00000000 00000000 00000000 682E6576 69746167 656E0000
74640000 00000000 00000000 00000000 00000000 00000000 00682E79 6D637367
6E616373 00000000 00000000 00000000 00000000 00000068 2E637265 6D697473
642E6B72 61640000 00000000 00000000 00000000 00000000 00682E63 726D745F
6665642E 6E696167 00000000 00000000 00000000 00000000 00000000 00006665
61642E6B 68635F69 32730000 00000000 00000000 00000000 00000000 00000000
00646C6F 2E6B6863 5F693273 00000000 00000000 00000000 00000000 00000074
00000000 0000682E 7261765F 32730000 00000000 00000000 00000000 00000000
00000000 00000000 682E306C 6F706E69 00000000 00000000 00000000 00000000
00000000 00000000 0000682E 316C6F70 6E690000 00000000 00000000 00000000
00000000 00000000 682E306C 6F706E69 5F646C6F 00000000 00000000 00000000
00000000 00000000 0000682E 316C6F70 6E695F64 6C6F0000 00000000 00000000
00000000 00000000 00000000 00746164 2E303030 6B726164 00000000 00000000
00000000 00000000 00000000 00000074 61642E30 30306E69 61670000 00000000
00000000 00000000 00000000 00000000 00746164 2E303031 6B726164 00000000
00000000 00000000 00000000 00000000 00000074 61642E30 30316E69 61670000
61670000 00000000 00000000 00000000 00000000 00746164 2E303032 6B726164
6B726164 00000000 00000000 00000000 00000000 00000074 61642E30 30326E69
31306E69 61670000 00000000 00000000 00000000 00000000 00746164 2E303130
2E313030 6B726164 00000000 00000000 00000000 00000000 00000074 61642E30
61642E31 30306E69 61670000 00000000 00000000 00000000 00000000 00746164
00746164 2E313031 6B726164 00000000 00000000 00000000 00000000 00000074
00000074 61642E31 30316E69 61670000 00000000 00000000 00000000 00000000
00000000 00746164 2E313032 6B726164 00000000 00000000 00000000 00000000
00000000 00000074 61642E31 30326E69 61670000 00000000 00000000 00000000
00000000 00000000 00746164 2E313130 6B726164 00000000 00000000 00000000
00000000 00000000 00000074 61642E31 31306E69 61670000 00000000 00000000
00000000 00000000 00000000 00746164 2E6B6863 5F693373 00000000 00000000
00000000 00000000 00000000 00000064 6C6F2E6B 68635F69 33730000 00000000
00000000 00000000 00000000 00000000 0000682E 74736E6F 635F3373 00000000
00000000 00000000 00000000 00000000 00000000 0000682E 7261765F 33730000
6E690000 00000000 00000000 00000000 00000000 682E326C 6F706E69 5F646C6F
635F7762 00000000 00000000 00000000 00000000 00000000 0000682E 326C6F70
7261765F 77620000 00000000 00000000 00000000 00000000 0000682E 74736E6F
00000000 00000000 00000000 00000000 00000000 00000000 00000000 0000682E
6D736972 703AFFFF 00010000 00000000 00000000 00000000 00000000 00000000
74643A00 00000000 00000000 00000000 00000000 2F737464 2F73656C 69663A61
00000000 00000000 00000000 00000000 00000000 00000000 00000000 003A3173
00000000 00000000 00000000 00000000 00000000 00000000 00003A32 7374643A
00000000 00000000 00000000 00000000 00000000 00000000 00000000 00000000
00000000 00000000 00000000 00000000 00000000 00000000 00000000 00000000
00000000 04000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000

```
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
6E69200A 00000000 00000000 00000000 00000000 00000000 00000000 00000000
6E69200A 00642520 646E695F 746C2064 25206220 64252067 20642520 72746C74
7263200A 00642520 646E695F 6B642064 25206220 64252067 20642520 726B6474
25006625 00642500 62720068 2E657669 74616765 6E006425 20646E69 5F73736F
666C2520 666C2500 666C2520 66250066 6C252066 25006625 00642500 66250066
2520666C 2520666C 25006425 20666C25 20666C25 20666C25 00642520 666C2520
```

```
28696661 20646165 72200A00 64252066 6C252066 6C252066 6C250064 2520666C
2520000A 20666C25 20666C25 20666C25 20000A20 656C6966 206D6F72 6620296A
666C2520 000A2066 6C252066 6C252066 6C252000 0A20666C 2520666C 2520666C
20294A28 49464120 666F204E 4F495443 4552524F 43000A20 666C2520 666C2520
383E2D2D 32312074 72617473 203A5443 43535444 200A2000 0A574446 20524F46
64252064 6E695F74 70746C20 0A00203E 3E3E3E20 6E6F6974 616C7563 6C616320
64746E69 20206425 20646E69 5F74706B 64200A00 64252074 70746C74 6E692020
67206425 2C642520 3A74756F 20206425 2C642520 203A6E69 20006425 2074706B
74646D2C 64616873 2C747361 72746E6F 632C7965 6B20000A 666C2520 3A646172
6C252066 6C252066 6C252066 6C252066 6C252020 200A3A61 666C612C 746C682C
000A666C 25202020 3D505845 2000200A 666C2520 72746320 00200A66 6C252066
25205D32 5B316661 20666C25 205D315B 31666120 666C2520 5D305B31 6661200A
205D325B 32666120 666C2520 5D315B32 66612066 6C25205D 305B3266 6120666C
5B336661 20666C25 205D315B 33666120 666C2520 5D305B33 6661200A 00666C25
34666120 666C2520 5D315B34 66612066 6C25205D 305B3466 6120666C 25205D32
61206425 20336761 20642520 32676120 64252031 6761200A 00666C25 205D325B
20524F46 20294A28 49464120 666F204E 4F495443 4552524F 43002064 25203467
20666C25 20666C25 20666C25 00772B72 00682E65 76697461 67656E00 0A574446
20666C25 20666C25 20666C25 000A6425 20666C25 20666C25 20666C25 000A6425
20336320 666C2520 3161200A 000A6425 20666C25 20666C25 20666C25 000A6425
666C2520 39630020 666C2520 32632066 6C252038 6320666C 25203763 20666C25
2520203D 205D6425 5B726C61 76726574 6E69200A 00200A20 666C2520 30316320
746E6920 0A002035 3930342D 30205449 4D494C20 464F2054 554F2020 2E202064
494D494C 20464F20 54554F20 202E2020 64252020 3D205D64 255B676C 61767265
20642520 203D205D 64255B62 6C617672 65746E69 200A0020 35393034 2D302054
615F776F 6C200A00 20353930 342D3020 54494D49 4C20464F 2054554F 20202E20
6E617420 6625206C 61765F77 6F6C2064 25203164 64615F77 6F6C2064 25206464
64615F68 67696820 0A002064 25206464 615F776F 6C200A00 20206625 2063735F
69722066 25206C61 765F6867 69682064 25203164 64612068 67696820 64252064
61206C61 72747565 6E002064 25206464 615F6867 6968200A 00206625 20746867
000A6625 20662520 66252066 25206E65 65726720 726F6620 73657373 65726464
656C706D 6F632020 0A003231 2D343120 726F6620 6E6F6974 63657272 6F63200A
00000000 00000000 00000000 00000000 00000000 00000000 0000000A 20646574
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 FFFFFFFF 00006466 322E3325 0066302E 34250020 64643425 00000000
00000000 00000000 00000000 00000000 00002076 20202020 02A40255 00010000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
```

541 542

```
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
4D204F46 4E49204E 4920524F 52524520 2A2A2A2A 2A2A2A2A 2A2A0000 00000000
255B2045 5059545F 574F444E 49575F5F 45544145 52435F57 203A5245 47414E41
```

00000000 00000000 00000000 00000000 00000000 00000000 00000000 00000000
00000000 00000000 00000000 00000000 00000000 00000000 00000000 00000000
00000000 00000000 00000000 00000000 0000004C 5C020072 63732E6B 726D0000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
52524520 4E4F4954 4143494C 50504120 00000000 00000000 00000000 00000000
20646568 63616572 206B6361 74732066 6F204D4F 54544F42 20000A64 2520524F
6C6C6120 65726120 706F7020 726F2068 73757020 4F4E2000 2069706F 70207461
656C6C61 63206E65 65622073 6168206E 72757465 72207265 74666120 6465776F
70207461 20646568 63616572 206B6361 74732066 6F206D6F 74746F62 20002064
6465776F 6C6C6120 65726120 706F7020 726F2068 73757020 4F4E2000 2066706F
20002064 656C6C61 63206E65 65622073 6168206E 72757465 72207265 74666120
6F70706F 70207461 20646568 63616572 206B6361 74732066 6F206D6F 74746F62
66612064 65776F6C 6C612065 72612070 6F702072 6F206873 7570204F 4E200020
746F6220 00206465 6C6C6163 206E6565 62207361 68206E72 75746572 20726574
4E200020 63706F70 20746120 64656863 61657220 6B636174 7320666F 206D6F74
20726574 66612064 65776F6C 6C612065 72612070 6F702072 6F206873 7570204F
20666F20 504F5420 00206465 6C6C6163 206E6565 62207361 68206E72 75746572
68737570 204F4E20 00206968 73757020 74612064 65686361 6572206B 63617473
6E727574 65722072 65746661 20646577 6F6C6C61 20657261 20706F70 20726F20
206B6361 74732066 6F20504F 54200020 64656C6C 6163206E 65656220 73616820
6F702072 6F206873 7570204F 4E200020 66687375 70207461 20646568 63616572
62207361 68206E72 75746572 20726574 66612064 65776F6C 6C612065 72612070
65686361 6572206B 63617473 20666F20 504F5420 00206465 6C6C6163 206E6565
20657261 20706F70 20726F20 68737570 204F4E20 00206368 73757020 74612064
6163206E 65656220 73616820 6E727574 65722072 65746661 20646577 6F6C6C61
65776F6C 6C612065 72612070 6F702072 6F206873 7570204F 4E200020 64656C6C
00206465 6C6C6163 206E6565 62207361 68206E72 75746572 20726574 66612064
00207368 73757020 74612064 65686361 6572206B 63617473 20666F20 504F5420
65746661 20646577 6F6C6C61 20657261 20706F70 20726F20 68737570 204F4E20
6F74746F 62200020 64656C6C 6163206E 65656220 73616820 6E727574 65722072
6F20706F 74007370 6F702074 61206465 68636165 72206B63 61747320 666F206D
7461636F 4C6C6C75 46687375 50207461 20646568 63616572 206B6361 74732066
253B6425 5B1B0048 64253B64 255B1B00 4A325B1B 78626D76 69727007 0000726F
61686320 7475706E 69206E65 706F2074 6F6E6E61 430A003A 49524554 3A004864

```
414D204F 464E4920 4E492052 4F525245 202A2A2A 2A2A2A2A 2A2A2A00 0A5D7834
2A2A2A00 0A5D7834 255B204E 454C5F54 5845545F 5445535F 57203A52 4547414E
57203A52 4547414E 414D204F 464E4920 4E492052 4F525245 202A2A2A 2A2A2A2A
2A2A2A2A 2A2A2A2A 2A000A5D 7834255B 20574F44 4E49575F 5F455441 4552435F
5245534E 495F5720 3A524547 414E414D 204F464E 49204E49 20524F52 5245202A
1B006325 63251B63 2563251B 000A5D78 34255B20 554E454D 5F49544C 554D5F54
4E49204E 4920524F 52524520 2A2A2A2A 2A2A2A2A 2A2A0063 2563251B 63256325
34255B20 574F444E 49575F59 414C5053 49445F57 203A5245 47414E41 4D204F46
4E414D20 4F464E49 204E4920 524F5252 45202A2A 2A2A2A2A 2A2A2A2A 000A5D78
0A5D7834 255B2055 4E454D5F 49544C55 4D5F5946 49444F4D 5F57203A 52454741
4547414E 414D204F 464E4920 4E492052 4F525245 202A2A2A 2A2A2A2A 2A2A2A00
2A2A2A2A 2A2A2A00 0A5D7834 255B2057 4F444E49 575F4553 4152455F 57203A52
4C45445F 57203A52 4547414E 414D204F 464E4920 4E492052 4F525245 202A2A2A
00000000 0000FFFF 00000A5D 7834255B 20455059 545F574F 444E4957 5F455445
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
0A232323 23232323 20534555 4C415620 4B434548 43202323 23232323 23200A0A
0A006425 20206425 20206425 203D206C 61765F6E 695F7861 6D2E705F 63200A00
49200A00 64252020 64252020 6425203D 206C6176 5F6E695F 6E696D2E 705F6320
4C205448 47494C20 23232323 23232320 0A002073 65756C61 56206C61 67656C6C
64252020 6425203D 206C6176 5F78616D 200A000A 23232323 23232320 4C455645
23232323 23232320 45554820 54484749 4C202323 23232323 23200A00 64252020
000A2323 23232323 23204854 4F422054 4847494C 20232323 23232323 200A000A
200A000A 23232323 23232320 4C455645 4C5F4B52 41442023 23232323 2323200A
44202023 23232323 23200A00 64252020 64252020 6425203D 206C6176 5F6E696D
4F425F4B 52414420 20232323 23232320 0A002323 23232323 20455548 204B5241
20206425 20206425 203D206C 61765F6E 696D200A 000A2323 23232323 20204854
5F63200A 000A2323 23232323 2078616D 6C616320 20232323 23232320 0A006425
23232323 200A0064 25202064 25202064 25203D20 6C61765F 6E695F78 616D2E70
5F6E695F 6E696D2E 705F6320 0A000A23 23232323 23206E69 6D6C6163 20202323
00000000 00000000 00000000 00000000 64252020 64252020 6425203D 206C6176
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
```

003A6F72 65743A00 0D5C1B31 3D542C30 3D4F2C31 3D453A43 5D1B000A 6C656E6E
0A000A6C 656E6E61 68632074 75707475 6F206E65 706F2074 6F6E6E61 430A0077
5B1B000A 786F626C 69616D20 6B736174 20657461 636F6C6C 6120746F 6E6E6143
6C30281B 00006D30 5B1B0020 20202020 20202000 6D375B1B 006D305B 1B006D37
71717171 71717171 71717171 71717171 71717171 71717171 71717171 71717171
20202020 20202020 20202020 20207848 30323B64 255B1B30 281B006B 71717171
3B31315B 1B30281B 00782020 20202020 20202020 20202020 20202020 20202020
71717171 71717171 71717171 71717171 71717171 71717171 71717171 74483032
20202020 20202020 20207848 30323B64 255B1B30 281B0075 71717171 71717171
1B30281B 00782020 20202020 20202020 20202020 20202020 20202020 20202020
20202020 20202020 20202020 20202020 20202020 20202020 78483032 3B64255B
20202020 20207848 30323B34 315B1B30 281B0078 20202020 20202020 20202020
206D305B 1B616161 61616161 61616161 61616161 61616161 616D373B 315B1B20
20206A71 20302020 20207848 30323B35 315B1B30 281B0078 20202020 20202020
30281B00 78202020 25253030 3120716D 20202020 20202020 20202020 20202020
71717171 71717171 71717171 71717171 71717171 7171716D 4830323B 36315B1B
5B1B006D 375B1B00 48313B31 5B1B0042 281B6A71 71717171 71717171 71717171
20002020 74697551 20200020 20293166 28202000 20207472 6F624120 00683032
1B73256D 375B1B48 38323B34 315B1B00 7325203A 454C4946 00202029 32662820
4154535F 54415453 0B00464E 495F4D45 54535953 0A007374 726F6261 006D305B
5F4D4554 5359530A 00464E49 5F544154 53080000 00010000 00000000 00535554
00000000 00000000 00000000 00D20000 00080808 0808000E 160C0201 00464E49
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
302E3325 0066322E 3325006C 6E702E33 5F737464 00000000 00000000 00000000
5F435F57 454E0044 5F435F57 454E004C 5F435F57 454E004C 5F435F57 454E0066
5F435F44 4C4F0044 5F435F44 4C4F004C 5F435F44 4C4F004C 5F435F44 4C4F0044
5F4D5F57 454E0044 5F4D5F57 454E004C 5F4D5F57 454E004C 5F4D5F57 454E0044
5F4D5F44 4C4F0044 5F4D5F44 4C4F004C 5F4D5F44 4C4F004C 5F4D5F44 4C4F0044
5F595F57 454E0044 5F595F57 454E004C 5F595F57 454E004C 5F595F57 454E0044
5F595F44 4C4F0044 5F595F44 4C4F004C 5F595F44 4C4F004C 5F595F44 4C4F0044
5F4B5F44 4C4F0044 5F4B5F44 4C4F0044 5F4B5F57 454E0044 5F4B5F57 454E0044
4C4F004C 5F4D5F44 4C4F004C 5F435F44 4C4F0066 302E3325 0066322E 33250044
4C4F004C 5F595F44 4C4F004C 5F4D5F44 4C4F004C 5F435F44 4C4F004C 5F595F44
5F435F57 454E0066 302E3325 0066322E 3325004C 5F4B5F44 4C4F004C 5F4B5F44
5F4D5F57 454E004C 5F435F57 454E004C 5F595F57 454E004C 5F4D5F57 454E004C
0066322E 3325004C 5F4B5F57 454E004C 5F4B5F57 454E004C 5F595F57 454E004C
4C4F0044 5F595F44 4C4F0044 5F4D5F44 4C4F0044 5F435F44 4C4F0066 302E3325
4C4F0044 5F595F44 4C4F0044 5F4D5F44 4C4F0044 5F435F44 4C4F0044 5F4B5F44
5F4D5F57 454E0044 5F435F57 454E0066 302E3325 0066322E 33250044 5F4B5F44
5F4D5F57 454E0044 5F435F57 454E0044 5F4B5F57 454E0044 5F595F57 454E0044
00545242 00545242 0066322E 33250044 5F4B5F57 454E0044 5F595F57 454E0044
445F505F 57000000 4E45445F 505F5700 7325004E 45445F50 5F570066 322E3325
45445F50 5F440073 25004E45 445F505F 44006632 2E332500 66322E33 25004E45
004C5F4B 5F444C4F 0066302E 33250066 322E3325 004E4544 5F505F44 0000004E
5F57454E 004C5F4B 5F57454E 0066302E 33250066 322E3325 004C5F4B 5F444C4F
00445F4B 5F444C4F 00445F4B 5F444C4F 0066302E 33250066 322E3325 004C5F4B
0A200A20 00445F4B 5F57454E 00445F4B 5F57454E 0066302E 33250066 322E3325
616C7563 6C616320 38203E2D 2D203820 74726174 73203A38 44415247 53544420
74686769 6C202064 252C6425 20203A6B 72616420 0A00203E 3E3E3E20 6E6F6974
74646D2C 64616873 2C747361 72746E6F 632C7965 6B20000A 2064252C 6425203A
666C2520 666C2520 666C2520 666C2520 666C2520 20200A3A 7078652C 746C682C
0A202066 2520203A 646E6520 20662520 203A7472 61747320 00200A20 666C2520
48205448 47494C20 48435441 43000A20 20544847 494C5F48 43544143 204F4E00
67694C20 68637461 4320646C 69754200 0A202D20 54434546 4645204F 4E205341
6625203D 20327820 726F7272 65000A20 64657465 6C706D6F 6320000A 2E207468
71652066 25203D20 32782072 6F727265 000A6625 203D2031 78206C61 75716520
20202020 20662520 3D207373 656E7065 65747300 0A662520 3D203178 206C6175
20202066 6C25203D 2065706F 6C732000 20202020 20662520 3D20656C 676E6100
6425203D 2074756F 5F747261 7473202C 20642520 3D206E69 5F747261 7473000A
00000000 3F800000 3F000000 00000000 00000000 3F000000 00000000 000A2020
3F000000 3F800000 3F800000 3F800000 3F800000 00000000 00000000 00000000
3F000000 3F000000 3F000000 3ECCCCCC 3F4CCCCC 3F000000 3F199999 3F199999

| | | | | | | | |
|---|---|---|---|---|---|---|---|
| 00000000 | 00000000 | 00000000 | 3F800000 | 3F800000 | 3F800000 | 3F800000 | 3F800000 |
| 00000000 | 00000000 | 3F8CCCCC | 3F000000 | 3F199999 | 3F199999 | 3F000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 7261656C | 5F737464 | 00000000 | 00000000 | 00000000 | 00000000 | 00000000 | 00000000 |
| 73252064 | 6E696620 | 746F6E6E | 6163202E | 20726F72 | 7265200A | 00772B72 | 00682E6E |
| 25006425 | 00642500 | 20737365 | 636F7270 | 20676E69 | 6E726165 | 6C206F4E | 200A0020 |
| 72754320 | 200A0020 | 73736563 | 6F727020 | 676E696E | 7261656C | 206F4E20 | 0A0A0064 |
| 65622074 | 6F6E206C | 6C697720 | 73726574 | 656D6172 | 6170206E | 61637320 | 746E6572 |
| 25006625 | 66256625 | 00662566 | 25662500 | 66256625 | 66250020 | 64656E72 | 61656C20 |
| 00206625 | 203D5D64 | 255B6665 | 6F635F65 | 74696877 | 5F646C6F | 200A0066 | 25662566 |
| 77656E20 | 0A002066 | 25203D5D | 64255B66 | 656F635F | 65746968 | 775F7265 | 7375200A |
| 65676E61 | 6863206F | 6E200A00 | 20662520 | 3D5D6425 | 5B66656F | 635F6574 | 6968775F |
| 635F6B72 | 61645F64 | 6C6F200A | 00205D64 | 255B6665 | 6F635F65 | 74696877 | 206E6920 |
| 255B6665 | 6F635F6B | 7261645F | 72657375 | 200A0020 | 6625203D | 205D6425 | 5B66656F |
| 25203D20 | 5D64255B | 66656F63 | 5F6B7261 | 645F7765 | 6E200A00 | 20662520 | 3D205D64 |
| 205D6425 | 5B66656F | 635F6B72 | 6164206E | 69206567 | 6E616863 | 206F6E20 | 0A002066 |
| 6C696620 | 65687420 | 676E6964 | 6E697765 | 7220656C | 69687720 | 726F7272 | 65200A00 |
| 20202064 | 25002073 | 7365636F | 72702067 | 6E696E72 | 61656C20 | 6F4E200A | 0A002065 |
| 616C6620 | 79726F74 | 73696820 | 65737520 | 20202020 | 20202020 | 20202020 | 20202020 |
| 72756320 | 65737520 | 20202020 | 20202020 | 20202020 | 20202020 | 20202064 | 25000A67 |
| 20202020 | 20202020 | 6425000A | 67616C66 | 20737265 | 74656D61 | 72617020 | 746E6572 |
| 20662500 | 0A736E61 | 63732066 | 6F207265 | 626D756E | 20202020 | 20202020 | 20202020 |
| 64202020 | 66252066 | 25206625 | 000A6665 | 6F632065 | 74696877 | 20202066 | 25206625 |
| 64656570 | 73206574 | 69687720 | 20206625 | 20662520 | 6625000A | 66656F63 | 206B7261 |
| 00000000 | 00040000 | 0A646565 | 7073206B | 72616420 | 20206625 | 20662520 | 6625000A |
| 0000FFFF | 43C00000 | 44000000 | 43C00000 | 00000000 | 00000000 | 44000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 696E6E65 | 706F206E | 6920726F | 72726520 | 00627200 | 682E6563 | 61707372 | 6F6C6F63 |

000A2065 6C696620 6E6F6974 696E6966 65642065 63617073 726F6C6F 6320676E
6625000A 20646573 75207369 206E6F69 74696E69 66656420 746C7561 66656420
00627200 6C62742E 32633163 6C006625 66256625 00662566 25662500 66256625
20676E69 6E6E6570 6F206E69 20726F72 72652000 6277006C 62742E32 6331636C
6C62742E 32633163 6C000A20 656C6966 20656C62 61742032 6331636C 32626772
20326331 636C3262 67722067 6E696E6E 65706F20 6E692072 6F727265 00627200
74203243 31434C20 676E6964 61657220 6E692072 6F727265 20000A65 6C626174
742E7263 75326331 636C0062 72006C62 742E7263 75326331 636C0020 656C6261
31636C32 62677220 676E696E 6E65706F 206E6920 726F7272 65200062 77006C62
6C62742E 72637532 6331636C 000A2065 6C696620 656C6261 74207263 755F3263
20326331 636C3262 67722067 6E696E6E 65706F20 6E692072 6F727265 00627200
74203243 31434C20 676E6964 61657220 6E692072 6F727265 20000A65 6C626174
E353BD65 6041BEE2 4DD23EFE F9DB3EAA A64C3EAA A64C3EAA A64C0020 656C6261
BF2D4FDF 3F800000 00000000 3FB41893 3F800000 3C003EFE F9DBBEAC 0831BE25
676E6964 726F6365 520A0000 00000000 3FEC8B43 00000000 3F800000 BE71A9FB
6434252C 6434252C 64342520 3D323142 47522072 656E656D 6F746973 6E654420
69207325 2074754C 000A0A64 34252C64 34252C64 34252C64 34253D4B 594D4320
524F4345 52205453 5249460A 000A6465 64726F63 65722079 64616572 6C612073
0072000A 646C2520 657A6973 20666F00 202C7325 2054554C 20464F20 474E4944
7220746F 6E6E6143 000A5453 49584520 544F4E20 53454F44 20732520 54554C0A
756C6365 722F6472 6F636572 3A726573 753A000A 6F666E49 2054554C 20646165
20737475 6C2D6465 64726F63 65722D79 64616572 6C410A00 72007461 642E7374
65723A72 6573753A 000A5453 49584520 544F4E20 53454F44 20732520 454C4946
64726F63 65723A72 6573753A 00732500 7461642E 7374756C 6365722F 64726F63
64656472 6F636572 2D796461 65726C41 0A006100 7461642E 7374756C 6365722F
000A6465 6E65706F 20454220 544F4E4E 41432073 2520454C 49462073 74756C2D
74756C00 0A732500 7461642E 7374756C 6365722F 64726F63 65723A72 6573753A
626F6A3A 72657375 3A007325 7325006E 69622E67 656E7475 6C006E69 622E6433
00000000 00000000 3F800000 40400000 002F656C 6261742F 63696C62 75702F73
6C005E73 2500454C 4241542F 43494C42 55500072 63732E6B 726D0000 00000000
656E2065 74616572 6320746F 6E206E61 6309090A 0A007700 6E69622E 64337475
6309090A 0A007700 6E69622E 67656E74 756C000A 74736978 6520656C 69662077
0A0A000A 74736978 6520656C 69662077 656E2065 74616572 6320746F 6E206E61
43494C42 55500020 0A0A2064 25203D20 45505954 2054554C 203E2D2D 2D2D2D20
2D200A0A 005E7325 00454C42 41542F43 494C4255 50005E73 2500454C 4241542F
2E67656E 64617267 00200A0A 20642520 3D204550 59542054 554C203E 2D2D2D2D
206E6962 2E67656E 64617267 206E6570 6F20746F 6E206E61 630A0077 006E6962
6F20746F 6E206E61 630A0077 006E6962 2E646172 67000A65 74697277 20726F66
7720726F 7272650A 000A6574 69727720 726F6620 6E69622E 64617267 206E6570
672F7374 642F7365 6C69663A 616D7369 72703A20 676E6974 69727720 656C6968
703A2067 6E697469 72772065 6C696877 20726F72 72650A00 0A6E6962 2E646172
2020004C 7766000A 6E69622E 64617267 2F737464 2F73656C 69663A61 6D736972
00000000 00000000 00000000 00000000 00000000 20202020 20202020 20202020
6C696877 20726F72 72450000 7325203A 4B420000 00000000 00000000 00000000
3A206E6F 6974636E 75662079 616C7073 69642073 75746174 73207469 6E692065
74696E69 20656C69 68772072 6F727245 000A6F66 6E497469 6E495F74 61745320
5F746174 53203A20 6E6F6974 636E7566 2079616C 70736964 20737574 61747320
6E692065 6C696877 20726F72 72450000 7325203A 5246000A 70736944 74696E49
61745320 3A206E6F 6974636E 75662079 616C7073 69642073 75746174 73207469
61747320 74696E69 20656C69 68772072 6F727245 000A6F66 6E497469 6E495F74
74696E49 5F746174 53203A20 6E6F6974 636E7566 2079616C 70736964 20737574
2074696E 6920656C 69687720 726F7272 45000073 25203A20 6325000A 70736944
495F7461 7453203A 206E6F69 74636E75 66207961 6C707369 64207375 74617473
73757461 74732074 696E6920 656C6968 7720726F 72724500 0A6F666E 4974696E
73694474 696E495F 74617453 203A206E 6F697463 6E756620 79616C70 73696420
73696420 73757461 74732065 74616470 7520656C 69687720 726F7272 45000A70
64207375 74617473 2065736F 6C632065 6C696877 20726F72 7245000A 79616C70
00000000 00000000 00000000 00000000 00000000 00000000 000A7961 6C707369
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 7B680000 00000000
00000000 00000000 00000000 00000000 00000000 00000000 00000000 00000000
00000000 00000000 00000000 00000000 00000000 00000000 00000000 00000000

00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00200000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
776F6C66 7265766F 2079726F 6D656D20 00000000 00000000 00000000 00000000
25207466 656C5F70 6F745F79 20202020 64252074 66656C5F 706F745F 78200A00
6D6F7474 6F625F79 20206425 20746867 69725F6D 6F74746F 625F7820 0A002064
20207468 67696568 20206425 20687464 6977200A 00206425 20207468 6769725F
25006464 33250020 20534E41 5254414D 44204E49 20524F52 5245200A 00206425
001B1A19 18177620 20200008 00040002 0001021C 02350000 00000064 66322E33
00000000 00000000 00000000 00000000 00000000 00000000 00000000 00000002
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
2F43494C 42555000 5E732500 454C4241 542F4349 4C425550 00726373 2E6B726D
65706F20 746F6E20 6E61630A 0077006E 69622E72 6367005E 73250045 4C424154
6C696877 20726F72 72650A00 0A657469 72772072 6F66206E 69622E72 6367206E
61630A00 77006E69 622E7263 75000A6E 69622E72 63672067 6E697469 72772065
650A000A 65746972 7720726F 66206E69 622E7263 75206E65 706F2074 6F6E206E
004C8020 000A6E69 622E7263 7520676E 69746972 7720656C 69687720 726F7272
00000000 00000000 00000000 00000000 00000000 00000000 00000000 00000000
73692074 6E696F70 200A0000 00000000 00000000 00000000 00000000 00000000
74696220 32310A00 6272000A 61657261 2079616C 70736964 20666F20 74756F20
42202020 20204720 20202020 52203A20 20797469 736E6564 5F747570 6E692073
31202020 200A2064 34252020 64342520 20643425 203A6234 31202020 20000A20
3425203A 32317475 6F202020 200A2064 34252020 64342520 20643425 203A6232
20643425 20206434 25203A62 32312020 2020000A 20643425 20206434 25202064
0A206434 25202064 34252020 64342520 3A323174 756F2020 20200A20 64342520
0A616572 61207961 6C707369 6420666F 2074756F 20736920 746E696F 70200A00
3D3D3D3D 3D3D3D3D 3D3D3D3D 3D3D3D3D 3D3D3D3D 3D3D3D3D 3D3D3D3D 00627200
3D3D3D3D 3D3D3D3D 3D3D3D3D 3D3D3D3D 3D3D3D3D 3D3D3D3D 3D3D3D3D 3D3D3D3D
57422079 6D6D7564 20657375 206F7420 64656972 74203A20 524F5252 4520000A
3D3D3D3D 3D3D3D00 0A202121 20732520 656E6974 756F7220 52454E4E 4143535F
3D3D3D3D 3D3D3D3D 3D3D3D3D 3D3D3D3D 3D3D3D3D 3D3D3D3D 3D3D3D3D 3D3D3D3D
705F6E65 706F5F77 62000A3D 3D3D3D3D 3D3D3D3D 3D3D3D3D 3D3D3D3D 3D3D3D3D
6E69200A 00656761 72617661 5F6C6578 69705F77 625F7465 6700656C 69665F6D
2C206632 2E303125 203D2063 20207475 706E690A 00643525 203D2070 6F6F6C20
74757074 756F0A00 66322E30 3125203D 2079202C 2066322E 30312520 3D206D20
25203D20 62202C20 66322E30 3125203D 2067202C 2066322E 30312520 3D207220
5B74756C 202C2064 3325203D 205D725B 74756C20 6B636568 630A0066 322E3031
33252064 3325200A 00643325 203D205D 625B7475 6C202C20 64332520 3D205D67
0A2A2A2A 2A2A2A2A 2064656C 69616620 68637261 6573200A 000A2064 33252064
00000000 00000000 00000000 00000000 00000000 40000000 20000000 00000000

00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
756F206E 65706F20 746F6E6E 61430A00 77003A6F 7265743A 00000000 00000000
375B1B48 38323B34 315B1B00 7374726F 6261000A 6C656E6E 61686320 74757074
00005355 54415453 5F544154 530B0046 4E495F54 41545308 006D305B 1B73256D
00000000 00000000 00000000 00000000 00000000 00464E49 5F4D4554 5359530A
00000000 00000000 00000000 00000000 00000000 00000000 00000000 00000000
6C696166 202D2046 49534D49 550A0000 00000000 00000000 00000000 00000000
74207265 6E776F20 64657463 65706563 63612065 76696563 6572206F 74206465
6572206F 74206465 6C696166 202D2046 49534D49 554E494F 4A0A002E 6E656B6F
0000002E 6E656B6F 74207265 6E776F20 64657463 65706563 63612065 76696563
00000000 00000000 00000000 FFFF7862 6D736D69 75070000 000001F4 00000000
4F462047 454E5F4E 41435320 200A0000 00000000 00000000 00000000 00000000
47454E5F 4E414353 20200A00 204E4F49 53524556 4E4F4320 54494220 34312052
00206625 20746361 66746E69 20206425 206C6576 656C5F6B 72616420 0A002020
41532044 4343200A 00203120 6F742064 65676E61 68632074 63616674 6E69200A
33250020 64643425 006E2F20 66252063 735F6E61 74200A00 20444554 41525554
20200008 00040002 000101F0 026B0064 66322E33 25002064 64342500 6466322E
00000000 00000000 00000000 00000000 00000000 00000000 00000000 20762020
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
63732E6B 726D0000 00000000 00000000 00000000 00000000 00000000 00000000
4F54324E 4143530A 004B4F54 314E4143 530A004C 873A0000 00545241 4D530072
00000000 00000000 4B4F545F 534E4143 530A0000 4B4F544C 50504143 530A004B
00000000 00000000 00000000 00000000 00000000 00000000 00000000 00000000
20726F74 63616620 6E6F6974 61726765 746E6920 0A200000 00000000 00000000
6625203D 20726F74 63616620 6E6F6974 61726765 746E6920 0A200020 6625203D
74206765 6E616863 20726F74 63616620 6E6F6974 61726765 746E6920 0A200020
49544144 4152475F 386F7420 3D3D3D3D 3D3D0000 00000000 20662520 3D20206F
000A2044 4152475F 54434552 524F435F 54554C20 0A000A3D 3D3D3D3D 3D204E4F
74736968 2078614D 0A003231 2D343120 726F6620 6E6F6974 63657272 6F63200A
6F697372 65765F6D 6172676F 72700000 0A642520 7369206C 6176206D 6172676F
6D75736B 63656863 2C2A2A2A 2A2A2A2A 2A2A2A2A 2A2A2A3D 7265626D 756E5F6E
20200000 53533A4D 4D3A4848 00000059 592F4444 2F4D4D3D 65746164 202C2A3D
682E6570 79745F72 656E6E61 63738872 00002020 20202020 20202020 20202020
74643A00 52485452 414D5300 4F575452 414D5300 59545241 4D530073 25007200
4D530032 37545241 4D530030 37545241 4D530072 00682E72 6564616F 6C3A3173
00010006 00060006 00020002 0002FFFF FFFF0000 FFFFFFFF FFFFFFFF 00545241
FFFF0000 00040004 00040007 00070007 00050005 00050003 00030003 00010001
00000000 00000000 00000000 00000000 00000000 00000000 00000000 00000000
62206425 20657461 636F6C6C 6120746F 6E6E6163 200A0000 00000000 00000000
00C8FFEC 00140000 656C6261 74206E6F 69746164 61726720 726F6620 73657479
00000000 00000000 00000000 00000000 00000000 00000000 00000000 0000FF38
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
66700063 6F6C6C61 63700000 00000000 00000000 00000000 00000000 00000000
65707375 735F656C 62616E65 00646E65 70737573 5F656C62 61736964 00656572
4A5F534D 46070046 4E495F4D 45545359 530A004A 4C414943 45505308 0000646E
20642520 20642520 3D203862 6772202A 2A2A200A 00000000 00000000 0000424F
00000000 00000000 00000000 00000000 00000000 00000000 00000000 0A642520
02000000 00000000 00000000 00000000 00000000 00000000 00000000 00000000
00000300 00000303 03030002 01020002 02020000 02020200 00020202 00000200
FFFFFFFF 00FFFFFF 0000FFFF FF000000 FF000000 00030003 03030000 03030300
6F6E2068 74697720 70756F72 67672073 6B67004E 00000000 00000000 FF000000
756F7961 6C204854 49572070 756F7267 6720736B 67000A20 2E74756F 79616C20
00000000 00000000 0A202E20 70756F72 675F7374 645F7465 73657200 0A202E74
00000000 00000000 00000000 00000000 00000000 00000000 00000000 00000000
00000000 00000000 00000000 00000000 00000000 00000000 00000000 00000000

756C0073 756F6976 6572705F 74756C00 6433315F 74756C00 65766173 5F74756C
00720077 0073756F 69766572 705F7475 6C006433 315F7475 6C006576 61735F74
73657264 64612054 4C4D206C 6C612065 74616470 7520656D 69742074 73726946
6A6C656E 61700000 00000000 00000000 00000000 00000000 00000001 00000A73
00000000 00000000 00000000 00000000 00000000 00000000 00000000 0000626F
2F43494C 42555000 454C4241 542F4349 4C425550 00000000 00000000 00000000
52455408 00656D65 74737973 7000454C 42415400 43494C42 55500045 4C424154
00000000 00000058 424D5F4D 52455408 004E4957 5F4D5245 5408004D 45535F4D
206E6920 726F7272 65000A20 65706163 73656720 6E692072 6F727265 00000000
00030303 00000303 03000000 03000000 03030303 0008000A 20657061 63736567
75006665 64626F6A 00726373 2E6B726D 00000000 00000000 00000000 00000003
FFFF7862 6D69646E 77070000 00000000 0000FFFF 004C8D10 00666564 7374696E
67060000 00000000 FFFF7862 6D69646E 77070000 00000000 FFFF0000 00000000
002F5342 4F4A3A53 454C4946 5F524553 553A0000 00000000 00FFFF78 626D736B
0003FFFF 00474946 4E4F435F 5357470A 00000000 00000000 00000000 00000000
54454D41 5241500A 004C8DAC 00726373 2E6B726D 00000000 00000000 00000000
53055842 4D505345 52070000 00000000 00000000 00000000 00000000 00535245
00000000 00000000 00000000 0000000A 00010000 00000004 0004FFFF 4B434154
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
50F6468D 1650FC46 8D16FF6A 35FF091C 3EC52E57 560000F6 46C70000 0AC85756
5E5F0054 3AE09A50 F6468D16 006A5756 107400F6 7E83FE46 895E5F00 543BF49A
058BF87E C50A7400 023D058B F87EC5FA 5689F846 8902C483 0054EF9C 9AFE76FF
09203EC5 2E09EB05 8909203E C52EFC46 8B0C7500 023D058B F87EC56E 7500043D
0845C73D C509283E C52E02C4 83004411 6F9A0C75 FF3DC509 243EC52E 000005C7
16006A57 56107400 F67E835E 5F00543C 749A50F6 468D1601 6AFC76FF 57560000
FF2BE903 7400013D 058BF87E C5FF38E9 0044156E 9A5E5F00 543AE09A 50F6468D
468D1600 6A575610 7400F67E 835E5F00 543C749A 50F6468D 16016AFC 76FF5756
57565E5F 00543AA0 9A50F646 8D1635FF 091C3EC5 2E57565E 5F00543A E09A50F6
05C7147E C5000008 C85756CB 5E5FC9FE DAE95E5F 00543AE0 9A50F646 8D16006A
830054EE EA9A0C76 FF0E76FF 13740C46 0B0E468B 0589092C 3EC52E0A 468B0000
00143D04 C4830054 EEEA9A10 76FF1276 FF1D7410 460B1246 8B1B7F00 0F3D04C4
FE46895E 5F00543A 809A1476 FF1676FF 256A5756 012AE900 0605C714 7EC50A7E
0B0E468B FA5689F8 468902C4 830054EF 9C9AFE76 FF010BE9 0374003D 83147EC5
08C48300 54EE309A F876FFFA 76FF0C76 FF0E76FF 14EB0005 C6F87EC5 08750C46
001005F8 468BFA76 FF1076FF 1276FF18 EB001045 C6F87EC5 09751046 0B12468B
FF093036 FF2E0932 36FF2EFE 76FF006A 57560054 E7B49A08 C4830054 EE309A50
2E006A57 567B7500 053D058B 147EC500 54E8069A 5E5F0054 3B609A14 76FF1676
3D83147E C5FC4689 5E5F0054 3C349A14 76FF1676 FF006A09 3036FF2E 093236FF
7EC55E5F 00543CD4 9A1476FF 1676FF09 3036FF2E 093236FF 2E006A57 56537500
2EFE76FF 006A5756 5E5F0054 3A609A14 76FF1676 FFFC76FF 57563075 003D8314
00003AC8 5756CB5E 5FC95E5F 00543B60 9A1476FF 1676FF09 3036FF2E 093236FF
0589092C 3EC52E0A 468B0000 05C7147E C50000F4 46C70000 F246C700 0AF846C7
343EC52E 08C48300 5499729A 093836FF 2E093A36 FF2E093C 36FF2E09 3E36FF2E
24050940 068B2E09 4236FF2E 094436FF 2E094636 FF2E2075 C20B0255 89058909
1C3EC52E 5E5F0054 3AC09A14 76FF1676 FFF876FF 575608C4 8300544A AE9A5000
885E5F00 543CF49A 1476FF16 76FF006A 575602A2 E9037400 3D83147E C5058909
05E42AF7 468A0A76 00C13DFF FD05E42A F7468A02 83E90374 003D8314 7EC5F746
0068F276 FFF476FF 006A0000 680E50E4 2AF7468A 5756F746 8800C1B8 03EBFFFD
E9037400 3D83147E C5058909 483EC52E 5E5F0054 3B409A14 76FF1676 FF016A08

0FE90374 003D8314 7EC5FC46 895E5F00 543A809A 1476FF16 76FF0C6A 5756022E
0C468B3D C509283E C52E0255 89058909 283EC52E 02C48300 54EF9C9A FC76FF02
09283EC5 2E025589 05891256 8B10468B 3DC50928 3EC52E06 55890445 890E568B
2E094E36 FF2EFC76 FF006A57 5600000A 45C73DC5 09283EC5 2E000108 45C73DC5
016A5756 0194E903 74003D83 147EC55E 5F00543B 609A1476 FF1676FF 094C36FF
FA76FF57 560175E9 0374003D 83147EC5 FA46895E 5F00543B D49A1476 FF1676FF
83147EC5 FE46895E 5F00543C 349A1476 FF1676FF 006A0950 36FF2E09 5236FF2E
1C3EC52E 02558905 8909243E C52E02C4 830054EF 9C9AFE76 FF0149E9 0374003D
00543B20 9A1476FF 1676FF00 6A016A00 6A575608 45893DC5 09243EC5 2E058B09
0054BE1C 9A016A50 C6468D16 00FCE903 74003D83 147EC505 8909543E C52E5E5F
003D8309 583EC52E 000005C7 095C3EC5 2E058909 583EC52E E42AE846 8A06C483
36FF2E09 6A36FF2E 57560255 89058909 603EC52E 0966168B 2E096406 8B2E2B74
6A575600 93E90374 000C7D83 3DC50924 3EC52E5E 5F007400 029A196A 206A0968
54EF9C9A EC76FF77 75003D83 147EC5EC 46895E5F 00543A80 9A1476FF 1676FF02
3EC52EEC 76FF35FF 091C3EC5 2E575600 0205C7EE 7EC5F056 89EE4689 02C48300
09543EC5 2E575637 75003D83 147EC55E 5F00543C 149A1476 FF1676FF 35FF0954
57561275 003D8314 7EC5EA46 895E5F00 543CB49A 1476FF16 76FFFF6A 016A35FF
0005C70E 7EC50000 02C85756 CB5E5FC9 5E5F0054 3A609A14 76FF1676 FFEC76FF
7574000A 7D833DC5 09283EC5 2E025589 05890C56 8B0A468B 3DC50928 3EC52E00
006A006A 006A006A 006A006A 0054406F 9A005441 EE9A0A74 003D8309 6C3EC52E
6A157400 0C7D833D C509243E C52E10C4 83005453 D19A0970 36FF2E09 7236FF2E
9A150C68 006A006A 006A006A 13EB0AC4 830054C0 489A111F 68006A00 6A006A00
00087D83 3DC50928 3EC52E01 3AE902C4 8300442B B89A1717 680AC483 0054C048
05DB9B3D C509283E C52E35C4 09283EC5 2EFE4689 058B095C 3EC52E01 2AE90374
2E058909 5C3EC52E 08C48300 5496EF9A 0054968F 9A09740E DC2E9B04 74DA269B
3EC52E00 D2E9037F FE463B05 8B095C3E C52E00E1 E9037E00 143D058B 095C3EC5
FF1076FF 001305C7 095C3EC5 2E097500 143D058B 095C3EC5 2E647400 3D830958
803EC52E 5052FE46 03096A16 8B2E0968 068B2E50 FE462B05 8B095C3E C52E0E76
FF3DC509 603EC52E 0275FF3D C509603E C52E0B6A 056A35FF 097C3EC5 2E35FF09
35FF095C 3EC52E20 6A096836 FF2E096A 36FF2E57 5664EB16 C4830054 DDB19A35
6836FF2E 096A36FF 2E0005C6 3C032609 683EC52E 095C36C4 2E5E5F00 7400029A
3EC52E0C C4830054 4AAE9A35 FF0275FF 09343EC5 2E098436 FF2E0986 36FF2E09
76FF026A 57560000 0AC85756 CB5E5FC9 9B04C483 00549BD5 9A35FF02 75FF0934
54EF9C9A FA76FF01 1FE90374 003D830A 7EC5FA46 895E5F00 543A809A 0A76FF0C
E7B49A00 000845C7 3DC50924 3EC52E00 0105C7FC 7EC5FE56 89FC4689 02C48300
54E8069A 5E5F0054 3CB49A0A 76FF0C76 FF006A01 6A35FF09 543EC52E 57560054
5F00543C 149A0A76 FF0C76FF 35FF0954 3EC52EFA 76FF35FF 091C3EC5 2E575600
7EC5F646 895E5F00 543CB49A 0A76FF0C 76FFFF6A 016A35FF 09543EC5 2E57565E
3EC52E57 565E5F00 543A609A 0A76FF0C 76FFFA76 FF575600 8FE90374 003D830A
6A094C36 FF2E094E 36FF2E00 6A57565E 5F00543B 009A0A76 FF0C76FF 35FF0954
36FF2E00 6A57563F 75003D83 0A7EC5F8 46895E5F 00543C34 9A0A76FF 0C76FF00
9A0A76FF 0C76FFF8 76FF5756 5E5F0054 3CD49A0A 76FF0C76 FF094C36 FF2E094E
004C8504 CB5E5FC9 04C48300 549C3C9A 35FF0275 FF09343E C52E5E5F 00543A60
004C846F 004C8468 004C850C 004C84A8 004C8510 004C8500 004C84FC 004C8506
004C850A 004C8508 004C84CE 004C84C0 004C84B2 004C84CC 004C8471 004C7C64
004C66E4 40340000 00000000 004C848E 004C6670 004C84D4 004C66E6 004C84D0
011C858B 0E7EC500 032646C7 05750026 7E830000 52C85756 004C8495 004C66EA
5496EF9A 0054968F 9A11F806 DC2E9B12 46DD9BFC 4689011A 858B0E7E C5FE4689
468908C4 83005496 EF9A0054 968F9A11 F806DC2E 9B1A46DD 9BFA4689 08C48300
120636FF 2E127400 3D801200 3EC52E22 76FC463B F8468B08 77FE463B FA468BF8
03F88B7C 7CF79900 40B80A76 C504E3E9 FFFFB804 C4830054 EB729A12 0436FF2E
7D00F67E 83F64689 C72BFA46 8BF88B12 083EF72E 9926468B EC468903 C76BFE7E
2E992646 8BF64689 FFFF0526 462BFE46 8B0C76FE 463B40FA 468B0000 F646C705
C00B0054 573B9AEE 4689EC66 F7E0D126 468BF446 89C72BF8 468BF88B 12083EF7
08C48300 5497D29A 5052D22B EC468B50 52FAE2D2 D1E0D100 01B999F4 468B2674
2BEC468B 5052FAE2 D2D1E0D1 0001B999 C78B14C7 83F47E8B 29EBCC56 89CA4689
00ADE903 7402450B 058B120A 3EC52ECC 5689CA46 8908C483 005497D2 9A5052D2
C446890E 458BC07E C508C483 005482E8 9A50C046 8D16120E 36FF2E12 1036FF2E
FFCC76FF 500002B8 C476FF57 56C64689 5E5F0054 3AC09A50 E2468D16 006A5756
89E44689 02C48300 54DBE89A EE76FF5E 5F00543D B49A50E0 468D16C6 76FFCA76
E676FFC4 76FF5756 5E5F0054 3DD49A50 E0468D16 FF6AC676 FFC476FF 5756E656
16FF6AC6 76FFC476 FF57565E 5F00543D 949A50E0 468D16C6 76FFEE76 FFE476FF
CE468902 55130503 CC568BCA 468B120A 3EC52E32 EB5E5F00 543DD49A 50E0468D
C7E65689 E446890A C4830044 A58F9ACE 76FFD076 FFEE76FF 50C8468D 16D05689

00F046C7 0000D446 C70000D2 46C700C8 E9037C03 F27E83F2 46FF03EB 0000F246
F066F7EC 468BEA56 89E84689 E6568BE4 468B777D 26463BF0 468BF046 FF03EB00
03DA468B DA468903 C76BF67E 03F88BFE F7990040 B8E6D17C 778B0A5E C5DC4689
6BA47326 463BD846 8BD846FF 03EB0000 D846C7E8 4601E0D1 DE468BDE 4689DC46
D2460199 C78B0FFF E7813C8B EA5E8EE8 7603E6D1 D6768BD6 4689F246 0303D846
08C48300 5497C69A D276FFD4 76FF5052 99C68BF0 8B266EF7 26468BCF EBD45611
F712123E C52EFF2C E90000D4 46C70000 D246C705 89245E8E 227E03E7 D1F27E8B
FF03EB00 00AE46C7 BC5ED99B 121E36DC 2E9B1216 06DD2E9B 00E3E903 75004005
AE7E8B3C 7701003D 058B245E 8E227E03 E7D1AE7E 8B0103E9 037C03AE 7E83AE46
8F9A11F8 06DC2E9B 122636DC 2E9B02C4 83005496 A59A35FF 245E8E22 7E03E7D1
7E03E7D1 AE7E8B3F EBB64589 1F16FD03 E7D1AE7E 8B08C483 005496EF 9A005496
54968F9A 11F806DC 2E9BBC4E D89B02C4 83005496 A59A50FF 0005058B 245E8E22
AE768B12 2E1EC42E B645891F 16FD03E7 D1AE7E8B 00400508 C4830054 96EF9A00
D1AE7E8B 058B025F 8E263F03 26FE03E7 D1B67D8B 1F16FD03 E7D1AE7E 8B0DE6C1
122E1EC4 2E337D03 AE7E83AE 46FF03EB 0000AE46 C7FF34E9 B045891F 16FD03E7
058B025F 8E263F03 26FE03E7 D13D8B24 5E8E227E 03E7D1AE 7E8B0DE6 C1AE768B
003EC52E 009EE903 75000105 F712323E C52EC4EB B045891F 16FD03E7 D1AE7E8B
4005F712 123EC52E 04C48300 544A8A9A 123636FF 2E123836 FF2E1274 003D8012
C5B676FF B876FFBA 76FFB076 FFB276FF B476FF6D 74003D80 12003EC5 2E417400
8300544A 8A9A123A 36FF2E12 3C36FF2E 35FF227E C50275FF 227EC504 75FF227E
227EC504 75FF227E C5B076FF B276FFB4 76FF2C74 003D8012 003EC52E 36EB16C4
8312423E C52E10C4 8300544A 8A9A123E 36FF2E12 4036FF2E 35FF227E C50275FF
06C48300 44F8A99A B676FFB8 76FFBA76 FF137400 4005F712 123EC52E 377E003D
120A3EC5 2E06C483 0044F8A9 9A35FF22 7EC50275 FF227EC5 0475FF22 7EC519EB
00549C3C 9AC076FF C276FF04 C4830054 DC759AE4 76FFE676 FF1E7502 450B058B
003AC857 56CB5E5F C99B5E5F 00543B94 9A50E246 8D16C876 FF575611 EB04C483
9A11F806 DC2E9B12 46DD9BFC 4689011A 858B0E7E C5FE4689 011C858B 0E7EC500
EF9A0054 968F9A11 F806DC2E 9B1A46DD 9BFA4689 08C48300 5496EF9A 0054968F
3D801200 3EC52E22 76FC463B F8468B08 77FE463B FA468BF8 468908C4 83005496
40B80A76 C50277E9 FFFFB804 C4830054 EB729A12 4636FF2E 124836FF 2E127400
2BFA468B F88B1208 3EF72E99 4822468B CC468903 C76BFE7E 03F88B7C 7CF79900
FF052246 2BFE468B 0C76FE46 3B40FA46 8B0000F6 46C7057D 00F67E83 F64689C7
CC66F7E0 D122468B F44689C7 2BF8468B F88B1208 3EF72E99 4822468B F64689FF
D22BCC46 8B5052FA E2D2D1E0 D10001B9 99F4468B 2674C00B 0054573B 9ACE4689
E0D10001 B999C78B 14C783F4 7E8B29EB E05689DE 468908C4 83005497 D29A5052
120A3EC5 2EE05689 DE468908 C4830054 97D29A50 52D22BCC 468B5052 FAE2D2D1
C4830054 82E89A50 D4468D16 124A36FF 2E124C36 FF2E00AD E9037402 450B058B
FF5756DA 46895E5F 00543AC0 9A50EE46 8D16006A 5756D846 890E458B D47EC508
E89ACE76 FF5E5F00 543DB49A 50EC468D 16DA76FF DE76FFE0 76FF5000 02B8D876
00543DD4 9A50EC46 8D16FF6A DA76FFD8 76FF5756 F25689F0 468902C4 830054DB
565E5F00 543D949A 50EC468D 16DA76FF CE76FFF0 76FFF276 FFD876FF 57565E5F
8BDE468B 120A3EC5 2E32EB5E 5F00543D D49A50EC 468D16FF 6ADA76FF D876FF57
0044A58F 9AE276FF E476FFCE 76FF50DC 468D16E4 5689E246 89025513 0503E056
66F7CC46 8B7C7D22 463BE846 8BE846FF 03EB0000 E846C7F2 5689F046 890AC483
C6468BC6 468903C7 6BF67E03 F88BFEF7 990040B8 E6D17C77 8B0A5EC5 C84689E8
46FF03EB 0000E646 C7D25689 D04689F2 568BF046 03E0D1CA 468BCA46 89C84603
EA466BD0 76FFD276 FF066AEA 4689E646 03E86EF7 22468BA7 7D22463B E6468BE6
450B058B 120A3EC5 2EC7EB06 D046830A C4830054 96649A50 5226568B 24460306
EB04C483 00549C3C 9AD476FF D676FF04 C4830054 DC759AF0 76FFF276 FF1E7502
3FE00000 00000000 00CB5E5F C99B5E5F 00543B94 9A50EE46 8D16DC76 FF575611
000040AF 7E000000 00000014 9374004C 81360014 93E40002 004C8116 0014951F
81AE004C 8163004C 81390014 93B20014 7B964010 00000000 000040AD FE000000
0A7EC500 0105C719 F83EC52E 00007AC8 5756004C 8201004C 81E10014 7B86004C
6A006A50 86468D16 57565E5F 00740002 9A126A00 6A50EC46 8D165756 000105C7
54A9DA9A 5086468D 1650DA46 8D16196A FE468900 541A489A 5E5F0074 00029A66
1650DA46 8D165000 01B82F6A 126A009D E9000105 C70A7EC5 0A75C00B 0AC48300
7400FA7E 830AC483 00549664 9A50EC46 8D165052 0CC48300 541E6F9A 5086468D
EE76FF52 EB000205 C70A7EC5 0AC48300 54C0489A FA76FF00 6A006A00 6A006A1C
1874C00B FE46890C C4830054 CE7E9A19 FC36FF2E 19FE36FF 2E176A01 6AEC76FF
1F539A50 EC468D16 00442B8C 9A0AC483 0054C048 9AFE76FF 036A006A 006A006A
05C71A00 3EC52E00 007AC857 56CB5E5F C9003487 389A0054 1D159A04 C4830054
468D1657 565E5F00 7400029A 126A006A 50EC468D 16575600 0105C70A 7EC50001
86468D16 50DA468D 16186AFE 46890054 1A489A5E 5F007400 029A666A 006A5086
16500001 B82E6A12 6A009DE9 000105C7 0A7EC50A 75C00B0A C4830054 A9DA9A50

290

0AC48300 5496649A 50EC468D 1650520C C4830054 1E6F9A50 86468D16 50DA468D
000205C7 0A7EC50A C4830054 C0489AFA 76FF006A 006A006A 006A1C74 00FA7E83
46890CC4 830054CE 7E9A1A04 36FF2E1A 0636FF2E 176A016A EC76FFEE 76FF52EB
468D1600 442B8C9A 0AC48300 54C0489A FE76FF03 6A006A00 6A006A18 74C00BFE
7EC50000 84C85756 CB5E5FC9 00348B82 9A00541D 159A04C4 8300541F 539A50EC
6A50FF7C 868D1657 565E5F00 7400029A 126A006A 50E2468D 16575600 0105C70A
830054EE 309A50FF 7F868D16 1A0836FF 2E1A0A36 FF2E5E5F 00740002 9A666A00
0054EEEA 9A50D346 8D1606C4 83005448 E69A0F6A 50D3468D 160CFF7E 86C608C4
6A006A00 6A0161E9 03750001 3D058B1A 0C3EC52E 2C7500D2 7E80D246 8804C483
FE468900 541A489A 0144E900 0205C70A 7EC50AC4 830054C0 489A112A 68006A00
0000FC46 C70017FA 46C7F946 880000B8 F8468800 03B8002F F646C700 01F446C7
E2468D16 50520CC4 8300541E 239A50FF 7C868D16 50D0468D 1650F446 8D16126A
2E1A1436 FF2E1A16 36FF2E50 D3468D16 76751047 F07E810A C4830054 96649A50
68016A01 6A1A1036 FF2E1A12 36FF2E0C C4830054 4ACA9A1A 1036FF2E 1A1236FF
8D1650D0 468D1650 F4468D16 126A2B75 00013DFE 46890AC4 830054C0 489A2007
0A7EC509 EB0AC483 00549664 9A50E246 8D165052 0CC48300 541F079A 50FF7C86
489AF076 FF006A00 6A006A00 6A137410 47F07E81 237400F0 7E8376EB 000205C7
FF2E1A1A 36FF2E17 6A016AE2 76FFE476 FF4DEB00 0205C70A 7EC50AC4 830054C0
C0489AFE 76FF036A 006A006A 006A1874 C00BFE46 890CC483 0054CF01 9A1A1836
CB5E5FC9 00541D15 9A04C483 00541F53 9A50E246 8D160044 2B8C9A0A C4830054
565E5F00 7400029A 126A006A 50E2468D 16575600 0105C70A 7EC50000 84C85756
7F868D16 1A1C36FF 2E1A1E36 FF2E5E5F 00740002 9A666A00 6A50FF7C 868D1657
8D1606C4 83005448 E69A0F6A 50D3468D 160CFF7E 86C608C4 830054EE 309A50FF
03750001 3D058B1A 0C3EC52E 2C7500D2 7E80D246 8804C483 0054EEEA 9A50D346
0144E900 0205C70A 7EC50AC4 830054C0 489A112A 68006A00 6A006A00 6A0161E9
46C7F946 880000B8 F8468800 03B8002E F646C700 01F446C7 FE468900 541A489A
8300541E 239A50FF 7C868D16 50D0468D 1650F446 8D16126A 0000FC46 C70017FA
36FF2E50 D3468D16 76751047 F07E810A C4830054 96649A50 E2468D16 50520CC4
FF2E1A12 36FF2E0C C4830054 4ACA9A1A 1036FF2E 1A1236FF 2E1A2036 FF2E1A22
F4468D16 126A2B75 00013DFE 46890AC4 830054C0 489A2007 68016A01 6A1A1036
00549664 9A50E246 8D165052 0CC48300 541F079A 50FF7C86 8D1650D0 468D1650
6A006A00 6A137410 47F07E81 237400F0 7E8376EB 000205C7 0A7EC509 EB0AC483
6A016AE2 76FFE476 FF4DEB00 0205C70A 7EC50AC4 830054C0 489AF076 FF006A00
006A006A 006A1874 C00BFE46 890CC483 0054CF01 9A1A1836 FF2E1A1A 36FF2E17
9A04C483 00541F53 9A50E246 8D160044 2B8C9A0A C4830054 C0489AFE 76FF036A
2E1A2836 FF2E1A2A 36FF2E00 0105C70A 7EC50000 06C85756 CB5E5FC9 00541D15
5689FC46 8908C483 00549972 9A505204 C4830054 7FAA9A1A 2436FF2E 1A2636FF
C4830054 4A8A9A1A 3036FF2E 1A3236FF 2E127400 3D801A2C 3EC52E3B 75C20BFE
00442B8C 9A000205 C70A7EC5 0AC48300 54C0489A 103C6803 6A006A00 6A006A04
0BFA4689 0CC48300 54CF019A 1A1836FF 2E1A1A36 FF2E176A 016AFC76 FFFE76FF
6A04C483 00544A8A 9A1A3436 FF2E1A36 36FF2E12 74003D80 1A2C3EC5 2E3B74C0
76FF0044 2B8C9A00 0205C70A 7EC50AC4 830054C0 489AFA76 FF036A00 6A006A00
36FF2E00 0105C70A 7EC50000 06C85756 CB5E5FC9 04C48300 549C3C9A FC76FFFE
00549972 9A505204 C4830054 7FAA9A1A 3836FF2E 1A3A36FF 2E1A3C36 FF2E1A3E
4036FF2E 1A4236FF 2E127400 3D801A2C 3EC52E3B 75C20BFE 5689FC46 8908C483
C70A7EC5 0AC48300 54C0489A 103C6803 6A006A00 6A006A04 C4830054 4A8A9A1A
54CF019A 1A1836FF 2E1A1A36 FF2E176A 016AFC76 FFFE76FF 00442B8C 9A000205
9A1A4436 FF2E1A46 36FF2E12 74003D80 1A2C3EC5 2E3B74C0 0BFA4689 0CC48300
0205C70A 7EC50AC4 830054C0 489AFA76 FF036A00 6A006A00 6A04C483 00544A8A
0024F74E 004C80E0 CB5E5FC9 04C48300 549C3C9A FC76FFFE 76FF0044 2B8C9A00
004C8039 0024F77E 004C8035 004C80E4 004C877A 004C8028 0024F766 004C80E2
004C809B 004C8093 004C8075 004C8054 0014951F 004C8052 004C804A 004C8046
21E636FF 2E21E836 FF2E0000 05C721E6 3EC52EEC 8B555756 004C80BE 004C809D
E836FF2E 066A0000 05C721E6 3EC52EEC 8B555756 CB5E5FC9 04C48300 546B989A
21EA36FF 2E21EC36 FF2E5052 08C48300 546BD19A 0A76FF0C 76FF21E6 36FF2E21
E836FF2E 066A0000 05C721E6 3EC52EEC 8B555756 CB5E5FC9 0AC48300 5496649A
21EE36FF 2E21F036 FF2E5052 08C48300 546BAB9A 0A76FF0C 76FF21E6 36FF2E21
E836FF2E 066A0000 05C721E6 3EC52EEC 8B555756 CB5E5FC9 0AC48300 5496649A
21F236FF 2E21F436 FF2E5052 08C48300 546BBE9A 0A76FF0C 76FF21E6 36FF2E21
2E21E836 FF2E0000 05C721E6 3EC52EEC 8B555756 CB5E5FC9 0AC48300 5496649A
21E63EC5 2EEC8B55 5756CB5E 5FC908C4 8300546C 569A0A76 FF0C76FF 21E636FF
2EEC8B55 5756CB5E 5FC904C4 8300546C DB9A21E6 36FF2E21 E836FF2E 000005C7
76FF0E76 FF1076FF 1276FF14 76FF21E6 36FF2E21 E836FF2E 000005C7 21E63EC5
FF2E0000 05C721E6 3EC52EEC 8B555756 CB5E5FC9 10C48300 546C8F9A 0A76FF0C

8300546C A29A0A76 FF0C76FF 0E76FF10 76FF1276 FF1476FF 21E636FF 2E21E836
21E636FF 2E21E836 FF2E686A 000005C7 21E63EC5 2EEC8B55 5756CB5E 5FC910C4
21F636FF 2E21F836 FF2E5052 0CC48300 546CB59A 0A76FF0C 76FF0E76 FF1076FF
2E21E836 FF2E0000 05C721E6 3EC52EEC 8B555756 CB5E5FC9 0AC48300 5496649A
21E63EC5 2EEC8B55 5756CB5E 5FC908C4 8300546D 4D9A0A76 FF0C76FF 21E636FF
C90AC483 00546DAC 9A0A76FF 0C76FF0E 76FF21E6 36FF2E21 E836FF2E 000005C7
1276FF21 E636FF2E 21E836FF 2E086A00 0005C721 E63EC52E EC8B5557 56CB5E5F
21FA36FF 2E21FC36 FF2E5052 0EC48300 546C7C9A 0A76FF0C 76FF0E76 FF1076FF
E836FF2E 066A0000 05C721E6 3EC52EEC 8B555756 CB5E5FC9 0AC48300 5496649A
2E50520E C4830054 6C699A0A 76FF0C76 FF0E76FF 1076FF12 76FF21E6 36FF2E21
C721E63E C52EEC8B 555756CB 5E5FC90A C4830054 96649A21 FE36FF2E 220036FF
C52EEC8B 555756CB 5E5FC904 C4830054 6CC89A21 E636FF2E 21E836FF 2E000005
C908C483 00546CEE 9A0A76FF 0C76FF21 E636FF2E 21E836FF 2E000005 C721E63E
76FF1276 FF21E636 FF2E21E8 36FF2E00 0005C721 E63EC52E EC8B5557 56CB5E5F
21E63EC5 2EEC8B55 5756CB5E 5FC90EC4 8300546D 019A0A76 FF0C76FF 0E76FF10
8300546D 149A0A76 FF0C76FF 0E76FF10 76FF21E6 36FF2E21 E836FF2E 000005C7
76FF21E6 36FF2E21 E836FF2E 000005C7 21E63EC5 2EEC8B55 5756CB5E 5FC90CC4
21E63EC5 2EEC8B55 5756CB5E 5FC90CC4 8300546D 279A0A76 FF0C76FF 0E76FF10
C90AC483 00546D3A 9A0A76FF 0C76FF0E 76FF21E6 36FF2E21 E836FF2E 000005C7
1476FF21 E636FF2E 21E836FF 2E126A00 0005C721 E63EC52E EC8B5557 56CB5E5F
FF2E2204 36FF2E50 5210C483 00546BE4 9A0A76FF 0C76FF0E 76FF1076 FF1276FF
2E126A00 0005C721 E63EC52E EC8B5557 56CB5E5F C90AC483 00549664 9A220236
00546BF7 9A0A76FF 0C76FF0E 76FF1076 FF1276FF 1476FF21 E636FF2E 21E836FF
EC8B5557 56CB5E5F C90AC483 00549664 9A220636 FF2E2208 36FF2E50 5210C483
76FF1076 FF1276FF 1476FF21 E636FF2E 21E836FF 2E126A00 0005C721 E63EC52E
00549664 9A220A36 FF2E220C 36FF2E50 5210C483 00546C0A 9A0A76FF 0C76FF0E
E636FF2E 21E836FF 2E126A00 0005C721 E63EC52E EC8B5557 56CB5E5F C90AC483
36FF2E50 5210C483 00546C1D 9A0A76FF 0C76FF0E 76FF1076 FF1276FF 1476FF21
0005C721 E63EC52E EC8B5557 56CB5E5F C90AC483 00549664 9A220E36 FF2E2210
555756CB 5E5FC908 C4830054 6C309A0A 76FF0C76 FF21E636 FF2E21E8 36FF2E00
76FF0E76 FF1076FF 1276FF21 E636FF2E 21E836FF 2E000005 C721E63E C52EEC8B
126A0000 05C721E6 3EC52EEC 8B555756 CB5E5FC9 0EC48300 546C439A 0A76FF0C
C4830054 6D739A0A 76FF0C76 FF0E76FF 1076FF12 76FF21E6 36FF2E21 E836FF2E
C52EEC8B 555756CB 5E5FC90A C4830054 96649A22 1236FF2E 221436FF 2E50520E
FF0C76FF 0E76FF10 76FF1276 FF21E636 FF2E21E8 36FF2E12 6A000005 C721E63E
5FC90AC4 83005496 649A2216 36FF2E22 1836FF2E 50520EC4 8300546D 869A0A76
0A76FF0C 76FF21E6 36FF2E21 E836FF2E 000005C7 21E63EC5 2EEC8B55 5756CB5E
0A76FF0C 76FF0000 05C721E6 3EC52EEC 8B555756 CB5E5FC9 08C48300 546D999A
21E63EC5 2EEC8B55 5756CB5E 5FC908C4 8300546E 909A21E6 36FF2E21 E836FF2E
36FF2E00 0005C721 E63EC52E EC8B5557 56CB5E5F C9058B22 1A3EC52E 000005C7
5FC90EC4 8300546E A39A0A76 FF0C76FF 0E76FF10 76FF1276 FF21E636 FF2E21E8
0E76FF10 76FF21E6 36FF2E21 E836FF2E 000005C7 21E63EC5 2EEC8B55 5756CB5E
000005C7 21E63EC5 2EEC8B55 5756CB5E 5FC90CC4 83005470 1F9A0A76 FF0C76FF
8B555756 CB5E5FC9 08C48300 5470329A 0A76FF0C 76FF21E6 36FF2E21 E836FF2E
83005470 459A0A76 FF0C76FF 21E636FF 2E21E836 FF2E0000 05C721E6 3EC52EEC
76FF21E6 36FF2E21 E836FF2E 000005C7 21E63EC5 2EEC8B55 5756CB5E 5FC908C4
FF2E0000 05C721E6 3EC52EEC 8B555756 CB5E5FC9 08C48300 5470589A 0A76FF0C
CB5E5FC9 0CC48300 54706B9A 0A76FF0C 76FF0E76 FF1076FF 21E636FF 2E21E836
83005470 7E9A0A76 FF0C76FF 0E76FF10 76FF0000 05C721E6 3EC52EEC 8B555756
7FAE004C 7FA6004C 7F3E004C 7F38004C 7F32004C 7F2C004C 7F22CB5E 5FC908C4
5756004C 7F2A004C 800E004C 7FFC004C 7FEA004C 7FD8004C 7FC6004C 7FB4004C
FF3D058B 29AC3EC5 2E000105 C70144E9 03750001 3D058B29 A83EC52E 00000CC8
35FF29B0 3EC52E35 FF29A83E C52E006A 29B436FF 2E29B636 FF2E0136 E90374FF
8B29B83E C52E018C E9037400 3D8329B4 3EC52E0E C4830054 D8DC9A00 C968036A
35FF29A8 3EC52E04 6A046A04 6A29B436 FF2E29B6 36FF2E01 07E90374 FFFF3D05
45E90374 003D8329 B43EC52E 12C48300 54D8DC9A 00CA6805 6A35FF29 B03EC52E
2EF85ED9 9B05DF9B 29C43EC5 2E04C483 00548569 9A29C036 FF2E29C2 36FF2E01
9BF64689 08C48300 5496EF9A 0054968F 9AF846D9 9BFC5ED9 9B05DF9B 29C83EC5
76FF5029 B436FF2E 29B636FF 2EF44689 08C48300 5496EF9A 0054968F 9AFC46D9
B43EC52E 10C48300 54D8DC9A 00C86804 6A35FF29 B03EC52E 35FF29A8 3EC52EF6
68026A35 FF29B03E C52E35FF 29A83EC5 2E5729B6 36FF2E00 BDE90374 003D8329
5429739A 0097E9C0 2B04C483 00446E4C 9A50F846 8D160CC4 830054D8 DC9A00CB
6B29B83E C52E29B4 36FF2E29 B636FF2E 76EBFEEC E9037500 3D8329B4 3EC52E00
29BC3E03 2EF88B06 056B29B8 3EC52E04 75FF29BE 1E8E2E29 BC3E032E F88B0605

C52E35FF 29BE1E8E 2E29BC3E 032EF88B 06056B29 B83EC52E 0275FF29 BE1E8E2E
3D8329B4 3EC52E12 C4830054 D8DC9A00 CA68056A 35FF29B0 3EC52E35 FF29A83E
2E286AEC 8B555756 CB5E5FC9 9B0064B8 02C48300 5444B89A 646AFEBB E9037500
EC8B5557 56CB5E5F C90AC483 00549664 9A0A76FF 0C76FF29 C036FF2E 29C236FF
29B636FF 2E3B74FF FF3D058B 29AC3EC5 2E00F2E9 03740001 3D058B29 A83EC52E
B43EC52E 0EC48300 54D8DC9A 00C96803 6A35FF29 B03EC52E 006A5029 B436FF2E
FFFF3D05 8B29B83E C52E00AD E90064B8 02C48300 5444B89A 646A1074 003D8329
C52E0475 FF29BE1E 8E2E29BC 3E032EF8 8B06056B 29B436FF 2E29B636 FF2E6C74
2EF88B06 056B29B8 3EC52E02 75FF29BE 1E8E2E29 BC3E032E F88B0605 6B29B83E
C4830054 D8DC9A00 CA68056A 35FF29B0 3EC52E00 6A35FF29 BE1E8E2E 29BC3E03
3EC52E29 B436FF2E 29B636FF 2E00446C 899AFF78 E9037400 3D8329B4 3EC52E12
FF05C729 A83EC52E 0CC48300 54D8DC9A 00CC6802 6A35FF29 B03EC52E 35FF29A8
739A0000 05C70475 00053D05 8B05FF29 AC3EC52E EC8B5557 56CB5E5F C9C02BFF
5FC9C02B 02EB0064 B802C483 005444B8 9A646A0F 74003D83 29B43EC5 2E005429
6A0F7400 3D8329B4 3EC52E00 5429739A 000005C7 29AC3EC5 2EEC8B55 5756CB5E
05C729AC 3EC52EEC 8B555756 CB5E5FC9 C02B02EB 0064B802 C4830054 44B89A64
02EB0064 B802C483 005444B8 9A646A0F 74003D83 29B43EC5 2E005429 739A0001
3D8329B4 3EC52E00 5429739A 000205C7 29AC3EC5 2EEC8B55 5756CB5E 5FC9C02B
3EC52EEC 8B555756 CB5E5FC9 C02B02EB 0064B802 C4830054 44B89A64 6A0F7400
B802C483 005444B8 9A646A0F 74003D83 29B43EC5 2E005429 739A0003 05C729AC
3EC52E00 5429739A 000405C7 29AC3EC5 2EEC8B55 5756CB5E 5FC9C02B 02EB0064
8B555756 CB5E5FC9 C02B02EB 0064B802 C4830054 44B89A64 6A0F7400 3D8329B4
3EC52E29 B436FF2E 29B636FF 2E000005 C7047500 073D058B 05FF29B8 3EC52EEC
032EF88B 06056B29 B83EC52E 0475FF29 BE1E8E2E 29BC3E03 2EF88B06 056B29B8
FF29BE1E 8E2E29BC 3E032EF8 8B06056B 29B83EC5 2E0275FF 29BE1E8E 2E29BC3E
B43EC52E 12C48300 54D8DC9A 00CA6805 6A35FF29 B03EC52E 35FF29A8 3EC52E35
EC8B5557 56CB5E5F C9C02B02 EB0064B8 02C48300 5444B89A 646A0F74 003D8329
1E8E2E29 BC3E032E F88B0605 6B29B436 FF2E29B6 36FF2E00 0205C729 B83EC52E
B83EC52E 0275FF29 BE1E8E2E 29BC3E03 2EF88B06 056B29B8 3EC52E04 75FF29BE
00CA6805 6A35FF29 B03EC52E 006A35FF 29BE1E8E 2E29BC3E 032EF88B 06056B29
C90064B8 02C48300 5444B89A 646A0D74 003D8329 B43EC52E 12C48300 54D8DC9A
0F74003D 8329B43E C52E0054 29019A00 0005C729 B83EC52E EC8B5557 56CB5E5F
C729B83E C52EEC8B 555756CB 5E5FC9C0 2B02EB00 64B802C4 83005444 B89A646A
EB0064B8 02C48300 5444B89A 646A0F74 003D8329 B43EC52E 00542901 9A000105
8329B43E C52E0054 29019A00 0205C729 B83EC52E EC8B5557 56CB5E5F C9C02B02
C52EEC8B 555756CB 5E5FC9C0 2B02EB00 64B802C4 83005444 B89A646A 0F74003D
02C48300 5444B89A 646A0F74 003D8329 B43EC52E 00542901 9A000305 C729B83E
C52E0054 29019A00 0405C729 B83EC52E EC8B5557 56CB5E5F C9C02B02 EB0064B8
555756CB 5E5FC9C0 2B02EB00 64B802C4 83005444 B89A646A 0F74003D 8329B43E
5444B89A 646A0F74 003D8329 B43EC52E 00542901 9A000505 C729B83E C52EEC8B
29019A00 0605C729 B83EC52E EC8B5557 56CB5E5F C9C02B02 EB0064B8 02C48300
5E5FC9C0 2B02EB00 64B802C4 83005444 B89A646A 0F74003D 8329B43E C52E0054
2E29BC3E 032EF88B 06056B29 B83EC52E 29B436FF 2E29B636 FF2EEC8B 555756CB
C52E0275 FF29BE1E 8E2E29BC 3E032EF8 8B06056B 29B83EC5 2E0475FF 29BE1E8E
29B03EC5 2E35FF29 A83EC52E 35FF29BE 1E8E2E29 BC3E032E F88B0605 6B29B83E
36FF2E29 B636FF2E EC8B5557 56CB5E5F C912C483 0054D8DC 9A00CA68 056A35FF
54D8DC9A 00C96803 6A35FF29 B03EC52E 35FF29A8 3EC52E35 FF29AC3E C52E29B4
004C8932 004C8930 004C8960 0014E220 004C892E 004C895E CB5E5FC9 0EC48300
312436FF 2E312636 FF2E500A 468D16EC 8B555756 004C8968 004C8966 004C8962
542A579A 0A76FF0C 76FF500E 468D16EC 8B555756 CB5E5FC9 08C48300 542A579A
8BF65689 F446890C 568B0A46 8B0808EE 46C70000 12C85756 CB5E5FC9 08C48300
FFF246C7 F0468904 C4830054 EEEA9A0A 76FF0C76 FFFA5689 F846890C 568B0A46
F246C700 005CC857 56CB5E5F C908C483 00542A57 9A50EE46 8D16500E 468D16FF
BBF08B98 078AEE46 FFEE5EC5 F05689EE 46890257 8B078B04 0E46830E 5EC50000
2AA62E26 00250020 000A0009 00000A67 FF2E3F75 F9E0073B 2E434300 05B92A90
EF3A9A50 F88B04C4 83005430 F99A0A76 FF0C76FF 0A76FF0C 76FF2AF5 2AA62AA6
3BF98BC8 8B04C483 0054D004 9A0A76FF 0C76FF03 59E9AA75 FFFF8306 C4830054
F08B9807 8AEE46FF EE5EC503 31E906C4 830054EF 3A9A570A 76FF0C76 FF9174F1
F08B9807 8AEE46FF EE5EC50B 7400F87E 83F84689 C02B02EB 0001B805 75002A3D
C5FC4689 00302DC1 03C68BC8 8B0AFC46 6B1D7F39 FE83227C 30FE8300 00FC46C7
057568FE 83F64689 C02B02EB 0001B805 756CFE83 D9EBF08B 98078AEE 46FFEE5E
8B98078A EE46FFEE 5EC50B74 00F47E83 067500F6 7E83F446 89C02B02 EB0001B8
00460045 00440025 00002267 FF2E4875 F9E0073B 2E434300 11B92B94 BBC68BF0
2C812BFC 2ACD2E26 00780073 006F006E 00660065 00640063 005B0058 004F004E

```
2E312636 FF2E2C1D 2D652C09 2C132C84 2C842BFF 2D432CD5 2C1A2C06 2C102C81
C7F646FF 022AE900 54EDAE9A 08C48300 1CFFC89A 3128680E 50002405 3124068B
FE46C7F6 46FF08EB 0000FE46 C7F646FF 12EB0008 FE46C7F6 46FF1CEB 000AFE46
5689EA46 890CC483 00542E42 9A0A76FF 0C76FFFE 76FFFC76 FF50FA46 8D160010
040E4683 0E5EC510 7400F67E 83FE21E9 037400F8 7E8301DC E9037500 FA7E83EC
F3E9F246 FF0789EA 468B1FC5 040E4683 0E5EC500 F47E8312 EB025789 07891FC5
FA7E83E6 5EDD0AC4 8300542F B29A0A76 FF0C76FF FC76FF50 FA468D16 F646FFFD
46DD1FC5 040E4683 0E5EC510 7400F67E 83FDC5E9 037400F8 7E830180 E9037500
AC5689AA 46895A16 AE468DA6 EB1FD9E6 46DD1FC5 040E4683 0E5EC5B6 EB1FDDE6
0B7400A8 7E83A846 89C02B02 EB0001B8 0575005E 3DF08B98 078AEE46 FFEE5EC5
E0EB0788 C68BAA46 FFAA5EC5 0C745DFE 831174F6 0BF08B98 078AEE46 FFEE5EC5
8B04C483 0054D004 9A0A76FF 0C76FFAC 5689AA46 895A16AE 468D0007 C6AA5EC5
46C7F88B 04C48300 54D0049A 0A76FF0C 76FF0001 FC46C705 7500FC7E 833FEBF8
A846C7AC 4E8C313E AA46C7F8 8B04C483 005430F9 9A0A76FF 0C76FF15 EB313DAA
830000FA 46C7A656 89A44689 02578B07 8B040E46 830E5EC5 127500F8 7E830001
463BC02B 02EB0001 B80575C2 0B06C483 0054EE62 9AAA76FF AC76FF57 4E74FFFF
BFEBFFFF BF0575FC 4EFF0788 C78BA446 FFA45EC5 0A7500F8 7E83FA46 FF2F75A8
3A9A570A 76FF0C76 FF0F74FF FF83ADEB F88B04C4 830054D0 049A0A76 FF0C76FF
A45EC5FE 5EE90375 63FE83FC 5FE90374 00F87E83 1A7400FA 7E8306C4 830054EF
5FC99BF2 468B03EB FFFFB805 74006007 F70A5EC5 0E7500F2 7E83FE55 E90007C6
7E20FF83 057EFF0B 0000FE46 C70000FC 46C7107E 8B0E768B 00000EC8 5756CB5E
2DFA7E83 FA468904 C4830054 30F99A0A 76FF0C76 FF000007 C7125EC5 0020BF03
54D0049A 0A76FF0C 76FF1675 2BFA7E83 0675C00B F64689C0 2B02EB00 01B80575
000ABE05 7430FA7E 834B75F6 0B4F7C3F 3B125EC5 07FF125E C5FA4689 04C48300
7E83247C F93B0F8B 07FF125E C5FA4689 04C48300 54D0049A 0A76FF0C 76FF40EB
125EC5FA 468904C4 830054D0 049A0A76 FF0C76FF 0010BE19 EB0008BE 057478FA
F8468900 372DFA46 8B217D00 0A3DF846 8900572D FA468B79 7E3F3B12 5EC507FF
10FE831A 7FF8763B 057F09F8 7E830B7C C00BF846 8900302D FA468B13 7D000A3D
5689F246 8999F846 8B2B75C0 0BF84689 00782DFA 468B3875 FE460BFC 468B4075
E9FE5689 FC4689F4 561BF246 2B08C483 005497D8 9A505299 C68B50FC 468D16F4
EBFE568B FC468B08 7400F67E 8306C483 0054EF3A 9AFA76FF 0A76FF0C 76FFFF6A
895A16DE 468DFF2B 000026C8 5756CB5E 5FC900DA 83D8F7DA F7FE568B FC468B0D
105EC500 0007C710 5EC50020 0E46C705 7E200E7E 83067E00 0E7E83DC 5689DA46
0012B930 0EBBF08B 04C48300 54D0049A 0A76FF0C 76FF00F8 E9037C0E 463B078B
00310030 002E002D 002B0020 000A0009 2467FF2E 00C7E903 74F9E007 3B2E4343
307F3069 30693058 30583058 00650045 00390038 00370036 00350034 00330032
FF105EC5 7775FF0B 309C309C 30893089 30893089 30893089 30893089 30893089
83E2EB07 88C68BDA 46FFDA5E C5476175 06FF8305 74FF0BFF 74E907FF 105EC50F
7C03FF83 D7EB0003 BF197503 FF830574 01FF830A 74FF0BEA EB0002BF 277F01FF
BF057505 FF830574 04FF830A 7402FF83 C0EB03FF 83C8EB00 06BF2D7F 05FF8332
830054EF 3A9A560A 76FF0C76 FFA0EB00 07BF0575 07FF8305 7406FF83 AFEB0005
76FFEC8B 555756CB 5E5FC904 C4830054 D4629A50 DE468D16 0007C6DA 5EC506C4
C9C68BE1 7409FE83 E6740AFE 83EB7400 203DF08B 04C48300 54D0049A 0A76FF0C
0A090000 0A666E61 6373206E 69207461 6D726F66 20646142 004C7C64 00CB5E5F
46C60191 46C60090 46C60001 16C85756 CB5E5FC9 00543150 9AEC8B55 57560020
5E5F0074 00029A64 6A206A50 9C468D16 57560595 46C60494 46C60393 46C60292
EA86895A 16FEEE86 8D038A46 C6018846 C6000686 46C7006C 8446C700 C68246C7
46C7FF26 9689FF24 86895A16 FF28868D 00009646 C78D5689 8B4689FE EC9689FE
BEC59846 8B009CE9 037C0698 7E830FFF 24868309 FEEA8683 9846FF0D EB000098
BEC58246 8B129646 83054589 FEEABEC5 96468B00 000145C7 FEEABEC5 0588FEEA
C5000301 45C7FF24 BEC57005 C6FF24BE C5074589 FEEABEC5 96468B03 4589FEEA
24BEC5E4 2A064588 FF24BEC5 E42A0745 88FF24BE C50001B8 00020345 C7FF24BE
24BEC503 0845C6FF 24BEC502 0545C6FF 24BEC509 4588FF24 BEC5E42A 074588FF
82468D16 509A468D 16FF4EE9 0D55890B 4589FF24 BEC55A16 9C468D64 0A45C6FF
14C48300 54D8DC9A 086A066A 35FF37F4 3EC52E10 6A37F836 FF2E37FA 36FF2E50
DBE99A46 8B06C483 00544A8A 9A37FC36 FF2E37FE 36FF2E9A 76FF1B74 009A7E83
830054D8 DC9A156A 036A35FF 37F43EC5 2E35FF37 F83EC52E 646A509A 468D1600
9A468B06 C4830054 4A8A9A38 0036FF2E 380236FF 2E9A76FF 1B74009A 7E830EC4
37F43EC5 2E35FF37 F83EC52E 006A3804 36FF2E38 0636FF2E 509A468D 160099E9
0836FF2E 380A36FF 2E9A76FF 1A74009A 7E8312C4 830054D8 DC9A026A 056A35FF
066A5090 468D1650 FF28868D 16509A46 8D164EEB 9A468B06 C4830054 4A8A9A38
1A74009A 7E8316C4 830054D8 DC9A0C6A 076A35FF 37F43EC5 2E35FF38 043EC52E
CB5E5FC9 C02B02EB 9A468B06 C4830054 4A8A9A38 0C36FF2E 380E36FF 2E9A76FF
89F44689 3812168B 2E381006 8B2EF256 89F04689 0C568B0A 468B0000 18C85756
```

F0468B01 DCE9037C 06EE7E83 66F44683 16F04683 EE46FF0B EB0000EE 46C7F656
80F87EC5 107D15EA 7E83F846 FFEA46FF 06EB0000 EA46C7FA 5689F846 89F2568B
830000E8 46C7FE56 89FC4689 4040F656 8BF4468B E4EB2005 C6F87EC5 EC75003D
FFFC76FF FE76FF57 56227500 087D8312 5E8E107E 03F88B1A EE466B12 74000E7E
46C70000 EC46C701 55E915E8 468315FC 46835E5F 0054DE28 9A156AF0 76FFF276
8E107E03 E7D1EC7E 8BF08B1A EE466B01 3DE9037C 15EA7E83 EA46FF03 EB0000EA
125E8E10 7E03F88B 1AEE466B E6D1EC76 8B0105E9 03740A45 3BEA468B FE03125E
FFFE76FF 381436FF 2E381636 FF2E076A 036A006A 016A00CD E9037500 3D83FE03
107E03E7 D1EC7E8B F08B1AEE 466B06E8 468306FC 468310C4 8300544A CA9AFC76
C4830054 ED1C9AFC 76FFFE76 FF5052F2 568BF046 03EA468B 1275FFFE 03125E8E
F08B1AEE 466BFC46 0112458B FE03125E 8E107E03 E7D1EC7E 8BF08B1A EE466B0A
381A36FF 2E006A00 6A076A00 6AE84601 12458BFE 03125E8E 107E03E7 D1EC7E8B
8B1AEE46 6B06E846 8306FC46 8310C483 00544ACA 9AFC76FF FE76FF38 1836FF2E
F25E8EF0 7E03EA7E 8B17EBEA 46014812 458BFE03 125E8E10 7E03E7D1 EC7E8BF0
98058AF2 5E8EF07E 03EA7E8B FED1E9EC 46FFE846 FFFC46FF 0588FC7E C598058A
555756CB 5E5FC9FE 10E90589 F47EC5E8 468BFEB7 E9E846FF FC46FF05 88FC7EC5
F446C700 5436319A 0000F246 C700000E C85756CB 5E5FC9C0 2B005435 CD9AEC8B
F43EC52E 35FF3804 3EC52E00 6A006A50 F4468D16 50F2468D 16016AF6 46C70339
36FF2E38 1E36FF2E F276FF15 7400F27E 8314C483 0054D8DC 9A066A06 6A35FF37
FF5586C6 00FF5486 C60000AC C85756CB 5E5FC9F2 468B06C4 8300544A 8A9A381C
89381216 8B2E3810 068B2E05 FF5986C6 04FF5886 C603FF57 86C602FF 5686C601
86C7A056 899E4689 5A16A246 8DFF6096 89FF5E86 895A16FF 62868DFE 5689FC46
5756467D 06FF5ABE 8366FC46 830F9E46 830AFF5E 8683FF5A 86FF11EB 0000FF5A
C5E42A09 4588FF5E BEC50001 B85E5F00 7400029A 0A6A006A FF5EB6FF FF60B6FF
890B4589 9E7EC540 40FE568B FC468B0A 45889E7E C5058BFC 7EC50845 88FF5EBE
3EC52E06 6A50FF54 868D1650 FF62868D 1650A246 8D1650FF 5C868D16 A2EB0D55
B6FF1674 00FF5CBE 831AC483 0054D8DC 9A136A09 6A35FF37 F43EC52E 35FF3804
8B555756 CB5E5FC9 FF5C868B 06C48300 544A8A9A 382036FF 2E382236 FF2EFF5C
2E50FE46 8D160000 FE46C700 0002C857 56CB5E5F C9005437 9B9A0054 374F9AEC
FF157400 FE7E830C C4830054 D8DC9A07 6A026A35 FF37F43E C52E35FF 38043EC5
0002C857 56CB5E5F C9FE468B 06C48300 544A8A9A 382436FF 2E382636 FF2EFE76
35FF37F4 3EC52E35 FF37F83E C52E50FE 468D1643 74FFFF3D 058B37F8 3EC52E00
FF2EFE76 FF157400 FE7E83FF FF05C737 F83EC52E 0CC48300 54D8DC9A 166A026A
004C5386 004C5578 0014E220 CB5E5FC9 06C48300 544A8A9A 382836FF 2E382A36
004C548A 004C547F 004C5474 004C557C 004C5437 004C53FD 004C557A 004C53C5
FF1276FF 1476FF16 76FF1876 FF1E06EC 8B555756 004C5539 004C5501 004C54C4
00009AEC 8B550010 CA5E5F5D E58B071F 0DE868DF 9A0A76FF 0C76FF0E 76FF1076
00009AEC 8B5500ED EB005439 FA9AD232 0002CA5D 0F892606 5EC40A75 C92308B8
00009AEC 8B5500ED EB005439 FA9AD232 0008CA5D 0F892606 5EC40A75 C92308A8
00009AEC 8B5500ED EB005439 FA9AD232 000CCA5D 0F892606 5EC40A75 C92308F0
00009AEC 8B5500ED EB005439 FA9AD232 000ACA5D 0F892606 5EC40A75 C9230868
00009AEC 8B5500ED EB005439 FA9AD232 0008CA5D 0F892606 5EC40A75 C9230858
00009AEC 8B5500ED EB005439 FA9AD232 0006CA5D 0F892606 5EC40A75 C9230870
00009AEC 8B5500ED EB005439 FA9AD232 0006CA5D 0F892606 5EC40A75 C9230878
00009AEC 8B5500ED EB005439 FA9AD232 0006CA5D 0F892606 5EC40A75 C9230908
00009AEC 8B5500ED EB005439 FA9AD232 0006CA5D 0F892606 5EC40A75 C9230820
00009AEC 8B5500ED EB005439 FA9AD232 0006CA5D 0F892606 5EC40A75 C92308E0
00009AEC 8B5500ED EB005439 FA9AD232 0008CA5D 0F892606 5EC40A75 C9230860
00009AEC 8B5500ED EB005439 FA9AD232 000CCA5D 0F892606 5EC40A75 C92308E8
52511179 C90B00ED EB005439 FA9AD232 000CCA5D 0F892606 5EC40A75 C9230880
5EC41F04 9000009A 1EEC8B55 00CBFFFF B800543A 149A5306 065EC450 5050C033
EB1A7280 00F98108 7501FB80 2574DB0A 0A5E8BEC 8B55000E CA5D0000 07C72606
0006CAFF FFB85D59 5A065EFF 006A006A 52515251 0D738000 F9810675 02FB800B
00EFEB00 543A2A9A 0006CA5D 0F892606 5EC40A75 C9231F03 7000009A 1EEC8B55
00EFEB00 543A2A9A 0006CA5D 0F892606 5EC40A75 C9231F03 2800009A 1EEC8B55
00EFEB00 543A2A9A 0006CA5D 0F892606 5EC40A75 C9231F03 6000009A 1EEC8B55
00EFEB00 543A2A9A 0006CA5D 0F892606 5EC40A75 C9231F03 1800009A 1EEC8B55
00EFEB00 543A2A9A 0006CA5D 0F892606 5EC40A75 C9231F03 8000009A 1EEC8B55
00EFEB00 543A2A9A 0006CA5D 0F892606 5EC40A75 C9231F03 7800009A 1EEC8B55
00EFEB00 543A2A9A 000ACA5D 0F892606 5EC40A75 C9231F03 3000009A 1EEC8B55
00EFEB00 543A2A9A 0014CA5D 0F892606 5EC40A75 C9231F03 3800009A 1EEC8B55
00EFEB00 543A2A9A 000CCA5D 0F892606 5EC40A75 C9231F02 E000009A 1EEC8B55
C9231F03 4800009A 1EEC8B55 0006CA5D 0F892606 5EC41F04 9800009A 1EEC8B55
C9231F03 0000009A 1EEC8B55 00EFEB00 543A2A9A 0006CA5D 0F892606 5EC40A75

C9231F04 0000009A 1EEC8B55 00EFEB00 543A2A9A 000ACA5D 0F892606 5EC40A75
C9231F04 3000009A 1EEC8B55 00EFEB00 543A2A9A 0006CA5D 0F892606 5EC40A75
C9231F04 5800009A 1EEC8B55 00EFEB00 543A2A9A 000CCA5D 0F892606 5EC40A75
C9231F04 1800009A 1EEC8B55 00EFEB00 543A2A9A 000ACA5D 0F892606 5EC40A75
C9231F04 0800009A 1EEC8B55 00EFEB00 543A2A9A 000CCA5D 0F892606 5EC40A75
C9231F04 6000009A 1EEC8B55 00EFEB00 543A2A9A 0006CA5D 0F892606 5EC40A75
C9231F04 A000009A 1EEC8B55 00EFEB00 543A2A9A 0008CA5D 0F892606 5EC40A75
C9231F04 3800009A 1EEC8B55 00EFEB00 543A2A9A 0006CA5D 0F892606 5EC40A75
C9231F04 B000009A 1EEC8B55 00EFEB00 543A2A9A 000ACA5D 0F892606 5EC40A75
C9231F03 F000009A 1EEC8B55 00EFEB00 543A2A9A 000ACA5D 0F892606 5EC40A75
C9231F03 D000009A 1EEC8B55 00EFEB00 543A2A9A 0006CA5D 0F892606 5EC40A75
C9231F04 6800009A 1EEC8B55 00EFEB00 543A2A9A 0008CA5D 0F892606 5EC40A75
0A75C923 05100000 9AEC8B55 00EFEB00 543A2A9A 0008CA5D 0F892606 5EC40A75
0A75C923 05600000 9AEC8B55 00EDEB00 5439FA9A D2320008 CA5D0F89 26065EC4
0A75C923 05780000 9AEC8B55 00EDEB00 5439FA9A D232000C CA5D0F89 26065EC4
0A75C923 05880000 9AEC8B55 00EDEB00 5439FA9A D232000E CA5D0F89 26065EC4
0A75C923 06000000 9AEC8B55 00EDEB00 5439FA9A D232000E CA5D0F89 26065EC4
0A75C923 05B00000 9AEC8B55 00EDEB00 5439FA9A D232000A CA5D0F89 26065EC4
0A75C923 06C80000 9AEC8B55 00EDEB00 5439FA9A D232000E CA5D0F89 26065EC4
0A75C923 06A80000 9AEC8B55 00EDEB00 5439FA9A D232000C CA5D0F89 26065EC4
0A75C923 06800000 9AEC8B55 00EDEB00 5439FA9A D2320008 CA5D0F89 26065EC4
0A75C923 06B80000 9AEC8B55 00EDEB00 5439FA9A D2320008 CA5D0F89 26065EC4
058B4474 3EC52EEC 8B555756 00EDEB00 5439FA9A D2320008 CA5D0F89 26065EC4
DF9A0A76 FF0A7500 023D058B 44743EC5 2E2AEB0F A868DF9A 0A76FF0A 7500013D
CB5E5FC9 02C4830F B868DF9A 0A76FF0B 7500033D 058B4474 3EC52E14 EB0FB068
36FF2E44 7A36FF2E EC8B5557 56CB5E5F C9058944 743EC52E 0A468BEC 8B555756
4005F746 74002005 F7617400 1005F744 783EC52E 06C48300 54BE1C9A 056A4478
00013D08 C4830054 C0489A13 7268056A 006A006A 000005C7 44743EC5 2E2B7400
400D058B 44783EC5 2E000305 C744743E C52E3FEB 02C48300 54EC2C9A 016A4B7E
0105C744 743EC52E 13EB0020 0D058B44 783EC52E 000205C7 44743EC5 2E28EB00
C4830054 BF179A05 6A447836 FF2E447A 36FF2E05 8900100D 058B4478 3EC52E00
05894480 3EC52E44 86168B2E 4484068B 2E058944 7C3EC52E 058B4474 3EC52E06
96168B2E 4494068B 2E025589 05894488 3EC52E44 8E168B2E 448C068B 2E025589
44A03EC5 2E0305C6 449C3EC5 2E0105C6 44983EC5 2E025589 05894490 3EC52E44
44983EC5 2E0A6A50 98058A44 9C3EC52E 447C36FF 2E447E36 FF2E35FF 000E05C7
74C00B05 8944A43E C52E10C4 83005453 D19A44A8 36FF2E44 AA36FF2E 5098058A
C4830054 EC2C9A01 6A0A7E00 013D08C4 830054C0 489AD009 68056A00 6A006A20
C52E02C4 8300543E 949A016A EC8B5557 56CB5E5F C902C483 00543E94 9A006A02
8944B03E C52E5E5F 00543A80 9A44A436 FF2E44A6 36FF2E04 6A575605 8944AC3E
3C149A44 A436FF2E 44A636FF 2E006A35 FF44B03E C52E35FF 44AC3EC5 2E575605
48058B44 743EC52E 06C48300 54BE1C9A 056A4478 36FF2E44 7A36FF2E 5E5F0054
16EBFFEF 25058B44 783EC52E 410C4100 40F440EE A7FF2ED8 8BE0D133 7700023D
36FF2E44 7A36FF2E 0589FFBF 25058B44 783EC52E 0AEBFFDF 25058B44 783EC52E
C902C483 00543E94 9A026AEC 8B555756 CB5E5FC9 06C48300 54BF179A 056A4478
3E949A04 6AEC8B55 5756CB5E 5FC902C4 8300543E 949A036A EC8B5557 56CB5E5F
8B555756 CB5E5FC9 02C48300 543E949A 056AEC8B 555756CB 5E5FC902 C4830054
5FC902C4 8300543E 949A076A EC8B5557 56CB5E5F C902C483 00543E94 9A066AEC
543E949A 096AEC8B 555756CB 5E5FC902 C4830054 3E949A08 6AEC8B55 5756CB5E
EC8B5557 56CB5E5F C902C483 00543E94 9A0A6AEC 8B555756 CB5E5FC9 02C48300
5E5FC902 C4830054 3E949A0C 6AEC8B55 5756CB5E 5FC902C4 8300543E 949A0B6A
00543E94 9A0E6AEC 8B555756 CB5E5FC9 02C48300 543E949A 0D6AEC8B 555756CB
6AEC8B55 5756CB5E 5FC902C4 8300543E 949A0F6A EC8B5557 56CB5E5F C902C483
CB5E5FC9 02C48300 543E949A 116AEC8B 555756CB 5E5FC902 C4830054 3E949A10
8300543E 949A136A EC8B5557 56CB5E5F C902C483 00543E94 9A126AEC 8B555756
156AEC8B 555756CB 5E5FC902 C4830054 3E949A14 6AEC8B55 5756CB5E 5FC902C4
56CB5E5F C902C483 00543E94 9A166AEC 8B555756 CB5E5FC9 02C48300 543E949A
C4830054 3E949A18 6AEC8B55 5756CB5E 5FC902C4 8300543E 949A176A EC8B5557
9A1A6AEC 8B555756 CB5E5FC9 02C48300 543E949A 196AEC8B 555756CB 5E5FC902
5756CB5E 5FC902C4 8300543E 949A1B6A EC8B5557 56CB5E5F C902C483 00543E94
02C48300 543E949A 1D6AEC8B 555756CB 5E5FC902 C4830054 3E949A1C 6AEC8B55
949A1F6A EC8B5557 56CB5E5F C902C483 00543E94 9A1E6AEC 8B555756 CB5E5FC9
555756CB 5E5FC902 C4830054 3E949A20 6AEC8B55 5756CB5E 5FC902C4 8300543E
C902C483 00543E94 9A226AEC 8B555756 CB5E5FC9 02C48300 543E949A 216AEC8B
3E949A24 6AEC8B55 5756CB5E 5FC902C4 8300543E 949A236A EC8B5557 56CB5E5F

04C48300 5443B69A 44B436FF 2E44B636 FF2EEC8B 555756CB 5E5FC902 C4830054
5E5FC902 C4830054 3E949A25 6AEC8B55 5756CB5E 5FC944B6 168B2E44 B4068B2E
00543E94 9A276AEC 8B555756 CB5E5FC9 02C48300 543E949A 266AEC8B 555756CB
6AEC8B55 5756CB5E 5FC902C4 8300543E 949A286A EC8B5557 56CB5E5F C902C483
CB5E5FC9 02C48300 543E949A 2A6AEC8B 555756CB 5E5FC902 C4830054 3E949A29
004C8C52 004C8C60 004C8C44 00CB5E5F C902C483 00543E94 9A2B6AEC 8B555756
004C8C48 004C8C46 00442BB8 004C8C5C 0054EFDC 004C8C58 0034F869 004C8C54
46C70000 06C85756 004C8C62 004C8C4E 004C8C50 004C8C3A 004C8C4A 004C8C4C
5E5FC906 C4830054 4A8A9A4A 2636FF2E 4A2836FF 2E0A76FF 0000FA46 C70000FE
FF2E4A34 36FF2E20 7D043B26 4848058B 4A2A3EC5 2E4A2E36 C42EEC8B 555756CB
058B4A36 3EC52E30 EBC02B02 C4830054 44B89A0D 6A04C483 0054EB72 9A4A3236
3D8B4A3E 36C42E02 2D834A2A 3EC52ED2 EB4A3A36 FF2E4A3C 36FF2E0C 7500013D
042D058B 4A2A3EC5 2E4A2E36 C42EEC8B 555756CB 5E5FC905 8B025C8E 263C0326
83005444 B89A0D6A 04C48300 54EB729A 4A4236FF 2E4A4436 FF2E217D 043B2600
2ED1EB4A 4636FF2E 4A4836FF 2E0C7500 013D058B 4A363EC5 2E31EBEE D99B02C4
555756CB 5E5FC99B 05D99B02 5C8E263C 03263D8B 4A3E36C4 2E042D83 4A2A3EC5
4A4A36FF 2E4A4C36 FF2E227D 043B2600 042D058B 4A2A3EC5 2E4A2E36 C42EEC8B
3D058B4A 363EC52E 33EBD08B C02B02C4 83005444 B89A0D6A 04C48300 54EB729A
263D8B4A 3E36C42E 042D834A 2A3EC52E D0EB4A4E 36FF2E4A 5036FF2E 0C750001
729A0054 968F9A00 54454D9A EC8B5557 56CB5E5F C902558B 058B025C 8E263C03
7D043B26 48058B4A 2A3EC52E 4A2E36C4 2EEC8B55 5756CB5E 5FC908C4 830054EA
EBC02B02 C4830054 44B89A0D 6A04C483 0054EB72 9A4A5236 FF2E4A54 36FF2E20
C52E4A3E 1EC42ED2 EB4A5636 FF2E4A58 36FF2E0C 7500013D 058B4A36 3EC52E30
8B4A2A3E C52EEC8B 555756CB 5E5FC998 058A025F 8E263F03 263C8B0C FF4A2A36
5444B89A 0D6A04C4 830054EB 729A4A5A 36FF2E4A 5C36FF2E 207E01F4 3D404005
D2EB4A5E 36FF2E4A 6036FF2E 0C750001 3D058B4A 363EC52E 38EBC02B 02C48300
0205834A 2A3EC52E 05890A46 8B025C8E 263C0326 3D8B4A2A 3EC52E4A 3E36C42E
36FF2E20 7E043B26 00040505 8B4A2A3E C52E4A62 36C42EEC 8B555756 CB5E5FC9
3EC52E3A EBC02B02 C4830054 44B89A0D 6A04C483 0054EB72 9A4A6636 FF2E4A68
8B4A2A3E C52E4A3E 36C42ED2 EB4A6A36 FF2E4A6C 36FF2E0C 7500013D 058B4A36
04C85756 CB5E5FC9 9B040583 4A2A3EC5 2E1DD99B 0A46DD9B 025C8E26 3C03263D
729A4A6E 36FF2E4A 7036FF2E 207E043B 2640058B 4A2A3EC5 2E4A6236 C42E0000
0C750001 3D058B4A 363EC52E 3DEBC02B 02C48300 5444B89A 0D6A04C4 830054EB
2A36C42E FE5689FC 46890255 8B058B4A 3E3EC52E D2EB4A72 36FF2E4A 7436FF2E
0000FE46 C7000006 C85756CB 5E5FC905 880A468B FE5E8EF8 0304FF26 3C8B264A
0D6A04C4 830054EB 729A4A76 36FF2E4A 7836FF2E 21750001 3D058B4A 363EC52E
7EC5E7EB 005446B5 9A006A09 750A460B 0C468B00 95E9C02B 02C48300 5444B89A
2E0C7504 3B26058B 4A2A3EC5 2E4A6236 C42E4E74 003D800A 7EC5EF74 003D800A
46FF0A7E C5FC5689 FA468902 558B058B 4A3E3EC5 2EABEB4A 7A36FF2E 4A7C36FF
9C9A006A AAEBFE46 FF0588FC 5E8EFA7E 0304FF26 3C8B264A 2A36C42E 98058A0A
83005446 B59AFE76 FF02C483 0054479C 9A006A0A 750001FE 46F702C4 83005447
36FF2E20 7500013D 058B4A36 3EC52E00 00FE46C7 000002C8 5756CB5E 5FC902C4
44E19A75 EBC02B02 C4830054 44B89A0D 6A04C483 0054EB72 9A4A7E36 FF2E4A80
FE46F7DC EB0005C6 0C7EC508 7500FE7E 8363EBFF FFB8057C 0A463BFE 46890054
0C7D043B 26058B05 294A2A3E C52E40FE 468B4A2E 36C42E00 54464A9A 05750001
5202548B 26040326 058B4A2A 3EC52E4A 3E36C42E 9BEB4A82 36FF2E4A 8436FF2E
4A2A3EC5 2EEC8B55 5756CB5E 5FC9FE46 8B08C483 0054EE30 9A0C76FF 0E76FF50
DE289A64 6A505202 548B2604 0326058B 4A3E36C4 2E0A76FF 0C76FF57 56642D83
7E043B26 00640505 8B4A2A3E C52E4A62 36C42EEC 8B555756 CB5E5FC9 5E5F0054
8B4A2A3E C52E4A3E 36C42E57 5604C483 0054EB72 9A4A8636 FF2E4A88 36FF2E12
05834A2A 3EC52E5E 5F0054DE 289A646A 0A76FF0C 76FF5052 02548B26 04032605
8596004C 6049004C 857E004C 6027004C 8582004C 8580004C 601000CB 5E5FC964
61B8004C 6198004C 615E004C 613C004C 6102004C 60DF004C 60A5004C 6083004C
6300004C 62E0004C 62A6004C 626C004C 624C004C 6212004C 61F2004C 8584004C
1205503C 068B2E50 3E36FF2E 500A468D 16EC8B55 5756004C 635B004C 633A004C
0E9A0A76 FF0C76FF 500E468D 16EC8B55 5756CB5E 5FC908C4 8300544B 0E9A5000
5689F446 890C568B 0A468B00 09EE46C7 000012C8 5756CB5E 5FC908C4 8300544B
544B0E9A 50EE468D 16500E46 8D167D00 F046C7FA 5689F846 890C568B 0A468BF6
FA5689F8 46891056 8B0E468B 000064C8 5756CB5E 5FC90005 C6F47EC5 08C48300
253DF08B E42A058A E046FFE0 7EC504F8 4683E256 89E04689 02558B05 8BF87EC5
0020EC46 C7D7EB06 C4830054 CCF09A56 0A76FF0C 76FF03D8 E90375F6 0B187400
0001EE46 C713752D FE83F08B E42A058A E046FFE0 7EC5FFFF EA46C7FF FFE846C7
E07EC500 30EC46C7 117530FE 830000EE 46C705EB F08BE42A 058AE046 FFE07E8B
46C70A7D C00BE846 89058B02 F84683F8 7EC52875 2AFE83F0 8BE42A05 8AE046FF

237C30FE 830000E8 46C72DEB F08BE42A 058AE046 FFE07EC5 E84689D8 F70001EE
8BE42A05 8AE046FF E07EC5E8 46890030 2DC703C6 8BF88B0A E8466B1E 7F39FE83
02F84683 F87EC51A 752AFE83 F08BE42A 058AE046 FFE07EC5 58752EFE 83D8EBF0
39FE8323 7C30FE83 0000EA46 C72DEBF0 8BE42A05 8AE046FF E07EC5EA 4689058B
D8EBF08B E42A058A E046FFE0 7EC5EA46 8900302D C703C68B F88B0AEA 466B1E7F
057475FE 830A746F FE830F74 64FE83F0 8BE42A05 8AE046FF E07EC527 756CFE83
E446C7FE 5689FC46 89F25689 F046895A 169C468D F08BFFDF 25C68B07 7578FE83
0055004F 00441C67 FF2EFE94 E90374F9 E0073B2E 4343000E B94CB8BB C68B0001
4E454DB2 4D894DAE 4D430078 00750073 0072006F 00670066 00650064 00630058
7E83DC46 89058B02 F84683F8 7EC54D3F 4D2E4DEF 4E5D4D3B 4DB64DB6 4DB64CF2
4F269AFC 76FFFE76 FFDC76FF 0A6A2D05 C6FC46FF FC7EC5DC 4689D8F7 0E7D00DC
6AF1EB08 6ADCEB35 FF02F846 83F87EC5 0A6A0148 E9FE5689 FC468908 C4830054
83D8F7DA F7167900 DE7E8304 F84683DE 5689DC46 8902558B 058BF87E C5EDEB10
9AFC76FF FE76FFDC 76FFDE76 FF0A6A2D 05C6FC46 FFFC7EC5 DE5689DC 468900DA
C4830054 4F9C9AFC 76FFFE76 FF35FF02 75FFF87E C50A6A9C EB0AC483 00544F9C
83EA76FF FC76FFFE 76FFD5EB 106AD9EB 086A00C8 E904F846 83FE5689 FC46890A
830034FB 309A560A C4830054 96649A50 000805C4 8B16F876 FFFA76FF 086A08EC
89F44689 02558B05 8BF87EC5 0000E446 C70087E9 08F84683 FE5689FC 468910C4
4689F256 89F04689 F6568BF4 468B04F8 4683F64E 8C5040F4 46C70875 C20BF656
E47EEA46 3BF4462B FC468BEF 7C00EA7E 83117400 3D80FC46 FFFC7EC5 FE5689FC
F87EC519 EB0588FC 46FFFC7E C5058B02 F84683F8 7EC50000 E446C731 EBFC4EFF
2BE84603 F2568BF0 468BFF31 E908C483 00544B0E 9A0A76FF 0C76FF35 FF0275FF
1E7530EC 7E832474 00E47E83 3F7500EE 7E830000 E646C705 7DC00BE6 4689FC46
468B06C4 830054CC F09A50E4 2A058AF0 46FF0A76 FF0C76FF 16752D3D 80F07EC5
76FF1B73 FC463BF2 568BF046 8BE3EBEC 76FF0A76 FF0C76FF 0B74C00B E64EFFE6
E9037500 EE7E83DA EB06C483 0054CCF0 9A50E42A 058AF046 FFF07EC5 0A76FF0C
06C48300 54CCF09A EC76FF0A 76FF0C76 FFFC23E9 0375C00B E64EFFE6 468BFC30
FC5EC5FC 4EFFFE56 89FC4689 5A16FC46 8D0E768B 00000EC8 5756CB5E 5FC9E0EB
FF985048 878A2EDA 8B1076F7 D22BC68B 1B74C00B F88B1076 F7D22BC6 8B0007C6
3F80FC5E C50788FC 5EC5FC4E FF985048 878A2EDE 8BD8EBF7 8B0788FC 5EC5FC4E
16C85756 CB5E5FC9 0C568B0A 468BE7EB 0A46FF0A 5EC5E42A 078AFC46 FF0F7400
76FF5052 99C68B00 05C6EA7E C5EA4EFF EC5689EA 46895A16 FF468D12 768B0000
76FF1076 FF505299 C68B3174 C20BF056 89EE4689 08C48300 5498729A 0E76FF10
89F0568B EE468B05 88EA7EC5 EA4EFF98 5048858A 2EF88B08 C4830054 98BE9A0E
003D80EA 7EC50588 EA7EC5EA 4EFF9850 48858A2E F88B0E46 8BB2EB10 56890E46
004C7C64 00CB5E5F C90C568B 0A468BE7 EB0A46FF 0A7EC5E4 2A058AEA 46FF0F74
46C60000 28C85756 46454443 42413938 37363534 33323130 00007D4C 4C554E7B
46C65FEF 46C646EE 46C649ED 46C65FEC 46C653EB 46C64DEA 46C646E9 46C60AE8
895E5F00 543BD49A 50FA468D 16036A57 560000E0 46C758F2 46C642F1 46C64DF0
9A50FA46 8D16006A 50E8468D 16F676FF 57560161 E9FA468B 067400FA 7E83F646
895E5F00 543A809A 50FA468D 164E6A57 56D97500 FA7E83F4 46895E5F 00543C34
0C76FF00 05C6FC7E C5FE5689 FC468902 C4830054 EF9C9A50 C07500FA 7E83E446
8B0C4588 10468B0B 4588FC7E C50E468B 08C48300 54EE309A 50001405 520A76FF
004845C7 00004645 C7124589 18468B10 55890E45 8916568B 14468B0D 45881246
037400FA 7E83E246 895E5F00 543AC09A 50FA468D 16E076FF 57560000 4A45C700
27E90374 00FA7E83 5E5F0054 3C149A50 FA468D16 50E476FF F476FF57 56FF45E9
00FA7E83 DE46895E 5F00543B F49A50FA 468D1650 D8468D16 FF6AE276 FF5756FF
56FEE9E9 037400FA 7E835E5F 00543A60 9A50FA46 8D16E476 FF5756FF 03E90374
54EF9C9A DE76FFFE CFE90374 00FA7E83 5E5F0054 3AA09A50 FA468D16 E276FF57
543A609A 50FA468D 16DE76FF 5756F846 89058BDA 7EC5DC56 89DA4689 02C48300
E946C60A E846C600 0028C857 56CB5E5F C9F8468B FE9CE903 7400FA7E 835E5F00
F146C64D F046C65F EF46C646 EE46C649 ED46C65F EC46C653 EB46C64D EA46C646
FA7E83F6 46895E5F 00543BD4 9A50FA46 8D16036A 57560000 E046C758 F246C642
5F00543C 349A50FA 468D1600 6A50E846 8D16F676 FF575601 64E9FA46 8B067400
FA7E83E4 46895E5F 00543A80 9A50FA46 8D164E6A 5756D975 00FA7E83 F446895E
05520A76 FF0C76FF 0005C6FC 7EC5FE56 89FC4689 02C48300 54EF9C9A 50C07500
0D458812 468B0C45 8810468B 0B4588FC 7EC50E46 8B08C483 0054EE30 9A500014
468B4855 89464589 1C568B1A 468B1245 8918468B 1055890E 45891656 8B14468B
42E90374 00FA7E83 E246895E 5F00543A C09A50FA 468D16E0 76FF5756 4A45891E
56FF24E9 037400FA 7E835E5F 00543C14 9A50FA46 8D1650E4 76FFF476 FF5756FF
037400FA 7E83DE46 895E5F00 543BF49A 50FA468D 1650D846 8D16FF6A E276FF57
FF5756FE E6E90374 00FA7E83 5E5F0054 3A609A50 FA468D16 E476FF57 56FF00E9
830054EF 9C9ADE76 FFFECCE9 037400FA 7E835E5F 00543AA0 9A50FA46 8D16E276
5F00543A 609A50FA 468D16DE 76FF5756 F8468905 8BDA7EC5 DC5689DA 468902C4

1476FF16 76FF1876 FF000002 C85756CB 5E5FC9F8 468BFE99 E9037400 FA7E835E
006A1174 C00BFE46 8910C483 00545058 9A0A76FF 0C76FF0E 76FF1076 FF1276FF
0AE846C6 000028C8 5756CB5E 5FC9FE46 8B0AC483 0054C048 9A50036A 006A006A
4DF046C6 5FEF46C6 46EE46C6 49ED46C6 5FEC46C6 53EB46C6 4DEA46C6 46E946C6
F646895E 5F00543B D49A50FA 468D1603 6A575600 00E046C7 58F246C6 42F146C6
3C349A50 FA468D16 006A50E8 468D16F6 76FF5756 0180E9FA 468B0674 00FA7E83
46895E5F 00543A80 9A50FA46 8D1600B4 685756D9 7500FA7E 83F44689 5E5F0054
FF0C76FF 0105C6FC 7EC5FE56 89FC4689 02C48300 54EF9C9A 50BF7500 FA7E83E4
468B0C45 8810468B 0B4588FC 7EC50E46 8B08C483 0054EE30 9A500014 05520A76
89464589 1C568B1A 468B1245 8918468B 1055890E 45891656 8B14468B 0D458812
54DE289A 666A2076 FF2276FF 50004E05 FC468BFE 76FF5756 4A45891E 468B4855
FF26E903 7400FA7E 83E24689 5E5F0054 3AC09A50 FA468D16 E076FF57 565E5F00
5756FF08 E9037400 FA7E835E 5F00543C 149A50FA 468D1650 E476FFF4 76FF5756
E9037400 FA7E83DE 46895E5F 00543BF4 9A50FA46 8D1650D8 468D16FF 6AE276FF
76FF5756 FECAE903 7400FA7E 835E5F00 543A609A 50FA468D 16E476FF 5756FEE4
C4830054 EF9C9ADE 76FFFEB0 E9037400 FA7E835E 5F00543A A09A50FA 468D16E2
5E5F0054 3A609A50 FA468D16 DE76FF57 56F84689 058BDA7E C5DC5689 DA468902
8BFE4689 48005481 479A0000 64C85756 CB5E5FC9 F8468BFE 7DE90374 00FA7E83
36FF2E5B 4A36FF2E 010EE903 74FFFF3D 058B5B42 1E8E2E5B 403E032E E7D1FE7E
468908C4 83005499 729A5052 04C48300 547FAA9A 5B4436FF 2E5B4636 FF2E5B48
29EC9AFA 76FFFC76 FF5B4C36 FF2E5B4E 36FF2E50 DC468D16 7874C20B FC5689FA
FE7E8B35 7577DD7E 80067457 DD7E8041 7562DC7E 80067442 DC7E800C C4830054
7E8B04C4 8300549C 3C9AFA76 FFFC76FF 000805C7 5B421E8E 2E5B403E 032EE7D1
04C48300 549C3C9A FA76FFFC 76FF0085 E9058B5B 421E8E2E 5B403E03 2EE7D1FE
5F005438 2C9A509C 468D1650 9E468D16 50DA468D 16006A11 6A575600 02DA46C7
1EFE466B 2A74009E 7D801F16 FD03F88B 1EFE466B 4BEBFFFF B8057400 9C7E835E
2E5B403E 032EE7D1 FE7E8B04 C4830054 59349A50 5200612D C6035A16 C58BF08B
0042C857 56CB5E5F C9058B5B 421E8E2E 5B403E03 2EE7D1FE 7E8B0589 5B421E8E
0374FFFF 3D058B5B 521E8E2E 5B503E03 2EE7D1BE 7E8BBE46 89480054 81479A00
382C9A50 C0468D16 50C2468D 1650FE46 8D16006A 116A5756 0002FE46 C7009BE9
6B5F7400 C27D801F 16FD03F8 8B1EBE46 6B0080E9 C02B0574 00C07E83 5E5F0054
2EE7D1BE 7E8B2EEB 04C48300 5459349A 5052003D 2DC7035A 16C58BF8 8B1EBE46
05C75B52 1E8E2E5B 503E032E E7D1BE7E 8B2FEB00 0105C75B 521E8E2E 5B503E03
7E8B57BA 57BA57BA 57CF57F6 A7FF2ED8 8BE0D1F7 7700033D 27EBC02B 1AEB0000
46890054 55F09A00 0002C857 56CB5E5F C9058B5B 521E8E2E 5B503E03 2EE7D1BE
EB000305 C70A7EC5 32EB0002 05C70A7E C53BEB00 0105C70A 7EC524EB FE468BFE
58385838 582F5826 5858A7FF 2ED88BE0 D11B7700 083D20EB 000405C7 0A7EC529
013D0054 55F09AEC 8B555756 CB5E5FC9 48058B0A 7EC55841 586A586A 586A586A
5FC9C02B 02EB0001 B8057500 033D0054 55F09A0A 7400023D 005455F0 9A147400
DC7E8006 7402DC7E 8006C483 0054BE1C 9A016A50 DA468D16 000026C8 5756CB5E
EBC02B04 7500023D 058B0A7E C5000205 C70A7EC5 07EB0001 05C70A7E C509750A
0054BE1C 9A016A50 DA468D16 000026C8 5756CB5E 5FC9FE46 8BFE4689 0001B803
023D058B 0A7EC500 0205C70A 7EC507EB 000105C7 0A7EC509 750ADC7E 8006C483
C50A46FF 03EB0000 08C85756 CB5E5FC9 FE468BFE 46890001 B803EBC0 2B047500
46FF03EB 0000FE46 C7E57500 3D800A7E C5087453 3D800A7E C5107473 3D800A7E
FE7E8BE1 7C613D80 0C5E8E0A 7E03FE7E 8B387400 3D800C5E 8E0A7E03 FE7E8BFE
0A7E03FE 7E8BFFDF 2598058A 0C5E8E0A 7E03FE7E 8BD37F7A 3D800C5E 8E0A7E03
C4830054 ECD09A0A 76FF0C76 FF5B5436 FF2E5B56 36FF2E06 6AB7EB05 880C5E8E
ECD09A0A 76FF0C76 FF5B5836 FF2E5B5A 36FF2E07 6A00FEE9 0001B806 75C00B0A
76FF0C76 FF5B5C36 FF2E5B5E 36FF2E07 6A00DAE9 0001B806 75C00B0A C4830054
5B6436FF 2E5B6636 FF2EF846 89480054 81479A48 75C00B0A C4830054 ECD09A0A
E90002B8 0675C20B FC5689FA 468908C4 83005499 729A5B60 36FF2E5B 6236FF2E
6836FF2E 5B6A36FF 2E076A74 EB0003B8 04C48300 549C3C9A FA76FFFC 76FF0087
2E5B6E36 FF2E076A 51EB0002 B80575C0 0B0AC483 0054ECD0 9A0A76FF 0C76FF5B
36FF2E05 6A2EEB00 03B80575 C00B0AC4 830054EC D09A0A76 FF0C76FF 5B6C36FF
20057D80 0A7EC50D 75C00B0A C4830054 ECD09A0A 76FF0C76 FF5B7036 FF2E5B72
8D16006A 136A5756 0001FE46 C7000004 C85756CB 5E5FC9FF FFB803EB C02B0475
3D835B74 3EC52E5E 5F005438 2C9A50FC 468D165B 7436FF2E 5B7636FF 2E50FE46
81579A00 0002C857 56CB5E5F C9000205 C70A7EC5 07EB0001 05C70A7E C5097500
CB5E5FC9 05890A7E C5005481 479A0AEB 000305C7 0A7EC509 75C00BFE 46890054
004C88F5 004C88ED 004C88E6 004C8928 004C88E3 004C88E1 004C88D2 004C8924
2E9B0000 74C85756 004C892C 004C891E 004C8916 004C890E 004C890C 004C88FD
00D446C7 0000D246 C72000D0 46C70000 CE46C700 00CC46C7 8C5ED99B 60D006DD
FF03EB00 00F846C7 DA5689D8 468900D2 83200005 D6568BD4 468B0000 D646C740

03E7D1F8 7E8B0F7E 00FF3D05 8B0C5E8E 0A7E03E7 D1F87E8B 7B7D03F8 7E83F846
7E03E7D1 F87E8B0F 7D003D83 0C5E8E0A 7E03E7D1 F87E8B00 FF05C70C 5E8E0A7E
16FD03E7 D1F87E8B 00F02505 8B0C5E8E 0A7E03E7 D1F87E8B 000005C7 0C5E8E0A
FA45891F 16FD03E7 D1F87E8B 000F2505 8B0C5E8E 0A7E03E7 D1F87E8B EC45891F
9B8C46D9 9B945ED9 9BFC4EDE 9B8C46D9 9B985ED9 9BFA4EDE 9B8C46D9 9BFF7CE9
16FD0302 E7C1F67E 8B137D08 F67E83F6 46FF03EB 0000F646 C7905ED9 9BFE4EDE
5ED89B90 46D99B3D 77005496 8A9A905E D89B9446 D99BE4EB 9C5DD99B EED99B1F
9BA05ED9 9B9066D8 9B9846D9 9B9C5ED9 9B9866D8 9BE8D99B 2E770054 968A9A98
8A9A985E D89B9446 D99B0178 E9B85ED9 9B9446D9 9BB05ED9 9B9466D8 9B9046D9
9B9C5ED9 9B9066D8 9BE8D99B 2E770054 968A9A90 5ED89B98 46D99B3D 77005496
E9B85ED9 9B9446D9 9BB05ED9 9B9466D8 9B9846D9 9BAC5ED9 9B9866D8 9B9046D9
2E770054 968A9A90 5ED89B94 46D99B3D 77005496 8A9A945E D89B9846 D99B012C
9B9866D8 9B9446D9 9BAC5ED9 9B9466D8 9B9046D9 9B9C5ED9 9B9066D8 9BE8D99B
46D99B3D 77005496 8A9A905E D89B9846 D99B00E0 E9B85ED9 9B9846D9 9BB45ED9
9B9066D8 9B9446D9 9B9C5ED9 9B9466D8 9BE8D99B 2E770054 968A9A94 5ED89B90
D89B9046 D99B0094 E9B85ED9 9B9846D9 9BB45ED9 9B9866D8 9B9046D9 9BA45ED9
9B9466D8 9BE8D99B 2D770054 968A9A94 5ED89B98 46D99B3C 77005496 8A9A985E
9B9046D9 9BA85ED9 9B9066D8 9B9846D9 9BA45ED9 9B9866D8 9B9446D9 9B9C5ED9
54968A9A 985ED89B 9446D99B 3A770054 968A9A94 5ED89B90 46D99B49 EBB85ED9
D89B9446 D99BA05E D99B9466 D89B9846 D99B9C5E D99B9866 D89BE8D9 9B2B7700
545FEC9A EC76FFEE 76FFF076 FF50DC46 8D16B85E D99B9046 D99BA85E D99B9066
8D160AC4 8300545F EC9A5000 1005EC46 8BEE76FF F076FF50 DE468D16 0AC48300
F076FF50 E2468D16 0AC48300 545FEC9A EC76FF50 001005EE 468BF076 FF50E046
1005F046 8B50E446 8D160AC4 8300545F EC9A5000 1005EC46 8B500010 05EE468B
8BEE76FF 50001005 F0468B50 E6468D16 0AC48300 545FEC9A EC76FFEE 76FF5000
001005EE 468B5000 1005F046 8B50E846 8D160AC4 8300545F EC9A5000 1005EC46
8B500010 05EE468B 50001005 F0468B50 EA468D16 0AC48300 545FEC9A EC76FF50
A6E9037C 04F67E83 F646FF03 EB0000F6 46C70AC4 8300545F EC9A5000 1005EC46
08F47E83 F446FF03 EB0000F4 46C7BC5D D99BEED9 9B1F16FD 0302E7C1 F67E8B00
541326CC 44032699 DC458B1F 16FD03E7 D1F47E8B 0716F503 02E6C1F6 768B547D
DE9B9C45 D99B1F16 FD0302E7 C1F47E8B F2468905 8B145E8E 127E03E7 D1F88BCE
1F16FD03 02E7C1F6 7E8BA3EB BC5DD99B BC45D89B 1F16FD03 02E7C1F6 7E8BF24E
8E0E7E03 E7D1F67E 8B08C483 005496EF 9A005496 8F9A60D8 06DC2E9B BC45D99B
81467D00 FF0C7E81 7E7D00FF 0A7E81EC 8B555756 CB5E5FC9 9BFF4EE9 0589105E
C60B0F00 2504E0C1 0E468B00 F0E6810C 768BC88B 04F8C10A 468B247D 00FF0E7E
107EC512 000DC60B 00F0250C 468BF08B 04F8C10A 468B00A2 E9058910 7EC5C10B
C511000D C60B00F0 250E468B F08B04F8 C10A468B 1A7D00FF 0E7E8100 87E90589
0E7E8131 7D00FF0C 7E8156EB 0589107E C513800D 04F8C10A 468B66EB 0589107E
468B2EEB 0589107E C510000D C60B00F0 250E468B F08B04F8 C10C468B 1A7D00FF
7EC51300 0D04F8C1 0E468B10 7D00FF0E 7E811EEB 0589107E C513400D 04F8C10C
3FE00000 00000000 3FB00000 00000000 CB5E5FC9 13C005C7 107EC507 EB058910
83005461 069A016A EC8B5557 56CB5E5F C902C483 00546106 9A006AEC 8B555756
9B04C483 00548569 9A50BC46 8D16E446 890A468B 000046C8 5756CB5E 5FC902C4
54968F9A FC46D99B 0054968F 9AF846D9 9BFC5ED9 9BD046D9 9BF85ED9 9BCC46D9
016A50BA 468D1650 EA468D16 03BA46C6 01F9E903 75C00B10 C4830054 64779A00
0E36FF2E 1274003D 8066083E C52E1C74 00EA7E83 0EC48300 54DABA9A 6E6A056A
012D6803 6AE676FF 50EA468D 160008E6 46C704C4 8300544A 8A9A660C 36FF2E66
468D160A C4830054 DABA9A01 2F68036A E676FF50 EA468D16 0AC48300 54DABA9A
1613BA46 C612C483 0054DABA 9A00CA68 076A016A 50F8468D 1650FC46 8D1650EA
3EC52E1C 7400EA7E 830EC483 0054DABA 9A6E6A05 6A016A50 BA468D16 50EA468D
8D1650F4 468D1604 C4830054 4A8A9A66 1036FF2E 661236FF 2E127400 3D806608
968F9AFC 46D99B00 54968F9A F846D99B 0054968F 9A05D99B 66143EC5 2E50F046
D99BEC46 8908C483 005496EF 9A005496 8F9AF446 D99B20C4 830054B9 F79A0054
1A36FF2E 661C36FF 2E661E36 FF2EEE46 8908C483 005496EF 9A005496 8F9AF046
04C48300 54D3239A 662036FF 2E662236 FF2E08C4 83005491 9E9A6618 36FF2E66
54C39E9A 0054C271 9A0AC483 0054DABA 9A6F6A03 6A036A50 EA468D16 2E74C00B
1636FF2E 50E8468D 1650E446 8D160034 05019A05 7500013D 058B6624 3EC52E00
2E661E36 FF2E6628 36FF2E66 2A36FF2E 662C36FF 2E662E36 FF2E6614 36FF2E66
03E47E83 005464E0 9A057502 E47E831C C483002C EEBB9A50 EC468D16 661C36FF
1836FF2E 661A36FF 2E661C36 FF2E661E 36FF2E1C 7401E47E 83005464 FC9A0575
5E5FC902 C4830054 63749A01 6AEC8B55 5756CB5E 5FC99B08 C4830054 92DF9A66
1E75010A 7E830000 04C85756 CB5E5FC9 02C48300 5463749A 026AEC8B 555756CB
7E8322EB 08C48300 54919E9A 661836FF 2E661A36 FF2E661C 36FF2E66 1E36FF2E
08C48300 5492DF9A 661836FF 2E661A36 FF2E661C 36FF2E66 1E36FF2E 1C75020A

FF2E662A 36FF2E66 2C36FF2E 662E36FF 2E661436 FF2E6616 36FF2E50 FC468D16
6F6A036A 036A50FE 468D1614 C483002C EFBA9A66 1C36FF2E 661E36FF 2E662836
016A1674 C00B04C4 830054D3 239A6620 36FF2E66 2236FF2E 0AC48300 54DABA9A
05750001 3D058B66 243EC52E 08C48300 54D39A9A 662036FF 2E662236 FF2E006A
FFFE7E81 04C48300 2CF0DA9A 50FE468D 16000002 C85756CB 5E5FC900 3405019A
303EC52E EC8B5557 56CB5E5F C9000205 C70A7EC5 07EB0001 05C70A7E C5097500
9A125EDC 9B05D99B 66343EC5 2E48EBC0 2B047600 54968A9A 125EDC9B 05D99B66
EBC02B04 73005496 8A9A0A5E DC9B05D9 9B66383E C52E31EB C02B0473 0054968A
CB5E5FC9 9B0001B8 03EBC02B 04760054 968A9A0A 5EDC9B05 D99B663C 3EC52E1A
8B555756 CB5E5FC9 0AC48300 54C0489A 13116800 6A006A00 6A006AEC 8B555756
8D160000 02C85756 CB5E5FC9 0AC48300 54C0489A 27156800 6A006A00 6A006AEC
0205C70A 7EC507EB 000105C7 0A7EC509 7500FE7E 8304C483 002CF112 9A50FE46
7EC50974 00FE7E83 04C48300 3C859B9A 50FE468D 16000002 C85756CB 5E5FC900
2C36FF2E 662E36FF 2EEC8B55 5756CB5E 5FC90001 05C70A7E C507EB00 0205C70A
FF2EEC8B 555756CB 5E5FC90A C483003C 850B9A01 6A662836 FF2E662A 36FF2E66
CB5E5FC9 0AC48300 3C850B9A 006A6628 36FF2E66 2A36FF2E 662C36FF 2E662E36
033D0054 55F09A1D 7400023D 005455F0 9A277400 013D0054 55F09AEC 8B555756
5464499A 0A76FF0C 76FF0EEB 000205C7 0A7EC509 7400083D 005455F0 9A137400
00147DE6 004C59F2 001494F8 004C8CD7 004C8CC4 0014951F CB5E5FC9 04C48300
00147C0E 00147C16 00147C12 00147C0A 00147CC6 00147B9E 0024E1D0 001494C2
EB0004B8 05740001 FE46F706 C4830054 BE1C9A05 6A50FE46 8D160000 02C85756
543BD49A 50F6468D 16016A57 560000F6 46C70000 0AC85756 CB5E5FC9 0002B803
50F6468D 16006A6B 7036FF2E 6B7236FF 2E505756 437500F6 7E83FC46 895E5F00
C5FA5689 F8468902 C4830054 EF9C9A50 1F7500F6 7E83FE46 895E5F00 543C349A
0000F846 C7000008 C85756CB 5E5FC9C0 2B02EB00 01B80575 00013D02 458BF87E
2B047400 F87E830A 46895E5F 00543BD4 9A50F846 8D16016A 57561D75 000A7E83
5E5F0054 3C349A50 F8468D16 006A6B70 36FF2E6B 7236FF2E 0A76FF57 563BEBC0
5FC90C45 8BFA7EC5 FC5689FA 468902C4 830054EF 9C9A50D6 7500F87E 83FE4689
FE46895E 5F00543B D49A50FA 468D1603 6A575600 00FA46C7 000006C8 5756CB5E
50FA468D 16006A6B 7436FF2E 6B7636FF 2EFE76FF 575626EB C02B0474 00FA7E83
8B0000F8 46C70000 08C85756 CB5E5FC9 D67500FA 7E83FC46 895E5F00 543C349A
9A6B7836 FF2E6B7A 36FF2E00 6A006A04 6A50FA46 8D16066A FE46890A 6EF70C46
CB5E5FC9 FC568BFA 468B06EB D08BC02B 067400F8 7E83F846 8910C483 00545058
026A50FA 468D1606 6AFC5689 FA46890C 568B0A46 8B0000F8 46C70000 08C85756
555756CB 5E5FC9F8 468910C4 83005450 589A6B7C 36FF2E6B 7E36FF2E 006A006A
10C48300 5450589A 6B8036FF 2E6B8236 FF2E006A 006A036A 006A006A 006AEC8B
9A6B8436 FF2E6B86 36FF2E00 6A006A03 6A006A00 6A006AEC 8B555756 CB5E5FC9
50005467 429A5756 000005C7 0C7EC500 0008C857 56CB5E5F C910C483 00545058
830C7EC5 FE46895E 5F00543C 349A0C76 FF0E76FF 006A6B88 36FF2E6B 8A36FF2E
76FF2075 003D830C 7EC5FC46 895E5F00 543BD49A 570E76FF 016A5756 3A75003D
5FC90589 FC468BFA 5E8EF803 E7D10A7E 8BFA5689 F8468902 C4830054 EF9C9AFE
67429A57 563F7505 0B02458B 6B8C3EC5 2E000005 C70C7EC5 000002C8 5756CB5E
C5FE4689 5E5F0054 3C349A0C 76FF0E76 FF006A6B 8836FF2E 6B8A36FF 2E500054
8B6B8C36 C42E0255 8905896B 8C3EC52E 02C48300 54EF9C9A 502E7500 3D830C7E
000AC857 56CB5E5F C9C02B02 EB0001B8 0574003D 83025C8E 263C0326 E7D10A7E
00543BF4 9A50F646 8D1650FC 468D16FF 6A35FF6B 903EC52E 57560000 F646C700
9C9AFE76 FF5E5F00 543AE09A 50F6468D 16006A57 56107400 F67E83FE 46895E5F
468D1601 6AFC76FF 57562075 00023D05 8BF87EC5 FA5689F8 468902C4 830054EF
9A50F646 8D16006A 575610EB 02C48300 442BB89A 1717685E 5F00543C 749A50F6
C70000F0 46C70000 EE46C700 0AF646C7 000014C8 5756CB5E 5FC95E5F 00543AE0
00E7E903 7400EC7E 83FC4689 5E5F0054 3BD49A50 EC468D16 016A5756 0000EC46
00C7E903 7400EC7E 8305896B 943EC52E 5E5F0054 3BD49A50 EC468D16 006A5756
FE46895E 5F00543C 349A50EC 468D1600 6A6B7036 FF2E6B72 36FF2EFC 76FF5756
468D16F6 76FF5756 FA5689F8 468902C4 830054EF 9C9A5000 9EE90374 00EC7E83
9A50EC46 8D16006A 57567175 00EC7E83 05896B90 3EC52E5E 5F00543A C09A50EC
2AF3468A 0A7600C1 3DFFFD05 E42AF346 8A587500 EC7E83F3 46885E5F 00543CF4
EE76FFF0 76FF006A 695B680E 50E42AF3 468A5756 F3468800 C1B803EB FFFD05E4
8B6B903E C52E0D75 00EC7E83 F446895E 5F00543B 409A50EC 468D1600 6A040068
3BD49A50 F6468D16 016A5756 00000AC8 5756CB5E 5FC9EC46 8B0A4589 F87EC505
6B7036FF 2E6B7236 FF2EFC76 FF57563A EBC02B04 7400F67E 83FC4689 5E5F0054
02C48300 54EF9C9A 50D67500 F67E83FE 46895E5F 00543C34 9A50F646 8D16006A
004C8A3E 004C8A36 004C8A7A 004C8A6E 00CB5E5F C9058BF8 7EC5FA56 89F84689
9A006AEC 8B555756 004C8A8A 004C8A88 004C8A84 004C8A64 004C8A54 004C8A44
5756CB5E 5FC902C4 830F8868 DF9A016A EC8B5557 56CB5E5F C902C483 0F8868DF

02C4830F 8868DF9A 036AEC8B 555756CB 5E5FC902 C4830F88 68DF9A02 6AEC8B55
DF9A056A EC8B5557 56CB5E5F C902C483 0F8868DF 9A046AEC 8B555756 CB5E5FC9
555756CB 5E5FC902 C4830F88 68DF9A06 6AEC8B55 5756CB5E 5FC902C4 830F8868
C902C483 0F8868DF 9A086AEC 8B555756 CB5E5FC9 02C4830F 8868DF9A 076AEC8B
68DF9A0A 6AEC8B55 5756CB5E 5FC902C4 830F8868 DF9A096A EC8B5557 56CB5E5F
8B555756 CB5E5FC9 02C4830F 8868DF9A 0B6AEC8B 555756CB 5E5FC902 C4830F88
5FC902C4 830F8868 DF9A0D6A EC8B5557 56CB5E5F C902C483 0F8868DF 9A0C6AEC
8868DF9A 0F6AEC8B 555756CB 5E5FC902 C4830F88 68DF9A0E 6AEC8B55 5756CB5E
EC8B5557 56CB5E5F C902C483 0F8868DF 9A106AEC 8B555756 CB5E5FC9 02C4830F
5E5FC902 C4830F88 68DF9A12 6AEC8B55 5756CB5E 5FC902C4 830F8868 DF9A116A
0F8868DF 9A146AEC 8B555756 CB5E5FC9 02C4830F 8868DF9A 136AEC8B 555756CB
6AEC8B55 5756CB5E 5FC902C4 830F8868 DF9A156A EC8B5557 56CB5E5F C902C483
CB5E5FC9 02C4830F 8868DF9A 176AEC8B 555756CB 5E5FC902 C4830F88 68DF9A16
830F8868 DF9A196A EC8B5557 56CB5E5F C902C483 0F8868DF 9A186AEC 8B555756
1B6AEC8B 555756CB 5E5FC902 C4830F88 68DF9A1A 6AEC8B55 5756CB5E 5FC902C4
56CB5E5F C902C483 0F8868DF 9A1C6AEC 8B555756 CB5E5FC9 02C4830F 8868DF9A
C4830F88 68DF9A1E 6AEC8B55 5756CB5E 5FC902C4 830F8868 DF9A1D6A EC8B5557
9A206AEC 8B555756 CB5E5FC9 02C4830F 8868DF9A 1F6AEC8B 555756CB 5E5FC902
5756CB5E 5FC902C4 830F8868 DF9A216A EC8B5557 56CB5E5F C902C483 0F8868DF
02C4830F 8868DF9A 236AEC8B 555756CB 5E5FC902 C4830F88 68DF9A22 6AEC8B55
DF9A266A EC8B5557 56CB5E5F C902C483 0F8868DF 9A256AEC 8B555756 CB5E5FC9
555756CB 5E5FC902 C4830F88 68DF9A27 6AEC8B55 5756CB5E 5FC902C4 830F8868
C902C483 0F8868DF 9A2D6AEC 8B555756 CB5E5FC9 02C4830F 8868DF9A 286AEC8B
68DF9A2F 6AEC8B55 5756CB5E 5FC902C4 830F8868 DF9A2E6A EC8B5557 56CB5E5F
8B555756 CB5E5FC9 02C4830F 8868DF9A 306AEC8B 555756CB 5E5FC902 C4830F88
5FC902C4 830F8868 DF9A326A EC8B5557 56CB5E5F C902C483 0F8868DF 9A316AEC
8868DF9A 346AEC8B 555756CB 5E5FC902 C4830F88 68DF9A33 6AEC8B55 5756CB5E
EC8B5557 56CB5E5F C902C483 0F8868DF 9A356AEC 8B555756 CB5E5FC9 02C4830F
5E5FC902 C4830F88 68DF9A37 6AEC8B55 5756CB5E 5FC902C4 830F8868 DF9A366A
0F8868DF 9A396AEC 8B555756 CB5E5FC9 02C4830F 8868DF9A 386AEC8B 555756CB
6AEC8B55 5756CB5E 5FC902C4 830F8868 DF9A3A6A EC8B5557 56CB5E5F C902C483
CB5E5FC9 02C4830F 8868DF9A 3C6AEC8B 555756CB 5E5FC902 C4830F88 68DF9A3B
830F8868 DF9A3E6A EC8B5557 56CB5E5F C902C483 0F8868DF 9A3D6AEC 8B555756
406AEC8B 555756CB 5E5FC902 C4830F88 68DF9A3F 6AEC8B55 5756CB5E 5FC902C4
56CB5E5F C902C483 0F8868DF 9A416AEC 8B555756 CB5E5FC9 02C4830F 8868DF9A
C4830F88 68DF9A43 6AEC8B55 5756CB5E 5FC902C4 830F8868 DF9A426A EC8B5557
9A456AEC 8B555756 CB5E5FC9 02C4830F 8868DF9A 446AEC8B 555756CB 5E5FC902
5756CB5E 5FC902C4 830F8868 DF9A476A EC8B5557 56CB5E5F C902C483 0F8868DF
02C4830F 8868DF9A 4C6AEC8B 555756CB 5E5FC902 C4830F88 68DF9A49 6AEC8B55
E9037C04 FC7E83FC 46FF03EB 0000FC46 C70000FE 46C70000 04C85756 CB5E5FC9
2E753C3E 032E02E7 C1FC7E8B 50527542 168B2E75 4006032E 02E0C1FC 468B00DF
754436FF 2E754636 FF2E0EC4 83003CFC 5A9A006A 0054968F 9A05D99B 753E1E8E
EF9A0054 968F9A75 4806DC2E 9B05D99B 75421E8E 2E75403E 032E02E7 C1FC7E8B
05897550 3EC52E75 46168B2E 7544068B 2E06C483 003CFB7B 9A5008C4 83005496
7E8B166A 755C36FF 2E755E36 FF2E7560 36FF2E75 6236FF2E 50FE468D 16025589
830054D8 DC9A046A 076A35FF 75543EC5 2E35FF75 5A1E8E2E 75583E03 2EE7D1FC
15E90AC4 830054C0 489AFE76 FF016A00 6A006A00 6AFF2BE9 037500FE 7E8316C4
C9003CF8 A29A0054 73B29A05 75003D83 75643EC5 2EEC8B55 5756CB5E 5FC99BFF
005473ED 9A0140E9 00547320 9A087500 083D0054 55F09A00 0020C857 56CB5E5F
6C3EC52E 08C48300 5474E29A 35FF0275 FF75683E C52E756C 36FF2E75 6E36FF2E
8075783E C52EFC46 89058B75 743EC52E FA468905 8B75703E C52EF846 89058B75
FF2E757E 36FF2E35 FF756C3E C52E35FF 75703EC5 2E35FF75 743EC52E 2774003D
9A50F846 8D1650F0 468D1635 FF0275FF 75803EC5 2E0AC483 00544A8A 9A757C36
1F16FD03 E7D1FE7E 8B677D04 FE7E83FE 46FF03EB 0000FE46 C70CC483 00545B78
7F3DF045 8B1F16FD 03E7D1FE 7E8BE05D D99B1F16 FD0302E7 C1FE7E8B F045DF9B
1F16FD03 E7D1FE7E 8BE05DD9 9B758406 DF2E9B1F 16FD0302 E7C1FE7E 8B147E01
FF2E90EB E05DD99B 758606DF 2E9B1F16 FD0302E7 C1FE7E8B A67DFF80 3DF0458B
8375883E C52E0CC4 83003CC4 2C9A50F8 468D1650 E0468D16 753C36FF 2E753E36
CB5E5FC9 9B005470 A49A04C4 830044F8 D29A753C 36FF2E75 3E36FF2E 1274003D
025C8E26 3C0326E7 D13D8B75 8C3EC52E 756836C4 2E005473 ED9A0000 04C85756
0000FE46 C7FC4689 058B025C 8E263C03 26E7D1FC 7E8B7590 36C42EFC 4689058B
9BFC46DF 9B753E1E 8E2E753C 3E032E02 E7C1FE7E 8B197D04 FE7E83FE 46FF03EB
CB5E5FC9 000105C7 75643EC5 2EEC8B55 5756CB5E 5FC99B00 5470A49A DEEB1DD9
000505C7 75643EC5 2EEC8B55 5756CB5E 5FC90003 05C77564 3EC52EEC 8B555756

75643EC5 2EEC8B55 5756CB5E 5FC90009 05C77564 3EC52EEC 8B555756 CB5E5FC9
36FF2E75 9636FF2E 0001F646 C700000A C85756CB 5E5FC900 3CFAFF9A 000005C7
D99B05D9 9B759C3E C52EFC5E D99B05D9 9B75983E C52E04C4 83005485 699A7594
968F9AFC 46D99B00 54968F9A 05D99B75 A03EC52E 50F8468D 1650FC46 8D16F85E
36FF2E41 7500083D 005455F0 9A20C483 0054B9F7 9A005496 8F9AF846 D99B0054
0054968F 9AFC46D9 9B005496 8F9AF846 D99B35FF 75643EC5 2E758C36 FF2E758E
C52E3FEB 1EC48300 54DFCF9A 75A436FF 2E75A636 FF2E75A8 36FF2E75 AA36FF2E
54968F9A FC46D99B 0054968F 9AF846D9 9B756C36 FF2E756E 36FF2E35 FF75643E
5FC99B1E C4830054 09889A75 A436FF2E 75A636FF 2E75A836 FF2E75AA 36FF2E00
7EC50589 0E7EC500 FF25058B 0C5E8E0A 7E03E7D1 3D8B0E7E C5EC8B55 5756CB5E
7D8B0E7E C5024589 0E7EC500 FF25058B 0C5E8E0A 7E03E7D1 1000C781 027D8B0E
004C8672 CB5E5FC9 0445890E 7EC500FF 25058B0C 5E8E0A7E 03E7D120 00C78104
004C86A0 004C8698 0014E220 004C86B5 3FE00000 00000000 004C865E 004C8682
004C8A8C 0014951F 004C8AB0 004C8AAE 004C8AAC 00147B9A 004C8ADA 004C86AA
004C8AC6 004C8AC2 004C8AB2 004C8AA8 004C8ADC 004C8AA6 FF80017F 00147B8C
9B00A085 D99B0E7E C51388DC 46C70000 44C85756 00147CC6 00147B9E 001494F8
45F7127E C5EE4689 08C48300 5496EF9A 0054968F 9A008885 D99B127E C5DE5ED9
5EDD9B02 C4830054 969D9A50 DC462B40 00B802EE 66C10100 DC46C751 7400404E
003D807A 7A3EC52E D85ED99B C476DC9B 02C48300 54969D9A 50DC462B 1000B8C4
1274003D 807A7A3E C52E1CEB 04C48300 544A8A9A 7A7E36FF 2E7A8036 FF2E3074
50001205 7A86068B 2E7A8836 FF2E04C4 8300544A 8A9A7A82 36FF2E7A 8436FF2E
FF2EEE76 FF005496 8F9ADE46 D99B1E74 003D807A 7A3EC52E 04C48300 549BD59A
D59A5000 12057A86 068B2E7A 8836FF2E 0EC48300 544A8A9A 7A8A36FF 2E7A8C36
9BE8D99B 39750054 968A9AC4 5EDC9BDE 46D99BC4 5EDD9BEE D99B04C4 8300549B
2E04C483 00544A8A 9A7A8E36 FF2E7A90 36FF2E12 74003D80 7A7A3EC5 2EDE5ED9
9A7A921E DC2E9BDE 46D99B04 C4830054 9BD59A50 0012057A 86068B2E 7A8836FF
8300544A 8A9A7A9A 36FF2E7A 9C36FF2E 1274003D 807A7A3E C52E3277 0054968A
FF03EB00 00F046C7 04C48300 549BD59A 50001205 7A86068B 2E7A8836 FF2E04C4
FE46C7EC 5689EA46 890C568B 0A46030D E0C1F046 8B032AE9 037C03F0 7E83F046
FE468B00 CEE9037C DC463BFE 468B0202 E9037DEE 463BFE46 8BFE4EFF 03EB0FFF
8A9A7A9E 1EDC2E9B E646D99B E65ED99B DE76D89B 02C48300 54969D9A 50EE462B
FA468940 FC468BFC 468908C4 83005496 EF9A0054 968F9AE6 46D99BBF 77005496
FA468BF8 5689F646 89EC568B EA4603E0 D1FC468B 0FFFFA46 C7057E0F FFFA7E81
83005496 9D9A5004 2B26058B F27EC5F6 76C4F456 89F24689 EC568BEA 4603E0D1
C446DC9B 05DF9BF6 7EC5C45E DD9BBC4E DC9BFC66 DE9BE646 D99BBC5E DD9B02C4
E7D1FE7E 8B08C483 005496EF 9A005496 8F9A7AA6 06DC2E9B E246D99B E25ED99B
9BD05ED9 9BDC46DE 9BD876D8 9BDC66DE 9BFE46DF 9BFF19E9 0589EC5E 8EEA7E03
D99B0A73 0054968A 9ADC5EDE 9BCC46D9 9BCC5ED9 9BDE76D8 9BEE66DE 9BD046D9
C45EDD9B BC4EDC9B D846D99B BC5EDD9B DC66DE9B CC46D99B 24EBD45E D99BCC46
FC468908 C4830054 96EF9A00 54968F9A D446D99B D45ED99B C446DC9B DC46DF9B
7E830FFF FC46C705 7E0FFFFC 7E810000 FC46C705 7D00FC7E 83FA4689 40FC468B
EC568BEA 4603E0D1 FC468B0F FFFA46C7 057E0FFF FA7E8100 00FA46C7 057D00FA
26058BF2 7EC5F676 C4F45689 F24689EC 568BEA46 03E0D1FA 468BF856 89F64689
C5C45EDD 9BBC4EDC 9BFC66DE 9BD446D9 9BBC5EDD 9B02C483 0054969D 9A50042B
5496EF9A 0054968F 9A7AA606 DC2E9BE2 46D99BE2 5ED99BC4 46DC9B05 DF9BF67E
7E8B2674 003D807A 7A3EC52E FDF0E905 89EC5E8E EA7E03E7 D1FE7E8B 08C48300
544A8A9A 7AAE36FF 2E7AB036 FF2E0054 968F9A05 D99B185E 8E167E03 02E7C1F0
468948EE 468B04C4 8300549B D59A5000 12057A86 068B2E7A 8836FF2E 0CC48300
F85689F6 4689EC56 8BEA4603 E0D1EE46 8BFD70E9 037D00FE 7E83FE4E FF03EBFE
462BFE46 8BC45ED9 9B05D99B 185E8E16 7E0302E7 C1F07E8B C2468905 8BF67EC5
0308C483 005496EF 9A005496 8F9ADE76 D89BC44E D89B02C4 83005496 9D9A50EE
7E00FF3D 058BEC5E 8EEA7E03 E7D1FE7E 8B0589EC 5E8EEA7E 03E7D1FE 7E8BC246
037C003D 83EC5E8E EA7E03E7 D1FE7E8B 00FF05C7 EC5E8EEA 7E03E7D1 FE7E8B0F
85B20014 951FCB5E 5FC99BFF 4EE90000 05C7EC5E 8EEA7E03 E7D1FE7E 8BFF60E9
0000004C 86183FF0 00000000 0000004C 8600004C 85E3004C 7C64004C 85D5004C
F246C600 00FE46C7 00005AC8 5756004C 86293FE0 00000000 000040AF FE000000
F146C600 F946C678 F846C662 F746C66D F646C661 F546C66D F446C664 F346C620
543B209A 50FE468D 16006A02 6A006A57 56000250 45C77F86 3EC52E06 F246C600
0054C048 9AFE76FF 006A006A 006A006A 167400FE 7E830589 7F8A3EC5 2E5E5F00
5F00543A 809A50FE 468D16FC 76FF5756 0000EA46 C7000BFC 46C701DD E90AC483
006A006A 006A006A 167400FE 7E830589 7F901E8E 2E7F8E3E 032EE7D1 EA7E8B5E
9A35FF7F 901E8E2E 7F8E3E03 2EE7D1EA 7E8B0195 E90AC483 0054C048 9AFE76FF
8A3EC52E 02558905 897F941E 8E2E7F92 3E032E02 E7C1EA7E 8B02C483 0054EF9C
032E02E7 C1EA7E8B 0245893D C57F941E 8E2E7F92 3E032E02 E7C1EA7E 8B058B7F

1E8E2E7F 923E032E 02E7C1EA 46FFEA7E 8B000009 45C73DC5 7F941E8E 2E7F923E
2FE9037D 02EA7E83 07558905 45897F88 168B2E7F 8606032E 50EA466B 3DC57F94
006A006A 006A1674 00FE7E83 FA46895E 5F00543B D49A50FE 468D1603 6A5756FF
FE468D16 FF6A50F2 468D16FA 76FF5756 00D3E90A C4830054 C0489AFE 76FF006A
FE76FF00 6A006A00 6A006A16 7400FE7E 8305897F 963EC52E 5E5F0054 3C349A50
C4830054 7D599A00 6A006A50 EC468D16 50FE468D 160098E9 0AC48300 54C0489A
8BEC7EC5 67EB0AC4 830054C0 489AFE76 FF006A00 6A006A00 6A157400 FE7E830C
8A3DC57F 923EC52E 217D02EA 7E83EA46 FF03EB00 01EA46C7 05897F9A 3EC52E05
449A50A6 468D16D6 EB05883D C57F941E 8E2E7F92 3E032E02 E7C1EA7E 8BE42A05
C77F9E3E C52E09EB 000105C7 7F9E3EC5 2E0B7400 AE7E83FE 468904C4 830054E8
8B05458B 3DC57F92 3EC52E00 0005C77F A23EC52E EC8B5557 56CB5E5F C9000205
8A3EC52E 57561B74 010A7E83 05897FA6 3EC52E0A 468B0255 8905890C 7EC50755
2E000004 C85756CB 5E5FC95E 5F00543C 749A1076 FF1276FF 50480A46 8B35FF7F
7FA23EC5 2E014588 0A468B3D C57F941E 8E2E7F92 3E032E02 E7C13D8B 7FA23EC5
35FF7F96 3EC52E57 56044588 0C468B3D C57F941E 8E2E7F92 3E032E02 E7C13D8B
FF1476FF 35FF7F8A 3EC52E35 FF7F901E 8E2E7F8E 3E032EE7 D13D8B7F A23EC52E
489A35FF 127EC500 6A006A00 6A006A15 74003D83 127EC55E 5F00543C 149A1276
5E5F0054 3CB49A12 76FF1476 FFFF6A01 6A35FF7F 8A3EC52E 57560AC4 830054C0
0AC48300 54C0489A 35FF127E C5006A00 6A006A00 6A157400 3D83127E C5FE4689
2E097504 3B26058B 05FF7FA2 3EC52E7F A636C42E 1C75030A 7E830674 010A7E83
458B3DC5 7F941E8E 2E7F923E 032E02E7 C13D8B7F A23EC52E 000005C7 7FA23EC5
50FE468D 160000FE 46C70000 08C85756 CB5E5FC9 02558905 890E7EC5 07558B05
013D058B 7FA63EC5 2E5B7500 FE7E830C C4830054 7D599A05 6A006A50 FA468D16
543CB49A 50FE468D 16FF6A50 48058B7F A63EC52E 35FF7F8A 3EC52E57 56297E00
6A137400 FE7E8304 C4830054 7F2D9A50 FE468D16 267500FE 7E83F846 895E5F00
FF0C76FF 000004C8 5756CB5E 5FC90AC4 830054C0 489AFE76 FF006A00 6A006A00
76FF0C76 FF0E7500 3D830A7E C50CC483 00547D59 9A066A00 6A50FC46 8D160A76
FF0C76FF 35FF7F8A 3EC52E57 56000002 C85756CB 5E5FC904 C4830054 7F2D9A0A
E7D1FE7E 8B575628 7D02FE7E 83FE46FF 03EB0000 FE46C75E 5F00543B 009A0A76
74003D83 0A7EC55E 5F00543A 609A0A76 FF0C76FF 35FF7F90 1E8E2E7F 8E3E032E
8466004C 8464004C 83B6004C 83B8004C 83C0004C 83B4004C 83C400CB 5E5FC9CF
468904C4 83005480 E29A0A76 FF0C76FF 000002C8 5756004C 83B0004C 83B2004C
74C00B09 EBFE4689 00548147 9A0AEBFE 468BF574 203D800A 7EC50A46 FF03EBFE
3436FF2E 50528438 168B2E84 3606032E 23FE466B 0A76FF0C 76FFED74 00013D05
168B2E84 2E068B2E 10C48300 544ACA9A 842E36FF 2E843036 FF2E8432 36FF2E84
800C5E8E 0A7E03FE 7E8BFE46 FF03EB00 00FE46C7 000002C8 5756CB5E 5FC98430
8B98048A 260C468E 0A7603FE 768B6974 003D8010 5E8E0E7E 03FE7E8B 7774003D
81F08B98 058A105E 8E0E7E03 FE7E8B29 740305F6 843C1E8E 2E843A3E 032E47F8
0E7603FE 768B44EB C02B9D74 C63B0020 0D98058A 0C5E8E0A 7E03FE7E 8B0020CE
7E03FE7E 8B23EBC0 2BFF7CE9 0375043A 2698058A 0C5E8E0A 7E03FE7E 8B10468E
5FC9C02B 02EB0001 B8057500 3D80105E 8E0E7E03 FE7E8B13 75003D80 0C5E8E0A
3E06032E 1EFE466B 0A76FF0C 76FFFE46 FF03EB00 00FE46C7 000002C8 5756CB5E
2E843E3E 032EF88B 1EFE466B 1975C00B 08C48300 5480269A 50528440 168B2E84
423EC52E 0A468BEC 8B555756 CB5E5FC9 0001B803 EBC02BC6 75003D80 84401E8E
FE46C700 0040C857 56CB5E5F C9058B84 423EC52E EC8B5557 56CB5E5F C9058984
7E835E5F 0054382C 9A50C046 8D1650C2 468D1650 FE468D16 006A116A 57560002
2B02EB00 01B80574 00E07E80 0DEBFFFF B8057500 C27E8018 EBFFFFB8 057400C0
2E00FAE9 0374FFFF 3D058B84 463EC52E 0000BE46 C7000042 C85756CB 5E5FC9C0
468D1650 C2468D16 50FE468D 16006A11 6A575600 02FE46C7 000005C7 84463EC5
E3E9FFFF B8067500 C27E8000 EFE9FFFE B8067400 C07E835E 5F005438 2C9A50C0
C6844A3E C52E34EB 5305C684 4A3EC52E 28EB04C4 83005459 349A50C3 468D1600
8BE0D111 7700033D 16EB4C05 C6844A3E C52E20EB 3305C684 4A3EC52E 2AEB3205
C4830054 59349A50 E1468D16 5C7400E0 7E80822E 8224821A 82108246 A7FF2ED8
45C6844A 3EC52E2C EB320145 C6844A3E C52E37EB 530145C6 844A3EC5 2E2CEB04
6E826382 9DA7FF2E D88BE0D1 11770003 3D16EB4C 0145C684 4A3EC52E 21EB3301
740A460B 0C468B4E 0145C684 4A3EC52E 09EB0001 05C78446 3EC52E82 84827982
3EC52E01 45880A7E C5980145 8A844A3E C52E0588 0A7EC598 058A844A 3EC52E1C
76FF0E76 FF1076FF 17750008 3D005455 F09A0000 22C85756 CB5E5FC9 058B8446
3D838452 3EC52E0A 75003D83 844E3EC5 2E0094E9 08C48300 54DFB49A 0A76FF0C
00548147 9AE076FF DE76FF08 C483002C FF1C9A50 E0468D16 50DE468D 16377400
50005481 479A1DEB 0EC48300 544ACA9A 50E2468D 16845636 FF2E8458 36FF2E50
468D160E 76FF1076 FF0AC483 00544ACA 9A50E246 8D16845A 36FF2E84 5C36FF2E
003C8DBD 9A272368 006A0D75 C20B0255 8905890A 7EC508C4 83005499 729A50E2
81479A0A 76FF0C76 FF257500 033D0054 55F09A00 0034C857 56CB5E5F C904C483

5481479A 1DEB0EC4 8300544A CA9A50CF 468D1684 5E36FF2E 846036FF 2E500054
EA9A50CF 468D160A C4830054 4ACA9A50 CF468D16 846236FF 2E846436 FF2E5000
CC7E835E 5F00543E 749A50CC 468D1650 CE468D16 5756CE46 889804C4 830054EE
32F40054 E94A004C 3A5A004C 3278004C 3AC6CB5E 5FC9C02B 02EB0001 B8057500
32B8004C 329B004C 327D0014 7B7C0014 7B7A004C 3AC4004C 3A58004C 3A56004C
0145880A 7EC50054 464A9A05 880A7EC5 0054464A 9AEC8B55 5756004C 32D6004C
45890A7E C5005444 E19A0345 880A7EC5 0054464A 9A024588 0A7EC500 54464A9A
890A7EC5 005444E1 9A084589 0A7EC500 5444E19A 0645890A 7EC50054 44E19A04
C5005445 4D9A145D D99B0A7E C5005445 4D9A105D D99B0A7E C5005445 4D9A0A45
44E19A0C 45890A7E C5005444 E19A1C5D D99B0A7E C5005445 4D9A185D D99B0A7E
245DD99B 0A7EC500 54454D9A 205DD99B 0A7EC500 54454D9A 0E45890A 7EC50054
0A7EC500 54464A9A 2C5DD99B 0A7EC500 54454D9A 285DD99B 0A7EC500 54454D9A
7EC50054 464A9A32 45880A7E C5005446 4A9A3145 880A7EC5 0054464A 9A304588
C5005445 4D9A105D D99B0A7E C5005445 4D9AEC8B 555756CB 5E5FC99B 3345880A
0054454D 9A024589 0A7EC500 5444E19A 05890A7E C5005444 E19A145D D99B0A7E
E19A0445 890A7EC5 005444E1 9A0C5DD9 9B0A7EC5 0054454D 9A085DD9 9B0A7EC5
5DD99B0A 7EC50054 454D9A18 5DD99B0A 7EC50054 454D9A06 45890A7E C5005444
75FFFF3D 04458B24 5DD99B0A 7EC50054 454D9A20 5DD99B0A 7EC50054 454D9A1C
C52E105D D99B104D D89B0A7E C505D99B 88C23EC5 2E247400 3D8388BE 3EC52E61
0054EA72 9A005496 8F9A1045 D99B0A7E C52FEB14 4DD89B0A 7EC505D9 9B88C23E
D99B0A7E C508C483 0054EA72 9A005496 8F9A1445 D99B105D D99B0A7E C508C483
C5E42ACD 468A04C4 83005484 669A50CC 468D1600 0034C857 56CB5E5F C99B145D
C02B0001 05C788BE 3EC52EEC 8B555756 CB5E5FC9 05890A7E C5D2468B 05890E7E
0A7E83EC 8B555756 CB5E5FC9 C02B0000 05C788BE 3EC52EEC 8B555756 CB5E5FC9
8B1DD99B 88C23EC5 2E88CE06 DD2E9B06 EB88C606 DD2E9B08 756D0A7E 8306744D
D99B88DE 3EC52E14 46DD9B1D D99B88DA 3EC52E0C 46DD9B05 8888D63E C52E0A46
D99B05D9 9B88C23E C52E1774 003D8388 BE3EC52E 000008C8 5756CB5E 5FC99B1D
D63EC52E EC8B5557 56CB5E5F C99B0054 462F9A05 EBF84ED8 9B005445 4D9AF85E
5756CB5E 5FC9C02B 06C48300 5488219A 4D6A88C2 36FF2E88 C436FF2E 4D05C688
2B06C483 00548821 9A496A88 C236FF2E 88C436FF 2E4905C6 88D63EC5 2EEC8B55
219A506A 88C236FF 2E88C436 FF2E5005 C688D63E C52EEC8B 555756CB 5E5FC9C0
FF2E88C4 36FF2E43 05C688D6 3EC52EEC 8B555756 CB5E5FC9 C02B06C4 83005488
4405C688 D63EC52E EC8B5557 56CB5E5F C9C02B06 C4830054 88219A43 6A88C236
2EEC8B55 5756CB5E 5FC9C02B 06C48300 5488219A 446A88C2 36FF2E88 C436FF2E
5E5FC9C0 2B06C483 00548821 9A546A88 C236FF2E 88C436FF 2E5405C6 88D63EC5
2ED88BE0 D17E7700 113D0043 2D0A468B 000105C7 88BE3EC5 2E000008 C85756CB
888988B9 88B98868 88B988B9 88B98870 88B988B9 88B988B9 88908897 8844A7FF
DD2E9B88 DA36C42E 3BEB88CE 06DD2E9B 43EB88C6 06DD2E9B 887888B9 88B988B9
9B05D99B 88DE3EC5 2EE6EB88 DE36C42E 0CEB88DA 3EC52E2A EB34D826 9B88C606
8D80CB5E 5FC99B1D D99B0C7E C5F876DC 9B88C606 DD2E9BF8 5EDD9B88 E236DC2E
8D8A004C 8D86004C 8D8E4039 66666666 66663FF0 00000000 0000004C 8D82004C
54BE1C9A 026A8D10 36FF2E8D 1236FF2E 000068C8 57564028 00000000 0000004C
8D1C3EC5 2EEED99B 000105C7 8D183EC5 2E01CFE9 98058A8D 143EC52E 06C48300
3EC52E01 C0E90025 05C78D26 3EC52E1D D99B8D20 3EC52E8D 2406DF2E 9B1DD99B
C52E05D9 9B8D2E3E C52E1DD9 9B8D1C3E C52E05D9 9B8D2A3E C52E0002 05C78D18
FF2E8D34 36FF2E8D 3636FF2E 8D3836FF 2E006405 C78D263E C52E1DD9 9B8D203E
00AA46C7 0161E903 75FC460B FE468BFE 5689FC46 8908C483 00549972 9A8D3236
DF2E9B8D 3C1E8E2E 8D3A3E03 2E02E7C1 AA7E8B1B 7D0166AA 7E81AA46 FF03EB00
FFFE76FF 8D4036FF 2E8D4236 FF2E8D44 36FF2E8D 4636FF2E DBEB1DD9 9B8D3E06
0000AA46 C70CC483 00542A08 9A50520A C4830054 EAAA9A50 AC468D16 506AFC76
8D4A36FF 2E50A046 8D1650A4 468D167E 7D053BAA 468B8D44 3EC52EAA 46FF03EB
542A089A 50520AC4 830054EA AA9A50AC 468D1650 6AFC76FF FE76FF8D 4836FF2E
06DC2E9B 9866DC9B 8D4C06DD 2E9B985E DD9B8D5C 0EDC2E9B A446D99B 10C48300
8D3A3E03 2E02E7C1 33C783A8 7E8BA846 8908C483 005496EF 9A005496 8F9A8D54
36FF2E04 C4830054 9C3C9AFC 76FFFE76 FFFF73E9 1DD99BA0 46D99B8D 3C1E8E2E
3EC52EEE D99B0000 05C78D18 3EC52E4C EB04C483 00548B18 9A8D3A36 FF2E8D3C
EFBB1FEB 007605C7 8D263EC5 2E1DD99B 8D203EC5 2E8D6406 DF2E9B1D D99B8D1C
5FC99B8A B1890F89 3D005300 50004406 67FF2EC4 75F9E007 3B2E4343 0003B98A
46C70000 22C85756 CB5E5FC9 05890A7E C540058B 8D183EC5 2EEC8B55 5756CB5E
D99B0C5E 8E0A7E03 02E7C1E8 7E8BDE5E DD9B8D66 06DF2E9B 0000E646 C70000E8
DD9B8D66 06DF2E9B E6468940 E8468BD7 EBE846FF 05770054 968A9ADE 5EDC9B05
EBE646FF 05770054 968A9ADE 5EDC9B05 D99B0C5E 8E0A7E03 02E7C1E6 7E8BDE5E
0C468E0A 760302E6 C1E8768B DE5EDD9B 02C48300 54969D9A 50E8462B E6468BD7
E7C1E87E 8BF85EDD 9BDE76DC 9B24D826 9B05D99B 0C5E8E0A 7E0302E7 C1E67E8B

E7C1EA7E 8B247C00 EA7E83EA 468948E8 468BF05E DD9B05D9 9B0C5E8E 0A7E0302
8BD6EBF0 5EDD9BF0 6EDC9BF8 46DD9BEA 4EFF1DD9 9BF046DD 9B0C5E8E 0A7E0302
DE5EDD9B 8D6606DF 2E9BEC46 8940EE46 8B00ECE9 037C0164 EE7E81EE 4689E846
7D0165EC 7E810C77 0054968A 9ADE5EDC 9B05D99B 0C5E8E0A 7E0302E7 C1EC7E8B
5E8E0A7E 0302E7C1 EC7E8BDE 5EDD9B8D 6606DF2E 9B0001EA 46C7D0EB EC46FF05
DD9B02C4 83005496 9D9A50EE 462BEC46 8B3A7600 54968A9A DE5EDC9B 05D99B0C
D8269B05 D99B0C5E 8E0A7E03 02E7C1EC 7E8B0C46 8E0A7603 02E6C1EE 768BDE5E
C1EE7E8B 367EEA46 3BEE462B EC468BF0 5EDD9BF8 46DD9BF8 5EDD9BDE 76DC9B24
D99B0C5E 8E0A7E03 02E7C1EE 7E03EA7E 8BF046DC 9B05D99B 0C5E8E0A 7E0302E7
D99B0A7E C5FF0AE9 EE4601EA 468BBFEB EA46FFF0 5EDD9BF0 46DC9BF8 46DD9B1D
004C866A 004C8666 0014FEC9 0014FEC8 CB5E5FC9 9B05949D D99B0A7E C5059085
FC180014 F92E0014 F9220014 F9060014 FECA0014 FECE004C 86680064 004C866E
66666666 3FE00000 00000000 406FE000 00000000 0014F928 0014FEC6 0014F925
0775013D 8091823E C52E00FD 46C600FF 46C60000 10C85756 FC1900FF 40046666
F2468B00 342D4B9A 74750001 3D058B91 863EC52E 0000F246 C705EB00 03F246C7
919436FF 2EF476FF 016A50F6 468D1600 BBE9037C 04F47E83 F446FF03 EBF44689
8A06032E 09E0C1F4 468B5052 9190168B 2E918E06 032E0082 F4466991 9236FF2E
76FF006A 006A006A 006AAF74 00F67E83 14C48300 3C99589A 5052918C 168B2E91
468D164F 7D04F47E 83F446FF 03EBF446 89F2468B 0126E90A C4830054 C0489AF6
8A06032E 09E0C1F4 468B50F0 468D1691 9236FF2E 919436FF 2EF476FF 006A50F6
76FF006A 006A006A 006ABE74 00F67E83 14C48300 3C99589A 5052918C 168B2E91
468D164F 7D04F47E 83F446FF 03EBF446 89F2468B 00C6E90A C4830054 C0489AF6
FD468AF4 76FF5052 918C168B 2E918A06 032E09E0 C1F4468B F876FFFA 76FF50F6
FF006A00 6A006A00 6ABD7400 F67E8312 C4830054 C78E9A50 E42AFF46 8A50E42A
468D1627 74C00B04 C4830054 58A29A50 F8468D16 66EB0AC4 830054C0 489AF676
3C7D919A 919636FF 2E919836 FF2E919A 36FF2E91 9C36FF2E 006A006A 006A50F6
9A077401 3D809182 3EC52E00 3405019A 1D750001 3D058B91 863EC52E 12C48300
00FF46C6 000014C8 5756CB5E 5FC90044 D4319A05 EB004478 AE9A0CEB 004477A2
2E0000EE 46C705EB 0003EE46 C7077501 3D809182 3EC52E00 44CC729A 00FD46C6
7C04F07E 83F046FF 03EBF046 89EE468B 00342D4B 9A747500 013D058B 91863EC5
06032E00 82F04669 919236FF 2E919436 FF2EF076 FF016A50 F2468D16 00BBE903
003C9958 9A505291 8C168B2E 918A0603 2E09E0C1 F0468B50 52919016 8B2E918E
8B019FE9 0AC48300 54C0489A F276FF00 6A006A00 6A006AAF 7400F27E 8314C483
2E919436 FF2EF076 FF006A50 F2468D16 4F7D04F0 7E83F046 FF03EBF0 4689EE46
003C9958 9A505291 8C168B2E 918A0603 2E09E0C1 F0468B50 EC468D16 919236FF
8B013FE9 0AC48300 54C0489A F276FF00 6A006A00 6A006ABE 7400F27E 8314C483
E0C1F046 8BF876FF FA76FF50 F2468D16 507D04F0 7E83F046 FF03EBF0 4689EE46
54C78E9A 50E42AFF 468A50E4 2AFD468A F076FF50 52918C16 8B2E918A 06032E09
00DEE90A C4830054 C0489AF2 76FF006A 006A006A 006ABD74 00F27E83 12C48300
00F27E83 0EC48300 54DABA9A 6E6A056A 016A50F4 468D1650 F2468D16 13F446C6
F2468D16 13F746C6 00A6E90A C4830054 C0489AF2 76FF006A 006A006A 006A1674
6A006A00 6A006A15 7400F27E 830AC483 0054DABA 9A6F6A03 6A50E42A F7468A50
FF2E919C 36FF2E00 6A006A00 6A50F246 8D1670EB 0AC48300 54C0489A F276FF00
6A006A00 6A157400 F27E8312 C483003C 7D919A91 9636FF2E 919836FF 2E919A36
3405019A 1D750001 3D058B91 863EC52E 2EEB0AC4 830054C0 489AF276 FF006A00
5FC90044 D4319A05 EB004478 AE9A0CEB 004477A2 9A077401 3D809182 3EC52E00
57560014 7CC60014 7B9E0014 7E8E0024 DD3E0024 D53E0024 E1D00014 7BA3CB5E
3EC52E1F 74003D80 95763EC5 2E1DD99B 956E3EC5 2E05D99B 95723EC5 2EEC8B55
8036FF2E 0CC48300 544A8A9A 957A36FF 2E957C36 FF2E0054 968F9A05 D99B956E
006A006A 0E7E003D 8395823E C52E04C4 8300549B D59A5000 1205957E 068B2E95
FF1076FF 04C48300 5494889A 50000605 0E468B10 76FF06C4 83002CFC 9C9A246A
8B0C76FF 04C48300 5494889A 50002405 0A468B0C 76FF04C4 83005494 889A0E76
04C48300 5494889A 50001805 0A468B0C 76FF04C4 83005494 889A5000 2A050A46
5494889A 50003005 0A468B0C 76FF04C4 83005494 889A5000 1E050A46 8B0C76FF
50000C05 0A468B0C 76FF04C4 83005494 889A5000 36050A46 8B0C76FF 04C48300
0A76FF0C 76FF04C4 83005494 889A5000 12050A46 8B0C76FF 04C48300 5494889A
56CB5E5F C99B04C4 83005494 889A5000 06050A46 8B0C76FF 04C48300 5494889A
2E1F7400 3D809576 3EC52E1D D99B956E 3EC52E05 D99B9572 3EC52E00 0008C857
FF2E0CC4 8300544A 8A9A9586 36FF2E95 8836FF2E 0054968F 9A05D99B 956E3EC5
956E3EC5 2EF85EDD 9BEED99B 04C48300 549BD59A 50001205 957E068B 2E958036
763EC52E 1DD99B95 6E3EC52E 958A06DD 2E9B4D75 0054968A 9AF85EDC 9B05D99B
4A8A9A95 9236FF2E 959436FF 2E005496 8F9A05D9 9B956E3E C52E1F74 003D8095
95823EC5 2E04C483 00549BD5 9A500012 05957E06 8B2E9580 36FF2E0C C4830054
94F89A50 0006050E 468B1076 FF06C483 002CFC9C 9A256A00 6A006A0E 7E003D83

94F89A50 0024050A 468B0C76 FF04C483 005494F8 9A0E76FF 1076FF04 C4830054
0018050A 468B0C76 FF04C483 005494F8 9A50002A 050A468B 0C76FF04 C4830054
468B0C76 FF04C483 005494F8 9A50001E 050A468B 0C76FF04 C4830054 94F89A50
FF04C483 005494F8 9A500036 050A468B 0C76FF04 C4830054 94F89A50 0030050A
005494F8 9A500012 050A468B 0C76FF04 C4830054 94F89A50 000C050A 468B0C76
005494F8 9A500006 050A468B 0C76FF04 C4830054 94F89A0A 76FF0C76 FF04C483
C42E557D 03FE7E83 FE46FF03 EB0000FE 46C70000 02C85756 CB5E5FC9 9B04C483
83005496 EF9A0054 968F9A0C D8269B05 DF9B0C5E 8E0A7E03 E7D1FE7E 8B956E36
5496EF9A 0054968F 9A05D99B 95963EC5 2E05890C 5E8E0A7E 03E7D1FE 7E8B08C4
46C70000 02C85756 CB5E5FC9 9BA2EB05 010C5E8E 0A7E03E7 D1FE7E8B 08C48300
005496EF 9A005496 8F9A05D9 9B95963E C52E5B7D 03FE7E83 FE46FF03 EB0000FE
0C5E8E0A 7E03E7D1 FE7E8B95 6E36C42E 05290C5E 8E0A7E03 E7D1FE7E 8B08C483
03E7D1FE 7E8B08C4 83005496 EF9A0054 968F9A95 9A06DC2E 9B34D826 9B05DF9B
7C64004C 87AA0014 951F0014 7C3E004C 880ACB5E 5FC99B9C EB05890C 5E8E0A7E
00000000 00000014 93AE004C 87E23FF0 00000000 0000004C 87C60014 7B86004C
7A9A7AEA 681E7B66 36FF1E57 777C117B 663E815F 731D7AEC 3E83FFFE E4813FE0
01758D0D 8A7AF09F 8C7AEEBF 897B663E 8BDB03DB 037AEC1E 8B7C6206 86005438
663E89AA C02AF2E2 AA200402 775A3C06 72413CAC 0EE3ED2A AA017420 3CFC071E
00007AF0 87C70000 7AEE87C7 DB03DB03 7AEC1E8B 9A750D7C 623E807A EC06FF7B
006A1F08 C4830054 C4709A7A EC681E7A EE681E1E D88E004C B80054E3 DC9AED2B
385A9A01 6A02C483 0054EC2C 9A500AC4 83004417 F69A7AEC 36FF7AEE 681E006A
5E5FC90C 568B0A46 8BA4F3FC 0A7EC40E 76C509E3 124E8BEC 8B555756 00F40054
EC8B55CB 9B50521F DD36DC8B 08EC835A 58CB9EE0 DF9BE4D9 000207FF 0FBF00CB
5D0646DB EC8B55CB C9FC46DB 0000FE46 C7FC4689 06468B00 0004C8CB 5D0646DF
CBC9F86E DF0000FE 46C70000 FC46C7FA 46890846 8BF84689 06468B00 0008C8CB
DF0646DD 96822ED9 2EFE7ED9 9B000004 C8CBC9FC 46D9FC5E D90646DD 000004C8
FE6ED9FA 5EDB0646 DD96822E D92EFE7E D99B0000 06C8CBC9 FC468BFE 6ED9FC5E
568BFA46 8BFE6ED9 FA5EDB06 46DD9682 2ED92EFE 7ED99B00 0006C8CB C9FA468B
C9F8568B F6468BFE 6ED9F67E DF0646DD 96822ED9 2EFE7ED9 9B00000A C8CBC9FC
55CB5DD9 DDFDD906 46DD0E46 DFEC8B55 CBC9FC46 D9FC5ED9 0646DD00 0004C8CB
DF260E5E C4C9D9C2 DEE8D9F9 DE968606 DF2E0B74 00549688 9AF4D906 46DDEC8B
1FDD260E 5EC4E9DC FCD9C0D9 0646DD96 842ED92E FE7ED99B 000002C8 CB5D9B1F
C38B0130 E997E8B8 012DE997 E8B8013C E99872B8 0139E998 72B800CB C9FE6ED9
8B27F726 0A468B50 EC8B5557 56085F8D DC8BC38B C08ED08C 0BEB085F C436DC8B
8B5500CB 5E5FC95B C78BD68B F00327F7 260C468B F0030267 F7260A46 8BF88BF2
4CB8EC8B 551ECB5D 000F2508 0C027440 A84724C4 8AD8DDE0 DF9BE5D9 0646DDEC
74C00BD8 DDFCE2C9 DC8DF006 DF40D9F7 0379C90B C02B1BE3 084E8BE8 D9D88E00
55575608 5F8DDC8B C38BC08E D08C0BEB 085FC436 DC8BC38B CB1F5D8D EE3EDE04
05770F72 02773B26 D6D1D7D1 D2D1E0D1 0020B9FF 2BF62B0A 468B0C56 8B50EC8B
D08C0BEB 085FC436 DC8BC38B CB5E5FC9 5BE1E240 02771B26 3F2B2608 723F3B26
D6D1E7D1 0020B9C0 2BD22B0A 7E8B0C76 8B50EC8B 55575608 5F8DDC8B C38BC08E
00CB5E5F C95BE2E2 02571B26 072B2607 72073B26 05770E72 02573B26 D2D1D0D1
0BF62B53 0EFA8BD8 8B53EC8B 55575680 00BA03EB 8001BA08 EBD22B0C EB0001BA
00DA83D8 F7DAF70C 79D20B0E 468B1056 8B06EB07 8B260257 8B260E5E C40C79FF
C483FA5E FF505246 00DA83D8 F7DAF708 79D20B0A 468B0C56 8B505246 0172EFD1
168B2E9C F2068B2E 000004C8 575600CB 5E5FC95B 00DA83D8 F7DAF707 73EED10C
003D83FC 7EC50E76 FC463B01 68059CF4 168B2E9C F2068B2E FE5689FC 46899CF4
2B0675FC 463B0B75 FE563B01 68059CF4 168B2E9C F2068B2E E0EB12FC 46830674
C90CC483 005499E3 9A0A76FF 0C76FF0E 76FF1076 FFFC76FF FE76FF1A EBD08BC0
74C00B04 C4830054 9C3C9A53 1476FF13 74003F83 125EC500 0108C857 56CB5E5F
7572FA7E 832F74C0 0BFA4689 98078A0E 46FF0E5E C50000FE 46C7F62B 01C9E903
83CCEB00 04CE8106 7561FA7E 83D8EB00 02CE8106 7577FA7E 83E4EB00 01CE8106
E5E69A50 FEFA868D 160A76FF 0C76FF01 7CE90375 F60BC1EB FE46FFC6 7562FA7E
247402FE 832975C0 0B08C483 00549CA6 9A0A76FF 0C76FF9C F6680E08 C4830054
831D7521 FEF8BE83 FC46895E 5F005438 DA9A50FE F8868D16 50FEFA86 8D165756
FEF8BE83 FC46895E 5F005439 9A9A50FE F8868D16 50FEFA86 8D165756 187504FE
9A50FEF8 868D1600 6A006A04 6AFC76FF 57561875 04FE8301 04E900BF E9037500
C70C5789 0A478908 47890647 89D08BC0 2B0E4789 125EC5FC 468B5E5F 005439BA
FE830004 0F81125E C5077503 FE830574 01FE8300 0007C7FF FF0447C7 00000247
080F8112 5EC50774 00FE7E83 00030F81 125EC507 7504FE83 057403FE 830A7402
1DEB0200 0F81125E C50974C0 0B08C483 00549CA6 9A0A76FF 0C76FF9C FD680E00
12468B04 000F8112 5EC50774 C00B08C4 8300549C A69A0A76 FF0C76FF 9D02680E
76FF5756 0002BF03 EB0003BF 057503FE 830DEB00 01BF0575 01FE834C EB14568B
FC76FF57 56FF0EE9 037500FE F8BE835E 5F005438 BA9A50FE F8868D16 006A57FC

05F70A7E C5000002 C85756CB 5E5FC9D0 8BC02B5E 5F005439 1A9A50FE F8868D16
0C75FF0E 75FF5756 3E74C00B F08B0245 2B0080B8 4A740A45 0B0C458B 52740001
FFFFB800 200D810A 7EC50C74 00FE7E83 5E5F0054 389A9A50 FE468D16 560A75FF
02C85756 CB5E5FC9 C02B0080 0245C708 55890645 890C558B 0A458B0A 7EC516EB
9A50FE46 8D160E75 FF0A7EC5 5756F08B 04C48300 549BD59A 0A76FF0C 76FF0000
0C458B0A 7EC55E5F 0054391A 9A50FE46 8D160E75 FF0A7EC5 57565E5F 005438FA
000005C7 0A7EC504 C4830054 DC759A0A 75FF0C75 FF0E7500 1005F714 740A450B
037F7AFE 83087C00 613DF08B 98078A0A 46FF0A5E C5EC8B55 5756CB5E 5FC9C68B
0B0475FE 3B20EF83 037F7AFF 83087C00 613DF88B 98078A0E 46FF0E5E C520EE83
69633A00 3A6B726F 773A004C 7C64CB5E 5FC9C02B 02EB0001 B80575FE 3BC875F6
FF03EB00 00FE46C7 4275003D 83A0603E C52E0000 02C85756 00003A6F 633A003A
D1FE7E8B 000005C7 A0661E8E 2EA0643E 032EE7D1 FE7E8B28 7D0100FE 7E81FE46
5756CB5E 5FC90001 05C7A060 3EC52ECE EB00FF05 C7A06A1E 8E2EA068 3E032EE7
46C70AC4 830054DA BA9A0148 68036AFA 76FF50FC 468D1600 00FA46C7 000006C8
06032E09 E0C1FE46 8B006A00 6A50FC46 8D16487D 04FE7E83 FE46FF03 EB0000FE
FC7E8316 C4830054 DABA9A01 4568096A 006A006A FE76FF50 52A06E16 8B2EA06C
000004C8 5756CB5E 5FC90AC4 830054C0 489AFC76 FF006A00 6A006A00 6AC27400
5756CB5E 5FC90AC4 830054DA BA9A0148 68036AFC 76FF50FE 468D1600 01FC46C7
02C48300 549E4A9A 016AEC8B 555756CB 5E5FC902 C4830054 9E4A9A00 6AEC8B55
4A9A036A EC8B5557 56CB5E5F C902C483 00549E4A 9A026AEC 8B555756 CB5E5FC9
03EB0000 FE46C700 9AE9037C 030A7E83 000004C8 5756CB5E 5FC902C4 8300549E
09E0C1FE 468B006A 006A50FC 468D1631 750A463B FE468B62 7D03FE7E 83FE46FF
16C48300 54DABA9A 01456809 6A006A00 6AFE76FF 5052A06E 168B2EA0 6C06032E
4568096A 006A006A FE76FFA0 6436FF2E A06636FF 2E006A00 6A50FC46 8D16BEEB
036AA068 36FF2EA0 6A36FF2E 006A006A 50FC468D 1695EB16 C4830054 DABA9A01
FE7E83FE 46FF03EB 0000FE46 C767EB16 C4830054 DABA9A01 4568096A 006A006A
68096A00 6A006AFE 76FFA068 36FF2EA0 6A36FF2E 006A006A 50FC468D 16297D03
A06C0603 2E09E0C1 FE468B00 6A006A50 FC468D16 CEEB16C4 830054DA BA9A0145
5756CB5E 5FC916C4 830054DA BA9A0145 68096A00 6A006A03 6A5052A0 6E168B2E
02C48300 549FF69A 016AEC8B 555756CB 5E5FC902 C4830054 9FF69A00 6AEC8B55
F69A036A EC8B5557 56CB5E5F C902C483 00549FF6 9A026AEC 8B555756 CB5E5FC9
555756CB 5E5FC902 C4830054 A02F9A00 6AEC8B55 5756CB5E 5FC902C4 8300549F
C902C483 0054A02F 9A026AEC 8B555756 CB5E5FC9 02C48300 54A02F9A 016AEC8B
FE468D16 000002C8 5756CB5E 5FC902C4 830054A0 2F9A036A EC8B5557 56CB5E5F
096A006A 006A0A76 FF5052A0 6E168B2E A06C0603 2E09E0C1 0A468B00 6A006A50
FF2E006A 006A50FE 468D1600 0002C857 56CB5E5F C916C483 0054DABA 9A014568
CB5E5FC9 16C48300 54DABA9A 01456809 6A006A00 6A0A76FF A06836FF 2EA06A36
0E7EC54B 74003D80 0A7EC5EC 8B555756 0024D53E 004C5E10 004C5C10 004C5C0E
8B98058A 0E7EC508 EB20EE83 F08B9805 8A0A7F7A 3D800F7C 613D8043 74003D80
0875C63B 98058A0A 7EC506EB 00202D98 058A087F 7A3D800D 7C613D80 0A7EC5F0
06C85756 CB5E5FC9 C62B9805 8A0A7EC5 F08B9805 8A0E7EC5 ADEB0E46 FF0A46FF
890589A3 9E3EC52E 02C48300 54DBE89A 5002E0C1 04000505 8BA3A23E C52E0000
E7C1FE7E 8BA39E36 C42E287E FE463B04 0005058B A3A23EC5 2E0000FE 46C70255
46C7C9EB FE46FF05 893C0326 02E7C1FE 7E8B0245 89FFFFB8 025C8E26 3C032602
FE46FFFF FF05C7A3 A81E8E2E A3A63E03 2EE7D1FE 7E8B187D 0400FE7E 810000FE
E7D1FC7E 89FA8BA3 AA3EF72E 990054EB E89A377D 0400FE7E 810000FE 46C7E1EB
0589FE46 8BA3A63E 032EE7D1 FC7E8BDD 75FFFF3D 058BA3A8 1E8E2EA3 A63E032E
2E03E7C1 FE7E8B00 B3E9037C 053BFE46 8BA3A23E C52E0000 FE46C7C2 EBFE46FF
7E8BA39E 36C42EFA 468904C4 830054A2 709A35FF 0275FFA3 AE1E8E2E A3AC3E03
0589FE46 8B3C0326 02E7C1FA 7E8B1075 FFFF3D05 8B025C8E 263C0326 02E7C1FA
C1FA7E8B 1174FFFF 3D02458B 025C8E26 3C032602 E7C1FA7E 8BA39E36 C42E64EB
2602E7C1 FA7E8BA3 9E36C42E 058BA3B0 3EC52ED5 EBFA4689 02458B3C 032602E7
2E0589FE 468B025C 8E263C03 2602E7C1 3D8BA3B0 3EC52E02 4589025C 8E263C03
76FF0C76 FF0000FE 46C70000 08C85756 CB5E5FC9 FF3EE9FE 46FF05FF A3B03EC5
8E0A7E03 FC7E8B55 7DFA463B FC468B00 00FC46C7 FA468904 C4830054 EEEA9A0A
0CEB0020 2D98058A 0A7E03FC 7E8B0E7F 7A3D800A 7E03FC7E 8B197C61 3D800C5E
2EA3A63E 032EE7D1 FE7E33F8 8B98F946 8AF94688 98058A0C 5E8E0A7E 03FC7E8B
76FF0000 04C85756 CB5E5FC9 03FF25FE 468BA3EB FC46FFFE 4689058B A3A81E8E
5C8E263C 032602E7 C1FE7E8B A39E36C4 2EFE4689 04C48300 54A2709A 0A76FF0C
83FC4689 058B025C 8E263C03 2602E7C1 FE7E8BA3 9E36C42E 6DEBFFFF 3D058B02
83005496 649A5000 0805C48B 165052A3 AE168B2E A3AC0603 2E03E0C1 086A08EC
7E8BA39E 36C42E21 EBFC468B 0575C00B 0CC48300 54A0709A 0A76FF0C 76FF0AC4
3B16CB5E 5FC9FFFF B89175FF FE7E83FE 46890245 8B025C8E 263C0326 02E7C1FE
C70000FC 46C70000 06C85756 004C3B1A 0014EFA4 0400004C 3B1C0014 F904004C

647D1400 FE7E81FE 46FF03EB 0000FE46 C77D7D04 FA7E83FA 46FF03EB 0000FA46
0C5E8E0A 7E03E7D1 FC7E03FE 7E8B03FF 25810C5E 8E0A7E03 E7D1FC7E 03FE7E8B
03FE7E8B 147E01FF 3D058B0C 5E8E0A7E 03E7D1FC 7E03FE7E 8BCF7E01 7F3D058B
05C70C5E 8E0A7E03 E7D1FC7E 03FE7E8B A6EBFE00 0D810C5E 8E0A7E03 E7D1FC7E
003C7D13 9A0A76FF 0C76FFEC 8B555756 CB5E5FC9 FF7AE920 00FC4681 92EB017F
0A76FF0C 76FFEC8B 555756CB 5E5FC904 C4830054 A3B49A0A 76FF0C76 FF04C483
54A51D9A 0A76FF0C 76FF04C4 830054A3 B49A0A76 FF0C76FF 04C48300 3C7D139A
76FF0C76 FF04C483 003C7D13 9A0A76FF 0C76FFEC 8B555756 CB5E5FC9 04C48300
EC8B5557 56CB5E5F C904C483 0054A4DB 9A0A76FF 0C76FF04 C4830054 A3B49A0A
8B555756 CB5E5FC9 08C48300 54A5A19A A6BE36FF 2EA6C036 FF2E0A76 FF0C76FF
555756CB 5E5FC908 C4830054 A5A19AA6 C236FF2E A6C436FF 2E0A76FF 0C76FFEC
5756CB5E 5FC908C4 830054A5 A19AA6C6 36FF2EA6 C836FF2E 0A76FF0C 76FFEC8B
56CB5E5F C908C483 0054A62F 9AA6CA36 FF2EA6CC 36FF2E0A 76FF0C76 FFEC8B55
CB5E5FC9 08C48300 54A62F9A A6CE36FF 2EA6D036 FF2E0A76 FF0C76FF EC8B5557
5E5FC908 C4830054 A62F9AA6 D236FF2E A6D436FF 2E0A76FF 0C76FFEC 8B555756
8908C483 00549972 9A0A76FF 0C76FFA6 D636FF2E A6D836FF 2E000006 C85756CB
0AC48300 54C0489A 103C6803 6A006A00 6A006A18 75FC460B FE468BFE 5689FC46
46890CC4 830054CF 019A0E76 FF1076FF 3A6A0400 68FC76FF FE76FF00 442B8C9A
FE76FF00 442B8C9A 0AC48300 54C0489A FA76FF03 6A006A00 6A006A18 74C00BFA
FFA6DA36 FF2EA6DC 36FF2E00 0006C857 56CB5E5F C904C483 00549C3C 9AFC76FF
6A006A00 6A1875FC 460BFE46 8BFE5689 FC468908 C4830054 99729A0A 76FF0C76
76FF3A6A 040068FC 76FFFE76 FF00442B 8C9A0AC4 830054C0 489A103C 68036A00
489AFA76 FF036A00 6A006A00 6A1874C0 0BFA4689 0CC48300 54CE7E9A 0E76FF10
8BC000CB 5E5FC904 C4830054 9C3C9AFC 76FFFE76 FF00442B 8C9A0AC4 830054C0
5756004C 8BFE004C 8BFC004C 8BEF004C 8BE7004C 8BDE004C 8BD1004C 8BC9004C
FF2EA9C4 36FF2E50 57563075 003D83A9 BE3EC52E FE468900 5467429A 000002C8
74003D83 0C7EC505 89A9BE3E C52E5E5F 00543C34 9A0C76FF 0E76FF00 6AA9C236
6AA9CA36 FF2EA9CC 36FF2EFE 76FF5756 4675003D 83A9C63E C52E00B9 E9C02B05
3EC52EC4 75003D83 0C7EC505 89A9C63E C52E5E5F 00543C34 9A0C76FF 0E76FF00
3075003D 83A9D23E C52E0255 890589A9 CE3EC52E 02C48300 54EF9C9A 35FFA9C6
C52E5E5F 00543C34 9A0C76FF 0E76FF00 6AA9D636 FF2EA9D8 36FF2EFE 76FF5756
76FF0A76 FF016A35 FFA9BE3E C52E5756 FF71E903 74003D83 0C7EC505 89A9D23E
C9058B3D C5A9CE3E C52EFF4B E9037400 3D830C7E C55E5F00 543CB49A 0C76FF0E
02C85756 CB5E5FC9 06C48300 54A6DE9A FF6A50FE 468D1600 0002C857 56CB5E5F
C90001B8 03EBC02B 047400FE 7E8306C4 830054A6 DE9A0A76 FF50FE46 8D160000
16016A35 FFA9BE3E C52E5756 000005C7 3DC5A9CE 3EC52E00 0002C857 56CB5E5F
74003D83 3DC5A9CE 3EC52E00 0006C857 56CB5E5F C95E5F00 543C749A 50FE468D
8BFA4689 00FF2505 8B3DC5A9 CE3EC52E FC468908 F8C1058B 3DC5A9CE 3EC52E34
C10A468B 3DC5A9CE 3EC52E0C 4689037E 0C463BFA 468B0A46 89037D0A 463BFC46
5FC95E5F 00543C74 9A50FE46 8D16016A 35FFA9BE 3EC52E57 5605890C 460308E0
7400FE7E 83F84689 5E5F0054 3A809A50 FE468D16 046A5756 00000CC8 5756CB5E
50FE468D 16006A57 56F65689 F4468902 C4830054 EF9C9AF8 76FF00B7 E9C02B05
FE468D16 006A5756 0589F47E C50A468B D17500FE 7E83FA46 895E5F00 543AC09A
468D16FA 76FFF876 FF35FFA9 D23EC52E 57560245 89F47EC5 5E5F0054 3BD49A50
50FE468D 1650FC46 8D16FF6A FA76FF57 56927500 FE7E835E 5F00543C 149A50FE
468D16F8 76FF5756 FC468905 8BF47EC5 FF71E903 7400FE7E 835E5F00 543BF49A
5E5FC9FC 468B5E5F 00543AA0 9A50FE46 8D16FA76 FF57565E 5F00543A 609A50FE
8CBA00CB 5E5FC9F4 468B06C4 830054BE 1C9A096A 50F4468D 1600000C C85756CB
0007BAC8 5756004C 8CB0004C 8CBE004C 8CC0004C 8CA6004C 8CBC004C 8C9C004C
03741012 7E830974 11127E83 5E5F0074 00029A07 BA68006A 50F84686 8D165756
FF2E0AC4 83005496 649A50F8 46868D16 ACAA36FF 2EACAC36 FF2E07BA 680099E9
0054EE30 9A505207 B52DD28C C50303DC F8468669 50000305 ACAE068B 2EACB036
2DC7035A 16C58BF8 8B03DCF8 46866950 000305AC AE068B2E ACB036FF 2E08C483
FD8BF28B 03DCF846 9669E42A 01458AAC AE3EC52E 08C48300 54EE309A 50520761
B436FF2E 6CEBF849 85881F16 FD03FA8B 03DCF846 9669E42A F89D8588 FE031F16
36FF2E08 C4830054 EE309A50 5207B52D D28CC503 03DCF846 8669ACB2 36FF2EAC
830054EE 309A5052 07612DC7 035A16C5 8BF88B03 DCF84686 69ACB636 FF2EACB8
FA8B03DC F8469669 E42AF89D 8588C02B FE031F16 FD8BF08B 03DCF846 866908C4
9C85881F 16FD03FA 8B03DCF8 469669E4 2A058AAC AE3EC52E F8498588 1F16FD03
7410127E 836E7411 127E83F8 488588FE 031F16FD 8BF28B03 DCF84696 69E42AF8
8669ACBA 36FF2EAC BC36FF2E 06F8F085 C6FE031F 16FD8BF0 8B03DCF8 46866968
16FD8BF0 8B03DCF8 46866908 C4830054 EE309A50 52070F2D D28CC503 03DCF846
5206BD2D D28CC503 03DCF846 8669ACBE 36FF2EAC C036FF2E 05F94285 C6FE031F
F8468669 00FA8F85 C6FE031F 16FD8BF0 8B03DCF8 46866908 C4830054 EE309A50

866901FC 0A85C61F 16FD03F8 8B03DCF8 46866901 FC0985C6 1F16FD03 F88B03DC
85891246 8B1F16FD 03F88B03 DCF84686 6901FC0B 85C61F16 FD03F88B 03DCF846
005453D1 9AACC236 FF2EACC4 36FF2E05 6A0A6A04 6A50F846 868D1607 BA68FC22
C00B04C4 830054EE EA9A5052 05C52DC7 035A16C5 8BF88B03 DCF84686 6910C483
EBC02B04 75C00B04 C4830054 EEEA9A50 5205712D D28CC503 03DCF846 86691B74
5496649A 0E76FF10 76FF5052 05742DC7 035A16C5 8BF88B03 DCF84686 69126A45
00549664 9A0A76FF 0C76FF50 5205C82D D28CC503 03DCF846 8669546A 0AC48300
8C8D004C 8C86004C 8C79004C 8C6C0014 95200014 958ECB5E 5FC90001 B80AC483
76FF0E76 FF0E7400 3D80AF68 3EC52E2E 74000A7E 83EC8B55 5756004C 8C93004C
C900442B 8C9A08C4 830054C0 489A0A76 FF006A00 6A006A04 C4830054 4A8A9A0C
7236FF2E 0E76FF10 76FF0096 E9037500 3D83AF6C 3EC52E00 0050C857 56CB5E5F
468D16AF 7436FF2E AF7636FF 2E0CC483 00544ACA 9A50B046 8D16AF70 36FF2EAF
743EC52E AF7836FF 2EAF7A36 FF2E0EC4 83005401 359A006A 0A76FF0C 76FF50B0
76FF1476 FF1676FF 1876FFAF 7436FF2E AF7636FF 2E06C483 0054ACC6 9A35FFAF
54ACC69A 35FFAF74 3EC52EAF 7C36FF2E AF7E36FF 2E0EC483 005402BA 9A006A12
2E0E76FF 1076FF00 96E90375 003D83AF 803EC52E 014AE900 44160D9A 06C48300
AF7436FF 2EAF7636 FF2E0CC4 8300544A CA9A50B0 468D16AF 8436FF2E AF8636FF
2EAF8836 FF2EAF8A 36FF2E0E C4830054 01359A01 6A0A76FF 0C76FF50 B0468D16
76FF1676 FF1876FF AF7436FF 2EAF7636 FF2E06C4 830054AC C69A35FF AF743EC5
9A35FFAF 743EC52E AF8C36FF 2EAF8E36 FF2E0EC4 83005402 BA9A016A 1276FF14
2E500040 05980054 81479A0E 76FF1076 FF00A7E9 0044160D 9A06C483 0054ACC6
AF7436FF 2EAF7636 FF2E0EC4 8300544A CA9A50B0 468D16AF 9036FF2E AF9236FF
2EAF9636 FF2E0EC4 83005401 359A5048 00548147 9A0A76FF 0C76FF50 B0468D16
1876FFAF 7436FF2E AF7636FF 2E06C483 0054ACC6 9A35FFAF 743EC52E AF9436FF
36FF2EAF 9A36FF2E 0EC48300 5402BA9A 50480054 81479A12 76FF1476 FF1676FF
2EEC8B55 5756CB5E 5FC90044 160D9A06 C4830054 ACC69A35 FFAF743E C52EAF98
9C36FF2E AF9E36FF 2E08C483 005405F4 9A0A76FF 0C76FFAF 7436FF2E AF7636FF
FF2EAF76 36FF2EEC 8B555756 CB5E5FC9 06C48300 54ACC69A 35FFAF74 3EC52EAF
54ACC69A 35FFAF74 3EC52EAF A036FF2E AFA236FF 2E04C483 005407D4 9AAF7436
004C7970 004C7936 004C7AE8 004C792E 00147B7C 0014951F CB5E5FC9 06C48300
004C7AA3 004C7A69 004C7A2F 004C7A26 004C79EC 004C79B2 004C79AA 00147B7A
423EC52E EC8B5557 56CB5E5F C90588B2 3E3EC52E 0A468BEC 8B555756 004C7AC6
05FFB246 3EC52E00 07EC46C7 0006EA46 C700001E C85756CB 5E5FC900 0005C7B2
2A058AB2 4E1E8E2E B24C3E03 2EF88B03 E8466BE8 56891589 B24A3EF7 2E99058B
3E032EF8 8B03E846 6BE44688 E42A0145 8AB24C3E 032EF88B 03E8466B E54688E4
8005744E 3D80B23E 3EC52EF4 5689F246 895A16F6 468DE346 88E42A02 458AB24C
483D8005 74463D80 0A744E3D 80B23E3E C52EE746 88C02B02 EB0001B8 0575463D
1F16FD03 E7D1EE7E 8B487D02 EE7E8300 00EE46C7 E64688C0 2B02EB00 01B80575
034588E4 2AE3468A 024588E4 2AE4468A 014588E4 2AE5468A 0588F27E C5EA458B
16B2EB05 F24683EE 46FF0445 88F27EC5 E42AE646 8A03EBE7 468A0574 00EE7E83
5756CB5E 5FC9C02B 0EC48300 54DABA9A 01416805 6A026A50 F6468D16 50F0468D
3EF72E99 058B05FF B2423EC5 2E000FE4 46C7000E E246C700 08E046C7 000024C8
466BDF46 88E42A05 8AB2521E 8E2EB250 3E032EF8 8B03E646 6BE65689 1589B24A
2A02458A B2503E03 2EF88B03 E6466BDE 4688E42A 01458AB2 503E032E F88B03E6
03E7D1E8 7E8B367D 03E87E83 0000E846 C7EE5689 EC46895A 16F0468D DD4688E4
E42ADD46 8A024588 E42ADE46 8A014588 E42ADF46 8A0588EC 7EC5E045 8B1F16FD
4168056A 036A50F0 468D1650 EA468D16 C4EB05EC 4683E846 FF010445 C6034588
2EFB4688 E42AFA46 88C02B00 000AC857 56CB5E5F C9C02B0E C4830054 DABA9A01
3E032EF8 8B03FC46 6B07F646 C6FC5689 1589B24A 3EF72E99 058B05FF B2543EC5
4688E42A 01458AB2 583E032E F88B03FC 466BF746 88E42A05 8AB25A1E 8E2EB258
468A50F6 468D1650 FE468D16 F94688E4 2A02458A B2583E03 2EF88B03 FC466BF8
8B2C00CB 5E5FC9C0 2B10C483 0054DABA 9A013268 066A50E4 2AFB468A 50E42AFA
06C85756 004C8B0E 004C8B2A 004C8AF6 004C8ADE 0008004C 8B26004C 8B28004C
046AFE76 FF016A0D 6A006A50 FC468D16 34FB46C6 FE468905 8BB4D63E C52E0000
9A012F68 046AFE76 FF0D6A50 FB468D16 50FC468D 1610C483 0054D8DC 9A012E68
830054D8 DC9A012E 68046AFE 76FF036A 0B6A006A 50FC468D 1610C483 0054D8DC
5FC910C4 830054D8 DC9A012F 68046AFE 76FF0B6A 50FB468D 1650FC46 8D1610C4
68026AFE 76FF016A 0A76FF0C 76FFFE46 89058BB4 D63EC52E 000002C8 5756CB5E
830054D8 DC9A012C 68026AFE 76FF036A 0A76FF0C 76FF0CC4 830054D8 DC9A012C
76FF016A 0A76FF0C 76FFFE46 89058BB4 D63EC52E 000002C8 5756CB5E 5FC90CC4
DC9A012D 68026AFE 76FF036A 0A76FF0C 76FF0CC4 830054D8 DC9A012D 68026AFE
B8B4DE3E C52E4C75 003D83B4 DA3EC52E 000004C8 5756CB5E 5FC90CC4 830054D8
68056A04 6A50FC46 8D161876 FF1A76FF 0000FE46 C7FC4689 166EF73D F7990400
54DABA9A 01516805 6A056A50 FC468D16 1876FF1A 76FF0EC4 830054DA BA9A0151

919A0A76 FF0C76FF 0E76FF10 76FF006A 006A006A 1876FF1A 76FF20EB 0EC48300
830054E8 449AB4E2 36FF2EB4 E436FF2E 000036C8 5756CB5E 5FC912C4 83003C7D
6A006A00 6A137400 FE7E830A C4830054 DABA9A6F 6A036A13 6A50FE46 8D1604C4
B4E63EC5 2E0096E9 0374003D 83B4DA3E C52E0AC4 830054C0 489AFE76 FF006A00
C52E0000 F246C700 0205C7B4 DE3EC52E 09EB0001 05C7B4DE 3EC52E0B 74003D83
893DF799 0800B8B4 DE3EC52E 017CF646 C7F066D1 F046893D F7990400 B8B4DE3E
B8B4DE3E C52E0190 D046C7CA 66D10000 CA46C700 00CE46C7 F446FFF4 66D1F446
CA468D16 006A006A 50FE468D 160013EE 46C7CC46 FFCC66D1 CC46893D F7990400
8BBE004C 8B860014 E22000CB 5E5FC914 C4830044 B06A9A01 6A136A00 6A006A50
8BFC468B FC46890C 468BFE46 890A468B 000004C8 5756004C 8B82004C 8B7A004C
468BFE46 89FC468B FC5689FA 46890C56 8B0A468B 000006C8 5756CB5E 5FC9FE56
00543BB4 9A50FE46 8D160E76 FF0A76FF 0C76FF57 56000002 C85756CB 5E5FC9FE
FF0C76FF 0E76FF50 FE468D16 000002C8 5756CB5E 5FC9FE46 8B058910 7EC55E5F
0006C857 56CB5E5F C904C483 0054B4EA 9AFE76FF 006A0AC4 830054B5 259A0A76
468B5E5F 00543B94 9A50FA46 8D16FE76 FF5756FE 5689FC46 890C568B 0A468B00
E5E69A50 9C468D16 0A76FF0C 76FF0000 05C7187E C5000068 C85756CB 5E5FC9FA
2C740098 7E830589 147EC55E 5F00543A C09A5098 468D1600 6A575608 C4830054
00543AA0 9A509846 8D1635FF 147EC557 56000005 C7107EC5 0589187E C598468B
549A5098 468D1650 9C468D16 57561A74 020E7E83 0114E900 0005C714 7EC55E5F
C55E5F00 543E349A 5098468D 16509C46 8D165756 18EB0589 107EC55E 5F00543E
35FF147E C5575600 0005C710 7EC50589 187EC598 468B2C74 00987E83 0589107E
468D1635 FF107EC5 575600AA E9000005 C7147EC5 5E5F0054 3AA09A50 98468D16
C52A7401 019A7E81 31750098 7E830D74 06987E83 9A46895E 5F00543C 549A5098
5E5F0054 3AA09A50 98468D16 35FF147E C5575600 0005C710 7EC50006 05C7187E
E42A0E46 8A35FF10 7EC55756 00030E46 C7057401 0E7E8357 EB000005 C7147EC5
C5058918 7EC59846 8B297400 987E835E 5F00543D 749A5098 468D1600 6A006A50
000005C7 147EC55E 5F00543A A09A5098 468D1635 FF147EC5 57560000 05C7107E
8B5E5F00 543D549A 50FE468D 16006A35 FF0A7EC5 57560000 02C85756 CB5E5FC9
5F00543A A09A50FE 468D1635 FF0E7EC5 57560000 05C70A7E C5058912 7EC5FE46
B9823EC5 2E2B7500 3D83B982 3EC52EEC 8B555756 CB5E5FC9 000005C7 0E7EC55E
5F007400 029A0084 68206AB9 8636FF2E B98836FF 2E575600 5431429A 000105C7
C52E04C4 83002CFB B89A50FF 50868D16 0000B0C8 5756CB5E 5FC90054 B7AA9A5E
9AB98636 FF2EB988 36FF2EB9 8A36FF2E B98C36FF 2E016EE9 0375003D 83B9823E
8636FF2E B98836FF 2EB98E36 FF2EB990 36FF2E50 FF50868D 1608C483 00544ACA
001605B9 86068B2E B98836FF 2EB99236 FF2EB994 36FF2E0C C4830054 4ACA9AB9
8B2EB988 36FF2EB9 9636FF2E B99836FF 2E50FF7F 868D1608 C4830054 4ACA9A50
8B2EB988 36FF2EB9 9A36FF2E B99C36FF 2E0CC483 00544ACA 9A500016 05B98606
2EB99E36 FF2EB9A0 36FF2E50 FF5F868D 1608C483 00544ACA 9A50002C 05B98606
2EB9A236 FF2EB9A4 36FF2E0C C4830054 4ACA9A50 002C05B9 86068B2E B98836FF
B9A836FF 2E50FF6E 868D1608 C4830054 4ACA9A50 004205B9 86068B2E B98836FF
B9AC36FF 2E0CC483 00544ACA 9A500042 05B98606 8B2EB988 36FF2EB9 A636FF2E
508E468D 1608C483 00544ACA 9A500058 05B98606 8B2EB988 36FF2EB9 AA36FF2E
0CC48300 544ACA9A 50005805 B986068B 2EB98836 FF2EB9AE 36FF2EB9 B036FF2E
555756CB 5E5FC900 5435BD9A 06C48300 5433A09A B98636FF 2EB98836 FF2E006A
5756CB5E 5FC90000 05C7B982 3EC52E00 54373C9A 0E74003D 83B9823E C52EEC8B
5E5FC900 0105C70A 7EC507EB 000205C7 0A7EC509 74003D83 B9823EC5 2EEC8B55
FF280014 FF120014 FF080014 FEF20014 FEE80014 FED20014 FF740014 FF7200CB
89BBCA3E C52E0A46 8BEC8B55 57560014 FF680014 FF520014 FF480014 FF320014
D23EC52E 34DE269B 05DF9BBB CE3EC52E BBD636C4 2E0589BB CE3EC52E 0C468B05
3EC52E00 000AC857 56CB5E5F C99B1DD9 9B0E7EC5 05D99BBB D23EC52E 1DD99BBB
24DE269B 0A46DD9B BBDE36C4 2E1DD99B BBD23EC5 2E1A46DD 9BFE4689 058BBBDA
9B24DE26 9B1246DD 9BBBE236 C42EF65E D99B05D9 9BBBD23E C52E1DD9 9B227EC5
7EC524D8 269BFE46 DF9B2676 C4117400 3D83BBE6 3EC52E1D D99B267E C5F64ED8
BBDE3EC5 2E1DD99B BBD23EC5 2E1A46DD 9B000002 C85756CB 5E5FC99B 1DD99B26
1246DD9B BBD236C4 2EFE4689 058BBBE2 3EC52E1D D99B227E C50A46DC 9B05DF9B
76DC9B0A 46DD9B00 0010C857 56CB5E5F C99B1DD9 9B267EC5 FE46DE9B 34D8269B
D89BFC46 D99BF85E D99B34DE 269B05DF 9BBBEA3E C52EBBD6 36C42EFC 5ED99B12
5ED99BF0 4ED89BFC 46D99BF0 5ED99B05 DF9BBBD6 3EC52E1A 73005496 8A9AF85E
76FF2076 FFF05ED9 9BFC76D8 9BF446D9 9BF45ED9 9B05DF9B BBEA3EC5 2E18EBF4
54968F9A 05DF9BBB DE3EC52E 0054968F 9A05DF9B BBE23EC5 2E1A76FF 1C76FF1E
3EC52E50 0004051A 468B1C76 FF500004 051E468B 2076FF18 C4830054 B9F79A00
9A005496 8F9AF446 D89B05DF 9BBBDE3E C52E0054 968F9AF0 46D89B05 DF9BBBE2
4EDC9B12 45D99B0A 7EC5BBEA 36C42EEC 8B555756 CB5E5FC9 9B18C483 0054B9F7
C534DE26 9B164EDC 9B1645D9 9B0A7EC5 BBD636C4 2E1DD99B 1E7EC534 DE269B0E

FFEA0014 7DE20024 FFF40024 FFFA0024 FFF80024 FFF6CB5E 5FC99B1D D99B227E
4AAE9A0A 76FF0C76 FFBD7468 0EEC8B55 57560024 FFF20014 7C080024 FFEC0024
BD79680E EC8B5557 56CB5E5F C904C483 00549BD5 9A0A76FF 0C76FF08 C4830054
CB5E5FC9 04C48300 549BD59A 0A76FF0C 76FF08C4 8300544A AE9A0A76 FF0C76FF
AFBCA9BC A3BC9DBC 89BC57A7 FF2ED88B E0D17977 00073D48 0E468BEC 8B555756
9A0A76FF 0C76FF08 C4830054 4AAE9A0A 76FF0C76 FFBDFE68 0EBCC1BC BBBCB5BC
8E680ECA EB08C483 00544AAE 9A0A76FF 0C76FFBD 7E680E41 EB04C483 00549BD5
EBBDDE68 0ED2EBBD CE680ED8 EBBDBE68 0EDEEBBD AE680EE4 EBBD9E68 0EEAEBBD
54BC409A 0A76FF0C 76FF0E76 FFEC8B55 5756CB5E 5FC9FFFF B8C6EBBD EE680ECC
FF5004C4 830054EE EA9A1476 FF1676FF 1076FF12 76FF1476 FF1676FF 06C48300
00544AAE 9A0A76FF 0C76FFBE 03680E0E 76FF5004 C4830054 EEEA9A10 76FF1276
00549BD5 9A0A76FF 0C76FF08 C4830054 4AAE9A0A 76FF0C76 FFBE1668 0E16C483
FF0C76FF 5098FF46 8A187F08 FF7E8001 FF46C600 0002C857 56CB5E5F C904C483
261B0040 6A261B00 426A261B 00CB5E5F C9E2EBFF 46FE06C4 830054BC 409A0A76
261B0051 4F1B204C 3364316B 32613066 261B0050 4F1B204C 3364316B 31613066
261B0053 4F1B204C 3364316B 34613066 261B0052 4F1B204C 3364316B 33613066
261B0055 4F1B204C 3364316B 36613066 261B0054 4F1B204C 3364316B 35613066
261B0057 4F1B204C 3364316B 38613066 261B0056 4F1B204C 3364316B 37613066
0AC85756 0000426A 261B0073 2573254C 64256464 256B6425 61306626 1B00426A
36FF2EC0 4636FF2E 505756FC 46895E5F 00543BD4 9A50FA46 8D16036A 57560000
89F64689 02C48300 54EF9C9A 50FE4689 5E5F0054 3C349A50 FA468D16 FF6AC044
CFBEC1BE B4BEA6BE 8EBE77A7 FF2ED88B E0D100A2 E9037600 083D480A 468BF856
5496649A 0C76FF0E 76FFF676 FFF876FF 246A0085 E9C02BBF 03BEF6BE E9BEDCBE
EB002E05 F6468BF8 76FF106A E2EB5000 2405F646 8BF876FF 0A6AE3EB 0AC48300
76FF046A D5EB047C 05F6468B F876FF02 6AE2EB00 3E05F646 8BF876FF 043E68F0
8A05F646 8BF876FF 116ABBEB 048205F6 468BF876 FF086AC8 EB047E05 F6468BF8
6A575600 000AC857 56CB5E5F C90001B8 A1EB049B 05F6468B F876FF0C 6AAEEB04
16FF6AC0 4436FF2E C04636FF 2E505756 FC46895E 5F00543B D49A50FA 468D1603
0A468BF8 5689F646 8902C483 0054EF9C 9A50FE46 895E5F00 543C349A 50FA468D
C002BFEF BFDCBFC8 BFB5BFA1 BF89BF72 A7FF2ED8 8BE0D100 D3E90376 00083D48
EB0AC483 00549664 9AF676FF F876FF0C 76FF0E76 FF246A00 B6E9C02B C028C015
F876FF0C 76FF0E76 FF106AE2 EB500024 05F6468B F876FF0C 76FF0E76 FF0A6AE3
76FF026A D6EB003E 05F6468B F876FF0C 76FF0E76 FF043E68 EAEB002E 05F6468B
047E05F6 468BF876 FF0C76FF 0E76FF04 6AC3EB04 7C05F646 8BF876FF 0C76FF0E
F876FF0C 76FF0E76 FF116A9D EB048205 F6468BF8 76FF0C76 FF0E76FF 086AB0EB
C90001B8 FF76E904 9B05F646 8BF876FF 0C76FF0E 76FF0C6A 8AEB048A 05F6468B
FFB80675 000A7E83 0000F046 C7FFFFF2 46C70000 1CC85756 004C8DB8 00CB5E5F
2EC25C36 FF2E5057 56F64689 5E5F0054 3BD49A50 F4468D16 036A5756 01F1E9FF
9A50F446 8D16F076 FF5756E8 46895E5F 00543C34 9A50F446 8D16FF6A C25A36FF
50F4468D 1600A068 575605EB 00C06857 5607750B 0C7E83E6 46895E5F 00543AC0
89FC7EC5 0A468BFE 5689FC46 8902C483 0054EF9C 9A50FA46 895E5F00 543A809A
05FC468B 5257561B 75FE0A7E 833B7400 0E7E8303 45880E46 8B024588 0C468B05
8BFE76FF 1076FF12 76FF646A 1AEB5E5F 0054DE28 9A046A10 76FF1276 FF500004
8BFE76FF 1476FF16 76FF146A 68750B0C 7E830AC4 830054ED 1C9A5000 0405FC46
50007C05 FC468BFE 76FF1876 FF1A76FF 146A0AC4 830054ED 1C9A5000 6805FC46
830054ED 1C9A5000 9005FC46 8BFE76FF 1C76FF1E 76FF146A 0AC48300 54ED1C9A
76FF5756 0AC48300 54ED1C9A 5000A405 FC468BFE 76FF2076 FF2276FF 146A0AC4
50EE468D 16F276FF E676FF57 565E5F00 543C149A 50F4468D 16E676FF FA76FFE8
7EC5EC56 89EA4689 02C48300 54EF9C9A 50F84689 5E5F0054 3BF49A50 F4468D16
F4468D16 FA76FF57 565E5F00 543AA09A 50F4468D 16E676FF 5756E546 88058BEA
51C225C2 25C251C2 19A7FF2E D88BE0D1 41770005 3D0C468B 5E5F0054 3A609A50
C246C246 C240C251 C238A7FF 2ED88BE0 D1227700 033D4898 E5468AC2 25C225C2
57560014 FFF800CB 5E5FC998 E5468A02 C4830044 2BB89A17 19680B74 010C7E83
5ED99BC4 5A06DF2E 9B00001A C85756CB 5E5FC900 54C2719A 0054DB58 9AEC8B55
50FE468D 16F25ED9 9BE646D9 9BEE5ED9 9BEA46D9 9BE65ED9 9BC45C06 DF2E9BEA
2C4F8A9A 016A50FE 468D161A 7500FE7E 830AC483 002C3D1C 9A50EE46 8D16036A
FE76FF00 6A006A00 6A006A13 7400FE7E 830054CB 5A9A0575 00FE7E83 06C48300
54DABA9A 6E6A056A 016A50F6 468D1650 FE468D16 03F646C6 0AC48300 54C0489A
00F846C7 0001FA46 C70008FC 46C70054 C39E9AFF FF05C7C4 5E3EC52E 0EC48300
0054DABA 9A012E68 066AFC76 FFFA76FF F876FF35 FFC4623E C52E50FE 468D1600
FFFA76FF F876FF35 FFC4623E C52E50FE 468D1600 01F846C7 0003FA46 C710C483
54DABA9A 012D6803 6AFC76FF 50FE468D 1610C483 0054DABA 9A013068 066AFC76
5756CB5E 5FC99B0A C4830054 DABA9A01 2F68036A FC76FF50 FE468D16 0AC48300
8AC4623E C52E1589 C45E3EC5 2EC4663E F72E9905 8B05FFC4 5E3EC52E 000002C8

```
8AC46E1E 8E2EC46C 3E032EF8 8B03046B 26C45E36 C42E0588 C4683EC5 2EE42A05
C46E1E8E 2EC46C3E 032EF88B 03046B26 C45E36C4 2E014588 C4683EC5 2EE42A05
1E8E2EC4 6C3E032E F88B0304 6B26C45E 36C42E02 4588C468 3EC52EE4 2A01458A
36FF2E50 FE468D16 010445C6 C4683EC5 2E034588 C4683EC5 2EE42A02 458AC46E
8D040200 0180CB5E 5FC90EC4 830054DA BA9A0141 68056A01 6AC46836 FF2EC46A
8B058B0E 7EC5040E 46830000 18C85756 004C8CEC 004C8D06 0008004C 8CEA004C
468B0000 F046C700 00FE46C7 0000FC46 C701A4E9 0375C20B FA5689F8 46890255
80F87E8B F846FF2D 7500233D 98F34688 98058AF8 7EC5EE56 89EC4689 10568B0E
98058AF8 7EC59C74 C20BFA56 89F84689 02558B05 8BEC7EC5 04EC4683 B275003D
83F846FF FE5689FC 4689C63A 168B2EC6 38068B2E 23753CF3 7E80F046 FFF34688
05C63A16 8B2EC638 068B2E65 753EF37E 8063EBC6 40B868EB C63EB805 7500F07E
8902558B 058BEC7E C504EC46 83317500 3D80F87E C5F846FF FE5689FC 46890012
B813EBC6 43B80575 00F07E83 F846FF13 753E3D80 F87EC51B 74C20BFA 5689F846
FC460BFE 468BF656 89F44689 5A0EC64A B803EBC6 48B80575 00F07E83 0EEBC645
0B0CC483 005499E3 9AF876FF FA76FFF4 76FFF676 FFFC76FF FE76FFFE F1E90375
66680E06 75C63806 3B2E0D75 C63A163B 2EFE568B FC468BF8 76FFFA76 FF4875C2
C4830054 4AAE9A50 002405C6 38068B2E C63A36FF 2EC64D68 0EC66B68 0E04EBC6
462BEC46 8BEA5689 E8468904 0E6E8310 568B0E46 8B02C483 0054EC2C 9A016A10
EC7E8B04 EC4683FE 5DE90375 050B0245 8BEC7EC5 05290A7E C5C63C3E F72E990E
00720004 004C7C64 00CB5E5F C9D9EB02 55890589 04E84683 E87EC502 558B058B
20732520 74636572 69646572 20746F6E 6E616300 62770077 00626100 61006272
C82036FF 2EFF6A50 FE468D16 000002C8 5756006F 74006D6F 7266000A 22732522
5756CB5E 5FC9FE46 8B0EC483 003C8C77 9AC81A36 FF2EC81C 36FF2EC8 1E36FF2E
9AC81A36 FF2EC81C 36FF2EC8 1E36FF2E C82036FF 2E006A50 FE468D16 000002C8
C82036FF 2E016A50 FE468D16 000002C8 5756CB5E 5FC9FE46 8B0EC483 003C8C77
5756CB5E 5FC9FE46 8B0EC483 003C8C77 9AC81A36 FF2EC81C 36FF2EC8 1E36FF2E
9AC81A36 FF2EC81C 36FF2EC8 1E36FF2E C82036FF 2E026A50 FE468D16 000002C8
C82036FF 2E036A50 FE468D16 000002C8 5756CB5E 5FC9FE46 8B0EC483 003C8C77
5756CB5E 5FC9FE46 8B0EC483 003C8C77 9AC81A36 FF2EC81C 36FF2EC8 1E36FF2E
9AC81A36 FF2EC81C 36FF2EC8 1E36FF2E C82036FF 2E046A50 FE468D16 000002C8
7EC50974 003D83C8 223EC52E 000004C8 5756CB5E 5FC9FE46 8B0EC483 003C8C77
C705EB00 00FC46C7 0774C00B 04C48300 5458A29A 50FE468D 166EEB00 0005C718
3C8CF79A 0E76FF10 76FF1276 FF1A74C0 0B005458 749A2375 00FC7E83 0001FC46
FF1076FF 1276FF14 76FF1676 FF1876FF 1A76FF28 EB000005 C7187EC5 06C48300
7CC60014 7B9E00CB 5E5FC916 C4830054 DABA9A01 4568096A 0A76FF0C 76FF0E76
5FC90AC4 830054C0 489AFF00 68006A00 6A006A00 6AEC8B55 57560014 7B7C0014
83005496 649A50FE 32868D16 C9B036FF 2EC9B236 FF2E666A 0001D2C8 5756CB5E
05C6FE2E BEC5FE30 9689FE2E 868906C4 830054EE 629A50FE 35868D16 2F6A0AC4
6A0A6A03 6A50FE32 868D1666 6AFE3486 8804C483 0054EEEA 9A50FE35 868D1600
2E666A00 01D2C857 56CB5E5F C910C483 005453D1 9AC9B436 FF2EC9B6 36FF2E04
9A50FE35 868D162F 6A0AC483 00549664 9A50FE32 868D16C9 B036FF2E C9B236FF
54EEEA9A 50FE3586 8D160005 C6FE2EBE C5FE3096 89FE2E86 8906C483 0054EE62
C9B836FF 2EC9BA36 FF2E046A 0A6A036A 50FE3286 8D16666A FE348688 04C48300
35FFC9BC 3EC52E02 6A50FE46 8D160000 02C85756 CB5E5FC9 10C48300 5453D19A
01926802 6A35FFC9 BC3EC52E 046A50FE 468D160C C4830054 D8DC9A01 9268026A
0054D8DC 9A019268 026A35FF C9BC3EC5 2E056A50 FE468D16 0CC48300 54D8DC9A
160054B2 5C9A0000 02C85756 CB5E5FC9 04C48300 54B3269A 50FE468D 160CC483
0014E220 004C8D1F 004C8D18 00149520 CB5E5FC9 04C48300 54B2E29A 50FE468D
8F9AF076 DC0A46DD F05EDDCA DE0EDC2E CAD606DD 2E50F846 8D160000 10C85756
76005496 8A9ACAE6 1EDC2E0A 46DDFF2B F62B0A5E DD0CC483 005497A4 9A005496
DD2E0001 BF0E7600 54968A9A CAEE1EDC 2E0A46DD 0A5EDD0A 6EDCCAE6 06DD2E0B
CAEE06DD 2E0001BE 0E760054 968A9ACA F61EDC2E 0A46DD0A 5EDD0A66 DCCAE606
CB3A680E 046AF85E DD0A4EDC 0A46DD0A 5EDD0A4E DCCAFE06 DD2E0A5E DD0A66DC
54968F9A F846DDCB 1A680E04 6AF05EDD 0EC48300 54EB129A 0054968F 9AF846DD
CB0E36DC 2ECB0606 DD2E2C74 F60BF85E DD0A4EDC F076DC0E C4830054 EB129A00
DDF876DC E8D917EB CB0E06DD 2E002207 C7CB161E C52E1076 0054968A 9AF85EDC
2D184000 00000000 0000CB5E 5FC99BF8 46DDF85E DDE0D9F8 46DD0874 FF0BF85E
00003FC0 00000000 00003FD0 00000000 00003FE0 00000000 00004009 21FB5444
56AA649D FE830014 FFFC479E 17B84357 691B3FF0 00000000 00004020 00000000
F3633641 DC2C3F9C E2C2B57E 8336C031 229B8495 542A4093 D704F429 BD05C0CF
000152C8 57563FF0 00000000 0000C066 AFC78113 B55240B6 B95C260A 98A2C0D3
B046C605 AF46C604 AE46C603 AD46C602 AC46C601 AB46C600 AA46C600 00BA46C7
B846C60D B746C60C B646C60B B546C60A B446C609 B346C608 B246C607 B146C606
E03EC52E 407D00FF C07E81BA 468904C4 830054E8 449A50BC 468D160F B946C60E
```

6A006A50 BA468D16 04C48300 544A8A9A CCE436FF 2ECCE636 FF2E1274 003D80CC
E03EC52E 7BEB18C4 830054DA BA9A0143 680A6A03 6A006A00 6A006A00 6A006A00
6A166A50 BA468D16 04C48300 544A8A9A CCE836FF 2ECCEA36 FF2E1274 003D80CC
8B127D00 FAFEAEBE 81FEAE86 FF04EB00 00FEAE86 C70AC483 0054DABA 9A6F6A03
FEB0868D 1650AA46 8D1650BA 468D16E2 EBFEB085 88FEAE86 8BFEAEBE 031F16FD
0046C857 56CB5E5F C918C483 0054DABA 9A014368 0A6A006A 026A00FA 68106A50
3EC52E3E 7500FFC0 7E81BA46 8904C483 0054E844 9A50BC46 8D160000 BA46C700
006A50BA 468D1604 C4830054 4A8A9ACC EC36FF2E CCEE36FF 2E127400 3D80CCE0
00CB5E5F C918C483 0054DABA 9A014368 0A6A016A 006A006A 006A006A 006A006A
006005F7 0C7EC50A 768B0000 02C85756 004C8B65 004C8B4B 004C8B2E 0014951F
FF0E76FF 26740400 05F72C75 09FE834B 75000805 F70C7EC5 016DE9FF FFB80674
E90009B8 E0750007 05F7CE7A 3EC52ED1 74FFFF3D 06C48300 54CCF09A 206A0C76
F70C7EC5 A674FFFF 3D06C483 0054CCF0 9A0D6A0C 76FF0E76 FF15750A FE830133
D22B0245 8B016A0E 75FF0C7E C5575691 EB00200D 81067500 0205F74C 75000105
8B0A458B 0C7EC5D2 EB0C7EC5 057400FE 7E835E5F 005439BA 9A50FE46 8D165052
9A008068 26750A45 0B0C458B 0C7EC500 010D8100 800245C7 08558906 45890C55
0245C708 55890645 890A458B 9774C20B 0C55890A 45890C7E C502C483 0054DBE8
7EC5FF04 E90374C0 0B04C483 00549BD5 9A570E76 FF137500 027D830C 7EC50080
040005F7 51750008 05F70C7E C50588C6 8B0647FF 26067FC5 260C5EC4 024DFF0C
FE830EEB 0DFFCE7A 3EC52E09 7508FE83 1CEB05FF CE7A3EC5 2E097C20 FE832A74
D59A570E 76FF1374 040005F7 0C7EC51C 750AFE83 000005C7 CE7A3EC5 2E09750D
5756004C 8DF200CB 5E5FC9C6 8BF08BE4 2AC68BFE 95E90374 C00B04C4 8300549B
FE46895E 5F00543A C09A50FA 468D1600 6A5756FC 46890E6E F710468B 000006C8
3D949A50 FA468D16 50FC76FF 0A76FF0C 76FF0E75 FF127EC5 57565475 00FA7E83
543DD49A 50FA468D 16FF6AFE 76FF0E75 FF127EC5 57563075 00FA7E83 5E5F0054
5E5FC9FA 468B5E5F 00543AA0 9A50FA46 8D16FE76 FF575611 7500FA7E 835E5F00
5E5F0054 3AC09A50 FA468D16 006A5756 FC46890E 6EF71046 8B000006 C85756CB
50FA468D 1650FC76 FF0A76FF 0C76FF0E 75FF127E C5575654 7500FA7E 83FE4689
9A50FA46 8D16FF6A FE76FF0E 75FF127E C5575630 7500FA7E 835E5F00 543DF49A
FA468B5E 5F00543A A09A50FA 468D16FE 76FF5756 117500FA 7E835E5F 00543DD4
FE7E83FC 46895E5F 00543AC0 9A50FE46 8D16006A 57560000 04C85756 CB5E5FC9
9A50FE46 8D16FC76 FF0E76FF 1076FF50 40401246 8B0E75FF 0A7EC557 56597500
D49A50FE 468D16FF 6AFC76FF 0E75FF0A 7EC55756 307500FE 7E835E5F 00543DB4
C9FE468B 5E5F0054 3AA09A50 FE468D16 FC76FF57 56117500 FE7E835E 5F00543D
8B04458B 0A7EC501 12E9FFFF B8067400 6005F70A 7EC50000 02C85756 00CB5E5F
570C76FF 10740004 05F72B74 000105F7 0A7EC500 FCE9FFFF 0445C708 7CC00BF0
000245C7 FFFE2581 0A7EC5BE EB00200D 810A7EC5 0974C00B 04C48300 549BD59A
0C55890A 45890A7E C502C483 0054DBE8 9A008068 1D750A45 0B0C458B 0A7EC500
74020005 F7FF78E9 03740800 05F76F75 00027D83 0A7EC500 000245C7 CB74C20B
45890C55 8B0A458B 0A7EC500 0005C7D1 783EC52E 02C48300 54D12F9A 04006814
7EC55E5F 005439DA 9A50FE46 8D160080 680A75FF 0C75FF0E 75FF5756 08558906
12E90040 0D810775 00027D83 0A7EC5FF 22E90020 05C70774 00FE7E83 0245890A
0A7EC50C 750DFE83 F08BE42A 058A0647 FF26067F C5260A5E C4024DFF 0A7EC5FF
168B2ED1 7C068B2E 0A768B00 0004C857 56CB5E5F C9C68BFF 60E90375 000805F7
743585FC 7EC51976 FC463B01 6805D17E 168B2ED1 7C068B2E FE5689FC 4689D17E
004C7C64 004C8DF2 00CB5E5F C9D5EB12 FC468304 C4830054 9BD59A57 FE76FF0C
D01EDC2E 1246DD1D 75005496 8A9AD2D0 1EDC2E0A 46DDFF2B F62B0000 0AC85756
8F9A1246 DD50F846 8D160115 E9EED900 2107C7D2 D81EC52E 09770054 968A9AD2
F846DD32 73005496 8A9AD2D0 1EDC2E0A 46DDF85E DD0CC483 005497A4 9A005496
5496EF9A 0054968F 9A1246DD 0A5EDDE0 D90A46DD BC750054 968A9AD2 D01EDC2E
46DD0B73 0054968A 9AD2D01E DC2E1246 DD0001BE 03740001 C1F7C88B 08C48300
D2DC1EDC 2E1246DD 0F750054 968A9AD2 D01EDC2E F846DD00 01BF125E DDE0D912
9AD2E40E DC2E124E DC08C483 0054D984 9A005496 8F9A0A46 DD2A7600 54968A9A
54968F9A 1246DDF8 5EDDD2EC 06DD2E3F EBF85EDD 08C48300 54D70C9A 0054968F
DDF84EDC 0A46DD09 740001F6 46F71E74 00F67E83 F6468908 C4830054 970A9A00
0874F60B F85EDDF8 76DCE8D9 0874FF0B DCEBF66E D10A5EDD 0A4EDC0A 46DDF85E
00000000 0014FFFC 00000000 00000000 CB5E5FC9 9BF846DD F85EDDE0 D9F846DD
EB0000FE 46C70000 02C85756 3FF00000 00000000 400A934F 0979A371 40D00000
C99BE3EB 1DD99BEE D99B0C5E 8E0A7E03 02E7C1FE 7E8B147D 05FE7E83 FE46FF03
55F09A0E 7400023D 005455F0 9A187400 013D0054 55F09A00 0002C857 56CB5E5F
C02B0475 02FE7E83 04C48300 5464499A 50FE468D 164AEBC0 2B047400 033D0054
D99B0C5E 8E0A7E03 02E7C1FE 7E8B207D 05FE7E83 FE46FF03 EB0000FE 46C733EB
000008C8 5756CB5E 5FC99B00 01B803EB C02BDB77 0054968A 9AD45A1E DC2E9B05
1374000E 7E830054 C39E9A00 54C2719A 0A740010 7E830009 FA46C700 00FC46C7

| | | | | | | | |
|---|---|---|---|---|---|---|---|
| FE468D16 | F8468934 | 458B0A7E | C50AC483 | 0054DABA | 9A6F6A03 | 6A036A50 | FE468D16 |
| 460302E0 | C1F8468B | 50001405 | C38B51CA | 8BD88B0C | 568B0A46 | 0302E0C1 | F8468B50 |
| 9B0A7EC5 | 1445D99B | 0A7EC512 | C4830054 | DABA9A00 | CA68076A | 016A5052 | 0C568B0A |
| FF500014 | 050A468B | 0C76FF50 | FE468D16 | 105DD99B | 0A7EC505 | D99B0A7E | C5245DD9 |
| 00000000 | 000000CB | 5E5FC99B | 12C48300 | 54DABA9A | 00C96807 | 6A056A0A | 76FF0C76 |
| 98078A0A | 5EC5FC46 | 89FA4689 | F84689C0 | 2BFF2BF0 | 5EDDEED9 | 000018C8 | 57560000 |
| 0001FC46 | C710752D | FE830A74 | 2BFE83E9 | EB0A46FF | 057509FE | 83057420 | FE83F08B |
| F05EDDF0 | 4EDCD5B2 | 06DD2E28 | 7F39FE83 | 2D7C30FE | 83F08B98 | 078A0A5E | C50A46FF |
| 2EFE83C3 | EB4FC674 | 00F87E83 | F05EDDF0 | 46DC02C4 | 83005496 | 9D9A5000 | 302DC68B |
| 8A0A5EC5 | 0A46FF66 | 7545FE83 | 057465FE | 83B1EB00 | 01F846C7 | 077500F8 | 7E830D75 |
| 5EC50A46 | FF0001FA | 46C71075 | 2DFE8310 | EB0A5E8B | 0A46FF08 | 752BFE83 | F08B9807 |
| 302DC68B | FE46890A | FE466B1C | 7F39FE83 | 217C30FE | 830000FE | 46C7F08B | 98078A0A |
| 0BFE7E03 | 03EBFE7E | 2B057400 | FA7E83DA | EBF08B98 | 078A0A5E | C50A46FF | FE460100 |
| D5BA06DD | 2E227DFF | 0BECEBF0 | 5EDDF04E | DCD5B206 | DD2E3374 | C00B4FC7 | 8B147EFF |
| FC7E83F0 | 5EDDF07E | DCE846DD | ECEBE84E | DCD5B206 | DD2E0A7D | C00B47C7 | 8BE85EDD |
| 00000000 | 00004024 | 00000000 | 0000CB5E | 5FC99BF0 | 46DD03EB | E0D9F046 | DD077400 |
| 5F00543A | C09A50FA | 468D1600 | 6A5756FC | 46890E6E | F710468B | 000006C8 | 57563FF0 |
| 0054E34C | 9A50FA46 | 8D1650FC | 76FF0A76 | FF0C76FF | 0E75FF12 | 7EC55756 | FE46895E |
| FE76FF57 | 565E5F00 | 54E3229A | 50FA468D | 16FF6AFE | 76FF0E75 | FF127EC5 | 57565E5F |
| 890E6EF7 | 10468B00 | 0006C857 | 56CB5E5F | C9FA468B | 5E5F0054 | 3AA09A50 | FA468D16 |
| 0C76FF0E | 75FF127E | C55756FE | 46895E5F | 00543AC0 | 9A50FA46 | 8D16006A | 5756FC46 |
| FF6AFE76 | FF0E75FF | 127EC557 | 565E5F00 | 54E3AC9A | 50FA468D | 1650FC76 | FF0A76FF |
| FA468B5E | 5F00543A | A09A50FA | 468D16FE | 76FF5756 | 5E5F0054 | E3229A50 | FA468D16 |
| C55756FC | 46895E5F | 00543AC0 | 9A50FE46 | 8D16006A | 57560000 | 04C85756 | CB5E5FC9 |
| FF0A7EC5 | 57565E5F | 0054E37C | 9A50FE46 | 8D16500E | 76FF1076 | FF026A0E | 75FF0A7E |
| 3AA09A50 | FE468D16 | FC76FF57 | 565E5F00 | 54E3229A | 50FE468D | 16FF6AFC | 76FF0E75 |
| 76005496 | 8A9AD7F8 | 1EDC2E0A | 46DD0000 | 28C85756 | 00CB5E5F | C9FE468B | 5E5F0054 |
| 54968F9A | 0A46DD50 | E0468D16 | F62B00C0 | E9D80406 | DD2E0022 | 05C7D800 | 3EC52E11 |
| DD2E0001 | BE0E7600 | 54968A9A | D80C1EDC | 2E0A46DD | 0A5EDD0C | C4830054 | 97A49A00 |
| 0054968F | 9AE846DD | D81C680E | 036AE85E | DD0A4EDC | 0A46DD0A | 5EDD0A6E | DCD80C06 |
| 54EB129A | 0054968F | 9AE846DD | D834680E | 036AF85E | DD0A4EDC | 0EC48300 | 54EB129A |
| 0B74F60B | E85EDDD8 | 76DCF846 | DCF046DD | D85EDDF8 | 66DCF046 | DDF05EDD | 0EC48300 |
| 9AE846DD | 5008C483 | 005496EF | 9A005496 | 8F9AE046 | DDE85EDD | E84EDCD8 | 1406DD2E |
| 405FC000 | 00000000 | 00CB5E5F | C99BE846 | DDE85EDD | 0AC48300 | 5497709A | 0054968F |
| 8FEE69B8 | 3FF6A09E | 667F3BCC | 3FE00000 | 00000000 | 479E17B8 | 4357691B | 0014FFFC |
| 0F5D12A8 | 40B11036 | 2F874CA5 | 3F97A5C8 | 556E17B5 | 403433BA | 9313EC1B | 4097A7A0 |
| 44368D1E | 500003B8 | D88E004C | B81E06EC | 8B555756 | 3FF00000 | 00000000 | 406D25E5 |
| 8D00543C | 349A568D | 44368D1E | 34FF8D3E | 368D568D | 36368D1E | 5000543B | D49A568D |
| 01B85000 | 00B80489 | 8D32368D | 00543A80 | 9A568D44 | 368D1E50 | 001EB804 | 898D3436 |
| B8500001 | B8500001 | B804898D | 40368D00 | 543B209A | 568D4436 | 8D1E5000 | 00B85000 |
| 8B555756 | CB5F5E5D | E58B071F | 04898D42 | 368D0054 | 3B209A56 | 8D44368D | 1E500000 |
| B800543C | B49A568D | 30368D1E | 8D2C36FF | 500001B8 | 8D4236FF | D88E004C | B81E06EC |
| BFF3E202 | C78302C6 | 83058926 | 028B000E | BE0006BF | 0C4E8BC0 | 8E8D32A1 | D88E004C |
| FF8D3436 | FF058926 | 028B02C7 | 8302C683 | 05892602 | 8B0002BF | 0589260A | 468B0000 |
| 8D1E8D2C | 36FF5000 | 01B88D40 | 36FF0054 | 3C149A56 | 8D30368D | 1E8D4036 | FF8D3236 |
| E58B071F | 00543C74 | 9A568D30 | 368D1E50 | 0001B88D | 4236FF00 | 543CB49A | 568D3036 |
| 05C7DA56 | 3EC52E0E | 77005496 | 8A9ADA4E | 1EDC2E0A | 46DD0000 | 1AC85756 | CB5E5F5D |
| 8F9A0A46 | DD50EE46 | 8D16EC74 | 0054968A | 9ADA5A1E | DC2E0A46 | DD00A2E9 | EED90021 |
| 5A06DC2E | 0A46DD0A | 5EDD0A4E | DCDA6206 | DD2E0A5E | DD0CC483 | 0054977F | 9A005496 |
| 9A680E04 | 6AF85EDD | F04EDCF0 | 46DDF05E | DDE676DC | DA5A26DC | 2E0A46DD | E65EDDDA |
| 968F9AF8 | 46DDDA7A | 680E046A | E65EDD0E | C4830054 | EB129A00 | 54968F9A | F846DDDA |
| DA720EDC | 2EDA6A26 | DC2EEE46 | DFF85EDD | F04EDCE6 | 76DC0EC4 | 830054EB | 129A0054 |
| 00000000 | 00000014 | FFFC0000 | 00000000 | 0000CB5E | 5FC99BF8 | 46DDF85E | DDF846DC |
| DBB49607 | A23E3FD3 | 4413509F | 79FF3FE0 | 00000000 | 00003FF6 | A09E667F | 3BCC3FF0 |
| 039023A5 | D8373FC7 | 687A6A68 | E1A8C010 | BE0CE0CF | A002402A | E3A03079 | 3CC4C024 |
| 06EC8B55 | 57563FF0 | 00000000 | 0000C021 | D27CE307 | 55334033 | 7B20999F | DC23C028 |
| 004CB800 | 543CB49A | 568D6B36 | 8D1E8D65 | 36FF5000 | 01B88D69 | 36FFD88E | 004CB81E |
| 0000BFF3 | E202C783 | 02C68305 | 8926028B | 000EBE00 | 04BF0C4E | 8BC08E8D | 5AA1D88E |
| 8D6B368D | 1E8D6736 | FF8D5A36 | FF8D5C36 | FF058926 | 0C468B00 | 02BF0589 | 260A468B |
| 6936FF00 | 543CB49A | 568D6B36 | 8D1E8D65 | 36FF5000 | 01B88D67 | 36FF0054 | 3C149A56 |
| B81E06EC | 8B555756 | CB5E5F5D | E58B071F | 00543C74 | 9A568D6B | 368D1E50 | 0001B88D |
| 34FF8D65 | 368D568D | 5E368D1E | 5000543B | D49A568D | 6B368D1E | 500003B8 | D88E004C |
| 00543A80 | 9A568D6B | 368D1E50 | 0040B804 | 898D5C36 | 8D00543C | 349A568D | 6B368D1E |
| 67368D00 | 543B209A | 568D6B36 | 8D1E5000 | 00B85000 | 01B85000 | 00B80489 | 8D5A368D |

| | | | | | | | |
|---|---|---|---|---|---|---|---|
| 04898D69 | 368D0054 | 3B209A56 | 8D6B368D | 1E500000 | B8500001 | B8500001 | B804898D |
| 29EB0000 | FA46C700 | 00F846C7 | 0C75000A | 7E830000 | 08C85756 | CB5F5E5D | E58B071F |
| 0054EF9C | 9A50DA75 | 00FC7E83 | FE46895E | 5F005439 | 5A9A50FC | 468D160A | 76FF5756 |
| 890A6EF7 | 0C468B00 | 0006C857 | 56CB5E5F | C9FA568B | F8468BFA | 5689F846 | 8902C483 |
| 6AFA76FF | 52575612 | 74FA460B | FC468BFC | 5689FA46 | 8902C483 | 0054DBE8 | 9A50FE46 |
| 0C76FF57 | 56000002 | C85756CB | 5E5FC9FC | 568BFA46 | 8B5E5F00 | 7400029A | FE76FF00 |
| C4830054 | DBE89A0E | 76FF0000 | 08C85756 | CB5E5FC9 | 5E5F0054 | 397A9A50 | FE468D16 |
| FE468D16 | 0C76FF57 | 564B74FA | 460BFC46 | 8B53740A | 460B0C46 | 8BFC5689 | FA468902 |
| 8B0A76FF | 0C76FFFA | 76FFFC76 | FF575631 | 7500FE7E | 83F84689 | 5E5F0054 | 393A9A50 |
| 830054DC | 759A0A76 | FF0C76FF | 5E5F0054 | DE289AF8 | 76FF03EB | 500373F8 | 463B0E46 |
| 58368D1E | 500A468B | D88E004C | B81E06EC | 8B555756 | CB5E5FC9 | FC568BFA | 468B04C4 |
| 5756CB5F | 5E5DE58B | 071F0054 | 3B009A56 | 8D58368D | 1E500C46 | 8B00543A | 609A568D |
| 568D4E36 | 8D1E5000 | 543BD49A | 568D5836 | 8D1E5000 | 03B8D88E | 004CB81E | 06EC8B55 |
| 8D58368D | 1E500032 | B804898D | 4C368D00 | 543C349A | 568D5836 | 8D1E34FF | 8D56368D |
| 209A568D | 58368D1E | 500000B8 | 500001B8 | 500000B8 | 0589260A | 7EC40054 | 3A809A56 |
| 0A468ED8 | 8E004CB8 | 1E06EC8B | 555756CB | 5F5E5DE5 | 8B071F05 | 89260E7E | C400543B |
| BF058926 | 0E468B00 | 00BFF3E2 | 02C78302 | C6830589 | 26028B00 | 12BE0006 | BF104E8B |
| 8D1E530C | 5E8B530A | 5E8B8D4C | 36FF0589 | 26028B02 | C78302C6 | 83058926 | 028B0002 |
| 00543CB4 | 9A568D4A | 368D1E8D | 4636FF50 | 0001B853 | 0C5E8B00 | 543C149A | 568D4A36 |
| 0C74008D | E63E833C | 74028DE6 | 3E83FCD8 | 8E004CB8 | 1EEC8B55 | CB5E5F5D | E58B071F |
| 0001E181 | CF8B437C | 00043D06 | 468B0876 | C50C7EC4 | E6EB8DE6 | A31F0054 | EF5E9A1E |
| 043D0646 | 8B0876C5 | 0C7EC490 | 29EBA5F3 | E9D10001 | 25C18BC8 | 2B064E8B | A4F3C18B |
| F3C88BA5 | 66F302E9 | C1000325 | C18BC82B | 064E8BA4 | F3C18B00 | 03E181CF | 8B1A7C00 |
| 9A1E0C74 | 008DE83E | 83407402 | 8DE83E83 | FCD88E00 | 4CB81EEC | 8B55000A | CA5D1FA4 |
| 0001E181 | CF8B497C | 00043DC0 | 0306468B | 0876C50C | 7EC4E6EB | 8DE8A31F | 0054EF5E |
| 06468B08 | 76C50C7E | C4902DEB | A5F3E9D1 | 000125C1 | 8BC82BC9 | 03064E8B | A4F3C18B |
| 02E9C100 | 0325C18B | C82BC903 | 064E8BA4 | F3C18B00 | 03E181CF | 8B1C7C00 | 043DC003 |
| 05FE7E83 | FE46FF03 | EB0000FE | 46C70000 | 02C85756 | 000ACA5D | 1FA4F3C8 | 8BA566F3 |
| D9EB04C4 | 8300544A | 8A9ADFEE | 36FF2EDF | F036FF2E | ED74003D | 80DFEA3E | C52E1E7D |
| 8300544A | 8A9ADFF2 | 36FF2EDF | F436FF2E | 0A76FF0C | 76FF1874 | 003D80DF | EA3EC52E |
| F836FF2E | ED74003D | 80DFEA3E | C52E1E7D | 05FE7E83 | FE46FF03 | EB0000FE | 46C708C4 |
| FF2EDFFC | 36FF2EEC | 8B555756 | CB5E5FC9 | D9EB04C4 | 8300544A | 8A9ADFF6 | 36FF2EDF |
| 2C9ADFFE | 36FF2EE0 | 0036FF2E | EC8B5557 | 56CB5E5F | C904C483 | 0054DF2C | 9ADFFA36 |
| 82C7004C | 82B7004C | 8279004C | 8242004C | 82040014 | 951FCB5E | 5FC904C4 | 830054DF |
| 00AFE903 | 74C00B04 | C4830054 | 9BD59A0A | 76FF0C76 | FF12768B | 000002C8 | 5756004C |
| 75FF0A7E | C55756E0 | CAE094E0 | 8FE033A7 | FF2ED88B | E0D100A5 | E9037600 | 023DC68B |
| 200D810A | 7EC50974 | 00FE7E83 | 5E5F0054 | 39BA9A50 | FE468D16 | 0E76FF10 | 76FF560E |
| 0C558B0A | 458B1174 | 000105F7 | FF9F2581 | FFFF0445 | C7000002 | 45C70A7E | C56CEB00 |
| 02458B0B | 75000105 | F70A7EC5 | A5EB0002 | BE43EBC0 | 2B008002 | 45C70855 | 89064589 |
| DA83D8F7 | DAF71056 | 8B0E468B | 0001BE88 | 7900107E | 830003BE | 1056190E | 4629D22B |
| C7107EC5 | 00000AC8 | 5756CB5E | 5FC9FFFF | B8E5EB00 | 04BEFF6F | E9105689 | 0E468900 |
| 83107EC5 | FE46895E | 5F00543B | 209A1076 | FF1276FF | 006A0E76 | FF006A57 | 56000005 |
| 3D83107E | C5FC4689 | 5E5F0054 | 3A809A10 | 76FF1276 | FF026A57 | 560093E9 | 0374003D |
| 76FF5756 | 0589F87E | C50C468B | FA5689F8 | 468902C4 | 830054EF | 9C9AFC76 | FF777500 |
| 76FF5756 | 3E75003D | 83107EC5 | 5E5F0054 | 3C149A10 | 76FF1276 | FFFE76FF | FC76FF0A |
| 76FF1276 | FFFC76FF | 5756F646 | 895E5F00 | 543CB49A | 1076FF12 | 76FFFF6A | 0E76FFFE |
| 5756CB5E | 5FC95E5F | 00543B00 | 9A1076FF | 1276FFFE | 76FF5756 | 5E5F0054 | 3A609A10 |
| 349A50F8 | 468D1635 | FFE2623E | C52EE25E | 36FF2EE2 | 6036FF2E | 006A5756 | 000008C8 |
| 468902C4 | 830054EF | 9C9AFE76 | FF27EB10 | 38B80574 | 00F87E83 | FE46895E | 5F00543C |
| 5756CB5E | 5FC9C02B | 5E5F0054 | DE289A0E | 76FF5052 | 0A76FF0C | 76FF5756 | FC5689FA |
| 349A50F8 | 468D1635 | FFE2623E | C52EE25E | 36FF2EE2 | 6036FF2E | 006A5756 | 000008C8 |
| 468902C4 | 830054EF | 9C9AFE76 | FF27EB10 | 38B80574 | 00F87E83 | FE46895E | 5F00543C |
| 8DDECB5E | 5FC9C02B | 5E5F0054 | DE289A0E | 76FF0A76 | FF0C76FF | 50525756 | FC5689FA |
| 00FE46C7 | FA5689F8 | 4689E320 | 168B2EE3 | 1E068B2E | 000008C8 | 5756004C | 8DE4004C |
| F876FFFA | 76FFE9EB | 0005C614 | 5E8E127E | 03FE7E8B | 0E7D64FE | 7E83FE46 | FF03EB00 |
| FFFC4689 | 04C48300 | 54EEEA9A | 1276FF14 | 76FF08C4 | 830054EE | 309A1276 | FF1476FF |
| FF1476FF | 08C48300 | 54EE309A | 50521456 | 8B124603 | FC468B50 | 0003050A | 468B0C76 |
| 8B1076FF | 2F05C614 | 5E8E127E | 03FC46FF | FC7E8BFC | 468904C4 | 830054EE | EA9A1276 |
| 8D6E00CB | 5E5FC908 | C4830054 | EE309A50 | 5214568B | 124603FC | 468B5000 | 03050E46 |
| DF9A0676 | FF0876FF | 0A76FF0C | 76FF0E76 | FF500000 | B850007C | B81E06EC | 8B55004C |
| FF1076FF | 1276FF50 | 0000B850 | 007CB81E | 06EC8B55 | 00000ACA | 5DE58B07 | 1F0F6868 |
| 06EC8B55 | 00000ECA | 5DE58B07 | 1F0F5068 | DF9A0676 | FF0876FF | 0A76FF0C | 76FF0E76 |
| DF9A0676 | FF0876FF | 0A76FF0C | 76FF0E76 | FF1076FF | 1276FF50 | 0000B850 | 007CB81E |
| FF1076FF | 1276FF50 | 0000B850 | 007CB81E | 06EC8B55 | 00000ECA | 5DE58B07 | 1F0F6068 |

8B555756 00000ECA 5DE58B07 1F0F5868 DF9A0676 FF0876FF 0A76FF0C 76FF0E76
2E4474C2 0B0CC483 005499E3 9AE47A68 0EE47F68 0EE47236 FF2EE474 36FF2EEC
74C20B0C C4830054 99E39AE4 81680EE4 86680E50 001205E4 72068B2E E47436FF
0B0CC483 005499E3 9AE48868 0EE48D68 0E500024 05E47206 8B2EE474 36FF2E22
72068B2E E47436FF 2EE47636 FF2EE478 36FF2E02 C4830054 EC2C9A01 6A0A75C2
72003A69 633A004C 86BA004C 7C6400CB 5E5FC908 C4830054 EC829A50 002405E4
02558B05 8BE5343E C52E0000 02C85756 00007700 3A6F633A 0077003A 6F633A00
55890589 E5383EC5 2E200005 02558B05 8BE5303E C52E0255 890589E5 303EC52E
FF03EB00 00FE46C7 02558905 89E53C3E C52E2000 0502558B 058BE538 3EC52E02
26E53836 C42E0589 FE468B02 0483263C C526E530 36C42E35 7D1000FE 7E81FE46
C52EC1EB 0589FE46 8B020483 263CC526 E53C36C4 2E0589FE 468B0204 83263CC5
004C8DA8 004C8DA4 00147B96 004C8DA0 00CB5E5F C9000060 0085C73D C5E5343E
EED90021 05C7E5D0 3EC52E0D 73005496 8A9AE5C8 1EDC2E0A 46DD0000 0AC85756
54968F9A 0A46DD50 F6468D16 0006BEED 74005496 8A9AE5C8 1EDC2E0A 46DD60EB
0054968F 9AE5D406 DD2E50E5 DC3EF72E 99F6468B F85EDD0C C4830054 977F9A00
DDEC754E F85EDDE5 DE36DC2E F846DCF8 76DC0A46 DDF85EDD 0AC48300 5497709A
00000002 3FF00000 00000000 0014FFFC 00000000 00000000 00CB5E5F C99BF846
7E00FFFE 81F08B04 C4830054 EEEA9A0E 76FF1076 FFEC8B55 57564000 00000000
2A078A0E 5EC50E4E FF1474C0 0B4FC78B FE8B0A46 01C68B0E 4601C68B 00FFBE03
04C85756 CB5E5FC9 0C568B0A 468B0788 0A5EC5C6 8BE5EB07 880A4EFF 0A5EC5E4
74C00B4E C68BF08B E42A058A 0E46FF0E 7EC5FE56 89FC4689 0C568B0A 468B0000
568BFC46 8B0005C6 0A7EC5E5 EB05880A 46FF0A7E C5E42A05 8A0E46FF 0E7EC514
01B80575 01FA83E7 1A3EF72E 990A468B 70EB0C46 8BEC8B55 575600CB 5E5FC9FE
FA83E71C 3EF72E99 0A468B0E 7402FA83 E71C3EF7 2E990A46 8B6FEBC0 2B73EB00
F72E990A 468B137C 04FA83E7 1E3EF72E 990A468B 4AEBC02B 4EEB0001 B8057503
16EBC02B 1AEB0001 B8057C08 0A7E8325 EBC02B29 EB0001B8 057F07FA 83E71E3E
00080004 0002CB5E 5FC9E6F1 E6CCE6A7 E690E70E A7FF2ED8 8BE0D111 7700033D
026AE7AC 36FF2EE7 AE36FF2E F84689FA 4689FC46 89FE4689 C02B0000 10C85756
F4468D16 F6468900 01B803EB C02B0475 4D3D80E7 AC3EC52E 06C48300 54BE1C9A
503D80E7 B03EC52E 10C48300 54D8DC9A 146A046A F076FFF2 76FF50F6 468D1650
126A046A F076FFF2 76FF50F6 468D1650 F4468D16 F6468900 01B803EB C02B0475
3A36FF2E 57560000 02C85756 004C8DC5 004C8DC4 CB5E5FC9 10C48300 54D8DC9A
E83C3EC5 2EE42A05 8AE8403E C52E5E5F 00543D14 9A50FE46 8D16E838 36FF2EE8
00543D34 9A50FE46 8D16E838 36FF2EE8 3A36FF2E 57560005 C6E8403E C52E0588
FF2E5756 0588E840 3EC52EE4 2A058AE8 3C3EC52E 000002C8 5756CB5E 5FC95E5F
004C8DCE 004C8DD0 CB5E5FC9 5E5F0054 3D349A50 FE468D16 E83836FF 2EE83A36
895E5F00 543BD49A 50F6468D 1635FFE8 BC3EC52E 57560000 0AC85756 004C8DD4
3C349A50 F6468D16 35FFE8C4 3EC52EE8 C036FF2E E8C236FF 2EFC76FF 5756FC46
5756FA56 89F84689 02C48300 54EF9C9A FE76FF28 7500F67E 83FE4689 5E5F0054
004C8D9E CB5E5FC9 F6468B5E 5F0054DE 289A446A F876FFFA 76FF0A76 FF0C76FF
C483002C 44F79A0A 76FF0C76 FF0E76FF 1076FFEC 8B555756 004C8D9C 004C8D90
5FC908C4 83002C46 A09A0A76 FF0C76FF 0E76FF10 76FFEC8B 555756CB 5E5FC908
8B555756 CB5E5FC9 06C48300 2C60EB9A 0A76FF0C 76FF0E76 FFEC8B55 5756CB5E
D59A0A76 FF0C76FF EC8B5557 56CB5E5F C904C483 002C56D5 9A0A76FF 0C76FFEC
40404040 40404050 50505050 40404040 40404040 4000CB5E 5FC904C4 83002C57
08080808 08202020 20202020 20202020 20202020 90404040 40404040 40404040
01010101 01010101 01010101 01010101 01010101 20202020 20202008 08080808
02020202 02020202 02020202 02020202 02020202 20202020 20200101 01010101
F4468D16 F676FF57 560008F6 46C70000 0CC85756 00402020 20200202 02020202
50F4468D 16FF6AEA 3E36FF2E EA4036FF 2E006A57 56FE4689 5E5F0054 3A809A50
45C7F87E C5FA5689 F8468902 C4830054 EF9C9AFE 76FFFC46 895E5F00 543C349A
8DD600CB 5E5FC95E 5F00543C 149A50F4 468D1600 6AFE76FF FC76FF57 5600FE02
46DD9B06 754DF67E 8006C483 0054BE1C 9A026A50 F6468D16 00000AC8 5756004C
9A026A50 F6468D16 00000AC8 5756CB5E 5FC99BEA A236DC2E 9B0A46DD 9B0AEB0A
5FC99BEA A20EDC2E 9B0A46DD 9B0AEB0A 46DD9B06 754DF67E 8006C483 0054BE1C
4EFE5689 FC46890C 568B0A46 8B0E768B 000004C8 57564039 66666666 6666CB5E
88C78BFC 46FFFC5E C51074FF FF3DF88B 04C48300 54D0049A 1076FF12 76FF257E
0A463B0B 750C563B FE568BFC 468B1675 FFFF8300 07C6FC5E C5D87500 0A3D9807
07DD125E C516768B 000010C8 5756CB5E 5FC90C56 8B0A468B 06EBD08B C02B0675
DCF046DD 145E8E12 5E0303E3 C1DF8B22 7EF73B00 01BF4EF0 5EDD0A46 DDF85EDD
46DD145E 8E125E03 03E3C1DF 8BDAEB47 F05EDDF0 4EDC0A46 DDF85EDD F846DC0F
2A058A0A 46FF0A7E C5EC8B55 575600CB 5E5FC99B F846DDF8 5EDDF846 DC0FDCF0
F88B06C4 830054CC F09A5650 001205EB CC068B2E EBCE36FF 2E2274C0 0BF08BE4
C4830054 CCF09A0A 6A500012 05EBCC06 8B2EEBCE 36FF2E1F EBFFFFB8 D374F73B

```
89EC283E C52ED22B 0A468BEC 8B555756 004C7C64 CB5E5FC9 C02BDE75 000A3D06
5497D29A 35FF0275 FFEC283E C52E660D 68196AEC 8B555756 CB5E5FC9 02558905
FF25FAE2 D8D1FAD1 0011B902 55890589 EC283EC5 2E3619D2 8162EB05 08C48300
89FC4689 EC80168B 2EEC7E06 8B2E0000 04C85756 004C8DEA 00CB5E5F C9D22B7F
57FE76FF 0C74003D 83FC7EC5 1A76FC46 3B016805 EC80168B 2EEC7E06 8B2EFE56
7C64CB5E 5FC95E5F 0054385A 9A0A76FF 5756D4EB 12FC4683 04C48300 549C3C9A
10568B0E 468B3174 0E460B10 468B3975 0A450B0C 458B0A7E C5EC8B55 5756004C
800245C7 08558906 45891056 8B0E468B 13740001 05F70010 0D810C55 890A4589
C50E5EC4 3974F60B 12768BEC 8B555756 00CB5E5F C9000002 45C70A7E C508EB00
0A7EC50E 5EC41BEB E4754E0E 46FF0A46 FF28EB00 01B8107E 073A2698 058A0A7E
04C85756 00CB5E5F C9C02BDA 75003D80 0A7EC50A EBFFFFB8 057D073A 2698058A
C598058A 0E46FF0E 7EC54E16 74F60BFE 5689FC46 890C568B 0A468B12 768B0000
0A468BEE EB0005C6 FC46FFFC 7EC50B74 C00B4EC6 8BE675C0 0A0588FC 46FFFC7E
895E5F00 543BD49A 0E76FF10 76FF006A 57560000 02C85756 00CB5E5F C90C568B
036AFE76 FF0A76FF 0C76FF0E 76FF1076 FF0054D8 4C9A2075 003D830E 7EC5FE46
DC068B2E EDDE36FF 2EEDE068 0EEC8B55 5756CB5E 5FC90EC4 830054D8 DC9A006A
004C7C64 00CB5E5F C902C483 0054EC2C 9A016A08 C4830054 4AAE9A50 002405ED
89FC4689 0C568B0A 468B0000 04C85756 000A2174 726F6261 206F7420 6C6C6143
88FC46FF FC7EC598 058A0E46 FF0E7EC5 FC4EFFF5 75003D80 FC46FFFC 7EC5FE56
89FC4689 0C568B0A 468B0000 04C85756 00CB5E5F C90C568B 0A468BEB 75C00A05
5E5FC90C 568B0A46 8BEB75C0 0A0588FC 46FFFC7E C598058A 0E46FF0E 7EC5FE56
8B0875F7 3BF88BE4 2A078A0A 5E8B1A74 003D800A 7EC50E76 8BEC8B55 575600CB
9A0A76FF 0C76FFEC 8B555756 CB5E5FC9 D08BC02B DEEB0A46 FF09EB0C 568B0A46
5FC904C4 83002C4A 209A0A76 FF0C76FF EC8B5557 56CB5E5F C904C483 002C4C22
5E5FC99B 08C48300 54D70C9A 0054968F 9AEEE20E DC2E0A46 DDEC8B55 5756CB5E
FF0A7EC5 FE5689FC 46890C56 8B0A468B 000004C8 57563FF7 1547652B 82FE00CB
9A005496 8F9A0A46 DDEC8B55 5756CB5E 5FC948FC 462B0A46 8BF57500 3D800A46
C5EC8B55 57564002 6BB1BBB5 551500CB 5E5FC99B EF320EDC 2E08C483 0054D984
5756CB5E 5FC90445 890C7EC5 0A468B09 EBFFFFB8 00200D81 097C0004 7D830C7E
575600CB 5E5FC900 0225FE46 8B06C483 0054BE1C 9A056A50 FE468D16 000002C8
04C85756 00CB5E5F C90AC483 0054E002 9A0A76FF 0C76FF00 6A006A00 6AEC8B55
0A7E83EC 8B555756 00CB5E5F C9FE568B FC468B00 00FC46C7 FE46890A 468B0000
8B555756 00CB5E5F C9EC8B55 575600CB 5E5FC90A 468B03EB D8F70A46 8B077D00
00000000 00000000 00000000 00000000 00000000 00000000 000000CB 5E5FC9EC
9A5016FE 468D37FF 2600001E C42E0000 02C80004 1E8E2E1E 0660006C 00147B8A
CB1F5DCC EC8B5500 041E8E2E 1ECF6107 1FC9CC00 01E90375 00FE7E83 00543B80
568BEC8B 5500041E 8E2E1E00 04CA1F5D EF08468B 0A568BEC 8B550004 1E8E2E1E
00000000 00000000 00000000 00000000 000002CA 1F5D0000 068B0000 0689ED08
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
```

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 0008CA1F | 5DAAF2FC | 084E8B0C | 7EC40A46 | 8AEC8B55 | 00001E8E | 2E1E0000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| C102C102 | 00000000 | 00000000 | 020095A2 | 00000000 | 00000000 | 005CC102 | 00000000 |
| 96609656 | 964D9638 | 96289625 | 95C10012 | 000B0000 | 004C005C | 0054004C | 00000000 |
| F91EF91A | F916F912 | F90EF90A | F906F902 | F8FEF8FA | F8F6F8F2 | 02CC0007 | 983F978A |
| F93EF93A | F936F932 | F92EF92A | F926F922 | D226D202 | D1CBD195 | D16AD116 | D0EDD0E2 |
| D2B4D293 | D272D251 | F96EF96A | F966F962 | F95EF95A | F956F952 | F94EF94A | F946F942 |
| F972D594 | D550D4CD | D494D461 | D419D3DD | D3BCD39B | D37AD359 | D338D317 | D2F6D2D5 |
| F98AF986 | F982D985 | D978D959 | D94CD914 | D902D8F6 | D8BFD8AB | F97EF97A | D72DF976 |
| DA78DA68 | F99AF996 | F992F98E | DA58DA49 | DA30DA1F | DA08D9F4 | D9CED9BF | D9B7D9A3 |
| DC6ADC54 | DBC4DBAD | DB95DB0A | F9B6F9B2 | F9AEF9AA | F9A6F9A2 | F99EDA99 | DA87DA80 |
| E046F9DA | F9D6F9D2 | F9CEF9CA | F9C6F9C2 | F9BEDEFD | DEE8F9BA | DDC1DDB9 | DD0BDCCB |
| E324E309 | E2F3F9E2 | F9DEE2C0 | E2ABE242 | E234E16E | E159E138 | E12AE0C9 | E0BBE059 |
| FA0EFA0A | FA06FA02 | F9FEF9FA | F9F6F9F2 | F9EEF9EA | F9E6E5D4 | E55BE41E | E36DE358 |
| E79BE739 | E72AFA22 | FA1EFA1A | FA16FA12 | E70FE6F9 | E6E7E6D5 | E6ABE685 | E65DE63D |
| E906E901 | FA46FA42 | FA3EFA3A | FA36FA32 | FA2EE8DD | E8A3FA2A | FA26E7F5 | E7E3E7BB |
| FA5AEA71 | FA56EA54 | FA52EA37 | FA4EEA14 | FA4AE9DE | E9D1E9AA | E95FE94D | E93BE915 |
| FA7AFA76 | FA72EBE6 | EB36EB16 | EAE6EADE | FA6EFA6A | FA66EAC8 | FA62EAAB | FA5EEA8E |
| FA86FA82 | EDB7ED9E | ED86ED6D | ED55ED3C | ED24ED0C | EC84EC5F | EC45EC2B | EC10FA7E |
| FAAAFAA6 | FAA2EF08 | EECFEEA3 | EE7AEE52 | EE2CEDFC | FA9EFA9A | FA96FA92 | FA8EFA8A |
| FABEFABA | F245F206 | F1D2F1A9 | F181F14D | FAB6F0CC | EFFFEFEF | EF8BEF5B | FAB2FAAE |
| FADEFADA | F3EAF3C5 | F3A0F37B | F356F331 | F30CF2E7 | FAD6FAD2 | FACEFACA | FAC6FAC2 |
| F4CCF4BD | F4A7F491 | F482F47D | F475F452 | F436F422 | F41DF418 | FAEEFAEA | FAE6FAE2 |
| F61DF618 | F613F60E | F609F5BF | F57BFAF6 | FAF2F52E | F529F524 | F4FCF4F5 | F4E5F4D3 |
| FB16FB12 | FB0EFB0A | FB06F6BF | F6A3FB02 | FAFEF658 | F650F641 | F63CF634 | FAFAF622 |
| F850F834 | F827F80D | F800F7D9 | F7CCF7AC | F743F731 | F701FB2A | FB26FB22 | FB1EFB1A |
| EFB2EFAE | EFAAEFA6 | 04B00003 | F8E8F8D9 | F8C3F8AF | F8A7F886 | F87AF872 | FB2EF85D |
| EFF2EFEE | EFEAEFE6 | EFE2EFDE | EFDAEFD6 | EFD2EFCE | EFCAEFC6 | EFC2EFBE | EFBAEFB6 |
| F032F02E | F02AF026 | F022F01E | F01AF016 | F012F00E | F00AF006 | F002EFFE | EFFAEFF6 |
| F072F06E | F06AF066 | F062F05E | F05AF056 | F052F04E | F04AF046 | F042F03E | F03AF036 |
| F0B2F0AE | F0AAF0A6 | F0A2F09E | F09AF096 | F092F08E | F08AF086 | F082F07E | F07AF076 |
| F0F2F0EE | F0EAF0E6 | F0E2F0DE | F0DAF0D6 | F0D2F0CE | F0CAF0C6 | F0C2F0BE | F0BAF0B6 |

| | | | | | | | |
|---|---|---|---|---|---|---|---|
| F132F12E | F12AF126 | F122F11E | F11AF116 | F112F10E | F10AF106 | F102F0FE | F0FAF0F6 |
| F172F16E | F16AF166 | F162F15E | F15AF156 | F152F14E | F14AF146 | F142F13E | F13AF136 |
| F1B2F1AE | F1AAF1A6 | F1A2F19E | F19AF196 | F192F18E | F18AF186 | F182F17E | F17AF176 |
| F1F2F1EE | F1EAF1E6 | F1E2F1DE | F1DAF1D6 | F1D2F1CE | F1CAF1C6 | F1C2F1BE | F1BAF1B6 |
| F232F22E | F22AF226 | F222F21E | F21AF216 | F212F20E | F20AF206 | F202F1FE | F1FAF1F6 |
| F272F26E | F26AF266 | F262F25E | F25AF256 | F252F24E | F24AF246 | F242F23E | F23AF236 |
| F2B2F2AE | F2AAF2A6 | F2A2F29E | F29AF296 | F292F28E | F28AF286 | F282F27E | F27AF276 |
| F2F2F2EE | F2EAF2E6 | F2E2F2DE | F2DAF2D6 | F2D2F2CE | F2CAF2C6 | F2C2F2BE | F2BAF2B6 |
| F332F32E | F32AF326 | F322F31E | F31AF316 | F312F30E | F30AF306 | F302F2FE | F2FAF2F6 |
| F372F36E | F36AF366 | F362F35E | F35AF356 | F352F34E | F34AF346 | F342F33E | F33AF336 |
| F3B2F3AE | F3AAF3A6 | F3A2F39E | F39AF396 | F392F38E | F38AF386 | F382F37E | F37AF376 |
| F3F2F3EE | F3EAF3E6 | F3E2F3DE | F3DAF3D6 | F3D2F3CE | F3CAF3C6 | F3C2F3BE | F3BAF3B6 |
| F432F42E | F42AF426 | F422F41E | F41AF416 | F412F40E | F40AF406 | F402F3FE | F3FAF3F6 |
| F472F46E | F46AF466 | F462F45E | F45AF456 | F452F44E | F44AF446 | F442F43E | F43AF436 |
| F4B2F4AE | F4AAF4A6 | F4A2F49E | F49AF496 | F492F48E | F48AF486 | F482F47E | F47AF476 |
| F4F2F4EE | F4EAF4E6 | F4E2F4DE | F4DAF4D6 | F4D2F4CE | F4CAF4C6 | F4C2F4BE | F4BAF4B6 |
| F532F52E | F52AF526 | F522F51E | F51AF516 | F512F50E | F50AF506 | F502F4FE | F4FAF4F6 |
| F572F56E | F56AF566 | F562F55E | F55AF556 | F552F54E | F54AF546 | F542F53E | F53AF536 |
| F5B2F5AE | F5AAF5A6 | F5A2F59E | F59AF596 | F592F58E | F58AF586 | F582F57E | F57AF576 |
| F5F2F5EE | F5EAF5E6 | F5E2F5DE | F5DAF5D6 | F5D2F5CE | F5CAF5C6 | F5C2F5BE | F5BAF5B6 |
| F632F62E | F62AF626 | F622F61E | F61AF616 | F612F60E | F60AF606 | F602F5FE | F5FAF5F6 |
| F672F66E | F66AF666 | F662F65E | F65AF656 | F652F64E | F64AF646 | F642F63E | F63AF636 |
| F6B2F6AE | F6AAF6A6 | F6A2F69E | F69AF696 | F692F68E | F68AF686 | F682F67E | F67AF676 |
| F6F2F6EE | F6EAF6E6 | F6E2F6DE | F6DAF6D6 | F6D2F6CE | F6CAF6C6 | F6C2F6BE | F6BAF6B6 |
| F732F72E | F72AF726 | F722F71E | F71AF716 | F712F70E | F70AF706 | F702F6FE | F6FAF6F6 |
| F772F76E | F76AF766 | F762F75E | F75AF756 | F752F74E | F74AF746 | F742F73E | F73AF736 |
| F7B2F7AE | F7AAF7A6 | F7A2F79E | F79AF796 | F792F78E | F78AF786 | F782F77E | F77AF776 |
| F7F2F7EE | F7EAF7E6 | F7E2F7DE | F7DAF7D6 | F7D2F7CE | F7CAF7C6 | F7C2F7BE | F7BAF7B6 |
| F832F82E | F82AF826 | F822F81E | F81AF816 | F812F80E | F80AF806 | F802F7FE | F7FAF7F6 |
| F872F86E | F86AF866 | F862F85E | F85AF856 | F852F84E | F84AF846 | F842F83E | F83AF836 |
| F8B2F8AE | F8AAF8A6 | F8A2F89E | F89AF896 | F892F88E | F88AF886 | F882F87E | F87AF876 |
| F8F2F8EE | F8EAF8E6 | F8E2F8DE | F8DAF8D6 | F8D2F8CE | F8CAF8C6 | F8C2F8BE | F8BAF8B6 |
| 2CF42CF0 | 2CEC2CE8 | 2CE42CE0 | 2CDC2CD8 | 2CD42CD0 | 02B60009 | F902F8FE | F8FAF8F6 |
| 2D342D30 | 2D2C2D28 | 2D242D20 | 2D1C2D18 | 2D142D10 | 2D0C2D08 | 2D042D00 | 2CFC2CF8 |
| 2D742D70 | 2D6C2D68 | 2D642D60 | 2D5C2D58 | 2D542D50 | 2D4C2D48 | 2D442D40 | 2D3C2D38 |
| 1873184C | 182C180B | 2DA82DA4 | 2DA02D9C | 2D982D94 | 2D902D8C | 2D882D80 | 2D7C2D78 |
| 1AC31AAD | 1A871A38 | 1A291A1A | 1A0719F6 | 19CA194A | 192B190D | 18EE18CF | 18B01892 |
| 1BF21BEA | 1BD81BC5 | 1BA71B8D | 1B7F1B6A | 1B4D1B2B | 1B0D1B05 | 1AF11AEC | 1ADD1AD5 |
| 1DAA1D88 | 1D611D51 | 1D421D2A | 1D171CF2 | 1CCF1C90 | 1C721C5F | 1C301C1B | 1C131C01 |
| 2DC42DC0 | 2DBC2DB8 | 2DB42DB0 | 2DAC1E8E | 1E831E63 | 1E221E10 | 1DF61DDB | 1DCB1DBD |
| 1F631F3E | 1F361F20 | 1EF81EEE | 1EA72DE8 | 2DE42DE0 | 2DDC2DD8 | 2DD42DD0 | 2DCC2DC8 |
| 21D52166 | 20D020BC | 208F2082 | 20762064 | 204F2032 | 1FFB1FED | 1FAF1F9F | 1F951F6D |
| 2366233F | 23372DF0 | 2324230E | 22D72DEC | 22B72290 | 22882275 | 2253222C | 220F21F2 |
| 2E2C2E28 | 2E242E20 | 2E1C2E18 | 2E142E10 | 2E0C2E08 | 2E042E00 | 2DFC2DF8 | 2DF4237F |
| 2E6C2E68 | 2E642E60 | 2E5C2E58 | 2E542E50 | 2E4C2E48 | 2E442E40 | 2E3C2E38 | 2E342E30 |
| 2EAC2EA8 | 2EA42EA0 | 2E9C2E98 | 2E942E90 | 2E8C2E88 | 2E842E80 | 2E7C2E78 | 2E742E70 |
| 240923E3 | 23BD2390 | 2EDC2ED8 | 2ED42ED0 | 2ECC2EC8 | 2EC42EC0 | 2EBC2EB8 | 2EB42EB0 |
| 25F425CE | 25A82582 | 255C2536 | 251024E7 | 24D524C3 | 24B1249F | 248D247B | 2455242F |
| 2EF02EEC | 2EE82EE4 | 2EE026F6 | 26E426D2 | 26C026AE | 269C268A | 26782666 | 2640261A |
| 2F302F2C | 2F282F24 | 2F202F1C | 2F182F14 | 2F102F0C | 2F082F04 | 2F002EFC | 2EF82EF4 |
| 2874284E | 282827FF | 27D927B3 | 278D2767 | 27412F4C | 2F482F44 | 2F402F3C | 2F382F34 |
| 29E629C7 | 29A82996 | 29872F58 | 2F542F50 | 296B2964 | 294C2932 | 290C28E6 | 28C0289A |
| 2B582B47 | 2B422B3A | 2B222B00 | 2AE82AE3 | 2ADE2AD9 | 2ABC2A9C | 2A612A42 | 2A232A04 |
| 2C8C2C7D | 2C642C40 | 2F642BEF | 2BE32BC9 | 2BAF2BA5 | 2B9E2B99 | 2B942B83 | 2B7C2B6B |
| EC3CEC38 | EC34EC30 | EC2CEC28 | B4FAB4E9 | B4C5B4BD | EC24EC20 | EC1C0384 | 00062CA0 |
| EC7CEC78 | EC74EC70 | EC6CEC68 | EC64EC60 | EC5CEC58 | EC54EC50 | EC4CEC48 | EC44EC40 |
| B6FCB6F7 | B6EAECA4 | ECA0EC9C | EC98EC94 | EC90B6A7 | B541B521 | EC8CEC88 | EC84EC80 |
| ECC8ECC4 | ECC0ECBC | ECB8ECB4 | ECB0ECAC | ECA8B772 | B76DB760 | B739B734 | B727B717 |
| B7DFB7DA | B7D1B7C8 | ECF8ECF4 | ECF0ECEC | ECE8ECE4 | ECE0ECDC | ECD8ECD4 | ECD0ECCC |
| BAF3BACC | BA8DBA86 | BA4CB956 | B940B92A | B904B8CE | B89CB86F | B853B81E | B805B7FC |
| BD01BCFA | BCBCBC9D | BC7EBC5F | BC4CBC36 | BC06BBFD | BBF4ED10 | ED0CED00 | ECFCBBE4 |
| BEE1BEDA | BEC0BEAD | BE98ED1C | BE74BE41 | BDDCBDD7 | BD5EBD59 | BD3EBD39 | BD1EBD19 |
| C06BC055 | C040C037 | C02EC025 | C000BFFB | BFEEBFCB | BF85BF67 | BF22BF1D | BEFDBEF6 |
| C19FC19A | C17FC17A | C15FC15A | C13FC13A | C122C11B | C0DDC0CA | C0B7C0A4 | C091C07E |

| | | | | | | | |
|---|---|---|---|---|---|---|---|
| C40CC3C6 | C3A8C363 | C35EC33E | C339C322 | C31BC301 | C2EEC2D9 | C2B5C282 | C21DC218 |
| C49DC493 | ED48ED44 | ED40ED3C | ED38ED34 | ED30ED2C | ED28ED24 | ED20C441 | C43CC42F |
| C7B3C787 | C758C737 | C71DC70B | C6B7C6A0 | C68AC667 | C65FC593 | C584C516 | C4F5C4D4 |
| C976C96C | C948C941 | C913C90C | C8CFC8CA | C8BDC89A | C87FC866 | C83FC829 | C7D7C7C5 |
| CC92CC66 | CC37CC16 | CBFCCBEA | CB96CB7F | CB69CB46 | CB3ECB17 | CA4EC9EF | C9CEC9AD |
| CE6FCE2E | CE24CE1D | CDFCCDF5 | CDAECDA9 | CD9CCD79 | CD5ECD45 | CD1ECD08 | CCB6CCA4 |
| D140D0FF | D0E9CFEE | CFE9CFC3 | CF80CF5F | CEB7CEA1 | ED60ED5C | ED58ED54 | ED50ED4C |
| D448ED74 | ED70ED6C | ED68ED64 | D340D2F0 | D2CBD2AA | D2A2D289 | D265D192 | D17CD156 |
| D66FD659 | D5F0D5D9 | D5C3D59F | D58ED578 | D55CED7C | ED78D522 | D4EAD4A8 | D48CD476 |
| D860D849 | D833D80F | D7FED7E8 | D7CCED84 | D751D72C | D708D6DA | D6C9D6B3 | D697ED80 |
| DA80DA6F | DA59DA3D | ED90DA16 | DA00D997 | D980D96A | D946D935 | D91FD903 | ED8CED88 |
| DD45DD2C | DC7FDC69 | DC00DBE9 | DBD3DBAF | DB9EDB88 | DB6CED98 | ED94DAE8 | DAC5DAA4 |
| DEC8DEC3 | DEB6DE89 | DE84DE77 | DE36DE31 | DE24DDF7 | DDF2DDE5 | DDA4DD9F | DD92DD63 |
| E079E068 | E038E033 | E026DFF7 | DFE1DFAD | DFA8DF9B | DF5ADF55 | DF48DF1B | DF16DF09 |
| E226E210 | E1E2E1C1 | E1ABE182 | E161E131 | E103E0ED | E0E8E0DB | E0AFED9E | E098E08A |
| E5B1E590 | E514E4FE | EDAEEDA2 | E4C1E4A4 | E49CE460 | E424E3BA | E379E295 | E27CE257 |
| E870E85A | E7FDE7F8 | E7E6E77E | E75DE6E1 | E6CBEDB6 | EDB2E6A4 | E68EE630 | E62BE619 |
| EBACEB9D | EB8CEDCE | EB6DEB5E | EB45EB21 | EB19EAF8 | EAB2EA97 | EA84E92B | E897EDBA |
| 5AD45AD0 | 5ACC5AC8 | 5AC45AC0 | 5ABC5AB8 | 5AB40108 | 0009EC11 | EBF8EBDB | EBC2EBB1 |
| 46EC46CB | 46B54688 | 45F045E3 | 5AFC5AF8 | 5AF45AF0 | 5AEC5AE8 | 5AE45AE0 | 5ADC5AD8 |
| 480447EC | 47D447BC | 47A45B0C | 478C5B08 | 47745B04 | 475C5B00 | 473D472C | 4727471A |
| 4984496C | 4954493C | 4924490C | 48F448DC | 48C448AC | 4894487C | 4864484C | 4834481C |
| 55175507 | 54E65B1A | 52DB52C3 | 52AB5293 | 527B513E | 50014EBE | 4CF84B32 | 5B145B10 |
| 55F65B3A | 5B365B32 | 5B2E5B2A | 5B265B22 | 55BF55B3 | 55A9557C | 556A5B1E | 55425538 |
| 57D957C0 | 57995779 | 57115709 | 570456F7 | 56D456B8 | 569F5677 | 566F5659 | 5640560F |
| 59625950 | 592A5918 | 58F458DC | 58D758CA | 58A7588B | 5872584B | 582A5825 | 581857F5 |
| 27BA27B6 | 27B20290 | 00085AAB | 5A9F5A89 | 5A845A77 | 5A3F5A24 | 5A0B59E3 | 59DE59D6 |
| 280A27F6 | 27F227EE | 27EA27E6 | 27E227DE | 27DA27D6 | 27D227CE | 27CA27C6 | 27C227BE |
| 0134011E | 00DA00D5 | 00C8001F | 28442840 | 282C2828 | 28242820 | 281C2816 | 2812280E |
| 03A503A0 | 035A033A | 0335031B | 0316030B | 029F0280 | 01CD01B7 | 018E0178 | 01690145 |
| 286005EC | 05300514 | 285C2858 | 285404B4 | 04AC0496 | 2850284C | 28480427 | 03CB03C6 |
| 28782874 | 2870286C | 08480836 | 07250718 | 06FD06BB | 06AF0680 | 067B0676 | 28682864 |
| 09F309DD | 09AC0996 | 09870962 | 08C408BF | 08AA08A5 | 08712894 | 28902884 | 2880287C |
| 289C2898 | 0BF70BDD | 0BCB0BBF | 0BB60BA7 | 0BA20A90 | 0A760A64 | 0A580A4B | 0A3C0A37 |
| 0E1C0DE1 | 0DC80DA4 | 0D9C0D1F | 28B028AC | 28A828A4 | 28A00D10 | 0D0B0D01 | 0CE80CC4 |
| 0F880F80 | 0F320F2D | 0F130EE9 | 0ED028B4 | 0E9E0E99 | 0E8C0E69 | 0E500E3F | 0E2E0E29 |
| 114610EA | 10D110B8 | 109D1084 | 104F1023 | 28C628C2 | 28BE28BA | 0FD60FD1 | 0FC40FA1 |
| 28D612CA | 12B11297 | 12851272 | 1259123A | 12211202 | 11E928D2 | 28CE28CA | 11A8118F |
| 160C15FE | 159F1569 | 15501521 | 150814FA | 149B1465 | 144C1400 | 13E713D9 | 133328DA |
| 1953194E | 193D1923 | 190B1903 | 18EA18B9 | 18A0185E | 180417EB | 177C166C | 16531625 |
| 1AFE1AF1 | 1AB128EE | 28EA28E6 | 1A9F1A86 | 1A711A58 | 1A2D1A14 | 19F319DA | 1978196C |
| 1D411D18 | 1D001C03 | 1BFE1BEB | 1BE61BC4 | 1BB41BAF | 1B931B8E | 1B831B41 | 1B301B03 |
| 20821FE8 | 1FE31FC4 | 1F951F90 | 1F711F48 | 1F301E6B | 1E4A1DCA | 1DC51D9C | 1D6F1D6A |
| 223E221F | 2213220E | 21F521F0 | 21D02184 | 214428FA | 212A210D | 20F420D0 | 20C820A3 |
| 238D2388 | 236F236A | 234A2303 | 22FE22E3 | 22CD22C4 | 22BF227F | 2273226E | 224F2243 |
| 2547253E | 25392486 | 246C2467 | 2447243E | 243923F9 | 23ED23E8 | 23C923BD | 23B82399 |
| 274D273F | 271F26C3 | 26A8267C | 26772668 | 26522649 | 264425F7 | 259B2580 | 2560255B |
| 368E368A | 36863682 | 367E367A | 36763672 | 366E0374 | 000727A7 | 27982788 | 27752767 |
| 011000B0 | 00A00087 | 36C636C2 | 36BE36BA | 36B636AA | 36A636A2 | 369E369A | 36963692 |
| 028136FA | 36F636F2 | 36EE36EA | 36E636E2 | 36DE36DA | 36D636D2 | 36CE36CA | 01DC0129 |
| 04E504B5 | 048A0443 | 042A3706 | 370236FE | 03FC03F2 | 03D9038C | 03840345 | 031D02F9 |
| 06820678 | 06600648 | 0630061B | 060C0602 | 370A05DF | 05B40585 | 05760540 | 052704F4 |
| 07B307AB | 0797078D | 0775075D | 07450730 | 07210717 | 06F906E0 | 06B106A7 | 069E0696 |
| 09110908 | 090008EC | 08E008D1 | 08B80864 | 083F0834 | 08250820 | 080E07F5 | 07C607BC |
| 09E909E4 | 09CC09C7 | 09AF09AA | 09910980 | 09710967 | 095E0956 | 09420936 | 092C091B |
| 0AD10ACC | 0AB40AAF | 0A970A92 | 0A7A0A75 | 0A5D0A58 | 0A400A3B | 0A230A1E | 0A060A01 |
| 0BB90BB4 | 0B9C0B97 | 0B7F0B7A | 0B620B5D | 0B450B40 | 0B280B23 | 0B0B0B06 | 0AEE0AE9 |
| 0CA10C9C | 0C840C7F | 0C670C62 | 0C4A0C45 | 0C2D0C28 | 0C100C0B | 0BF30BEE | 0BD60BD1 |
| 0DF90DE8 | 0DA9375E | 375A3736 | 0D320D2D | 0D150D10 | 0CF80CF3 | 0CDB0CD6 | 0CBE0CB9 |
| 10A5106C | 10133776 | 37620FAB | 0F9B0F82 | 0F1A0F05 | 0EEA0ECB | 0EBC0EB3 | 0E760E3D |
| 13231314 | 130B12D1 | 1298123F | 377A11D7 | 11C711AE | 11461131 | 111610F7 | 10E810DF |
| 1589156E | 154F1540 | 153714FD | 14C4146B | 3782377E | 140313F3 | 13DA1372 | 135D1342 |
| 183217CA | 17B5179A | 177B176C | 17631729 | 16F01697 | 378A3786 | 162F161F | 1606159E |
| 1A871A77 | 1A5E19F6 | 19E119C6 | 19A71998 | 198F1955 | 191C18C3 | 3792378E | 185B184B |

| | | | | | | | |
|---|---|---|---|---|---|---|---|
| 37CA37B6 | 1CC41CB4 | 1C9B1C33 | 1C1E1C03 | 1BE41BD5 | 1BCC1B8F | 1B561AFD | 37B2379E |
| 1FBB37D6 | 37D237CE | 1F011EF1 | 1ED81E70 | 1E5B1E40 | 1E211E12 | 1E091DCC | 1D931D3A |
| 22EE221E | 220521DB | 21C22170 | 21652149 | 210720EE | 2099206A | 20171FFE | 1FD91FC4 |
| 2457244D | 24332418 | 240E23F4 | 23D923CF | 23B5239A | 23902376 | 37DA2359 | 234F2338 |
| 37EE37EA | 37E637E2 | 37DE2537 | 252F2522 | 250924C9 | 24B424AA | 24A02496 | 248C2472 |
| 277C2763 | 38143810 | 272E26E4 | 26CB26B4 | 269B380A | 38063802 | 37FE37FA | 37F637F2 |
| 2AC02AA7 | 2A7B2A5B | 2A2D2A28 | 29D229CD | 29622949 | 28A6288D | 27EA27D1 | 27B927A0 |
| 2DC02D8A | 2D71381A | 2D392D1A | 2CC82CAF | 2C592C06 | 2BED2BBE | 2B812B68 | 2B292AF2 |
| 30603016 | 2FFD2FCC | 2F862F57 | 2F482F16 | 2EE32EA0 | 2E872E58 | 2E3E2E29 | 2DFE2DCF |
| 3386336D | 332532E6 | 326B3231 | 31FF31CA | 3198317F | 314D313E | 312C30F2 | 30C0308B |
| 36543646 | 35F535BB | 38263822 | 354E34F3 | 3486346D | 343C3423 | 340A33C0 | 33A4381E |
| ECA2EC9E | EC9AEC96 | EC92EC8E | EC8AEC86 | EC82EC7E | EC7AEC76 | EC72020E | 00093665 |
| ECE2ECDE | ECDAECD6 | ECD2ECCE | ECCAECC6 | ECC2ECBE | ECBAECB6 | ECB2ECAE | ECAAECA6 |
| E339E323 | E307E2F1 | E2C5E2AD | E29DED06 | ED02ECFE | ECFAECF6 | ECF2ECEE | ECEAECE6 |
| E56BE55D | E54FE541 | E52CE442 | E434E41E | E402E3EC | E3C9E3BF | E39AE390 | E36BE361 |
| E772E75C | E749E6D6 | E6C0E6AD | E673E669 | E638E62E | E5FDE5F3 | E5C2E5B8 | E587E579 |
| EA9EEA88 | EA65EA4F | EA3CE9A8 | E992E97F | E8CEE8B8 | E8A5E868 | E852E82F | E819E806 |
| EBD6EBCC | EBC2EBB5 | EBA0EB96 | EB8CEB7F | EB61EB45 | EB26EB18 | EB02EAE6 | EAD0EAAF |
| CAB8CAB4 | CAB0CAAC | CAA8CAA4 | EC65EC57 | EC42EC38 | EC2EEC21 | EC0CEC02 | EBF8EBEB |
| CAF8CAF4 | CAF0CAEC | CAE8CAE4 | CAE0CADC | CAD8CAD4 | CAD0CACC | CAC8CAC4 | CAC0CABC |
| BFC3BF87 | BF4ABEFB | BEEEBED8 | BEB5BEA3 | BE91BE7F | CB10CB0C | CB08CB04 | CB00CAFC |
| C1DAC1C7 | C19CC178 | C160C14D | C13BCB18 | CB14C0EE | C0E9C0DC | C057C00F | BFF3BFE2 |
| C365C35D | C341C328 | C302C2F3 | C2EBC277 | C265C23F | C22DC209 | CB24CB20 | CB1CC1F2 |
| C4B5C48B | C483C471 | C45BCB2C | C439C431 | C41FC409 | CB28C3DA | C3C2C3A3 | C39EC391 |
| C5CACB40 | CB3CC59F | C597C57B | C560C538 | C526C518 | C50AC4F1 | C4DBCB38 | CB34CB30 |
| CB60CB5C | CB58CB54 | C70EC6DF | C6C9CB48 | C656C64E | C638CB44 | C609C5F7 | C5E8C5E0 |
| CB70CB6C | C9C7C9BF | C9A3C98A | C963C951 | CB68C836 | C817C7F9 | C7C0C795 | C790CB64 |
| F374F370 | F36CF368 | 01A00008 | CA98CA87 | CA63CA52 | CA2ECA1D | CB78CB74 | C9F9C9E8 |
| F3B4F3B0 | F3ACF3A8 | F3A4F3A0 | F39CF398 | F394F390 | F38CF388 | F384F380 | F37CF378 |
| F3C8F3C4 | F3C0D91F | D91AD915 | D904D8FF | D8F2D8C1 | D8A8D85B | D854D834 | F3BCF3B8 |
| DA1ADA01 | D9E0F3F4 | F3E8F3E4 | F3E0F3DC | D974D96F | D962D94B | F3D8F3D4 | F3D0F3CC |
| DB4AF40C | F408F404 | F400F3FC | F3F8DB1E | DAB9DA8A | DA78DA66 | DA50DA41 | DA27DA22 |
| DDE5DDD6 | DDBDDD6B | F418F414 | F410DD08 | DD03DCED | DCD7DCA4 | DC8EDC66 | DC50DB7D |
| F42CE131 | E127E10E | E0BDE049 | DF96DF88 | DF7CDF6B | DF5CDF43 | DEF1DE10 | DE02DDF6 |
| E45BE445 | E423E3F1 | E389E340 | E32AE31B | E2C2E297 | E267E256 | E1F4E1C6 | E19AF430 |
| E6A7E69F | E687E66F | E657E63F | E62EE61E | E605E5B8 | E5A3E563 | E506E4E1 | E4D7E4BE |
| F45CF458 | F454F450 | F44CF448 | F444F440 | F43CF438 | F434E767 | E74EE701 | E6EFE6D6 |
| E924E8D8 | E8BFE8AE | E895E887 | E85DE833 | E80DE7EF | F474F470 | F46CF468 | F464F460 |
| F484EFA8 | EF51EEF6 | EE6FF480 | EAFEEACC | EAB0EA52 | E9FCE9E3 | F47CF478 | E96BE952 |
| F22BF1CA | F172F14B | F132F113 | F0FAF0CA | F0B1F078 | F05FF036 | EFE7EFD4 | F48CF488 |
| 8FCE8FCA | 04BE0004 | F34CF347 | F333F2DB | F2D6F2C2 | F288F283 | F25CF257 | F247F242 |
| 901E901A | 90169012 | 900E900A | 90069002 | 8FFE8FFA | 8FF68FF2 | 8FDE8FDA | 8FD68FD2 |
| 906E906A | 90669062 | 905E905A | 904E904A | 9046903A | 90369032 | 902E902A | 90269022 |
| 004990AC | 90A690A2 | 909E909A | 90969092 | 908E908A | 90869082 | 907E907A | 90769072 |
| 05990546 | 0457042C | 040503DE | 03B70390 | 036901F4 | 0150011B | 00FA00C2 | 00A70069 |
| 08680847 | 0838082E | 07EB07CD | 07C30792 | 071406F6 | 06E406CE | 06AB0695 | 063D0603 |
| 0B400B2A | 0B0E0AED | 0ABE0AA2 | 0A860A6A | 0A4E0A32 | 09D509AE | 09790958 | 0886087E |
| 90F890F4 | 90F090EC | 90E890E4 | 90E090DC | 90D890D4 | 90CE90CA | 90C690C2 | 90BE90BA |
| 0ED20D84 | 0D510D1E | 0BB50BA3 | 0B8D9124 | 9120911C | 9110910C | 91089104 | 910090FC |
| 151F14EC | 135B12E1 | 11E211B5 | 119710FB | 10831042 | 102E1010 | 0FF00FCB | 0F9E0F71 |
| 189B1876 | 1849181C | 177B173B | 17361717 | 17121707 | 16E316DE | 16BF16BA | 16A01552 |
| 1C9E1C88 | 1C761BF4 | 1BDE1BCC | 1BA71B91 | 1B7F1AD5 | 1A5B19A5 | 192E18ED | 18D918BB |
| 1EBF1EA9 | 1E971E72 | 1E5C1E28 | 1E121DF3 | 1DDD1DCB | 1DA61D90 | 1D7E1CEB | 1CD51CC3 |
| 21712152 | 21382121 | 210820F2 | 2093208E | 203A2002 | 1FAE1F64 | 1F351F0C | 1EF61EE4 |
| 263F2629 | 246E2469 | 243A2392 | 23682363 | 232022F4 | 22A62290 | 226421BE | 21B9219D |
| 2E402DD1 | 2D902C7E | 2BD02AB7 | 2A3429E5 | 29762935 | 279C2797 | 276826C0 | 26962691 |
| 913C9138 | 91349130 | 912C9128 | 324F3213 | 31E2318C | 313A3108 | 30C93045 | 2F122E8F |
| 33EC33C9 | 33BF3396 | 338C335E | 33483322 | 331832FC | 32E69150 | 914C9148 | 91449140 |
| 35BC9170 | 916C9168 | 91649160 | 915C9158 | 915434F0 | 34DA34C4 | 34BA3443 | 342D3402 |
| 38B53823 | 380437E2 | 37C437A5 | 3786374C | 37363727 | 364E3638 | 361535FF | 35E135CB |
| 3B2F3A8D | 3A779180 | 917C3A40 | 3A2A399E | 39883958 | 39423933 | 391B3902 | 38DA38C4 |
| 3DE53DE0 | 3D833D7E | 3D513D4C | 3D063D01 | 3C843C7F | 3C773BE5 | 3BDA3BCD | 3BC23B8E |
| 40364031 | 4020401B | 3FBF3FBA | 3F313EFE | 3EF93EA0 | 3E943E8F | 3E823E41 | 3E3C3DEE |
| 4400438B | 43759186 | 42D442B9 | 42614238 | 420A41F5 | 41544139 | 40E140B8 | 408A4075 |

| | | | | | | | |
|---|---|---|---|---|---|---|---|
| 4B934B2D | 4B17918E | 49BD494F | 490E48CB | 47D1475C | 4746918A | 45EC457E | 453D44FA |
| 555954BA | 544053DA | 53C45394 | 537E919E | 919A9196 | 91925210 | 515A4EA3 | 4D634C0D |
| 5CE95CD6 | 5CB75C89 | 5C785C59 | 5C485C32 | 91A691A2 | 5C0B5BF5 | 5B2358CD | 57845609 |
| 618B616F | 5DE65DD0 | 91C691C2 | 91BE91BA | 91B691B2 | 91AE91AA | 5D4B5D35 | 5D0D5CFB |
| 64EF64EA | 64CE644D | 6448642C | 63B063AB | 638F62F9 | 62F462D8 | 6242623D | 62216190 |
| 68DD68AB | 6859684C | 6843683E | 681867F6 | 679C6797 | 66356630 | 66146590 | 658B656F |
| 6F9A6F60 | 6EFE6D72 | 6AEE6AE9 | 6ADB6A63 | 6A1569F3 | 69766955 | 694C6947 | 68F868E2 |
| 74D39218 | 92149210 | 920C9204 | 920091FC | 91F87217 | 721271AF | 71AA701A | 6FB76F9F |
| 7D3C7BAB | 7B957B63 | 7B4D7B2B | 7B157895 | 787D771A | 77157651 | 764C7564 | 752874E9 |
| 7F9C7F97 | 7F8A7F64 | 7F5F7F53 | 7F377DF2 | 7DDB7DD6 | 7DCC7DAA | 7D967D7D | 7D647D50 |
| 80FD80E1 | 80B880B3 | 80A68080 | 807B806F | 8053802A | 80258018 | 7FF27FED | 7FE17FC5 |
| 842C840A | 83F683DD | 83C483B0 | 839C820B | 81F581B4 | 81A68146 | 81418134 | 810E8109 |
| 86858678 | 8652864D | 86418625 | 85FC85F7 | 85EA85C4 | 85BF85B3 | 85978452 | 843B8436 |
| 880687A6 | 87A18794 | 876E8769 | 875D8741 | 87188713 | 870686E0 | 86DB86CF | 86B3868A |
| 19FA00D0 | 000B8C98 | 8C938C77 | 8BFA8BF5 | 8BD98B64 | 8B5F8B43 | 8AB58AB0 | 8A948814 |
| 1A061A02 | 134D1348 | 13401336 | 132E1314 | 12EF12D6 | 12C7129F | 128B1284 | 127219FE |
| 1A121A0E | 1A0A1452 | 144D1445 | 143B1433 | 141913F4 | 13DB13CC | 13A41390 | 13891377 |
| 15E115B6 | 15A71585 | 156C1544 | 153514FB | 14E914BE | 14B1149D | 14861473 | 1A1A1A16 |
| 172C171D | 16E316D1 | 16A61699 | 1685166E | 165B1A22 | 1A1E163A | 16321628 | 16201606 |
| 184C1A36 | 1A321A2E | 1A2A1A26 | 1822181A | 18101808 | 17EE17C9 | 179E178F | 176D1754 |
| 1964193E | 19341A46 | 1A421A3E | 1A3A1907 | 18FC18ED | 18DA18B7 | 189E188F | 187C1856 |
| 2929291A | 50345030 | 01D20008 | 80DE0002 | 000A19EF | 19E419D5 | 19C2199F | 19861977 |
| 2A0329F1 | 29DF29CD | 29BB5044 | 5040503C | 50382996 | 29872978 | 29672958 | 29492938 |
| 2B812B6F | 2B5D2B4B | 2B392B14 | 2AFB2AD4 | 2AC22AB0 | 2A9E2A8C | 2A7A2A55 | 2A3C2A15 |
| 2D392D12 | 2D002CE4 | 2CBD2CA1 | 2C7A2C68 | 2C4C2C3A | 2C132C01 | 2BEF2BD3 | 2BBA2B93 |
| 2EC92DEA | 2DC22DBD | 2D975074 | 5070506C | 5068505C | 50585054 | 5050504C | 50482D4B |
| 315F30EA | 30D130B7 | 3080302F | 302A300F | 300A2FFA | 2F982F4E | 2F352F1B | 2EFD2EEB |
| 50B250AE | 50AA50A6 | 50A2509E | 509A5094 | 5090330E | 330932D1 | 327B31A4 | 317C3177 |
| 351F34F1 | 34C4349E | 34863469 | 345F3403 | 33DD33C5 | 33A8339E | 50D250CE | 50CA50B6 |
| 36883674 | 36663647 | 50EA50E6 | 50E250DE | 50DA50D6 | 35FF35E7 | 35BF354C | 35473524 |
| 3B403B11 | 3B0C3A88 | 39873970 | 38D450F6 | 50F250EE | 3888383A | 382B381C | 376A368D |
| 3EED3EE8 | 3ECE3EA2 | 3E783E4E | 3E243CA7 | 3C613C5C | 3C363C31 | 3C283BFC | 3B863B45 |
| 410A40F2 | 40D040B7 | 40844073 | 40404001 | 3FFC3FE2 | 3FA53FA0 | 3F863F49 | 3F443F2A |
| 44D64409 | 440443DF | 43DA4395 | 43904386 | 42F8425A | 41A3510E | 510A5106 | 5102412D |
| 48224801 | 5114472E | 47294704 | 46FF46BA | 46B546AB | 4652464D | 460C4607 | 45FD4556 |
| 51245120 | 4C974A1A | 49D9511C | 511849AB | 49A6496D | 49684880 | 487B4848 | 4843483A |
| 9DBE9DBA | 9DB69DB2 | 9DAE9DA2 | 9D9E9D9A | 9D8E0404 | 00074DDC | 4DBB5130 | 512C5128 |
| 6FA66FA1 | 6EE56EE0 | 6ED59DF2 | 9DEE9DEA | 9DE69DE2 | 9DDE9DDA | 9DD69DCA | 9DC69DC2 |
| 9E029DFE | 9DFA9DF6 | 711E710C | 70E670D4 | 70A07091 | 70687046 | 70417025 | 6FE56FD3 |
| 71F371EE | 71D2719A | 71957141 | 713C7131 | 9E229E1E | 9E1A9E16 | 9E129E0E | 9E0A9E06 |
| 9E3E9E3A | 9E369E32 | 9E2E9E2A | 9E267303 | 72F172CB | 72B97293 | 7281724D | 723E7215 |
| 9E4A74AF | 749D7477 | 74657423 | 741473EB | 73C973C4 | 73A87326 | 73217316 | 9E469E42 |
| 9E669E62 | 75D875C6 | 75A0758E | 755A754B | 74D174CC | 74C19E5E | 9E5A9E56 | 9E529E4E |
| 771B7709 | 76BF76AA | 768A9E7E | 9E7A9E76 | 76777665 | 7620760B | 75EB9E72 | 9E6E9E6A |
| 78637851 | 780777F2 | 77D29E96 | 9E929E8E | 77BF77AD | 7763774E | 772E9E8A | 9E869E82 |
| 9ED69ED2 | 9ECE9ECA | 9EC69EC2 | 9EBE9EBA | 9EB69EB2 | 9EAE9EAA | 9EA69EA2 | 9E9E9E9A |
| 9F169F12 | 9F0E9F0A | 9F069F02 | 9EFE9EFA | 9EF69EF2 | 9EEE9EEA | 9EE69EE2 | 9EDE9EDA |
| 7AD97AB1 | 7A727A20 | 7A0C79E3 | 79D17995 | 7970795C | 793778C4 | 78AE7899 | 78927876 |
| 7E187DF2 | 7DE07DAC | 7D9D7D74 | 7D527D4D | 7D317D0C | 7CCD7C79 | 7BA97B8B | 7B4C7B00 |
| 7F867F4A | 7F257F11 | 7EE77ED1 | 7EB27E9A | 7E7A7E75 | 9F229F1E | 9F1A7E62 | 7E507E2A |
| 9F268282 | 8271825D | 821E8165 | 815A8139 | 80FA80AE | 80878066 | 80277FD5 | 7FC17F98 |
| 9F669F62 | 9F5E9F5A | 9F569F52 | 9F4E9F4A | 9F469F42 | 9F3E9F3A | 9F369F32 | 9F2E9F2A |
| 9FA69FA2 | 9F9E9F9A | 9F969F92 | 9F8E9F8A | 9F869F82 | 9F7E9F7A | 9F769F72 | 9F6E9F6A |
| 83FB83D6 | 83CD83C8 | 83A3839A | 839582F5 | 82AD829B | 9FBE9FBA | 9FB69FB2 | 9FAE9FAA |
| 8630860A | 85E485C8 | 855E8559 | 85368531 | 84E7848A | 8485843C | 8433842E | 84098400 |
| 9FE29FDE | 9FDA9FD6 | 9FD29FCE | 9FCA9FC6 | 9FC28728 | 872086F6 | 86CC86A6 | 867C8656 |
| 886F87AA | 8765875D | 874BA00E | A00AA006 | A0029FFE | 9FFA9FF6 | 9FF29FEE | 9FEA9FE6 |
| 8AD28AAC | 8A868A60 | 8A3A8A1E | 89F789F2 | 89D68974 | 896F894C | 894788FD | 88AA8874 |
| A03AA036 | A032A02E | A02AA026 | A022A01E | A01AA016 | A0128B72 | 8B6A8B44 | 8B1E8AF8 |
| 8BAF8BA7 | 8B95A06E | A06AA066 | A062A05E | A05AA056 | A052A04E | A04AA046 | A042A03E |
| 8ED08EAA | 8E848E68 | 8E418E3C | 8E208DBE | 8DB98D96 | 8D918D47 | 8CF48CBE | 8CB98BF4 |
| A0A2A09E | A09AA08E | A07AA076 | A072901A | 8FED8FBC | 8FB48F8E | 8F688F42 | 8F1C8EF6 |
| A0FEA0FA | A0F6A0F2 | A0EEA0EA | A0E6A0E2 | A0DEA0DA | A0CEA0CA | A0C6A0BA | A0B4A0AE |
| 919F9197 | 917E915C | A12EA12A | A126A122 | A11EA11A | A116A112 | A10EA10A | A106A102 |

| | | | | | | | |
|---|---|---|---|---|---|---|---|
| 95599506 | 94FC94D0 | 94B4946D | 945E9300 | 92E992D0 | 92B992A0 | 91CF91BD | 91AE91A6 |
| 970A96F0 | 96E696BD | 96B3968A | 96809643 | 96399606 | 95FC95C9 | 95BF9596 | 958C9563 |
| 99219903 | 9885987B | A13AA136 | A1329848 | 9841983C | 982A97C1 | 97BC978B | 97819732 |
| 9B309A8C | 9A819A79 | 9A669A43 | 9A2599A7 | 999DA146 | A142A13E | 996A995F | 99579944 |
| DA33DA03 | D9CDD92E | D88F03B0 | 00099CFC | 9BD29BC0 | 9BAE9B9C | 9B8A9B78 | 9B579B4D |
| DE90DE7A | DE75DE60 | DE5BDD31 | DCE8DCA6 | DBF4DBD4 | DBCFDB3C | DB15DAC4 | E268DA59 |
| E274E270 | E26CDF8E | DF79DF63 | DF4DDF30 | DEEBDEE2 | DEDDDEC9 | DEC4DEAF | DEAADE95 |
| E0B8E08B | E07CE071 | E065E04C | E03DE032 | E026E00D | DFD1E288 | E284E280 | E27CE278 |
| 80DC80D0 | 80CC80C8 | 80C4E233 | E1F1E19F | E19AE171 | E16CE143 | E13EE114 | E0E3E0BD |
| 71E571DE | 71907174 | 716D7157 | 7150713A | 7133711D | 711670C8 | 70B6709A | 708B80E0 |
| 81048100 | 80FC80F8 | 80F480F0 | 80EC80E8 | 80E47258 | 723C7235 | 721F7218 | 720271FB |
| 81448140 | 813C8138 | 81348130 | 812C8128 | 81248120 | 811C8118 | 81148110 | 810C8108 |
| 732E7312 | 730072E4 | 72DD72C8 | 72C172A6 | 728D8160 | 815C8158 | 81548150 | 814C8148 |
| 74937477 | 74657449 | 7437741B | 740973ED | 73E673D0 | 73C9739C | 738A736E | 735C7340 |
| 760275E6 | 75DF75B0 | 759E7582 | 75707554 | 75427526 | 751474F8 | 74F174DB | 74D474A5 |
| 77F277DC | 77D577BF | 77B87742 | 7726770A | 76EE76D2 | 76CB76B5 | 76AE7642 | 76307614 |
| 792478E9 | 78E278CC | 78C578A4 | 78887881 | 786B7864 | 784E7847 | 7831782A | 781577F9 |
| 79DE79C1 | 79A47987 | 796E8188 | 81848180 | 817C8178 | 81748170 | 816C8168 | 81647940 |
| 7A7A81B0 | 81AC81A8 | 81A481A0 | 819C8198 | 81948190 | 818C7A4D | 7A3B7A14 | 7A0279F0 |
| 81CC81C8 | 81C481C0 | 81BC81B8 | 81B47B59 | 7B477B20 | 7B0E7AFC | 7AEA7ACD | 7AB07A93 |
| 81E481E0 | 81DC7C5B | 7C497C37 | 7C257C13 | 7BF67BD9 | 7BBC7B9F | 7B8681D8 | 81D481D0 |
| 7D4B7D39 | 7D277D15 | 7CF87CDB | 7CBE7CA1 | 7C888200 | 81FC81F8 | 81F481F0 | 81EC81E8 |
| 7E0A7DF1 | 7DD48224 | 8220821C | 82188214 | 82107DAD | 7D9B7D7E | 820C8208 | 82047D5D |
| 82447EE4 | 7ED27EB1 | 7E987E7B | 7E5E8240 | 823C8238 | 82348230 | 822C8228 | 7E3D7E2B |
| 82647FCE | 7FBC7F9F | 7F868260 | 825C8258 | 82547F59 | 7F477F2A | 7F118250 | 824C8248 |
| A1BC80B8 | 80A68089 | 80708280 | 827C8278 | 82748043 | 80318014 | 7FFB8270 | 826C8268 |
| 93AD93A3 | 938A933D | 93369316 | A1E4A1E0 | A1DCA1D8 | A1D4A1D0 | A1CCA1C8 | A1C4A1C0 |
| 9519A200 | A1FCA1F8 | A1F494D6 | 94B694A2 | 9495A1F0 | A1ECA1E8 | 93D393CE | 93C993C4 |
| 9864985B | 985697BA | 9753974E | 970296B5 | A2069622 | 96169605 | 95F695DD | 958B9532 |
| 9A1E9A15 | 9A1099F5 | 99E799DE | 99D99939 | 98EF98E6 | 98E198A9 | 989B9892 | 988D9872 |
| 9B5FA25A | A256A252 | A24EA24A | A246A242 | 9B1E9AAD | A23EA23A | 9A6E9A65 | 9A609A2C |
| 9D0C9CF9 | 9CF49CE3 | 9CDE9CCC | 9CC79CB5 | 9CB09C21 | 9BF69BE0 | 9BBE9BA8 | 9B839B64 |
| 9E9A9E7E | 9E659E54 | 9E4F9E3E | 9E399E2C | A26EA26A | A266A262 | A25E9D80 | 9D399D22 |
| A04AA037 | A02BA01A | A00B9FF2 | 9FA09F52 | 9F349F18 | 9EFF9EEE | 9EE99ED8 | 9ED39EC6 |
| DFE1E000 | DFC6DFFC | DFA9DF7D | DF59DFF8 | DFF4DFF0 | DFEC0016 | 000BA1B1 | A158A130 |
| 798FB2BA | B2B6B2B2 | B2AEB2AA | B2A6B2A2 | B29EB29A | B296B292 | B28EB28A | 03E80006 |
| 7C5B7C50 | B2BE7C3D | 7C277C18 | 7C0C7C00 | 7BE77BBA | 7B8C7A17 | 7A0C79DF | 79D479BE |
| B2E6B2E2 | B2DEB2DA | B2D67D94 | 7D827D5D | 7D35B2D2 | B2CEB2CA | B2C6B2C2 | 7CB17C98 |
| 7E7B7E58 | 7E367E28 | 7E057DE2 | 7DB6B30A | B306B302 | B2FEB2FA | B2F6B2F2 | B2EEB2EA |
| 80758067 | 80447FE3 | 7FD57FB2 | 7F877F79 | 7F567F2F | 7F217EFE | 7EDC7ECE | 7EAB7E89 |
| B33AB336 | B332B32E | B32AB326 | B322B31E | B31AB316 | B312B30E | 80DA80C7 | 80B98096 |
| 81D681A3 | 8100B36E | B36AB366 | B362B35E | B35AB356 | B352B34E | B34AB346 | B342B33E |
| 840483F6 | 83DB83A8 | 83758359 | 832682F3 | 82D782A4 | 82958288 | 827A825F | 823C8209 |
| 84F584E3 | 84CF84AD | 8489847F | B386B382 | B37EB37A | B376B372 | 84598443 | 84208411 |
| 868A862A | 861D860F | B38EB38A | 85DD85CF | 85C1859E | 85728568 | 8550852E | 851D8503 |
| 87598747 | 870886D8 | 86CEB3B6 | B3B2B3AE | B3AAB3A6 | B3A2B39E | B39AB396 | B39286A7 |
| B3CAB3C6 | B3C2B3BE | B3BA895A | 892D891C | 88368817 | 880587EE | 87C687A7 | 87958778 |
| 8998897C | B402B3FE | B3FAB3F6 | B3F2B3EE | B3EAB3E6 | B3E2B3DE | B3DAB3D6 | B3D2B3CE |
| 8C3E8C30 | 8C158BE2 | 8BAF8B7C | 8B498B16 | 8AE38AB0 | 8A948A78 | 8A408A24 | 89EC89D0 |
| B44AB446 | B442B43E | B43AB426 | B422B41E | 8CFC8CD2 | 8C9F8C90 | 8C838C75 | 8C5A8C4B |
| 8E168DFA | B494B490 | B48CB488 | B482B47E | B47AB476 | B472B46E | B462B45E | B452B44E |
| 8FDD8FD8 | 8FA68FA1 | 8F568F51 | 8F448F3F | 8F158ECB | 8EC68EB9 | 8EB48E8A | 8E388E33 |
| 93999394 | 934F934A | 92E692E1 | 929E9299 | 92509228 | 91F591C2 | 904B9046 | 9014900F |
| 95EC95E7 | 95B595B0 | 9562955D | 952E9529 | 94EC94E7 | 94A0949B | 9451944C | 94059400 |
| 97DD97BF | 97BA9796 | 9779975A | 973B971C | 96E896E3 | 96B096AB | 96769671 | 963E9639 |
| 99BD999C | 99979973 | 99569914 | 990F98EA | 98CB98AB | 98A69881 | 98629823 | 981E97FA |
| 9C929C6D | 9B829B4F | 9B1C9AF8 | 9AF39ACE | 9AAF9A8E | 9A899A65 | 9A489A06 | 9A0199DC |
| 9E069DFD | 9DF49DEB | 9DE29DA1 | 9D589D53 | 9D489D37 | 9D329D27 | 9D0B9D06 | 9CD89CD3 |
| A080A052 | A04D9FB3 | 9FAE9F8A | 9F5C9F57 | 9EBF9EBA | 9E969E59 | 9E439E34 | 9E2B9E15 |
| A37CA324 | A31FA2FB | A2CDA2C8 | A22EA229 | A205A1D7 | A1D2A13A | A135A111 | A0A9A0A4 |
| A5A1A4EB | A4E6A4C2 | A4AAA4A5 | A484A466 | A461A440 | A422A41D | A3FDA3DC | A3C1A397 |
| A7D0A7A5 | A786A76D | A741A71B | A6F5A6C9 | A6C4A699 | A67AA661 | A635A610 | A5CAA5C5 |
| ABF2ABE7 | ABCBABC6 | AB98AB93 | AB52AB2D | A98FA979 | A951A91E | A849A824 | A7FFA7D5 |
| AD3CAD19 | AD03ACF4 | ACEBACD5 | ACC6ACBD | ACB4ACAB | ACA2AC61 | AC18AC13 | AC08ABF7 |

| | | | | | | | |
|---|---|---|---|---|---|---|---|
| AF4AAEDE | AED9AEB5 | AE9DAE98 | AE74AE57 | AE38AE1A | AE15ADF1 | ADD4ADB5 | AD65AD60 |
| B1D3B1A2 | B19DB18D | B188B15E | B111B10C | B0FCB0F7 | B0CDB07C | B001AF95 | AF90AF6C |
| 3B1C3B18 | 3B143B10 | 3B0C0420 | 00061EF6 | 0002000A | B27EB26F | B262B254 | B239B206 |
| 3B5C3B58 | 3B543B50 | 3B4C3B48 | 3B443B40 | 3B3C3B38 | 3B343B30 | 3B2C3B28 | 3B243B20 |
| 3B9C3B98 | 3B943B90 | 3B8C3B88 | 3B843B80 | 3B7C3B78 | 3B743B70 | 3B6C3B68 | 3B643B60 |
| 3BAC02ED | 02420229 | 021901FE | 01B20199 | 018B0161 | 01410022 | 00183BA8 | 3BA43BA0 |
| 06650660 | 06443BD6 | 3BD23BCE | 3BCA3BC4 | 3BC03BBC | 3BB83BB4 | 3BB00340 | 0327030B |
| 3BEA3BE6 | 3BE23BDE | 3BDA0940 | 08DE08D7 | 081607B9 | 075106B8 | 06AF06AA | 068E066E |
| 3C3A3C2E | 3C2A3C26 | 3C223C1E | 3C1A3C16 | 3C123C0E | 3C0A3C06 | 3C023BFE | 3BF63BEE |
| 0A9109A2 | 09893C6E | 3C6A3C66 | 3C623C5E | 3C5A3C56 | 3C523C4E | 3C4A3C46 | 3C423C3E |
| 0C820C69 | 0C270C0E | 0BDB0BD6 | 0BC60BC1 | 0BA70B7C | 0B770B6D | 0B400AED | 0AD40AAA |
| 0E400E2A | 0E250E19 | 0DAD0DA8 | 0D920D8D | 0D780D73 | 0D5D0D58 | 0D4C0CE4 | 0CC80CA8 |
| 11500FC7 | 0FAE0F92 | 0F790F51 | 0F380EFC | 0EE30EC0 | 0EA70E7A | 0E750E5F | 0E5A0E45 |
| 12EA12B6 | 129D126A | 12651248 | 12431236 | 1212120D | 120311D6 | 3C7A3C76 | 3C721169 |
| 14871465 | 144C1430 | 141013F7 | 13CA13B1 | 137E1379 | 135C1357 | 134A1326 | 13211317 |
| 156D1568 | 15551550 | 15431529 | 1524151A | 14F714D8 | 14D314C1 | 14BC14AF | 14961491 |
| 167E1679 | 166C1652 | 164D1643 | 16201601 | 15FC15E9 | 15E415D7 | 15BD15B8 | 15AE158B |
| 17921778 | 17731769 | 17461727 | 17221710 | 170B16FE | 16E516E0 | 16D616B4 | 16961691 |
| 189C1892 | 186F1850 | 184B1838 | 18331826 | 180C1807 | 17FD17DA | 17BC17B7 | 17A4179F |
| 1A1919E7 | 19CE19BA | 19A11977 | 196F1956 | 1933191A | 18E518E0 | 18CD18C8 | 18BB18A1 |
| 1CEC1CD3 | 1C971C7E | 1C421C29 | 1BED1BD4 | 1B981B7F | 1B431B2A | 1AF11AD8 | 1A621A46 |
| 1F131EFA | 1EC11EA8 | 1E8C1E73 | 1E371E1E | 1DE51DCC | 1DB81D9F | 1D731D5A | 1D211D08 |
| 21A3218A | 215A213E | 211120F8 | 20D820BF | 2094207B | 20392024 | 1F9E1F85 | 1F601F47 |
| 23372332 | 23052300 | 2296228F | 3C9A3C96 | 3C923C86 | 3C823C7E | 220C21F3 | 21DF21C6 |
| 250024FB | 24E924E4 | 24D724BE | 24B924AF | 248D2474 | 24582414 | 23F823AC | 23932340 |
| 2611260C | 25FF25E5 | 25E025D6 | 25B32595 | 2590257D | 2578256B | 2551254C | 2542251F |
| 3CB6272F | 27162702 | 26E926BE | 26B926A6 | 26A12694 | 267A2675 | 266B2648 | 26292624 |
| 2B252ADA | 2A9A2A76 | 2A6D2A68 | 2A412A3C | 29EF29EA | 29942978 | 27893CD4 | 3CD03CCC |
| 2D442D27 | 2D222D15 | 2CF12CEC | 2CE22CB5 | 2C5B2C22 | 2C1B2BA7 | 2B5F2B56 | 2B512B2A |
| 2E9F2E7C | 2E5D2E58 | 2E462E41 | 2E342E1B | 2E162E0C | 2DEA2DD1 | 2DB52D95 | 2D7C2D49 |
| 2F862F81 | 2F6E2F69 | 2F5C2F42 | 2F3D2F33 | 2F102EF2 | 2EED2EDA | 2ED52EC8 | 2EAE2EA9 |
| 310D3105 | 30EA308C | 3073305F | 3046301B | 30163003 | 2FFE2FF1 | 2FD72FD2 | 2FC82FA5 |
| 3CE63CE2 | 3CDE3CD8 | 32B3329A | 32723259 | 3245322C | 320931F0 | 31C031A4 | 3177315E |
| 359C3D02 | 3CFE3CFA | 3CF63CF2 | 3CEE3CEA | 356D3558 | 354A3535 | 351B3502 | 34FD34EC |
| 39513909 | 3901386A | 37F337D7 | 3784377B | 37763749 | 37443700 | 35FE35BD | 35B835A1 |
| E53AE536 | E5320008 | 000B3B03 | 3AF43ADC | 39C03D16 | 3D123D0A | 3D0639A3 | 398A396A |
| D3CED3B8 | D3B3D38A | D353D340 | D336D32C | 0014000B | 00220004 | 00020006 | 000DE53E |
| B040B03C | B038B034 | B030B02C | B028B024 | B0200106 | 00098DB6 | 0002000A | D44FD410 |
| A429A420 | A3FFA3D5 | A3C3A3B2 | A386A379 | A364A34A | A309A2E8 | A2CBA299 | A28DA279 |
| B064B060 | B05CB058 | B054B050 | B04CB048 | B044A587 | A550A544 | A52BA470 | A464A455 |
| A827A810 | A7F8A791 | A780A767 | A758A737 | A728A711 | A6F9A5F0 | A5D9A5CA | A5B3B068 |
| A9A1A988 | A979A958 | A949A932 | A912A8FC | A8CDA8BE | A8A7A88B | A881A86F | A85CA836 |
| AB78AB61 | AB41AB2B | AAFCAAED | AAD6AABA | AAA8AA94 | AA8BAA65 | AA56AA3F | AA1FA9B2 |
| AD2BAD1C | AD05ACE9 | ACD7ACC3 | ACBAAC94 | AC85AC6E | AC4EABE1 | ABD0ABB7 | ABA8AB87 |
| AF1AAF09 | AEF7AEE6 | AEBCAEAF | AE9AAE7A | AE55AE2E | AE0BADB5 | ADA6AD8F | AD6FAD5A |
| 7510750C | 75087504 | 01200008 | B018B010 | AFFEAFCD | AFBBAFA6 | AF95AF5C | AF4FAF3A |
| 7560755C | 75587554 | 75507534 | 752851BF | 51875175 | 51637524 | 7520751C | 75187514 |
| 53CA5373 | 536E532C | 532752E4 | 52DF529C | 52975261 | 525C5226 | 5221757C | 75687564 |
| 56C355D4 | 75AA75A6 | 75A2759E | 759A7596 | 7592758E | 758A7586 | 7580548F | 548A543E |
| 5F365F26 | 5F065F01 | 5EE15EA7 | 5EA25E82 | 5E575E52 | 5E325E07 | 5E025DE2 | 5D48580A |
| 62C162BC | 629C6202 | 61CE61C9 | 61BC6012 | 600D6000 | 5FC65FC1 | 5FB45F7A | 5F755F68 |
| 6BE86BC0 | 695468EC | 68E768CD | 68BB63BD | 63B86398 | 6361635C | 633C6311 | 630C62EC |
| 70387010 | 6F256F20 | 6EE96EC1 | 6E486E43 | 6E106DE8 | 6CFD6CF8 | 6CC16C99 | 6C206C1B |
| 72BA7294 | 726F7221 | 721471F9 | 71E071D3 | 71B875B6 | 7152714D | 711670EE | 7070706B |
| 91889184 | 00D8000B | 74AF74AA | 744873E7 | 73D673C2 | 73987343 | 732A7312 | 72FB72E1 |
| 8F228F13 | 8EFF8ED4 | 8EC58EAC | 8E648E4B | 8E048DEB | 8D9B919C | 91989194 | 9190918C |
| 91499130 | 910790EE | 90D090B7 | 9098907F | 9037901E | 8FD78FBE | 8F6E8F47 | 8F308F29 |
| 662E662A | 66266622 | 661E661A | 66166612 | 660E660A | 60FD60EA | 917C9175 | 916E915F |
| 62516245 | 62406237 | 622E6214 | 61F261D6 | 61B861A3 | 61896167 | 6144613F | 6136611A |
| 6397636B | 63586344 | 6325631A | 630C62D0 | 62BF62BA | 62B2629B | 6289626A | 62656256 |
| 64F364D0 | 64B964A2 | 648B663E | 663A6636 | 66326457 | 6443642F | 64156403 | 63F063BB |
| 45084504 | 450044FC | 02160009 | 65FF65E6 | 65DC65D2 | 65C865B7 | 65906553 | 6526650F |
| 31203106 | 30E030B5 | 30A63084 | 306B3043 | 30342FFA | 2FE82FCC | 2FBF2FAB | 2F942F81 |
| 453C4538 | 45344530 | 452C4528 | 45244520 | 451C4518 | 45144510 | 450C313A | 31323128 |

| | | | | | | | |
|---|---|---|---|---|---|---|---|
| 32613247 | 322E3226 | 320C31F2 | 31EA31C4 | 31BA319F | 31973171 | 31674548 | 45444540 |
| 33BB33B3 | 33993380 | 3378335E | 3315330D | 32F332DA | 32D232B8 | 32A4329C | 32823269 |
| 455C4558 | 45544550 | 454C34A6 | 349B3493 | 3479345E | 3456343C | 3424340F | 340733ED |
| 370436ED | 35FB358C | 3584356A | 3547352E | 351F34F7 | 34E334DC | 34CA4572 | 456C4568 |
| 37A7377F | 376B3764 | 3752458A | 45864582 | 457E457A | 45763730 | 3728371E | 37193711 |
| 38E038CA | 38C238A8 | 3893388B | 38713858 | 38503836 | 381D3815 | 37FB37E1 | 37CF37B6 |
| 3A943A7A | 3A723A58 | 3A263A1E | 3A0439EB | 39E339C9 | 397D3946 | 393E3924 | 390238FA |
| 3C3C3C34 | 3C2A3C22 | 3C083BE7 | 3BD23BCA | 3BBD3BA2 | 3B8B3B7D | 3B6B3B59 | 3B473B35 |
| 3DBE3D92 | 3D833D61 | 3D483D20 | 3D113CD7 | 3CC53CA9 | 3C9C3C88 | 3C713C5E | 4592458E |
| 3ED83E9C | 3E8F3E7B | 3E643E51 | 45A2459E | 459A4596 | 3E303E28 | 3E1E3E16 | 3DFC3DE4 |
| 40F640EE | 40D440BB | 40B34099 | 407D4056 | 402A401B | 3FF93FE0 | 3FB83FA9 | 3F0D3EFB |
| 425F4257 | 423D41F1 | 41DB41D3 | 41B941A0 | 4198417E | 41684160 | 41464131 | 4129410F |
| 45C245BE | 45BA45B6 | 45B245AE | 45AA45A6 | 430042F8 | 42EE42E6 | 42CC429A | 42924278 |
| 44684453 | 444B4437 | 441343FB | 43E143D9 | 43C643A0 | 4396437B | 43734360 | 4337432D |
| 6E4A6E46 | 6E426E3E | 026C0007 | 78FC0002 | 000A44F4 | 44E244CB | 44C044B8 | 44A44480 |
| 6E5E3983 | 3975396B | 39223918 | 38CF38C5 | 387D386B | 384F3845 | 6E5A6E56 | 6E526E4E |
| 3BB63A14 | 39EB39E1 | 39B839AE | 39956E92 | 6E7E6E7A | 6E766E72 | 6E6E6E6A | 6E666E62 |
| 3EF33EDB | 3D493D44 | 3D1A3D04 | 3CEC3CAC | 3CA73C7D | 3C673C4F | 3C133C0E | 3BE43BCE |
| 422E4218 | 4200406E | 4069403F | 40294011 | 3FD13FCC | 3FA23F8C | 3F743F38 | 3F333F09 |
| 457D4553 | 453D4525 | 4393438E | 4364434E | 433642F6 | 42F142C7 | 42B14299 | 425D4258 |
| 4890488B | 4861484B | 483346B8 | 46B34689 | 4673465B | 461B4616 | 45EC45D6 | 45BE4582 |
| 4BDA4B9E | 4B994B6F | 4B594B41 | 49C649C1 | 49974981 | 49694929 | 492448FA | 48E448CC |
| 4F004EE8 | 4EAC4EA7 | 4E7D4E67 | 4E4F4CD4 | 4CCF4CA5 | 4C8F4C77 | 4C374C32 | 4C084BF2 |
| 51FD51E7 | 51CF5193 | 518E5164 | 514E5136 | 4FE24FDD | 4FB34F9D | 4F854F45 | 4F404F16 |
| 5381535B | 53516EA2 | 6E9E6E9A | 6E96532A | 531152C9 | 52C4529A | 5284526C | 522C5227 |
| 5623560B | 54695440 | 5436540D | 54036EBA | 6EB66EB2 | 6EAE6EAA | 6EA653DD | 53CF53A0 |
| 595E5948 | 5930579E | 5799576F | 57595741 | 570156FC | 56D256BC | 56A45668 | 56635639 |
| 5CAD5C83 | 5C6D5C55 | 5AC35ABE | 5A945A7E | 5A665A26 | 5A2159F7 | 59E159C9 | 598D5988 |
| 5FD75FD2 | 5FA85F92 | 5F7A5DE8 | 5DE35DB9 | 5DA35D8B | 5D4B5D46 | 5D1C5D06 | 5CEE5CB2 |
| 632162E5 | 62E062B6 | 62A06288 | 610D6108 | 60DE60C8 | 60B06070 | 606B6041 | 602B6013 |
| 6647662F | 65F365EE | 65C465AE | 6596641B | 641663EC | 63D663BE | 637E6379 | 634F6339 |
| 696B6955 | 693D6901 | 68FC68D2 | 68BC68A4 | 67296724 | 66FA66E4 | 66CC668C | 6687665D |
| 6C7C6C52 | 6C3C6C24 | 6BE86BE3 | 6BB96BA3 | 6B8B6A37 | 6A326A08 | 69F269DA | 699A6995 |
| 6DF56DD6 | 6DB06DA6 | 6ECA6EC6 | 6EC26EBE | 6D7F6D66 | 6D1E6D19 | 6CEF6CD9 | 6CC16C81 |
| 92259217 | 920591ED | 91D791C8 | 95849580 | 957C9578 | 95749570 | 0092000B | 6E326E24 |
| 934A932F | 9319930A | 95949588 | 92D592C3 | 92B592A3 | 9291927F | 926D925B | 92499237 |
| 947E946C | 945E944C | 943A9428 | 94169404 | 93F293E0 | 93CE93C0 | 93AE9396 | 93809371 |
| ACC4ACC0 | ACBCACB8 | ACB4ACB0 | ACAC9555 | 9550951E | 951994DF | 94DA94BD | 94B89598 |
| 98BE029A | 0008AC9E | AC7FAC54 | AC39AC1E | ABA4AB70 | AADDAAB8 | AA67AA3E | AA19A9F0 |
| 76AD7696 | 766C763C | 760A75D2 | 98E698E2 | 98DE98DA | 98D698D2 | 98CE98CA | 98C698C2 |
| 78477826 | 781D98F6 | 77F377EB | 77E077CC | 77997783 | 775F98F2 | 98EE98EA | 76E876CA |
| 7A4E7A18 | 7A0F79D9 | 79D079B2 | 797C7973 | 793D7934 | 78FE78F4 | 78BE78B5 | 787F7876 |
| 7BFA7BDC | 7BBE7B96 | 7B8D7B6F | 7B517B29 | 7B167B0D | 7AE57ADC | 7ABE7A88 | 7A7F7A57 |
| 7DE77DC9 | 7D997D7A | 7D717D3B | 7D327CFC | 7CF37CBD | 7CB47C7E | 7C757C57 | 7C397C03 |
| 7FAA7FA1 | 7F727F69 | 7F4B7F1C | 7F137EE4 | 7EDB7EBD | 7E8E7E85 | 7E677E2C | 7E237E05 |
| 81838154 | 814B811C | 811380F5 | 80D780A8 | 809F8081 | 80528049 | 801A8011 | 7FE27FD9 |
| 832E8325 | 830782D8 | 82CF82A0 | 82978268 | 824E8245 | 821681FC | 81F381C4 | 81BB818C |
| 84C384A9 | 848F8475 | 846C843D | 84348407 | 83F883E9 | 83DA83C0 | 83B78399 | 837B835D |
| 86808677 | 86598623 | 861A85E4 | 85C385BA | 858B8582 | 85648546 | 85208513 | 84FB84F2 |
| 886C8863 | 88458827 | 87F187E8 | 87CA87AC | 878E8770 | 8752871C | 871386F5 | 86D786A1 |
| 8A3A8A1C | 89ED89E4 | 89B589AC | 897D8974 | 89568927 | 891E88EF | 88E688BE | 88B5888D |
| 8BF78BCF | 8BC68BA8 | 8B8A8B5B | 8B528B23 | 8B1A8AEB | 8AE28AB3 | 8AAA8A7B | 8A728A43 |
| 8DDC8DAD | 8D938D8A | 8D6C8D3D | 8D348D16 | 8CDB8CD2 | 8CB48C96 | 8C608C3F | 8C1E8C15 |
| 8F8A8F73 | 8F6A8F3E | 8F358F17 | 8EF98EDB | 8EBD8E8D | 8E738E6A | 8E3B8E32 | 8E038DFA |
| 990A9906 | 990298FE | 911090F5 | 90C590B7 | 906F9055 | 98FA9014 | 8FFA8FF1 | 8FD38FB5 |
| 994A9946 | 9942993E | 993A9936 | 9932992E | 992A9926 | 9922991E | 991A9916 | 9912990E |
| 930792DA | 92B49287 | 925A9250 | 92469219 | 920A91E5 | 91C191B7 | 91AC9188 | 91799153 |
| 959F9596 | 994E953A | 9531952A | 95209518 | 94A7947B | 94339412 | 93B9939F | 93749341 |
| 97759757 | 9739971B | 96F396E9 | 96CB96AD | 9685967B | 965D9635 | 962B960D | 95DE95D5 |
| 132A1326 | 00F4000A | 989F9895 | 98779859 | 98319827 | 99569952 | 97CF97C5 | 97A7977F |
| 136A1366 | 1362135E | 135A1356 | 1352134E | 134A1346 | 1342133E | 133A1336 | 1332132E |
| 13AA13A6 | 13A2139E | 139A1396 | 1392138E | 138A1386 | 1382137E | 137A1376 | 1372136E |
| 13EA13E6 | 13E213DE | 13DA13D6 | 13D213CE | 13CA13C6 | 13C213BE | 13BA13B6 | 13B213AE |
| 14581454 | 1450144C | 14481444 | 1440143C | 14381434 | 1430142C | 14281424 | 1420141C |

| | | | | | | | |
|---|---|---|---|---|---|---|---|
| 14981494 | 1490148C | 14881484 | 1480147C | 14781474 | 1470146C | 14681464 | 1460145C |
| 14D814D4 | 14D014CC | 14C814C4 | 14C014BC | 14B814B4 | 14B014AC | 14A814A4 | 14A0149C |
| 15181514 | 1510150C | 15081504 | 150014FC | 14F814F4 | 14F014EC | 14E814E4 | 14E014DC |
| FFC2FFBE | FFBAFFB6 | FFB2FFAE | 01660006 | 15381534 | 1530152C | 15281524 | 1520151C |
| EFB1EF98 | EF8FEF71 | EF53EF35 | EF17EEF9 | EEDBEEAC | EEA3EE7A | EE49EE32 | EE06FFC6 |
| FFCEFFCA | F13BF132 | F103F0FA | F0CBF0C2 | F093F08A | F05BF052 | F034F016 | EFF8EFDA |
| F2E8F2D3 | F2CAF2A1 | F284F236 | F21FF1F5 | F1C5F193 | F164FFE2 | FFDEFFDA | FFD6FFD2 |
| F450F43B | F432F414 | F3DCF3CF | FFE6F3AF | F39AF391 | F368F355 | F342F32F | F31AF311 |
| F5EBF5E2 | F5C4F58C | F57FF55F | F54CF539 | F524F51A | F4FCF4D3 | F4BEF4B5 | F497F479 |
| F7B5F77D | F770F72C | F717F70E | F6F0F6B8 | F6ABF692 | F67FF66A | F661F643 | F619F600 |
| F933F929 | F90BF8D3 | F8C6F8A6 | F891F887 | F85EF84B | F836F82D | F804F7F1 | F7DCF7D3 |
| FABBFA8C | FA82FA53 | FA49FA20 | FA16F9E8 | F9DEF9B5 | F996F989 | FFEAF970 | F95CF948 |
| FC83FC54 | FC4AFC1B | FC11FBE2 | FBD8FBA9 | FB9FFB70 | FB66FB37 | FB2DFAFE | FAF4FAC5 |
| FE33FE29 | FE0BFDED | FDBEFDB4 | FD85FD7B | FD52FD38 | FD2EFCFF | FCE4FCDA | FCBCFC8D |
| 874C0002 | 000AFF9D | FF93FF64 | FF5AFF3C | FF0DFEF8 | FEDEFED4 | FEA5FE9B | FE6CFE62 |
| CF18CF14 | CF10CF0C | CF08CF04 | CF00CEFC | CEF6CEE8 | CEE4CED8 | CED4CED0 | 01E40007 |
| CF92CF86 | CF72CF6E | CF6ACF66 | CF62CF5E | CF5ACF56 | CF42CF2C | CF28CF24 | CF20CF1C |
| A24DA220 | A202A1EC | A1CED002 | CFFECFFA | CFF6CFF2 | CFEECFEA | CFE6CFD2 | CFCECFB6 |
| A5D1A4E0 | A496A486 | A47CA42B | A413A3E6 | A3D6A3C4 | A3BFA3B6 | A367A2AF | A2AAA2A1 |
| A793A78A | A762A753 | A729A6D5 | A6ACA6A7 | A687A682 | A66EA64A | A634A62F | A5F8A5F3 |
| A9BDA9A3 | A980A966 | A942A878 | A862A853 | A84AA7FF | A7FAA7F1 | A7C4A7BF | A7B6A798 |
| ABF9ABBB | ABB6AB76 | AB57AB34 | AAF4AAE5 | AAC4AA27 | AA12A9FC | A9EDA9E4 | A9D7A9CA |
| AF25AF1C | AF13AE05 | AE00ADE5 | AD61AD5C | AD3CAD15 | AD01ACAE | ACA9AC69 | AC55AC28 |
| B2EAB2D8 | B27AB275 | B266B25D | B23EB1FA | B1F5B114 | B10FAFE0 | AF86AF81 | AF50AF2A |
| B77BB730 | B67FB67A | B63BB5E8 | B50CB499 | B494B44D | B448B436 | B3AEB33B | B336B2EF |
| BBC5BB0D | BB08BAB5 | B9D0B9CB | B97DB936 | B929B8F6 | B88AB855 | B850B802 | B7BBB7AE |
| BFF9BFF0 | BFE7BF5F | BF56BF07 | BEFEBEA3 | BE9ABE4E | BE45BD30 | BD2BBC73 | BC6EBBCA |
| C363C34C | C337C31D | C318C30F | C2DCC2AF | C299C286 | C274C25E | C24FC184 | C095BFFE |
| C554C4A5 | C45EC459 | C442C42D | C40FC40A | C3F3C3DE | C3C0C3BB | C3B2C39B | C386C368 |
| D048CCFA | CCF5CCAA | CCA5CC8C | CC59CC54 | CC09CC04 | CBEDC744 | C5F8D02E | D02AD026 |
| EFFCEFF8 | EFF4EFF0 | EFEC03B4 | 00040214 | 0210020C | 00060005 | CEA4CE88 | CE6BCE47 |
| F03CF038 | F034F030 | F02CF028 | F024F020 | F01CF018 | F014F010 | F00CF008 | F004F000 |
| F094F090 | F08CF088 | F074F068 | F064F060 | F05CF058 | F054F050 | F04CF048 | F044F040 |
| F126F102 | F0F6F0EA | F0E6F0E2 | F0DEF0DA | F0D6F0D2 | F0CEF0CA | F0C6F0B0 | F09CF098 |
| 92B2F182 | F17AF176 | F172F16E | F16AF166 | F15AF156 | F150F14C | F148F144 | F140F12A |
| 95209516 | 94EE94E4 | 94BC94B2 | 948A9480 | 9458944E | 9426941C | 93EC93E2 | 936F92ED |
| 96B09698 | 96809668 | 96509638 | 96209608 | 95F095D8 | 95C095A8 | 95909586 | 9558954E |
| 9827981B | 980C9803 | 97FA97EE | 97DC97CC | 97C2978B | 9781974A | 97409709 | 96FF96C8 |
| 99DF98EE | 98E998CC | 98B098A2 | 9893988A | 98819875 | 9866985D | 98549848 | 98399830 |
| 9E6F9E56 | 9E3D9E24 | 9DFC9DB5 | 9C379C1A | 9B509B3A | 9B029AEC | 9A9E9A60 | 9A359A0A |
| A665A613 | A344A2F2 | A2A0A02F | A019A00A | 9F9B9F68 | 9EFE9EE8 | 9ED99EAC | 9E9D9E88 |
| A867A85E | A855A830 | A82BA81B | A816A806 | A801A7F1 | A7ECA7C9 | A79EA773 | A748A6B7 |
| AACAAAC0 | A957A93B | A925A8EE | A8DFA8D6 | A8CDA8C4 | A8BBA8B2 | A891A882 | A879A870 |
| AC52AC3A | AC22AC0A | ABF2ABDA | ABC2ABAA | AB92AB7A | AB62AB4A | AB32AB1A | AB02AAEA |
| AD63AD59 | AD4FAD3E | AD27AD1D | AD13AD03 | ACECACE3 | ACDAACCA | ACB2AC9A | AC82AC6A |
| B03DB012 | B00DAFCE | AFADAF77 | AF61AF4D | AE1FADFE | ADC6ADB6 | AD9FAD95 | AD8BAD7A |
| B18EB17F | B175B153 | B144B13A | B130B126 | B11CB095 | B090B085 | B073B06E | B063B042 |
| B381B377 | B363B35E | B354B34A | B336B331 | B327B31D | B241B23C | B20FB1F0 | B1EBB1A4 |
| B639B634 | B5C9B5C4 | B587B582 | B52EB529 | B4D8B4D3 | B44CB436 | B3F8B3E2 | B390B38B |
| B8CEB8B1 | B897B87B | B860B845 | B7D9B7D4 | B797B792 | B73EB739 | B6E8B6E3 | B68FB68A |
| BDC7BD73 | BD33BCD3 | BC93BC35 | BBF9BB9D | BB5DBAEE | BAAEBA41 | BA05B91F | B905B8E8 |
| C2D3C2B9 | C18FC143 | C0EFC0A3 | C04FC00B | BFB7BF3A | BF35BEFE | BE81BE7C | BE45BDCC |
| CBB7C945 | C87BC83E | C6D0C612 | C554C54F | C510C4F6 | C434C42F | C3F0C3D6 | C314C30F |
| D04FD03A | CFCCCFB6 | CF65CF60 | CED7CEC1 | CE96CE81 | CE11CD42 | CCEDCCAA | CC4FCBFA |
| D3FED3F9 | D3D7D3B4 | D3A5D39B | D391D387 | D1B3D19D | D15FD15A | D143D127 | D090D07A |
| D825D7D0 | D7CBD779 | D729D6DF | D68AD685 | D633D5E3 | D599D544 | D53FD4ED | D49DD453 |
| DD8ADD3A | DCF0DC9B | DC96DC44 | DBF4DBAA | DB55DB50 | DB2ED9A8 | D93BD8DE | D8D9D86F |
| E1D7E185 | E180E0FF | E092E035 | E030DFC6 | DF7CDF27 | DF22DED0 | DE80DE36 | DDE1DDDC |
| E647E61E | E619E5F4 | E5D4E571 | E54EE428 | E3B1E3AC | E346E341 | E2F4E2EF | E289E284 |
| E8A3E7D2 | E7BDE780 | E77BE772 | E750E730 | E707E702 | E6E0E6C0 | E697E692 | E689E667 |
| 75CE7AB0 | 7A9C7A90 | 7A8C7A88 | 7A847A80 | 7A7C00D2 | 000BEEB5 | E9A3F1AE | F1AAF19E |
| 77877733 | 771D7702 | 76F076DA | 76B876A1 | 768B7679 | 7663764D | 762F760B | 75F875D3 |
| 7A0579B5 | 799F7990 | 795F795A | 792678B8 | 78B3787A | 78367831 | 77FD77B1 | 77AC77A1 |
| 56605639 | 562F55F9 | 5B4E5B4A | 5B465B42 | E314E2E5 | E2D7E2B7 | E2A9E320 | 7A1A7A15 |

| | | | | | | | |
|---|---|---|---|---|---|---|---|
| 5B5A5B56 | 58FE58B2 | 58905886 | 587C581C | 57B35780 | 57445B52 | 571056DD | 56BB5699 |
| 5B765AB0 | 5A8D5A6A | 5A4B5A2D | 5A105A04 | 59E059BC | 5B725B6E | 5B6A5B66 | 5B625B5E |
| C810C7DF | C7CDC7AF | C824C782 | C752C722 | C6F2C6C2 | C692C820 | C81C5B35 | 5B205AF5 |
| B894B890 | B88CB888 | B884B878 | B874B870 | B86CB868 | B864B850 | B844B840 | 01840008 |
| 9B6E9B65 | 9B4F9B40 | 9B379B2A | 9B1D9B10 | 9B039AED | 9975B902 | B8FEB8C0 | B8B4B8A0 |
| 9E179E12 | 9DF49DB2 | 9D629D51 | 9D029CE1 | 9CD59C3A | 9C259C0F | 9BF49BCE | 9B939B7D |
| A041A03C | A02FA003 | 9FA59FA0 | 9F869F69 | 9F569F10 | 9F0B9EEF | 9EEA9EE0 | 9E559E50 |
| A2CAA2A2 | A289A25D | A252A249 | A235A21C | A11FA105 | A0F5A0F0 | A0D7A075 | A070A052 |
| A491A479 | A45CA44A | A445A421 | A40DA3A8 | A3A3A38B | A36EA35C | A357A333 | A320A2E3 |
| A81FA811 | A808A7FD | A7E7A7AB | A7A6A78C | A76FA75C | A737A72B | A690A67B | A501A496 |
| A96BA93C | A927A909 | A8CDA8B8 | A89AA895 | A87EA869 | B91AB916 | B912B90E | B90AB906 |
| B94AB946 | B942AAD9 | AAC5AA70 | AA61AA56 | AA2CB91E | A9FCA9F7 | A9EEA9DA | A99EA989 |
| AF76AE2A | B962B95E | B95AADA0 | AD8CAD45 | AD36AD2B | AD01B956 | AC42ABBC | AB98AB74 |
| B99CB46A | B454B445 | B42BB426 | B406B3F0 | B3E1B3CB | B3B5B3A6 | B387B998 | B984B980 |
| B798B793 | B778B726 | B6E7B6E2 | B6CAB67E | B641B63C | B621B5FF | B537B532 | B4C1B4AB |
| CBD8CBB5 | CBADCB97 | D740D73C | D738D734 | D730D72C | 00880009 | B82EB829 | B80EB7EC |
| CD65CD46 | CCB8CCB3 | CCAED756 | D752D74E | D74ACC96 | CC8ED744 | CC69CC53 | CC3ACC13 |
| D772D046 | D041CFEC | CFE7CFA5 | CFA0CF4B | CF46CEA0 | D75ACE6D | CE54CE2D | CE17CDFA |
| D7B2D50A | D44FD79A | D796D792 | D78ED379 | D368D353 | D78AD77E | D0D7D0D2 | D099D07A |
| D722D70E | D70AD706 | 00E40008 | D721D6FD | D6DDD6BC | D693D66F | D64FD62E | D7BAD7B6 |
| BD87BD79 | BD16BD00 | BCFBBCC9 | BC74BB63 | BB5EBA14 | B9F3B9CF | D744D740 | D73CD738 |
| C218C1D1 | C1B5C191 | C15FC148 | C111C0FA | C0B6C09F | C045C00F | BFF5BF10 | BE58BD8C |
| C505C500 | C4BEC49D | C479C44A | D74EC3F6 | C3D2C3B8 | C37CC35D | C318C2F3 | C2C5C27B |
| CB01CA9E | CA57CA3B | CA17C927 | C922C917 | C8B4C89E | C899C867 | C80FC6FD | C6F8C5B7 |
| D03AD035 | D003CFAB | CE99CE94 | CD53CCA5 | CCA0CC5E | CC3DCC19 | CBEACB9E | CB79CB4B |
| D4B4D48A | D474D45C | D33AD315 | D2E7D29D | D23AD1F3 | D1D7D1B3 | D0C3D0BE | D0B3D050 |
| 008C000B | D6E4D6DF | D6CBD5CB | D5C6D59C | D586D56E | D542D53D | D513D4FD | D4E5D4B9 |
| 33753344 | 332932F8 | 32DD32B6 | 329B317C | 380E380A | 38063802 | 37FE37FA | 37F6314A |
| 371236AF | 38223625 | 360A35DB | 381E35C5 | 354E34FC | 34C5344A | 381A3816 | 38123390 |
| B990B98C | B7A4B79D | B787B988 | B98437EB | 37C7382A | 378F3774 | 38263749 | 3744372F |
| B8B0B890 | B86AB84A | B824B804 | B7E2B7B9 | B9B0B9AC | B9A8B9A4 | B9A0B99C | B998B994 |
| FF1EF724 | F71CF708 | F6F4F6E7 | F6D3FF1A | 00BC0009 | B94FB937 | B92FB91B | B8F6B8D6 |
| F845F82D | F823F806 | F7F8F7E9 | F7DCF7B8 | F7A4F790 | F77CF768 | F758F744 | FF26FF22 |
| F9BDFF6E | FF6AFF66 | FF62FF5E | FF5AF99C | F988F91F | F91AFF56 | FF52FF2E | FF2AF855 |
| FBC0FBB0 | FB8CFB37 | FB27FAFA | FADBFACE | FABEFA93 | FA80FA5C | FA34FA27 | FA17F9CA |
| FCE8FCD6 | FCBEFC9C | FC6CFF84 | FF80FF7C | FF78FF74 | FC46FC39 | FC29FC16 | FBE7FBD0 |
| FFA8FFA4 | FFA0FF9C | FDE8FD9C | FD84FD76 | FD53FD23 | FF98FF94 | FF90FF8C | FF88FCFA |
| 7562755E | 755A7556 | 75527546 | 7542753E | 0074000B | FF0EFEE4 | FED4FEAC | FE85FE44 |
| 757E757A | 75767572 | 756E756A | 71BD71B8 | 75667199 | 717D712A | 7121711C | 70F170EA |
| 73E77387 | 73297592 | 758E7319 | 731172F5 | 72627246 | 71F771DE | 71D671CC | 758A7582 |
| 74B67497 | 747E7475 | 7456744E | 74497440 | 74377405 | 75AA75A6 | 75A2759E | 759A7596 |
| FF3EFF3A | FF36FF32 | FF2EFF2A | FF26FF22 | FF1EFF1A | FF16FF12 | 00A20008 | 74D874BF |
| FF52F6A8 | F68FF606 | F5EDF5DD | F5C2F576 | F55DF54F | F525F505 | FF4EFF4A | FF46FF42 |
| FF90FF84 | FF78FF74 | FF70F91E | FF6CFF68 | F895F88E | F81EF7C0 | FF64FF5E | FF5AFF56 |
| FB4EFAEF | FAD6FA83 | FA7AFA75 | FA48FA2F | FA12F9F5 | F9F0F9D0 | F9A9F9A2 | FF98FF94 |
| FEB3FFBC | FFB8FE82 | FE6BFE5D | FE25FDD0 | FD9FFD5E | FD4FFD2E | FD29FCB3 | FCAEFB69 |
| 9E089DF5 | 9DD19DB8 | 9D79A06E | A06AA066 | A0620036 | 000BFF05 | FEF0FEE2 | FEC9FEC4 |
| 9FED9FDA | 9FC79FB4 | 9FA19F8E | 9F7B9F68 | 9F559F25 | 9EEC9EC4 | 9E9B9E41 | 9E2E9E1B |
| 8D348D30 | 8D2C8D28 | 8D228D1E | 8D1A8D16 | 8D1200F2 | 000B5C0C | 0002000A | A057A026 |
| 8B488AAA | 8A988A6A | 8A658A3F | 8A3589F6 | 89EC8986 | 88FF8D4A | 8D468D42 | 8D3C8D38 |
| C33EC310 | C2FFC2E3 | C2CDC2BF | C2AAC464 | C460C26B | C2668C79 | 8C6B8C36 | 8B8B8B78 |
| 5DD45DC5 | 5D885D79 | 5D3C5D2D | 5CF05CE1 | 5CA45C95 | C451C46E | C46AC394 | C37FC36A |
| A491A483 | A46CA45E | 5FD25FCD | 5F295F07 | 5EE95ECB | 5EB15E93 | 5E795E5F | 5E1F5E10 |
| A598A6D4 | A577A6D0 | A556A6CC | A535A6C8 | A514A6C4 | A4F3A6C0 | A4D2A4C4 | A4B6A49F |
| A6B4A6A9 | A6A1A687 | A671A669 | A648A6DC | A626A61B | A613A5F9 | A5E3A5DB | A5BAA6D8 |
| BB82BB7D | BB6CBB44 | BB3FBB32 | BAE5BBEC | BBE8BBE4 | BBE0BBDC | BBD8BBD4 | BBD0BBCC |
| FF56FF52 | FF4EFF4A | FF46FF42 | FF3EFF3A | FF36FF32 | F1CEFF2E | FF2AFF26 | 00EA0004 |
| F234F1FB | F1F1FF92 | FF8EFF8A | FF86FF82 | FF76FF72 | FF6EFF6A | FF66FF62 | FF5EFF5A |
| F4BCF480 | F3BBF398 | F34BF332 | F2F1F2D8 | F2CFF2B7 | F2B2F2A5 | F298F26E | F269F25C |
| F5ABF59E | F574F56F | F562F53A | FFB2FFAE | FFAAFFA6 | FFA2FF9E | FF9AFF96 | F4DCF4CB |
| F86FF84A | F842F839 | F7ECF79A | F78BF74F | F68AF667 | F60EF5F7 | F5DEF5D5 | F5BDF5B8 |
| FB8DFB82 | FB79FB1B | FAF8FAD7 | FA92FA83 | F9C8F96C | F92BF921 | F903F8E0 | F8D6F8C5 |
| FD67FD4F | FD4AFD3D | FD30FD06 | FD01FCF4 | FCCCFFC6 | FFC2FFBE | FC86FC77 | FC22FBE9 |
| 91E891E4 | 91E091DC | 91D891D4 | 91D00132 | 0009FF19 | FE77FE66 | FD9BFD7E | FD79FD6C |

92289224 9220921C 92189214 9210920C 92089204 920091FC 91F891F4 91F091EC
9230922C 85A38595 856E853E 84A18488 8475845C 840A83F1 83BC83A3 8368834F
8923890A 924C9248 92448891 888A8813 87D7877E 871286E0 9240923C 92389234
8AA9927C 92789274 9270926C 92689264 9260925C 92588A3D 8A1F8A06 89AE8995
8C748C67 8C188C13 8C068BE3 8BDE8BD1 8B8E8B75 8B218B18 8B138AE6 8AE18AB0
92A892A4 92A0929C 92989294 9290928C 92889284 92808D17 8CFE8CBA 8CA18C79
8DBC8DB7 8D4A92DC 92D892D4 92D092CC 92C892C4 92C092BC 92B892B4 92B092AC
8FF68FE0 8FB38F82 8F698F47 8F2E8F06 8EF38EDA 8E318E2C 8E0A8E05 8DE38DDE
91A09187 91829171 92EA92E6 92E09130 911790D4 90C1909F 90789062 90369020
CCB4CC8E CCEECC72 CC26CC13 CBF5CBD3 CBADCCEA CCE6CCE2 0108000B 91C391AE
B4E4B3E1 B3BFB3A5 B4E0B4DC B361B349 B31DB305 B2D9B2BD B2A2B286 B4D8CCD6
B685B668 B63BB621 B5FEB5D1 B5C0B59A B572B565 B53EB4CC B429B410 B3FDB4E8
12441240 123C1238 12341230 12141210 120C1206 1202B75D B73BB715 B6EDB6BC
0BB40B87 0B710B54 0B370B2D 0B0C0AF2 0AC60A9B 0A7C0A08 09D909D4 09BF09BA
12480EF2 0EDE0ED0 0EB60E9B 0E750E3D 0DF30D44 0D3F0D2D 0D060D01 0CED0C7B
10F110DB 10BE10A1 10971076 105C1030 10050FE6 0F700F41 0F3C0F27 0F22124C
C8FFC8E2 C8D2C9BA C8AEC88A C86DC85D C9B6C9B2 C83911EE 11DA11CC 11AC111E
ACF5ACE4 AF6A0056 000B8D2A 0002000A C9A7C99D C98BC97E C963C948 C9BEC923
AD66AD4D AD2EAF9A AF96AF92 AF8EAF8A AF86AF82 AF7EAF7A AF76AF72 AF6EACFD
AED3AECC AEAEAE95 AE8EAE71 AE58AE4A AE42AE29 AE09ADF0 ADD1ADA7 AD9FAD86
16E416E0 002E001C 16DC16D8 01B00009 AF5FAF46 AFA2AF2B AF12AF9E AEF4AEEC
1710170C 17081704 170016FC 16F800DF 00CD00A9 00760064 16F416F0 16EC16E8
1720024A 02350220 020001D4 01C30195 017A0159 013F0114 0100171C 17181714
03B60378 17441740 173C1738 17341730 172C1728 17240324 030102DE 02AA0281
17541750 174C1748 05B00589 054B0517 050204CA 04AF0471 0449043B 03FD03C9
07900780 07600745 07280703 06F606DD 06B50659 061205D6 17641760 175C1758
09DF09C3 09BA1788 17841780 177C1778 17741770 176C086C 08370802 07BD07A5
0B450B39 0B270B0B 0AF90ADD 0ACB0AAF 0A9D0A7F 0A6D0A4F 0A3D0A21 0A0F09F1
0D350CE3 0C800C05 0BC00BA4 0B8617AC 17A817A4 17A0179C 17981794 1790178C
11281112 10E710B5 17B0106A 1062104A 10370FF9 0FBB0F71 0EE10E6B 0DE70D8E
11BB11A0 119817E0 17DC17D0 17CC17C8 17C417C0 17BC17B8 17B41167 1148113E
137A1352 13401329 131B12E8 12CB12A2 12901284 12451231 120911EE 11E111D9
15641556 15441532 150014E5 149A144D 14481419 140D13FB 13E413D6 13A31390
16571646 162B17F4 17F01607 15F915EE 15D315CE 15BD15A2 157717EC 17E817E4
0023092A 09260922 091EE196 E184E16F E150E129 E114E0F5 0238000B 16CA1688
01B10199 0178015D 0932092E 012A011A 010500EF 00CE00C7 00B10091 0046003C
094E094A 09460942 093E093A 093602B2 0294027A 0254022F 0228020C 020401DB
0469044D 03E703CF 03AC035B 03380325 02F7096A 09660962 095E095A 09560952
062D0986 0982097E 0972096E 05EC05CF 05AD057F 056A0549 04FE04DE 04AD0495
083F0838 082007FF 07E707CA 07B80783 076406D3 06CE068D 0682066D 064D0632
8440843C 80137FD6 7FB98438 84348430 09130902 08F008CA 08AD0897 0877085D
833E8330 830782F1 845C8458 84548450 825C8209 81E5844C 8448817A 8444810B
3EAB4476 84198401 83F483DF 83D583C0 83B08464 8460839E 83858372 835D8353
3F0744AA 44A644A2 449E449A 44964492 448E448A 44864482 447E447A 3ED73EC1
414D413A 412740D3 40C04096 407944B2 44AE4066 405C404D 40313F9C 3F473F38
427D426A 42574244 4231421E 420B41F8 41E541D2 41BF41AC 41994186 41734160
43AD439A 43874374 4361434E 433B4328 43154302 42EF42DC 42C942B6 42A34290
29BE29BA 29B629B2 29AE29AA 446A4457 44444431 441E440B 43F843DB 44B643C0
240B23F4 237F2372 23652337 230B2306 22F722F2 22CE22AF 226829CA 29C629C2
263A2629 260825F7 25D625C5 25A42593 25722561 25332511 24FC248B 24772432
288D287C 285B284A 28292818 27F727E6 27C527B4 27972783 270B26F7 266C265B
B232B25A B256B1A4 B252B0D3 B24EB248 B244B240 299F296A 28F128E0 28BF28AE
F694F690 F68CF688 F684F680 F67CF678 F674F670 F66CEDA9 F668F664 00920009
EEBBEEA6 EE95EE79 EE47EE2A EE0DEDEC EDD1F6B0 F6ACF6A8 F6A4F6A0 F69CF698
F205F1EB F1CAF192 F13DF123 F109F0EC F03AEFFC EFC2EF6C EF41EEFF EEE5EED0
F42DF409 F3B5F38A F341F327 F312F301 F2E5F2B3 F296F279 F258F23D F6B4F21F
7F907F8C 7F880044 000BF651 F630F605 F5B3F596 F4E4F4C3 F495F487 F472F45A
7CE17C95 7C7C7C63 7C447C28 7C0D7B82 7B667B3D 7B1E7AFF 7FA07F9C 7F987F94
00097F75 7F457F24 7F0E7EED 7ED47EBF 7E8C7E1B 7DFC7DE1 7DC57D51 7FA87FA4
B78FB767 B746B6B1 B64CB633 B5A3B2CC B298B27E B0F8BE54 BE50BE4C BE48002A
DB71DB60 DB4EDB3B DB24DADE DADBDAC2 0100000B BE2ABD31 BD0AB94C B899B871
84E984DD 84D184C5 84BA84AF 84A48499 848E8483 8478846E DBD8DBBB DB9EDB89
85938589 857D8571 88C488C0 855C8551 8546853B 852F8523 8517850B 850084F5
88E088DC 88D88675 86568651 863E8639 85F085E4 85D885CC 85C185B6 85AA859E

4A404A3C 4A384A34 4A304A2C 44D84A28 881687EF 87C887A1 877A8753 87308725
466E4A58 4A544641 463C4637 45ED45E3 4A504A4C 457D4573 4A484A44 45104506
4A7C4A78 47CB47C1 4A744A70 4754474A 4A6C4A68 4A6446DF 46D54A60 4A5C4678
49EE4A88 49C0498A 49474920 4914490A 4A844A80 48DD48D2 48C1485A 48434839
785A7856 7852784E 784A7846 02820006 E8B1E893 E880E85B E8C6E8C2 E8BE4A15
78CA78C6 78BA78B6 78AA78A6 78A2789E 789A7896 788A787E 78727866 7862785E
7912790E 790A7906 78FA78F6 78F278EE 78EA78E6 78E278DE 78DA78D6 78D278CE
430842C6 41F841C2 41BD41A6 41A1413E 3DA33D57 792A7926 7922791E 791A7916
79464497 44874467 443F441F 43FA43F5 43ED793A 79367932 792E43CA 43BC434A
4CC84CA0 4C754C18 4BF84BD9 4BBA4B9B 4B064AEE 4AC64A9E 4A734A17 4991490B
53DE53D5 53CC53C3 52195211 51FC51D4 4F984F93 4DFA4DDB 4DBC4D9D 4D084CF0
561A5611 560855FF 55F6544C 5444542F 7952794E 794A5407 540253F9 53F053E7
5A7E5A75 5A6C5925 591D5908 58E1585B 57CC5756 56CB5695 563A5635 562C5623
5C595C52 5C495C2A 5C145BE6 5B695B46 5B105ADA 5AB05AAB 5AA25A99 5A905A87
5D7A5D63 5D5C5D53 5D345D1D 5D165D0D 5CEA5CE3 5CDA5CB6 5CAF5CA2 5C835C70
5EEA5EE1 5ED85EAE 5EA75E95 5E265E1F 5E165DF4 5DED5DE4 5DC05DB9 5DAC5D8D
66FA65F5 64D16347 62DE6154 60AE609C 5FDE5F5A 5F1C5F17 5F0E5F05 5EFC5EF3
68796863 67C967B1 67AC67A3 679A6791 6788677F 6776676D 6743673C 67266710
6A306996 697E6979 69706967 695E6955 694C6943 693A6910 68F868E4 68CE688D
6B6D6B4B 6B466B3D 6B346B2B 6B226B19 6B106B07 6ADD6AC5 6AB16A9B 6A5A6A46
6E087966 6D6E6D69 6D606D57 6D4E6D45 6D3C6D33 6D2A6D00 6CA86C5D 6BC16BA8
6FE56FD4 6FC86FBC 6FB26FA1 6F956F89 6F7F6F6E 6F626F56 6F4C6F3C 6F316EE2
70EE70E5 70DC70D3 70CA70BB 70B170A0 7094706B 7058704E 703D7031 700A6FEF
74AB7497 743F740C 73E273D1 7381734E 73247310 7218711F 710E7109 710070F7
E743E7B2 E7AE0022 000B7839 770876E9 76A87681 75C67593 75697558 750874D5
00EE0009 D97AD967 D950D900 D8FDD8E4 D8CCD8AF D892D87D D865D854 E7A3E773
70347030 702C7028 70247020 701C7018 70147010 700C7008 70046FD8 6FCC6FC8
5D595D43 5D31706A 705E7052 704E704A 70465CFF 5C455C2E 5BE15B4C 703E7038
6139600E 60095FF8 5FF35F21 5EF45EC7 5E9A5E09 5DE95DC9 5DA95D8A 5D855D5E
63D863D3 63776372 6342633D 62D36227 61F661E1 61DC61A2 619D6163 615E613E
65396534 64FA64F5 64976492 647B6476 646B6452 644D6436 64316426 640D6408
6B636B2A 6B026A37 69A86998 6943670D 66EE66CB 661C65FE 65B765B2 65786573
6E376E26 6E216E15 6DB86DA2 6D8C6D77 6CDE6CAC 6C6C6C4B 6C176BD7 6B976B7B
E941E92A E913E8F9 E8DCEEB9 EEA2035C 000B6FBC 6FA26F32 6F196EE9 6ED06E3C
1A8F21EC 1A6321E8 A36BA35D A307A284 A1D1A171 A0F3A3B2 A3AEA3A8 A3A4A3A0
1C7A1C4D 1C231C0F 21F81BDD 1BA71B71 1B4D1B23 1B0F21F4 1AE31ACF 21F01AA3
22081E66 1E522204 1E1A1DED 1DBD1D8D 1D5A1D30 1D0C1CF8 22001CC3 1CAF21FC
20392025 22181FF0 1FDC2214 1FA71F74 1F4A1F36 22101EFE 1EEA220C 1EB21E9E
6C016BEE 6BDB6BC8 6BB56BA2 21DD21B7 2187215D 21332109 20D9221C 208D2063
6D316D1E 6D0B6CF8 6CE56CD2 6CBF6CAC 6C996C86 6C736C60 6C4D6C3A 6C276C14
6E616E4E 6E3B6E28 6E156E02 6DEF6DDC 6DC96DB6 6DA36D90 6D7D6D6A 6D576D44
6F916F7E 6F6B6F58 6F456F32 6F1F6F0C 6EF96EE6 6ED36EC0 6EAD6E9A 6E876E74
DD25DD14 709B7088 70757062 704F703C 70297016 70036FF0 6FDD6FCA 6FB76FA4
DCC4DC9C DC88DC67 DC46DC1E DC0DDE1E DE07DDB9 DDA1DD84 DD6FDD57 DD46DD34
CF1CCEF6 CEDFCEC0 CE99BF9A BF52BF47 BF29BE9F BE57BE4C BE2EC046 DCFDDCF0
D6B6D699 D688D66F D64ED628 D617D5FE D5DDCFF8 CFE1CFC2 CF96CF79 CF62CF43
A9D8A9D4 A9D0A9CC A9C8A9C4 A9C0E830 E7FEE7CE E842E83E E83AD700 D6EFD6D6
A963A945 A924A903 A8ECA8D4 A8BAA847 A80DA7F3 A7C7A79A A767A74A A70EA6E7
BD3EBD30 BD1EBD08 BCF9BCDF BC96BC82 BC74BC37 BC29BC0E BC00A9B1 A996A985
C1AFC197 C17DC163 C149C129 C10EC0CE C0C3C0A2 C08EC070 C25CEA82 EA52BD65
51955174 5153510B 50EC50DB 50C2509B EDA5ED8D ED7BC24C C204C1F3 C1D3C1C8
53BD539D 538A5370 53535332 531152C6 52A75296 527D5256 51FF51DF 51CC51B2
DE2D55DC 55BC55A9 558F5572 55515530 551F54CA 54AB549A 54805459 540A53F2
67C26B7A 67836759 6B76672D 671C66F2 66B466A3 667F6B72 6650DEC2 DEABDE44
6B92692B 69186900 6B8E68C4 68AF6895 687D6B8A 68626B86 683B6B82 68116B7E
6B4A6B20 6AED6AA2 6A856A6D 6A596A2C 6A106B96 69E269CF 69C569A1 6997697E
384EEF6E E254E239 E221E1F4 E1D9E1C1 E264E260 EA35EA10 EA03E9E4 EA406B5B
3A9B3A7B 3A0D39F5 39D539B5 39953975 39553935 391538F5 38D538B5 38953875
3CAF3C8F 3C6F3C4F 3C2F3C0F 3BEF3BCF 3BAF3B7B 3B5B3B3B 3B1B3AFB 3ADB3ABB
E3283E8F 3E6F3E4F 3E2F3E0F 3DEF3DCF 3DAF3D8F 3D6F3D4F 3D2F3D0F 3CEF3CCF
FF88FF74 FF6CFF64 FF60FF5C FF580038 0007E3D1 E3B2E3A1 E382E371 E352E341
FE1EFE08 FDFCFDF7 FDE5FDE0 FD91FD7B FCDAFCCC FC5BFBAE FBA6FB41 FB3CFF90
9A919A72 9A6099F8 99DA9CF4 EC76EC63 EC800148 000BFED9 FED4FEB8 FE45FE40
C5DCC59A C63AEED7 EED29C94 9C769C62 9C4B9C0C 9BC99BAD 9B6D9B4E 9AE29AB5

4D9C4D82 4D204B54 4AFF4AC1 4AA5503E E468E448 E43AE418 E3F6E478 E474C5E6
2AC02AB5 2A4E2A34 29FF29E3 3126EACB 4FE44FC7 4F1B4EF2 4EB94E6E 4DDD4DD4
2EF52ECB 2E9F2E74 2E012DE9 2DAE2D6E 2D572D3A 2C952C36 2BF72BEF 2AED2AD6
D21AD1FF D1FAD1E8 D1D9D1C6 D1C1D1A4 D195D2DA 310730F0 30DD2FF3 2F8E2F6E
DA20DA0C DA07D9C6 D9C1D9B2 D995DA58 D284D27F D267D262 D252D24D D243D234
C9E1CB18 EBBCEB99 EBCEEF22 EF1DE5A3 E59EE584 E57FE56D E551E5D2 EF92DA25
D4C9EDD2 EDC8EDDE EBFFEC2A E5F4CAA6 CA84CA7F CA6BCA66 CA34CA17 C9FDC9E6
CD52CD27 CE7CD7E7 D7E2D7D6 D7D1D79F D79AD783 D77ED757 D744D73F D71DD802
0004000B FFE60002 0004D168 D17ED0DA D0A7D072 D043D17A CE61CDF2 CDC2CD8A
47455345 3F0A0004 20202031 2E474553 443F0A00 033F5444 4C040002 E050E014
07202020 322E4745 53453F0A 00062020 20322E47 4553443F 0A000520 2020312E
4553453F 0A000920 2020342E 47455345 3F0A0008 20202033 2E474553 453F0A00
20202036 2E474553 453F0A00 0B202020 332E4745 53443F0A 000A2020 20352E47
5F544E49 4D434D0B 000E4544 4F435F54 4E494D43 4D0B000D 4B434154 5305000C
41445F53 4F495445 4E0B0010 45444F43 5F534554 59425445 530D000F 41544144
00010000 00000000 00000000 00000000 00000000 00000000 00000018 00064154
014F0000 01260000 00FD0000 00D70000 00AD0000 00820000 002C0000 000401B0
02940000 026B0000 023D0000 02180000 01ED0000 01C30000 019C0000 01760000
04100000 03E50000 03900000 036B0000 033E0000 03140000 02E70000 02BC0000
05790000 054F0000 051D0000 04F50000 04C30000 04930000 04670000 043C0000
06DE0000 06B50000 06890000 065C0000 06320000 06000000 05D20000 05A60000
08270000 07FE0000 07D80000 07AD0000 07830000 075A0000 07300000 07050000
09750000 094D0000 09270000 08FC0000 08D40000 08AD0000 08820000 08520000
0AC40000 0A970000 0A6D0000 0A460000 0A1D0000 09F30000 09C70000 099E0000
0C160000 0BEB0000 0BBF0000 0B930000 0B6A0000 0B3F0000 0B160000 0AED0000
0D5B0000 0D300000 0D070000 0CDE0000 0CB70000 0C8D0000 0C680000 0C3F0000
0EA80000 0E810000 0E570000 0E2D0000 0E030000 0DD80000 0DB10000 0D860000
0FEB0000 0FBE0000 0F990000 0F700000 0F4A0000 0F230000 0EFB0000 0ED20000
11300000 11080000 10DE0000 10B60000 108C0000 10610000 103A0000 10110000
00890000 00480000 000316B0 00030000 11D20000 11A90000 11800000 11590000
03E90000 03810000 033F0000 03010000 02B70000 026E0000 025B0000 00980000
05E30000 05840000 051B0000 04F00000 04C20000 04940000 04500000 040F0000
06C90000 06B00000 06970000 067E0000 06650000 064C0000 06330000 06110000
08230000 08020000 07B50000 078A0000 075E0000 07370000 07110000 06F60000
09110000 08DA0000 08A60000 08930000 08800000 086C0000 08580000 08440000
0A390000 0A150000 09CA0000 09AF0000 09940000 09770000 095A0000 093E0000
0B6B0000 0B500000 0B3C0000 0B200000 0AE90000 0ABE0000 0A940000 0A670000
0FF30000 0FCA0000 0F210000 0EDE0000 0C640000 0C550000 0C040000 0BB90000
10C00000 10A40000 108B0000 10720000 10410000 102D0000 101A0000 10080000
11940000 117B0000 11670000 114B0000 11300000 10FB0000 10E60000 10D40000
14F40000 148E0000 14720000 144B0000 14320000 14180000 11BA0000 11AC0000
175A0000 17100000 16720000 165D0000 16000000 15C10000 15AC0000 154E0000
18490000 182C0000 18180000 18020000 17EA0000 17DB0000 17CA0000 17850000
191B0000 19050000 18F10000 18DD0000 18C90000 18B50000 18A10000 186F0000
1B010000 1AC00000 1AA30000 1A7D0000 1A480000 1A140000 19CE0000 19880000
1C6E0000 1C590000 1C440000 1C2F0000 1C1A0000 1BE80000 1B350000 1B2B0000
1D160000 1D010000 1CEC0000 1CD70000 1CC20000 1CAD0000 1C980000 1C830000
1DBE0000 1DA90000 1D940000 1D7F0000 1D6A0000 1D550000 1D400000 1D2B0000
1EEE0000 1EAE0000 1E7A0000 1E460000 1E120000 1DFD0000 1DE80000 1DD30000
20310000 20110000 1FCA0000 1FB30000 1F9C0000 1F850000 1F6E0000 1F2E0000
23FF0000 23440000 213C0000 212F0000 20F10000 20C70000 209C0000 207C0000
25B80000 258D0000 25670000 25410000 24E60000 24760000 245A0000 24140000
29280000 28630000 282A0000 28190000 27FD0000 27450000 26AB0000 267D0000
2CAF0000 2C850000 2C560000 2C300000 2BF20000 2A300000 2A230000 29F10000
2DC70000 2DB30000 2D9F0000 2D8B0000 2D770000 2D580000 2D260000 2CEB0000
2E6F0000 2E5A0000 2E450000 2E300000 2E1B0000 2E060000 2DF10000 2DDC0000
2F130000 2EFE0000 2EE90000 2ED40000 2EBF0000 2EAB0000 2E970000 2E830000
2FB70000 2FA30000 2F8F0000 2F7B0000 2F670000 2F520000 2F3D0000 2F280000
31610000 310B0000 30B40000 305D0000 30070000 2FF30000 2FDF0000 2FCB0000
33030000 32F10000 32DF0000 32CD0000 32BB0000 32650000 320E0000 31B70000
33F70000 33D00000 33B50000 339C0000 33830000 336A0000 33510000 331F0000
35790000 354D0000 35280000 35130000 34FD0000 34D40000 34730000 34210000
37070000 36E50000 36A60000 36380000 36100000 35E80000 35C30000 35970000
38D00000 38C60000 37D30000 37C80000 37AC0000 37670000 37400000 37210000

| | | | | | | | |
|---|---|---|---|---|---|---|---|
| 3B560000 | 3B2A0000 | 3B140000 | 3B000000 | 3ACE0000 | 3AAF0000 | 3A910000 | 3A350000 |
| 3D210000 | 3D070000 | 3CED0000 | 3CC60000 | 3C650000 | 3C270000 | 3BBB0000 | 3B6E0000 |
| 3F8D0000 | 3F220000 | 3EC70000 | 3E8E0000 | 3E580000 | 3D610000 | 3D560000 | 3D3B0000 |
| 42690000 | 41A10000 | 41760000 | 41310000 | 40E40000 | 403C0000 | 40050000 | 3FC30000 |
| 452B0000 | 44CD0000 | 449B0000 | 446B0000 | 44230000 | 43A70000 | 434C0000 | 42DD0000 |
| 4BA20000 | 4B570000 | 4B1E0000 | 4AC90000 | 49290000 | 48630000 | 459A0000 | 458C0000 |
| 4E860000 | 4E2E0000 | 4DEF0000 | 4DB50000 | 4D800000 | 4D4F0000 | 4CEA0000 | 4C810000 |
| 55C30000 | 557A0000 | 553A0000 | 54FA0000 | 54B20000 | 54A30000 | 53470000 | 51380000 |
| 59F80000 | 59E20000 | 59CC0000 | 59B60000 | 56780000 | 566F0000 | 563D0000 | 560C0000 |
| 5B3D0000 | 5AC10000 | 5AA30000 | 5A850000 | 5A630000 | 5A430000 | 5A2A0000 | 5A110000 |
| 5E280000 | 5D9D0000 | 5D600000 | 5D3C0000 | 5D180000 | 5C6F0000 | 5BC70000 | 5BA30000 |
| 603B0000 | 60290000 | 5FDD0000 | 5FA30000 | 5F6D0000 | 5F120000 | 5EE50000 | 5E920000 |
| 62910000 | 62750000 | 62590000 | 623D0000 | 62220000 | 62090000 | 61EE0000 | 61CA0000 |
| 64A00000 | 63BE0000 | 637D0000 | 633C0000 | 63020000 | 62EC0000 | 62CF0000 | 62AD0000 |
| 65FE0000 | 65EB0000 | 65BE0000 | 659F0000 | 65780000 | 65440000 | 65100000 | 64F80000 |
| 68620000 | 68560000 | 67E10000 | 66EF0000 | 66B50000 | 666B0000 | 66420000 | 66350000 |
| 6AAB0000 | 6A610000 | 6A160000 | 69CB0000 | 69860000 | 69490000 | 68F90000 | 68A70000 |
| 6CA40000 | 6C6C0000 | 6C350000 | 6BFD0000 | 6BC50000 | 6B780000 | 6B2A0000 | 6AF50000 |
| 6E5F0000 | 6E160000 | 6DF70000 | 6DCF0000 | 6DB20000 | 6D950000 | 6D6F0000 | 6CB30000 |
| 70FD0000 | 70DD0000 | 70BF0000 | 70350000 | 6FDB0000 | 6FC40000 | 6FAB0000 | 6F690000 |
| 726D0000 | 725F0000 | 71FE0000 | 71D00000 | 71A90000 | 71980000 | 71710000 | 71360000 |
| 756E0000 | 753D0000 | 75240000 | 74EE0000 | 74900000 | 74100000 | 72B00000 | 729F0000 |
| 7DE80000 | 79B50000 | 79AC0000 | 76CD0000 | 76A00000 | 764F0000 | 761B0000 | 75C30000 |
| 7FD00000 | 7FAF0000 | 7F8A0000 | 7F590000 | 7F110000 | 7EAF0000 | 7E790000 | 7E530000 |
| 822E0000 | 81B40000 | 815E0000 | 81360000 | 81020000 | 808C0000 | 805C0000 | 80350000 |
| 83B60000 | 83900000 | 837F0000 | 83510000 | 83360000 | 82FA0000 | 82D80000 | 827F0000 |
| 85240000 | 84E30000 | 84D30000 | 845F0000 | 842A0000 | 83F90000 | 83E50000 | 83D60000 |
| 88CA0000 | 870E0000 | 86FF0000 | 86CB0000 | 86920000 | 86550000 | 85D20000 | 85AE0000 |
| 89EF0000 | 89D10000 | 89B30000 | 89980000 | 897D0000 | 89620000 | 89030000 | 88E30000 |
| 8D190000 | 8CB40000 | 8C5A0000 | 8C010000 | 8BBF0000 | 8B760000 | 8B1C0000 | 8A0B0000 |
| 8F2A0000 | 8F120000 | 8EFE0000 | 8E810000 | 8E1C0000 | 8E0C0000 | 8DD20000 | 8DBA0000 |
| 90D70000 | 90C20000 | 909C0000 | 90650000 | 90140000 | 8FFA0000 | 8FE10000 | 8F420000 |
| 92090000 | 91B00000 | 919A0000 | 91740000 | 915D0000 | 91480000 | 911B0000 | 90EE0000 |
| 94E80000 | 94C40000 | 94770000 | 940B0000 | 93AC0000 | 93380000 | 92970000 | 92520000 |
| 96E00000 | 96CA0000 | 968A0000 | 961A0000 | 95DF0000 | 95730000 | 95440000 | 94F40000 |
| 983A0000 | 98290000 | 97E90000 | 97DB0000 | 97A80000 | 977E0000 | 97340000 | 96F20000 |
| 9AE40000 | 9AB70000 | 9A910000 | 9A6F0000 | 9A4B0000 | 9A280000 | 99D10000 | 998F0000 |
| 9C4B0000 | 9C260000 | 9BF60000 | 9BBD0000 | 9B950000 | 9B6F0000 | 9B4A0000 | 9B110000 |
| 9DBB0000 | 9D710000 | 9D500000 | 9D340000 | 9D160000 | 9CFA0000 | 9CC60000 | 9C920000 |
| 9F490000 | 9F1B0000 | 9EE70000 | 9EB30000 | 9E7E0000 | 9E470000 | 9E1C0000 | 9DED0000 |
| A0F20000 | A0C10000 | A0980000 | A0640000 | A02F0000 | A0040000 | 9FD90000 | 9F8C0000 |
| A2AE0000 | A2880000 | A2600000 | A2090000 | A1B20000 | A1740000 | A1410000 | A10C0000 |
| A3E20000 | A3B80000 | A38B0000 | A3640000 | A3290000 | A3040000 | A2E70000 | A2CA0000 |
| A5A10000 | A56D0000 | A53E0000 | A5200000 | A4E30000 | A47F0000 | A43A0000 | A41D0000 |
| A72B0000 | A7020000 | A6DA0000 | A6B20000 | A6790000 | A6490000 | A6170000 | A5CF0000 |
| A8B60000 | A88C0000 | A8480000 | A8280000 | A8070000 | A7D20000 | A77A0000 | A7560000 |
| AA380000 | AA080000 | A9A70000 | A9880000 | A9530000 | A9200000 | A8F50000 | A8E00000 |
| ACC50000 | ACA00000 | AC060000 | ABD70000 | AB860000 | AAC10000 | AAA50000 | AA5D0000 |
| AE7C0000 | AE450000 | ADD80000 | AD970000 | AD680000 | AD3A0000 | AD0B0000 | ACE50000 |
| B11B0000 | B0EC0000 | B09C0000 | AF5C0000 | AF4C0000 | AF0A0000 | AED50000 | AEA60000 |
| B33F0000 | B3050000 | B2D20000 | B29F0000 | B2590000 | B21B0000 | B1AB0000 | B1970000 |
| B4710000 | B42A0000 | B3FD0000 | B3E40000 | B3CB0000 | B3B30000 | B3860000 | B35A0000 |
| B6170000 | B5CE0000 | B5B50000 | B56C0000 | B5250000 | B50D0000 | B4F30000 | B4B80000 |
| B7850000 | B7350000 | B7030000 | B6E90000 | B6BB0000 | B6A10000 | B6560000 | B6360000 |
| B9070000 | B8D00000 | B8990000 | B8620000 | B82A0000 | B8020000 | B7C10000 | B7A30000 |
| BACB0000 | BA8F0000 | BA560000 | BA150000 | B9DF0000 | B9A90000 | B9790000 | B9440000 |
| BC7F0000 | BC440000 | BC050000 | BBAB0000 | BB760000 | BB410000 | BB290000 | BAF60000 |
| C2F70000 | BE8B0000 | BD8C0000 | BD7A0000 | BD440000 | BD040000 | BCD80000 | BCC00000 |
| C4D40000 | C4A50000 | C45C0000 | C41C0000 | C3E50000 | C39A0000 | C37E0000 | C34B0000 |
| CBBF0000 | CB800000 | CB2C0000 | CAE40000 | C64C0000 | C5680000 | C5520000 | C5030000 |
| CDFF0000 | CDAB0000 | CD9A0000 | CCB10000 | CCA30000 | CC620000 | CC190000 | CBDC0000 |
| CF9F0000 | CF6D0000 | CF3D0000 | CF280000 | CF040000 | CEB20000 | CE470000 | CE0F0000 |
| D0CA0000 | D0AE0000 | D0920000 | D0740000 | D0550000 | D0480000 | D0210000 | CFF00000 |
| D5930000 | D5280000 | D4430000 | D2900000 | D1870000 | D17C0000 | D1020000 | D0E60000 |

| | | | | | | | |
|---|---|---|---|---|---|---|---|
| D8760000 | D7C20000 | D7460000 | D7030000 | D6C20000 | D68A0000 | D6350000 | D5E70000 |
| DA790000 | DA140000 | D98B0000 | D94A0000 | D9320000 | D9160000 | D8DE0000 | D8CF0000 |
| DBCC0000 | DB860000 | DB5A0000 | DB360000 | DB140000 | DAF40000 | DADA0000 | DAB00000 |
| DFAE0000 | DE500000 | DE000000 | DCD30000 | DC7E0000 | DC700000 | DC340000 | DBF70000 |
| E3450000 | E2B60000 | E21B0000 | E1FF0000 | E1CD0000 | E1C00000 | E1800000 | E1300000 |
| E4A10000 | E4810000 | E4730000 | E44D0000 | E42A0000 | E40E0000 | E3980000 | E3620000 |
| E5E40000 | E5950000 | E5610000 | E52D0000 | E51E0000 | E4FC0000 | E4E20000 | E4BA0000 |
| E8320000 | E7F80000 | E7660000 | E7230000 | E6EF0000 | E6C30000 | E6900000 | E6610000 |
| EA090000 | E9D10000 | E9BC0000 | E98F0000 | E9220000 | E9180000 | E8C40000 | E8680000 |
| EAF20000 | EAC70000 | EA980000 | EA850000 | EA710000 | EA5D0000 | EA490000 | EA350000 |
| ED9B0000 | ED6B0000 | ED140000 | ECC70000 | EC9D0000 | EC7C0000 | EC220000 | EAFF0000 |
| EF650000 | EF410000 | EEFB0000 | EEEC0000 | EEBE0000 | EE7A0000 | EE190000 | EDC10000 |
| F08F0000 | F07C0000 | F03C0000 | F0210000 | F0050000 | EFE80000 | EFCE0000 | EF9A0000 |
| F13C0000 | F1180000 | F1040000 | F0F00000 | F0DC0000 | F0C80000 | F0B50000 | F0A20000 |
| F2D20000 | F28E0000 | F27F0000 | F2240000 | F1FF0000 | F1A90000 | F1760000 | F1620000 |
| F4AC0000 | F4770000 | F46B0000 | F4360000 | F38F0000 | F3840000 | F3640000 | F2EA0000 |
| F5B50000 | F5950000 | F5740000 | F54E0000 | F52D0000 | F50B0000 | F4EB0000 | F4C70000 |
| F7A30000 | F7590000 | F7070000 | F6D30000 | F6670000 | F6580000 | F6190000 | F5DA0000 |
| FB230000 | FB0B0000 | FA5C0000 | F9E90000 | F9CF0000 | F84B0000 | F8410000 | F7F70000 |
| FE9E0000 | FCDD0000 | FCD00000 | FC900000 | FC840000 | FC540000 | FBDD0000 | FB630000 |
| 01CA0001 | 01350001 | 010F0001 | 00B40001 | 005D0000 | FFF80000 | FF9D0000 | FF1C0000 |
| 03110001 | 02D20001 | 02B30001 | 02A30001 | 026F0001 | 021D0001 | 02100001 | 01E00001 |
| 04E20001 | 04980001 | 04620001 | 04260001 | 04180001 | 03E00001 | 03770001 | 03430001 |
| 09830001 | 09780001 | 07DF0001 | 06180001 | 060B0001 | 05C60001 | 055A0001 | 051A0001 |
| 0A650001 | 0A4F0001 | 0A320001 | 0A160001 | 09FB0001 | 09E10001 | 09CC0001 | 09B90001 |
| 0B360001 | 0B190001 | 0AF10001 | 0ACB0001 | 0AB70001 | 0AA30001 | 0A950001 | 0A7A0001 |
| 0C5C0001 | 0C4F0001 | 0C360001 | 0C0F0001 | 0BAE0001 | 0B790001 | 0B680001 | 0B570001 |
| 0F5C0001 | 0F160001 | 0EE50001 | 0EAD0001 | 0E8A0001 | 0E5F0001 | 0E1F0001 | 0E0D0001 |
| 12220001 | 12150001 | 11B10001 | 117E0001 | 10D90001 | 10B30001 | 100F0001 | 0FF40001 |
| 15D10001 | 15710001 | 15390001 | 144F0001 | 13D80001 | 138E0001 | 12A60001 | 12990001 |
| 175A0001 | 171D0001 | 17030001 | 16DF0001 | 16B30001 | 16860001 | 164C0001 | 15E00001 |
| 19200001 | 18BB0001 | 18AB0001 | 18970001 | 18800001 | 18730001 | 180F0001 | 17BA0001 |
| 19F90001 | 19DC0001 | 19C00001 | 19A30001 | 19880001 | 19740001 | 19610001 | 19410001 |
| 1ADA0001 | 1AC20001 | 1AA70001 | 1A8A0001 | 1A700001 | 1A570001 | 1A360001 | 1A150001 |
| 1BC90001 | 1BA90001 | 1B8D0001 | 1B720001 | 1B5A0001 | 1B3D0001 | 1B200001 | 1AFD0001 |
| 1CAA0001 | 1C8B0001 | 1C720001 | 1C560001 | 1C3C0001 | 1C230001 | 1C0A0001 | 1BEA0001 |
| 1D800001 | 1D640001 | 1D4A0001 | 1D340001 | 1D190001 | 1CFB0001 | 1CE30001 | 1CC80001 |
| 1E810001 | 1E5F0001 | 1E3E0001 | 1E170001 | 1DF00001 | 1DCE0001 | 1DAC0001 | 1D900001 |
| 1FAD0001 | 1F900001 | 1F790001 | 1F540001 | 1F230001 | 1EBE0001 | 1EAF0001 | 1E910001 |
| 206F0001 | 20570001 | 203D0001 | 20200001 | 20090001 | 1FF20001 | 1FDB0001 | 1FC40001 |
| 21330001 | 211C0001 | 20FF0001 | 20E70001 | 20CF0001 | 20B70001 | 209F0001 | 20870001 |
| 234A0001 | 233D0001 | 22ED0001 | 227A0001 | 21F50001 | 21DA0001 | 21B30001 | 21400001 |
| 26810001 | 26650001 | 25C40001 | 25AF0001 | 25220001 | 244C0001 | 241F0001 | 23F20001 |
| 28720001 | 28440001 | 28180001 | 27E30001 | 27830001 | 27460001 | 26CB0001 | 268A0001 |
| 2AF10001 | 2AD50001 | 2AC10001 | 2ABC0001 | 2A5C0001 | 2A0F0001 | 28B20001 | 28800001 |
| 2C390001 | 2BF30001 | 2BD80001 | 2BBE0001 | 2B8B0001 | 2B6A0001 | 2B4C0001 | 2AFE0001 |
| 2D0D0001 | 2CDC0001 | 2CC30001 | 2CAA0001 | 2C900001 | 2C780001 | 2C610001 | 2C4C0001 |
| 2DCC0001 | 2DBC0001 | 2DAA0001 | 2D990001 | 2D890001 | 2D790001 | 2D310001 | 2D1A0001 |
| 2EC20001 | 2EB30001 | 2E8D0001 | 2E690001 | 2E390001 | 2E170001 | 2DFE0001 | 2DE50001 |
| 31840001 | 31400001 | 311B0001 | 30F30001 | 309C0001 | 2F530001 | 2F440001 | 2EF40001 |
| 33200001 | 32D30001 | 32910001 | 326C0001 | 32550001 | 323F0001 | 31EE0001 | 31AD0001 |
| 36BF0001 | 366A0001 | 35B50001 | 35020001 | 34D80001 | 34AA0001 | 33F70001 | 33470001 |
| 39EF0001 | 393C0001 | 388C0001 | 38050001 | 37C60001 | 379F0001 | 37750001 | 37140001 |
| 3D2D0001 | 3D1E0001 | 3CB30001 | 3C600001 | 3C0D0001 | 3BA60001 | 3AF50001 | 3AC40001 |
| 3F010001 | 3E500001 | 3E410001 | 3E300001 | 3E0F0001 | 3E0A0001 | 3D8C0001 | 3D440001 |
| 41920001 | 41720001 | 41530001 | 413A0001 | 40F60001 | 40A50001 | 40500001 | 3F280001 |
| 432E0001 | 43090001 | 42FB0001 | 428A0001 | 42400001 | 42180001 | 41D40001 | 41B10001 |
| 44290001 | 441B0001 | 43F30001 | 43CF0001 | 43A80001 | 43850001 | 43620001 | 43540001 |
| 457F0001 | 456A0001 | 45560001 | 454B0001 | 45010001 | 44C70001 | 44910001 | 44640001 |
| 46ED0001 | 46BD0001 | 466A0001 | 46190001 | 46040001 | 45E40001 | 45C50001 | 45A40001 |
| 487F0001 | 484A0001 | 480D0001 | 47E80001 | 47D20001 | 47960001 | 47460001 | 47110001 |
| 4A420001 | 4A080001 | 49E10001 | 49A00001 | 495A0001 | 491B0001 | 48DD0001 | 48B00001 |
| 4BAD0001 | 4B850001 | 4B510001 | 4B1A0001 | 4B080001 | 4ADD0001 | 4AB90001 | 4A7E0001 |
| 4CD90001 | 4CC40001 | 4CAD0001 | 4C960001 | 4C880001 | 4C590001 | 4C100001 | 4BEB0001 |

| | | | | | | | |
|---|---|---|---|---|---|---|---|
| 4D9F0001 | 4D890001 | 4D710001 | 4D5A0001 | 4D3F0001 | 4D220001 | 4D0C0001 | 4CF40001 |
| 4E660001 | 4E4B0001 | 4E340001 | 4E1C0001 | 4E070001 | 4DEC0001 | 4DD00001 | 4DB30001 |
| 4F2D0001 | 4F160001 | 4EFE0001 | 4EE70001 | 4ECE0001 | 4EB50001 | 4E990001 | 4E7C0001 |
| 4FE50001 | 4FCE0001 | 4FB80001 | 4FA60001 | 4F900001 | 4F7A0001 | 4F5F0001 | 4F440001 |
| 50A80001 | 508C0001 | 50770001 | 50560001 | 503F0001 | 502B0001 | 50170001 | 4FFC0001 |
| 51640001 | 514E0001 | 51370001 | 511E0001 | 51080001 | 50EB0001 | 50D60001 | 50BD0001 |
| 52270001 | 520D0001 | 51EE0001 | 51D20001 | 51BB0001 | 51AB0001 | 51930001 | 517E0001 |
| 52F80001 | 52DF0001 | 52C80001 | 52AD0001 | 52910001 | 52740001 | 525B0001 | 52400001 |
| 54060001 | 53C80001 | 53BC0001 | 53A90001 | 53880001 | 53700001 | 536B0001 | 53120001 |
| 55850001 | 557B0001 | 551F0001 | 54C40001 | 54AF0001 | 54A40001 | 54660001 | 54420001 |
| 57A00001 | 57970001 | 57490001 | 56EC0001 | 56900001 | 56830001 | 56380001 | 55DE0001 |
| 593D0001 | 59050001 | 58E00001 | 58940001 | 58180001 | 58070001 | 57E80001 | 57C90001 |
| 5AC40001 | 5A970001 | 5A710001 | 5A4A0001 | 5A400001 | 5A200001 | 59AE0001 | 59630001 |
| 5CC20001 | 5C940001 | 5B9D0001 | 5B920001 | 5B6A0001 | 5B430001 | 5B360001 | 5B0A0001 |
| 60D70001 | 60C60001 | 5F9D0001 | 5F400001 | 5E240001 | 5D1E0001 | 5D100001 | 5CD10001 |
| 61F60001 | 61D70001 | 61BF0001 | 61B20001 | 61970001 | 61680001 | 61570001 | 61060001 |
| 63880001 | 636D0001 | 63390001 | 62FA0001 | 62B70001 | 62A40001 | 62580001 | 620D0001 |
| 65D70001 | 65CC0001 | 65740001 | 64D30001 | 64880001 | 64510001 | 640D0001 | 63A20001 |
| 674B0001 | 67180001 | 670B0001 | 66C10001 | 66780001 | 66550001 | 66480001 | 65EE0001 |
| 00620000 | 004D0000 | 003E0000 | 002D0000 | 00180000 | 00021A84 | 00050001 | 67560001 |
| 01040000 | 00F10000 | 00D60000 | 00C10000 | 00B60000 | 00A60000 | 008E0000 | 007D0000 |
| 01930000 | 01830000 | 01730000 | 01660000 | 01510000 | 01420000 | 01240000 | 01140000 |
| 02370000 | 021F0000 | 020A0000 | 01FA0000 | 01E50000 | 01CA0000 | 01B70000 | 01A60000 |
| 02C50000 | 02B30000 | 02A30000 | 028E0000 | 027A0000 | 026C0000 | 025D0000 | 02450000 |
| 036D0000 | 034F0000 | 03380000 | 031E0000 | 030C0000 | 02F80000 | 02E40000 | 02D70000 |
| 03F30000 | 03E10000 | 03D00000 | 03BE0000 | 03AB0000 | 039F0000 | 038E0000 | 037C0000 |
| 04AA0000 | 049A0000 | 047C0000 | 046D0000 | 045A0000 | 04480000 | 04330000 | 041C0000 |
| 05410000 | 05300000 | 05240000 | 050A0000 | 04FA0000 | 04E20000 | 04D30000 | 04BB0000 |
| 05CF0000 | 05B90000 | 05A60000 | 05970000 | 05800000 | 05710000 | 05650000 | 05560000 |
| 064A0000 | 063C0000 | 062A0000 | 061E0000 | 06130000 | 06050000 | 05F20000 | 05E10000 |
| 06E40000 | 06D40000 | 06C40000 | 06AF0000 | 069E0000 | 06890000 | 06720000 | 065A0000 |
| 07640000 | 07550000 | 07420000 | 072F0000 | 07200000 | 07110000 | 07010000 | 06F10000 |
| 07F00000 | 07DC0000 | 07CB0000 | 07BC0000 | 07B00000 | 07990000 | 07880000 | 07790000 |
| 08890000 | 087E0000 | 086C0000 | 085A0000 | 08400000 | 08300000 | 081B0000 | 08080000 |
| 09200000 | 090A0000 | 08F70000 | 08E70000 | 08D40000 | 08BF0000 | 08AA0000 | 08950000 |
| 09A60000 | 09900000 | 097F0000 | 096F0000 | 095B0000 | 094A0000 | 093D0000 | 09320000 |
| 0A3A0000 | 0A270000 | 0A130000 | 09FB0000 | 09EA0000 | 09DB0000 | 09C20000 | 09B70000 |
| 0ACD0000 | 0ABA0000 | 0AA90000 | 0A970000 | 0A8A0000 | 0A6F0000 | 0A5D0000 | 0A4D0000 |
| 0B670000 | 0B570000 | 0B470000 | 0B3A0000 | 0B250000 | 0B0F0000 | 0AFE0000 | 0AE70000 |
| 0BED0000 | 0BDB0000 | 0BCC0000 | 0BB60000 | 0BAA0000 | 0B9A0000 | 0B870000 | 0B770000 |
| 0C6E0000 | 0C600000 | 0C520000 | 0C3E0000 | 0C2D0000 | 0C190000 | 0C0D0000 | 0BF90000 |
| 0CF60000 | 0CE80000 | 0CD60000 | 0CC20000 | 0CB40000 | 0C9F0000 | 0C930000 | 0C830000 |
| 0D910000 | 0D800000 | 0D6F0000 | 0D5E0000 | 0D4D0000 | 0D3C0000 | 0D1F0000 | 0D0A0000 |
| 0E1D0000 | 0E080000 | 0DF70000 | 0DE60000 | 0DD50000 | 0DC40000 | 0DB30000 | 0DA20000 |
| 0EAE0000 | 0E9E0000 | 0E8D0000 | 0E7D0000 | 0E6C0000 | 0E5B0000 | 0E3F0000 | 0E2E0000 |
| 0F3A0000 | 0F290000 | 0F160000 | 0F060000 | 0EF50000 | 0EE40000 | 0ED30000 | 0EC10000 |
| 0FC80000 | 0FB60000 | 0FA60000 | 0F950000 | 0F820000 | 0F710000 | 0F5E0000 | 0F4D0000 |
| 106B0000 | 105A0000 | 10390000 | 10190000 | 100B0000 | 0FFA0000 | 0FEA0000 | 0FD80000 |
| 11180000 | 10FB0000 | 10DF0000 | 10C50000 | 10B80000 | 10A70000 | 10990000 | 10800000 |
| 11B30000 | 11A00000 | 11920000 | 11830000 | 11730000 | 115D0000 | 11490000 | 11380000 |
| 123F0000 | 122F0000 | 121E0000 | 120E0000 | 11FD0000 | 11EC0000 | 11D80000 | 11C70000 |
| 12D50000 | 12C50000 | 12B10000 | 129B0000 | 128B0000 | 127B0000 | 12660000 | 124F0000 |
| 13680000 | 13570000 | 13470000 | 13300000 | 13150000 | 13050000 | 12F50000 | 12E50000 |
| 13EF0000 | 13DF0000 | 13CF0000 | 13C00000 | 13A70000 | 13970000 | 13870000 | 13770000 |
| 14720000 | 14610000 | 14510000 | 14410000 | 14310000 | 141F0000 | 140F0000 | 13FF0000 |
| 15010000 | 14EC0000 | 14D40000 | 14C10000 | 14B30000 | 14A20000 | 14940000 | 14830000 |
| 15840000 | 15770000 | 15690000 | 15560000 | 15410000 | 15320000 | 15230000 | 15100000 |
| 161C0000 | 160B0000 | 15FA0000 | 15E90000 | 15D80000 | 15C20000 | 15B10000 | 15A10000 |
| 16AD0000 | 169C0000 | 168B0000 | 16760000 | 16640000 | 16530000 | 16420000 | 16310000 |
| 17580000 | 173F0000 | 17280000 | 17120000 | 16FC0000 | 16EE0000 | 16DE0000 | 16C00000 |
| 17FA0000 | 17E90000 | 17D30000 | 17BD0000 | 17A40000 | 178D0000 | 177D0000 | 176D0000 |
| 189B0000 | 18880000 | 18710000 | 185D0000 | 18460000 | 18350000 | 18250000 | 18130000 |
| 193E0000 | 192D0000 | 19150000 | 19060000 | 18F00000 | 18D40000 | 18BE0000 | 18AB0000 |
| 1A000000 | 19E70000 | 19CC0000 | 19B60000 | 199D0000 | 198A0000 | 19730000 | 195B0000 |

| | | | | | | | |
|---|---|---|---|---|---|---|---|
| 1AC70000 | 1AB00000 | 1A980000 | 1A760000 | 1A670000 | 1A4F0000 | 1A350000 | 1A1A0000 |
| 1B830000 | 1B750000 | 1B620000 | 1B4B0000 | 1B310000 | 1B180000 | 1AFE0000 | 1AE50000 |
| 1C2B0000 | 1C140000 | 1C010000 | 1BEF0000 | 1BD80000 | 1BC30000 | 1BA80000 | 1B960000 |
| 1CC00000 | 1CAD0000 | 1C960000 | 1C8A0000 | 1C740000 | 1C650000 | 1C510000 | 1C3F0000 |
| 1D480000 | 1D380000 | 1D280000 | 1D140000 | 1D040000 | 1CF00000 | 1CE00000 | 1CD00000 |
| 1DD40000 | 1DC30000 | 1DB20000 | 1D9C0000 | 1D8F0000 | 1D840000 | 1D780000 | 1D620000 |
| 1E640000 | 1E520000 | 1E400000 | 1E300000 | 1E1C0000 | 1E0C0000 | 1DFC0000 | 1DE60000 |
| 1EFE0000 | 1EEF0000 | 1EE00000 | 1ECA0000 | 1EBA0000 | 1EA10000 | 1E8F0000 | 1E7D0000 |
| 1F7B0000 | 1F6F0000 | 1F640000 | 1F540000 | 1F3C0000 | 1F2F0000 | 1F1C0000 | 1F0E0000 |
| 20000000 | 1FF20000 | 1FE60000 | 1FD70000 | 1FC60000 | 1FAD0000 | 1F9E0000 | 1F8C0000 |
| 206F0000 | 20630000 | 20580000 | 204D0000 | 20420000 | 202E0000 | 201E0000 | 200F0000 |
| 20E90000 | 20D20000 | 20C70000 | 20B30000 | 20A50000 | 20910000 | 20860000 | 207A0000 |
| 216B0000 | 21570000 | 21470000 | 21360000 | 21270000 | 21190000 | 21090000 | 20FC0000 |
| 21F30000 | 21E30000 | 21D40000 | 21BF0000 | 21AE0000 | 219F0000 | 218A0000 | 217B0000 |
| 22820000 | 226D0000 | 225F0000 | 224D0000 | 22390000 | 22230000 | 220E0000 | 21FF0000 |
| 230C0000 | 22F80000 | 22E10000 | 22D10000 | 22C20000 | 22B20000 | 22A60000 | 22910000 |
| 23A00000 | 23910000 | 23740000 | 23650000 | 23580000 | 23440000 | 23300000 | 23200000 |
| 24830000 | 24620000 | 24470000 | 242A0000 | 24080000 | 23E80000 | 23CA0000 | 23B40000 |
| 255C0000 | 25490000 | 25320000 | 25130000 | 24F60000 | 24E00000 | 24C00000 | 24A10000 |
| 26130000 | 26000000 | 25F00000 | 25D60000 | 25BC0000 | 25A70000 | 25930000 | 25740000 |
| 26BE0000 | 26A90000 | 26980000 | 26760000 | 26650000 | 26520000 | 26370000 | 26250000 |
| 276C0000 | 27560000 | 27460000 | 27310000 | 27150000 | 27030000 | 26EC0000 | 26CF0000 |
| 28140000 | 28020000 | 27E50000 | 27D30000 | 27BE0000 | 27AE0000 | 27940000 | 27800000 |
| 28C20000 | 28B30000 | 28970000 | 28880000 | 28730000 | 28550000 | 283A0000 | 28260000 |
| 295C0000 | 294D0000 | 293F0000 | 292A0000 | 29170000 | 28F80000 | 28EA0000 | 28DC0000 |
| 2A060000 | 29F10000 | 29DB0000 | 29C90000 | 29AD0000 | 29980000 | 297E0000 | 296D0000 |
| 2A940000 | 2A860000 | 2A750000 | 2A5E0000 | 2A4A0000 | 2A380000 | 2A280000 | 2A160000 |
| 2B270000 | 2B1B0000 | 2B040000 | 2AF20000 | 2AD90000 | 2AC20000 | 2AB30000 | 2AA40000 |
| 2BE40000 | 2BCA0000 | 2BB90000 | 2BA10000 | 2B870000 | 2B6D0000 | 2B4E0000 | 2B380000 |
| 2C7E0000 | 2C640000 | 2C4D0000 | 2C430000 | 2C390000 | 2C220000 | 2C0D0000 | 2BFA0000 |
| 2D150000 | 2D020000 | 2CF10000 | 2CDC0000 | 2CCD0000 | 2CB80000 | 2CA60000 | 2C940000 |
| 2D900000 | 2D790000 | 2D6C0000 | 2D600000 | 2D520000 | 2D410000 | 2D340000 | 2D260000 |
| 2E210000 | 2E140000 | 2E050000 | 2DEB0000 | 2DDD0000 | 2DCF0000 | 2DB80000 | 2D9D0000 |
| 2EA30000 | 2E970000 | 2E8A0000 | 2E730000 | 2E640000 | 2E4D0000 | 2E3A0000 | 2E2D0000 |
| 2F2B0000 | 2F130000 | 2EFF0000 | 2EEA0000 | 2EDF0000 | 2ED00000 | 2EBF0000 | 2EB00000 |
| 2FBB0000 | 2FB00000 | 2FA40000 | 2F8A0000 | 2F710000 | 2F5F0000 | 2F4B0000 | 2F360000 |
| 302B0000 | 301D0000 | 30100000 | 30050000 | 2FF90000 | 2FEA0000 | 2FDF0000 | 2FD30000 |
| 30AB0000 | 309B0000 | 308D0000 | 30750000 | 30680000 | 30560000 | 30470000 | 30360000 |
| 31370000 | 31250000 | 31120000 | 30FE0000 | 30ED0000 | 30D80000 | 30C30000 | 30B60000 |
| 31E50000 | 31D10000 | 31BE0000 | 31A50000 | 31850000 | 316F0000 | 315E0000 | 314D0000 |
| 328F0000 | 327E0000 | 32640000 | 324D0000 | 32370000 | 32210000 | 320D0000 | 31FA0000 |
| 332F0000 | 33180000 | 33030000 | 32EA0000 | 32D90000 | 32C80000 | 32B00000 | 32A00000 |
| 33FB0000 | 33E50000 | 33D50000 | 33AD0000 | 339A0000 | 337A0000 | 335F0000 | 33490000 |
| 34C10000 | 34AB0000 | 34940000 | 347D0000 | 345D0000 | 344A0000 | 34300000 | 34170000 |
| 35820000 | 35690000 | 354E0000 | 35330000 | 351C0000 | 35090000 | 34EF0000 | 34D50000 |
| 36520000 | 36360000 | 36210000 | 36020000 | 35EA0000 | 35D10000 | 35BB0000 | 35A50000 |
| 37090000 | 36F20000 | 36E20000 | 36CD0000 | 36AC0000 | 368E0000 | 36780000 | 36690000 |
| 37C10000 | 37AB0000 | 378E0000 | 37750000 | 37620000 | 374A0000 | 373B0000 | 37210000 |
| 38990000 | 38830000 | 38680000 | 38490000 | 38330000 | 381B0000 | 37FA0000 | 37E10000 |
| 39530000 | 393F0000 | 392B0000 | 39160000 | 38FB0000 | 38E20000 | 38CC0000 | 38B40000 |
| 3A290000 | 3A040000 | 39EE0000 | 39D60000 | 39BE0000 | 39A00000 | 39890000 | 39710000 |
| 3AE20000 | 3AD20000 | 3AB80000 | 3A9E0000 | 3A850000 | 3A6F0000 | 3A5E0000 | 3A410000 |
| 3BA50000 | 3B890000 | 3B790000 | 3B570000 | 3B3F0000 | 3B230000 | 3B0D0000 | 3AFA0000 |
| 3C510000 | 3C350000 | 3C1E0000 | 3C040000 | 3BF30000 | 3BE20000 | 3BCE0000 | 3BB30000 |
| 3D230000 | 3D0C0000 | 3CED0000 | 3CCE0000 | 3CB60000 | 3C970000 | 3C890000 | 3C6F0000 |
| 3DCC0000 | 3DB80000 | 3D9C0000 | 3D8D0000 | 3D7B0000 | 3D650000 | 3D4C0000 | 3D320000 |
| 3EA70000 | 3E7F0000 | 3E630000 | 3E4C0000 | 3E300000 | 3E1C0000 | 3E070000 | 3DF10000 |
| 3F680000 | 3F4B0000 | 3F310000 | 3F170000 | 3F010000 | 3EEC0000 | 3ED70000 | 3EC10000 |
| 40190000 | 40030000 | 3FEF0000 | 3FD40000 | 3FBE0000 | 3FA30000 | 3F8F0000 | 3F7B0000 |
| 40D40000 | 40B90000 | 40A40000 | 408F0000 | 40790000 | 40640000 | 40440000 | 40300000 |
| 41830000 | 416E0000 | 41570000 | 41470000 | 412F0000 | 411D0000 | 41020000 | 40EC0000 |
| 423B0000 | 42230000 | 42090000 | 41EF0000 | 41DA0000 | 41CB0000 | 41B80000 | 41A00000 |
| 42F90000 | 42DF0000 | 42C40000 | 42B00000 | 429C0000 | 42860000 | 42720000 | 425B0000 |
| 43A50000 | 438B0000 | 43760000 | 43610000 | 434B0000 | 43350000 | 43220000 | 430D0000 |

| | | | | | | | |
|---|---|---|---|---|---|---|---|
| 44360000 | 44250000 | 44160000 | 44080000 | 43FC0000 | 43EA0000 | 43D00000 | 43BB0000 |
| 44B10000 | 449F0000 | 448B0000 | 44760000 | 446C0000 | 44600000 | 444F0000 | 44440000 |
| 45440000 | 45340000 | 45260000 | 450E0000 | 44FE0000 | 44ED0000 | 44DB0000 | 44C60000 |
| 45D00000 | 45BF0000 | 45AE0000 | 459C0000 | 458A0000 | 45740000 | 45670000 | 45550000 |
| 46650000 | 46540000 | 46380000 | 46250000 | 46130000 | 46020000 | 45EF0000 | 45DF0000 |
| 47030000 | 46F30000 | 46E50000 | 46CE0000 | 46B70000 | 46A20000 | 468D0000 | 467A0000 |
| 47850000 | 47780000 | 47660000 | 474D0000 | 473E0000 | 47300000 | 471F0000 | 47110000 |
| 48260000 | 48150000 | 48040000 | 47EE0000 | 47D10000 | 47C10000 | 47B00000 | 479A0000 |
| 48D80000 | 48C60000 | 48AD0000 | 488D0000 | 48770000 | 48600000 | 484E0000 | 48390000 |
| 49740000 | 495F0000 | 494D0000 | 493A0000 | 49220000 | 490F0000 | 49030000 | 48EC0000 |
| 4A100000 | 49FC0000 | 49EC0000 | 49DB0000 | 49C90000 | 49B10000 | 49990000 | 49880000 |
| 4AC00000 | 4AAB0000 | 4A920000 | 4A7A0000 | 4A620000 | 4A4E0000 | 4A360000 | 4A210000 |
| 4B780000 | 4B5E0000 | 4B430000 | 4B2E0000 | 4B1B0000 | 4B020000 | 4AEC0000 | 4AD70000 |
| 4C550000 | 4C3B0000 | 4C140000 | 4BFA0000 | 4BE10000 | 4BC20000 | 4BA50000 | 4B910000 |
| 4D040000 | 4CF40000 | 4CE40000 | 4CD30000 | 4CC20000 | 4CAA0000 | 4C850000 | 4C6E0000 |
| 4D9E0000 | 4D880000 | 4D730000 | 4D610000 | 4D520000 | 4D430000 | 4D330000 | 4D230000 |
| 4E1C0000 | 4E0A0000 | 4DF00000 | 4DDC0000 | 4DCE0000 | 4DC30000 | 4DB70000 | 4DAB0000 |
| 4EAE0000 | 4E980000 | 4E840000 | 4E700000 | 4E620000 | 4E4C0000 | 4E3F0000 | 4E2E0000 |
| 4F330000 | 4F270000 | 4F170000 | 4F070000 | 4EF70000 | 4EE60000 | 4ED60000 | 4EBF0000 |
| 4FC60000 | 4FB80000 | 4FA80000 | 4F960000 | 4F890000 | 4F6D0000 | 4F5E0000 | 4F480000 |
| 50680000 | 50590000 | 50410000 | 50320000 | 50190000 | 50010000 | 4FF20000 | 4FE30000 |
| 51000000 | 50E80000 | 50D10000 | 50C10000 | 50B10000 | 50A10000 | 50940000 | 507E0000 |
| 51940000 | 51790000 | 51630000 | 514E0000 | 513D0000 | 512C0000 | 511E0000 | 51100000 |
| 521F0000 | 52090000 | 51F60000 | 51E80000 | 51D50000 | 51C60000 | 51B90000 | 51A50000 |
| 52BA0000 | 52A80000 | 529B0000 | 52880000 | 52700000 | 525E0000 | 524A0000 | 52360000 |
| 532A0000 | 53190000 | 530C0000 | 52FD0000 | 52EC0000 | 52E10000 | 52D40000 | 52C70000 |
| 53AF0000 | 539C0000 | 53880000 | 537A0000 | 53690000 | 535A0000 | 534C0000 | 533B0000 |
| 54390000 | 54250000 | 54110000 | 53FD0000 | 53F30000 | 53E90000 | 53D90000 | 53C20000 |
| 54CA0000 | 54B20000 | 549F0000 | 548C0000 | 54730000 | 54600000 | 54560000 | 54430000 |
| 55780000 | 55630000 | 554C0000 | 55360000 | 55200000 | 550B0000 | 54F80000 | 54E20000 |
| 56110000 | 56010000 | 55E90000 | 55D20000 | 55C00000 | 55AA0000 | 559C0000 | 55890000 |
| 56A20000 | 56880000 | 56760000 | 56670000 | 56580000 | 56490000 | 56330000 | 56210000 |
| 57590000 | 573F0000 | 57250000 | 57120000 | 56FA0000 | 56E30000 | 56CC0000 | 56B70000 |
| 57EE0000 | 57D30000 | 57C20000 | 57B30000 | 57A30000 | 578D0000 | 577E0000 | 57700000 |
| 58850000 | 586C0000 | 585A0000 | 58490000 | 58320000 | 58230000 | 58130000 | 58050000 |
| 59230000 | 59150000 | 59030000 | 58F30000 | 58DD0000 | 58C50000 | 58AF0000 | 58960000 |
| 59BC0000 | 59AC0000 | 59990000 | 59860000 | 59720000 | 595D0000 | 59420000 | 59330000 |
| 5A5C0000 | 5A460000 | 5A320000 | 5A1B0000 | 5A090000 | 59F10000 | 59E00000 | 59CF0000 |
| 5AE80000 | 5AD80000 | 5AC30000 | 5AB00000 | 5AA00000 | 5A8B0000 | 5A760000 | 5A690000 |
| 5B810000 | 5B6C0000 | 5B550000 | 5B3F0000 | 5B2E0000 | 5B1B0000 | 5B0A0000 | 5AFA0000 |
| 5C220000 | 5C0B0000 | 5BF50000 | 5BDF0000 | 5BCC0000 | 5BBC0000 | 5BA60000 | 5B920000 |
| 5CE50000 | 5CCB0000 | 5CB50000 | 5C9F0000 | 5C810000 | 5C620000 | 5C4A0000 | 5C310000 |
| 5DAC0000 | 5D950000 | 5D7C0000 | 5D680000 | 5D450000 | 5D280000 | 5D0C0000 | 5CF70000 |
| 5E6B0000 | 5E530000 | 5E3D0000 | 5E200000 | 5E090000 | 5DEE0000 | 5DD40000 | 5DC00000 |
| 5F320000 | 5F1D0000 | 5F010000 | 5EE80000 | 5ECF0000 | 5EB20000 | 5E9A0000 | 5E8A0000 |
| 5FE80000 | 5FD10000 | 5FB90000 | 5FA20000 | 5F900000 | 5F7E0000 | 5F690000 | 5F4B0000 |
| 60B70000 | 60A40000 | 608B0000 | 606E0000 | 60560000 | 603D0000 | 60200000 | 600B0000 |
| 615B0000 | 61470000 | 61330000 | 611F0000 | 610B0000 | 60F50000 | 60E20000 | 60D00000 |
| 61FE0000 | 61EB0000 | 61D80000 | 61C50000 | 61AC0000 | 61980000 | 61840000 | 616F0000 |
| 62B00000 | 629F0000 | 62880000 | 626E0000 | 62560000 | 623F0000 | 62280000 | 62110000 |
| 633D0000 | 632B0000 | 63170000 | 63020000 | 62F50000 | 62DF0000 | 62D10000 | 62C70000 |
| 63C00000 | 63B20000 | 63A30000 | 63920000 | 63820000 | 636D0000 | 635D0000 | 634D0000 |
| 64530000 | 643C0000 | 642A0000 | 641D0000 | 640D0000 | 63F50000 | 63E50000 | 63D20000 |
| 64E90000 | 64D80000 | 64C20000 | 64AC0000 | 649D0000 | 648A0000 | 64750000 | 64670000 |
| 657B0000 | 656D0000 | 65590000 | 65420000 | 65310000 | 65250000 | 65100000 | 64F80000 |
| 65EA0000 | 65DE0000 | 65D10000 | 65C50000 | 65B80000 | 65AB0000 | 659E0000 | 65910000 |
| 666D0000 | 665D0000 | 664C0000 | 663B0000 | 662B0000 | 66180000 | 66070000 | 65F60000 |
| 67110000 | 67020000 | 66E70000 | 66D80000 | 66C30000 | 66B10000 | 669D0000 | 66810000 |
| 679C0000 | 67890000 | 67780000 | 67690000 | 67520000 | 67430000 | 67310000 | 67250000 |
| 68360000 | 681D0000 | 680E0000 | 67F70000 | 67E60000 | 67D50000 | 67C30000 | 67AD0000 |
| 68BA0000 | 68AE0000 | 68970000 | 68870000 | 68740000 | 68610000 | 68510000 | 68400000 |
| 694E0000 | 69390000 | 69250000 | 69100000 | 69030000 | 68F10000 | 68E00000 | 68CC0000 |
| 69EB0000 | 69D80000 | 69C30000 | 69B20000 | 69A00000 | 69890000 | 69770000 | 695B0000 |
| 6A7D0000 | 6A6F0000 | 6A590000 | 6A450000 | 6A310000 | 6A210000 | 6A0D0000 | 69FC0000 |

| | | | | | | | |
|---|---|---|---|---|---|---|---|
| 6B240000 | 6B0F0000 | 6AFA0000 | 6AE80000 | 6AD20000 | 6AB50000 | 6AA40000 | 6A8B0000 |
| 6BBF0000 | 6BAE0000 | 6B990000 | 6B860000 | 6B750000 | 6B5A0000 | 6B470000 | 6B390000 |
| 6C4F0000 | 6C3F0000 | 6C300000 | 6C1E0000 | 6C090000 | 6BF70000 | 6BE70000 | 6BD10000 |
| 6CE60000 | 6CD50000 | 6CC40000 | 6CAE0000 | 6C9F0000 | 6C880000 | 6C750000 | 6C650000 |
| 6D780000 | 6D670000 | 6D560000 | 6D430000 | 6D320000 | 6D230000 | 6D0E0000 | 6CFD0000 |
| 6E240000 | 6E0F0000 | 6DF90000 | 6DE60000 | 6DD10000 | 6DB40000 | 6D9D0000 | 6D860000 |
| 6EC40000 | 6EB20000 | 6EA10000 | 6E8D0000 | 6E790000 | 6E670000 | 6E4F0000 | 6E3B0000 |
| 6F5B0000 | 6F4F0000 | 6F3C0000 | 6F290000 | 6F120000 | 6F000000 | 6EEB0000 | 6EDA0000 |
| 6FFA0000 | 6FEA0000 | 6FD20000 | 6FC00000 | 6FA70000 | 6F920000 | 6F820000 | 6F700000 |
| 709B0000 | 70800000 | 70690000 | 70560000 | 70430000 | 702B0000 | 701A0000 | 700C0000 |
| 713B0000 | 71280000 | 71150000 | 71000000 | 70ED0000 | 70DD0000 | 70CB0000 | 70B20000 |
| 71E00000 | 71CC0000 | 71B70000 | 71A40000 | 718D0000 | 717C0000 | 716A0000 | 71520000 |
| 728B0000 | 72720000 | 72590000 | 72480000 | 72370000 | 721E0000 | 72060000 | 71F30000 |
| 73310000 | 731F0000 | 730A0000 | 72F30000 | 72E00000 | 72CD0000 | 72B60000 | 729F0000 |
| 73AB0000 | 739B0000 | 738B0000 | 737D0000 | 736F0000 | 73630000 | 73540000 | 73450000 |
| 742F0000 | 74200000 | 740A0000 | 73F80000 | 73E70000 | 73D60000 | 73C70000 | 73B90000 |
| 74C70000 | 74B70000 | 74A30000 | 74930000 | 747C0000 | 74670000 | 744F0000 | 74410000 |
| 75640000 | 75520000 | 75460000 | 753A0000 | 75220000 | 750D0000 | 74F60000 | 74DD0000 |
| 75DD0000 | 75CF0000 | 75C20000 | 75B40000 | 75A50000 | 75950000 | 75850000 | 75750000 |
| 76770000 | 76650000 | 76580000 | 76400000 | 762C0000 | 761B0000 | 76050000 | 75ED0000 |
| 77050000 | 76F50000 | 76E50000 | 76D80000 | 76BF0000 | 76A90000 | 76920000 | 76860000 |
| 778C0000 | 777B0000 | 776B0000 | 775C0000 | 774D0000 | 773C0000 | 772A0000 | 771D0000 |
| 77F50000 | 77EA0000 | 77DB0000 | 77CE0000 | 77C10000 | 77B30000 | 77A70000 | 77990000 |
| 785D0000 | 78510000 | 78440000 | 78370000 | 782A0000 | 781D0000 | 78100000 | 78030000 |
| 78C50000 | 78B80000 | 78AB0000 | 789E0000 | 78910000 | 78840000 | 78770000 | 786A0000 |
| 79290000 | 791E0000 | 79120000 | 79050000 | 78F90000 | 78EC0000 | 78DF0000 | 78D20000 |
| 799A0000 | 798C0000 | 797D0000 | 796F0000 | 79600000 | 79520000 | 79430000 | 79340000 |
| 7A040000 | 79F70000 | 79EC0000 | 79DE0000 | 79D00000 | 79C30000 | 79B50000 | 79A80000 |
| 7A6C0000 | 7A5D0000 | 7A510000 | 7A430000 | 7A380000 | 7A2B0000 | 7A1E0000 | 7A120000 |
| 7AD40000 | 7AC70000 | 7ABA0000 | 7AAE0000 | 7AA00000 | 7A930000 | 7A860000 | 7A770000 |
| 7B3B0000 | 7B2E0000 | 7B220000 | 7B150000 | 7B070000 | 7AFA0000 | 7AEE0000 | 7AE10000 |
| 7BA30000 | 7B960000 | 7B890000 | 7B7C0000 | 7B6F0000 | 7B620000 | 7B550000 | 7B470000 |
| 7C0B0000 | 7BFE0000 | 7BF10000 | 7BE40000 | 7BD80000 | 7BCB0000 | 7BBD0000 | 7BB00000 |
| 7C840000 | 7C750000 | 7C650000 | 7C570000 | 7C480000 | 7C330000 | 7C250000 | 7C180000 |
| 7D000000 | 7CF10000 | 7CE30000 | 7CD50000 | 7CC50000 | 7CB70000 | 7CA50000 | 7C940000 |
| 7DB20000 | 7D990000 | 7D850000 | 7D6E0000 | 7D570000 | 7D400000 | 7D290000 | 7D190000 |
| 7E740000 | 7E5C0000 | 7E450000 | 7E2A0000 | 7E0F0000 | 7DF60000 | 7DDF0000 | 7DCB0000 |
| 7F160000 | 7F010000 | 7EE80000 | 7ED20000 | 7EC30000 | 7EB00000 | 7E9F0000 | 7E890000 |
| 7FAD0000 | 7F9D0000 | 7F8D0000 | 7F7E0000 | 7F6F0000 | 7F600000 | 7F500000 | 7F330000 |
| 00200000 | 00160000 | 000C0000 | 000022A0 | 00060000 | 7FEF0000 | 7FDA0000 | 7FC50000 |
| 009C0000 | 00850000 | 00790000 | 006C0000 | 00570000 | 004D0000 | 003A0000 | 002D0000 |
| 011C0000 | 01020000 | 00F60000 | 00E70000 | 00D70000 | 00C10000 | 00B50000 | 00A90000 |
| 01900000 | 01790000 | 01670000 | 015C0000 | 01500000 | 01450000 | 01390000 | 012E0000 |
| 02140000 | 01FE0000 | 01F20000 | 01DB0000 | 01CE0000 | 01C00000 | 01B40000 | 01A20000 |
| 02990000 | 028E0000 | 02820000 | 026B0000 | 025F0000 | 02520000 | 023D0000 | 02290000 |
| 030E0000 | 02FE0000 | 02EF0000 | 02E40000 | 02DB0000 | 02CC0000 | 02C10000 | 02AB0000 |
| 03A20000 | 03880000 | 03710000 | 035D0000 | 034F0000 | 033C0000 | 032D0000 | 031F0000 |
| 04280000 | 04190000 | 040B0000 | 03F90000 | 03E40000 | 03D50000 | 03C30000 | 03B10000 |
| 04C00000 | 04B20000 | 04970000 | 04870000 | 04730000 | 04640000 | 04560000 | 04430000 |
| 05480000 | 053A0000 | 05270000 | 05120000 | 05040000 | 04F60000 | 04E20000 | 04CE0000 |
| 05C60000 | 05AF0000 | 05A10000 | 05930000 | 05870000 | 05770000 | 056B0000 | 055C0000 |
| 06400000 | 06270000 | 06170000 | 06080000 | 05F70000 | 05EB0000 | 05DD0000 | 05D40000 |
| 06B50000 | 069F0000 | 068C0000 | 067F0000 | 06710000 | 06630000 | 06570000 | 064D0000 |
| 074D0000 | 073E0000 | 072A0000 | 071A0000 | 07070000 | 06E90000 | 06D50000 | 06C30000 |
| 07E10000 | 07C90000 | 07B20000 | 07A20000 | 07930000 | 07840000 | 076F0000 | 075E0000 |
| 08700000 | 085E0000 | 08500000 | 083A0000 | 08270000 | 081A0000 | 08020000 | 07F20000 |
| 09060000 | 08F70000 | 08E90000 | 08D10000 | 08B20000 | 08A30000 | 08940000 | 08870000 |
| 098A0000 | 097C0000 | 096D0000 | 095F0000 | 094C0000 | 093E0000 | 092B0000 | 091E0000 |
| 0A0F0000 | 09FB0000 | 09EF0000 | 09E10000 | 09D30000 | 09C50000 | 09B30000 | 09A00000 |
| 0A8B0000 | 0A7C0000 | 0A6E0000 | 0A600000 | 0A510000 | 0A460000 | 0A2D0000 | 0A1E0000 |
| 0B070000 | 0AF30000 | 0AE40000 | 0AD50000 | 0AC70000 | 0AB90000 | 0AAA0000 | 0A9A0000 |
| 0B850000 | 0B760000 | 0B690000 | 0B560000 | 0B470000 | 0B380000 | 0B2A0000 | 0B170000 |
| 0C0F0000 | 0BF50000 | 0BE60000 | 0BD30000 | 0BC50000 | 0BB60000 | 0BA70000 | 0B900000 |
| 0C990000 | 0C860000 | 0C760000 | 0C690000 | 0C520000 | 0C440000 | 0C2F0000 | 0C1E0000 |

| | | | | | | | |
|---|---|---|---|---|---|---|---|
| 0D0C0000 | 0D000000 | 0CF10000 | 0CE30000 | 0CCF0000 | 0CC10000 | 0CB70000 | 0CA80000 |
| 0DA30000 | 0D870000 | 0D740000 | 0D610000 | 0D550000 | 0D470000 | 0D330000 | 0D240000 |
| 0E250000 | 0E160000 | 0E050000 | 0DF10000 | 0DE30000 | 0DD30000 | 0DC40000 | 0DB00000 |
| 0EA90000 | 0E980000 | 0E8A0000 | 0E7C0000 | 0E6D0000 | 0E530000 | 0E410000 | 0E330000 |
| 0F380000 | 0F1F0000 | 0F0A0000 | 0EF70000 | 0EE60000 | 0ED80000 | 0EC90000 | 0EBA0000 |
| 0FB50000 | 0FA60000 | 0F930000 | 0F830000 | 0F720000 | 0F650000 | 0F570000 | 0F450000 |
| 103C0000 | 102D0000 | 101F0000 | 100E0000 | 0FFF0000 | 0FEF0000 | 0FD90000 | 0FC90000 |
| 10BC0000 | 10AC0000 | 109C0000 | 10860000 | 10740000 | 10650000 | 10590000 | 104B0000 |
| 113D0000 | 112E0000 | 11200000 | 11080000 | 10FE0000 | 10F40000 | 10DE0000 | 10CF0000 |
| 11C60000 | 11AE0000 | 119B0000 | 118A0000 | 117B0000 | 116C0000 | 115D0000 | 114E0000 |
| 123F0000 | 122E0000 | 121D0000 | 120E0000 | 11FF0000 | 11F00000 | 11E30000 | 11D50000 |
| 12BE0000 | 12AD0000 | 129E0000 | 128D0000 | 127E0000 | 126B0000 | 125C0000 | 124D0000 |
| 13470000 | 13340000 | 131B0000 | 130B0000 | 12F80000 | 12E80000 | 12D90000 | 12CA0000 |
| 13C70000 | 13BD0000 | 13AA0000 | 13990000 | 13830000 | 136E0000 | 13600000 | 13530000 |
| 144C0000 | 14370000 | 14290000 | 141D0000 | 140A0000 | 13FB0000 | 13EC0000 | 13D50000 |
| 14CB0000 | 14C20000 | 14B40000 | 14A50000 | 14910000 | 147D0000 | 14690000 | 145A0000 |
| 15430000 | 15300000 | 15270000 | 15140000 | 15060000 | 14F80000 | 14EB0000 | 14DF0000 |
| 15B80000 | 15AB0000 | 15960000 | 15890000 | 157A0000 | 15680000 | 155B0000 | 154F0000 |
| 164A0000 | 16370000 | 16230000 | 16100000 | 15F70000 | 15E90000 | 15D70000 | 15C70000 |
| 16D00000 | 16C40000 | 16B00000 | 16A10000 | 168C0000 | 16800000 | 16690000 | 165C0000 |
| 17580000 | 17490000 | 173D0000 | 172C0000 | 171D0000 | 170E0000 | 16FE0000 | 16E60000 |
| 17E60000 | 17D70000 | 17CB0000 | 17BC0000 | 17A10000 | 17930000 | 177F0000 | 17680000 |
| 18690000 | 18540000 | 18460000 | 18360000 | 18200000 | 18120000 | 18050000 | 17F10000 |
| 18FF0000 | 18EA0000 | 18D60000 | 18CB0000 | 18C00000 | 18A70000 | 18920000 | 187B0000 |
| 198B0000 | 19770000 | 19690000 | 194D0000 | 19360000 | 192B0000 | 191C0000 | 19110000 |
| 1A110000 | 1A030000 | 19EE0000 | 19E20000 | 19D30000 | 19BB0000 | 19A60000 | 19990000 |
| 1AB10000 | 1AA20000 | 1A8F0000 | 1A7D0000 | 1A650000 | 1A570000 | 1A410000 | 1A2A0000 |
| 1B310000 | 1B240000 | 1B110000 | 1B040000 | 1AFA0000 | 1AE30000 | 1AD70000 | 1AC60000 |
| 1B9E0000 | 1B940000 | 1B8B0000 | 1B800000 | 1B6C0000 | 1B600000 | 1B4E0000 | 1B420000 |
| 1C1A0000 | 1C0B0000 | 1BF50000 | 1BE90000 | 1BDA0000 | 1BC50000 | 1BB90000 | 1BA80000 |
| 1CC10000 | 1CB70000 | 1C990000 | 1C890000 | 1C740000 | 1C560000 | 1C420000 | 1C320000 |
| 1D3E0000 | 1D2B0000 | 1D1D0000 | 1D120000 | 1D050000 | 1CF70000 | 1CEC0000 | 1CCD0000 |
| 1DBB0000 | 1DA30000 | 1D960000 | 1D8B0000 | 1D800000 | 1D710000 | 1D630000 | 1D4F0000 |
| 1E430000 | 1E270000 | 1E1D0000 | 1E0E0000 | 1DFC0000 | 1DEB0000 | 1DDB0000 | 1DC80000 |
| 1EE40000 | 1ED70000 | 1EB10000 | 1E9F0000 | 1E8A0000 | 1E7C0000 | 1E600000 | 1E510000 |
| 1F890000 | 1F7D0000 | 1F610000 | 1F480000 | 1F310000 | 1F160000 | 1EFD0000 | 1EEE0000 |
| 20310000 | 20270000 | 20190000 | 1FF90000 | 1FEB0000 | 1FD80000 | 1FC50000 | 1F9E0000 |
| 20B60000 | 20A20000 | 20950000 | 20810000 | 20700000 | 205F0000 | 20440000 | 203A0000 |
| 21220000 | 21160000 | 210A0000 | 21000000 | 20EE0000 | 20E50000 | 20CC0000 | 20C10000 |
| 21A30000 | 21930000 | 21840000 | 21740000 | 21600000 | 21500000 | 213F0000 | 212E0000 |
| 22180000 | 22080000 | 21F00000 | 21E20000 | 21D50000 | 21CA0000 | 21BC0000 | 21AF0000 |
| 228A0000 | 227D0000 | 22690000 | 225F0000 | 224E0000 | 223D0000 | 22330000 | 22230000 |
| 230E0000 | 22FD0000 | 22EB0000 | 22D70000 | 22CE0000 | 22C40000 | 22B80000 | 22A30000 |
| 23850000 | 237B0000 | 23720000 | 23670000 | 23540000 | 23410000 | 23340000 | 231F0000 |
| 240E0000 | 23FA0000 | 23EA0000 | 23D50000 | 23C40000 | 23AF0000 | 239E0000 | 23920000 |
| 24780000 | 246F0000 | 24640000 | 24590000 | 24490000 | 243D0000 | 24280000 | 241E0000 |
| 24E50000 | 24D70000 | 24CA0000 | 24BF0000 | 24B40000 | 24A50000 | 24910000 | 24860000 |
| 255B0000 | 254F0000 | 253E0000 | 25330000 | 25230000 | 25190000 | 250E0000 | 24FD0000 |
| 25E10000 | 25D00000 | 25C30000 | 25B10000 | 25A30000 | 25940000 | 25810000 | 25770000 |
| 26870000 | 267B0000 | 26660000 | 264D0000 | 262E0000 | 260E0000 | 25F90000 | 25EC0000 |
| 27120000 | 27000000 | 26EC0000 | 26E30000 | 26D90000 | 26C10000 | 26B80000 | 26AE0000 |
| 279B0000 | 27900000 | 27870000 | 27700000 | 27630000 | 274B0000 | 273A0000 | 27290000 |
| 281C0000 | 28070000 | 27FA0000 | 27EE0000 | 27DC0000 | 27D20000 | 27BF0000 | 27B60000 |
| 288A0000 | 287E0000 | 28740000 | 28630000 | 28530000 | 28450000 | 28380000 | 28290000 |
| 28F50000 | 28E80000 | 28D00000 | 28C30000 | 28B80000 | 28AD0000 | 28A20000 | 28950000 |
| 297A0000 | 29660000 | 294A0000 | 293B0000 | 29310000 | 29230000 | 29110000 | 29030000 |
| 2A0D0000 | 29FF0000 | 29F50000 | 29CE0000 | 29C20000 | 29AD0000 | 29990000 | 298A0000 |
| 2A950000 | 2A880000 | 2A6F0000 | 2A5E0000 | 2A4D0000 | 2A400000 | 2A330000 | 2A250000 |
| 2B280000 | 2B1C0000 | 2B120000 | 2AF90000 | 2AE60000 | 2AD10000 | 2ABD0000 | 2AAA0000 |
| 2B8F0000 | 2B830000 | 2B780000 | 2B6D0000 | 2B620000 | 2B560000 | 2B480000 | 2B340000 |
| 2BFE0000 | 2BF50000 | 2BDC0000 | 2BD10000 | 2BBD0000 | 2BB10000 | 2BA50000 | 2B980000 |
| 2C870000 | 2C770000 | 2C630000 | 2C530000 | 2C3E0000 | 2C290000 | 2C1D0000 | 2C080000 |
| 2CF60000 | 2CEB0000 | 2CD40000 | 2CC90000 | 2CBB0000 | 2CAD0000 | 2CA10000 | 2C910000 |
| 2D9D0000 | 2D870000 | 2D7C0000 | 2D630000 | 2D520000 | 2D3E0000 | 2D260000 | 2D0D0000 |

| | | | | | | | |
|---|---|---|---|---|---|---|---|
| 2E100000 | 2E060000 | 2DEF0000 | 2DE40000 | 2DD70000 | 2DC90000 | 2DBF0000 | 2DAE0000 |
| 2E810000 | 2E760000 | 2E660000 | 2E590000 | 2E480000 | 2E370000 | 2E2B0000 | 2E190000 |
| 2EF50000 | 2EE50000 | 2EDB0000 | 2ECF0000 | 2EBA0000 | 2EAE0000 | 2E9D0000 | 2E930000 |
| 2F610000 | 2F540000 | 2F460000 | 2F3B0000 | 2F2B0000 | 2F1F0000 | 2F150000 | 2F060000 |
| 2FC40000 | 2FB70000 | 2FAA0000 | 2F9F0000 | 2F940000 | 2F850000 | 2F7A0000 | 2F6C0000 |
| 30390000 | 30260000 | 301A0000 | 30070000 | 2FF80000 | 2FEE0000 | 2FE30000 | 2FD50000 |
| 30B10000 | 30A70000 | 309A0000 | 308F0000 | 307E0000 | 306D0000 | 30600000 | 304C0000 |
| 31310000 | 31280000 | 31150000 | 30FC0000 | 30EC0000 | 30DA0000 | 30CB0000 | 30BD0000 |
| 319E0000 | 318B0000 | 317C0000 | 31700000 | 31640000 | 314F0000 | 31450000 | 313C0000 |
| 320F0000 | 32060000 | 31FD0000 | 31ED0000 | 31DE0000 | 31C90000 | 31BF0000 | 31AA0000 |
| 32710000 | 32660000 | 325B0000 | 32520000 | 32440000 | 32370000 | 322B0000 | 32210000 |
| 32DA0000 | 32CA0000 | 32B40000 | 32A70000 | 329F0000 | 32920000 | 32870000 | 327C0000 |
| 334A0000 | 333F0000 | 33320000 | 33240000 | 33120000 | 33030000 | 32F90000 | 32EB0000 |
| 33BF0000 | 33B30000 | 33A70000 | 339B0000 | 338F0000 | 33800000 | 33770000 | 33650000 |
| 34330000 | 34240000 | 34140000 | 34070000 | 33FD0000 | 33EA0000 | 33DF0000 | 33CB0000 |
| 349F0000 | 34940000 | 34890000 | 347B0000 | 346B0000 | 345F0000 | 34510000 | 34430000 |
| 35080000 | 34FC0000 | 34F00000 | 34E20000 | 34CF0000 | 34C10000 | 34B60000 | 34AB0000 |
| 35900000 | 357F0000 | 356B0000 | 355F0000 | 354D0000 | 353E0000 | 35310000 | 351E0000 |
| 35FD0000 | 35E80000 | 35DA0000 | 35CA0000 | 35BC0000 | 35AF0000 | 35A30000 | 35990000 |
| 367D0000 | 36740000 | 36680000 | 365C0000 | 364A0000 | 36350000 | 361C0000 | 36070000 |
| 36F40000 | 36EA0000 | 36D50000 | 36C80000 | 36B70000 | 36A60000 | 369B0000 | 36900000 |
| 376B0000 | 375F0000 | 37540000 | 373D0000 | 37270000 | 371A0000 | 370F0000 | 37050000 |
| 37D60000 | 37CC0000 | 37BB0000 | 37A70000 | 379A0000 | 378A0000 | 377E0000 | 37740000 |
| 38610000 | 38510000 | 383B0000 | 382D0000 | 38190000 | 38050000 | 37EE0000 | 37E00000 |
| 38D80000 | 38C60000 | 38B70000 | 38AD0000 | 389E0000 | 388F0000 | 38840000 | 386F0000 |
| 39420000 | 39370000 | 39250000 | 391A0000 | 390C0000 | 39000000 | 38F40000 | 38E60000 |
| 39A30000 | 39980000 | 398D0000 | 397D0000 | 39720000 | 39670000 | 395B0000 | 394D0000 |
| 3A0F0000 | 3A030000 | 39F60000 | 39EC0000 | 39DF0000 | 39D20000 | 39C00000 | 39AE0000 |
| 3A7C0000 | 3A6D0000 | 3A5F0000 | 3A520000 | 3A410000 | 3A350000 | 3A290000 | 3A1C0000 |
| 3AE20000 | 3AD90000 | 3ACC0000 | 3ABC0000 | 3AAC0000 | 3A9F0000 | 3A930000 | 3A860000 |
| 3B4F0000 | 3B3A0000 | 3B310000 | 3B250000 | 3B160000 | 3B080000 | 3AF90000 | 3AEF0000 |
| 3BBF0000 | 3BB40000 | 3BA80000 | 3B9C0000 | 3B880000 | 3B700000 | 3B650000 | 3B590000 |
| 3C1B0000 | 3C100000 | 3C050000 | 3BF90000 | 3BEE0000 | 3BE40000 | 3BDA0000 | 3BD10000 |
| 3C950000 | 3C850000 | 3C6F0000 | 3C580000 | 3C4E0000 | 3C450000 | 3C330000 | 3C260000 |
| 3D060000 | 3CFB0000 | 3CF20000 | 3CE60000 | 3CD70000 | 3CC50000 | 3CB30000 | 3CA60000 |
| 3D880000 | 3D7C0000 | 3D670000 | 3D5B0000 | 3D460000 | 3D340000 | 3D2A0000 | 3D170000 |
| 3E080000 | 3DF80000 | 3DEE0000 | 3DDF0000 | 3DCC0000 | 3DBB0000 | 3DAB0000 | 3D9C0000 |
| 3E690000 | 3E5E0000 | 3E530000 | 3E480000 | 3E3A0000 | 3E2D0000 | 3E1F0000 | 3E140000 |
| 3EF10000 | 3EDE0000 | 3EC20000 | 3EAF0000 | 3EA00000 | 3E920000 | 3E870000 | 3E760000 |
| 3F740000 | 3F620000 | 3F530000 | 3F3E0000 | 3F2E0000 | 3F1C0000 | 3F0F0000 | 3EFE0000 |
| 3FF80000 | 3FED0000 | 3FE10000 | 3FD60000 | 3FC30000 | 3FAD0000 | 3F990000 | 3F870000 |
| 405C0000 | 40500000 | 40460000 | 403B0000 | 402F0000 | 40180000 | 400B0000 | 40010000 |
| 40BA0000 | 40AF0000 | 40A40000 | 40990000 | 408D0000 | 40820000 | 40700000 | 40650000 |
| 411E0000 | 41120000 | 41060000 | 40F90000 | 40ED0000 | 40DB0000 | 40CF0000 | 40C40000 |
| 41930000 | 41890000 | 41730000 | 41630000 | 41540000 | 41470000 | 413D0000 | 41320000 |
| 41F80000 | 41ED0000 | 41DC0000 | 41CD0000 | 41C20000 | 41B70000 | 41A90000 | 419E0000 |
| 42670000 | 42580000 | 42470000 | 423C0000 | 422E0000 | 42200000 | 42160000 | 42070000 |
| 42E70000 | 42D30000 | 42C20000 | 42AB0000 | 429C0000 | 428E0000 | 42830000 | 42770000 |
| 43750000 | 43600000 | 434B0000 | 43390000 | 43240000 | 43150000 | 42FC0000 | 42F10000 |
| 43DE0000 | 43CC0000 | 43BE0000 | 43B30000 | 43AB0000 | 439F0000 | 43940000 | 43880000 |
| 44680000 | 44530000 | 44490000 | 44400000 | 442C0000 | 44130000 | 43FA0000 | 43E60000 |
| 44D50000 | 44CA0000 | 44BF0000 | 44AA0000 | 44A00000 | 44970000 | 44870000 | 44720000 |
| 454E0000 | 453D0000 | 452D0000 | 45180000 | 45030000 | 44FA0000 | 44ED0000 | 44DF0000 |
| 45D00000 | 45BC0000 | 45AB0000 | 45980000 | 45820000 | 45740000 | 45670000 | 45590000 |
| 463E0000 | 46340000 | 462A0000 | 46210000 | 460C0000 | 45FB0000 | 45EE0000 | 45DA0000 |
| 46C10000 | 46B60000 | 46AB0000 | 469F0000 | 46910000 | 46760000 | 466C0000 | 464E0000 |
| 47660000 | 47400000 | 472D0000 | 471E0000 | 47050000 | 46F40000 | 46DE0000 | 46D30000 |
| 47E70000 | 47DD0000 | 47D10000 | 47BA0000 | 47A60000 | 47970000 | 47820000 | 47750000 |
| 48690000 | 48560000 | 484C0000 | 48430000 | 48300000 | 481D0000 | 48080000 | 47F00000 |
| 48EF0000 | 48E00000 | 48D00000 | 48B90000 | 48AB0000 | 48970000 | 48820000 | 48750000 |
| 49650000 | 49570000 | 49450000 | 49350000 | 49270000 | 49190000 | 490D0000 | 48FF0000 |
| 49D60000 | 49C80000 | 49BD0000 | 49B00000 | 49A50000 | 49990000 | 498E0000 | 49700000 |
| 4A560000 | 4A4B0000 | 4A3A0000 | 4A240000 | 4A180000 | 4A090000 | 49FD0000 | 49EC0000 |
| 4AD00000 | 4ABF0000 | 4AB30000 | 4AA40000 | 4A970000 | 4A8E0000 | 4A840000 | 4A6F0000 |

| | | | | | | | |
|---|---|---|---|---|---|---|---|
| 4B3D0000 | 4B320000 | 4B260000 | 4B1C0000 | 4B120000 | 4AFE0000 | 4AF20000 | 4AE10000 |
| 4BA10000 | 4B950000 | 4B890000 | 4B7C0000 | 4B6A0000 | 4B5E0000 | 4B530000 | 4B480000 |
| 4C000000 | 4BF50000 | 4BEA0000 | 4BDE0000 | 4BD40000 | 4BC80000 | 4BBE0000 | 4BB50000 |
| 4C6E0000 | 4C630000 | 4C560000 | 4C4B0000 | 4C3F0000 | 4C340000 | 4C230000 | 4C120000 |
| 4CDF0000 | 4CD30000 | 4CC30000 | 4CA90000 | 4C9C0000 | 4C900000 | 4C870000 | 4C7B0000 |
| 4D850000 | 4D6C0000 | 4D560000 | 4D410000 | 4D330000 | 4D210000 | 4D150000 | 4CED0000 |
| 4DFE0000 | 4DF20000 | 4DE40000 | 4DD80000 | 4DCE0000 | 4DB90000 | 4DAC0000 | 4D980000 |
| 4E7D0000 | 4E710000 | 4E670000 | 4E5E0000 | 4E4A0000 | 4E370000 | 4E210000 | 4E0C0000 |
| 4EDA0000 | 4ECF0000 | 4EBD0000 | 4EB20000 | 4EA90000 | 4E9D0000 | 4E930000 | 4E890000 |
| 4F350000 | 4F260000 | 4F1B0000 | 4F110000 | 4F060000 | 4EFB0000 | 4EF00000 | 4EE50000 |
| 4FA80000 | 4F9C0000 | 4F900000 | 4F860000 | 4F6F0000 | 4F630000 | 4F510000 | 4F450000 |
| 50050000 | 4FF90000 | 4FEF0000 | 4FE60000 | 4FDA0000 | 4FD00000 | 4FC70000 | 4FBC0000 |
| 505F0000 | 50570000 | 504C0000 | 50410000 | 50360000 | 502B0000 | 50190000 | 500E0000 |
| 50D10000 | 50BD0000 | 50B10000 | 50A50000 | 50980000 | 508C0000 | 507A0000 | 506A0000 |
| 51290000 | 511E0000 | 51130000 | 51080000 | 50FC0000 | 50F20000 | 50E60000 | 50DC0000 |
| 51900000 | 51820000 | 51720000 | 51670000 | 51590000 | 514C0000 | 51400000 | 51340000 |
| 52040000 | 51F90000 | 51E80000 | 51D90000 | 51D00000 | 51BC0000 | 51B00000 | 519C0000 |
| 526D0000 | 52630000 | 52570000 | 524D0000 | 52440000 | 52300000 | 52220000 | 52180000 |
| 52C10000 | 52B80000 | 52AD0000 | 52A20000 | 52970000 | 528C0000 | 52830000 | 52770000 |
| 53210000 | 53180000 | 530E0000 | 52FE0000 | 52F20000 | 52E30000 | 52D70000 | 52CB0000 |
| 53880000 | 537B0000 | 53700000 | 53650000 | 53580000 | 534A0000 | 533E0000 | 532B0000 |
| 53F80000 | 53EE0000 | 53DC0000 | 53CE0000 | 53BE0000 | 53A80000 | 539B0000 | 53900000 |
| 545D0000 | 54510000 | 54470000 | 543C0000 | 54270000 | 54180000 | 540B0000 | 54010000 |
| 54BF0000 | 54AB0000 | 549E0000 | 54930000 | 54880000 | 547A0000 | 54700000 | 54670000 |
| 55210000 | 55100000 | 55050000 | 54FA0000 | 54EE0000 | 54E10000 | 54D40000 | 54C80000 |
| 55AE0000 | 55A40000 | 55910000 | 557C0000 | 556F0000 | 55640000 | 554D0000 | 55370000 |
| 56160000 | 560B0000 | 55F50000 | 55E90000 | 55DD0000 | 55D20000 | 55C70000 | 55BB0000 |
| 56970000 | 568B0000 | 56790000 | 566D0000 | 56610000 | 56480000 | 563E0000 | 56330000 |
| 570B0000 | 56FF0000 | 56F60000 | 56E20000 | 56D60000 | 56C90000 | 56B80000 | 56AC0000 |
| 57710000 | 57660000 | 575B0000 | 574F0000 | 57430000 | 572F0000 | 571F0000 | 57150000 |
| 58030000 | 57F60000 | 57D10000 | 57BC0000 | 57AB0000 | 579D0000 | 57900000 | 57850000 |
| 58880000 | 58750000 | 58670000 | 585D0000 | 58430000 | 58370000 | 58280000 | 58170000 |
| 59040000 | 58F70000 | 58ED0000 | 58D80000 | 58CD0000 | 58B30000 | 58A60000 | 589C0000 |
| 59680000 | 59570000 | 594D0000 | 593F0000 | 59340000 | 59290000 | 591E0000 | 59140000 |
| 59CE0000 | 59C00000 | 59B60000 | 59AC0000 | 599E0000 | 59930000 | 59830000 | 59770000 |
| 5A310000 | 5A250000 | 5A170000 | 5A090000 | 59FA0000 | 59EF0000 | 59E40000 | 59D90000 |
| 5AA60000 | 5A980000 | 5A890000 | 5A790000 | 5A6E0000 | 5A5E0000 | 5A4B0000 | 5A3D0000 |
| 5B070000 | 5AFA0000 | 5AEE0000 | 5AE30000 | 5AD50000 | 5AC50000 | 5ABA0000 | 5AB00000 |
| 5B5C0000 | 5B4F0000 | 5B460000 | 5B3C0000 | 5B320000 | 5B280000 | 5B1F0000 | 5B130000 |
| 5BD60000 | 5BCA0000 | 5BB90000 | 5BAB0000 | 5B950000 | 5B840000 | 5B700000 | 5B660000 |
| 5C430000 | 5C320000 | 5C250000 | 5C180000 | 5C080000 | 5BFD0000 | 5BEE0000 | 5BE00000 |
| 5CCC0000 | 5CBB0000 | 5CAA0000 | 5C9E0000 | 5C8B0000 | 5C760000 | 5C660000 | 5C520000 |
| 5D500000 | 5D3D0000 | 5D2A0000 | 5D200000 | 5D100000 | 5CF60000 | 5CE70000 | 5CD90000 |
| 5DC70000 | 5DB60000 | 5DA50000 | 5D990000 | 5D8C0000 | 5D820000 | 5D760000 | 5D610000 |
| 5E270000 | 5E1C0000 | 5E0E0000 | 5E030000 | 5DF80000 | 5DED0000 | 5DE10000 | 5DD70000 |
| 5EA40000 | 5E930000 | 5E7D0000 | 5E720000 | 5E640000 | 5E4E0000 | 5E400000 | 5E360000 |
| 5F190000 | 5F0A0000 | 5EFC0000 | 5EF10000 | 5EE60000 | 5ED20000 | 5EC60000 | 5EB30000 |
| 5F7E0000 | 5F700000 | 5F650000 | 5F5A0000 | 5F4A0000 | 5F3B0000 | 5F300000 | 5F250000 |
| 60020000 | 5FEF0000 | 5FE00000 | 5FD40000 | 5FC60000 | 5FB10000 | 5F9C0000 | 5F8F0000 |
| 60890000 | 607D0000 | 60730000 | 60690000 | 60540000 | 603B0000 | 60220000 | 60150000 |
| 60EB0000 | 60DC0000 | 60D20000 | 60C70000 | 60BA0000 | 60AF0000 | 60A40000 | 60940000 |
| 61690000 | 61580000 | 614A0000 | 61380000 | 612D0000 | 61200000 | 610E0000 | 61030000 |
| 61F30000 | 61E80000 | 61D20000 | 61C20000 | 61AD0000 | 61A10000 | 618E0000 | 61750000 |
| 626C0000 | 62580000 | 62400000 | 622F0000 | 62220000 | 62170000 | 620A0000 | 61FF0000 |
| 62E50000 | 62D20000 | 62C70000 | 62B90000 | 62AD0000 | 629A0000 | 628A0000 | 62790000 |
| 63700000 | 635B0000 | 634F0000 | 63420000 | 63310000 | 631D0000 | 63090000 | 62F60000 |
| 63E70000 | 63D50000 | 63C90000 | 63BE0000 | 63B20000 | 63A50000 | 63900000 | 637A0000 |
| 64670000 | 64590000 | 64470000 | 64340000 | 64220000 | 64100000 | 64000000 | 63F50000 |
| 64CF0000 | 64C10000 | 64AE0000 | 64A10000 | 64940000 | 64890000 | 647E0000 | 64720000 |
| 65530000 | 653E0000 | 65300000 | 65240000 | 650F0000 | 65020000 | 64EE0000 | 64DB0000 |
| 65D30000 | 65C30000 | 65B50000 | 65A10000 | 65910000 | 65830000 | 65760000 | 65690000 |
| 664C0000 | 66400000 | 66340000 | 66230000 | 66160000 | 66040000 | 65F50000 | 65E80000 |
| 66E60000 | 66D30000 | 66BC0000 | 66A50000 | 66900000 | 667B0000 | 66650000 | 665A0000 |
| 676D0000 | 67610000 | 674B0000 | 67360000 | 672C0000 | 67170000 | 670B0000 | 66FA0000 |

| | | | | | | | |
|---|---|---|---|---|---|---|---|
| 67F90000 | 67EA0000 | 67DA0000 | 67C50000 | 67B30000 | 67A10000 | 678C0000 | 677B0000 |
| 686F0000 | 68620000 | 68570000 | 684C0000 | 68350000 | 68290000 | 68120000 | 68070000 |
| 68FA0000 | 68E40000 | 68CF0000 | 68C10000 | 68B50000 | 68A20000 | 68930000 | 687C0000 |
| 698F0000 | 69820000 | 696E0000 | 69590000 | 69440000 | 69300000 | 691D0000 | 69070000 |
| 6A0C0000 | 69F20000 | 69E00000 | 69D30000 | 69C70000 | 69BC0000 | 69B00000 | 69A40000 |
| 6A9A0000 | 6A860000 | 6A730000 | 6A5E0000 | 6A4E0000 | 6A430000 | 6A370000 | 6A240000 |
| 6B1E0000 | 6B100000 | 6B020000 | 6AF40000 | 6AE40000 | 6ACF0000 | 6AC30000 | 6AAF0000 |
| 6B980000 | 6B8E0000 | 6B7B0000 | 6B710000 | 6B5E0000 | 6B500000 | 6B390000 | 6B2C0000 |
| 6C050000 | 6BFA0000 | 6BEE0000 | 6BDD0000 | 6BD20000 | 6BC70000 | 6BB20000 | 6BA70000 |
| 6CAA0000 | 6C9E0000 | 6C8A0000 | 6C750000 | 6C600000 | 6C450000 | 6C300000 | 6C1A0000 |
| 6D370000 | 6D230000 | 6D0F0000 | 6CFC0000 | 6CEC0000 | 6CE10000 | 6CCB0000 | 6CB60000 |
| 6DD50000 | 6DBE0000 | 6DA70000 | 6D970000 | 6D820000 | 6D6D0000 | 6D5E0000 | 6D480000 |
| 6E570000 | 6E490000 | 6E3E0000 | 6E330000 | 6E250000 | 6E110000 | 6DFD0000 | 6DEA0000 |
| 6EC90000 | 6EB50000 | 6E9E0000 | 6E8E0000 | 6E830000 | 6E770000 | 6E6C0000 | 6E610000 |
| 6F4B0000 | 6F410000 | 6F350000 | 6F2B0000 | 6F180000 | 6F040000 | 6EF30000 | 6EDE0000 |
| 6FAA0000 | 6F950000 | 6F890000 | 6F7F0000 | 6F730000 | 6F690000 | 6F5F0000 | 6F550000 |
| 701A0000 | 700E0000 | 6FF80000 | 6FE60000 | 6FD30000 | 6FC80000 | 6FBE0000 | 6FB20000 |
| 70880000 | 707D0000 | 70720000 | 70680000 | 70590000 | 704D0000 | 70430000 | 702F0000 |
| 71060000 | 70F10000 | 70E60000 | 70D80000 | 70C10000 | 70B50000 | 70A50000 | 70930000 |
| 71940000 | 71880000 | 717E0000 | 716B0000 | 71570000 | 71460000 | 71310000 | 711D0000 |
| 71F80000 | 71ED0000 | 71E20000 | 71D40000 | 71C90000 | 71BF0000 | 71B00000 | 719E0000 |
| 72700000 | 725B0000 | 72460000 | 72380000 | 722C0000 | 721B0000 | 720E0000 | 72030000 |
| 72FC0000 | 72F10000 | 72E50000 | 72D10000 | 72BA0000 | 72A80000 | 728E0000 | 727F0000 |
| 73870000 | 73760000 | 73610000 | 734E0000 | 733D0000 | 73220000 | 73160000 | 73060000 |
| 74170000 | 74070000 | 73F80000 | 73E60000 | 73D10000 | 73BF0000 | 73AF0000 | 73990000 |
| 74AE0000 | 749D0000 | 748C0000 | 74760000 | 74670000 | 74500000 | 743D0000 | 742D0000 |
| 753A0000 | 75290000 | 75160000 | 75050000 | 74F60000 | 74E10000 | 74D00000 | 74B90000 |
| 75DA0000 | 75C70000 | 75B20000 | 759D0000 | 75880000 | 75760000 | 755F0000 | 75480000 |
| 767D0000 | 76690000 | 76540000 | 76400000 | 76290000 | 76140000 | 75FF0000 | 75E80000 |
| 76FE0000 | 76E80000 | 76DC0000 | 76CC0000 | 76C10000 | 76B20000 | 76A60000 | 76900000 |
| 77840000 | 77760000 | 77690000 | 775C0000 | 77470000 | 77320000 | 771E0000 | 77090000 |
| 780E0000 | 77F30000 | 77E50000 | 77D80000 | 77CB0000 | 77BC0000 | 77A70000 | 77920000 |
| 78B60000 | 78A40000 | 788F0000 | 787A0000 | 78640000 | 784F0000 | 783A0000 | 78290000 |
| 79420000 | 79360000 | 792A0000 | 79160000 | 79020000 | 78EF0000 | 78D90000 | 78C40000 |
| 79CA0000 | 79B50000 | 79A90000 | 79940000 | 797E0000 | 79690000 | 795D0000 | 794F0000 |
| 7A5E0000 | 7A490000 | 7A3E0000 | 7A2A0000 | 7A170000 | 7A010000 | 79EC0000 | 79DF0000 |
| 7AF40000 | 7AE40000 | 7ACF0000 | 7ABA0000 | 7AAE0000 | 7A980000 | 7A830000 | 7A6E0000 |
| 7B790000 | 7B680000 | 7B5D0000 | 7B520000 | 7B3E0000 | 7B2B0000 | 7B150000 | 7B000000 |
| 7C030000 | 7BF00000 | 7BE20000 | 7BD40000 | 7BC20000 | 7BB00000 | 7B9A0000 | 7B850000 |
| 7CAA0000 | 7C940000 | 7C800000 | 7C6D0000 | 7C580000 | 7C420000 | 7C2E0000 | 7C180000 |
| 7D200000 | 7D120000 | 7D030000 | 7CF50000 | 7CE60000 | 7CD80000 | 7CCA0000 | 7CB60000 |
| 7D860000 | 7D7C0000 | 7D710000 | 7D640000 | 7D5A0000 | 7D4C0000 | 7D3D0000 | 7D2F0000 |
| 7DE20000 | 7DD70000 | 7DCB0000 | 7DBF0000 | 7DB40000 | 7DA90000 | 7D9E0000 | 7D920000 |
| 7E460000 | 7E3A0000 | 7E2D0000 | 7E230000 | 7E170000 | 7E090000 | 7DFB0000 | 7DEF0000 |
| 7EA30000 | 7E970000 | 7E8C0000 | 7E820000 | 7E750000 | 7E680000 | 7E5E0000 | 7E540000 |
| 7EFD0000 | 7EF20000 | 7EE70000 | 7EDB0000 | 7ED00000 | 7EC50000 | 7EBA0000 | 7EB00000 |
| 7F570000 | 7F4C0000 | 7F400000 | 7F350000 | 7F2A0000 | 7F1F0000 | 7F130000 | 7F080000 |
| 7FAC0000 | 7FA10000 | 7F960000 | 7F8B0000 | 7F810000 | 7F770000 | 7F6C0000 | 7F610000 |
| 7FFF0000 | 7FF50000 | 7FEA0000 | 7FDF0000 | 7FD50000 | 7FCB0000 | 7FC10000 | 7FB60000 |
| 80550000 | 804A0000 | 803F0000 | 80340000 | 80290000 | 801E0000 | 80140000 | 800A0000 |
| 80AA0000 | 809F0000 | 80950000 | 808B0000 | 80800000 | 80750000 | 806A0000 | 80600000 |
| 81030000 | 80F60000 | 80EB0000 | 80DF0000 | 80D40000 | 80C90000 | 80BE0000 | 80B40000 |
| 81570000 | 814D0000 | 81420000 | 81370000 | 812D0000 | 81230000 | 81180000 | 810D0000 |
| 81B30000 | 81A70000 | 819B0000 | 81900000 | 81840000 | 81780000 | 816C0000 | 81620000 |
| 82140000 | 82070000 | 81FA0000 | 81ED0000 | 81E10000 | 81D50000 | 81CA0000 | 81BF0000 |
| 827C0000 | 826F0000 | 82620000 | 82550000 | 82480000 | 823B0000 | 822E0000 | 82210000 |
| 82F30000 | 82E50000 | 82D70000 | 82C90000 | 82BB0000 | 82AD0000 | 82960000 | 82890000 |
| 83630000 | 83550000 | 83470000 | 83390000 | 832B0000 | 831D0000 | 830F0000 | 83010000 |
| 83D30000 | 83C50000 | 83B70000 | 83A90000 | 839B0000 | 838D0000 | 837F0000 | 83710000 |
| 843E0000 | 84310000 | 84240000 | 84170000 | 840A0000 | 83FD0000 | 83EF0000 | 83E10000 |
| 00000000 | 00000000 | 00000000 | 00000000 | 84720000 | 84650000 | 84580000 | 844B0000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

Appendix B
===========

Instruction for using the TET software :

1. Get a Smart Scanner (Scitex product)
2. Connect it to the Whisper Cabinet & Softproof Workstation (Scitex procucts)
3. Connect in the a Fyrox Cabinet (Scitex procuct)
4. Load, using the Fyrox cabinex, Scitex version 5.0.3 (Scitex software procuct)
5. Load The scanner configuration magnitic tape :
   a. Start up the system as described in the Smart Scanner User Guide (chapter 2)
   b. Pick "services"
   c. Pick "Software Handling"
   d. Pick "Load Configuration" and follow the displayed instructions.
6. Pick "services"
   Pick "Exit to RMX"
7. Enter the following commands :

```
af :user:
cd flow
af flow
```

8. Create the ascii file tr_help.h according to its print-out in appendix A
9. Create the following binary files, according to the print-outs in appendix A. The ASCII Print-outs are in Hexadecimal format, and the files created should include their binary representations:

```
Create NEWCAST.IDB from NEWCAST.HEX
Create DARK.IDB from DARK.HEX
Create DARKINST.IDB from DARKINST.HEX
Create INSTRUCT.IDB from INSTRUCT.HEX
Create LIGHT.IDB from LIGHT.HEX
Create LIGHTINS.IDB from LIGHTINS.HEX
Create REPROD2.IDB from REPROD2.HEX
Create CHOOSING.IDB from CHOOSING.HEX
Create OPTDEL.IDB from OPTDEL.HEX
Create FLACCESS.IDB from FLACCESS.HEX
Create tone.out from tone.HEX
Create yshow.pnl from yshow.HEX
Create flw_pwd.pnl from flw_pwd.HEX
```

10. Enter the following commands :

```
copy NEWCAST.IDB over  :sd:prisma/idf/dir28
copy DARK.IDB over     :sd:prisma/idf/dir31
copy DARKINST.IDB over :sd:prisma/idf/dir11
copy INSTRUCT.IDB over :sd:prisma/idf/dir22
copy LIGHT.IDB over    :sd:prisma/idf/dir9
copy LIGHTINS.IDB over :sd:prisma/idf/dir14
copy REPROD2.IDB over  :sd:prisma/idf/dir15
copy CHOOSING.IDB over :sd:prisma/idf/dir18
copy OPTDEL.IDB over   :sd:prisma/idf/dir19
copy FLACCESS.IDB over :sd:prisma/idf/dir21
delete :sd:prisma/system/dir5/tone
copy tone.out over     :sd:prisma/system/dir5/tone
copy yshow.pnl over    :sd:prisma/panels/dir1
copy flw_pwd.pnl over  :sd:prisma/panels/dir14
    lo
```

11. Perform the scanning procedure, as described in the Smart Scanner User Guide, in order to get to the Tone & Color scanning mode.
12. Pick "Yes" in the "INCTRUCTED FLOW ?" memu displayed at the begining of the tone mode.
13. Pick "Yes" in the "Modify Passwords ?" memu, if you want to add/ modify/delete a TET passsword. A panel is displayed.
    You can scan all existing password by using the NEXT bottom.
    You can create a new password by typing it to the topmost field.
    you can modify a password by toggling one or more of its functions between the USE & BLOCK options.
    Pick Save & Exit to terminate.
14. Perform the instructed flow, by responding to the displayed queries.

I claim:

1. An electronic separation scanner comprising:

a tool library comprising a plurality of tools, each individual one of the plurality of tools comprising a user interface operative to prompt a user to select values for at least one tone enhancement parameter;

an optical-mechanical scanning unit operative to electronically scan a color image in accordance with at least one user-selected tone enhancement parameter value;

a selective tool disabler operative to selectively disable access of the user to at least one of the plurality of tools, said selective tool disabler comprising a tool sequence generator operative to determine a tool sequence in which at least said first and second tools are sequentially presented to the user, the first tool comprising an indication prompting the user to select values for a first set of first tone enhancement parameters and the second tool comprising an indication prompting the user to select values for a second set of second tone enhancement parameters;

a user querying unit operative to prompt a user to enter a user evaluation of at least one characteristic of the color image and to transit user evaluation information to the tool sequence generator, wherein the tool sequence generator determines the tool sequence at least are in accordance with the user evaluation information;

a query sequence generator operative to receive a user response to an individual query from the user querying unit and to determine, at least partly in accordance therewith, a sequence of further queries to be presented to the user by the user querying unit; and a user expertise level coding system comprising, for each of a plurality of users, a stored indication of an expertise level code value, wherein the query sequence generator determines the sequence of queries presented to an individual user at least partly in accordance with the user's ordinal expertise level code value.

2. An electronic separation scanner according to claim 1 wherein the selective tool disabler includes:

a set of rules determining a relationship between use of at least one first tool and disabling of a corresponding set of at least one second tools; and a user selection monitor operative to receive an indication of use of a first tool and to disable access of the user to the corresponding set of at least one second tools.

3. An electronic separation scanner according to claim 1 wherein the selective tool disabler includes:

a set of rules determining a relationship between type of usage of individual first tools and disabling of a corresponding set of at least one second tools; and a tool usage monitor operative to receive a characterization of usage of a user-selected first tool and to disable access of the user to the corresponding set of at Least one second tool in accordance with the set of rules.

4. An electronic separation scanner according to claim 1 wherein the optical-mechanical scanning unit includes:

a sequence of transformation units operative to provide a corresponding sequence of digital representations of the color image, wherein the tool library comprises a first tool for selecting values of a tone enhancement parameter of an individual transformation unit in the transformation unit sequence and a second tool for selecting values of a tone enhancement parameter of a later transformation unit in the transformation unit sequence, and wherein the first tool precedes the second tool in the tool sequence.

5. An electronic separation scanner according to claim 1 and wherein the query sequence generator is operative to automatically analyze at least one characteristic of the color image and to determine, at least partly in accordance therewith, the sequence of further queries.

6. An electronic separation scanner according to claim 1 wherein the expertise level code value for each individual user comprises an indication of a subset of the plurality of tools to be disabled for the individual user.

7. An electronic separation scanner according to claim 1 wherein the user querying unit prompts a user to evaluate at least one color image characteristic as satisfactory and wherein the tool sequence generator is operative to determine a tool sequence which excludes at least one tool which affects the satisfactory color image characteristic.

8. An electronic separation scanner according to claim 1 and also comprising an automatic image analyzer operative to automatically analyze at least one characteristic of the color image;

wherein the tool sequence generator determines the tool sequence at least partly in accordance with the automatically analyzed characteristic.

9. An electronic separation scanner according to claim 1 wherein each of the first and second sets of first tone enhancement parameters comprises an individual one of the following set of tone enhancement parameters:

brightness/darkness of white point;
brightness/darkness of dark point;
global image brightness/darkness;
color balance of white point;
color balance of dark point; and
global image color balance.

10. An electronic separation scanner according to claim 1 and also comprising a current image display operative to provide a real-time indication of the appearance of the image as scanned in accordance with current user-selected tone enhancement parameter values.

11. An electronic separation scanner according to claim 1 wherein the user evaluation of at least one color image characteristic defines a query sequence of at least one queries and wherein the query sequence and the tool sequence are interspersed.

12. An electronic separation scanner comprising:

a tool library comprising a plurality of tools, each individual one of the plurality of tools comprising a user interface operative to prompt a user to select values for at least one tone enhancement parameter;

an optical-mechanical scanning unit operative to electronically scan a color image in-accordance with at least one user-selected tone enhancement parameter value;

a selective tool disabler operative to selectively disable access of the user to at least one of the plurality of tools; and a user expertise level coding system comprising for each of a plurality of users, a stored indication of an ordinal expertise level code value and for each expertise level code value, a stored indication of a subset of the plurality of tools to be disabled by the selective tool disabler.

13. An electronic separation scanner according to claim 12 wherein the user expertise level coding system also comprises an automatic expertise level updating system.

14. An electronic separation scanner according to claim 13 wherein the automatic expertise level updating system comprises, for each expertise level code value, a stored indication of at least one prerequisite for advancing a user at the individual expertise level code value to the next expertise level code value.

15. An electronic separation scanner according to claim 14 wherein the at least one prerequisite comprises at least one of the following types of prerequisite:

time accumulated at the individual expertise level;

quantity of work experience at the individual expertise level;

full utilization of the subset of tools which is not disabled by the selective tool disabler;

quality level of scanned images generated by a user; and correctness of user's habitual work processes.

16. An electronic separation scanning method comprising the steps of:

providing a tool library comprising a plurality of tools, each individual one of the plurality of tools comprising a user interface operative to prompt a user to select values for at least one tone enhancement parameter;

selectively disabling access of the user to at least one of the plurality of tools, wherein the disabling step comprises the steps of determining a tool sequence in which at least said first and second tools are sequentially presented to the user, the first tool comprising an indication prompting the user to select values for a first set of first tone enhancement parameters and the second tool comprising an indication prompting the user to select values for a second set of second tone enhancement parameters;

prompting a user to enter a user evaluation of at least one characteristic of the color image;

determining the tool sequence at least partly in accordance with the user evaluation information;

receiving a user response to an individual query and determining, at least partly in accordance therewith, a sequence of further queries to be presented to the user;

storing, for each of plurality of users, an indication of an expertise level code value, wherein the sequence of queries presented to an individual user is determined at least partly in accordance with the user's ordinal expertise level code value; and electronically scanning a color image in accordance with at least one user-selected tone enhancement parameter value.

17. An electronic separation scanning method according to claim 16 wherein the selectively disabling step includes the steps of:

providing a set of rules determining a relationship between use of at least one first tool and disabling of a corresponding set of at least one second tools; and receiving an indication of use of a first tool and disabling access of the user to the corresponding set of at least one second tools in accordance with the set of rules.

18. An electronic separation scanning method according to claim 16 wherein the selectively disabling step includes the steps of:

providing a set of rules determining a relationship between type of usage of individual first tools and disabling of a corresponding set of at least one second tools; and receiving a characterization of usage of a user-selected first tool and disabling access of the user to the corresponding set of at least one second tool in accordance with the set of rules.

19. An electronic separation scanning method according to claim 16 wherein the step of electronically scanning comprises the step of performing a sequence of color transformations, thereby to provide a sequence of digital representations of the color image, wherein the tool library comprises a first tool for selecting values of a tone enhancement parameter of an individual transformation in the transformation sequence and a second tool for selecting values of a tone enhancement parameter of a later transformation in the transformation sequence, and wherein the first tool precedes the second tool in the tool sequence.

20. An electronic separation scanning method according to claim 16 and wherein the step of determining comprises the step of:

automatically analyzing at least one characteristic the color image and determining, at least partly in accordance therewith, the sequence of further queries.

21. An electronic separation scanning method according to claim 16 wherein the expertise level code value for each individual user comprises an indication of a subset of the plurality of tools to be disabled for the individual user.

22. An electronic separation scanning method according to claim 16 wherein the step of prompting comprises the step of:

prompting a user to evaluate at least one color image characteristic as satisfactory; and generating a tool sequence which excludes at least one tool which affects the satisfactory color image characteristic.

23. An electronic separation scanning method according to claim 16 and also comprising the steps of:

automatically analyzing at least one characteristic of the color image; and determining the tool sequence at least partly in accordance with the automatically analyzed characteristic.

24. An electronic separation scanning method according to claim 16 wherein each of the first and second sets of first tone enhancement parameters comprises an individual one of the following set of tone enhancement parameters:

brightness/darkness of white point;
brightness/darkness of dark point;
global image brightness/darkness;
color balance of white point;
color balance of dark point; and
global image color balance.

25. An electronic separation scanning method according to claim 16 and also comprising the step of providing a real-time indication of the appearance of the image as scanned in accordance with current user-selected tone enhancement parameter values.

26. An electronic separation scanning method according to claim 16 wherein the step of prompting defines a query sequence of at least one queries and wherein the query sequence and the tool sequence are interspersed.

27. An electronic separation scanning method comprising the steps of:

providing a tool library comprising a plurality of tools, each individual one of the plurality of tools comprising a user interface operative to prompt a user to select values for at least one tone enhancement parameter;

selectively disabling access of the user to at least one of the plurality of tools:

storing, for each of a plurality of users, an indication of an ordinal expertise level code value, and for each expertise level code value, storing an indication of a subset of the plurality of tools to be disabled by the selective tool disabler; and electronically scanning a color image in accordance with at least one user-selected tone enhancement parameter value.

28. An electronic separation scanning method according to claim 27 wherein the step of storing also comprises the step of automatically updating expertise levels of individual users.

29. An electronic separation scanning method according to claim 28 wherein the step of storing comprises the step of:

storing, For each expertise level code value, an indication of at least one prerequisite For advancing a user at the individual expertise level code value to the next expertise level code value.

30. An electronic separation scanning method according to claim 29 wherein the at least one prerequisite comprises at least one of the following types of prerequisite:

time accumulated at the individual expertise level;
quantity of work experience at the individual expertise level;
full utilization of the subset of tools which is not disabled by the selective tool disabler;
quality level of scanned images generated by a user; and
correctness of user's habitual work processes.

* * * * *